US010735642B1

(12) United States Patent
Manzari et al.

(10) Patent No.: US 10,735,642 B1
(45) Date of Patent: Aug. 4, 2020

(54) USER INTERFACES FOR CAPTURING AND MANAGING VISUAL MEDIA

(71) Applicant: Apple Inc., Cupertino, CA (US)

(72) Inventors: Behkish J. Manzari, San Francisco, CA (US); Alok Deshpande, Mountain View, CA (US); Alan C. Dye, Sa Francisco, CA (US); Craig M. Federighi, Los Altos Hills, CA (US); Paul Hubel, Mountain View, CA (US); Nicholas Lupinetti, San Francisco, CA (US); Jonathan McCormack, Los Altos, CA (US); Grant Paul, San Francisco, CA (US); William A. Sorrentino, III, San Francisco, CA (US); Andre Souza Dos Santos, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/584,044

(22) Filed: Sep. 26, 2019

Related U.S. Application Data

(60) Provisional application No. 62/844,110, filed on May 6, 2019, provisional application No. 62/856,036, filed (Continued)

(51) Int. Cl.

*H04N 5/232* (2006.01)
*H04N 5/262* (2006.01)
*H04M 1/725* (2006.01)

(52) U.S. Cl.

CPC .... *H04N 5/23216* (2013.01); *H04M 1/72563* (2013.01); *H04N 5/232935* (2018.08); *H04N 5/232939* (2018.08); *H04N 5/2621* (2013.01)

(58) Field of Classification Search

CPC .............. H04N 5/232; H04N 5/23216; H04N 5/232939; H04N 5/232935; H04N 5/2621; H04M 1/72563

(Continued)

(56) References Cited

U.S. PATENT DOCUMENTS 5,557,358 A 9/1996 Mukai et al.
5,615,384 A 3/1997 Allard et al.

(Continued)

FOREIGN PATENT DOCUMENTS

AU 2017100683 B4 1/2018
AU 2015297035 B2 6/2018

(Continued)

OTHER PUBLICATIONS

AstroVideo, "AstroVideo enables you to use a low-cost, low-light video camera to capture astronomical images", Available online at: https://www.coaa.co.uk/astrovideo.htm, Retrieved on: Nov. 18, 2019, 5 pages.

(Continued)

*Primary Examiner* — Pritham D Prabhakher
(74) *Attorney, Agent, or Firm* — Dentons US LLP

(57) ABSTRACT

Media user interfaces are described, including user interfaces for capturing media (e.g., capturing a photo, recording a video), displaying media (e.g., displaying a photo, playing a video), editing media (e.g., modifying a photo, modifying a video), accessing media controls or settings (e.g., accessing controls or settings to capture photos or videos to capture videos), and automatically adjusting media (e.g., automatically modifying a photo, automatically modifying a video).

21 Claims, 354 Drawing Sheets

Related U.S. Application Data on Jun. 1, 2019, provisional application No. 62/897,968, filed on Sep. 9, 2019.

(58) Field of Classification Search
USPC .................................................... 348/333.01
See application file for complete search history.

(56) References Cited

U.S. PATENT DOCUMENTS

| | | | | |
|---|---|---|---|---|
| 5,825,353 | A | 10/1998 | Will | |
| 6,359,837 | B1 | 3/2002 | Tsukamoto | |
| 6,429,896 | B1 | 8/2002 | Aruga et al. | |
| 6,522,347 | B1 | 2/2003 | Tsuji et al. | |
| 6,621,524 | B1 | 9/2003 | Iijima et al. | |
| 6,809,724 | B1 | 10/2004 | Shiraishi et al. | |
| 6,809,759 | B1 | 10/2004 | Chiang | |
| 6,819,867 | B2 | 11/2004 | Mayer, Jr. et al. | |
| 6,901,561 | B1 | 5/2005 | Kirkpatrick et al. | |
| 7,463,304 | B2 | 12/2008 | Murray | |
| 7,515,178 | B1 | 4/2009 | Fleischman et al. | |
| 7,551,899 | B1 | 6/2009 | Nicolas et al. | |
| 8,189,087 | B2 | 5/2012 | Misawa et al. | |
| 8,203,640 | B2 | 6/2012 | Kim et al. | |
| 8,295,546 | B2 | 10/2012 | Craig et al. | |
| 8,379,098 | B2 | 2/2013 | Rottler et al. | |
| 8,405,680 | B1 | 3/2013 | Cardoso Lopes et al. | |
| 8,624,836 | B1 | 1/2014 | Miller et al. | |
| 8,675,084 | B2 | 3/2014 | Bolton et al. | |
| 8,736,704 | B2 * | 5/2014 | Jasinski | H04N 5/23232 348/222.1 |
| 8,736,716 | B2 * | 5/2014 | Prentice | H04N 5/2625 348/220.1 |
| 8,742,890 | B2 | 6/2014 | Gocho | |
| 8,762,895 | B2 | 6/2014 | Mehta et al. | |
| 8,817,158 | B2 | 8/2014 | Saito | |
| 8,885,978 | B2 | 11/2014 | Cote et al. | |
| 8,896,652 | B2 | 11/2014 | Ralston | |
| 9,094,576 | B1 | 7/2015 | Karakotsios | |
| 9,153,031 | B2 | 10/2015 | Ei-Saban et al. | |
| 9,172,866 | B2 | 10/2015 | Ito et al. | |
| 9,207,837 | B2 | 12/2015 | Paretti et al. | |
| 9,230,241 | B1 | 1/2016 | Singh et al. | |
| 9,245,177 | B2 | 1/2016 | Perez | |
| 9,250,797 | B2 | 2/2016 | Roberts et al. | |
| 9,264,660 | B1 | 2/2016 | Petterson et al. | |
| 9,298,263 | B2 | 3/2016 | Geisner et al. | |
| 9,313,401 | B2 * | 4/2016 | Frey | H04N 5/23245 |
| 9,325,970 | B2 | 4/2016 | Sakayori | |
| 9,349,414 | B1 | 5/2016 | Furment et al. | |
| 9,360,671 | B1 | 6/2016 | Zhou | |
| 9,423,868 | B2 | 8/2016 | Iwasaki | |
| 9,448,708 | B1 | 9/2016 | Bennett et al. | |
| 9,451,144 | B2 | 9/2016 | Dye et al. | |
| 9,544,563 | B1 | 1/2017 | Chin et al. | |
| 9,602,559 | B1 | 3/2017 | Barros et al. | |
| 9,628,416 | B2 | 4/2017 | Henderson | |
| 9,686,497 | B1 | 6/2017 | Terry | |
| 9,704,250 | B1 | 7/2017 | Shah et al. | |
| 9,716,825 | B1 | 7/2017 | Manzari et al. | |
| 9,767,613 | B1 * | 9/2017 | Bedikian | G06T 19/006 |
| 9,942,463 | B2 | 4/2018 | Kuo et al. | |
| 9,973,674 | B2 | 5/2018 | Dye et al. | |
| 10,187,587 | B2 * | 1/2019 | Hasinoff | H04N 1/2137 |
| 10,270,983 | B1 | 4/2019 | Van Os et al. | |
| 10,297,034 | B2 * | 5/2019 | Nash | H04N 5/217 |
| 10,304,231 | B2 | 5/2019 | Saito | |
| 10,326,942 | B2 * | 6/2019 | Shabtay | G02B 13/0015 |
| 10,375,313 | B1 | 8/2019 | Van Os et al. | |
| 10,397,500 | B1 | 8/2019 | Xu et al. | |
| 10,447,908 | B2 * | 10/2019 | Lee | H04N 5/23258 |
| 10,467,729 | B1 | 11/2019 | Perera et al. | |
| 10,523,879 | B2 | 12/2019 | Dye et al. | |
| 2002/0140803 | A1 | 10/2002 | Gutta et al. | |
| 2002/0171737 | A1 | 11/2002 | Tullis | |
| 2003/0001827 | A1 | 1/2003 | Gould | |
| 2003/0025802 | A1 | 2/2003 | Mayer et al. | |
| 2003/0025812 | A1 | 2/2003 | Slatter | |
| 2003/0107664 | A1 | 6/2003 | Suzuki | |
| 2003/0174216 | A1 | 9/2003 | Iguchi et al. | |
| 2004/0041924 | A1 | 3/2004 | White et al. | |
| 2004/0061796 | A1 | 4/2004 | Honda et al. | |
| 2004/0095473 | A1 | 5/2004 | Park | |
| 2004/0189861 | A1 | 9/2004 | Tom | |
| 2005/0134695 | A1 | 6/2005 | Deshpande | |
| 2005/0189419 | A1 | 9/2005 | Igarashi et al. | |
| 2005/0237383 | A1 | 10/2005 | Soga | |
| 2005/0248660 | A1 | 11/2005 | Stavely et al. | |
| 2006/0026521 | A1 | 2/2006 | Hotelling et al. | |
| 2006/0170791 | A1 | 8/2006 | Porter et al. | |
| 2006/0187322 | A1 | 8/2006 | Janson et al. | |
| 2006/0228040 | A1 | 10/2006 | Simon et al. | |
| 2006/0275025 | A1 | 12/2006 | Labaziewicz et al. | |
| 2007/0024614 | A1 | 2/2007 | Tam et al. | |
| 2007/0025711 | A1 | 2/2007 | Marcus | |
| 2007/0025714 | A1 | 2/2007 | Shiraki | |
| 2007/0040810 | A1 | 2/2007 | Dowe et al. | |
| 2007/0097088 | A1 | 5/2007 | Battles | |
| 2007/0109417 | A1 | 5/2007 | Hyttfors et al. | |
| 2007/0113099 | A1 | 5/2007 | Takikawa et al. | |
| 2007/0140675 | A1 | 6/2007 | Yanagi | |
| 2007/0165103 | A1 | 7/2007 | Arima et al. | |
| 2007/0228259 | A1 | 10/2007 | Hohenberger | |
| 2007/0254640 | A1 | 11/2007 | Bliss | |
| 2007/0273769 | A1 | 11/2007 | Takahashi | |
| 2008/0084484 | A1 | 4/2008 | Ochi et al. | |
| 2008/0106601 | A1 | 5/2008 | Matsuda | |
| 2008/0129759 | A1 | 6/2008 | Jeon et al. | |
| 2008/0129825 | A1 * | 6/2008 | DeAngelis | A63B 24/0021 348/169 |
| 2008/0143840 | A1 | 6/2008 | Corkum et al. | |
| 2008/0146275 | A1 | 6/2008 | Tofflinger | |
| 2008/0192020 | A1 | 8/2008 | Kang et al. | |
| 2008/0218611 | A1 | 9/2008 | Parulski et al. | |
| 2008/0222558 | A1 | 9/2008 | Cho et al. | |
| 2008/0284855 | A1 | 11/2008 | Umeyama et al. | |
| 2008/0297587 | A1 | 12/2008 | Kurtz et al. | |
| 2008/0298571 | A1 | 12/2008 | Kurtz et al. | |
| 2009/0021600 | A1 | 1/2009 | Watanabe | |
| 2009/0066817 | A1 | 3/2009 | Sakamaki | |
| 2009/0102933 | A1 | 4/2009 | Harris et al. | |
| 2009/0144639 | A1 | 6/2009 | Nims et al. | |
| 2009/0167890 | A1 | 7/2009 | Nakagomi et al. | |
| 2009/0244318 | A1 | 10/2009 | Makii | |
| 2009/0251484 | A1 | 10/2009 | Zhao et al. | |
| 2009/0315671 | A1 | 12/2009 | Gocho | |
| 2010/0020221 | A1 | 1/2010 | Tupman et al. | |
| 2010/0020222 | A1 | 1/2010 | Jones et al. | |
| 2010/0097322 | A1 | 4/2010 | Hu et al. | |
| 2010/0124941 | A1 | 5/2010 | Cho | |
| 2010/0141786 | A1 | 6/2010 | Bigioi et al. | |
| 2010/0141787 | A1 | 6/2010 | Bigioi et al. | |
| 2010/0153847 | A1 | 6/2010 | Fama | |
| 2010/0162160 | A1 | 6/2010 | Stallings et al. | |
| 2010/0188426 | A1 | 7/2010 | Ohmori et al. | |
| 2010/0194931 | A1 | 8/2010 | Kawaguchi et al. | |
| 2010/0208122 | A1 | 8/2010 | Yumiki | |
| 2010/0232703 | A1 | 9/2010 | Aiso | |
| 2010/0232704 | A1 | 9/2010 | Thorn | |
| 2010/0238327 | A1 | 9/2010 | Griffith et al. | |
| 2010/0277470 | A1 | 11/2010 | Margolis | |
| 2010/0283743 | A1 | 11/2010 | Coddington | |
| 2010/0289825 | A1 | 11/2010 | Shin et al. | |
| 2010/0289910 | A1 | 11/2010 | Kamshilin | |
| 2011/0008033 | A1 | 1/2011 | Ichimiya | |
| 2011/0018970 | A1 | 1/2011 | Wakabayashi | |
| 2011/0019058 | A1 | 1/2011 | Sakai et al. | |
| 2011/0019655 | A1 | 1/2011 | Hakola | |
| 2011/0058052 | A1 | 3/2011 | Bolton et al. | |
| 2011/0072394 | A1 | 3/2011 | Victor | |
| 2011/0074710 | A1 | 3/2011 | Weeldreyer et al. | |
| 2011/0074830 | A1 | 3/2011 | Rapp et al. | |
| 2011/0085016 | A1 | 4/2011 | Kristiansen et al. | |
| 2011/0090155 | A1 | 4/2011 | Caskey et al. | |
| 2011/0115932 | A1 | 5/2011 | Shin et al. | |

(56) References Cited

U.S. PATENT DOCUMENTS

2011/0187879 A1 8/2011 Ochiai
2011/0221755 A1 9/2011 Geisner et al.
2011/0234853 A1 9/2011 Hayashi et al.
2011/0242369 A1 10/2011 Misawa et al.
2011/0249073 A1 10/2011 Cranfill et al.
2011/0258537 A1 10/2011 Rives et al.
2011/0296163 A1 12/2011 Abernethy et al.
2011/0304632 A1 12/2011 Evertt et al.
2012/0002898 A1 1/2012 Côté et al.
2012/0057064 A1 3/2012 Gardiner et al.
2012/0069028 A1 3/2012 Bouguerra
2012/0069206 A1 3/2012 Hsieh
2012/0105579 A1 5/2012 Jeon et al.
2012/0106790 A1 5/2012 Sultana et al.
2012/0120277 A1 5/2012 Tsai
2012/0162242 A1 6/2012 Amano et al.
2012/0169776 A1 7/2012 Rissa et al.
2012/0194559 A1 8/2012 Lim
2012/0206452 A1 8/2012 Geisner et al.
2012/0243802 A1 9/2012 Fintel et al.
2012/0249853 A1 10/2012 Krolczyk et al.
2012/0309520 A1 12/2012 Evertt et al.
2012/0320141 A1 12/2012 Bowen et al.
2013/0009858 A1 1/2013 Lacey
2013/0038546 A1 2/2013 Mineo
2013/0038771 A1 2/2013 Brunner et al.
2013/0055119 A1 2/2013 Luong
2013/0057472 A1 3/2013 Dizac et al.
2013/0076908 A1 3/2013 Bratton et al.
2013/0083222 A1 4/2013 Matsuzawa et al.
2013/0091298 A1 4/2013 Ozzie et al.
2013/0093904 A1 4/2013 Wagner et al.
2013/0101164 A1 4/2013 Leclerc et al.
2013/0135315 A1 5/2013 Bares et al.
2013/0141362 A1 6/2013 Asanuma
2013/0159900 A1 6/2013 Pendharkar
2013/0165186 A1 6/2013 Choi
2013/0201104 A1 8/2013 Ptucha et al.
2013/0208136 A1 8/2013 Takatsuka et al.
2013/0222663 A1 8/2013 Rydenhag et al.
2013/0246948 A1 9/2013 Chen et al.
2013/0265311 A1 10/2013 Na et al.
2013/0265467 A1 10/2013 Matsuzawa et al.
2013/0278576 A1 10/2013 Lee et al.
2013/0286251 A1 10/2013 Wood et al.
2013/0290905 A1 10/2013 Luvogt et al.
2013/0329074 A1 12/2013 Zhang et al.
2014/0007021 A1 1/2014 Akiyama
2014/0022399 A1 1/2014 Rashid
2014/0028872 A1 1/2014 Lee et al.
2014/0028885 A1 1/2014 Ma et al.
2014/0033100 A1 1/2014 Noda et al.
2014/0037178 A1 2/2014 Park
2014/0047389 A1 2/2014 Aarabi
2014/0055554 A1 2/2014 Du et al.
2014/0063175 A1 3/2014 Jafry et al.
2014/0063313 A1 3/2014 Choi et al.
2014/0078371 A1 3/2014 Kinoshita
2014/0095122 A1 4/2014 Appleman et al.
2014/0099994 A1 4/2014 Bishop et al.
2014/0104449 A1 4/2014 Masarik et al.
2014/0108928 A1 4/2014 Mumick
2014/0118563 A1 5/2014 Mehta et al.
2014/0132735 A1 5/2014 Lee et al.
2014/0143678 A1 5/2014 Mistry et al.
2014/0152886 A1 6/2014 Morgan-mar et al.
2014/0160231 A1 6/2014 Middleton et al.
2014/0160304 A1 6/2014 Galor et al.
2014/0176565 A1 6/2014 Adeyoola et al.
2014/0184524 A1 7/2014 Schiefer et al.
2014/0192233 A1 7/2014 Kakkori et al.
2014/0204229 A1 7/2014 Leung
2014/0218371 A1 8/2014 Du et al.
2014/0218599 A1 8/2014 Nakamura
2014/0240577 A1 8/2014 Masugi
2014/0267126 A1 9/2014 Berg et al.
2014/0267867 A1 9/2014 Lee et al.
2014/0300635 A1 10/2014 Suzuki
2014/0310598 A1 10/2014 Sprague et al.
2014/0327639 A1 11/2014 Papakipos et al.
2014/0333671 A1 11/2014 Phang et al.
2014/0351753 A1 11/2014 Shin et al.
2014/0359438 A1 12/2014 Matsuki
2014/0362091 A1 12/2014 Bouaziz et al.
2014/0368601 A1 12/2014 Decharms
2014/0368719 A1 12/2014 Kaneko et al.
2015/0022674 A1 1/2015 Blair et al.
2015/0043806 A1 2/2015 Karsch et al.
2015/0049233 A1 2/2015 Choi
2015/0067513 A1 3/2015 Zambetti et al.
2015/0078621 A1 3/2015 Choi et al.
2015/0085174 A1 3/2015 Shabtay et al.
2015/0092077 A1 4/2015 Feder et al.
2015/0109417 A1 4/2015 Zirnheld
2015/0116353 A1 4/2015 Miura et al.
2015/0138079 A1 5/2015 Lannsjo
2015/0145950 A1 5/2015 Murphy et al.
2015/0146079 A1 5/2015 Kim
2015/0150141 A1 5/2015 Szymanski et al.
2015/0154448 A1 6/2015 Murayama et al.
2015/0181135 A1 6/2015 Shimosato
2015/0189162 A1 7/2015 Kuo et al.
2015/0208001 A1 7/2015 Kaneko et al.
2015/0212723 A1 7/2015 Lim et al.
2015/0220249 A1 8/2015 Snibbe et al.
2015/0248198 A1 9/2015 Somlai-Fisher et al.
2015/0248583 A1 9/2015 Sugita et al.
2015/0249775 A1 9/2015 Jacumet
2015/0249785 A1 9/2015 Mehta et al.
2015/0254855 A1 9/2015 Patankar et al.
2015/0256749 A1* 9/2015 Frey .................. H04N 5/23245 348/220.1
2015/0264202 A1 9/2015 Pawlowski
2015/0277686 A1 10/2015 Laforge et al.
2015/0286724 A1 10/2015 Knaapen et al.
2015/0297185 A1 10/2015 Mander et al.
2015/0341536 A1 11/2015 Huang et al.
2015/0350533 A1 12/2015 Harris et al.
2015/0350535 A1 12/2015 Voss
2015/0362998 A1 12/2015 Park et al.
2015/0370458 A1 12/2015 Chen
2016/0012567 A1 1/2016 Siddiqui et al.
2016/0026371 A1 1/2016 Lu et al.
2016/0044236 A1 2/2016 Matsuzawa et al.
2016/0048725 A1* 2/2016 Holz ...................... G01P 13/00 345/156
2016/0050351 A1 2/2016 Lee et al.
2016/0065832 A1 3/2016 Kim et al.
2016/0065861 A1 3/2016 Steinberg et al.
2016/0077725 A1 3/2016 Maeda
2016/0080657 A1 3/2016 Chou et al.
2016/0092035 A1 3/2016 Crocker et al.
2016/0117829 A1 4/2016 Yoon et al.
2016/0142649 A1 5/2016 Yim
2016/0148384 A1 5/2016 Bud et al.
2016/0162039 A1* 6/2016 Eilat ...................... G06F 3/011 382/103
2016/0173869 A1 6/2016 Wang et al.
2016/0217601 A1 7/2016 Tsuda et al.
2016/0219217 A1 7/2016 Williams et al.
2016/0226926 A1 8/2016 Singh et al.
2016/0241793 A1 8/2016 Ravirala et al.
2016/0259413 A1 9/2016 Anzures et al.
2016/0259497 A1 9/2016 Foss et al.
2016/0259498 A1 9/2016 Foss et al.
2016/0259499 A1 9/2016 Kocienda et al.
2016/0259518 A1 9/2016 King et al.
2016/0259519 A1 9/2016 Foss et al.
2016/0259527 A1 9/2016 Kocienda et al.
2016/0259528 A1 9/2016 Foss et al.
2016/0267067 A1 9/2016 Mays et al.
2016/0283097 A1 9/2016 Voss
2016/0284123 A1 9/2016 Hare et al.
2016/0307324 A1 10/2016 Nakada et al.

(56) References Cited

U.S. PATENT DOCUMENTS

2016/0316147 A1 10/2016 Bernstein et al.
2016/0337570 A1 11/2016 Tan et al.
2016/0337582 A1 11/2016 Shimauchi et al.
2016/0353030 A1 12/2016 Gao et al.
2016/0357353 A1 12/2016 Miura et al.
2016/0357387 A1 12/2016 Penha et al.
2016/0360116 A1 12/2016 Penha et al.
2016/0366323 A1 12/2016 Chan et al.
2016/0370974 A1 12/2016 Stenneth
2016/0373631 A1 12/2016 Kocienda et al.
2017/0006210 A1 1/2017 Dye et al.
2017/0011773 A1 1/2017 Lee
2017/0013179 A1 1/2017 Kang et al.
2017/0018289 A1 1/2017 Morgenstern
2017/0024872 A1 1/2017 Olsson et al.
2017/0034449 A1 2/2017 Eum et al.
2017/0041549 A1 2/2017 Kim et al.
2017/0048461 A1 2/2017 Lee et al.
2017/0048494 A1 2/2017 Boyle et al.
2017/0061635 A1 3/2017 Oberheu et al.
2017/0109912 A1 4/2017 Lee et al.
2017/0111567 A1 4/2017 Pila
2017/0111616 A1 4/2017 Li et al.
2017/0178287 A1 6/2017 Anderson
2017/0186162 A1 6/2017 Mihic et al.
2017/0220212 A1 8/2017 Yang et al.
2017/0230585 A1 8/2017 Nash et al.
2017/0244896 A1 8/2017 Chien et al.
2017/0264817 A1 9/2017 Yan et al.
2017/0302840 A1 10/2017 Hasinoff et al.
2017/0324784 A1 11/2017 Taine et al.
2017/0336928 A1 11/2017 Chaudhri et al.
2017/0359504 A1 12/2017 Manzari et al.
2017/0359505 A1 12/2017 Manzari et al.
2017/0359506 A1 12/2017 Manzari et al.
2017/0366729 A1 12/2017 Itoh
2018/0047200 A1 2/2018 O'hara et al.
2018/0077332 A1 3/2018 Shimura et al.
2018/0091732 A1 3/2018 Wilson et al.
2018/0095649 A1 4/2018 Valdivia et al.
2018/0096487 A1 4/2018 Nash et al.
2018/0109722 A1 4/2018 Laroia et al.
2018/0113577 A1* 4/2018 Burns .................. G06F 16/739
2018/0114543 A1 4/2018 Novikoff
2018/0120661 A1 5/2018 Kilgore et al.
2018/0131876 A1 5/2018 Bernstein et al.
2018/0146132 A1 5/2018 Manzari et al.
2018/0152611 A1 5/2018 Li et al.
2018/0191944 A1 7/2018 Carbonell et al.
2018/0227479 A1 8/2018 Parameswaran et al.
2018/0227482 A1 8/2018 Holzer et al.
2018/0227505 A1 8/2018 Baltz et al.
2018/0234608 A1 8/2018 Sudo et al.
2018/0262677 A1 9/2018 Dye et al.
2018/0267703 A1 9/2018 Kamimaru et al.
2018/0270420 A1 9/2018 Lee et al.
2018/0278823 A1* 9/2018 Horesh ................ H04N 5/2351
2018/0284979 A1 10/2018 Choi et al.
2018/0288310 A1 10/2018 Goldenberg
2018/0302568 A1 10/2018 Kim et al.
2018/0349008 A1 12/2018 Manzari et al.
2018/0352165 A1 12/2018 Zhen et al.
2018/0376122 A1 12/2018 Park et al.
2019/0028650 A1 1/2019 Bernstein et al.
2019/0029513 A1* 1/2019 Gunnerson ............ A61B 3/113
2019/0082097 A1 3/2019 Manzari et al.
2019/0121216 A1 4/2019 Shabtay et al.
2019/0149706 A1 5/2019 Rivard et al.
2019/0174054 A1 6/2019 Srivastava et al.
2019/0206031 A1 7/2019 Kim et al.
2019/0250812 A1 8/2019 Davydov et al.
2019/0253619 A1 8/2019 Davydov et al.
2019/0289201 A1 9/2019 Nishimura et al.
2019/0342507 A1 11/2019 Dye et al.
2020/0045245 A1 2/2020 Van OS et al.
2020/0082599 A1 3/2020 Manzari

FOREIGN PATENT DOCUMENTS

CN 1705346 A 12/2005
CN 101243383 A 8/2008
CN 101282422 A 10/2008
CN 101427574 A 5/2009
CN 101883213 A 11/2010
CN 102457661 A 5/2012
CN 202309894 U 7/2012
CN 103297719 A 9/2013
CN 103309602 A 9/2013
CN 103970472 A 8/2014
CN 104346080 A 2/2015
CN 104461288 A 3/2015
CN 105190511 A 12/2015
CN 106210550 A 12/2016
DK 201670753 A1 1/2018
DK 201670755 A1 1/2018
DK 201670627 A1 2/2018
EP 1278099 A1 1/2003
EP 1592212 A1 11/2005
EP 1953663 A1 8/2008
EP 1981262 A1 10/2008
EP 2482179 A2 8/2012
EP 2487613 A1 8/2012
EP 2487913 A2 8/2012
EP 2579572 A1 4/2013
EP 2627073 A1 8/2013
EP 2640060 A1 9/2013
EP 2682855 A2 1/2014
EP 2950198 A1 12/2015
EP 2966855 A2 1/2016
EP 3012732 A1 4/2016
EP 3026636 A1 6/2016
EP 3051525 A1 8/2016
EP 3209012 A1 8/2017
EP 3211587 A1 8/2017
EP 3457680 A1 3/2019
GB 2515797 A 1/2015
GB 2523670 A 9/2015
JP 2-179078 A 7/1990
JP 11-355617 A 12/1999
JP 2000-207549 A 7/2000
JP 2003-18438 A 1/2003
JP 2004-135074 A 4/2004
JP 2005-31466 A 2/2005
JP 2007-124398 A 5/2007
JP 2009-212899 A 9/2009
JP 2009-545256 A 12/2009
JP 2010-160581 A 7/2010
JP 2010-268052 A 11/2010
JP 2011-91570 A 5/2011
JP 2011-124864 A 6/2011
JP 2011-211552 A 10/2011
JP 2012-89973 A 5/2012
JP 2012-124608 A 6/2012
JP 2013-70303 A 4/2013
JP 2013-106289 A 5/2013
JP 2013-546238 A 12/2013
JP 2014-23083 A 2/2014
JP 2015-1716 A 1/2015
JP 2015-22716 A 2/2015
JP 2015-50713 A 3/2015
JP 2015-146619 A 8/2015
JP 2015-180987 A 10/2015
JP 2016-72965 A 5/2016
KR 10-2012-0048397 A 5/2012
KR 10-2012-0057696 A 6/2012
KR 10-2012-0093322 A 8/2012
KR 10-2014-0062801 A 5/2014
KR 10-2015-0024899 A 3/2015
KR 10-2016-0019145 2/2016
KR 10-2016-0020791 A 2/2016
WO 1999/39307 A1 8/1999
WO 2005/043892 A1 5/2005

(56) References Cited

FOREIGN PATENT DOCUMENTS

| | | | |
|---|---|---|---|
| WO | 2007/126707 | A1 | 11/2007 |
| WO | 2008/014301 | A2 | 1/2008 |
| WO | 2010/102678 | A1 | 9/2010 |
| WO | 2012/001947 | A1 | 1/2012 |
| WO | 2012/051720 | A2 | 4/2012 |
| WO | 2013/152453 | A1 | 10/2013 |
| WO | 2013/189058 | A1 | 12/2013 |
| WO | 2014/066115 | A1 | 5/2014 |
| WO | 2014/105276 | A1 | 7/2014 |
| WO | 2014/160819 | A1 | 10/2014 |
| WO | 2014/200734 | A1 | 12/2014 |
| WO | 2015/080744 | A1 | 6/2015 |
| WO | 2015/112868 | A1 | 7/2015 |
| WO | 2015/183438 | A1 | 12/2015 |
| WO | 2015/187494 | A1 | 12/2015 |
| WO | 2015/190666 | A1 | 12/2015 |
| WO | 2016/064435 | A1 | 4/2016 |
| WO | 2017/153771 | A1 | 9/2017 |
| WO | 2018/006053 | A1 | 1/2018 |
| WO | 2018/049430 | A2 | 3/2018 |
| WO | 2018/159864 | A1 | 9/2018 |
| WO | 2018/212802 | A1 | 11/2018 |

OTHER PUBLICATIONS

Corrected Notice of Allowance received for U.S. Appl. No. 16/143,097, dated Nov. 8, 2019, 3 pages.
Corrected Notice of Allowance received for U.S. Appl. No. 16/191,117, dated Nov. 20, 2019, 2 pages.
Gibson, Andrew S., "Aspect Ratio: What it is and Why it Matters", Retrieved from <https://web.archive.org/web/20190331225429/https:/digital-photography-school.com/aspect-ratio-what-it-is-and-why-it-matters/>, Mar. 31, 2019, 10 pages.
Hernández, Carlos, "Lens Blur in the New Google Camera App", Available online at: https://research.googleblog.com/2014/04/lens-blur-in-new-google-camera-app.html, Apr. 16, 2014, 6 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Non-Final Office Action received for U.S. Appl. No. 16/583,020, dated Nov. 14, 2019, 9 pages.
Office Action received for Chinese Patent Application No. 201780002533.5, dated Sep. 26, 2019, 21 pages (9 pages of English Translation and 12 pages of Official Copy).
Office Action received for Danish Patent Application No. PA201970601, dated Nov. 11, 2019, 8 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970605, dated Nov. 12, 2019, 10 pages.
Shaw et al., "Skills for Closeups Photography", Watson-Guptill Publications, Nov. 1999, 5 pages (Official Copy Only) (See Communication under 37 CFR § 1.98(a) (3)).
shiftdelete.net, "Oppo Reno 10x Zoom Ön Inceleme—Huawei P30 Pro'ya rakip mi geliyor?", Available online at <https://www.youtube.com/watch?v=ev2wlUztdrg>, Apr. 24, 2019, 2 pages.
"Sony Xperia XZ3 Camera Review—The Colors, Duke", The Colors!, Android Headlines—Android News & Tech News, Available online at <https://www.youtube.com/watch?v=mwpYXzWVOgw>, Nov. 3, 2018, 3 pages.
Sony, "User Guide, Xperia XZ3", H8416/H9436/H9493, Sony Mobile Communications Inc., Retrieved from <https://www-support-downloads.sonymobile.com/h8416/userguide_EN_H8416-H9436-H9493_2_Android9.0.pdf>, 2018, 121 pages.
The Nitpicker, "Sony Xperia | in-depth Preview", Available online at <https://www.youtube.com/watch?v=TGCKxBuiO5c>, Oct. 7, 2018, 3 pages.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
AT&T, "Pantech C3b User Guide", AT&T, Feb. 10, 2007, 14 pages.
Brett, "How to Create Your AR Emoji on the Galaxy S9 and S9+", Available online at: <https://www.youtube.com/watch?v=HHMdcBpC8MQ>, Mar. 16, 2018, 5 pages.
Certificate of Examination received for Australian Patent Application No. 2017100683, dated Jan. 16, 2018, 2 pages.
Certificate of Examination received for Australian Patent Application No. 2019100420, dated Jul. 3, 2019, 2 pages.
Channel Highway, "Virtual Makeover in Real-time and in full 3D", Available online at:—https://www.youtube.com/watch?v=NgUbBzb5qZg, Feb. 16, 2016, 1 page.
Corrected Notice of Allowance received for U.S. Appl. No. 14/641,251, dated Jun. 17, 2016, 2 pages.
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Decision of Refusal received for Japanese Patent Application No. 2018-243463, dated Feb. 25, 2019, 8 pages (5 pages of English Translation and 3 pages of Official Copy).
Decision of Refusal received for Japanese Patent Application No. 2018-545502, dated Feb. 25, 2019, 11 pages (7 pages of English Translation and 4 pages of Official Copy).
Decision to grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for European Patent Application No. 15712218.5, dated Jun. 7, 2018, 2 pages.
Decision to Refuse received for Japanese Patent Application No. 2018-225131, dated Jul. 8, 2019, 6 pages (4 pages of English Translation and 2 pages of Official Copy).

(56) References Cited

OTHER PUBLICATIONS

Decision to Refuse received for Japanese Patent Application No. 2018-243463, dated Jul. 8, 2019, 5 pages (3 pages of English Translation and 2 pages of Official Copy).
Decision to Refuse received for Japanese Patent Application No. 2018-545502, dated Jul. 8, 2019, 5 pages (3 pages of English Translation and 2 pages of Official Copy).
Digital Trends, "ModiFace Partners With Samsung to Bring AR Makeup to the Galaxy S9", Available online at:-https://www.digitaltrends.com/mobile/modiface-samsung-partnership-ar-makeup-galaxy-s9/, 2018, 16 pages.
European Search Report received for European Patent Application No. 18209460.7, dated Mar. 15, 2019, 4 pages.
European Search Report received for European Patent Application No. 18214698.5, dated Mar. 21, 2019, 5 pages.
Extended European Search Report (includes Supplementary European Search Report and Search Opinion) received for European Patent Application No. 17184710.6, dated Nov. 28, 2017, 10 pages.
Extended European Search Report received for European Patent Application No. 16784025.5, dated Apr. 16, 2018, 11 pages.
Extended European Search Report received for European Patent Application 17809168.2, dated Jun. 28, 2018, 9 pages.
Fedko, Daria, "AR Hair Styles", Online Available at <https://www.youtube.com/watch?v=FrS6tHRbFE0>, Jan. 24, 2017, 2 pages.
Final Office Action received for U.S. Appl. No. 15/268,115, dated Oct. 11, 2017., 48 pages.
Final Office Action received for U.S. Appl. No. 15/728,147, dated Aug. 29, 2018, 39 pages.
Final Office Action received for U.S. Appl. No. 15/728,147, dated May 28, 2019, 45 pages.
Final Office Action received for U.S. Appl. No. 16/143,396, dated Jun. 20, 2019, 14 pages.
Final Office Action received for U.S. Appl. No. 16/144,629, dated Sep. 18, 2019, 22 pages.
Franks Tech Help, "DSLR Camera Remote Control on Android Tablet, DSLR Dashboard, Nexus 10, Canon Camera, OTG Host Cable", Available online at : https://www.youtube.com/watch?v=DD4dCVinreU, Dec. 10, 2013, 1 page.
Fuji Film, "Taking Pictures Remotely : Free iPhone/Android App FUJI FILM Camera Remote", Available at <http://app.fujifilm-dsc.com/en/camera_remote/guide05.html>, Apr. 22, 2014, 3 pages.
Gadgets Portal, "Galaxy J5 Prime Camera Review! (vs J7 Prime) 4K", Available Online at :-https://www.youtube.com/watch?v=Rf2Gy8QmDqc, Oct. 24, 2016, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
GSM Arena, "Honor 10 Review : Camera", Available Online at <https://web.archive.org/web/20180823142417/https://www.gsmarena.com/honor_10-review-1771p5.php>, Aug. 23, 2018, 11 pages.
Hall, Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRkTg>, Jun. 19, 2018, 3 pages.
HelpVideosTV, "How to Use Snap Filters on Snapchat", Retrieved from <https://www.youtube.com/watch?v=oR-7cIWPszU& feature=youtu.be>, Mar. 22, 2017, pp. 1-2.
Huawei Mobile PH, "Huawei P10 Tips & Tricks: Compose Portraits With Wide Aperture (Bokeh)", Available Online at <https://www.youtube.com/watch?v=WM4yo5-hrrE>, Mar. 30, 2017, 2 pages.
Intention to Grant received for Danish Patent Application No. PA201570788, dated Mar. 27, 2017., 2 pages.
Intention to Grant received for Danish Patent Application No. PA201570791, dated Mar. 7, 2017., 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for European Patent Application No. 15712218.5, dated Jan. 24, 2018, 7 pages.
International Preliminary Report on Patentability and Written Opinion received for PCT Application No. PCT/US2016/029030, dated Nov. 2, 2017, 35 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2017/035321, dated Dec. 27, 2018, 11 pages.
International Search Report and Written Opinion received for PCT Patent Application No. PCT/US2016/029030, dated Aug. 5, 2016, 37 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2018/015591, dated Jun. 14, 2018, 14 pages.
International Search Report and Written Opinion received for PCT Patent Application No. PCT/US2019/017363, dated Aug. 12, 2019, 12 pages.
Invitation to Pay Addition Fees received for PCT Patent Application No. PCT/US2017/035321, dated Aug. 17, 2017, 3 pages.
Invitation to Pay Additional Fees and Partial International Search Report received for PCT Patent Application No. PCT/US2019/024067, dated Jul. 16, 2019, 13 pages.
Invitation to Pay Additional Fees received for PCT Patent Application No. PCT/US2019/017363, dated Jun. 17, 2019, 8 pages.
iPhone User Guide for iOS 4.2 and 4.3 Software, Available at https://manuals.info.apple.com/MANUALS/1000/MA1539/en_US/iPhone_iOS4_User_Guide.pdf, 2011, 274 pages.
Kozak, Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang, Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Mobiscrub, "Galaxy S4 mini camera review", Available Online at :-https://www.youtube.com/watch?v=KYKOydw8QT8, Aug. 10, 2013, 3 pages.
Mobiscrub, "Samsung Galaxy S5 Camera Review—HD Video", Available Online on:-<https://www.youtube.com/watch?v=BFgwDtNKMjg>, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.
Non-Final Office Action received for U.S. Appl. No. 12/508,534, dated Dec. 30, 2011, 11 pages.
Non-Final Office Action received for U.S. Appl. No. 12/764,360, dated May 3, 2012, 19 pages.
Non-Final Office Action received for U.S. Appl. No. 14/869,807, dated Dec. 2, 2016, 23 pages.
Non-Final Office Action received for U.S. Appl. No. 15/136,323, dated Apr. 6, 2017, 27 pages.
Non-Final Office Action received for U.S. Appl. No. 15/268,115, dated Apr. 13, 2017, 44 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/728,147, dated Feb. 22, 2018, 20 pages.

(56) References Cited

OTHER PUBLICATIONS

Non-Final Office Action received for U.S. Appl. No. 15/728,147, dated Jan. 31, 2019, 41 pages.
Non-Final Office Action received for U.S. Appl. No. 15/863,369, dated Apr. 4, 2018, 15 pages.
Non-Final Office Action received for U.S. Appl. No. 15/995,040, dated May 16, 2019, 24 pages.
Non-Final Office Action received for U.S. Appl. No. 16/143,396, dated Jan. 7, 2019, 13 pages.
Non-Final Office Action received for U.S. Appl. No. 16/144,629, dated Mar. 29, 2019, 18 pages.
Non-Final Office Action received for U.S. Appl. No. 16/143,097, dated Feb. 28, 2019, 17 pages.
Notice of Acceptance received for Australian Patent Application No. 2016252993, dated Dec. 19, 2017, 3 pages.
Notice of Acceptance received for Australian Patent Application No. 2017286130, dated Apr. 26, 2019, 3 pages.
Notice of Allowance received for Chinese Patent Application No. 201580046237.6, dated Aug. 29, 2018, 4 pages (1 page of English Translation and 3 pages of Official copy).
Notice of Allowance received for Chinese Patent Application No. 201680023520.1, dated Jun. 28, 2019, 2 pages (1 page of English Translation and 1 page of Official Copy).
Notice of Allowance received for Chinese Patent Application No. 201810664927.3, dated Jul. 19, 2019, 2 pages (1 page of English Translation and 1 page of Official Copy).
Notice of Allowance received for Japanese Patent Application No. 2018-171188, dated Jul. 16, 2019, 3 pages (1 page of English Translation and 2 pages of Official Copy).
Notice of Allowance received for Korean Patent Application No. 10-2018-7026743, dated Mar. 20, 2019, 7 pages (1 page of English Translation and 6 pages of Official Copy).
Notice of Allowance received for Korean Patent Application No. 10-2018-7028849, dated Feb. 1, 2019, 4 pages (1 page of English Translation and 3 pages of Official Copy).
Notice of Allowance received for Korean Patent Application No. 10-2018-7034780, dated Jun. 19, 2019, 4 pages (1 page of English Translation and 3 pages of Official Copy).
Notice of Allowance received for Korean Patent Application No. 10-2018-7036893, dated Jun. 12, 2019, 4 pages (1 page of English Translation and 3 pages of Official Copy).
Notice of Allowance received for Taiwanese Patent Application No. 104107328, dated Jun. 12, 2017, 3 pages (Official Copy only) {See Communication under 37 CFR § 1.98(a) (3)}.
Notice of Allowance received for U.S. Appl. No. 12/764,360, dated Oct. 1, 2012, 13 pages.
Notice of Allowance received for U.S. Appl. No. 14/641,251, dated May 18, 2016, 13 pages.
Notice of Allowance received for U.S. Appl. No. 14/869,807, dated Jun. 21, 2017, 9 pages.
Notice of Allowance received for U.S. Appl. No. 14/869,807, dated Oct. 10, 2017, 9 pages.
Notice of Allowance received for U.S. Appl. No. 15/136,323, dated Feb. 28, 2018, 9 pages.
Notice of Allowance received for U.S. Appl. No. 15/136,323, dated Oct. 12, 2017, 8 pages.
Notice of Allowance received for U.S. Appl. No. 15/268,115, dated Mar. 7, 2018, 15 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/728,147, dated Aug. 19, 2019, 13 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 15/863,369, dated Jun. 28, 2018, 8 pages.
Notice of Allowance received for U.S. Appl. No. 15/975,581, dated Oct. 3, 2018, 25 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/143,097, dated Aug. 29, 2019, 23 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action Received for Australian Patent Application No. 2017286130, dated Jan. 21, 2019, 4 pages.
Office Action received for Chinese Patent Application No. 201580046237.6, dated Feb. 6, 2018, 10 pages (5 pages of English Translation and 5 pages of Official Copy).
Office Action received for Chinese Patent Application No. 201680023520.1, dated Jan. 3, 2019, 10 pages (5 pages of English translation and 5 pages of Official Copy).
Office Action received for Chinese Patent Application No. 201780002533.5, dated Apr. 25, 2019, 17 pages (7 pages of English Translation and 10 pages of Official Copy).
Office Action received for Chinese Patent Application No. 201810566134.8, dated Aug. 13, 2019, 14 pages (8 pages of English Translation and 6 pages of Official Copy).
Office Action received for Chinese Patent Application No. 201810664927.3, dated Mar. 28, 2019, 11 pages (5 pages of English Translation and 6 pages of Official Copy).
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017., 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.

(56) References Cited

OTHER PUBLICATIONS

Office Action received for Danish Patent Application No. PA201770563, dated Aug. 13, 2018, 5 pages.
Office Action received for Danish Patent Application No. PA201770563, dated Jun. 28, 2019, 5 pages.
Office Action received for Danish Patent Application No. PA201770719, dated Aug. 14, 2018, 6 pages.
Office Action received for Danish Patent Application No. PA201770719, dated Feb. 19, 2019, 4 pages.
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for Danish Patent Application No. PA201870368, dated Oct. 1, 2019, 6 pages.
Office Action received for Danish Patent Application No. PA201870623, dated Jul. 12, 2019, 4 pages.
Office Action received for European Patent Application No. 15712218.5, dated Aug. 3, 2017, 4 pages.
Office Action received for European Patent Application No. 17184710.6, dated Dec. 21, 2018, 7 pages.
Office Action received for European Patent Application No. 18176890.4, dated Oct. 16, 2018, 8 pages.
Office Action received for European Patent Application No. 18183054.8, dated Nov. 16, 2018, 8 pages.
Office Action received for European Patent Application No. 18209460.7, dated Apr. 10, 2019, 7 pages.
Office Action received for European Patent Application No. 18214698.5, dated Apr. 2, 2019, 8 pages.
Office Action received for Japanese Patent Application No. 2018-225131, dated Mar. 4, 2019, 10 pages (6 pages of English Translation and 4 pages of Official Copy).
Office Action received for Korean Patent Application No. 10-2018-7026743, dated Jan. 17, 2019, 5 pages (2 pages of English Translation and 3 pages of Official Copy).
Office Action received for Korean Patent Application No. 10-2018-7034780, dated Apr. 4, 2019, 11 pages (5 pages of English Translation and 6 pages of Official Copy).
Office Action received for Korean Patent Application No. 10-2018-7036893, dated Apr. 9, 2019, 6 pages (2 pages of English Translation and 4 pages of Official Copy).
Office Action received for Taiwanese Patent Application No. 104107328, dated Dec. 28, 2016, 4 pages (1 page of Search Report and 3 pages of Official Copy).
Paine, Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
PC World, "How to make AR Emojis on the Samsung Galaxy S9", You Tube, Available Online: https://www.youtube.com/watch?v=8wQlCfulkz0, Feb. 25, 2018, 2 pages.
Peters, "Long-Awaited iPhone Goes on Sale", nytimes.com, Jun. 29, 2007, 3 pages.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
Remote Shot for SmartWatch 2, Available online at:-https://play.google.com/store/apps/details?id=net.watea.sw2.rshot&h1=en, Nov. 21, 2017, 3 pages.
Search Report and Opinion received for Danish Patent Application No. PA201770563, dated Oct. 10, 2017, 9 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870623, dated Dec. 20, 2018, 8 pages.
Search Report received for Danish Patent Application No. PA201770719, dated Oct. 17, 2017, 9 pages.
Smart Reviews, "Honor10 AI Camera's in Depth Review", See Especially 2:37-2:48; 6:39-6:49, Available Online at <https://www.youtube.com/watch?v=oKFqRvxeDBQ>, May 31, 2018, 2 pages.
Snapchat Lenses, "How to Get All Snapchat Lenses Face Effect Filter on Android", Retrived from: <https://www.youtube.com/watch?v=0PfnF1RInfw&feature=youtu.be>, Sep. 21, 2015, pp. 1-2.
Summons to Attend Oral Proceedings received for European Patent Application No. 17184710.6, dated Sep. 17, 2019, 7 pages.
Supplemental Notice of Allowance received for U.S. Appl. No. 15/136,323, dated Jan. 31, 2018, 6 pages.
Supplemental Notice of Allowance received for U.S. Appl. No. 15/863,369, dated Aug. 8, 2018, 4 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Tech, Smith, "Snagit 11 Snagit 11.4 Help", Available at: <http://assets.techsmith.com/Downloads/ua-tutorials-snagit-11/Snagit_11.pdf>, Jan. 2014, 2 pages.
Techsmith, "Snagit® 11 Snagit 11.4 Help", available at <http://assets.techsmith.com/Downloads/ua-tutorials-snagit-11/Snagit_11.pdf>, Jan. 2014, 146 pages.
Techtag, "Samsung J5 Prime Camera Review | True Review", Available online at :-https://www.youtube.com/watch?v=a_p906ai6PQ, Oct. 26, 2016, 3 pages.
Techtag, "Samsung J7 Prime Camera Review (Technical Camera)", Available Online at :—https://www.youtube.com/watch?v=AJPcLP8GpFQ, Oct. 4, 2016, 3 pages.
Travel Tech Sports Channel, "New Whatsapp update-voice message recording made easy-Want to record long voice messages", Available Online at: https://www.youtube.com/watch?v=SEviqgsAdUk, Nov. 30, 2017, 13 pages.
Vickgeek, "Canon 80D Live View Tutorial | Enhance your image quality", Available online at:-https://www.youtube.com/watch?v=JGNCiy6Wt9c, Sep. 27, 2016, 3 pages.
Vivo India, "Bokeh Mode | Vivo V9", Available Online at <https://www.youtube.com/watch?v=B5AIHhH5Rxs>, Mar. 25, 2018, 3 pages.
Wong, Richard, "Huawei Smartphone (P20/P10/P9 ,Mate 10/9) Wide Aperture Mode Demo", Available Online at <https://www.youtube.com/watch?v=eLY3LsZGDPA>, May 7, 2017, 2 pages.
Xiao, et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Final Office Action received for U.S. Appl. No. 15/995,040, dated Oct. 17, 2019, 20 pages.
International Search Report and Written Opinion received for PCT Patent Application No. PCT/US2019/024067, dated Oct. 9, 2019, 18 pages.

(56) References Cited

OTHER PUBLICATIONS

Notice of Allowance received for Brazilian Patent Application No. 112018074765-3, dated Oct. 8, 2019, 2 pages (1 page of English Translation and 1 page of Official Copy).
Notice of Allowance received for U.S. Appl. No. 16/191,117, dated Oct. 29, 2019, 9 pages.
Office Action received for Australian Patent Application No. 2019100794, dated Oct. 3, 2019, 4 pages.
Office Action received for Chinese Patent Application No. 201710657424.9, dated Sep. 17, 2019, 23 pages (11 pages f English Translation and 12 pages of Official Copy).
Search Report and Opinion received for Danish Patent Application No. PA201970603, dated Nov. 15, 2019, 9 pages.
Office Action received for Danish Patent Application No. PA201970601, dated Jan. 31, 2020, 3 pages.
Applicant-Initiated interview summary received for U.S. Appl. No. 16/271,583 dated Mar. 2, 2020, 3 pages.
Applicant-Initiated Interview Summary received for U.S. Appl. No. 15/995,040, dated Dec. 23, 2019, 5 pages.
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Brief Communication regarding Oral Proceedings received for European Patent Application No. 17184710.6, dated Feb. 19, 2020, 2 pages.
Certificate of Examination received for Australian Patent Application No. 2019100794, dated Dec. 19, 2019, 2 pages.
Corrected Notice of Allowance received for U.S. Appl. No. 16/143,396, dated Jan. 30, 2020, 2 pages.
Corrected Notice of Allowance received for U.S. Appl. No. 16/191,117, dated Dec. 9, 2019, 2 pages.
Corrected Notice of Allowance received for U.S. Appl. No. 16/191,117, dated Feb. 28, 2020, 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Jan. 23, 2020, 4 pages.
Extended European Search Report received for European Patent Application No. 19204230.7, dated Feb. 21, 2020, 7 pages.
Intention to Grant received for European Patent Application No. 18176890.4, dated Feb. 28, 2020, 8 pages.
International Preliminary Report on Patentability received for PCT Patent Application No. PCT/US2018/015591, dated Dec. 19, 2019, 10 pages.
Invitation to Pay Search Fees received for European Patent Application No. 19724959.2, dated Feb. 25, 2020, 3 pages.
Non-Final Office Action received for U.S. Appl. No. 16/271,583, dated Nov. 29, 2019, 18 pages.
Non-Final Office Action received for U.S. Appl. No. 16/582,595, dated Nov. 26, 2019, 17 pages.
Notice of Acceptance received for Australian Patent Application No. 2018279787, dated Dec. 10, 2019, 3 pages.
Notice of Allowance received for U.S. Appl. No. 16/143,396, dated Nov. 27, 2019, 8 pages.
Notice of Allowance received for U.S. Appl. No. 16/583,020, dated Feb. 28, 2020, 5 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Office Action received for Chinese Patent Application No. 201780002533.5, dated Feb. 3, 2020, 6 psges (3 psges of English Translation and 3 pages of Official Copy).
Office Action received for Chinese Patent Application No. 201811446867.4, dated Dec. 31, 2019, 12 pp. (5 pages of English Translation and 7 pages of Official Copy).
Office Action received for Chinese Patent Application No. 201811512767.7, dated Dec. 20, 2019, 14 pages (7 pages of English Translation and 7 pages of Official Copy).
Office Action received for Danish Patent Application No. PA201770563,dated Jan. 28, 2020, 3 pages.
Office Action received for Danish Patent Application No. PA201770719, dated Jan. 17, 2020, 4 pages.
Office Action received for Danish Patent Application No. PA201870623, dated Jan. 30, 2020, 2 pages.
Office Action received for Danish Patent Application No. PA201970592, dated Mar. 2, 2020, 5 pages.
Office Action received for Danish Patent Application No. PA201970605, dated Mar. 10, 2020, 5 pages.
Office Action received for European Patent Application 17809168.2, dated Jan. 7, 2020, 5 pages.
Office Action received for European Patent Application No. 18183054.8, dated Feb. 24, 2020, 6 pages.
Office Action received for Korean Patent Application No. 10-2019-7035478, dated Jan. 17, 2020, 17 pages (9 pages of English Translation and 8 pages of Official Copy).
PreAppeal review report received for Japanese Patent Application No. 2018-225131,dated Jan. 24, 2020, 8 pages (4 pages of English Translation and 4 pages of Official Copy).
PreAppeal review report received for Japanese Patent Application No. 2018-545502, dated Jan. 24, 2020, 8 pages (3 pages of English Translation and 5 pages of Official Copy).
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Advisory Action received for U.S. Appl. No. 16/144,629, dated Dec. 13, 2019, 9 pages.
International Search Report and Written Opinion received for PCT Patent Application No. PCT/US2019/049101, dated Dec. 16, 2019, 26 pages.
Invitation to Pay Additional Fees and Partial International Search Report received for PCT Patent Application No. PCT/US2019/049101, dated Oct. 24, 2019, 17 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Brief Communication regarding Oral Proceedings received for European Patent Application No. 17184710.6, dated Mar. 9, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,344, dated Mar. 17, 2020, 4 pages.
Non-Final Office Action received for U.S. Appl. No. 16/144,629, dated Mar. 13, 2020, 24 pages.
Notice of Allowance received for U.S. Appl. No. 16/582,595, dated Mar. 20, 2020, 9 pages.

* cited by examiner

Figure 7C:
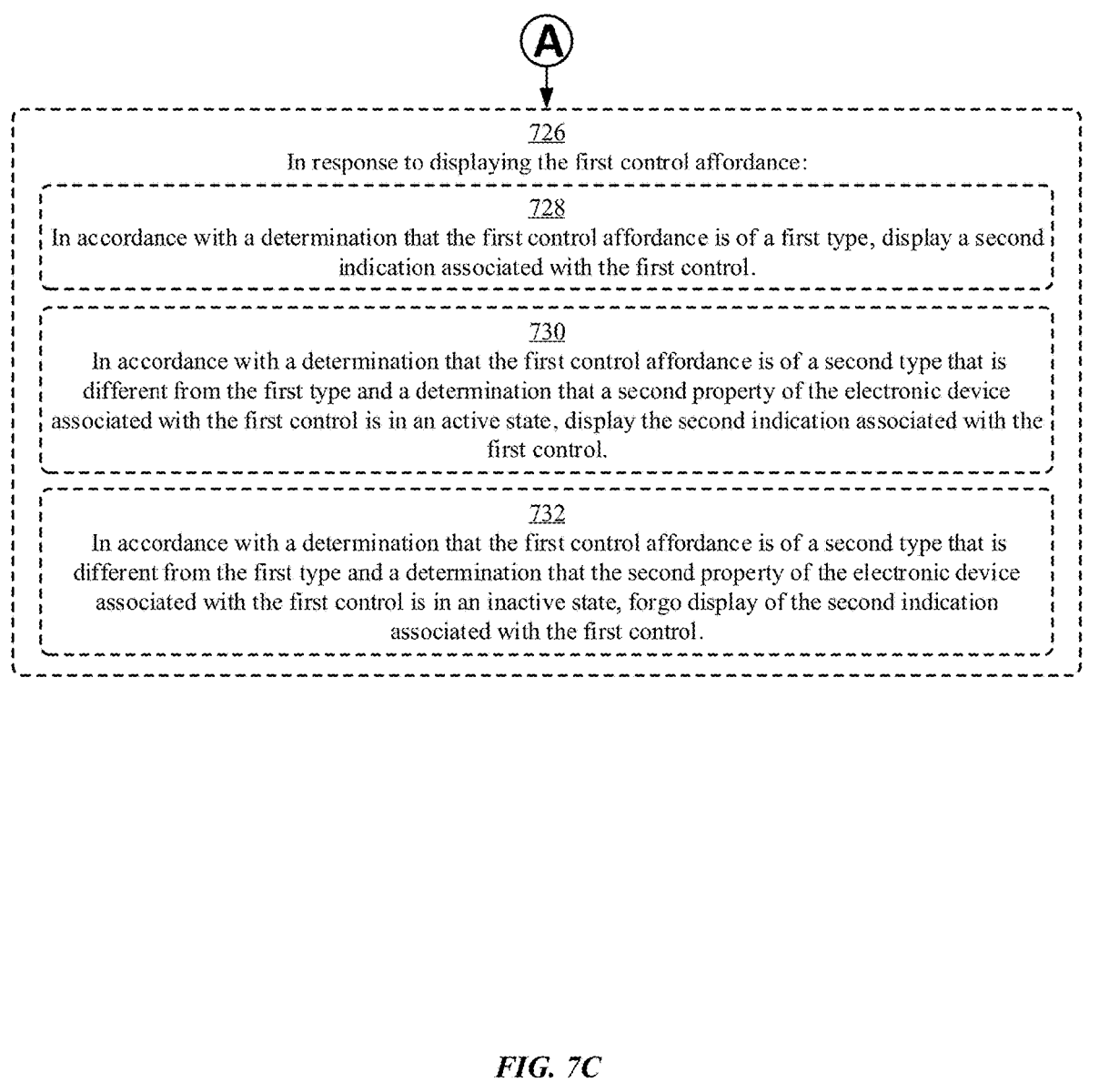

A

726
In response to displaying the first control affordance:

728
In accordance with a determination that the first control affordance is of a first type, display a second indication associated with the first control.

730
In accordance with a determination that the first control affordance is of a second type that is different from the first type and a determination that a second property of the electronic device associated with the first control is in an active state, display the second indication associated with the first control.

732
In accordance with a determination that the first control affordance is of a second type that is different from the first type and a determination that the second property of the electronic device associated with the first control is in an inactive state, forgo display of the second indication associated with the first control.

Figure 9A:
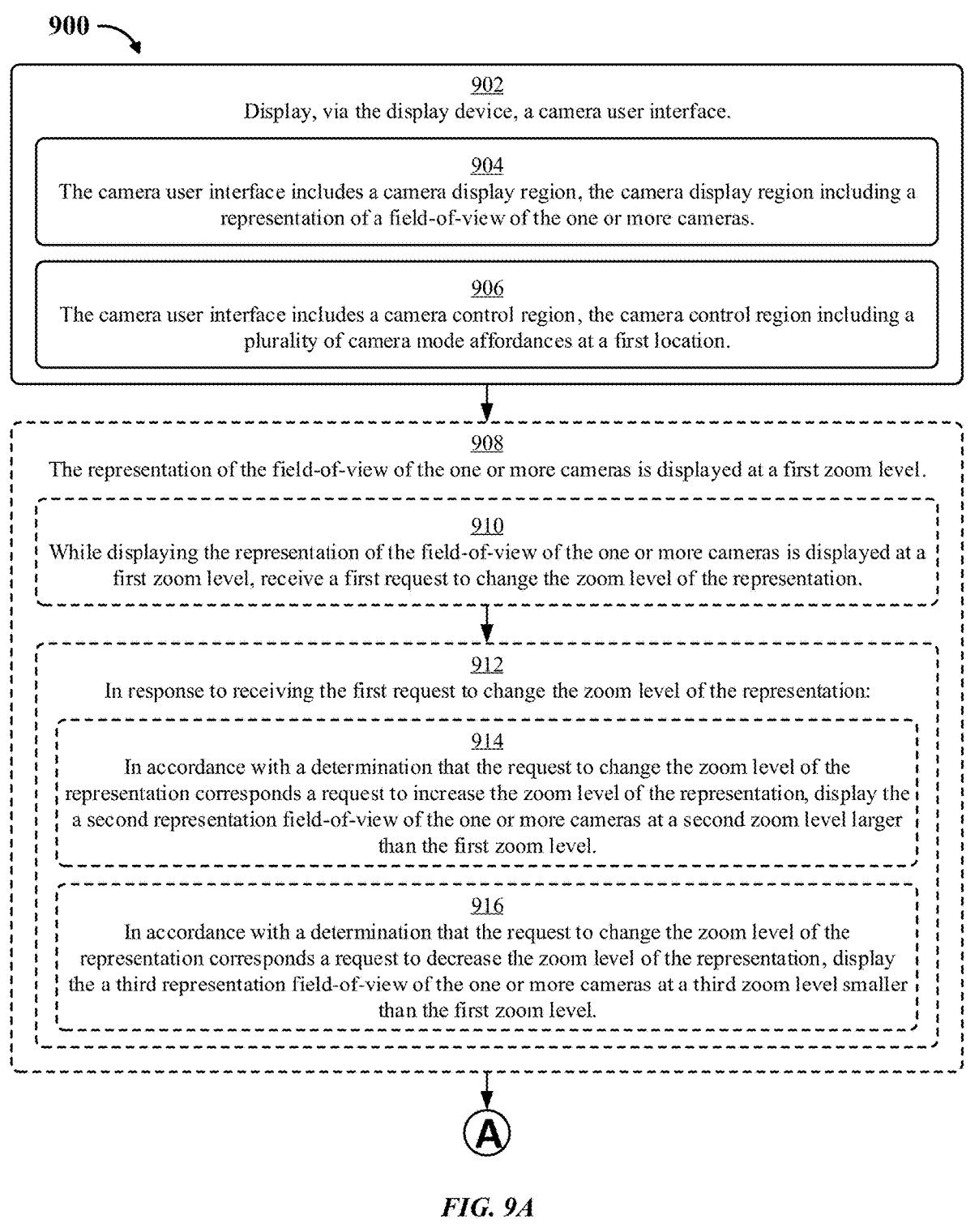

902
Display, via the display device, a camera user interface.

904
The camera user interface includes a camera display region, the camera display region including a representation of a field-of-view of the one or more cameras.

906
The camera user interface includes a camera control region, the camera control region including a plurality of camera mode affordances at a first location.

908
The representation of the field-of-view of the one or more cameras is displayed at a first zoom level.

910
While displaying the representation of the field-of-view of the one or more cameras is displayed at a first zoom level, receive a first request to change the zoom level of the representation.

912
In response to receiving the first request to change the zoom level of the representation:

914
In accordance with a determination that the request to change the zoom level of the representation corresponds a request to increase the zoom level of the representation, display the a second representation field-of-view of the one or more cameras at a second zoom level larger than the first zoom level.

916
In accordance with a determination that the request to change the zoom level of the representation corresponds a request to decrease the zoom level of the representation, display the a third representation field-of-view of the one or more cameras at a third zoom level smaller than the first zoom level.

Figure 9B:
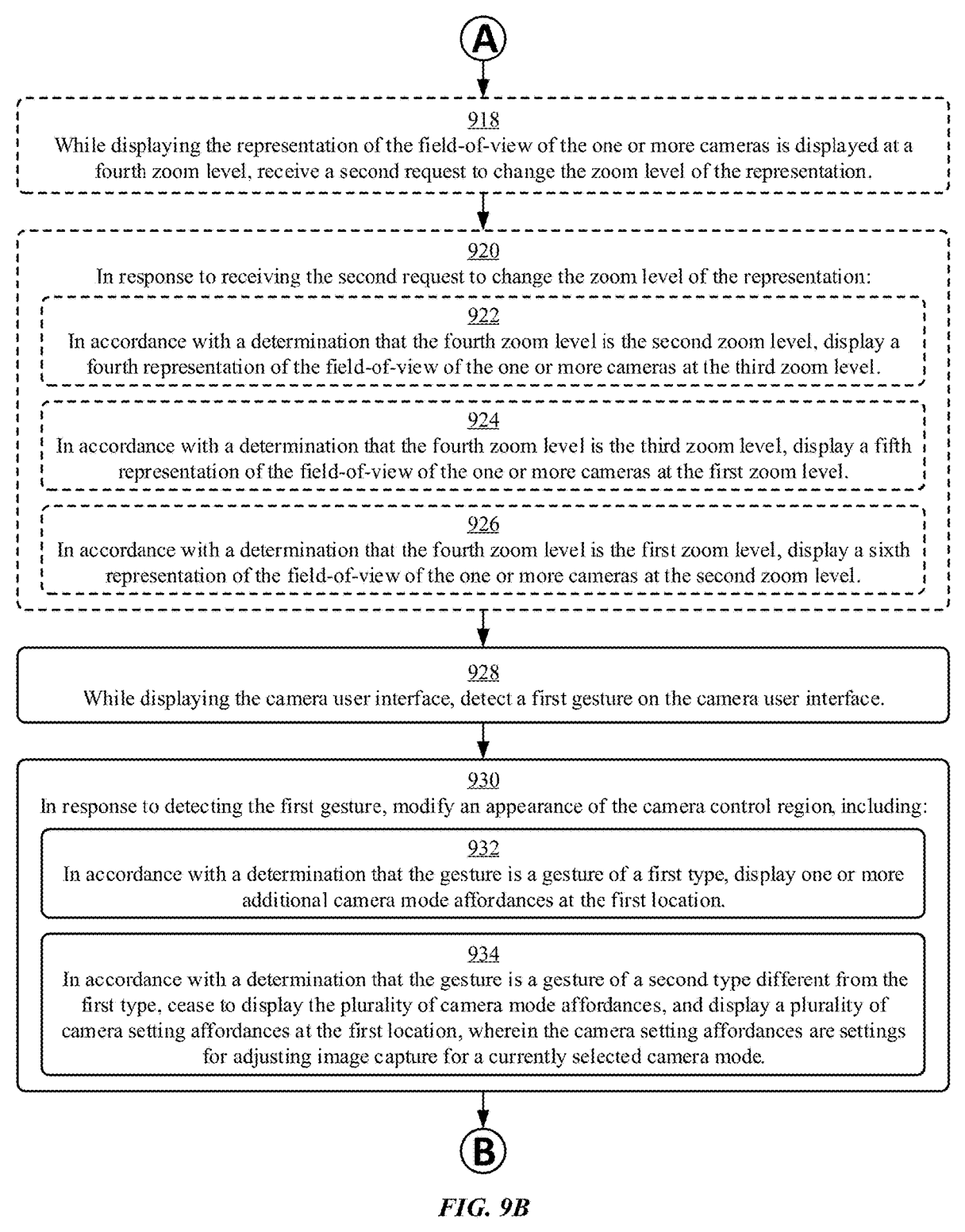

918
While displaying the representation of the field-of-view of the one or more cameras is displayed at a fourth zoom level, receive a second request to change the zoom level of the representation.

920
In response to receiving the second request to change the zoom level of the representation:

922
In accordance with a determination that the fourth zoom level is the second zoom level, display a fourth representation of the field-of-view of the one or more cameras at the third zoom level.

924
In accordance with a determination that the fourth zoom level is the third zoom level, display a fifth representation of the field-of-view of the one or more cameras at the first zoom level.

926
In accordance with a determination that the fourth zoom level is the first zoom level, display a sixth representation of the field-of-view of the one or more cameras at the second zoom level.

928
While displaying the camera user interface, detect a first gesture on the camera user interface.

930
In response to detecting the first gesture, modify an appearance of the camera control region, including:

932
In accordance with a determination that the gesture is a gesture of a first type, display one or more additional camera mode affordances at the first location.

934
In accordance with a determination that the gesture is a gesture of a second type different from the first type, cease to display the plurality of camera mode affordances, and display a plurality of camera setting affordances at the first location, wherein the camera setting affordances are settings for adjusting image capture for a currently selected camera mode.

Figure 11B:
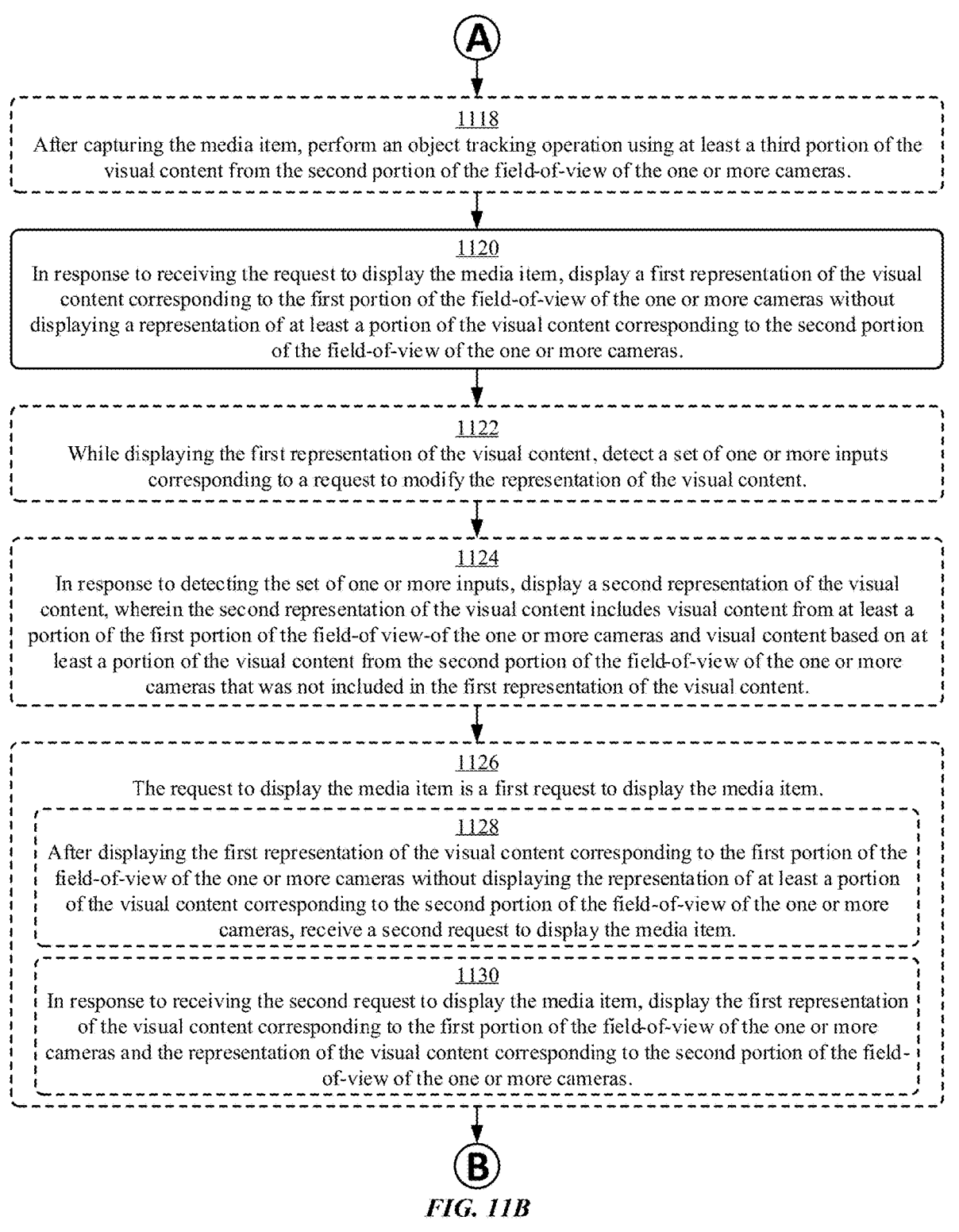

1118
After capturing the media item, perform an object tracking operation using at least a third portion of the visual content from the second portion of the field-of-view of the one or more cameras.

1120
In response to receiving the request to display the media item, display a first representation of the visual content corresponding to the first portion of the field-of-view of the one or more cameras without displaying a representation of at least a portion of the visual content corresponding to the second portion of the field-of-view of the one or more cameras.

1122
While displaying the first representation of the visual content, detect a set of one or more inputs corresponding to a request to modify the representation of the visual content.

1124
In response to detecting the set of one or more inputs, display a second representation of the visual content, wherein the second representation of the visual content includes visual content from at least a portion of the first portion of the field-of view-of the one or more cameras and visual content based on at least a portion of the visual content from the second portion of the field-of-view of the one or more cameras that was not included in the first representation of the visual content.

1126
The request to display the media item is a first request to display the media item.

1128
After displaying the first representation of the visual content corresponding to the first portion of the field-of-view of the one or more cameras without displaying the representation of at least a portion of the visual content corresponding to the second portion of the field-of-view of the one or more cameras, receive a second request to display the media item.

1130
In response to receiving the second request to display the media item, display the first representation of the visual content corresponding to the first portion of the field-of-view of the one or more cameras and the representation of the visual content corresponding to the second portion of the field-of-view of the one or more cameras.

Figure 11C:
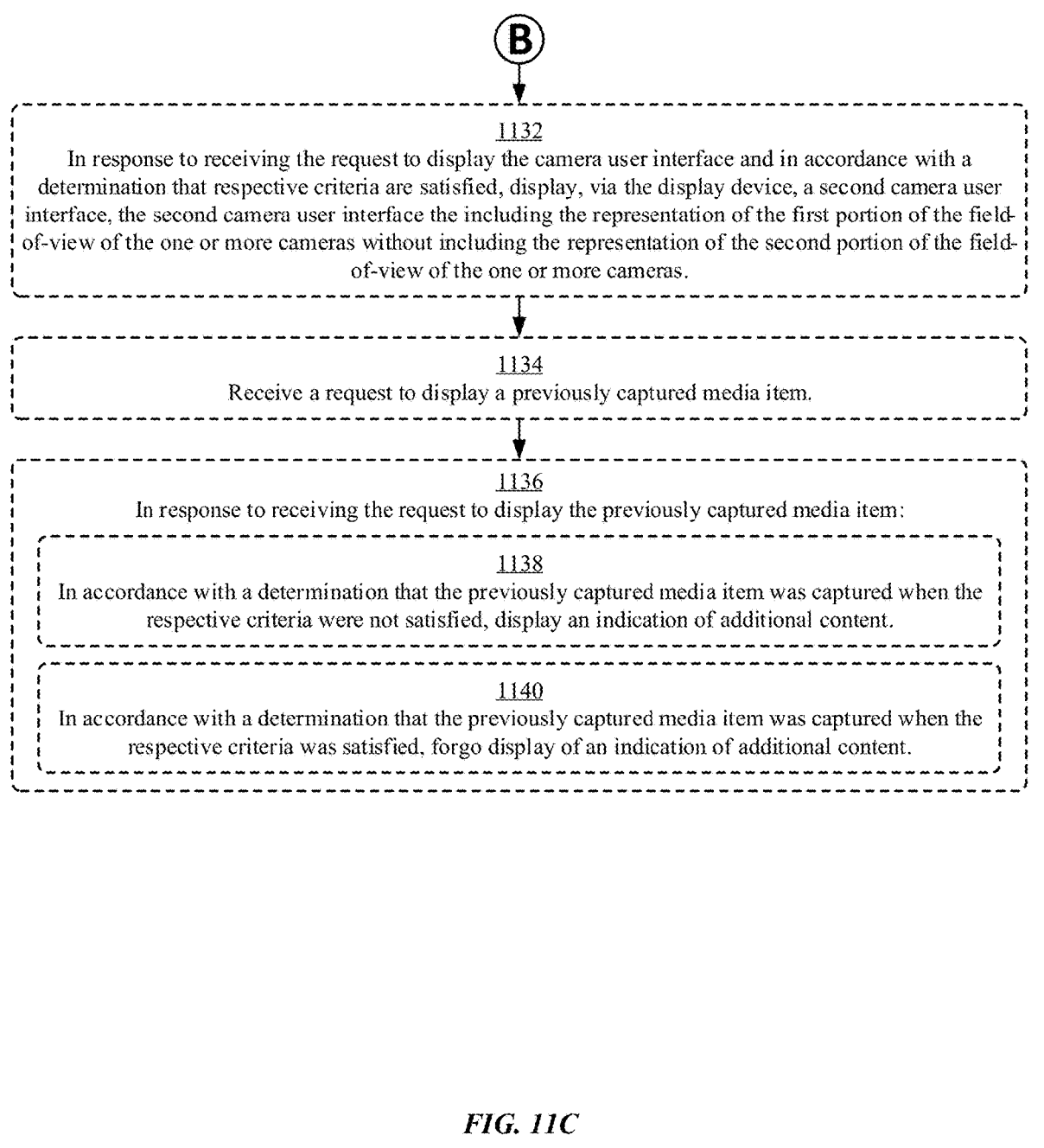

1132
In response to receiving the request to display the camera user interface and in accordance with a determination that respective criteria are satisfied, display, via the display device, a second camera user interface, the second camera user interface the including the representation of the first portion of the field-of-view of the one or more cameras without including the representation of the second portion of the field-of-view of the one or more cameras.

1134
Receive a request to display a previously captured media item.

1136
In response to receiving the request to display the previously captured media item:

1138
In accordance with a determination that the previously captured media item was captured when the respective criteria were not satisfied, display an indication of additional content.

1140
In accordance with a determination that the previously captured media item was captured when the respective criteria was satisfied, forgo display of an indication of additional content.

Figure 13A:
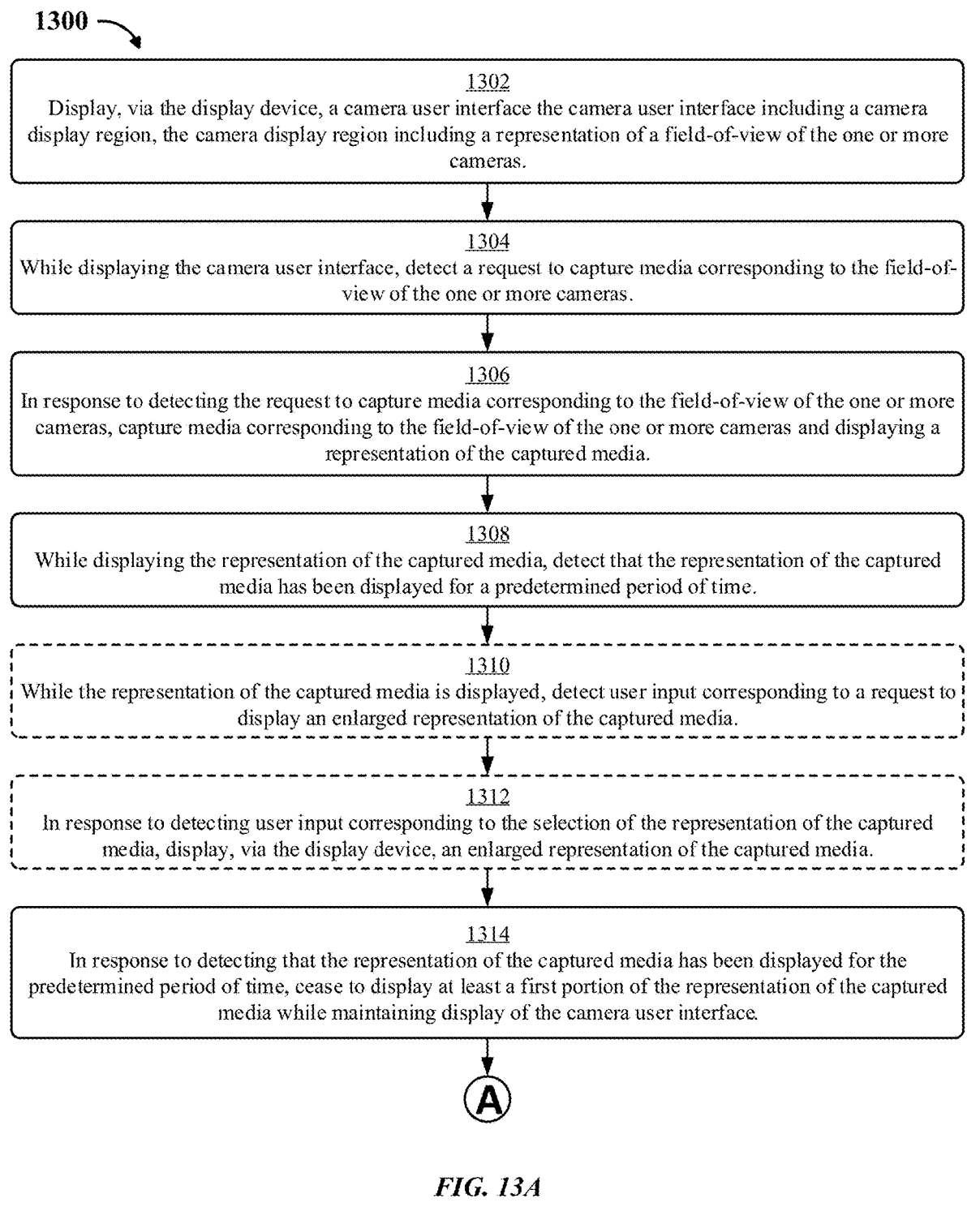

1302
Display, via the display device, a camera user interface the camera user interface including a camera display region, the camera display region including a representation of a field-of-view of the one or more cameras.

1304
While displaying the camera user interface, detect a request to capture media corresponding to the field-of-view of the one or more cameras.

1306
In response to detecting the request to capture media corresponding to the field-of-view of the one or more cameras, capture media corresponding to the field-of-view of the one or more cameras and displaying a representation of the captured media.

1308
While displaying the representation of the captured media, detect that the representation of the captured media has been displayed for a predetermined period of time.

1310
While the representation of the captured media is displayed, detect user input corresponding to a request to display an enlarged representation of the captured media.

1312
In response to detecting user input corresponding to the selection of the representation of the captured media, display, via the display device, an enlarged representation of the captured media.

1314
In response to detecting that the representation of the captured media has been displayed for the predetermined period of time, cease to display at least a first portion of the representation of the captured media while maintaining display of the camera user interface.

Figure 15B:
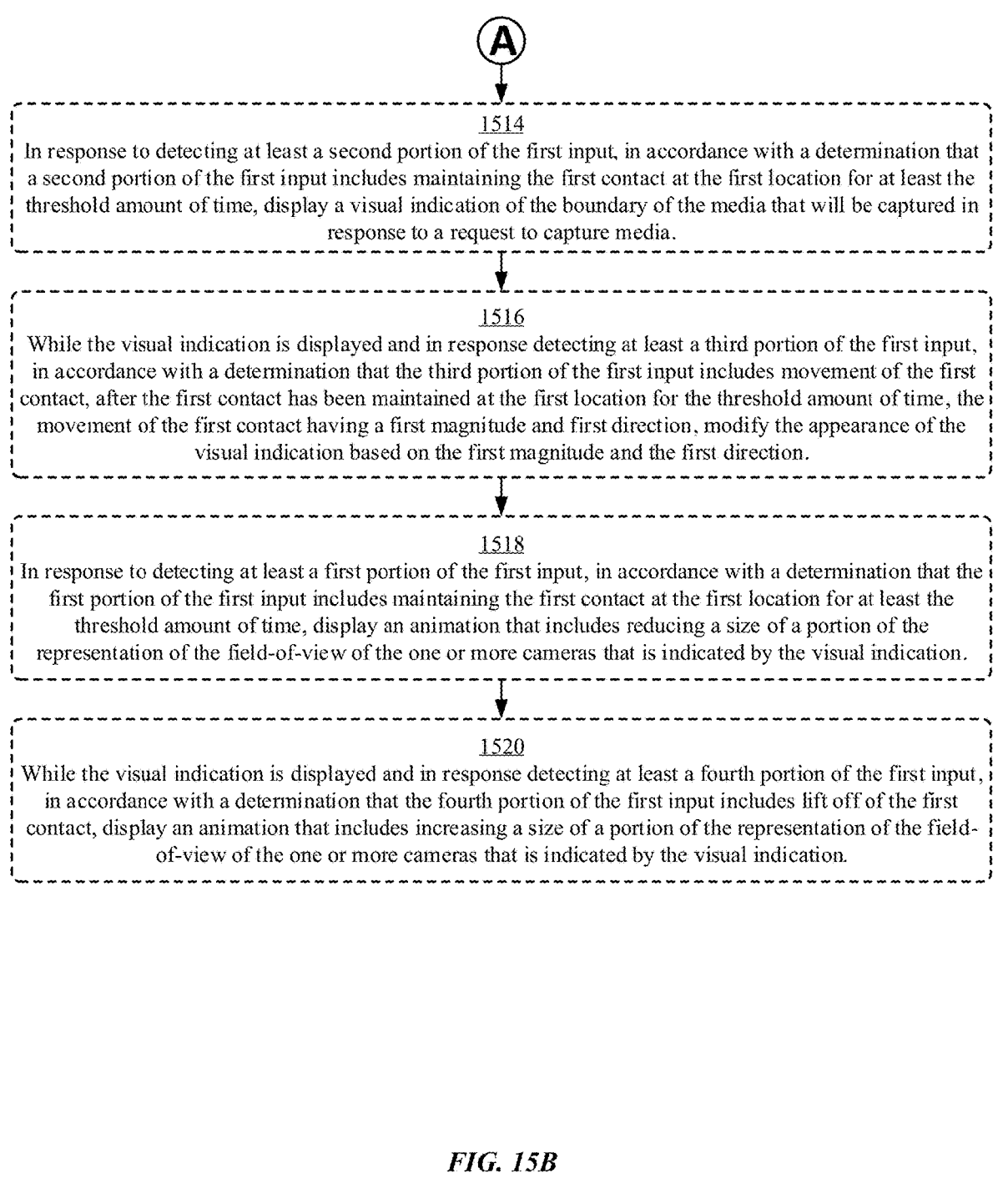

1514
In response to detecting at least a second portion of the first input, in accordance with a determination that a second portion of the first input includes maintaining the first contact at the first location for at least the threshold amount of time, display a visual indication of the boundary of the media that will be captured in response to a request to capture media.

1516
While the visual indication is displayed and in response detecting at least a third portion of the first input, in accordance with a determination that the third portion of the first input includes movement of the first contact, after the first contact has been maintained at the first location for the threshold amount of time, the movement of the first contact having a first magnitude and first direction, modify the appearance of the visual indication based on the first magnitude and the first direction.

1518
In response to detecting at least a first portion of the first input, in accordance with a determination that the first portion of the first input includes maintaining the first contact at the first location for at least the threshold amount of time, display an animation that includes reducing a size of a portion of the representation of the field-of-view of the one or more cameras that is indicated by the visual indication.

1520
While the visual indication is displayed and in response detecting at least a fourth portion of the first input, in accordance with a determination that the fourth portion of the first input includes lift off of the first contact, display an animation that includes increasing a size of a portion of the representation of the field-of-view of the one or more cameras that is indicated by the visual indication.

Figure 15C:
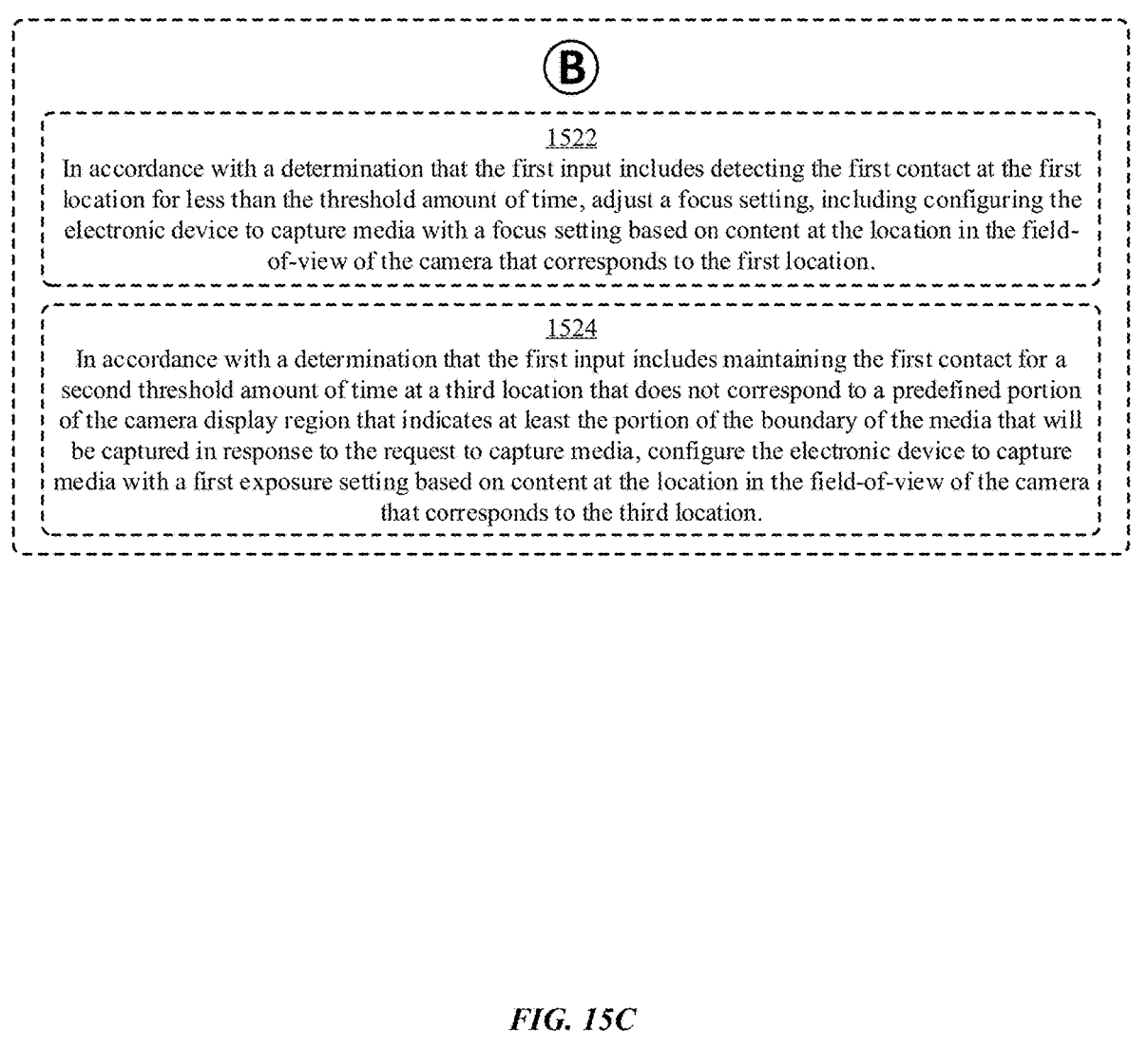

In accordance with a determination that the first input includes detecting the first contact at the first location for less than the threshold amount of time, adjust a focus setting, including configuring the electronic device to capture media with a focus setting based on content at the location in the field-of-view of the camera that corresponds to the first location.

1524

In accordance with a determination that the first input includes maintaining the first contact for a second threshold amount of time at a third location that does not correspond to a predefined portion of the camera display region that indicates at least the portion of the boundary of the media that will be captured in response to the request to capture media, configure the electronic device to capture media with a first exposure setting based on content at the location in the field-of-view of the camera that corresponds to the third location.

Figure 17A:
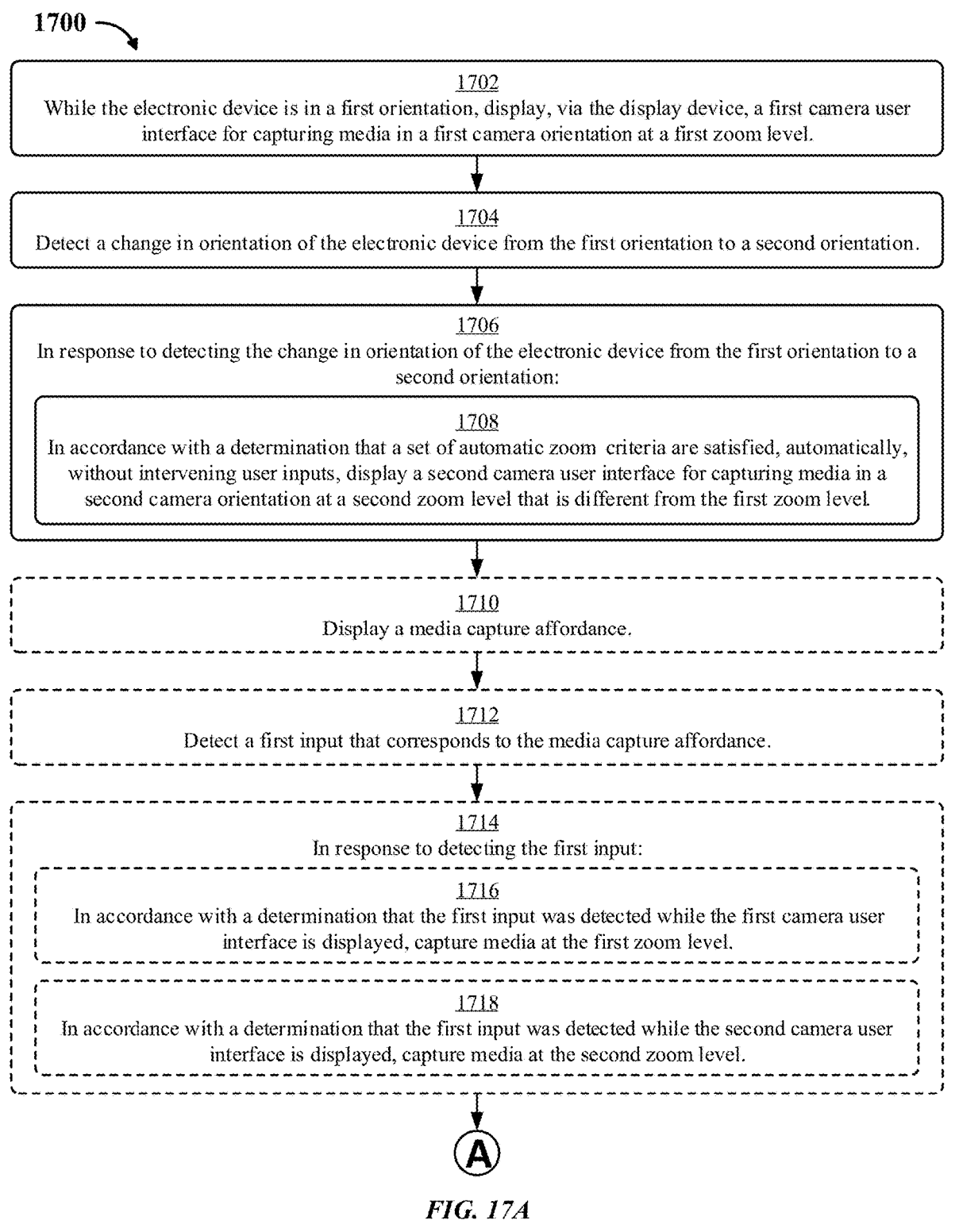

1702
While the electronic device is in a first orientation, display, via the display device, a first camera user interface for capturing media in a first camera orientation at a first zoom level.

1704
Detect a change in orientation of the electronic device from the first orientation to a second orientation.

1706
In response to detecting the change in orientation of the electronic device from the first orientation to a second orientation:

1708
In accordance with a determination that a set of automatic zoom criteria are satisfied, automatically, without intervening user inputs, display a second camera user interface for capturing media in a second camera orientation at a second zoom level that is different from the first zoom level.

1710
Display a media capture affordance.

1712
Detect a first input that corresponds to the media capture affordance.

1714
In response to detecting the first input:

1716
In accordance with a determination that the first input was detected while the first camera user interface is displayed, capture media at the first zoom level.

1718
In accordance with a determination that the first input was detected while the second camera user interface is displayed, capture media at the second zoom level.

Figure 19B:
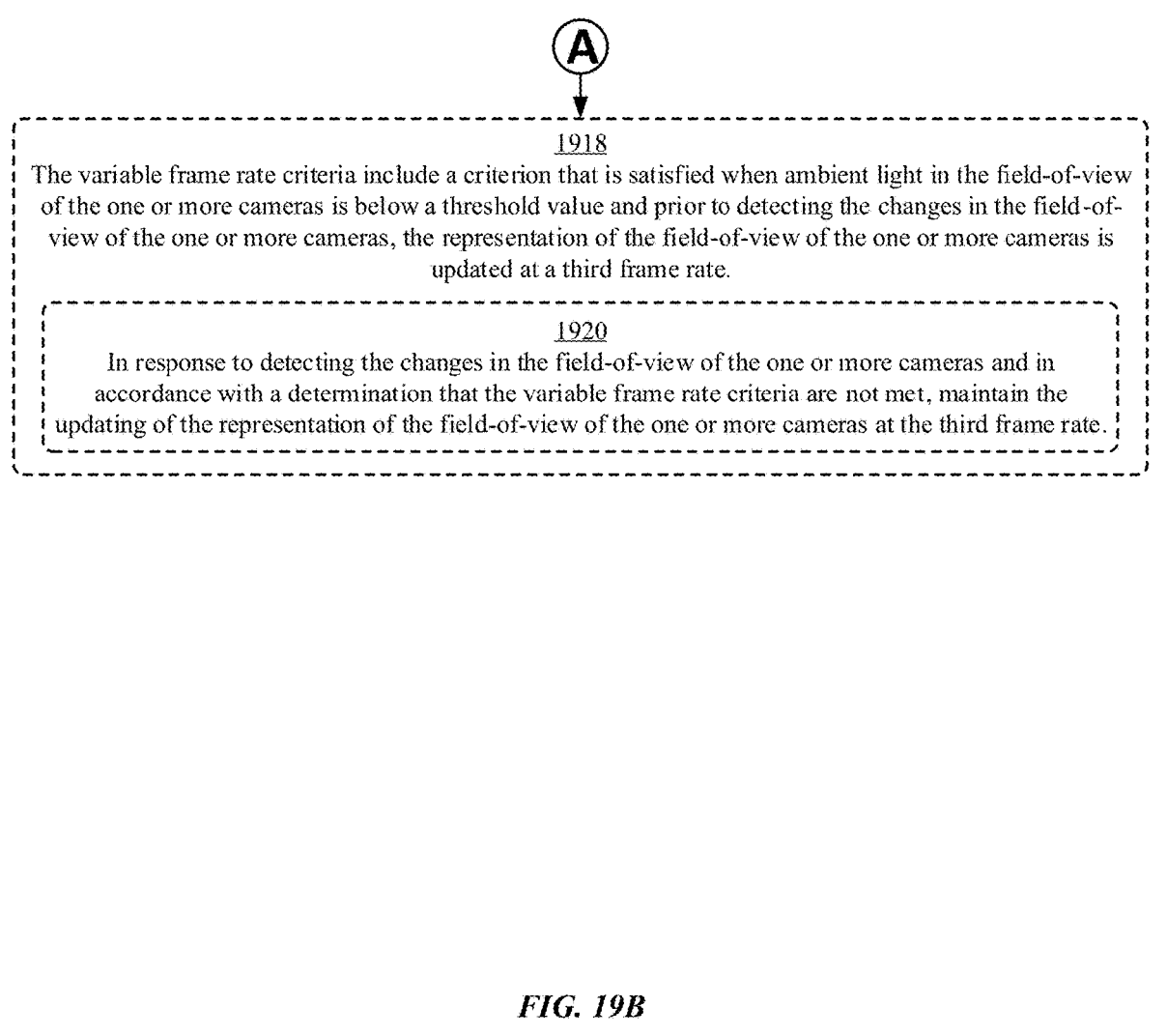

1918
The variable frame rate criteria include a criterion that is satisfied when ambient light in the field-of-view of the one or more cameras is below a threshold value and prior to detecting the changes in the field-of-view of the one or more cameras, the representation of the field-of-view of the one or more cameras is updated at a third frame rate.

1920
In response to detecting the changes in the field-of-view of the one or more cameras and in accordance with a determination that the variable frame rate criteria are not met, maintain the updating of the representation of the field-of-view of the one or more cameras at the third frame rate.

Figure 20B:
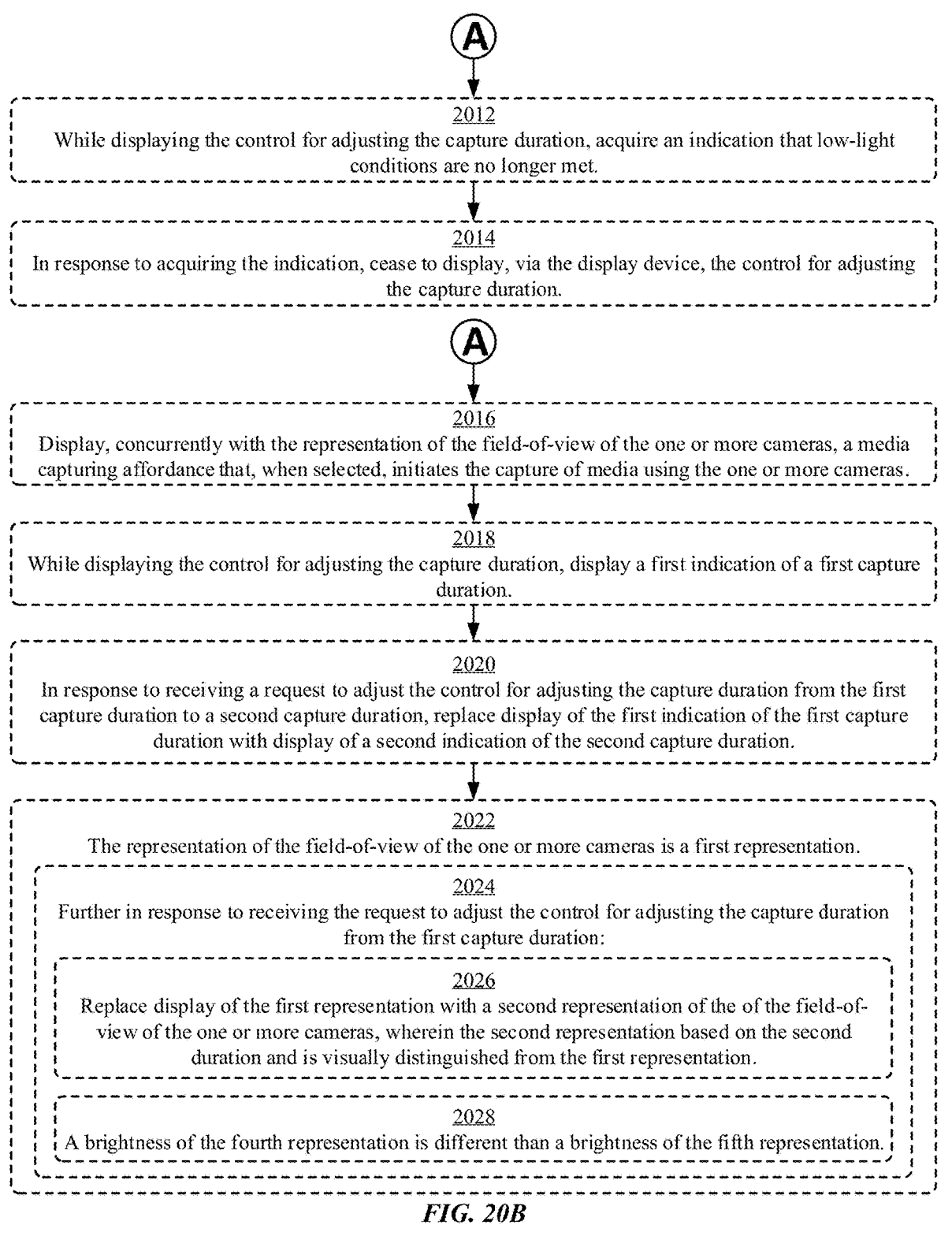

2012
While displaying the control for adjusting the capture duration, acquire an indication that low-light conditions are no longer met.

2014
In response to acquiring the indication, cease to display, via the display device, the control for adjusting the capture duration.

A

2016
Display, concurrently with the representation of the field-of-view of the one or more cameras, a media capturing affordance that, when selected, initiates the capture of media using the one or more cameras.

2018
While displaying the control for adjusting the capture duration, display a first indication of a first capture duration.

2020
In response to receiving a request to adjust the control for adjusting the capture duration from the first capture duration to a second capture duration, replace display of the first indication of the first capture duration with display of a second indication of the second capture duration.

2022
The representation of the field-of-view of the one or more cameras is a first representation.

2024
Further in response to receiving the request to adjust the control for adjusting the capture duration from the first capture duration:

2026
Replace display of the first representation with a second representation of the of the field-of-view of the one or more cameras, wherein the second representation based on the second duration and is visually distinguished from the first representation.

2028
A brightness of the fourth representation is different than a brightness of the fifth representation.

Figure 20C:
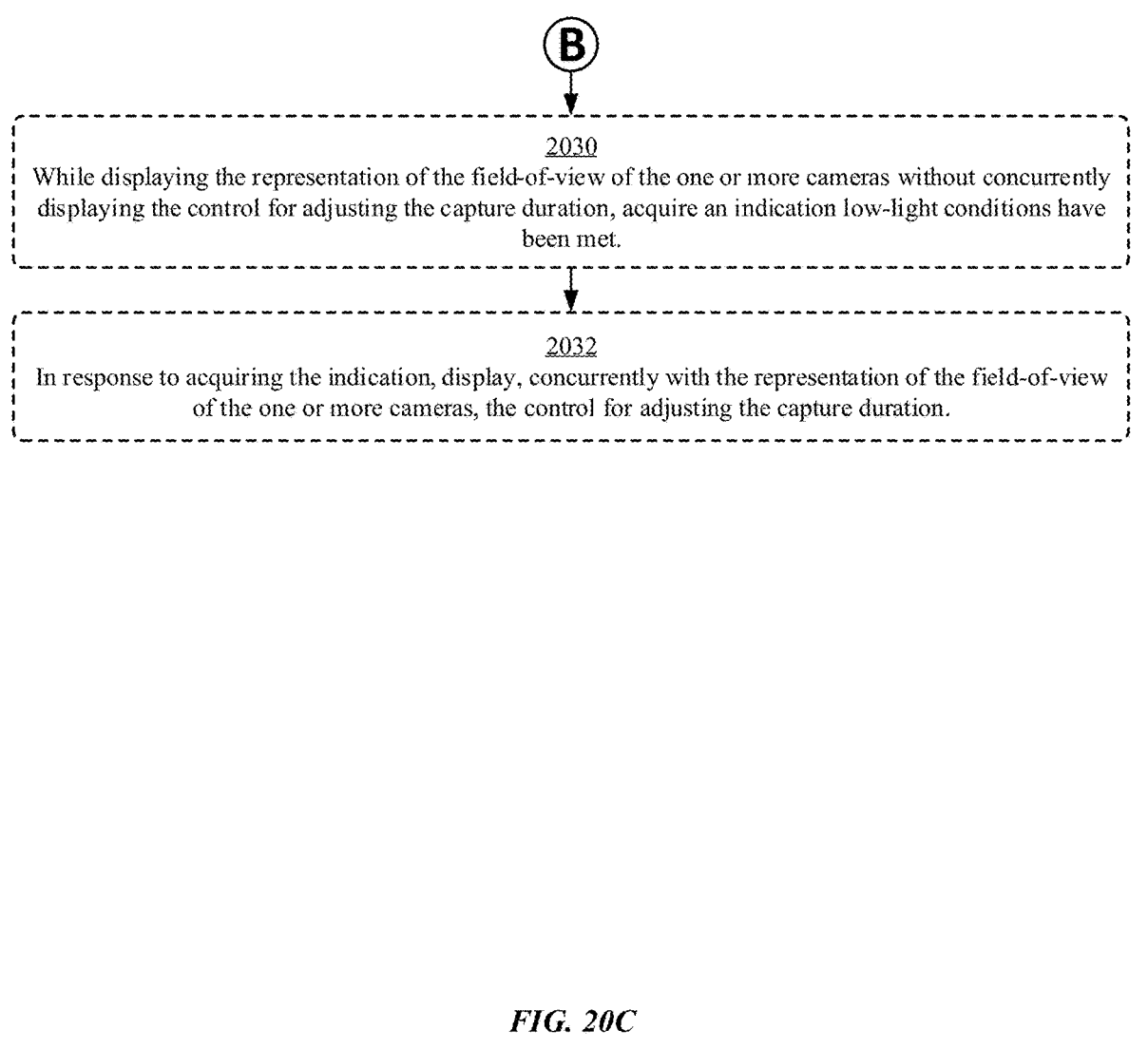

2030
While displaying the representation of the field-of-view of the one or more cameras without concurrently displaying the control for adjusting the capture duration, acquire an indication low-light conditions have been met.

2032
In response to acquiring the indication, display, concurrently with the representation of the field-of-view of the one or more cameras, the control for adjusting the capture duration.

Figure 21B:
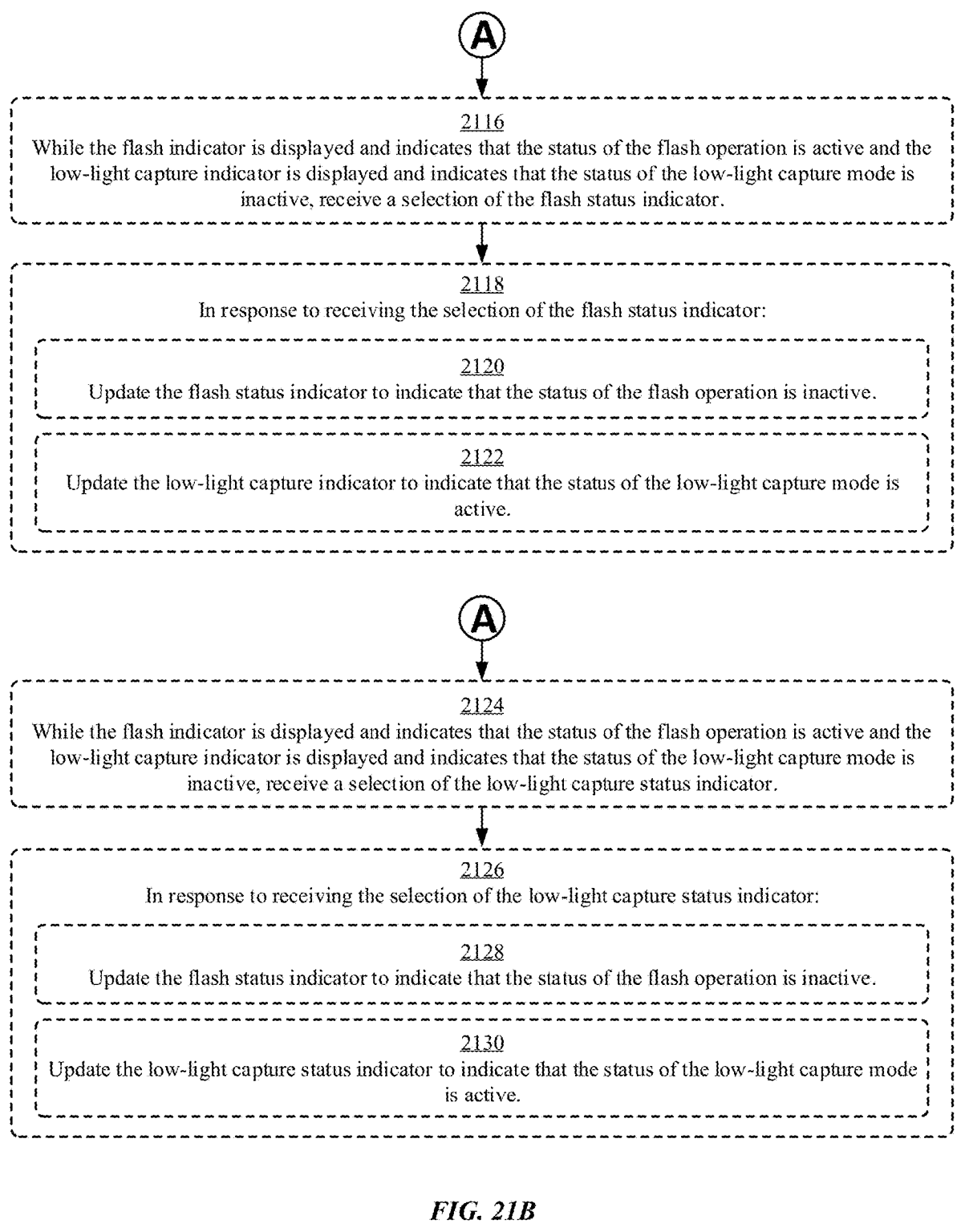

2116
While the flash indicator is displayed and indicates that the status of the flash operation is active and the low-light capture indicator is displayed and indicates that the status of the low-light capture mode is inactive, receive a selection of the flash status indicator.

2118
In response to receiving the selection of the flash status indicator:

2120
Update the flash status indicator to indicate that the status of the flash operation is inactive.

2122
Update the low-light capture indicator to indicate that the status of the low-light capture mode is active.

A

2124
While the flash indicator is displayed and indicates that the status of the flash operation is active and the low-light capture indicator is displayed and indicates that the status of the low-light capture mode is inactive, receive a selection of the low-light capture status indicator.

2126
In response to receiving the selection of the low-light capture status indicator:

2128
Update the flash status indicator to indicate that the status of the flash operation is inactive.

2130
Update the low-light capture status indicator to indicate that the status of the low-light capture mode is active.

Figure 23A:
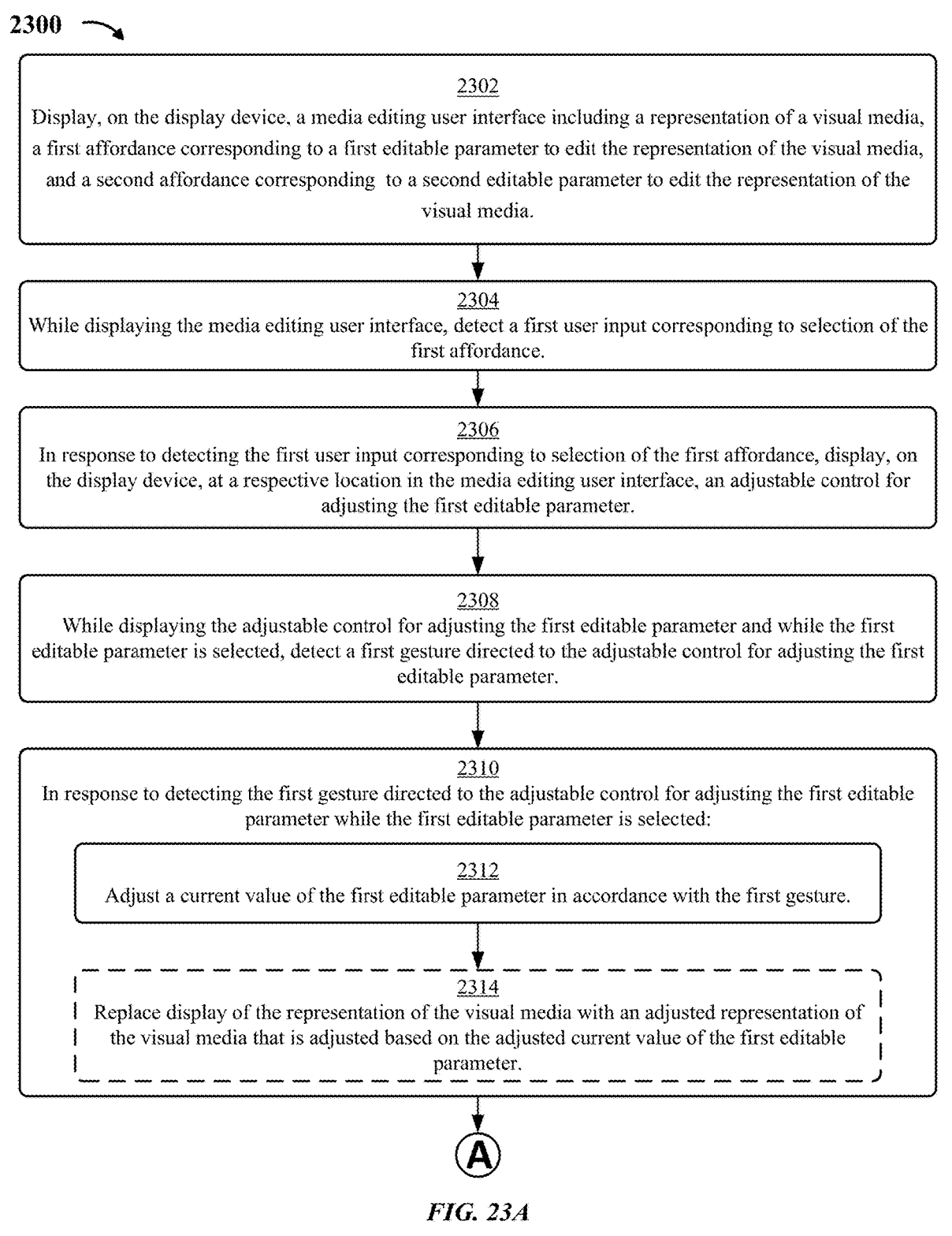

2302
Display, on the display device, a media editing user interface including a representation of a visual media, a first affordance corresponding to a first editable parameter to edit the representation of the visual media, and a second affordance corresponding to a second editable parameter to edit the representation of the visual media.

2304
While displaying the media editing user interface, detect a first user input corresponding to selection of the first affordance.

2306
In response to detecting the first user input corresponding to selection of the first affordance, display, on the display device, at a respective location in the media editing user interface, an adjustable control for adjusting the first editable parameter.

2308
While displaying the adjustable control for adjusting the first editable parameter and while the first editable parameter is selected, detect a first gesture directed to the adjustable control for adjusting the first editable parameter.

2310
In response to detecting the first gesture directed to the adjustable control for adjusting the first editable parameter while the first editable parameter is selected:

2312
Adjust a current value of the first editable parameter in accordance with the first gesture.

2314
Replace display of the representation of the visual media with an adjusted representation of the visual media that is adjusted based on the adjusted current value of the first editable parameter.

Figure 25A:
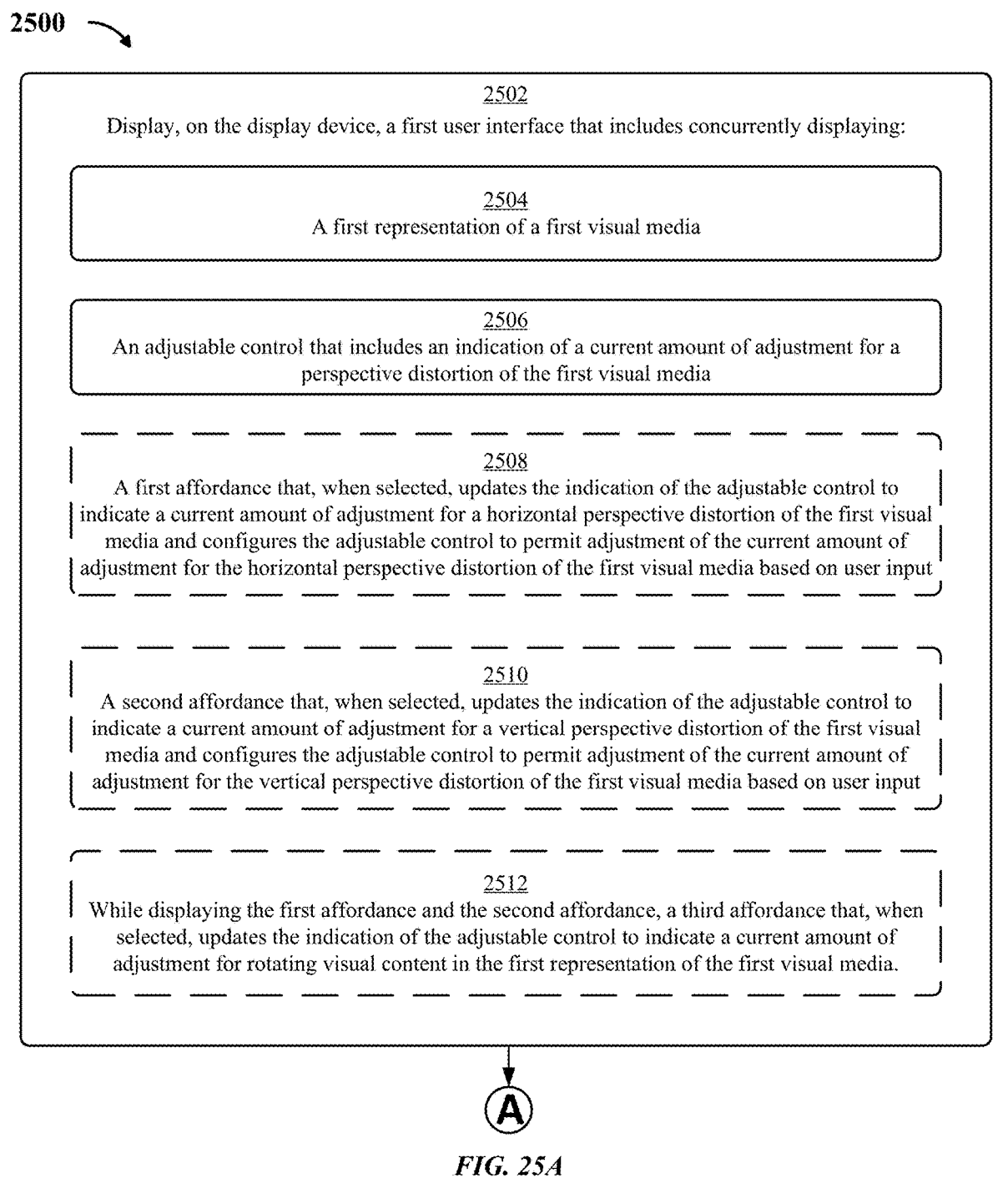

2502
Display, on the display device, a first user interface that includes concurrently displaying:

2504
A first representation of a first visual media

2506
An adjustable control that includes an indication of a current amount of adjustment for a perspective distortion of the first visual media 2508
A first affordance that, when selected, updates the indication of the adjustable control to indicate a current amount of adjustment for a horizontal perspective distortion of the first visual media and configures the adjustable control to permit adjustment of the current amount of adjustment for the horizontal perspective distortion of the first visual media based on user input 2510
A second affordance that, when selected, updates the indication of the adjustable control to indicate a current amount of adjustment for a vertical perspective distortion of the first visual media and configures the adjustable control to permit adjustment of the current amount of adjustment for the vertical perspective distortion of the first visual media based on user input 2512
While displaying the first affordance and the second affordance, a third affordance that, when selected, updates the indication of the adjustable control to indicate a current amount of adjustment for rotating visual content in the first representation of the first visual media.

Figure 25B:
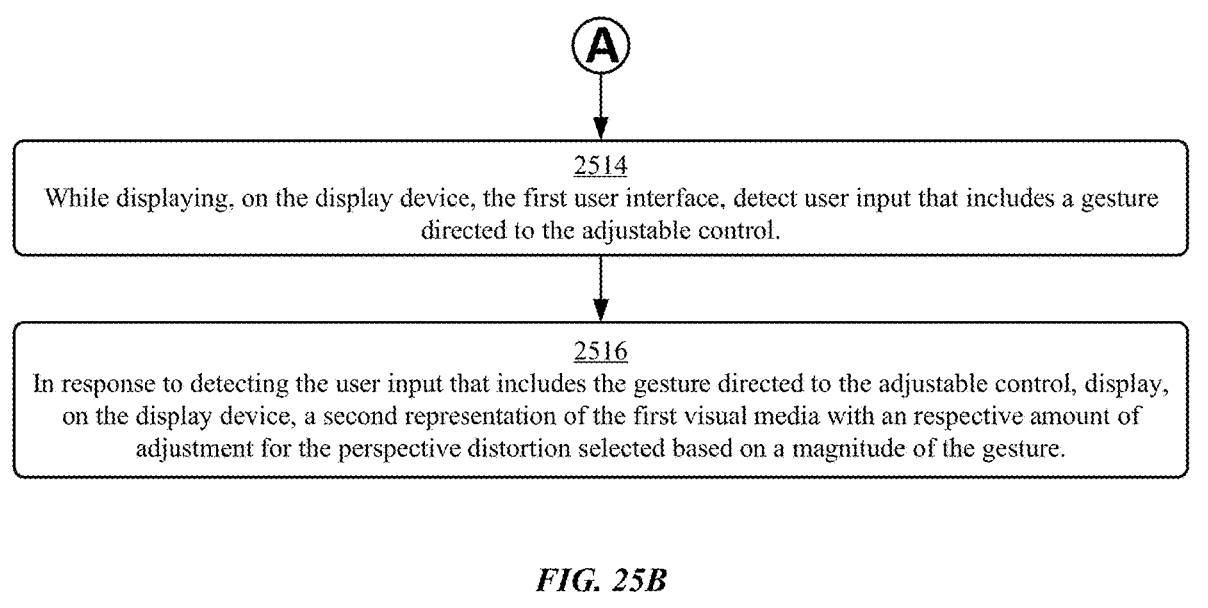

2514
While displaying, on the display device, the first user interface, detect user input that includes a gesture directed to the adjustable control.

2516
In response to detecting the user input that includes the gesture directed to the adjustable control, display, on the display device, a second representation of the first visual media with an respective amount of adjustment for the perspective distortion selected based on a magnitude of the gesture.

Figure 28A:
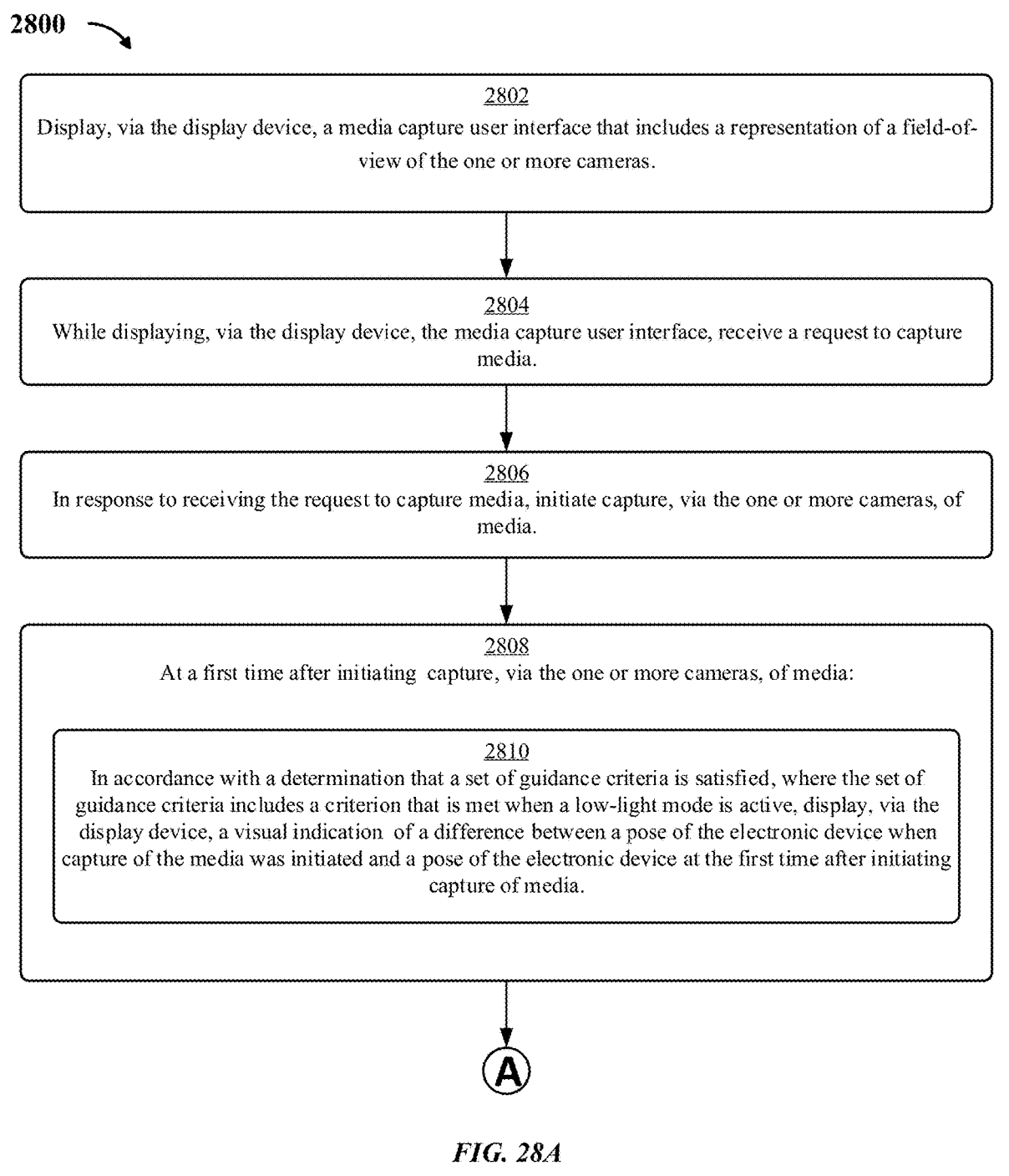

2802
Display, via the display device, a media capture user interface that includes a representation of a field-of-view of the one or more cameras.

2804
While displaying, via the display device, the media capture user interface, receive a request to capture media.

2806
In response to receiving the request to capture media, initiate capture, via the one or more cameras, of media.

2808
At a first time after initiating capture, via the one or more cameras, of media:

2810
In accordance with a determination that a set of guidance criteria is satisfied, where the set of guidance criteria includes a criterion that is met when a low-light mode is active, display, via the display device, a visual indication of a difference between a pose of the electronic device when capture of the media was initiated and a pose of the electronic device at the first time after initiating capture of media.

Figure 30A:
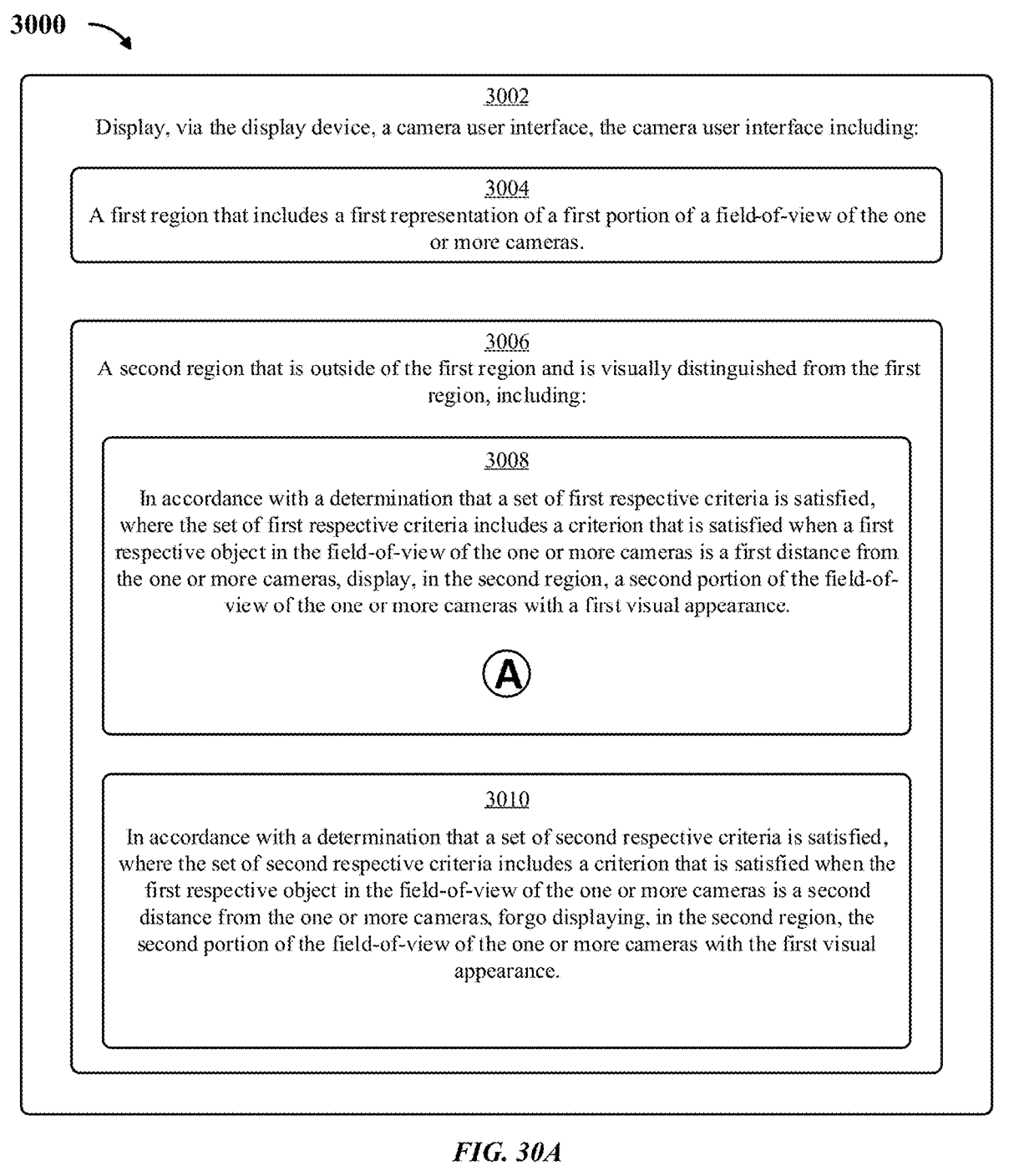

3002
Display, via the display device, a camera user interface, the camera user interface including:

3004
A first region that includes a first representation of a first portion of a field-of-view of the one or more cameras.

3006
A second region that is outside of the first region and is visually distinguished from the first region, including:

3008
In accordance with a determination that a set of first respective criteria is satisfied, where the set of first respective criteria includes a criterion that is satisfied when a first respective object in the field-of-view of the one or more cameras is a first distance from the one or more cameras, display, in the second region, a second portion of the field-of-view of the one or more cameras with a first visual appearance.

(A)

3010
In accordance with a determination that a set of second respective criteria is satisfied, where the set of second respective criteria includes a criterion that is satisfied when the first respective object in the field-of-view of the one or more cameras is a second distance from the one or more cameras, forgo displaying, in the second region, the second portion of the field-of-view of the one or more cameras with the first visual appearance.

Figure 32A:
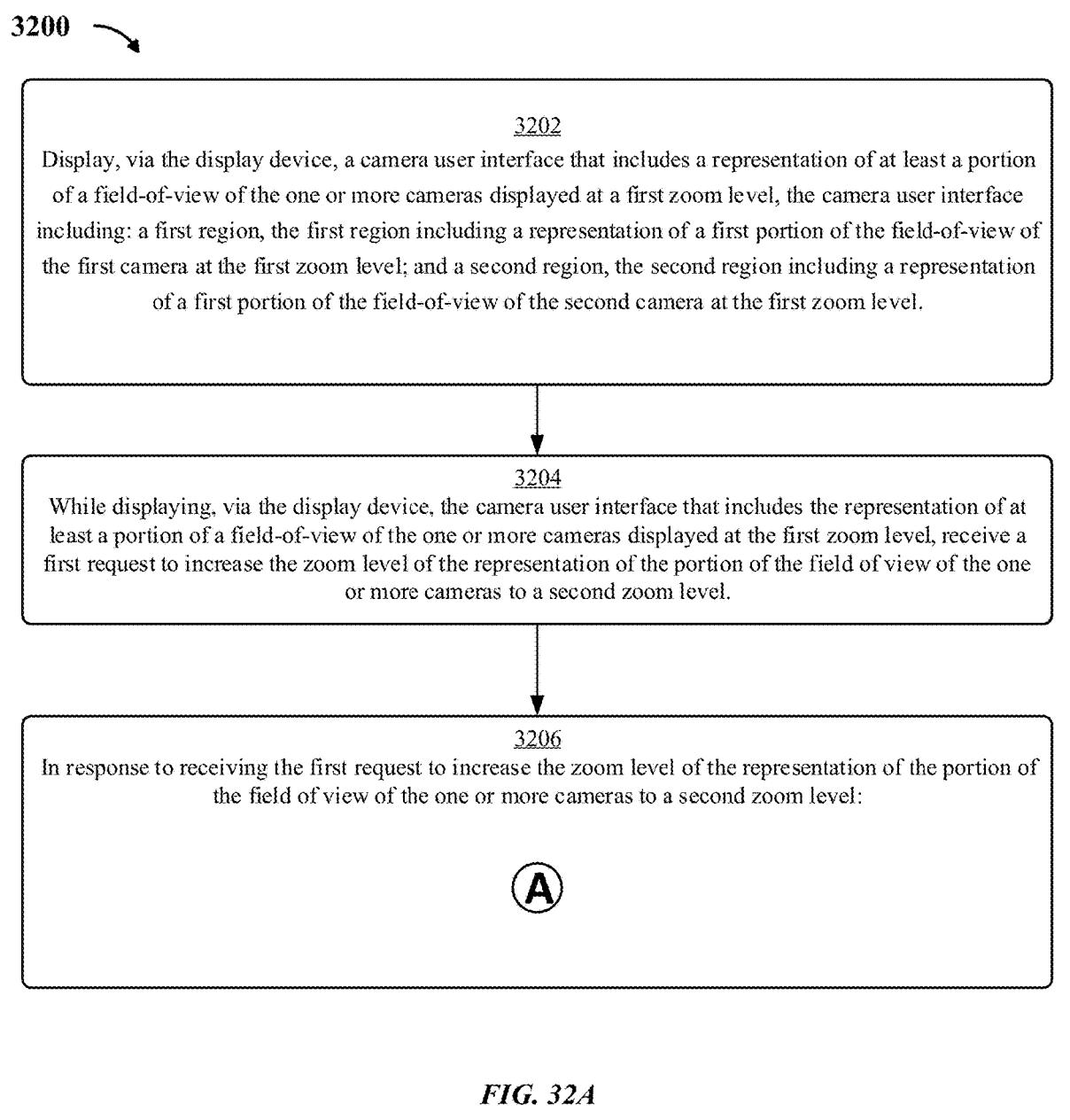

3202
Display, via the display device, a camera user interface that includes a representation of at least a portion of a field-of-view of the one or more cameras displayed at a first zoom level, the camera user interface including: a first region, the first region including a representation of a first portion of the field-of-view of the first camera at the first zoom level; and a second region, the second region including a representation of a first portion of the field-of-view of the second camera at the first zoom level.

3204
While displaying, via the display device, the camera user interface that includes the representation of at least a portion of a field-of-view of the one or more cameras displayed at the first zoom level, receive a first request to increase the zoom level of the representation of the portion of the field of view of the one or more cameras to a second zoom level.

3206
In response to receiving the first request to increase the zoom level of the representation of the portion of the field of view of the one or more cameras to a second zoom level:

Figure 32C:
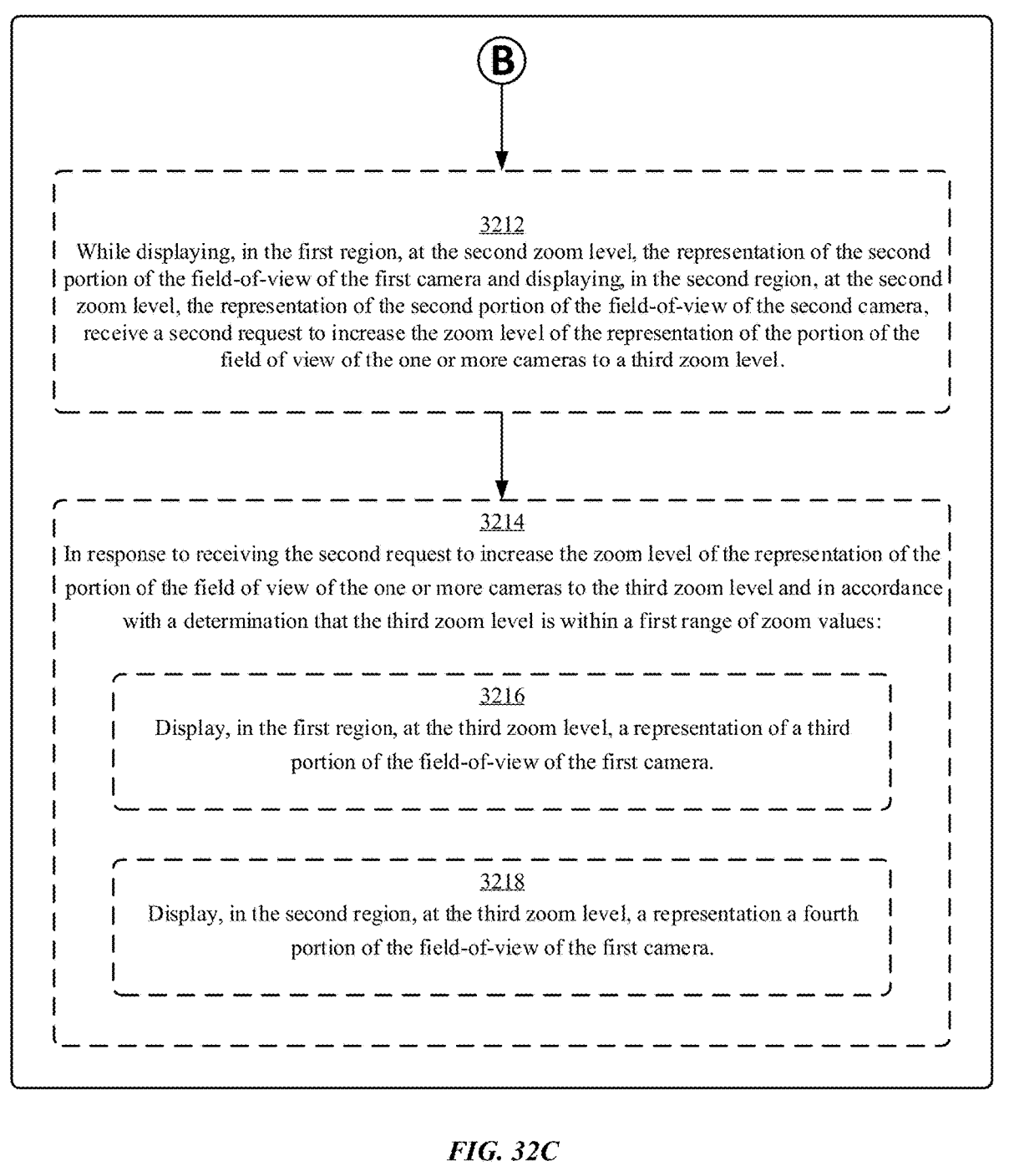

3212
While displaying, in the first region, at the second zoom level, the representation of the second portion of the field-of-view of the first camera and displaying, in the second region, at the second zoom level, the representation of the second portion of the field-of-view of the second camera, receive a second request to increase the zoom level of the representation of the portion of the field of view of the one or more cameras to a third zoom level.

3214
In response to receiving the second request to increase the zoom level of the representation of the portion of the field of view of the one or more cameras to the third zoom level and in accordance with a determination that the third zoom level is within a first range of zoom values:

3216
Display, in the first region, at the third zoom level, a representation of a third portion of the field-of-view of the first camera.

3218
Display, in the second region, at the third zoom level, a representation a fourth portion of the field-of-view of the first camera.

Figure 34A:
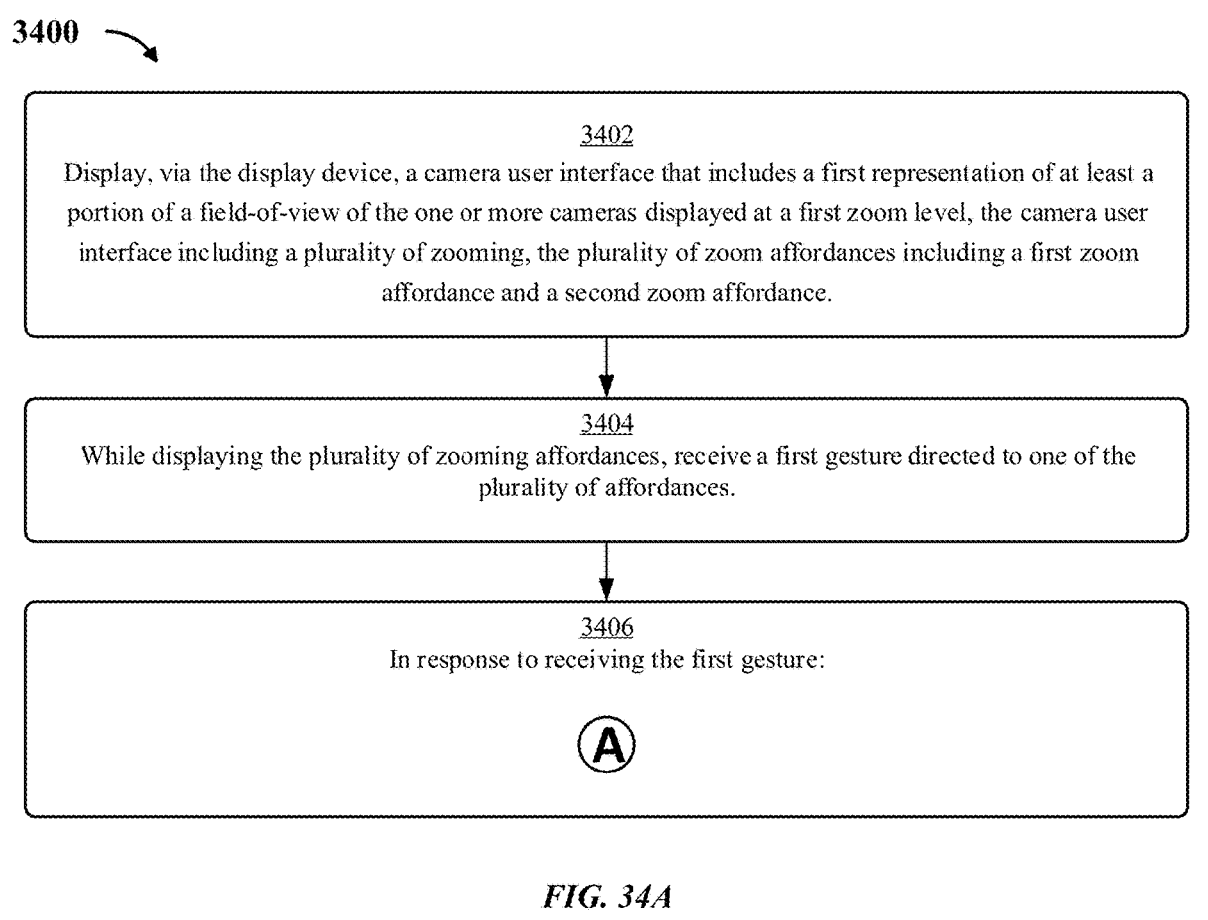

3402
Display, via the display device, a camera user interface that includes a first representation of at least a portion of a field-of-view of the one or more cameras displayed at a first zoom level, the camera user interface including a plurality of zooming, the plurality of zoom affordances including a first zoom affordance and a second zoom affordance.

3404
While displaying the plurality of zooming affordances, receive a first gesture directed to one of the plurality of affordances.

3406
In response to receiving the first gesture:

Figure 36B:
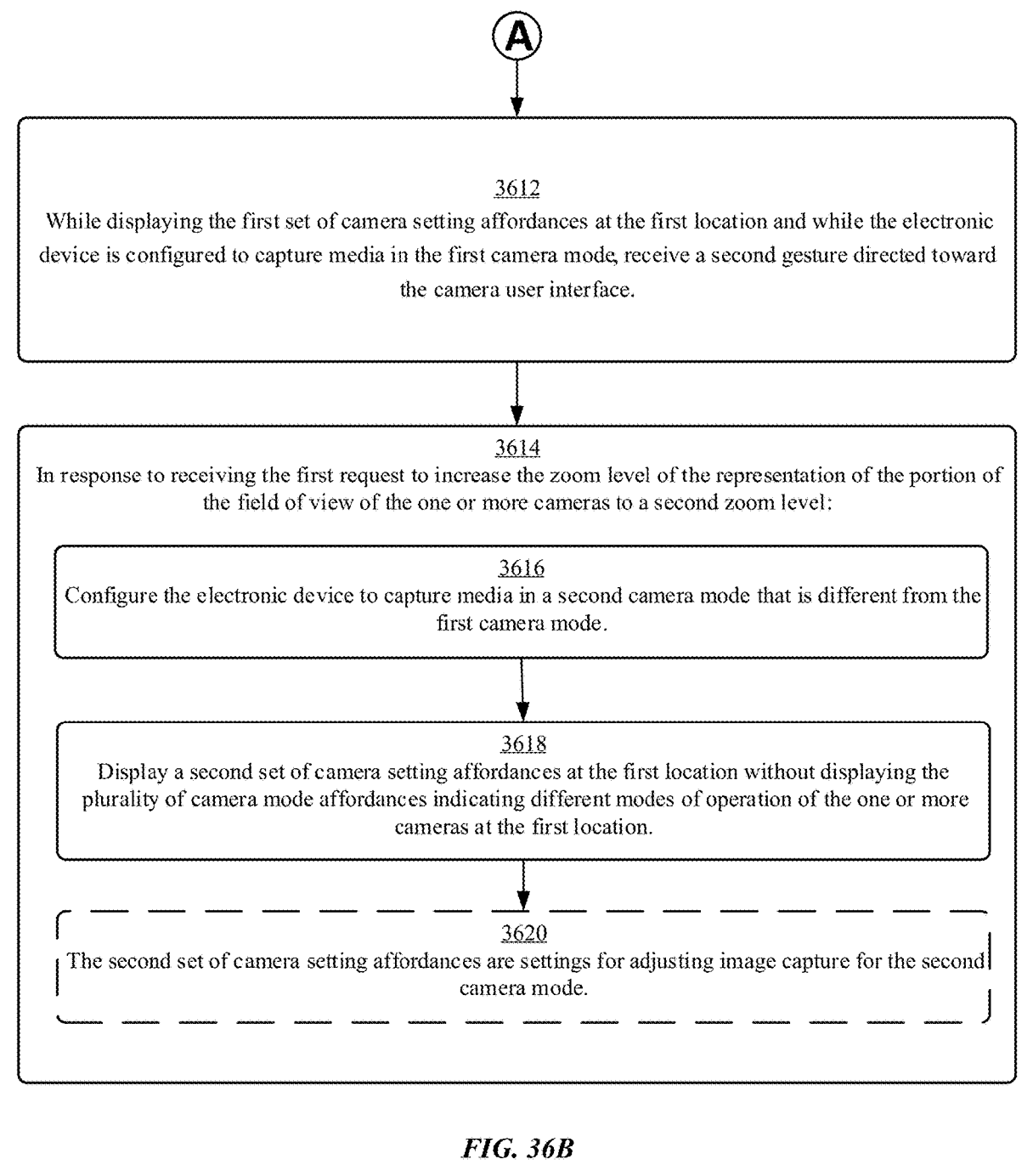

3612
While displaying the first set of camera setting affordances at the first location and while the electronic device is configured to capture media in the first camera mode, receive a second gesture directed toward the camera user interface.

3614
In response to receiving the first request to increase the zoom level of the representation of the portion of the field of view of the one or more cameras to a second zoom level:

3616
Configure the electronic device to capture media in a second camera mode that is different from the first camera mode.

3618
Display a second set of camera setting affordances at the first location without displaying the plurality of camera mode affordances indicating different modes of operation of the one or more cameras at the first location.

3620
The second set of camera setting affordances are settings for adjusting image capture for the second camera mode.

USER INTERFACES FOR CAPTURING AND MANAGING VISUAL MEDIA

CROSS-REFERENCE TO RELATED APPLICATIONS

This application claims priority to U.S. Provisional Patent Application No. 62/844,110, entitled "USER INTERFACES FOR CAPTURING AND MANAGING VISUAL MEDIA," filed on May 6, 2019; U.S. Provisional Patent Application No. 62/856,036, entitled "USER INTERFACES FOR CAPTURING AND MANAGING VISUAL MEDIA," filed on Jun. 1, 2019; and U.S. Provisional Patent Application No. 62/897,968, entitled "USER INTERFACES FOR CAPTURING AND MANAGING VISUAL MEDIA," filed on Sep. 9, 2019, the contents of which are hereby incorporated by reference in their entireties.

FIELD

The present disclosure relates generally to computer user interfaces, and more specifically to techniques for capturing and managing visual media.

BACKGROUND

Users of smartphones and other personal electronic devices are more frequently capturing, storing, and editing media for safekeeping memories and sharing with friends. Some existing techniques allowed users to capture images or videos. Users can manage such media by, for example, capturing, storing, and editing the media.

BRIEF SUMMARY

Some techniques for capturing and managing media using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for capturing and managing media. Such methods and interfaces optionally complement or replace other methods for capturing and managing media. Such methods and interfaces reduce the cognitive burden on a user and produce a more efficient human-machine interface. For battery-operated computing devices, such methods and interfaces conserve power and increase the time between battery charges.

In some examples, the present technique enables users to edit captured media in a time- and input-efficient manner, thereby reducing the amount of processing the device needs to do. In some examples, the present technique manages framerates, thereby conserving storage space and reducing processing requirements.

In accordance with some embodiments, a method is described. The method is performed at an electronic device having a display device and one or more cameras. The method comprises: displaying, via the display device, a camera user interface, the camera user interface including: a camera display region, the camera display region including a representation of a field-of-view of the one or more cameras; and a camera control region, the camera control region including a plurality of control affordances; and while a first predefined condition and a second predefined condition are not met, displaying the camera user interface without displaying a first control affordance associated with the first predefined condition and without displaying a second control affordance associated with the second predefined condition; while displaying the camera user interface without displaying the first control affordance and without displaying the second control affordance, detecting a change in conditions; and in response to detecting the change in conditions: in accordance with a determination that the first predefined condition is met, displaying the first control affordance; and in accordance with a determination that the second predefined condition is met, displaying the second control affordance.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface, the camera user interface including: a camera display region, the camera display region including a representation of a field-of-view of the one or more cameras; and a camera control region, the camera control region including a plurality of control affordances; and while a first predefined condition and a second predefined condition are not met, displaying the camera user interface without displaying a first control affordance associated with the first predefined condition and without displaying a second control affordance associated with the second predefined condition; while displaying the camera user interface without displaying the first control affordance and without displaying the second control affordance, detecting a change in conditions; and in response to detecting the change in conditions: in accordance with a determination that the first predefined condition is met, displaying the first control affordance; and in accordance with a determination that the second predefined condition is met, displaying the second control affordance.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: displaying, via the display device, a camera user interface, the camera user interface including: a camera display region, the camera display region including a representation of a field-of-view of the one or more cameras; and a camera control region, the camera control region including a plurality of control affordances; and while a first predefined condition and a second predefined condition are not met, displaying the camera user interface without displaying a first control affordance associated with the first predefined condition and without displaying a second control affordance associated with the second predefined condition; while displaying the camera user interface without displaying the first control affordance and without displaying the second control affordance, detecting a change in conditions; and in response to detecting the change in conditions: in accordance with a determination that the first predefined condition is met, displaying the first control affordance; and in accordance with a determination that the second predefined condition is met, displaying the second control affordance.

In accordance with some embodiments, an electronic device is described. The electronic device comprises: a display device; one or more cameras; one or more processors; and memory storing one or more programs configured to be executed by the one or more processors, the one or more programs including instructions for: displaying, via the display device, a camera user interface, the camera user interface including: a camera display region, the camera display region including a representation of a field-of-view of the one or more cameras; and a camera control region, the camera control region including a plurality of control affordances; and while a first predefined condition and a second predefined condition are not met, displaying the camera user interface without displaying a first control affordance associated with the first predefined condition and without displaying a second control affordance associated with the second predefined condition; while displaying the camera user interface without displaying the first control affordance and without displaying the second control affordance, detecting a change in conditions; and in response to detecting the change in conditions: in accordance with a determination that the first predefined condition is met, displaying the first control affordance; and in accordance with a determination that the second predefined condition is met, displaying the second control affordance.

In accordance with some embodiments, an electronic device is described. The electronic device comprises: a display device; one or more cameras; means for displaying, via the display device, a camera user interface, the camera user interface including: a camera display region, the camera display region including a representation of a field-of-view of the one or more cameras; and a camera control region, the camera control region including a plurality of control affordances; and means, while a first predefined condition and a second predefined condition are not met, for displaying the camera user interface without displaying a first control affordance associated with the first predefined condition and without displaying a second control affordance associated with the second predefined condition; means, while displaying the camera user interface without displaying the first control affordance and without displaying the second control affordance, for detecting a change in conditions; and in response to detecting the change in conditions: in accordance with a determination that the first predefined condition is met, displaying the first control affordance; and in accordance with a determination that the second predefined condition is met, displaying the second control affordance.

In accordance with some embodiments, a method is described. The method is performed at an electronic device having a display device and one or more cameras. The method comprises: displaying, via the display device, a camera user interface, the camera user interface including: a camera display region, the camera display region including a representation of a field-of-view of the one or more cameras; and a camera control region, the camera control region including a plurality of camera mode affordances at a first location; and while displaying the camera user interface, detecting a first gesture on the camera user interface; and in response to detecting the first gesture, modifying an appearance of the camera control region, including: in accordance with a determination that the gesture is a gesture of a first type, displaying one or more additional camera mode affordances at the first location; and in accordance with a determination that the gesture is a gesture of a second type different from the first type, ceasing to display the plurality of camera mode affordances, and displaying a plurality of camera setting affordances at the first location, wherein the camera setting affordances are settings for adjusting image capture for a currently selected camera mode.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface, the camera user interface including: a camera display region, the camera display region including a representation of a field-of-view of the one or more cameras; and a camera control region, the camera control region including a plurality of camera mode affordances at a first location; and while displaying the camera user interface, detecting a first gesture on the camera user interface; and in response to detecting the first gesture, modifying an appearance of the camera control region, including: in accordance with a determination that the gesture is a gesture of a first type, displaying one or more additional camera mode affordances at the first location; and in accordance with a determination that the gesture is a gesture of a second type different from the first type, ceasing to display the plurality of camera mode affordances, and displaying a plurality of camera setting affordances at the first location, wherein the camera setting affordances are settings for adjusting image capture for a currently selected camera mode.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: displaying, via the display device, a camera user interface, the camera user interface including: a camera display region, the camera display region including a representation of a field-of-view of the one or more cameras; and a camera control region, the camera control region including a plurality of camera mode affordances at a first location; and while displaying the camera user interface, detecting a first gesture on the camera user interface; and in response to detecting the first gesture, modifying an appearance of the camera control region, including: in accordance with a determination that the gesture is a gesture of a first type, displaying one or more additional camera mode affordances at the first location; and in accordance with a determination that the gesture is a gesture of a second type different from the first type, ceasing to display the plurality of camera mode affordances, and displaying a plurality of camera setting affordances at the first location, wherein the camera setting affordances are settings for adjusting image capture for a currently selected camera mode.

In accordance with some embodiments, an electronic device is described. The electronic device comprises: a display device; one or more cameras; one or more processors; and memory storing one or more programs configured to be executed by the one or more processors, the one or more programs including instructions for: displaying, via the display device, a camera user interface, the camera user interface including: a camera display region, the camera display region including a representation of a field-of-view of the one or more cameras; and a camera control region, the camera control region including a plurality of camera mode affordances at a first location; and while displaying the camera user interface, detecting a first gesture on the camera user interface; and in response to detecting the first gesture, modifying an appearance of the camera control region, including: in accordance with a determination that the gesture is a gesture of a first type, displaying one or more additional camera mode affordances at the first location; and in accordance with a determination that the gesture is a gesture of a second type different from the first type, ceasing to display the plurality of camera mode affordances, and displaying a plurality of camera setting affordances at the first location, wherein the camera setting affordances are settings for adjusting image capture for a currently selected camera mode.

In accordance with some embodiments, an electronic device is described. The electronic device comprises: a display device; one or more cameras; means for displaying, via the display device, a camera user interface, the camera user interface including: a camera display region, the camera display region including a representation of a field-of-view of the one or more cameras; and a camera control region, the camera control region including a plurality of camera mode affordances at a first location; and means, while displaying the camera user interface, for detecting a first gesture on the camera user interface; and means responsive to detecting the first gesture, for modifying an appearance of the camera control region, including: in accordance with a determination that the gesture is a gesture of a first type, displaying one or more additional camera mode affordances at the first location; and in accordance with a determination that the gesture is a gesture of a second type different from the first type, ceasing to display the plurality of camera mode affordances, and displaying a plurality of camera setting affordances at the first location, wherein the camera setting affordances are settings for adjusting image capture for a currently selected camera mode.

In accordance with some embodiments, a method is described. The method is performed at an electronic device having a display device and one or more cameras. The method comprises: receiving a request to display a user camera user interface; in response to receiving the request to display the camera user interface and in accordance with a determination that respective criteria are not satisfied: displaying, via the display device, the camera user interface, the camera user interface including: a first region, the first region including a representation of a first portion of a field-of-view of the one or more cameras; and a second region, the second region including a representation of a second portion of the field-of-view of the one or more cameras, wherein the second portion of the field-of-view of the one or more cameras is visually distinguished from the first portion; while the camera user interface is displayed, detecting an input corresponding to a request to capture media with the one or more cameras; and in response to detecting the input corresponding to a request to capture media with the one or more cameras, capturing, with the one or more cameras, a media item that includes visual content corresponding to the first portion of the field-of-view of the one or more cameras and visual content corresponding to the second portion of the field-of-view of the one or more cameras; after capturing the media item, receiving a request to display the media item; and in response to receiving the request to display the media item, displaying a first representation of the visual content corresponding to the first portion of the field-of-view of the one or more cameras without displaying a representation of at least a portion of the visual content corresponding to the second portion of the field-of-view of the one or more cameras.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: receiving a request to display a user camera user interface; in response to receiving the request to display the camera user interface and in accordance with a determination that respective criteria are not satisfied: displaying, via the display device, the camera user interface, the camera user interface including: a first region, the first region including a representation of a first portion of a field-of-view of the one or more cameras; and a second region, the second region including a representation of a second portion of the field-of-view of the one or more cameras, wherein the second portion of the field-of-view of the one or more cameras is visually distinguished from the first portion; while the camera user interface is displayed, detecting an input corresponding to a request to capture media with the one or more cameras; and in response to detecting the input corresponding to a request to capture media with the one or more cameras, capturing, with the one or more cameras, a media item that includes visual content corresponding to the first portion of the field-of-view of the one or more cameras and visual content corresponding to the second portion of the field-of-view of the one or more cameras; after capturing the media item, receiving a request to display the media item; and in response to receiving the request to display the media item, displaying a first representation of the visual content corresponding to the first portion of the field-of-view of the one or more cameras without displaying a representation of at least a portion of the visual content corresponding to the second portion of the field-of-view of the one or more cameras.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: receiving a request to display a user camera user interface; in response to receiving the request to display the camera user interface and in accordance with a determination that respective criteria are not satisfied: displaying, via the display device, the camera user interface, the camera user interface including: a first region, the first region including a representation of a first portion of a field-of-view of the one or more cameras; and a second region, the second region including a representation of a second portion of the field-of-view of the one or more cameras, wherein the second portion of the field-of-view of the one or more cameras is visually distinguished from the first portion; while the camera user interface is displayed, detecting an input corresponding to a request to capture media with the one or more cameras; and in response to detecting the input corresponding to a request to capture media with the one or more cameras, capturing, with the one or more cameras, a media item that includes visual content corresponding to the first portion of the field-of-view of the one or more cameras and visual content corresponding to the second portion of the field-of-view of the one or more cameras; after capturing the media item, receiving a request to display the media item; and in response to receiving the request to display the media item, displaying a first representation of the visual content corresponding to the first portion of the field-of-view of the one or more cameras without displaying a representation of at least a portion of the visual content corresponding to the second portion of the field-of-view of the one or more cameras.

In accordance with some embodiments, an electronic device is described. The electronic device comprises: a display device; one or more cameras; one or more processors; and memory storing one or more programs configured to be executed by the one or more processors, the one or more programs including instructions for: receiving a request to display a user camera user interface; in response to receiving the request to display the camera user interface and in accordance with a determination that respective criteria are not satisfied: displaying, via the display device, the camera user interface, the camera user interface including: a first region, the first region including a representation of a first portion of a field-of-view of the one or more cameras; and a second region, the second region including a representation of a second portion of the field-of-view of the one or more cameras, wherein the second portion of the field-of-view of the one or more cameras is visually distinguished from the first portion; while the camera user interface is displayed, detecting an input corresponding to a request to capture media with the one or more cameras; and in response to detecting the input corresponding to a request to capture media with the one or more cameras, capturing, with the one or more cameras, a media item that includes visual content corresponding to the first portion of the field-of-view of the one or more cameras and visual content corresponding to the second portion of the field-of-view of the one or more cameras; after capturing the media item, receiving a request to display the media item; and in response to receiving the request to display the media item, displaying a first representation of the visual content corresponding to the first portion of the field-of-view of the one or more cameras without displaying a representation of at least a portion of the visual content corresponding to the second portion of the field-of-view of the one or more cameras.

In accordance with some embodiments, an electronic device is described. The electronic device comprises: a display device; one or more cameras; means for receiving a request to display a user camera user interface; means, responsive to receiving the request to display the camera user interface and in accordance with a determination that respective criteria are not satisfied, for: displaying, via the display device, the camera user interface, the camera user interface including: a first region, the first region including a representation of a first portion of a field-of-view of the one or more cameras; and a second region, the second region including a representation of a second portion of the field-of-view of the one or more cameras, wherein the second portion of the field-of-view of the one or more cameras is visually distinguished from the first portion; means, while the camera user interface is displayed, for detecting an input corresponding to a request to capture media with the one or more cameras; and means, responsive to detecting the input corresponding to a request to capture media with the one or more cameras, for capturing, with the one or more cameras, a media item that includes visual content corresponding to the first portion of the field-of-view of the one or more cameras and visual content corresponding to the second portion of the field-of-view of the one or more cameras; means, after capturing the media item, for receiving a request to display the media item; and means, responsive to receiving the request to display the media item, for displaying a first representation of the visual content corresponding to the first portion of the field-of-view of the one or more cameras without displaying a representation of at least a portion of the visual content corresponding to the second portion of the field-of-view of the one or more cameras.

In accordance with some embodiments, a method is described. The method is performed at an electronic device having a display device and one or more cameras. The method comprises: displaying, via the display device, a camera user interface the camera user interface including a camera display region, the camera display region including a representation of a field-of-view of the one or more cameras; while displaying the camera user interface, detecting a request to capture media corresponding to the field-of-view of the one or more cameras; in response to detecting the request to capture media corresponding to the field-of-view of the one or more cameras, capturing media corresponding to the field-of-view of the one or more cameras and displaying a representation of the captured media; while displaying the representation of the captured media, detecting that the representation of the captured media has been displayed for a predetermined period of time; and in response to detecting that the representation of the captured media has been displayed for the predetermined period of time, ceasing to display at least a first portion of the representation of the captured media while maintaining display of the camera user interface.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface the camera user interface including a camera display region, the camera display region including a representation of a field-of-view of the one or more cameras; while displaying the camera user interface, detecting a request to capture media corresponding to the field-of-view of the one or more cameras; in response to detecting the request to capture media corresponding to the field-of-view of the one or more cameras, capturing media corresponding to the field-of-view of the one or more cameras and displaying a representation of the captured media; while displaying the representation of the captured media, detecting that the representation of the captured media has been displayed for a predetermined period of time; and in response to detecting that the representation of the captured media has been displayed for the predetermined period of time, ceasing to display at least a first portion of the representation of the captured media while maintaining display of the camera user interface.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: displaying, via the display device, a camera user interface the camera user interface including a camera display region, the camera display region including a representation of a field-of-view of the one or more cameras; while displaying the camera user interface, detecting a request to capture media corresponding to the field-of-view of the one or more cameras; in response to detecting the request to capture media corresponding to the field-of-view of the one or more cameras, capturing media corresponding to the field-of-view of the one or more cameras and displaying a representation of the captured media; while displaying the representation of the captured media, detecting that the representation of the captured media has been displayed for a predetermined period of time; and in response to detecting that the representation of the captured media has been displayed for the predetermined period of time, ceasing to display at least a first portion of the representation of the captured media while maintaining display of the camera user interface.

In accordance with some embodiments, an electronic device is described. The electronic device comprises: a display device; one or more cameras; one or more processors; and memory storing one or more programs configured to be executed by the one or more processors, the one or more programs including instructions for: displaying, via the display device, a camera user interface the camera user interface including a camera display region, the camera display region including a representation of a field-of-view of the one or more cameras; while displaying the camera user interface, detecting a request to capture media corresponding to the field-of-view of the one or more cameras; in response to detecting the request to capture media corresponding to the field-of-view of the one or more cameras, capturing media corresponding to the field-of-view of the one or more cameras and displaying a representation of the captured media; while displaying the representation of the captured media, detecting that the representation of the captured media has been displayed for a predetermined period of time; and in response to detecting that the representation of the captured media has been displayed for the predetermined period of time, ceasing to display at least a first portion of the representation of the captured media while maintaining display of the camera user interface.

In accordance with some embodiments, an electronic device is described. The electronic device comprises: a display device; one or more cameras; means for displaying, via the display device, a camera user interface the camera user interface including a camera display region, the camera display region including a representation of a field-of-view of the one or more cameras; means, while displaying the camera user interface, for detecting a request to capture media corresponding to the field-of-view of the one or more cameras; means, responsive to detecting the request to capture media corresponding to the field-of-view of the one or more cameras, for capturing media corresponding to the field-of-view of the one or more cameras and displaying a representation of the captured media; means, while displaying the representation of the captured media, for detecting that the representation of the captured media has been displayed for a predetermined period of time; and means, responsive to detecting that the representation of the captured media has been displayed for the predetermined period of time, for ceasing to display at least a first portion of the representation of the captured media while maintaining display of the camera user interface.

In accordance with some embodiments, a method is described. The method is performed at an electronic device having a display device and one or more cameras. The method comprises: displaying, via the display device, a camera user interface, the camera user interface including a camera display region, the camera display region including a representation of a field-of-view of the one or more cameras; while the electronic device is configured to capture media with a first aspect ratio in response to receiving a request to capture media, detecting a first input including a first contact at a respective location on the representation of the field-of-view of the one or more cameras; and in response to detecting the first input: in accordance with a determination that a set of aspect ratio change criteria is met, configuring the electronic device to capture media with a second aspect ratio that is different from the first aspect ratio in response to a request to capture media, wherein the set of aspect ratio change criteria includes a criterion that is met when the first input includes maintaining the first contact at a first location corresponding to a predefined portion of the camera display region that indicates at least a portion of a boundary of the media that will be captured in response to a request to capture media for at least a threshold amount of time, followed by detecting movement of the first contact to a second location different from the first location.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface, the camera user interface including a camera display region, the camera display region including a representation of a field-of-view of the one or more cameras; while the electronic device is configured to capture media with a first aspect ratio in response to receiving a request to capture media, detecting a first input including a first contact at a respective location on the representation of the field-of-view of the one or more cameras; and in response to detecting the first input: in accordance with a determination that a set of aspect ratio change criteria is met, configuring the electronic device to capture media with a second aspect ratio that is different from the first aspect ratio in response to a request to capture media, wherein the set of aspect ratio change criteria includes a criterion that is met when the first input includes maintaining the first contact at a first location corresponding to a predefined portion of the camera display region that indicates at least a portion of a boundary of the media that will be captured in response to a request to capture media for at least a threshold amount of time, followed by detecting movement of the first contact to a second location different from the first location.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: displaying, via the display device, a camera user interface, the camera user interface including a camera display region, the camera display region including a representation of a field-of-view of the one or more cameras; while the electronic device is configured to capture media with a first aspect ratio in response to receiving a request to capture media, detecting a first input including a first contact at a respective location on the representation of the field-of-view of the one or more cameras; and in response to detecting the first input: in accordance with a determination that a set of aspect ratio change criteria is met, configuring the electronic device to capture media with a second aspect ratio that is different from the first aspect ratio in response to a request to capture media, wherein the set of aspect ratio change criteria includes a criterion that is met when the first input includes maintaining the first contact at a first location corresponding to a predefined portion of the camera display region that indicates at least a portion of a boundary of the media that will be captured in response to a request to capture media for at least a threshold amount of time, followed by detecting movement of the first contact to a second location different from the first location.

In accordance with some embodiments, an electronic device is described. The electronic device comprises: a display device; one or more cameras; one or more processors; and memory storing one or more programs configured to be executed by the one or more processors, the one or more programs including instructions for: displaying, via the display device, a camera user interface, the camera user interface including a camera display region, the camera display region including a representation of a field-of-view of the one or more cameras; while the electronic device is configured to capture media with a first aspect ratio in response to receiving a request to capture media, detecting a first input including a first contact at a respective location on the representation of the field-of-view of the one or more cameras; and in response to detecting the first input: in accordance with a determination that a set of aspect ratio change criteria is met, configuring the electronic device to capture media with a second aspect ratio that is different from the first aspect ratio in response to a request to capture media, wherein the set of aspect ratio change criteria includes a criterion that is met when the first input includes maintaining the first contact at a first location corresponding to a predefined portion of the camera display region that indicates at least a portion of a boundary of the media that will be captured in response to a request to capture media for at least a threshold amount of time, followed by detecting movement of the first contact to a second location different from the first location.

In accordance with some embodiments, an electronic device is described. The electronic device comprises: a display device; one or more cameras; means for displaying, via the display device, a camera user interface, the camera user interface including a camera display region, the camera display region including a representation of a field-of-view of the one or more cameras; means, while the electronic device is configured to capture media with a first aspect ratio in response to receiving a request to capture media, for detecting a first input including a first contact at a respective location on the representation of the field-of-view of the one or more cameras; and means, responsive to detecting the first input, for: in accordance with a determination that a set of aspect ratio change criteria is met, configuring the electronic device to capture media with a second aspect ratio that is different from the first aspect ratio in response to a request to capture media, wherein the set of aspect ratio change criteria includes a criterion that is met when the first input includes maintaining the first contact at a first location corresponding to a predefined portion of the camera display region that indicates at least a portion of a boundary of the media that will be captured in response to a request to capture media for at least a threshold amount of time, followed by detecting movement of the first contact to a second location different from the first location.

In accordance with some embodiments, a method is described. The method is performed at an electronic device having a display device and a camera. The method comprises: while the electronic device is in a first orientation, displaying, via the display device, a first camera user interface for capturing media in a first camera orientation at a first zoom level; detecting a change in orientation of the electronic device from the first orientation to a second orientation; and in response to detecting the change in orientation of the electronic device from the first orientation to a second orientation: in accordance with a determination that a set of automatic zoom criteria are satisfied, automatically, without intervening user inputs, displaying a second camera user interface for capturing media in a second camera orientation at a second zoom level that is different from the first zoom level.

In accordance with some embodiments, a non-transitory computer-readable storage medium is described. The non-transitory computer-readable storage medium stores one or more programs configured to be executed by one or more processors of an electronic device with a display device and a camera, the one or more programs including instructions for: while the electronic device is in a first orientation, displaying, via the display device, a first camera user interface for capturing media in a first camera orientation at a first zoom level; detecting a change in orientation of the electronic device from the first orientation to a second orientation; and in response to detecting the change in orientation of the electronic device from the first orientation to a second orientation: in accordance with a determination that a set of automatic zoom criteria are satisfied, automatically, without intervening user inputs, displaying a second camera user interface for capturing media in a second camera orientation at a second zoom level that is different from the first zoom level.

In accordance with some embodiments, a transitory computer-readable storage medium is described. The transitory computer-readable storage medium stores one or more programs configured to be executed by one or more processors of an electronic device with a display device and a camera, the one or more programs including instructions for: while the electronic device is in a first orientation, displaying, via the display device, a first camera user interface for capturing media in a first camera orientation at a first zoom level; detecting a change in orientation of the electronic device from the first orientation to a second orientation; and in response to detecting the change in orientation of the electronic device from the first orientation to a second orientation: in accordance with a determination that a set of automatic zoom criteria are satisfied, automatically, without intervening user inputs, displaying a second camera user interface for capturing media in a second camera orientation at a second zoom level that is different from the first zoom level.

In accordance with some embodiments, an electronic device is described. The electronic device comprises: a display device; a camera; one or more processors; and memory storing one or more programs configured to be executed by the one or more processors, the one or more programs including instructions for: while the electronic device is in a first orientation, displaying, via the display device, a first camera user interface for capturing media in a first camera orientation at a first zoom level; detecting a change in orientation of the electronic device from the first orientation to a second orientation; and in response to detecting the change in orientation of the electronic device from the first orientation to a second orientation: in accordance with a determination that a set of automatic zoom criteria are satisfied, automatically, without intervening user inputs, displaying a second camera user interface for capturing media in a second camera orientation at a second zoom level that is different from the first zoom level.

In accordance with some embodiments, an electronic device is described. The electronic device comprises: a display device; a camera; means, while the electronic device is in a first orientation, for displaying, via the display device, a first camera user interface for capturing media in a first camera orientation at a first zoom level; means for detecting a change in orientation of the electronic device from the first orientation to a second orientation; and means, responsive to detecting the change in orientation of the electronic device from the first orientation to a second orientation, for: in accordance with a determination that a set of automatic zoom criteria are satisfied, automatically, without intervening user inputs, displaying a second camera user interface for capturing media in a second camera orientation at a second zoom level that is different from the first zoom level.

In accordance with some embodiments, a method is described. The method is performed at an electronic device having a display device and one or more cameras. The method comprises: displaying, via the display device, a media capture user interface that includes displaying a representation of a field-of-view of the one or more cameras; while displaying the media capture user interface, detecting, via the camera, changes in the field-of-view of the one or more cameras; and in response to detecting the changes in the field-of-view of the one or more cameras and in accordance with a determination that variable frame rate criteria are satisfied: in accordance with a determination that the detected changes in the field-of-view of the one or more cameras satisfy movement criteria, updating the representation of the field-of-view of the one or more cameras based on the detected changes in the field-of-view of the one or more cameras at a first frame rate; and in accordance with a determination that the detected changes in the field-of-view of the one or more cameras do not satisfy the movement criteria, updating the representation of the field-of-view of the one or more cameras based on the detected changes in the field-of-view of the one or more cameras at a second frame rate, wherein the second frame rate is lower than the first frame rate.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a media capture user interface that includes displaying a representation of a field-of-view of the one or more cameras; while displaying the media capture user interface, detecting, via the camera, changes in the field-of-view of the one or more cameras; and in response to detecting the changes in the field-of-view of the one or more cameras and in accordance with a determination that variable frame rate criteria are satisfied: in accordance with a determination that the detected changes in the field-of-view of the one or more cameras satisfy movement criteria, updating the representation of the field-of-view of the one or more cameras based on the detected changes in the field-of-view of the one or more cameras at a first frame rate; and in accordance with a determination that the detected changes in the field-of-view of the one or more cameras do not satisfy the movement criteria, updating the representation of the field-of-view of the one or more cameras based on the detected changes in the field-of-view of the one or more cameras at a second frame rate, wherein the second frame rate is lower than the first frame rate.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: displaying, via the display device, a media capture user interface that includes displaying a representation of a field-of-view of the one or more cameras; while displaying the media capture user interface, detecting, via the camera, changes in the field-of-view of the one or more cameras; and in response to detecting the changes in the field-of-view of the one or more cameras and in accordance with a determination that variable frame rate criteria are satisfied: in accordance with a determination that the detected changes in the field-of-view of the one or more cameras satisfy movement criteria, updating the representation of the field-of-view of the one or more cameras based on the detected changes in the field-of-view of the one or more cameras at a first frame rate; and in accordance with a determination that the detected changes in the field-of-view of the one or more cameras do not satisfy the movement criteria, updating the representation of the field-of-view of the one or more cameras based on the detected changes in the field-of-view of the one or more cameras at a second frame rate, wherein the second frame rate is lower than the first frame rate.

In accordance with some embodiments, an electronic device is described. The electronic device comprises: a display device; one or more cameras; one or more processors; and memory storing one or more programs configured to be executed by the one or more processors, the one or more programs including instructions for: displaying, via the display device, a media capture user interface that includes displaying a representation of a field-of-view of the one or more cameras; while displaying the media capture user interface, detecting, via the camera, changes in the field-of-view of the one or more cameras; and in response to detecting the changes in the field-of-view of the one or more cameras and in accordance with a determination that variable frame rate criteria are satisfied: in accordance with a determination that the detected changes in the field-of-view of the one or more cameras satisfy movement criteria, updating the representation of the field-of-view of the one or more cameras based on the detected changes in the field-of-view of the one or more cameras at a first frame rate; and in accordance with a determination that the detected changes in the field-of-view of the one or more cameras do not satisfy the movement criteria, updating the representation of the field-of-view of the one or more cameras based on the detected changes in the field-of-view of the one or more cameras at a second frame rate, wherein the second frame rate is lower than the first frame rate.

In accordance with some embodiments, an electronic device is described. The electronic device comprises: a display device; one or more cameras; means for displaying, via the display device, a media capture user interface that includes displaying a representation of a field-of-view of the one or more cameras; means, while displaying the media capture user interface, for detecting, via the camera, changes in the field-of-view of the one or more cameras; and means, responsive to detecting the changes in the field-of-view of the one or more cameras and in accordance with a determination that variable frame rate criteria are satisfied, for: in accordance with a determination that the detected changes in the field-of-view of the one or more cameras satisfy movement criteria, updating the representation of the field-of-view of the one or more cameras based on the detected changes in the field-of-view of the one or more cameras at a first frame rate; and in accordance with a determination that the detected changes in the field-of-view of the one or more cameras do not satisfy the movement criteria, updating the representation of the field-of-view of the one or more cameras based on the detected changes in the field-of-view of the one or more cameras at a second frame rate, wherein the second frame rate is lower than the first frame rate.

In accordance with some embodiments, a method is described. The method is performed at an electronic device having a display device and one or more cameras. The method comprises: receiving a request to display a camera user interface; and in response to receiving the request to display the camera user interface, displaying, via the display device, a camera user interface that includes: displaying, via the display device, a representation of a field-of-view of the one or more cameras; and in accordance with a determination that low-light conditions have been met, wherein the low-light conditions include a condition that is met when ambient light in the field-of-view of the one or more cameras is below a respective threshold, displaying, concurrently with the representation of the field-of-view of the one or more cameras, a control for adjusting a capture duration for capturing media in response to a request to capture media; and in accordance with a determination that the low-light conditions have not been met, forgoing display of the control for adjusting the capture duration.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: receiving a request to display a camera user interface; and in response to receiving the request to display the camera user interface, displaying, via the display device, a camera user interface that includes: displaying, via the display device, a representation of a field-of-view of the one or more cameras; and in accordance with a determination that low-light conditions have been met, wherein the low-light conditions include a condition that is met when ambient light in the field-of-view of the one or more cameras is below a respective threshold, displaying, concurrently with the representation of the field-of-view of the one or more cameras, a control for adjusting a capture duration for capturing media in response to a request to capture media; and in accordance with a determination that the low-light conditions have not been met, forgoing display of the control for adjusting the capture duration.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: receiving a request to display a camera user interface; and in response to receiving the request to display the camera user interface, displaying, via the display device, a camera user interface that includes: displaying, via the display device, a representation of a field-of-view of the one or more cameras; and in accordance with a determination that low-light conditions have been met, wherein the low-light conditions include a condition that is met when ambient light in the field-of-view of the one or more cameras is below a respective threshold, displaying, concurrently with the representation of the field-of-view of the one or more cameras, a control for adjusting a capture duration for capturing media in response to a request to capture media; and in accordance with a determination that the low-light conditions have not been met, forgoing display of the control for adjusting the capture duration.

In accordance with some embodiments, an electronic device is described. The electronic device comprises: a display device; one or more cameras; one or more processors; and memory storing one or more programs configured to be executed by the one or more processors, the one or more programs including instructions for: receiving a request to display a camera user interface; and in response to receiving the request to display the camera user interface, displaying, via the display device, a camera user interface that includes: displaying, via the display device, a representation of a field-of-view of the one or more cameras; and in accordance with a determination that low-light conditions have been met, wherein the low-light conditions include a condition that is met when ambient light in the field-of-view of the one or more cameras is below a respective threshold, displaying, concurrently with the representation of the field-of-view of the one or more cameras, a control for adjusting a capture duration for capturing media in response to a request to capture media; and in accordance with a determination that the low-light conditions have not been met, forgoing display of the control for adjusting the capture duration.

In accordance with some embodiments, an electronic device is described. The electronic device comprises: a display device; one or more cameras; means for receiving a request to display a camera user interface; and means, responsive to receiving the request to display the camera user interface, for displaying, via the display device, a camera user interface that includes: displaying, via the display device, a representation of a field-of-view of the one or more cameras; and in accordance with a determination that low-light conditions have been met, wherein the low-light conditions include a condition that is met when ambient light in the field-of-view of the one or more cameras is below a respective threshold, displaying, concurrently with the representation of the field-of-view of the one or more cameras, a control for adjusting a capture duration for capturing media in response to a request to capture media; and in accordance with a determination that the low-light conditions have not been met, forgoing display of the control for adjusting the capture duration.

In accordance with some embodiments, a method is described. The method is performed at an electronic device having a display device and one or more cameras. The method comprises: displaying, via the display device, a camera user interface; while displaying the camera user interface, detecting, via one or more sensors of the electronic device, an amount of light in a field-of-view of the one or more cameras; and in response detecting, the amount of light in the field-of-view of the one or more cameras: in accordance with a determination that the amount of light in the field-of-view of the one or more cameras satisfies low-light environment criteria, wherein the low-light environment criteria include a criterion that is satisfied when the amount of light in the field-of-view of the one or more cameras is below a predetermined threshold, concurrently displaying, in the camera user interface: a flash status indicator that indicates a status of a flash operation; and a low-light capture status indicator that indicates a status of a low-light capture mode; and in accordance with a determination that the amount of light in the field-of-view of the one or more cameras does not satisfy the low-light environment criteria, forgoing display of the low-light capture status indicator in the camera user interface.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface; while displaying the camera user interface, detecting, via one or more sensors of the electronic device, an amount of light in a field-of-view of the one or more cameras; and in response detecting, the amount of light in the field-of-view of the one or more cameras: in accordance with a determination that the amount of light in the field-of-view of the one or more cameras satisfies low-light environment criteria, wherein the low-light environment criteria include a criterion that is satisfied when the amount of light in the field-of-view of the one or more cameras is below a predetermined threshold, concurrently displaying, in the camera user interface: a flash status indicator that indicates a status of a flash operation; and a low-light capture status indicator that indicates a status of a low-light capture mode; and in accordance with a determination that the amount of light in the field-of-view of the one or more cameras does not satisfy the low-light environment criteria, forgoing display of the low-light capture status indicator in the camera user interface.

In accordance with some embodiments, a transitory computer-readable storage medium is described. The transitory computer-readable storage medium stores one or more programs configured to be executed by one or more processors of an electronic device with a display device and one or more cameras, the one or more programs including instructions for: displaying, via the display device, a camera user interface; while displaying the camera user interface, detecting, via one or more sensors of the electronic device, an amount of light in a field-of-view of the one or more cameras; and in response detecting, the amount of light in the field-of-view of the one or more cameras: in accordance with a determination that the amount of light in the field-of-view of the one or more cameras satisfies low-light environment criteria, wherein the low-light environment criteria include a criterion that is satisfied when the amount of light in the field-of-view of the one or more cameras is below a predetermined threshold, concurrently displaying, in the camera user interface: a flash status indicator that indicates a status of a flash operation; and a low-light capture status indicator that indicates a status of a low-light capture mode; and in accordance with a determination that the amount of light in the field-of-view of the one or more cameras does not satisfy the low-light environment criteria, forgoing display of the low-light capture status indicator in the camera user interface.

In accordance with some embodiments, an electronic device is described. The electronic device comprises: a display device; one or more cameras; one or more processors; and memory storing one or more programs configured to be executed by the one or more processors, the one or more programs including instructions for: displaying, via the display device, a camera user interface; while displaying the camera user interface, detecting, via one or more sensors of the electronic device, an amount of light in a field-of-view of the one or more cameras; and in response detecting, the amount of light in the field-of-view of the one or more cameras: in accordance with a determination that the amount of light in the field-of-view of the one or more cameras satisfies low-light environment criteria, wherein the low-light environment criteria include a criterion that is satisfied when the amount of light in the field-of-view of the one or more cameras is below a predetermined threshold, concurrently displaying, in the camera user interface: a flash status indicator that indicates a status of a flash operation; and a low-light capture status indicator that indicates a status of a low-light capture mode; and in accordance with a determination that the amount of light in the field-of-view of the one or more cameras does not satisfy the low-light environment criteria, forgoing display of the low-light capture status indicator in the camera user interface.

In accordance with some embodiments, an electronic device is described. The electronic device comprises: a display device; one or more cameras; means for displaying, via the display device, a camera user interface; means, while displaying the camera user interface, for detecting, via one or more sensors of the electronic device, an amount of light in a field-of-view of the one or more cameras; and means, responsive to detecting, the amount of light in the field-of-view of the one or more cameras, for: in accordance with a determination that the amount of light in the field-of-view of the one or more cameras satisfies low-light environment criteria, wherein the low-light environment criteria include a criterion that is satisfied when the amount of light in the field-of-view of the one or more cameras is below a predetermined threshold, concurrently displaying, in the camera user interface: a flash status indicator that indicates a status of a flash operation; and a low-light capture status indicator that indicates a status of a low-light capture mode; and in accordance with a determination that the amount of light in the field-of-view of the one or more cameras does not satisfy the low-light environment criteria, forgoing display of the low-light capture status indicator in the camera user interface.

In accordance with some embodiments, a method is described. The method is performed at an electronic device having a display device. The method comprises: displaying, on the display device, a media editing user interface including: a representation of a visual media; a first affordance corresponding to a first editable parameter to edit the representation of the visual media; and a second affordance corresponding to a second editable parameter to edit the representation of the visual media; while displaying the media editing user interface, detecting a first user input corresponding to selection of the first affordance; in response to detecting the first user input corresponding to selection of the first affordance, displaying, on the display device, at a respective location in the media editing user interface, an adjustable control for adjusting the first editable parameter; while displaying the adjustable control for adjusting the first editable parameter and while the first editable parameter is selected, detecting a first gesture directed to the adjustable control for adjusting the first editable parameter; in response to detecting the first gesture directed to the adjustable control for adjusting the first editable parameter while the first editable parameter is selected, adjusting a current value of the first editable parameter in accordance with the first gesture; while displaying, on the display device, the adjustable control for adjusting the first editable parameter, detecting a second user input corresponding to selection of the second affordance; in response to detecting the second user input corresponding to selection of the second affordance, displaying at the respective location in the media editing user interface an adjustable control for adjusting the second editable parameter; while displaying the adjustable control for adjusting the second editable parameter and while the second editable parameter is selected, detecting a second gesture directed to the adjustable control for adjusting the second editable parameter; and in response to detecting the second gesture directed to the adjustable control for adjusting the second editable parameter while the second editable parameter is selected, adjusting a current value of the second editable parameter in accordance with the second gesture.

In accordance with some embodiments, a non-transitory computer-readable storage medium is described. The non-transitory computer-readable storage medium stores one or more programs configured to be executed by one or more processors of an electronic device with a display device, the one or more programs including instructions for: displaying, on the display device, a media editing user interface including: a representation of a visual media; a first affordance corresponding to a first editable parameter to edit the representation of the visual media; and a second affordance corresponding to a second editable parameter to edit the representation of the visual media; while displaying the media editing user interface, detecting a first user input corresponding to selection of the first affordance; in response to detecting the first user input corresponding to selection of the first affordance, displaying, on the display device, at a respective location in the media editing user interface, an adjustable control for adjusting the first editable parameter; while displaying the adjustable control for adjusting the first editable parameter and while the first editable parameter is selected, detecting a first gesture directed to the adjustable control for adjusting the first editable parameter; in response to detecting the first gesture directed to the adjustable control for adjusting the first editable parameter while the first editable parameter is selected, adjusting a current value of the first editable parameter in accordance with the first gesture; while displaying, on the display device, the adjustable control for adjusting the first editable parameter, detecting a second user input corresponding to selection of the second affordance; in response to detecting the second user input corresponding to selection of the second affordance, displaying at the respective location in the media editing user interface an adjustable control for adjusting the second editable parameter; while displaying the adjustable control for adjusting the second editable parameter and while the second editable parameter is selected, detecting a second gesture directed to the adjustable control for adjusting the second editable parameter; and in response to detecting the second gesture directed to the adjustable control for adjusting the second editable parameter while the second editable parameter is selected, adjusting a current value of the second editable parameter in accordance with the second gesture.

In accordance with some embodiments, a transitory computer-readable storage medium is described. The transitory computer-readable storage medium stores one or more programs configured to be executed by one or more processors of an electronic device with a display device, the one or more programs including instructions for: displaying, on the display device, a media editing user interface including: a representation of a visual media; a first affordance corresponding to a first editable parameter to edit the representation of the visual media; and a second affordance corresponding to a second editable parameter to edit the representation of the visual media; while displaying the media editing user interface, detecting a first user input corresponding to selection of the first affordance; in response to detecting the first user input corresponding to selection of the first affordance, displaying, on the display device, at a respective location in the media editing user interface, an adjustable control for adjusting the first editable parameter; while displaying the adjustable control for adjusting the first editable parameter and while the first editable parameter is selected, detecting a first gesture directed to the adjustable control for adjusting the first editable parameter; in response to detecting the first gesture directed to the adjustable control for adjusting the first editable parameter while the first editable parameter is selected, adjusting a current value of the first editable parameter in accordance with the first gesture; while displaying, on the display device, the adjustable control for adjusting the first editable parameter, detecting a second user input corresponding to selection of the second affordance; in response to detecting the second user input corresponding to selection of the second affordance, displaying at the respective location in the media editing user interface an adjustable control for adjusting the second editable parameter; while displaying the adjustable control for adjusting the second editable parameter and while the second editable parameter is selected, detecting a second gesture directed to the adjustable control for adjusting the second editable parameter; and in response to detecting the second gesture directed to the adjustable control for adjusting the second editable parameter while the second editable parameter is selected, adjusting a current value of the second editable parameter in accordance with the second gesture.

In accordance with some embodiments, an electronic device is described. The electronic device comprises: displaying, on the display device, a media editing user interface including: a representation of a visual media; a first affordance corresponding to a first editable parameter to edit the representation of the visual media; and a second affordance corresponding to a second editable parameter to edit the representation of the visual media; while displaying the media editing user interface, detecting a first user input corresponding to selection of the first affordance; in response to detecting the first user input corresponding to selection of the first affordance, displaying, on the display device, at a respective location in the media editing user interface, an adjustable control for adjusting the first editable parameter; while displaying the adjustable control for adjusting the first editable parameter and while the first editable parameter is selected, detecting a first gesture directed to the adjustable control for adjusting the first editable parameter; in response to detecting the first gesture directed to the adjustable control for adjusting the first editable parameter while the first editable parameter is selected, adjusting a current value of the first editable parameter in accordance with the first gesture; while displaying, on the display device, the adjustable control for adjusting the first editable parameter, detecting a second user input corresponding to selection of the second affordance; in response to detecting the second user input corresponding to selection of the second affordance, displaying at the respective location in the media editing user interface an adjustable control for adjusting the second editable parameter; while displaying the adjustable control for adjusting the second editable parameter and while the second editable parameter is selected, detecting a second gesture directed to the adjustable control for adjusting the second editable parameter; and in response to detecting the second gesture directed to the adjustable control for adjusting the second editable parameter while the second editable parameter is selected, adjusting a current value of the second editable parameter in accordance with the second gesture.

In accordance with some embodiments, an electronic device is described. The electronic device comprises: a display device; means for displaying, on the display device, a media editing user interface including: a representation of a visual media; a first affordance corresponding to a first editable parameter to edit the representation of the visual media; and a second affordance corresponding to a second editable parameter to edit the representation of the visual media; means, while displaying the media editing user interface, for detecting a first user input corresponding to selection of the first affordance; means, responsive to detecting the first user input corresponding to selection of the first affordance, for displaying, on the display device, at a respective location in the media editing user interface, an adjustable control for adjusting the first editable parameter; means, while displaying the adjustable control for adjusting the first editable parameter and while the first editable parameter is selected, for detecting a first gesture directed to the adjustable control for adjusting the first editable parameter; means, responsive to detecting the first gesture directed to the adjustable control for adjusting the first editable parameter while the first editable parameter is selected, for adjusting a current value of the first editable parameter in accordance with the first gesture; means, while displaying, on the display device, the adjustable control for adjusting the first editable parameter, for detecting a second user input corresponding to selection of the second affordance; means, responsive to detecting the second user input corresponding to selection of the second affordance, for displaying at the respective location in the media editing user interface an adjustable control for adjusting the second editable parameter; means, while displaying the adjustable control for adjusting the second editable parameter and while the second editable parameter is selected, for detecting a second gesture directed to the adjustable control for adjusting the second editable parameter; and means, responsive to detecting the second gesture directed to the adjustable control for adjusting the second editable parameter while the second editable parameter is selected, for adjusting a current value of the second editable parameter in accordance with the second gesture.

In accordance with some embodiments, a method is described. The method is performed at an electronic device having a display device. The method comprises: displaying, on the display device, a first user interface that includes concurrently displaying: a first representation of a first visual media; and an adjustable control that includes an indication of a current amount of adjustment for a perspective distortion of the first visual media; while displaying, on the display device, the first user interface, detecting user input that includes a gesture directed to the adjustable control; an in response to detecting the user input that includes the gesture directed to the adjustable control: displaying, on the display device, a second representation of the first visual media with an respective amount of adjustment for the perspective distortion selected based on a magnitude of the gesture.

In accordance with some embodiments, a non-transitory computer-readable storage medium is described. The non-transitory computer-readable storage medium stores one or more programs configured to be executed by one or more processors of an electronic device with a display device, the one or more programs including instructions for: displaying, on the display device, a first user interface that includes concurrently displaying: a first representation of a first visual media; and an adjustable control that includes an indication of a current amount of adjustment for a perspective distortion of the first visual media; while displaying, on the display device, the first user interface, detecting user input that includes a gesture directed to the adjustable control; an in response to detecting the user input that includes the gesture directed to the adjustable control: displaying, on the display device, a second representation of the first visual media with an respective amount of adjustment for the perspective distortion selected based on a magnitude of the gesture.

In accordance with some embodiments, a transitory computer-readable storage medium is described. The transitory computer-readable storage medium stores one or more programs configured to be executed by one or more processors of an electronic device with a display device, the one or more programs including instructions for: displaying, on the display device, a first user interface that includes concurrently displaying: a first representation of a first visual media; and an adjustable control that includes an indication of a current amount of adjustment for a perspective distortion of the first visual media; while displaying, on the display device, the first user interface, detecting user input that includes a gesture directed to the adjustable control; an in response to detecting the user input that includes the gesture directed to the adjustable control: displaying, on the display device, a second representation of the first visual media with an respective amount of adjustment for the perspective distortion selected based on a magnitude of the gesture.

In accordance with some embodiments, an electronic device is described. The electronic device comprises: a display device; one or more processors; and memory storing one or more programs configured to be executed by the one or more processors, the one or more programs including instructions for displaying, on the display device, a first user interface that includes concurrently displaying: a first representation of a first visual media; and an adjustable control that includes an indication of a current amount of adjustment for a perspective distortion of the first visual media; while displaying, on the display device, the first user interface, detecting user input that includes a gesture directed to the adjustable control; an in response to detecting the user input that includes the gesture directed to the adjustable control: displaying, on the display device, a second representation of the first visual media with an respective amount of adjustment for the perspective distortion selected based on a magnitude of the gesture.

In accordance with some embodiments, an electronic device is described. The electronic device comprises: a display device; means for displaying, on the display device, a first user interface that includes concurrently displaying: a first representation of a first visual media; and an adjustable control that includes an indication of a current amount of adjustment for a perspective distortion of the first visual media; means, while displaying, on the display device, the first user interface, for detecting user input that includes a gesture directed to the adjustable control; an means, responsive to detecting the user input that includes the gesture directed to the adjustable control, for: displaying, on the display device, a second representation of the first visual media with an respective amount of adjustment for the perspective distortion selected based on a magnitude of the gesture.

In accordance with some embodiments, a method is described. The method is performed at an electronic device having a display device. The method comprises: displaying, via the display device, a media capture user interface that includes: displaying a representation of a field-of-view of the one or more cameras; and while a low-light camera mode is active, displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, a non-transitory computer-readable storage medium is described. A non-transitory computer-readable storage medium storing one or more programs configured to be executed by one or more processors of an electronic device with a display device, the one or more programs including instructions for: displaying, via the display device, a media capture user interface that includes: displaying a representation of a field-of-view of the one or more cameras; and while a low-light camera mode is active, displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, a transitory computer-readable storage medium is described. A non-transitory computer-readable storage medium storing one or more programs configured to be executed by one or more processors of an electronic device with a display device, the one or more programs including instructions for: displaying, via the display device, a media capture user interface that includes: displaying a representation of a field-of-view of the one or more cameras; and while a low-light camera mode is active, displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, an electronic device is described. The electronic device includes one or more processors; and memory storing one or more programs configured to be executed by the one or more processors, the one or more programs including instructions for: displaying, via the display device, a media capture user interface that includes: displaying a representation of a field-of-view of the one or more cameras; and while a low-light camera mode is active, displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, an electronic device is described. The electronic device includes: a display device; means for displaying, via the display device, a media capture user interface that includes: displaying a representation of a field-of-view of the one or more cameras; and means, while a low-light camera mode is active, for displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, a method is described. The method is performed at an electronic device having a display device and one or more cameras. The method comprises: displaying, via the display device, a media capture user interface that includes a representation of a field-of-view of the one or more cameras; while displaying, via the display device, the media capture user interface, receiving a request to capture media; in response to receiving the request to capture media, initiating capture, via the one or more cameras, of media; and at a first time after initiating capture, via the one or more cameras, of media: in accordance with a determination that a set of guidance criteria is satisfied, wherein the set of guidance criteria includes a criterion that is met when a low-light mode is active, displaying, via the display device, a visual indication of a difference between a pose of the electronic device when capture of the media was initiated and a pose of the electronic device at the first time after initiating capture of media.

In accordance with some embodiments, a non-transitory computer-readable storage medium is described. The non-transitory computer-readable storage medium stores one or more programs configured to be executed by one or more processors of an electronic device with a display device, the one or more programs including instructions for: displaying, via the display device, a media capture user interface that includes: displaying a representation of a field-of-view of the one or more cameras; and while a low-light camera mode is active, displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, a transitory computer-readable storage medium is described. The non-transitory computer-readable storage medium stores one or more programs configured to be executed by one or more processors of an electronic device with a display device, the one or more programs including instructions for: displaying, via the display device, a media capture user interface that includes: displaying a representation of a field-of-view of the one or more cameras; and while a low-light camera mode is active, displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, an electronic device is described. The electronic device includes: a display device; one or more processors; and memory storing one or more programs configured to be executed by the one or more processors, the one or more programs including instructions for: displaying, via the display device, a media capture user interface that includes: displaying a representation of a field-of-view of the one or more cameras; and while a low-light camera mode is active, displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, an electronic device is described. The electronic device includes: a display device; means for displaying, via the display device, a media capture user interface that includes: displaying a representation of a field-of-view of the one or more cameras; and means, while a low-light camera mode is active, for displaying a control for adjusting a capture duration for capturing media, where displaying the control includes: in accordance with a determination that a set of first capture duration criteria is satisfied: displaying an indication that the control is set to a first capture duration; and configuring the electronic device to capture a first plurality of images over the first capture duration responsive to a single request to capture an image corresponding to a field-of-view of the one or more cameras; and in accordance with a determination that a set of second capture duration criteria is satisfied, wherein the set of second capture criteria is different from the set of first capture duration criteria: displaying an indication that the control is set to a second capture duration that is greater than the first capture duration; and configuring the electronic device to capture a second plurality of images over the second capture duration responsive to the single request to capture the image corresponding to the field-of-view of the one or more cameras.

In accordance with some embodiments, a method is described. The method is performed at an electronic device having a display device and one or more cameras. The method comprises: displaying, via the display device, a camera user interface, the camera user interface including: a first region, the first region including a first representation of a first portion of a field-of-view of the one or more cameras; and a second region that is outside of the first region and is visually distinguished from the first region, including: in accordance with a determination that a set of first respective criteria is satisfied, wherein the set of first respective criteria includes a criterion that is satisfied when a first respective object in the field-of-view of the one or more cameras is a first distance from the one or more cameras, displaying, in the second region, a second portion of the field-of-view of the one or more cameras with a first visual appearance; and in accordance with a determination that a set of second respective criteria is satisfied, wherein the set of second respective criteria includes a criterion that is satisfied when the first respective object in the field-of-view of the one or more cameras is a second distance from the one or more cameras, forgoing displaying, in the second region, the second portion of the field-of-view of the one or more cameras with the first visual appearance.

In accordance with some embodiments, a non-transitory computer-readable storage medium is described. The non-transitory computer-readable storage medium stores one or more programs configured to be executed by one or more processors of an electronic device with a display device, the one or more programs including instructions for: displaying, via the display device, a camera user interface, the camera user interface including: a first region, the first region including a first representation of a first portion of a field-of-view of the one or more cameras; and a second region that is outside of the first region and is visually distinguished from the first region, including: in accordance with a determination that a set of first respective criteria is satisfied, wherein the set of first respective criteria includes a criterion that is satisfied when a first respective object in the field-of-view of the one or more cameras is a first distance from the one or more cameras, displaying, in the second region, a second portion of the field-of-view of the one or more cameras with a first visual appearance; and in accordance with a determination that a set of second respective criteria is satisfied, wherein the set of second respective criteria includes a criterion that is satisfied when the first respective object in the field-of-view of the one or more cameras is a second distance from the one or more cameras, forgoing displaying, in the second region, the second portion of the field-of-view of the one or more cameras with the first visual appearance.

In accordance with some embodiments, a transitory computer-readable storage medium is described. The non-transitory computer-readable storage medium stores one or more programs configured to be executed by one or more processors of an electronic device with a display device, the one or more programs including instructions for: displaying, via the display device, a camera user interface, the camera user interface including: a first region, the first region including a first representation of a first portion of a field-of-view of the one or more cameras; and a second region that is outside of the first region and is visually distinguished from the first region, including: in accordance with a determination that a set of first respective criteria is satisfied, wherein the set of first respective criteria includes a criterion that is satisfied when a first respective object in the field-of-view of the one or more cameras is a first distance from the one or more cameras, displaying, in the second region, a second portion of the field-of-view of the one or more cameras with a first visual appearance; and in accordance with a determination that a set of second respective criteria is satisfied, wherein the set of second respective criteria includes a criterion that is satisfied when the first respective object in the field-of-view of the one or more cameras is a second distance from the one or more cameras, forgoing displaying, in the second region, the second portion of the field-of-view of the one or more cameras with the first visual appearance.

In accordance with some embodiments, an electronic device is described. The electronic device includes: a display device; one or more processors; and memory storing one or more programs configured to be executed by the one or more processors, the one or more programs including instructions for: displaying, via the display device, a camera user interface, the camera user interface including: a first region, the first region including a first representation of a first portion of a field-of-view of the one or more cameras; and a second region that is outside of the first region and is visually distinguished from the first region, including: in accordance with a determination that a set of first respective criteria is satisfied, wherein the set of first respective criteria includes a criterion that is satisfied when a first respective object in the field-of-view of the one or more cameras is a first distance from the one or more cameras, displaying, in the second region, a second portion of the field-of-view of the one or more cameras with a first visual appearance; and in accordance with a determination that a set of second respective criteria is satisfied, wherein the set of second respective criteria includes a criterion that is satisfied when the first respective object in the field-of-view of the one or more cameras is a second distance from the one or more cameras, forgoing displaying, in the second region, the second portion of the field-of-view of the one or more cameras with the first visual appearance.

In accordance with some embodiments, an electronic device is described. The electronic device includes: a display device; one or more cameras; and means for displaying, via the display device, a camera user interface, the camera user interface including: a first region, the first region including a first representation of a first portion of a field-of-view of the one or more cameras; and a second region that is outside of the first region and is visually distinguished from the first region, including: in accordance with a determination that a set of first respective criteria is satisfied, where the set of first respective criteria includes a criterion that is satisfied when a first respective object in the field-of-view of the one or more cameras is a first distance from the one or more cameras, displaying, in the second region, a second portion of the field-of-view of the one or more cameras with a first visual appearance; and in accordance with a determination that a set of second respective criteria is satisfied, where the set of second respective criteria includes a criterion that is satisfied when the first respective object in the field-of-view of the one or more cameras is a second distance from the one or more cameras, forgoing displaying, in the second region, the second portion of the field-of-view of the one or more cameras with the first visual appearance.

In accordance with some embodiments, a method is described. The method is performed at an electronic device having a display device, a first camera that has a field-of-view and a second camera that has a wider field-of-view than the field-of-view of the first camera. The method comprises: displaying, via the display device, a camera user interface that includes a representation of at least a portion of a field-of-view of the one or more cameras displayed at a first zoom level, the camera user interface including: a first region, the first region including a representation of a first portion of the field-of-view of the first camera at the first zoom level; and a second region, the second region including a representation of a first portion of the field-of-view of the second camera at the first zoom level. The method also comprises while displaying, via the display device, the camera user interface that includes the representation of at least a portion of a field-of-view of the one or more cameras displayed at the first zoom level, receiving a first request to increase the zoom level of the representation of the portion of the field of view of the one or more cameras to a second zoom level; and in response to receiving the first request to increase the zoom level of the representation of the portion of the field of view of the one or more cameras to a second zoom level: displaying, in the first region, at the second zoom level, a representation of a second portion of the field-of-view of the first camera that excludes at least a subset of the first portion of the field-of-view of the first camera; and displaying, in the second region, at the second zoom level, a representation of a second portion of the field-of-view of the second camera that overlaps with the subset of the portion of the field-of-view of the first camera that was excluded from the second portion of the field-of-view of the first camera without displaying, in the second region, a representation of the subset of the portion of the field-of-view of the first camera that was excluded from the second portion of the field-of-view of the first camera.

In accordance with some embodiments, a non-transitory computer-readable storage medium is described. The non-transitory computer-readable storage medium stores one or more programs configured to be executed by one or more processors of an electronic device with a display device, a first camera that has a field-of-view, and a second camera that has a wider field-of-view than the field-of-view of the first camera, the one or more programs including instructions for: displaying, via the display device, a camera user interface that includes a representation of at least a portion of a field-of-view of the one or more cameras displayed at a first zoom level, the camera user interface including: a first region, the first region including a representation of a first portion of the field-of-view of the first camera at the first zoom level; and a second region, the second region including a representation of a first portion of the field-of-view of the second camera at the first zoom level. The non—transitory computer—readable storage medium also includes while displaying, via the display device, the camera user interface that includes the representation of at least a portion of a field-of-view of the one or more cameras displayed at the first zoom level, receiving a first request to increase the zoom level of the representation of the portion of the field of view of the one or more cameras to a second zoom level; and in response to receiving the first request to increase the zoom level of the representation of the portion of the field of view of the one or more cameras to a second zoom level: displaying, in the first region, at the second zoom level, a representation of a second portion of the field-of-view of the first camera that excludes at least a subset of the first portion of the field-of-view of the first camera; and displaying, in the second region, at the second zoom level, a representation of a second portion of the field-of-view of the second camera that overlaps with the subset of the portion of the field-of-view of the first camera that was excluded from the second portion of the field-of-view of the first camera without displaying, in the second region, a representation of the subset of the portion of the field-of-view of the first camera that was excluded from the second portion of the field-of-view of the first camera.

In accordance with some embodiments, a transitory computer-readable storage medium is described. The non-transitory computer-readable storage medium stores one or more programs configured to be executed by one or more processors of an electronic device with a display device, a first camera that has a field-of-view, and a second camera that has a wider field-of-view than the field-of-view of the first camera, the one or more programs including instructions for: displaying, via the display device, a camera user interface that includes a representation of at least a portion of a field-of-view of the one or more cameras displayed at a first zoom level, the camera user interface including: a first region, the first region including a representation of a first portion of the field-of-view of the first camera at the first zoom level; and a second region, the second region including a representation of a first portion of the field-of-view of the second camera at the first zoom level. The non—transitory computer—readable storage medium also includes while displaying, via the display device, the camera user interface that includes the representation of at least a portion of a field-of-view of the one or more cameras displayed at the first zoom level, receiving a first request to increase the zoom level of the representation of the portion of the field of view of the one or more cameras to a second zoom level; and in response to receiving the first request to increase the zoom level of the representation of the portion of the field of view of the one or more cameras to a second zoom level: displaying, in the first region, at the second zoom level, a representation of a second portion of the field-of-view of the first camera that excludes at least a subset of the first portion of the field-of-view of the first camera; and displaying, in the second region, at the second zoom level, a representation of a second portion of the field-of-view of the second camera that overlaps with the subset of the portion of the field-of-view of the first camera that was excluded from the second portion of the field-of-view of the first camera without displaying, in the second region, a representation of the subset of the portion of the field-of-view of the first camera that was excluded from the second portion of the field-of-view of the first camera.

In accordance with some embodiments, an electronic device is described. The electronic device includes: a display device; a first camera that has a field-of-view; and a second camera that has a wider field-of-view than the field-of-view of the first camera; one or more processors; and memory storing one or more programs configured to be executed by the one or more processors, the one or more programs including instructions for: displaying, via the display device, a camera user interface that includes a representation of at least a portion of a field-of-view of the one or more cameras displayed at a first zoom level, the camera user interface including: a first region, the first region including a representation of a first portion of the field-of-view of the first camera at the first zoom level; and a second region, the second region including a representation of a first portion of the field-of-view of the second camera at the first zoom level. The electronic device also includes while displaying, via the display device, the camera user interface that includes the representation of at least a portion of a field-of-view of the one or more cameras displayed at the first zoom level, receiving a first request to increase the zoom level of the representation of the portion of the field of view of the one or more cameras to a second zoom level; and in response to receiving the first request to increase the zoom level of the representation of the portion of the field of view of the one or more cameras to a second zoom level: displaying, in the first region, at the second zoom level, a representation of a second portion of the field-of-view of the first camera that excludes at least a subset of the first portion of the field-of-view of the first camera; and displaying, in the second region, at the second zoom level, a representation of a second portion of the field-of-view of the second camera that overlaps with the subset of the portion of the field-of-view of the first camera that was excluded from the second portion of the field-of-view of the first camera without displaying, in the second region, a representation of the subset of the portion of the field-of-view of the first camera that was excluded from the second portion of the field-of-view of the first camera.

In accordance with some embodiments, an electronic device is described. The electronic device includes: a display device; a first camera that has a field-of-view; a second camera that has a wider field-of-view than the field-of-view of the first camera; one or more cameras; means for displaying, via the display device, a camera user interface that includes a representation of at least a portion of a field-of-view of the one or more cameras displayed at a first zoom level, the camera user interface including: a first region, the first region including a representation of a first portion of the field-of-view of the first camera at the first zoom level; and a second region, the second region including a representation of a first portion of the field-of-view of the second camera at the first zoom level. The electronic device also includes means, while displaying, via the display device, the camera user interface that includes the representation of at least a portion of a field-of-view of the one or more cameras displayed at the first zoom level, for receiving a first request to increase the zoom level of the representation of the portion of the field of view of the one or more cameras to a second zoom level; and means, responsive to receiving the first request to increase the zoom level of the representation of the portion of the field of view of the one or more cameras to a second zoom level, for: displaying, in the first region, at the second zoom level, a representation of a second portion of the field-of-view of the first camera that excludes at least a subset of the first portion of the field-of-view of the first camera; and displaying, in the second region, at the second zoom level, a representation of a second portion of the field-of-view of the second camera that overlaps with the subset of the portion of the field-of-view of the first camera that was excluded from the second portion of the field-of-view of the first camera without displaying, in the second region, a representation of the subset of the portion of the field-of-view of the first camera that was excluded from the second portion of the field-of-view of the first camera.

In accordance with some embodiments, a method is described. The method is performed at: an electronic device having a display device and one or more cameras. The method comprises: displaying, via the display device, a camera user interface that includes a first representation of at least a portion of a field-of-view of the one or more cameras displayed at a first zoom level, the camera user interface including a plurality of zooming, the plurality of zoom affordances including a first zoom affordance and a second zoom affordance. The method also comprises while displaying the plurality of zooming affordances, receiving a first gesture directed to one of the plurality of affordances; and in response to receiving the first gesture: in accordance with a determination that the first gesture is a gesture directed to the first zoom affordance, displaying, at a second zoom level, a second representation of at least a portion of a field-of-view of the one or more cameras; and in accordance with a determination that the first gesture is a gesture directed to the second zoom affordance, displaying, at a third zoom level, a third representation of at least a portion of a field-of-view of the one or more cameras, where the third zoom level is different from the first zoom level and the second zoom level.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface that includes a first representation of at least a portion of a field-of-view of the one or more cameras displayed at a first zoom level, the camera user interface including a plurality of zooming, the plurality of zoom affordances including a first zoom affordance and a second zoom affordance; while displaying the plurality of zooming affordances, receiving a first gesture directed to one of the plurality of affordances; and in response to receiving the first gesture: in accordance with a determination that the first gesture is a gesture directed to the first zoom affordance, displaying, at a second zoom level, a second representation of at least a portion of a field-of-view of the one or more cameras; and in accordance with a determination that the first gesture is a gesture directed to the second zoom affordance, displaying, at a third zoom level, a third representation of at least a portion of a field-of-view of the one or more cameras, where the third zoom level is different from the first zoom level and the second zoom level.

In accordance with some embodiments, a transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface that includes a first representation of at least a portion of a field-of-view of the one or more cameras displayed at a first zoom level, the camera user interface including a plurality of zooming, the plurality of zoom affordances including a first zoom affordance and a second zoom affordance; while displaying the plurality of zooming affordances, receiving a first gesture directed to one of the plurality of affordances; and in response to receiving the first gesture: in accordance with a determination that the first gesture is a gesture directed to the first zoom affordance, displaying, at a second zoom level, a second representation of at least a portion of a field-of-view of the one or more cameras; and in accordance with a determination that the first gesture is a gesture directed to the second zoom affordance, displaying, at a third zoom level, a third representation of at least a portion of a field-of-view of the one or more cameras, where the third zoom level is different from the first zoom level and the second zoom level.

In accordance with some embodiments, an electronic device is described. The electronic device includes: a display device; one or more cameras; one or more processors; and memory storing one or more programs configured to be executed by the one or more processors, the one or more programs including instructions for: displaying, via the display device, a camera user interface that includes a first representation of at least a portion of a field-of-view of the one or more cameras displayed at a first zoom level, the camera user interface including a plurality of zooming, the plurality of zoom affordances including a first zoom affordance and a second zoom affordance; while displaying the plurality of zooming affordances, receiving a first gesture directed to one of the plurality of affordances; and in response to receiving the first gesture: in accordance with a determination that the first gesture is a gesture directed to the first zoom affordance, displaying, at a second zoom level, a second representation of at least a portion of a field-of-view of the one or more cameras; and in accordance with a determination that the first gesture is a gesture directed to the second zoom affordance, displaying, at a third zoom level, a third representation of at least a portion of a field-of-view of the one or more cameras, where the third zoom level is different from the first zoom level and the second zoom level.

In accordance with some embodiments, an electronic device is described. The electronic device includes: a display device; one or more cameras; and means for displaying, via the display device, a camera user interface that includes a first representation of at least a portion of a field-of-view of the one or more cameras displayed at a first zoom level, the camera user interface including a plurality of zooming, the plurality of zoom affordances including a first zoom affordance and a second zoom affordance; means while displaying the plurality of zooming affordances, for receiving a first gesture directed to one of the plurality of affordances; and means, responsive to receiving the first gesture, for: in accordance with a determination that the first gesture is a gesture directed to the first zoom affordance, displaying, at a second zoom level, a second representation of at least a portion of a field-of-view of the one or more cameras; and in accordance with a determination that the first gesture is a gesture directed to the second zoom affordance, displaying, at a third zoom level, a third representation of at least a portion of a field-of-view of the one or more cameras, where the third zoom level is different from the first zoom level and the second zoom level.

In accordance with some embodiments, a method is described. The method is performed at an electronic device having a display device and one or more cameras. The method comprises: displaying, via the display device, a camera user interface, the camera user interface including: a camera display region, the camera display region including a representation of a field-of-view of the one or more cameras; and a camera control region, the camera control region including a first plurality of camera mode affordances indicating different modes of operation of the one or more cameras at a first location. The method also comprises while displaying the first plurality of camera mode affordances indicating different modes of operation of the one or more cameras, detecting a first gesture directed toward the camera user interface; in response to detecting the first gesture directed toward the camera user interface: displaying a first set of camera setting affordances at the first location, where the first set of camera setting affordances are settings for adjusting image capture for a first camera mode; and ceasing to display the plurality of camera mode affordances indicating different modes of operation of the camera at the first location. The method also comprises while displaying the first set of camera setting affordances at the first location and while the electronic device is configured to capture media in the first camera mode, receiving a second gesture directed toward the camera user interface; and in response to receiving the second gesture directed toward the camera user interface: configuring the electronic device to capture media in a second camera mode that is different from the first camera mode, and displaying a second set of camera setting affordances at the first location without displaying the plurality of camera mode affordances indicating different modes of operation of the one or more cameras at the first location.

In accordance with some embodiments, a non-transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface, the camera user interface including: a camera display region, the camera display region including a representation of a field-of-view of the one or more cameras; and a camera control region, the camera control region including a first plurality of camera mode affordances indicating different modes of operation of the one or more cameras at a first location. The non—transitory computer—readable storage medium also includes while displaying the first plurality of camera mode affordances indicating different modes of operation of the one or more cameras, detecting a first gesture directed toward the camera user interface; in response to detecting the first gesture directed toward the camera user interface: displaying a first set of camera setting affordances at the first location, where the first set of camera setting affordances are settings for adjusting image capture for a first camera mode; and ceasing to display the plurality of camera mode affordances indicating different modes of operation of the camera at the first location. The non—transitory computer—readable storage medium also includes while displaying the first set of camera setting affordances at the first location and while the electronic device is configured to capture media in the first camera mode, receiving a second gesture directed toward the camera user interface; and in response to receiving the second gesture directed toward the camera user interface: configuring the electronic device to capture media in a second camera mode that is different from the first camera mode, and displaying a second set of camera setting affordances at the first location without displaying the plurality of camera mode affordances indicating different modes of operation of the one or more cameras at the first location.

In accordance with some embodiments, a transitory computer-readable storage medium is described. The non-transitory computer-readable storage medium stores one or more programs configured to be executed by one or more processors of an electronic device with a display device and one or more cameras, the one or more programs including instructions for: displaying, via the display device, a camera user interface, the camera user interface including: a camera display region, the camera display region including a representation of a field-of-view of the one or more cameras; and a camera control region, the camera control region including a first plurality of camera mode affordances indicating different modes of operation of the one or more cameras at a first location. The non—transitory computer—readable storage medium also includes while displaying the first plurality of camera mode affordances indicating different modes of operation of the one or more cameras, detecting a first gesture directed toward the camera user interface; in response to detecting the first gesture directed toward the camera user interface: displaying a first set of camera setting affordances at the first location, where the first set of camera setting affordances are settings for adjusting image capture for a first camera mode; and ceasing to display the plurality of camera mode affordances indicating different modes of operation of the camera at the first location. The non—transitory computer—readable storage medium also includes while displaying the first set of camera setting affordances at the first location and while the electronic device is configured to capture media in the first camera mode, receiving a second gesture directed toward the camera user interface; and in response to receiving the second gesture directed toward the camera user interface: configuring the electronic device to capture media in a second camera mode that is different from the first camera mode, and displaying a second set of camera setting affordances at the first location without displaying the plurality of camera mode affordances indicating different modes of operation of the one or more cameras at the first location.

In accordance with some embodiments, an electronic device is described. The electronic device includes: a display device; one or more cameras; one or more processors; and memory storing one or more programs configured to be executed by the one or more processors, the one or more programs including instructions for: displaying, via the display device, a camera user interface, the camera user interface including: a camera display region, the camera display region including a representation of a field-of-view of the one or more cameras; and a camera control region, the camera control region including a first plurality of camera mode affordances indicating different modes of operation of the one or more cameras at a first location. The electronic device also includes while displaying the first plurality of camera mode affordances indicating different modes of operation of the one or more cameras, detecting a first gesture directed toward the camera user interface; in response to detecting the first gesture directed toward the camera user interface: displaying a first set of camera setting affordances at the first location, where the first set of camera setting affordances are settings for adjusting image capture for a first camera mode; and ceasing to display the plurality of camera mode affordances indicating different modes of operation of the camera at the first location. The electronic device also includes while displaying the first set of camera setting affordances at the first location and while the electronic device is configured to capture media in the first camera mode, receiving a second gesture directed toward the camera user interface; and in response to receiving the second gesture directed toward the camera user interface: configuring the electronic device to capture media in a second camera mode that is different from the first camera mode, and displaying a second set of camera setting affordances at the first location without displaying the plurality of camera mode affordances indicating different modes of operation of the one or more cameras at the first location.

In accordance with some embodiments, an electronic device is described. The electronic device includes: a display device; one or more cameras; means for displaying, via the display device, a camera user interface, the camera user interface including: a camera display region, the camera display region including a representation of a field-of-view of the one or more cameras; and a camera control region, the camera control region including a first plurality of camera mode affordances indicating different modes of operation of the one or more cameras at a first location. The electronic device also includes means, while displaying the first plurality of camera mode affordances indicating different modes of operation of the one or more cameras, for detecting a first gesture directed toward the camera user interface; and means, responsive to detecting the first gesture directed toward the camera user interface, for: displaying a first set of camera setting affordances at the first location, where the first set of camera setting affordances are settings for adjusting image capture for a first camera mode; and ceasing to display the plurality of camera mode affordances indicating different modes of operation of the camera at the first location. The electronic device also includes means, while displaying the first set of camera setting affordances at the first location and while the electronic device is configured to capture media in the first camera mode, for receiving a second gesture directed toward the camera user interface; and means, responsive to receiving the second gesture directed toward the camera user interface, for: configuring the electronic device to capture media in a second camera mode that is different from the first camera mode; and displaying a second set of camera setting affordances at the first location without displaying the plurality of camera mode affordances indicating different modes of operation of the one or more cameras at the first location.

In accordance with some embodiments, a method is described. The method is performed at an electronic device with a display device. The method comprises receiving a request to display a representation of a previously captured media item that includes first content from a first portion of a field-of-view of one or more cameras and second content from a second portion of the field-of-view of the one or more cameras; and in response to receiving the request to display the representation of the previously captured media item: in accordance with a determination that automatic media correction criteria are satisfied, displaying, via the display device, a representation of the previously captured media item that includes a combination of the first content and the second content; and in accordance with a determination that automatic media correction criteria are not satisfied, displaying, via the display device, a representation of the previously captured media item that includes the first content and does not include the second content.

In accordance with some embodiments, a non-transitory computer-readable storage medium is described. The non-transitory computer-readable storage medium stores one or more programs configured to be executed by one or more processors of an electronic device with a display device, the one or more programs including instructions for: receiving a request to display a representation of a previously captured media item that includes first content from a first portion of a field-of-view of one or more cameras and second content from a second portion of the field-of-view of the one or more cameras; and in response to receiving the request to display the representation of the previously captured media item: in accordance with a determination that automatic media correction criteria are satisfied, displaying, via the display device, a representation of the previously captured media item that includes a combination of the first content and the second content; and in accordance with a determination that automatic media correction criteria are not satisfied, displaying, via the display device, a representation of the previously captured media item that includes the first content and does not include the second content.

In accordance with some embodiments, a transitory computer-readable storage medium is described. The non-transitory computer-readable storage medium stores one or more programs configured to be executed by one or more processors of an electronic device with a display device, the one or more programs including instructions for: receiving a request to display a representation of a previously captured media item that includes first content from a first portion of a field-of-view of one or more cameras and second content from a second portion of the field-of-view of the one or more cameras; and in response to receiving the request to display the representation of the previously captured media item: in accordance with a determination that automatic media correction criteria are satisfied, displaying, via the display device, a representation of the previously captured media item that includes a combination of the first content and the second content; and in accordance with a determination that automatic media correction criteria are not satisfied, displaying, via the display device, a representation of the previously captured media item that includes the first content and does not include the second content.

In accordance with some embodiments, an electronic device is described. The electronic device includes: a display device; one or more processors; and memory storing one or more programs configured to be executed by the one or more processors, the one or more programs including instructions for: receiving a request to display a representation of a previously captured media item that includes first content from a first portion of a field-of-view of one or more cameras and second content from a second portion of the field-of-view of the one or more cameras; and in response to receiving the request to display the representation of the previously captured media item: in accordance with a determination that automatic media correction criteria are satisfied, displaying, via the display device, a representation of the previously captured media item that includes a combination of the first content and the second content; and in accordance with a determination that automatic media correction criteria are not satisfied, displaying, via the display device, a representation of the previously captured media item that includes the first content and does not include the second content.

In accordance with some embodiments, an electronic device is described. The electronic device includes: a display device; means for receiving a request to display a representation of a previously captured media item that includes first content from a first portion of a field-of-view of one or more cameras and second content from a second portion of the field-of-view of the one or more cameras; and means, responsive to receiving the request to display the representation of the previously captured media item, for: in accordance with a determination that automatic media correction criteria are satisfied, displaying, via the display device, a representation of the previously captured media item that includes a combination of the first content and the second content; and in accordance with a determination that automatic media correction criteria are not satisfied, displaying, via the display device, a representation of the previously captured media item that includes the first content and does not include the second content.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for capturing and managing media, thereby increasing the effectiveness, efficiency, and user satisfaction with such devices. Such methods and interfaces may complement or replace other methods for capturing and managing media.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 7A-7C are a flow diagram illustrating a method for accessing media controls using an electronic device in accordance with some embodiments.

FIGS. 9A-9C are a flow diagram illustrating a method for displaying media controls using an electronic device in accordance with some embodiments.

FIGS. 11A-11C are a flow diagram illustrating a method for displaying a camera field-of-view using an electronic device in accordance with some embodiments.

FIGS. 13A-13B are a flow diagram illustrating a method for accessing media items using an electronic device in accordance with some embodiments.

FIGS. 15A-15C are a flow diagram illustrating a method for modifying media items using an electronic device in accordance with some embodiments.

FIGS. 17A-17B are a flow diagram illustrating a method for varying zoom levels using an electronic device in accordance with some embodiments.

FIGS. 19A-19B are a flow diagram illustrating a method for varying frame rates using an electronic device in accordance with some embodiments.

FIGS. 20A-20C are a flow diagram illustrating a method for accommodating light conditions using an electronic device in accordance with some embodiments.

FIGS. 21A-21C are a flow diagram illustrating a method for providing camera indications using an electronic device in accordance with some embodiments.

FIGS. 23A-23B are a flow diagram illustrating a method for editing captured media using an electronic device in accordance with some embodiments.

FIGS. 25A-25B are a flow diagram illustrating a method for editing captured media using an electronic device in accordance with some embodiments.

FIGS. 28A-28B are a flow diagram illustrating a method for providing guidance while capturing media.

FIGS. 30A-30C are a flow diagram illustrating a method for managing the capture of media controlled by using an electronic device with multiple cameras in accordance with some embodiments.

FIGS. 32A-32C are a flow diagram illustrating a method for displaying a camera user interface at various zoom level using different cameras of an electronic device in accordance with some embodiments.

FIGS. 34A-34B are a flow diagram illustrating a method for varying zoom levels using an electronic device in accordance with some embodiments.

FIGS. 36A-36B are a flow diagram illustrating a method for accessing media capture controls using an electronic device in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for capturing and managing media. Such techniques can reduce the cognitive burden on a user who manage media, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing event notifications.

Figure 6A:
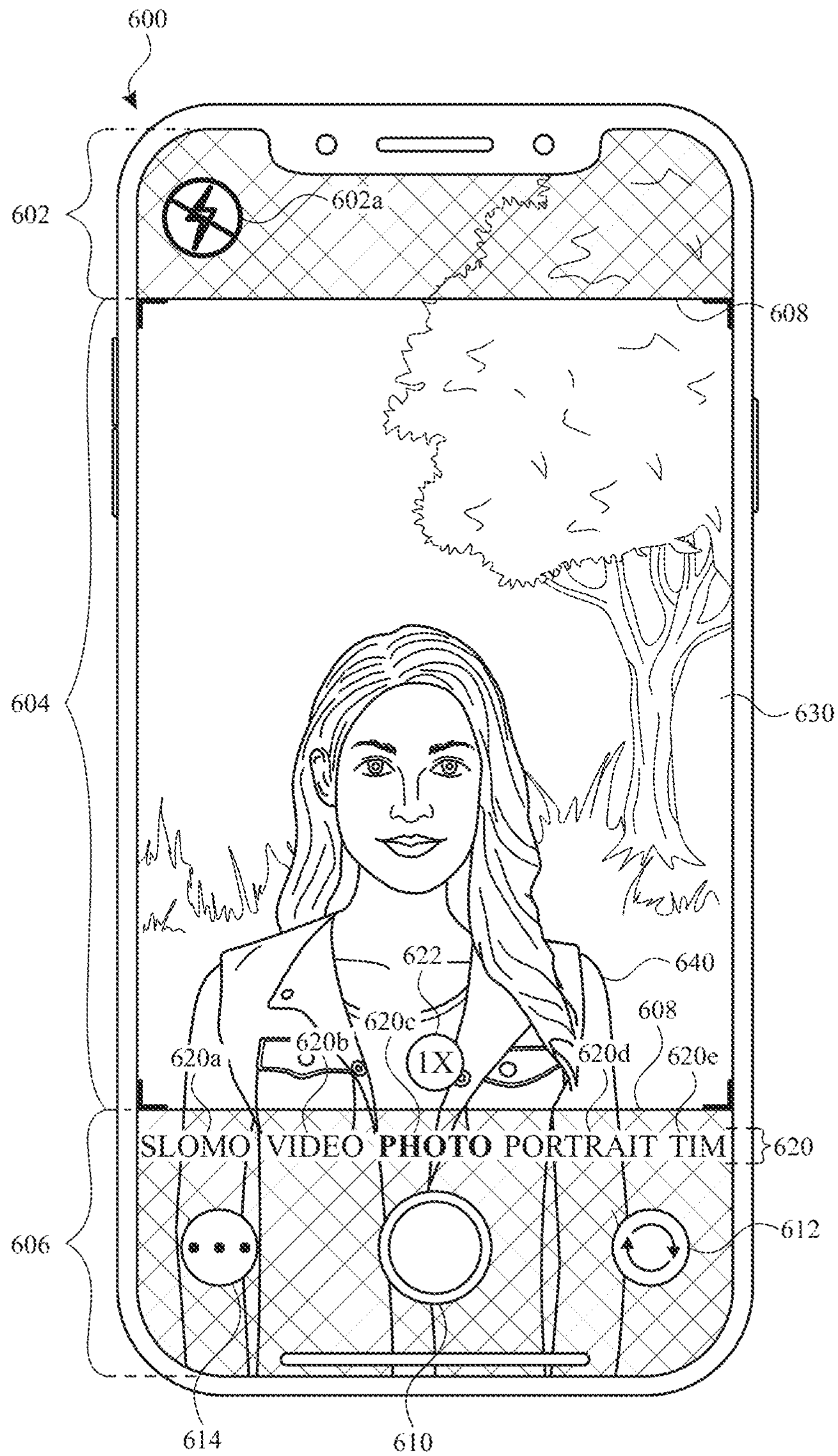
FIGS. 6A-6V illustrate exemplary techniques and user interfaces for accessing media controls using an electronic device in accordance with some embodiments.
Figure 6B:
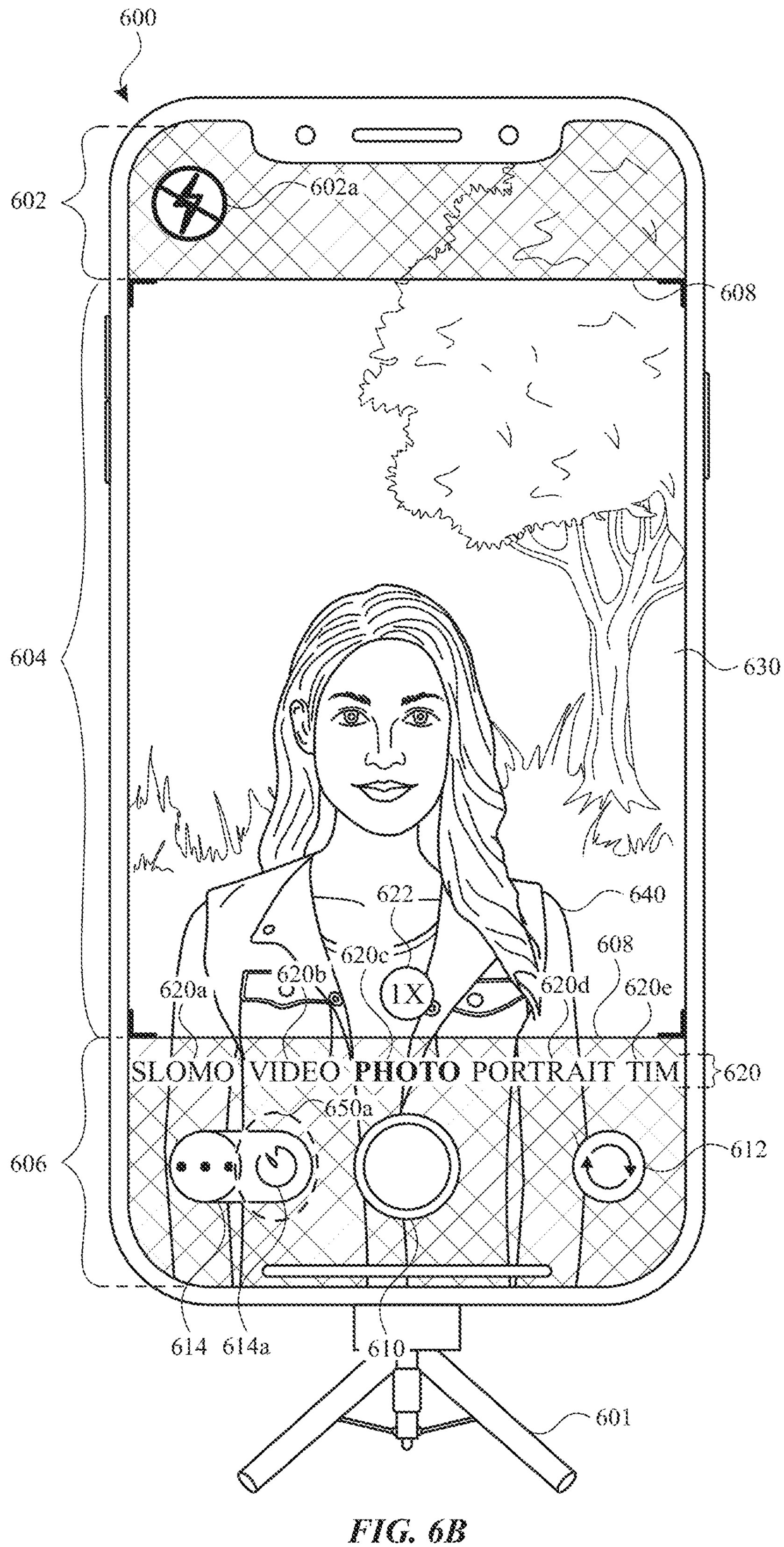
Figure 6C:
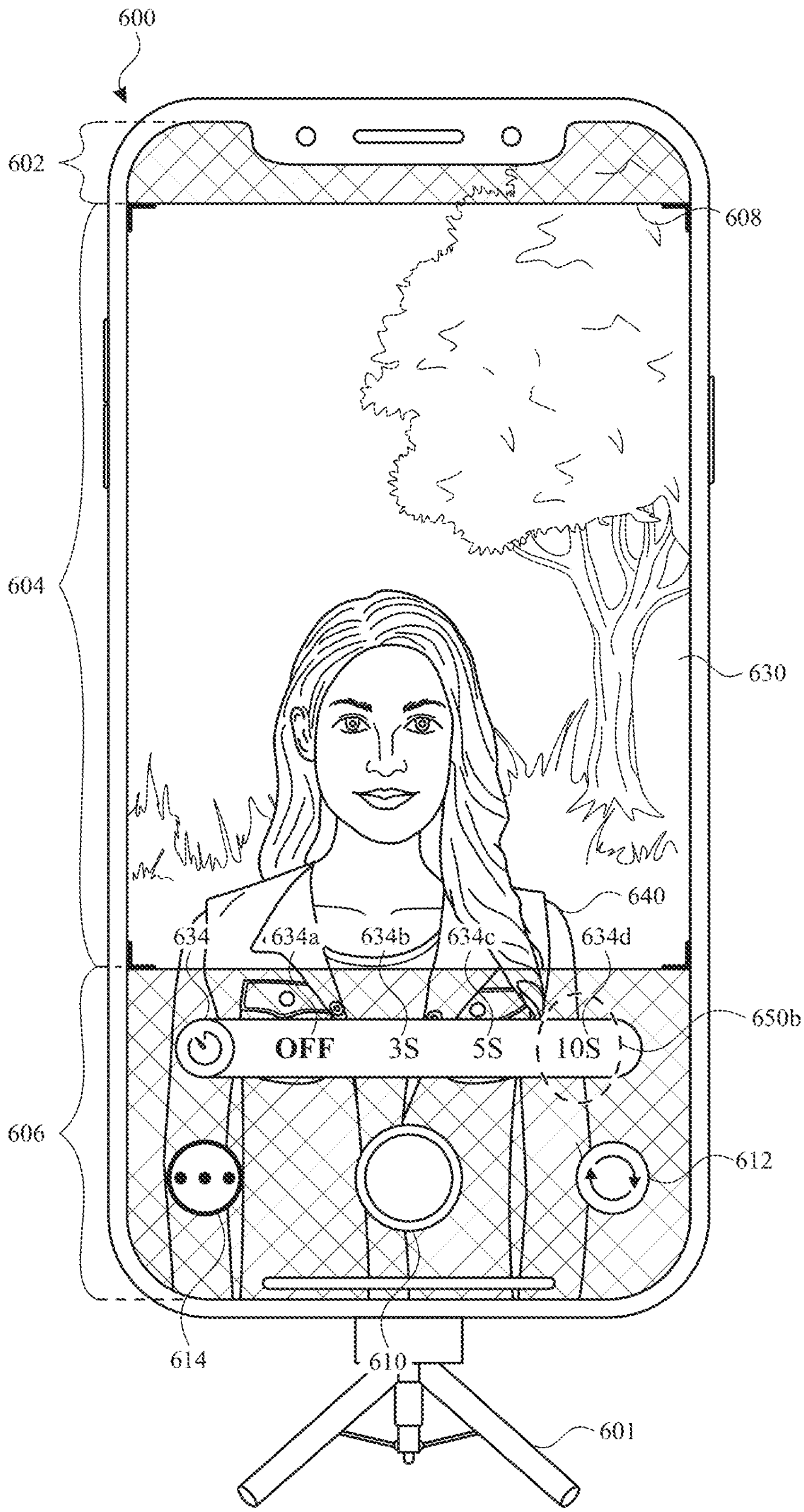
Figure 6D:
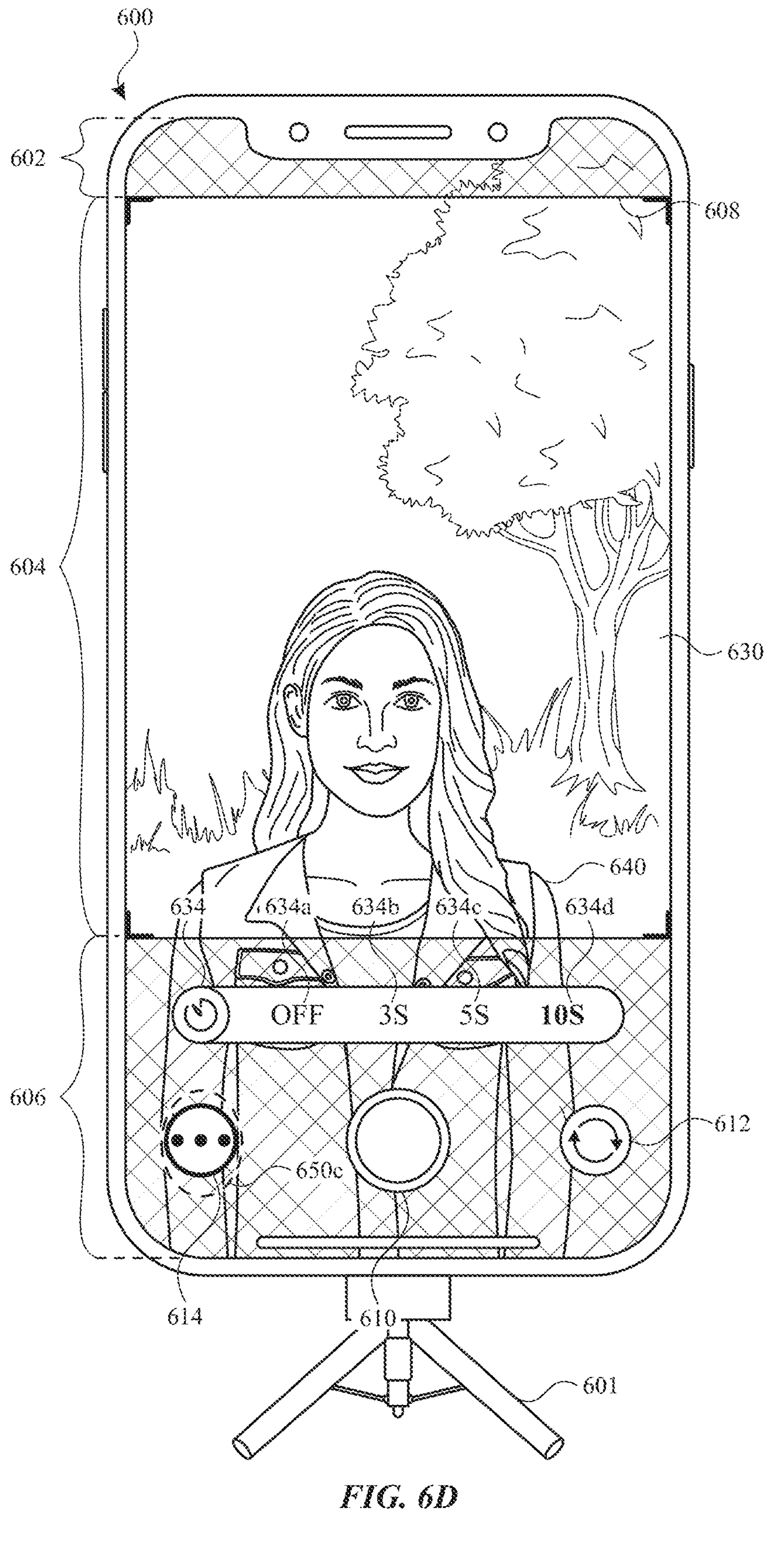
Figure 6E:
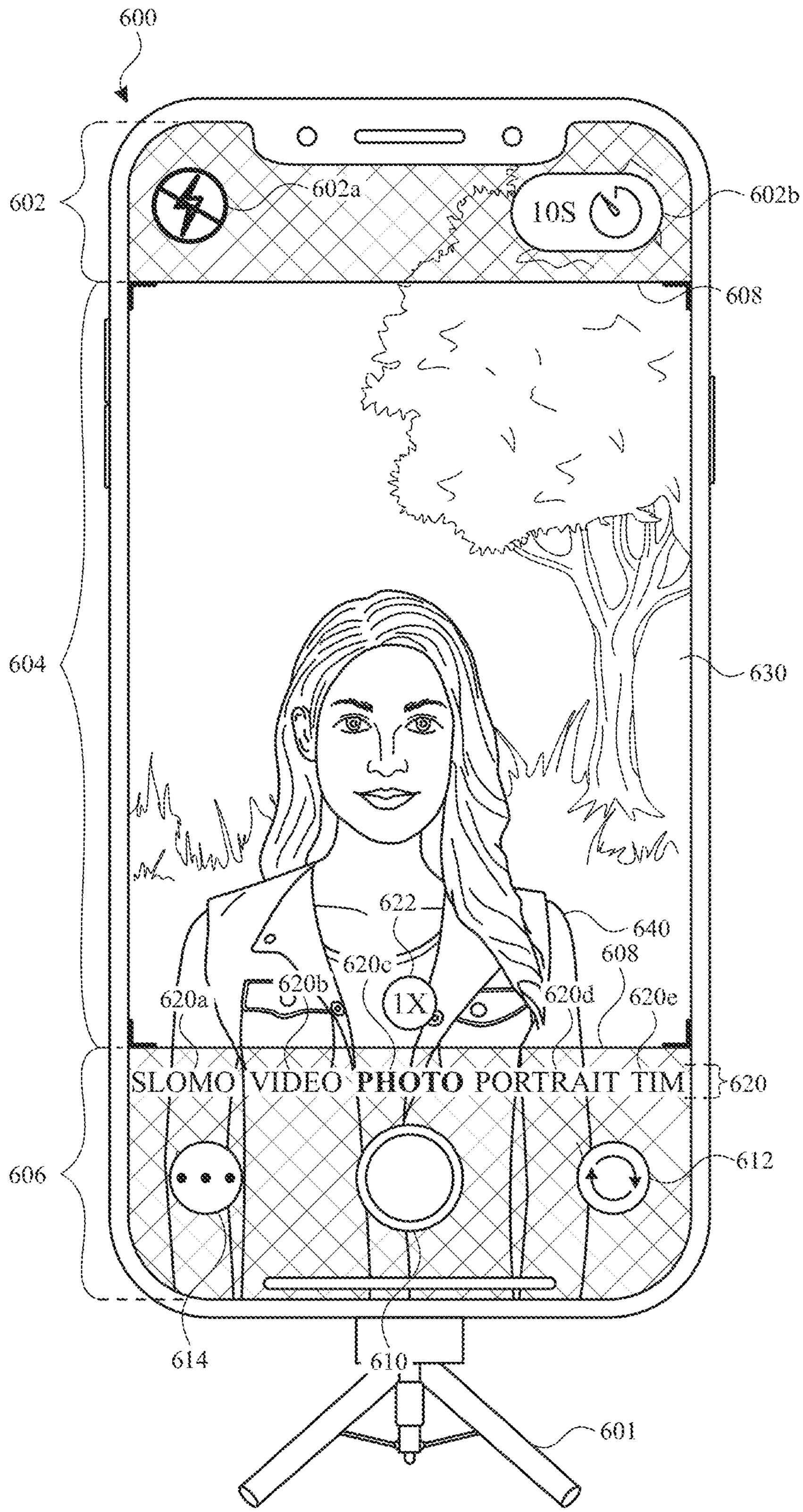
Figure 6F:
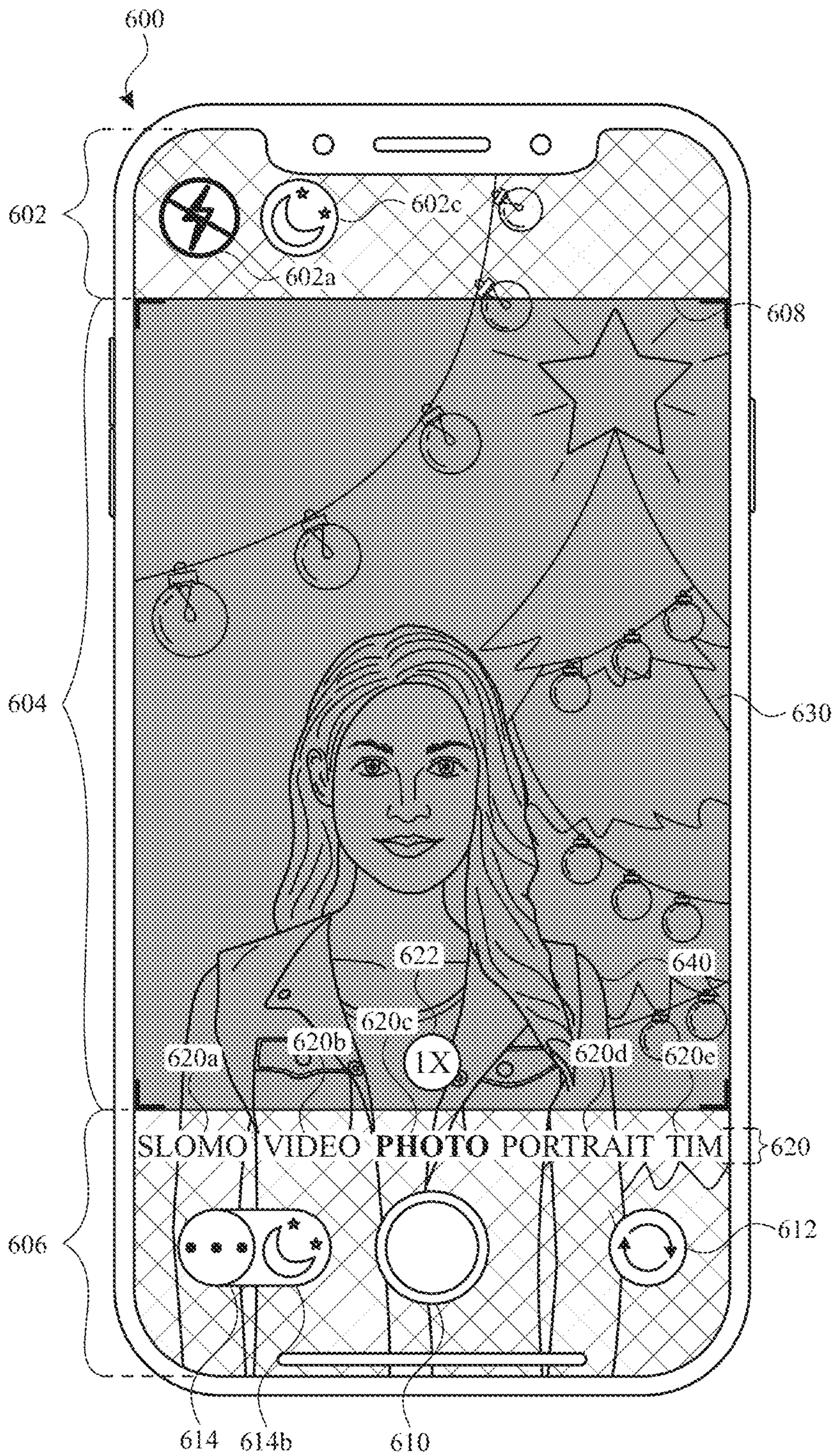
Figure 6G:
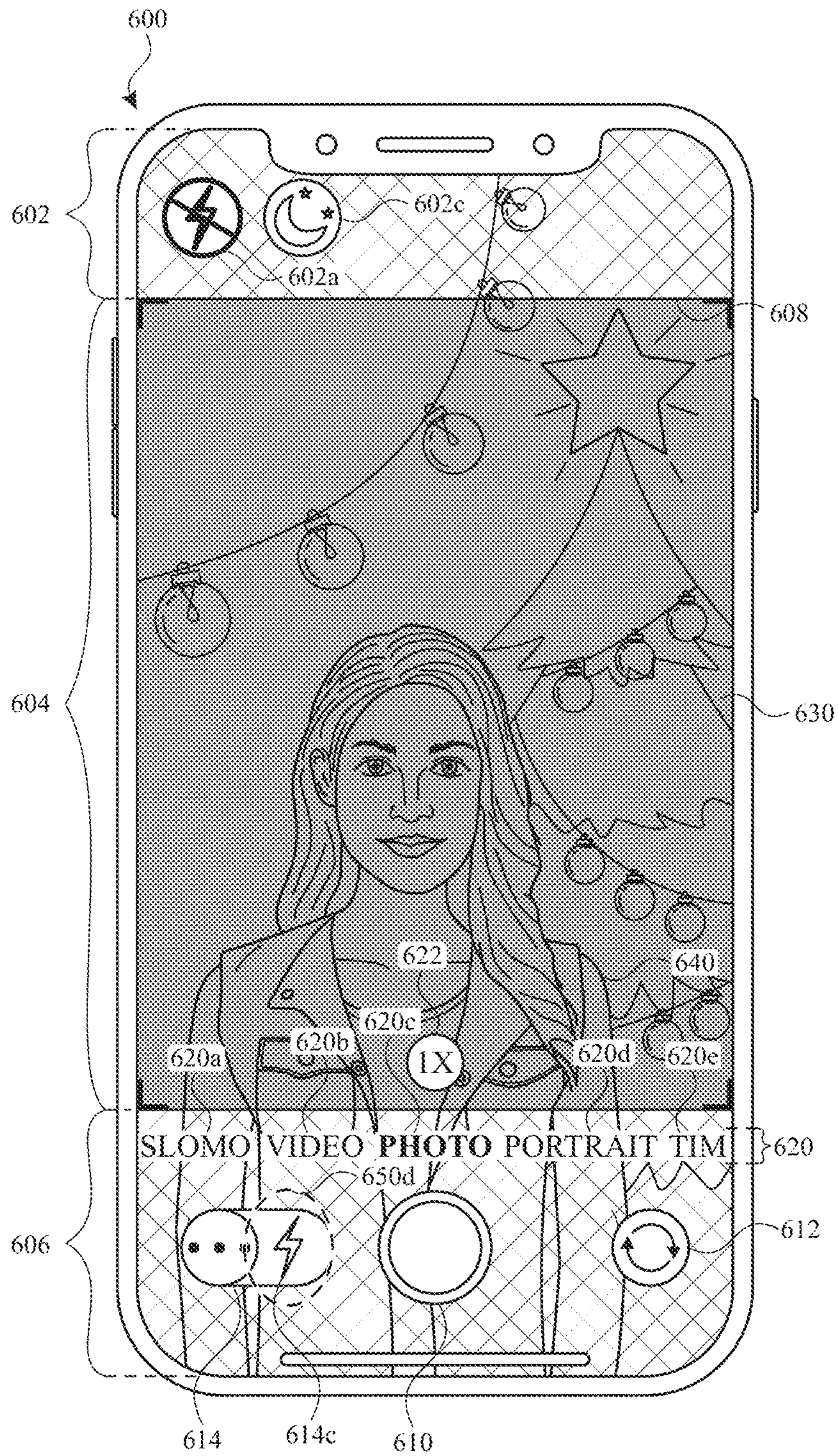
Figure 6H:
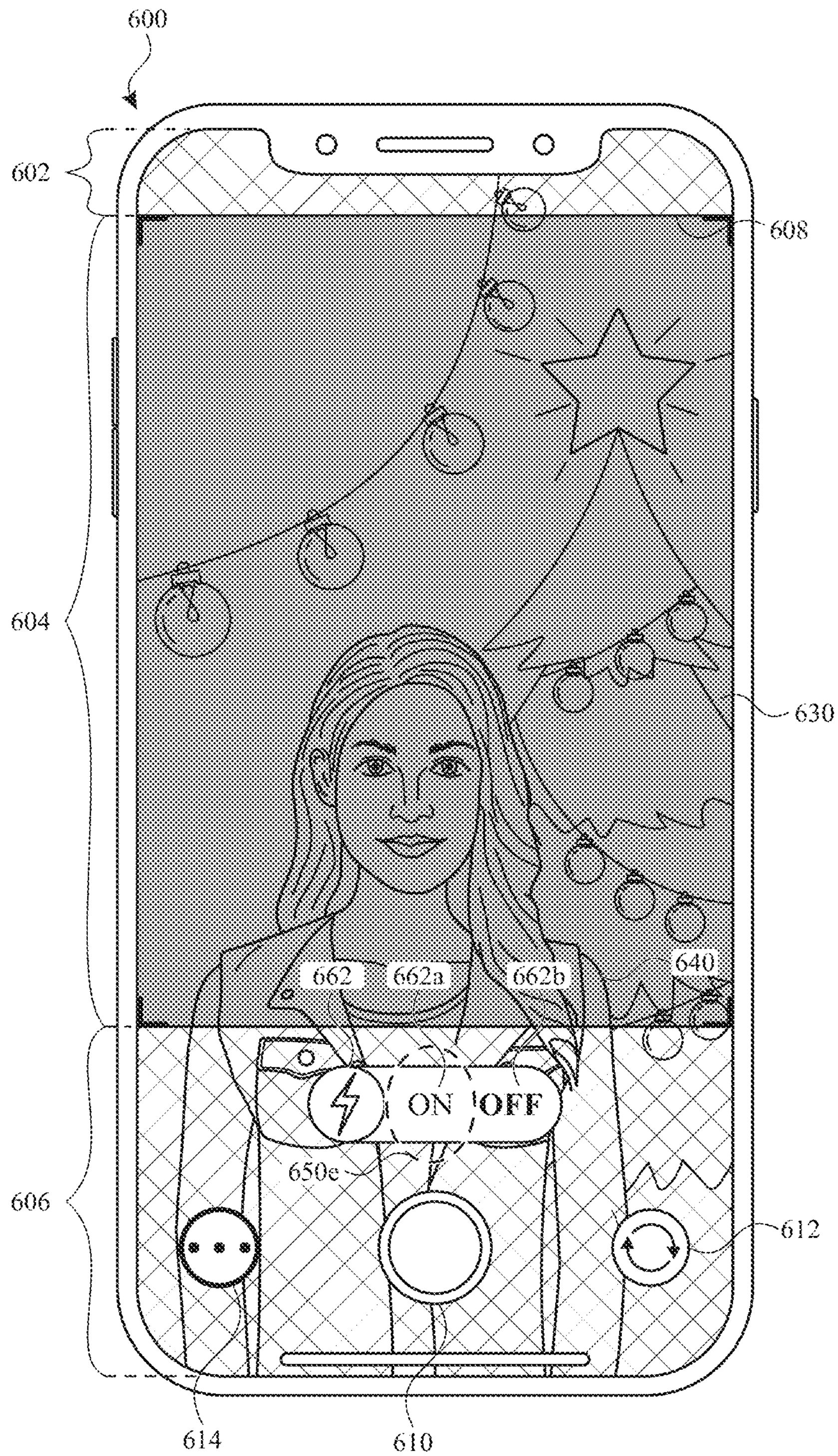
Figure 6I:
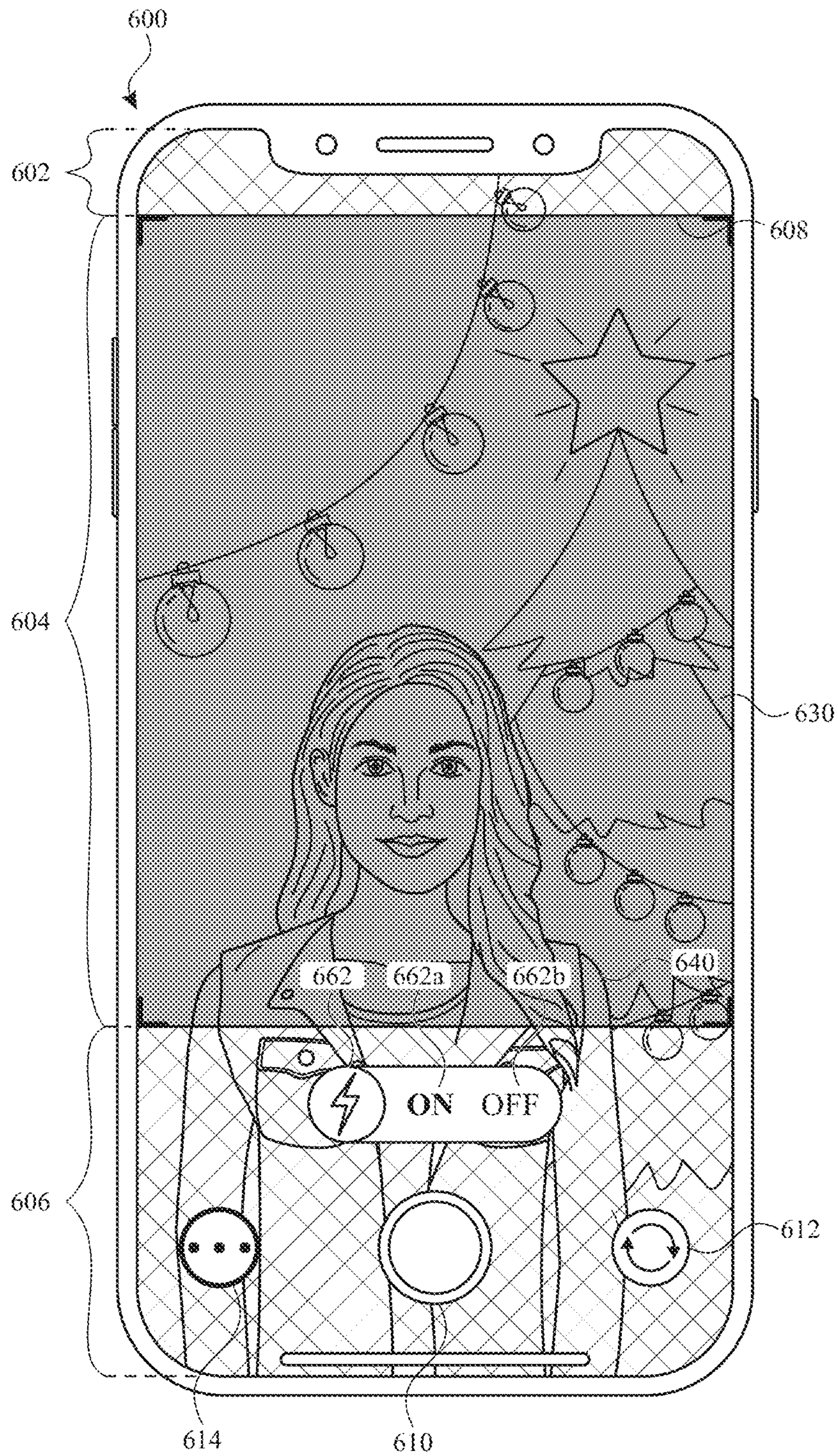
Figure 6J:
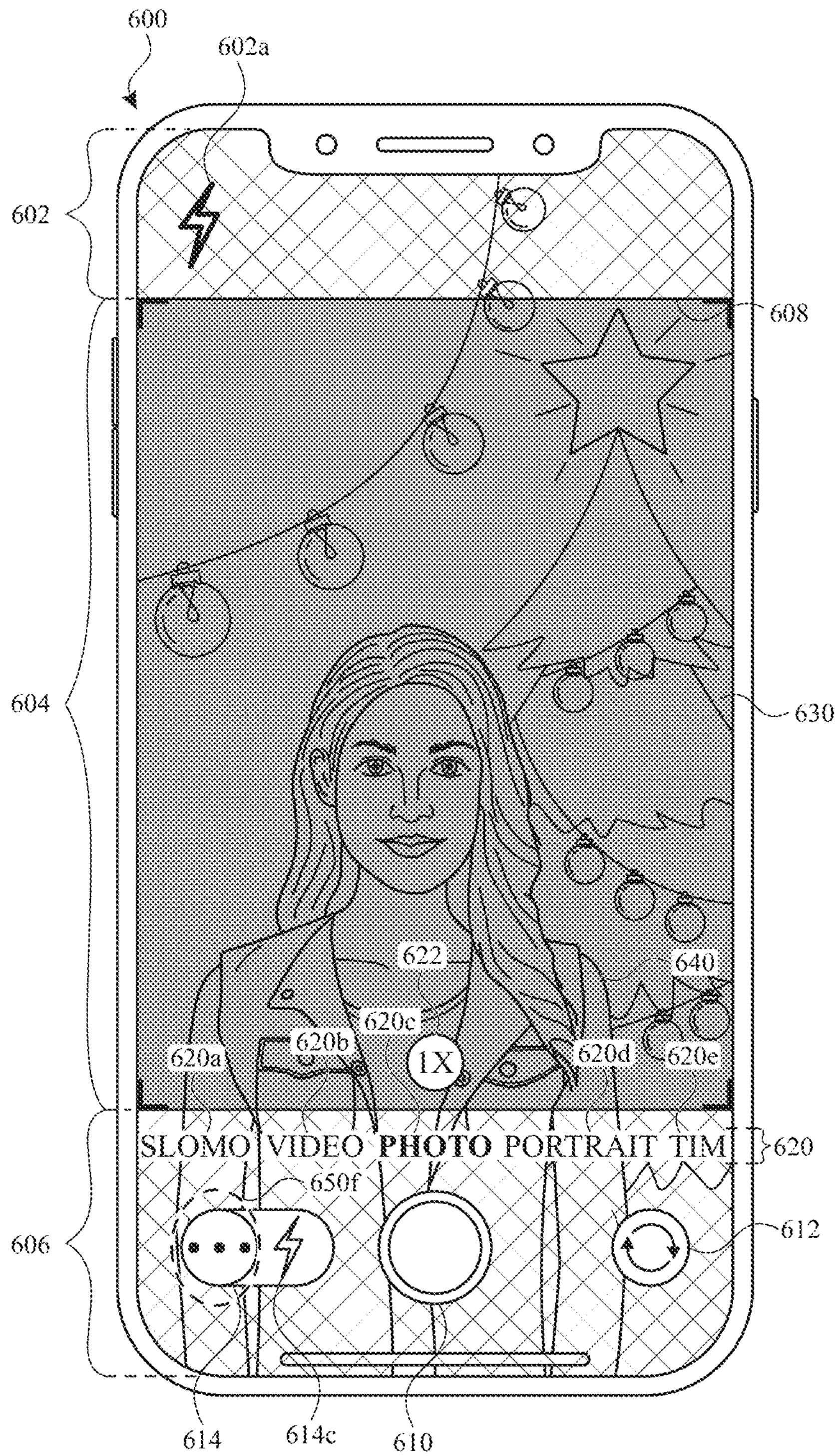
Figure 6K:
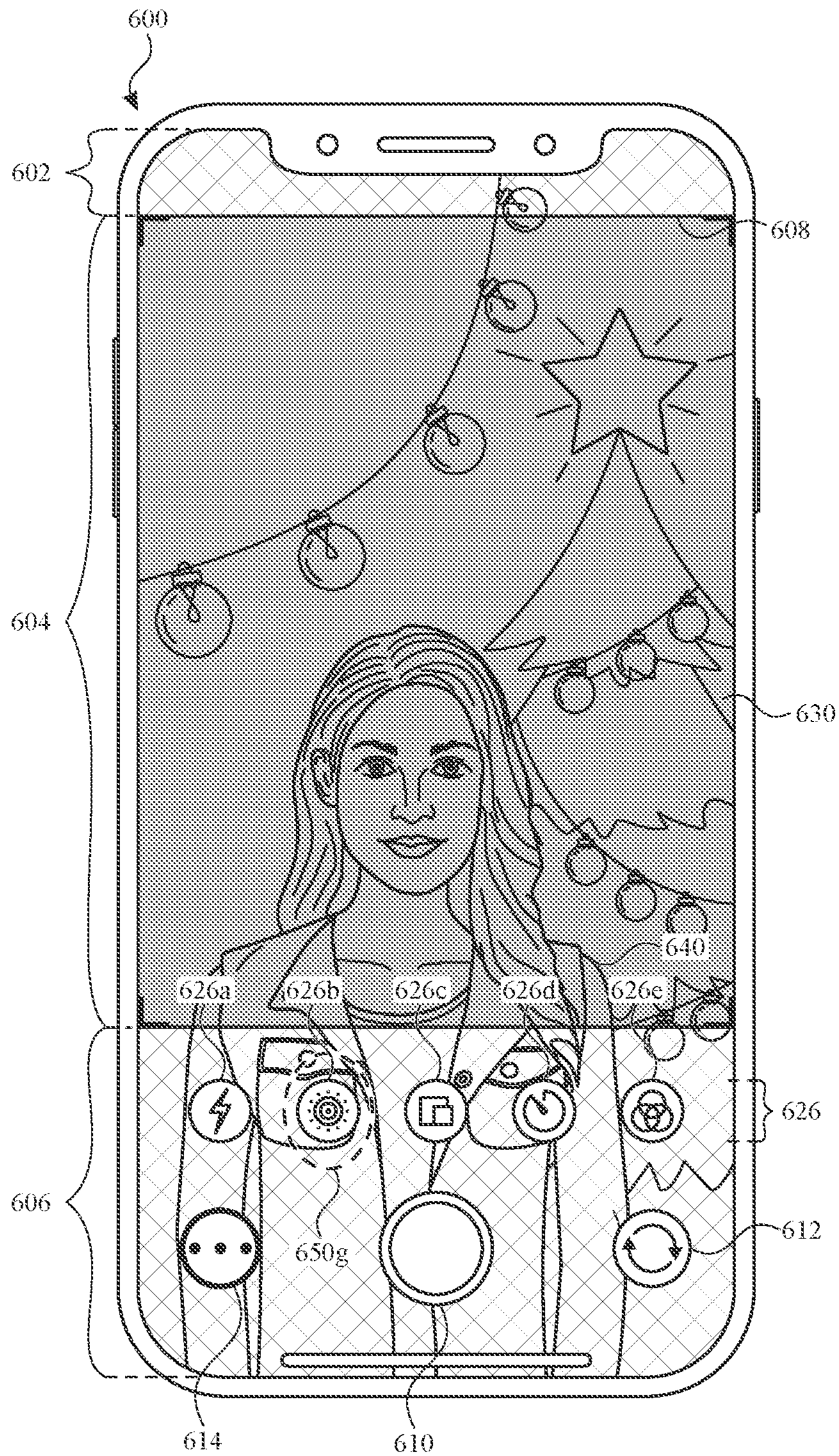
Figure 6L:
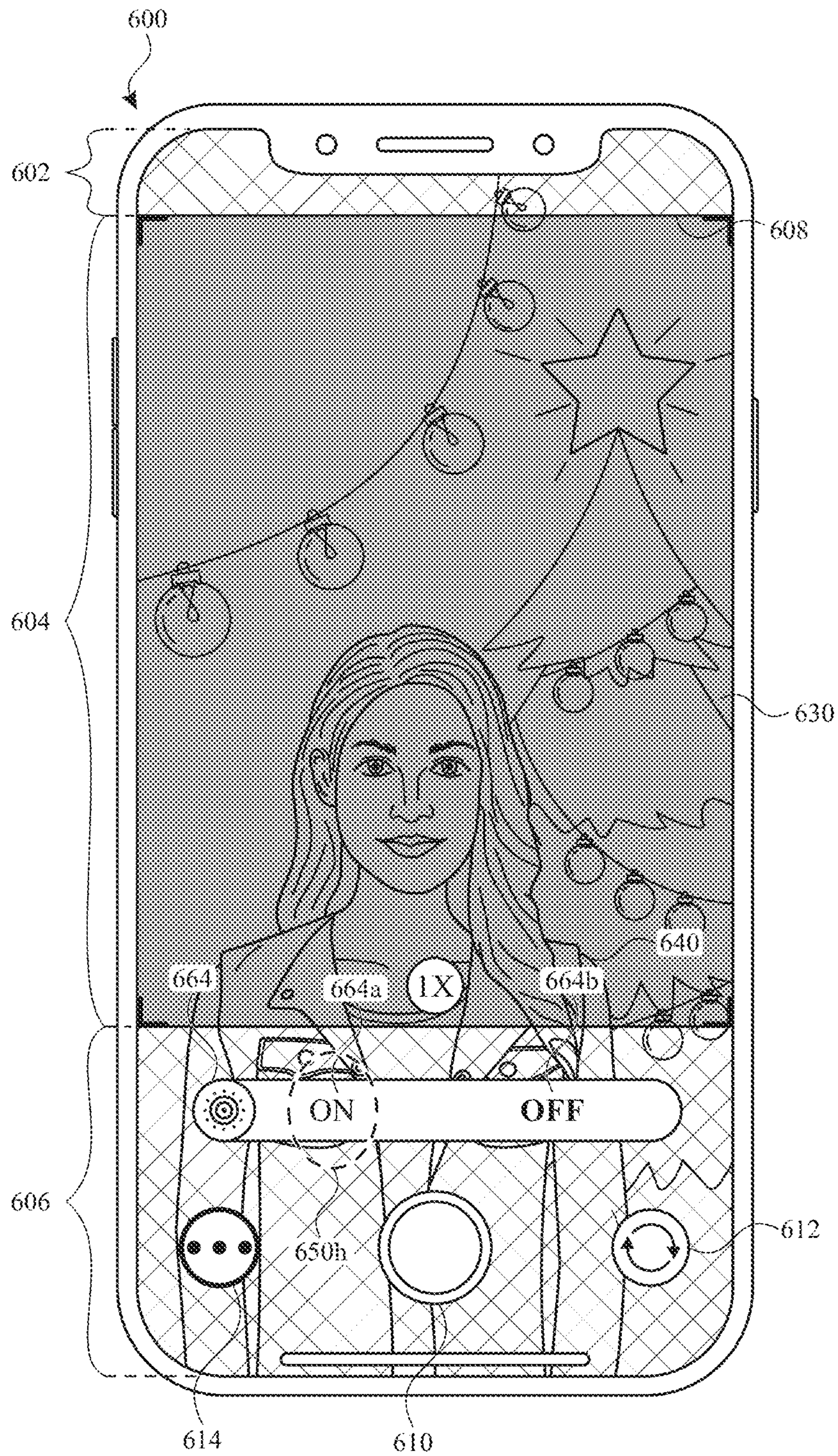
Figure 6M:
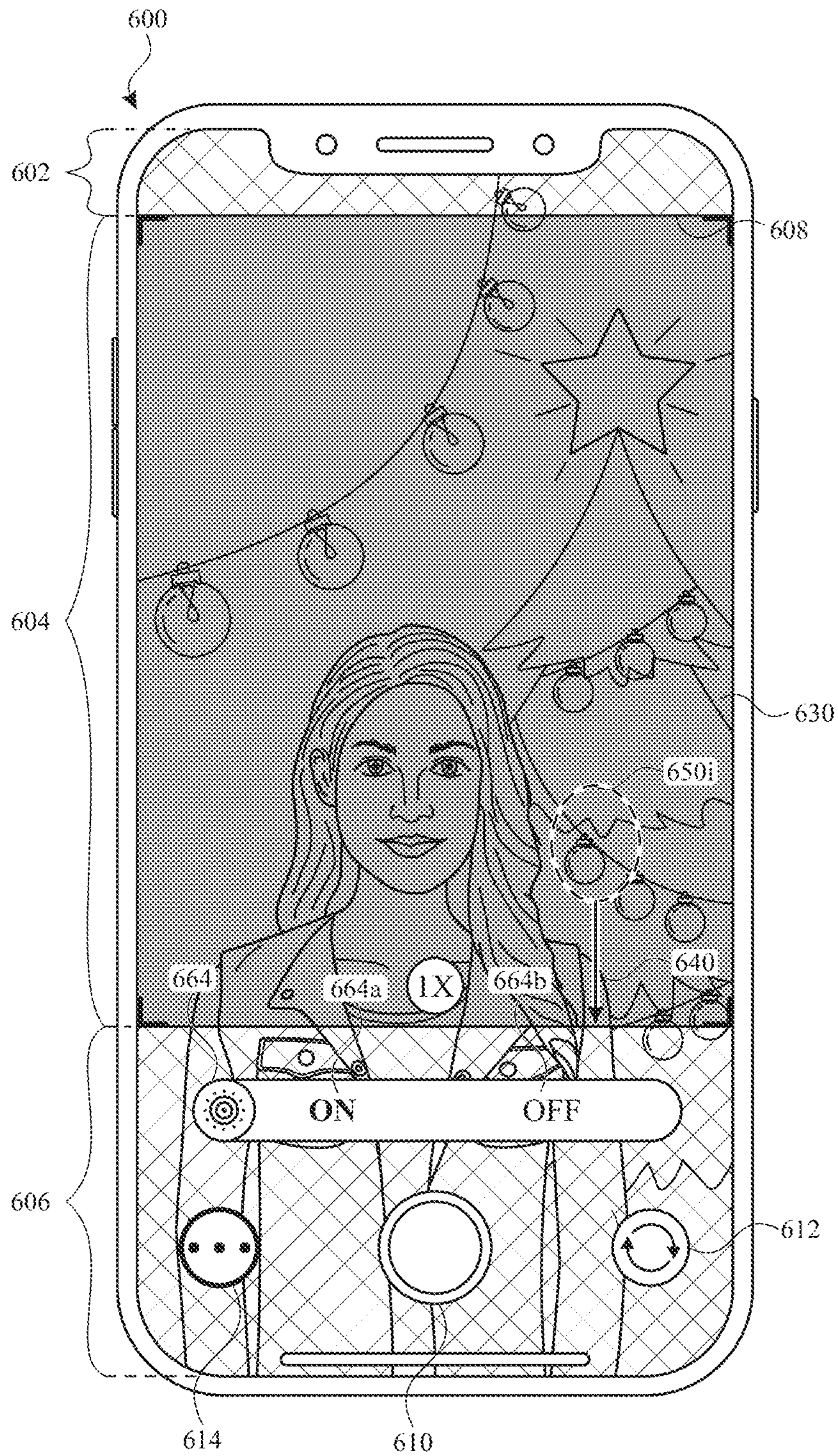
Figure 6N:
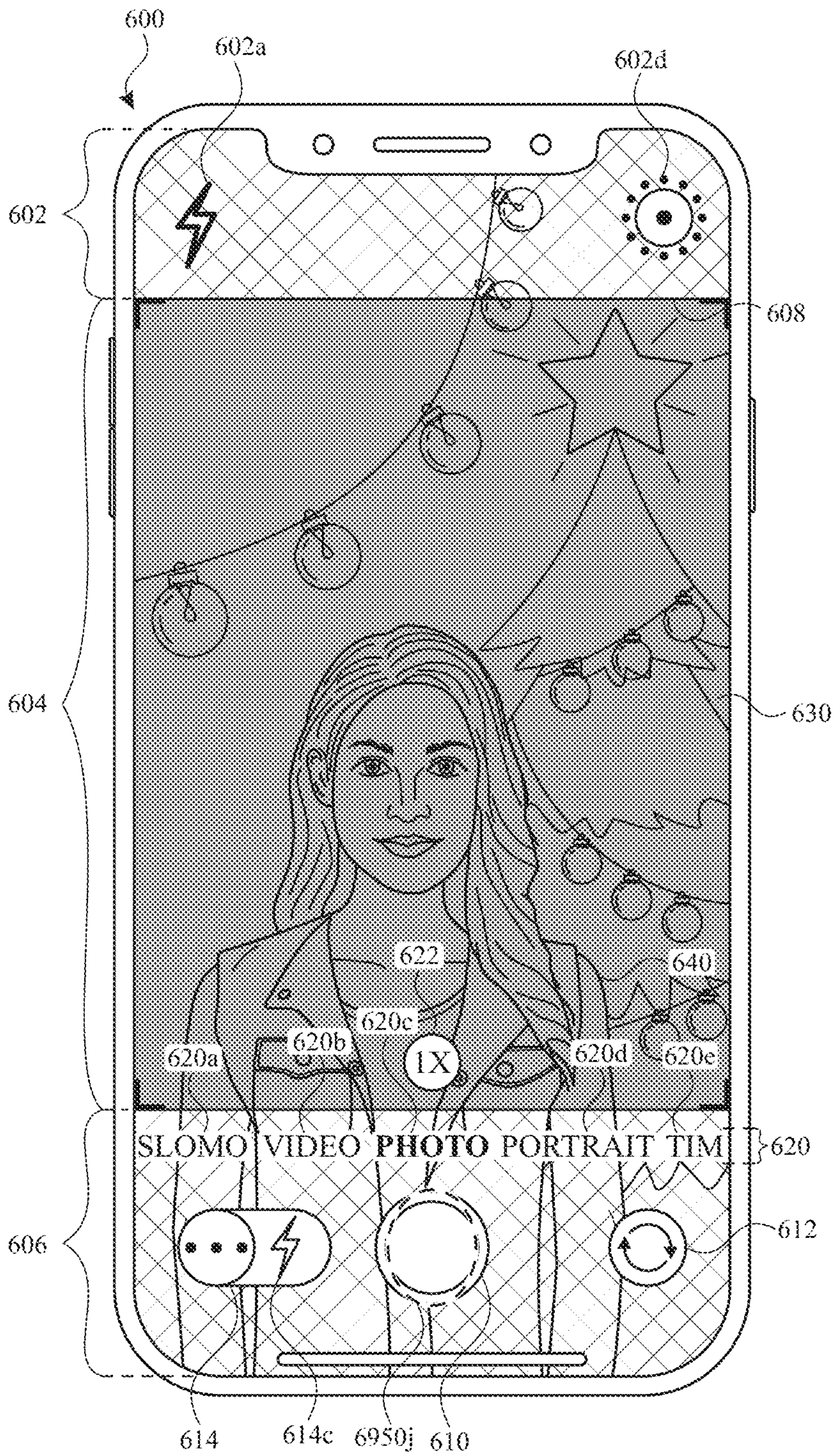
Figure 6O:
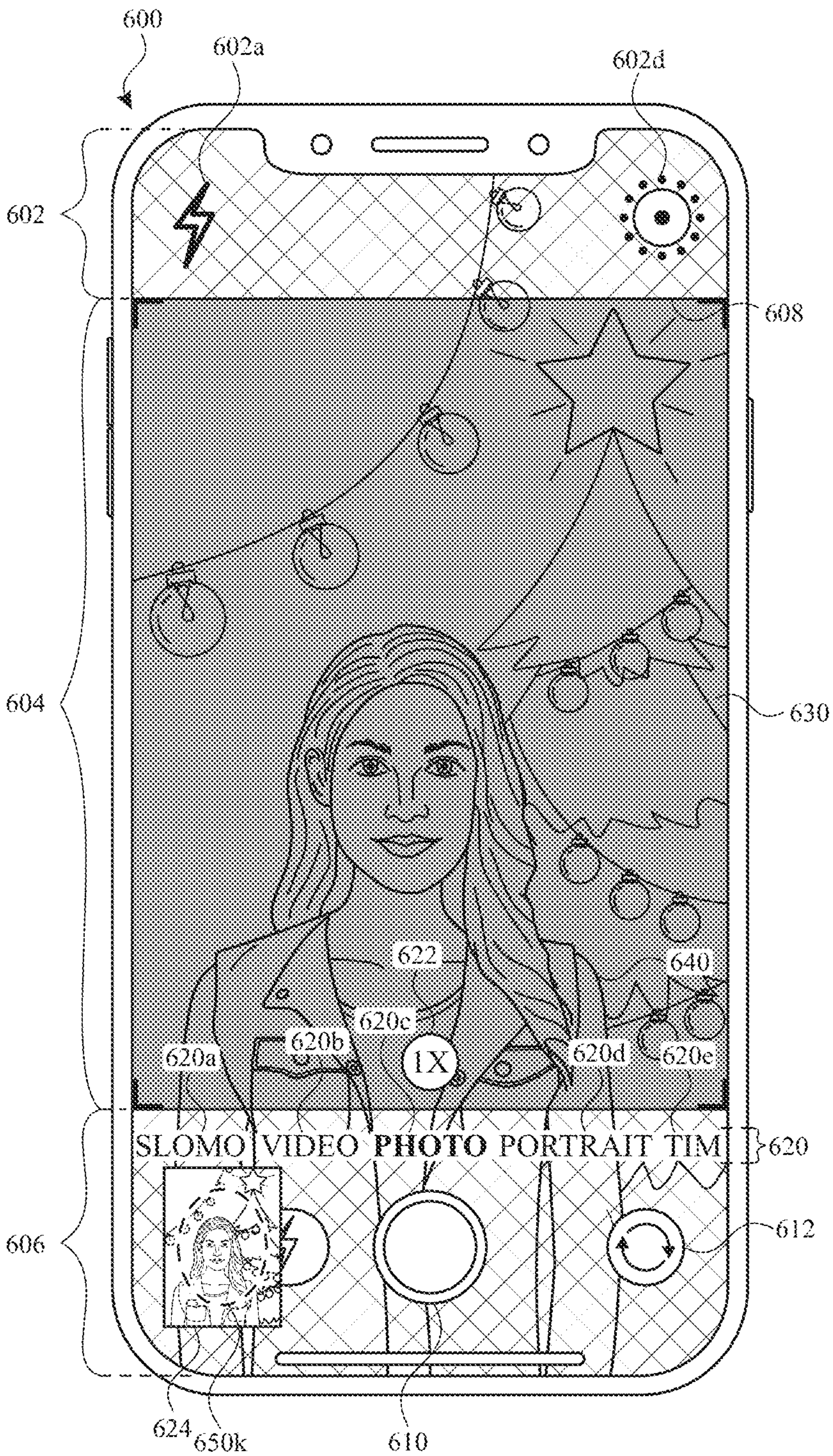
Figure 6P:
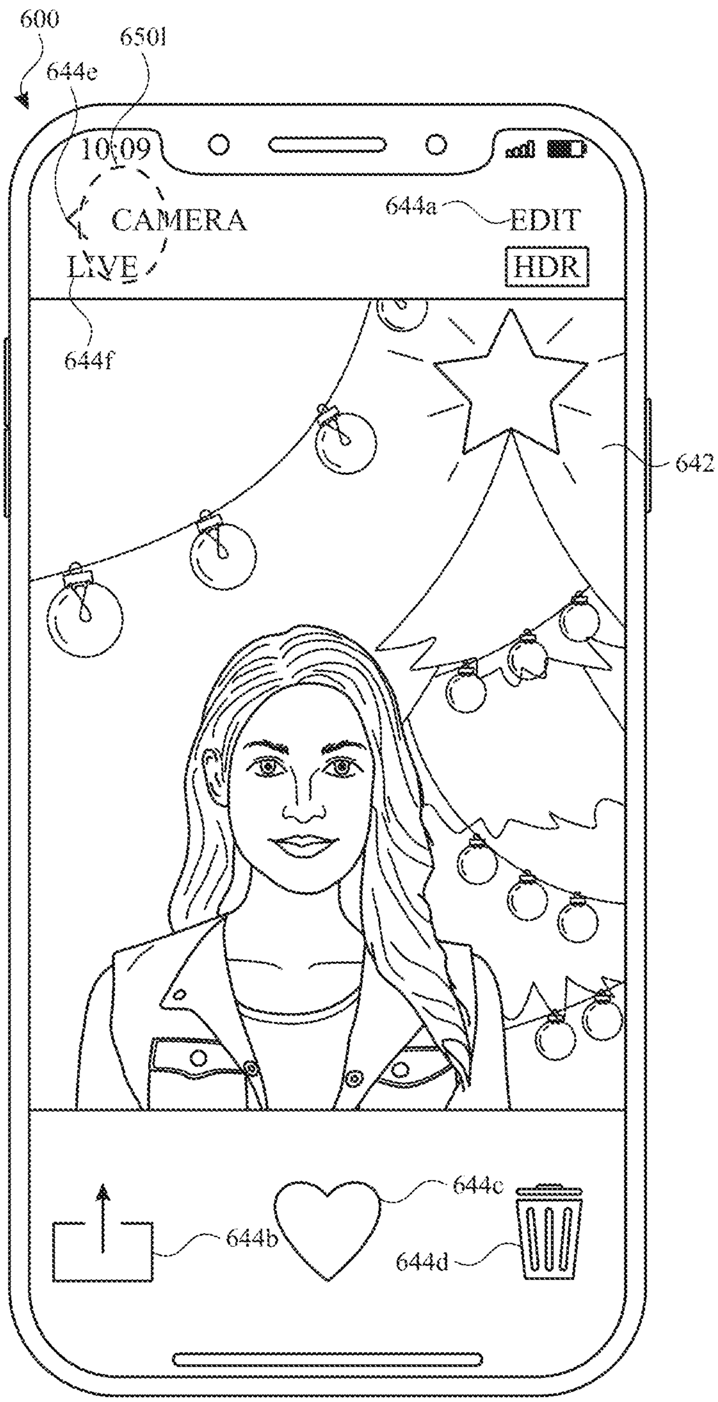
Figure 6Q:
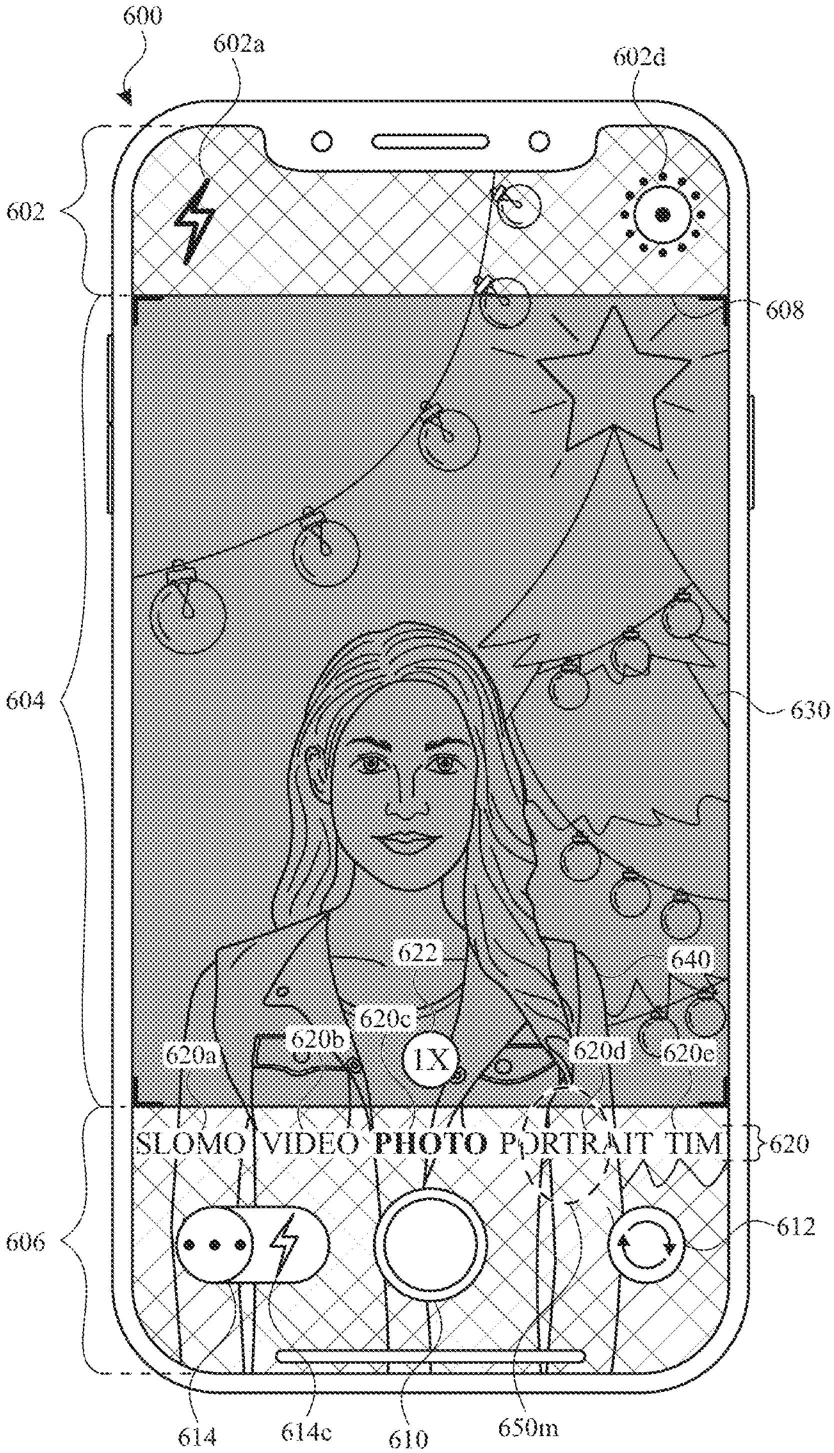
Figure 6R:
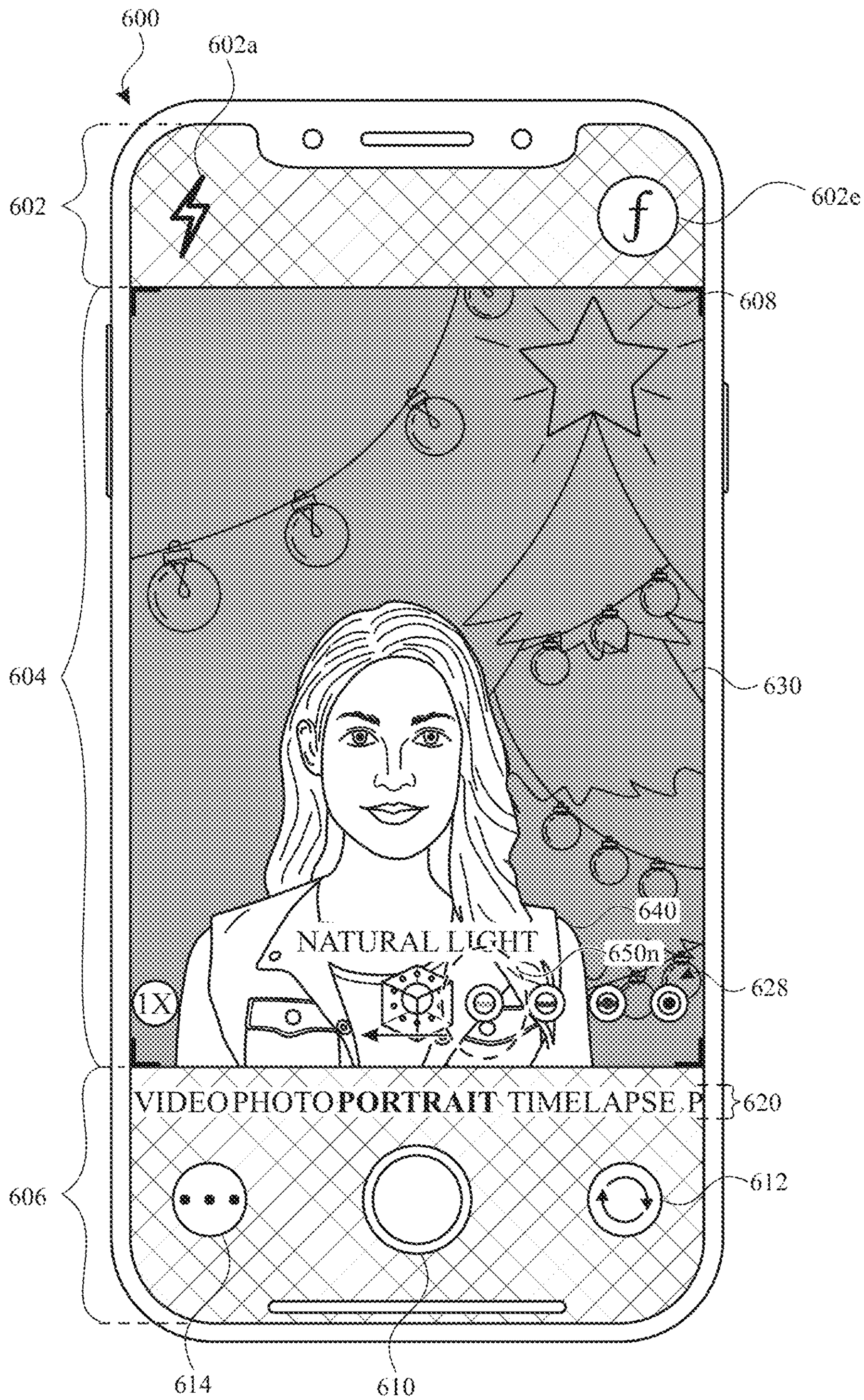
Figure 6S:
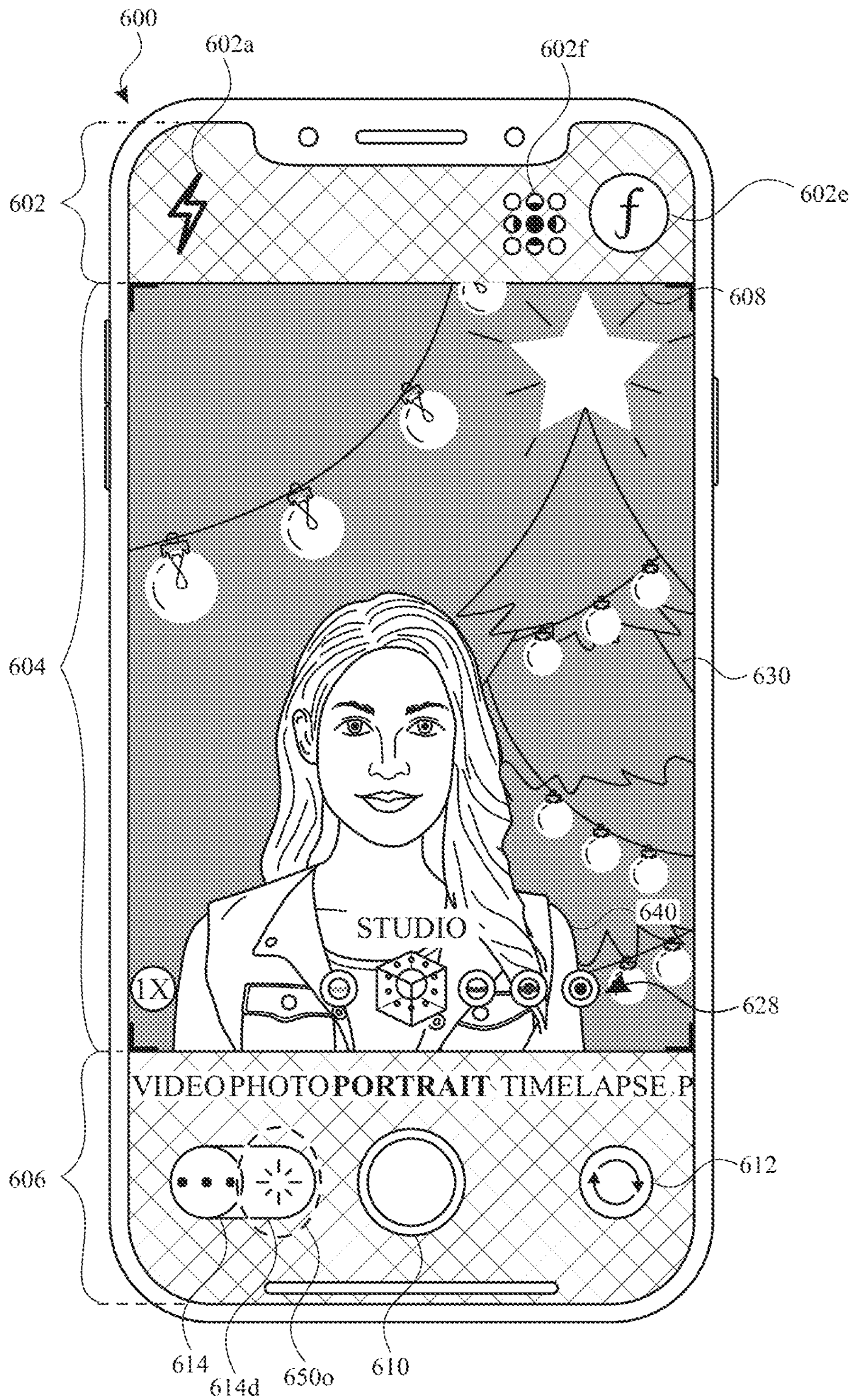
Figure 6T:
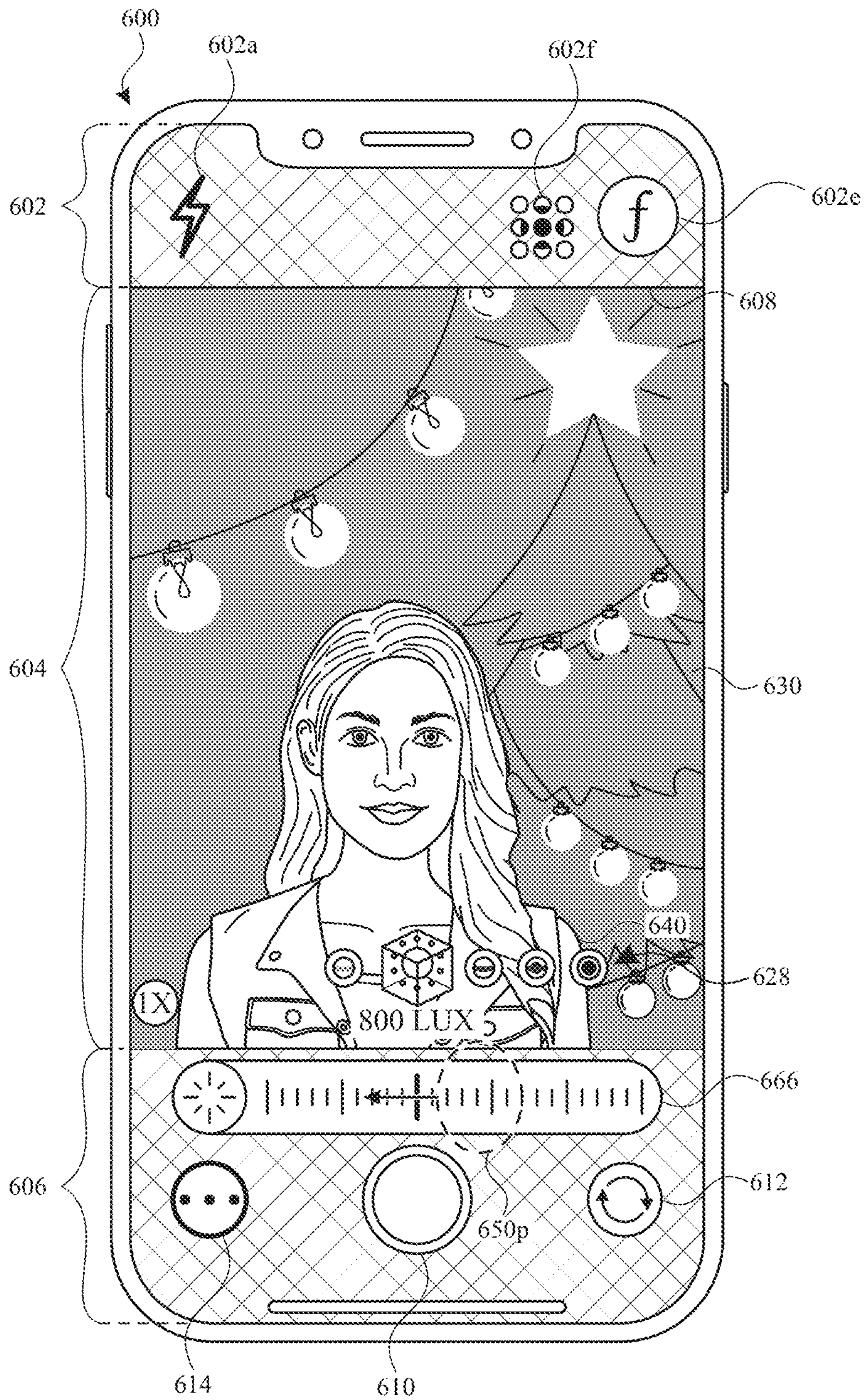
Figure 6U:
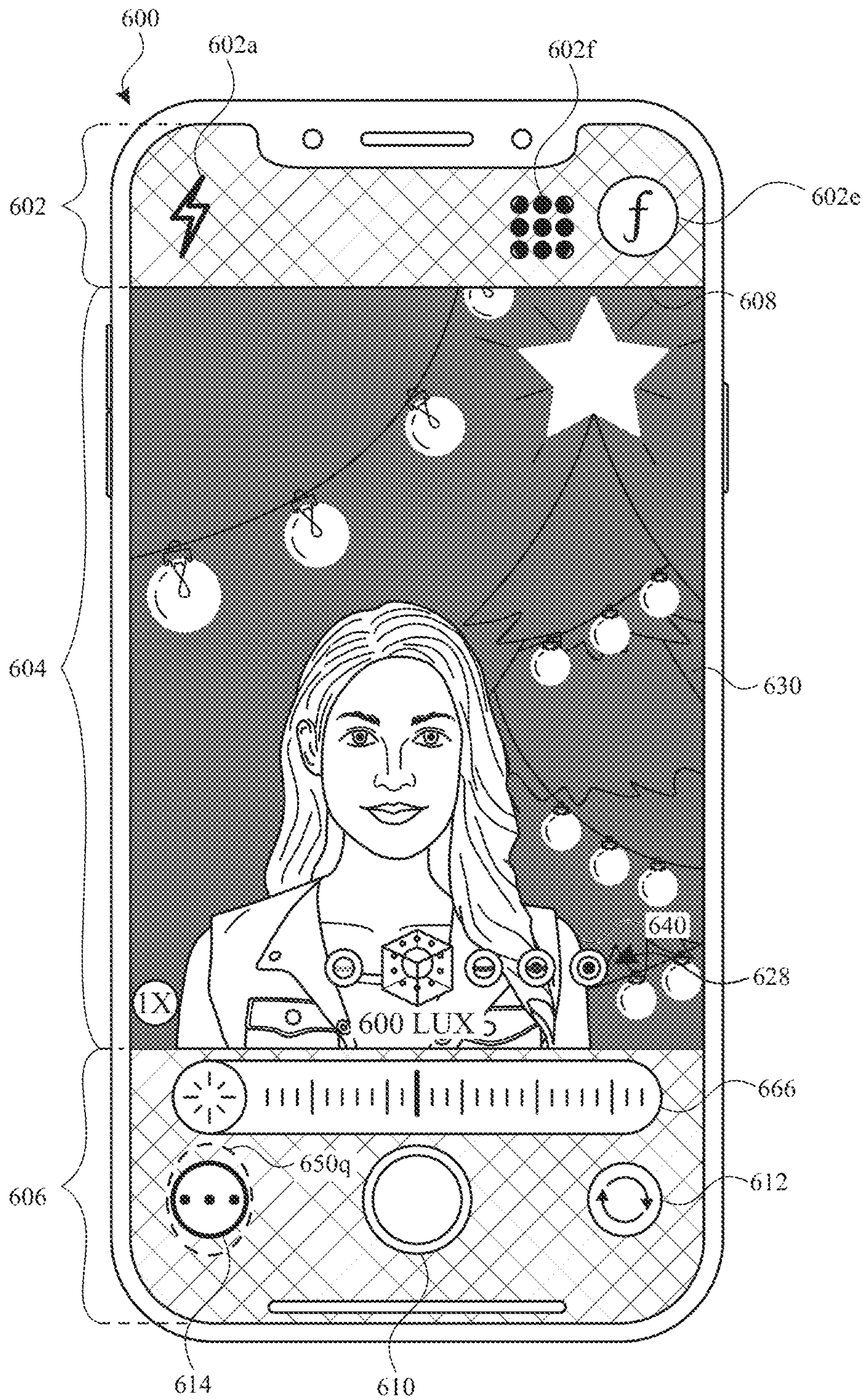
Figure 6V:
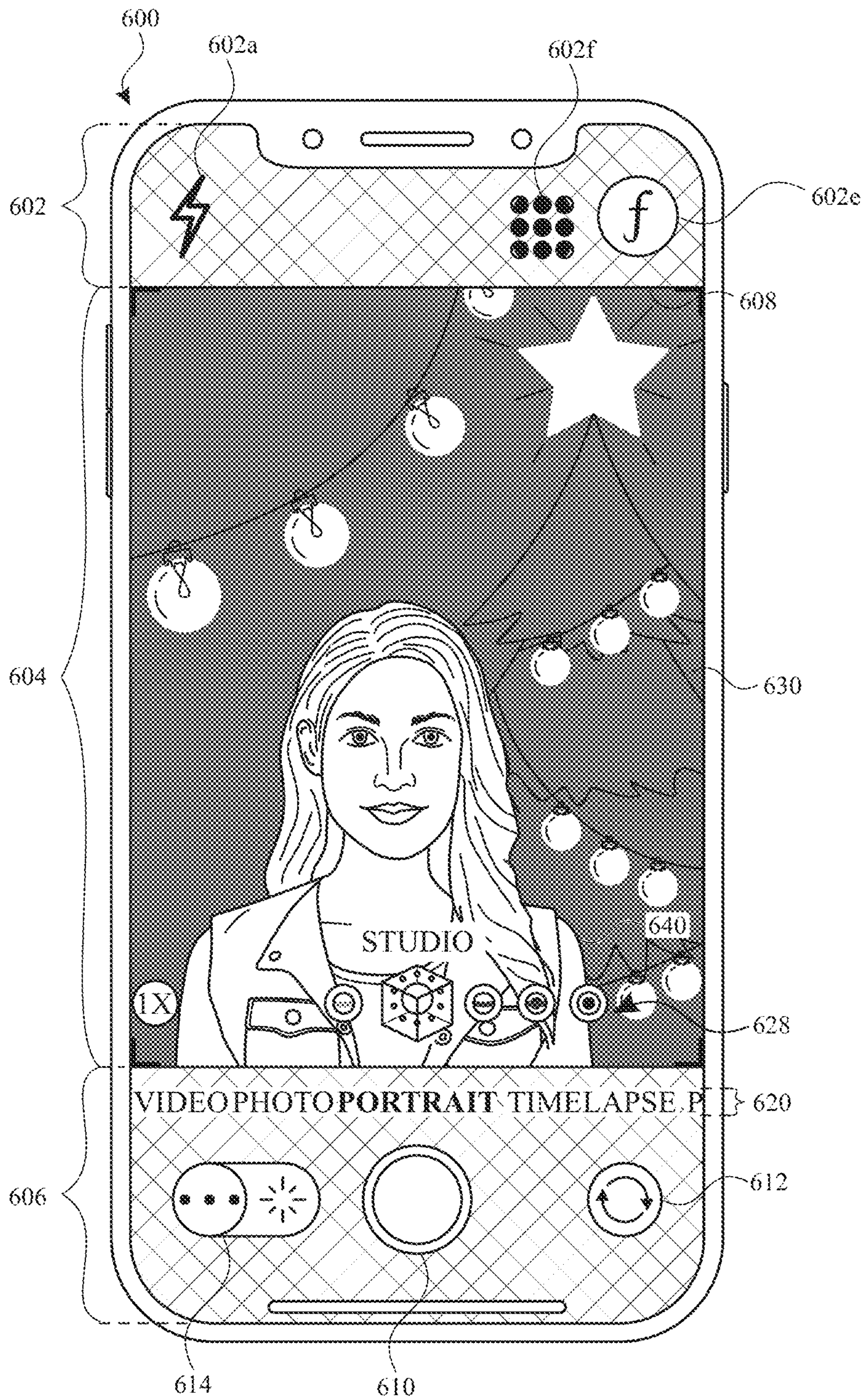
Figure 7A:
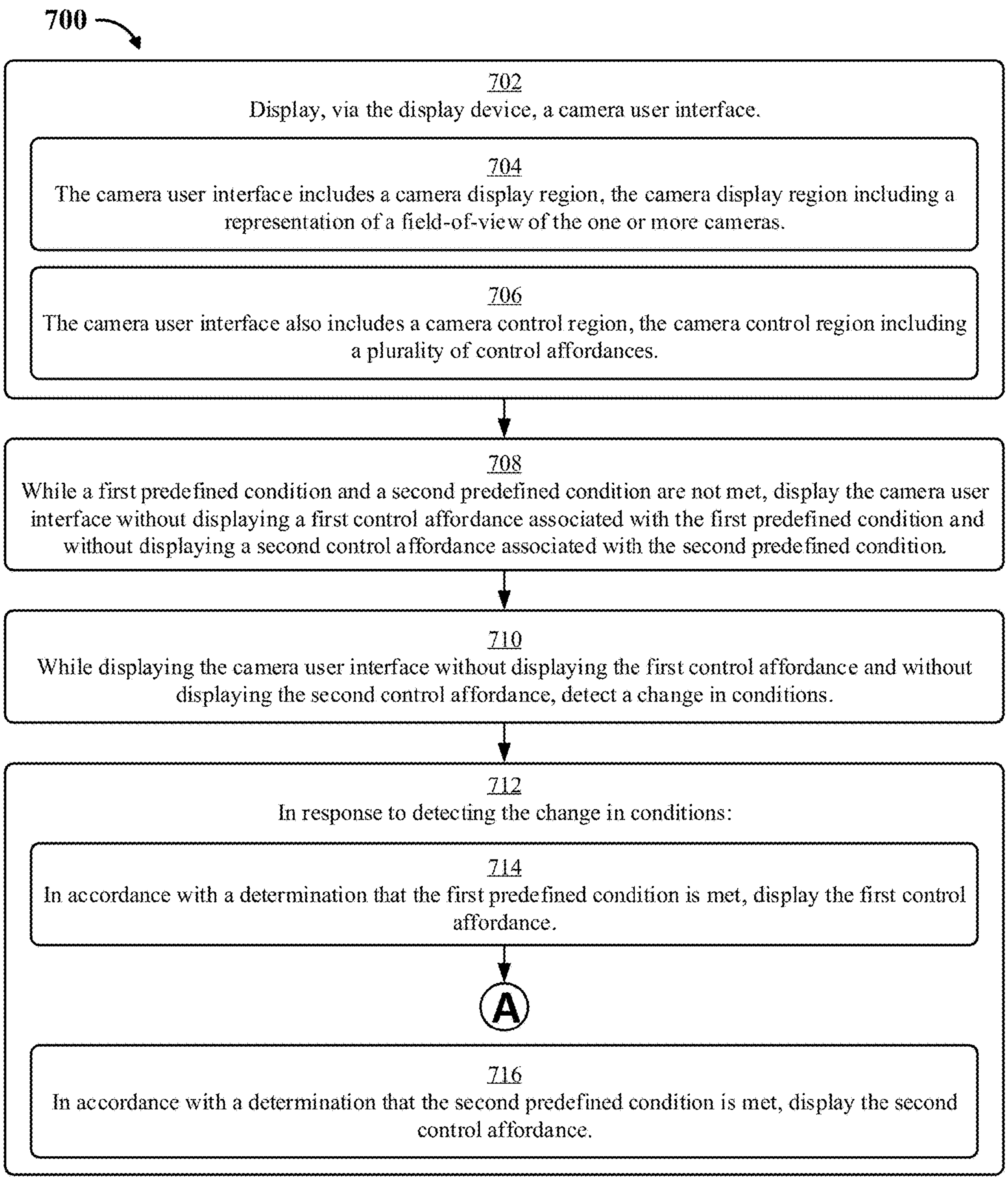
Figure 7B:
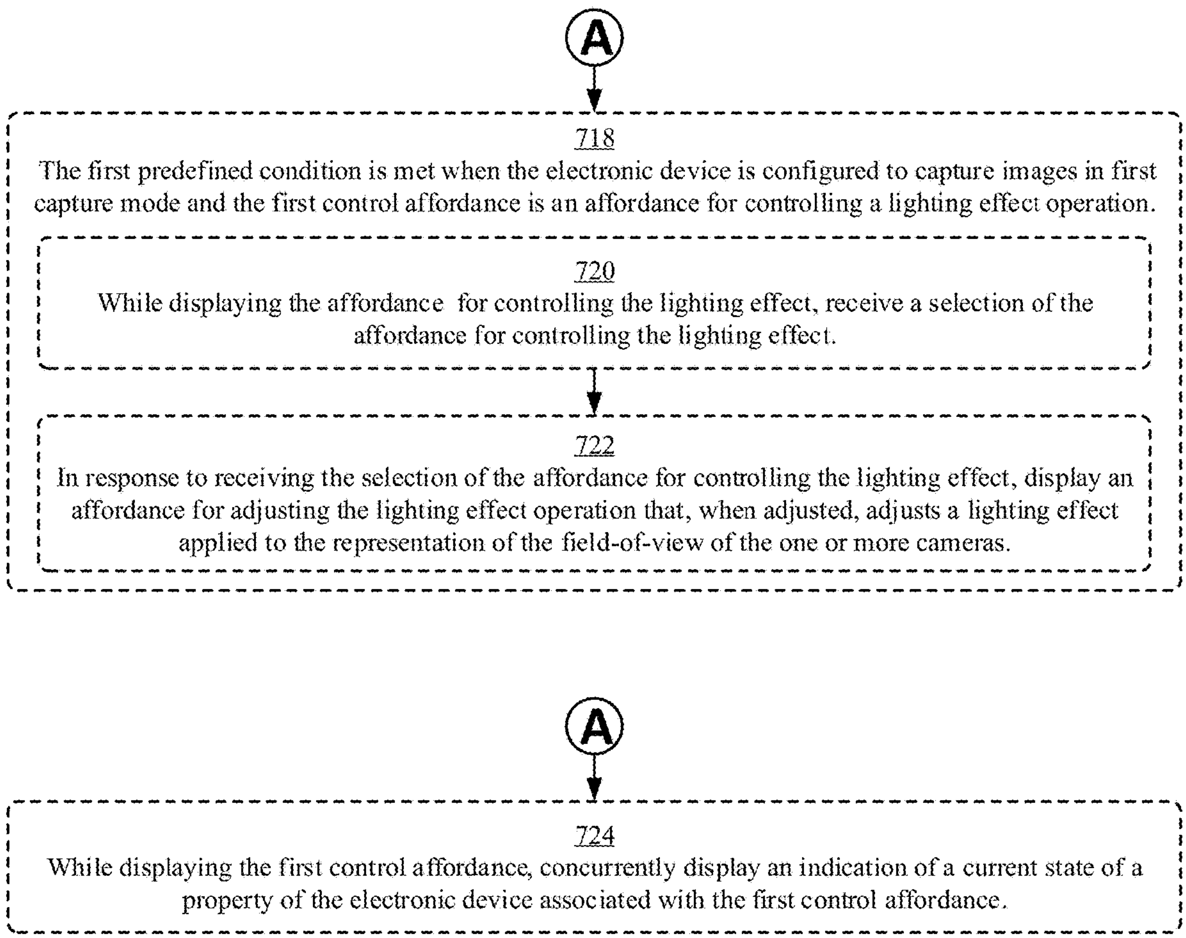

FIGS. 6A-6V illustrate exemplary techniques and user interfaces for accessing media controls using an electronic device in accordance with some embodiments. FIGS. 7A-7C are a flow diagram illustrating a method for accessing media controls using an electronic device in accordance with some embodiments. The user interfaces in FIGS. 6A-6V are used to illustrate the processes described below, including the processes in 7A-7C.

Figure 8A:
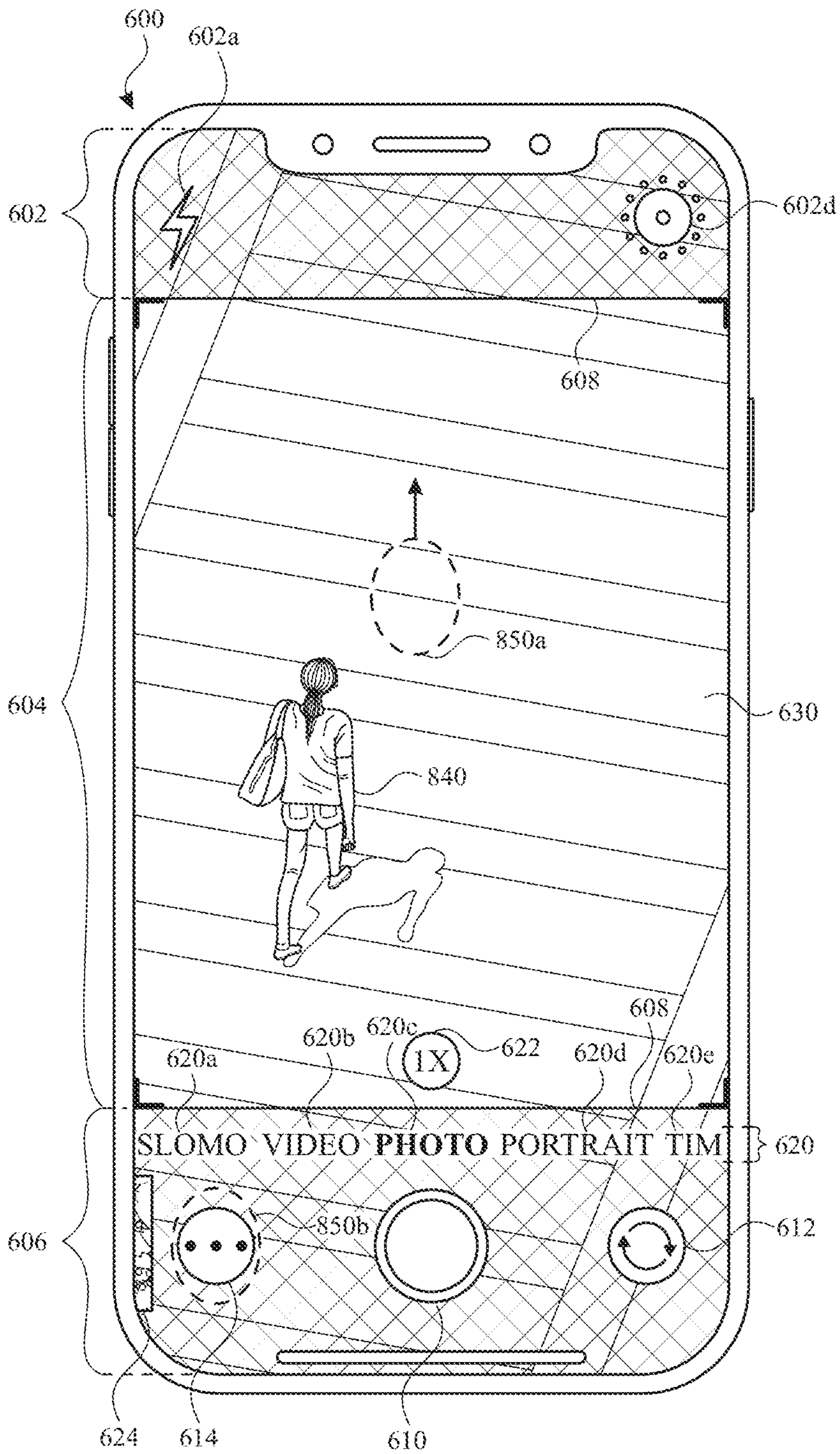
FIGS. 8A-8V illustrate exemplary techniques and user interfaces for displaying media controls using an electronic device in accordance with some embodiments.
Figure 8B:
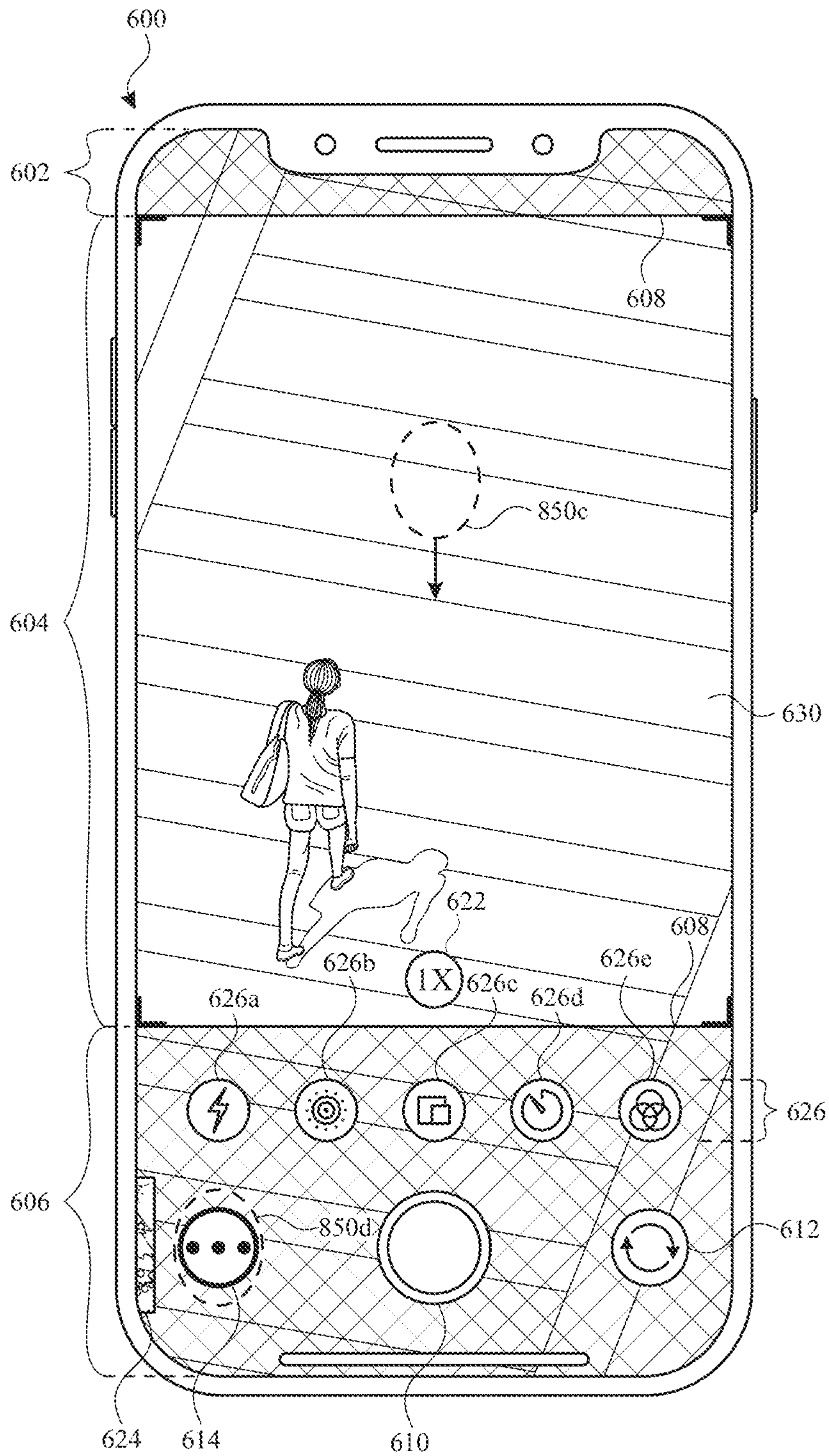
Figure 8C:
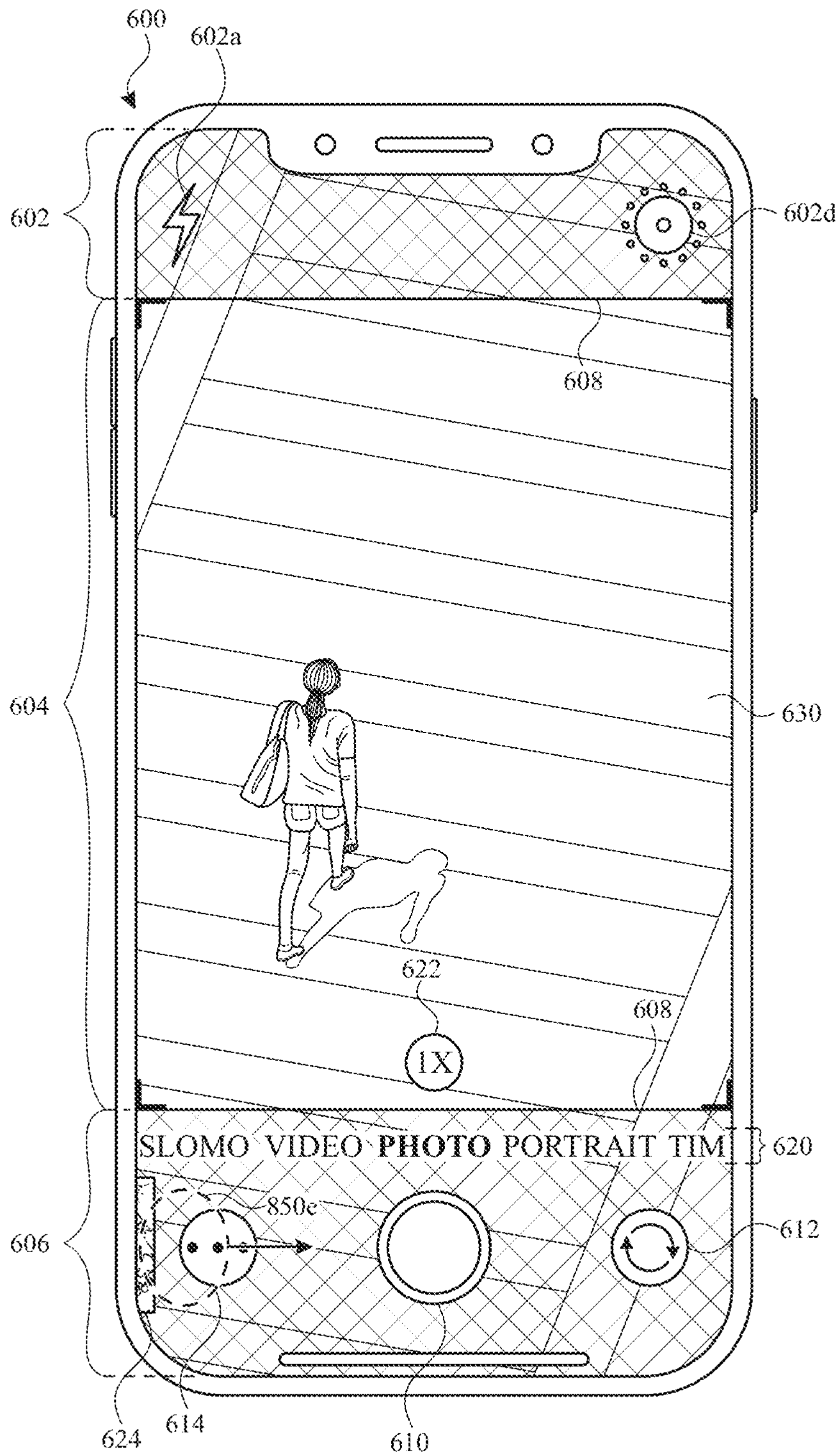
Figure 8D:
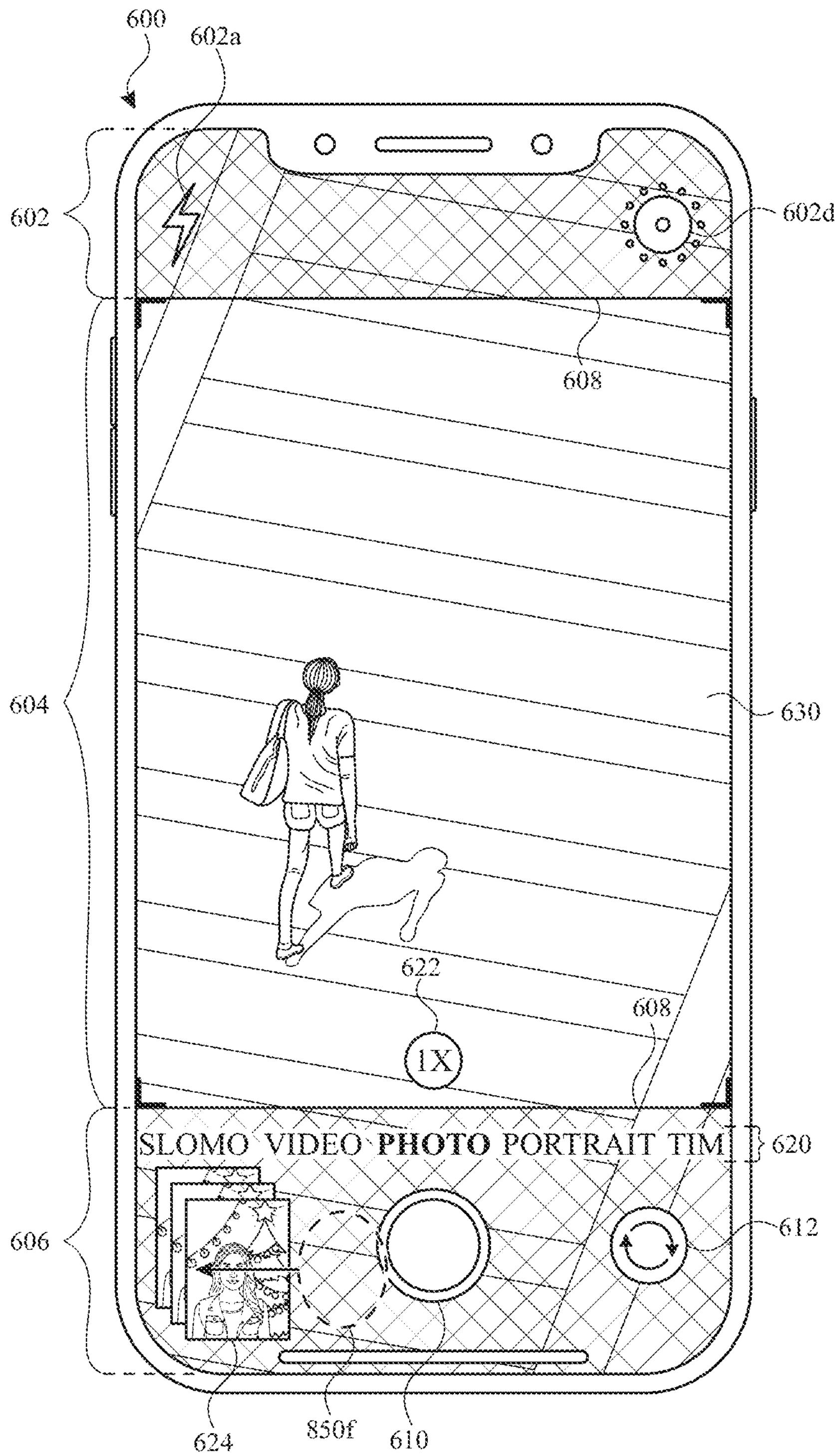
Figure 8E:
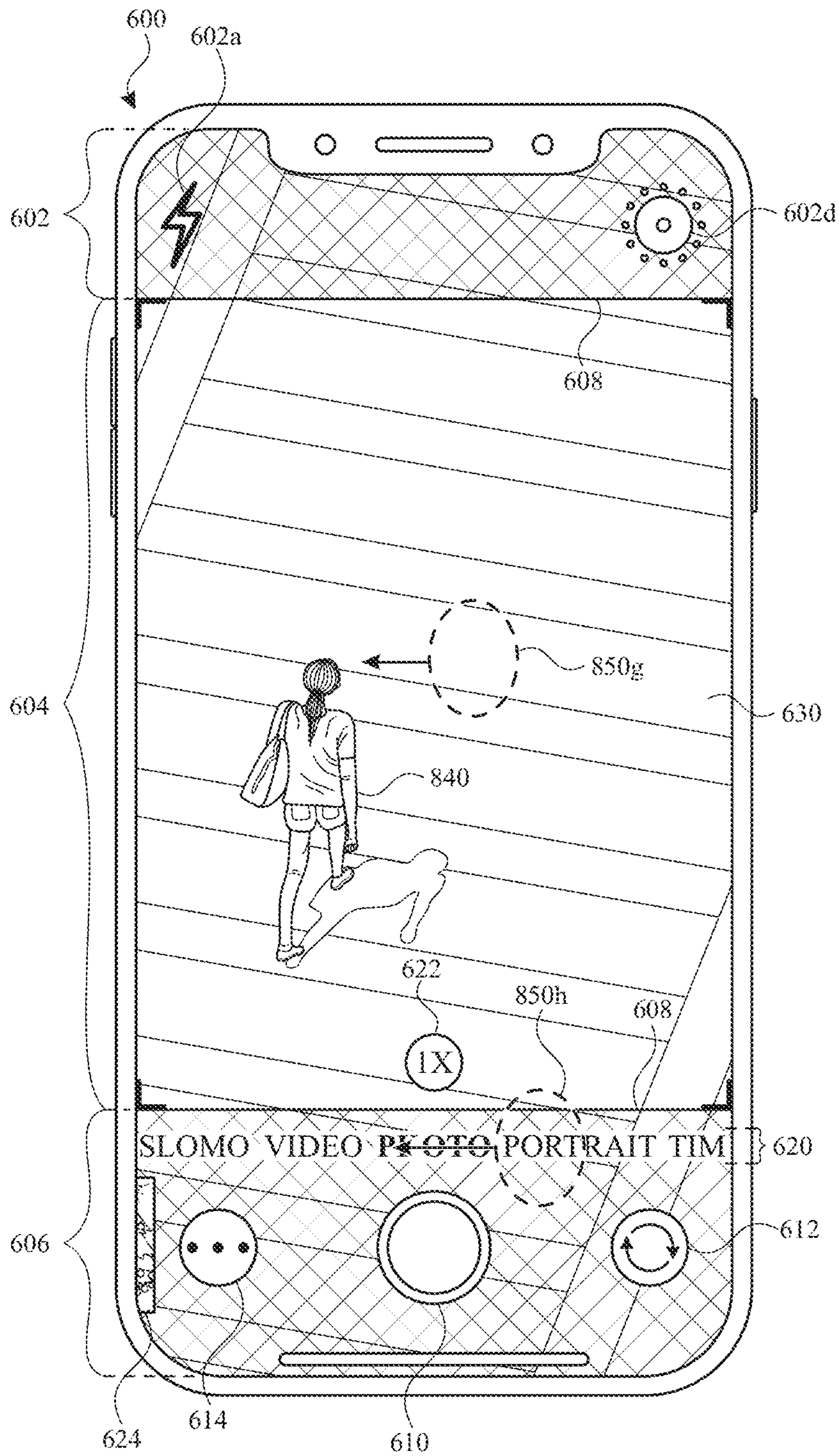
Figure 8F:
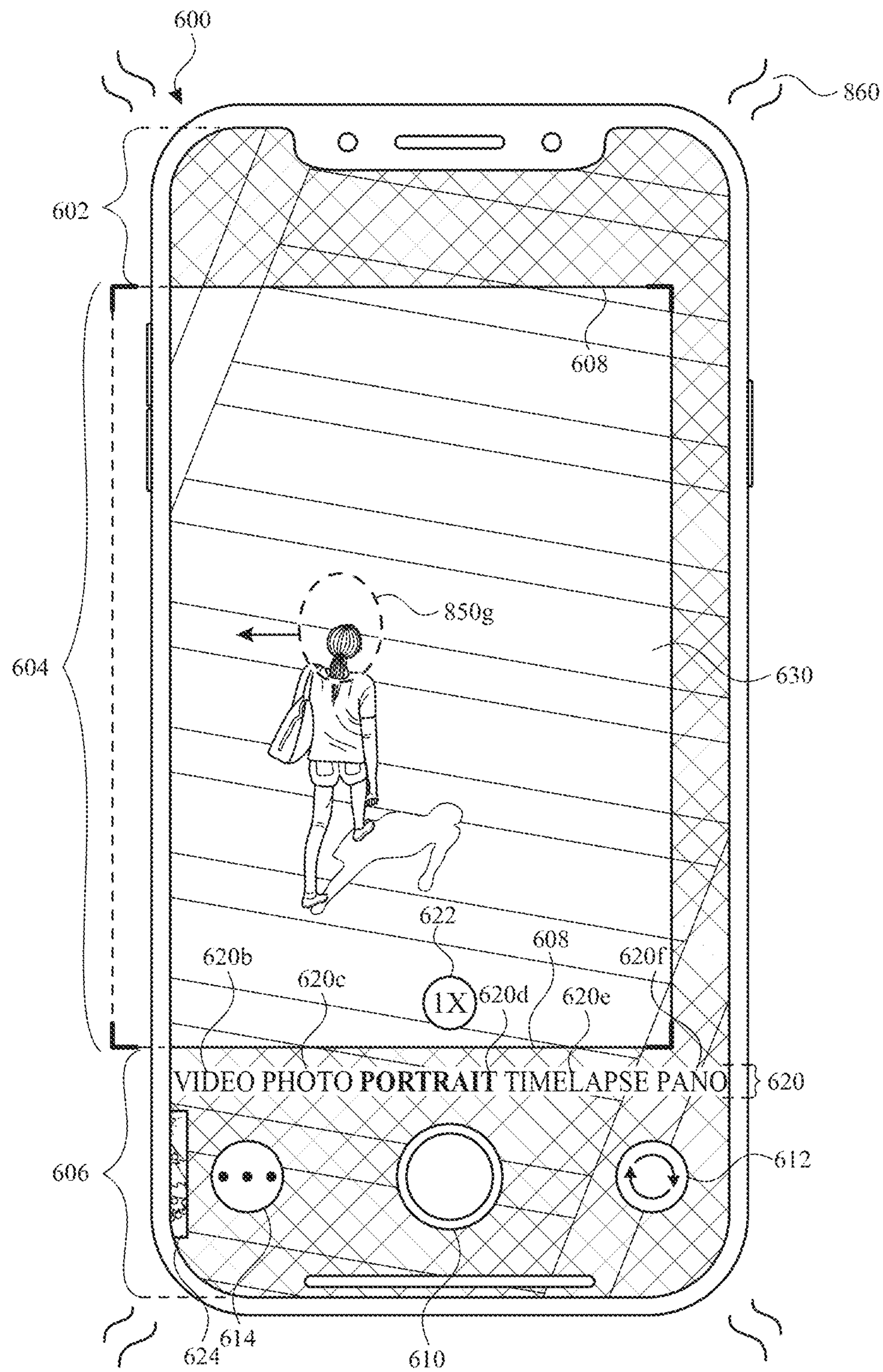
Figure 8G:
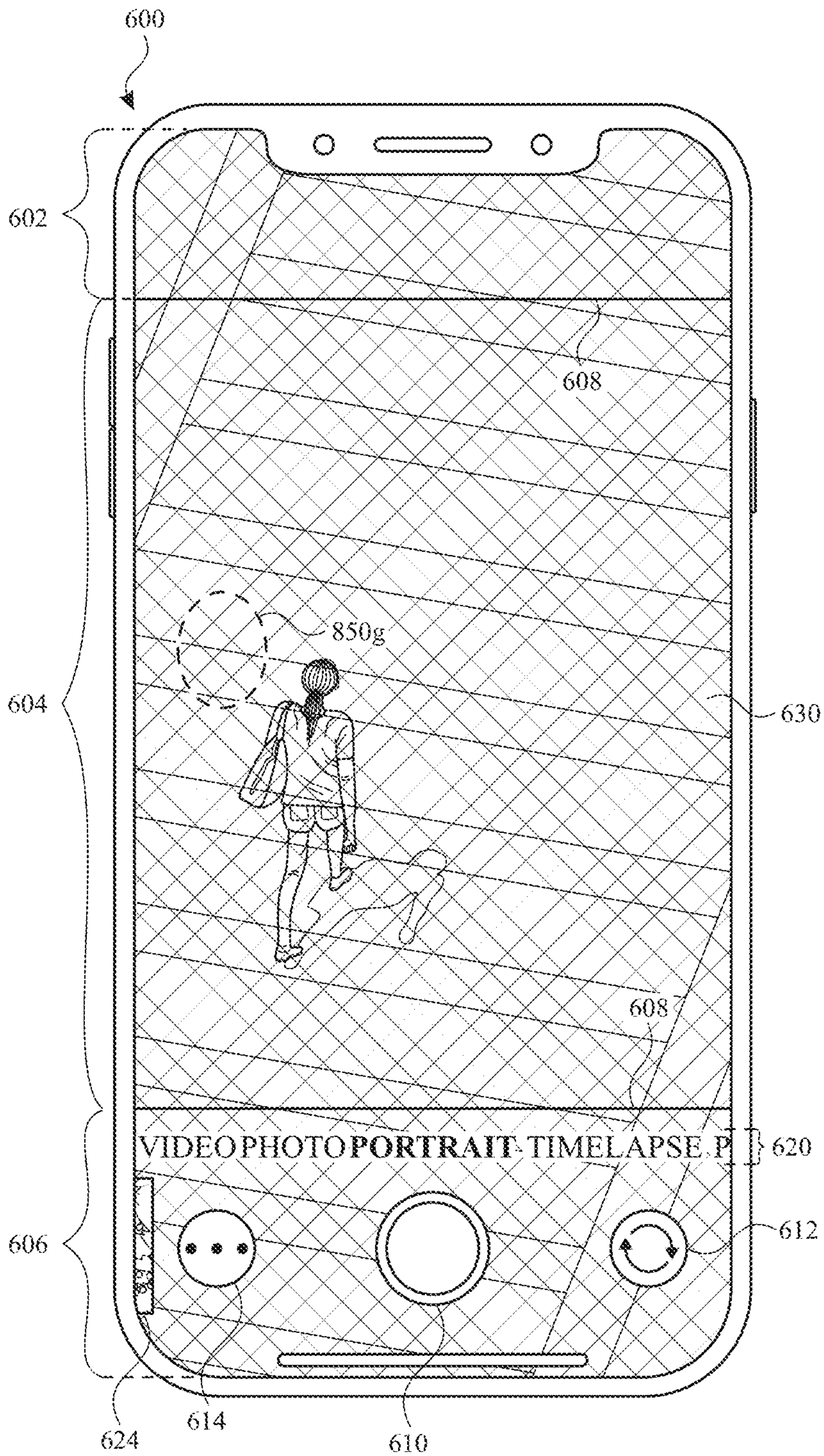
Figure 8H:
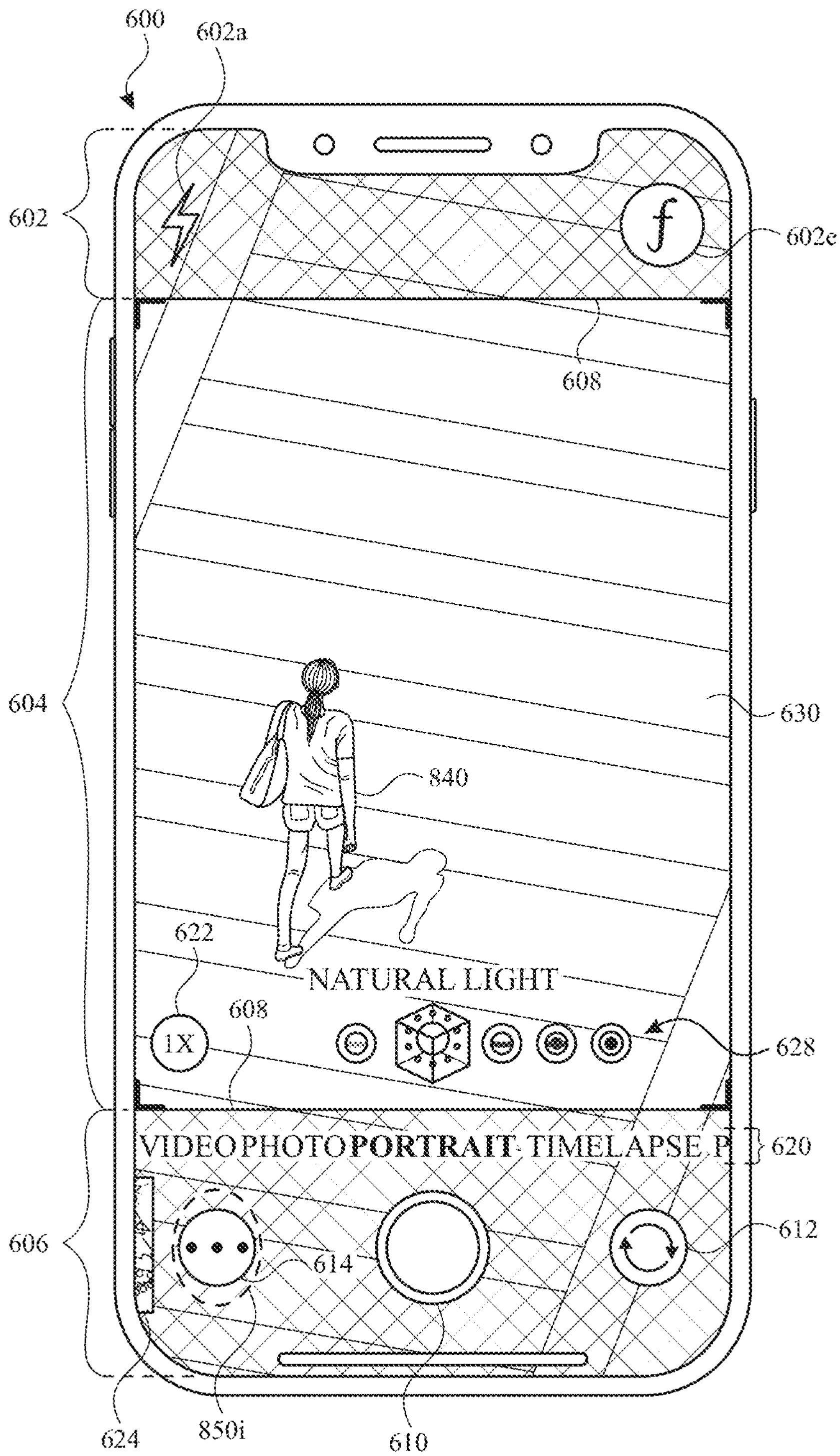
Figure 8I:
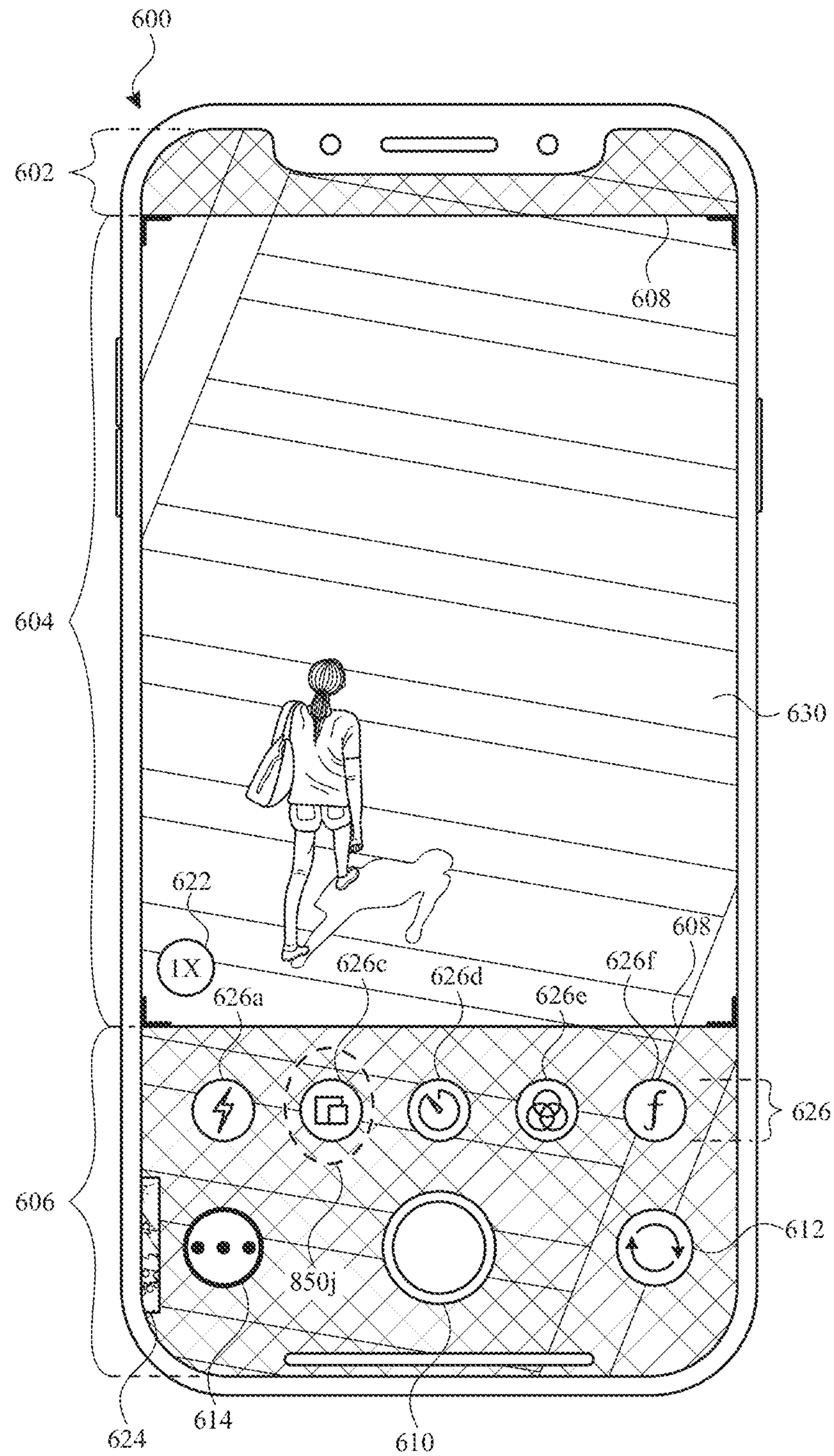
Figure 8J:
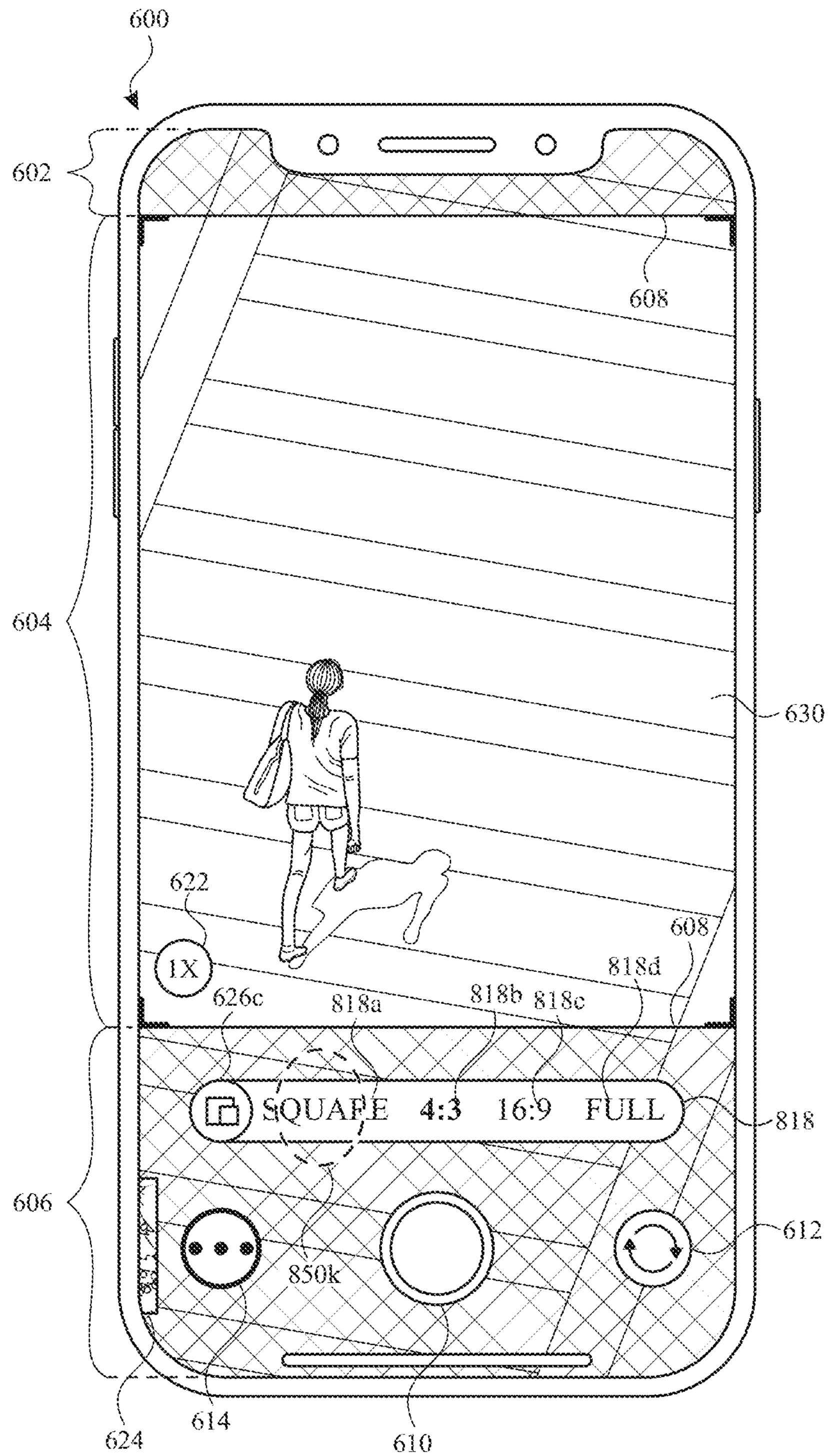
Figure 8K:
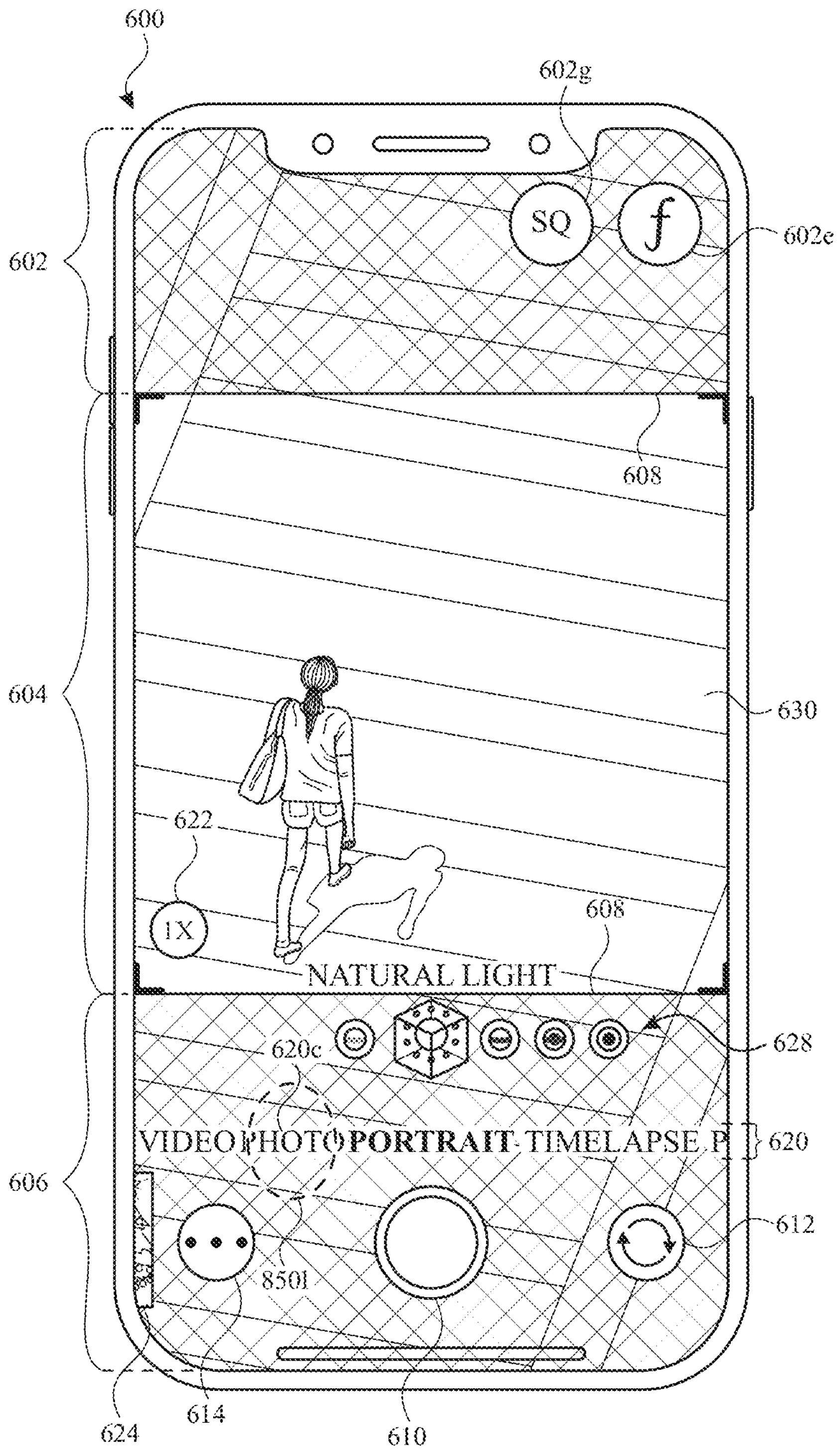
Figure 8L:
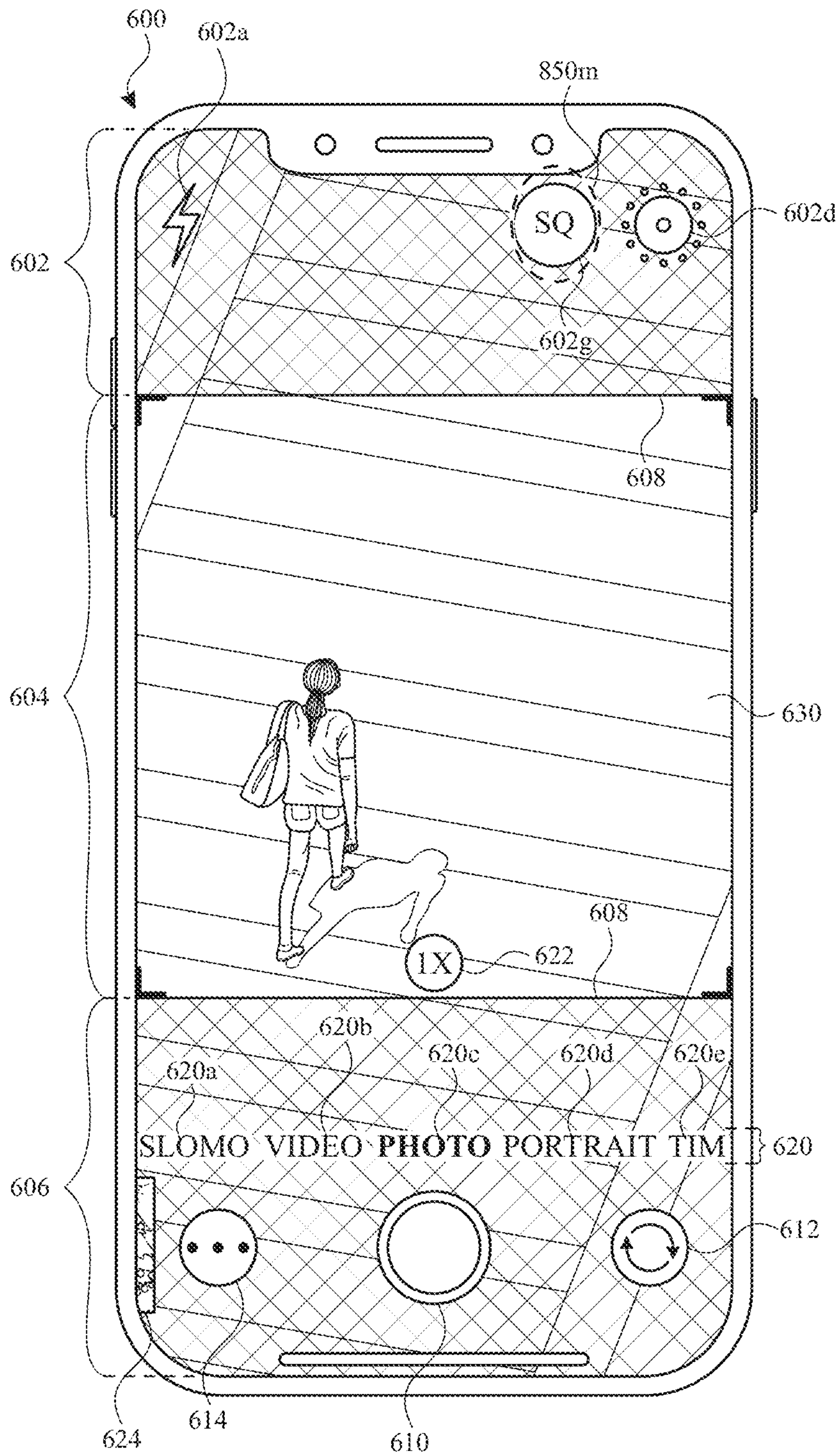
Figure 8M:
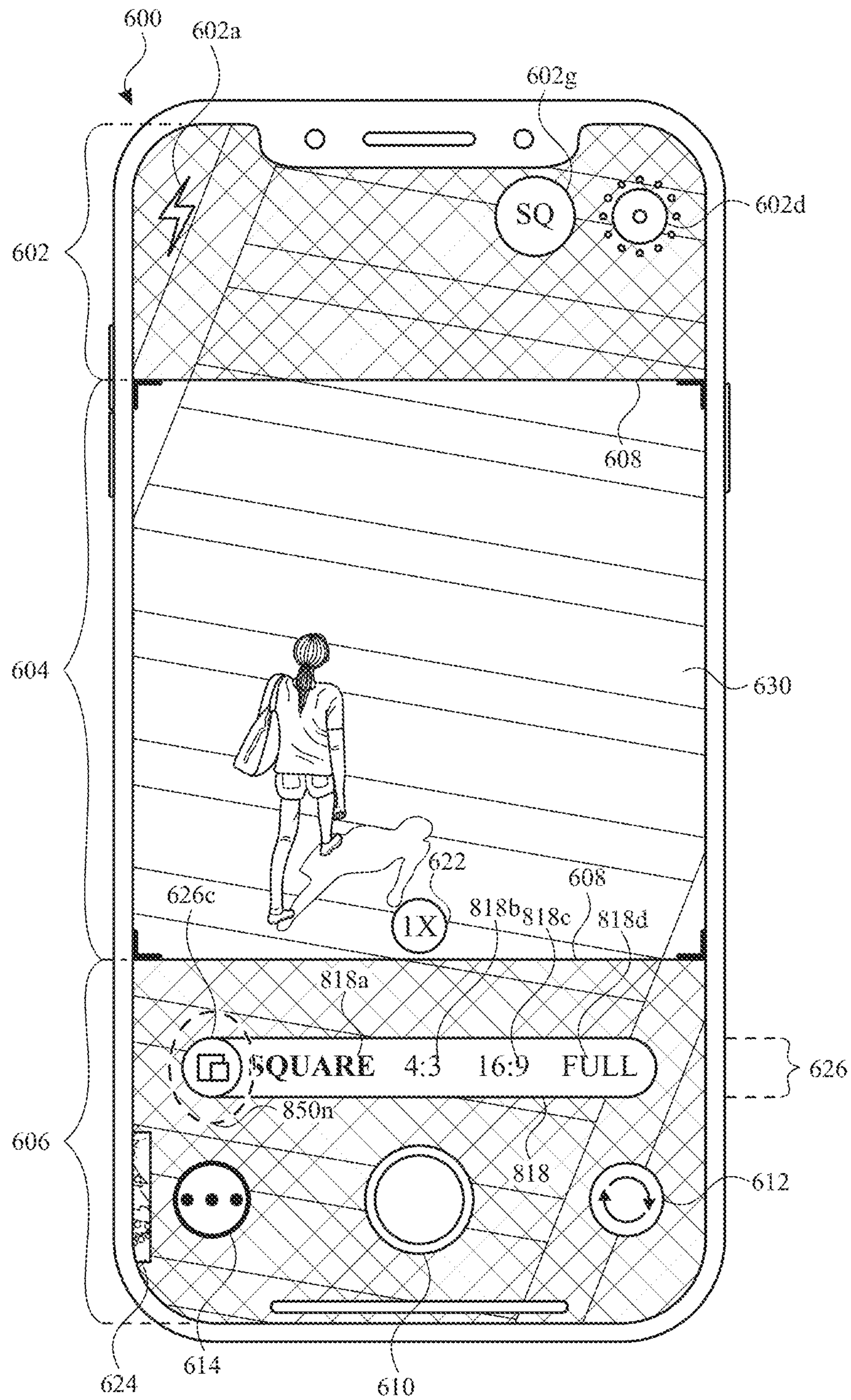
Figure 8N:
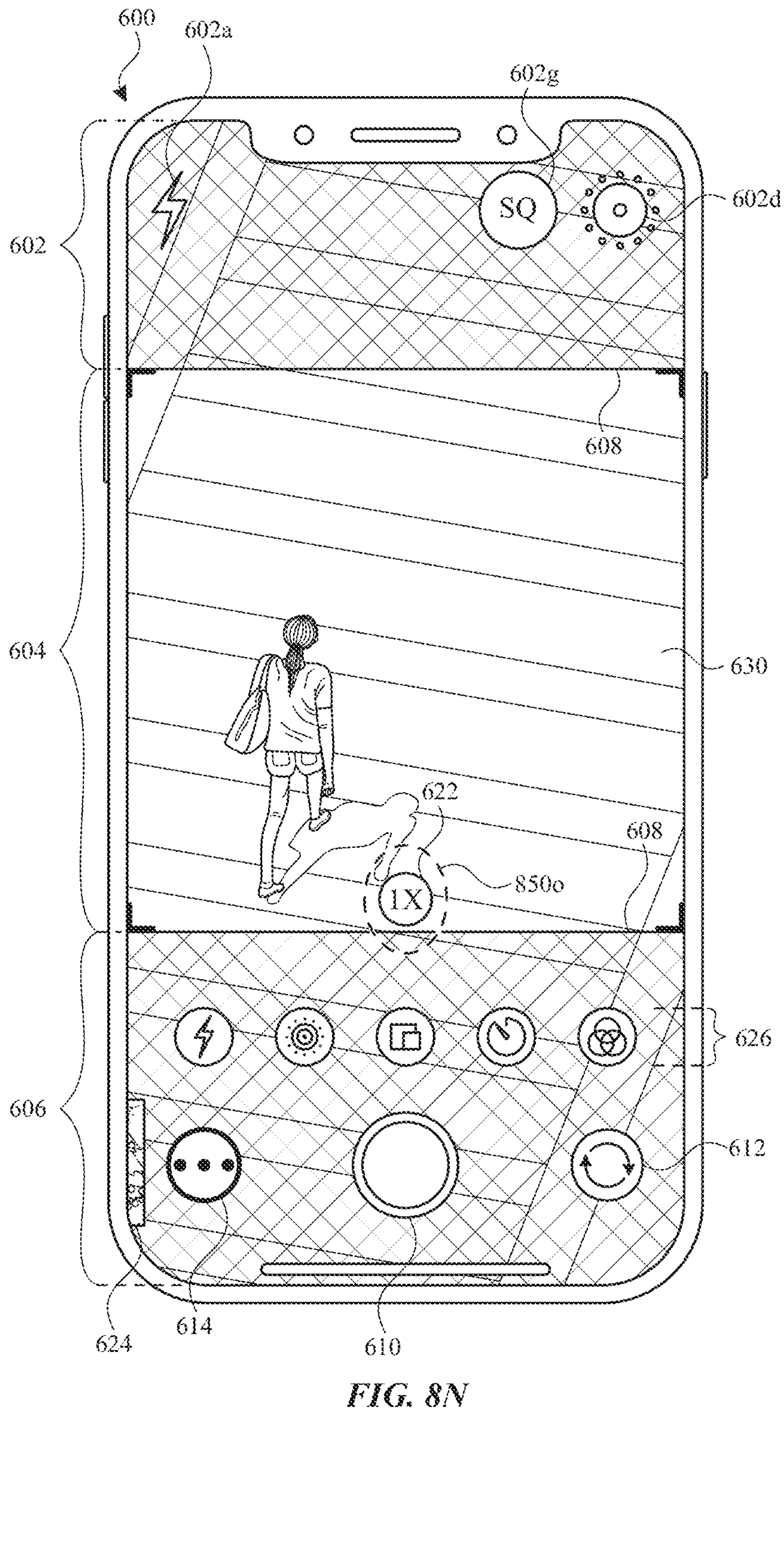
Figure 8O:
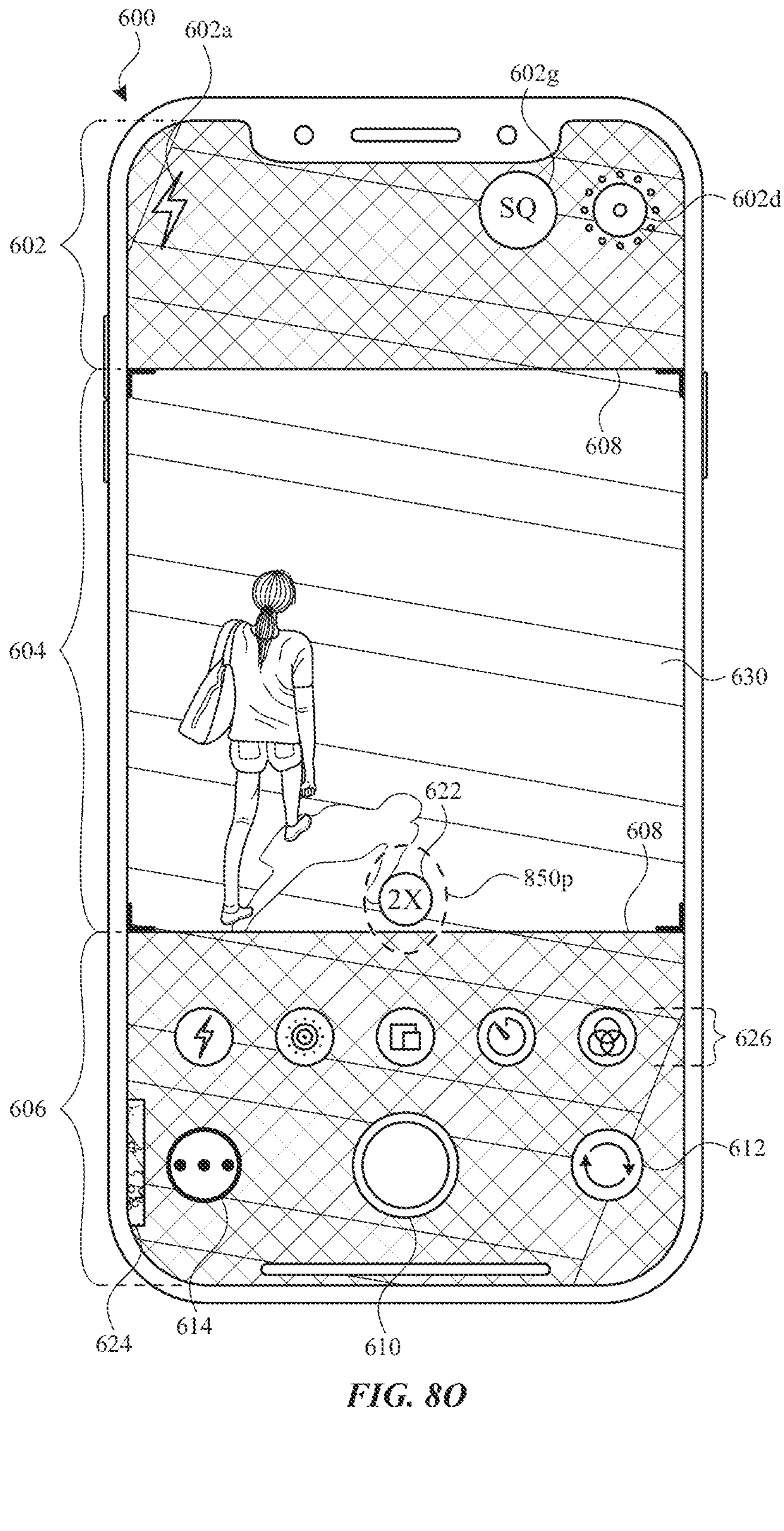
Figure 8P:
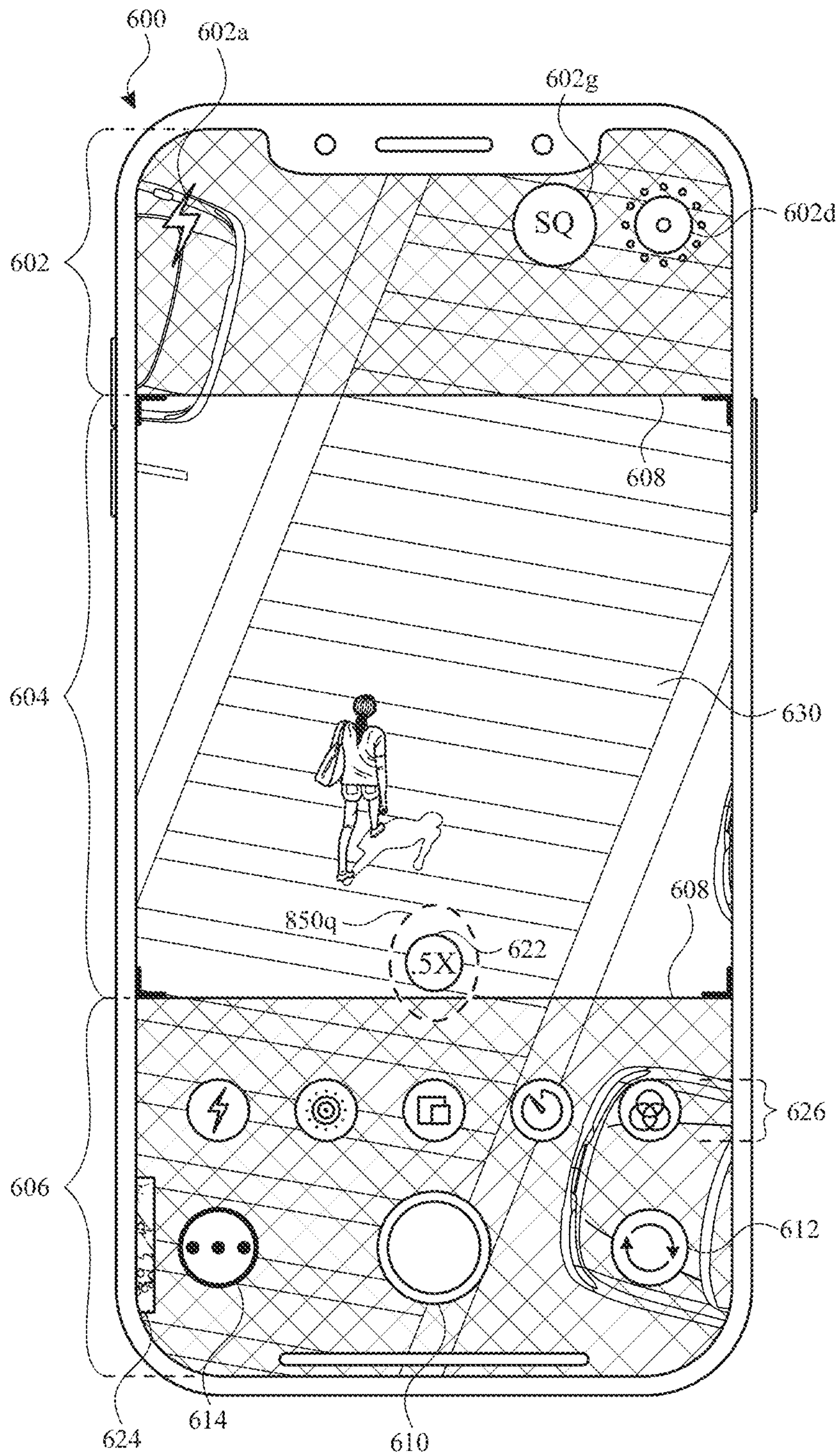
Figure 8Q:
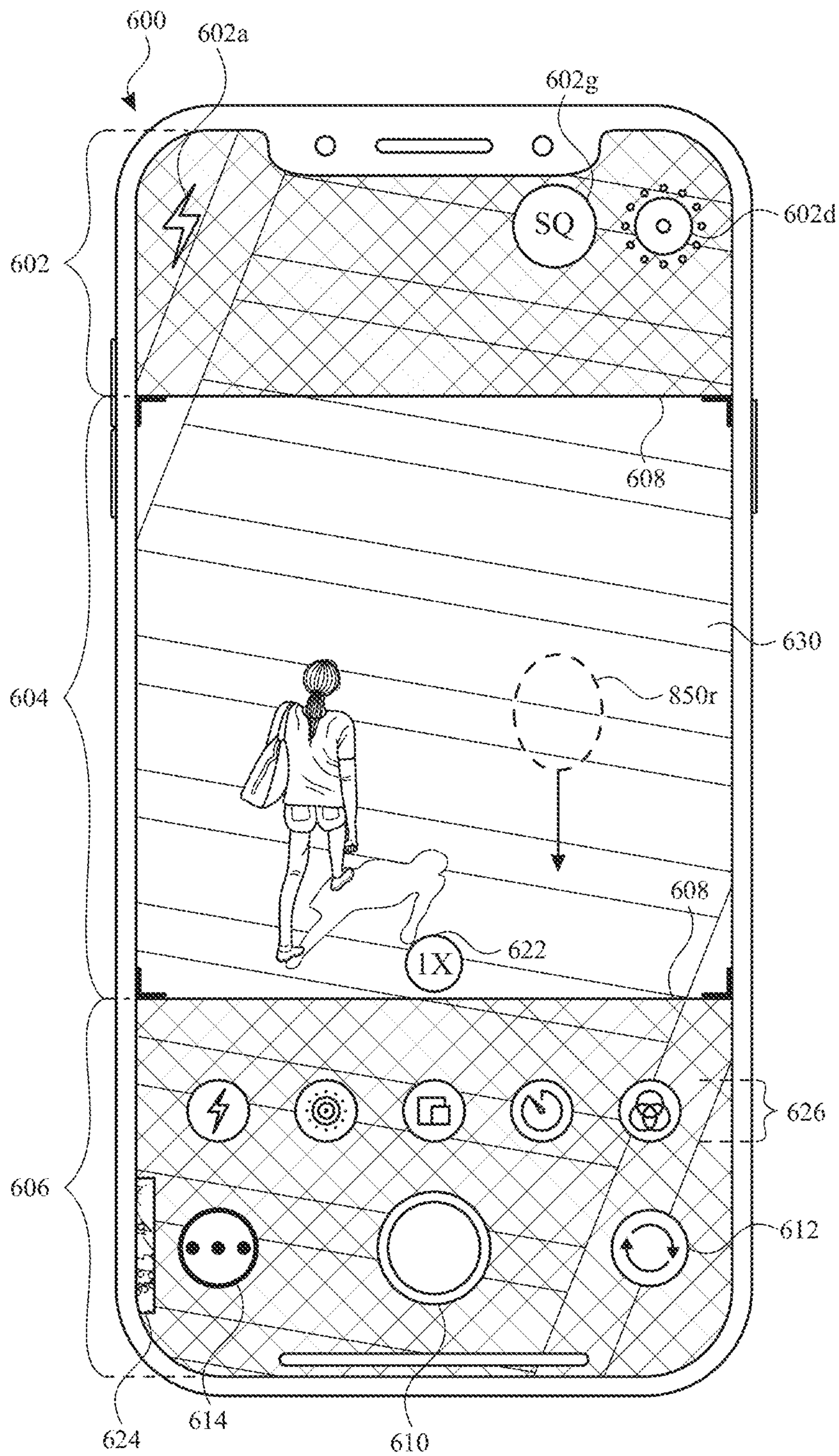
Figure 8R:
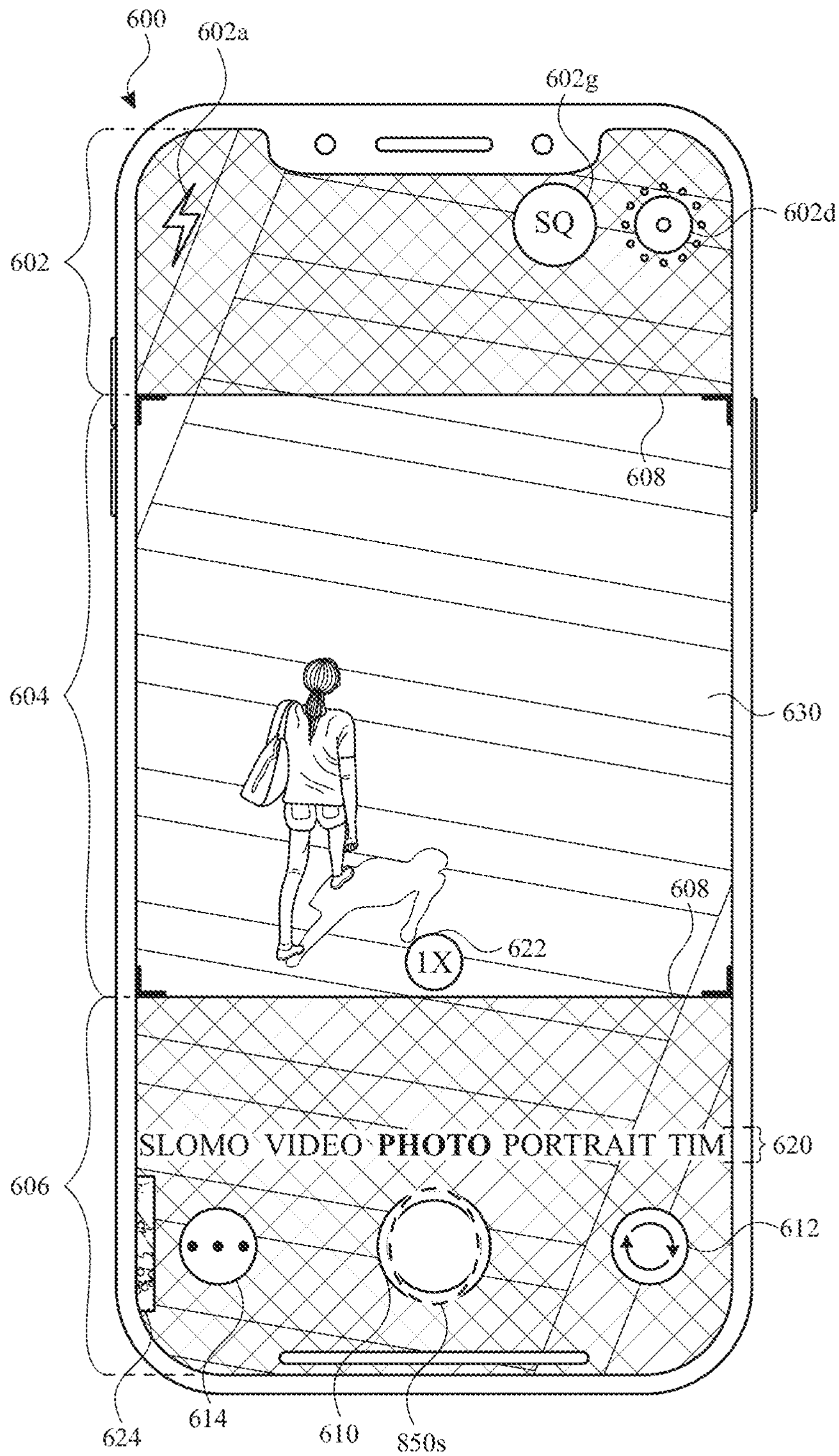
Figure 8S:
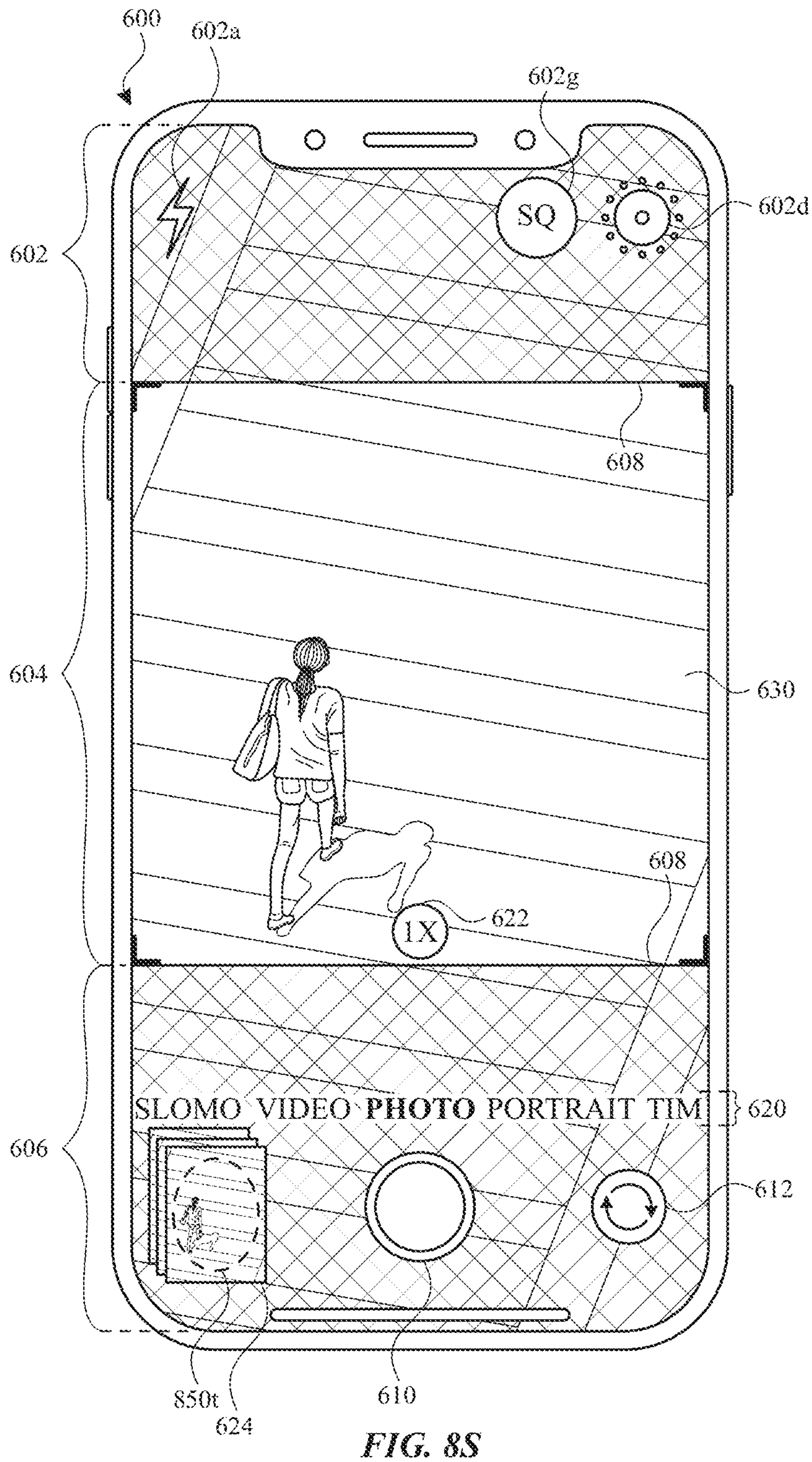
Figure 8T:
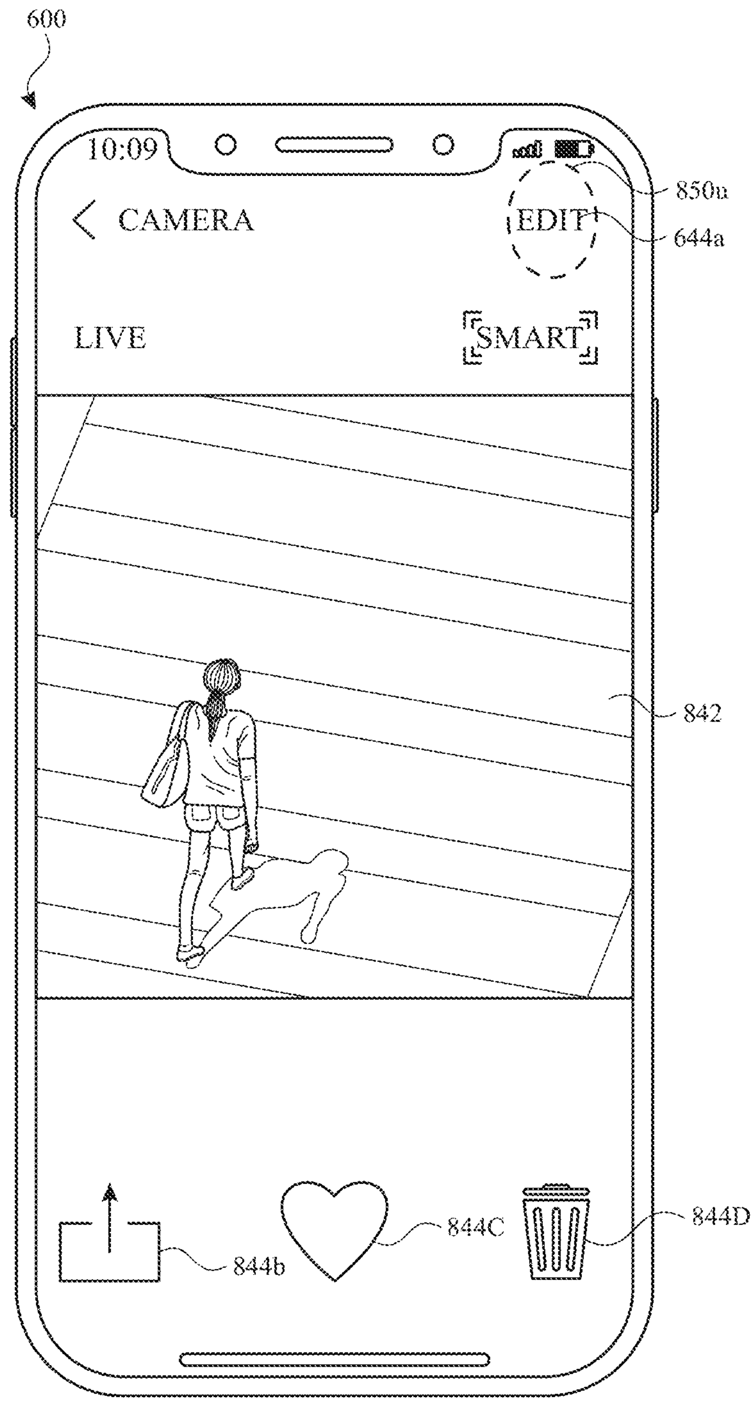
Figure 8U:
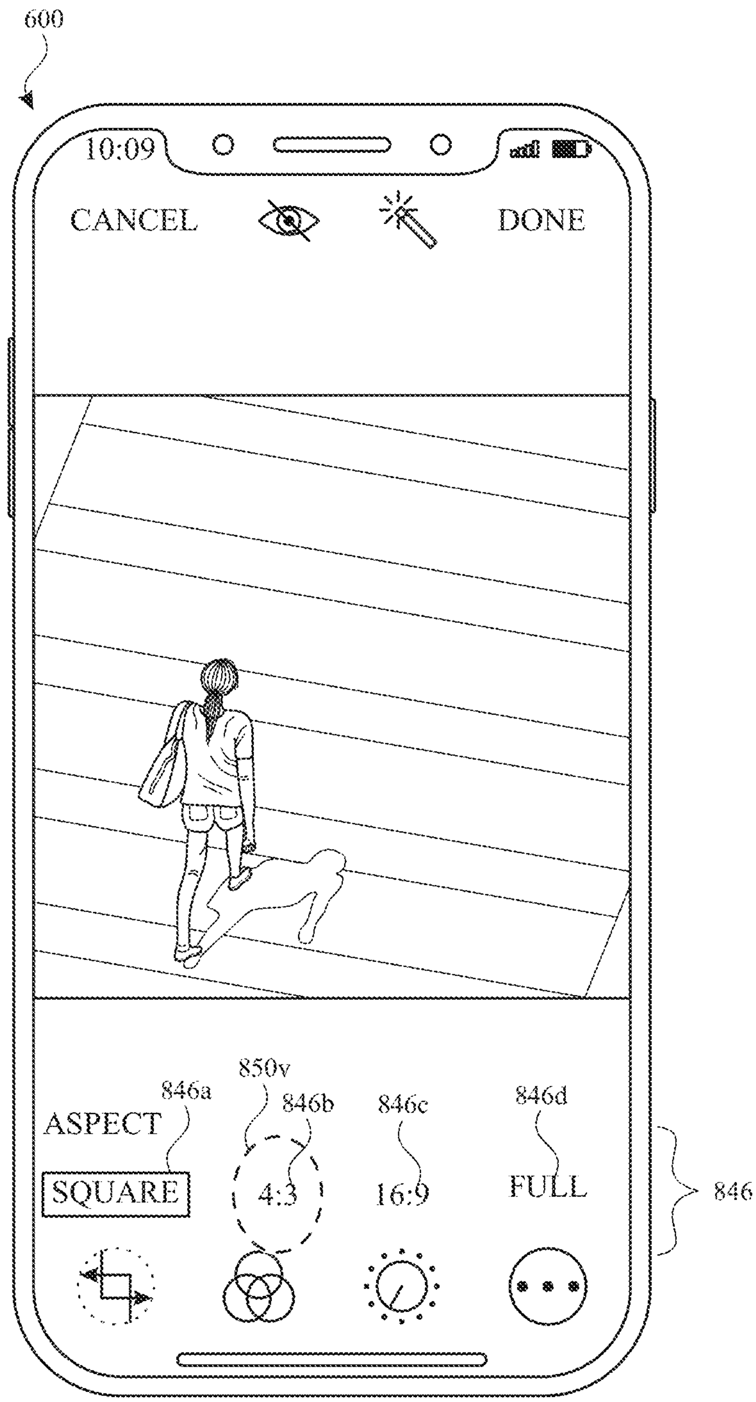
Figure 8V:
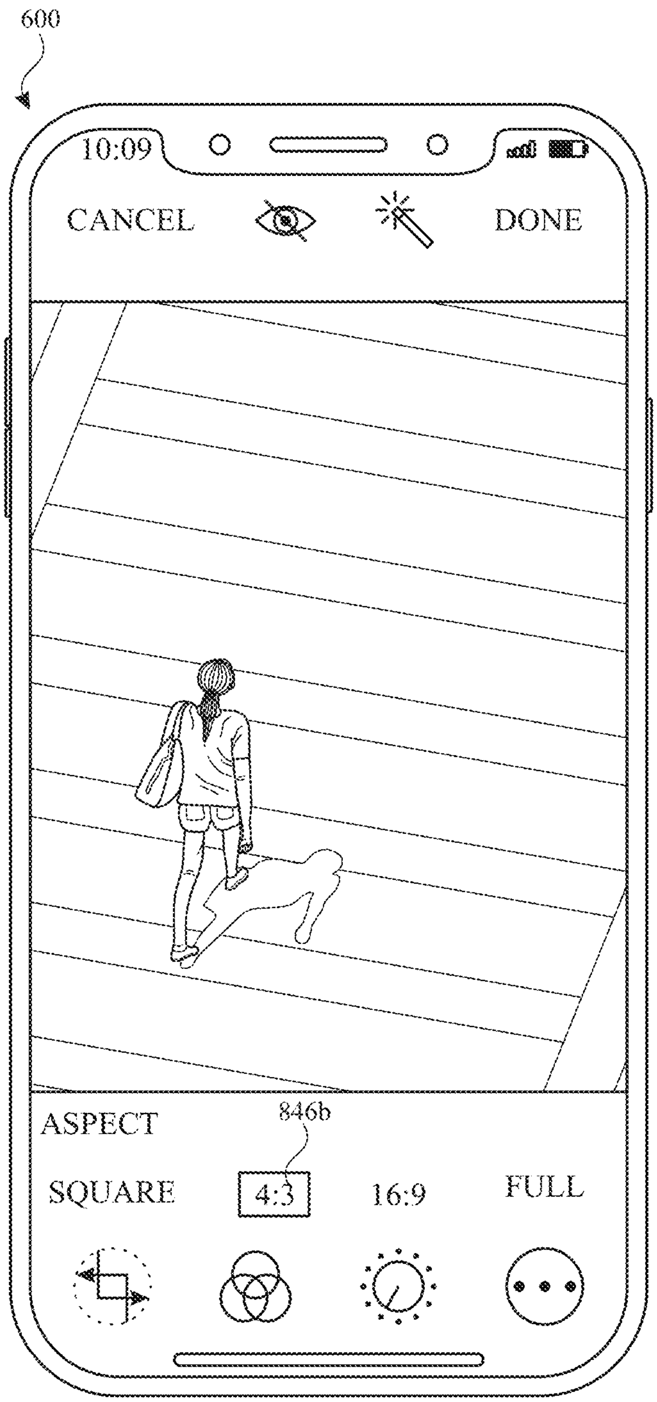
Figure 9C:
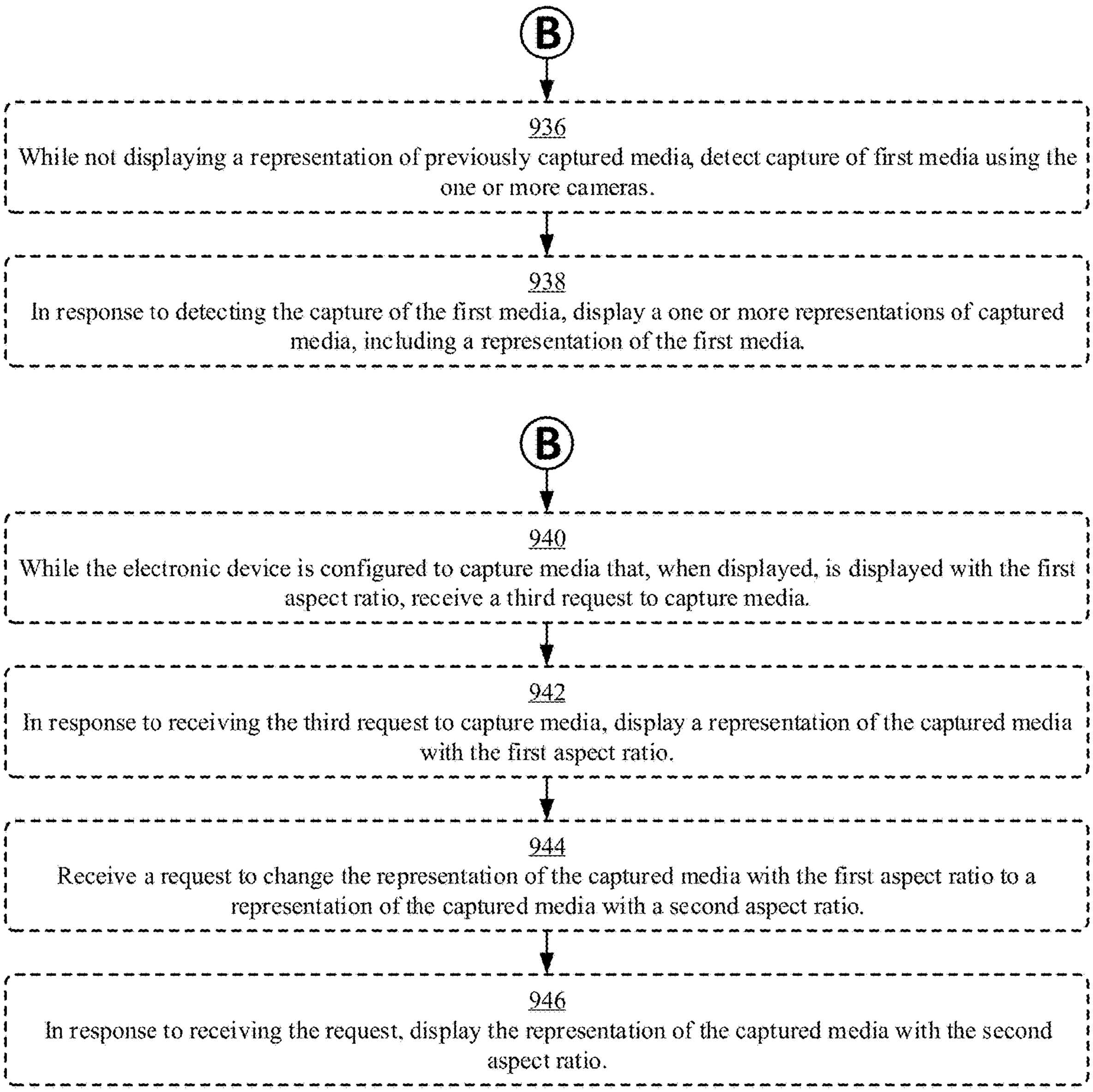

FIGS. 8A-8V illustrate exemplary techniques and user interfaces for displaying media controls using an electronic device in accordance with some embodiments. FIGS. 9A-9C are a flow diagram illustrating a method for displaying media controls using an electronic device in accordance with some embodiments. The user interfaces in FIGS. 8A-8V are used to illustrate the processes described below, including the processes in FIGS. 9A-9C.

FIGS. 10A-10K illustrate exemplary techniques and user interfaces for displaying a camera field-of-view using an electronic device in accordance with some embodiments. FIGS. 11A-11C are a flow diagram illustrating a method for displaying a camera field-of-view using an electronic device in accordance with some embodiments. The user interfaces in FIGS. 10A-10K are used to illustrate the processes described below, including the processes in FIGS. 11A-11C.

FIGS. 12A-12K illustrate exemplary techniques and user interfaces for accessing media items using an electronic device in accordance with some embodiments. FIGS. 13A-13B are a flow diagram illustrating a method for accessing media items using an electronic device in accordance with some embodiments. The user interfaces in FIGS. 12A-12K are used to illustrate the processes described below, including the processes in FIGS. 13A-13B.

Figure 14A:
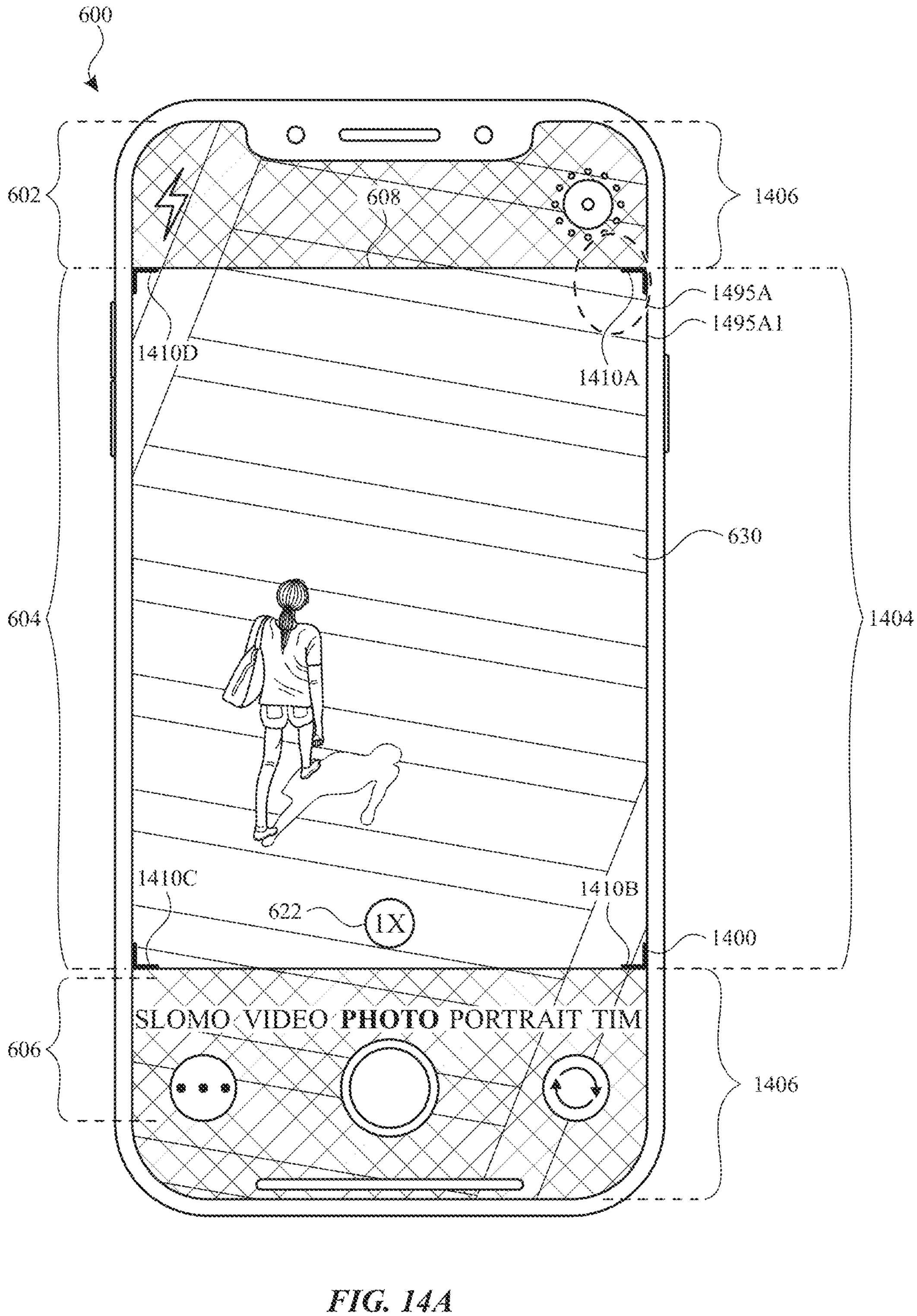
FIGS. 14A-14U illustrate exemplary techniques and user interfaces for modifying media items using an electronic device in accordance with some embodiments.
Figure 14B:
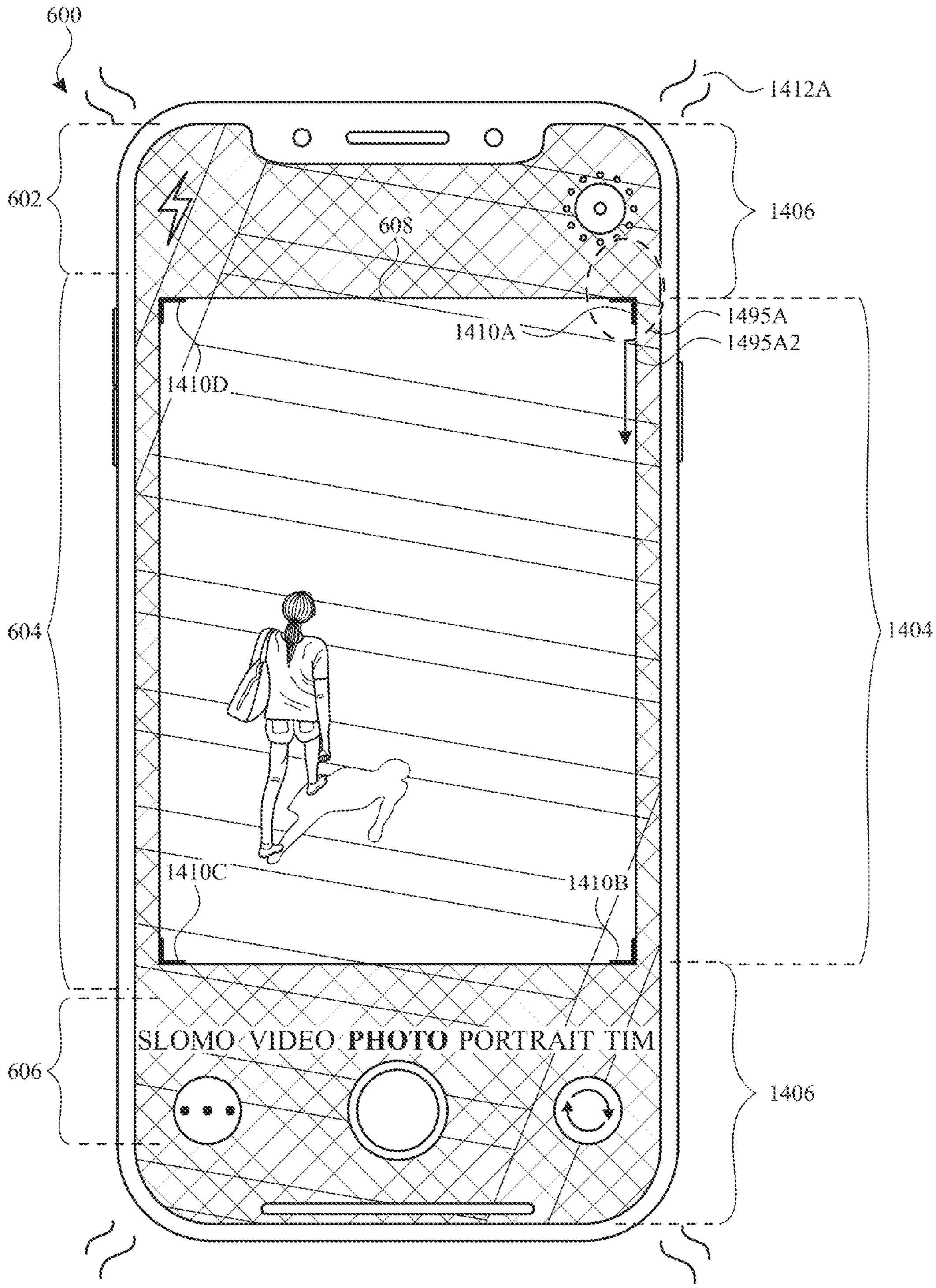
Figure 14C:
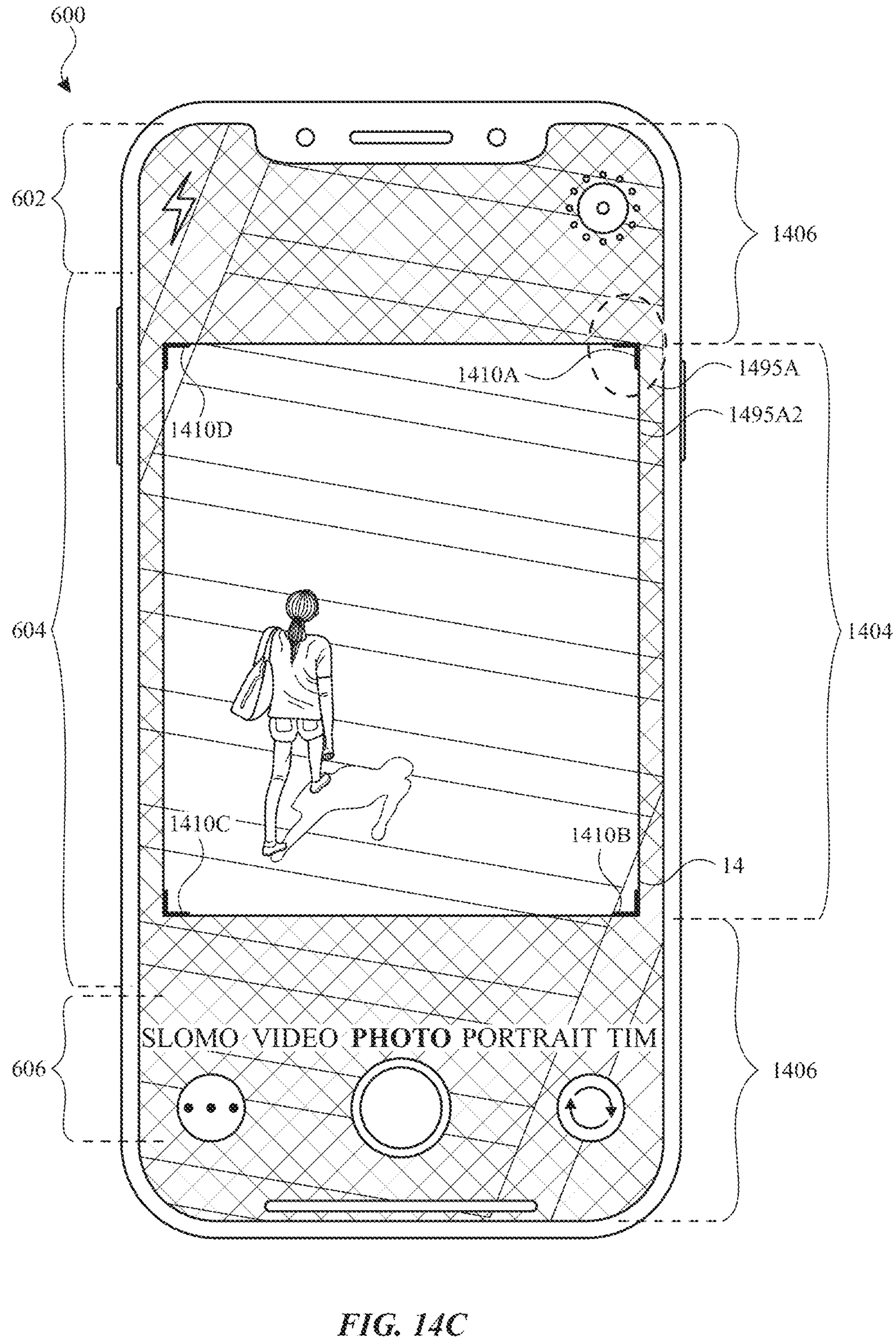
Figure 14D:
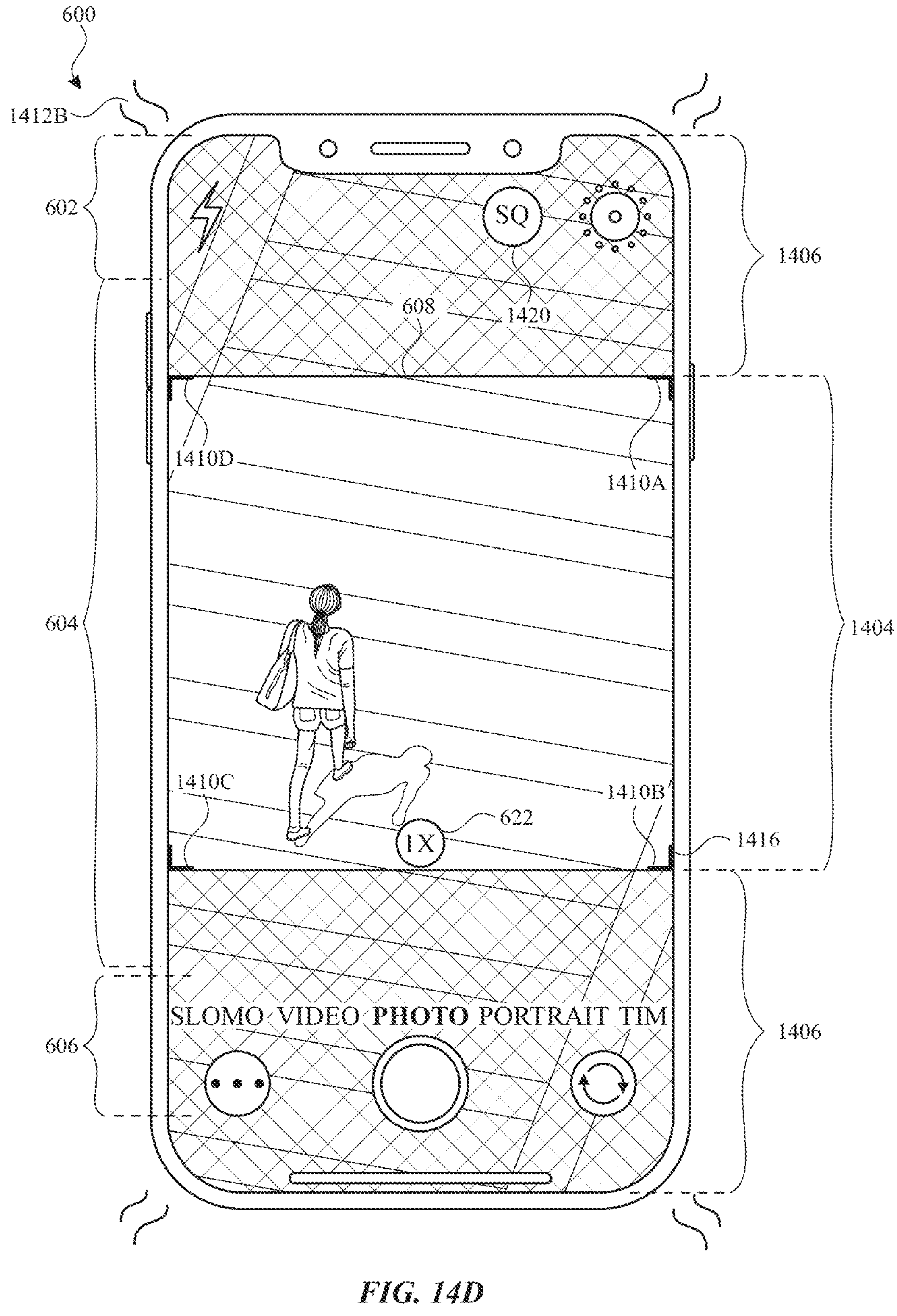
Figure 14E:
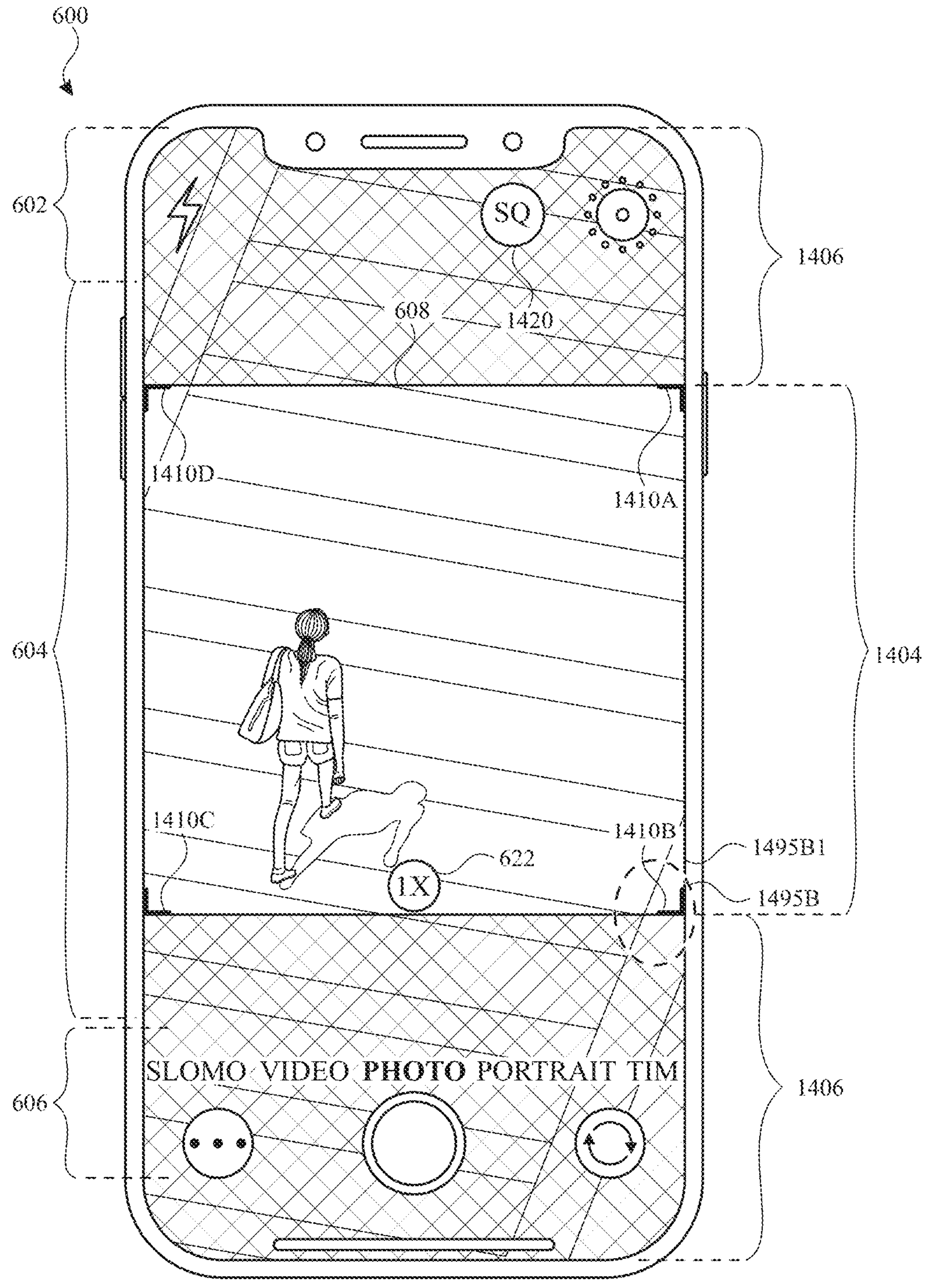
Figure 14F:
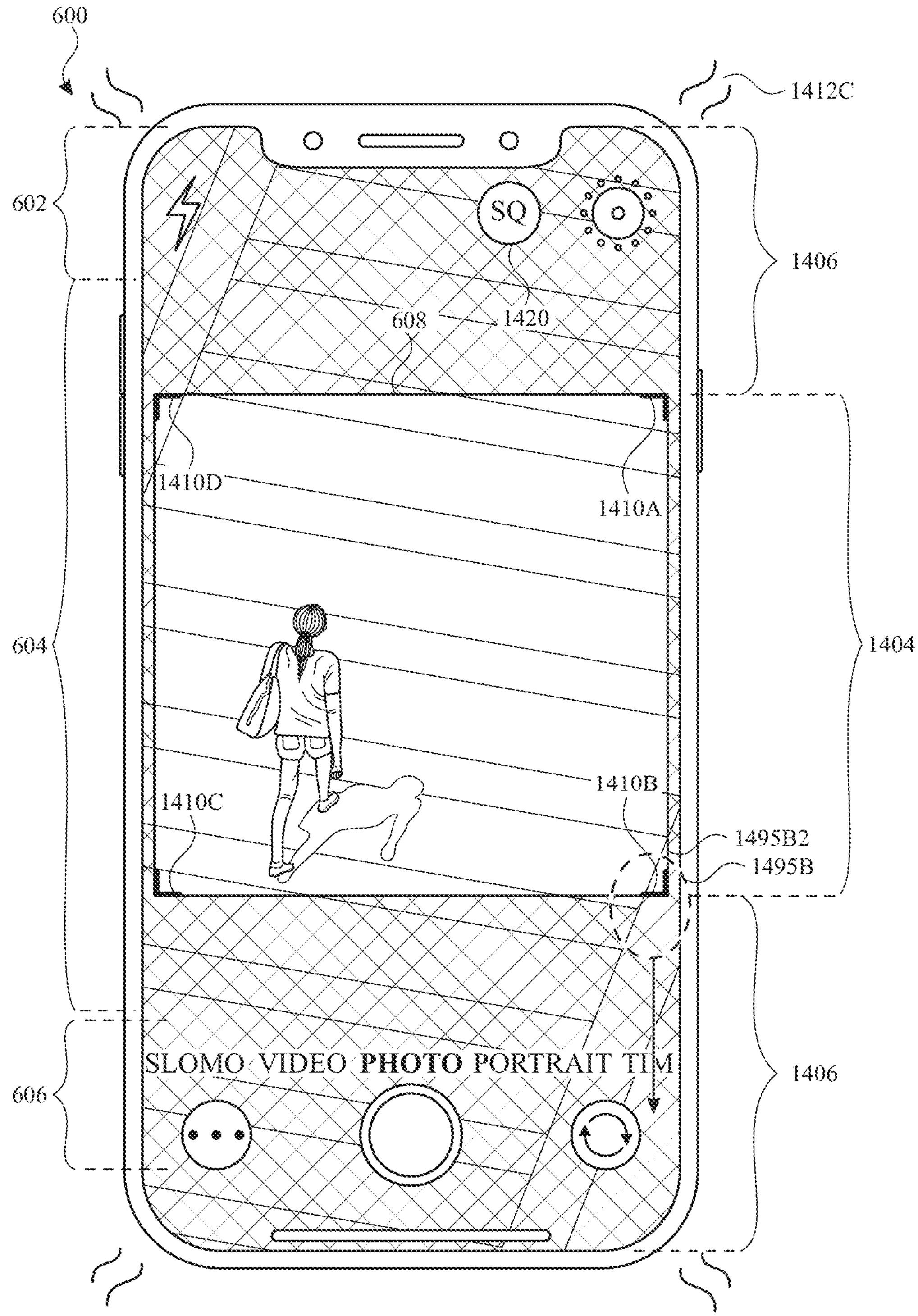
Figure 14G:
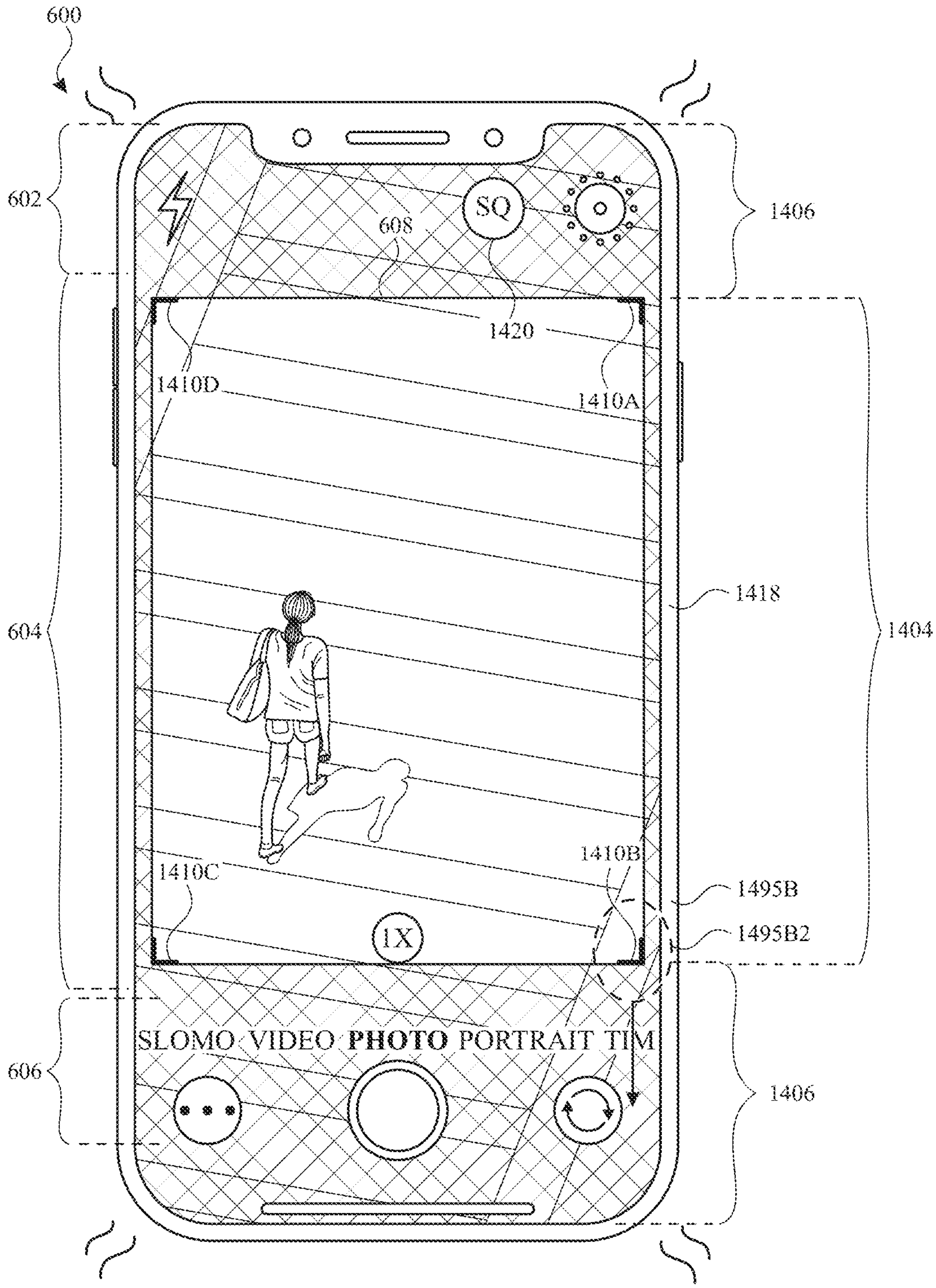
Figure 14H:
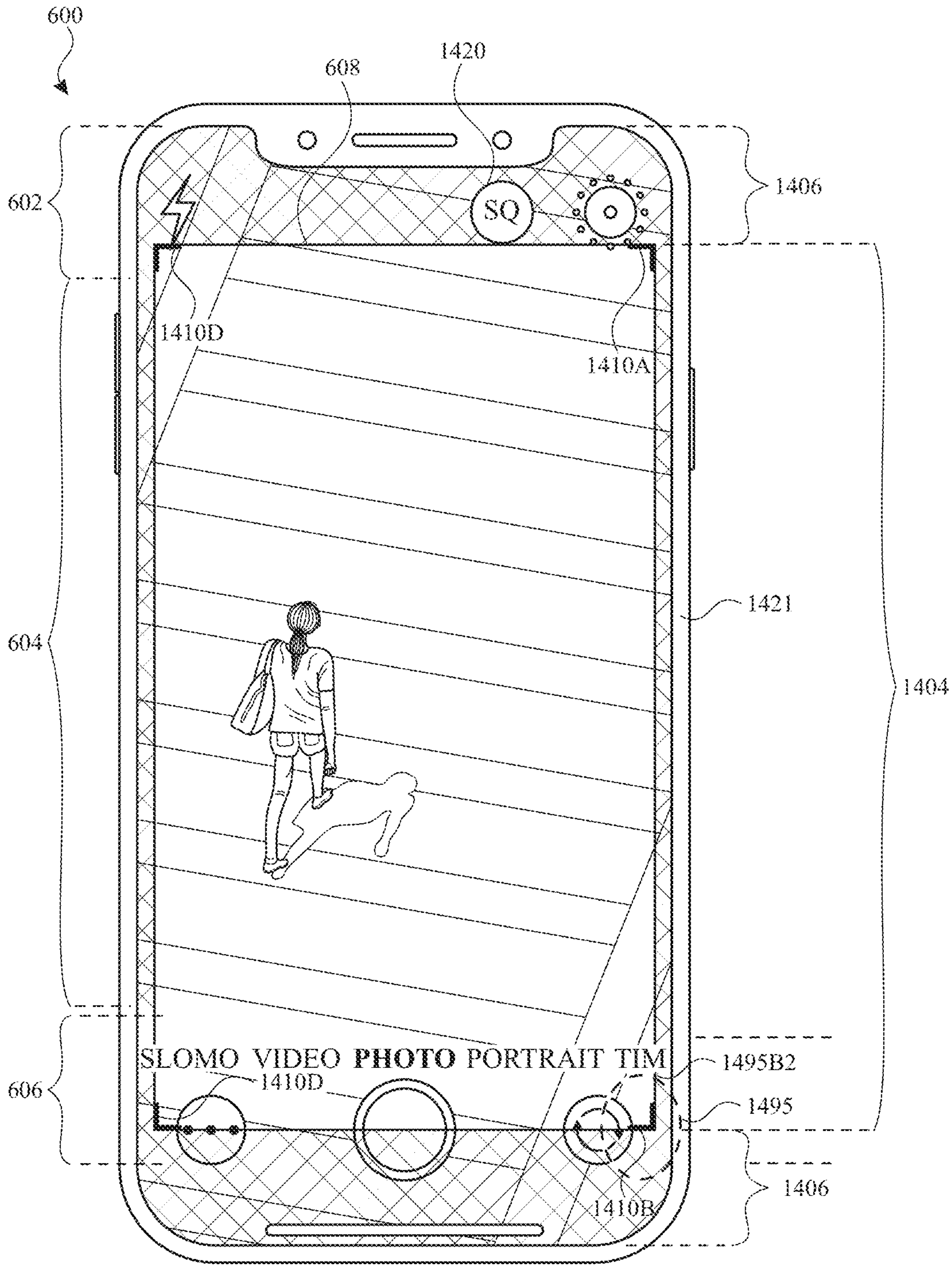
Figure 14I:
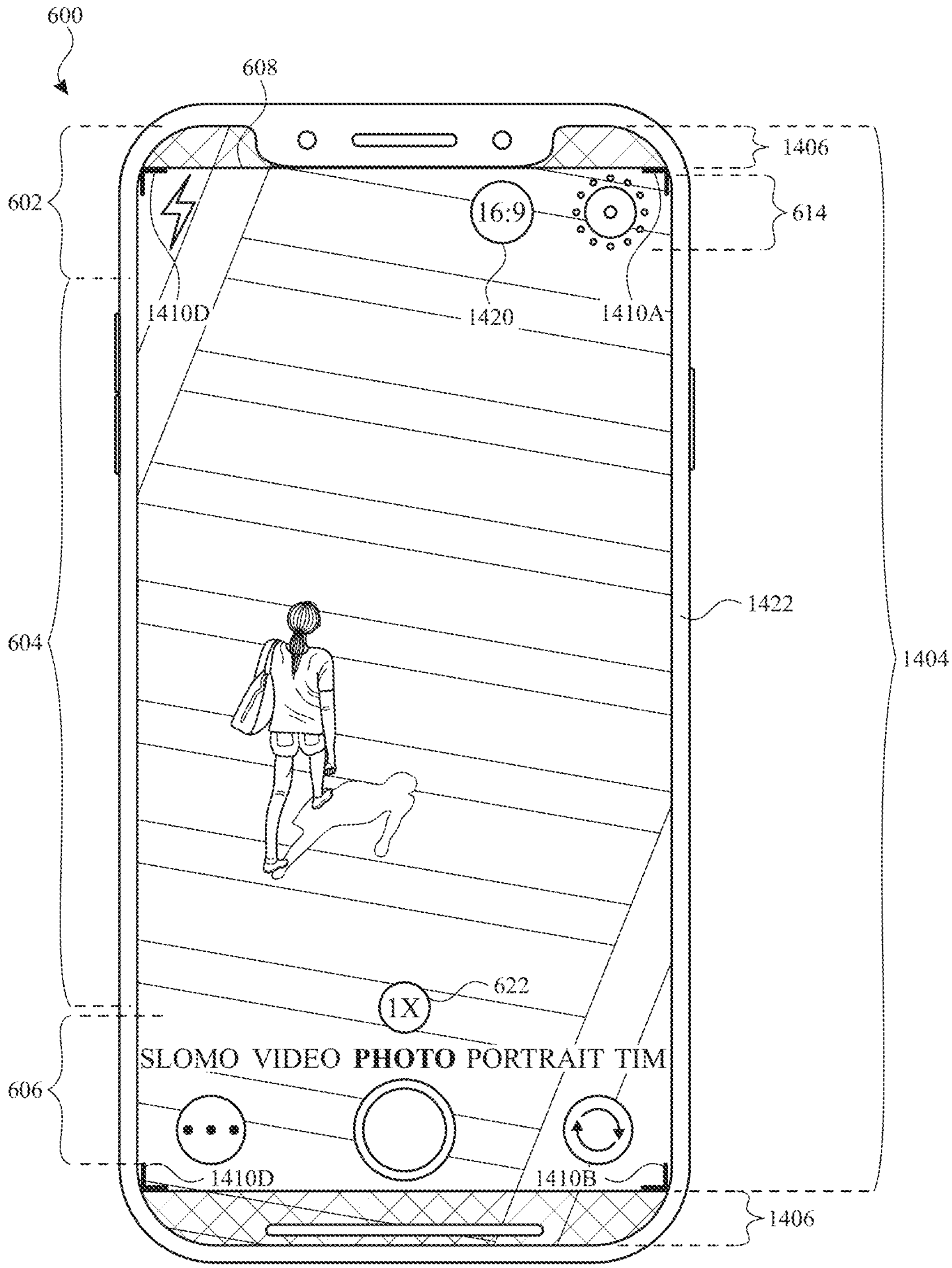
Figure 14J:
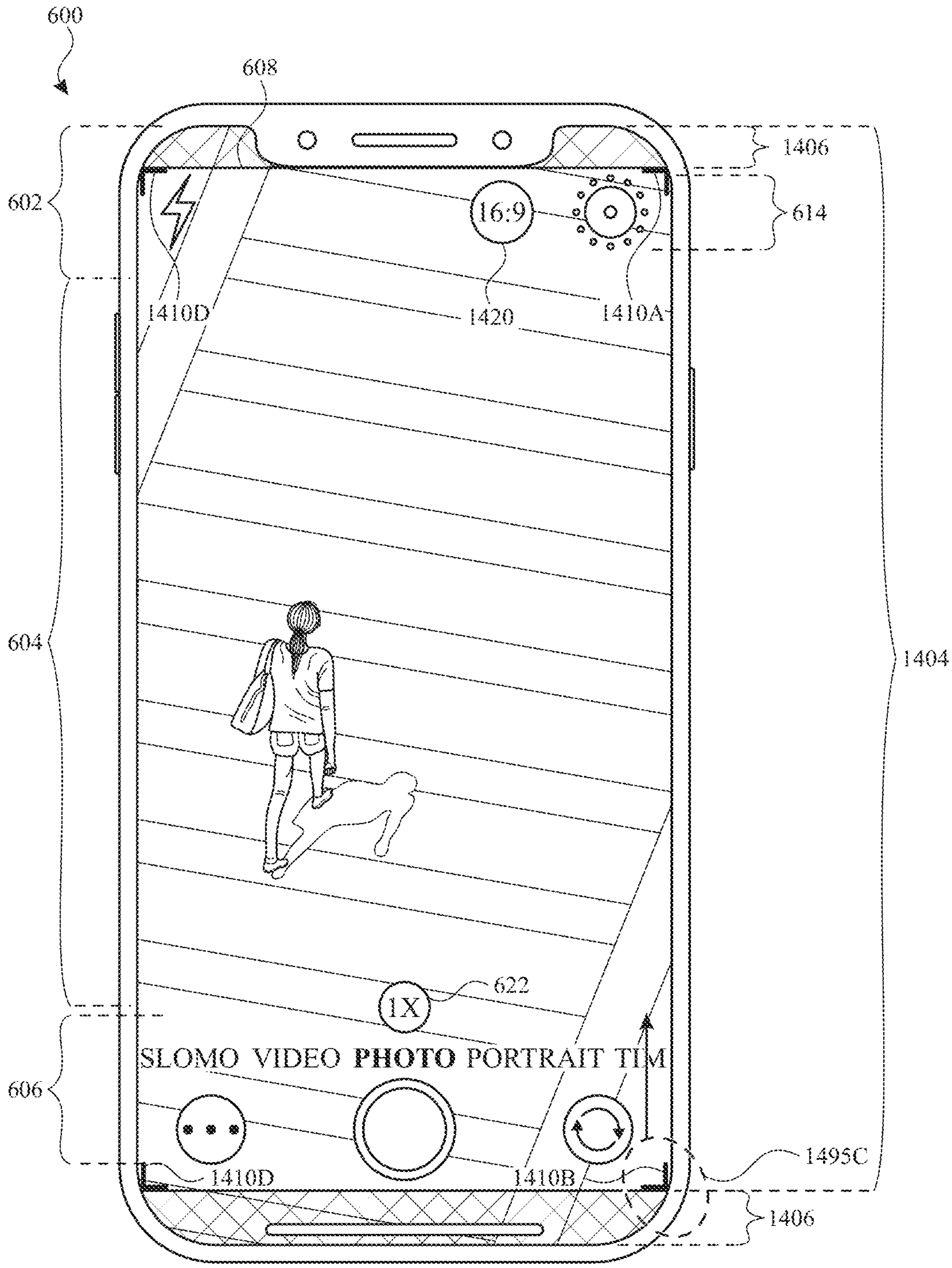
Figure 14K:
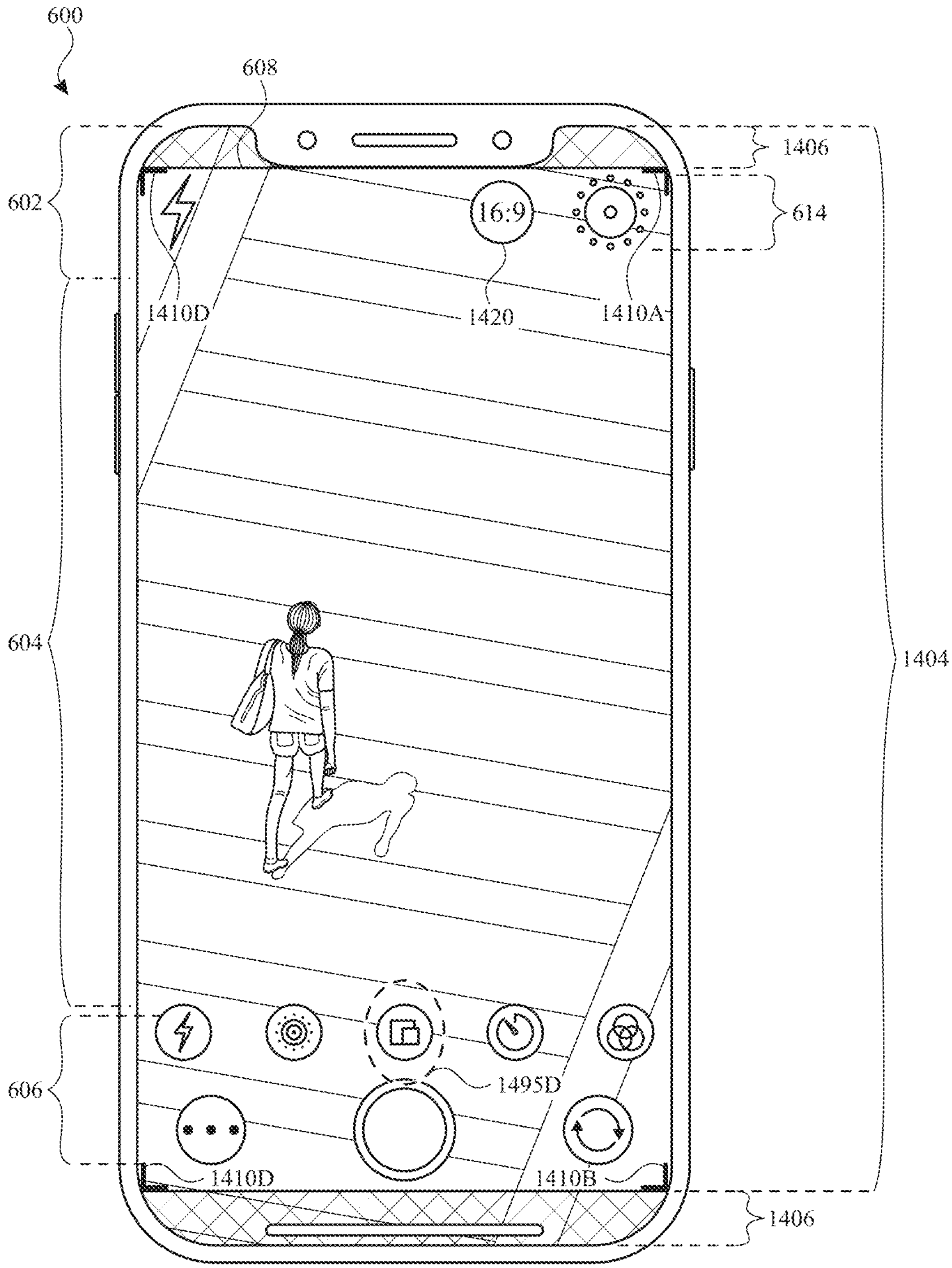
Figure 14L:
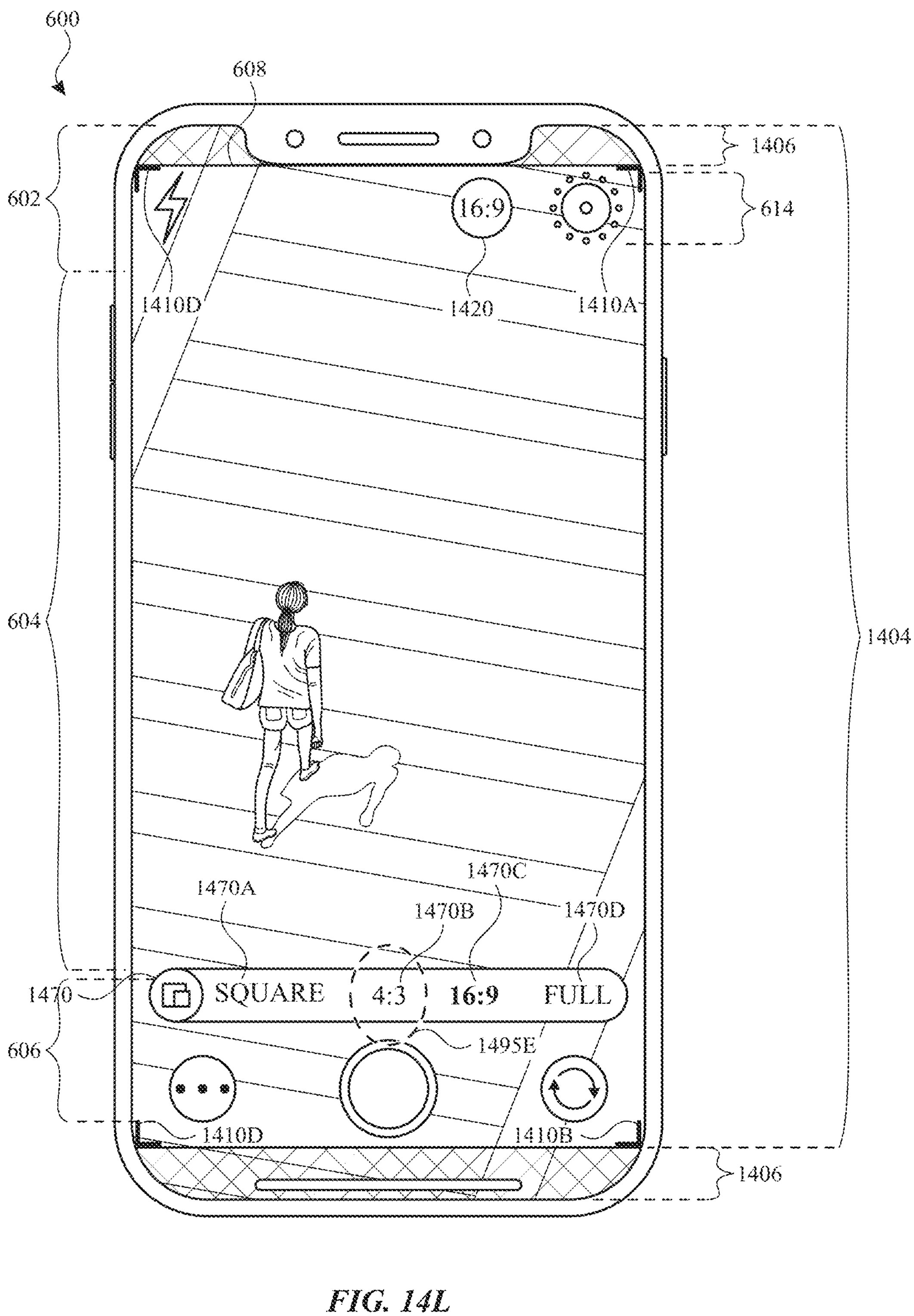
Figure 14M:
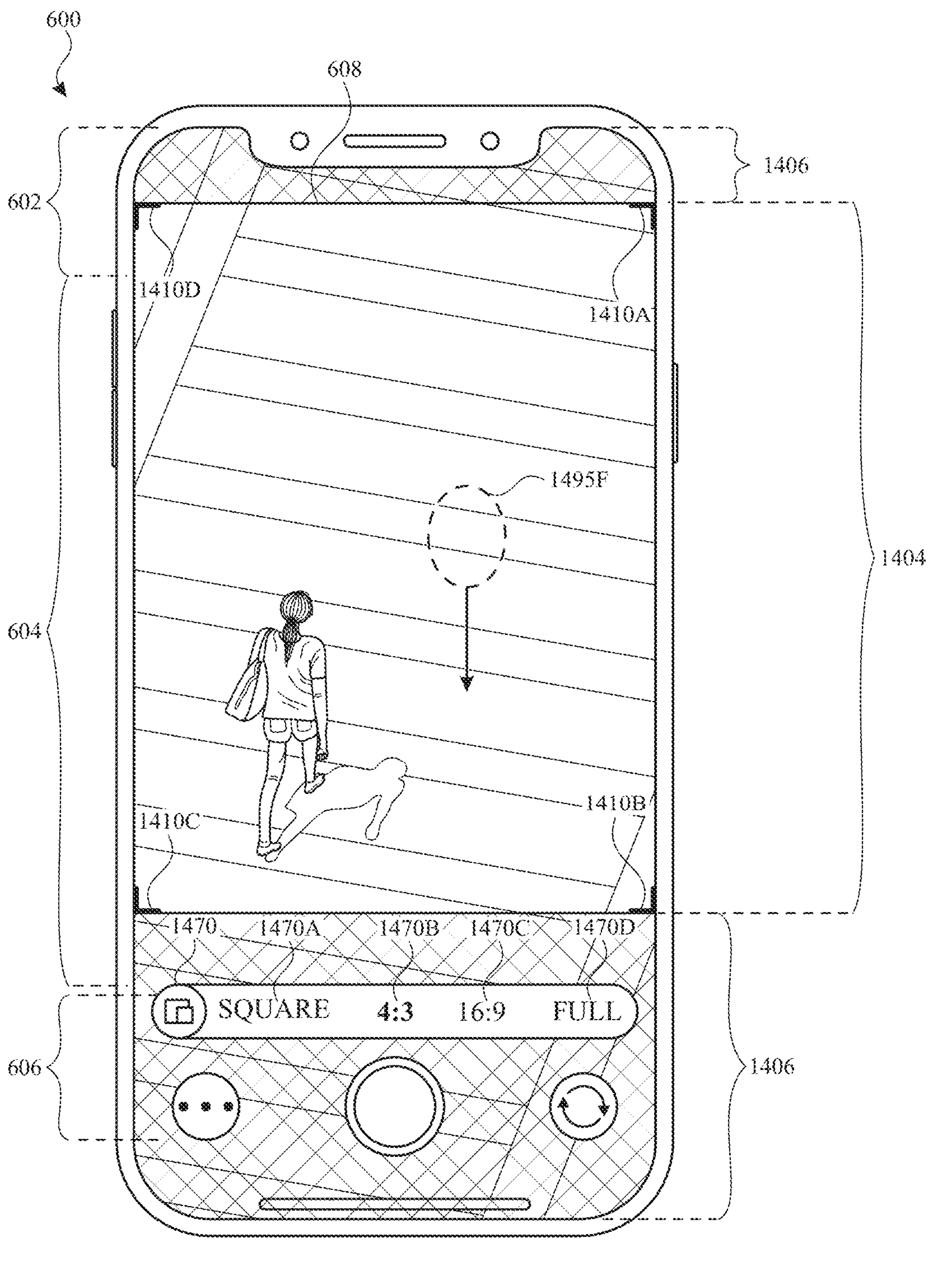
Figure 14N:
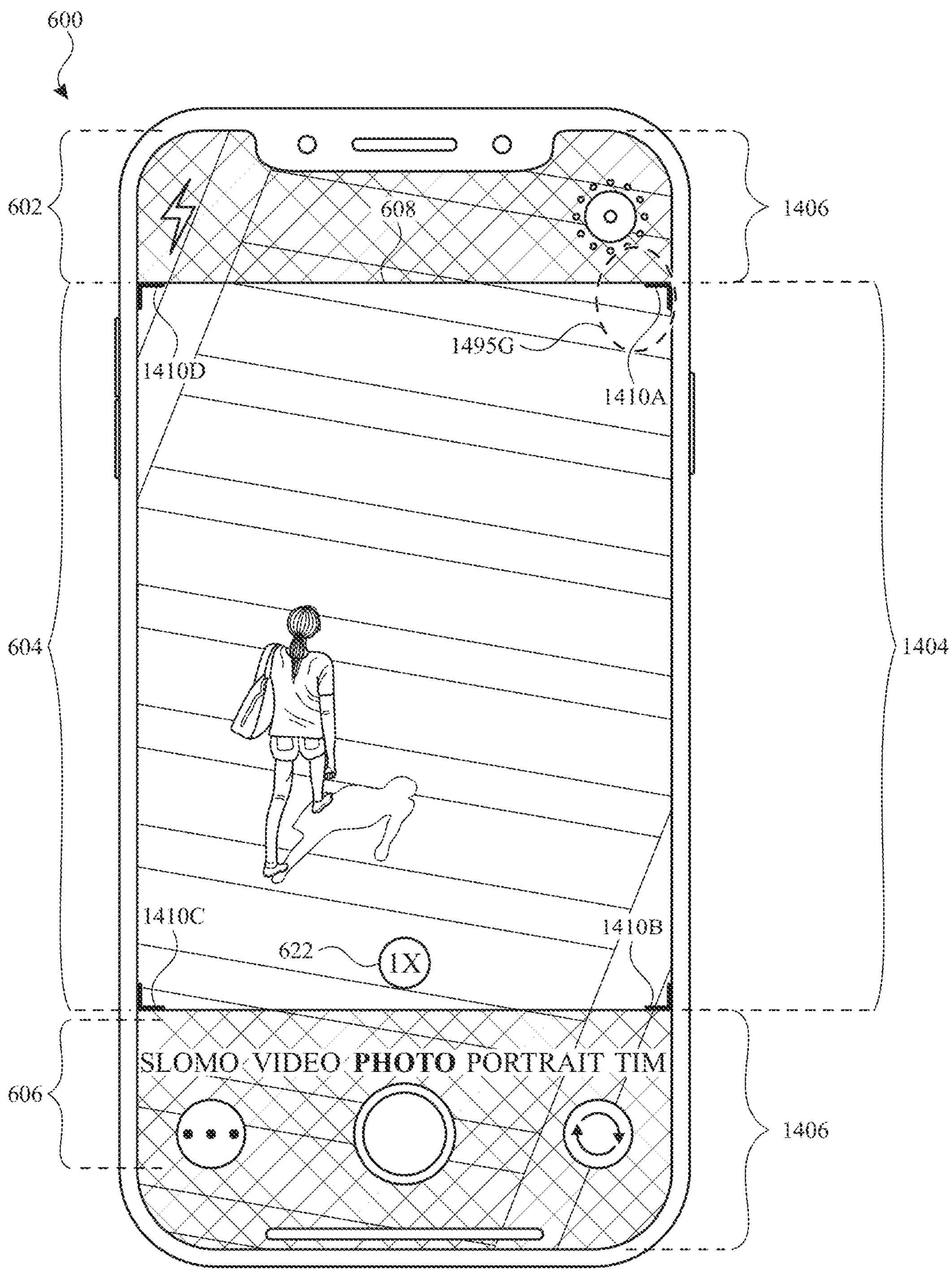
Figure 14O:
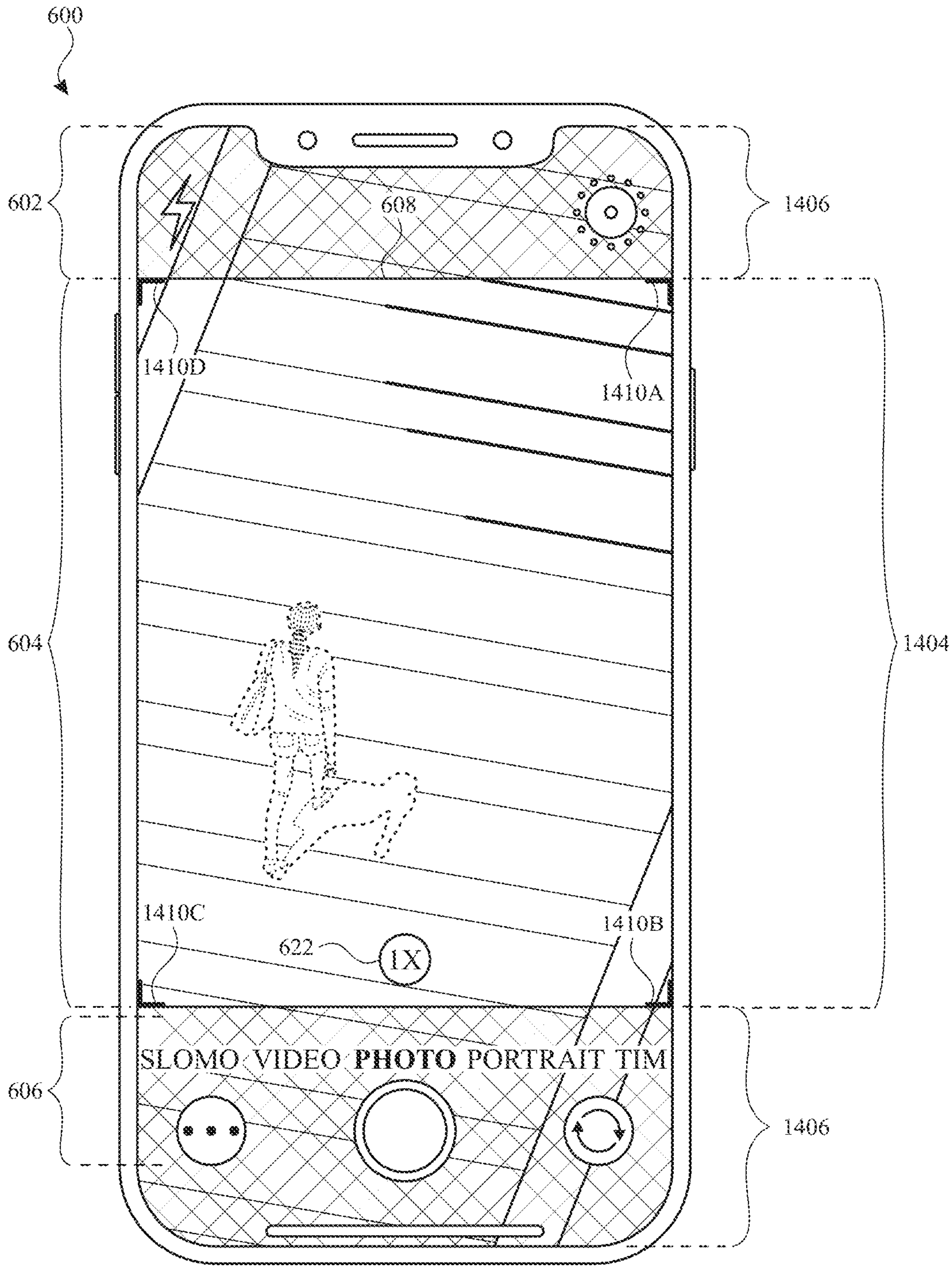
Figure 14P:
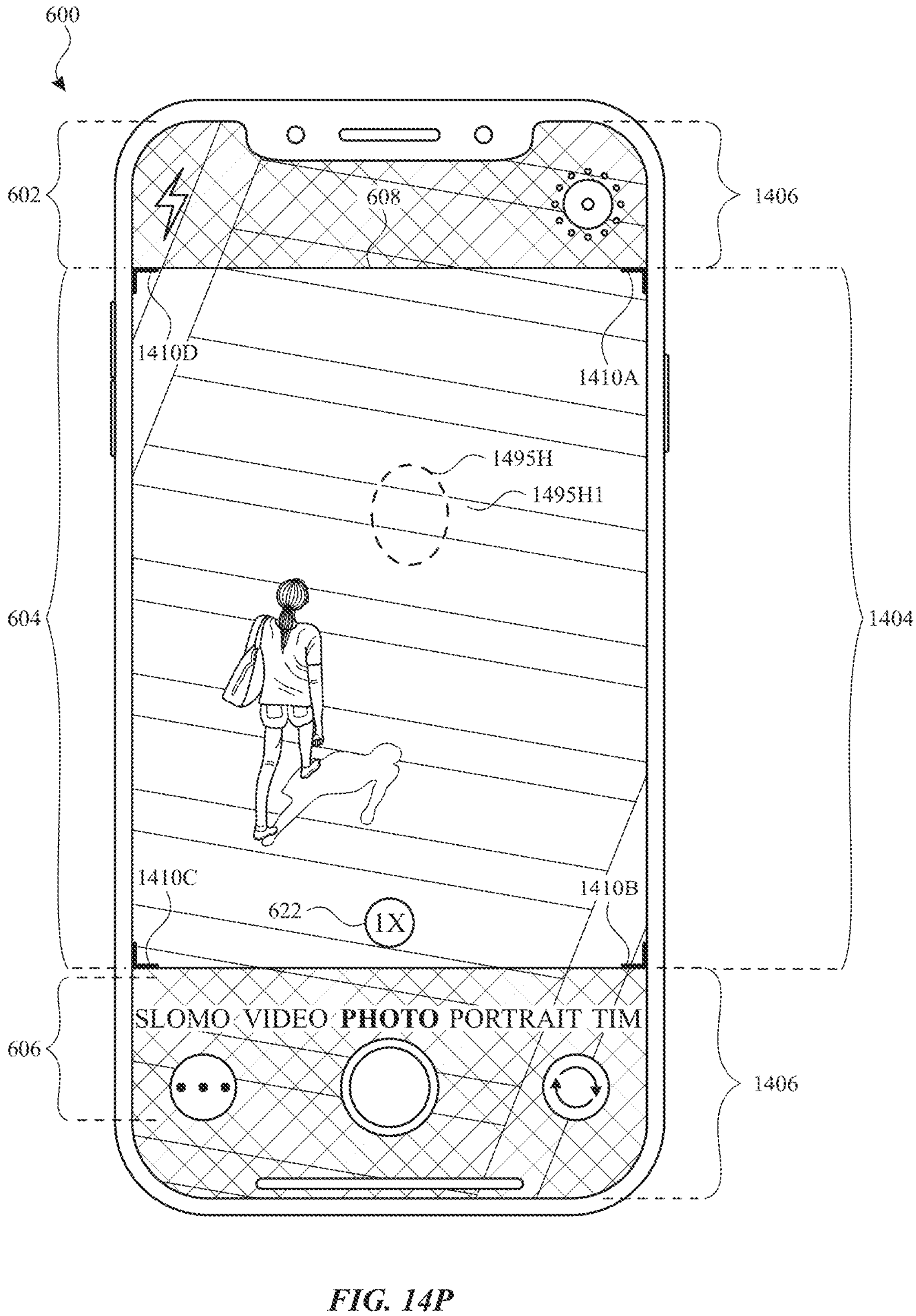
Figure 14Q:
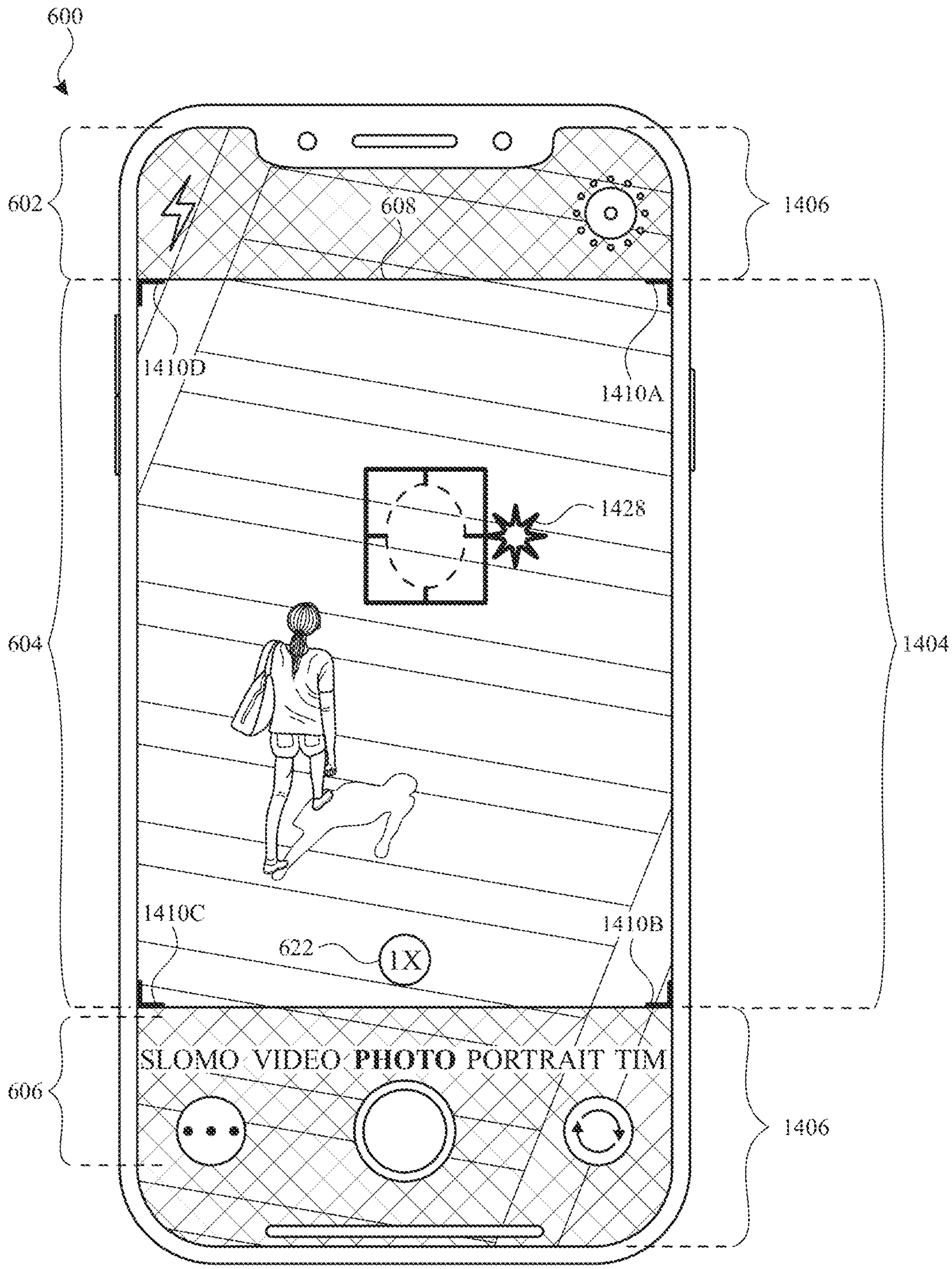
Figure 14R:
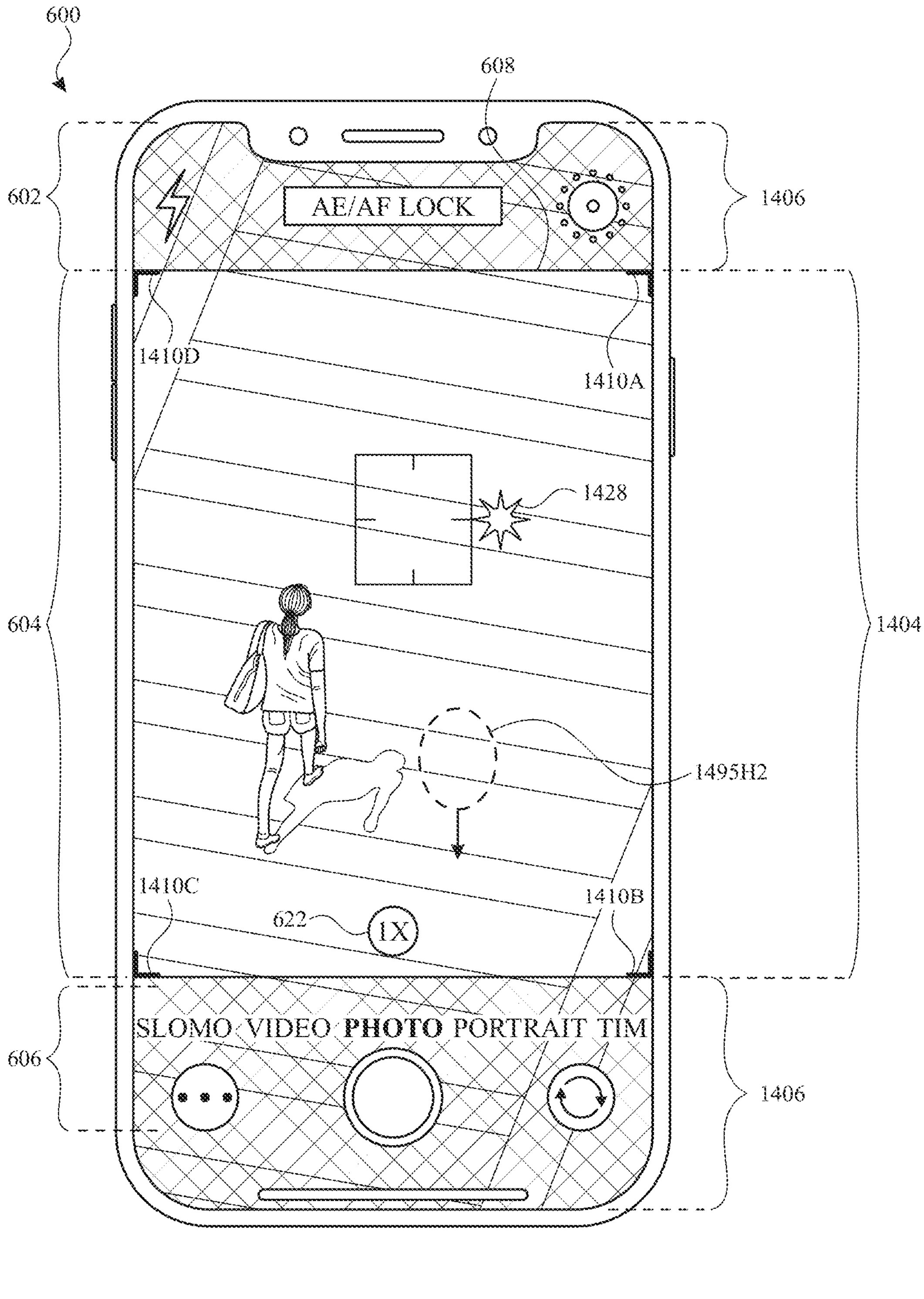
Figure 14S:
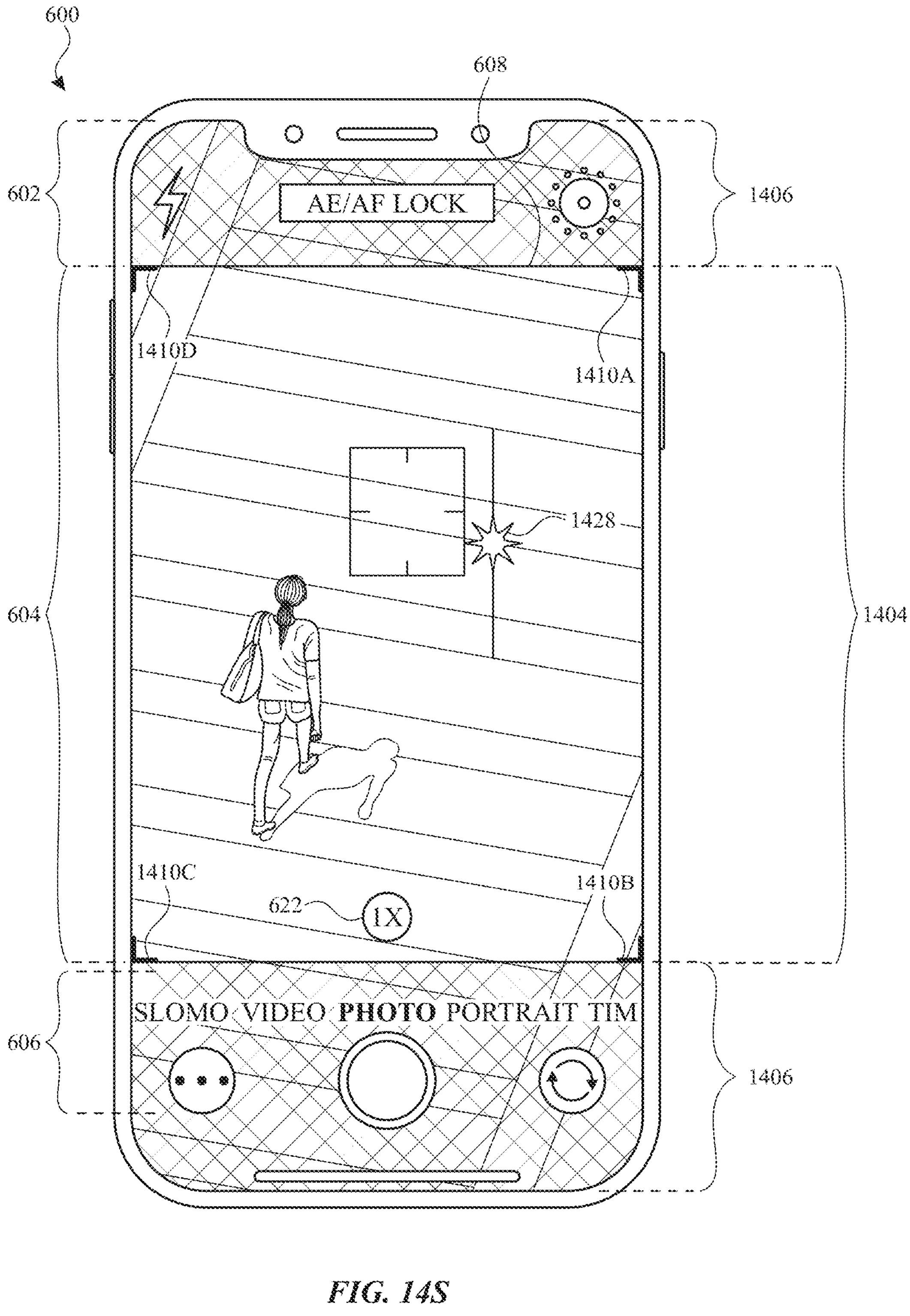
Figure 14T:
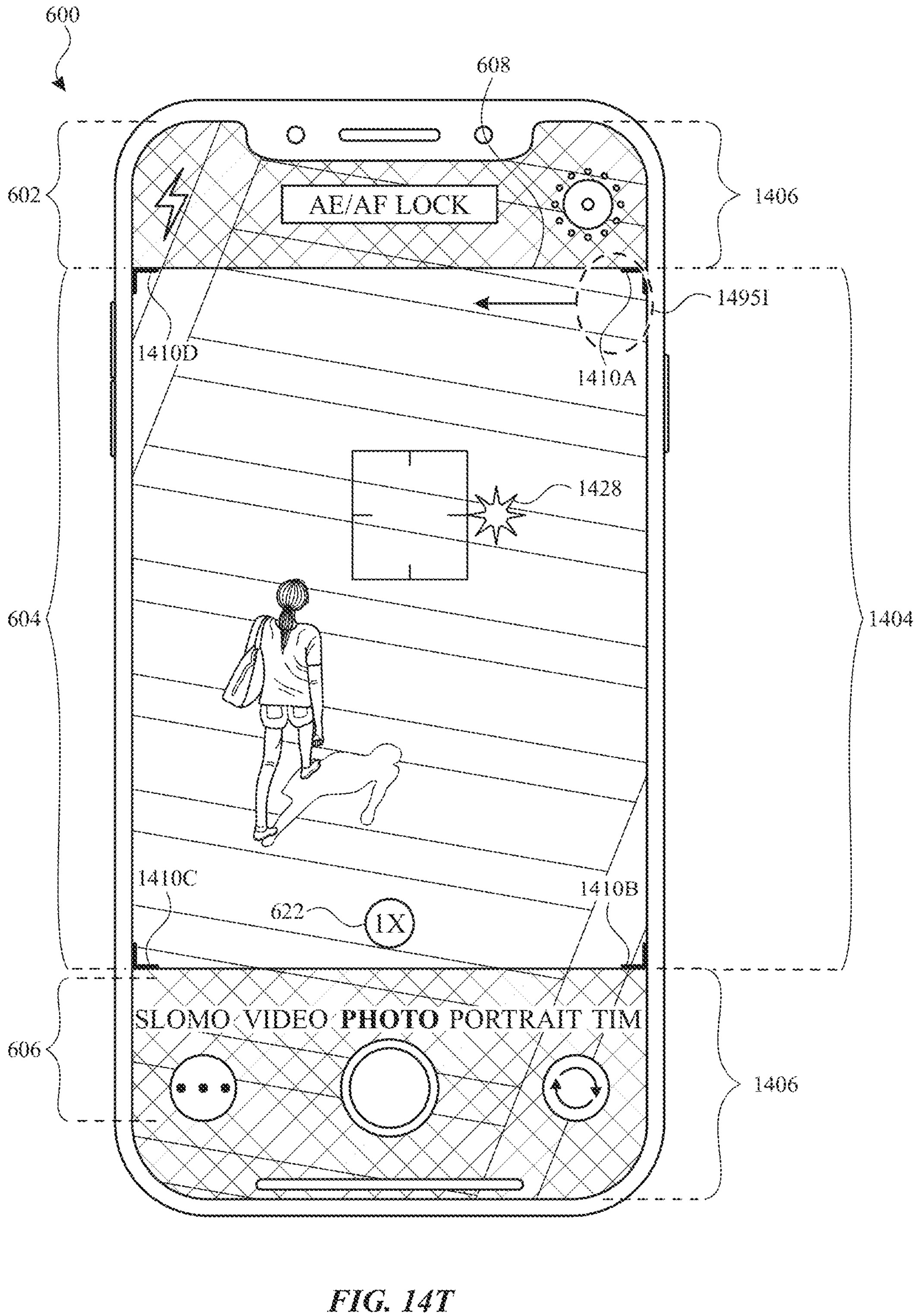
Figure 14U:
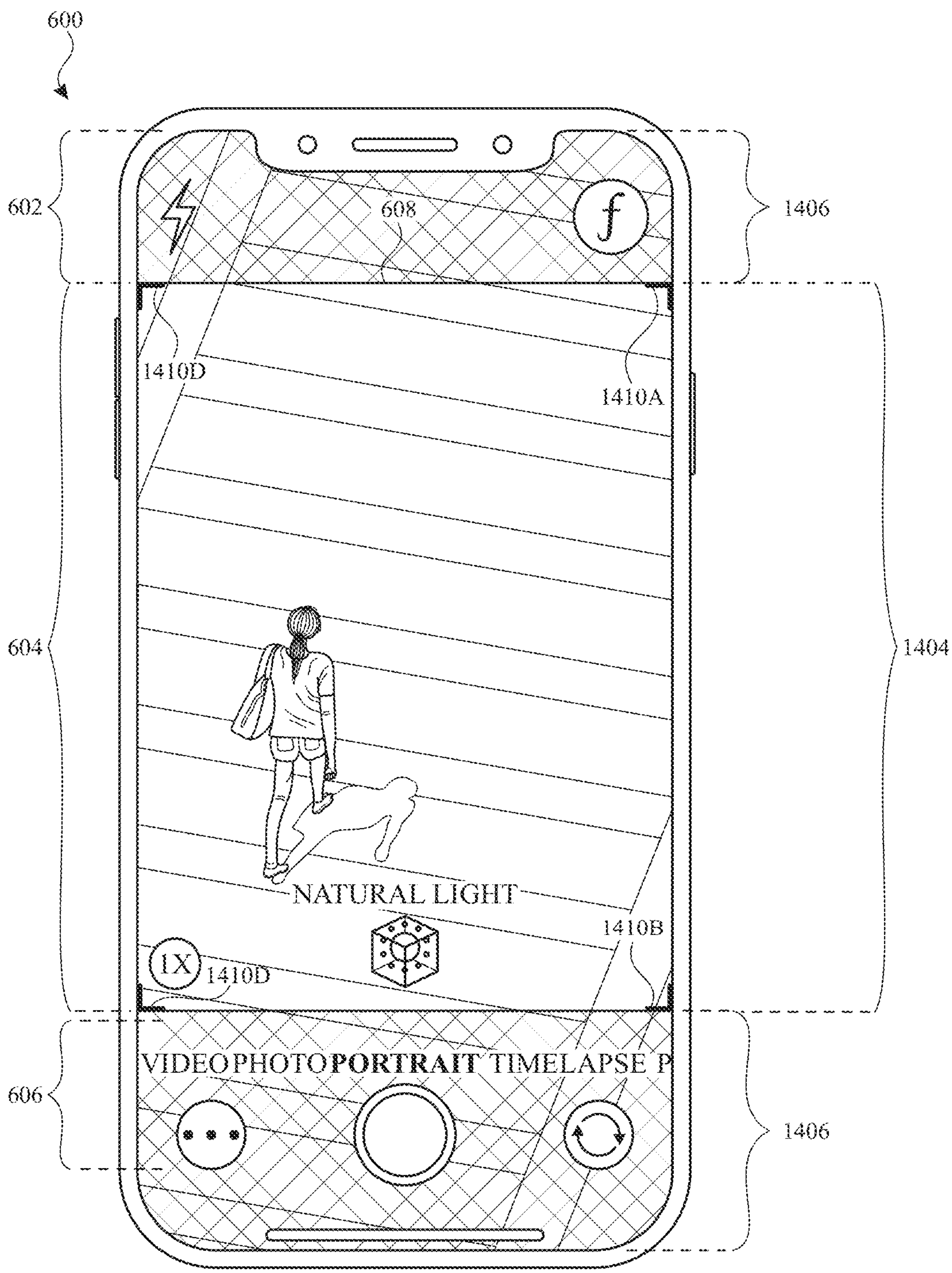
Figure 15A:
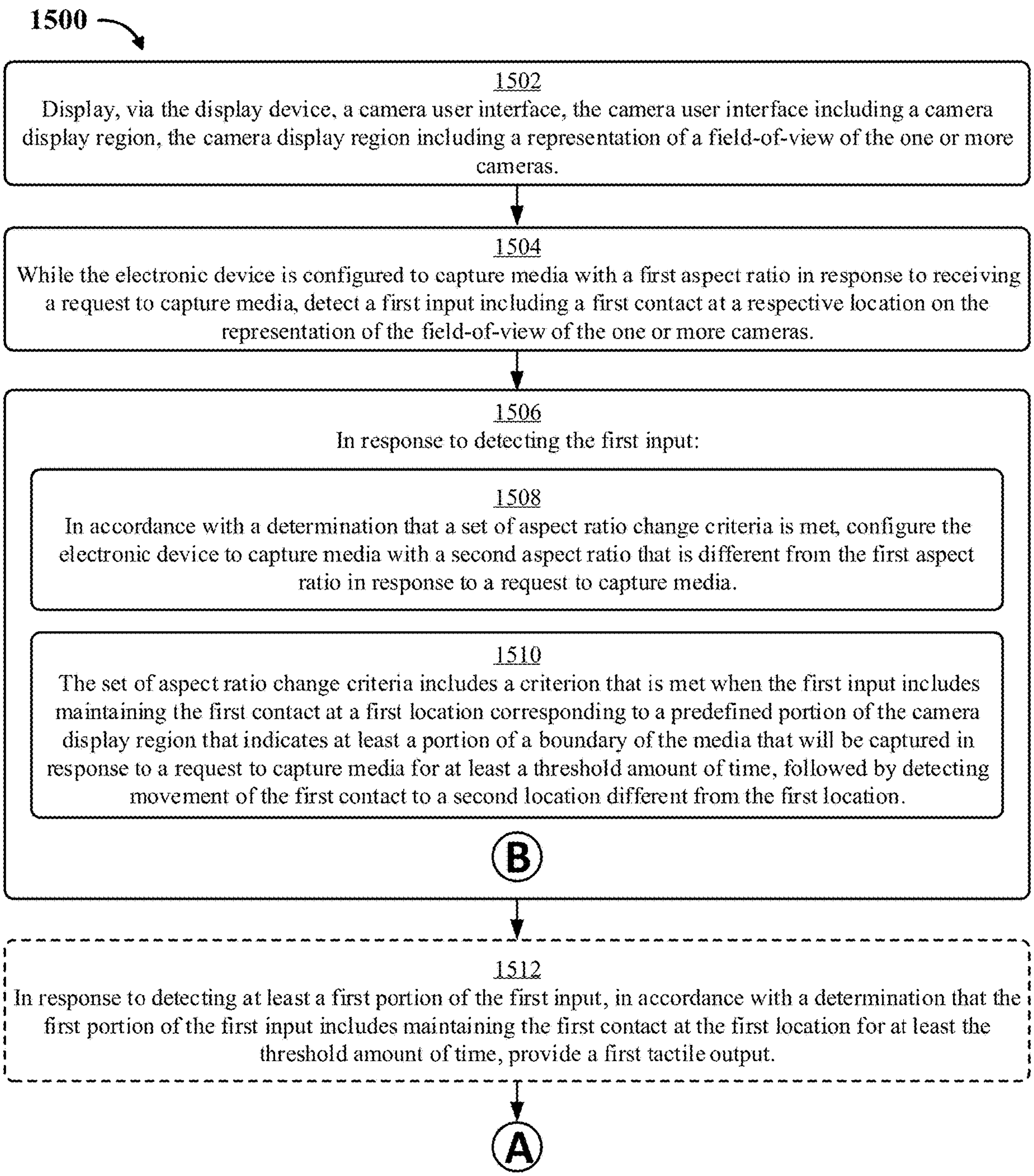

FIGS. 14A-14U illustrate exemplary techniques and user interfaces for modifying media items using an electronic device in accordance with some embodiments. FIGS. 15A-15C are a flow diagram illustrating a method for modifying media items using an electronic device in accordance with some embodiments. The user interfaces in FIGS. 14A-14U are used to illustrate the processes described below, including the processes in FIGS. 15A-15C.

Figure 16A:
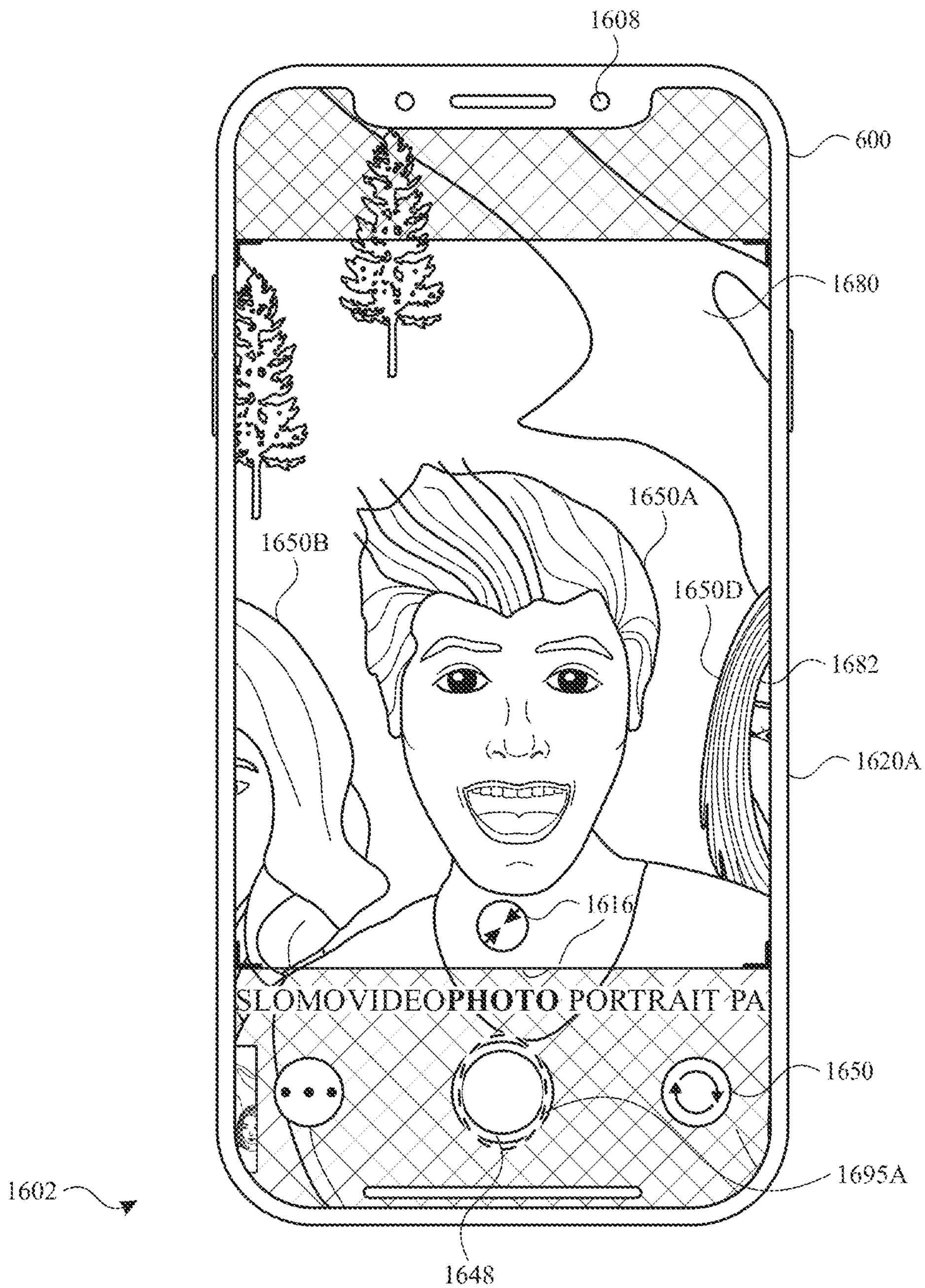
FIGS. 16A-16Q illustrate exemplary techniques and user interfaces for varying zoom levels using an electronic device in accordance with some embodiments.
Figure 16B:
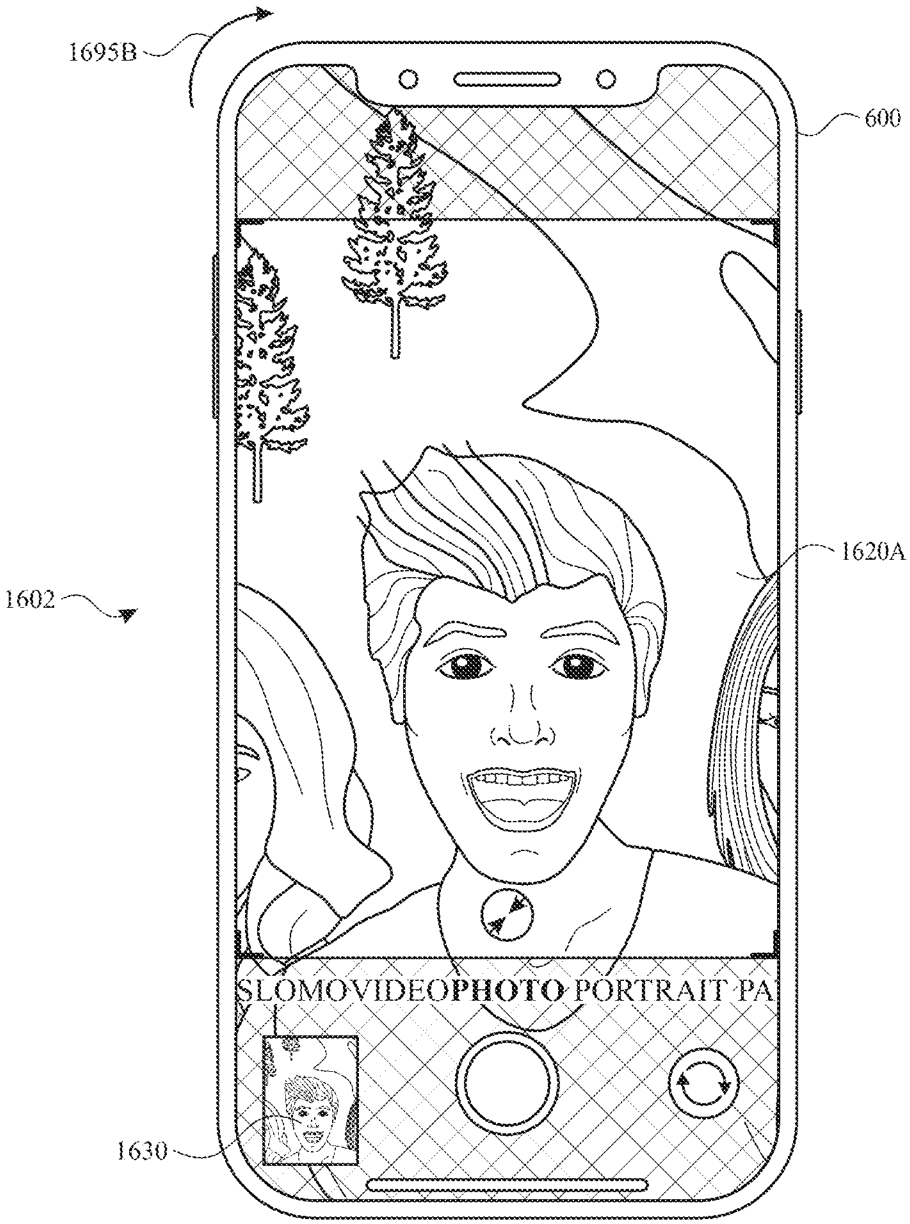
Figure 16C:
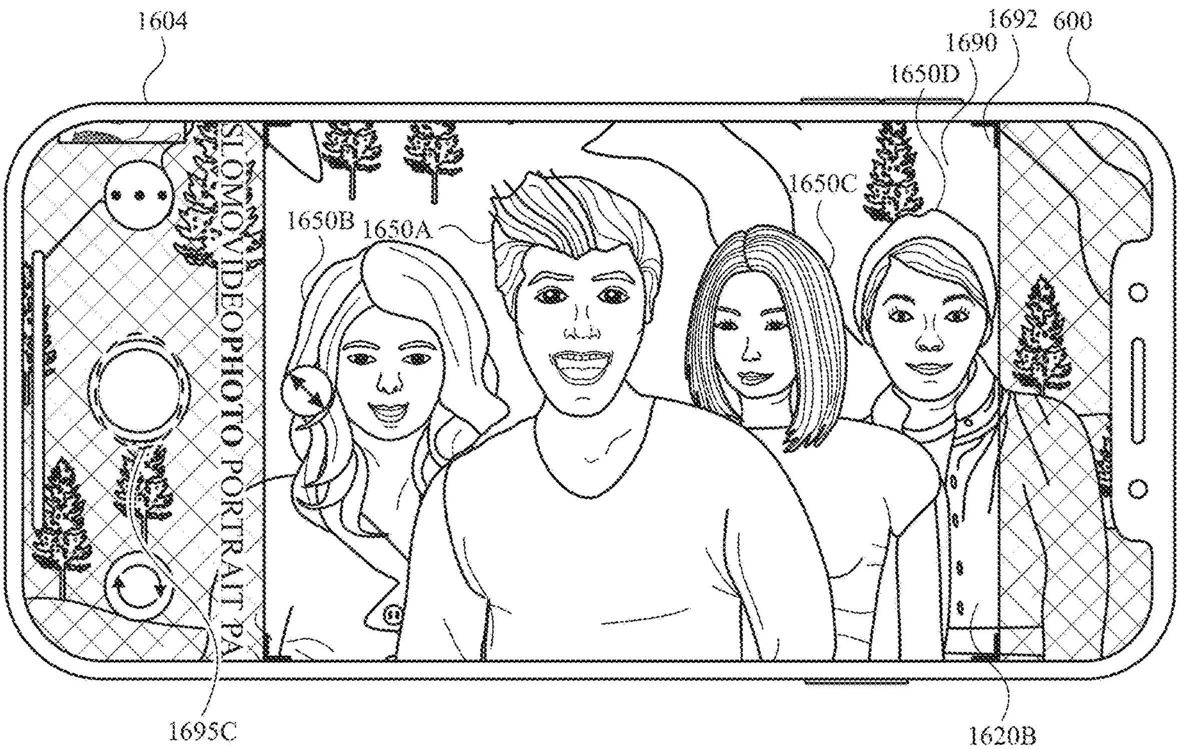
Figure 16D:
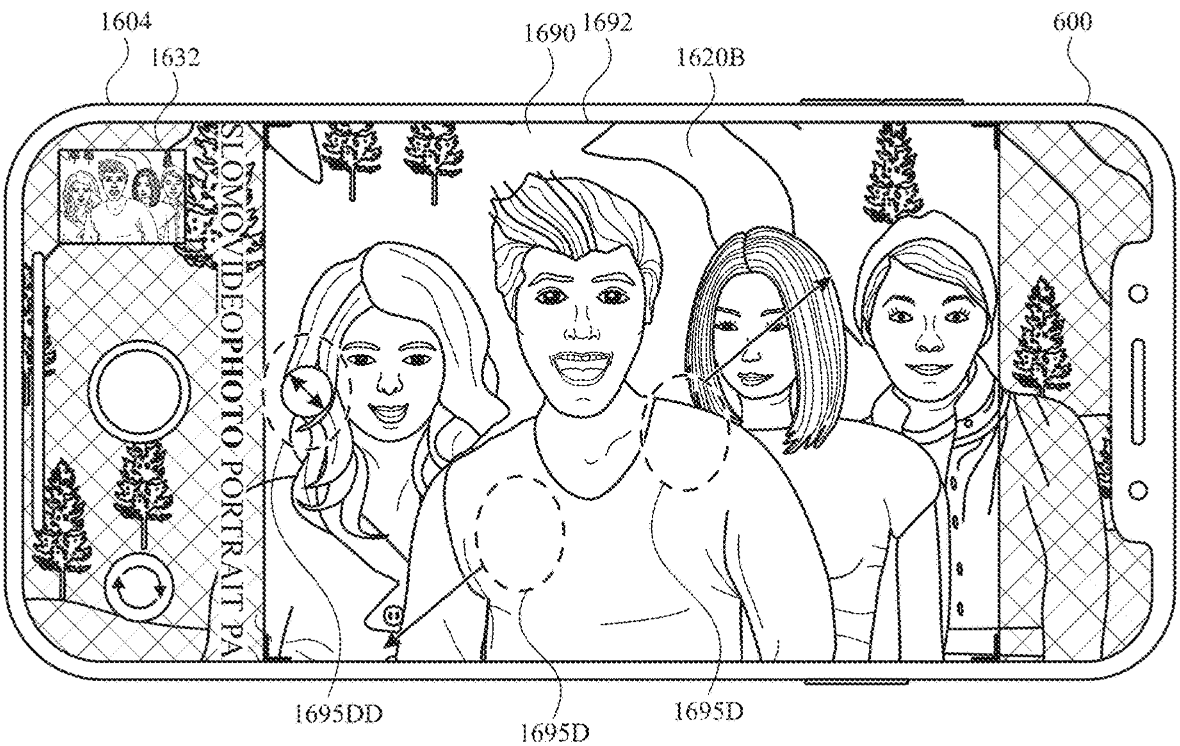
Figure 16E:
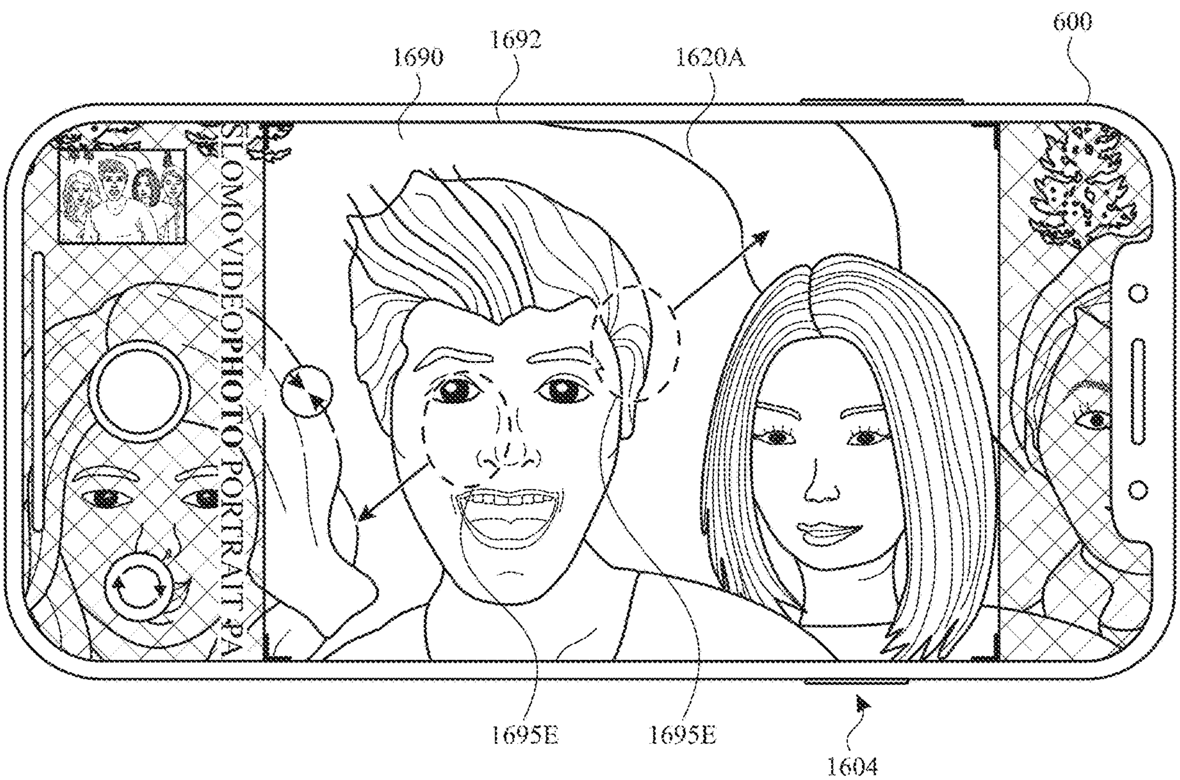
Figure 16F:
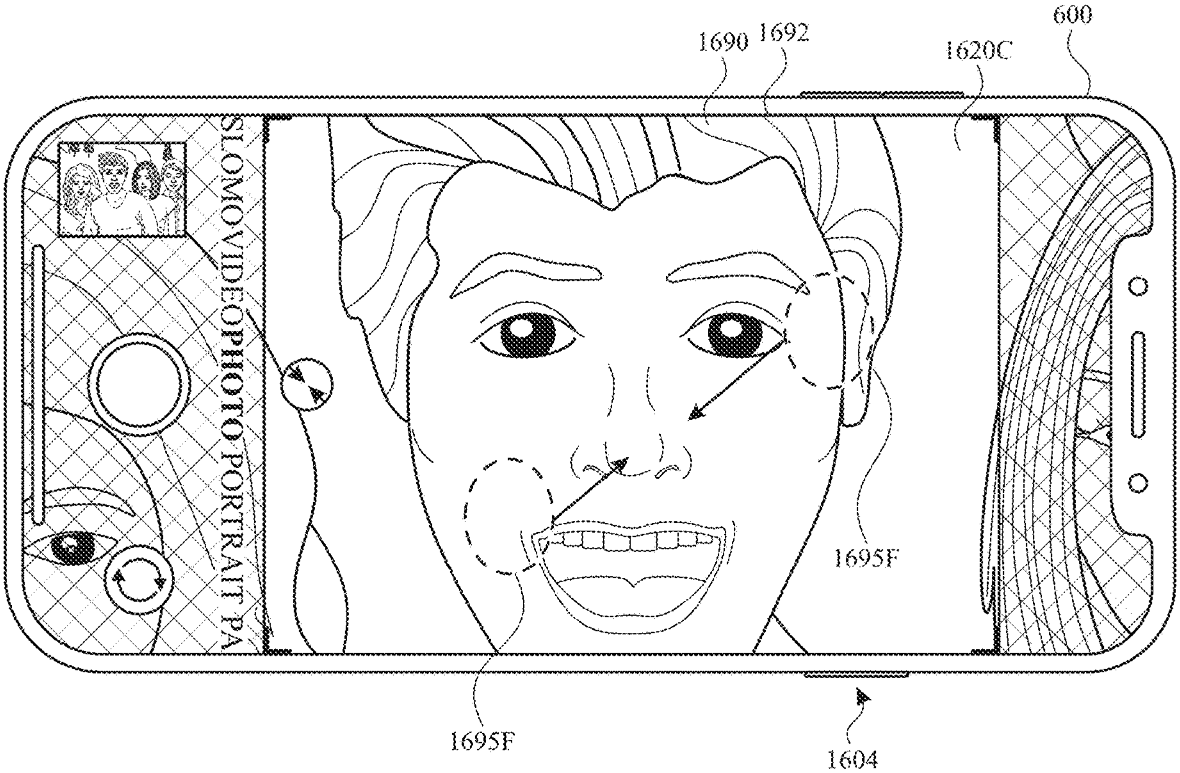
Figure 16G:
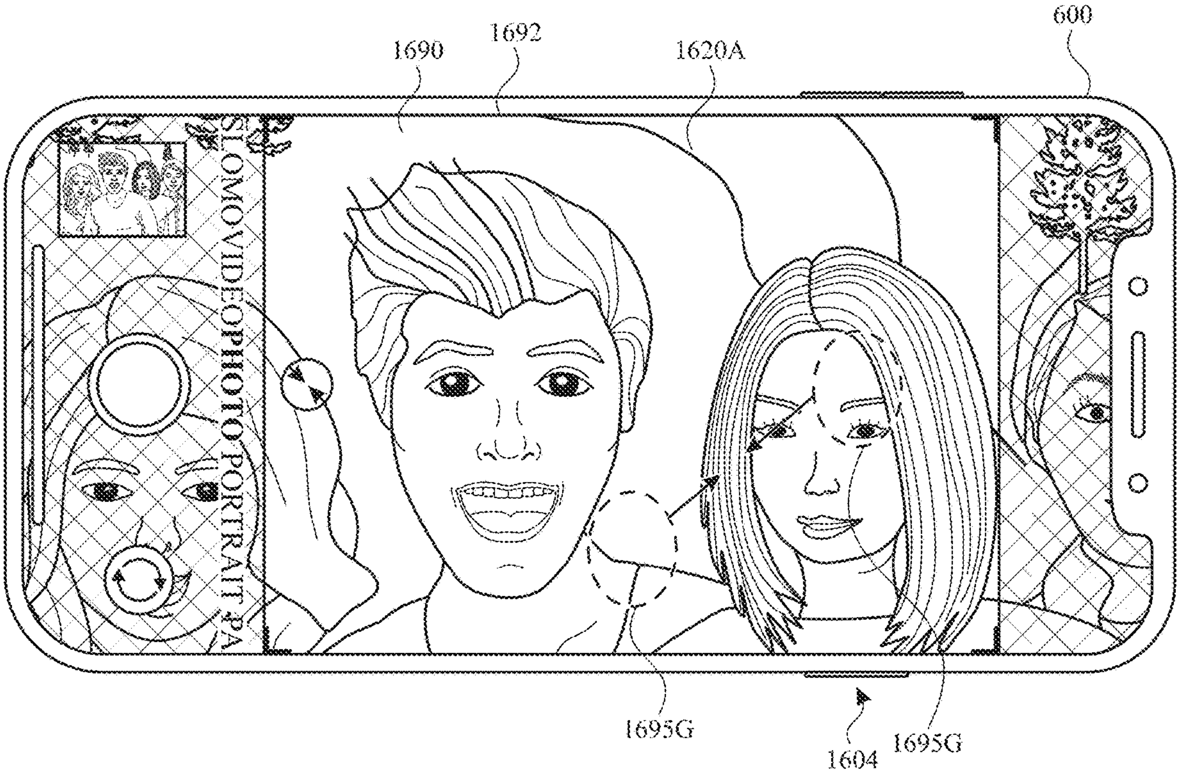
Figure 16H:
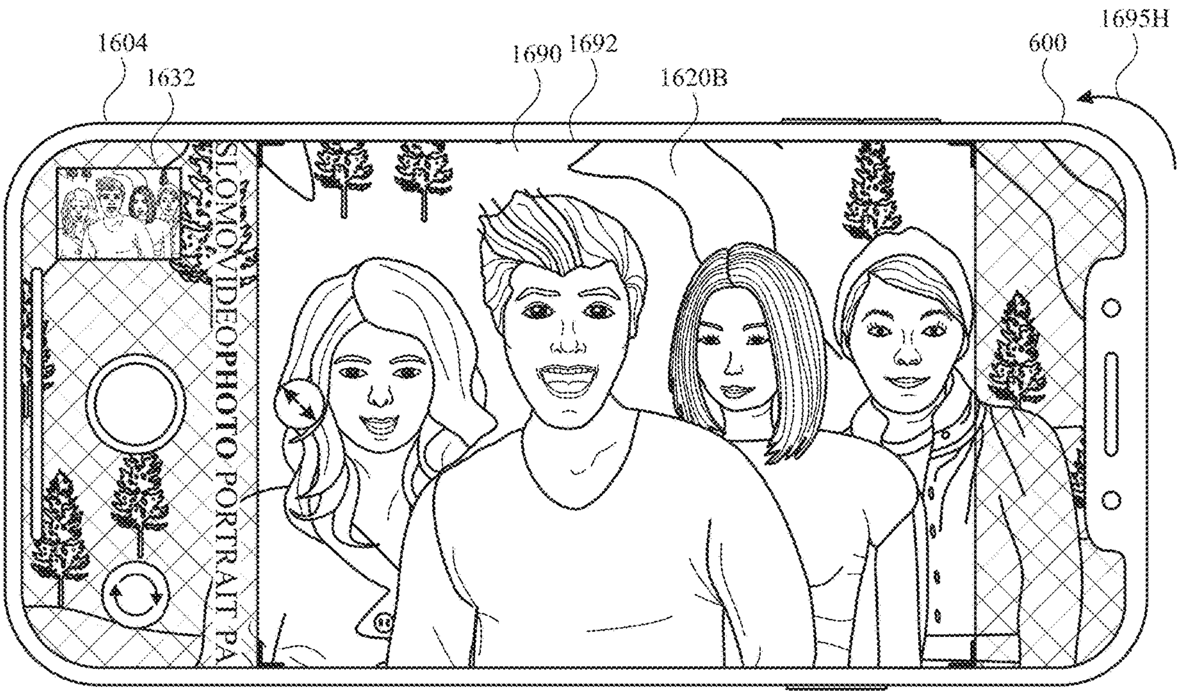
Figure 16I:
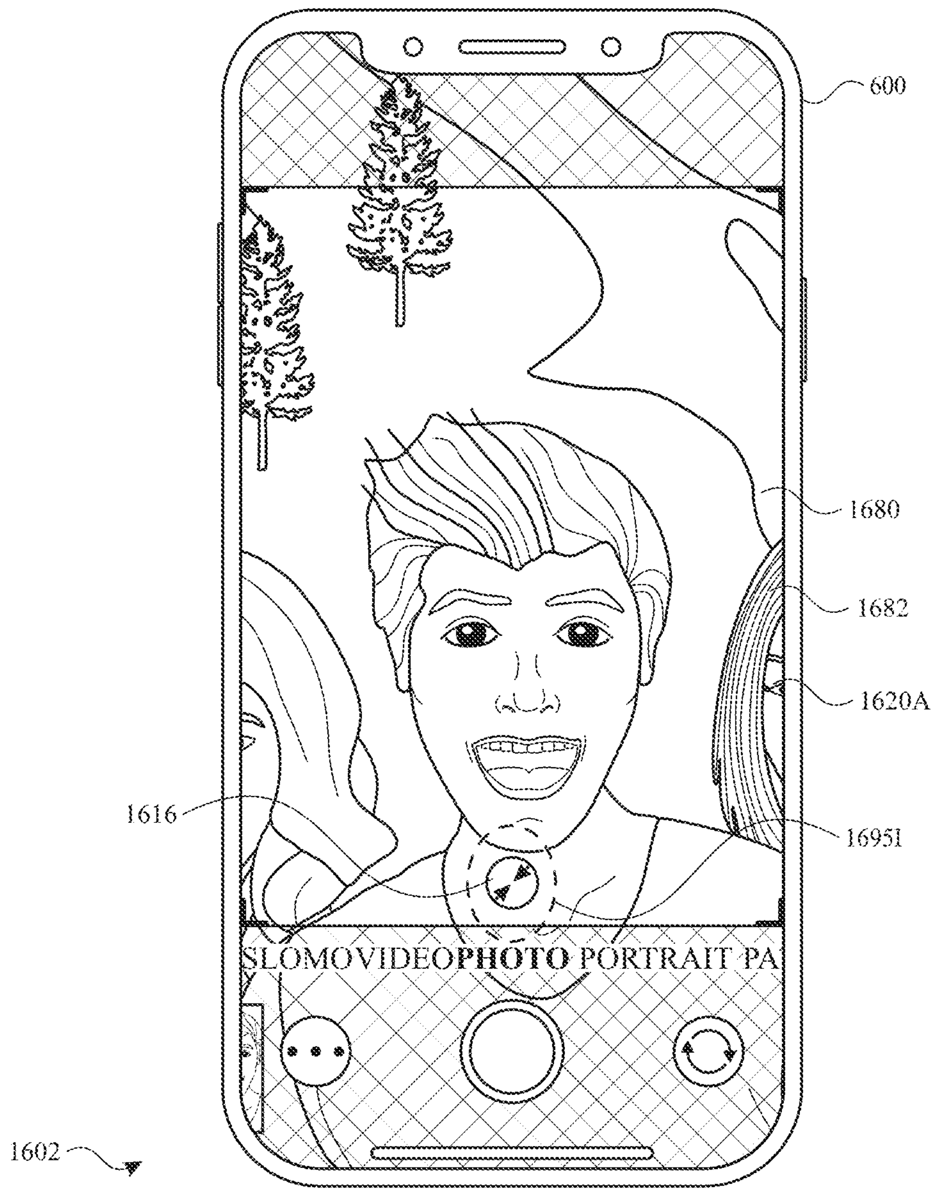
Figure 16J:
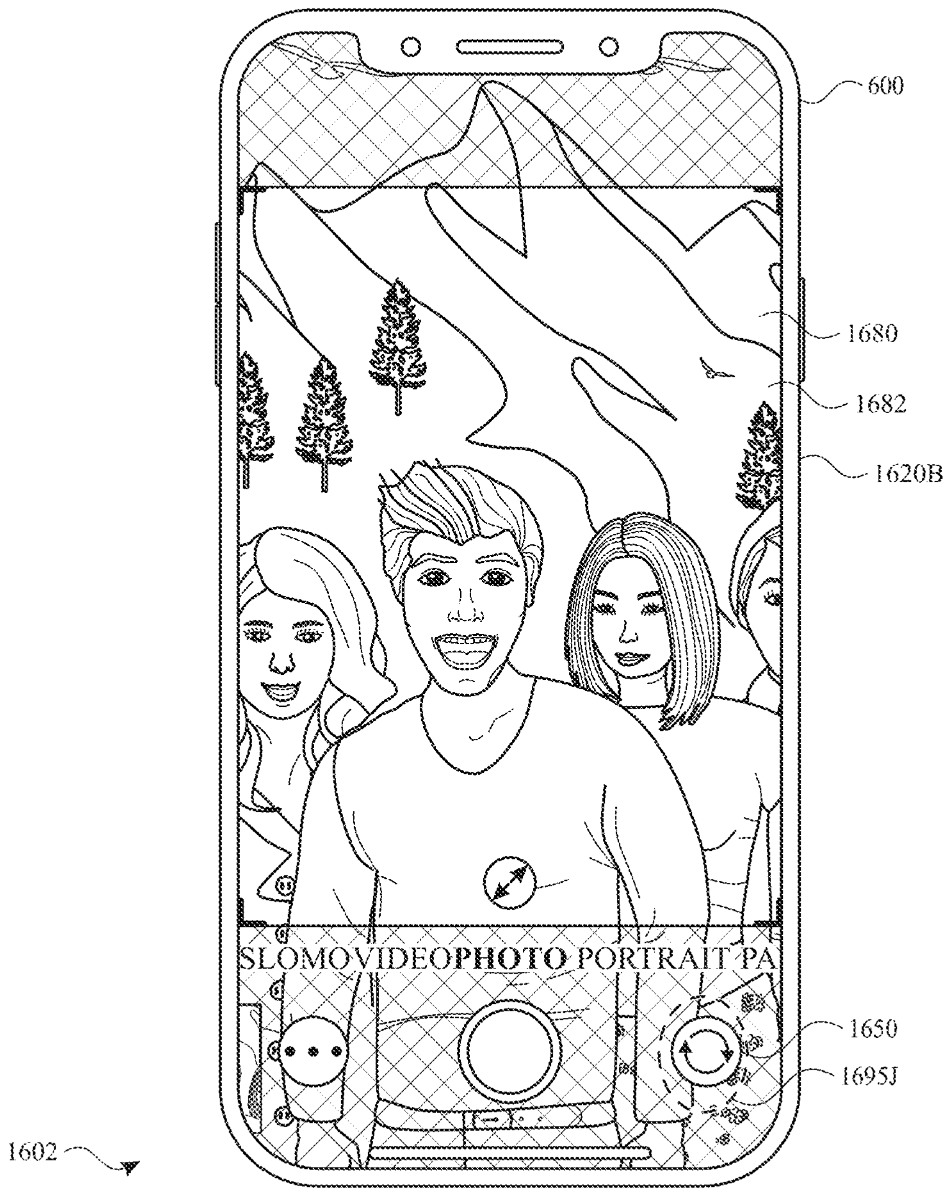
Figure 16K:
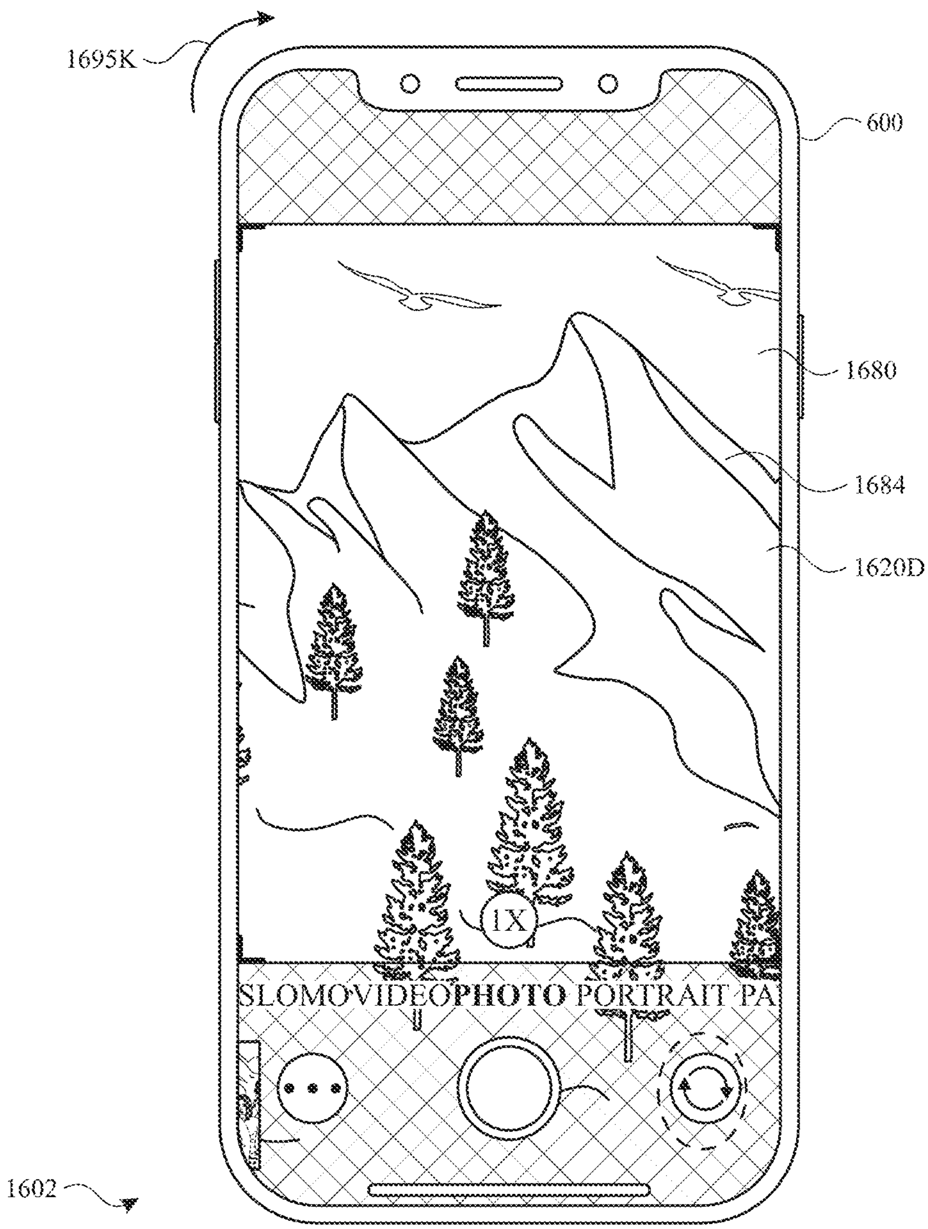
Figure 16L:
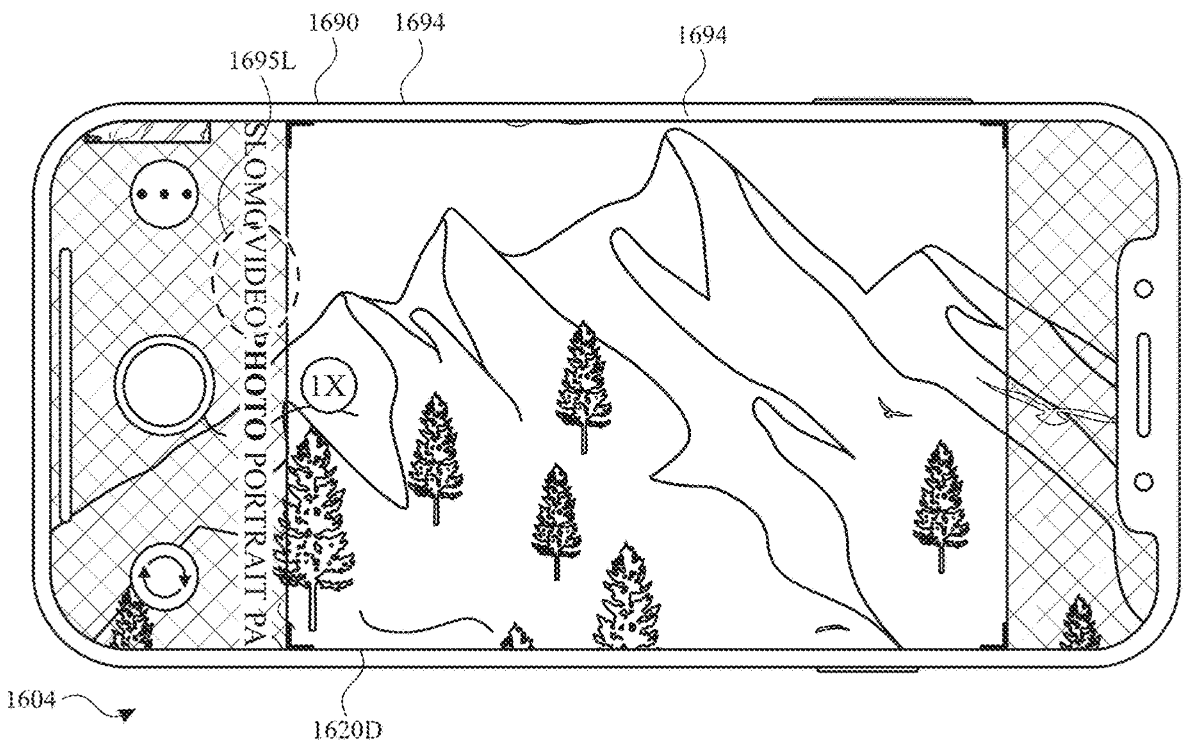
Figure 16M:
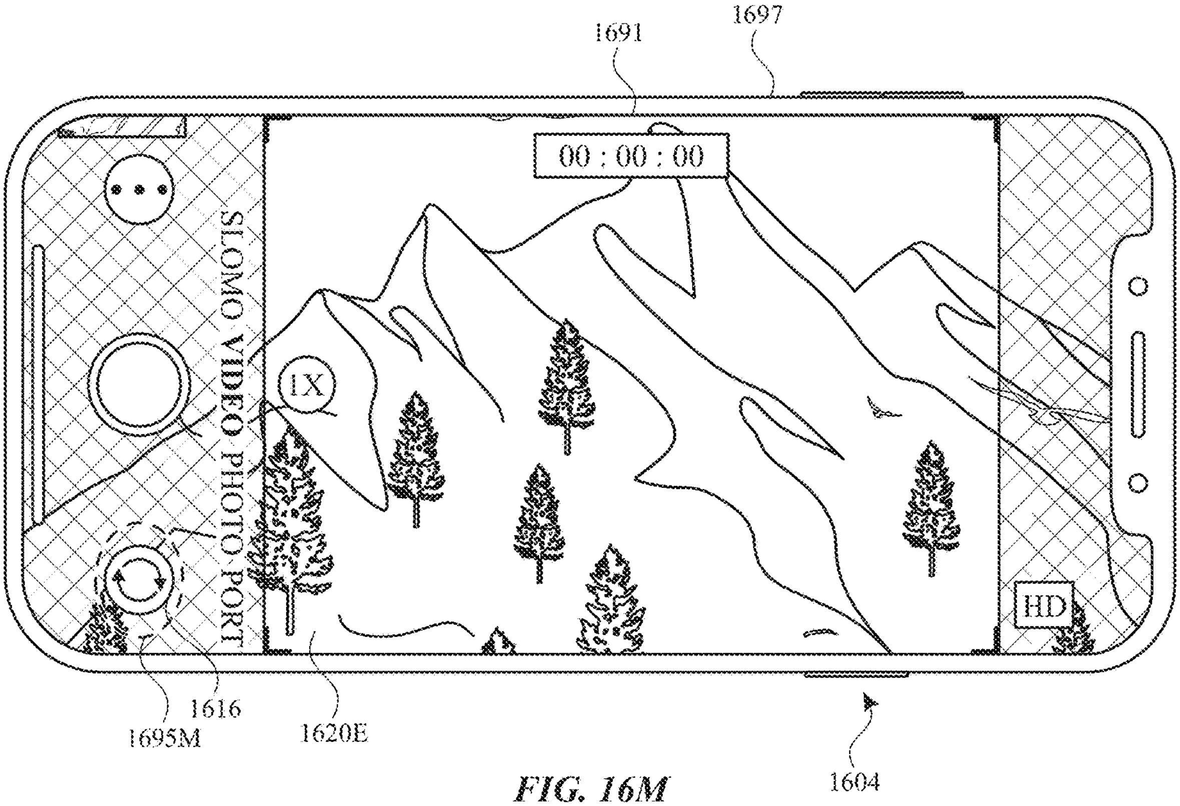
Figure 16N:
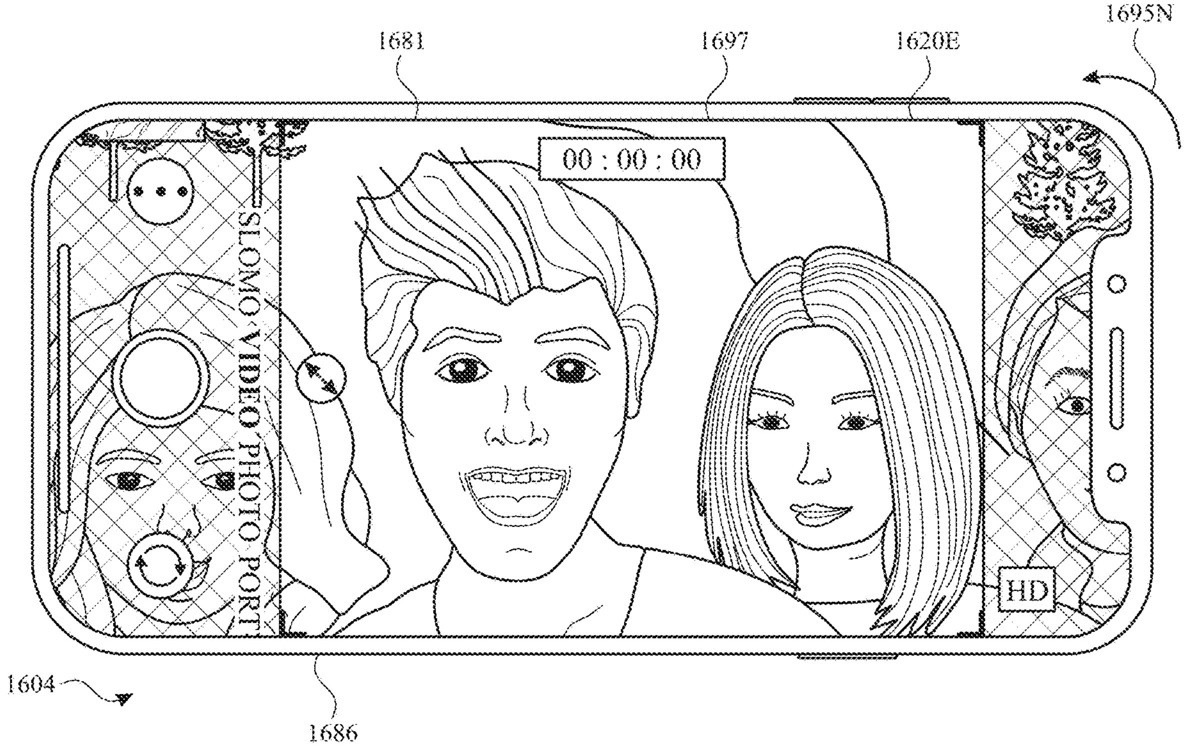
Figure 16O:
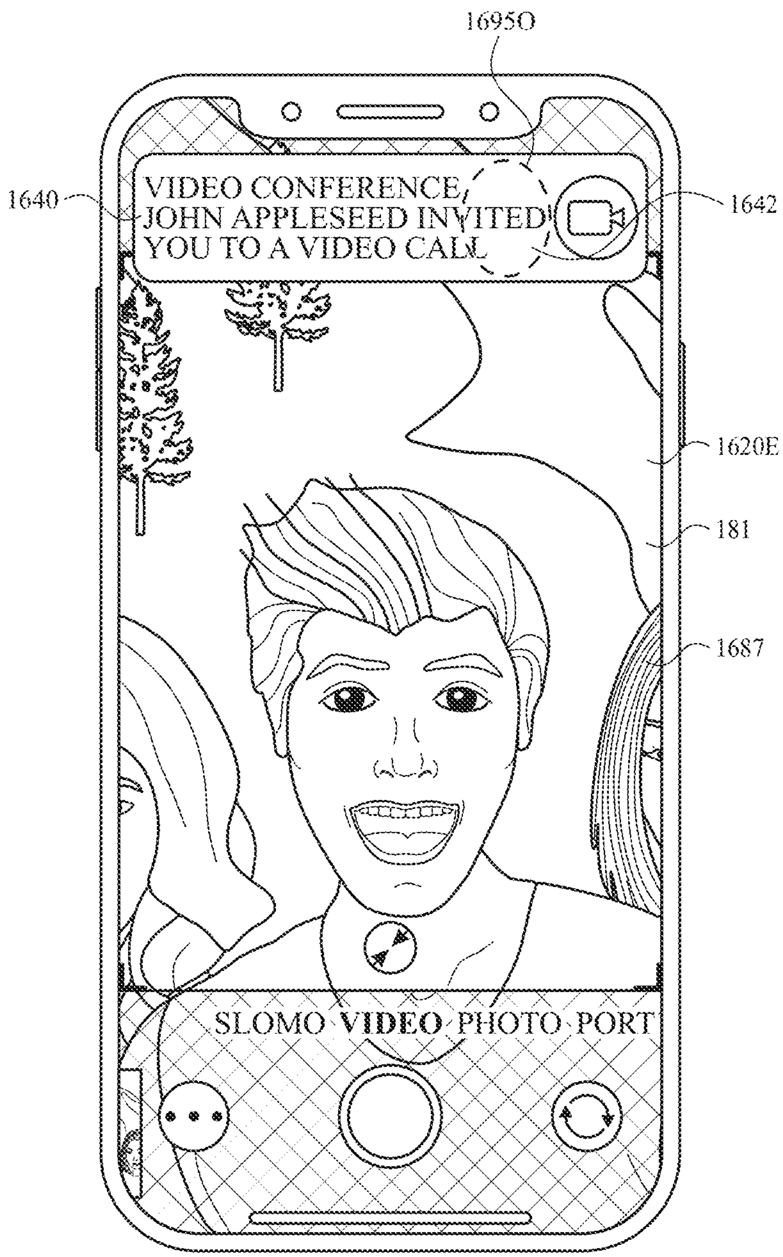
Figure 16P:
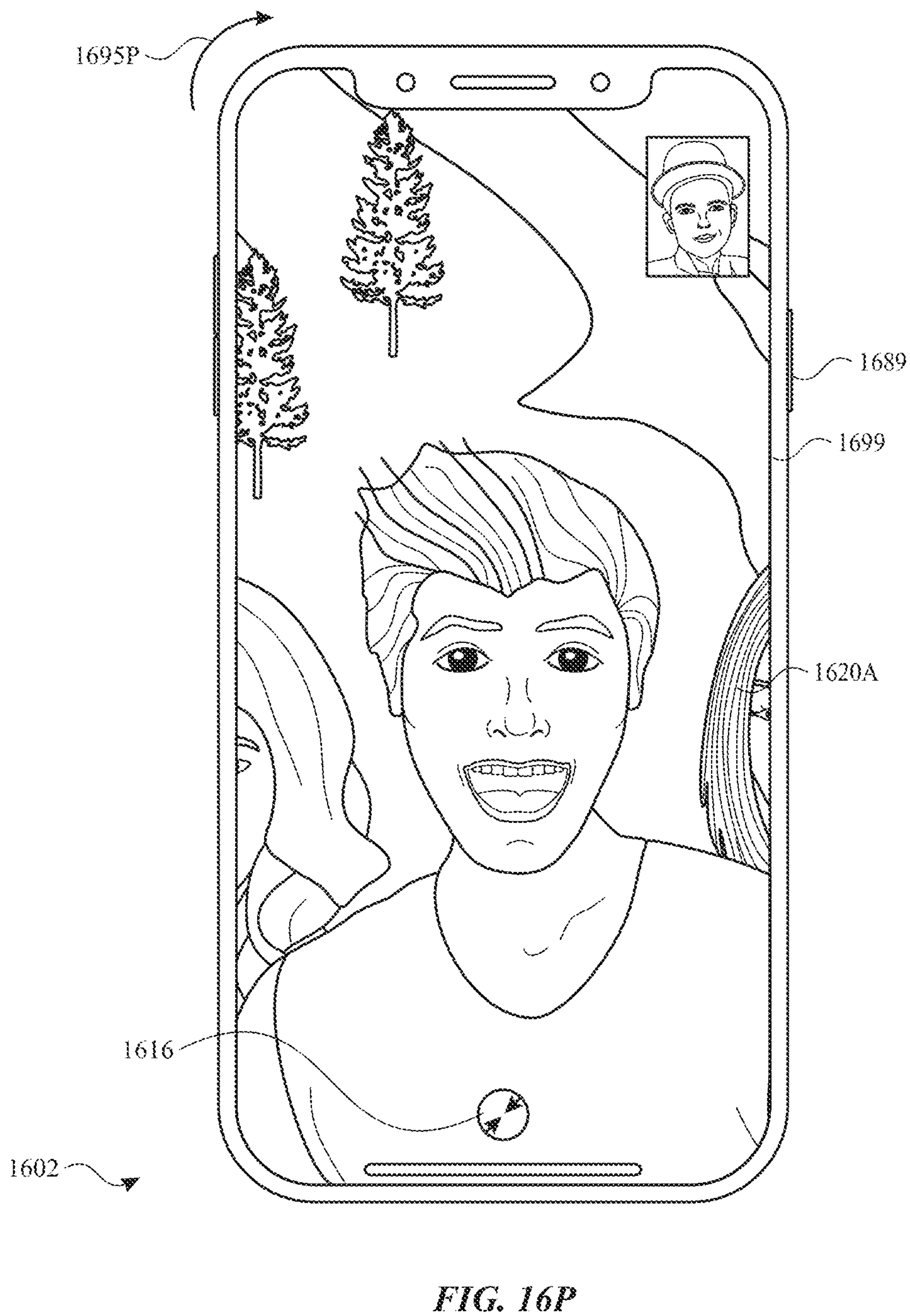
Figure 16Q:
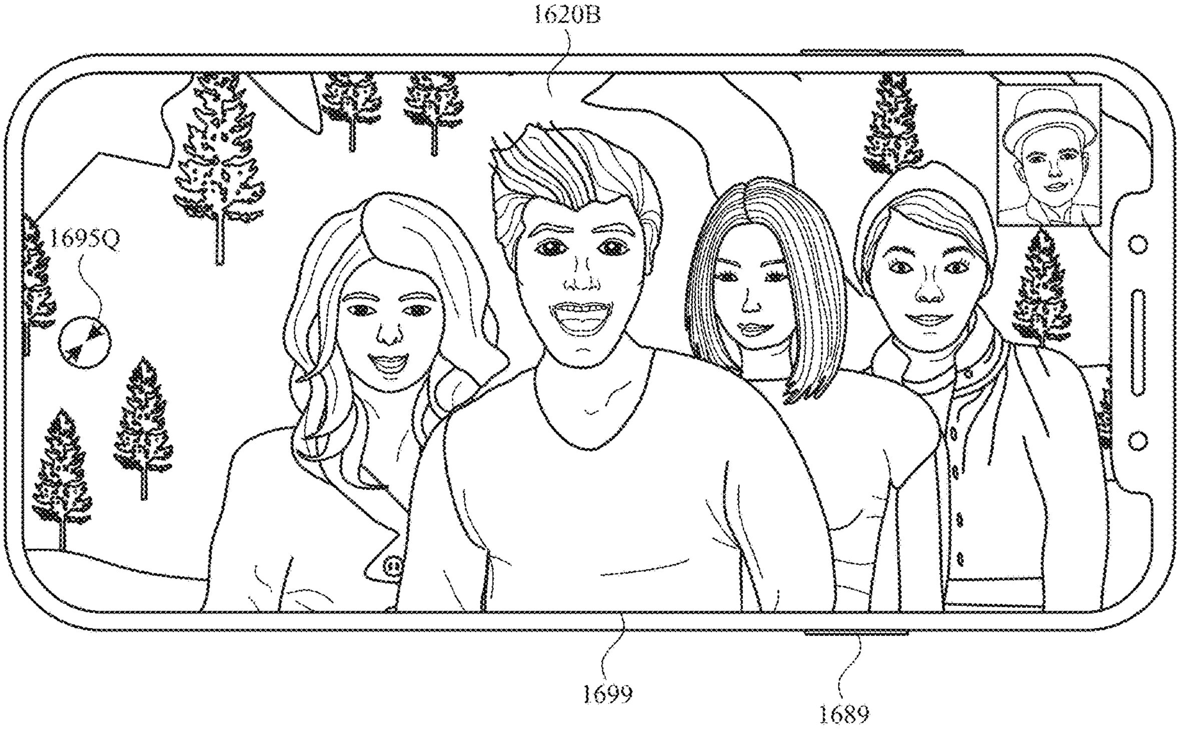
Figure 17B:
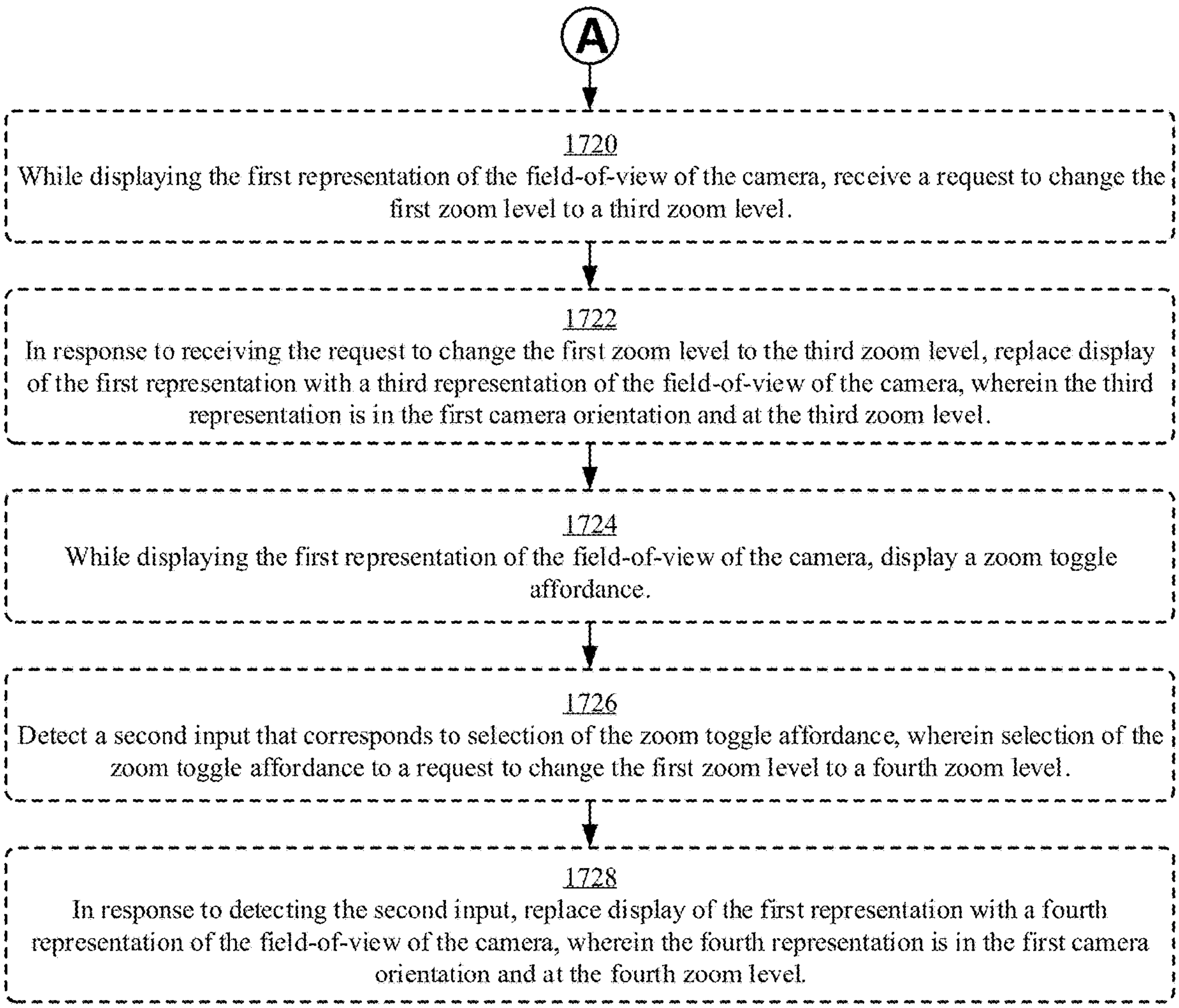

FIGS. 16A-16Q illustrate exemplary techniques and user interfaces for varying zoom levels using an electronic device in accordance with some embodiments. FIGS. 17A-17B are a flow diagram illustrating a method for varying zoom levels using an electronic device in accordance with some embodiments. The user interfaces in FIGS. 16A-16Q are used to illustrate the processes described below, including the processes in FIGS. 17A-17B.

Figure 18A:
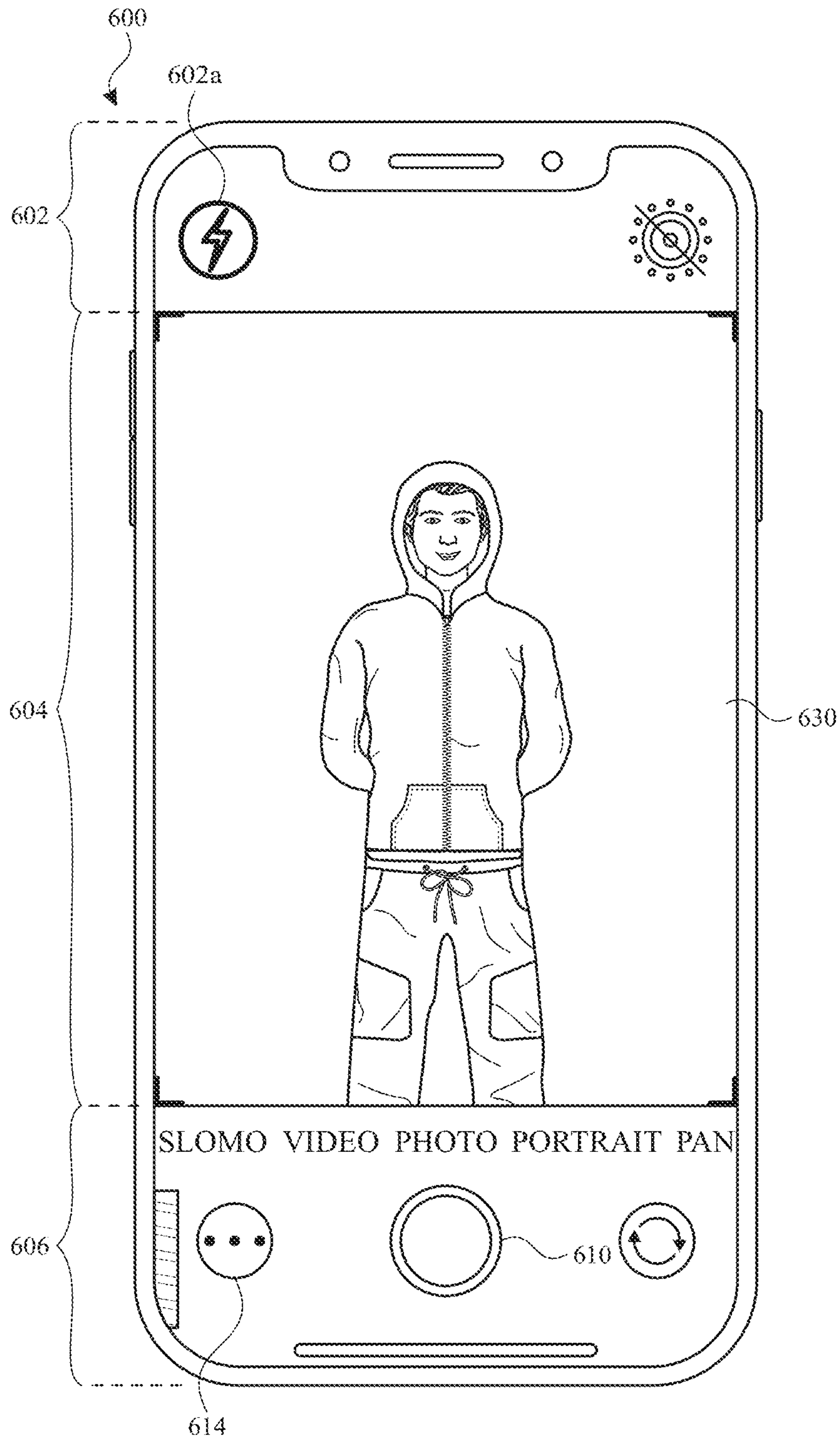
FIGS. 18A-18X illustrate exemplary techniques and user interfaces for managing media using an electronic device in accordance with some embodiments.
Figure 18B:
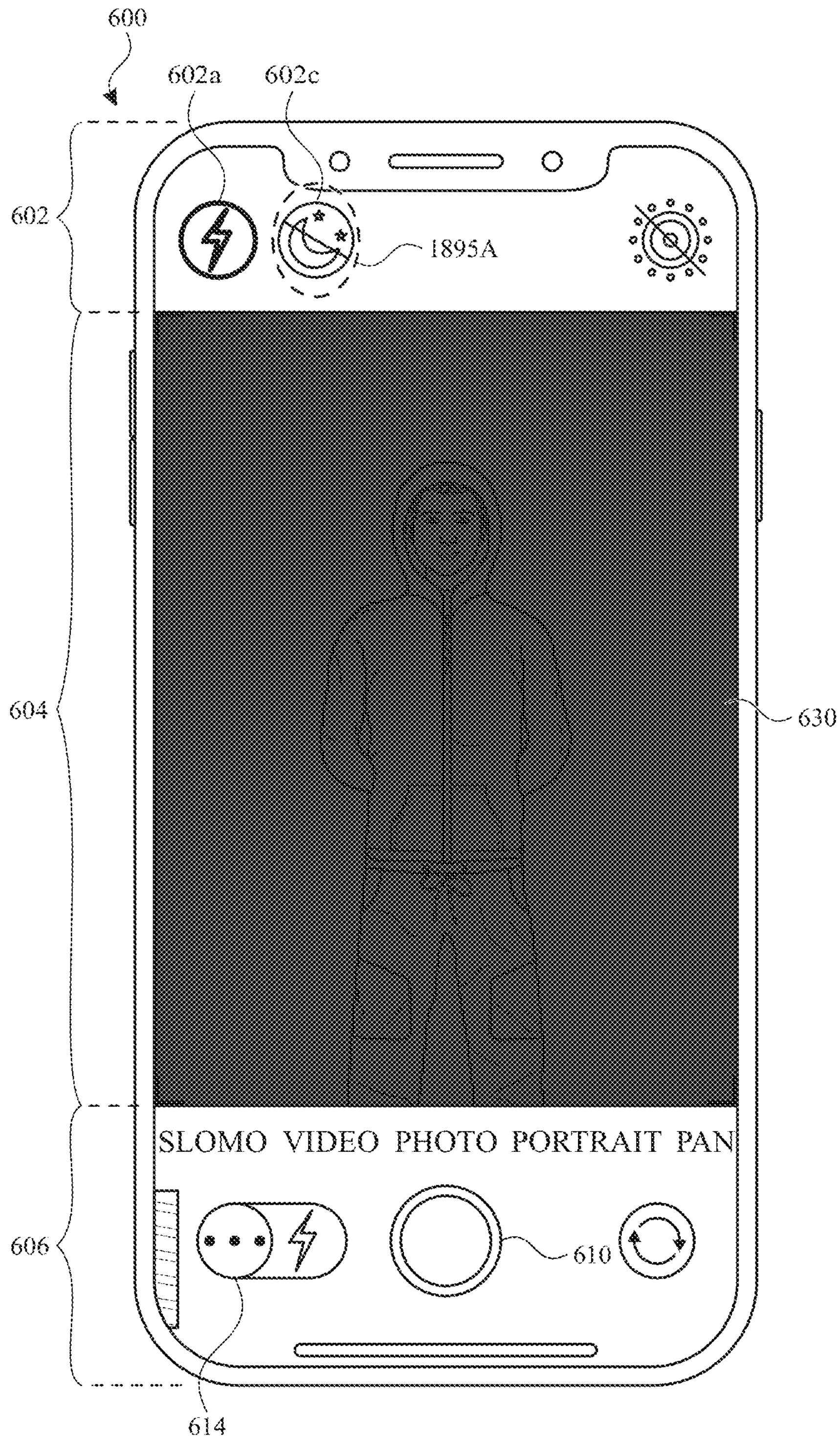
Figure 18C:
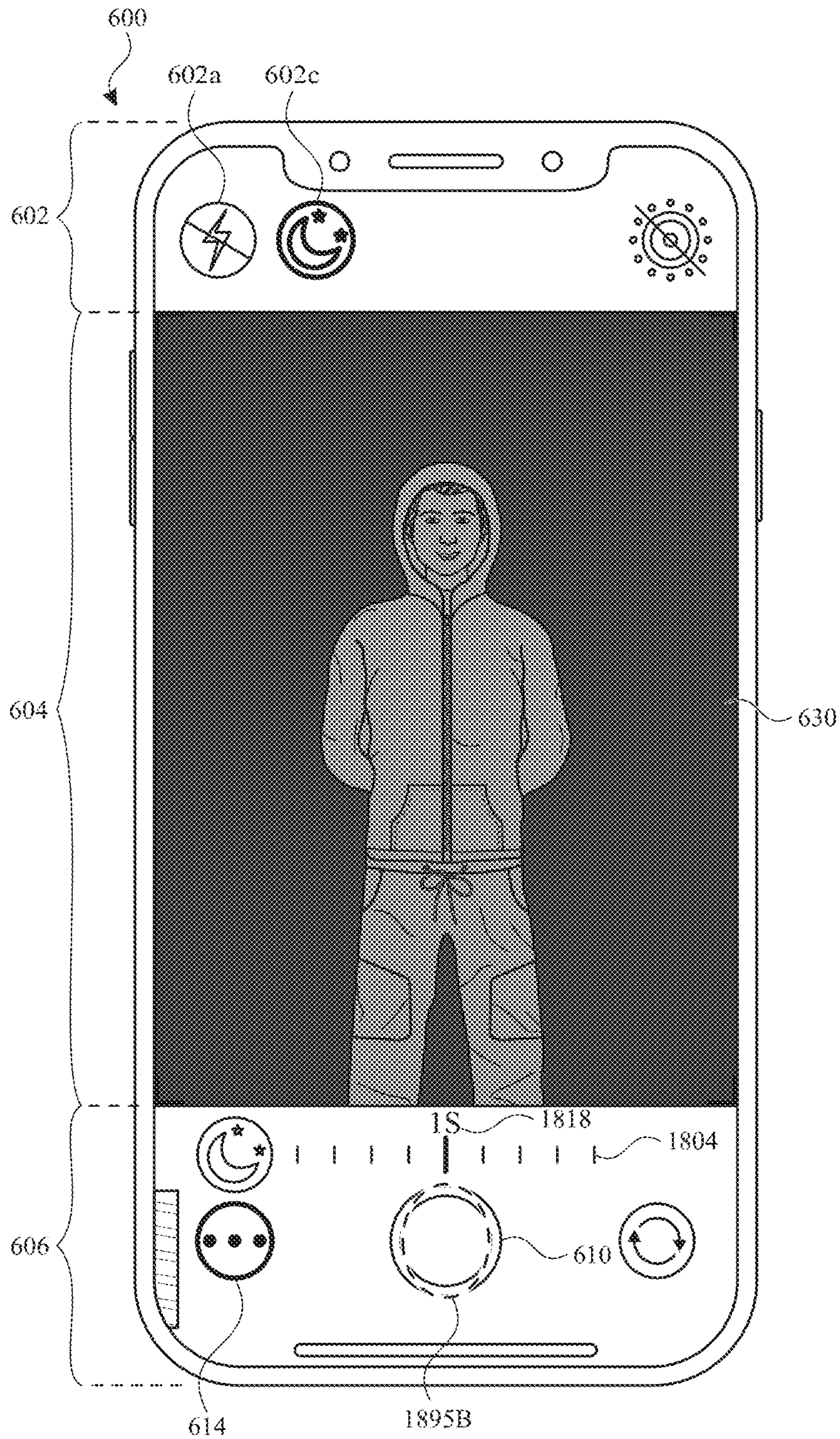
Figure 18D:
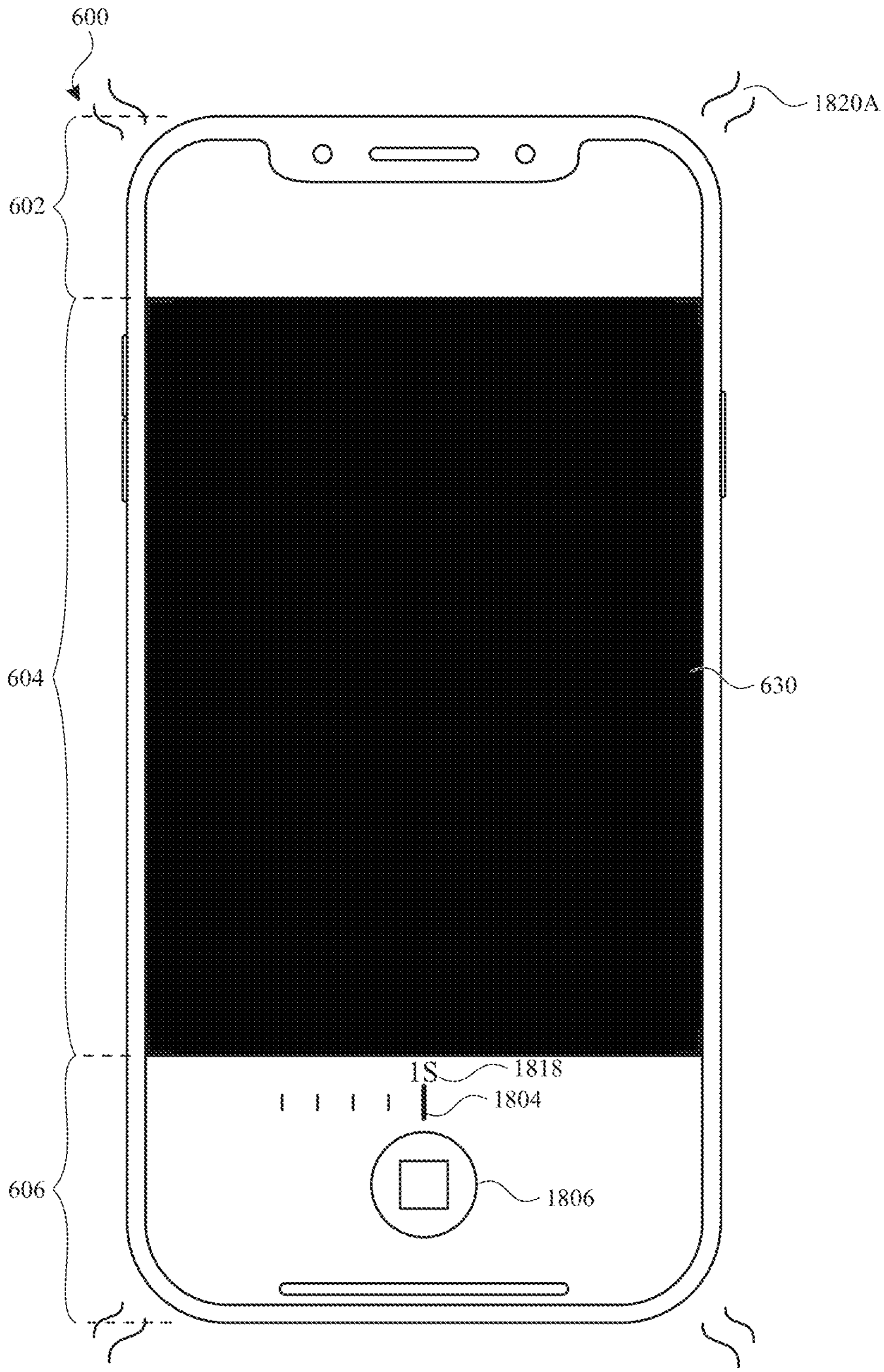
Figure 18E:
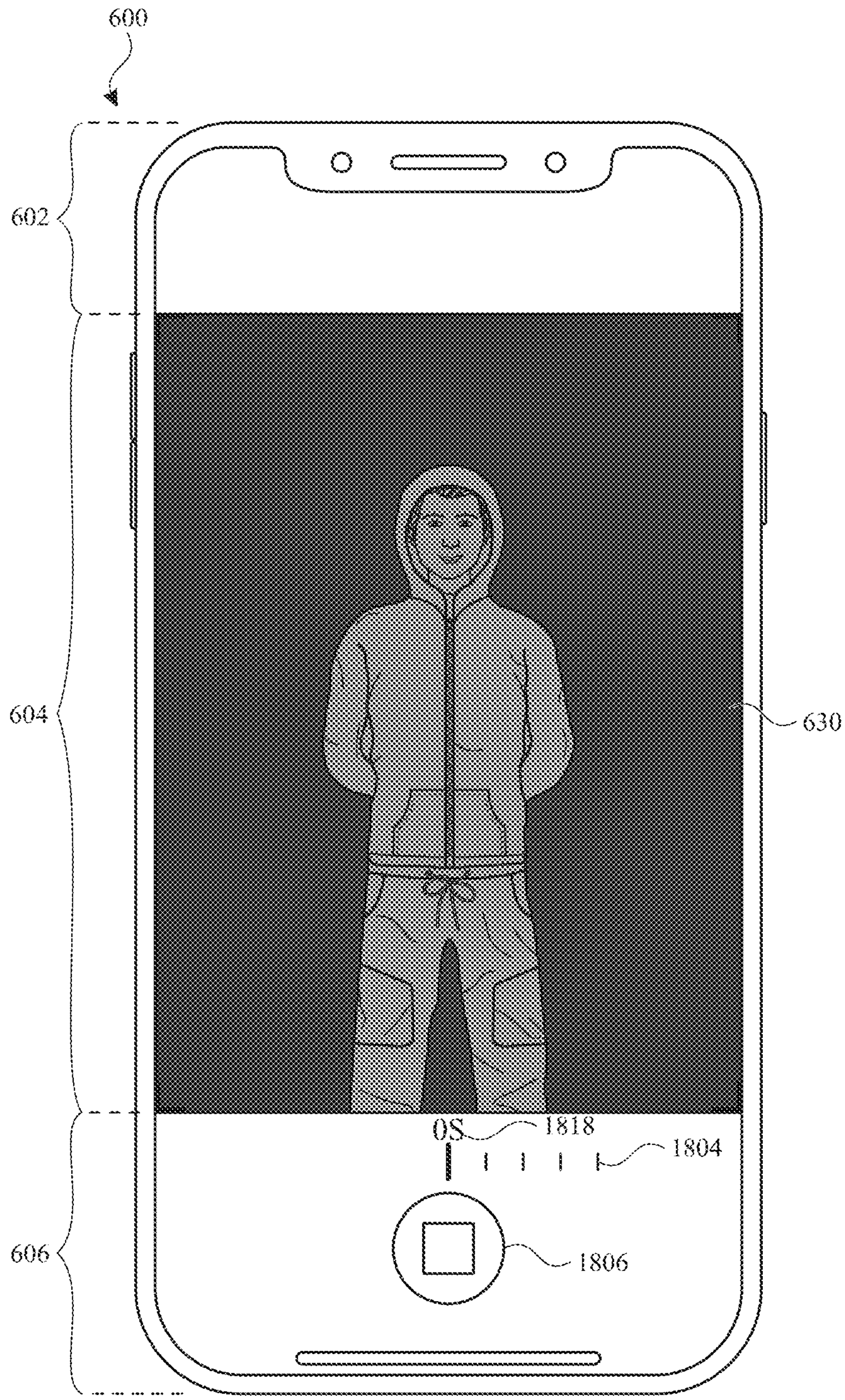
Figure 18F:
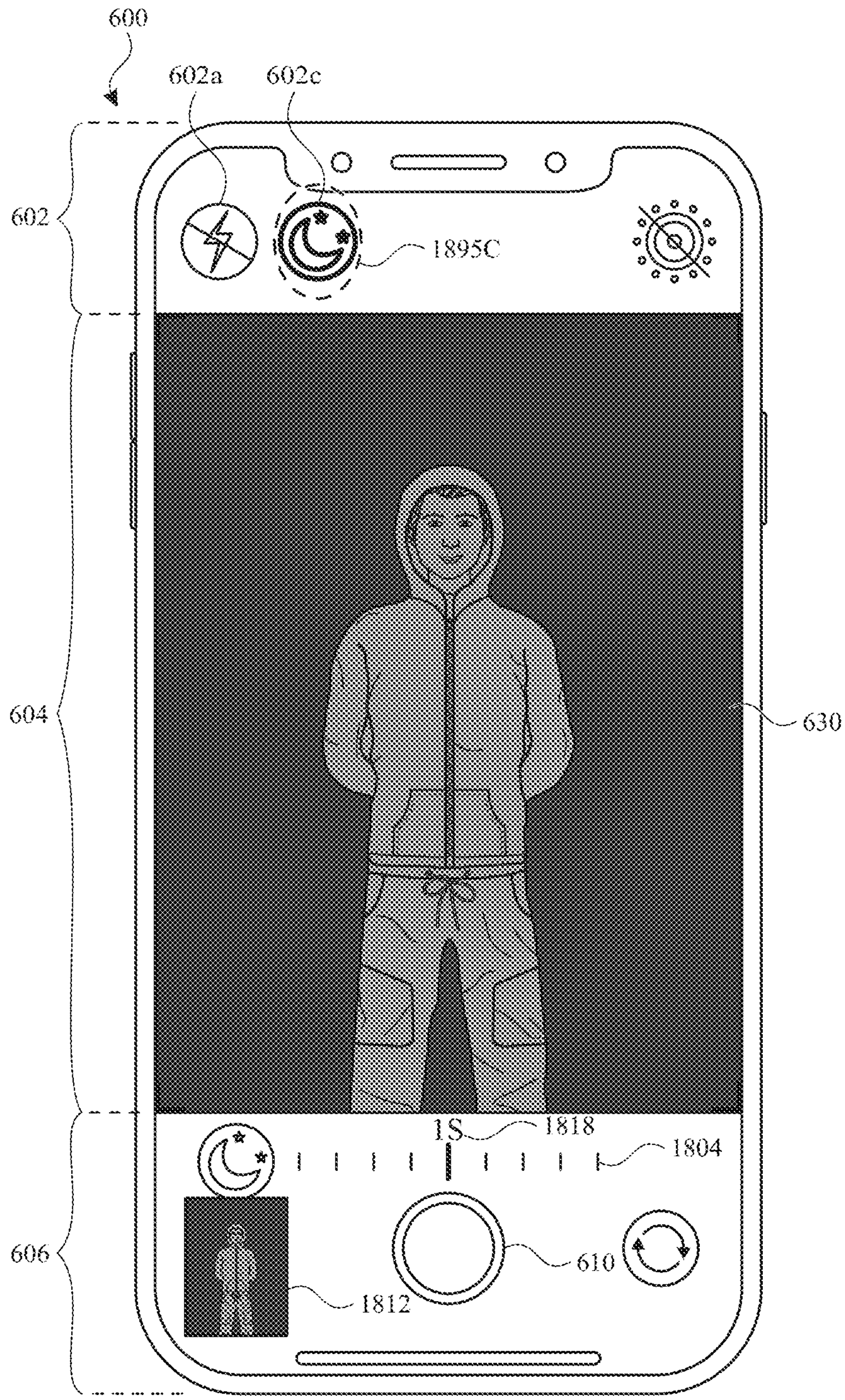
Figure 18G:
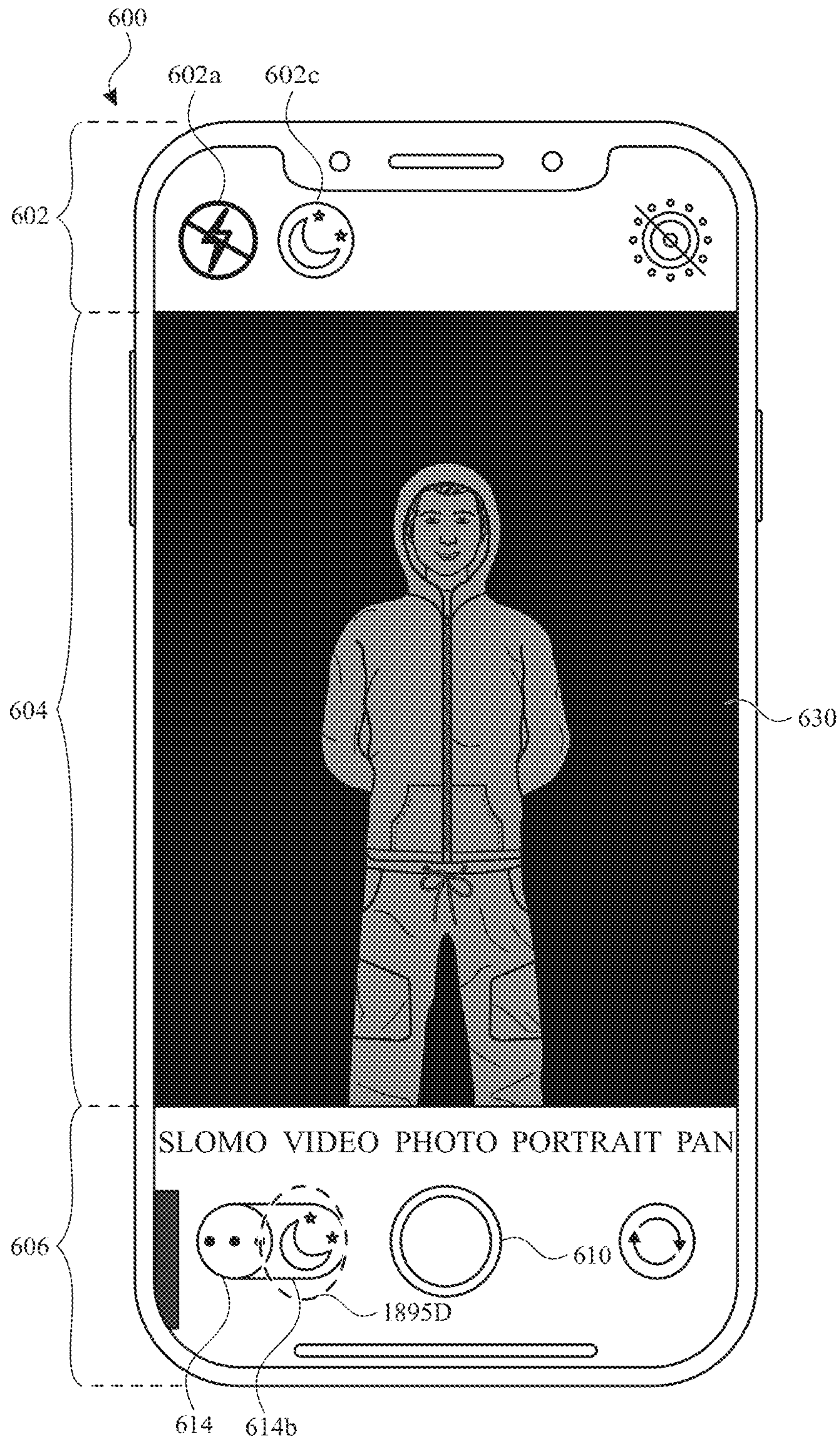
Figure 18H:
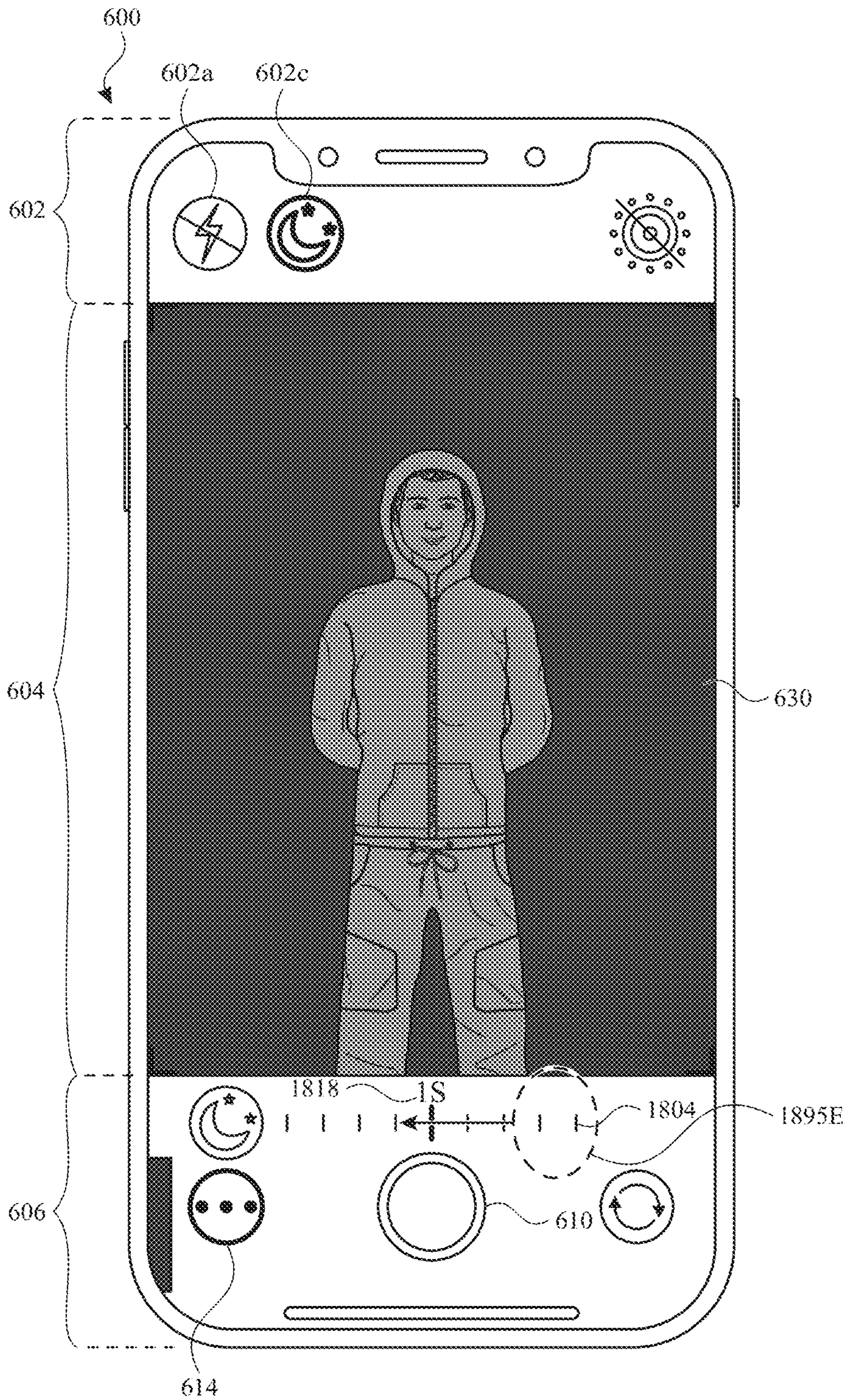
Figure 18I:
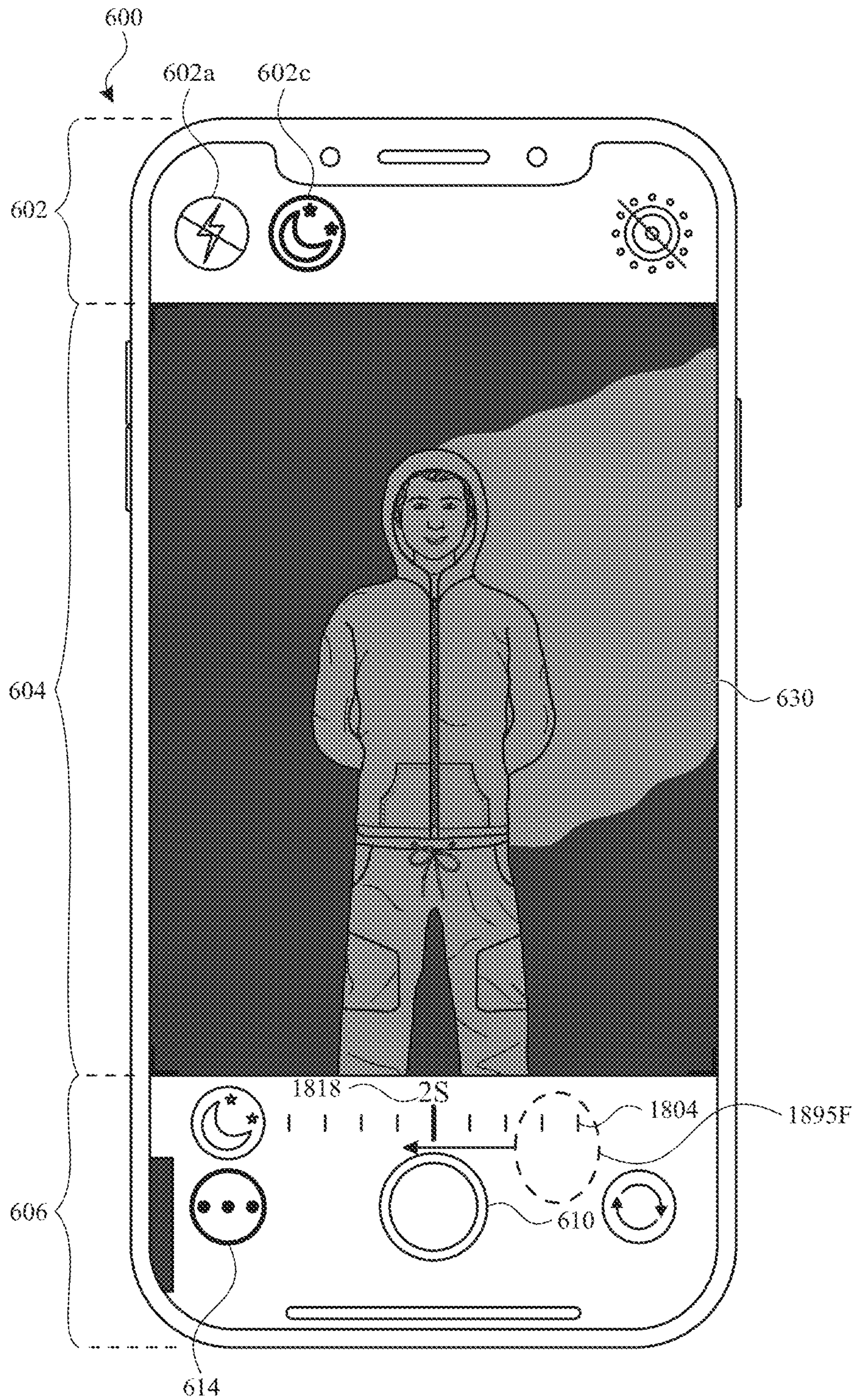
Figure 18J:
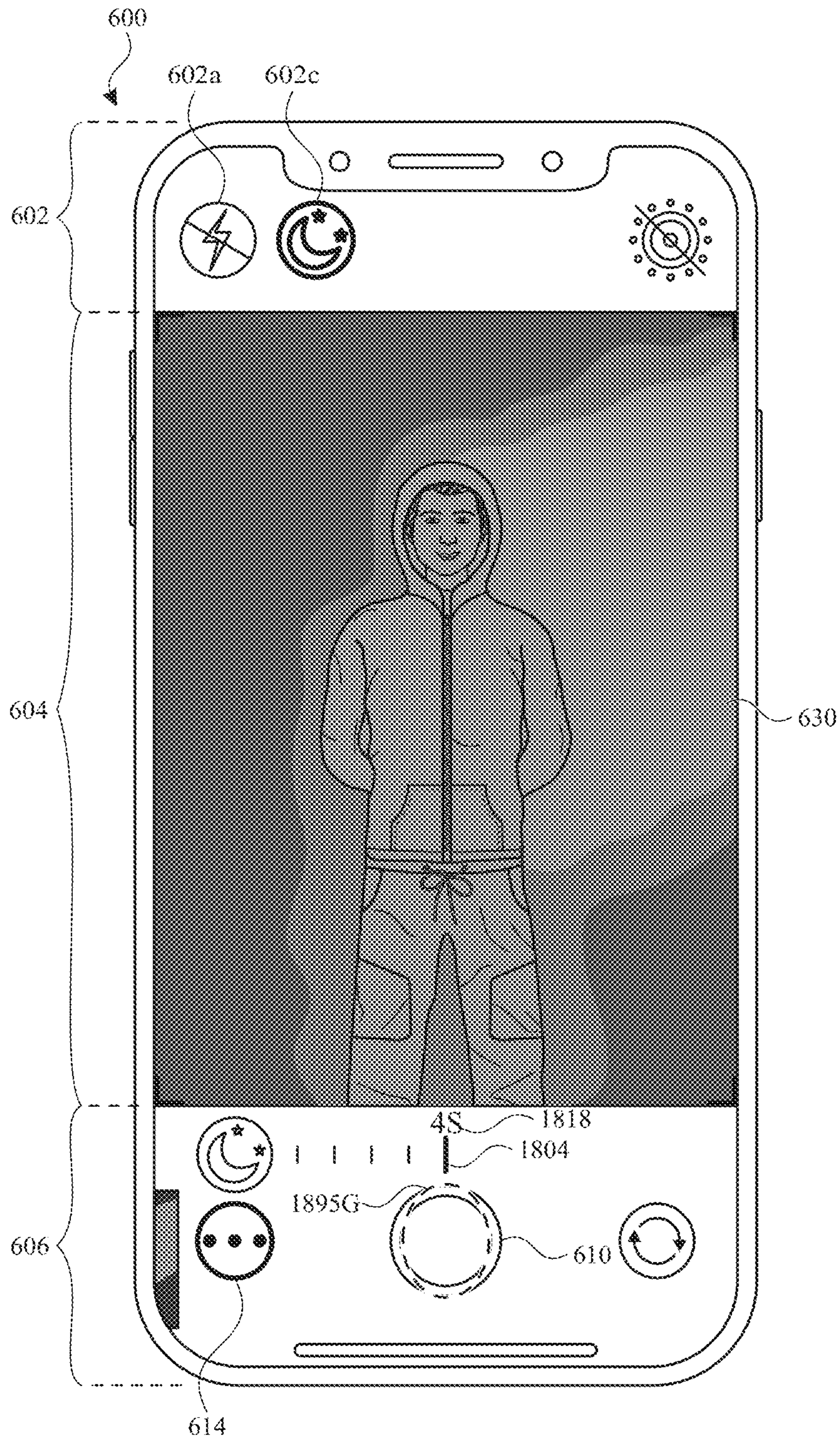
Figure 18K:
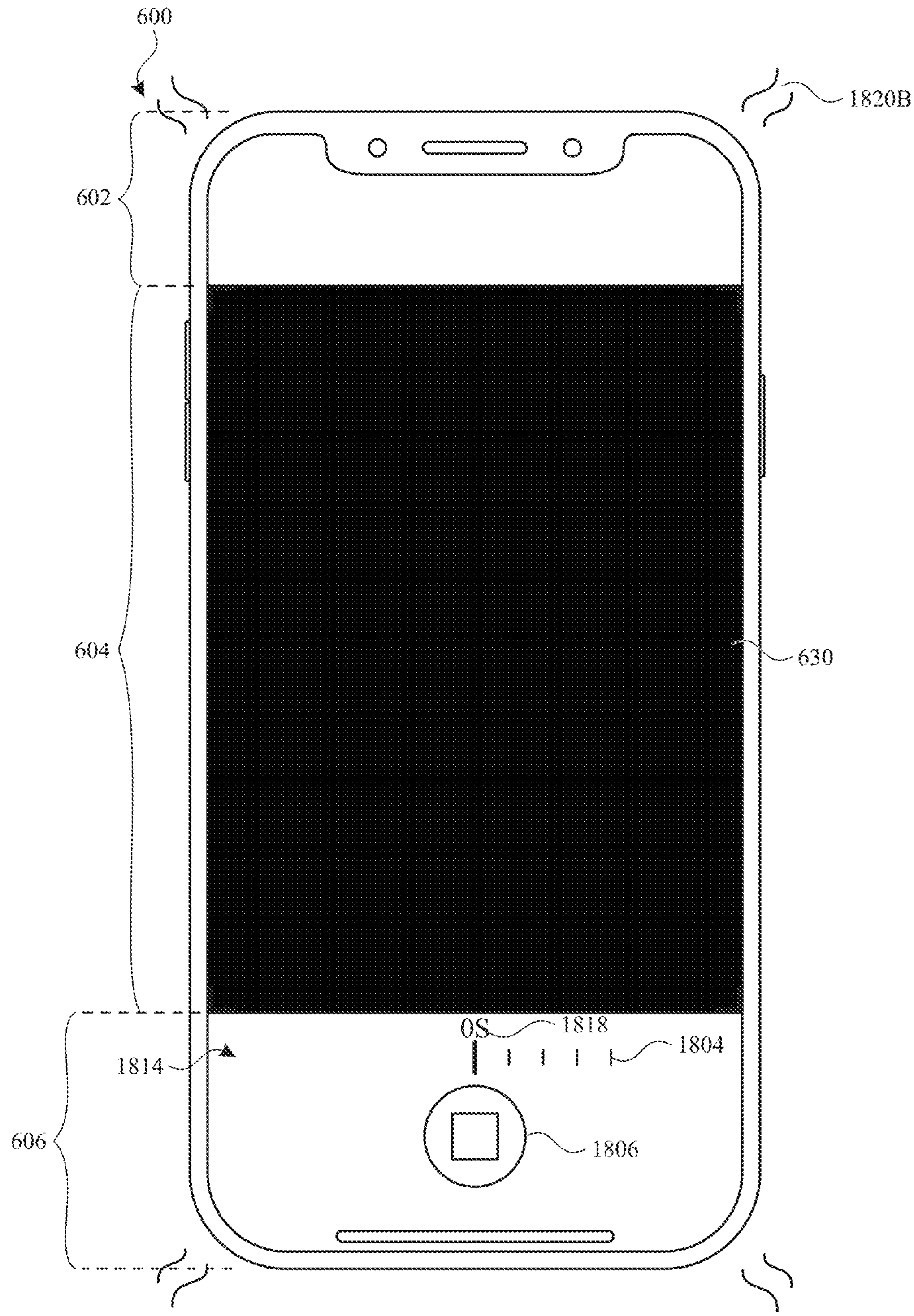
Figure 18L:
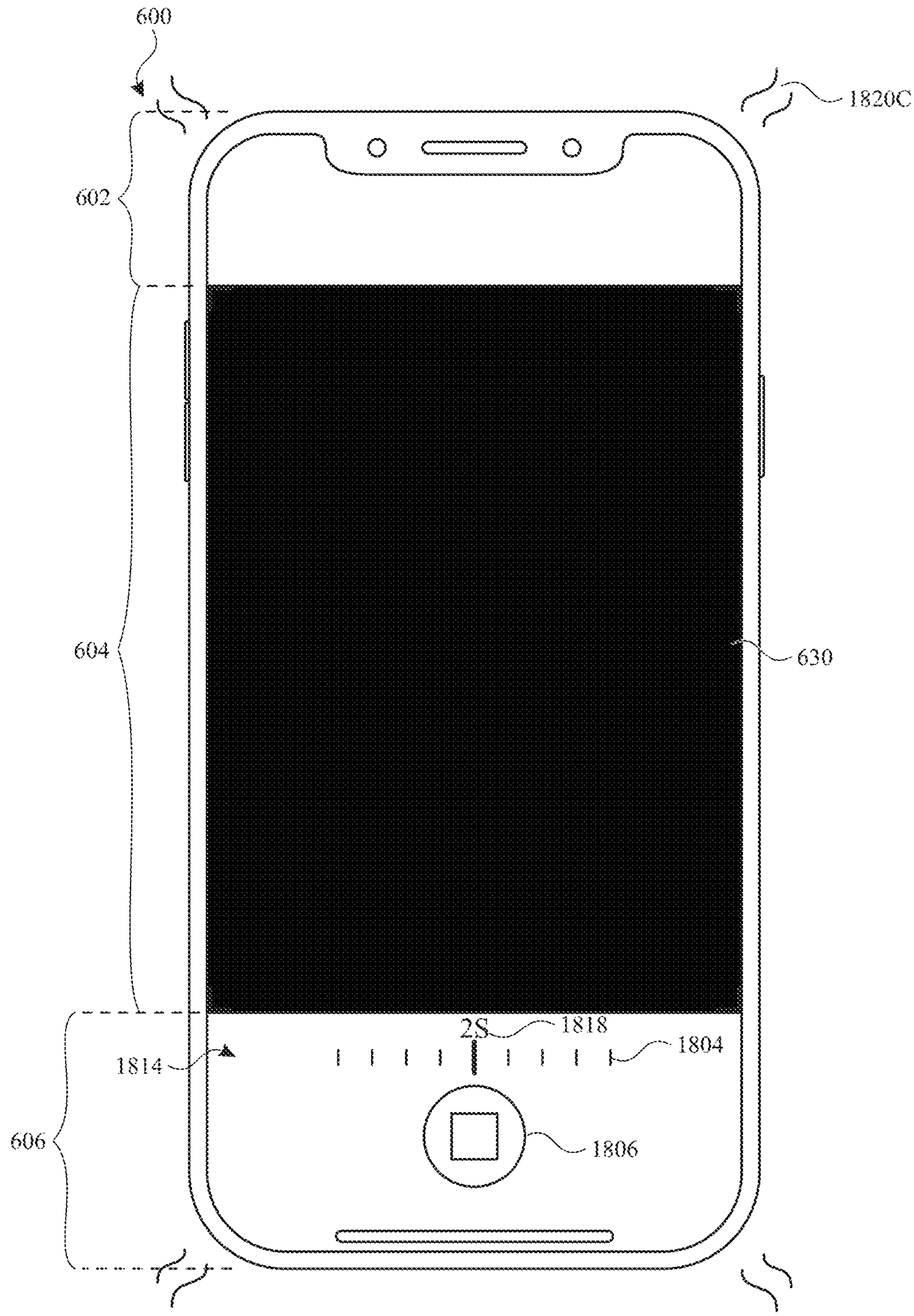
Figure 18M:
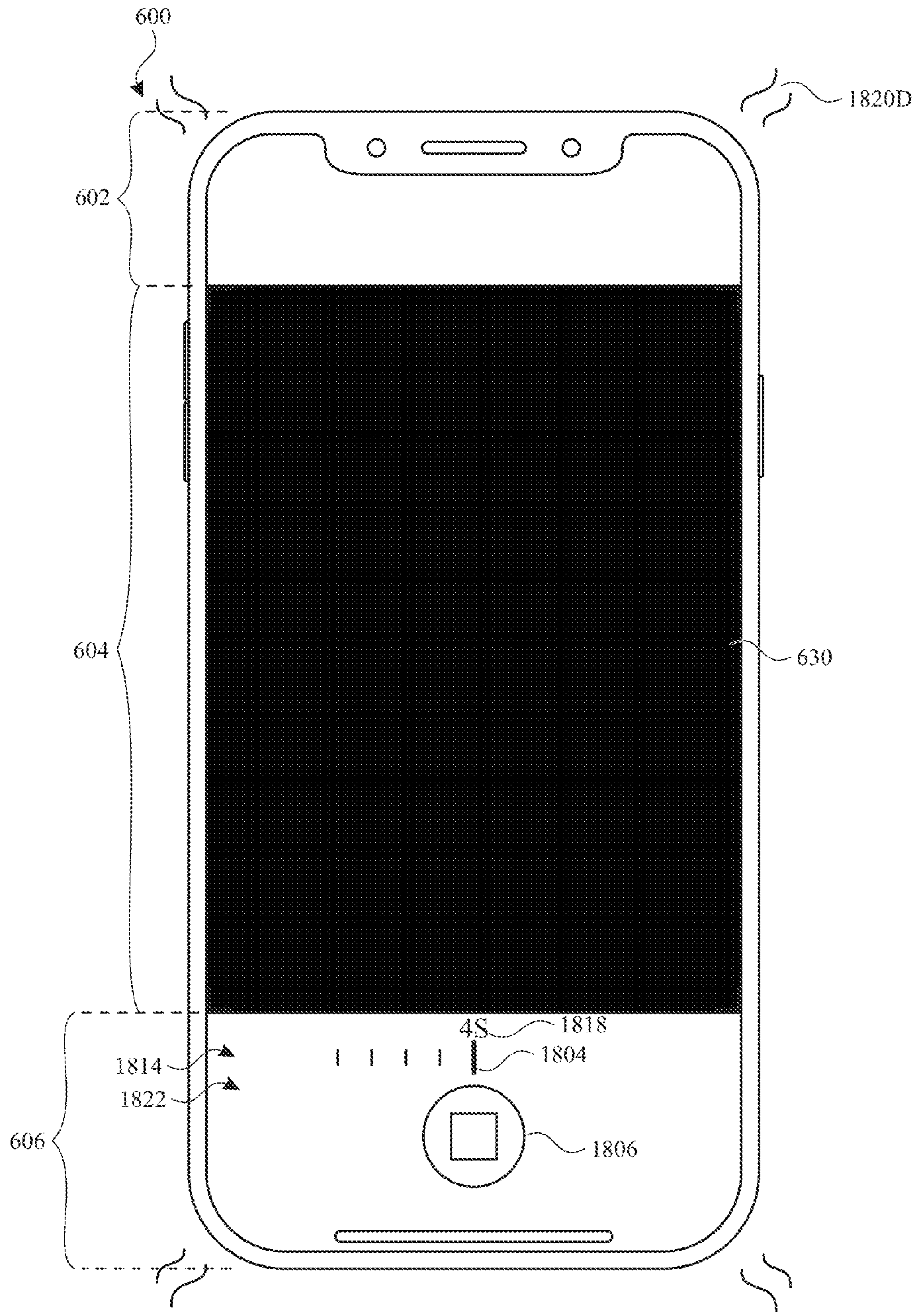
Figure 18N:
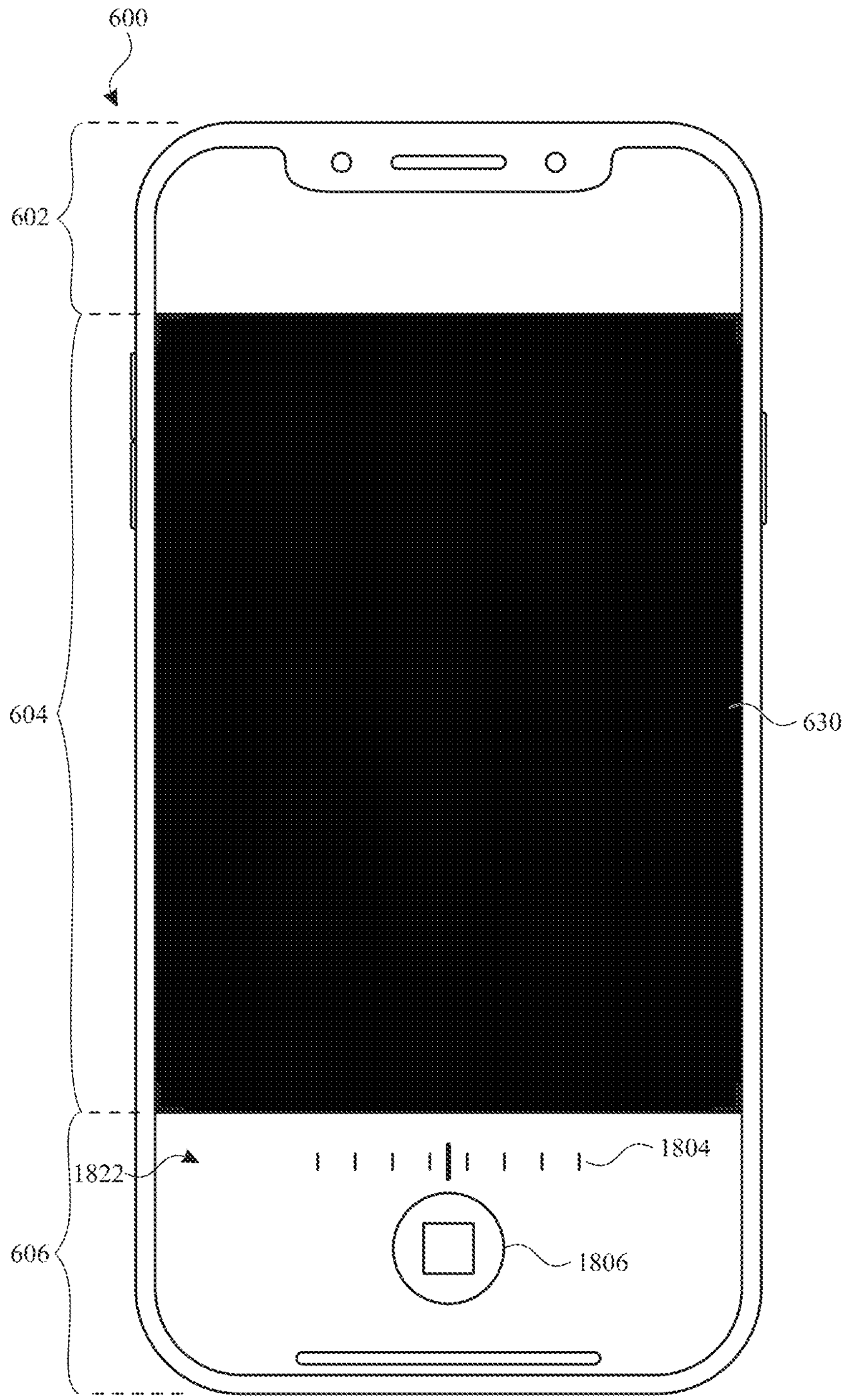
Figure 18O:
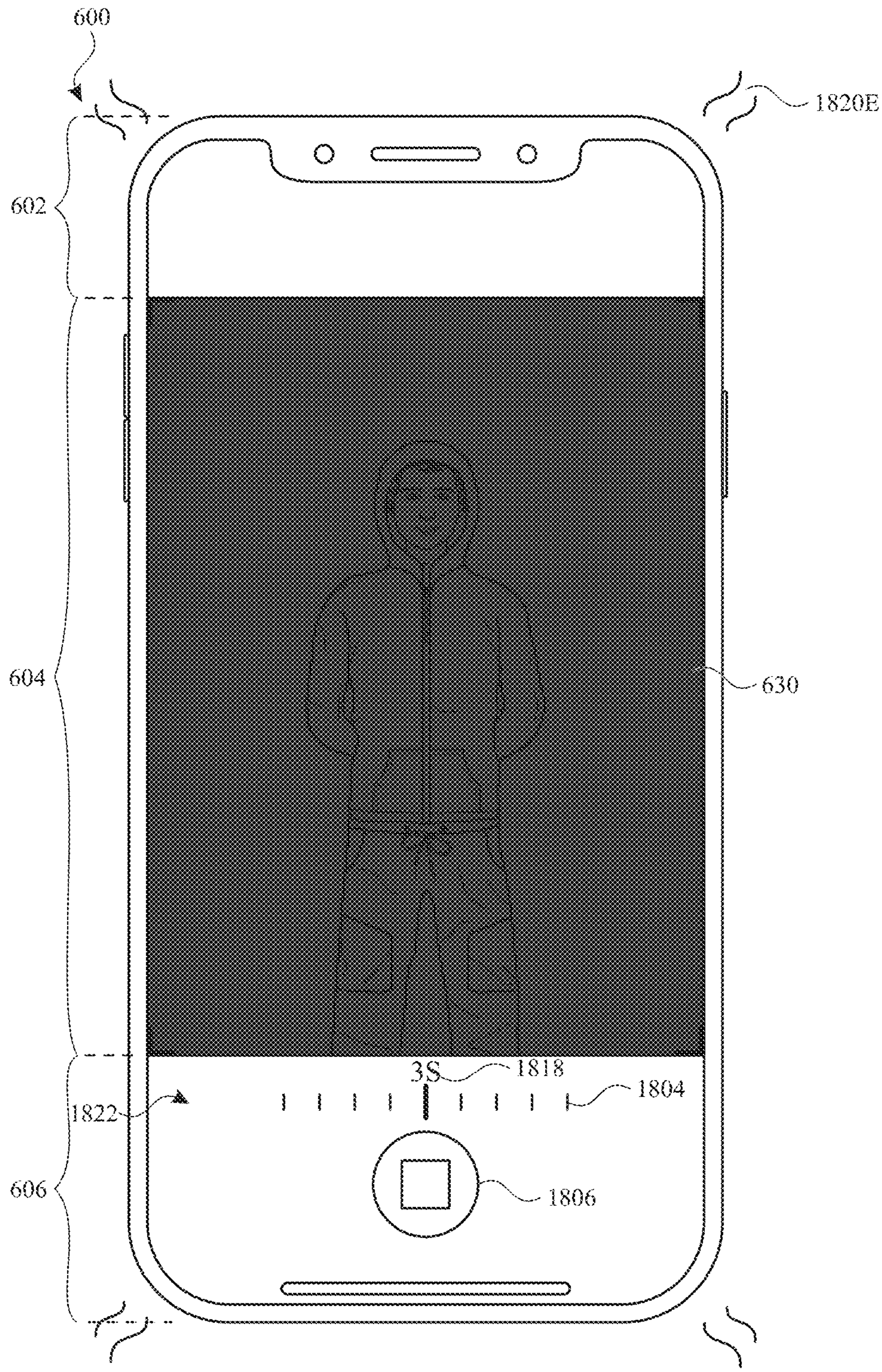
Figure 18P:
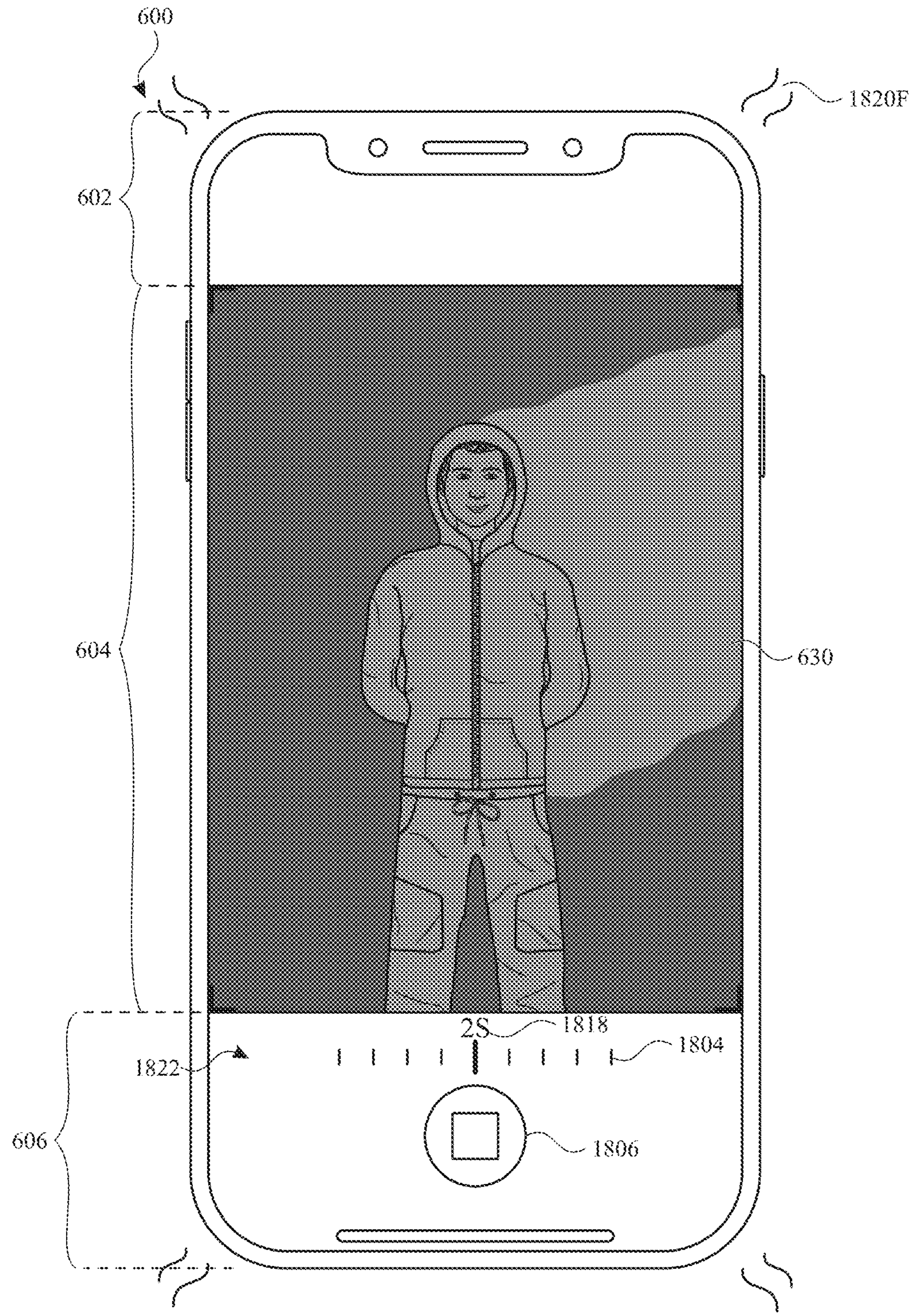
Figure 18Q:
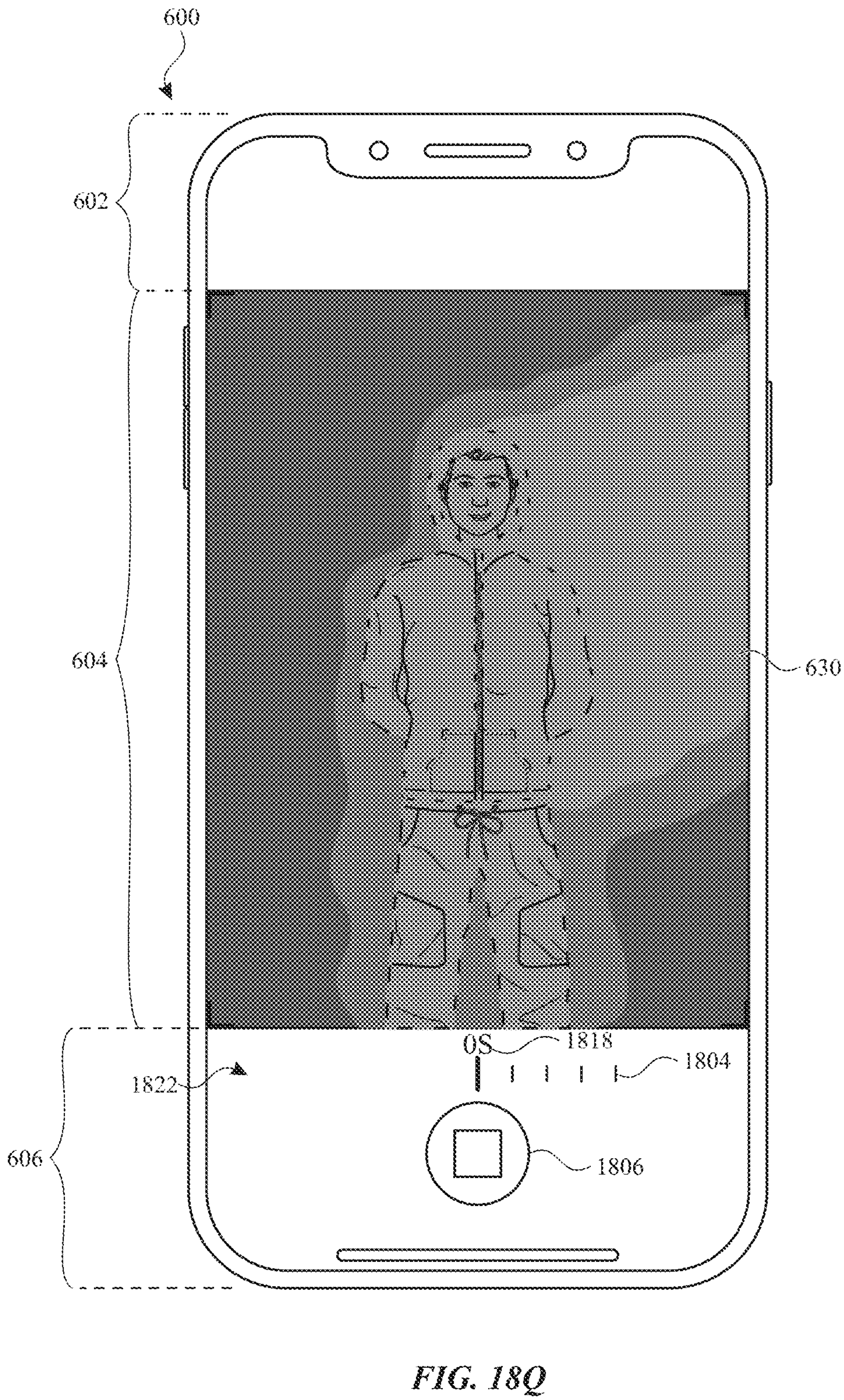
Figure 18R:
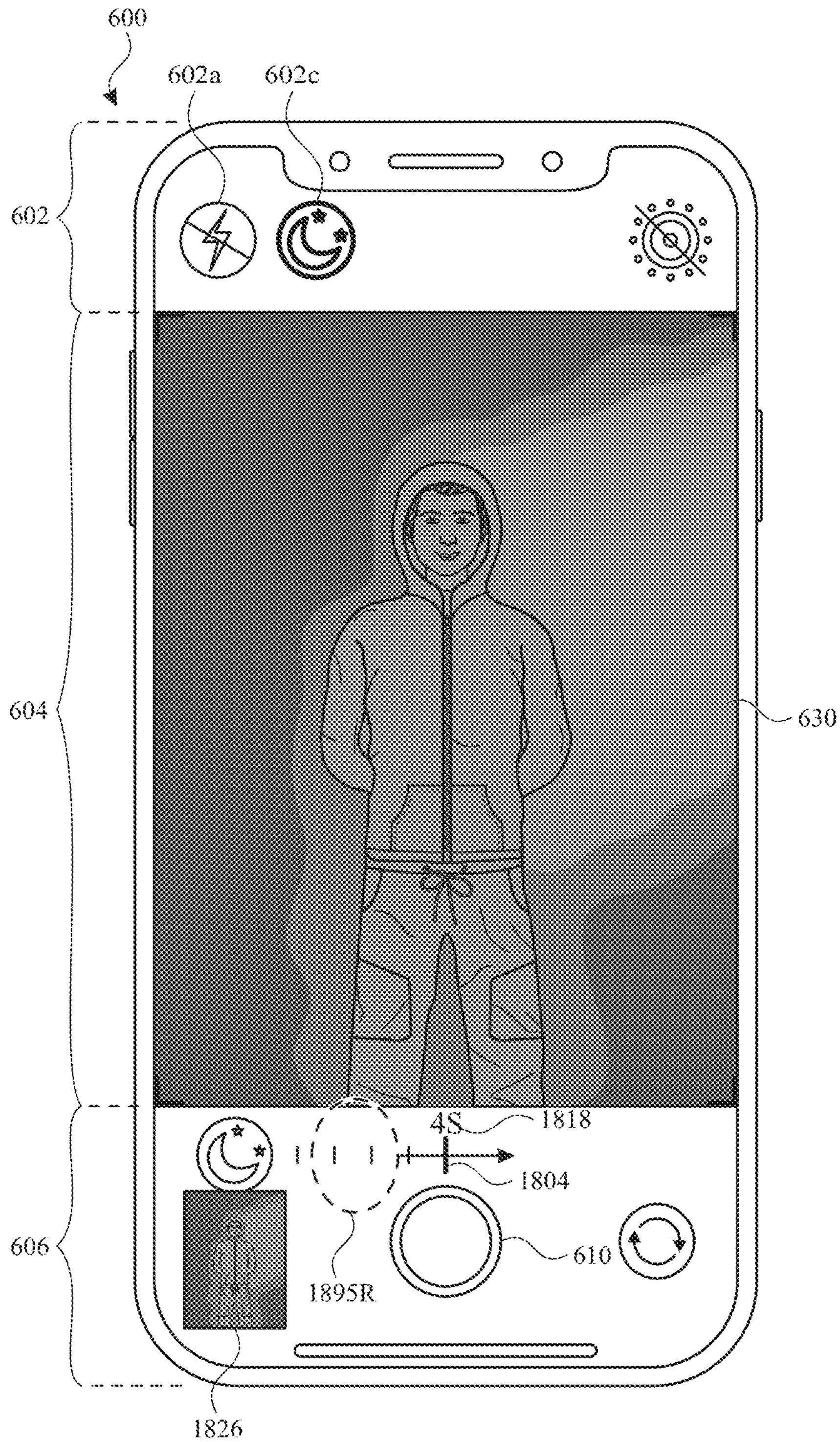
Figure 18S:
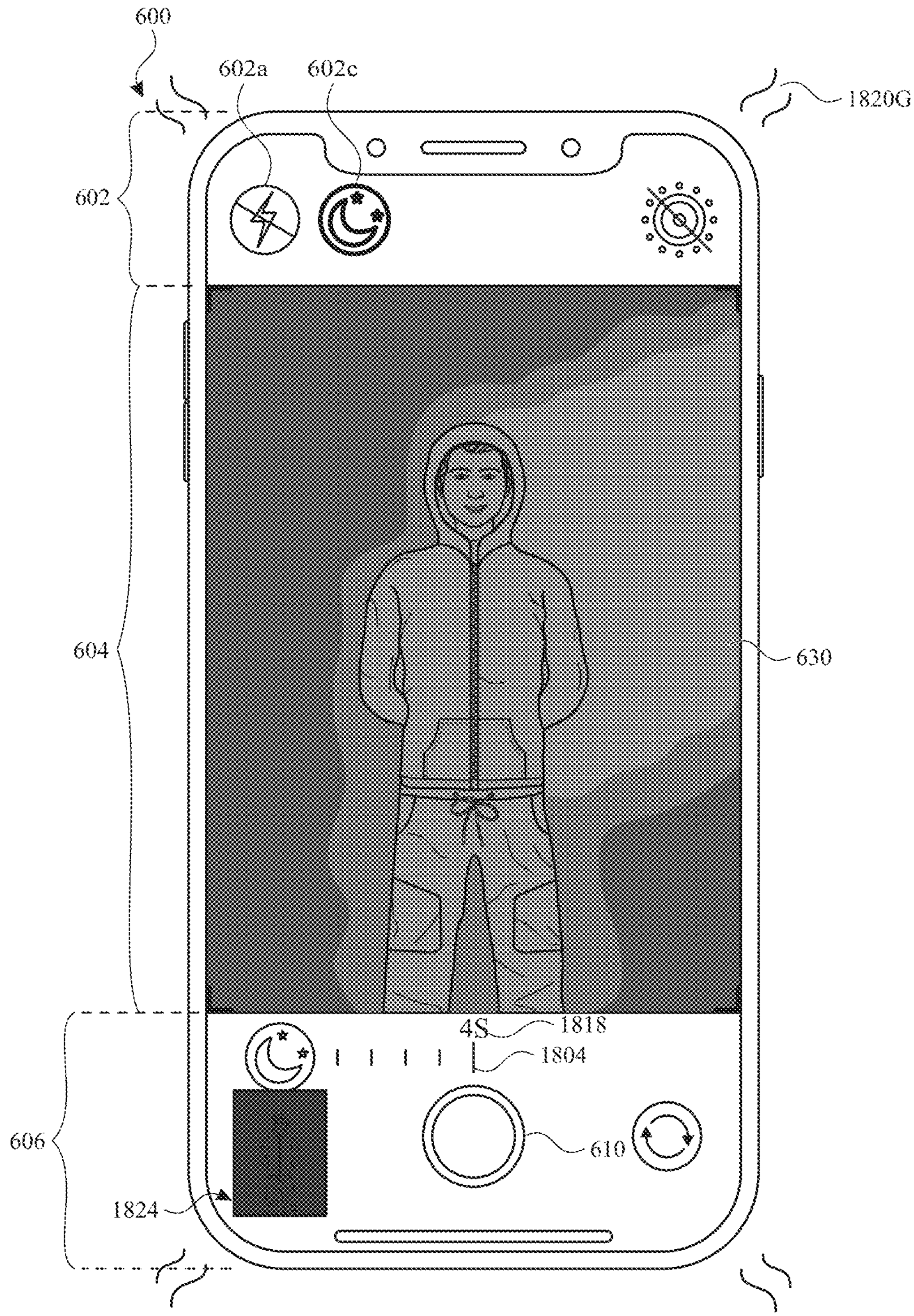
Figure 18T:
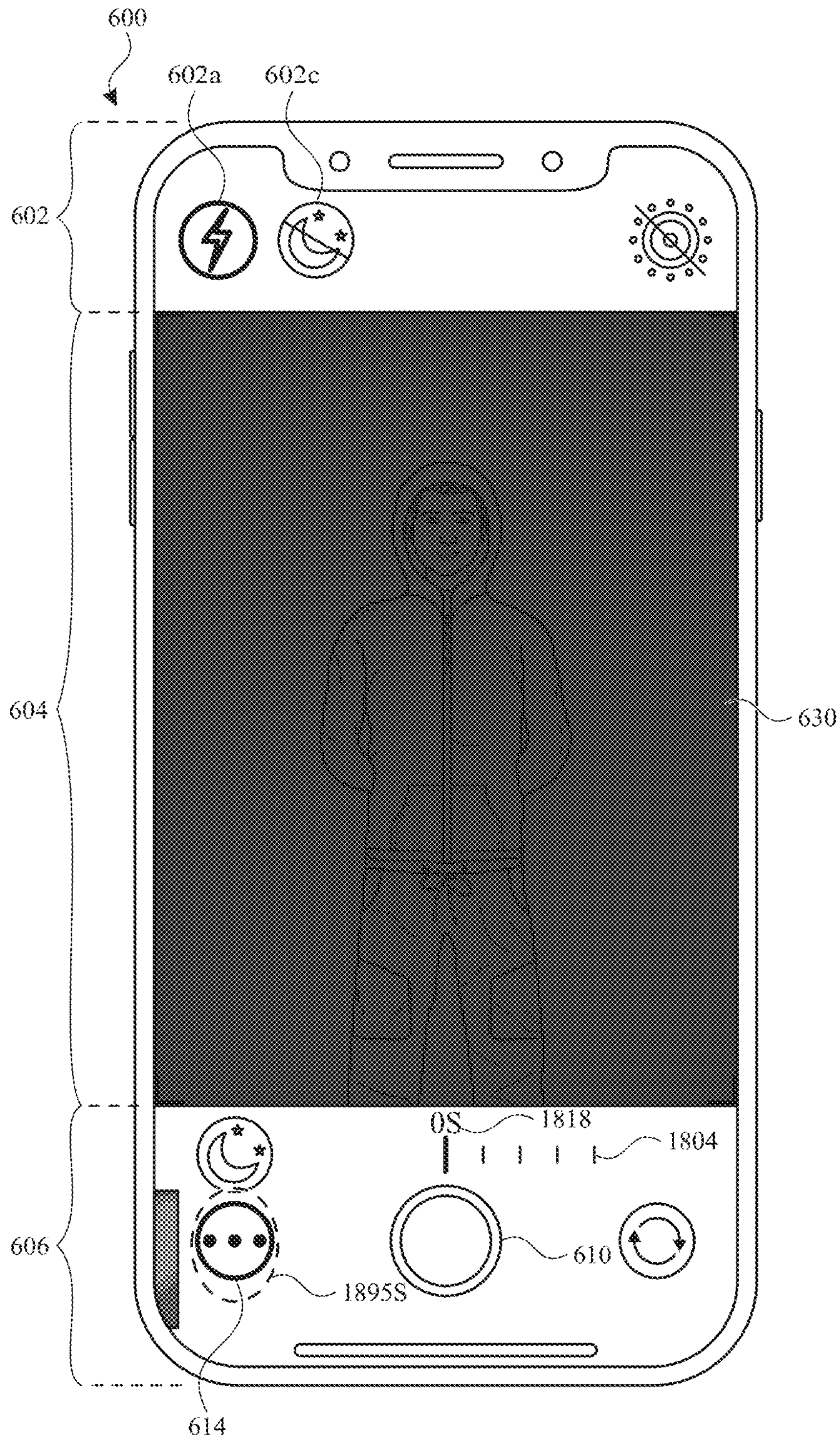
Figure 18U:
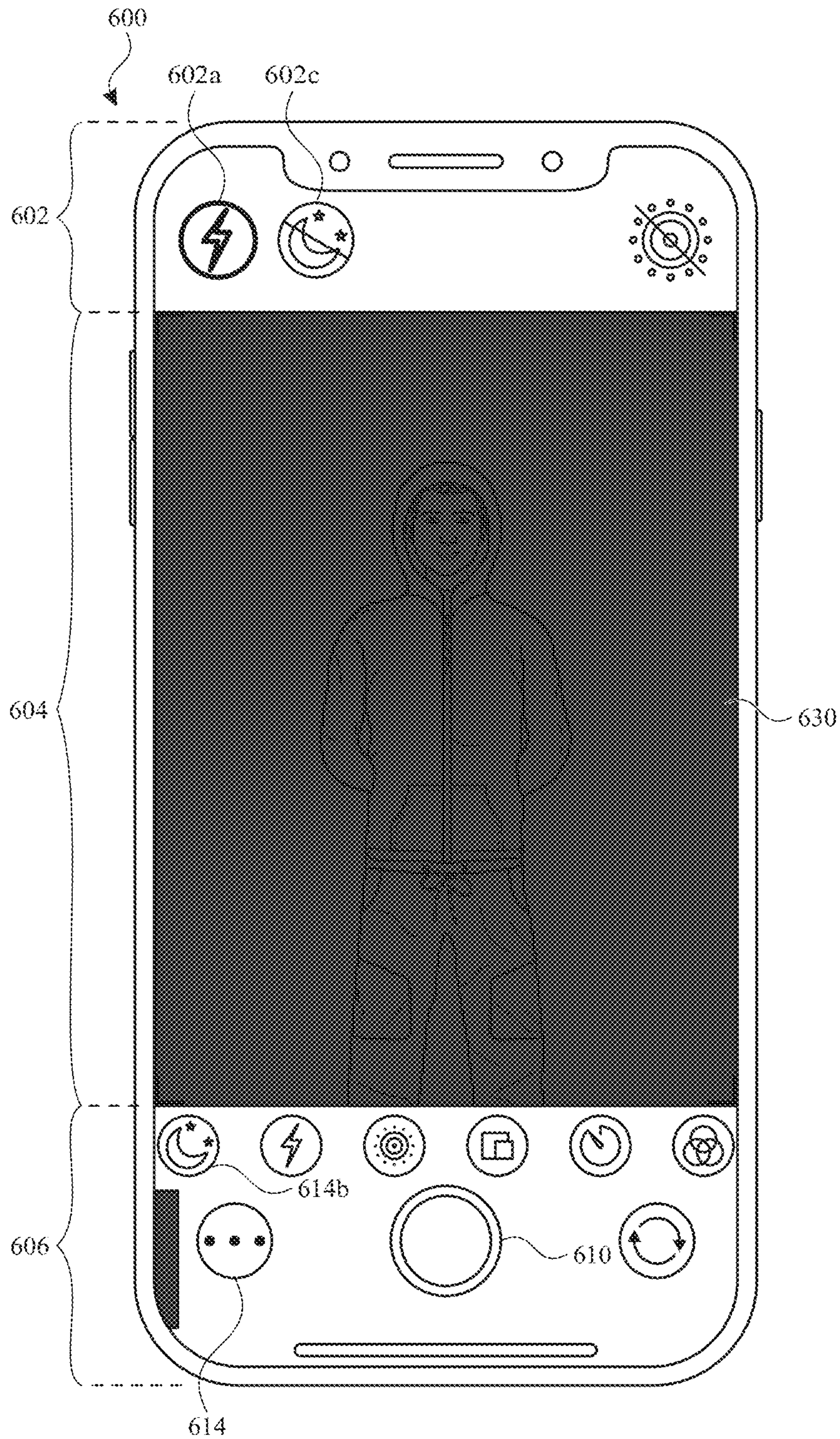
Figure 18V:
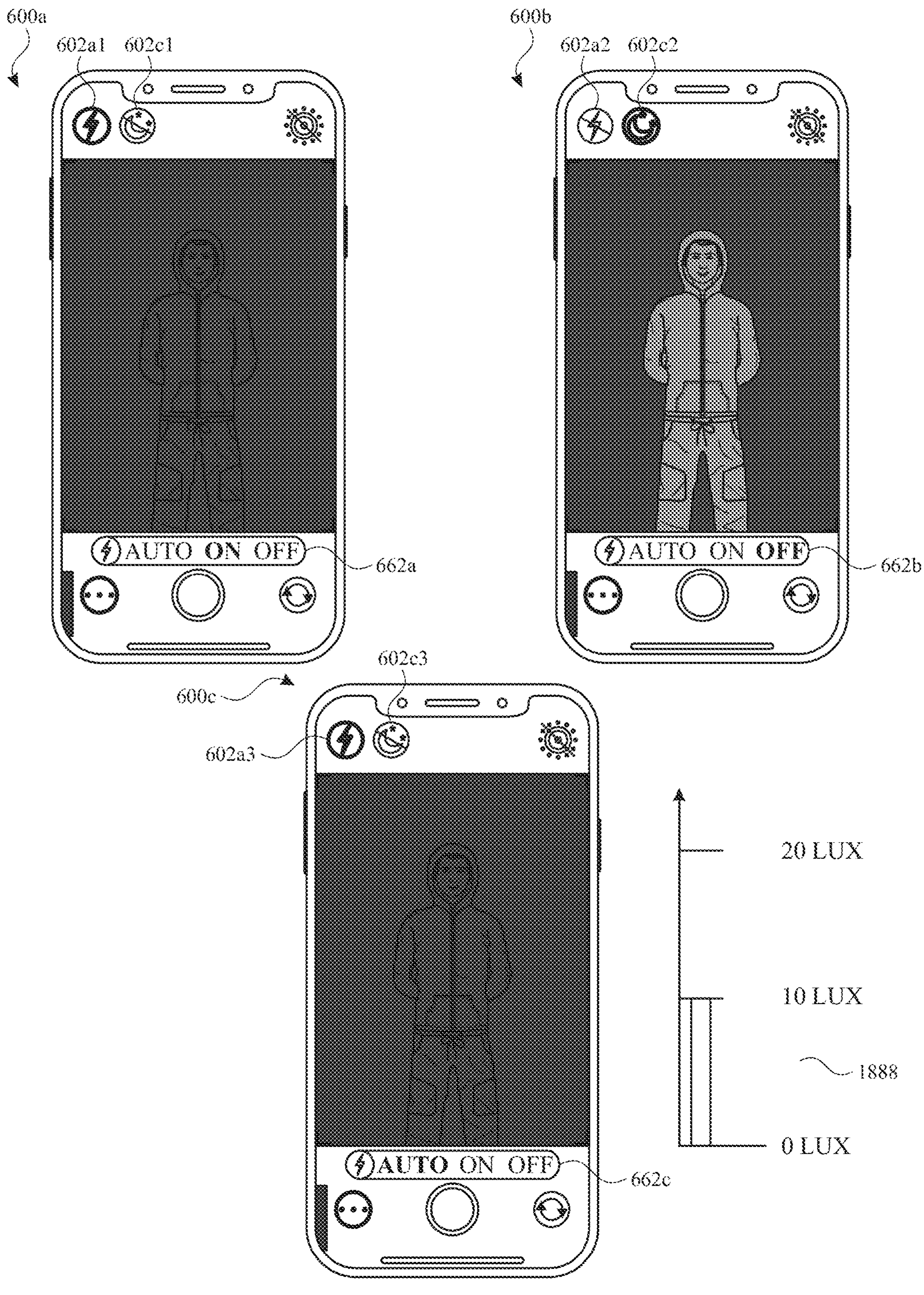
Figure 18W:
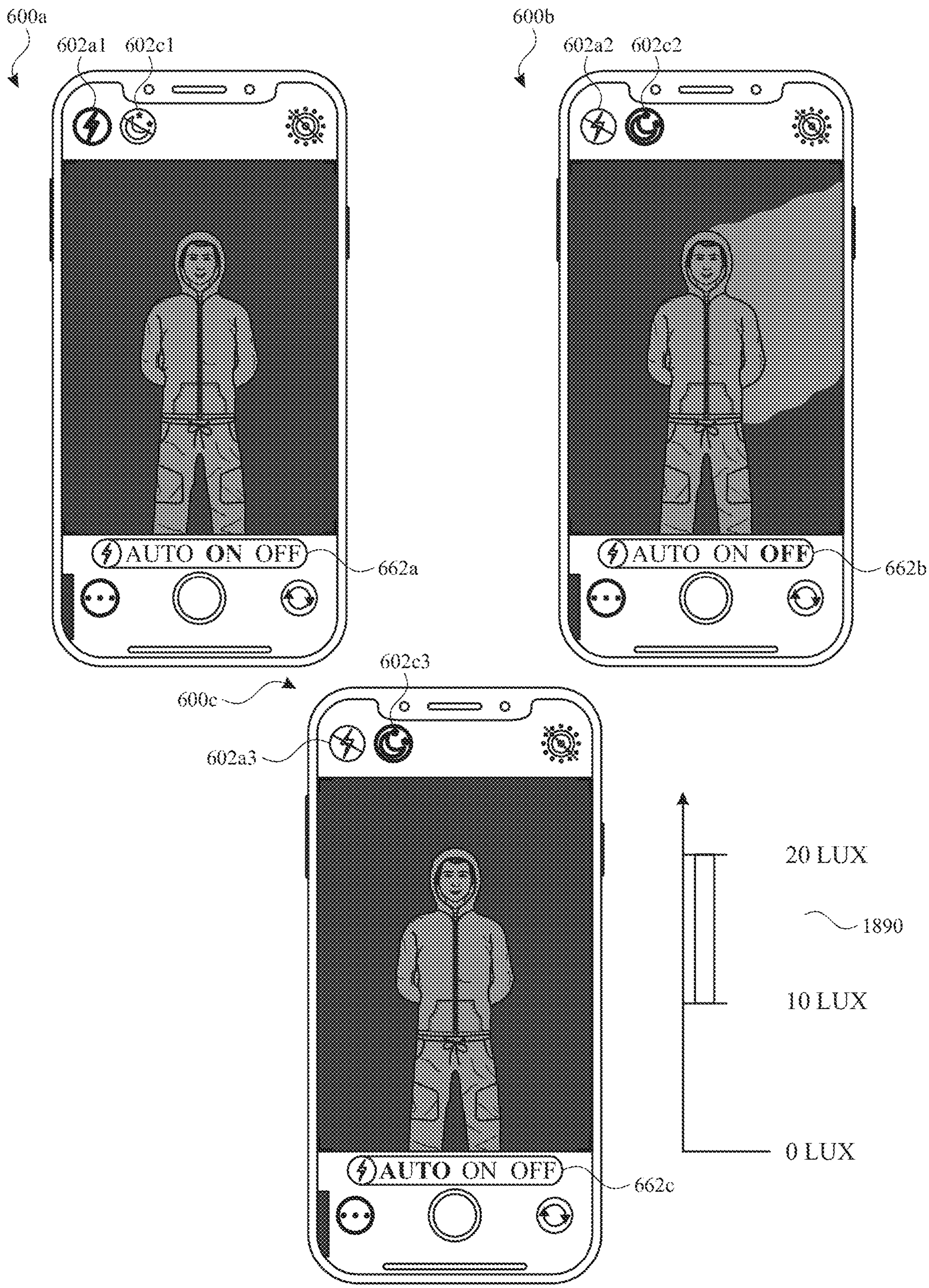
Figure 18X:
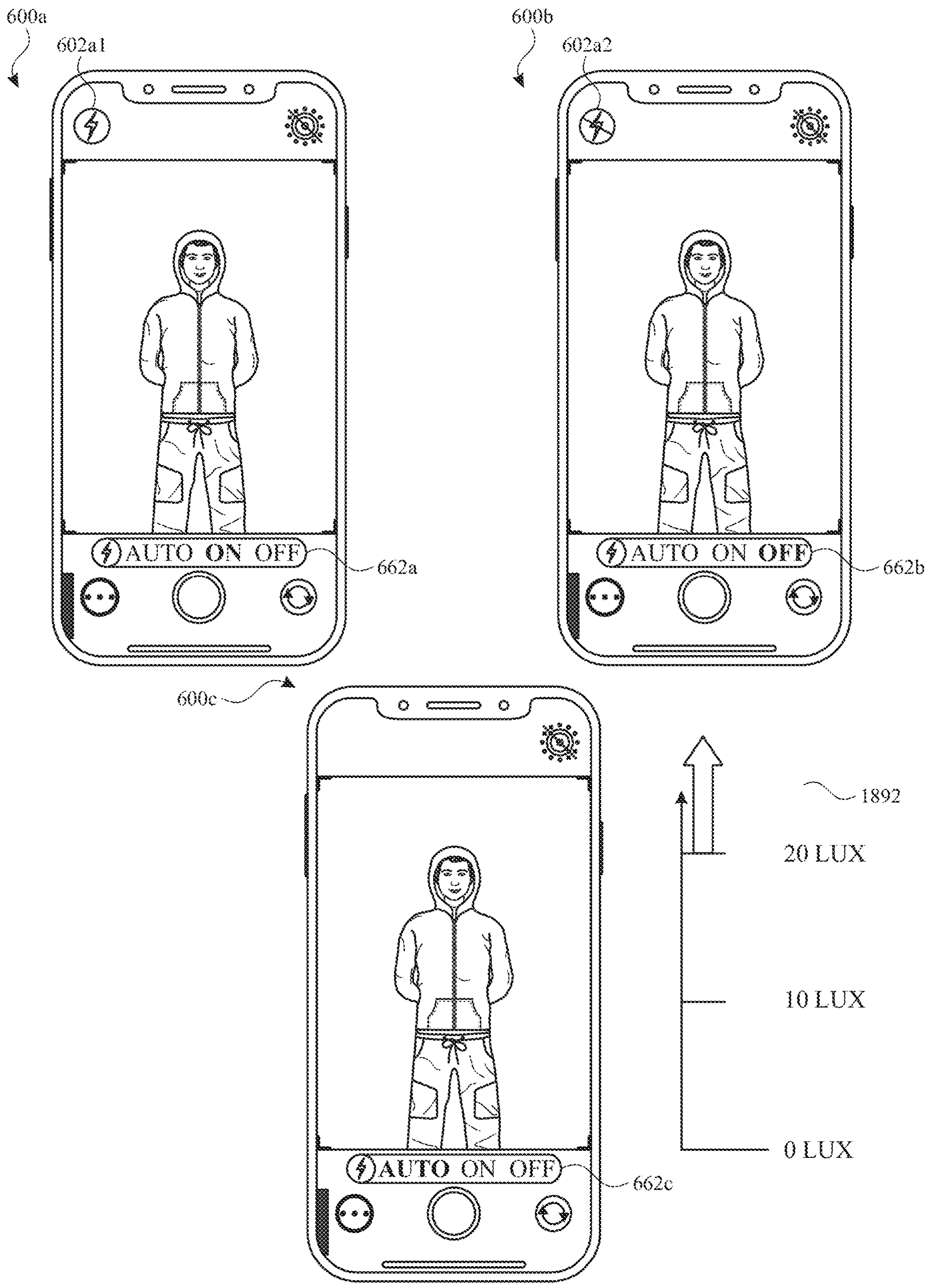
Figure 19A:
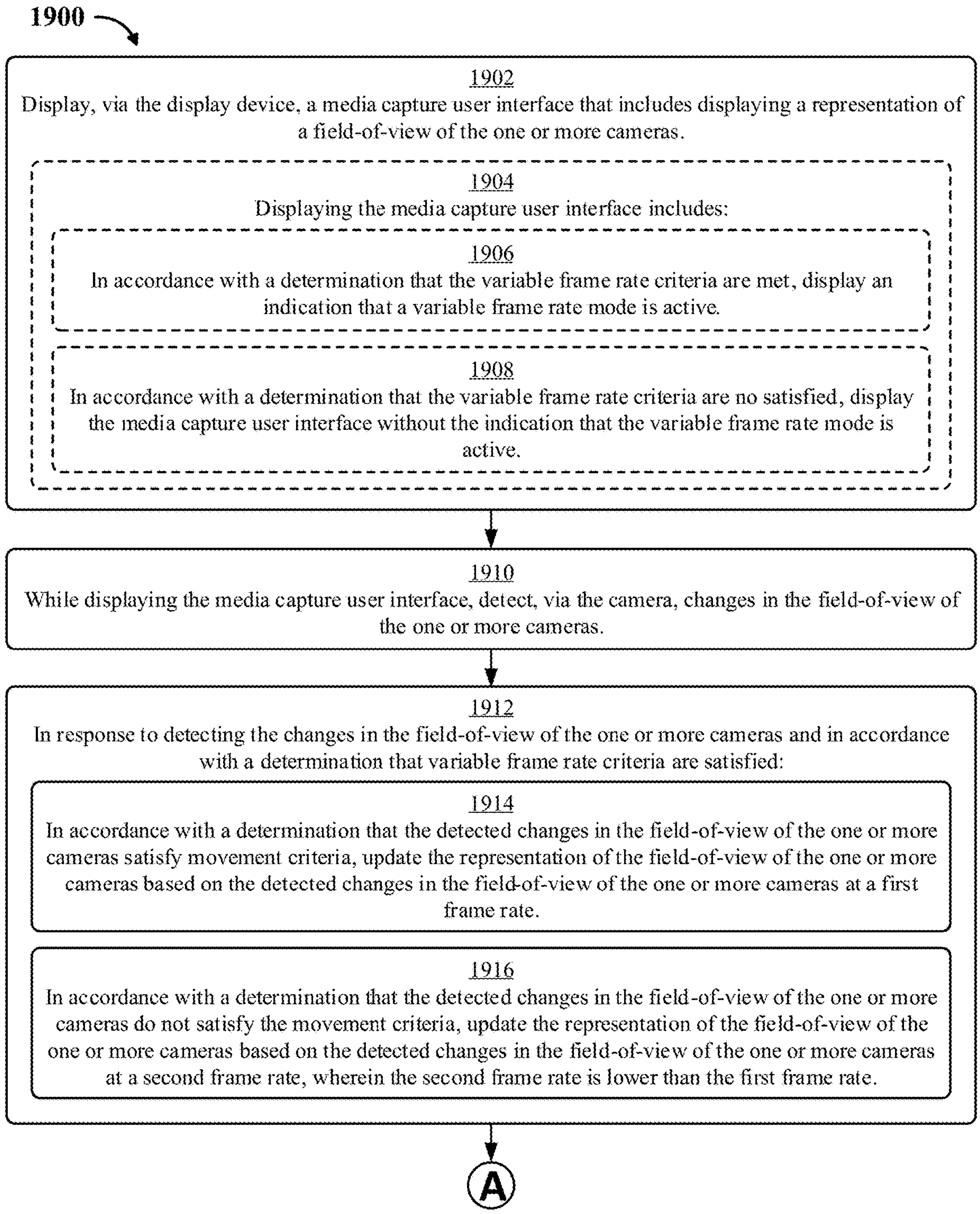
Figure 20A:
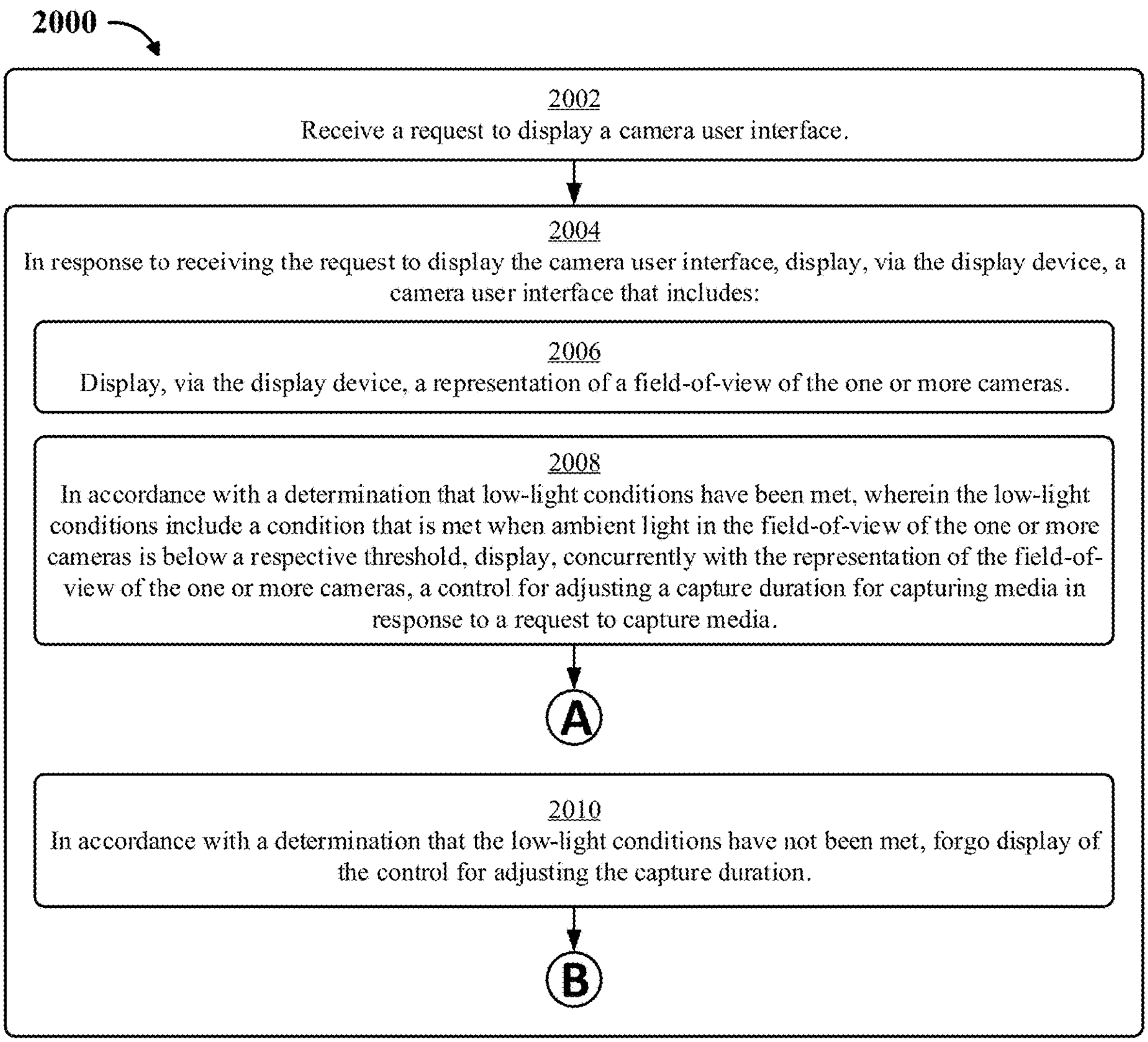
Figure 21A:
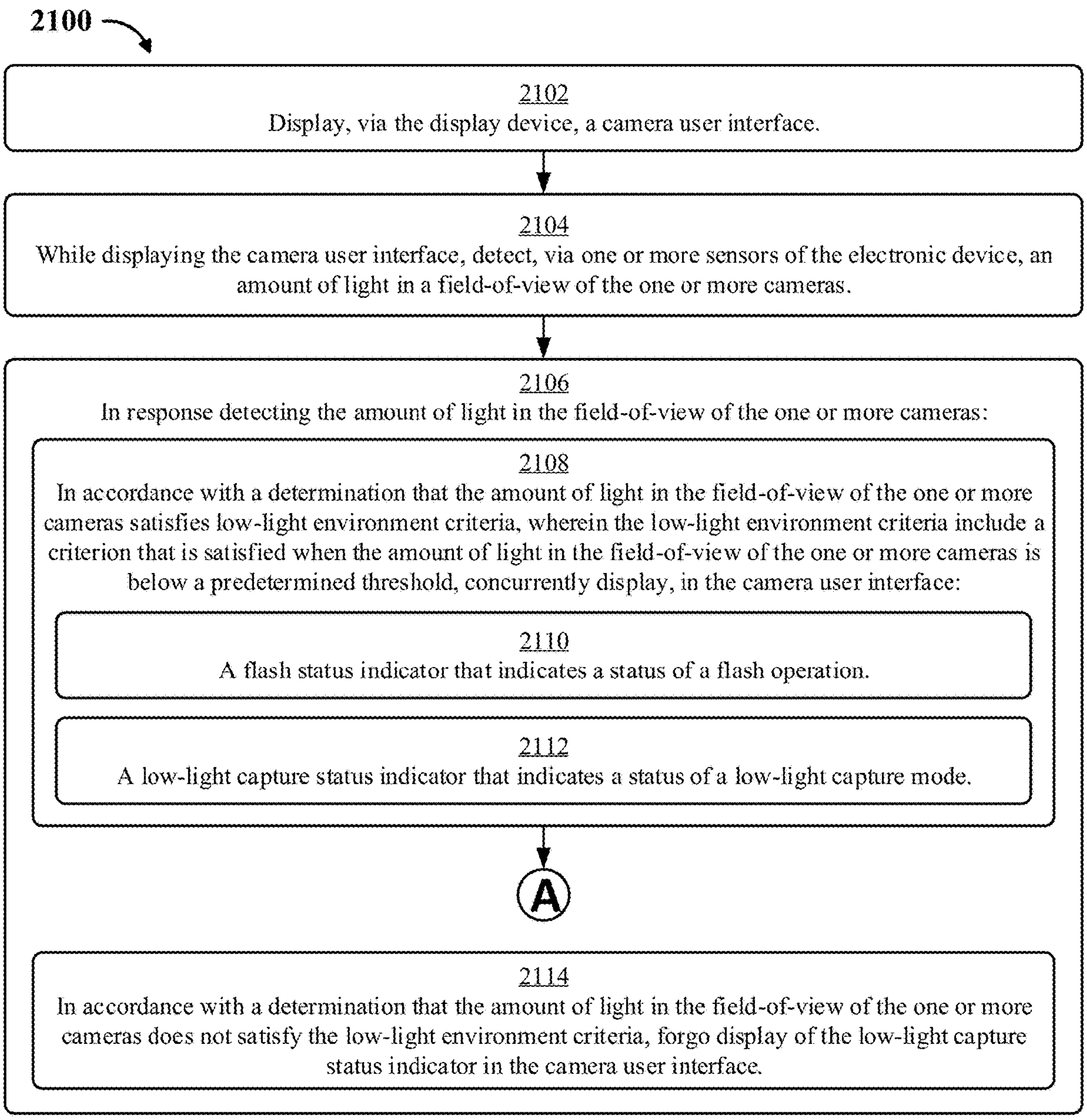
Figure 21C:
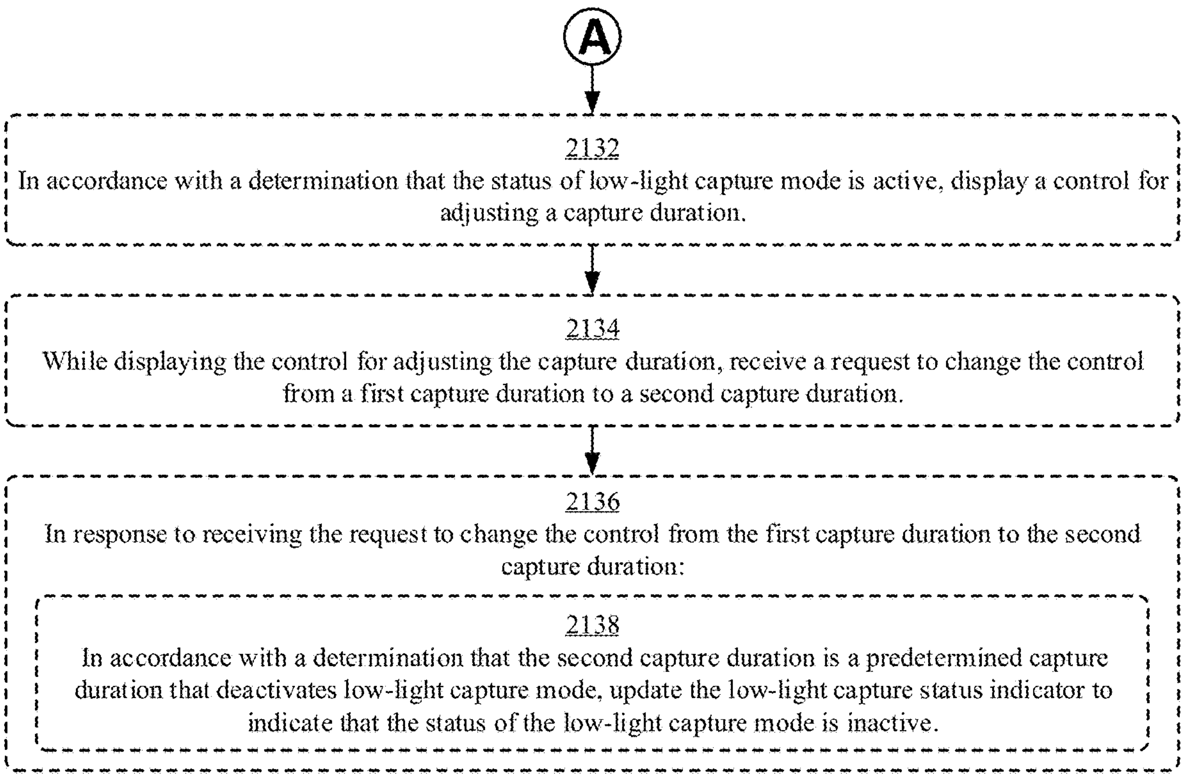

FIGS. 18A-18X illustrate exemplary techniques and user interfaces for managing media using an electronic device in accordance with some embodiments. FIGS. 19A-19B are a flow diagram illustrating a method for varying frame rates using an electronic device in accordance with some embodiments. FIGS. 20A-20C are a flow diagram illustrating a method for accommodating light conditions using an electronic device in accordance with some embodiments. FIGS. 21A-21C are a flow diagram illustrating a method for providing camera indications using an electronic device in accordance with some embodiments. The user interfaces in FIGS. 18A-18X are used to illustrate the processes described below, including the processes in FIGS. 19A-19B, 20A-20C, and 21A-21C.

Figure 22A:
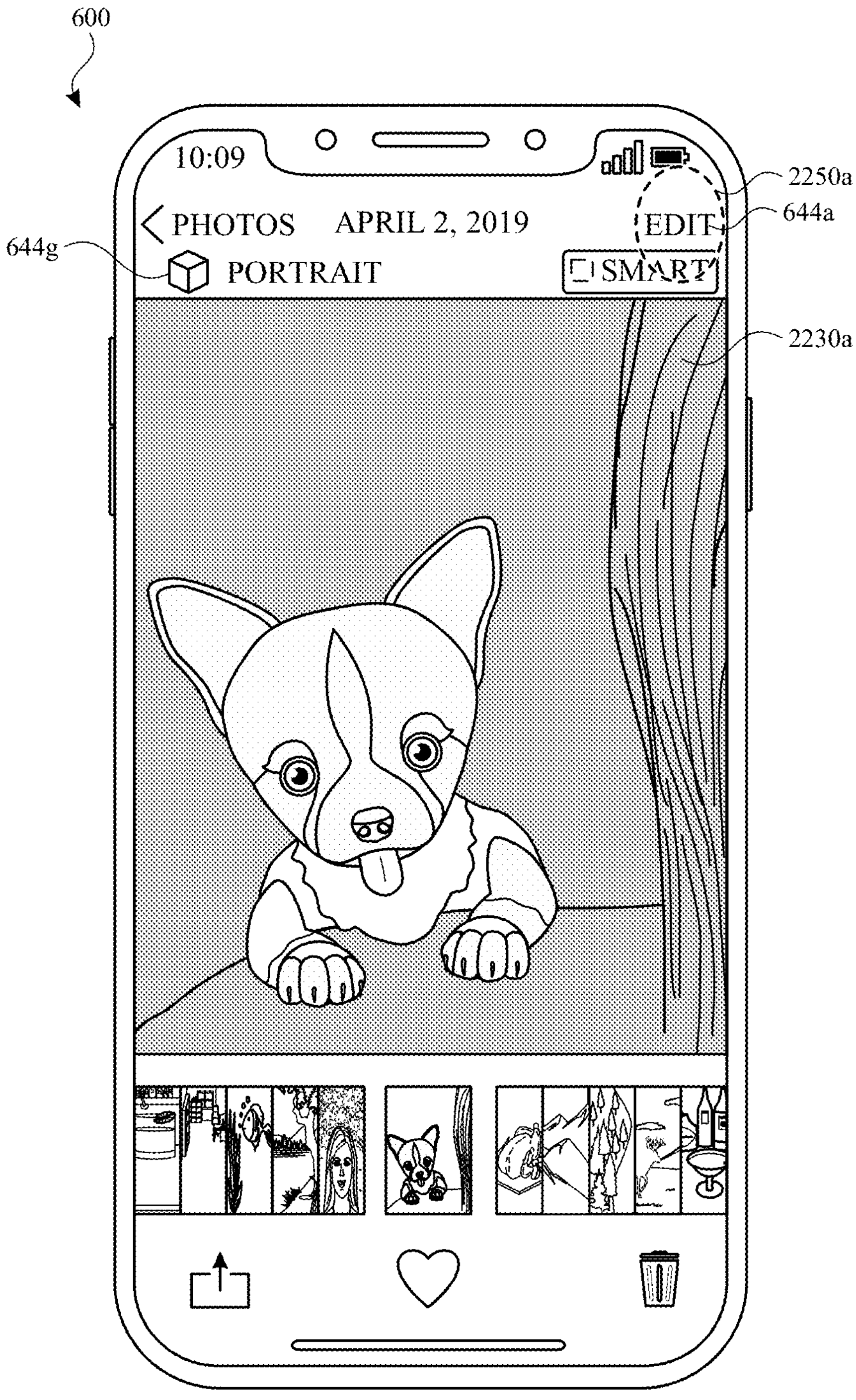
FIGS. 22A-22AM illustrate exemplary user interfaces for editing captured media in accordance with some embodiments.
Figure 23B:
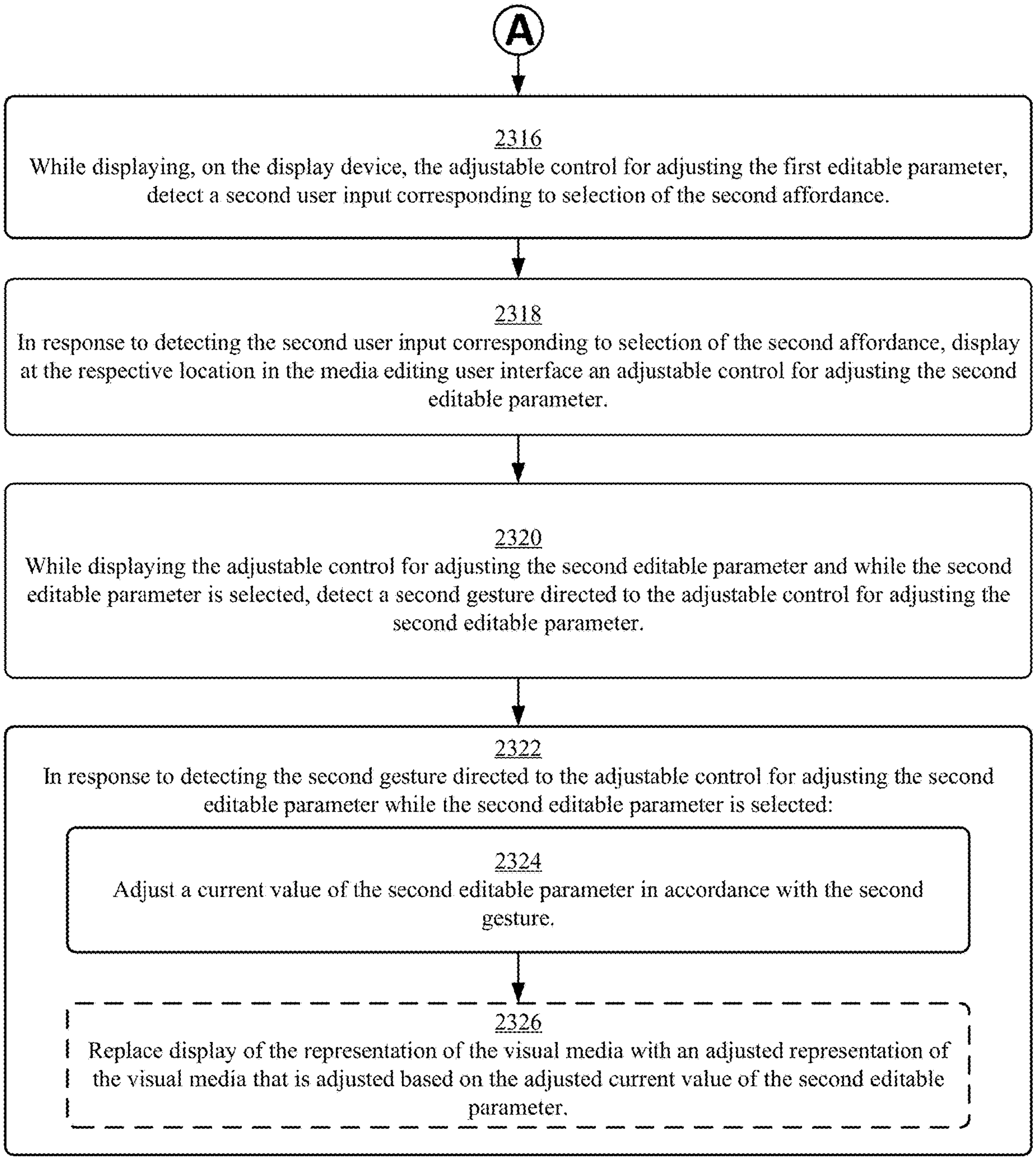

FIGS. 22A-22AM illustrate exemplary user interfaces for editing captured media in accordance with some embodiments. FIGS. 23A-23B are a flow diagram illustrating a method for editing captured media using an electronic device in accordance with some embodiments. The user interfaces in FIGS. 22A-22AM are used to illustrate the processes described below, including the processes in FIGS. 23A-23B.

Figure 24A:
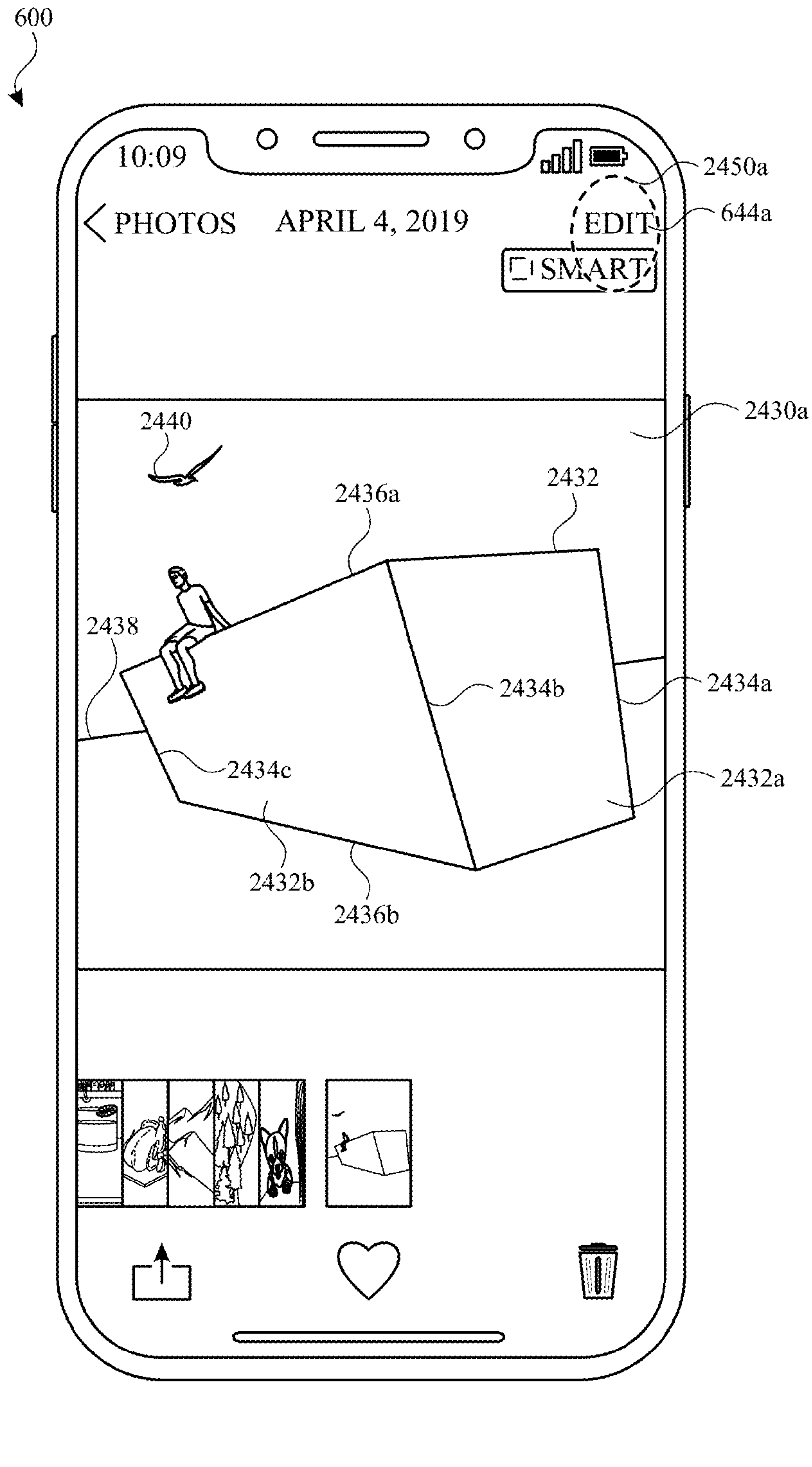
FIGS. 24A-24AB illustrate exemplary user interfaces for editing captured media in accordance with some embodiments.

FIGS. 24A-24AB illustrate exemplary user interfaces for editing captured media in accordance with some embodiments. FIGS. 25A-25B are a flow diagram illustrating a method for editing captured media using an electronic device in accordance with some embodiments. The user interfaces in FIGS. 24A-24AB are used to illustrate the processes described below, including the processes in FIGS. 25A-25B.

Figure 26A:
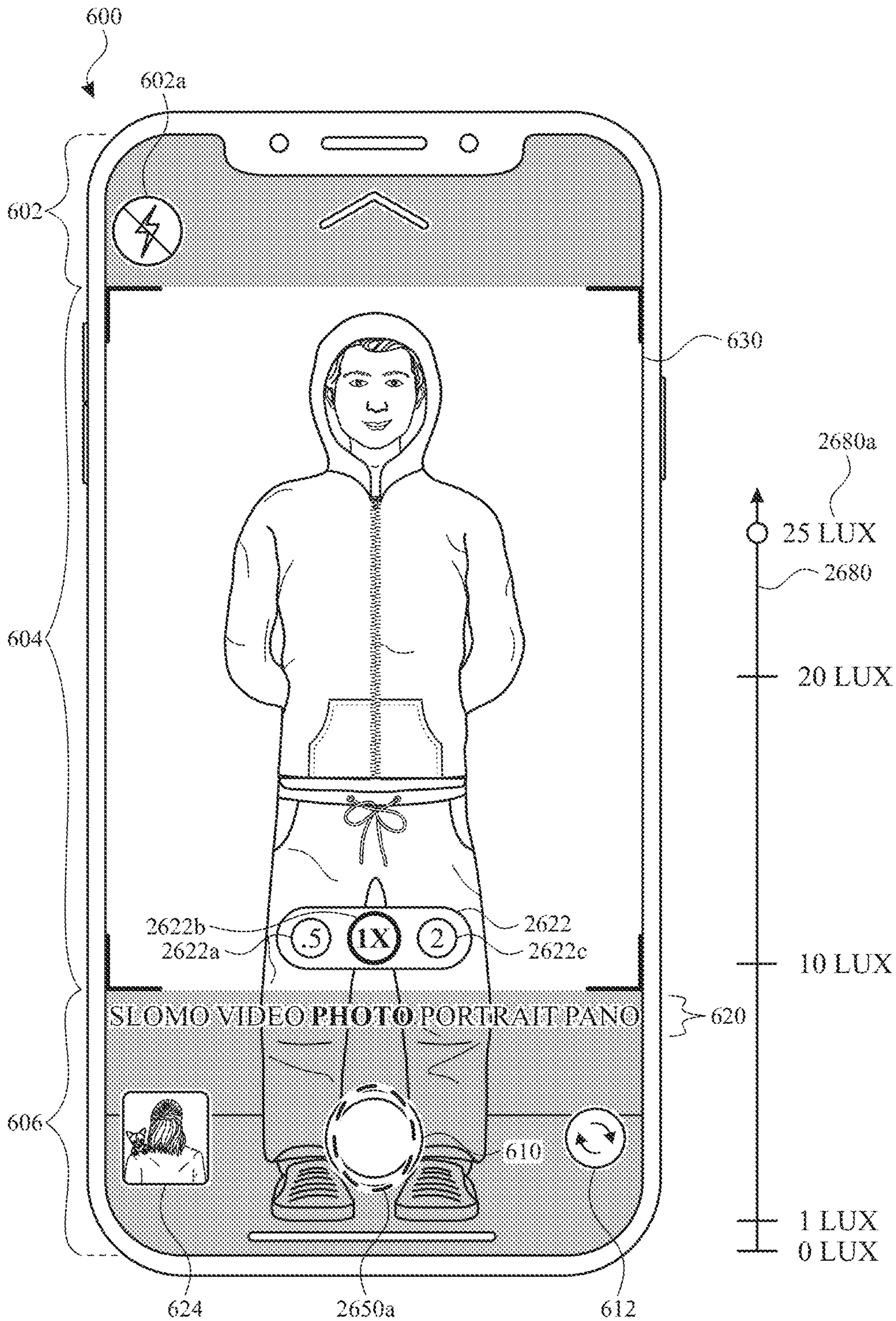
FIGS. 26A-26U illustrate exemplary user interfaces for managing media using an electronic device in accordance with some embodiments.
Figure 26B:
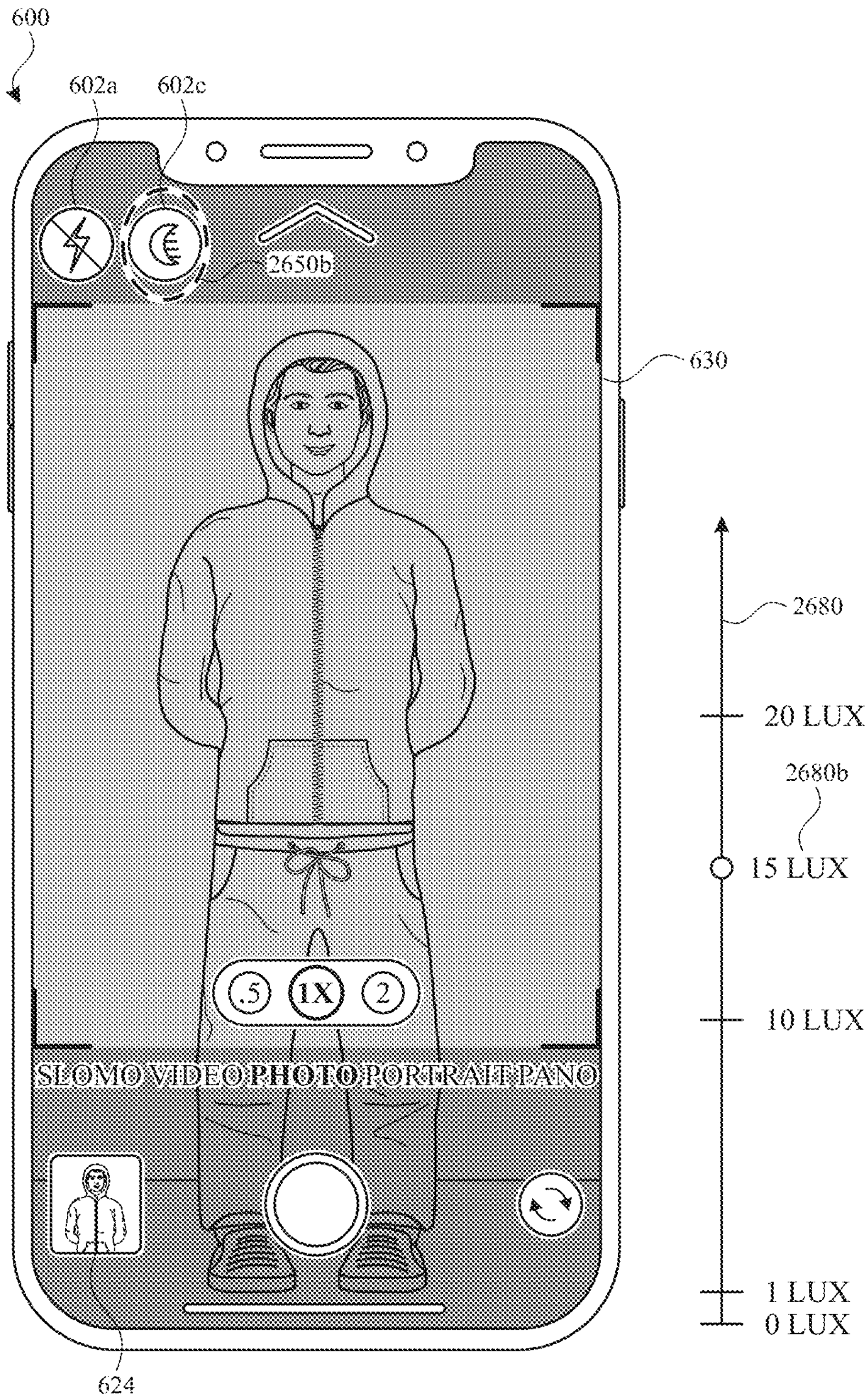
Figure 26C:
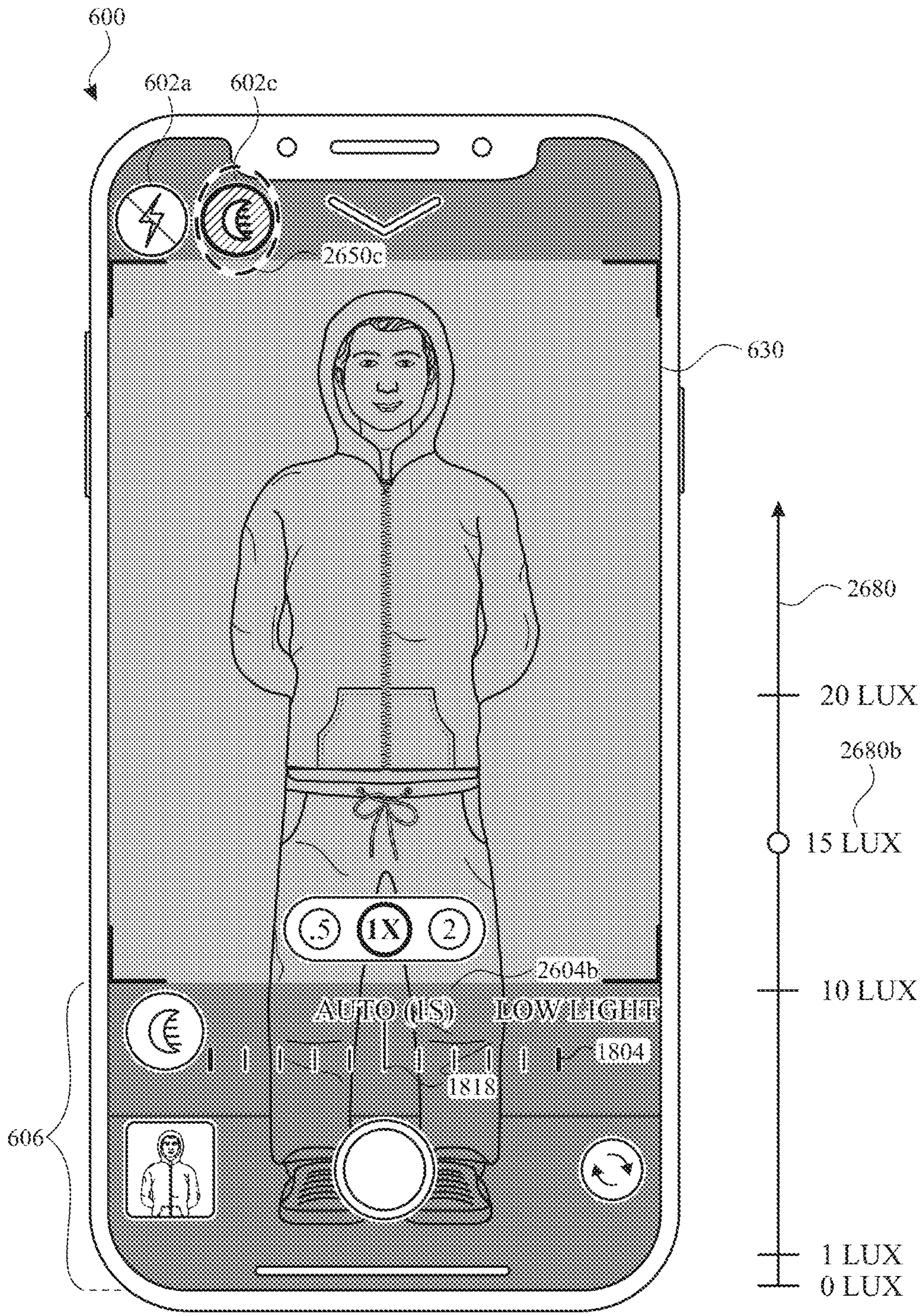
Figure 26D:
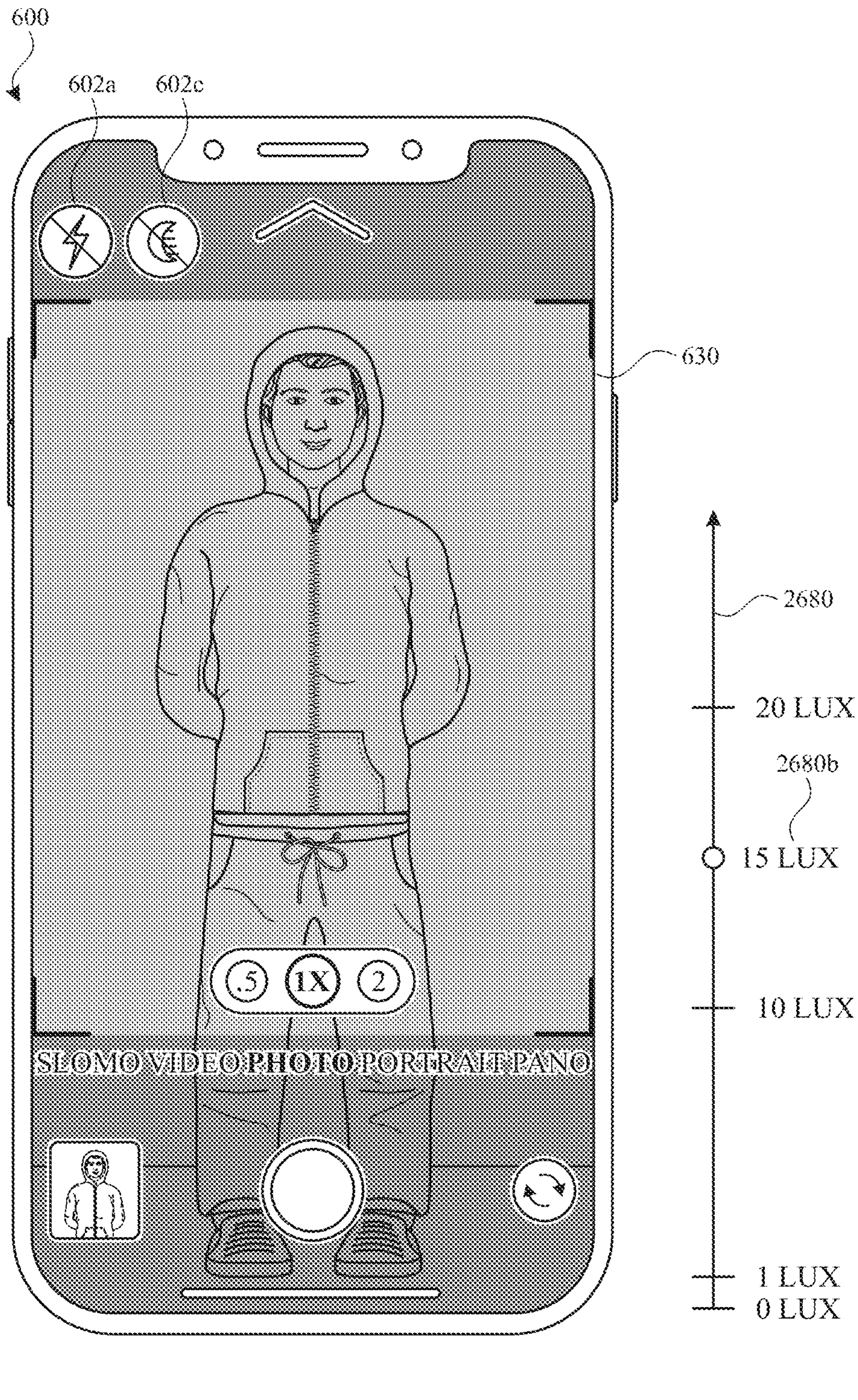
Figure 26E:
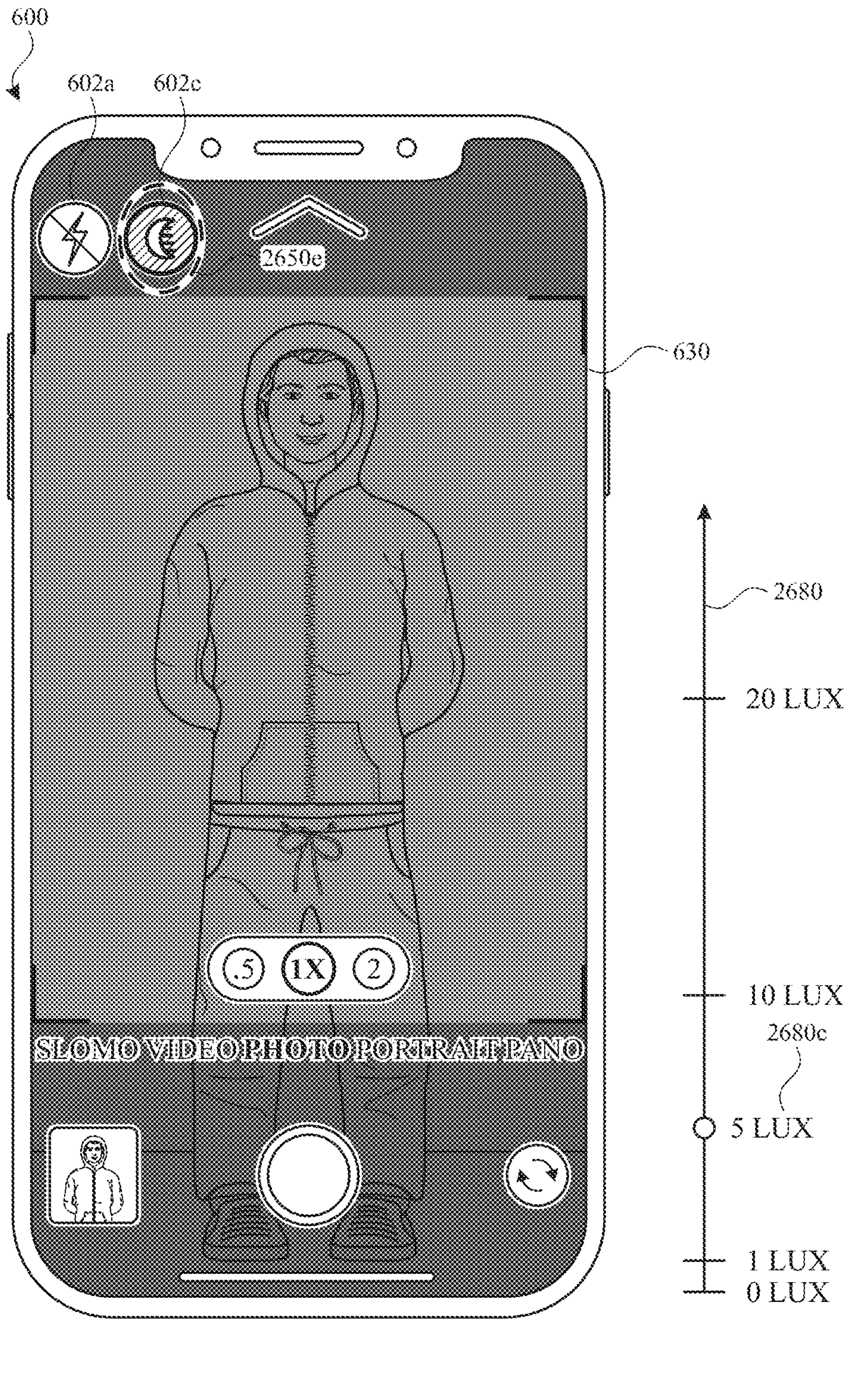
Figure 26F:
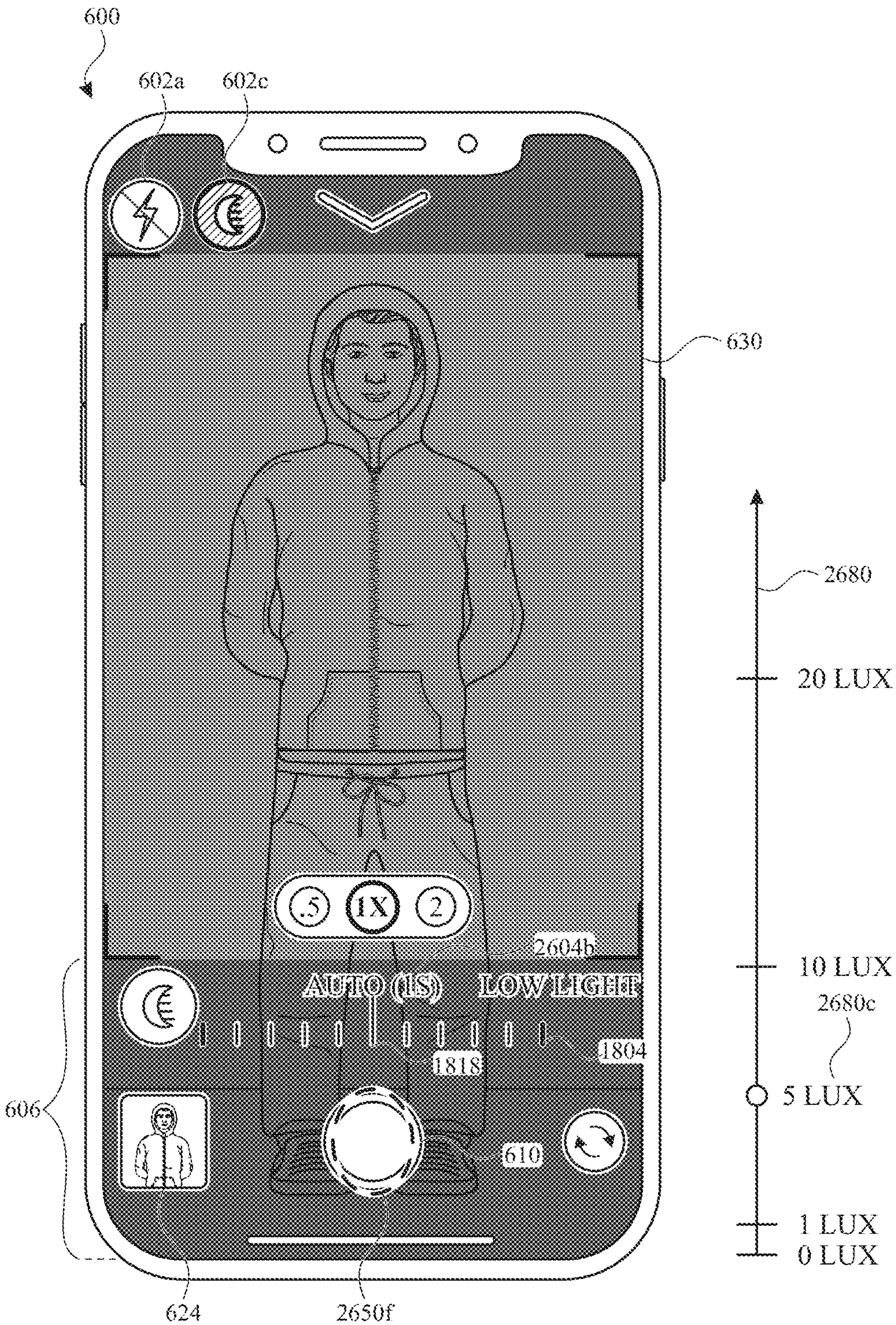
Figure 26G:
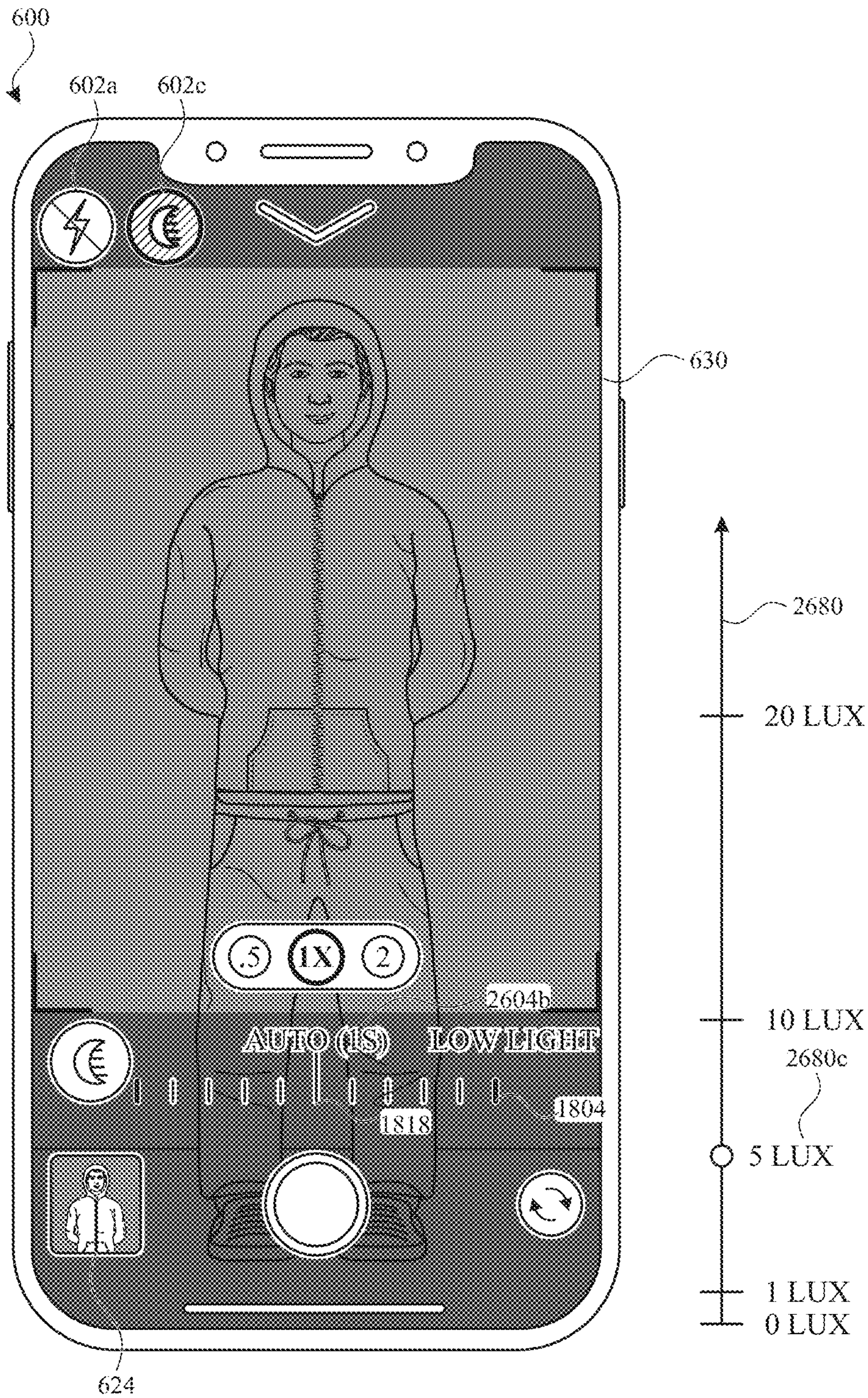
Figure 26H:
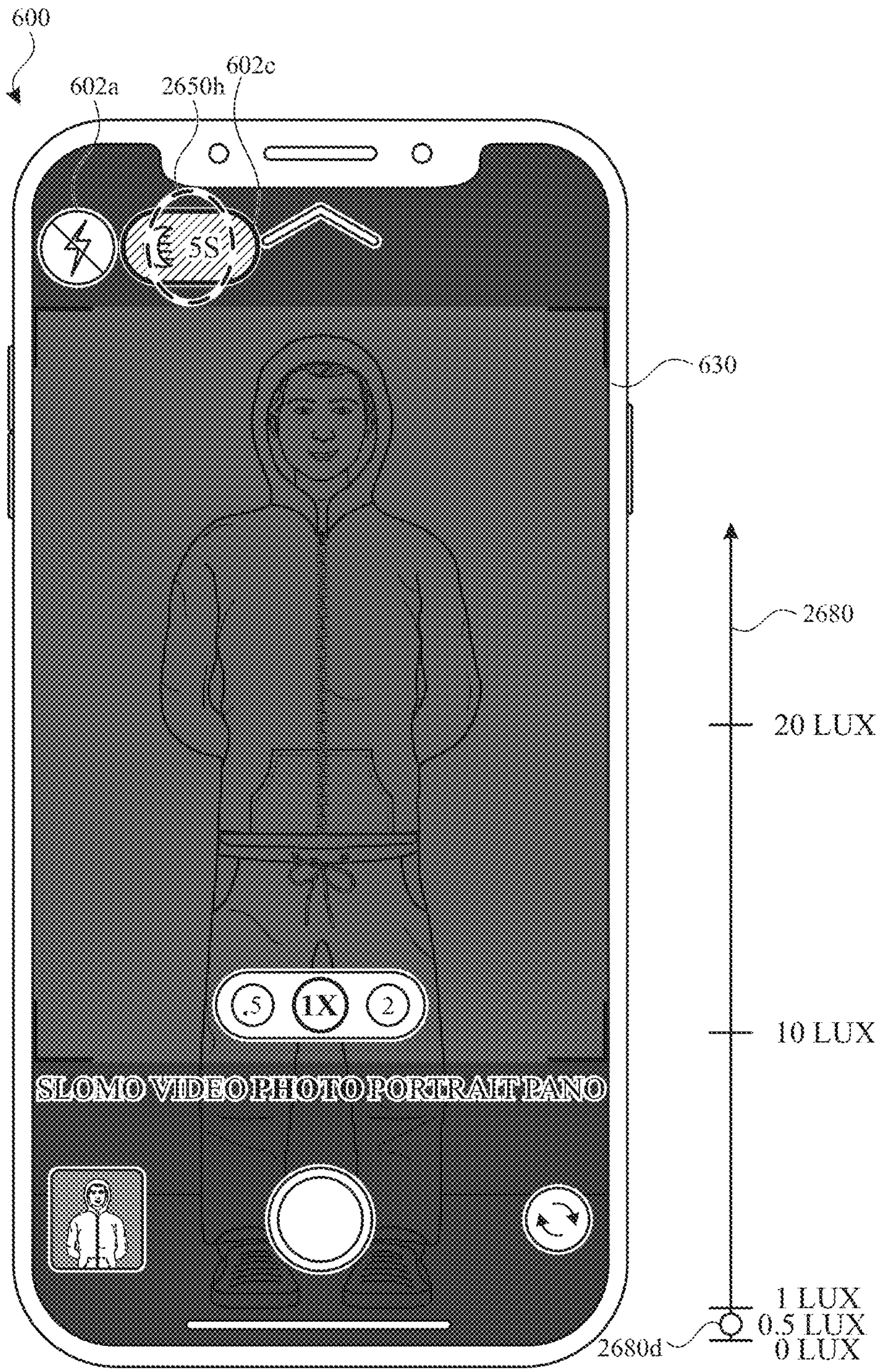
Figure 26I:
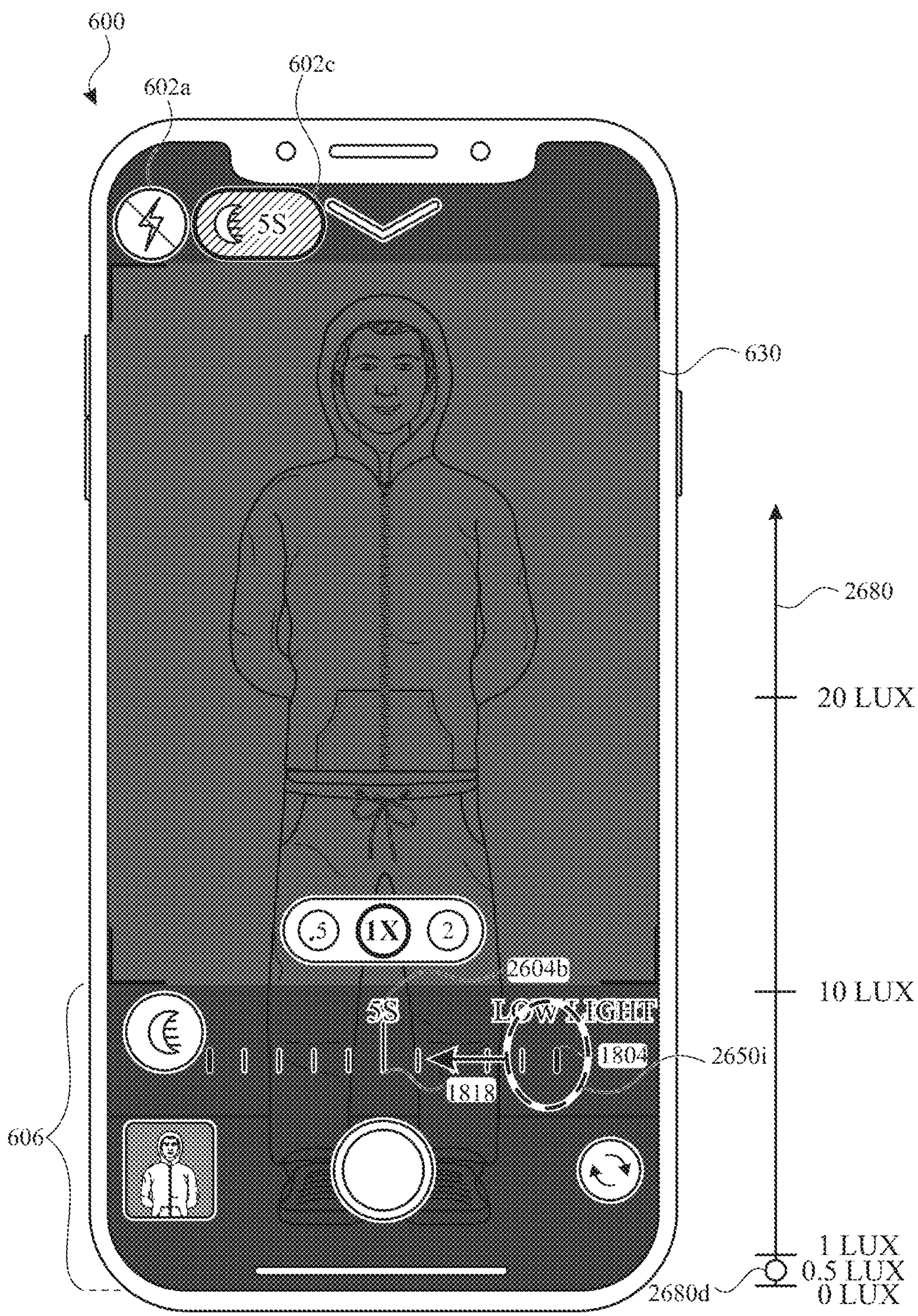
Figure 26J:
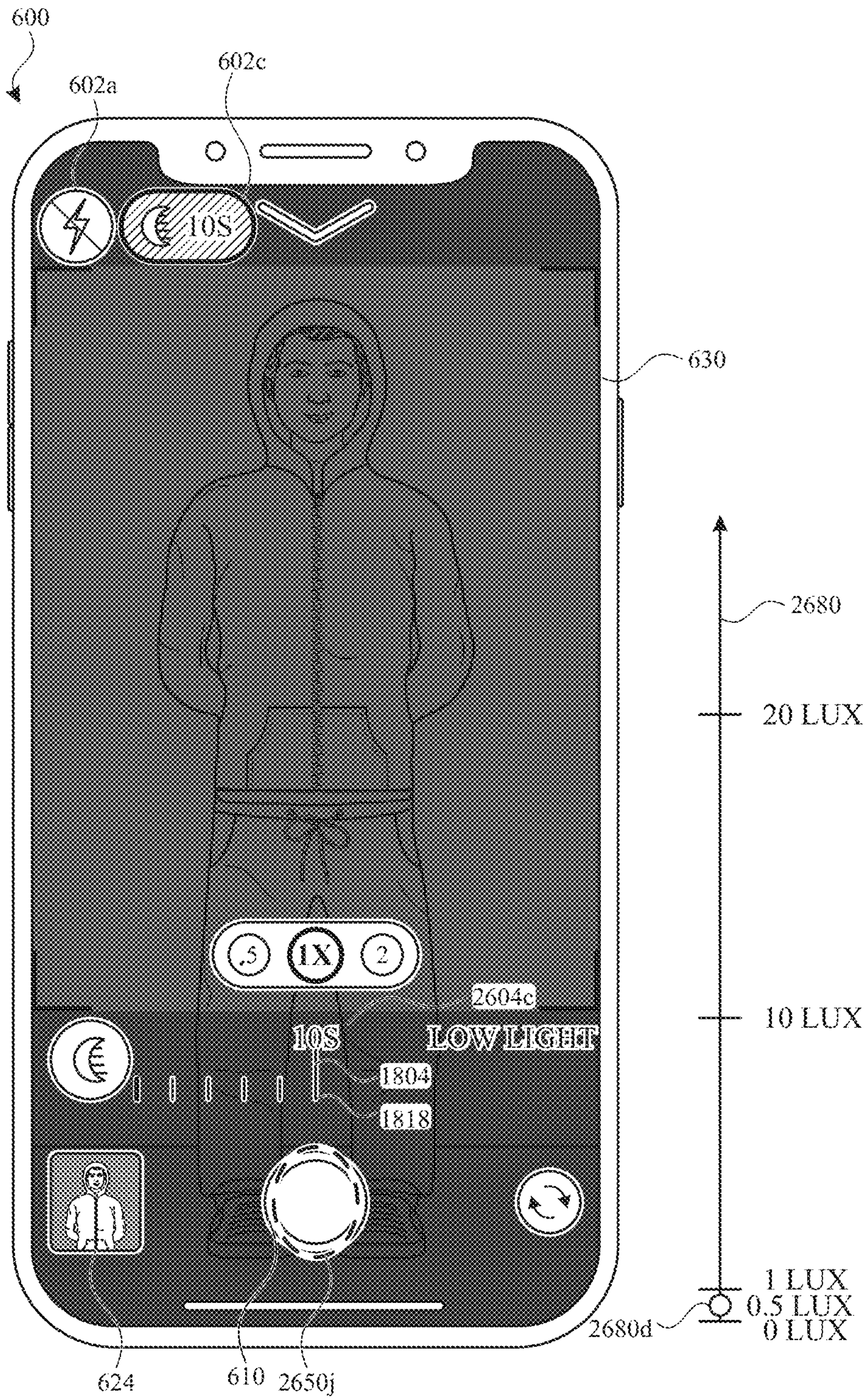
Figure 26K:
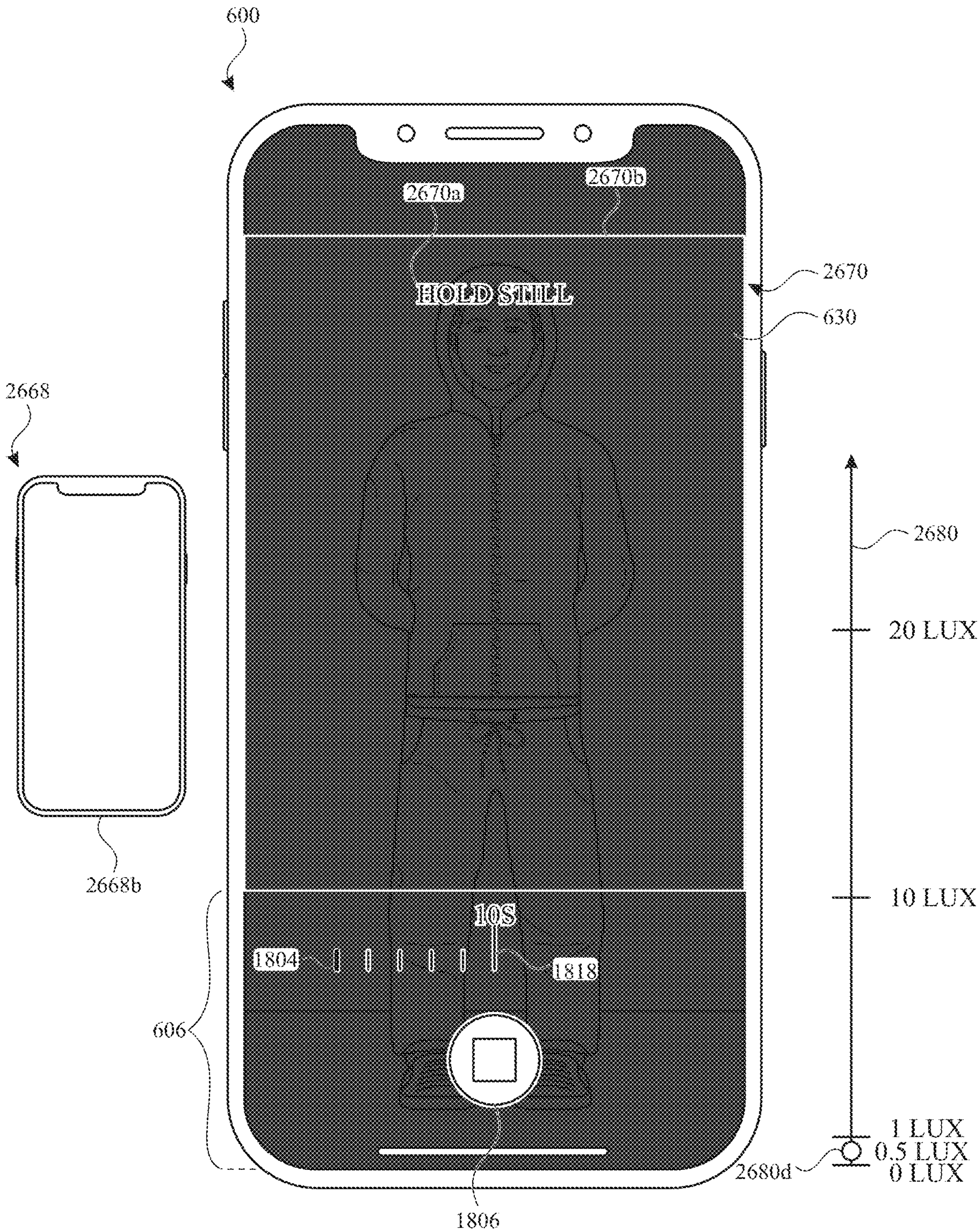
Figure 26L:
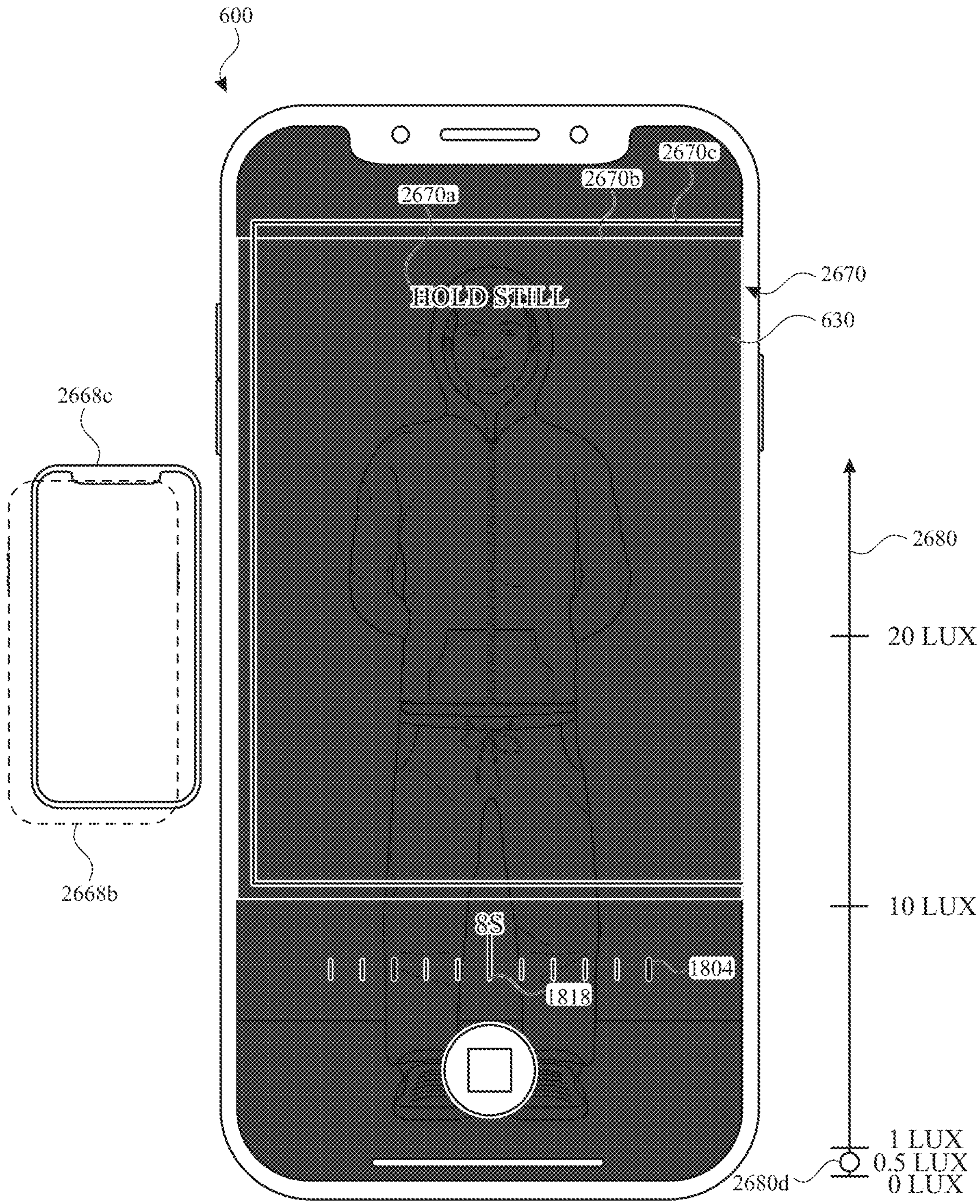
Figure 26M:
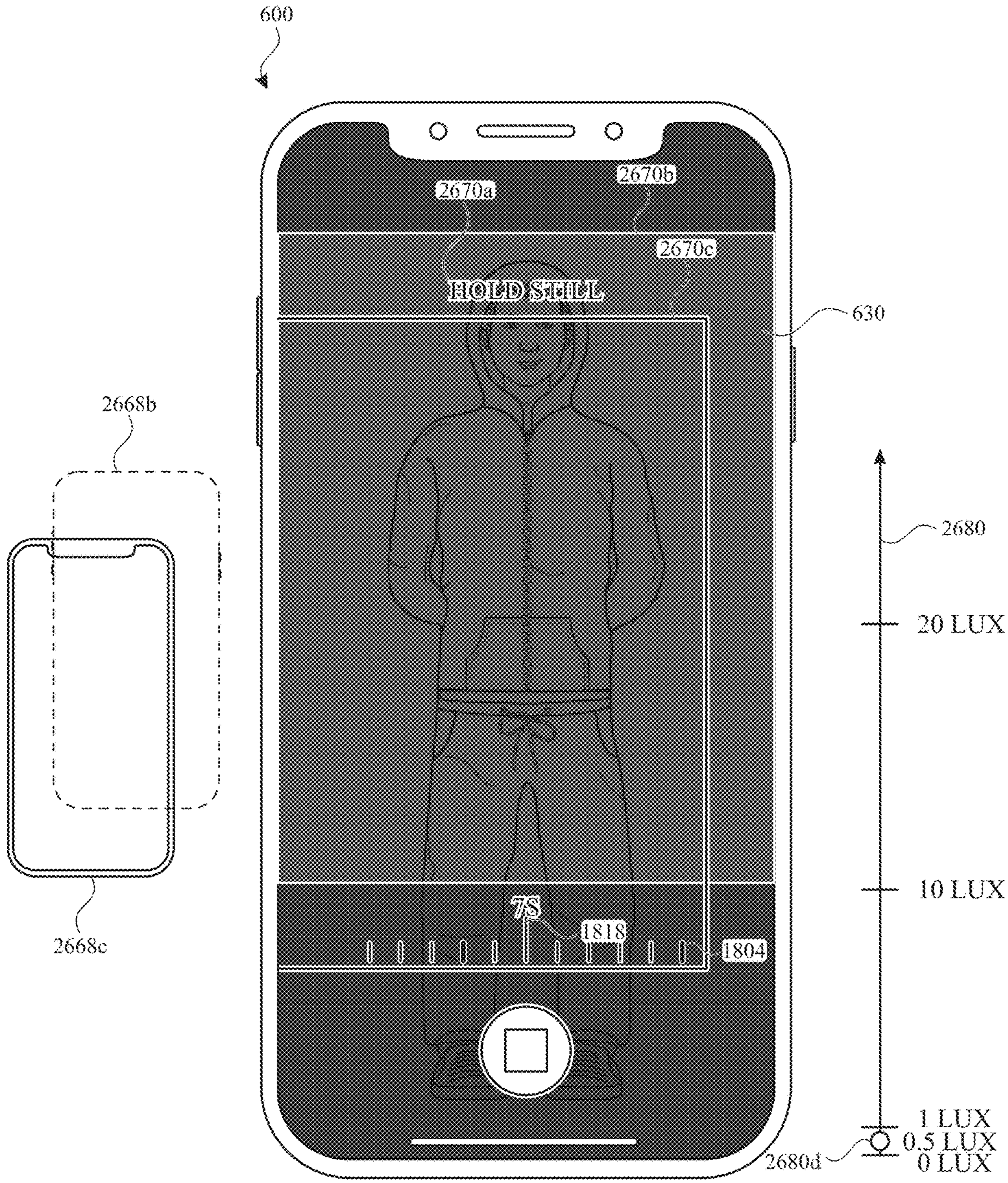
Figure 26N:
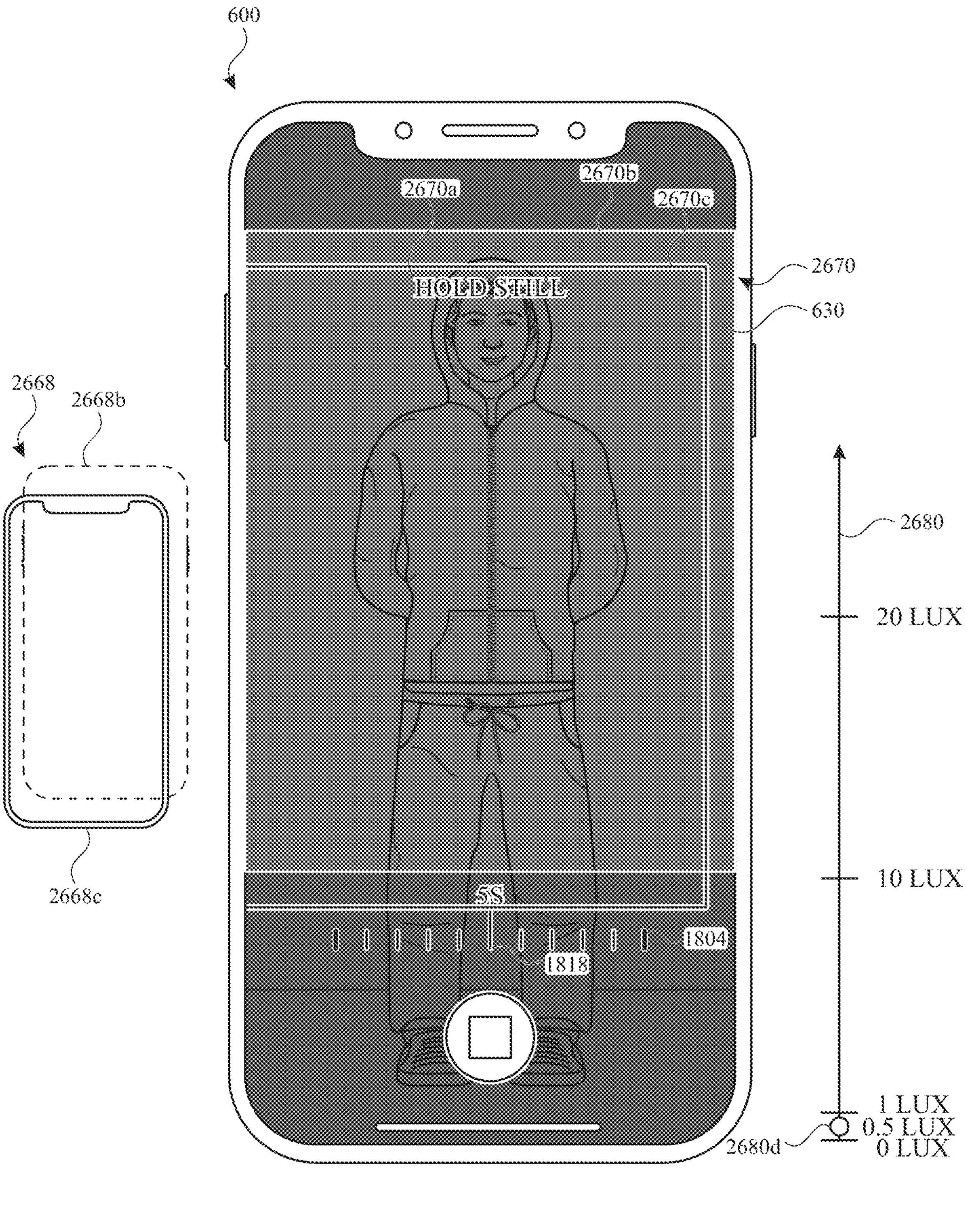
Figure 26O:
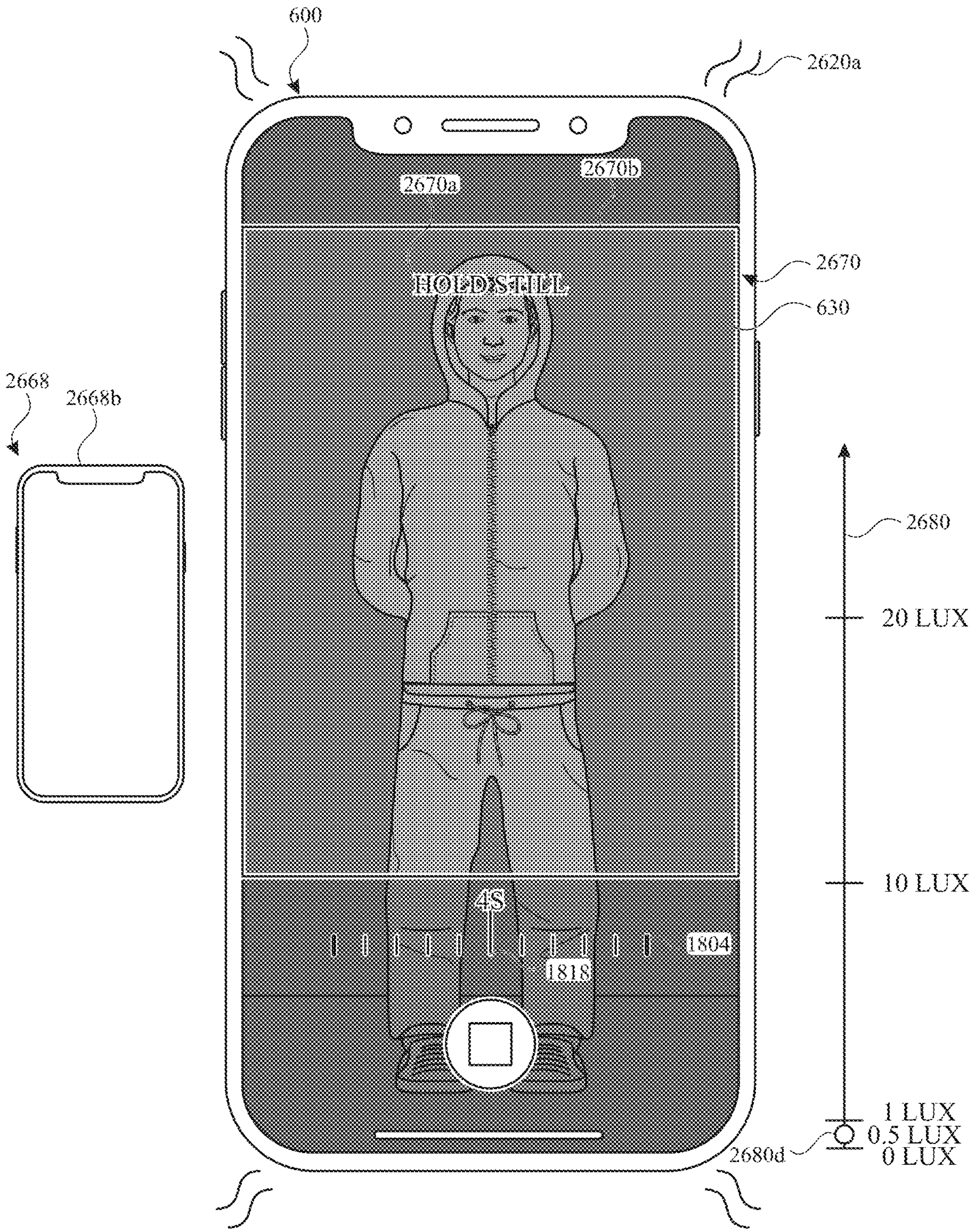
Figure 26P:
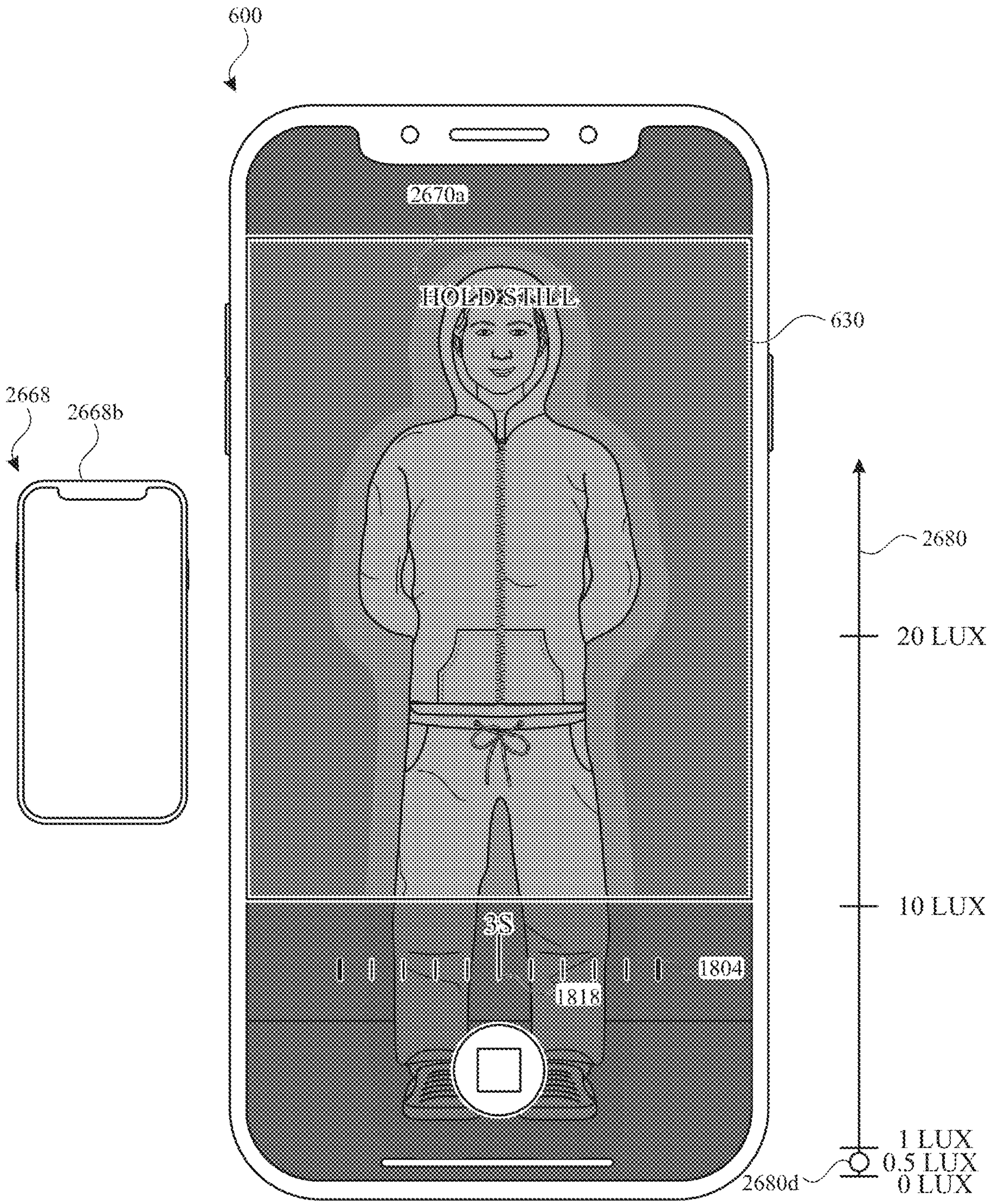
Figure 26Q:
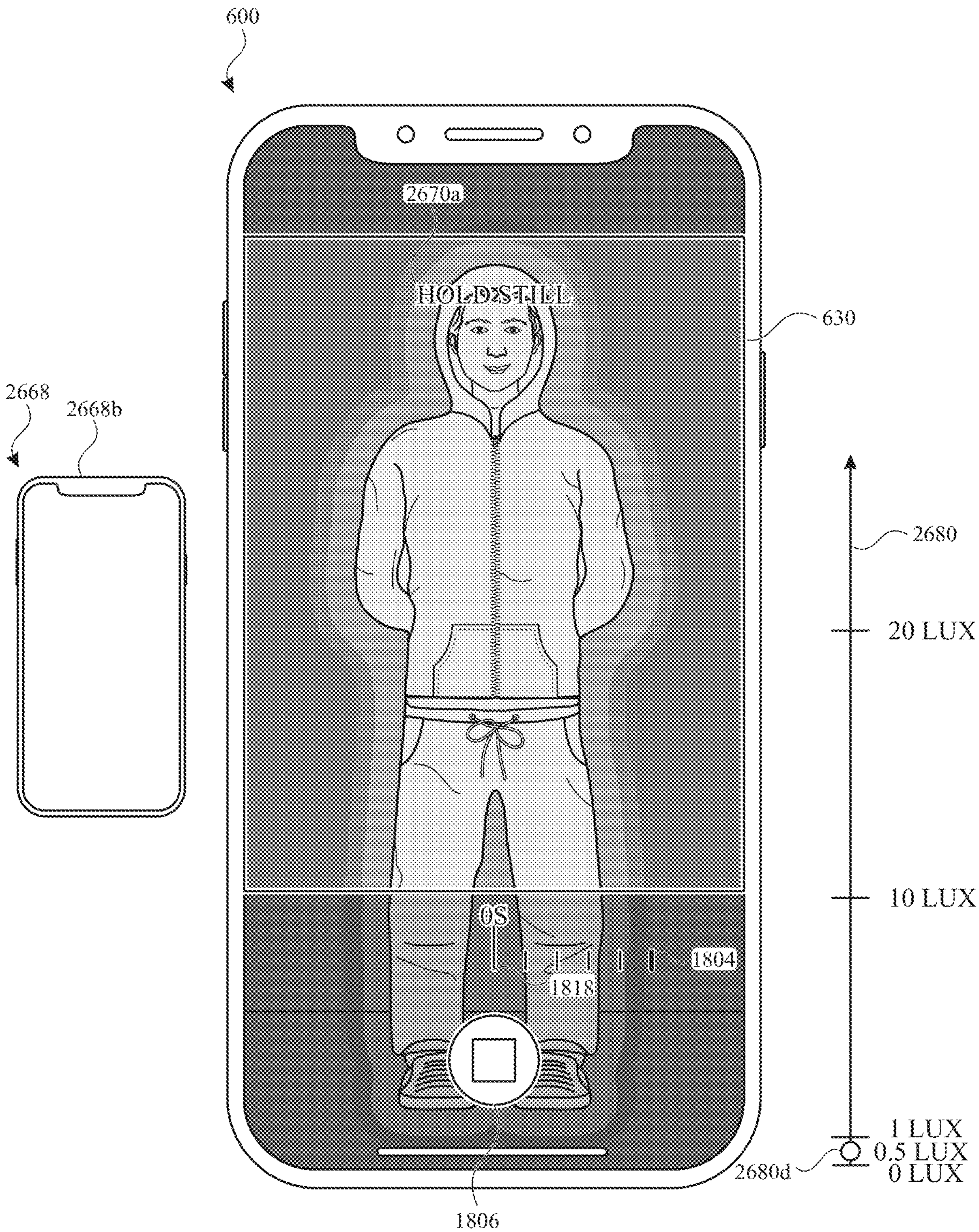
Figure 26R:
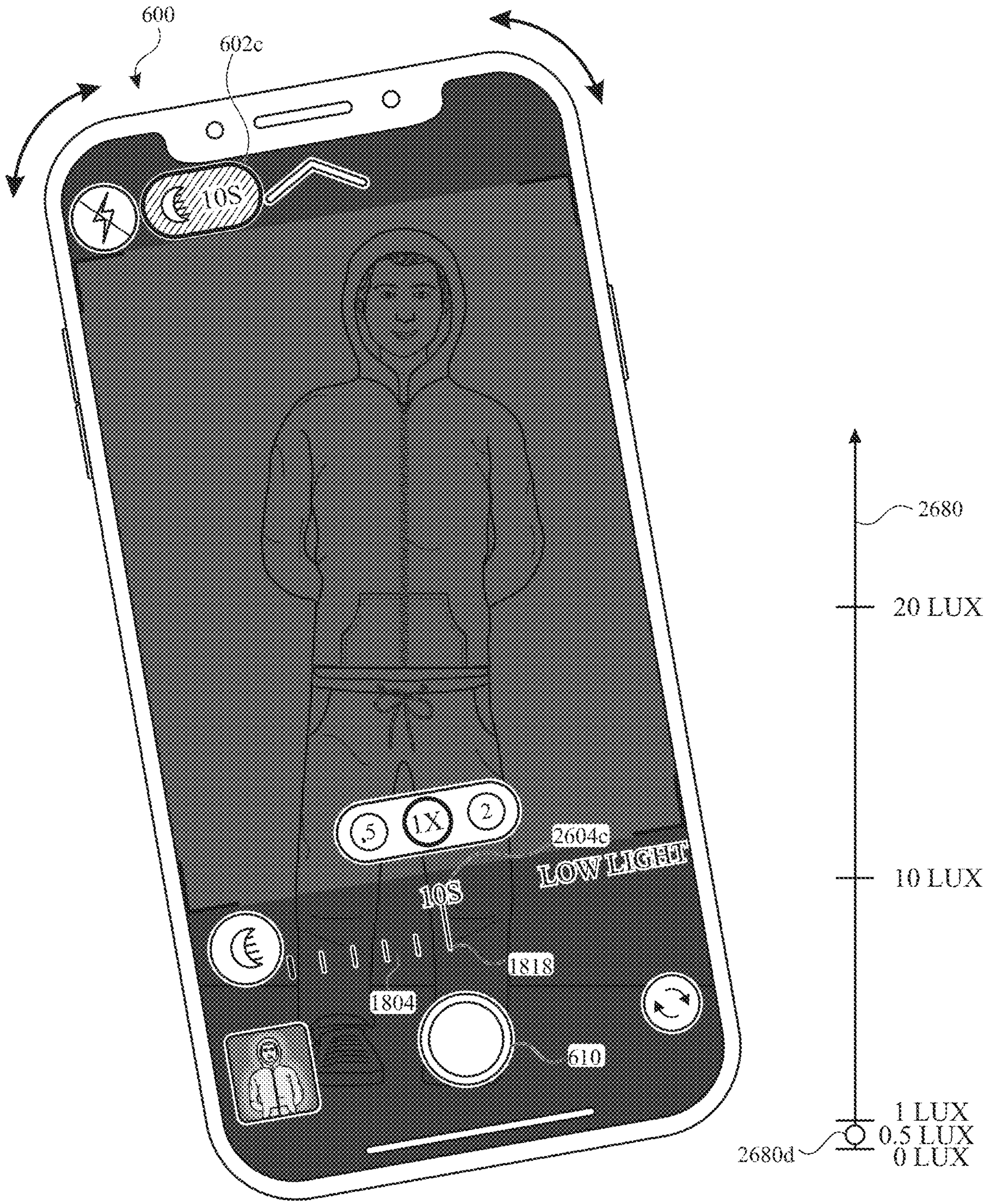
Figure 26S:
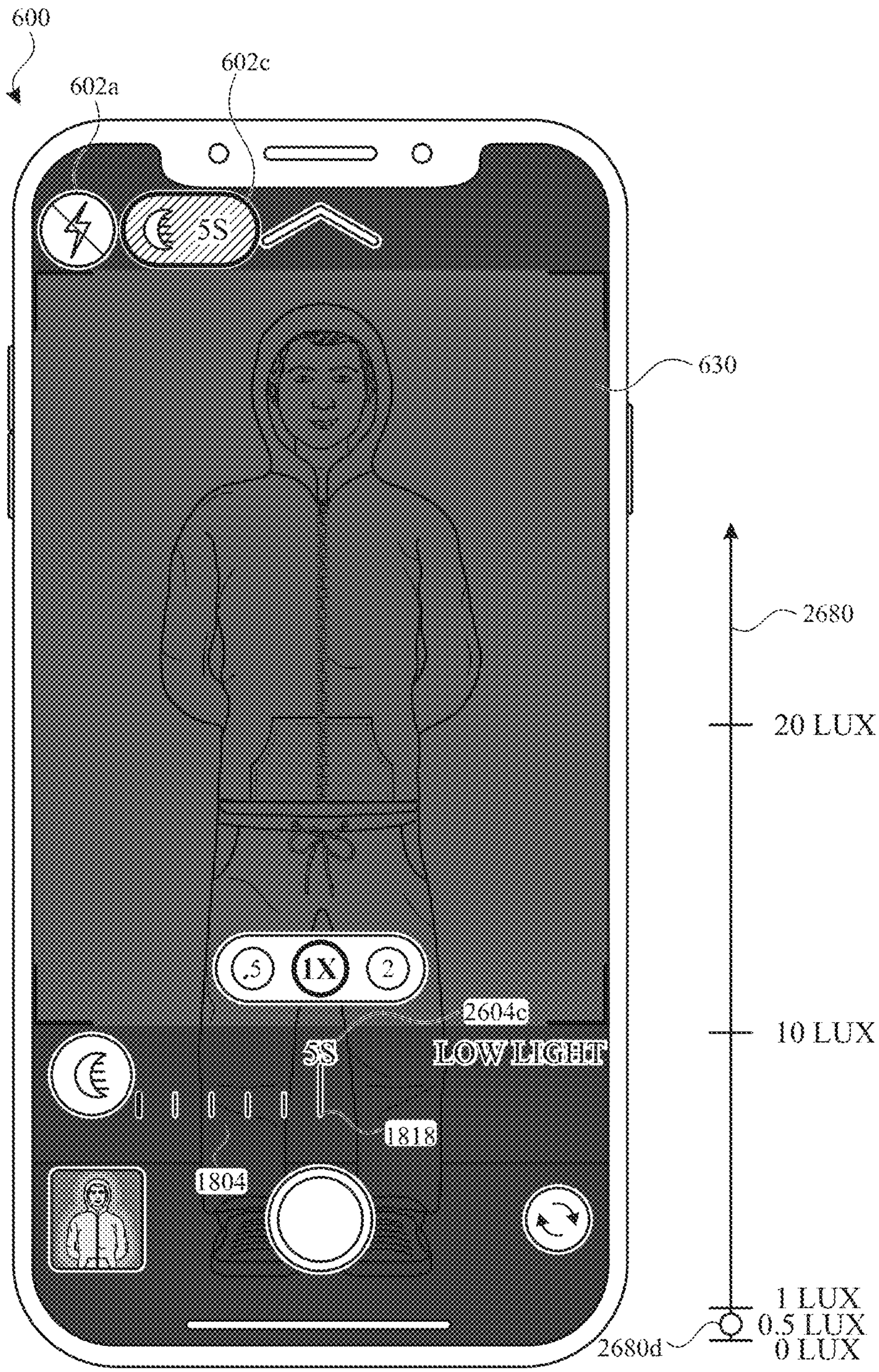
Figure 26T:
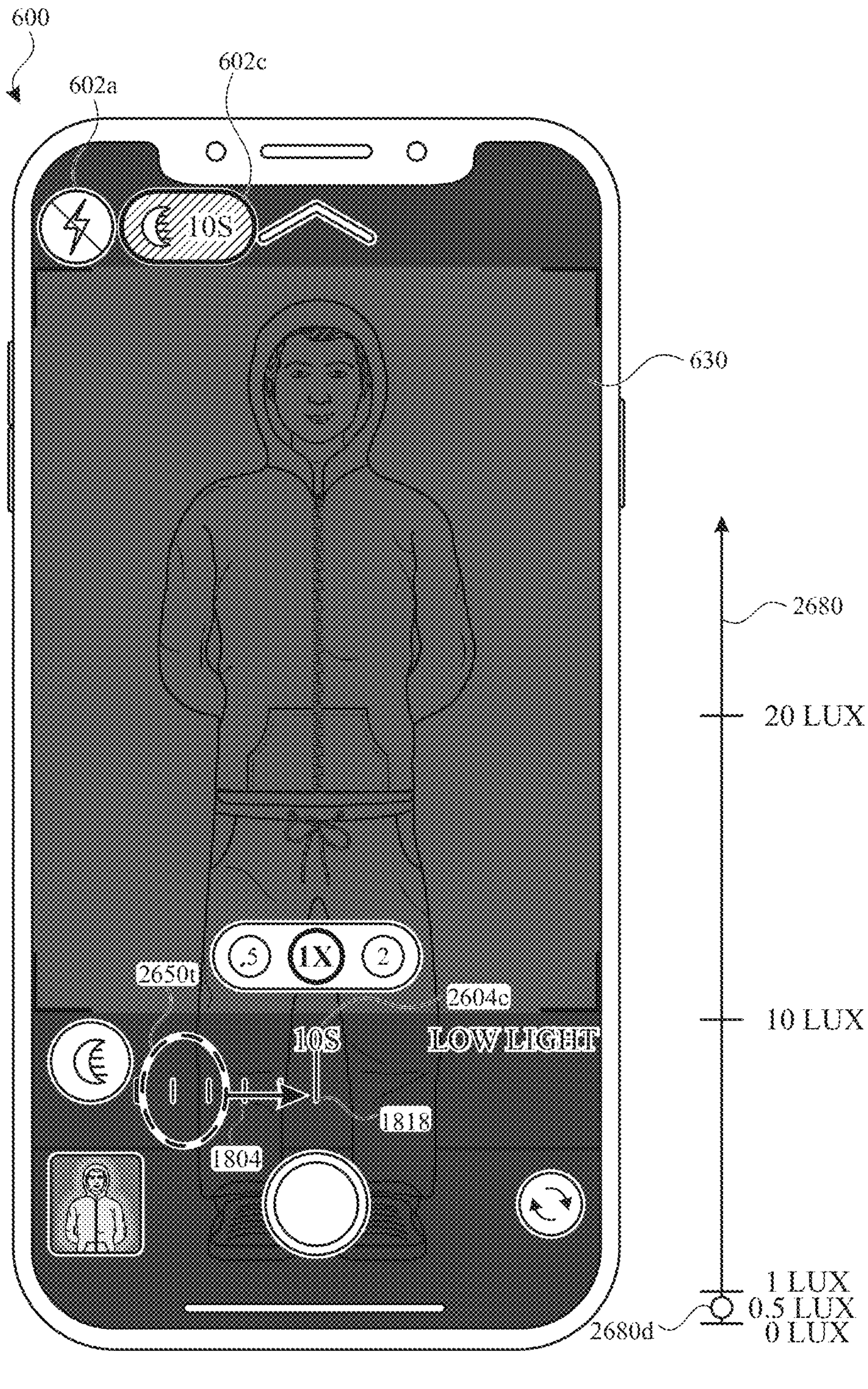
Figure 26U:
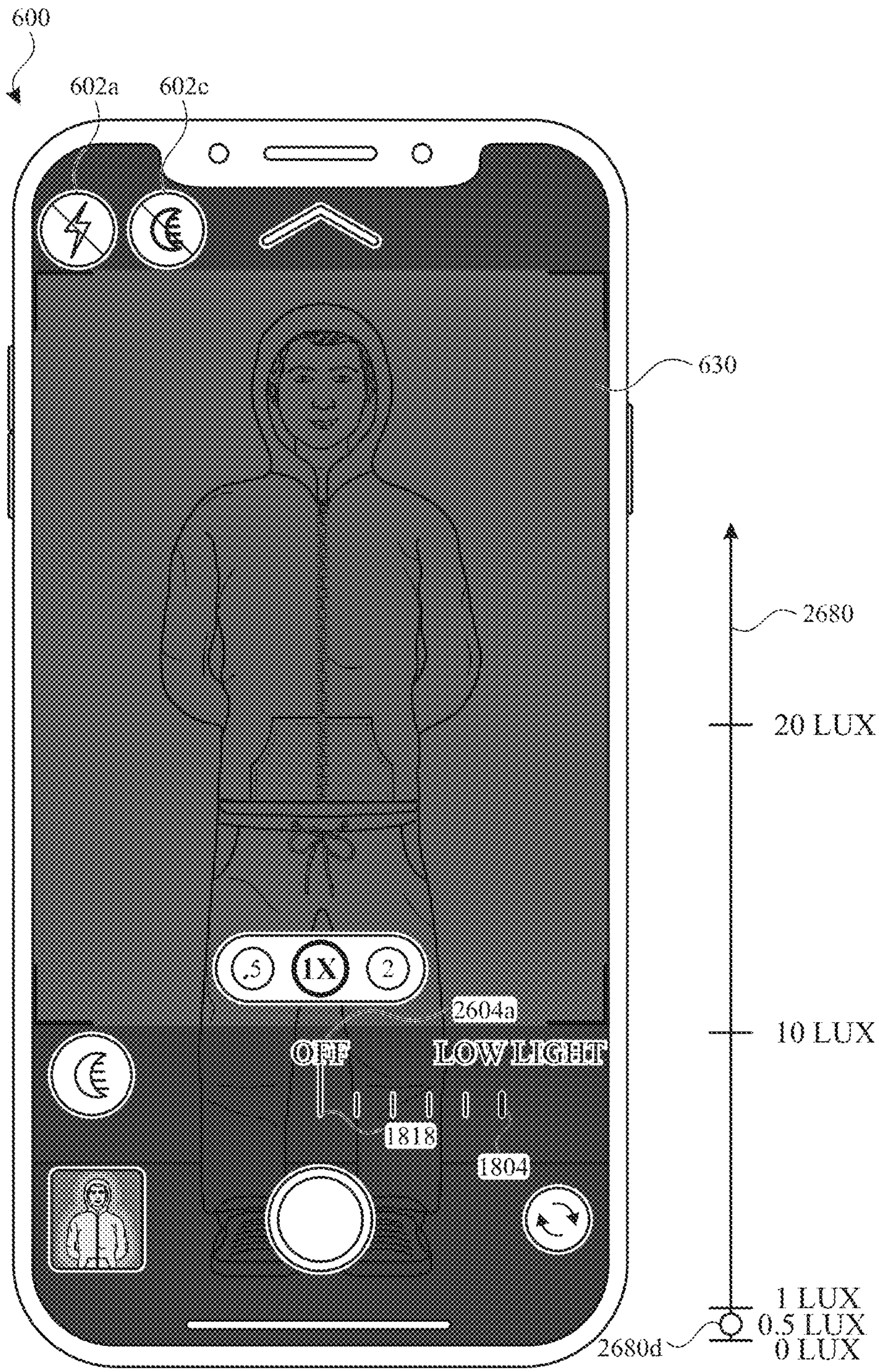
Figure 27A:
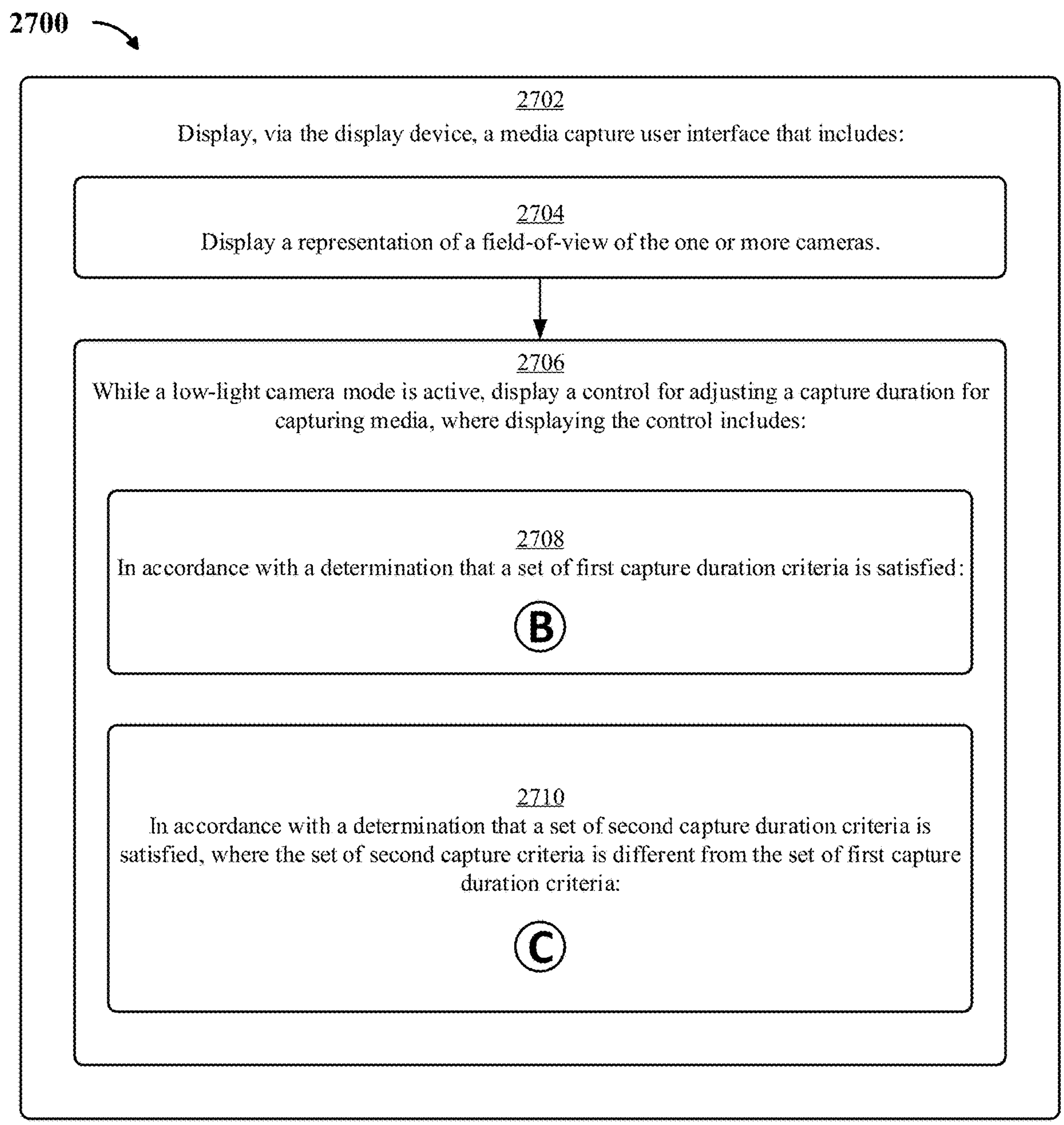
FIGS. 27A-27C are a flow diagram illustrating a method for managing media using an electronic device in accordance with some embodiments.
Figure 27B:
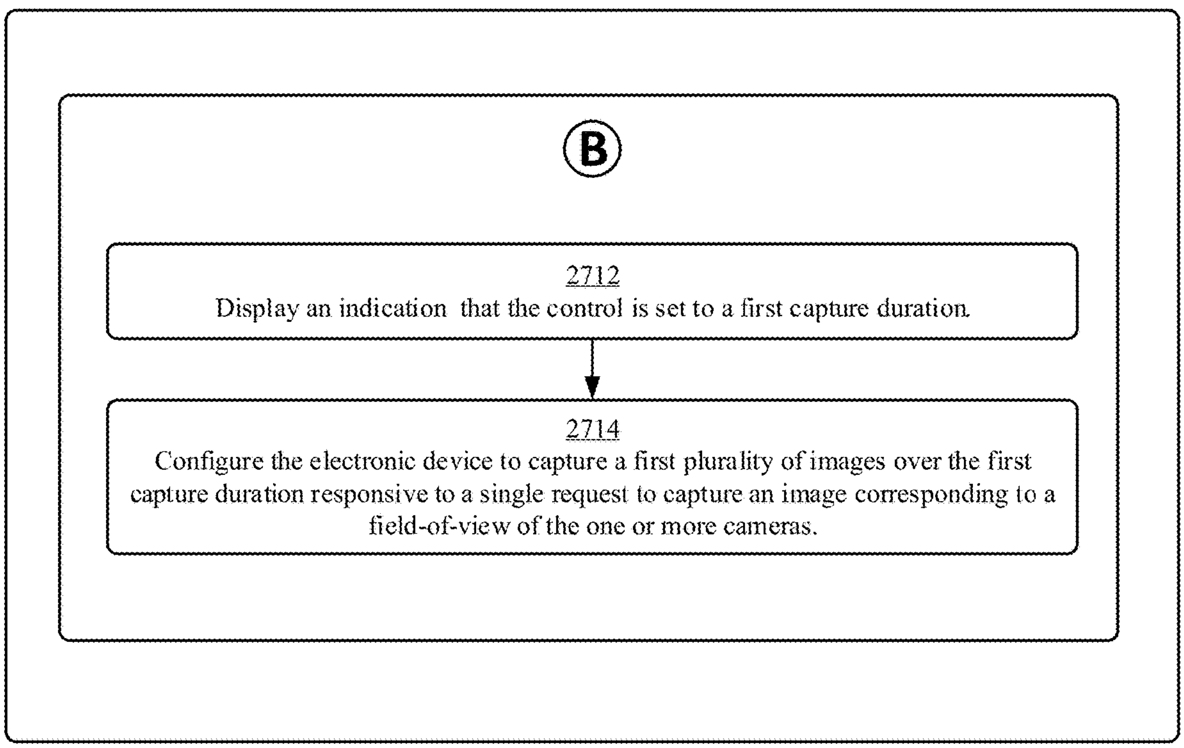
Figure 27C:
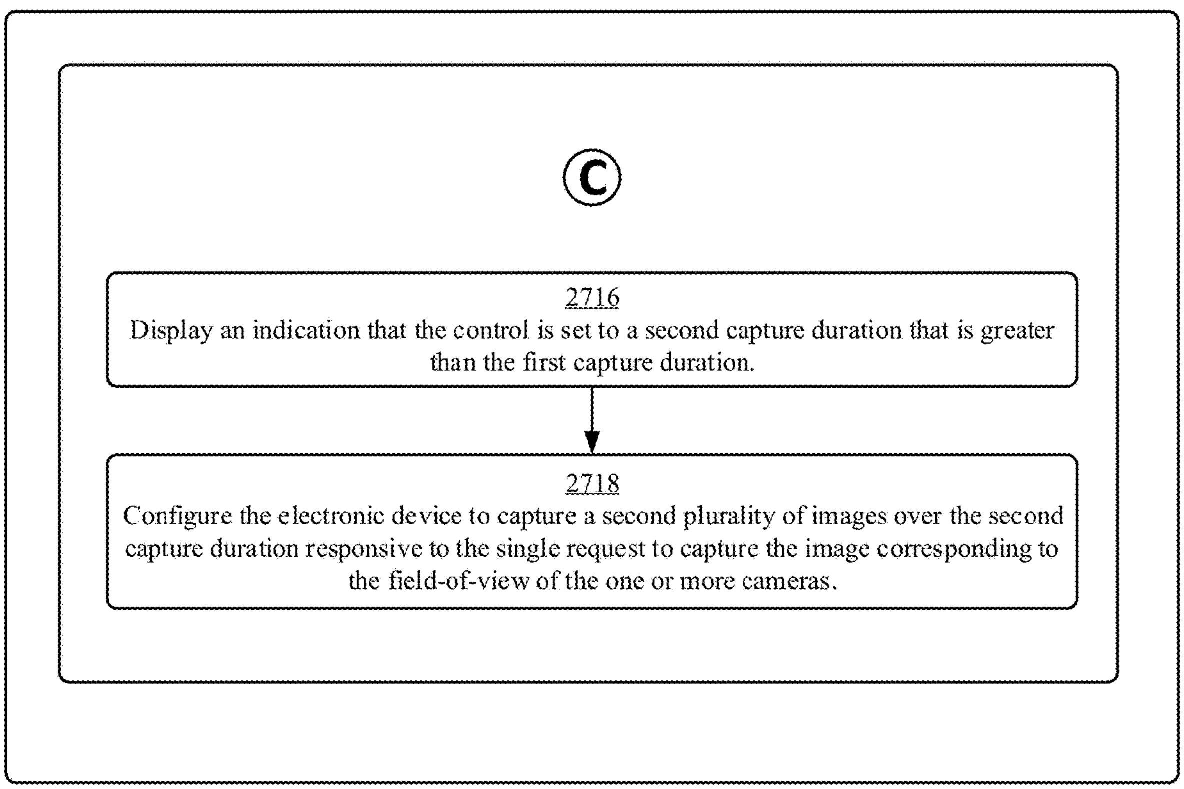
Figure 28B:
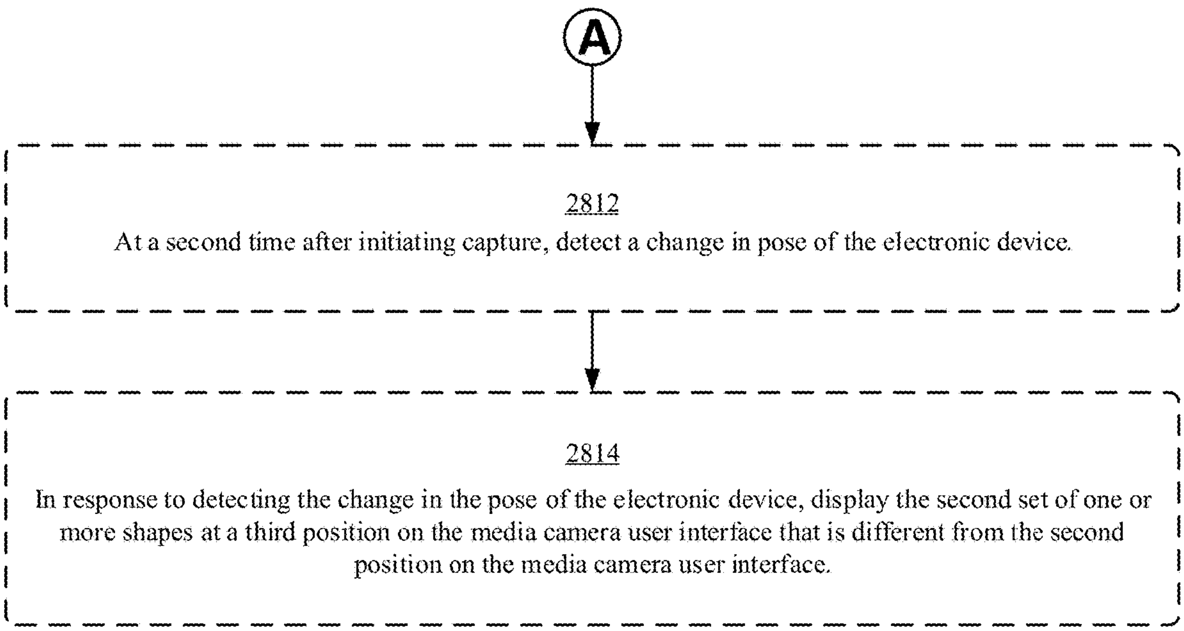

FIGS. 26A-26U illustrate exemplary user interfaces for managing media using an electronic device in accordance with some embodiments. FIGS. 27A-27C are a flow diagram illustrating a method for managing media using an electronic device in accordance with some embodiments. FIGS. 28A-28B are a flow diagram illustrating a method for providing guidance while capturing media. The user interfaces in FIGS. 26A-26U are used to illustrate the processes described below, including the processes in FIGS. 27A-27C and FIGS. 28A-28B.

Figure 29A:
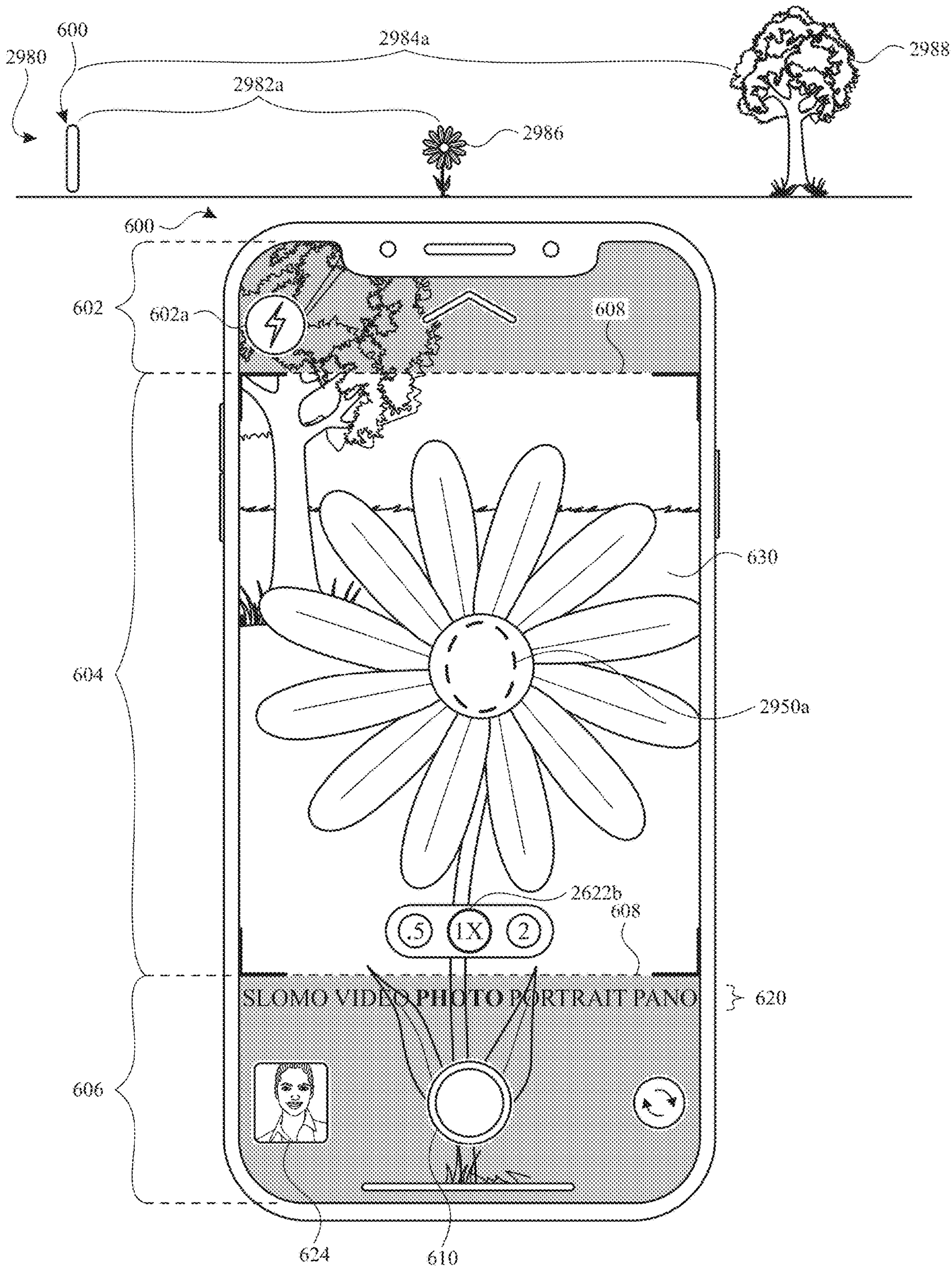
FIGS. 29A-29P illustrate exemplary user interfaces for managing the capture of media controlled by using an electronic device with multiple cameras in accordance with some embodiments.
Figure 29B:
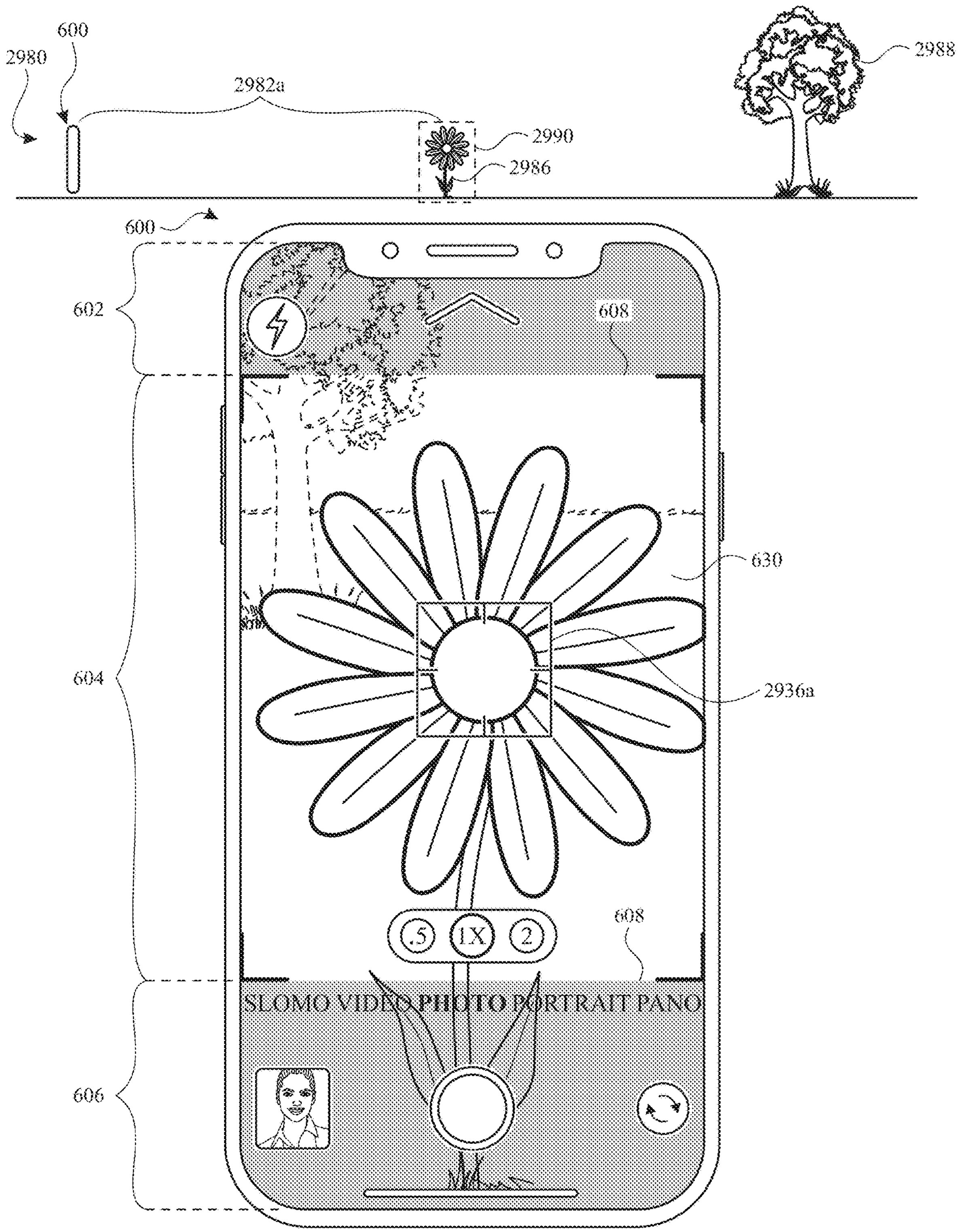
Figure 29C:
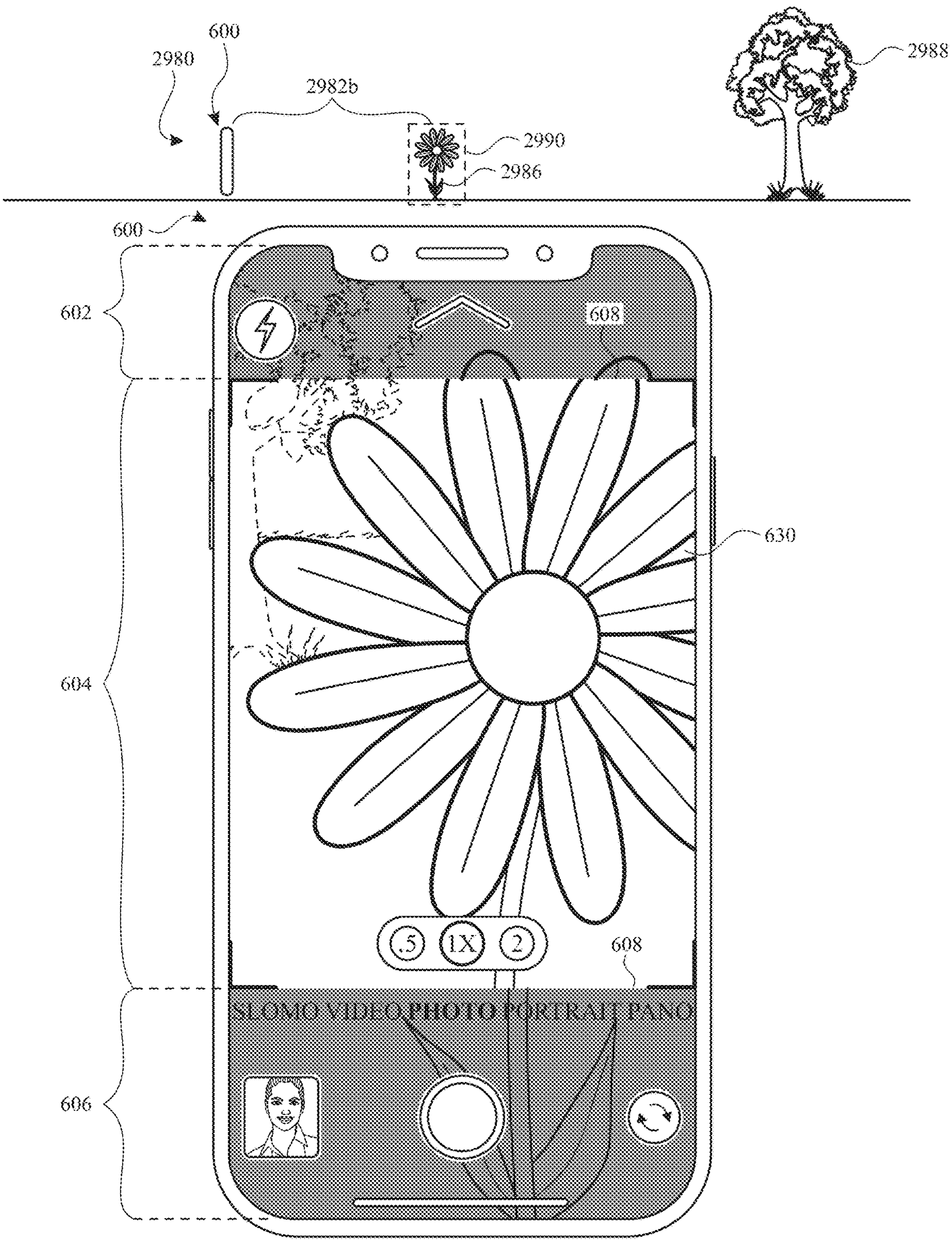
Figure 29D:
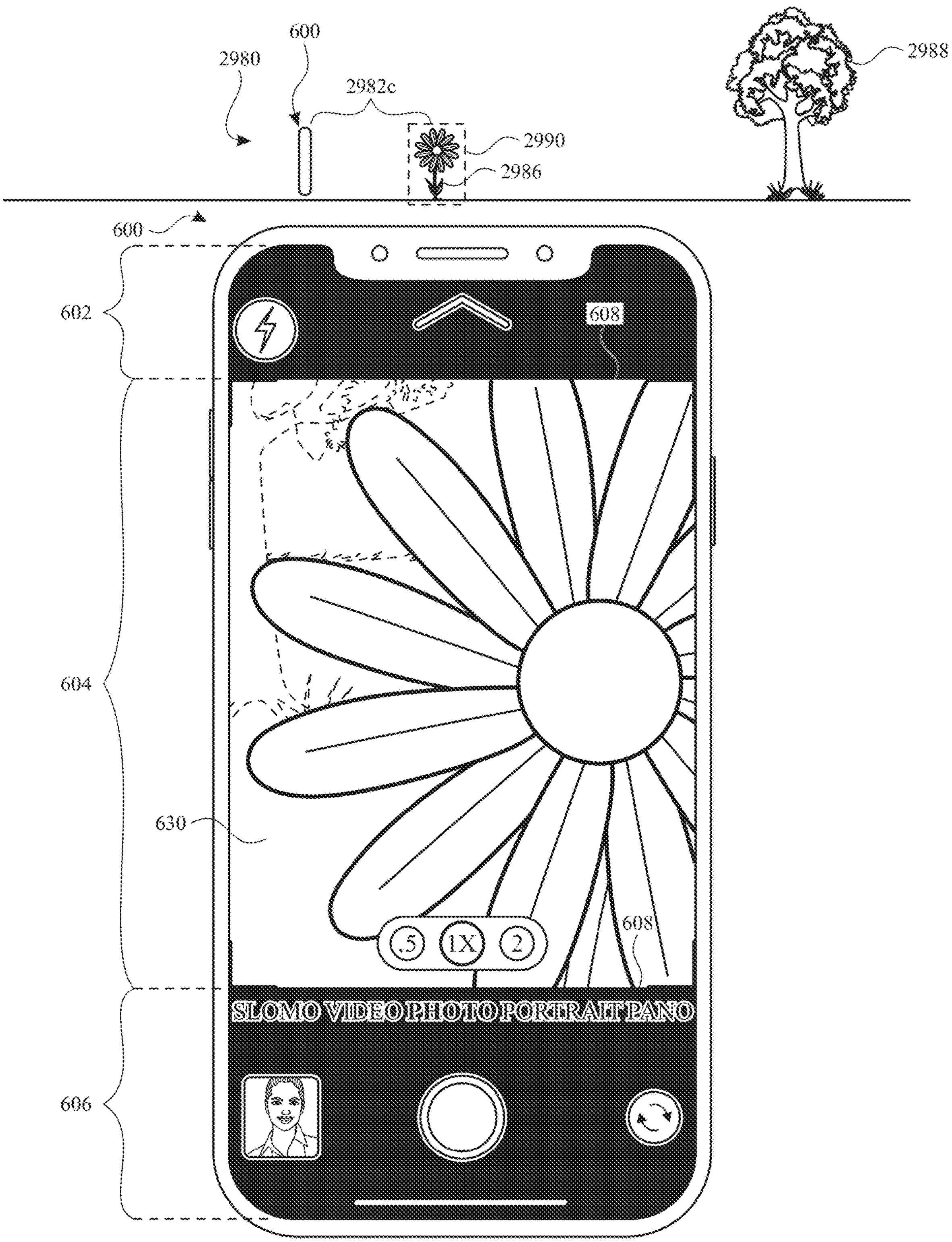
Figure 29E:
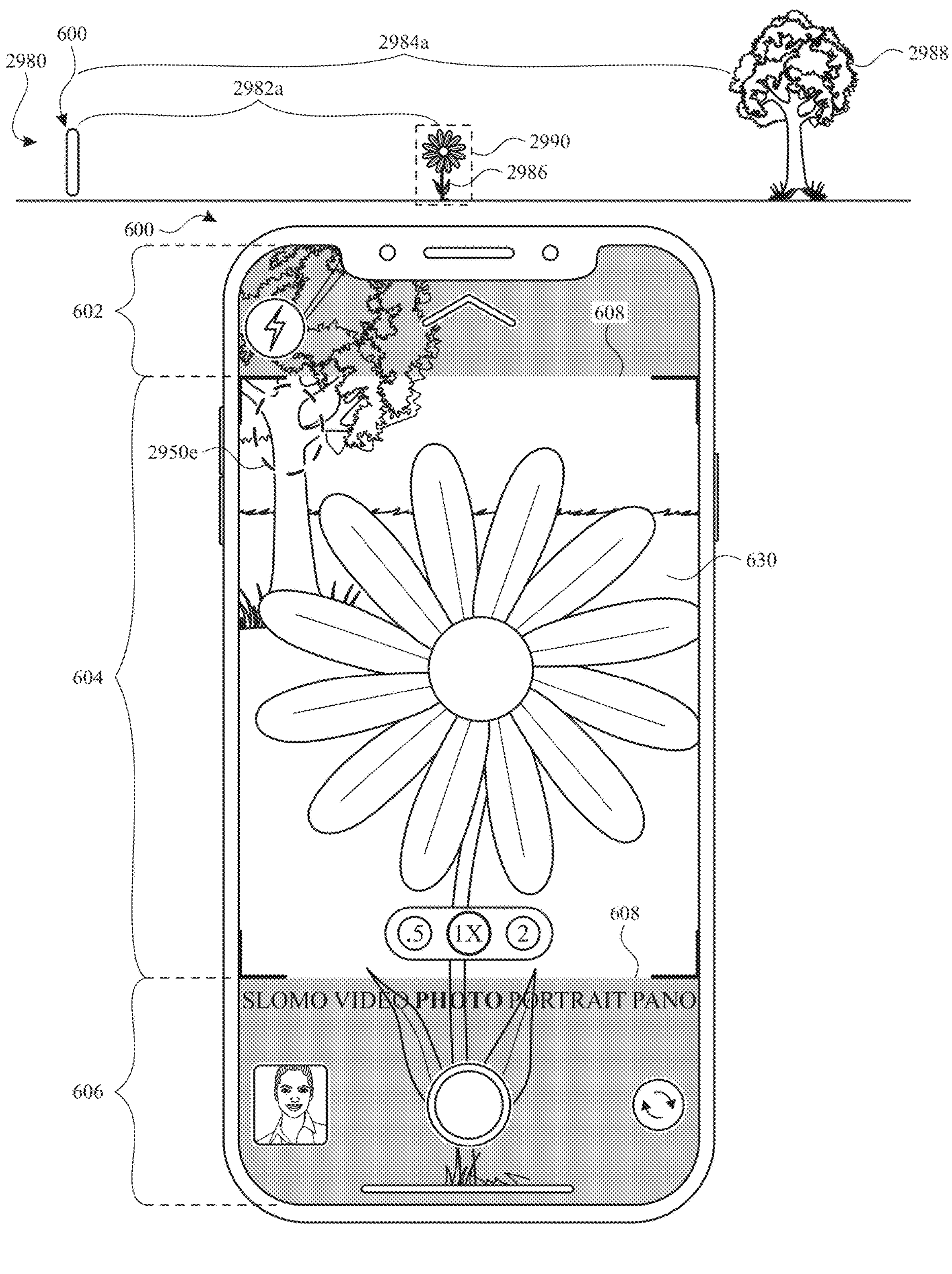
Figure 29F:
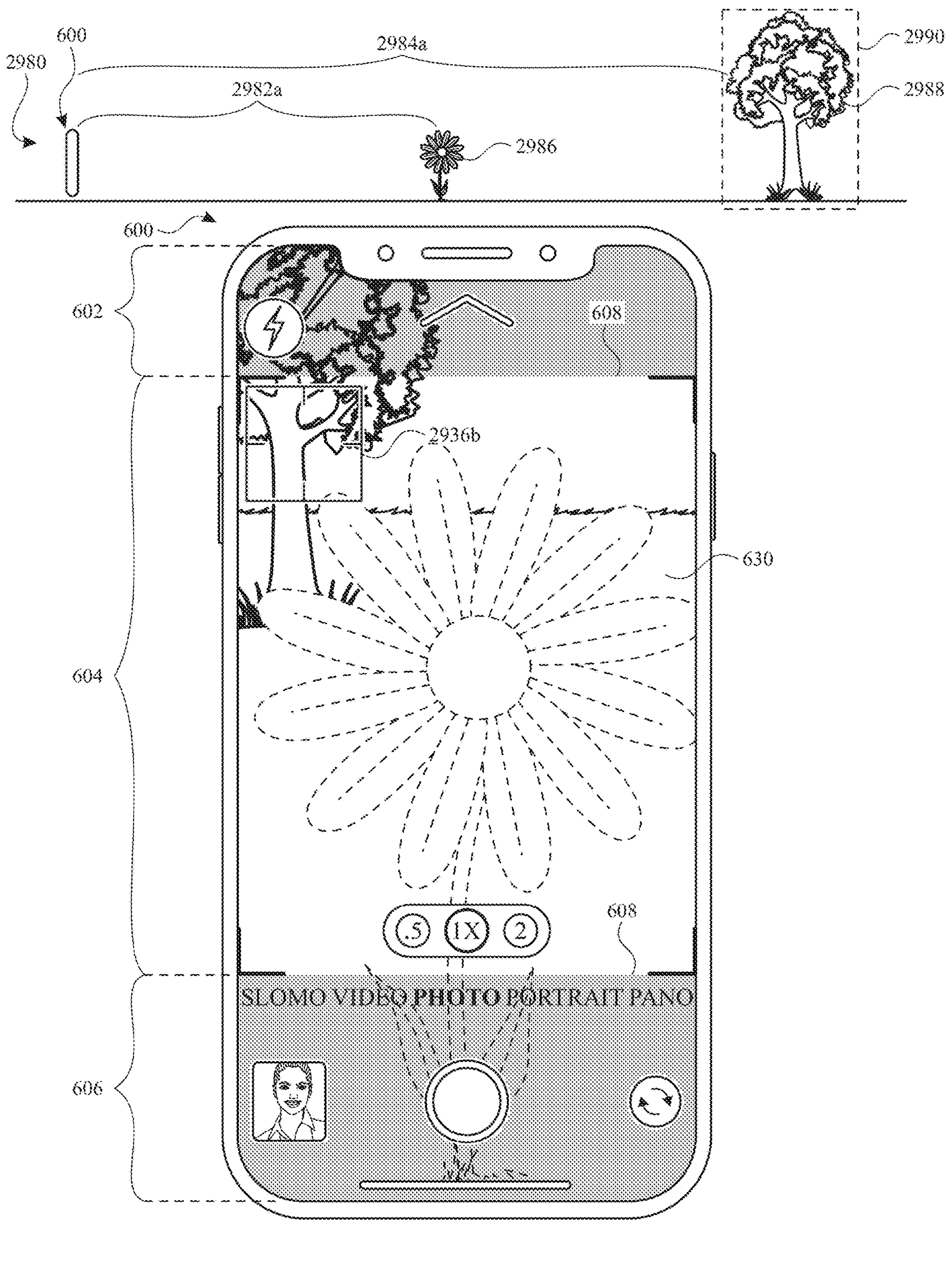
Figure 29G:
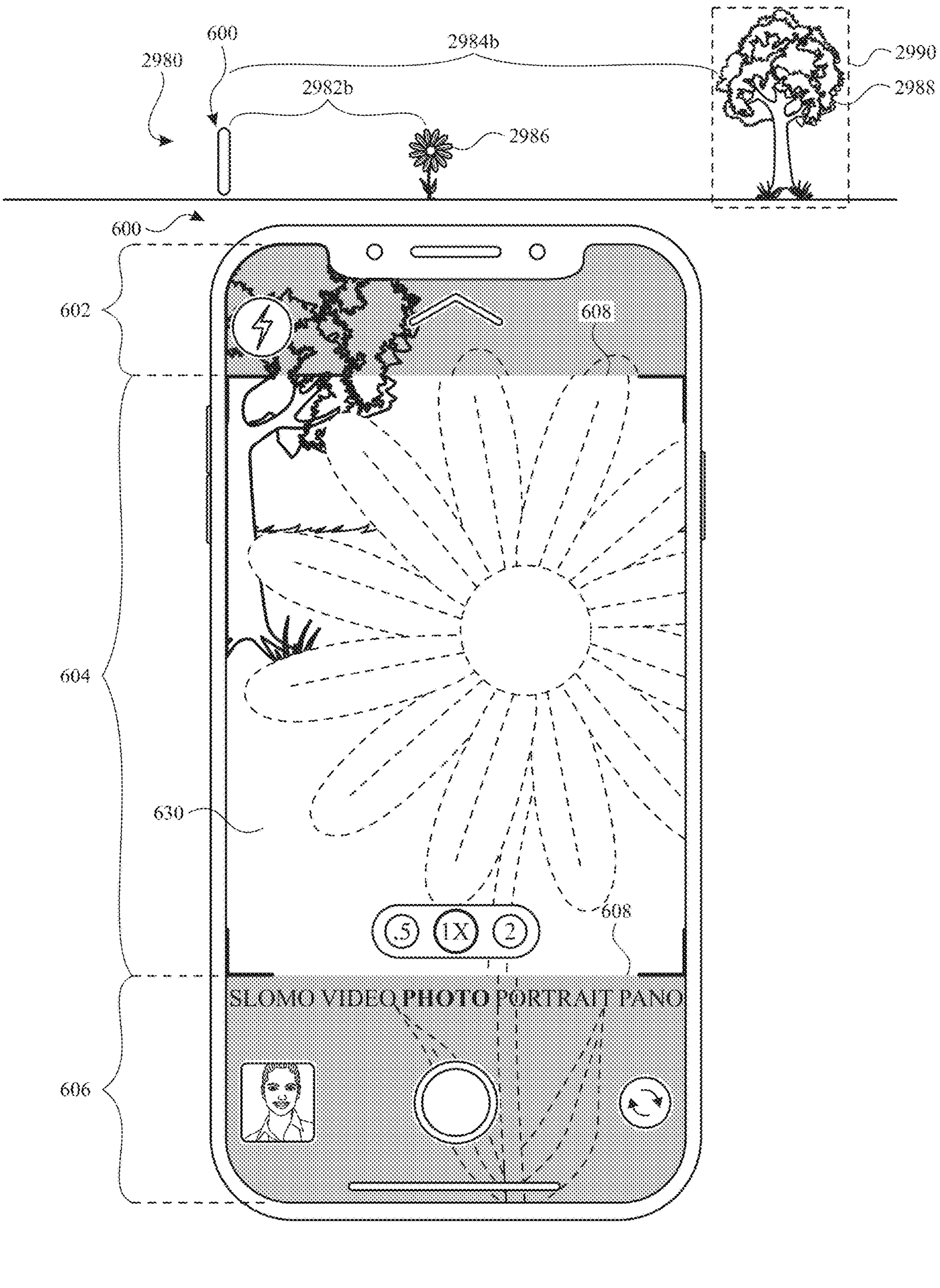
Figure 29H:
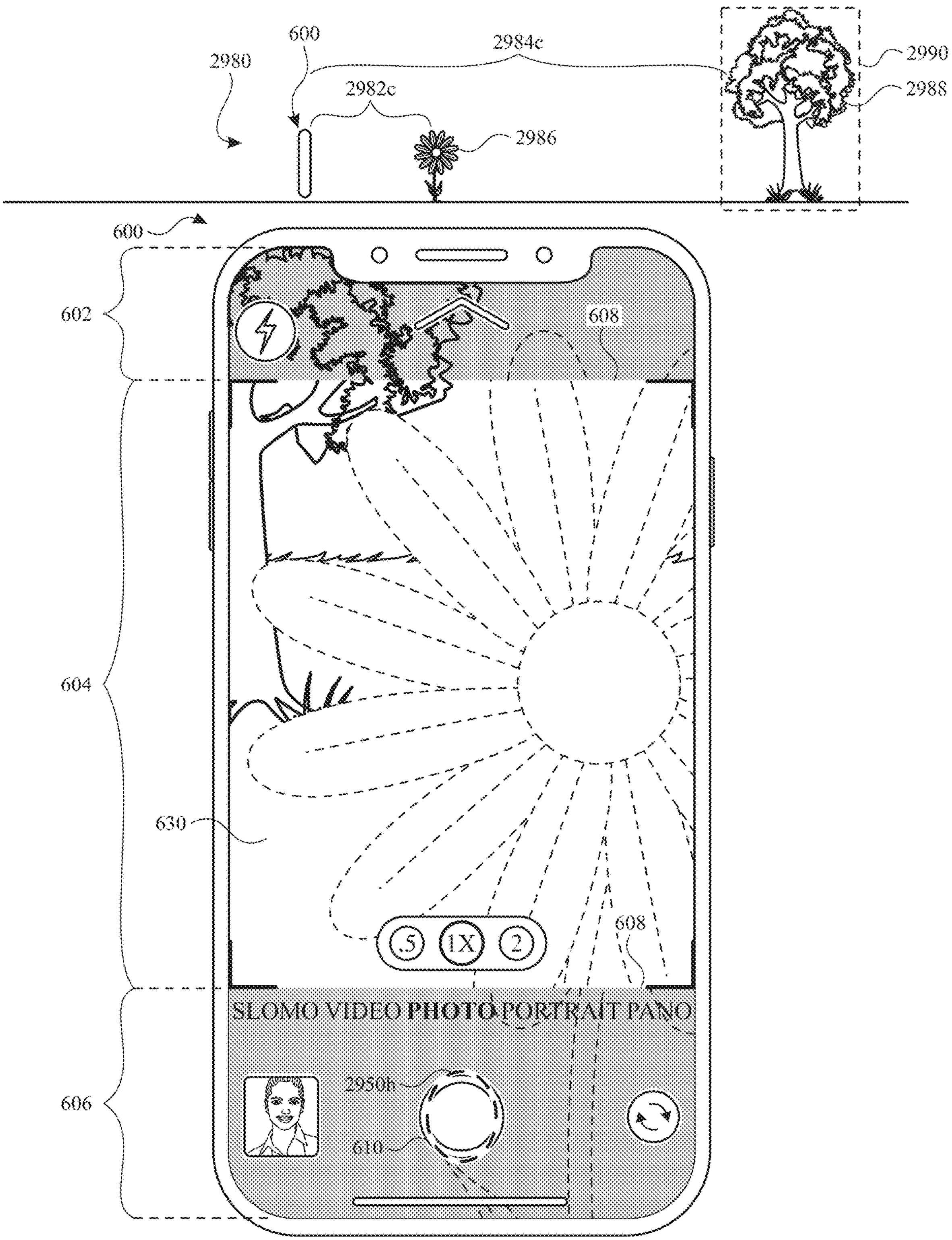
Figure 29I:
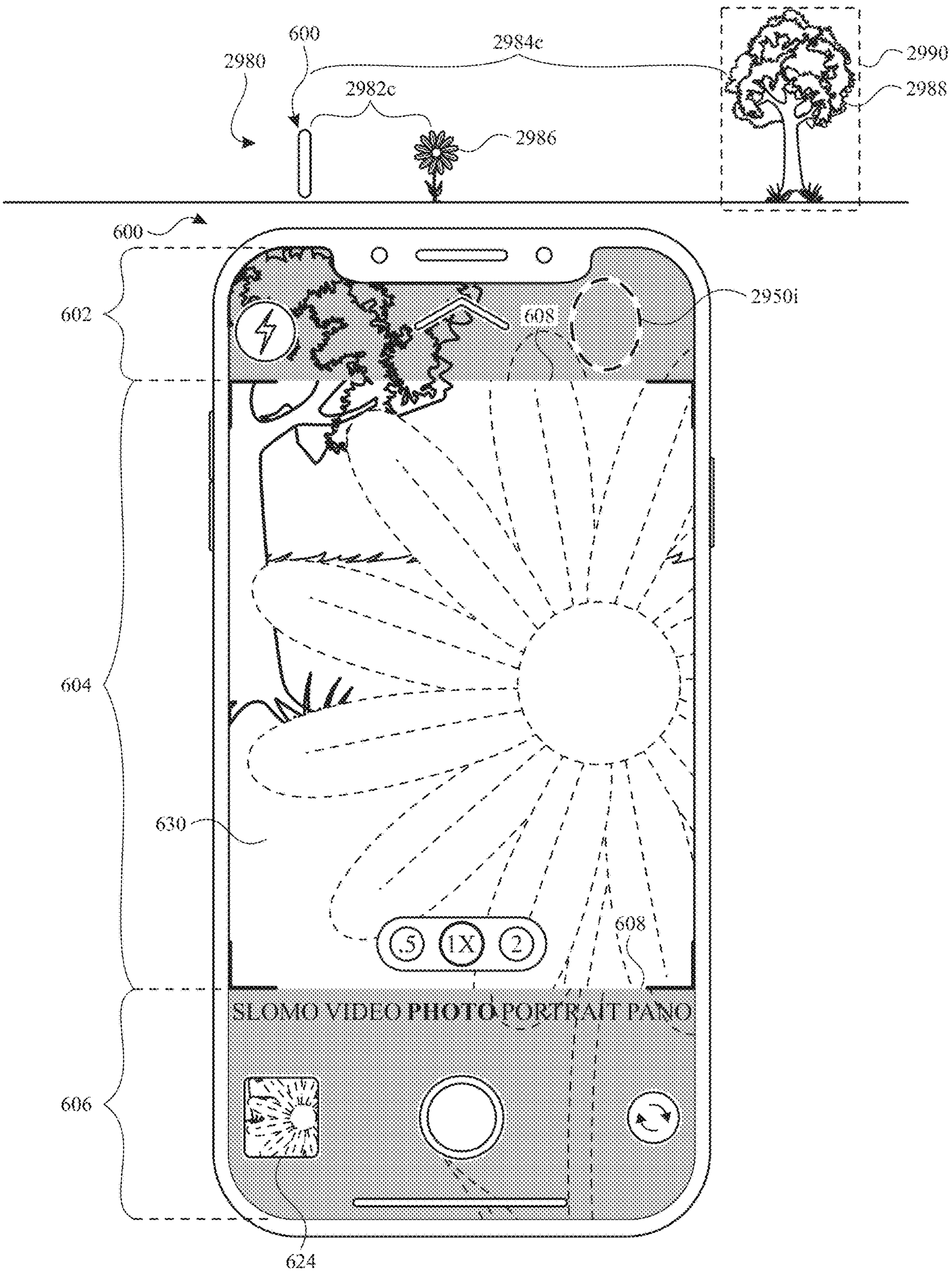
Figure 29J:
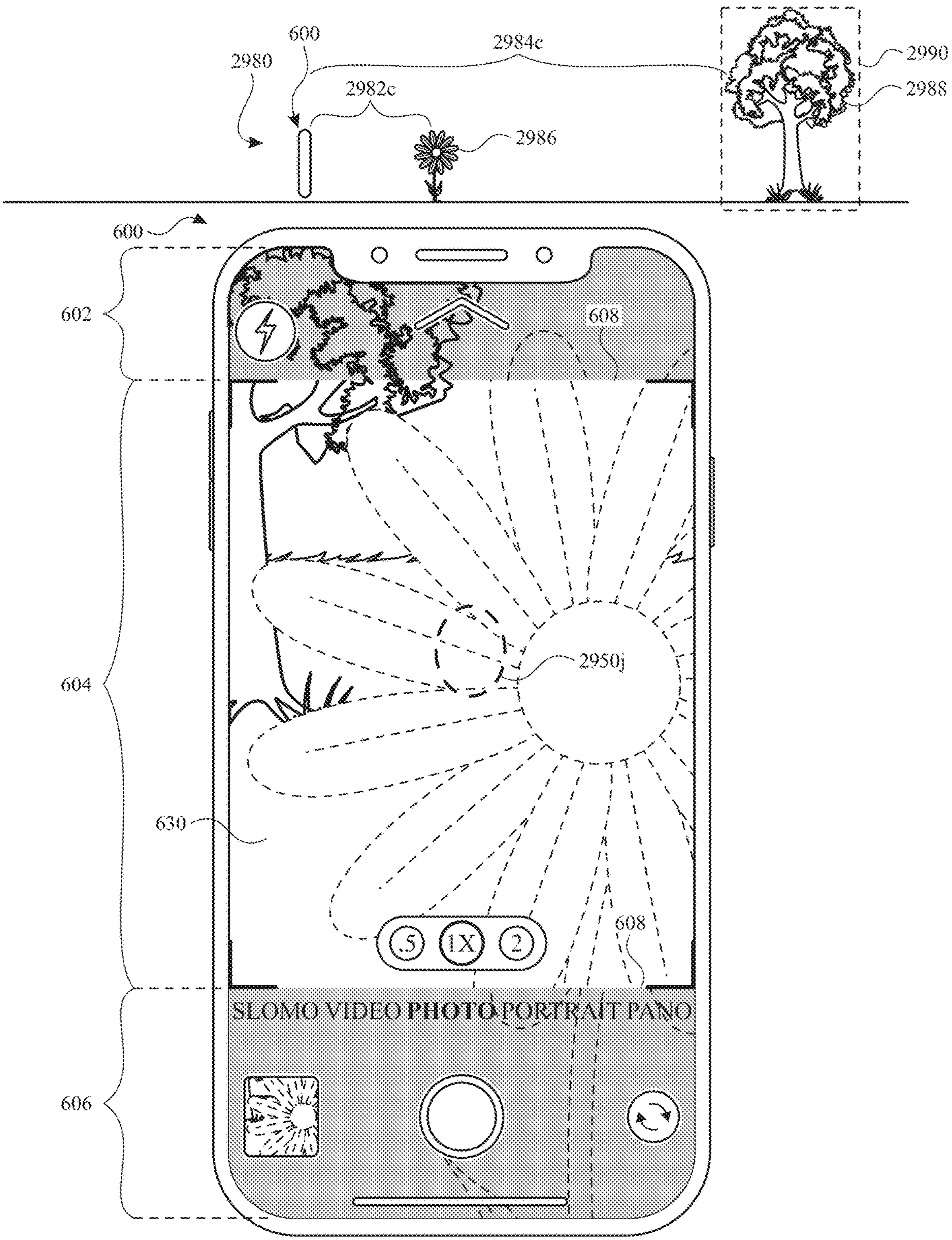
Figure 29K:
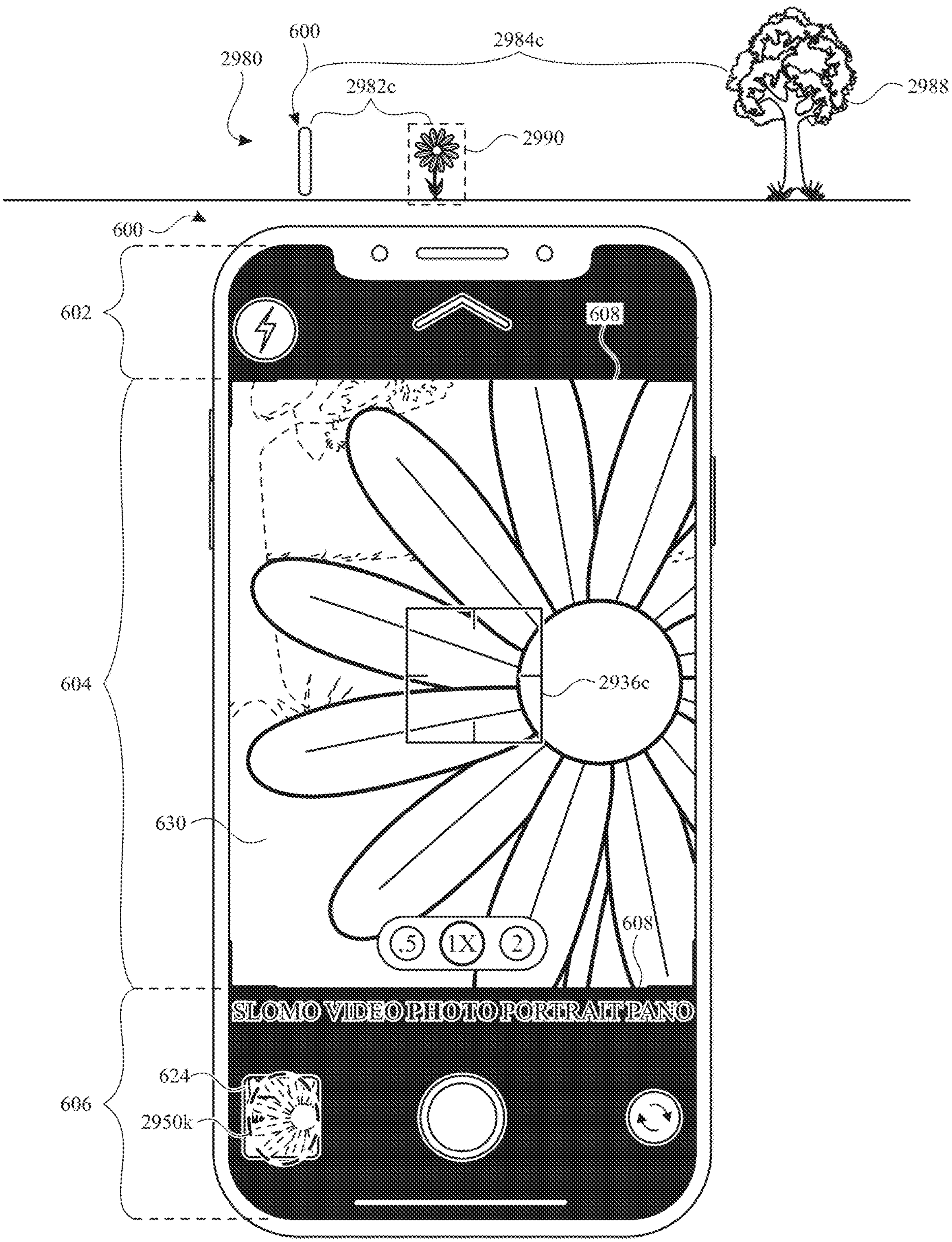
Figure 29L:
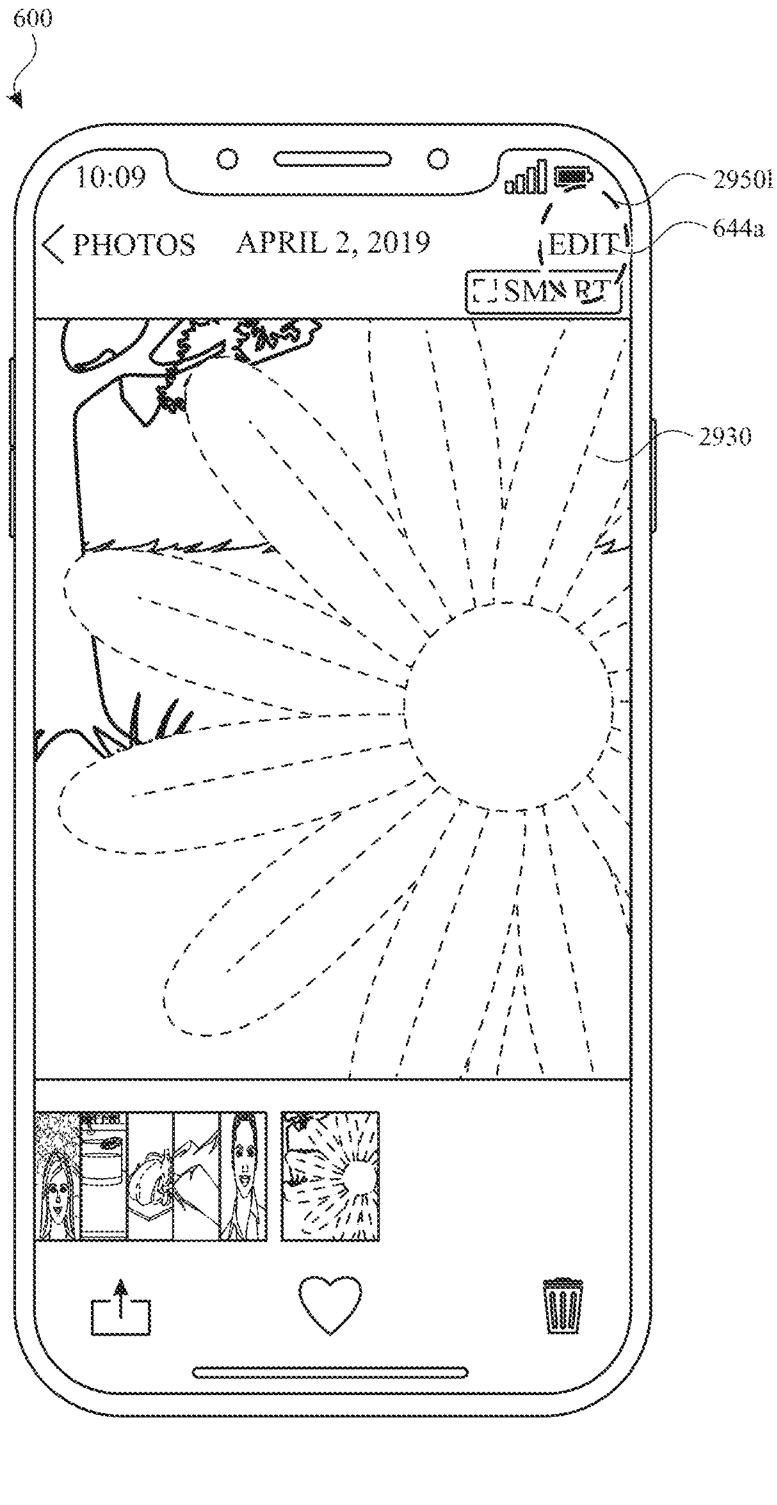
Figure 29M:
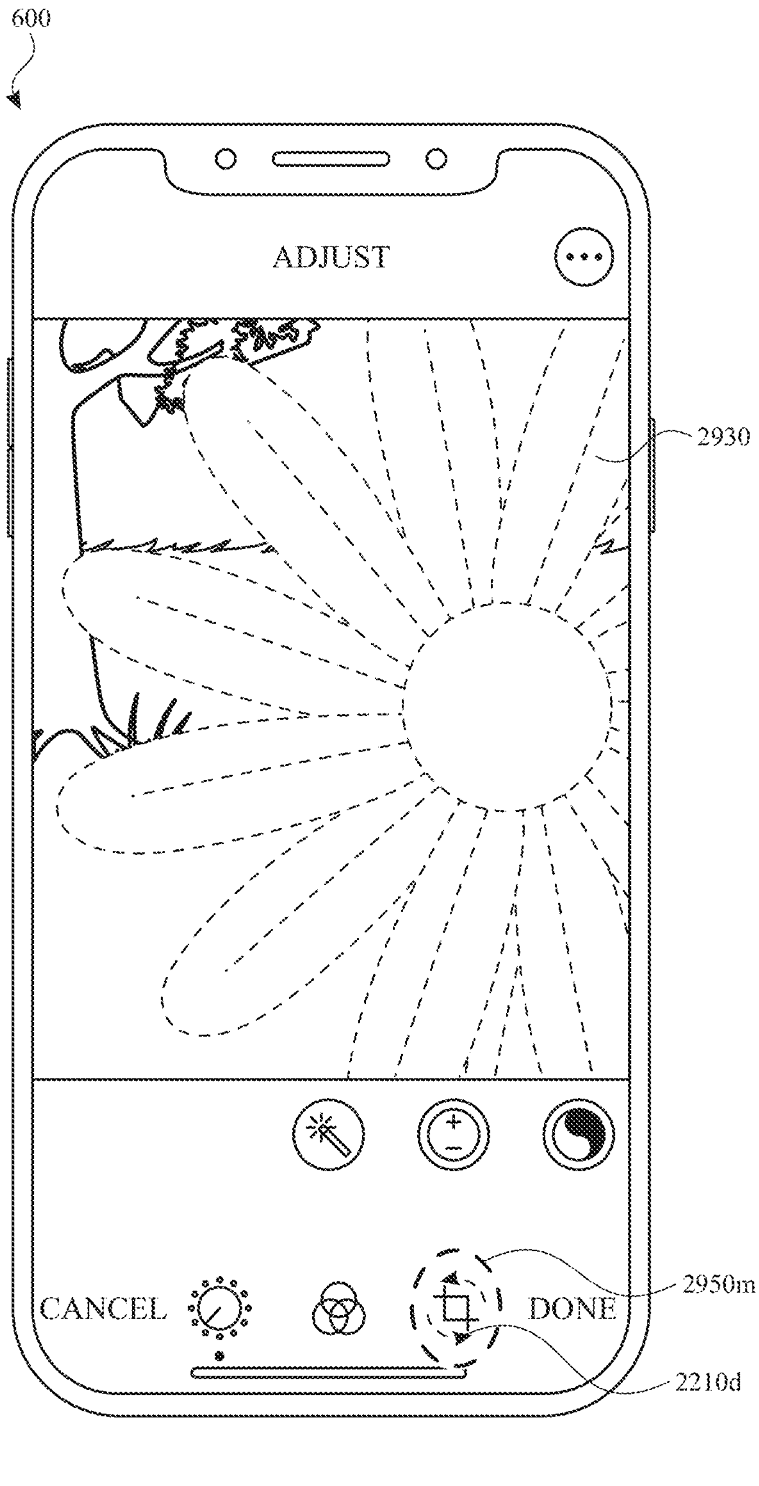
Figure 29N:
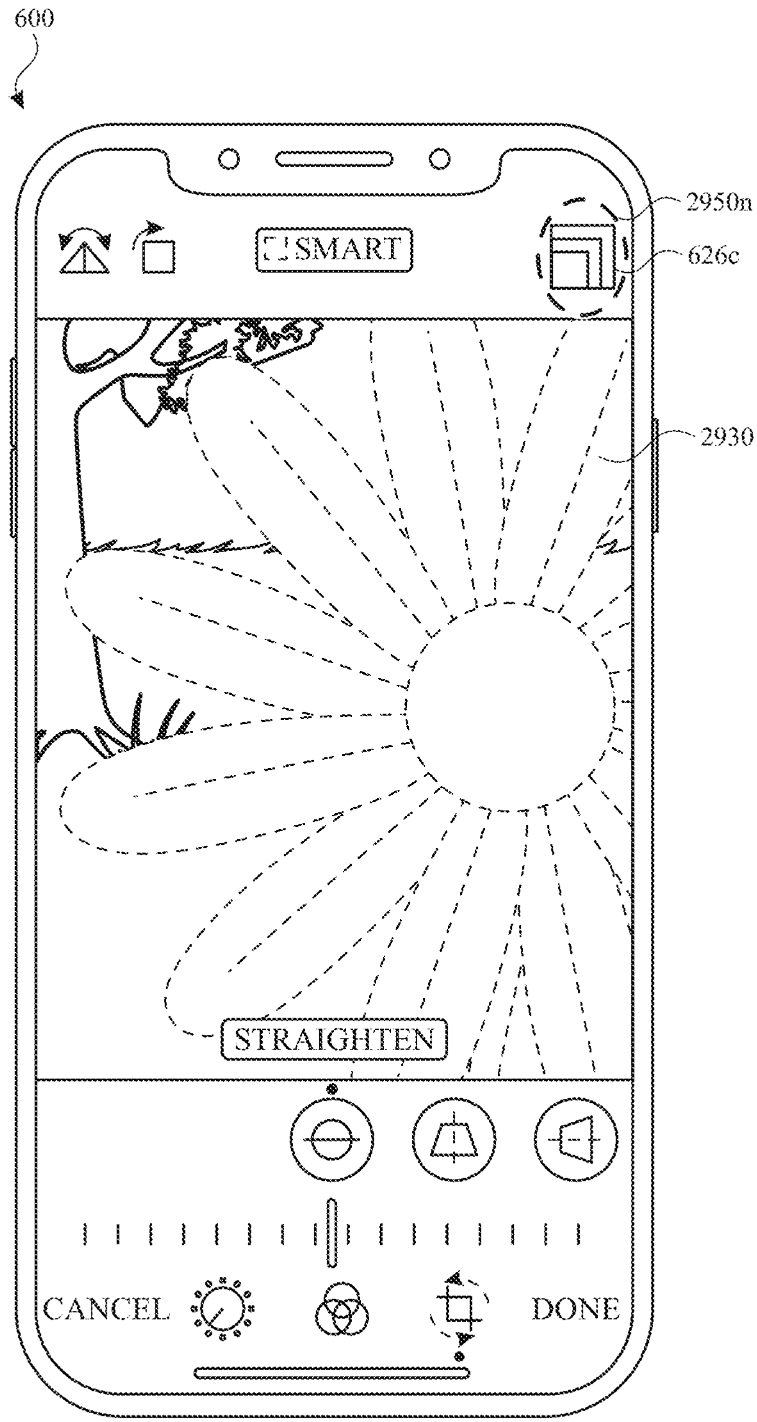
Figure 29O:
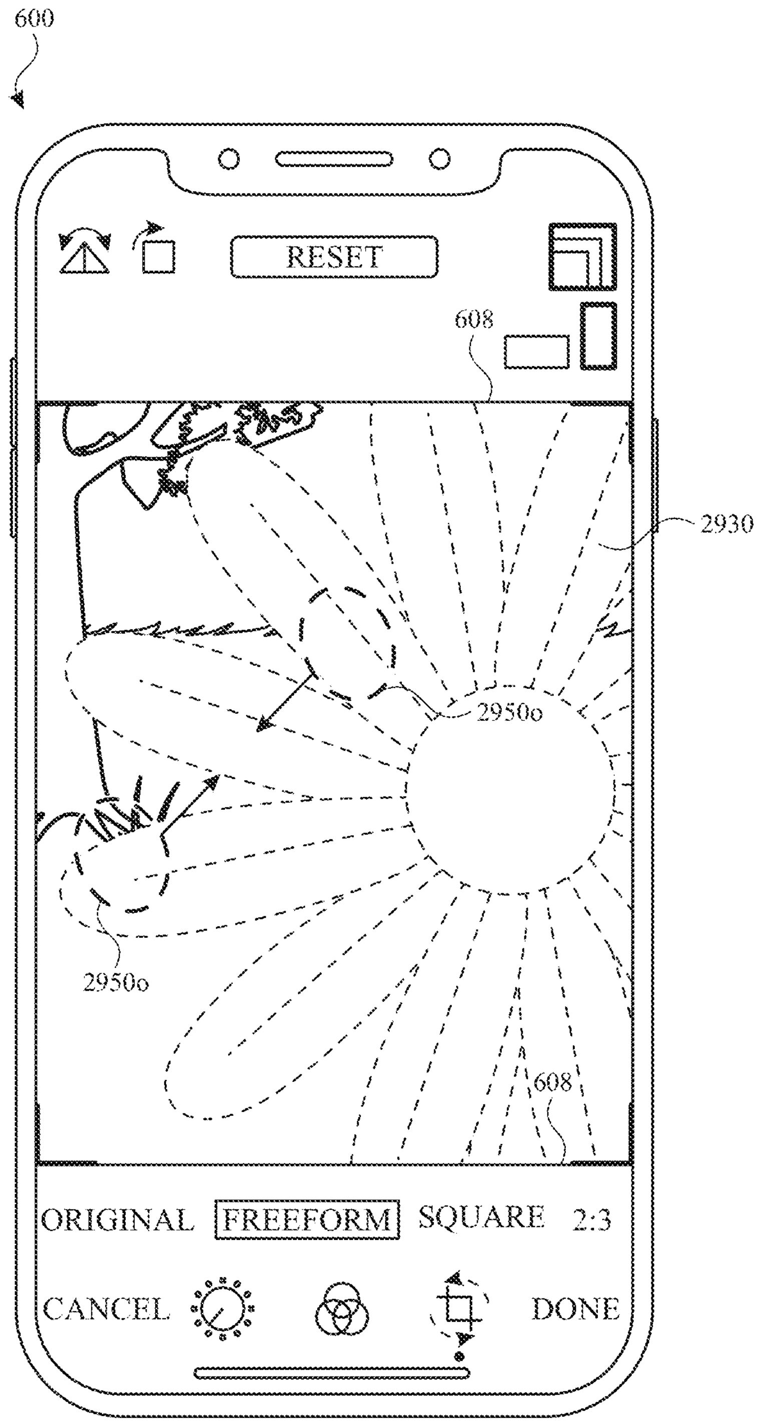
Figure 29P:
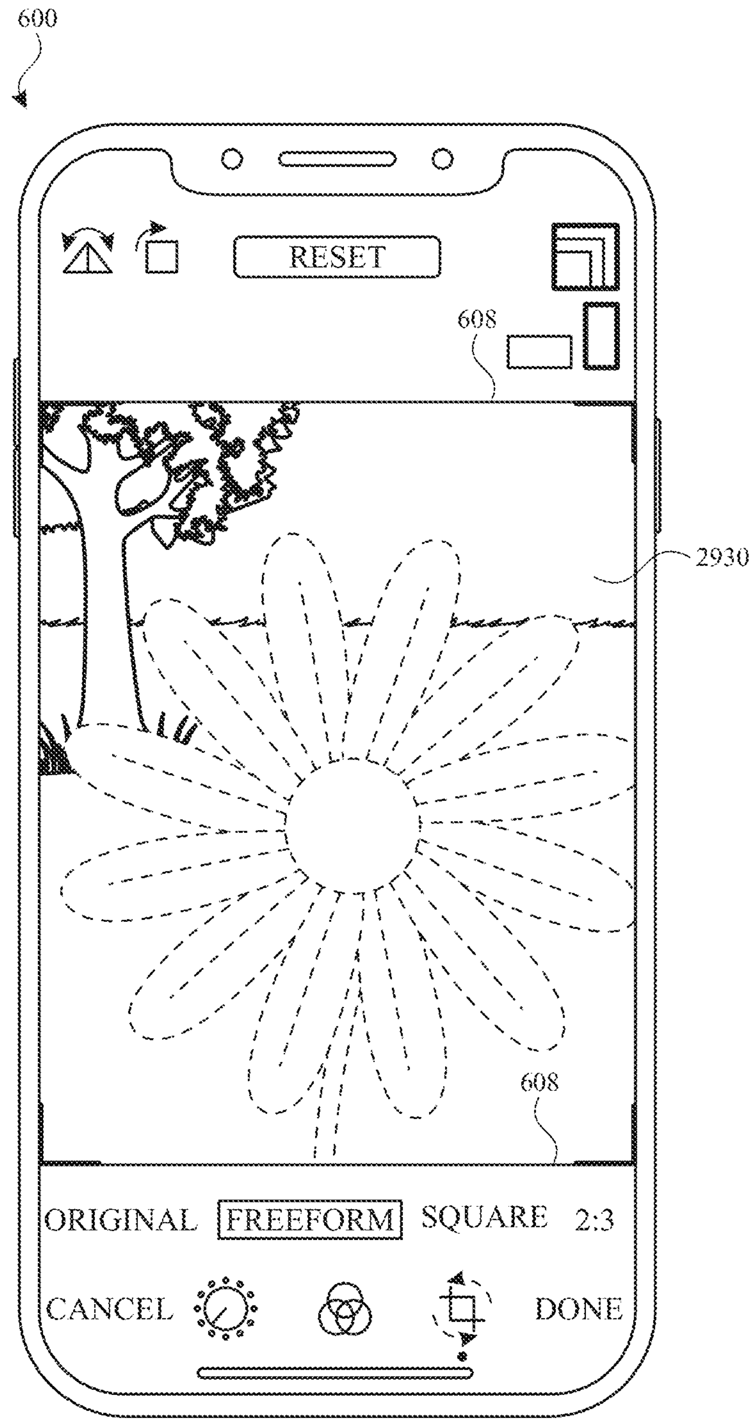
Figure 30B:
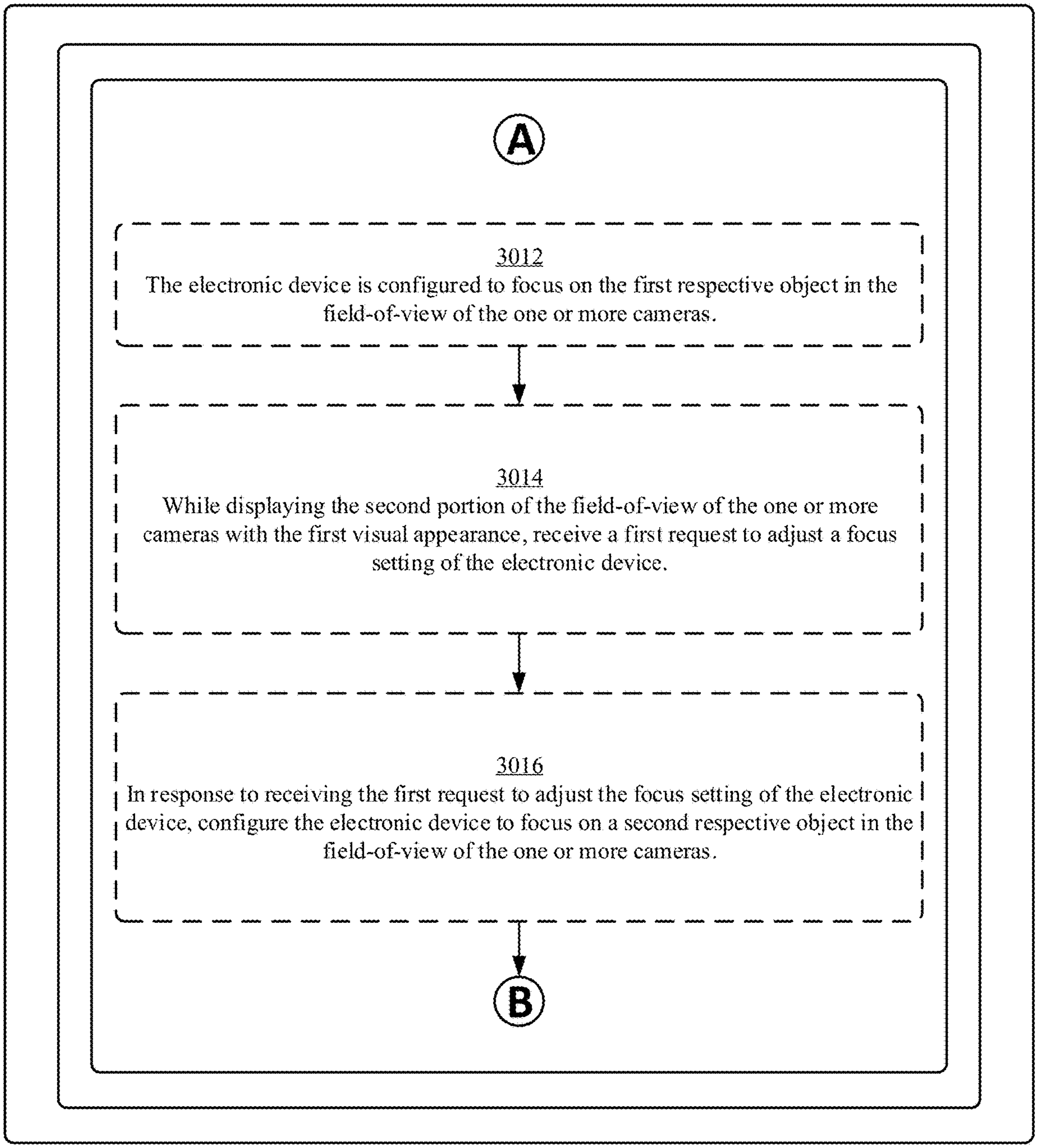
Figure 30C:
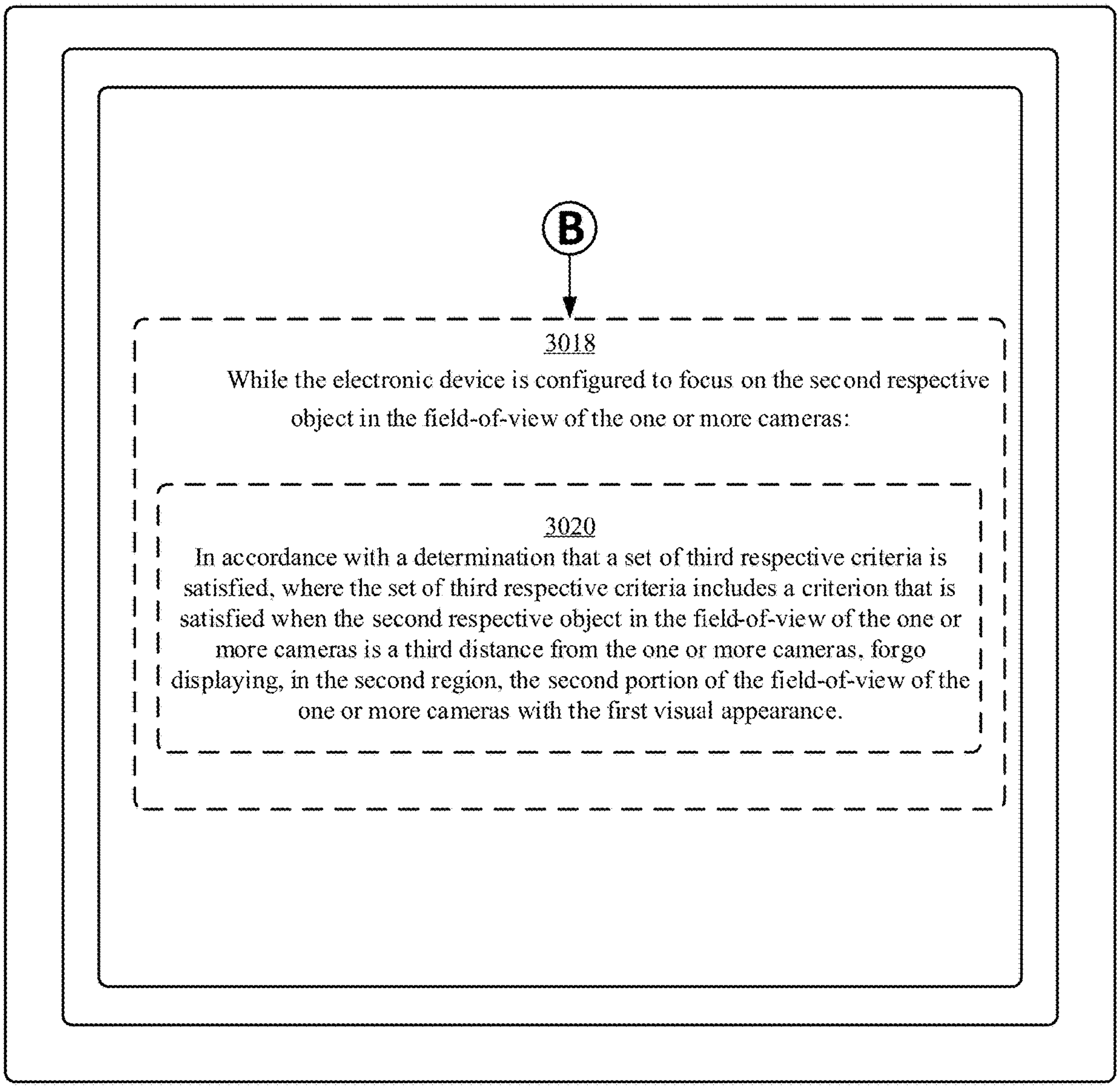

FIGS. 29A-29P illustrate exemplary user interfaces for managing the capture of media controlled by using an electronic device with multiple cameras in accordance with some embodiments. FIGS. 30A-30C are a flow diagram illustrating a method for managing the capture of media controlled by using an electronic device with multiple cameras in accordance with some embodiments. The user interfaces in FIGS. 29A-29P are used to illustrate the processes described below, including the processes in FIGS. 30A-30C.

FIGS. 31A-31I illustrate exemplary user interfaces for displaying a camera user interface at various zoom level using different cameras of an electronic device in accordance with some embodiments. FIGS. 32A-32C are a flow diagram illustrating a method for displaying a camera user interface at various zoom level using different cameras of an electronic device in accordance with some embodiments. The user interfaces in FIGS. 31A-31I are used to illustrate the processes described below, including the processes in FIGS. 32A-32C.

Figure 33A:
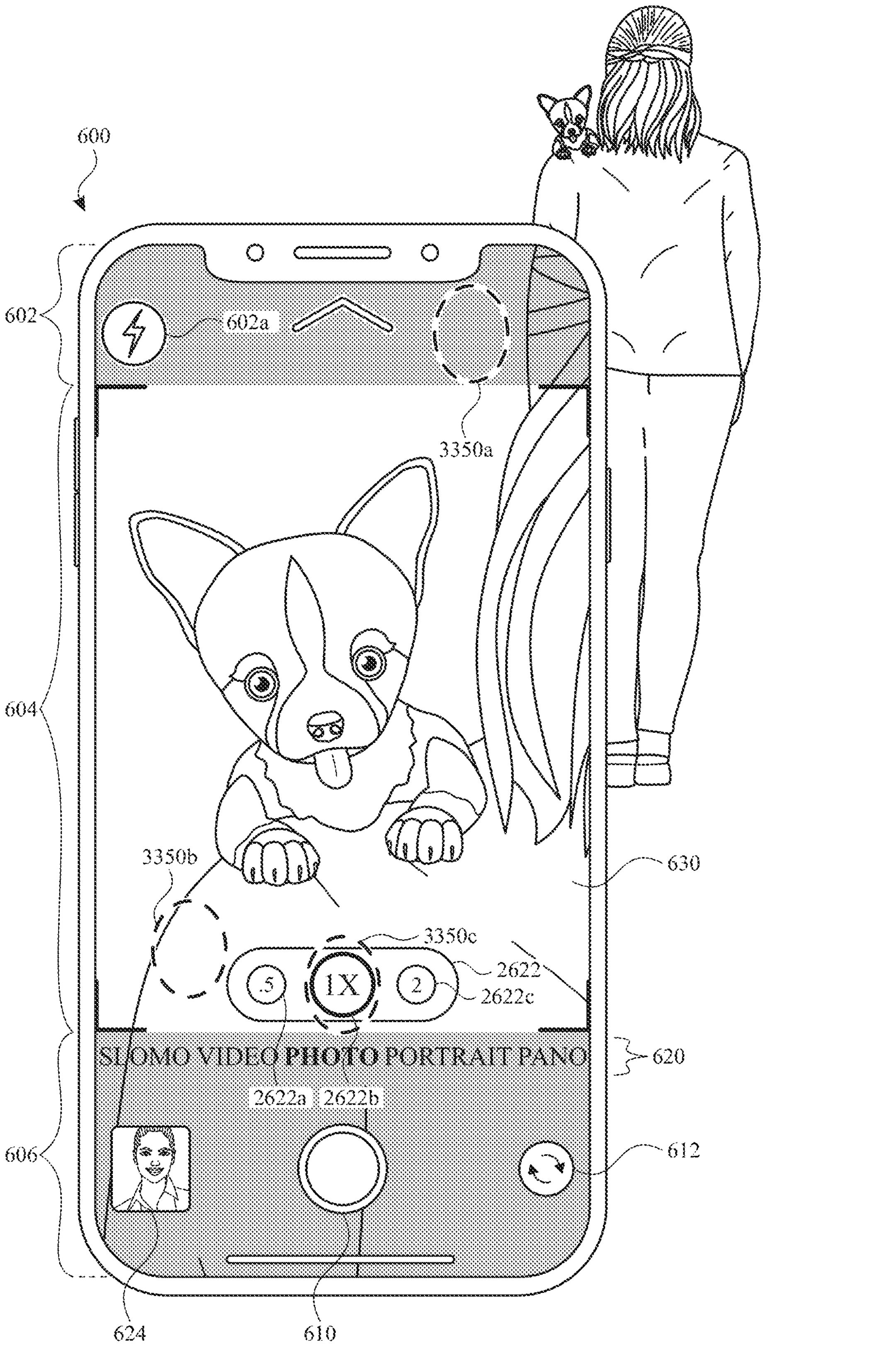
FIGS. 33A-33Q illustrate exemplary user interfaces for varying zoom levels using an electronic device in accordance with some embodiments.
Figure 33B:
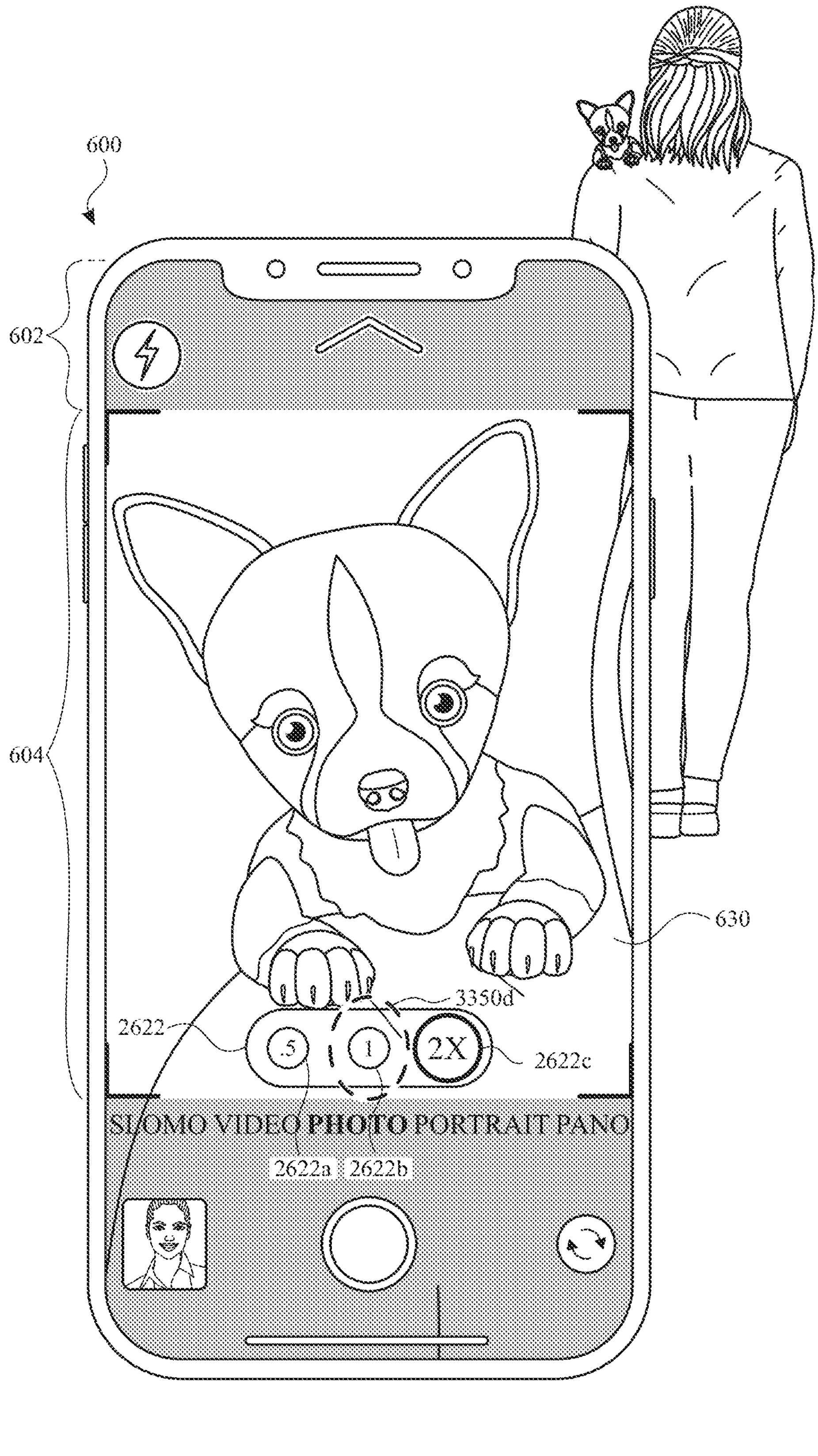
Figure 33C:
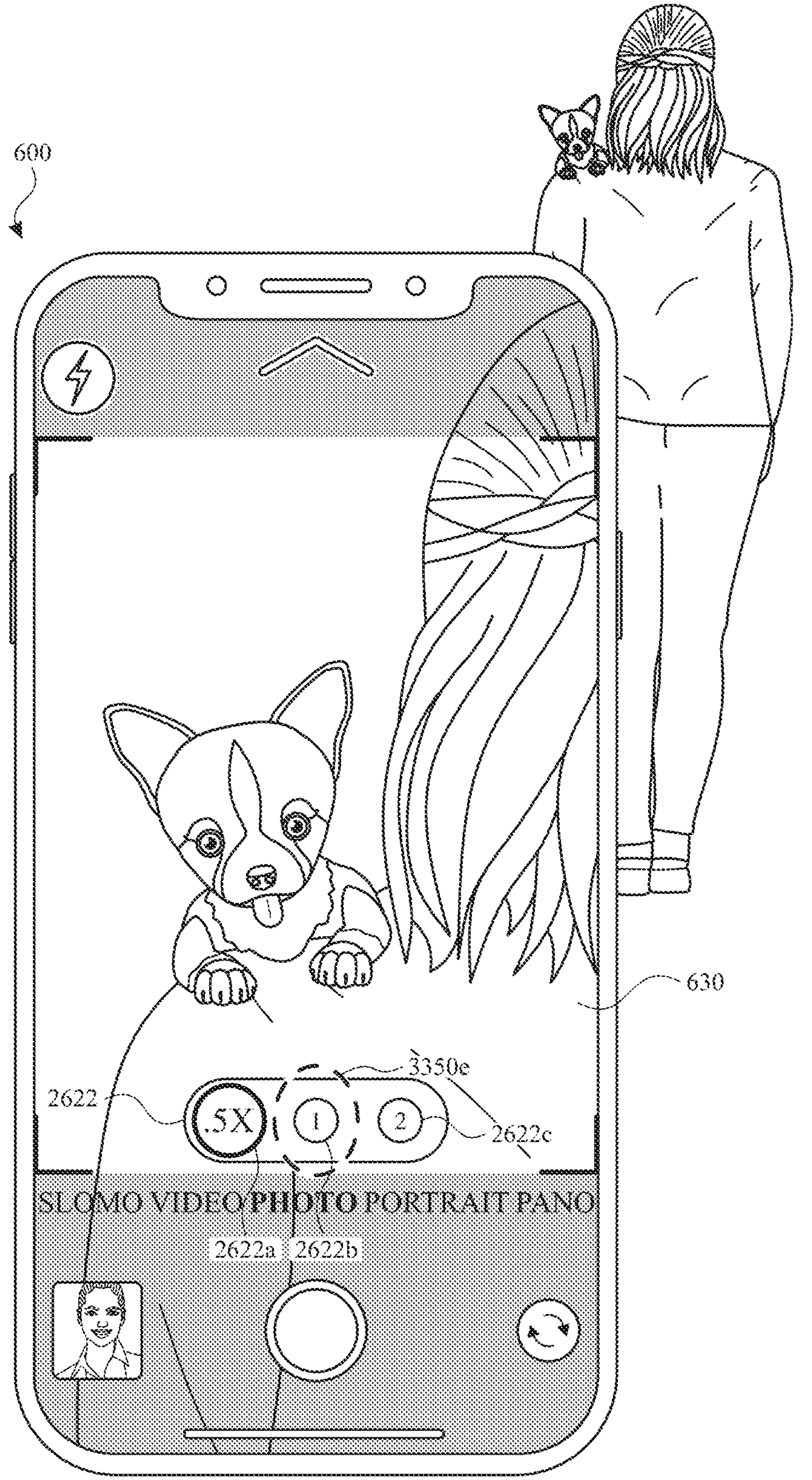
Figure 33D:
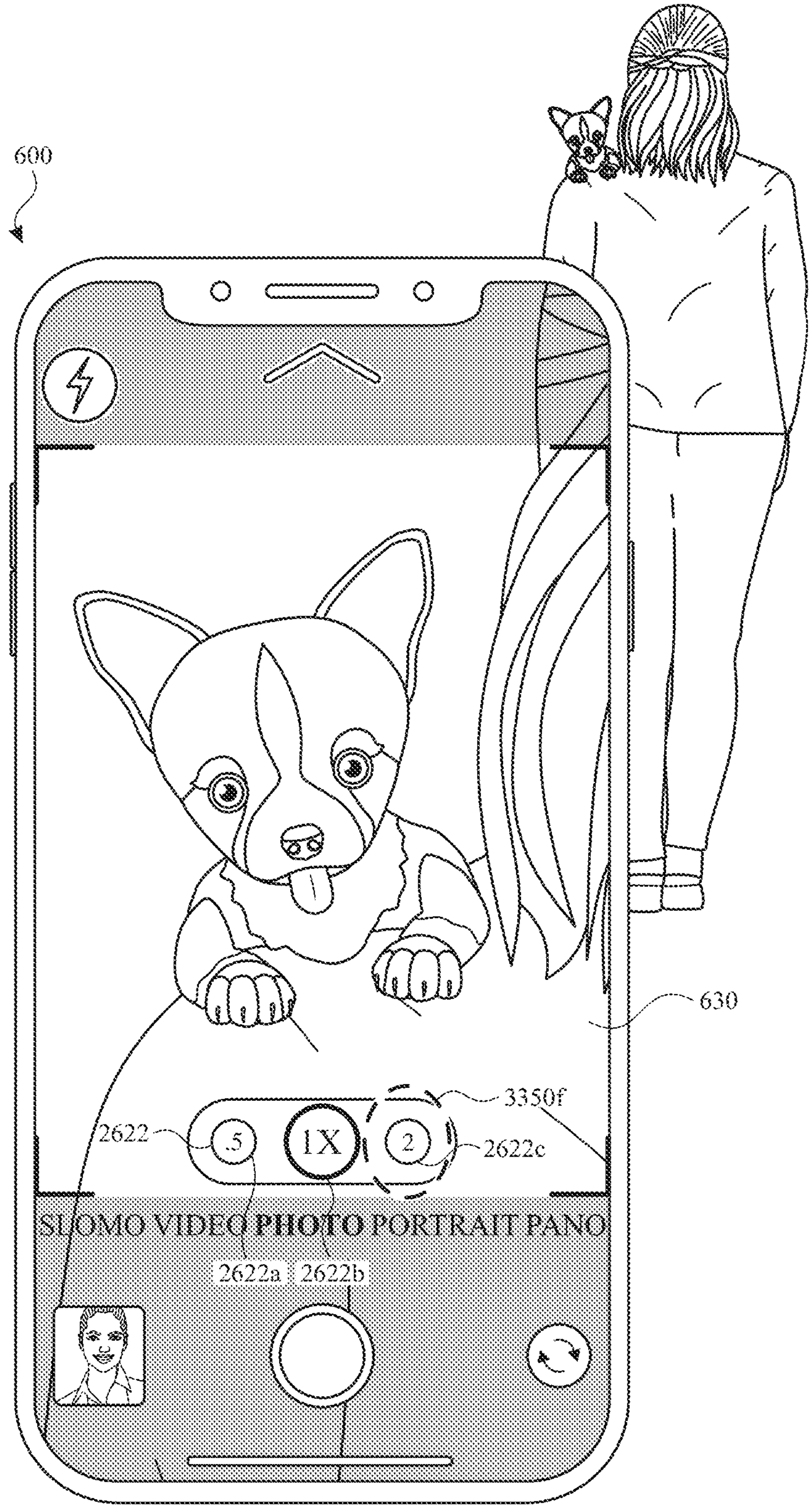
Figure 33E:
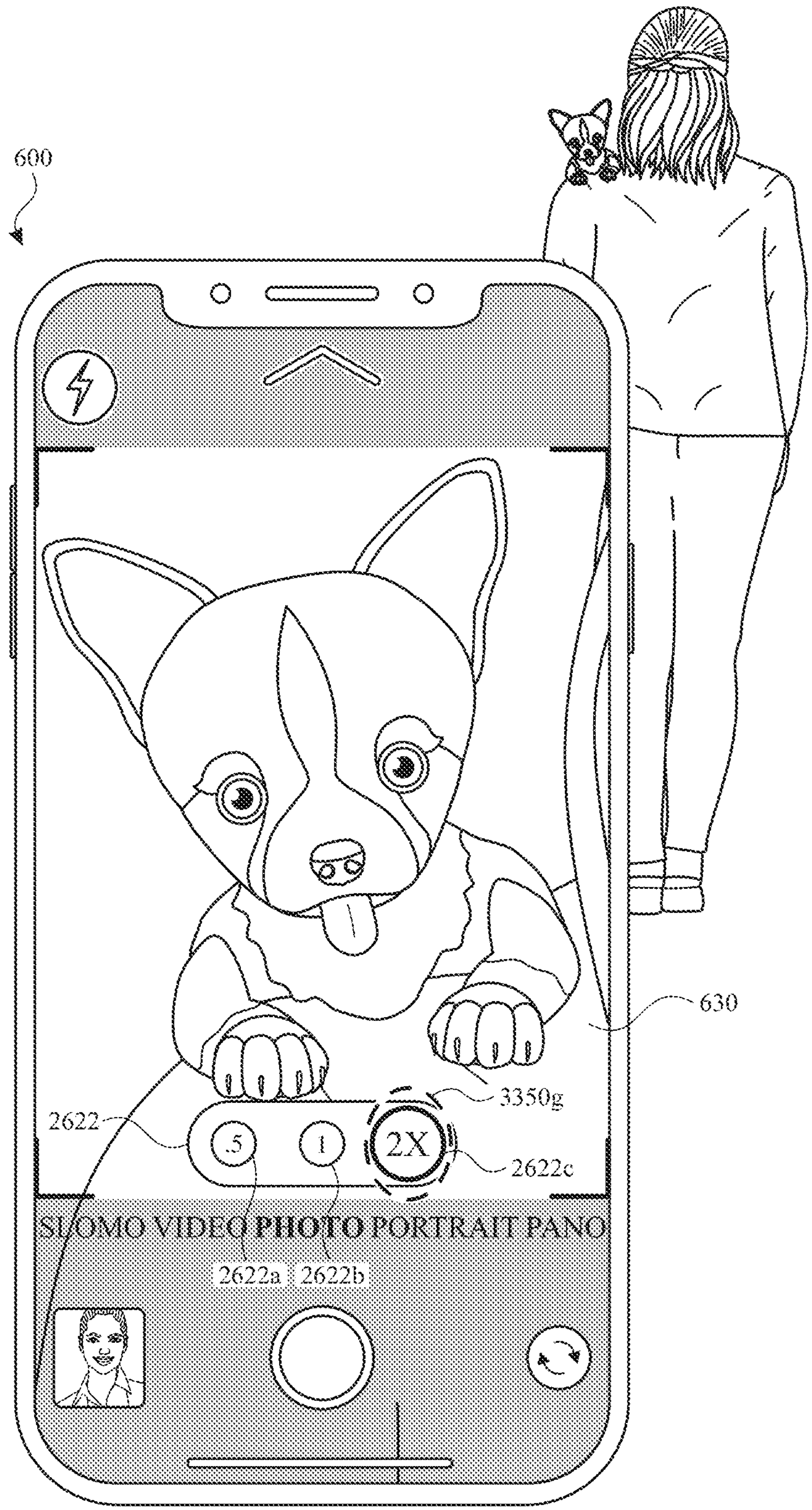
Figure 33F:
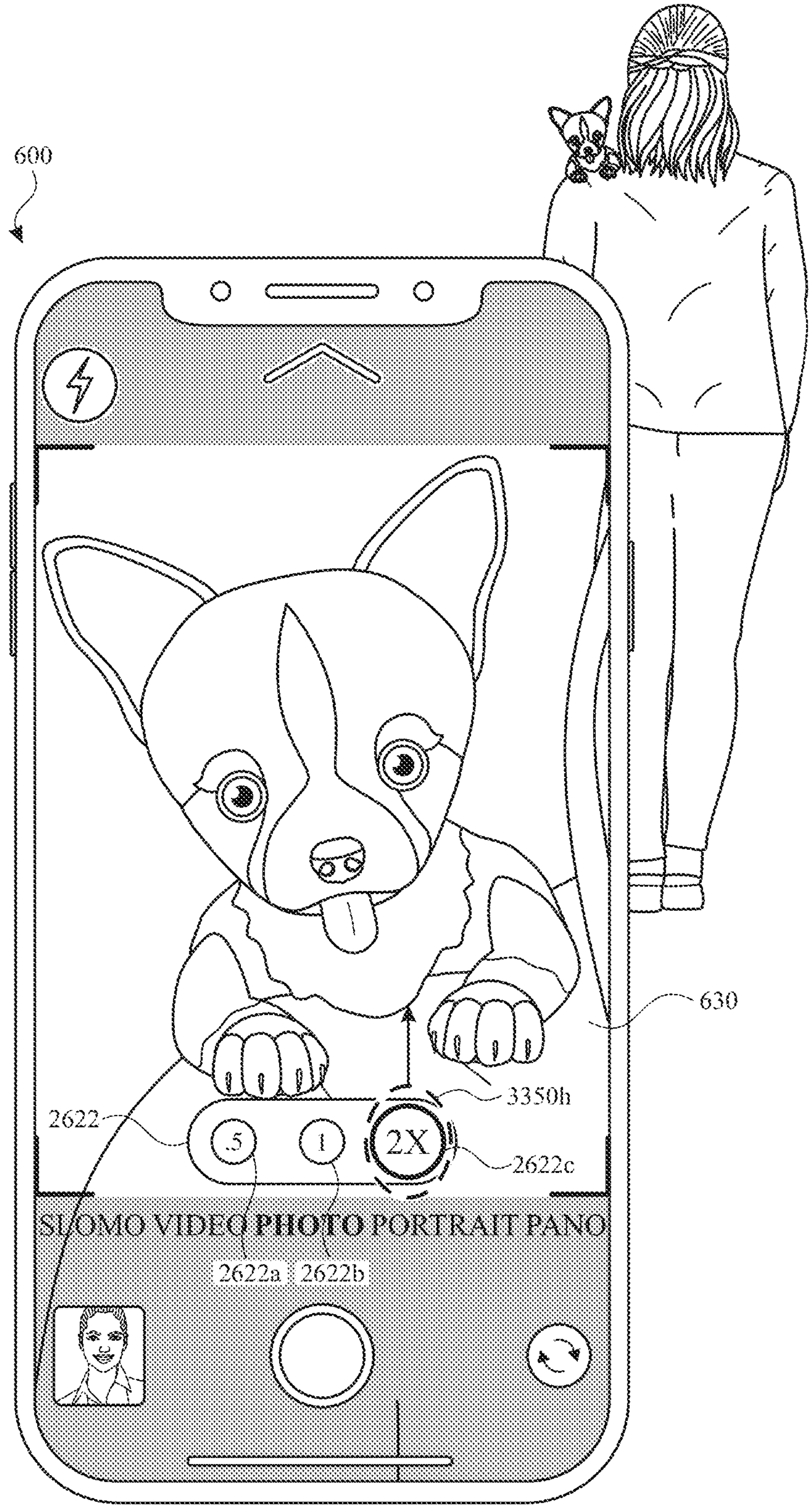
Figure 33G:
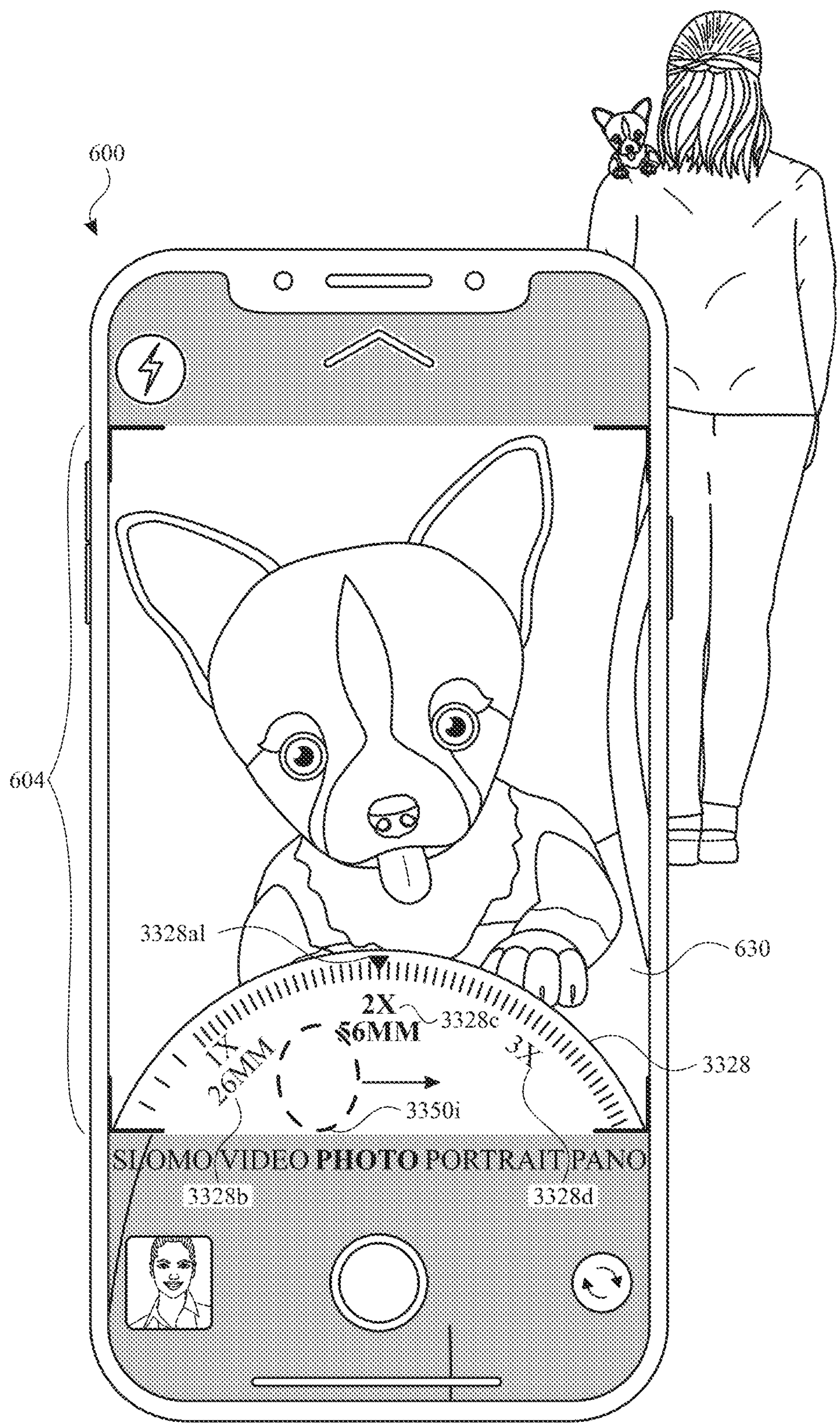
Figure 33H:
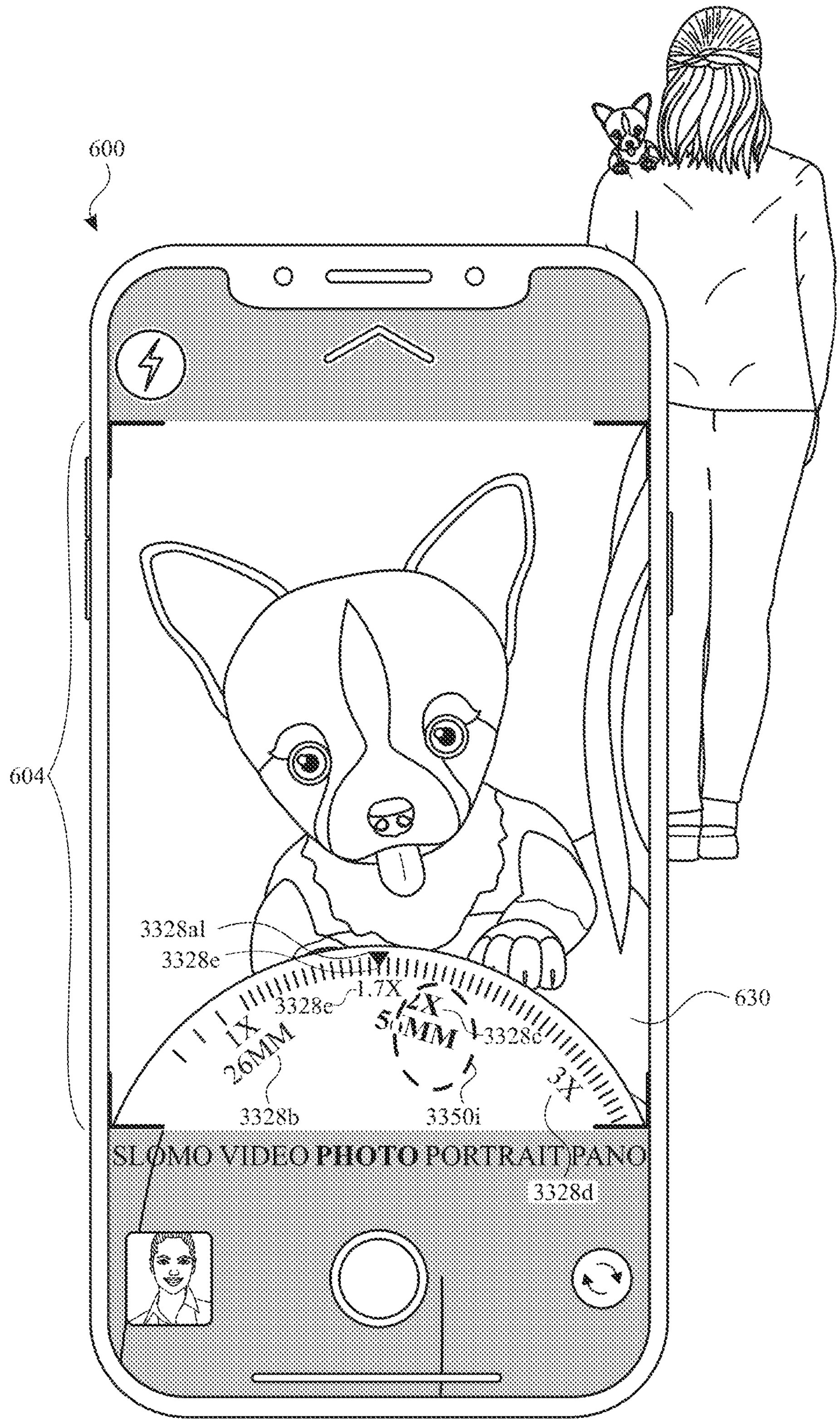
Figure 33I:
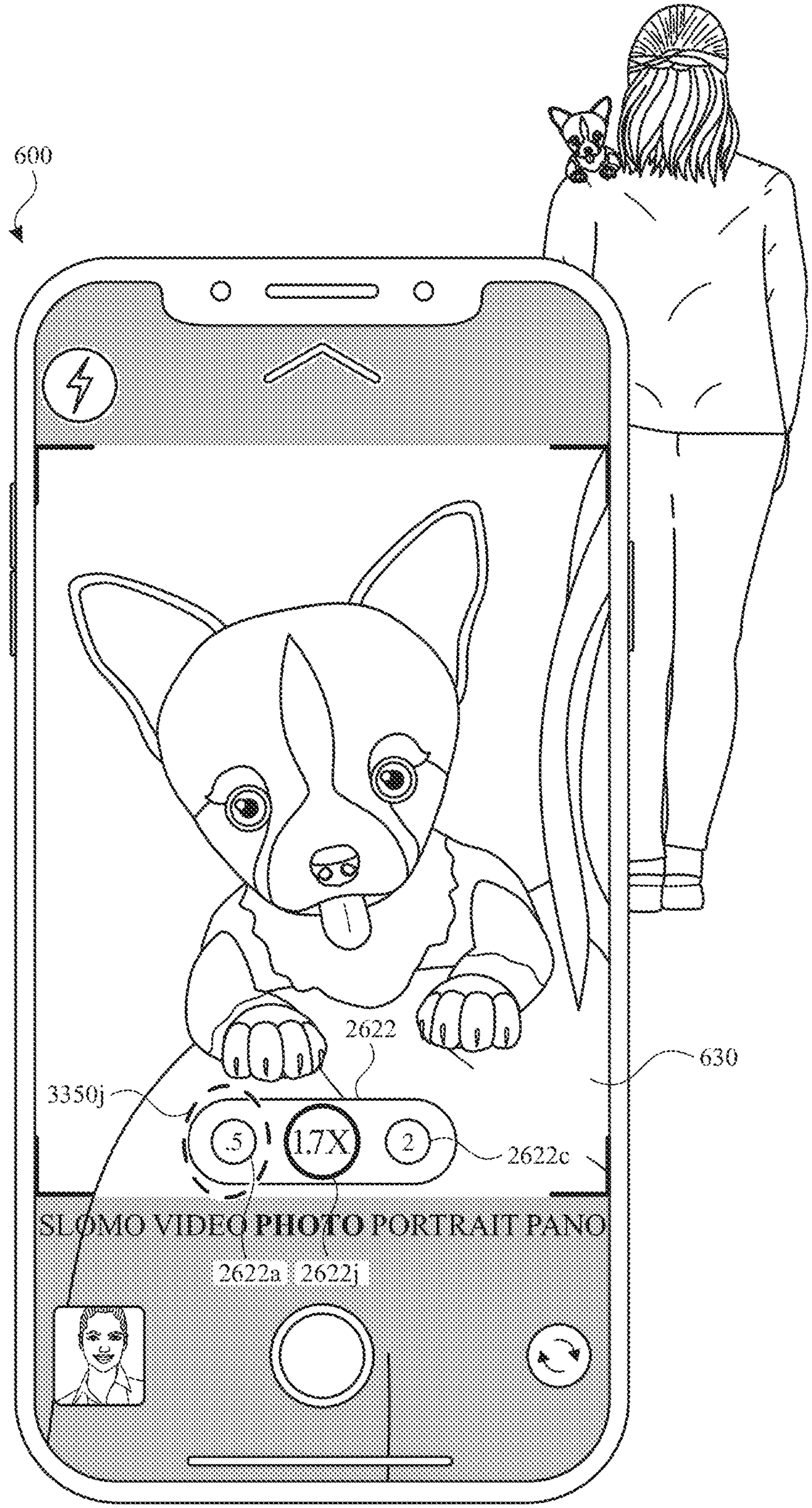
Figure 33J:
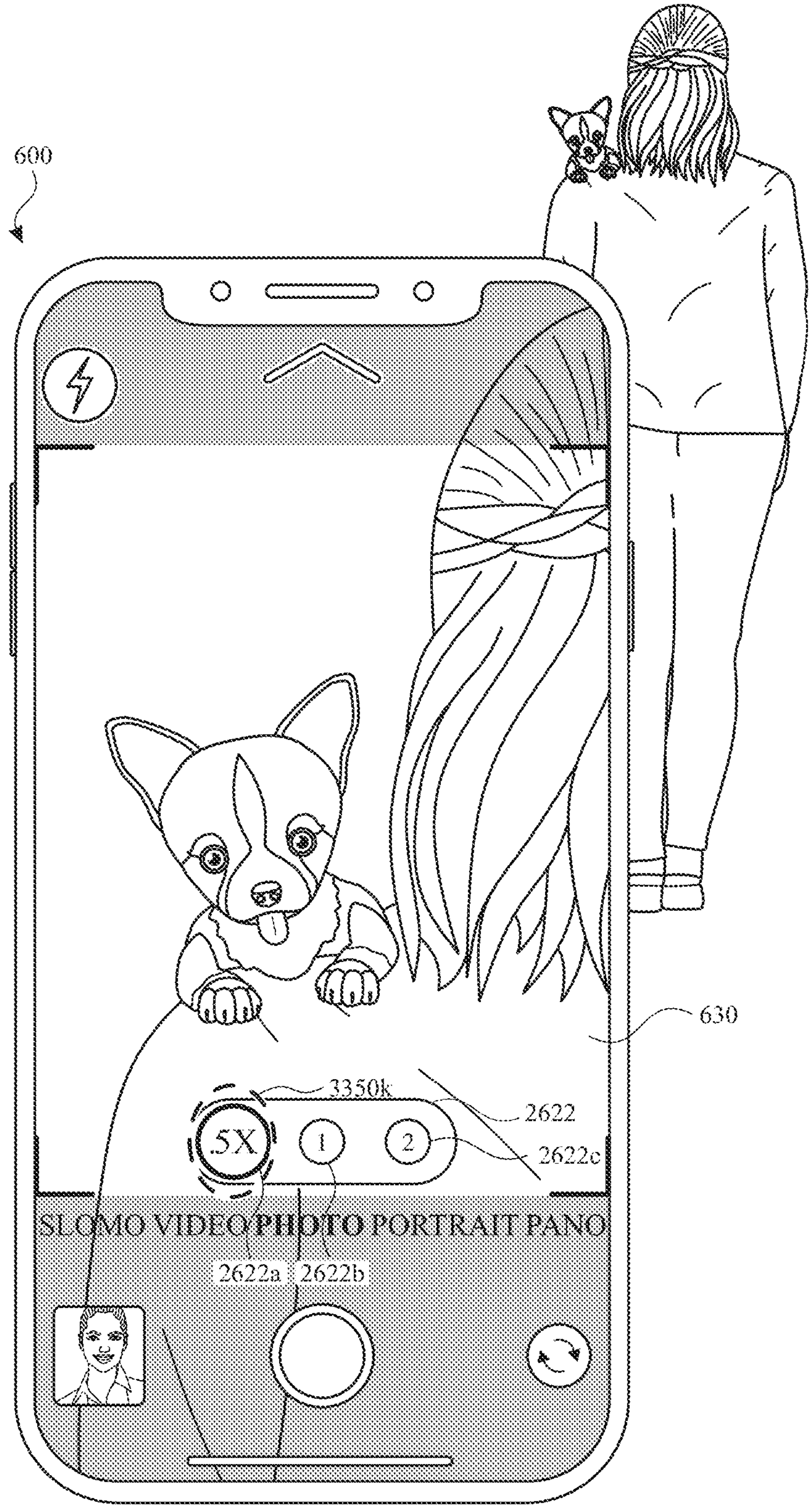
Figure 33K:
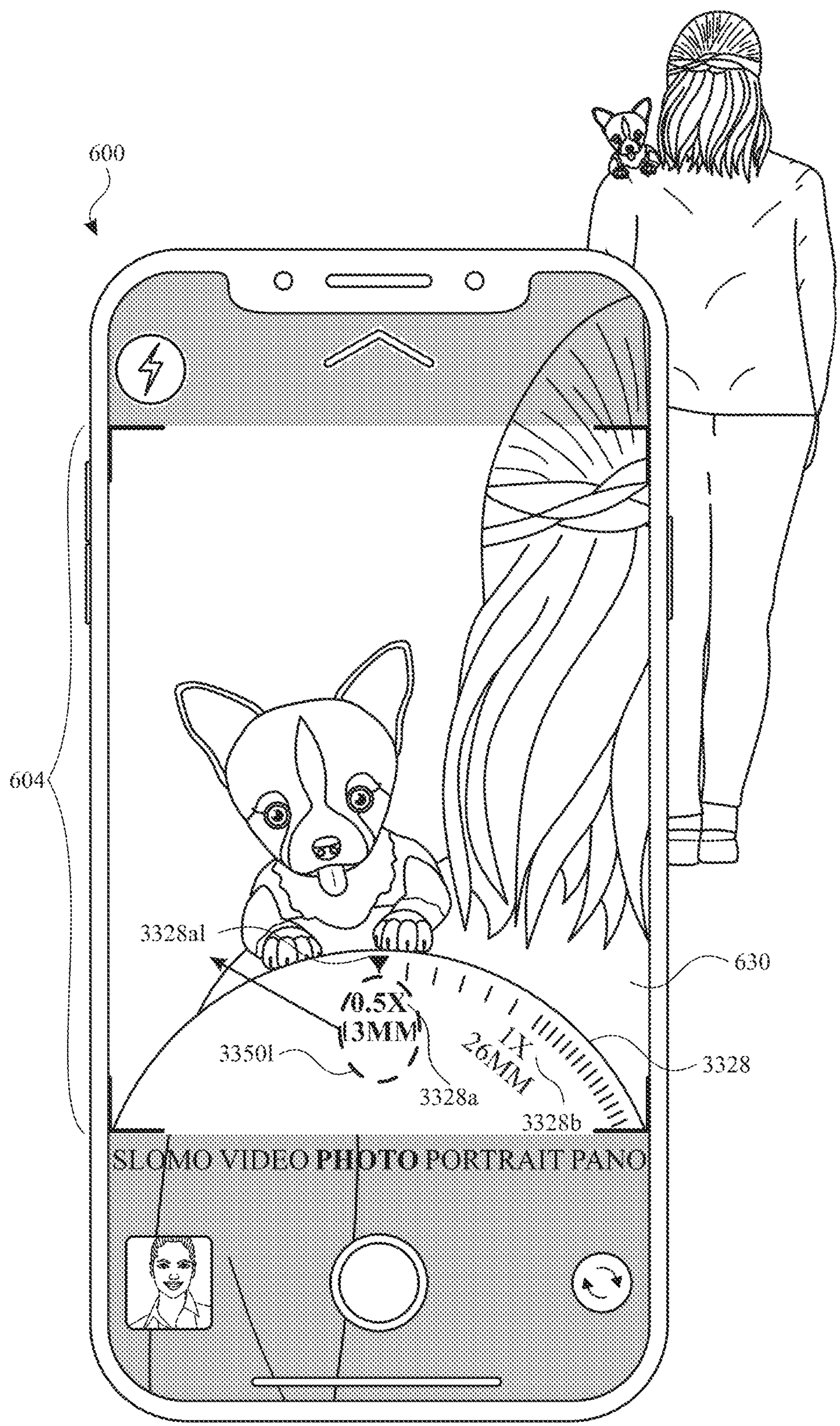
Figure 33L:
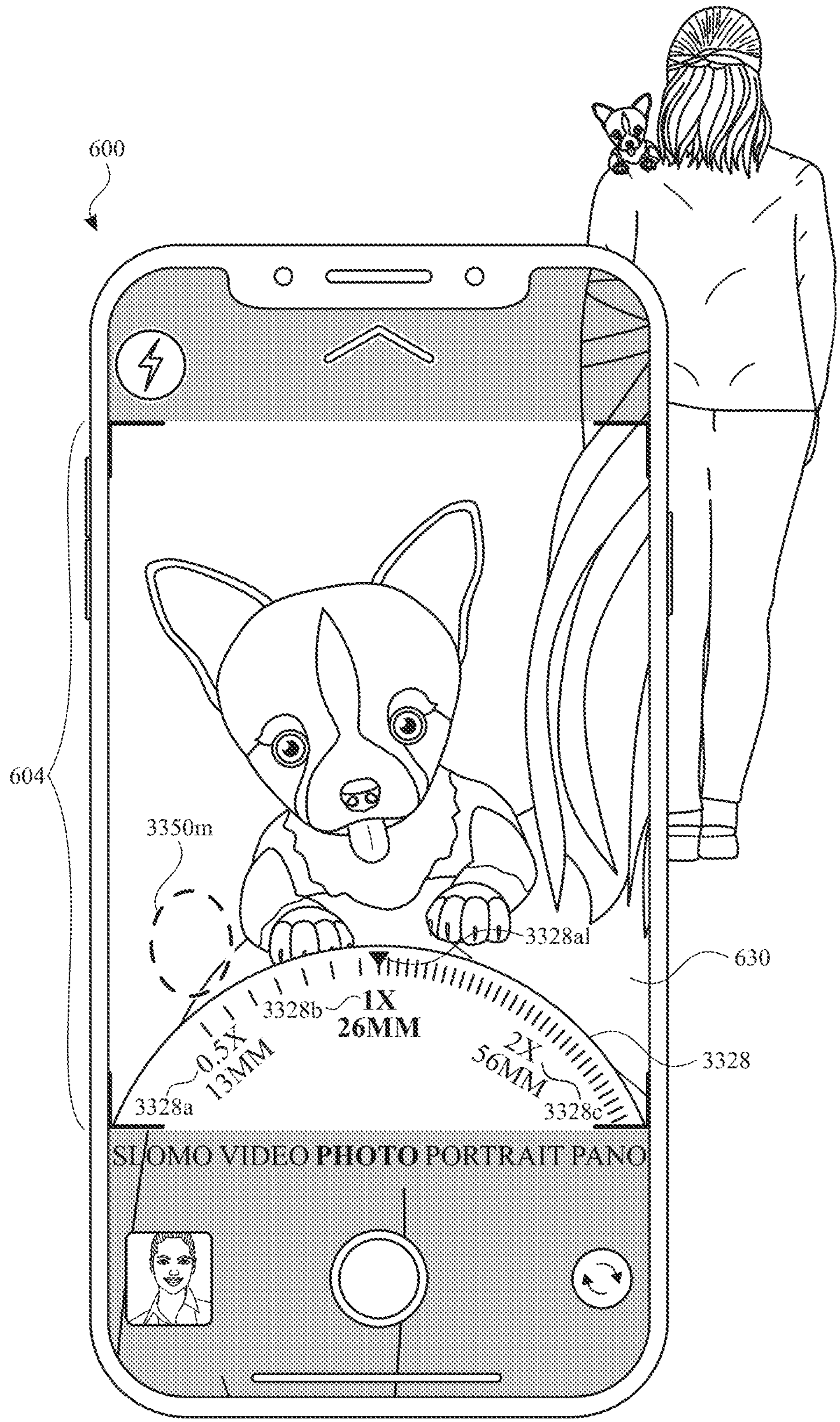
Figure 33M:
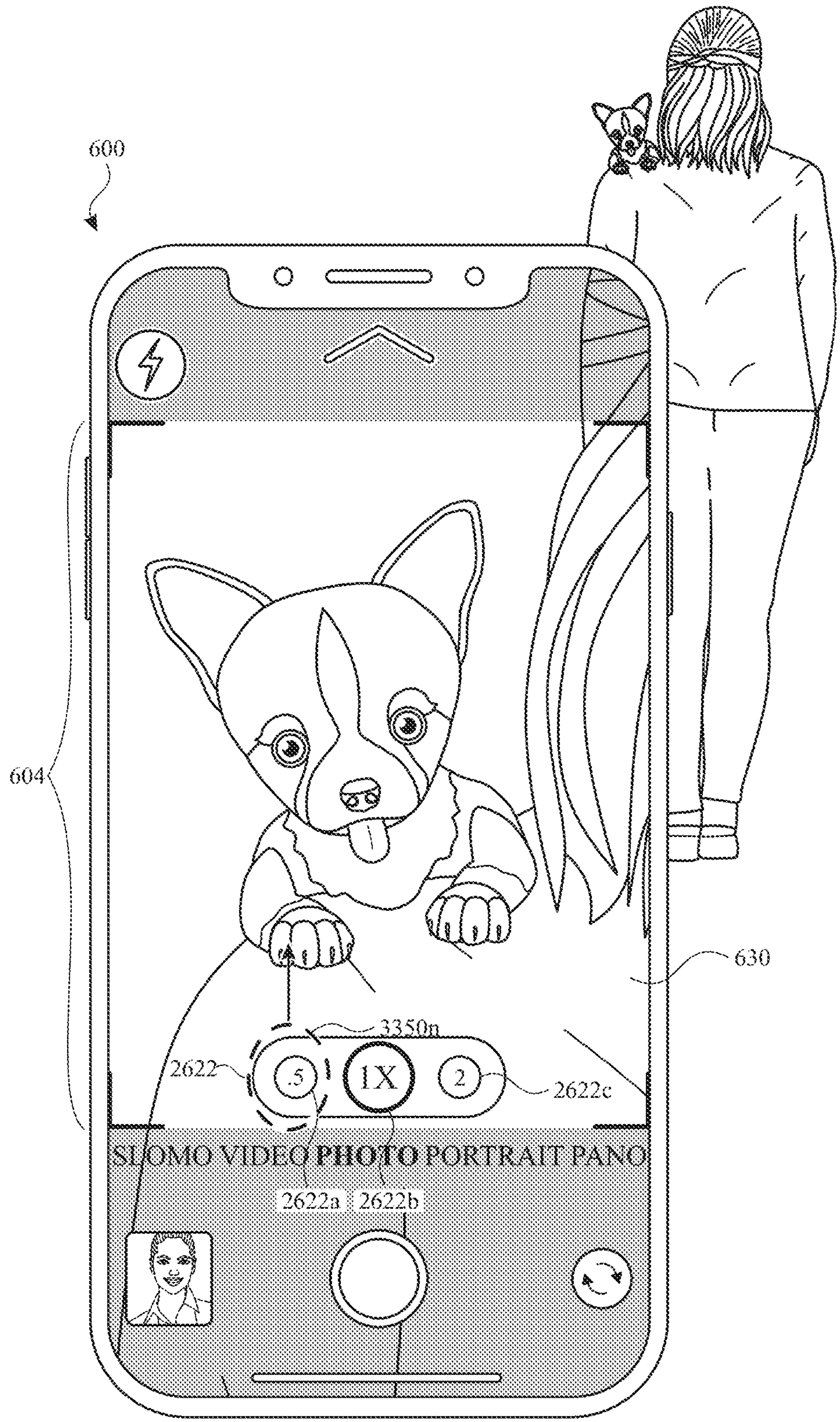
Figure 33N:
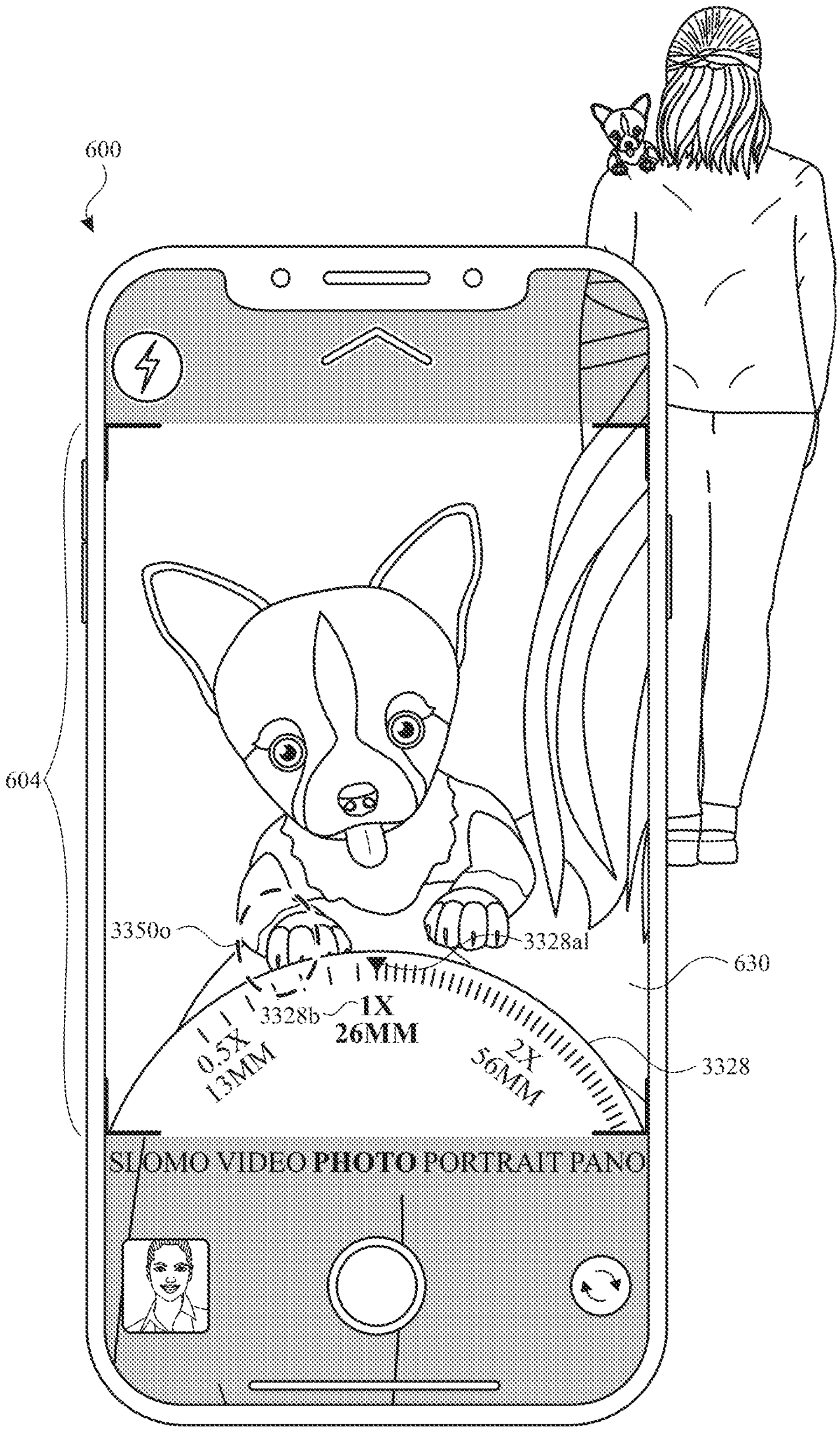
Figure 33O:
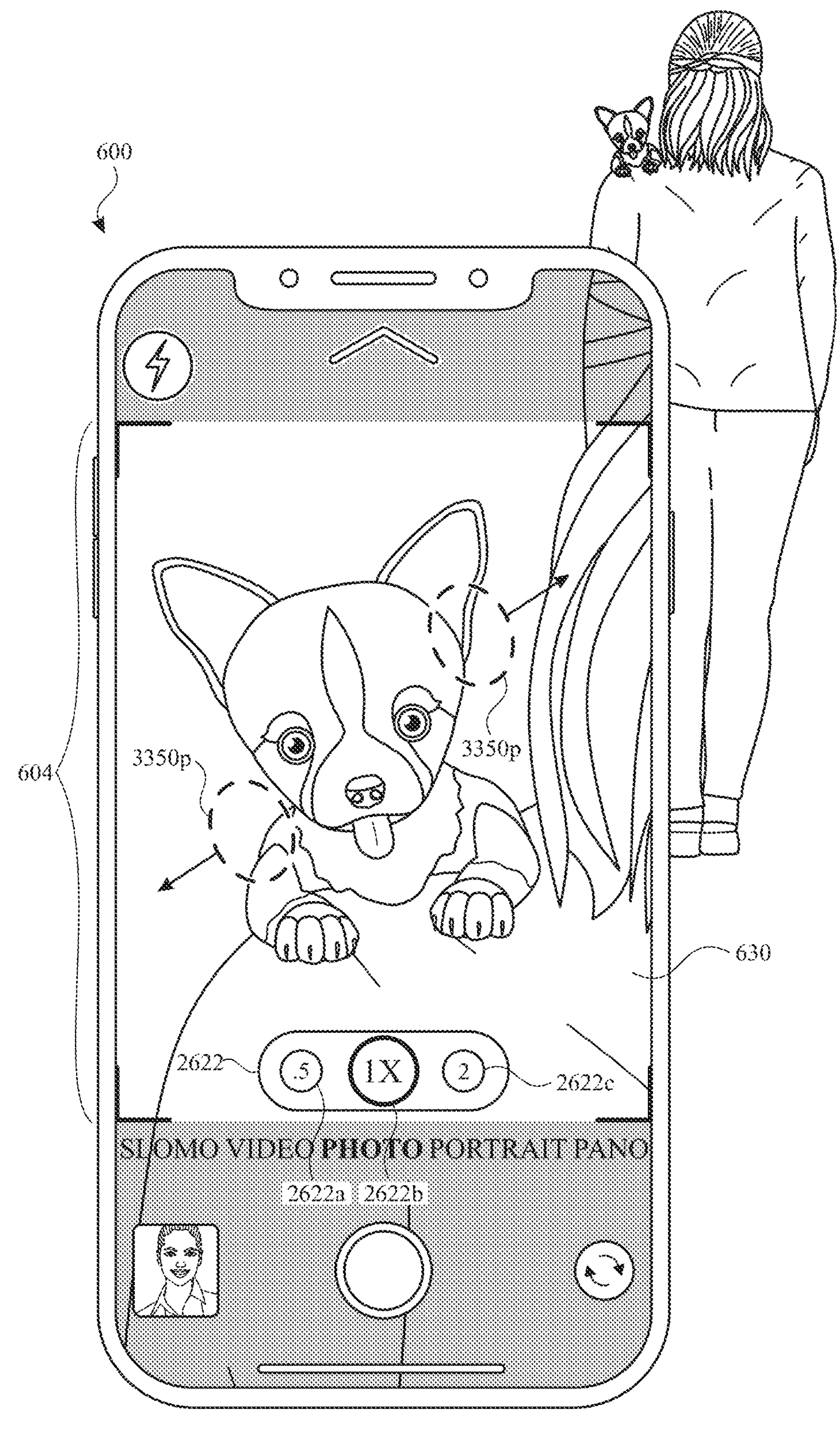
Figure 33P:
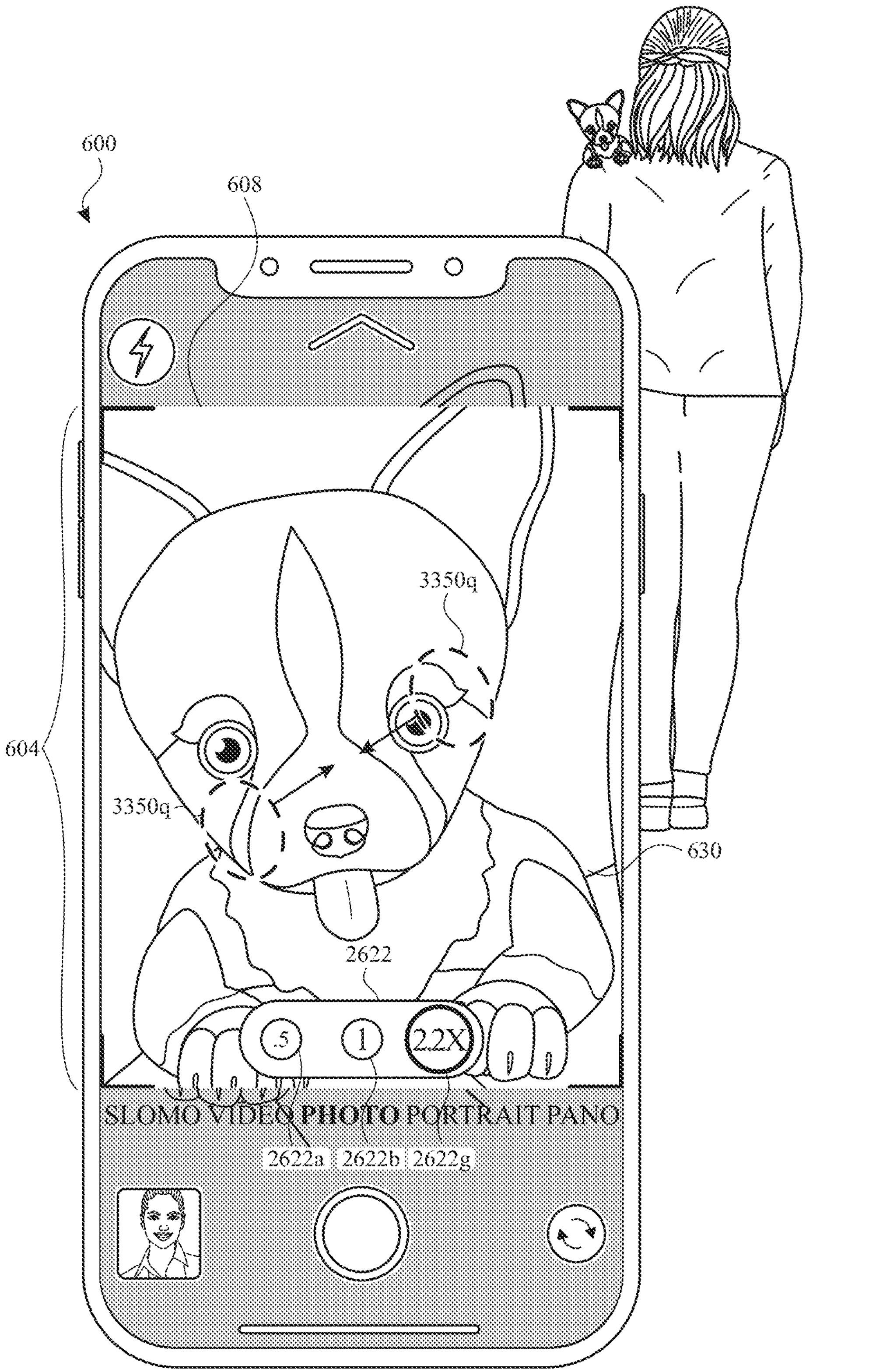
Figure 33Q:
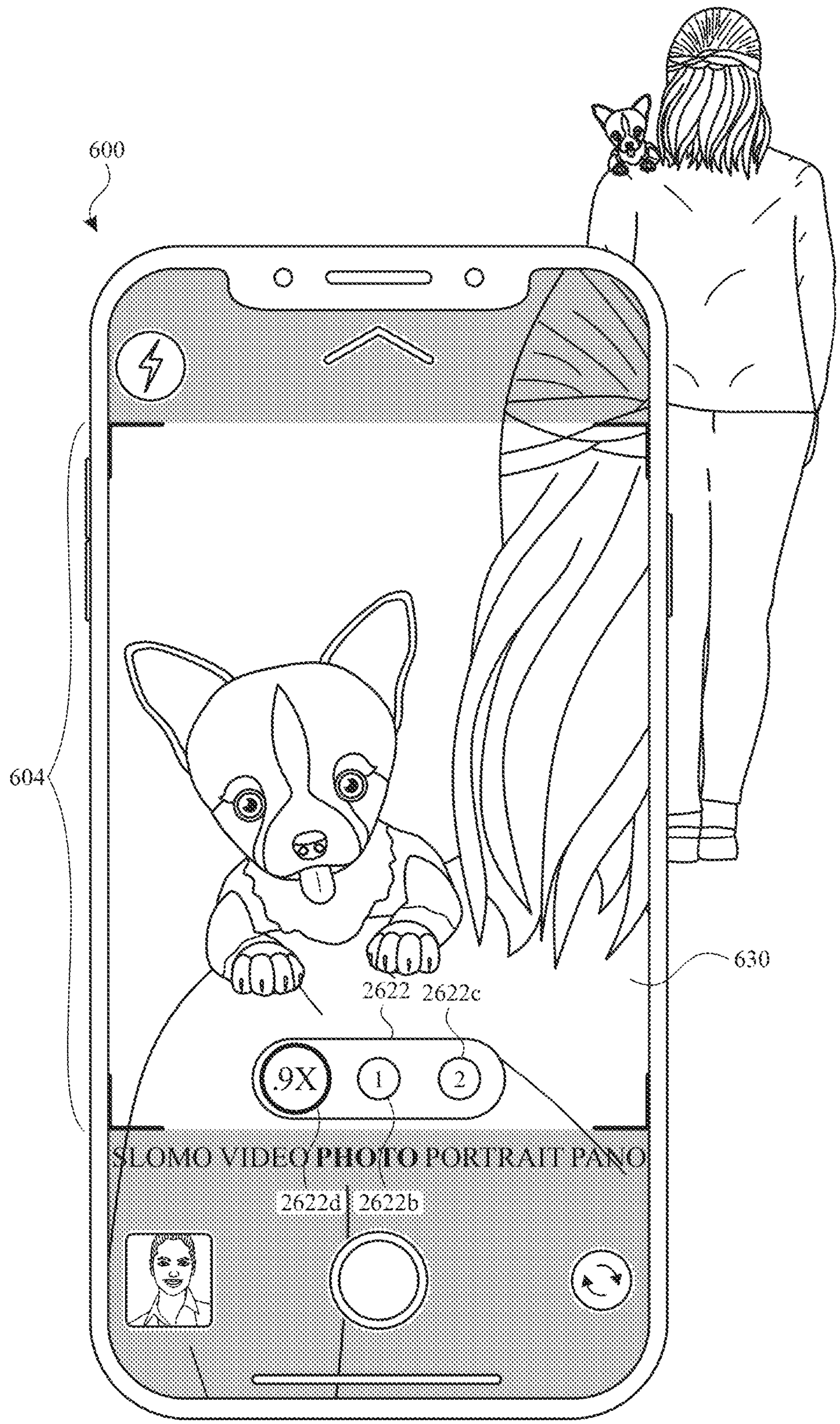
Figure 34B:
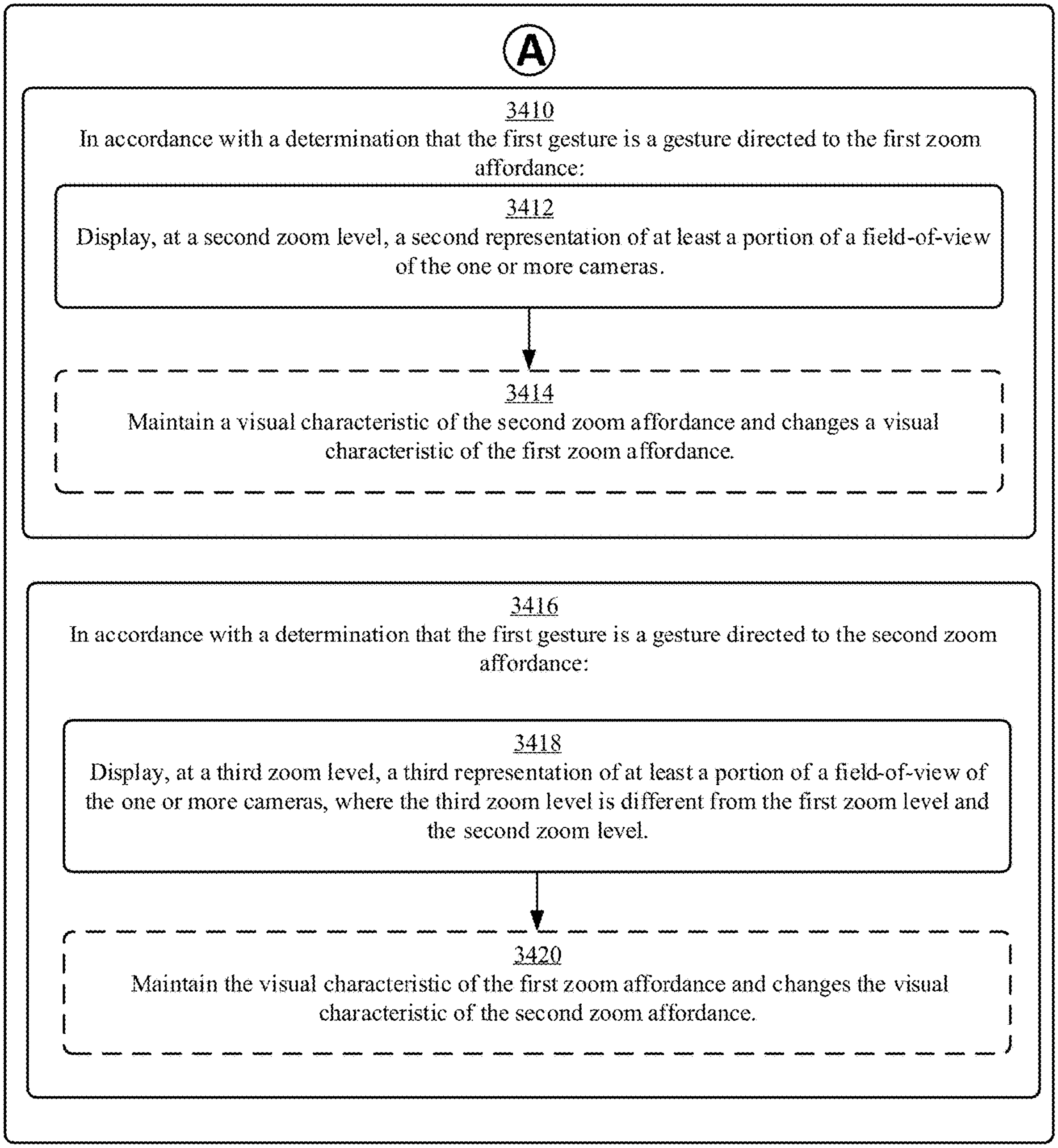

FIGS. 33A-33Q illustrate exemplary user interfaces for varying zoom levels using an electronic device in accordance with some embodiments. FIGS. 34A-34B are a flow diagram illustrating a method for varying zoom levels using an electronic device in accordance with some embodiments. The user interfaces in FIGS. 33A-33Q are used to illustrate the processes described below, including the processes in FIGS. 34A-34B.

Figure 35A:
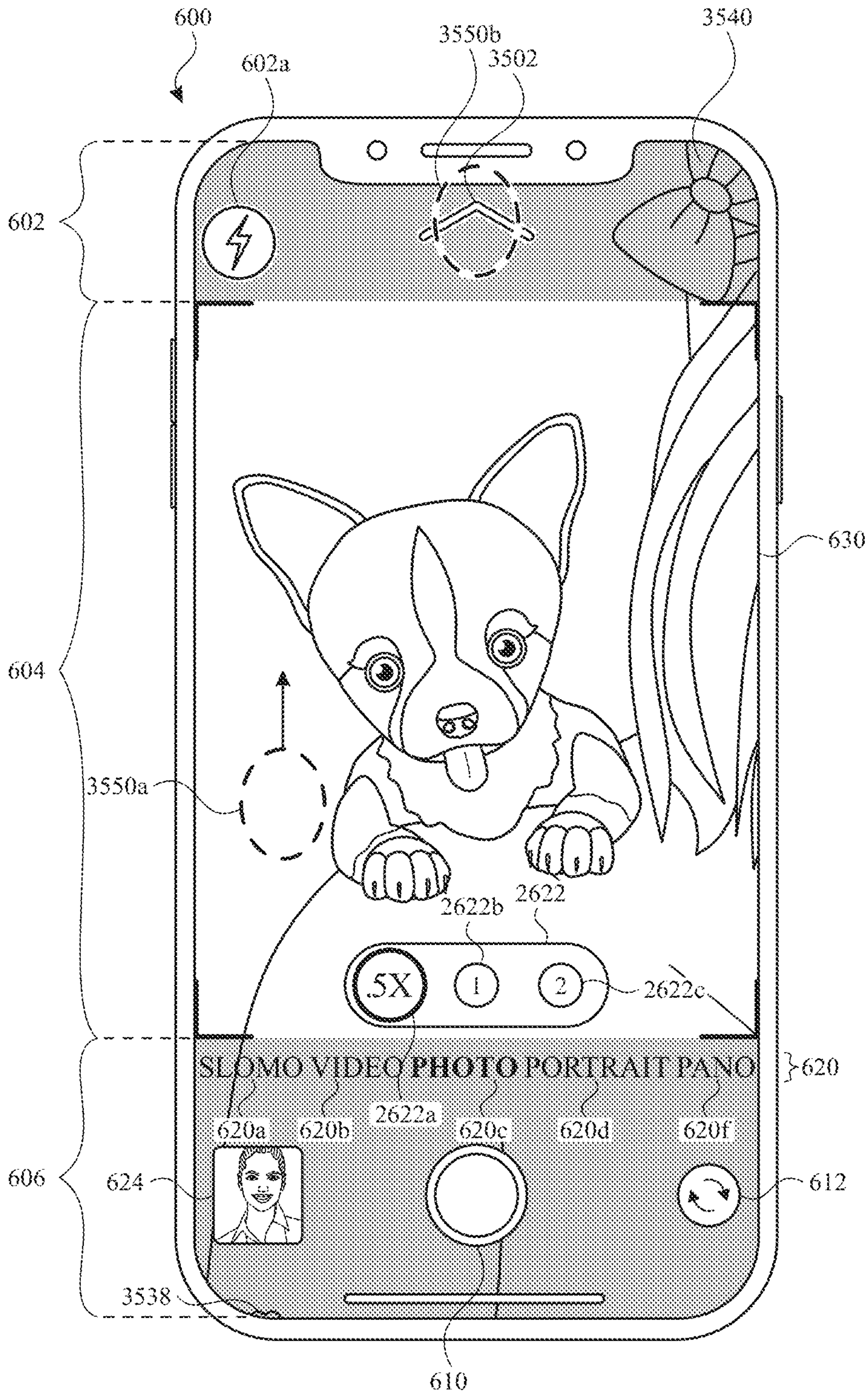
FIGS. 35A-35I illustrate exemplary user interfaces for accessing media capture controls using an electronic device in accordance with some embodiments.

FIGS. 35A-35I illustrate exemplary user interfaces for accessing media capture controls using an electronic device in accordance with some embodiments. FIGS. 36A-36B are a flow diagram illustrating a method for accessing media capture controls using an electronic device in accordance with some embodiments. The user interfaces in FIGS. 35A-35I are used to illustrate the processes described below, including the processes in FIGS. 36A-36B.

Figure 37A:
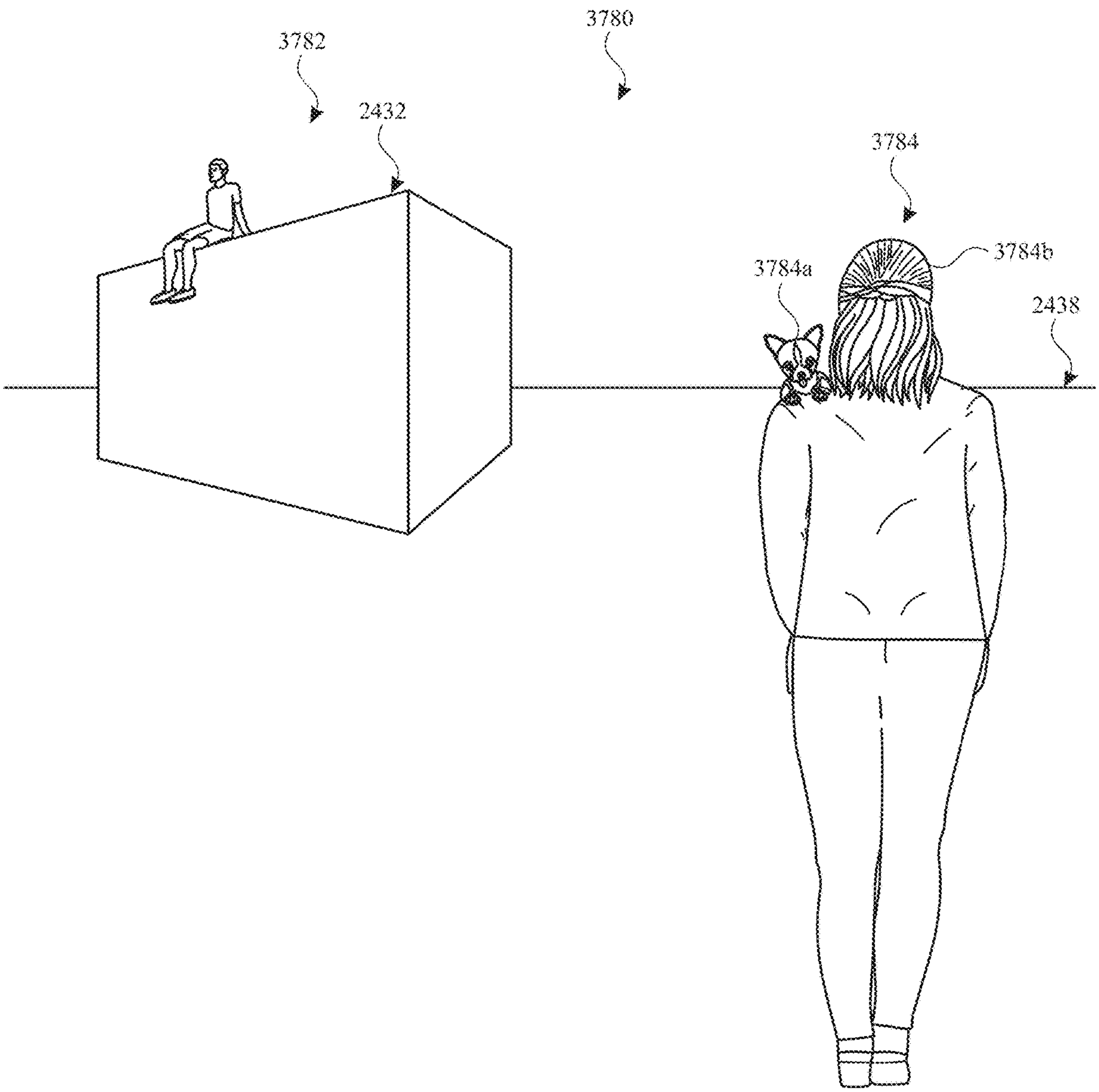
FIGS. 37A-37AA illustrate exemplary user interfaces for automatically adjusting captured media using an electronic device in accordance with some embodiments.
Figure 38A:
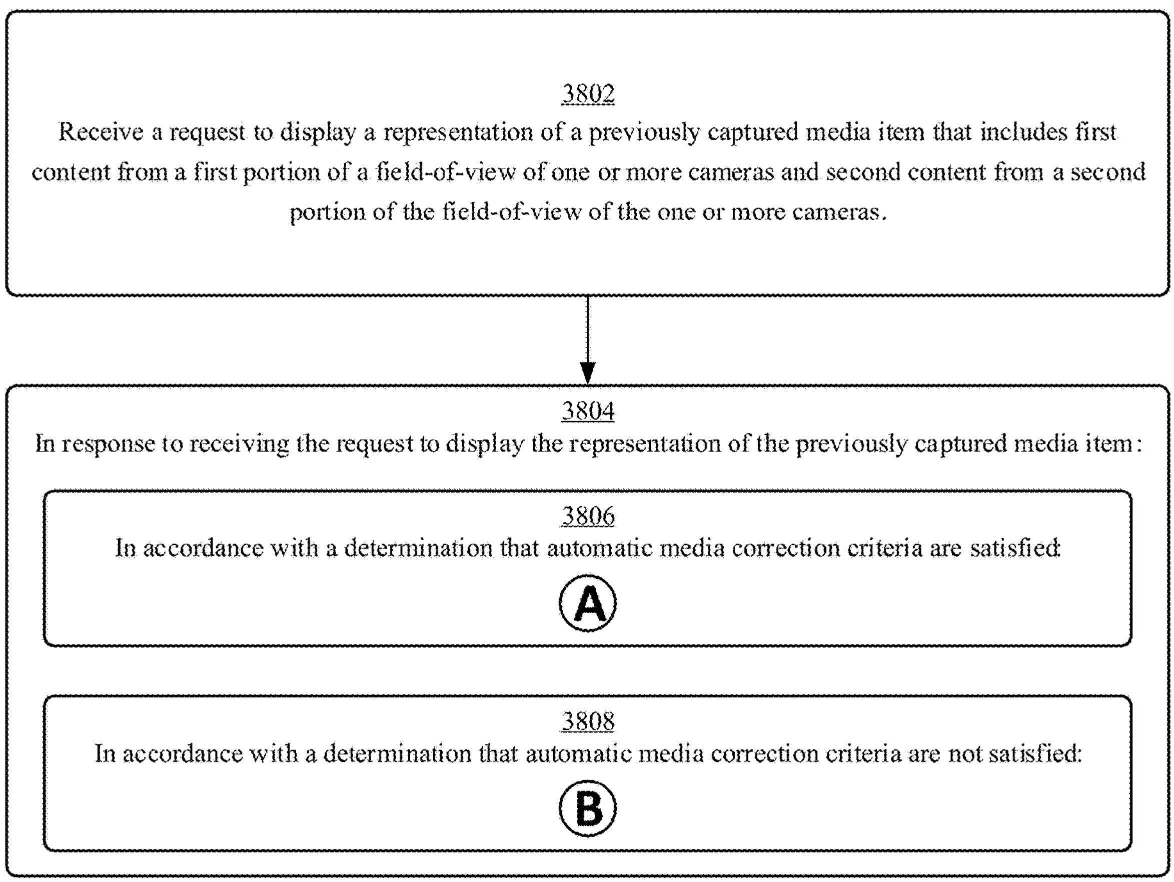
FIGS. 38A-38C are a flow diagram illustrating a method for automatically adjusting captured media using an electronic device in accordance with some embodiments.
Figure 38B:
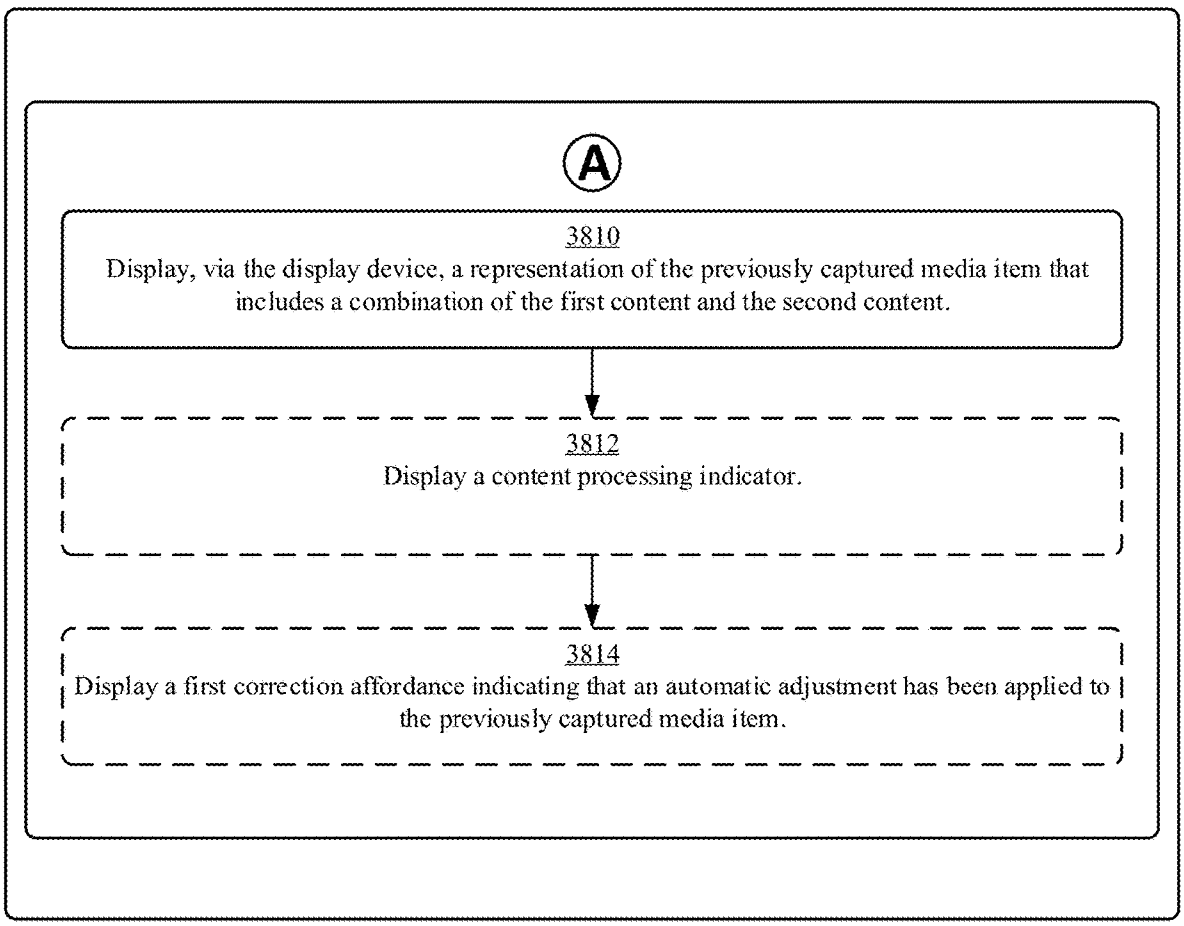
Figure 38C:
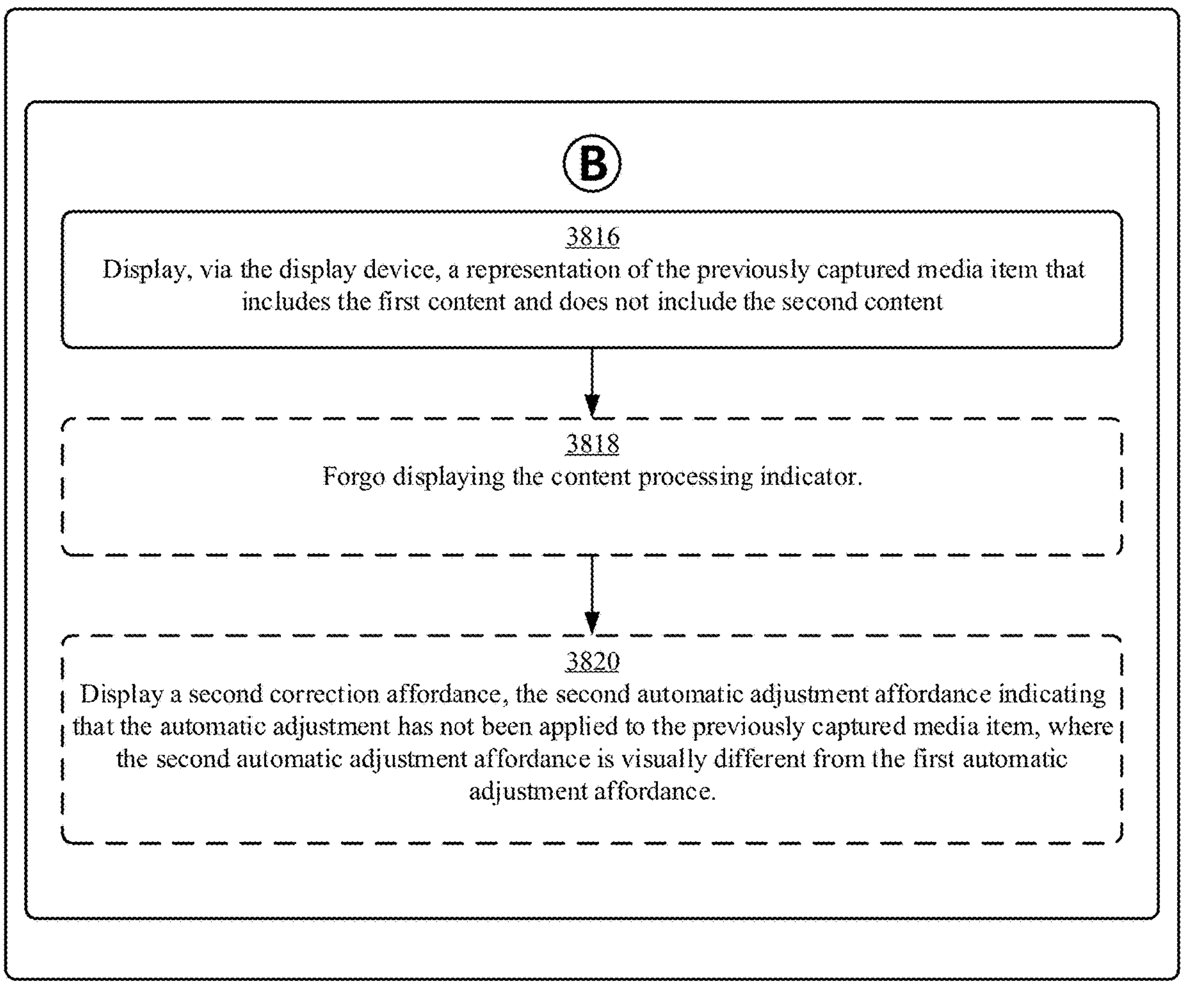

FIGS. 37A-37AA illustrate exemplary user interfaces for automatically adjusting captured media using an electronic device in accordance with some embodiments. FIGS. 38A-38C are a flow diagram illustrating a method for automatically adjusting captured media using an electronic device in accordance with some embodiments. The user interfaces in FIGS. 37A-37AA are used to illustrate the processes described below, including the processes in FIGS. 38A-38C.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
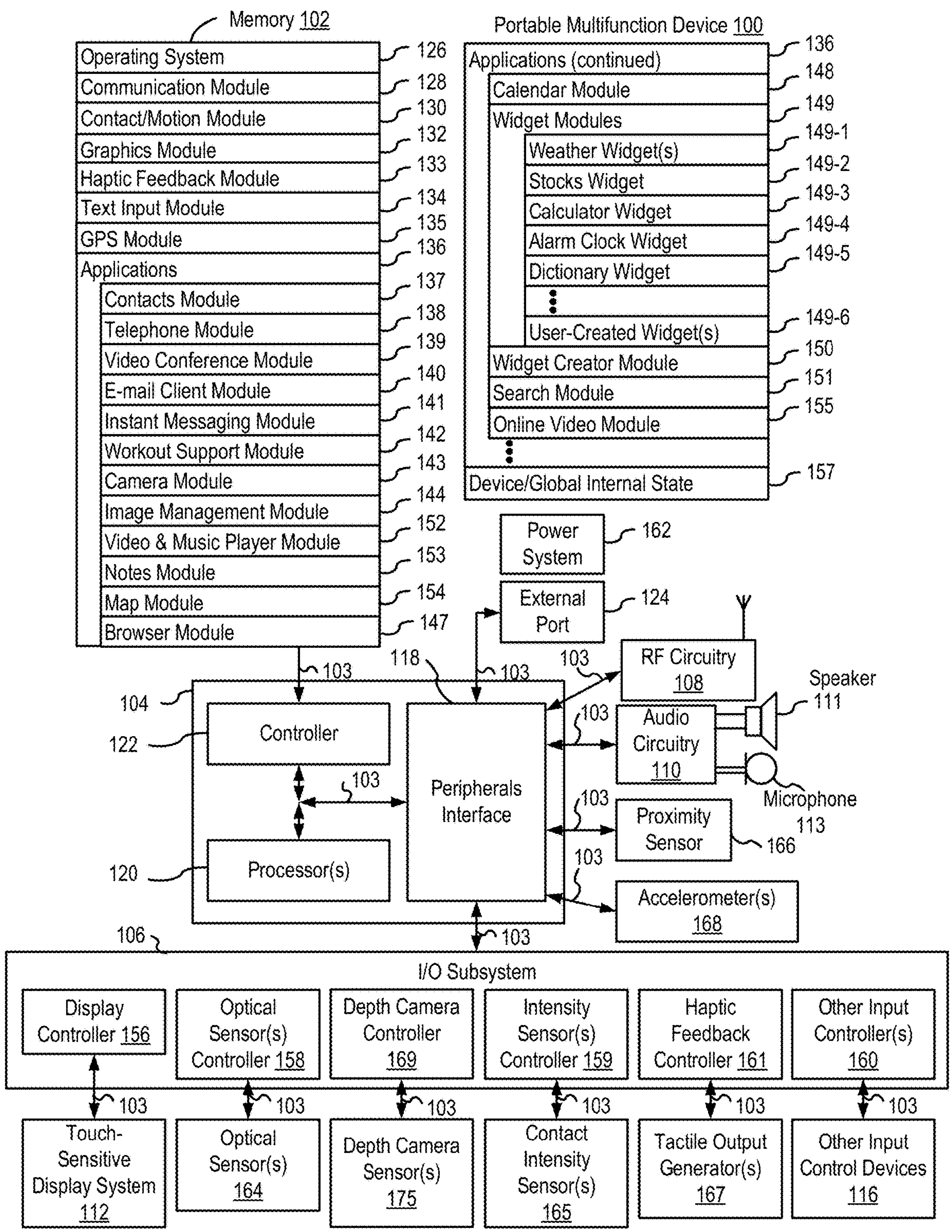
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels where each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
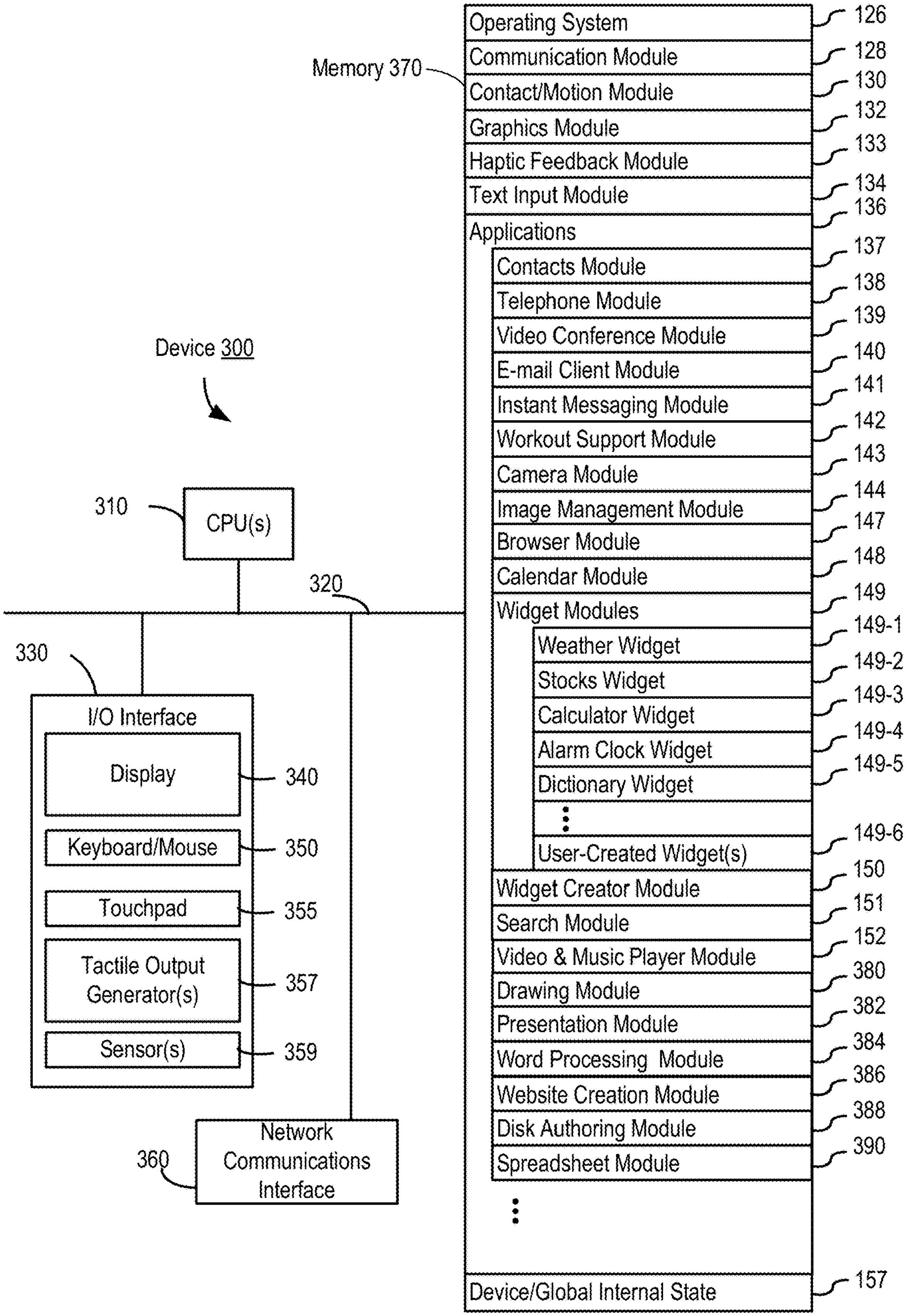
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
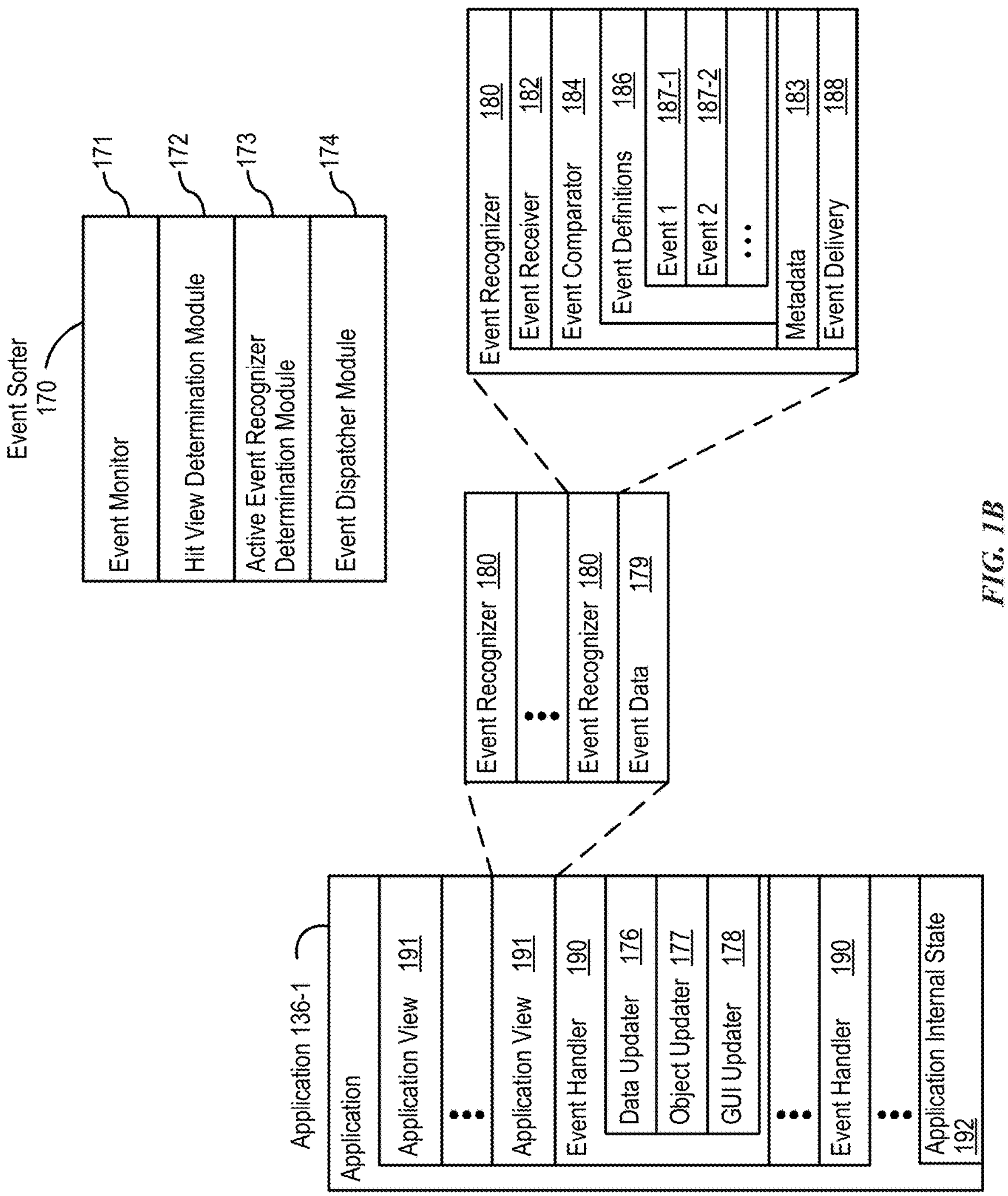
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
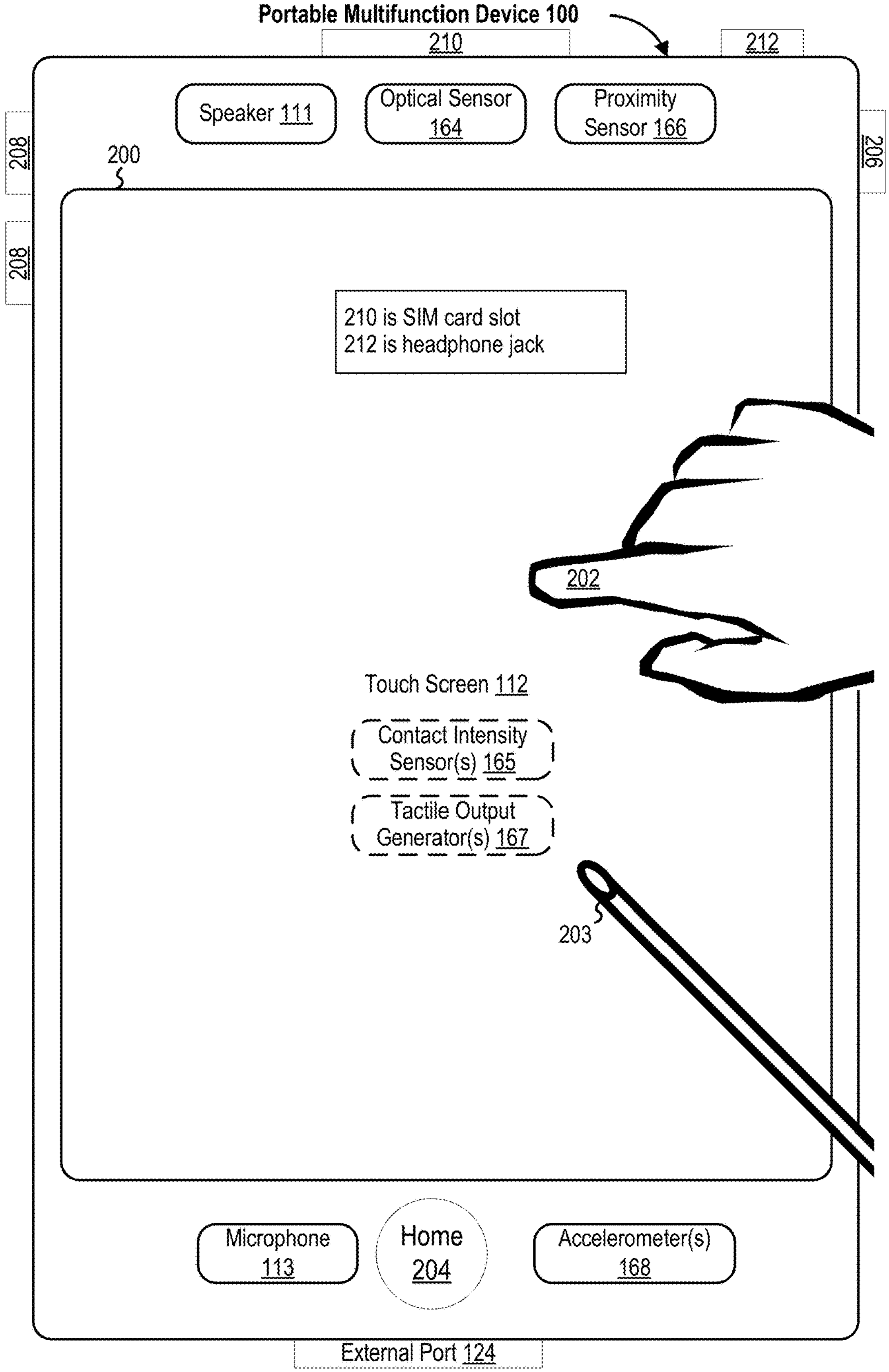
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
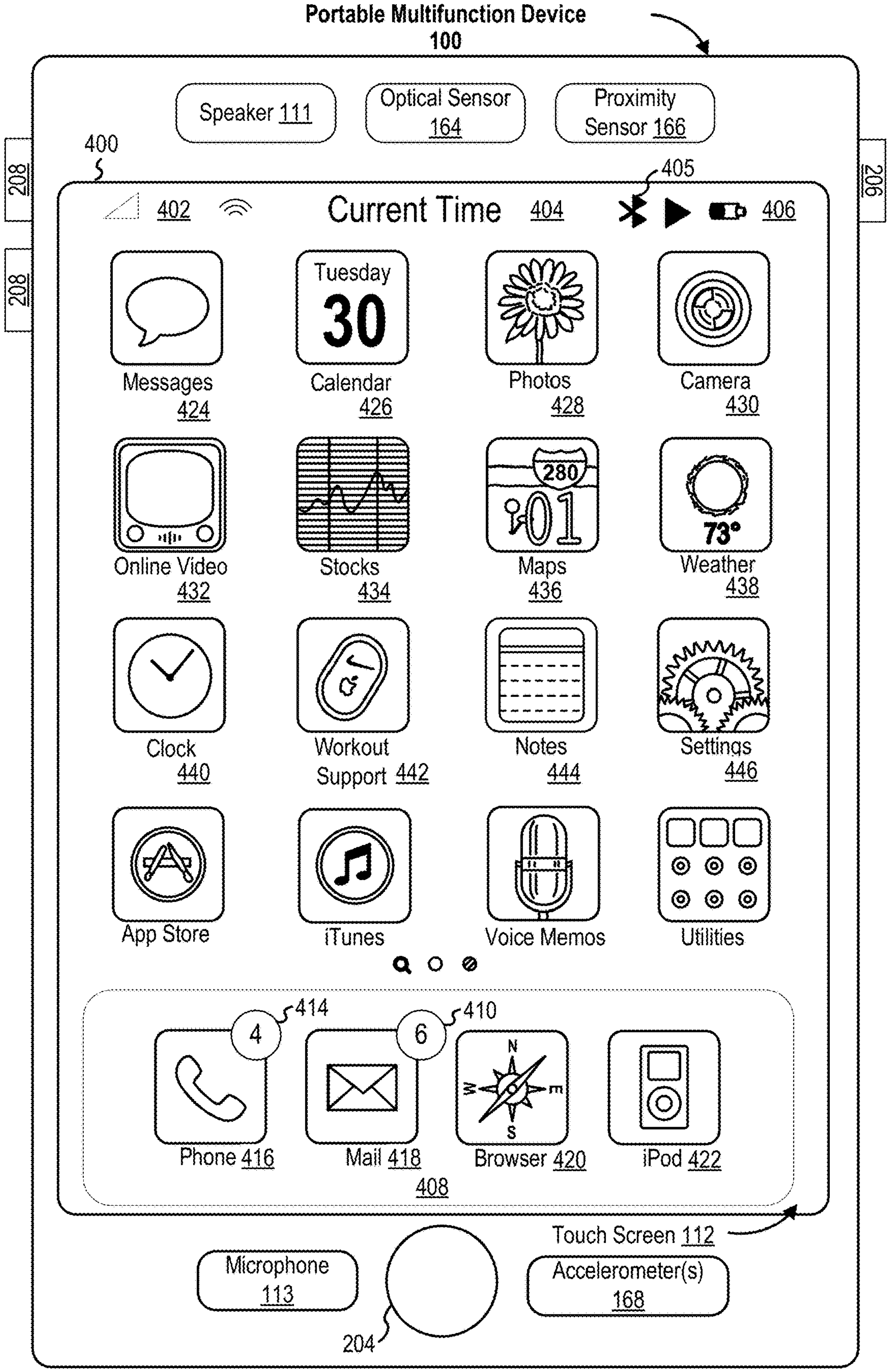
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
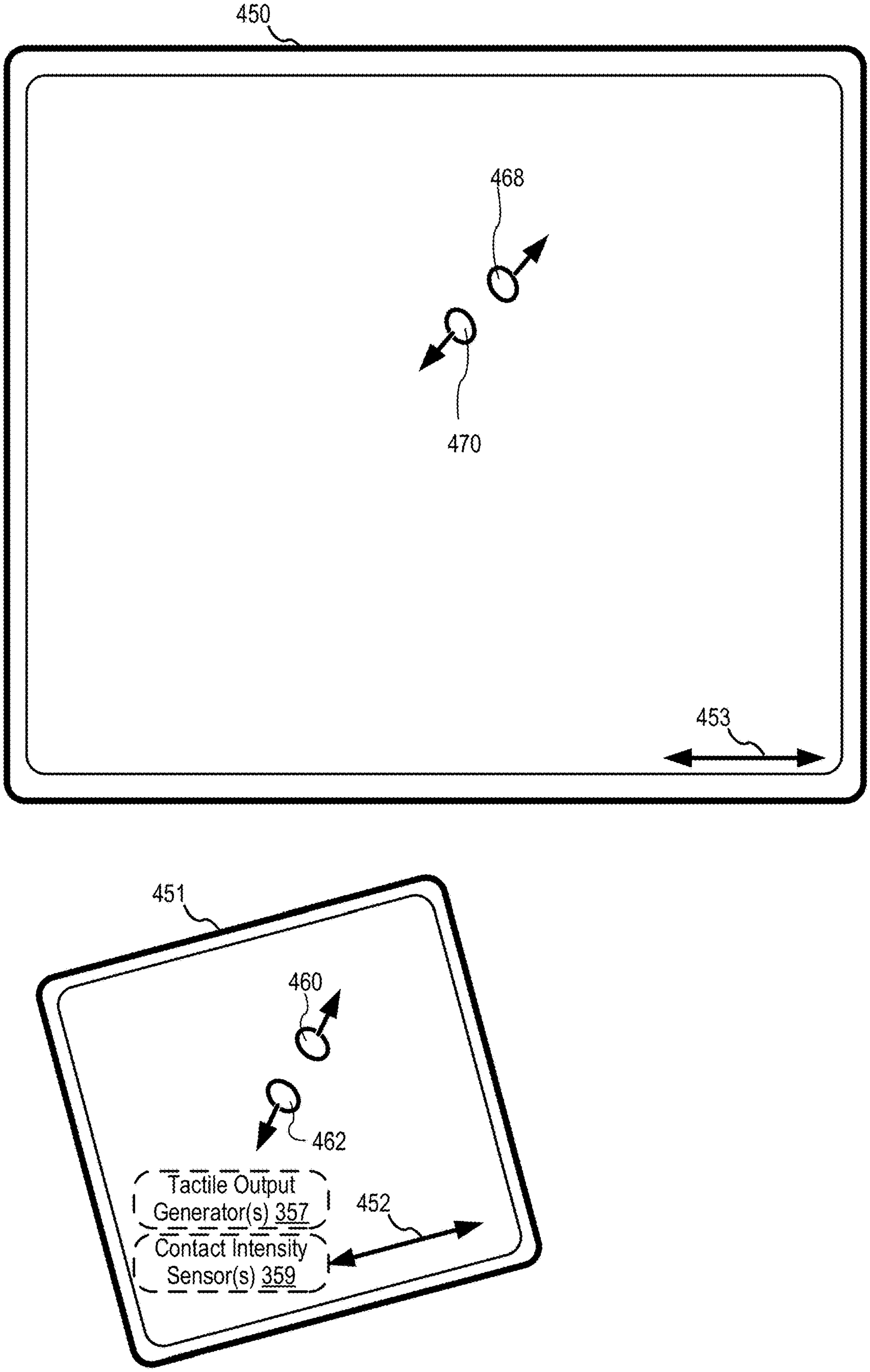
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
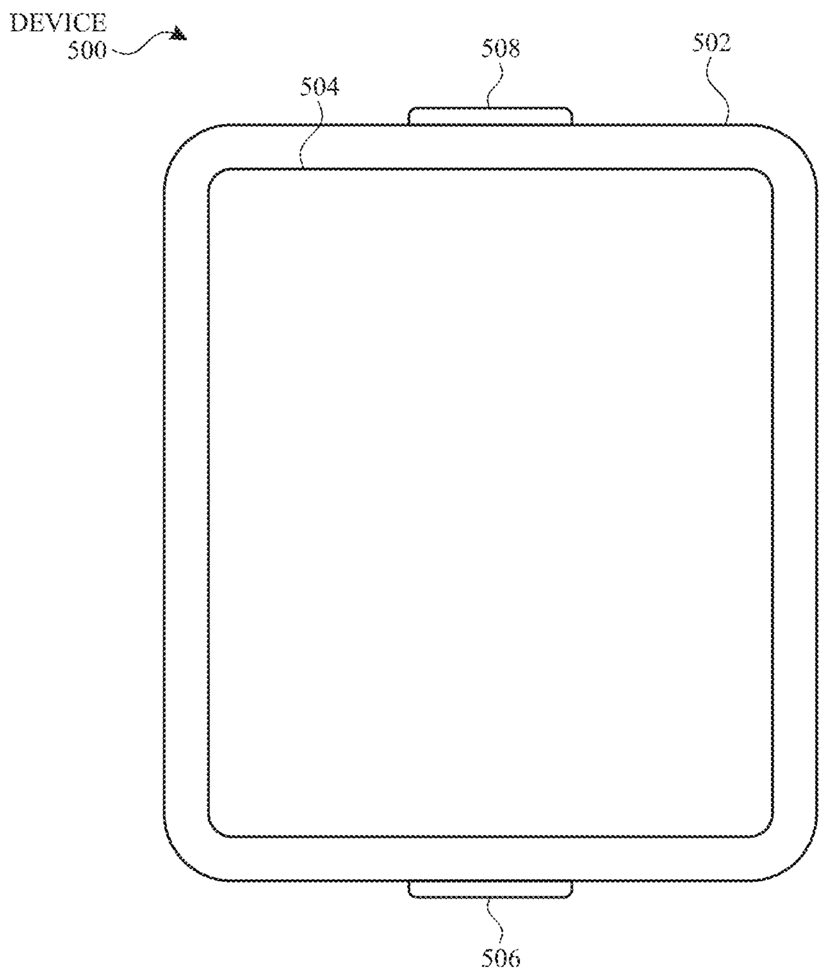
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
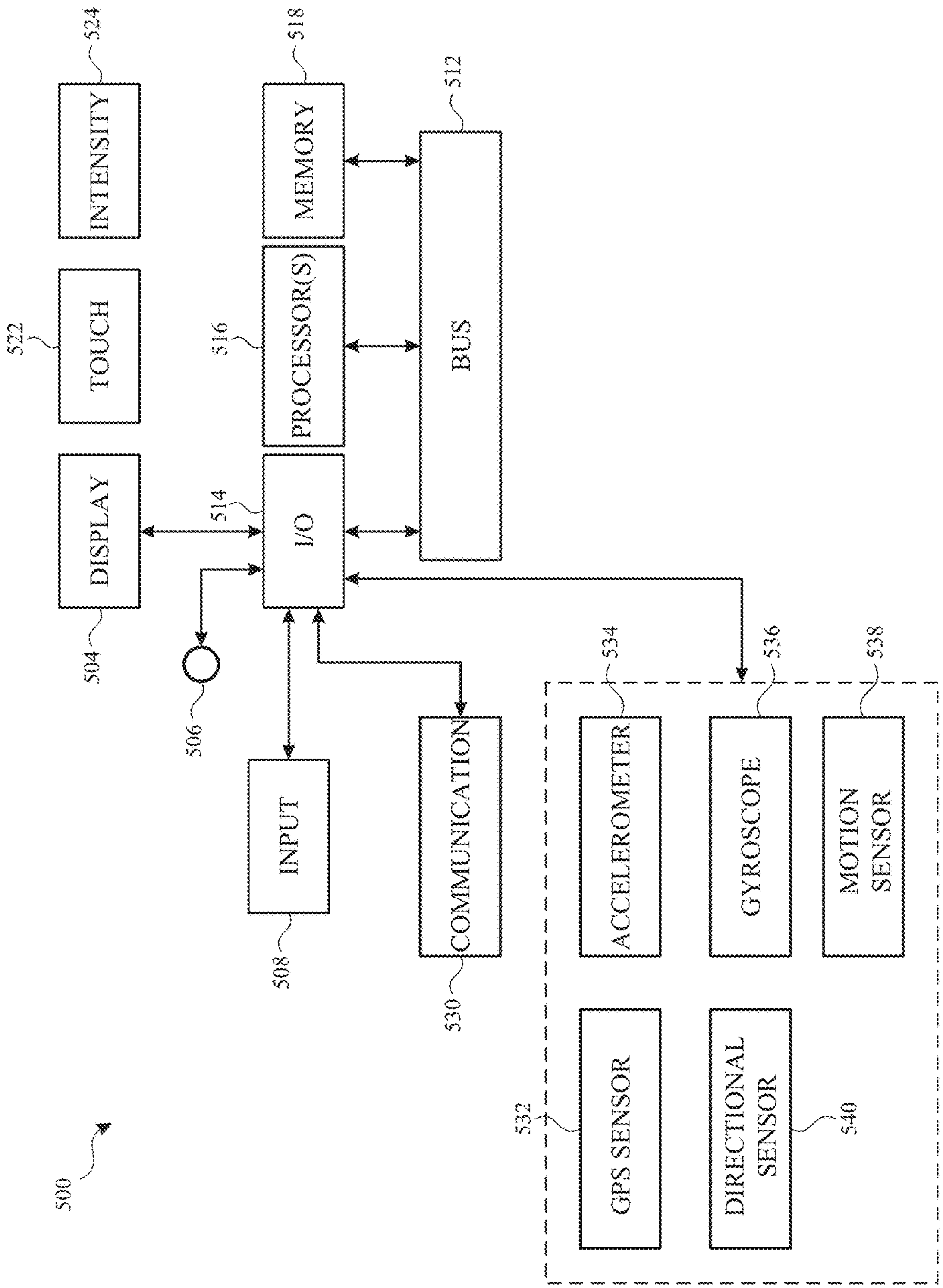
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1300, 1500, 1700, 1900, 2000, 2100, 2300, 2500, 2700, 2800, 3000, 3200, 3400, 3600, and 3800. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
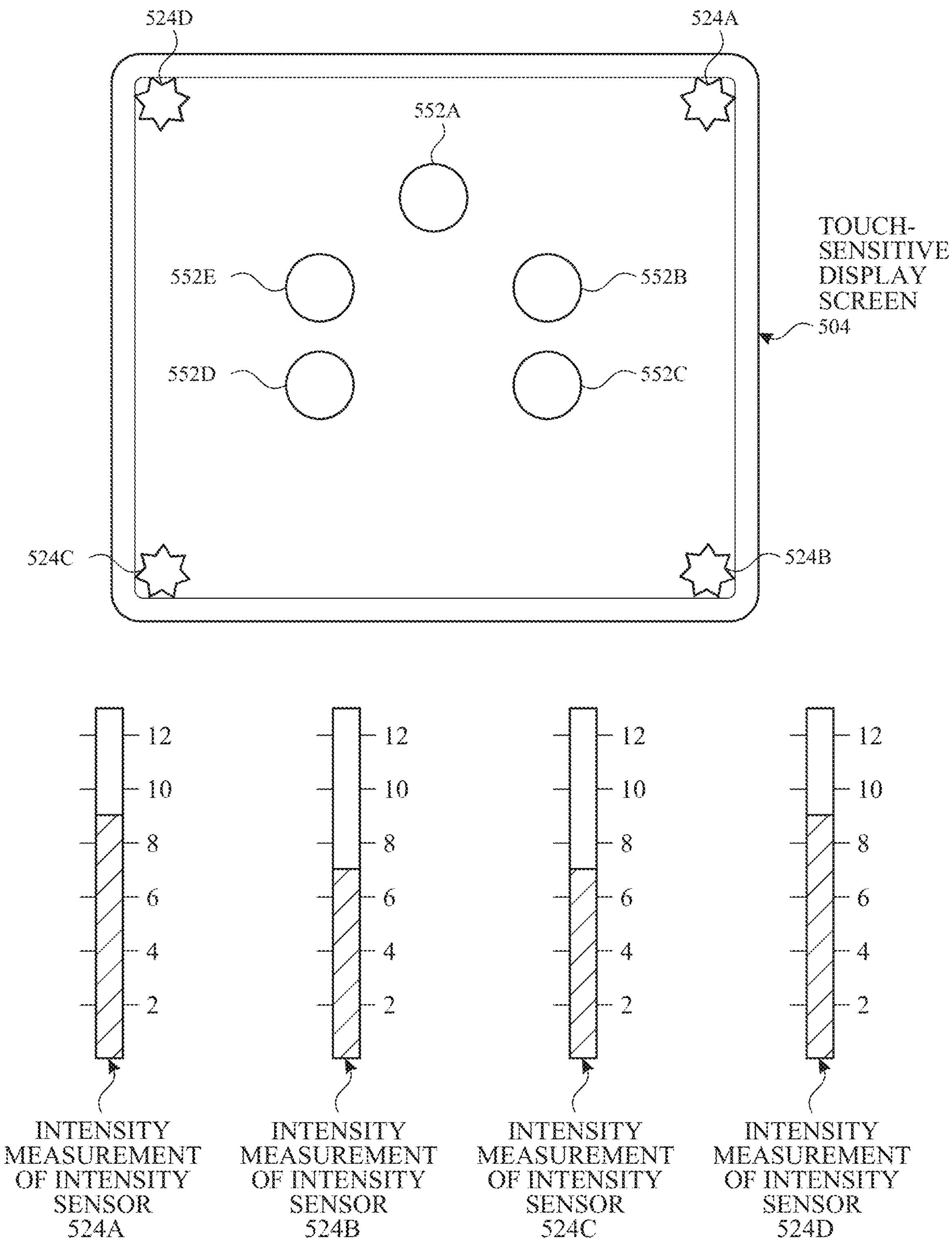
FIGS. 5C-5D illustrate exemplary components of a personal electronic device having a touch-sensitive display and intensity sensors in accordance with some embodiments.
Figure 5D:
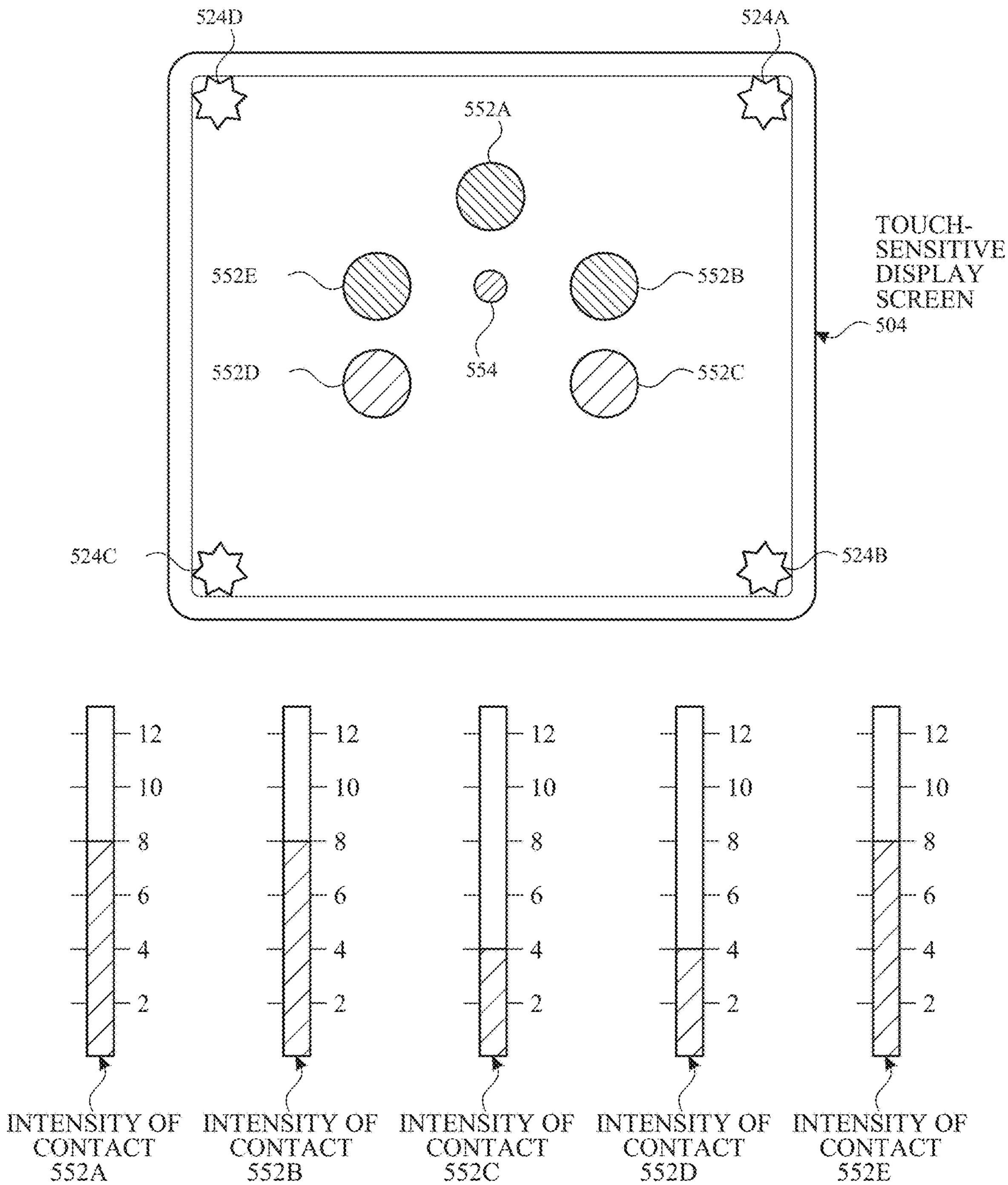

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A\cdot(Dj/\Sigma Di)$, where Dj is the distance of the respective contact j to the center of force, and/Di is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
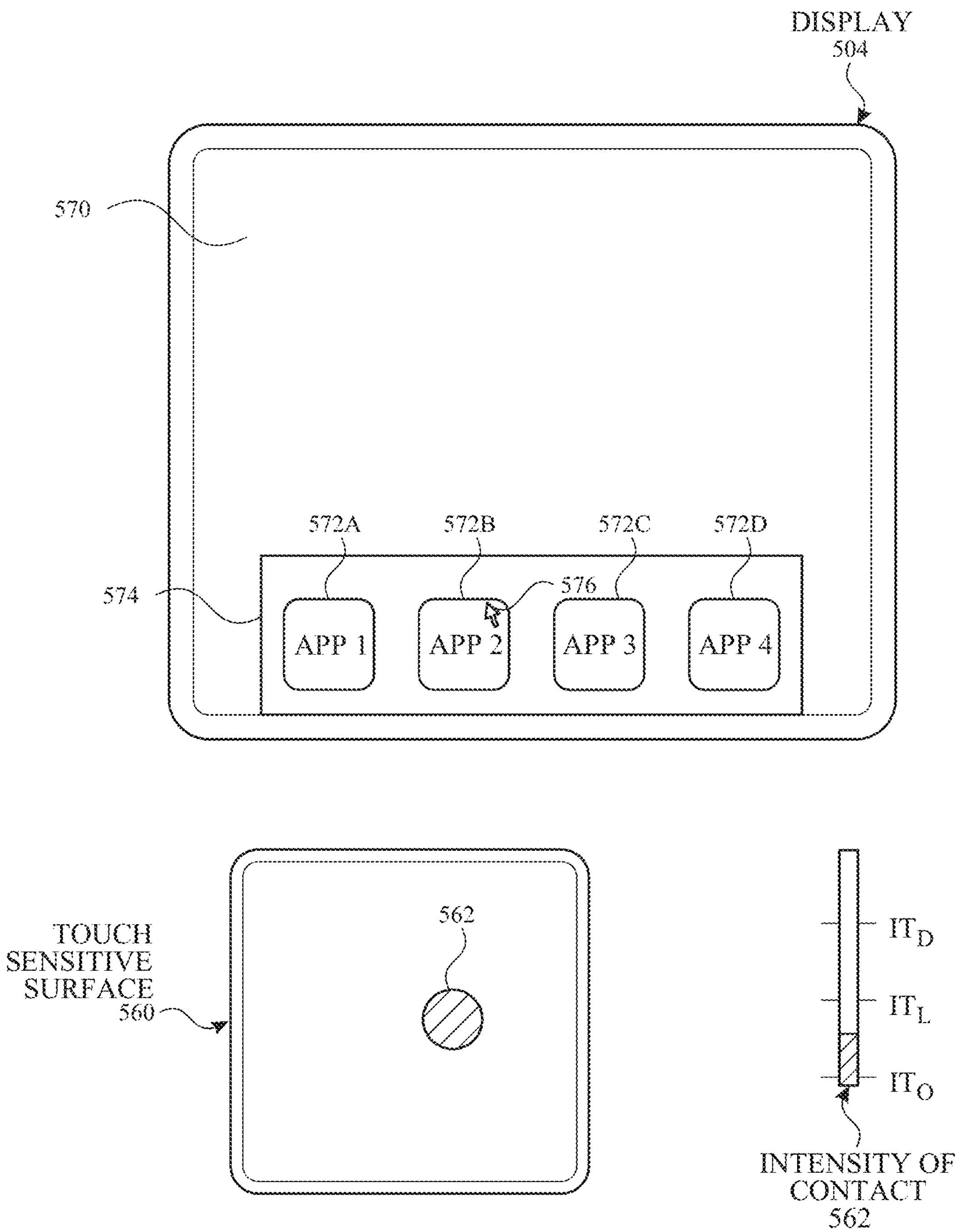
FIGS. 5E-5H illustrate exemplary components and user interfaces of a personal electronic device in accordance with some embodiments.
Figure 5F:
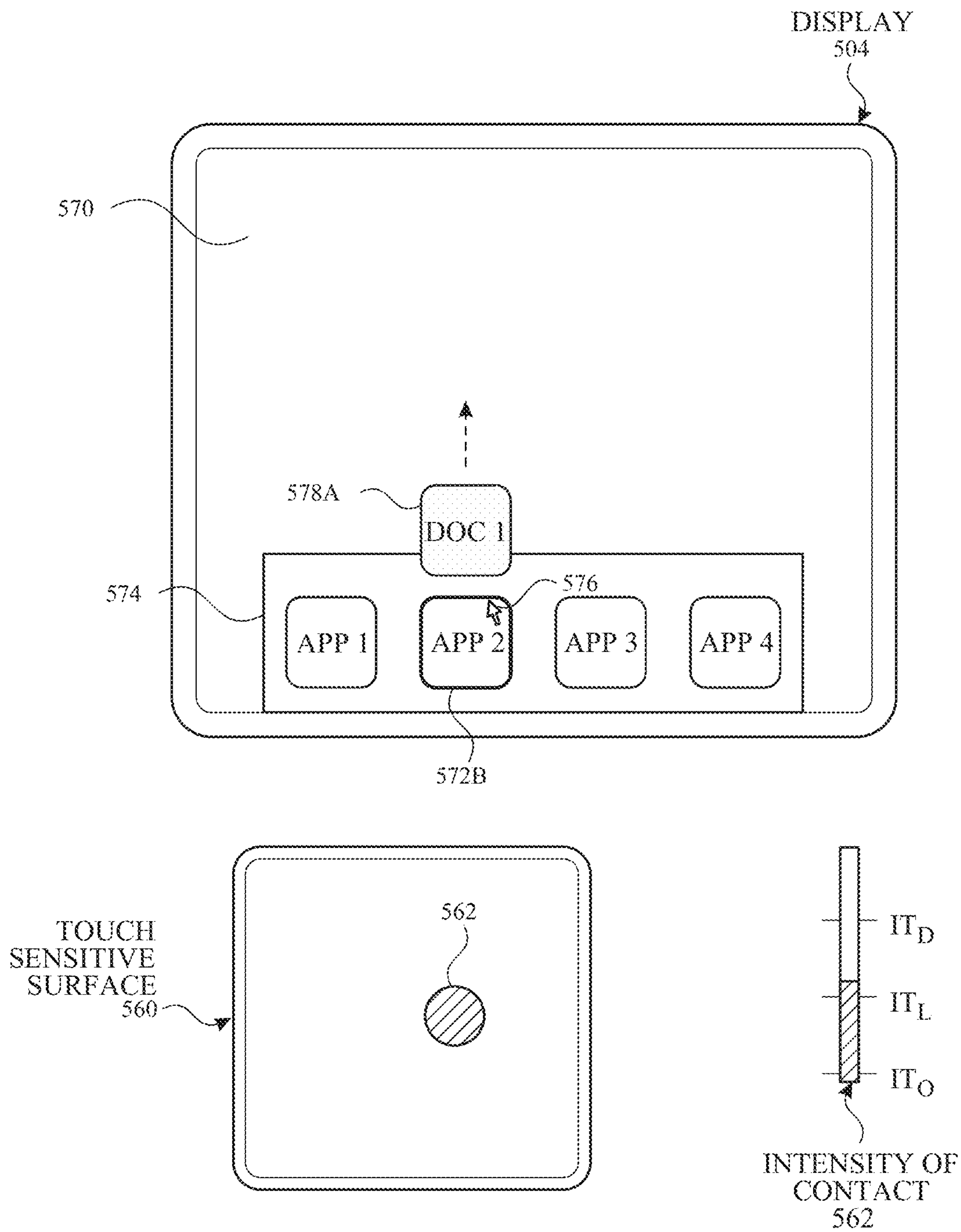
Figure 5G:
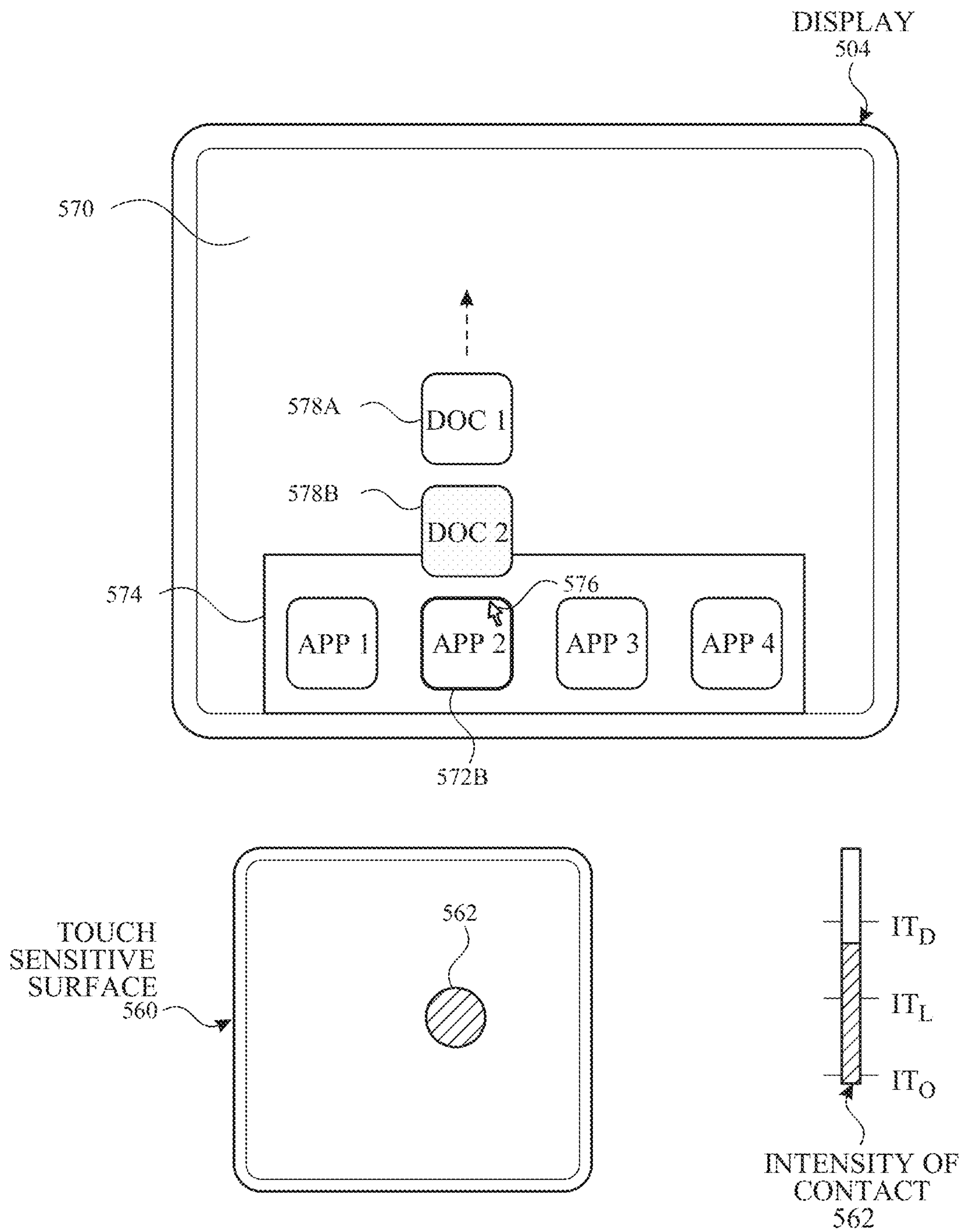
Figure 5H:
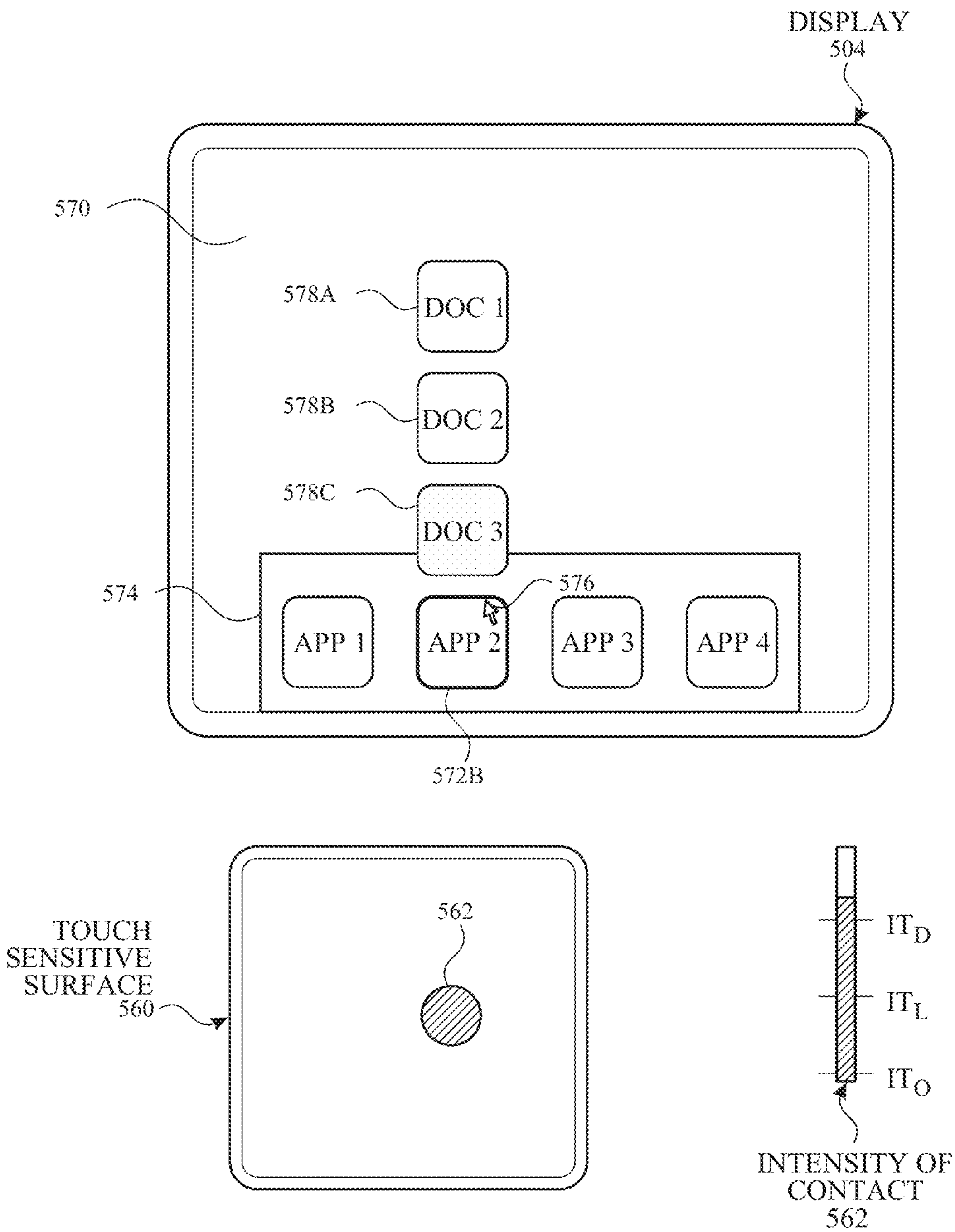

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6V illustrate exemplary user interfaces for accessing media controls using an electronic device in accordance with some embodiments. The user interfaces in these figures are used to illustrate the processes described below, including the processes in FIGS. 7A-7C.

FIG. 6A illustrates electronic device 600 displaying a live preview 630 that optionally extends from the top of the display to the bottom of the display. Live preview 630 is based on images detected by one or more camera sensors. In some embodiments, device 600 captures images using a plurality of camera sensors and combines them to display live preview 630. In some embodiments, device 600 captures images using a single camera sensor to display live preview 630. The camera user interface of FIG. 6A includes indicator region 602 and control region 606, which are overlaid on live preview 630 such that indicators and controls can be displayed concurrently with the live preview. Camera display region 604 is substantially not overlaid with indicators or controls. In this example, the live preview includes subject 640 and a surrounding environment. The camera user interface of FIG. 6A includes visual boundary 608 that indicates the boundary between indicator region 602 and camera display region 604 and the boundary between camera display region 604 and control region 606. Live preview 630 is representation of a (e.g., partial) field-of-view of the one or more cameras of device 600.

As illustrated in FIG. 6A, indicator region 602 is overlaid onto live preview 630 and optionally includes a colored (e.g., gray; translucent) overlay. Indicator region 602 includes flash indicator 602*a*. Generally, flash indicator 602*a* indicates whether the flash is on, off, or in another mode (e.g., automatic mode). In FIG. 6A, flash indicator 602*a* indicates to the user that the flash is off.

As illustrated in FIG. 6A, camera display region 604 includes live preview 630 and zoom affordance 622. As illustrated in FIG. 6A, control region 606 is overlaid onto live preview 630 and optionally includes a colored (e.g., gray; translucent) overlay.

As illustrated in FIG. 6A, control region 606 includes camera mode affordances 620, additional control affordance 614, shutter affordance 610, and camera switcher affordance 612. Camera mode affordances 620 indicates which camera mode is currently selected and enables the user to change the camera mode. In FIG. 6A, camera modes affordances 620*a*-620*e* are displayed, and 'Photo' camera mode 620*c* is indicated as being the current mode in which the camera is operating by the bolding of the text. Additional control affordance 614 enables the user to access additional camera controls. Shutter affordance 610, when activated, causes device 600 to capture media (e.g., a photo), using the one or more camera sensors, based on the current state of live preview 630 and the current state of the camera application. The captured media is stored locally at electronic device 600 and/or transmitted to a remote server for storage. Camera switcher affordance 612, when activated, causes device 600 to switch to showing the field-of-view of a different camera in live preview 630, such as by switching between a rear-facing camera sensor and a front-facing camera sensor.

At FIG. 6B, a user has attached a tripod accessory 601 to device 600. As a result, device 600 determines that a tripod-connected condition is met. The tripod-connected condition is a condition that is met when the device detects a connected tripod and is not met when the device does not detect a connected tripod. Based on the tripod-connected condition being met, device 600 updates control region to expand additional control affordance 614 and display timer control affordance 614*a*. In some embodiments, device 600 ceases to display timer control affordance 614*a* after a predetermined period of time elapses when no input directed to timer control affordance 614*a* is received.

Returning to FIG. 6A, device 600 does not have a tripod accessory 601 attached. As a result, device 600 determines that the tripod-connected condition is not met. At FIG. 6A, based on the tripod-connected condition being met, device 600 does not display timer control affordance 614*a*.

At FIG. 6B, device 600 detects, using a touch-sensitive surface, tap gesture 650*a* at a location that corresponds to display timer control affordance 614*a*. As illustrated in FIG. 6C, in response to detecting tap gesture 650*a*, device 600 shifts up a border of camera display region 604 (while maintaining the same size and aspect ratio) and visual boundary 608, thereby reducing the height of indicator region 602 and increasing the height of control region 606. In addition to reducing the height of indicator region 602, device 600 ceases to display flash indicator 602*a*. In some embodiments, device 600 ceases to display any indicators in indicator region 602 while indicator region 602 is in the reduced height mode. In addition to increasing the height of control region 606, device 600 replaces display of camera mode affordances 620 with adjustable timer control 634, including adjustable timer control affordances 634*a*-634*d*. Adjustable timer control affordances 634*a*-634*d*, when activated, change (or initiated processes for changing) a delay for capturing media when shutter affordance 610 is activated. For example, adjustable timer control affordance 634*a*, when activated, sets the delay to 0 seconds and adjustable timer control affordance 634*b*, when activated, sets the delay to 3 seconds. At FIG. 6C, device 600 is also no longer displaying zoom affordance 622.

At FIG. 6C, device 600 detects, using the touch-sensitive surface, tap gesture 650*b* at a location that corresponds to adjustable timer control affordance 634*d*. As illustrated in FIG. 6D, in response to detecting tap gesture 650*b*, device 600 updates adjustable timer control 634 to indicate that 'OFF' is no longer selected and that '10S' is now selected (e.g., via bolding, highlighting). Additionally, device 600 sets a self-timer delay of 10 seconds for capturing media when shutter affordance 610 is activated. In some embodiments, further in response to detecting tap gesture 650*b*, and without receiving additional user input, device 600 ceases to display adjustable timer control 634 after a predetermined period of time after detecting tap gesture 650*b*.

At FIG. 6D, while adjustable timer control 634 is displayed and indicator region 602 is in the reduced height mode, device 600 detects, using the touch-sensitive surface, tap gesture 650*c* at a location that corresponds to additional control affordance 614. As illustrated in FIG. 6E, in response to detecting tap gesture 650*c*, device 600 shifts down a border of camera display region 604 (while maintaining the same size and aspect ratio) and visual boundary 608, thereby increasing the height of indicator region 602 and reducing the height of control region 606. In addition to increasing the height of indicator region 602, device 600 re-displays flash indicator 602*a* in control region 606. In some embodiments, device 600 displays flash indicator 602*a* (regardless of the state (on, off, automatic)) in the indicator region 602 when indicator region 602 is not in the reduced-height mode (e.g., when indicators are being displayed in indicator region 602). In addition to decreasing the height of control region 606, device 600 replaces display of adjustable timer control 634 with camera mode affordances 620. Further, device 600 re-displays zoom affordance 610 in camera display region 604. As a result of the self-timer feature being activated (e.g., being set to a delay that is greater than 0 seconds), device 600 displays timer status indicator 602*b* in indicator region 602. Similar to flash indicator 602*a*, timer status indicator 602*b* provides an indication of the state of the self-timer. In the example of FIG. 6E, timer status indicator 602*b* indicates that the self-timer delay is set to 10 seconds. In some embodiments, timer status indicator 602*b* is not displayed when the self-timer delay is disabled (or set to 0 seconds). In some embodiments, activation of (e.g., tap gesture on) timer status indicator 602*b* causes device 600 to display various options for changing the self-timer delay, such as in adjustable timer control 634.

At FIG. 6E, activation of (e.g., tap gesture on) shutter affordance 610 causes device 600 to initiate capture of media (e.g., an image, a series of images) based on the current state of the device, including without flash (as indicated by flash indicator 602*a*) and with a 10 second self-timer delay (as indicated by timer status indicator 602*b*). In some embodiments, device 600 includes the visual content corresponding to live preview 630 as shown in indictor region 602 and control region 606 (and, optionally, additional visual content), as described in further detail with respect to FIGS. 8A-8V.

At FIG. 6F, the camera feature of device 600 is in use in a low-light environment, as illustrated in live preview 630. While in the low-light environment, device 600 determines, using the one or more camera sensors, ambient light sensors, and/or additional sensors that detect environmental lighting conditions, that a low-light condition is met (e.g., a condition that is met when device 600 detects that environmental lighting conditions are below a threshold (e.g., 10 lux) and that flash is not enabled, and that is not met when the device detects that environmental lighting conditions are not below the threshold or that flash is enabled (on or automatic)). In FIG. 6F, in accordance with determining that the low-light condition is met, device 600 displays (e.g., without requiring additional user input) low-light mode status indicator 602*c* in indicator region 602. Additionally, as illustrated in FIGS. 6F-6G, in accordance with determining that the low-light condition is met, device 600 displays (e.g., without requiring additional user input) low-light mode control affordance 614*b* and flash control affordance 614*c* in indicator region 606. In some embodiments, device 600 cycles (e.g., a predetermined number of times) between displays of low-light mode control affordance 614*b* and flash control affordance 614*c* in indicator region 606, by replacing one affordance with the other. In some embodiments, low-light mode control affordance 614*b* and flash control affordance 614*c* are displayed concurrently in indicator region 606. In some embodiments, each of low-light mode control affordance 614*b* and flash control affordance 614*c* correspond to a different lighting condition (e.g., different ambient light levels) and the affordances are displayed in control region 606 when their corresponding lighting condition is met (and are not displayed when their corresponding lighting condition is met). In some examples, a first lighting condition is met when device 600 detects that environmental lighting conditions are below a first threshold (e.g., 20 lux) and a second lighting condition is met when device 600 detects that environmental lighting conditions are below a second threshold (e.g., 10 lux). In some embodiments, the lighting conditions are based on an amount of environmental light detected by device 600 and, optionally, whether flash is enabled. Device 600 optionally displays low-light mode status indicator 602*c* when a feature (e.g., lighting enhancement feature) corresponding to the indicator is available for use (regardless of whether the corresponding feature is enabled or disabled).

In contrast, in FIGS. 6A-6E, in accordance with device 600 determining that the low-light condition is not met, device 600 forgoes displaying low-light mode control affordance 614*b*, low-light mode status indicator 602*c*, and low-light mode status indicator 602*c* in those corresponding camera user interfaces. In some embodiments, device 600 does not displays low-light mode status indicator 602*c* in indicator region 602 when the feature (e.g., lighting enhancement feature) corresponding to the indicator is not available for use.

Returning to FIG. 6G, device 600 detects, using the touch-sensitive surface, tap gesture 650*d* at a location that corresponds to flash control affordance 614*c*. As illustrated in FIG. 6H, in response to detecting tap gesture 650*d*, device 600 shifts up a border of camera display region 604 (while maintaining the same size and aspect ratio) and visual boundary 608, thereby decreasing the height of indicator region 602 and increasing the height of control region 606. In addition to decreasing the height of indicator region 602, device 600 ceases to display flash indicator 602*a* in control region 606. In some embodiments, device 600 continues to display flash indicator 602*a* (regardless of the state (on, off, automatic)) in the indicator region 602 even when indicator region 602 is in the reduced-height mode. In addition to increasing the height of control region 606, device 600 replaces display of camera mode affordances 620 with adjustable flash control 662. Adjustable flash control 662 includes flash-on control 662*a* and flash-off control 662*b*. Device 600 indicates that the flash is in the off state by, for example, emphasizing (e.g., bolding, highlighting) 'OFF' in flash-off control 662*b*. In some embodiments, device 600 also ceases to display zoom affordance 610 in camera display region 604. In some embodiments, device 600 maintains display of zoom affordance 610 in camera display region 604.

At FIG. 6H, device 600 detects, using the touch-sensitive surface, tap gesture 650*e* at a location that corresponds to flash-on control 662*a*. As illustrated in FIG. 6I, in response to detecting tap gesture 650*b*, device 600 updates adjustable flash control 662 to indicate that 'OFF' (corresponding to flash-off control 662*b*) is no longer selected and that 'ON' (corresponding to flash-on control 662*a*) is now selected (e.g., via bolding, highlighting).

In some embodiments, further in response to detecting tap gesture 650*e*, and without receiving additional user input, device 600 ceases to display updated adjustable flash control 662 after a predetermined period of time after detecting tap gesture 650*e* and transitions to the user interface illustrated in FIG. 6I. In particular, device 600 shifts down a border of camera display region 604 (while maintaining the same size and aspect ratio) and visual boundary 608, thereby increasing the height of indicator region 602 and reducing the height of control region 606 (as compared to the user interface of FIG. 6H). In addition to increasing the height of indicator region 602, device 600 re-displays flash indicator 602*a*, which now indicates that the flash is enabled, in control region 606. In addition to decreasing the height of control region 606, device 600 replaces display of adjustable flash control 662 with camera mode affordances 620. Further, device 600 re-displays zoom affordance 610 in camera display region 604. At FIG. 6J, in accordance with determining that the low-light condition continues to be met, device 600 displays (e.g., without requiring additional user input) flash control affordance 614*c* in control region 606. At FIG. 6J, the low-light condition is no longer met (e.g., because flash is on) and, as a result, low-light mode status indicator 602*c* is no longer displayed in indicator region 602, as described in more detail with respect to FIGS. 18A-18X.

At FIG. 6J, device 600 detects, using the touch-sensitive surface, tap gesture 650*f* at a location that corresponds to additional control affordance 614. As illustrated in FIG. 6K, in response to detecting tap gesture 650*f*, device 600 shifts up a border of camera display region 604 (while maintaining the same size and aspect ratio) and visual boundary 608, thereby decreasing the height of indicator region 602 and increasing the height of control region 606. In addition to decreasing the height of indicator region 602, device 600 ceases to display flash indicator 602*a* in control region 606. In addition to reducing the height of indicator region 602, device 600 ceases to display flash indicator 602*a*. In addition to increasing the height of control region 606, device 600 replaces display of camera mode affordances 620 with camera setting affordances 626, including a first set of camera setting affordances 626*a*-626*e*. Camera setting affordances 626*a*-626*e*, when activated, change (or initiate processes for changing) camera settings. For example, affordance 626*a*, when activated, turns on/off the flash and affordance 626*d*, when activated, initiates a process for setting a self-delay timer (also known as a shutter time).

At FIG. 6K, device 600 detects, using the touch-sensitive surface, tap gesture 650*g* at a location that corresponds to animated image control affordance 626*b* (in control region 606). At FIG. 6L, in response to detecting tap gesture 650*g*, device 600 expands display of animated image control affordance 626*b* to display adjustable animated image control 664, which includes a plurality of affordances 664*a*-664*b* which, when activated (e.g., via a tap), configure whether the device captures single images or a predefined number of images. At FIG. 6L, animated image control off option 664*b* is emphasized (e.g., bolded) to indicate that activation of shutter affordance 610 will capture a single image, rather than a predefined number of images.

At FIG. 6L, device 600 detects, using the touch-sensitive surface, tap gesture 650*h* at a location that corresponds to animated image control affordance 626*b* (in control region 606). At FIG. 6M, in response to detecting tap gesture 650*g*, device 600 updates adjustable animated image control 664 to cease to emphasize animated image control off option 664*b* and, instead, to emphasize animated image control on option 664*a* (e.g., by bolding "ON"). Further, in response to detecting tap gesture 650*h*, device 600 configures the camera to capture a predefined number of images when activation (e.g., tap on) of shutter affordance 610 is detected.

In some embodiments, further in response to detecting tap gesture 650*h*, and without receiving additional user input, device 600 ceases to display updated adjustable animated image control 664 after a predetermined period of time after detecting tap gesture 650*h* and transitions to the user interface illustrated in FIG. 6N. In some embodiments, in response to detecting, using the touch-sensitive surface, swipe down gesture 650*i* at a location that corresponds to live preview 630 in camera display region 606, device 600 transitions to display the user interface illustrated in FIG. 6N.

In transitioning from user interfaces of FIG. 6M to 6N, device 600 shifts down a border of camera display region 604 (while maintaining the same size and aspect ratio) and visual boundary 608, thereby increasing the height of indicator region 602 and reducing the height of control region 606 (as compared to the user interface of FIG. 6M). In addition to increasing the height of indicator region 602, device 600 re-displays flash indicator 602*a*, which indicates that the flash is enabled, and further displays animated image status indicator 602*d*, which indicates that the camera to capture a predefined number of images (as described above) in control region 606. In addition to decreasing the height of control region 606, device 600 replaces display of adjustable animated image control 664 with camera mode affordances 620. Further, device 600 re-displays zoom affordance 610 in camera display region 604. At FIG. 6N, in accordance with determining that the low-light condition continues to be met, device 600 displays (e.g., without requiring additional user input) flash control affordance 614*c* in control region 606.

At FIG. 6N, while camera flash is enabled and animated image control is enabled, device 600 detects, using the touch-sensitive surface, tap gesture 650*j* at a location that corresponds to shutter affordance 610. In response to detecting tap gesture 650*j*, device 600 captures media (e.g., a predefined number of images) based on the current state of live preview 630 and the camera settings. The captured media is stored locally at device 600 and/or transmitted to a remote server for storage. Further, in response to detecting tap gesture 650*j*, as shown in FIG. 6O, device 600 displays (e.g., by partially or fully replacing display of additional control affordance 614) media collection 624, which includes a representation of the newly captured media on top of the collection. In the example of FIG. 6O, media collection 624 includes only the representation of the newly captured media, and does not include representations of other media. Because camera flash was enabled when shutter affordance 610 was activated, the newly captured media was captured with flash. Because animated image control was enabled when shutter affordance 610 was activated, the newly captured media includes a predefined number of images (e.g., a still image and a video).

At FIG. 6O, device 600 detects, using the touch-sensitive surface, tap gesture 650*k* at a location that corresponds to media collection 624. In response to detecting tap gesture 650*k*, as shown in FIG. 6P, device 600 ceases to display live preview 630 and, instead, displays a photo viewer user interface that includes a representation 642 of the newly captured media. Because the captured media was captured with flash enabled, representation 642 of the newly captured media is brighter than the view of live preview 630 displayed when shutter affordance 610 was activated (because the flash was activated). The displayed representation 642 of the captured media includes the visual content of live preview 630 that was displayed in the camera display region 604 when the image was taken, but does not include visual content of live preview 630 that was displayed in indicator region 602 and control region 606. When device 600 plays back the captured media, playback includes visual playback of the visual content of live preview 630 that was displayed in the camera display region 604 when the series of images was captured, but does not include visual content of live preview 630 that was displayed in indicator region 602 and control region 606 (and also does not include recorded visual content that was not displayed in live preview 630 during the recording but that was optionally saved as part of storing the captured media). In some embodiments, visual content of live preview 630 that was displayed in indicator region 602 and control region 606 during recording of the captured media are stored in the saved media, as further described with respect to FIGS. 10A-10K.

At FIG. 6P, device 600 concurrently displays, with representation 642 of the newly captured media, an edit affordance 644*a* for editing the newly captured media, send affordance 644*b* for transmitting the newly captured media, favorite affordance 644*c* for marking the newly captured media as a favorite media, trash affordance 644*d* for deleting the newly captured media, and back affordance 644*e* for returning to display of live preview 630. Device 600 determines that the displayed media was captured while animated image control was enabled, and, in response, displays animated image status indicator 644*f*.

At FIG. 6P, device 600 detects, using the touch-sensitive surface, tap gesture 650*l* at a location that corresponds to back affordance 644*e*. In response to detecting tap gesture 650*l*, as shown in FIG. 6Q, device 600 replaces display the photo viewer user interface that includes the representation 642 of the newly captured media with display of camera user interface that includes live preview 630.

At FIG. 6Q, device 600 detects, using the touch-sensitive surface, tap gesture 650*m* at a location that corresponds to camera portrait mode affordance 620*d*. At FIG. 6R, in response to detecting tap gesture 650*m*, device 600 displays a revised set of indicators in indicator region 602, an updated live preview 630, and updated control region 606. The revised set of indicators includes previously displayed flash indicator 602*a* and newly displayed f-stop indicator 602*e* (e.g., because the newly selected mode is compatible with the features corresponding to flash indicator 602*a* and f-stop indicator 602*e*), without displaying previously displayed animated image status indicator 602*d* (e.g., because the newly selected mode is incompatible with the feature corresponding to animated image status indicator 602*d*). In some embodiments, f-stop indicator 602*e* provides an indication of an f-stop value (e.g., a numerical value). In FIG. 6T, zoom affordance 622 has shifted to the left and lighting effect control 628 (which, when activated enables changing lighting effects) is displayed in the camera display region 604. In some embodiment, the size, aspect ratio, and location of camera display region 604 is the same in FIG. 6R as in FIG. 6Q. Updated live preview 630 in FIG. 6R provides different visual effects as compared to live preview 630 in FIG. 6Q. For example, updated live preview 630 provides a bokeh effect and/or lighting effects whereas live preview 630 in FIG. 6Q does not provide the bokeh effect and/or lighting effects. In some embodiments, the zoom of objects in live preview 630 change because of the change in camera mode (photo vs. portrait mode). In some embodiments, the zoom of objects in live preview 630 does not change despite the change in camera mode (photo vs. portrait mode). As indicated by the natural light selection of lighting effect control 628, live preview is displaying subject 640 using the natural light in the subject's environment and is not applying a lighting effect. Lighting effect control 628 can be used to adjust the level (and type) of lighting effect that is used/applied when capturing media. In some embodiments, adjustments to the lighting effect are also reflected in live preview 630.

At FIG. 6R, device 600 detects, using the touch-sensitive surface, swipe left gesture 650*n* at a location that corresponds to lighting effect control 628 to select a studio lighting effect. At FIG. 6S, in response to detecting swipe left gesture 650*n*, device 600 updates lighting effect control 628 to indicate that the studio lighting effect is selected and updates display of live preview 630 to include the studio lighting effect, thereby providing the user with a representation of how media captured using the studio lighting effect will appear. Device 600 also displays lighting status indicator 602*f* in indicator region 602. Lighting status indicator 602*f* includes an indication of the current value of lighting effect that is used/applied when capturing media. At FIG. 6S, in accordance with determining that a light-adjustment condition is met (e.g., a condition that is met when the camera is in portrait mode or is otherwise able to vary lighting effects), device 600 displays (e.g., by expanding additional control affordance 614, without requiring additional user input) lighting control affordance 614*d* in control region 606.

At FIG. 6S, device 600 detects, using the touch-sensitive surface, tap gesture 650*o* at a location that corresponds to lighting control affordance 614*d*. At FIG. 6T, in response to detecting tap gesture 650*o*, device 600 replaces display of camera mode affordances 620 with adjustable lighting effect control 666 and provides an indication (e.g., in camera display region 604) of the current lighting effect value (e.g., 800 lux). In some embodiments, display of indicators in indicator region 602 are maintained. In some embodiments, tap gesture 650*o* results in ceasing to display indicators in indictor region 602 (such as by shifting a border of camera display region 606 and resizing indictor region 602 and control region 606, as described above).

At FIG. 6T, while displaying adjustable lighting effect control 666, device 600 detects, using the touch-sensitive surface, swipe gesture 650*p* at a location that corresponds to adjustable lighting effect control 666 to lower the lighting effect value. At FIG. 6U, in response to detecting swipe gesture 650*o*, device 600 lowers the lighting effect value, which is reflected in live preview 630 become darker, updates the indication (e.g., in camera display region 604) to the updated lighting effect value (e.g., 600 lux), and updates lighting status indicator 602*f* in indicator region 602 to reflect the updated lighting effect value.

At FIG. 6U, while adjustable lighting effect control 666 is displayed (and, optionally, indicator region 602 is in the reduced height mode), device 600 detects, using the touch-sensitive surface, tap gesture 650*q* at a location that corresponds to additional control affordance 614. As illustrated in FIG. 6V, in response to detecting tap gesture 650*q*, device 600 replaces display of adjustable lighting effect control 666 with display of camera mode affordances 620. In some embodiments, where the border of camera display region 606 had shifted up and indictor region 602 and control region 606 were resized, device 600 shifts back down the border of camera display region 604 (while maintaining the same size and aspect ratio) and visual boundary 608, thereby increasing the height of indicator region 602 and reducing the height of control region 606. Device 600 also ceases to display the indication of lighting effect value in camera display region 604, but optionally maintains display of lighting effect control 628.

FIGS. 7A-7C are a flow diagram illustrating a method for accessing media controls using an electronic device in accordance with some embodiments. Method 700 is performed at a device (e.g., 100, 300, 500, 600) with a display device and one or more cameras (e.g., one or more cameras (e.g., dual cameras, triple camera, quad cameras, etc.) on different sides of the electronic device (e.g., a front camera, a back camera)). Some operations in method 700 are, optionally, combined, the orders of some operations are, optionally, changed, and some operations are, optionally, omitted.

As described below, method 700 provides an intuitive way for accessing media controls. The method reduces the cognitive burden on a user for accessing media controls, thereby creating a more efficient human-machine interface. For battery-operated computing devices, enabling a user to access media controls faster and more efficiently conserves power and increases the time between battery charges.

The electronic device (e.g., 600) displays (702), via the display device, a camera user interface. The camera user interface includes (704) a camera display region (e.g., 606), the camera display region including a representation (e.g., 630) of a field-of-view of the one or more cameras.

The camera user interface also includes (706) a camera control region (e.g., 606), the camera control region including a plurality of control affordances (e.g., 620, 626) (e.g., a selectable user interface object) (e.g., proactive control affordance, a shutter affordance, a camera selection affordance, a plurality of camera mode affordances) for controlling a plurality of camera settings (e.g., flash, timer, filter effects, f-stop, aspect ratio, live photo, etc.) (e.g., changing a camera mode) (e.g., taking a photo) (e.g., activating a different camera (e.g., front-facing to rear-facing). Providing a plurality of control affordances for controlling a plurality of camera settings in the camera control region enables a user to quickly and easily and change and/or manage the plurality of camera settings. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While a first predefined condition and a second predefined condition (e.g., environmental conditions in an environment of the device) (e.g., electronic device is in a dark environment) (e.g., electronic device is on a tripod) (e.g., electronic device is in a low-light mode) (e.g., electronic device is in a particular camera mode) are not met, the electronic device (e.g., 600) displays (708) the camera user interface without displaying a first control affordance (e.g., 602*b*, 602*c*) (e.g., a selectable user interface object) associated with the first predefined condition and without displaying a second control affordance (e.g., a selectable user interface object) associated with the second predefined condition.

While displaying the camera user interface without displaying the first control affordance and without displaying the second control affordance, the electronic device (e.g., 600) detects (710) a change in conditions.

In response to detecting the change in conditions (712), in accordance with a determination that the first predefined condition (e.g., the electronic device is in a dark environment) is met (e.g., now met), the electronic device (e.g., 600) displays (714) (e.g., automatically, without the need for further user input) the first control affordance (e.g., 614*c*, a flash setting affordance) (e.g., a control affordance that corresponds to a setting of the camera that is active or enabled as a result of the first predefined condition being met). Displaying the first control affordance in accordance with a determination that the first predefined condition is met provides quick and convenient access to the first control affordance. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first predefined condition is met when an amount of light (e.g., amount of brightness (e.g., 20 lux, 5 lux)) in the field-of-view of the one or more cameras is below a first predetermined threshold (e.g., 10 lux), and the first control affordance is an affordance (e.g., a selectable user interface object) for controlling a flash operation. Providing a first control affordance that is an affordance for controlling a flash operation when the amount of light in the field-of-view of the one or more cameras is below a first predetermined threshold provides a user with a quick and easy access to controlling the flash operation when such control is likely to be needed and/or used. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device (e.g., 600) receives a user input corresponding to the selection of the affordance for control the flash operation, and, in response to receiving the user input, the electronic device can change the state of the flash operation (e.g., active (e.g., on), e.g., inactive (e.g., off), automatic (e.g., electronic device determines if the flash should be changed ton inactive or active in real time based on conditions (e.g., amount of light in field-of-view of the camera)) and/or display a user interface to change the state of the flash operation.

In some embodiments, the first predefined condition is met when the electronic device (e.g., 600) is connected to (e.g., physically connected to) an accessory of a first type (e.g., 601, a stabilizing apparatus (e.g., tripod)), and the first control affordance is an affordance (e.g., 614*a*) (e.g., a selectable user interface object) for controlling a timer operation (e.g., an image capture timer, a capture delay timer). Providing a first control affordance that is an affordance for controlling a timer operation when the electronic device is connected to an accessory of a first type provides a user with a quick and easy access to controlling the timer operation when such control is likely to be needed and/or used. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device (e.g., 600) receives a user input corresponding to the selection of the affordance (e.g., 630) for controlling a timer operation, and, in response to receiving the user input, the electronic device can change the state (e.g., time of capture after initiating the capture of media) of the timer operation and/or display a user interface to change the state of the flash operation.

In some embodiments, the first predefined condition is met when an amount of light (e.g., amount of brightness (e.g., 20 lux, 5 lux)) in the field-of-view of the one or more cameras is below a second predetermined threshold (e.g., 20 lux), and the first control affordance is an affordance (e.g., 614*b*) (e.g., a selectable user interface object) for controlling a low-light capture mode. Providing a first control affordance that is an affordance for controlling a low-light capture mode when an amount of light in the field-of-view of the one or more cameras is below a second predetermined threshold provides a user with a quick and easy access to controlling the low-light capture mode when such control is likely to be needed and/or used. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device (e.g., 600) receives a user input corresponding to the selection of the affordance (e.g 650*d*) for controlling a low-light capture mode, and, in response to receiving the user input, the electronic device can change the state (e.g., active (e.g., on), inactive (e.g., off)) of the low-light capture mode and/or display a user interface to change the state of the low-light capture mode.

In some embodiments, the first predefined condition is met when the electronic device (e.g., 600) is configured to capture images in first capture mode (e.g., a portrait mode) and the first control affordance is an affordance (e.g., 614*d*) (e.g., a selectable user interface object) for controlling a lighting effect operation (718) (e.g., a media lighting capture control (e.g., a portrait lighting effect control (e.g., a studio lighting, contour lighting, stage lighting)). Providing a first control affordance that is an affordance for controlling a lighting effect operation when the electronic device is configured to capture images in first capture mode provides a user with a quick and easy access to controlling the lighting effect operation when such control is likely to be needed and/or used. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device (e.g., 600) receives a user input corresponding to the selection of the affordance (e.g., 650*o*) for controlling a lighting effect operation, and, in response to receiving the user input, the electronic device can change the state (e.g., amount of lighting) of the lighting effect and/or display a user interface to change the state of the lighting effect operation.

In some embodiments, while displaying the affordance (e.g., 614*d*) for controlling the lighting effect, the electronic device (e.g., 600) receives (720) a selection (e.g., tap) of the affordance (e.g., 614*d*) for controlling the lighting effect. In some embodiments, in response to receiving the selection of the affordance (e.g., 614*d*) for controlling the lighting effect, the electronic device (e.g., 600) displays (722) an affordance (e.g., 666) (e.g., a selectable user interface object) for adjusting the lighting effect operation (e.g., slider) that, when adjusted (e.g., dragging a slider bar on a slider between values (e.g., tick marks) on the slider), adjusts a lighting effect (e.g., lighting) applied to the representation of the field-of-view of the one or more cameras. In some embodiments, the lighting effect that is adjusted also applies to captured media (e.g., lighting associated with a studio light when the first control affordance control a studio lighting effect operation).

In some embodiments, while displaying the first control affordance, the electronic device (e.g., 600) concurrently displays (724) an indication (e.g., 602*f*) of a current state of a property (e.g., a setting) of the electronic device (e.g., an effect of a control (e.g., an indication that a flash operation is active)) associated (e.g., showing a property or a status of the first control) with (e.g., that can be controlled by) the first control affordance. Concurrently displaying an indication of a current state of a property of the electronic device while displaying the first control affordance enables a user to quickly and easily view and change the current state of a property using the first control affordance. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the indication (e.g., 602*a*, 602*c*) is displayed at the top of the user interface (e.g., top of phone). In some embodiments, the indication is displayed in response to changing a camera toggle (e.g., toggling between a front camera and a back camera) control).

In some embodiments, the property has one or more active states and one or more inactive states and displaying the indication is in accordance with a determination that the property is in at least one of the one or more active states. In some embodiments, some operations must be activated before an indication associated with the operation is displayed in the camera user interface while some operations do not have to be active before an indication associated with the operation is displayed in the camera user interface. In some embodiments, in accordance with a determination that the property is in the inactive state (e.g., is changed to being in the inactive state) the indication is not displayed or is ceased to be displayed if currently displayed.

In some embodiments, the property is a first flash operation setting and the current state of the property is that a flash operation is enabled. In some embodiments, when the flash is set to automatic, the flash operation is active when the electronic device (e.g., 600) determines that the amount of light in the field-of-view of the one or more cameras is within a flash range (e.g., a range between 0 and 10 lux). The flash operation being active when the electronic device determines that the amount of light in the field-of-view of the one or more cameras is within a flash range reduces power usage and improves battery life of the device by enabling the user to use the device more efficiently.

In some embodiments, the property is a second flash operation setting and the current state of the property is that a flash operation is disabled (e.g., shows, displays a representation that shows). In some embodiments, when the flash is set to automatic, the flash operation is inactive when the electronic device (e.g., 600) determines that the amount of light in the field-of-view of the one or more cameras is not within a flash range (e.g., a range between 0 and 10 lux). The flash operation being inactive when the electronic device determines that the amount of light in the field-of-view of the one or more cameras is not within a flash range reduces power usage and improves battery life of the device by enabling the user to use the device more efficiently. In some embodiments, the property is an image capture mode setting and the current state of the property is that the image capture mode is enabled, and the electronic device (e.g., 600) is configured to, in response to an input (e.g., a single input) corresponding to a request to capture media, capture a still image and a video (e.g., a moving image). Capturing a still image and a video when the property is an image capture mode setting and the current state of the property is that the image capture mode is enabled enables a user to quickly and easily capture a still image and a video. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the property is a second image capture mode setting and the current state of the property is that the second image capture mode is enabled. In some embodiments, the electronic device (e.g., 600) is configured to, in response to an input (e.g., a single input) corresponding to a request to capture media, capture media using a high-dynamic-range imaging effect. In some embodiments, in response to receiving a request to camera media, the electronic device (e.g., 600), via the one or more cameras, captures media that is a high-dynamic-range imaging image. Capturing media using a high-dynamic-range imaging effect when the property is a second image capture mode setting and the current state of the property is that the second image capture mode is enabled enables a user to quickly and easily capture media using the high-dynamic-range imaging effect. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the camera control region (e.g., 606) is displayed adjacent to a first side of the display device (e.g., at the bottom of a display region) and the indication is displayed adjacent to a second side of the display device (e.g., a side is closest to the location of the one or more cameras) that is opposite the first side (e.g., top of camera display region).

In some embodiments, in response to displaying the first control affordance (726), in accordance with a determination that the first control affordance is of a first type (e.g., a type in which a corresponding indication is always shown (e.g., a flash control)), the electronic device (e.g., 600) displays (728) a second indication associated with the first control (e.g., the second indication is displayed irrespective of a state of a property associated with the first control). In some embodiments, in response to displaying the first control affordance, in accordance with a determination that the first control affordance is of a second type (e.g., a type in which a corresponding indication is conditionally shown) that is different from the first type and a determination that a second property (e.g., a setting) of the electronic device (e.g., 600) associated with the first control is in an active state, the electronic device displays (730) the second indication associated with the first control. In some embodiments, in response to displaying the first control affordance, in accordance with a determination that the first control affordance is of a second type (e.g., a type in which a corresponding indication is conditionally shown) that is different from the first type and a determination that the second property (e.g., a setting) of the electronic device (e.g., 600) associated with the first control is in an inactive state, the electronic device forgoes display of the second indication associated with the first control. In some embodiments, some operations associated with a control must be activated before an indication associated with the operation is displayed in the camera user interface while some operations do not have to be active before an indication associated with the operation is displayed in the camera user interface.

In response to detecting the change in conditions (712), in accordance with a determination that the second predefined condition (e.g., the electronic device is positioned on a tripod) (e.g., a predefined condition that is different from the first predefined condition) is met (e.g., now met), the electronic device (e.g., 600) displays (716) (e.g., automatically, without the need for further user input) the second control affordance (e.g., a timer setting affordance) (e.g., a control affordance that corresponds to a setting of the camera that is active or enabled as a result of the second predefined condition being met). Displaying the second control affordance in accordance with a determination that the second predefined condition is met provides quick and convenient access to the second control affordance. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the control affordance has an appearance that represents the camera setting that is associated with the predefined condition (e.g., a lightning bolt to represent a flash setting). In some embodiments, when the control affordance is selected, a settings interface is displayed for changing a state of the camera setting associated with the predefined condition.

In some embodiments, further in response to detecting the change in conditions, in accordance with a determination that the first and second predefined conditions are met, the electronic device (e.g., 600) concurrently displays the first control affordance and the second control affordance. Concurrently displaying the first control affordance and the second control affordance in response to detecting the change in conditions and in accordance with a determination that the first and second predefined conditions are met provides the user with a quick and convenient access to both the first control affordance and the second control affordance. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, when multiple conditions are met, multiple affordances are displayed.

In some embodiments, further in response to detecting the change in conditions, in accordance with a determination that the first predefined condition is met and the second predefined condition is not met, the electronic device (e.g., 600) displays the first control affordance while forgoing to display the second control affordance. Displaying the first control affordance while forgoing to display the second control affordance in response to detecting the change in conditions and in accordance with a determination that the first predefined condition is met and the second predefined condition is not met provides the user with quick and easy access to a control affordance that is likely to be needed and/or used while not providing the user with quick and easy access to a control affordance that is not likely to be needed and/or used. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in response to detecting the change in conditions, in accordance with a determination that the first predefined condition is not met and the second predefined condition is met, the electronic device (e.g., 600) displays the second control affordance while forgoing to display the first control affordance. Displaying the second control affordance while forgoing to display the first control affordance in response to detecting the change in conditions and in accordance with a determination that the first predefined condition is not met and the second predefined condition is met provides the user with quick and easy access to a control affordance that is likely to be needed and/or used while not providing the user with quick and easy access to a control affordance that is not likely to be needed and/or used. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, when the respective predefined conditions are met, only the respective affordances associated with the predefined conditions are displayed. In some embodiments, the electronic receives selection of an affordance (e.g., 614) for navigating to the plurality of additional control affordances (e.g., an ellipses affordance). In some embodiments, in response to receiving selection of the affordance (e.g., 614) for navigating to the plurality of addition control affordances, the electronic device (e.g., 600) displays at least some of a plurality of control affordances (e.g., 626) in the camera user interface (including the first control and/or the second control affordances. In some embodiments, when a predefined condition is met, the electronic device (e.g., 600) can display an animation when the affordance pops out the affordance for navigating to the plurality of additional control affordances. In some embodiments, the plurality of control affordances includes an affordance (e.g., 618) for navigating to a plurality of additional control affordances (e.g., an affordance for displaying a plurality of camera setting affordances) that includes at least one of the first or second control affordances. In some of these embodiments, in accordance with the determination that the first predefined condition is met, the first affordance is displayed adjacent to (e.g., next to, sounded by a bounder with the additional control affordance) the affordance for navigating to the plurality of additional control affordances. In some of these embodiments, in accordance with the determination that the second predefined condition is met, the second affordance is displayed adjacent to (e.g., next to, sounded by a bounder with the additional control affordance) the affordance for navigating to the plurality of additional control affordances.)

In some embodiments, the representation of the field-of-view of the one or more cameras extends across (e.g., over) a portion of the camera user interface that includes the first affordance and/or the second affordance. In some embodiments, the camera user interface extends across the entirety of the display area of the display device. In some embodiments, the representation (e.g., the preview) is displayed under all controls included in the camera user interface (e.g., transparently or translucently displayed so that the buttons are shown over portions of the representation).

Note that details of the processes described above with respect to method 700 (e.g., FIGS. 7A-7C) are also applicable in an analogous manner to the methods described below. For example, methods 900, 1100, 1300, 1500, 1700, 1900, 2000, 2100, 2300, 2500, 2700, 2800, 3000, 3200, 3400, 3600, and 3800 optionally include one or more of the characteristics of the various methods described above with reference to method 700. For brevity, these details are not repeated below.

FIGS. 8A-8V illustrate exemplary user interfaces for displaying media controls using an electronic device in accordance with some embodiments. The user interfaces in these figures are used to illustrate the processes described below, including the processes in FIGS. 9A-9C.

FIG. 8A illustrates electronic device 600 displaying a live preview 630 that optionally extends from the top of the display to the bottom of the display. Live preview 630 is based on images detected by one or more camera sensors. In some embodiments, device 600 captures images using a plurality of camera sensors and combines them to display live preview 630. In some embodiments, device 600 captures images using a single camera sensor to display live preview 630. The camera user interface of FIG. 8A includes indicator region 602 and control region 606, which are overlaid on live preview 630 such that indicators and controls can be displayed concurrently with the live preview. Camera display region 604 is substantially not overlaid with indicators or controls. In this example, the live preview includes subject 840 and a surrounding environment. The camera user interface of FIG. 8A includes visual boundary 608 that indicates the boundary between indicator region 602 and camera display region 604 and the boundary between camera display region 604 and control region 606.

As illustrated in FIG. 8A, indicator region 602 is overlaid onto live preview 630 and optionally includes a colored (e.g., gray; translucent) overlay. Indicator region 602 includes flash indicator 602*a* and animated image status indicator 602*d*. Flash indicator 602*a* indicates whether the flash is automatic mode, on, off, or in another mode (e.g., red-eye reduction mode). Animated image status indicator 602*d* indicates whether the camera is configured to capture a single image or a plurality of images (e.g., in response to detecting activation of shutter affordance 610).

As illustrated in FIG. 8A, camera display region 604 includes live preview 630 and zoom affordance 622. As illustrated in FIG. 8A, control region 606 is overlaid onto live preview 630 and optionally includes a colored (e.g., gray; translucent) overlay.

As illustrated in FIG. 8A, control region 606 includes camera mode affordances 620, a portion of media collection 624, additional control affordance 614, shutter affordance 610, and camera switcher affordance 612. Camera mode affordances 620 indicates which camera mode is currently selected and enables the user to change the camera mode. In FIG. 8A, camera modes affordances 620*a*-620*e* are displayed, and ‘Photo’ camera mode 620*c* is indicated as being the current mode in which the camera is operating by the bolding of the text. Media collection 624 includes representations of media (e.g., photos), such as recently captured photos. Additional control affordance 614 enables the user to access additional camera controls. Shutter affordance 610, when activated, causes device 600 to capture media (e.g., a photo) based on the current state of live preview 630 and the currently selected mode. The captured media is stored locally at electronic device and/or transmitted to a remote server for storage. Camera switcher affordance 612, when activated, causes device 600 to switch to showing the field-of-view of a different camera in live preview 630, such as by switching between a rear-facing camera sensor and a front-facing camera sensor.

At FIG. 8A, device 600 detects, using a touch-sensitive surface, swipe up gesture 850*a* (a swipe input toward indicator region 602 and away from control region 606) at a location that corresponds to camera display region 604. In response to detecting swipe up gesture 850*a*, device 600 displays the user interface of FIG. 8B. Alternatively, at FIG. 8A, device 600 detects, using a touch-sensitive surface, tap gesture 850*b* at a location corresponding to additional control affordance 614. In response to detecting tap gesture 850*b*, device 600 similarly displays the user interface of FIG. 8B.

As illustrated in FIG. 8B, in response to detecting swipe up gesture 850*a* or tap gesture 850*b*, device 600 shifts up camera display region 604 (while maintaining the same size and aspect ratio) and visual boundary 608, thereby reducing the height of indicator region 602 and increasing the height of control region 606. In addition to reducing the height of indicator region 602, device 600 ceases to display flash indicator 602*a* and animated image status indicator 602*d*. In some examples, device 600 ceases to display any indicators in indicator region 602 while it is in the reduced height mode. In addition to increasing the height of control region 606, device 600 replaces display of camera mode affordances 620 with camera setting affordances 626, including a first set of camera setting affordances 626*a*-626*e*. Camera setting affordances 626*a*-626*e*, when activated, change (or initiated processes for changing) camera settings. For example, affordance 626*a*, when activated, turns on/off the flash and affordance 626*d*, when activated, initiates a process for setting a shutter timer.

At FIG. 8B, device 600 detects, using the touch-sensitive surface, swipe down gesture 850*c* (a swipe input away from indicator region 602 and toward control region 606) at a location that corresponds to camera display region 604. In response to detecting swipe down gesture 850*c*, device 600 displays the user interface of FIG. 8C. Alternatively, at FIG. 8B, device 600 detects, using a touch-sensitive surface, tap gesture 850*d* at a location corresponding to additional control affordance 614. In response to detecting tap gesture 850*d*, device 600 similarly displays the user interface of FIG. 8C.

As illustrated in FIG. 8C, in response to detecting swipe down gesture 850*c* or tap gesture 850*d*, device 600 shifts down camera display region 604 (while maintaining the same size and aspect ratio) and visual boundary 608, thereby increasing the height of indicator region 602 and decreasing the height of control region 606. In some examples, device 600 re-displays flash indicator 602*a* and animated image status indicator 602*d*. In addition to reducing the height of control region 606, device 600 replaces display of camera setting affordances 626 with camera mode affordances 620. At FIG. 8C, device 600 detects, using the touch-sensitive surface, swipe right gesture 850*e* at a location that corresponds to media collection 624.

As illustrated in FIG. 8D, in response to detecting swipe right gesture 850*e*, device 600 slides the remainder of media collection 624 onto the display, which covers additional control affordance 614. As a result, device 600 ceases to display additional control affordance 614. At FIG. 8D, device 600 detects, using the touch-sensitive surface, swipe left gesture 850*f* at a location that corresponds to media collection 624.

As illustrated in FIG. 8E, in response to detecting swipe left gesture 850*f*, device 600 slides the media collection 624 partially off of the display in the left direction, which reveals additional control affordance 614. As a result, device 600 displays additional control affordance 614. At FIG. 8E, device 600 detects, using the touch-sensitive surface, swipe left gesture 850*g* at a location that corresponds to camera display region 604 (on live preview 630).

In response to detecting swipe left gesture 850*g* (in FIG. 8E), device 600 transitions among graphical views of FIGS. 8F-8H. Alternatively (or in addition), device 600 begins the transition among graphical views of FIGS. 8F-8H in response to detecting a start of a swipe left gesture 850*g* (in FIG. 8E), and the transition continues as the swipe left gesture 850*g* progresses (without detecting lift-off of the gesture), as shown in FIGS. 8F-8G.

As illustrated in FIG. 8F, device 600 shifts a border of camera display region 604 to the left (the direction of swipe left gesture 850*g*) without shifting live preview 630. Shifting camera display region 604 causes display of a vertical portion of visual boundary 608 and causes display of a colored (e.g., gray) overlay in the area that camera display region 604 has vacated (e.g., on the right side of the display, thereby indicating to the user that device 600 is detecting swipe left gesture 850*g*. In FIG. 8F, a portion of visual boundary 608 is displayed outside of (to the left of) device 600 for the better understanding of the reader and is not a visual element of the user interface of device 600. At FIG. 8F, device 600 ceases to display indicators 602*a* and 602*d* of indicator region 602. Similarly, device 600 updates camera mode affordance 620 to slide 620*b* to the left and off the display and to slide 'Pano' camera mode 620*f* onto the display from the right. 'Photo' camera mode is no longer indicated as being the current mode and, instead, portrait camera mode is indicated as being the current mode (by the bolding of the text of 'Portrait' camera mode affordance 620*d* and/or by being centered on the display). At FIG. 8F, in response to left swipe input 850*g*, device 600 also optionally provides a tactile output 860 to indicate to the user that the camera mode is changing.

At FIG. 8G, device 600 overlays camera display region 604 with a colored (e.g., gray; translucent) overlay and/or device 600 dims live preview 630 and/or device 600 dims the display and/or device 600 blurs the display (including live preview 630).

At FIG. 8H, in response to detecting swipe left gesture 850*g*, device 600 displays a revised set of indicators in indicator region 602, an updated live preview 630, and updated control region 606. The revised set of indicators includes previously displayed flash indicator 602*a* and newly displayed f-stop indicator 602*e* (e.g., because the newly selected mode is compatible with the features corresponding to flash indicator 602*a* and f-stop indicator 602*e*), without displaying previously displayed animated image status indicator 602*d* (e.g., because the newly selected mode is incompatible with the feature corresponding to animated image status indicator 602*d*). In some embodiments, f-stop indicator 602*e* provides an indication of an f-stop value (e.g., a numerical value). In FIG. 8H, zoom affordance 622 has shifted to the left and lighting effect control 628 (which, when activated enables changing lighting effects) is displayed in the camera display region 604. In some embodiment, the size, aspect ratio, and location of camera display region 604 is the same in FIG. 8E as in FIG. 8H. Updated live preview 630 in FIG. 8H provides different visual effects as compared to live preview 630 in FIG. 8E. For example, updated live preview 630 provides a bokeh effect and/or lighting effects whereas live preview 630 in FIG. 8E does not provide the bokeh effect and/or lighting effects. In some embodiments, the zoom of objects in live preview 630 change because of the change in camera mode (photo vs. portrait mode). In some embodiments, the zoom of objects in live preview 630 does not change despite the change in camera mode (photo vs. portrait mode).

Returning to FIG. 8E, device 600 detects, using the touch-sensitive surface, swipe left gesture 850*h* at a location that corresponds to camera mode affordances 620 (in control region 606), rather than on live preview 630 in camera display region 604. In contrast to swipe gesture 850*g*, which causes camera display region 604 to shift while transitioning to the portrait camera mode, the device transitions to the portrait camera mode of FIG. 8H without shifting the camera display region 604. Thus, the device can receive either input to transition camera modes, but displays different animations during the transitions to the updated camera mode.

At FIG. 8H, device 600 detects, using the touch-sensitive surface, tap gesture 850*i* at a location that corresponds to additional control affordance 614. As illustrated in FIG. 8I, in response to detecting tap gesture 850*i*, device 600 shifts up camera display region 604 (while maintaining the same size and aspect ratio) and visual boundary 608, thereby reducing the height of indicator region 602 and increasing the height of control region 606. In addition to reducing the height of indicator region 602, device 600 ceases to display flash indicator 602*a* and f-stop indicator 602*e*. In some examples, device 600 ceases to display any indicators in indicator region 602 while it is in the reduced height mode for the indicator region. In addition to increasing the height of control region 606, device 600 replaces display of camera mode affordances 620 with camera setting affordances 626, including a second set of camera setting affordances 626*a*, 626*c*, 626*d*-626*f*. Camera setting affordances 626*a*, 626*c*, 626*d*-626*f*, when activated, change (or initiated processes for changing) camera settings. The first set of camera setting affordances are different from the second set of camera setting affordances. For example, affordance 626*a* is displayed for both the photo camera mode and the portrait camera mode, but affordance 626*b* for enabling/disabling live photos is not displayed for portrait camera mode and, instead, affordance 626*f* is displayed which, when activated, initiates a process for setting an f-stop value. In some embodiments, detecting a swipe up gesture at FIG. 8H on camera display region 604 causes device 600 to similarly display the user interface of FIG. 8I.

At FIG. 8I, device 600 detects, using the touch-sensitive surface, tap gesture 850*j* at a location that corresponds to aspect ratio control affordance 626*c* (in control region 606) while in the portrait camera mode.

At FIG. 8J, in response to detecting tap gesture 850*j*, device 600 expands display of aspect ratio control affordance 626*c* to display adjustable aspect ratio control 818, which includes a plurality of affordances 818*a*-1818*d* which, when activated (e.g., via a tap) change the aspect ratio of camera display region 604. At FIG. 8J, 4:3 aspect ratio affordance 818*b* is bolded to indicate that the aspect ratio of camera display region 604 is 4:3, a non-square aspect ratio. At FIG. 8J, while displaying adjustable aspect ratio control 818, device 600 detects, using the touch-sensitive surface, tap gesture 850*k* at a location that corresponds to square aspect ratio affordance 818*a*.

At FIG. 8K, in response to detecting tap gesture 850*k*, device 600 changes the aspect ratio of camera display region 604 to be square. As a result, device 600 also increases the height of one or both of indicator region 602 and control region 606. As illustrated in FIG. 8K, lighting effect control 628 is now displayed in control region 606 because the height of control region 606 has increased.

At FIG. 8K, device 600 detects, using the touch-sensitive surface, tap gesture 850*l* at a location that corresponds to 'Photo' camera mode 620*c* to change the mode in which the camera is operating.

At FIG. 8L, in response to detecting tap gesture 850*l*, device 600 changes the camera mode from portrait camera mode to photo camera mode. Although the camera mode has changed and the f-stop indicator 602*e* is no longer displayed, the size, aspect ratio, and location of camera display region 604 is the same in both FIGS. 8K and 8L. 'Photo' camera mode affordance is now bolded to indicate that the photo camera mode is currently active.

At FIG. 8L, device 600 detects, using the touch-sensitive surface, tap gesture 850*m* at a location that corresponds to aspect ratio indicator 602*g*. At FIG. 8K, in response to detecting tap gesture 850*m*, device 600 replaces display of camera mode affordance 620 in control region 606 with display of adjustable aspect ratio control 818, including affordances 818*a*-1818*d* which, when activated (e.g., via a tap) change the aspect ratio of camera display region 604, as discussed above.

At FIG. 8M, device 600 detects, using the touch-sensitive surface, tap gesture 850*n* at a location that corresponds to aspect ratio control affordance 626*c*. At FIG. 8N, in response to detecting tap gesture 850*n*, device 600 contracts the display of aspect ratio control affordance 626*c* to cease display of adjustable aspect ratio control 818.

At each of FIGS. 8N-8P, device 600 detects, using the touch-sensitive surface, tap gestures 850*o*, 850*p*, and 850*q* at a location that corresponds to zoom affordance 622. In response to tap gesture 850*o*, as shown in FIG. 8O, device 600 updates a zoom of live preview 630 (e.g., by switching camera sensors from a first camera sensor to a second camera sensor with a different field-of-view) and updates the zoom affordance 622 to indicate the current zoom. In response to tap gesture 850*p*, as shown in FIG. 8P, device 600 updates a zoom of live preview 630 (e.g., by switching from the second camera sensor to a third camera sensor with a different field-of-view) and updates the zoom affordance 622 to indicate the current zoom. In response to tap gesture 850*q*, as shown in FIG. 8Q, device 600 updates a zoom of live preview 630 (e.g., by switching from the third camera sensor to the first camera sensor with a different field-of-view) and updates the zoom affordance 622 to indicate the current zoom. Throughout FIGS. 8M-8Q, the controls in control region 606 have not changed and the indicators in indicator region 602 have not changed.

At FIG. 8Q, while displaying camera setting affordances 626, device 600 detects, using the touch-sensitive surface, swipe down gesture 850*r* at a location that corresponds to live preview 630 in the camera display region 604. In response to detecting swipe down gesture 850*r*, device 600 replaces display of camera setting affordances 626 with camera mode affordances 620, as shown in FIG. 8R. In some embodiments, device 600 also shifts down camera display region 604 (while maintaining the same size and aspect ratio) and visual boundary 608, thereby increasing the height of indicator region 602 and decreasing the height of control region 606. In some embodiments, device 600 maintains display of aspect ratio indicator 602*g* for FIGS. 8K-8S because the square aspect ratio allows indicator region 602 to have a height that more readily accommodates indicators while the camera setting affordance 626 is displayed.

At FIG. 8R, while camera display region 604 has a square aspect ratio, device 600 detects, using the touch-sensitive surface, tap gesture 850*s* at a location that corresponds to shutter affordance 610. In response to detecting tap gesture 850*s*, device 600 captures media (e.g., a photo, a video) based on the current state of live preview 630. The captured media is stored locally at electronic device and/or transmitted to a remote server for storage. Further, in response to detecting tap gesture 850*s*, as shown in FIG. 8S, device 600 replaces display of additional control affordance 614 with media collection 624, which includes a representation of the newly captured media on top of the collection.

At FIG. 8S, device 600 detects, using the touch-sensitive surface, tap gesture 850*t* at a location that corresponds to media collection 624. In response to detecting tap gesture 850*t*, as shown in FIG. 8T, device 600 ceases to display live preview 630 and, instead, displays a photo viewer user interface that includes a representation 842 of newly captured media (e.g., a photo, a frame of a video). Device 600 concurrently displays, with representation 842 of the newly captured media, edit affordance 644*a* for editing the newly captured media, send affordance 644*b* for transmitting the newly captured media, favorite affordance 644*c* for marking the newly captured media as a favorite media, and trash affordance 644*d* for deleting the newly captured media.

At FIG. 8T, device 600 detects, using the touch-sensitive surface, tap gesture 850*u* at a location that corresponds to edit affordance 644*a*. In response to detecting tap gesture 850*u*, as shown in FIG. 8U, device 600 displays an edit user interface for editing the newly captured media. The edit user interface includes aspect editing affordances 846*a*-846*d*, with square aspect editing affordance 846*a* highlighted to indicate that the media was captured at the square aspect ratio.

At FIG. 8U, device 600 detects, using the touch-sensitive surface, tap gesture 850*v* at a location that corresponds to 4:3 aspect ratio editing affordance 846*b*. In response to detecting tap gesture 850*v*, as shown in FIG. 8V, device 600 updates display of the representation of the media from the square aspect ratio to a 4:3 aspect ratio while maintaining the visual content of the media as displayed in the square aspect ratio and adding visual content captured (in response to tap gesture 850*s* on shutter affordance 610) that extends beyond the 4:3 aspect ratio visual content. Additionally, 4:3 aspect editing affordance 846*b* is highlighted to indicate that the media is being shown at the expanded 4:3 aspect ratio.

FIGS. 9A-9C are a flow diagram illustrating a method for displaying media controls using an electronic device in accordance with some embodiments. Method 900 is performed at a device (e.g., 100, 300, 500, 600) with a display device and one or more cameras (e.g., one or more cameras (e.g., dual cameras, triple camera, quad cameras, etc.) on different sides of the electronic device (e.g., a front camera, a back camera)). Some operations in method 900 are, optionally, combined, the orders of some operations are, optionally, changed, and some operations are, optionally, omitted.

As described below, method 900 provides an intuitive way for displaying media controls. The method reduces the cognitive burden on a user for displaying media controls, thereby creating a more efficient human-machine interface. For battery-operated computing devices, enabling a user to view media controls faster and more efficiently conserves power and increases the time between battery charges.

The electronic device (e.g., 600) displays (902), via the display device, a camera user interface. The camera user interface includes (e.g., the electronic device displays concurrently, in the camera user interface) a camera display region, the camera display region including a representation (e.g., 630) of a field-of-view of the one or more cameras (904).

The camera user interface includes (e.g., the electronic device displays concurrently, in the camera user interface) a camera control region (e.g., 606) the camera control region including a plurality of camera mode affordances (e.g., 620) (e.g., a selectable user interface object) (e.g., affordances for selecting different camera modes (e.g., slow motion, video, photo, portrait, square, panoramic, etc.)) at a first location (906) (e.g., a location above an image capture affordance (e.g., a shutter affordance that, when activated, captures an image of the content displayed in the camera display region)). In some embodiments, each camera mode (e.g., video, phot/still, portrait, slow-motion, panoramic modes) has a plurality of settings (e.g., for a portrait camera mode: a studio lighting setting, a contour lighting setting, a stage lighting setting) with multiple values (e.g., levels of light for each setting) of the mode (e.g., portrait mode) that a camera (e.g., a camera sensor) is operating in to capture media (including post-processing performed automatically after capture). In this way, for example, camera modes are different from modes which do not affect how the camera operates when capturing media or do not include a plurality of settings (e.g., a flash mode having one setting with multiple values (e.g., inactive, active, auto). In some embodiments, camera modes allow a user to capture different types of media (e.g., photos or video) and the settings for each mode can be optimized to capture a particular type of media corresponding to a particular mode (e.g., via post processing) that has specific properties (e.g., shape (e.g., square, rectangle), speed (e.g., slow motion, time elapse), audio, video). For example, when the electronic device (e.g., 600) is configured to operate in a still photo mode, the one or more cameras of the electronic device, when activated, captures media of a first type (e.g., rectangular photos) with particular settings (e.g., flash setting, one or more filter settings); when the electronic device is configured to operate in a square mode, the one or more cameras of the electronic device, when activated, captures media of a second type (e.g., square photos) with particular settings (e.g., flash setting and one or more filters); when the electronic device is configured to operate in a slow motion mode, the one or more cameras of the electronic device, when activated, captures media that media of a third type (e.g., slow motion videos) with particular settings (e.g., flash setting, frames per second capture speed); when the electronic device is configured to operate in a portrait mode, the one or more cameras of the electronic device captures media of a fifth type (e.g., portrait photos (e.g., photos with blurred backgrounds)) with particular settings (e.g., amount of a particular type of light (e.g., stage light, studio light, contour light), f-stop, blur); when the electronic device is configured to operate in a panoramic mode, the one or more cameras of the electronic device captures media of a fourth type (e.g., panoramic photos (e.g., wide photos) with particular settings (e.g., zoom, amount of field to view to capture with movement). In some embodiments, when switching between modes, the display of the representation (e.g., 630) of the field-of-view changes to correspond to the type of media that will be captured by the mode (e.g., the representation is rectangular mode while the electronic device (e.g., 600) is operating in a still photo mode and the representation is square while the electronic device is operating in a square mode).

In some embodiments, the plurality of camera setting affordances (e.g., 618*a*-618*d*) include an affordance (e.g.,

618*a*-618*d*) (e.g., a selectable user interface object) for configuring the electronic device (e.g., 600) to capture media that, when displayed, is displayed with a first aspect ratio (e.g., 4 by 3, 16 by 9) in response to a first request to capture media. Including an affordance for configuring the electronic device to capture media that, when displayed, is displayed with a first aspect ratio in response to a first request to capture media enables a user to quickly and easily set and/or change the first aspect ratio. Providing a needed control option without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device (e.g., 600) receives selection of the affordance (e.g., 618*a*-618*d*) and, in response, the electronic device displays a control (e.g., a boundary box 608) that can be moved to change the first aspect ratio to a second aspect ratio.

In some embodiments, the representation (e.g., 630) of the field-of-view of the one or more cameras is displayed at a first zoom level (e.g., 1× zoom) (908). In some embodiments, while displaying the representation (e.g., 630) of the field-of-view of the one or more cameras is displayed at a first zoom level, the electronic device (e.g., 600) receives (910) a first request to change the zoom level of the representation (e.g., tap on display device). In some embodiments, in response to receiving the first request to change the zoom level of the representation (e.g., 630) (912), in accordance with a determination that the request to change the zoom level of the representation corresponds a request to increase the zoom level of the representation, the electronic device (e.g., 600) displays (914) the a second representation field-of-view of the one or more cameras at a second zoom level (e.g., 2× zoom) larger than the first zoom level. In some embodiments, in response to receiving the first request to change the zoom level of the representation (912), in accordance with a determination that the request to change the zoom level of the representation corresponds a request to decrease the zoom level of the representation (e.g., 630), the electronic device (e.g., 600) displays (916) the a third representation field-of-view of the one or more cameras at a third zoom (e.g., 0.5*x* zoom) level smaller than the first zoom level. In some embodiments, the difference between the magnification of the zoom levels is uneven (e.g., between 0.5× and 1× (e.g., 0.5× difference) and between 1× and 2× (e.g., 1× difference).

In some embodiments, while displaying the representation (e.g., 630) of the field-of-view of the one or more cameras at a fourth zoom level (e.g., a current zoom level (e.g., 0.5×, 1×, or 2× zoom)), the electronic device (e.g., 600) receives (918) a second request (e.g., tap on display device) to change the zoom level of the representation. In some embodiments, in response to receiving the second request to change the zoom level of the representation (920), in accordance with a determination that the fourth zoom level is the second zoom level (e.g., 2× zoom) (and, in some embodiments, the second request to change the zoom level of the representation corresponds to a second request to increase the zoom level of the representation), the electronic device (e.g., 600) displays (922) a fourth representation of the field-of-view of the one or more cameras at the third zoom level (e.g., 0.5*x* zoom). In some embodiments, in response to receiving the second request to change the zoom level of the representation (920), in accordance with a determination that the fourth zoom level is the third zoom level (e.g., 0.5×) (and, in some embodiments, the second request to change the zoom level of the representation corresponds to a second request to increase the zoom level of the representation), the electronic device (e.g., 600) displays (924) a fifth representation of the field-of-view of the one or more cameras at the first zoom level (e.g., 1× zoom). In some embodiments, in response to receiving the second request to change the zoom level of the representation (920), in accordance with a determination that the fourth zoom level is the first zoom level (e.g., 1×) (and, in some embodiments, the second request to change the zoom level of the representation corresponds to a second request to increase the zoom level of the representation), the electronic device (e.g., 600) displays (926) a sixth representation of the field-of-view of the one or more cameras at the second zoom level (e.g., 2×). In some embodiments, the camera user interface includes an affordance (e.g., 622) that, when selected, cycles through a set of predetermined zoom values (e.g., cycles from 0.5×, to 1×, to 2×, and then back to 0.5× or cycles from 2× to 1× to 0.5×, and then back to 2×). Providing an affordance that, when selected, cycles through a set of predetermined zoom values provides visual feedback to a user of the selectable predetermined zoom values. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, when the zoom level is an upper limit zoom level (e.g., 2×) and in response to a request to increase zoom, the electronic device (e.g., 600) changes the zoom level to 0.5×. In some embodiments, when the zoom level is a lower limit zoom level (e.g., 0.5×) and in response to a request to decrease zoom, the electronic device (e.g., 600) changes the zoom level to 2×.

While displaying the camera user interface the electronic device (e.g., 600) detects (928) a first gesture (e.g., 850*g*, 850*h*, a touch gesture (e.g., swipe)) on the camera user interface.

In response to detecting the first gesture (e.g., 850*g*, 850*h*), the electronic device (e.g., 600) modifies (930) an appearance of the camera control region (e.g., 606) including, in accordance with a determination that the gesture is a gesture of a first type (e.g., a swipe gesture on the camera mode affordances) (e.g., a gesture at the first location), displaying (932) one or more additional camera mode affordances (e.g., 620*f*, a selectable user interface object) at the first location (e.g., scrolling the plurality of camera mode affordances such that one or more displayed camera mode affordances are no longer displayed, and one or more additional camera mode affordances are displayed at the first location). Displaying one or more additional camera mode affordances in accordance with a determination that the gesture is a gesture of a first type enables a user to quickly and easily access other camera mode affordances. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the gesture of the first type is movement of a contact (e.g., 850*h*, a swipe on display device) on at least one of the plurality of camera mode affordances (e.g., 620) (e.g., swipe across two or more camera mode affordances or a portion of a region associated with the plurality of camera affordances).

In some embodiments, the gesture is of the first type and detecting the first gesture includes detecting a first portion (e.g., an initial portion, a contact followed by a first amount of movement) of the first gesture and a second portion (a subsequent portion, a continuation of the movement of the contact) of the first gesture. In some embodiments, in response to detecting the first portion of the first gesture, the electronic device (e.g., 600) displays, via the display device, a boundary (e.g., 608) that includes one or more discrete boundary elements (e.g., a single, continuous boundary or a boundary made up of discrete elements at each corner) enclosing (e.g., surrounding, bounding in) at least a portion of the representation of the field-of-view of the one or more cameras (e.g., boundary (e.g., frame) displayed around representation (e.g., camera preview) of the field-of-view of the one or more cameras). Displaying a boundary that includes one or more discrete boundary elements enclosing at least a portion of the representation of the field-of-view of the one or more cameras in response to detecting the first portion of the first gesture provides visual feedback to a user that the first portion of the first gesture has been detected. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in response to detecting the second portion of the first gesture, the electronic device (e.g., 600) translates (e.g., moving, sliding, transitioning) the boundary (e.g., 608 in FIG. 8F) in a first direction to across a display of the display device until at least a portion of the boundary is translated off the display (translated off a first edge of the display device) and is ceased to be displayed. Translating the boundary in a first direction to across a display of the display device until at least a portion of the boundary is translated off the display and is ceased to be displayed in response to detecting the second portion of the first gesture provides visual feedback to a user that the first gesture has been (e.g., fully) detected. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, detecting the second portion of the first gesture includes detecting a second contact moving in the first direction.

In some embodiments, the second contact is detected on the representation of the field-of-view (e.g., on a portion of the representation) of the one or more cameras. In some embodiments, a rate at which translating the boundary occurs is proportional to a rate of movement of the second contact in the first direction (e.g., the boundary moves as the contact moves). The rate at which translating the boundary occurs being proportional to a rate of movement of the second contact in the first direction provides visual feedback to a user that the rate of translation of the boundary corresponds to the rate of the movement of the second contact. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, translating the boundary includes altering a visual appearance (e.g., dimming, as in FIG. 8G) of the at least a portion of the representation (e.g., 630) of the field-of-view of the one or more cameras enclosed by the boundary. In some embodiments, the electronic device (e.g., 600) decreases the brightness level of the entire display device.

In response to detecting the first gesture, the electronic device (e.g., 600) modifies (930) an appearance of the camera control region (e.g., 606), including, in accordance with a determination that the gesture is a gesture of a second type different from the first type (e.g., a selection of an affordance in the camera control region other than one of the camera mode affordances) (e.g., a gesture at a location other than the first location (e.g., a swipe up on the representation of the field-of-view of the camera)), ceasing to display (934) the plurality of camera mode affordances (e.g., 620) (e.g., a selectable user interface object), and displaying a plurality of camera setting (e.g., 626, control a camera operation) affordances (e.g., a selectable user interface object) (e.g., affordances for selecting or changing a camera setting (e.g., flash, timer, filter effects, f-stop, aspect ratio, live photo, etc.) for a selected camera mode) at the first location. In some embodiments, the camera setting affordances are settings for adjusting image capture (e.g., controls for adjusting an operation of image capture) for a currently selected camera mode (e.g., replacing the camera mode affordances with the camera setting affordances).

In some embodiments, the gesture of the second type is movement of a contact (e.g., a swipe on the display device) in the camera display region.

In some embodiments, the camera control region (e.g., 606) further includes an affordance (e.g., a selectable user interface object) for displaying a plurality of camera setting affordances, and the gesture of the second type is a selection (e.g., tap) of the affordance for displaying one or more camera setting. In some embodiments, while displaying the affordance for displaying one or more camera settings and while displaying one or more camera mode affordance, one or more camera setting affordances, one or more options corresponding to one or more camera setting affordances, the electronic device (e.g., 600) receives a selection of the affordance for displaying one or more camera settings. In some embodiments, in response to receiving the request, the electronic device (e.g., 600) ceases to display the one or more camera mode affordances (e.g., 620) or one or more camera setting affordances.

In some embodiments, displaying the camera user interface further includes displaying an affordance (e.g., 602*a*) (e.g., a selectable user interface object) that includes a graphical indication of a status of capture setting (e.g., a flash status indicator). Displaying an affordance that includes a graphical indication of a status of capture setting enables a user to quickly and easily recognize the status of capture setting. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the gesture of the second type corresponds to a selection of the indication.

In some embodiments, the electronic device (e.g., 600) detects a second gesture on the camera user interface corresponding to a request to display a first representation of previously captured media (e.g., 624, captured before now) (e.g., swipe (e.g., swipe from an edge of the display screen)). In some embodiments, in response to detecting the second gesture, the electronic device (e.g., 600) displays a first representation (e.g., 624) of the previously captured media (e.g., one or more representations of media that are displayed stacked on top of each other). Displaying a first representation of the previously captured media in response to detecting the second gesture enable a user to quickly and easily view the first representation of the previously captured media. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the first representation is displayed in the camera control region (e.g., 606).

In some embodiments, displaying the plurality of camera setting affordances at the first location includes, in accordance with a determination that the electronic device (e.g., 600) is configured to capture media in a first camera mode (e.g., a portrait mode) while the gesture of the second type was detected, displaying a first set of camera setting affordances (e.g., a selectable user interface object) (e.g., lighting effect affordances) at the first location. Displaying a first set of camera setting affordances at the first location in accordance with a determination that the electronic device is configured to capture media in a first camera mode while the gesture of the second type was detected provides a user with a quick and convenient access to the first set of camera setting affordances. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, displaying the plurality of camera setting affordances (e.g., 626) at the first location includes, in accordance with a determination that the electronic device (e.g., 600) is configured to capture media in a second camera mode (e.g., a video mode) that is different than the first camera mode while the gesture of the second type was detected, displaying a second first of camera setting affordances (e.g., a selectable user interface object) (e.g., video effect affordances) at the first location that is different than the first plurality of camera settings.

In some embodiments, the first set of camera setting affordances includes a first camera setting affordance (e.g., 626*a*) and the second set of camera setting affordances includes the first camera setting affordance (e.g., 626*a*, a flash affordance that is included for both portrait mode and video mode).

In some embodiments, the first camera mode is a still photo capture mode and the first set of camera setting affordances includes one or more affordances selected from the group consisting of: an affordance (e.g., a selectable user interface object) that includes an indication (e.g., a visual indication) corresponding to a flash setting, an affordance (e.g., a selectable user interface object) that includes an indication corresponding to a live setting (e.g., setting that, when on, creates a moving images (e.g., an image with the file extension of a GIF) (in some embodiments, the electronic device receives a selection of the affordance that includes the indication corresponding to the live setting; in some embodiments, in response to receiving selection of the indication, the electronic device turns on/off the live setting), an affordance (e.g., a selectable user interface object) that includes an indication corresponding to an aspect ratio setting (in some embodiments, the electronic device receives a selection of the affordance that includes the indication corresponding to the aspect ratio setting; in some embodiments, in response to receiving selection of the indication, the electronic device turns on/off the aspect ratio setting and/or displays an adjustable control to adjust the aspect ratio of a representation (e.g., image, video) display on the display device), an affordance (e.g., a selectable user interface object) that includes an indication corresponding to a timer setting (in some embodiments, the electronic device receives a selection of the affordance that includes the indication corresponding to the timer setting; in some embodiments, in response to receiving selection of the indication, the electronic device turns on/off the timer setting and/or displays an adjustable control to adjust the time before the image is captured after capture is initiated), and an affordance (e.g., a selectable user interface object) that includes an indication corresponding to a filter setting (in some embodiments, the electronic device receives a selection of the affordance that includes the indication corresponding to the filter setting; in some embodiments, in response to receiving selection of the indication, the electronic device turns on/off the filter setting and/or displays an adjustable control to adjust the filter that the electronic device uses when capturing an image). In some embodiments, selection of the affordance will cause the electronic device (e.g., 600) to set a setting corresponding to the affordance or display a user interface (e.g., options (e.g., slider, affordances)) for setting the setting.

In some embodiments, the first camera mode is a portrait mode and the first set of camera setting affordances (e.g., 626) includes one or more affordances selected from the group consisting of: an affordance (e.g., a selectable user interface object) that includes an indication corresponding to a depth control setting (in some embodiments, the electronic device receives a selection of the affordance that includes the indication corresponding to the depth control setting; in some embodiments, in response to receiving selection of the indication, the electronic device turns on/off the depth control setting and/or displays an adjustable control to adjust the depth of field to blur the background of the device), an affordance (e.g., a selectable user interface object) that includes an visual indication corresponding to a flash setting (in some embodiments, the electronic device receives a selection of the affordance that includes the indication corresponding to the flash setting; in some embodiments, in response to receiving selection of the indication, the electronic device displays selectable user interface elements to configure a flash setting of an electronic device (e.g., set the flash setting to auto, on, off)), an affordance (e.g., a selectable user interface object) that includes an visual indication corresponding to a timer setting (in some embodiments, the electronic device receives a selection of the affordance that includes the indication corresponding to the timer setting; in some embodiments, in response to receiving selection of the indication, the electronic device turns on/off the timer setting and/or displays an adjustable control to adjust the time before the image is captured after capture is initiated), an affordance (e.g., a selectable user interface object) that includes an visual indication corresponding to a filter setting (in some embodiments, the electronic device receives a selection of the affordance that includes the indication corresponding to the filter setting; in some embodiments, in response to receiving selection of the indication, the electronic device turns on/off the filter setting and/or displays an adjustable control to adjust the filter that the electronic device uses when capturing an image), and an affordance (e.g., a selectable user interface object) that includes an indication corresponding to a lighting setting (in some embodiments, the electronic device receives a selection of the affordance that includes the indication corresponding to the lighting setting; in some embodiments, in response to receiving selection of the indication, the electronic device turns on/off the lighting setting and/or displays an adjustable control to adjust (e.g., increase/decrease the amount of light) the a particular light setting (e.g., studio light setting, a stage lighting setting) that the electronic device uses when capturing an image). In some embodiments, selection of the affordance will cause the electronic device (e.g., 600) to set a setting corresponding to the affordance or display a user interface (e.g., options (e.g., slider, affordances)) for setting the setting.

In some embodiments, while not displaying a representation (e.g., any representation) of previously captured media, the electronic device (e.g., 600) detects (936) capture of first media (e.g., capture of a photo or video) using the one or more cameras. In some embodiments, the capture occurs in response to a tap on a camera activation affordance or a media capturing affordance (e.g., a shutter button). In some embodiments, in response to detecting the capture of the first media, the electronic device (e.g., 600) displays (938) one or more representations (e.g., 6) of captured media, including a representation of the first media. In some embodiments, the representation of the media corresponding to the representation of the field-of-view of the one or more cameras is displayed on top of the plurality of representations of the previously captured media. Displaying the representation of the media corresponding to the representation of the field-of-view of the one or more cameras on top of the plurality of representation of the previously captured media enables a user to at least partially view and/or recognize previously captured media while viewing the representation of the media corresponding to the representation of the field-of-view of the one or more cameras. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the plurality of representations of the previously captured media are displayed as a plurality of representations that are stacked on top of each other.

In some embodiments, while the electronic device (e.g., 600) is configured to capture media that, when displayed, is displayed with the first aspect ratio, the electronic device receives (940) a third request to capture media. In some embodiments, in response to receiving the third request to capture media, the electronic device (e.g., 600) displays (942) a representation of the captured media with the first aspect ratio. In some embodiments, the electronic device (e.g., 600) receives (944) a request to change the representation of the captured media with the first aspect ratio to a representation of the captured media with a second aspect ratio. In some embodiments, in response to receiving the request, the electronic device (e.g., 600) displays (946) the representation of the captured media with the second aspect ratio. In some embodiments, adjusting the aspect ratio is nondestructive (e.g., the aspect ratio of the captured media can be changed (increased or decreased) after changing the photo).

In some embodiments, the representation of the captured media with the second aspect ratio includes visual content (e.g., image content; additional image content within the field-of-view of the one or more cameras at the time of capture that was not included in the representation at the first aspect ratio) not present in the representation of the captured media with the first aspect ratio.

In some embodiments, while the electronic device (e.g., 600) is configured to capture media in a third camera mode (e.g., portrait mode), the electronic device (e.g., 600) detects a second request to capture media. In some embodiments, in response to receiving the request, the electronic device (e.g., 600) captures media using the one or more cameras based on settings corresponding to the third camera mode and at least one setting corresponding to an affordance (e.g., a selectable user interface object) (e.g., a lighting effect affordance) of the plurality of camera setting affordances (e.g., 626). Capturing media using the one or more cameras based on settings corresponding to the third camera mode and at least one setting corresponding to an affordance in response to receiving the request while the electronic device is configured to capture media in a third camera mode provides a user with easier control of the camera mode applied to captured media. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 900 (e.g., FIGS. 9A-9C) are also applicable in an analogous manner to the methods described above and below. For example, methods 700, 1100, 1300, 1500, 1700, 1900, 2000, 2100, 2300, 2500, 2700, 2800, 3000, 3200, 3400, 3600, and 3800 optionally include one or more of the characteristics of the various methods described above with reference to method 900. For brevity, these details are not repeated below.

FIGS. 10A-10K illustrate exemplary user interfaces for displaying a camera field-of-view using an electronic device in accordance with some embodiments. The user interfaces in these figures are used to illustrate the processes described below, including the processes in FIGS. 11A-11C.

Figure 10A:
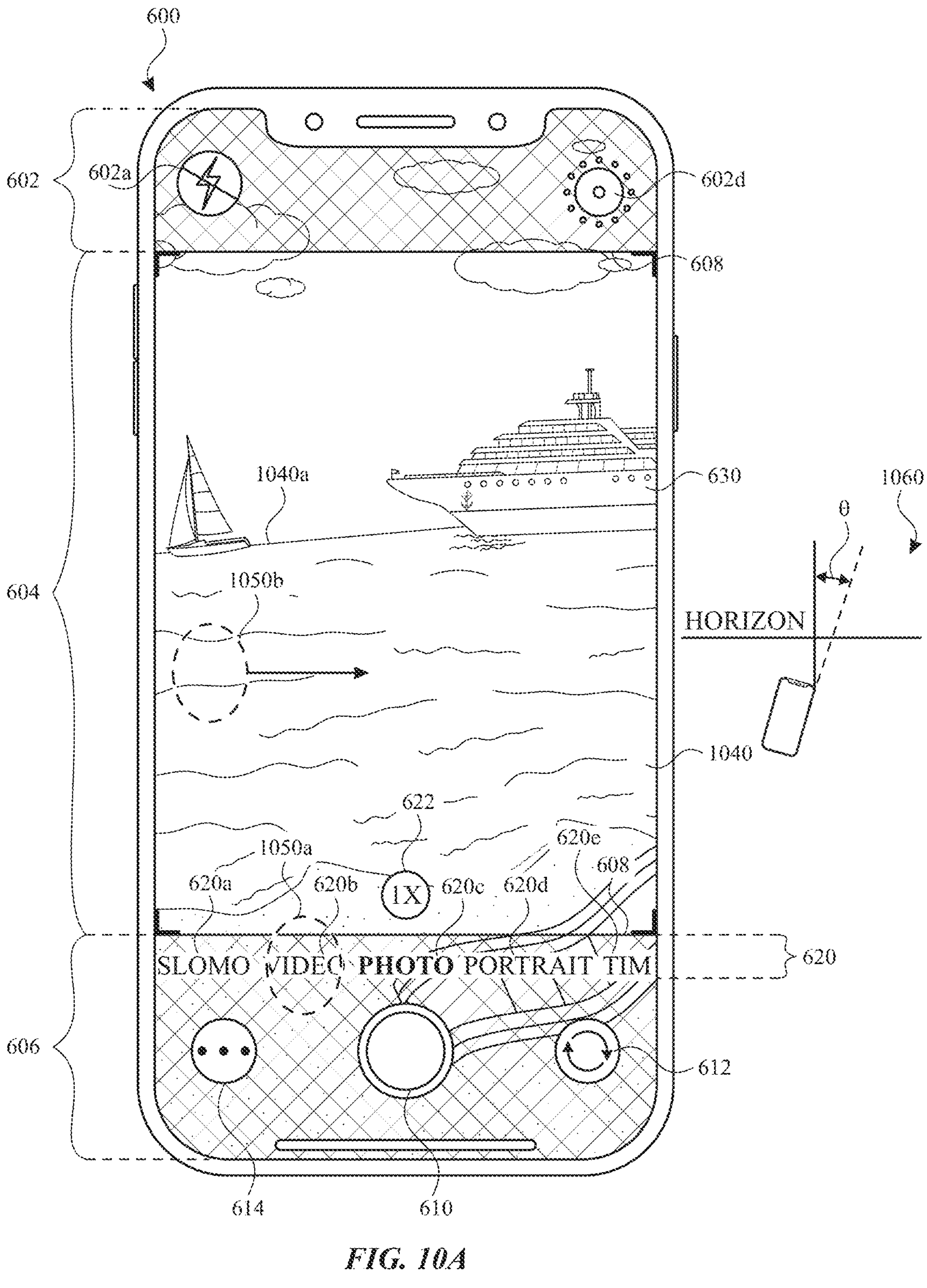
FIGS. 10A-10K illustrate exemplary techniques and user interfaces for displaying a camera field-of-view using an electronic device in accordance with some embodiments.
Figure 11A:
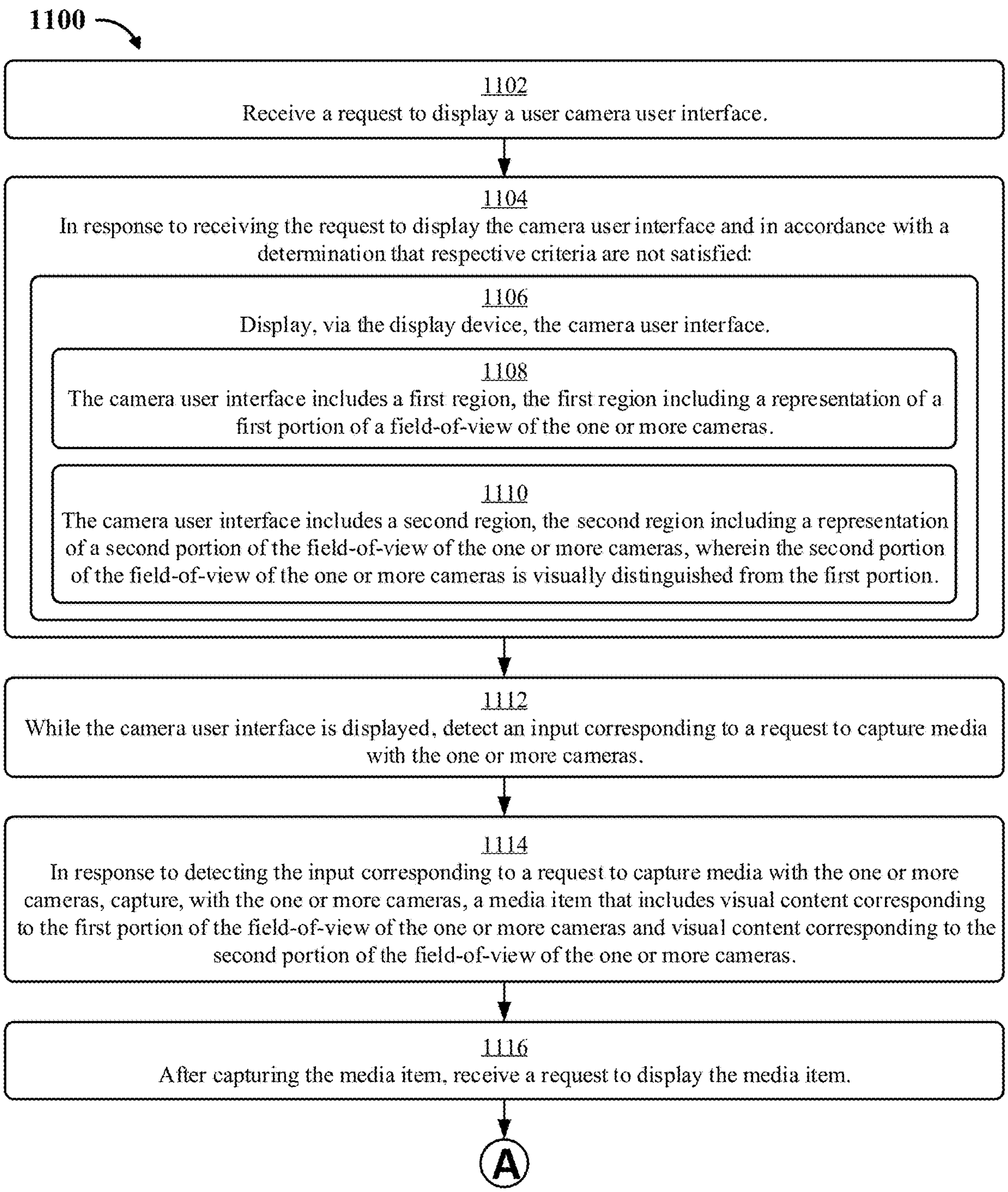

FIG. 10A illustrates electronic device 600 displaying a live preview 630 that optionally extends from the top of the display to the bottom of the display. Live preview 630 is based on images detected by one or more camera sensors. In some embodiments, device 600 captures images using a plurality of camera sensors and combines them to display live preview 630. In some embodiments, device 600 captures images using a single camera sensor to display live preview 630. The camera user interface of FIG. 10A includes indicator region 602 and control region 606, which are overlaid on live preview 630 such that indicators and controls can be displayed concurrently with the live preview.

Camera display region 604 is substantially not overlaid with indicators or controls. In this example, live preview 630 includes a water view 1040 with surrounding environment. Water view 1040 includes a horizon line 1040*a* that is displayed at an offset by an angle from device 600 because of how the user has oriented device 600. To improve understanding, some of FIGS. 10A-10K include graphical illustration 1060 that provides details about the orientation of device 600 with respect to the horizon line in the corresponding figure. The camera user interface of FIG. 10A includes visual boundary 608 that indicates the boundary between indicator region 602 and camera display region 604 and the boundary between camera display region 604 and control region 606.

As illustrated in FIG. 10A, indicator region 602 is overlaid onto live preview 630 and optionally includes a colored (e.g., gray; translucent) overlay. Indicator region 602 includes animated image status indicator 602*d*, which indicates whether the camera is configured to capture a single image or a plurality of images (e.g., in response to detecting activation of shutter affordance 610).

As illustrated in FIG. 10A, camera display region 604 includes live preview 630 and zoom affordance 622. As illustrated in FIG. 10A, control region 606 is overlaid onto live preview 630 and optionally includes a colored (e.g., gray; translucent) overlay.

As illustrated in FIG. 10A, control region 606 includes camera mode affordances 620, additional control affordance 614, shutter affordance 610, and camera switcher affordance 612. Camera mode affordances 620 indicates which camera mode is currently selected and enables the user to change the camera mode. In FIG. 10A, camera modes 620*a*-620*e* are displayed, and 'Photo' camera mode 620*c* is indicated as being the current mode in which the camera is operating by the bolding of the text. Additional control affordance 614 enables the user to access additional camera controls. Shutter affordance 610, when activated, causes device 600 to capture media (e.g., a photo) based on the current state of live preview 630. The captured media is stored locally at electronic device and/or transmitted to a remote server for storage. Camera switcher affordance 612, when activated, causes the device to switch to showing the field-of-view of a different camera in live preview 630, such as by switching between a rear-facing camera sensor and a front-facing camera sensor.

At FIG. 10A, device 600 detects, using a touch-sensitive surface, tap gesture 1050*a* at a location that corresponds to video camera mode affordance 620*b*. In response to detecting tap gesture 1050*a*, device 600 displays the user interface of FIG. 10B. Alternatively, at FIG. 10A, device 600 detects, using the touch-sensitive surface, swipe right gesture 1050*b* at a location corresponding to live preview 630 in the camera display region 604. In response to detecting swipe right gesture 1050*b*, device 600 similarly displays the user interface of FIG. 10B. The transitions between FIGS. 10A and 10B are described in further detail above with respect to FIGS. 8E-8H.

Figure 10B:
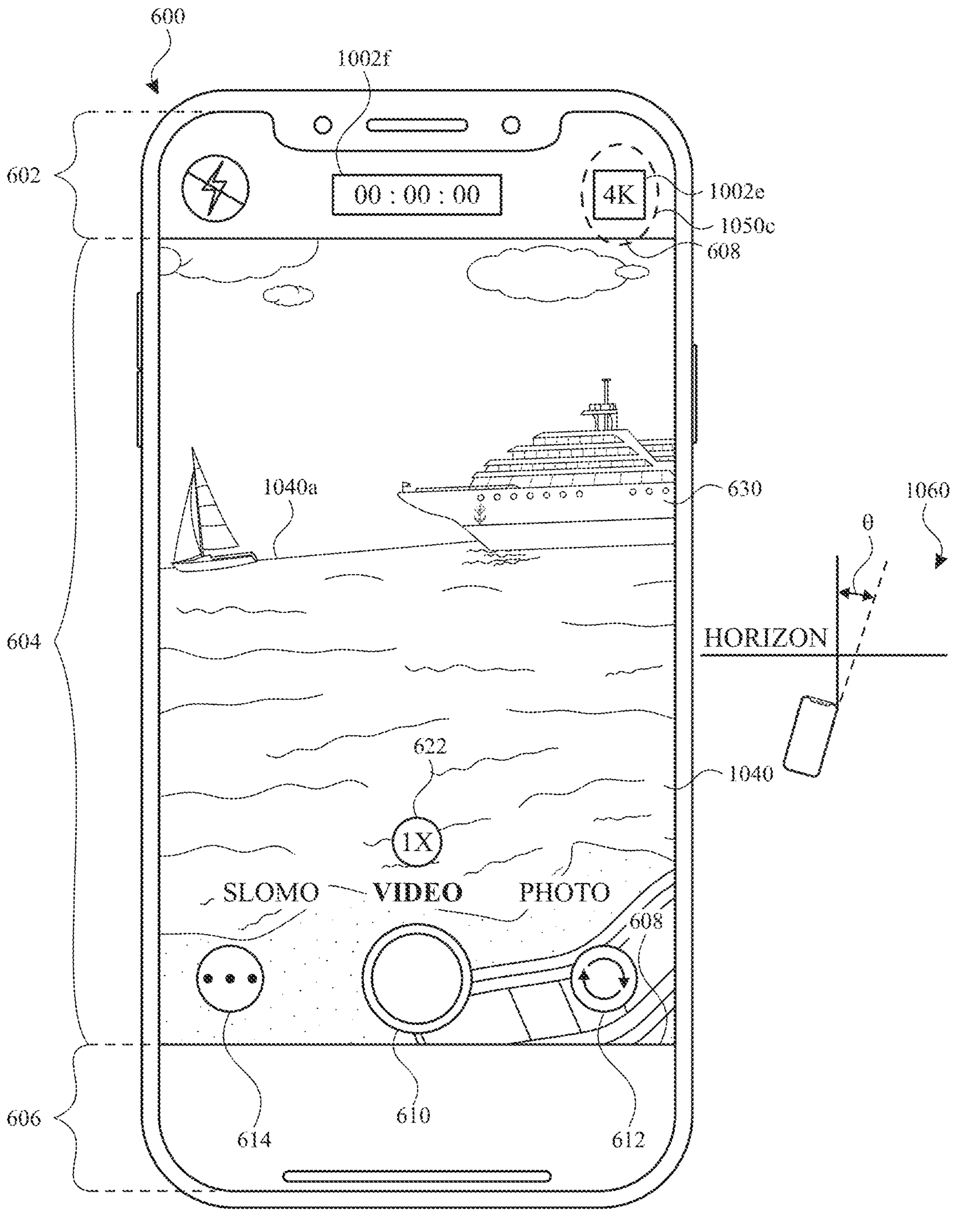

As illustrated in FIG. 10B, in response to detecting tap gesture 1050*a* or swipe right gesture 1050*b*, device 600 has transitioned from the photo camera mode to the video camera mode. Device 600 displays a revised set of indicators in indicator region 602, an (optionally) updated live preview 630, and updated camera mode affordances 620.

The revised set of indicators in indicator region 602 includes newly displayed video quality indicator 602*h* (e.g., because the newly selected mode (video (record) mode) is compatible with the features corresponding to video quality indicator 602*h*) and newly displayed record time indicator 602*i*, without displaying previously displayed animated image status indicator 602*d* (e.g., because the newly selected mode is incompatible with the feature corresponding to live animated image status indicator 602*d*). Video quality indicator 602*h* provides an indication of a video quality (e.g., resolution) at which videos will be recorded (e.g., when shutter affordance 610 is activated). In FIG. 10B, video quality indicator 602*h* indicates that the device is in 4K video quality recording mode and, as a result, when recording is activated the video will be recorded at the 4K video quality. In some embodiments, record time indicator 602*i* indicators the amount of time (e.g., in seconds, minutes, and/or hours) of a current ongoing vide. In FIG. 10B, record time indicator 602*i* indicates 00:00:00 because no video is currently being recorded. In some embodiments, the zoom of objects in live preview 630 change because of the change in camera mode (photo vs. video mode). In some embodiments, the zoom of objects in live preview 630 does not change despite the change in camera mode (photo vs. video mode). Note that the orientation 1060 of device 600 continues to be offset from the horizon and, as a result, horizon line 1040*a* continues to be displayed at an offset by an angle from device 600.

At FIG. 10B, while the device is in a 4K video quality recording mode (as indicated by video quality indicator 602*h*), live preview 630 is updated to no longer be displayed in indicator region 602 and control region 606, while continuing to be displayed in camera display region 604. In some embodiments, the backgrounds of indicator region 602 and control region 606 are also updated to be black. As a result, the user can no longer see live preview 630 in indicator region 602 and control region 606.

At FIG. 10B, device 600 detects, using the touch-sensitive surface, tap gesture 1050*c* at a location that corresponds to video quality indicator 602*h* (in indicator region 602).

Figure 10C:
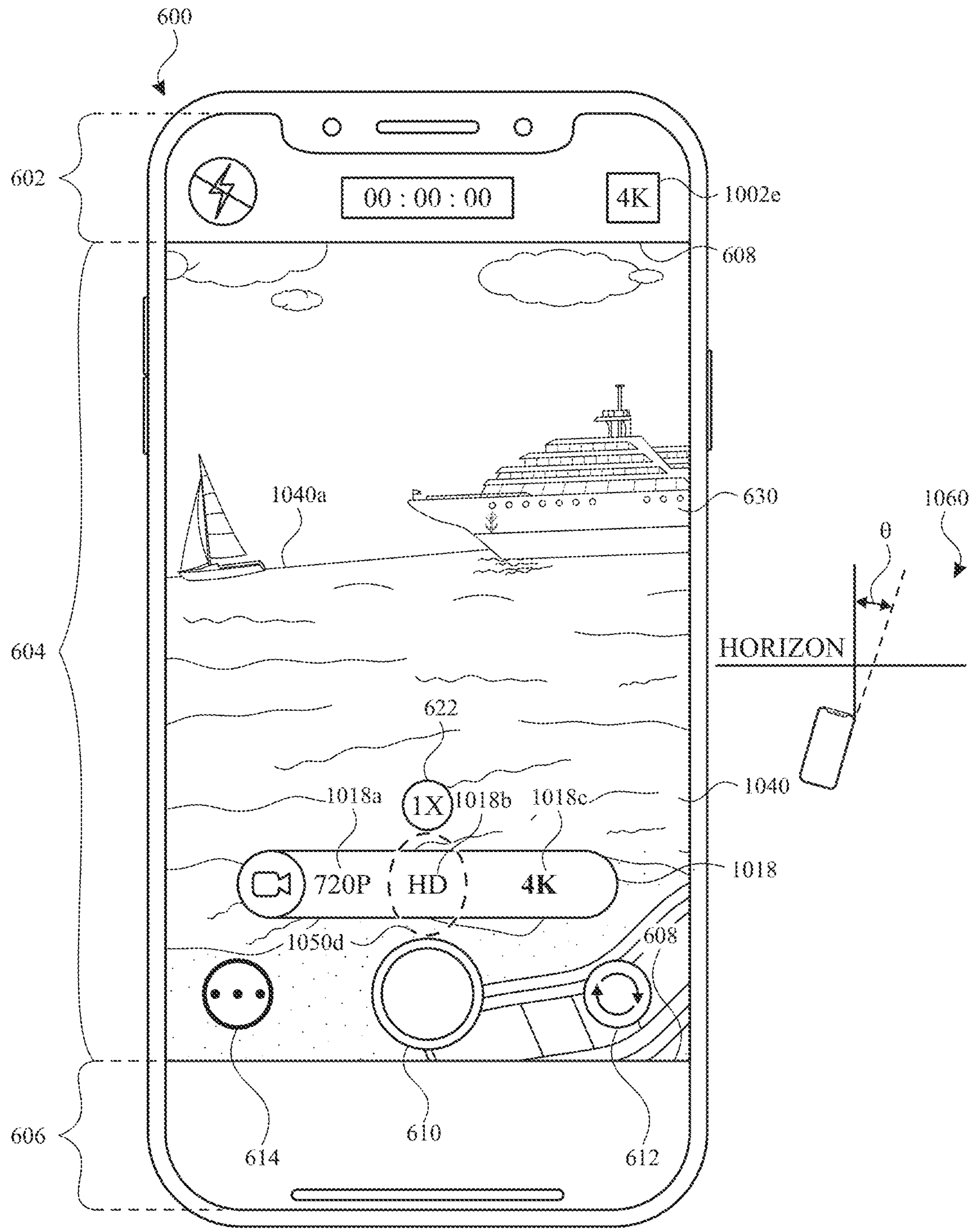

As illustrated in FIG. 10C, in response to detecting tap gesture 1050*c*, device 600 displays adjustable video quality control 1018, which includes 720p video quality affordance 1018*a*, HD video quality affordance 1018*b*, and 4K video quality affordance 1018*c* (bolded to indicate 4K video quality recording mode is currently active). At FIG. 10C, device 600 detects, using the touch-sensitive surface, tap gesture 1050*d* at a location that corresponds to HD video quality affordance 1018*b*.

Figure 10D:
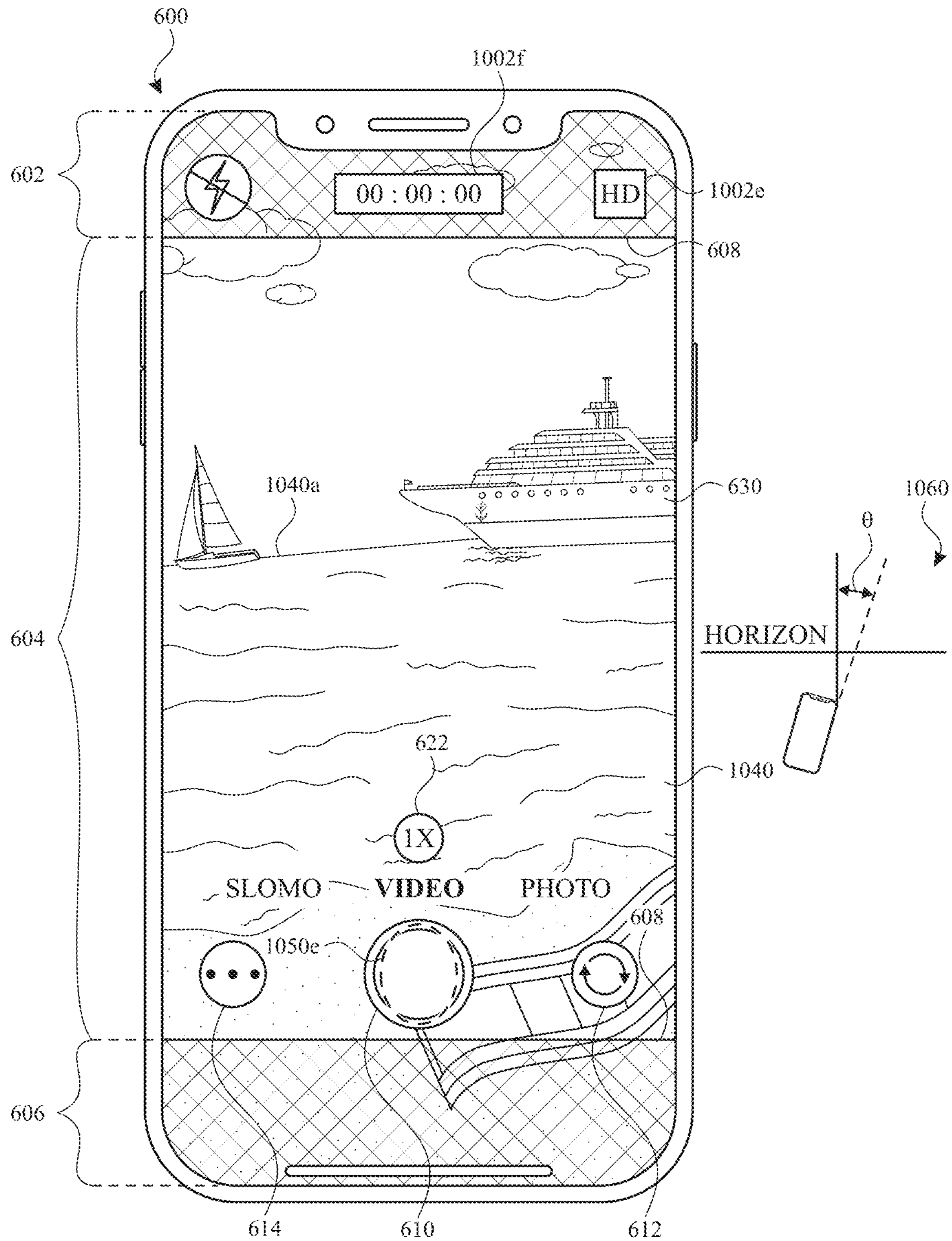

As illustrated in FIG. 10D, in response to detecting tap gesture 1050*d*, device 600 transitions the device (while not actively recording video) from 4K video quality recording mode to HD video quality recording mode. Device 600 updates video quality indicator 602*h* (e.g., to say "HD") to indicate that the device is in the HD video quality recording mode. As a result transitioning to the HD video quality recording mode, device 600 displays live preview 630 in indicator region 602, camera display region 604, and control region 606 (similar to FIG. 10A). This indicates to the user that visual content (beyond the visual content displayed in camera display region 604 and, optionally also, beyond visual content displayed in indicator region 602 and control region 606) will be stored as part of a video recording.

At FIG. 10D, while device 600 is in the HD video quality recording mode and the orientation 1060 of device 600 continues to be offset from the horizon and, as a result, horizon line 1040*a* continues to be displayed at an offset by an angle from device 600, device 600 detects, using the touch-sensitive surface, tap gesture 1050*e* at a location that corresponds to shutter affordance 610.

Figure 10E:
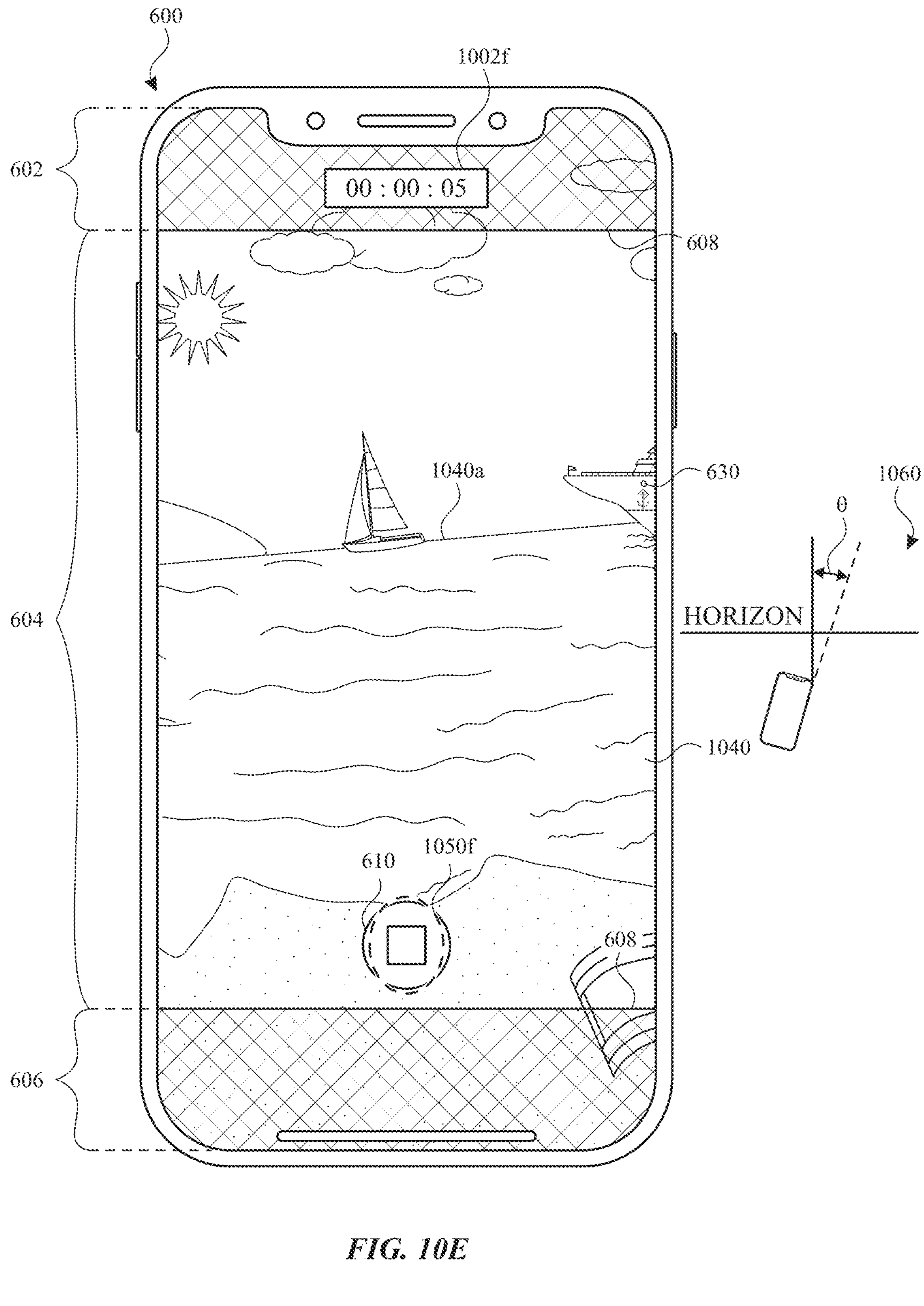

As illustrated in FIG. 10E, in response to detecting tap gesture 1050*e*, device 600 begins recording video in the HD video quality recording mode. In FIG. 10E (as in FIGS. 10A-10D), the content of live preview 630 continues to update as the scene in the field-of-view of the camera(s) changes. Visual elements of shutter affordance 610 have been updated to indicate that the device is recording a video and that re-activating shutter affordance 610 will end the recording. Record time indicator 602*i* has progressed in FIG. 10E to indicate that 5 second of video has been recorded thus far. Video quality indicator 602*h* is no longer displayed, thereby providing the user with a more complete view of live preview 630 and, optionally, because the video quality recording mode cannot be changed while recording video. Note that during the recording the orientation 1060 of device 600 continues to be offset from the horizon and, as a result, horizon line 1040*a* continues to be displayed at an offset by an angle from device 600. In some embodiments, orientation 1060 of device 600 varies during the video recording such that horizon line 1040*a* is recorded with varying degrees of offset from device 600.

At FIG. 10E, device 600 detects, using the touch-sensitive surface, tap gesture 1050*g* at a location that corresponds to shutter affordance 610. In response to tap gesture 1050*g*, device 600 stops the recording. The recording is stored in memory of device 600 for later retrieval, editing, and playback. The stored recording includes visual content of live preview 630 as was displayed in indicator region 602, camera display region 604, and control region 606. Further, the stored recording also includes visual content captured during the video recording by the camera(s) of device 600 that were not displayed as part of live preview 630.

Figure 10F:
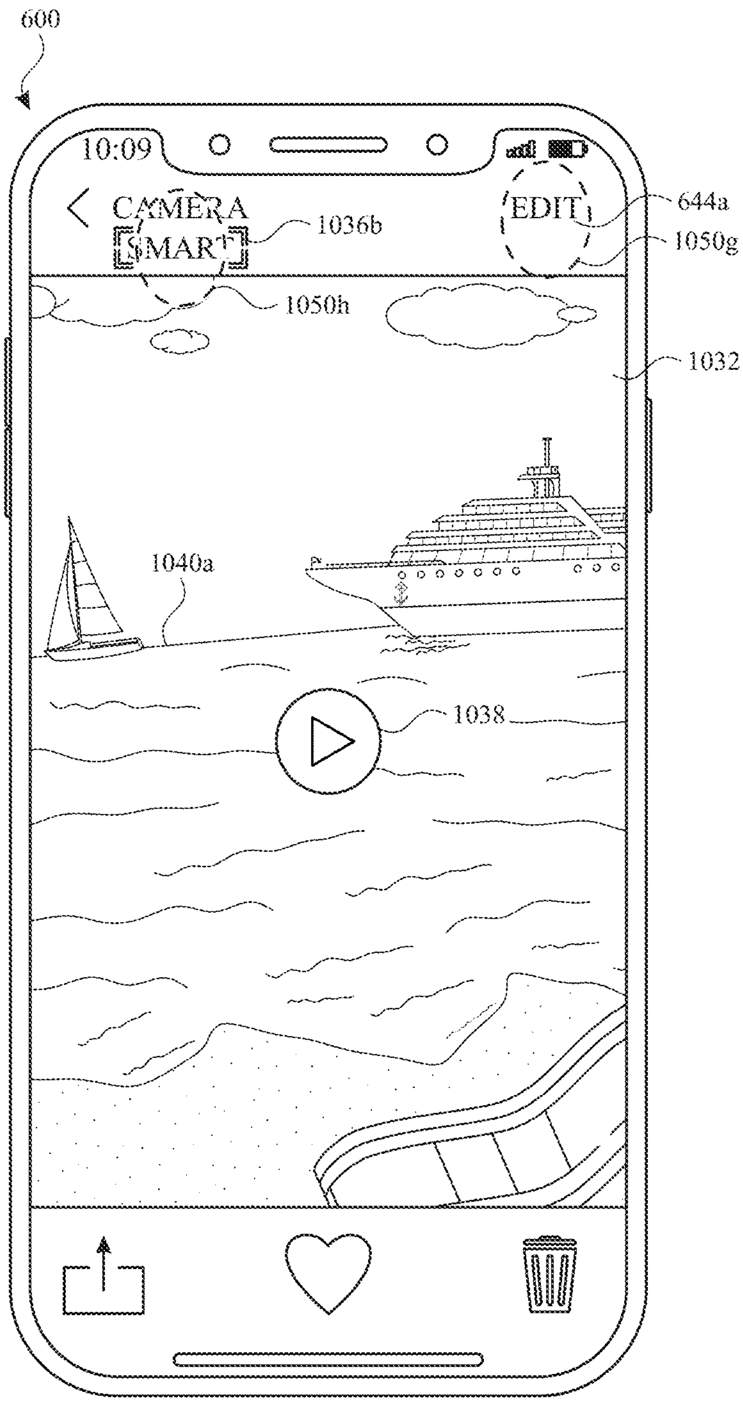

Subsequent to recording and storing the video recording, device 600 receives one or more user inputs to access the video recording. As illustrated in FIG. 10F, device 600 displays a frame of video recording 1032, which is available for playback, editing, deleting, and transmitting to other users. The displayed frame of video recording 1032 includes the visual content of live preview 630 that was displayed in the camera display region 604 during recording, but does not include visual content of live preview 630 that was displayed in indicator region 602 and control region 606. Device 600 overlays playback affordance 1038 onto the displayed frame of video recording 1032. Activation (e.g., tap on) playback affordance 1038 causes playback affordance 1038 to cease to be displayed and for playback of video recording 1032 to occur, which includes visual playback of the visual content of live preview 630 that was displayed in the camera display region 604 during recording, but does not include visual content of live preview 630 that was displayed in indicator region 602 and control region 606 (and also does not include recorded visual content that was not displayed in live preview 630 during the recording). The user interface of FIG. 10F also includes edit affordance 644*a* (for initiating a process for editing the video recording) and auto adjust affordance 1036*b* (for automatically editing the video recording).

Figure 10G:
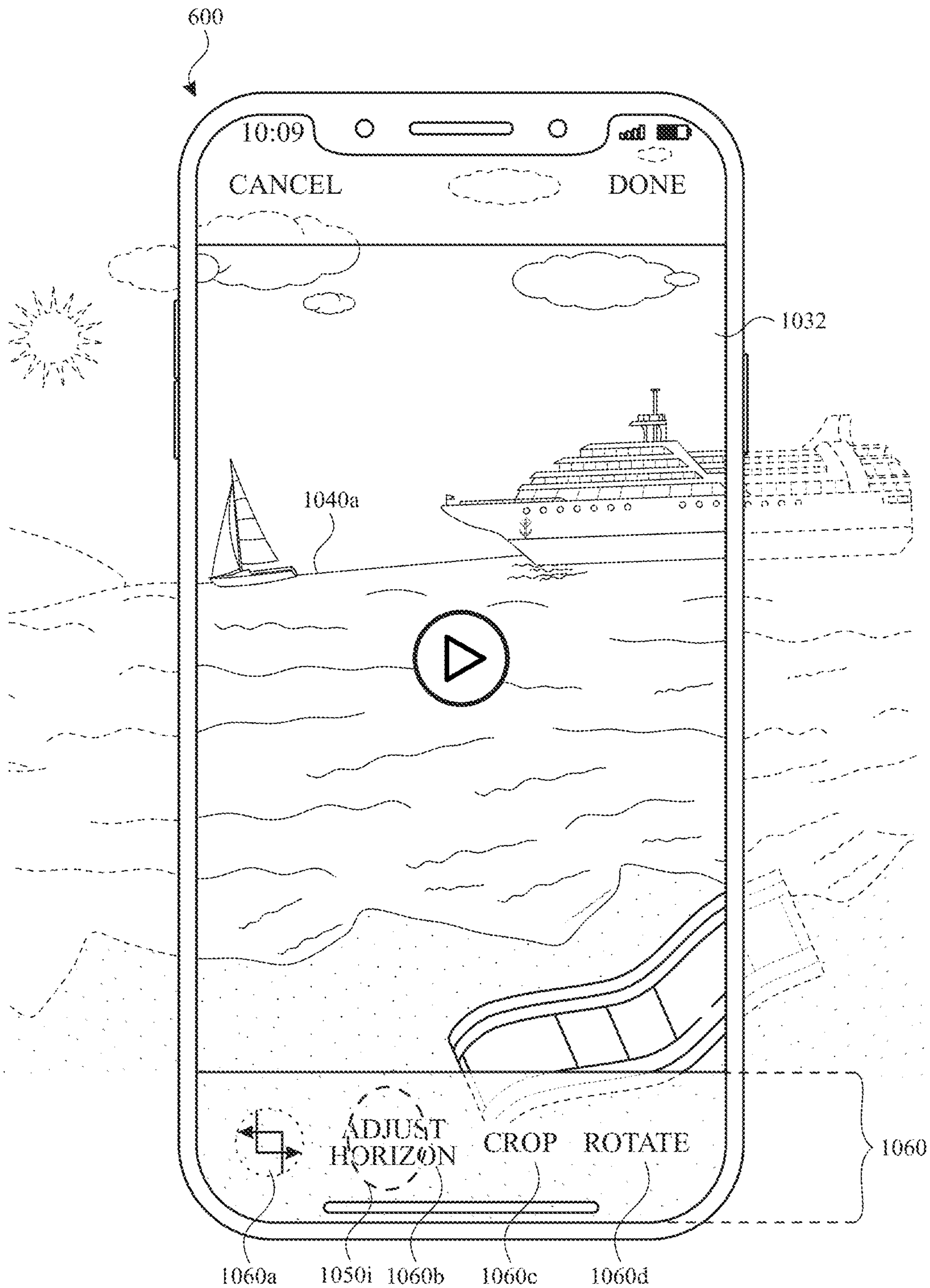

At FIG. 10F, device 600 detects, using the touch-sensitive surface, tap gesture 1050*g* at a location corresponding to edit affordance 644*a*. As illustrated in FIG. 10G, in response to detecting tap gesture 1050*g*, device 600 displays video editing options 1060, including affordance 1060*a* (for cropping and simultaneously rotating the video recording), adjust horizon affordance 1060*b* (for adjusting the horizon of the recording), affordance 1060*c* (for cropping the video recording), and affordance 1060*d* (for rotating the video recording). In some embodiments, cropping the recording merely reduces the visual content for playback (as compared to FIG. 10F) by, for example, further excluding portions of live preview 630 that would otherwise be displayed by activating playback affordance 1038 in FIG. 10F.

To improve understanding, FIG. 10G also includes representations of visual content that was recorded and stored as part of the video recording but was not displayed as part of the camera display region 604 during the recording. These representations shown outside of device 600 are not part of the user interface of device 600, but are provided for improved understanding. For example, FIG. 10G illustrates that visual content of live preview 630 that was displayed in indicator region 602 and control region 606 is stored as part of the video recording and that some visual content that was not displayed in live preview 630 during the recording is also stored as part of video recording 1032, all of which is available to device 600 for rotating video recording 1032 to correct the offset of the horizon line.

Figure 10H:
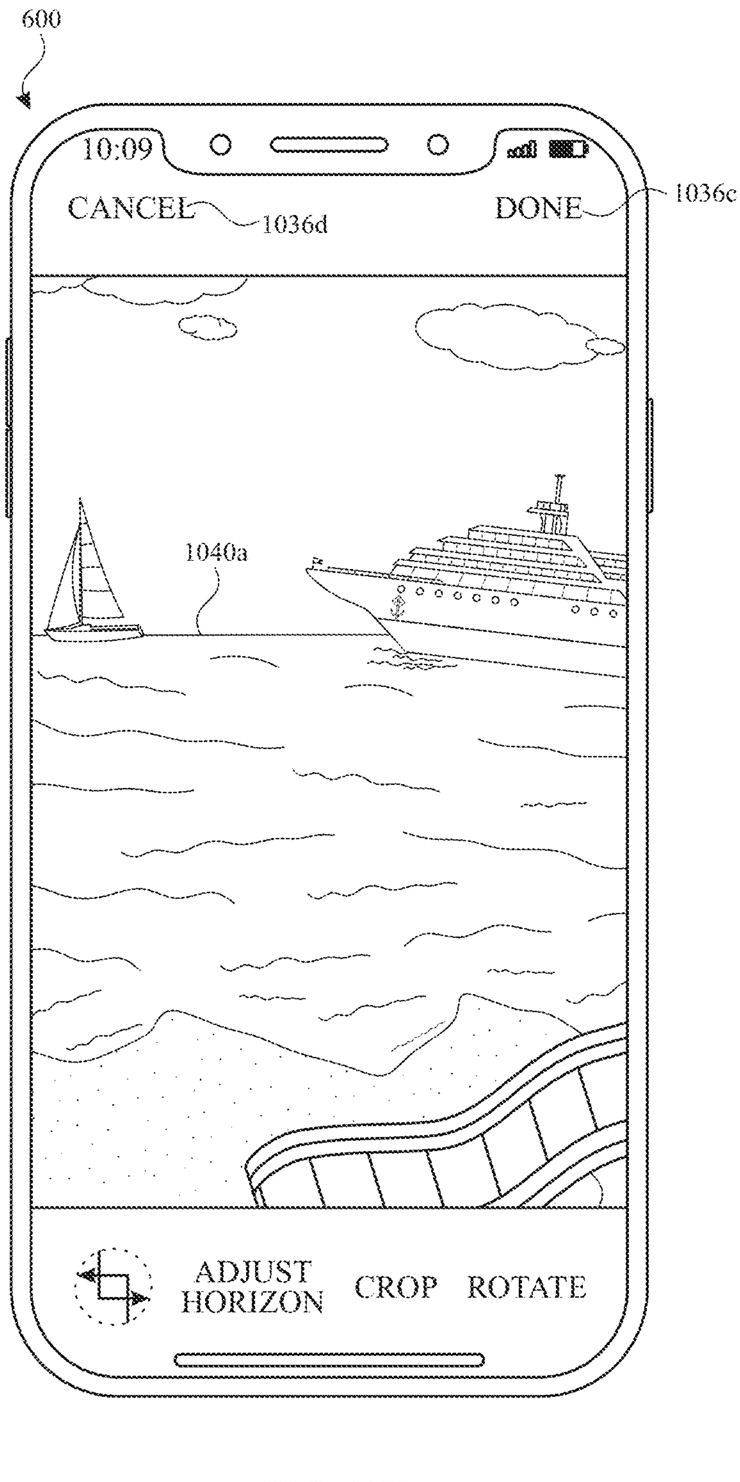

At FIG. 10G, while displaying video editing options 1060, device 600 detects, using the touch-sensitive surface, tap gesture 1050*i* at a location corresponding to adjust horizon affordance 1060*b*. As illustrated in FIG. 10H, in response to detecting tap gesture 1050*i*, device 600 modifies video recording 1032 such that horizon line 1040*a* is not displayed at an offset (e.g., is parallel to the top (or bottom) of the display of device 600) by using (e.g., bringing in) visual content that was not displayed in camera display region 604 during video recording and/or was not displayed in live preview 630 during video recording. Activation of done affordance 1036*c* preserves the modifications made to video recording 1032, while activation of cancel affordance 1036*d* reverts the modifications made to video recording 1032.

Returning to FIG. 10G, alternatively to device 600 detecting tap gesture 1050*g* to enter the editing mode, device 600 detects, using the touch-sensitive surface, tap gesture 1050*h* at a location corresponding to auto adjust affordance 1036*b*. In response to detecting tap gesture 1050*g*, device 600 automatically (and without requiring further user input) modifies video recording 1032 such that horizon line 1040*a* is not displayed at an offset (e.g., is parallel to the top (or bottom) of the display of device 600) by bringing in visual content that was not displayed in camera display region 604 during video recording and/or was not displayed in live preview 630 during video recording, as shown in FIG. 10H. In some embodiments, auto adjustment includes additional adjustments, beyond horizon line correction (e.g., sharpening, exposure correction) that can use visual content that was not displayed in camera display region 604 during video recording and/or was not displayed in live preview 630 during video recording.

Figure 10I:
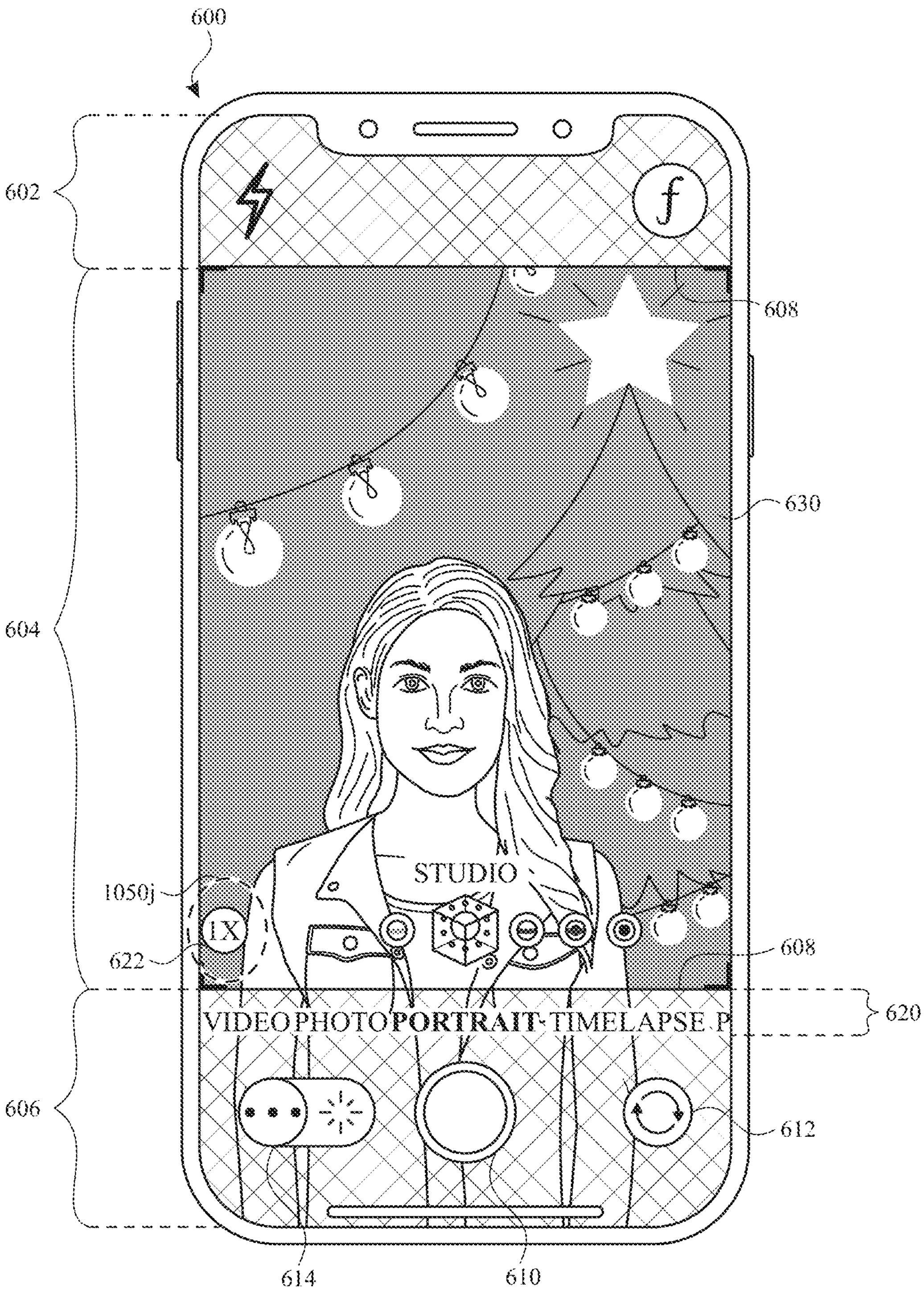
Figure 10J:
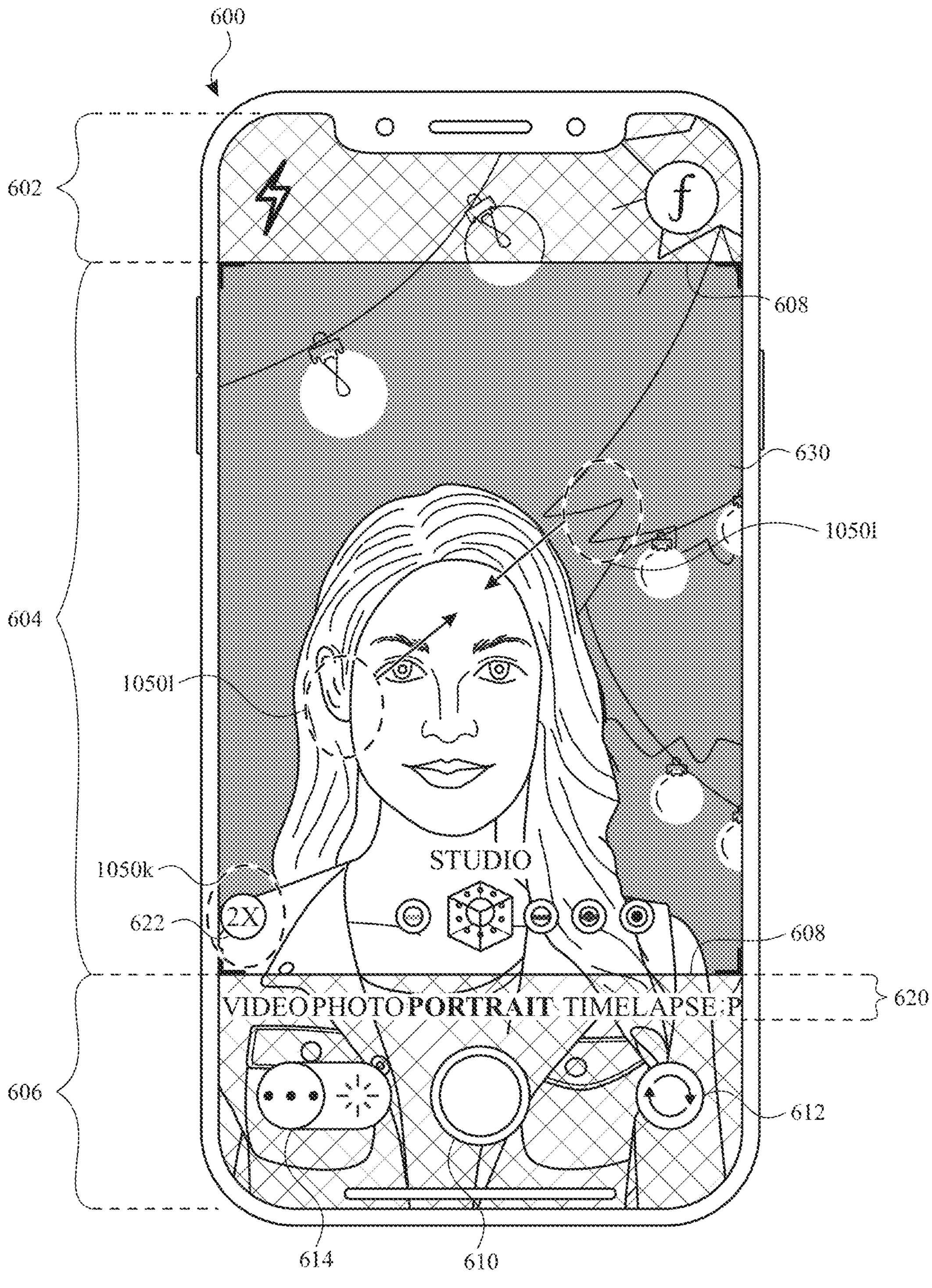
Figure 10K:
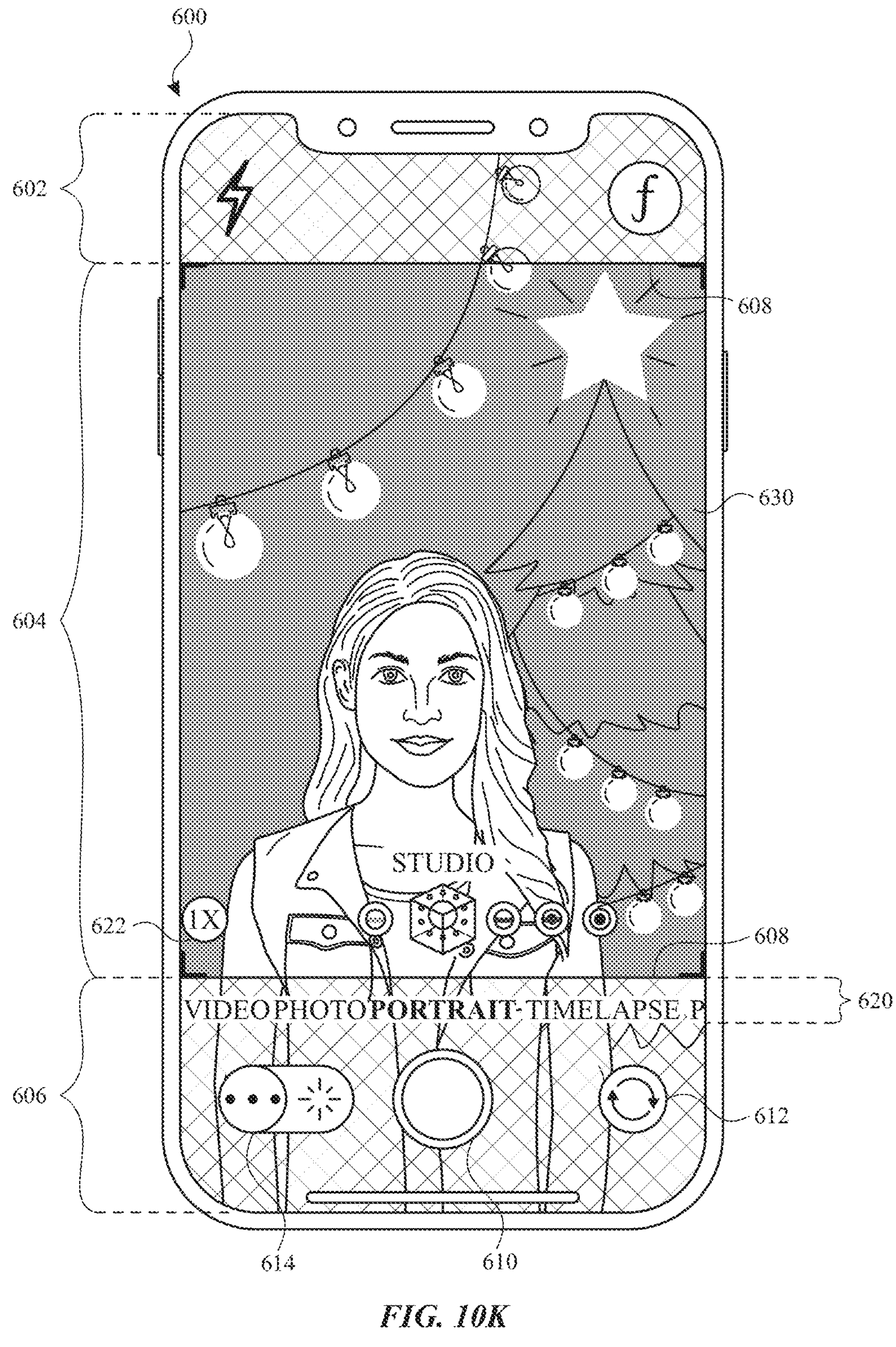

In some embodiments, as illustrated in FIGS. 10I-10K, various user inputs change the magnification of live preview 630. In FIG. 10I, device 600 detects, using the touch-sensitive surface, tap gesture 1050*j* at a location corresponding to zoom affordance 622 and, in response, updates visual elements of zoom affordance 622 and zooms live preview 630 to a predetermined zoom level (e.g., 2X) that is not based on a magnitude of tap gesture 1050*j*, as shown in FIG. 10J. In FIG. 10J, device 600 detects, using the touch-sensitive surface, tap gesture 1050*k* at a location corresponding to zoom affordance 622 and, in response, updates visual elements of zoom affordance 622 and zooms live preview 630 to a second predetermined zoom level (e.g., 1X) that is not based on a magnitude of tap gesture 1050*k*, as shown in FIG. 10K. Alternative to detecting tap gesture 1050*k*, device 600 detects, using the touch-sensitive surface, pinch (or de-pinch) gesture 10501 at a location corresponding to live preview 630 in camera display region 604 and, in response, zooms live preview 630 to a zoom level (e.g., 1.7X) that is based on a magnitude of pinch (or de-pinch) gesture 10501 (and, optionally, updates visual elements of zoom affordance 622).

FIGS. 11A-11C are a flow diagram illustrating a method for displaying a camera field-of-view using an electronic device in accordance with some embodiments. Method 1100 is performed at a device (e.g., 100, 300, 500, 600) with a display device and one or more cameras (e.g., one or more cameras (e.g., dual cameras, triple camera, quad cameras, etc.) on different sides of the electronic device (e.g., a front camera, a back camera)). Some operations in method 1100 are, optionally, combined, the orders of some operations are, optionally, changed, and some operations are, optionally, omitted.

As described below, method 1100 provides an intuitive way for displaying a camera field-of-view. The method reduces the cognitive burden on a user for displaying a camera field-of-view, thereby creating a more efficient human-machine interface. For battery-operated computing devices, enabling a user to access a camera field-of-view faster and more efficiently conserves power and increases the time between battery charges.

The electronic device (e.g., 600) receives (1102) a request to display a camera user interface.

In response to receiving the request to display the camera user interface and in accordance with a determination that respective criteria are not satisfied (1104) (e.g., criteria can include a criterion that is satisfied when the device is configured to capture certain media (e.g., 4K video) or configured to operate in certain modes (e.g., portrait mode)), the electronic device (e.g., 600) displays (1106), via the display device, the camera user interface. The camera user interface includes (1108) a first region (e.g., 604) (e.g., a camera display region), the first region including a representation of a first portion of a field-of-view (e.g., 630) of the one or more cameras. The camera user interface includes (1110) a second region (e.g., 606) (e.g., a camera control region), the second region including a representation of a second portion of the field-of-view (e.g., 630) of the one or more cameras. In some embodiments, the second portion of the field-of-view of the one or more cameras is visually distinguished (e.g., having a dimmed appearance) (e.g., having a semi-transparent overlay on the second portion of the field-of-view of the one or more cameras) from the first portion. In some embodiments, the representation of the second portion of the field-of-view of the one or more cameras has a dimmed appearance when compared to the representation of the first portion of the field-of-view of the one or more cameras. In some embodiments, the representation of the second portion of the field-of-view of the one or more cameras is positioned above and/or below the camera display region (e.g., 604) in the camera user interface. By displaying the camera user interface in response to receiving the request to display the camera user interface and in accordance with a determination that respective criteria are not satisfied, where the camera user interface includes the first region and the second region, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While the camera user interface is displayed, the electronic device (e.g., 600) detects (1112) an input corresponding to a request to capture media (e.g., image data (e.g., still images, video)) with the one or more cameras (e.g., a selection of an image capture affordance (e.g., a selectable user interface object) (e.g., a shutter affordance that, when activated, captures an image of the content displayed in the first region)).

In response to detecting the input corresponding to a request to capture media (e.g., video, photo) with the one or more cameras, the electronic device (e.g., 600) captures (1114), with the one or more cameras, a media item (e.g., video, photo) that includes visual content corresponding to (e.g., from) the first portion of the field-of-view (e.g., 630) of the one or more cameras and visual content corresponding to the second portion (e.g., from) of the field-of-view of the one or more cameras.

After capturing the media item, the electronic device (e.g., 600) receives (1116) a request to display the media item (e.g., a request to display).

In some embodiments, after capturing the media item, the electronic device (e.g., 600) performs (1118) an object tracking (e.g., object identification) operation using at least a third portion of the visual content from the second portion of the field-of-view of the one or more cameras. Performing an object tracking operation (e.g., automatically, without user input) using at least a third portion of the visual content from the second portion of the field-of-view of the one or more camera after capturing the media item reduces the number of inputs needed to perform an operation, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to receiving the request to display the media item, the electronic device (e.g., 600) displays (1120) a first representation of the visual content corresponding to the first portion of the field-of-view (e.g., 630) of the one or more cameras without displaying a representation of at least a portion of (or all of) the visual content corresponding to the second portion of the field-of-view of the one or more cameras. In some embodiments, the captured image data includes the representations of both the first and second portions of the field-of-view (e.g., 630) of the one or more cameras. In some embodiments, the representation of the second portion is omitted from the displayed representation of the captured image data, but can be used to modify the displayed representation of the captured image data. For example, the second portion can be used for camera stabilization, object tracking, changing a camera perspective (e.g., without zooming), changing camera orientation (e.g., without zooming), and/or to provide additional image data that can be incorporated into the displayed representation of the captured image data.

In some embodiments, while displaying the first representation of the visual content, the electronic device (e.g., 600) detects (1122) a set of one or more inputs corresponding to a request to modify (e.g., edit) the representation of the visual content. In some embodiments, in response to detecting the set of one or more inputs, the electronic device (e.g., 600) displays (1124) a second (e.g., a modified or edited) representation of the visual content. In some embodiments, the second representation of the visual content includes visual content from at least a portion of the first portion of the field-of view-of the one or more cameras and visual content based on (e.g., from) at least a portion of the visual content from the second portion of the field-of-view of the one or more cameras that was not included in the first representation of the visual content. Displaying the second representation of the visual content in response to detecting the set of one or more inputs enables a user to access visual content from at least the portion of the first portion of the field-of view-of the one or more cameras and visual content based on at least the portion of the visual content from the second portion of the field-of-view of the one or more cameras that was not included in the first representation of the visual content, thus enabling the user to access more of the visual content and/or different portions of the visual content. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, a second representation of the visual content is generated and displayed in response to an edit operation. In some embodiments, the second representation includes at least a portion of the captured visual content that was not included in the first representation.

In some embodiments, the first representation of the visual content is a representation from a first visual perspective (e.g., visual perspective of one or more cameras at the time the media item was captured, an original perspective, an unmodified perspective). In some embodiments, the second representation of the visual content is a representation from a second visual perspective different from the first visual perspective that was generated based on the at least a portion of the visual content from the second portion of the field-of-view of the one or more cameras that was not included in the first representation of the visual content (e.g., changing the representation from the first to the second visual perspective adds or, in the alternative, removes some of visual content corresponding to the second portion). Providing the second representation of the visual content that is a representation from a second visual perspective different from the first visual perspective that was generated based on the at least a portion of the visual content from the second portion of the field-of-view of the one or more cameras that was not included in the first representation of the visual content provides a user with access to and enables the user to view additional visual content. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first representation of the visual content is a representation in a first orientation (e.g., visual perspective of one or more cameras at the time the media item was captured, an original perspective, an unmodified perspective). In some embodiments, the second representation of the visual content is a representation in a second orientation different from the first orientation that was generated based on the at least a portion of the visual content from the second portion of the field-of-view of the one or more cameras that was not included in the first representation of the visual content (e.g., changing the representation from the first to the second orientation (e.g., horizon, portrait, landscape) adds or, in the alternative, removes some of visual content corresponding to the second portion). Providing the second representation of the visual content that is a representation in a second orientation different from the first orientation that was generated based on the at least a portion of the visual content from the second portion of the field-of-view of the one or more cameras that was not included in the first representation of the visual content provides a user with access to and enables the user to view additional visual content. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first representation is displayed at a first zoom level. In some embodiments, the first representation of the visual content is a representation in at a first zoom level (e.g., visual perspective of one or more cameras at the time the media item was captured, an original perspective, an unmodified perspective). In some embodiments, the second representation of the visual content is a representation in a second zoom level different from the first zoom level that was generated based on the at least a portion of the visual content from the second portion of the field-of-view of the one or more cameras that was not included in the first representation of the visual content (e.g., changing the representation from the first to the second zoom level adds or, in the alternative, removes some of visual content corresponding to the second portion). In some embodiments, the request to change the first zoom level to the second zoom level, while the device is operating in a portrait capturing mode, corresponds to a selection of an zoom option affordance that is displayed while the device is configured to operate in portrait mode.

In some embodiments, the first representation of the visual content is generated based at least in part on a digital image stabilization operation using at least a second portion of the visual content from the second portion of the field-of-view of the one or more cameras (e.g., using pixels from the visual content corresponding to the second portion in order to stabilize capture of camera).

In some embodiments, the request to display the media item is a first request to display the media item (1126). In some embodiments, after displaying the first representation of the visual content corresponding to the first portion of the field-of-view of the one or more cameras without displaying the representation of at least a portion of (or all of) the visual content corresponding to the second portion of the field-of-view of the one or more cameras, the electronic device (e.g., 600) receives (1128) a second request to display the media item (e.g., a request to edit the media item (e.g., second receiving the second request includes detecting one or more inputs corresponding to a request to display the media item)). In some embodiments, in response to receiving the second request to display the media item (e.g., a request to edit the media item), the electronic device (e.g., 600) displays (1130) the first representation of the visual content corresponding to the first portion of the field-of-view (e.g., 630) of the one or more cameras and the representation of the visual content corresponding to the second portion of the field-of-view of the one or more cameras. In some embodiments, the representation of the second portion of the field-of-view (e.g., 630) of the one or more cameras has a dimmed appearance when compared to the representation of the first portion of the field-of-view of the one or more cameras in the displayed media. In some embodiments, the displayed media has a first region that includes the representation and a second media that includes the representation of the visual content corresponding to the second portion of the field-of-view (e.g., 630) of the one or more cameras.

In some embodiments, in response to receiving the request to display the camera user interface and in accordance with a determination that respective criteria are satisfied, the electronic device (e.g., 600) displays (1132), via the display device, a second camera user interface, the second camera user interface the including the representation of the first portion of the field-of-view of the one or more cameras without including the representation of the second portion of the field-of-view of the one or more cameras. By displaying a second camera user interface that includes the representation of the first portion of the field-of-view of the one or more cameras without including the representation of the second portion of the field-of-view of the one or more cameras in response to receiving the request to display the camera user interface and in accordance with a determination that respective criteria are satisfied, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in response to detecting input corresponding to a request to capture media, the electronic device (e.g., 600) captures a media item that includes visual content corresponding to the first portion of the field-of-view of the one or more cameras without capturing media corresponding to the second portion of the field-of-view of the one or more cameras.

In some embodiments, the electronic device (e.g., 600) receives (1134) a request to display a previously captured media item (e.g., a request to edit the media item). In some embodiments, in response to receiving the request to display the previously captured media item (1136) (e.g., a request to edit the media item), in accordance with a determination that the previously captured media item was captured when the respective criteria were not satisfied, the electronic device (e.g., 600) displays an indication of additional content (e.g., the indication includes an alert the media item includes additional content that can be used, when a media item is captured that does include additional content, the indication is displayed). By displaying an indication of additional content in response to receiving the request to display the previously captured media item and in accordance with a determination that the previously captured media item was captured when the respective criteria were not satisfied, the electronic device provides a user with additional control options (e.g., for editing the media item), which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in response to receiving the request to display the previously captured media item (1136) (e.g., a request to edit the media item), in accordance with a determination that the previously captured media item was captured when the respective criteria was satisfied, the electronic device (e.g., 600) forgoes display of (1140) an indication of additional content (e.g., when a media item is captured that does not include additional content, the media item is not displayed).

In some embodiments, the respective criteria includes a criterion that is satisfied when the electronic device (e.g., 600) is configured to capture a media item with a resolution of four thousand horizontal pixels or greater.

In some embodiments, the respective criteria includes a criterion that is satisfied when the electronic device (e.g., 600) is configured to operate in a portrait mode at a predetermined zoom level (e.g., portrait mode doesn't include additional content while going between zoom levels (e.g., 0.5×, 1×, 2× zooms)).

In some embodiments, the respective criteria include a criterion that is satisfied when at least one camera (e.g., a peripheral camera) of the one or more cameras cannot maintain a focus (e.g., on one or more objects in the field-of-view) for a predetermined period of time (e.g., 5 seconds).

In some embodiments, the input corresponding to the request to capture media with the one or more cameras is a first input corresponding to the request to capture media with the one or more cameras. In some embodiments, while the camera user interface is displayed, the electronic device detects a second input corresponding to a request to capture media with the one or more cameras. In some embodiments, in response to detecting the second input corresponding to the request to capture media with the one or more cameras and in accordance with a determination that the electronic device is configured to capture visual content corresponding to the second portion of the field-of-view of the one or more cameras based on an additional content setting (e.g., **3702*a*, 3702*a*2, 3702*a*3 in FIG. 37), the electronic device captures the first representation (e.g., displayed in region 604) of the visual content corresponding to the first portion of the field-of-view of the one or more cameras and capturing the representation (e.g., displayed in regions 602 and/or 606**) of at least the portion of the visual content corresponding to the second portion of the field-of-view of the one or more cameras. In some embodiments, the electronic device displays a settings user interface that includes an additional content capture setting affordance, that when selected, causes the electronic device to change into or out of a state in which the electronic device automatically, without additional user input, captures the second content in response to a request to capture media. In some embodiments, the additional content capture setting is user configurable. In some embodiments, in response to detecting the second input corresponding to the request to capture media with the one or more cameras and in accordance with a determination that the electronic device is not configured to capture visual content corresponding to the second portion of the field-of-view of the one or more cameras based on the additional content setting, the electronic device captures the first representation of the visual content corresponding to the first portion of the field-of-view of the one or more cameras without capturing the representation of at least the portion of the visual content corresponding to the second portion of the field-of-view of the one or more cameras. In some embodiments, the electronic device forgoes capturing the second portion of the field-of-view of the one or more cameras.

Note that details of the processes described above with respect to method 1100 (e.g., FIGS. 11A-11C) are also applicable in an analogous manner to the methods described above and below. For example, methods 700, 900, 1300, 1500, 1700, 1900, 2000, 2100, 2300, 2500, 2700, 2800, 3000, 3200, 3400, 3600, and 3800 optionally include one or more of the characteristics of the various methods described above with reference to method 1100. For brevity, these details are not repeated below.

Figure 12A:
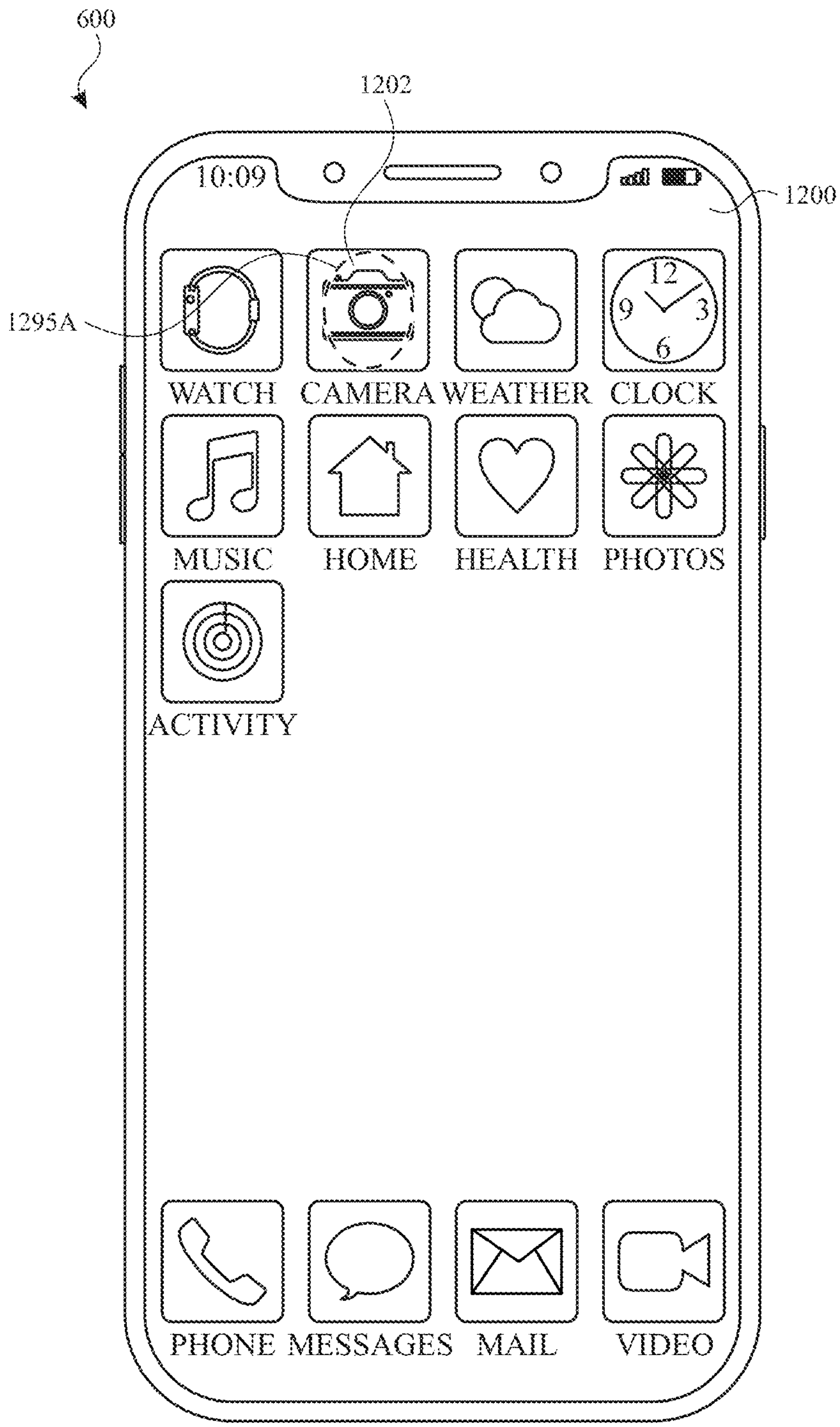
FIGS. 12A-12K illustrate exemplary techniques and user interfaces for accessing media items using an electronic device in accordance with some embodiments.
Figure 13B:
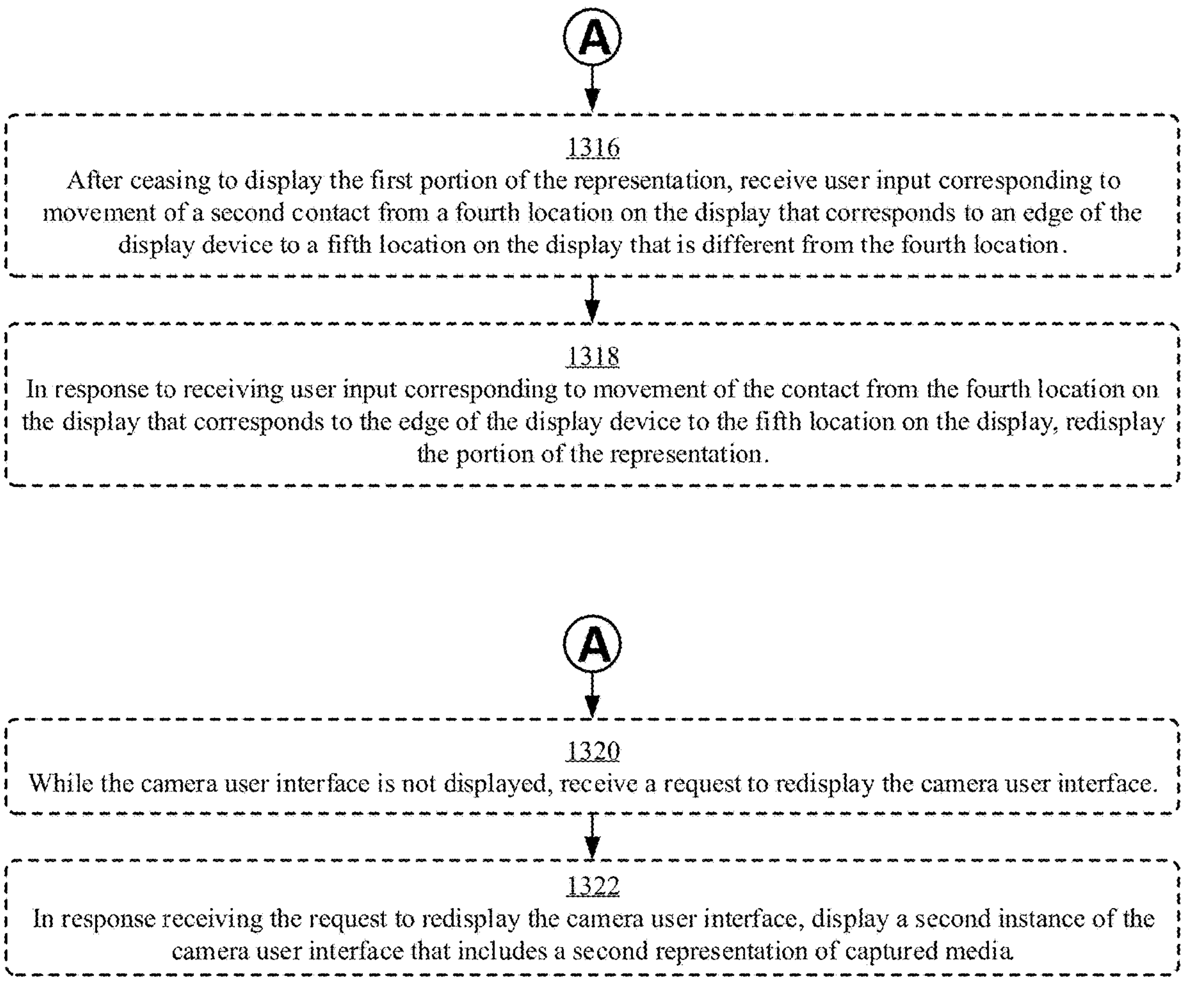

FIGS. 12A-121 illustrate exemplary user interfaces for accessing media items using an electronic device in accordance with some embodiments. The user interfaces in these figures are used to illustrate the processes described below, including the processes in FIGS. 13A-13B.

As illustrated in FIG. 12A, device 600 displays home user interface screen 1200 that includes camera launch icon 1202. While displaying home user interface 1200, device 600 detects input 1295*a* on camera launch icon 1202.

Figure 12B:
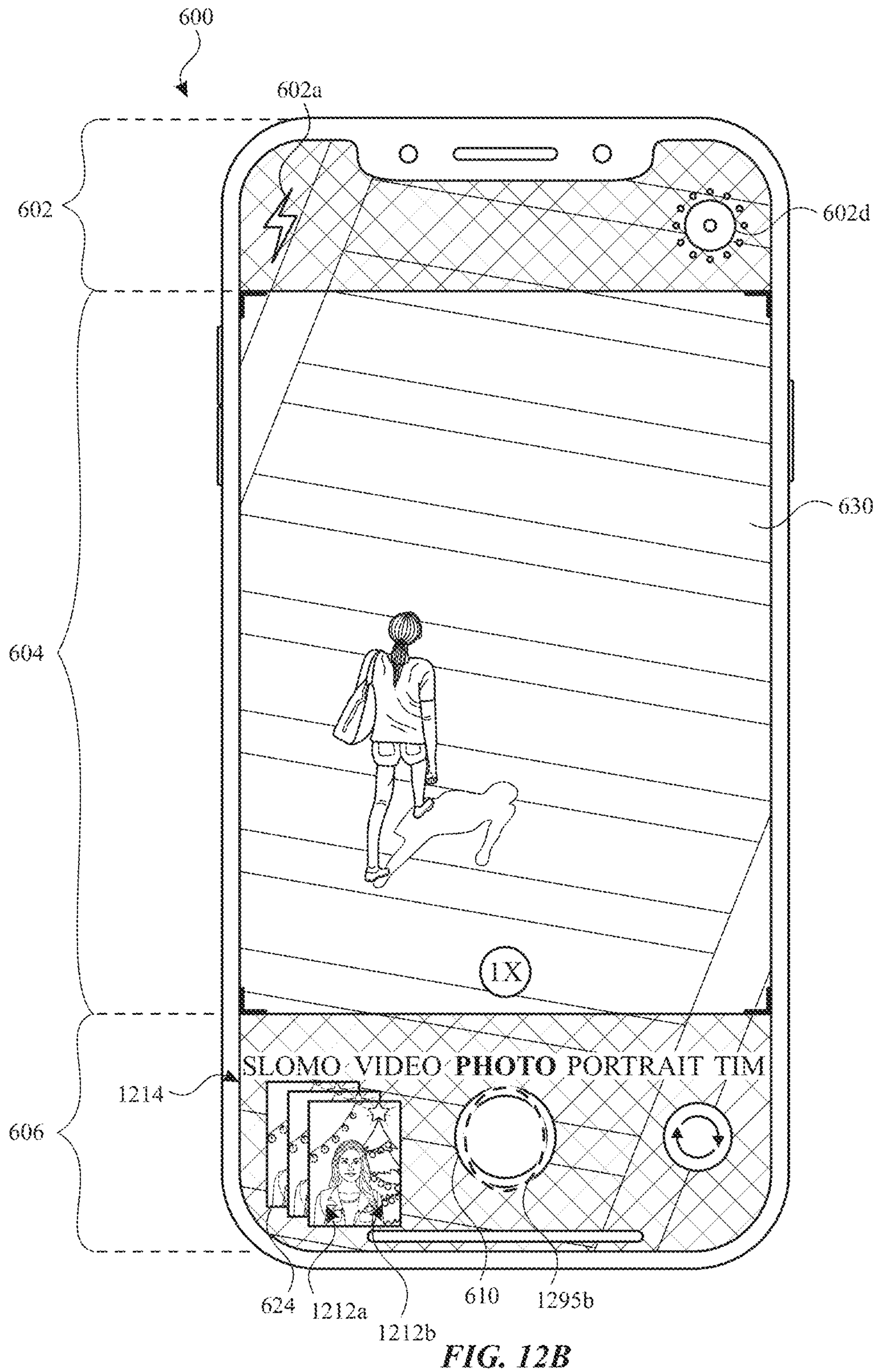

In response to detecting input 1295*a*, device 600 displays a user interface that includes an indicator region 602, camera display region 604, and control region 606, as seen in FIG. 12B. Indicator region 602 includes a flash indicator 602*a* and an animated image status indicator 602*d* that shows that device 600 is currently configured to capture animated images (e.g., capture a predefined number of images in response to a request to capture media). Camera display region 604 includes live preview 630. Live preview 630 is a representation of the field-of-view of one or more cameras of device 600 (e.g., a rear-facing camera).

Control region 606 includes media collection 624 collection 624. Device 600 displays media collection 624 collection 624 as being stacked and close to device edge 1214. Media collection 624 collection 624 includes first portion of media collection 1212*a* (e.g., left half of media collection 624 collection 624) and second portion of media collection 1212*b* (e.g., the top representations in the stack of media collection 624 collection 624). In some embodiments, when the camera user interface is launched, device 600 automatically, without user input, displays an animation of media collection 624 collection 624 sliding in from device edge 1214 towards the center of device 600. In some embodiments, first portion of media collection 1212*b* is not initially displayed when the animation begins (e.g., only the top representation is initially visible). In addition, camera control region 612 includes shutter affordance 610. In FIG. 12B, device 600 detects a tap input 1295*b* on shutter affordance 610 while live preview 630 shows a woman walking across a crosswalk.

FIGS. 12C-12F illustrate the capture of animated media in response to input 1295*b*.

Figure 12C:
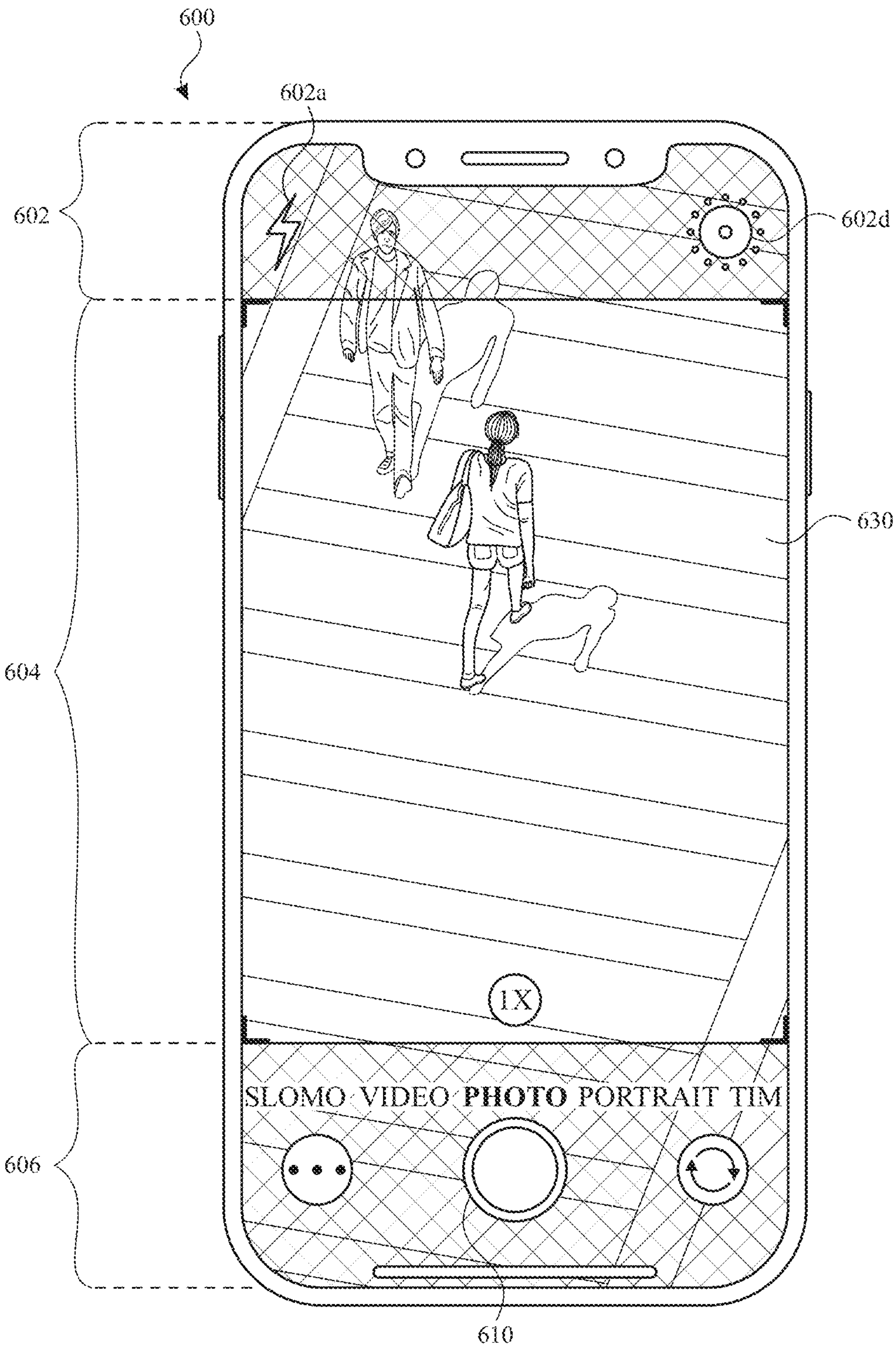

In FIG. 12C, corresponding to a first time point during the capture of the animated media (e.g., capture of a predefined plurality of images, in sequence), live preview 630 shows the woman moving further across the crosswalk and a man having entered the crosswalk. Control region 606 does not include media collection 624 collection 624, which is not shown while media is being captured. In some embodiments, media collection 624 is displayed while capturing media. In some embodiments, media collection 624 is displayed with only a single representation (e.g., the top representation of the stack) while capturing media.

Figure 12D:
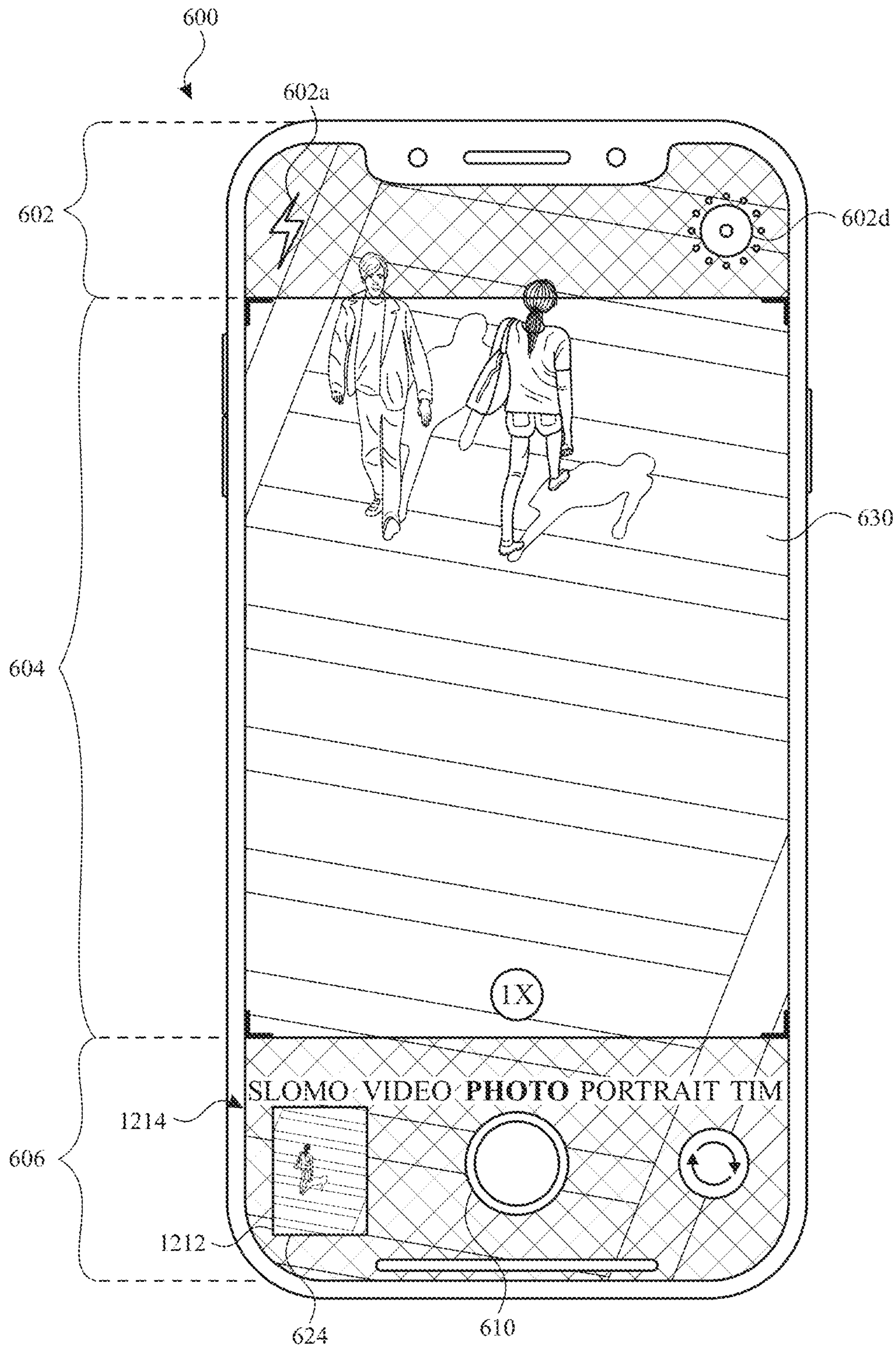

In FIG. 12D, corresponding to a second time point during the capture of the animated media, live preview 630 shows the woman beginning to exit the crosswalk while the man moves further into the crosswalk. Media collection 624 is shown and includes a representation of a first image of the plurality of images captured during the ongoing capture of animated media (e.g., an image captured 0.5 seconds after input 1295*b* was detected).

Figure 12E:
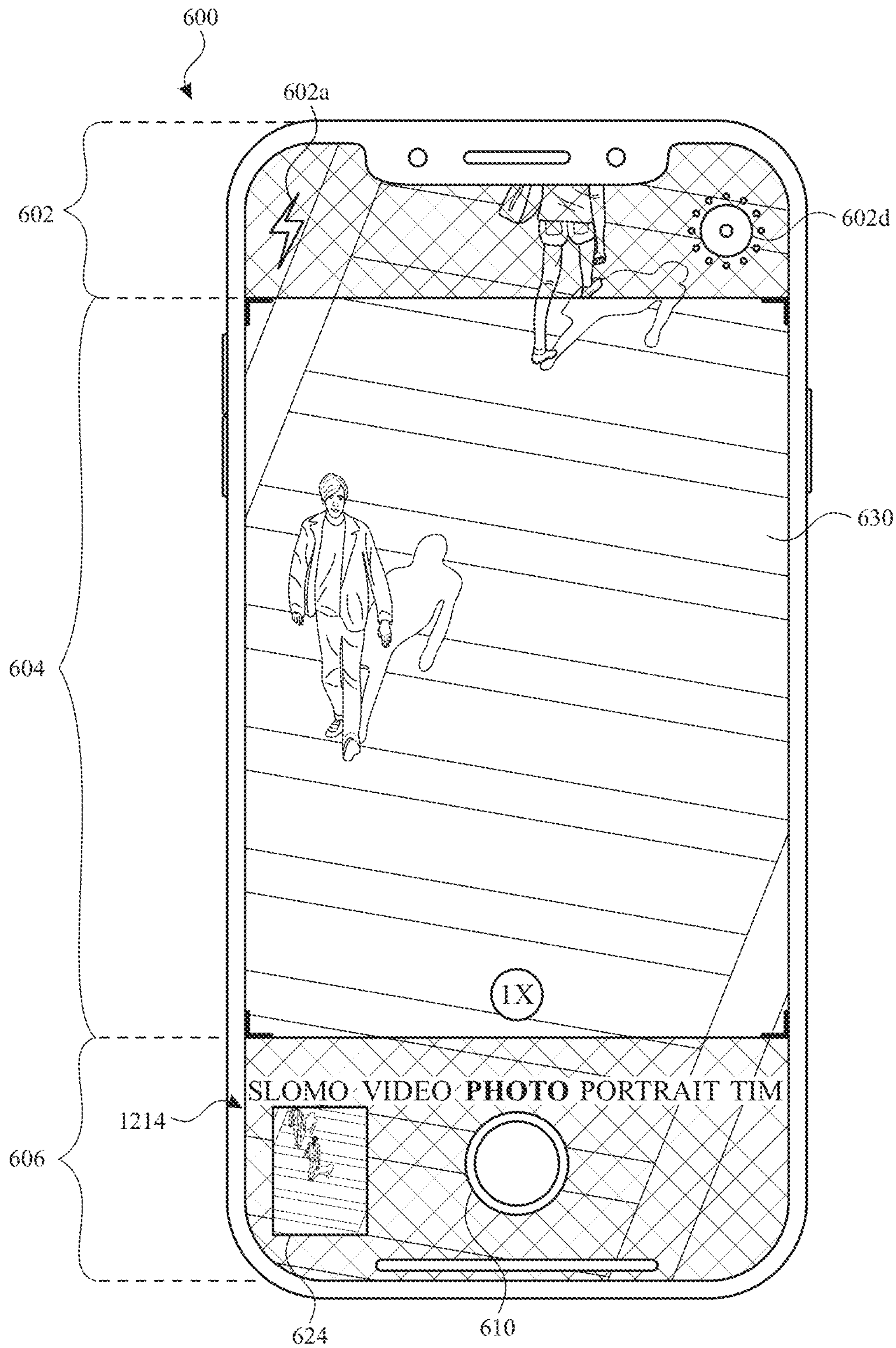

In FIG. 12E, corresponding to a third time point during the capture of the animated media, live preview 630 shows the woman having partially exited the crosswalk and the man in the middle of the crosswalk. Media collection 624 is shown and includes a representation of a second image of the plurality of images captured during the ongoing capture of animated media (e.g., an image captured 1 second after input 1295*b* was detected). In some embodiments, the second image is overlaid over the representation shown in FIG. 12D (e.g., as a stack).

Figure 12F:
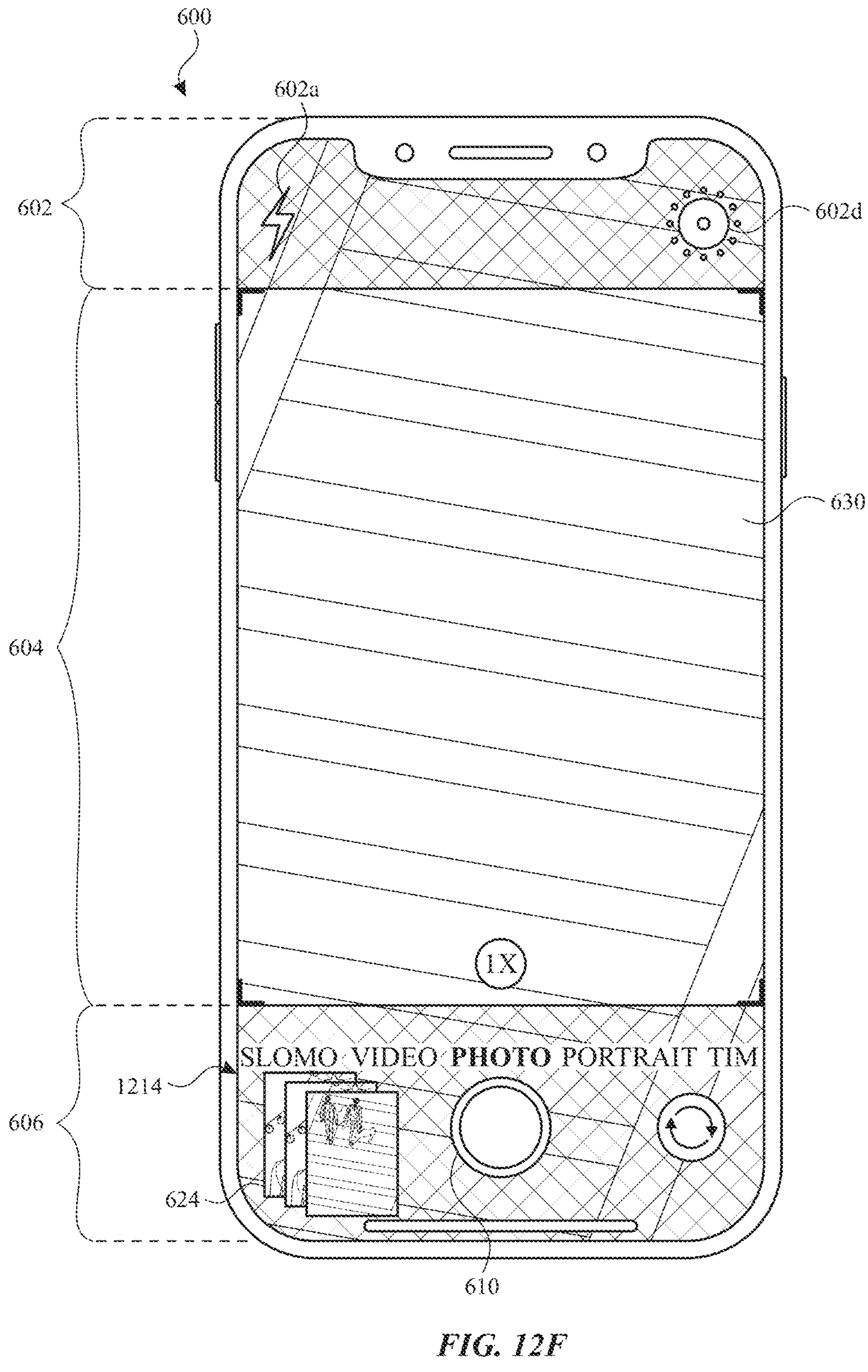

In FIG. 12F, device 600 has completed capture of the animated media. Media collection 624 now includes, at the top of the stack, a single representation of the captured animated media (e.g., a single representation that is representative of the predefined plurality of captured images) overlaid over other previously captured media (e.g., media other than that captured during the animated media capture operation).

Figure 12G:
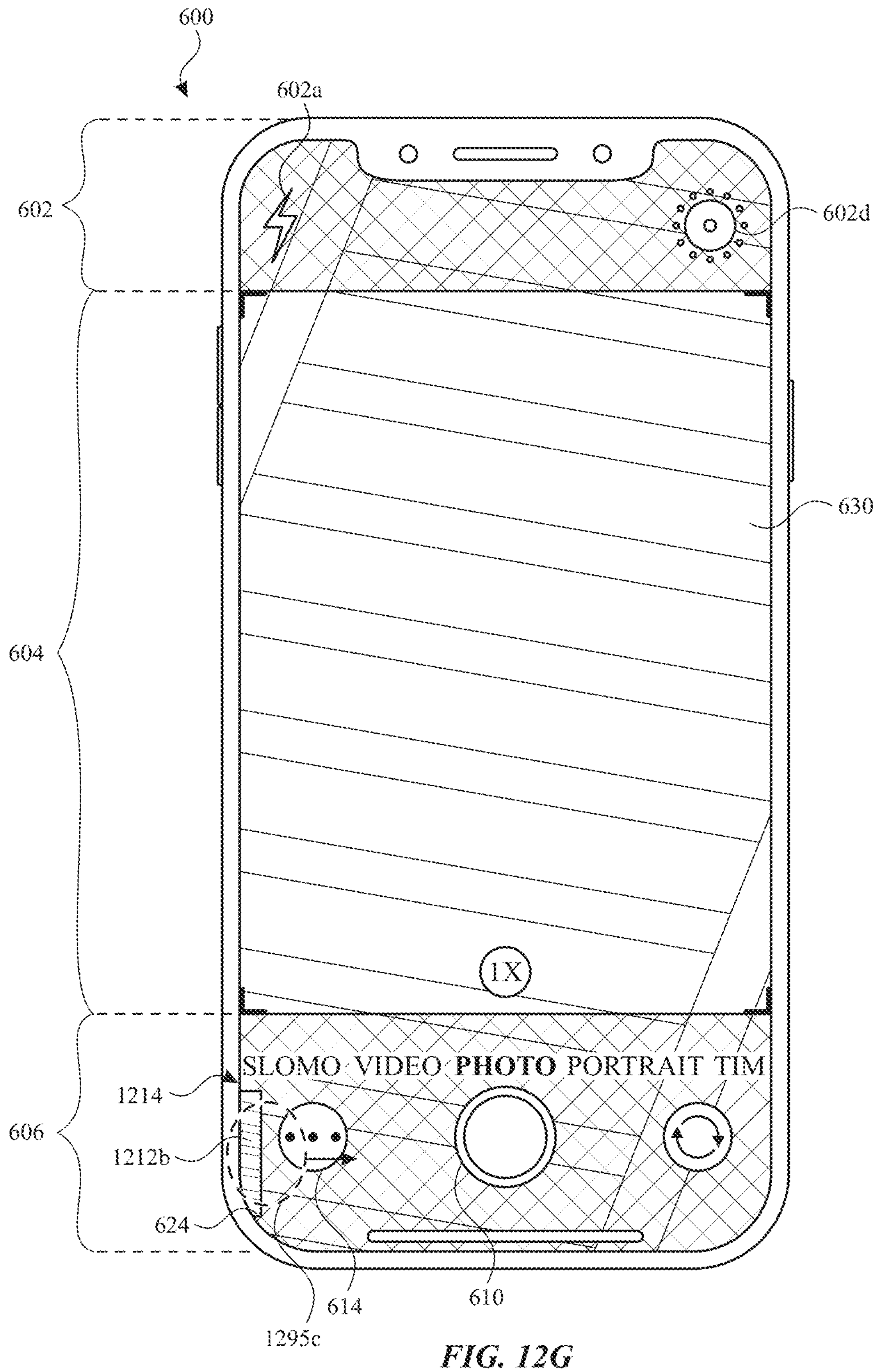

As illustrated in FIG. 12G, in response to detecting that representation media collection 624 has been displayed for a predetermined period of time, device 600 ceases to display the first portion of media collection 1212*a* of media collection 624. As illustrated in FIG. 12G, device 600 maintains display of second portion of media collection 1212*b* while ceasing to display first portion of media collection 1212*a*. In some embodiments, ceasing to display first portion of media collection 1212*a* includes displaying an animation that slides the media collection 624 towards device edge 1214. After ceasing to display first portion of media collection 1212*a* and maintain second portion of media collection 1212*b*, additional control affordance 614 is displayed in a location previously occupied by media collection 624. In addition, after ceasing to display first portion of media collection 1212*a*, device 600 detects a swipe input 1295*c* that moves away from device edge 1214.

Figure 12H:
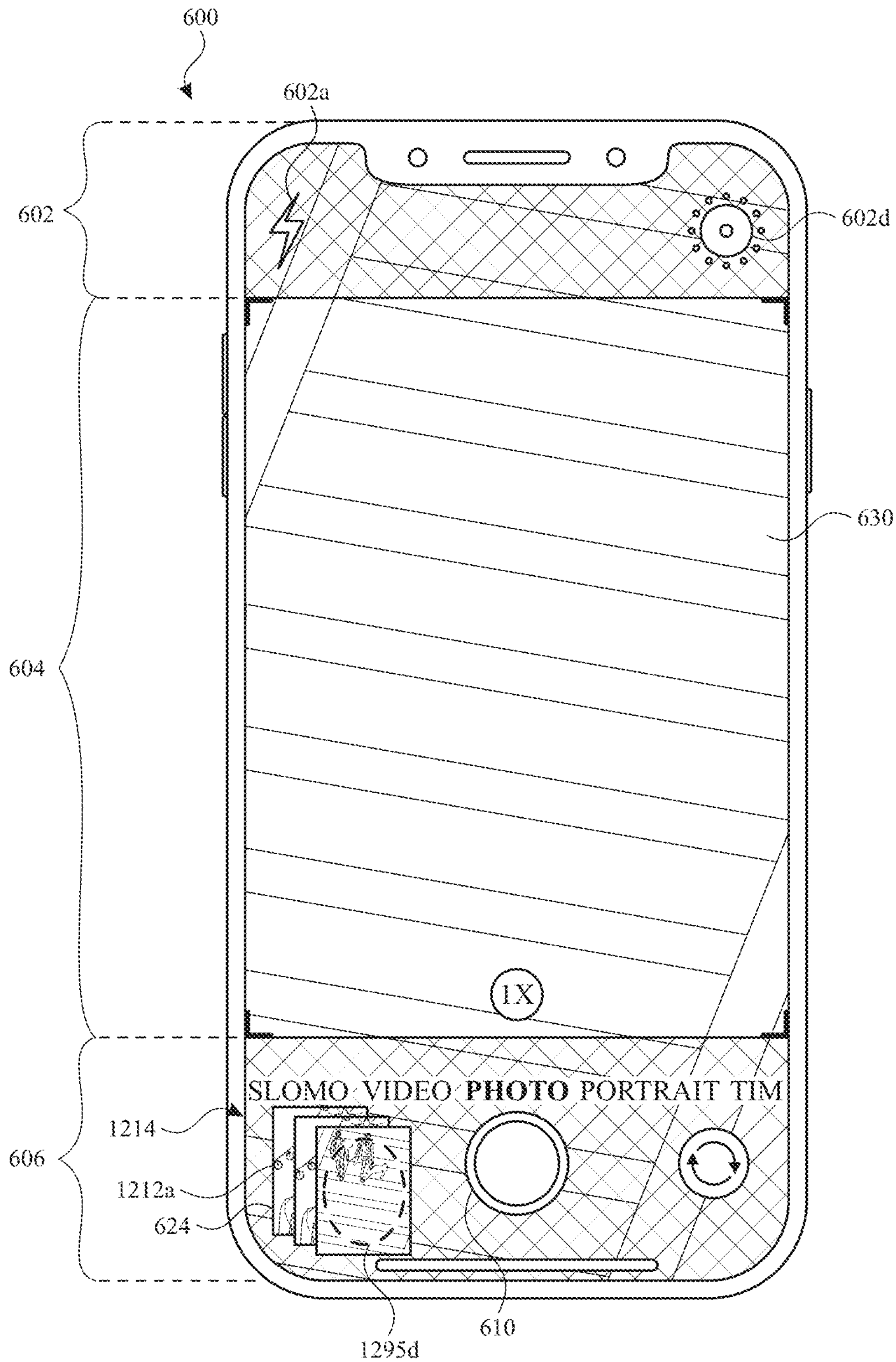

As illustrated in FIG. 12H, in response to detecting swipe input 1295*c*, device 600 re-displays first portion of media collection 1212*b* of media collection 624. After redisplaying first portion of media collection 1212*b*, device 600 ceases to display additional control affordance 614 because media collection 624 covered the location that additional control affordance 614 occupied. While displaying media collection 624, device 600 detects tap input 1295*d* on media collection 624.

Figure 12I:
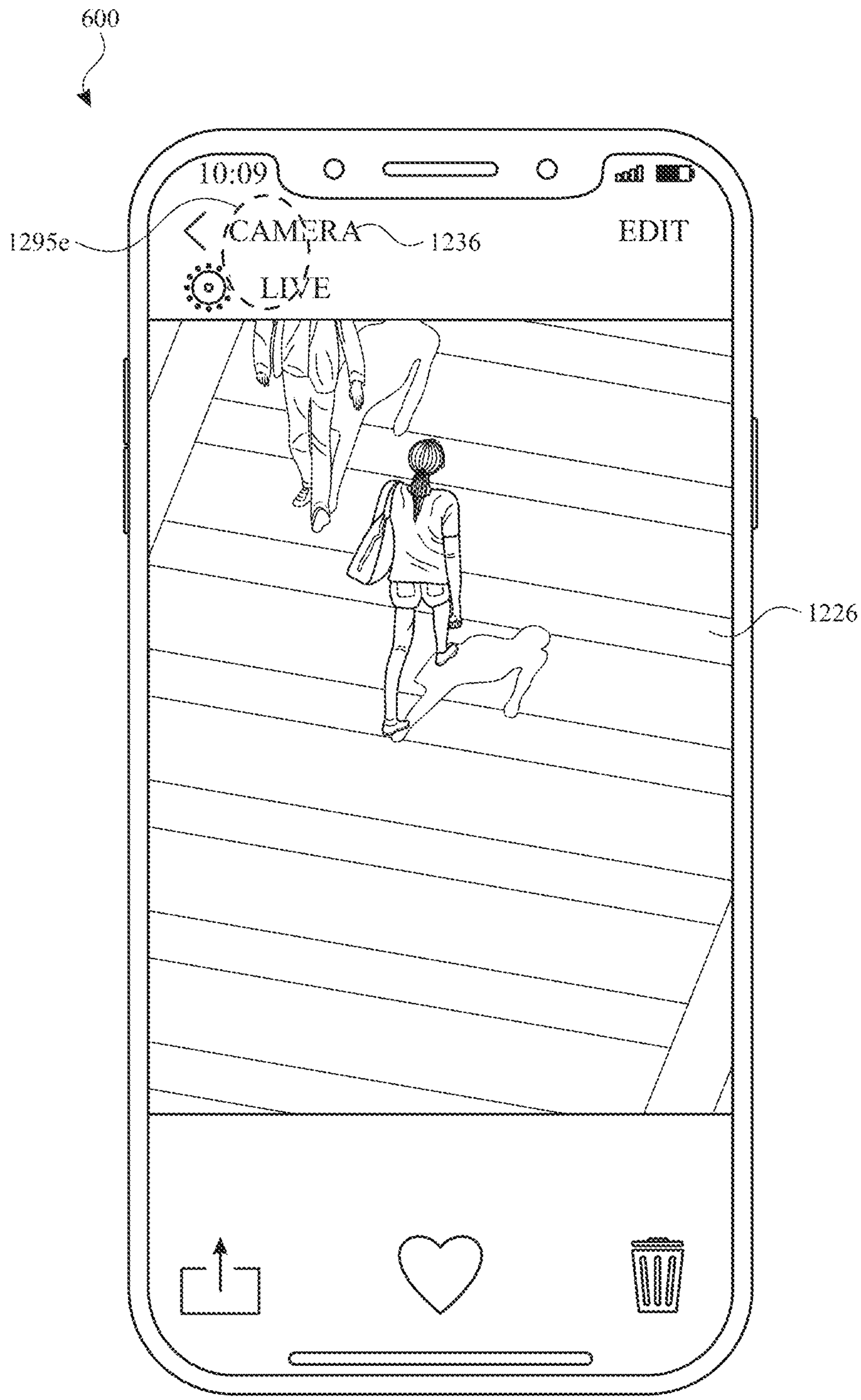

As illustrated in FIG. 12I, in response to detecting tap input 1295*d*, device 600 displays enlarged representation 1226 (e.g., a representation of the animated media captured in FIGS. 12B-12F). Representation 1226 corresponds to the small representation displayed at the top of the stack of media collection 624 of FIG. 12H. In some embodiments, in response to a contact on representation 1226 with a characteristic intensity greater than a threshold intensity or a duration longer than a threshold duration, device 600 plays back the animated media corresponding to representation 1226. While displaying enlarged representation 1226, device 600 detects input 1295*e* on back affordance 1236.

Figure 12J:
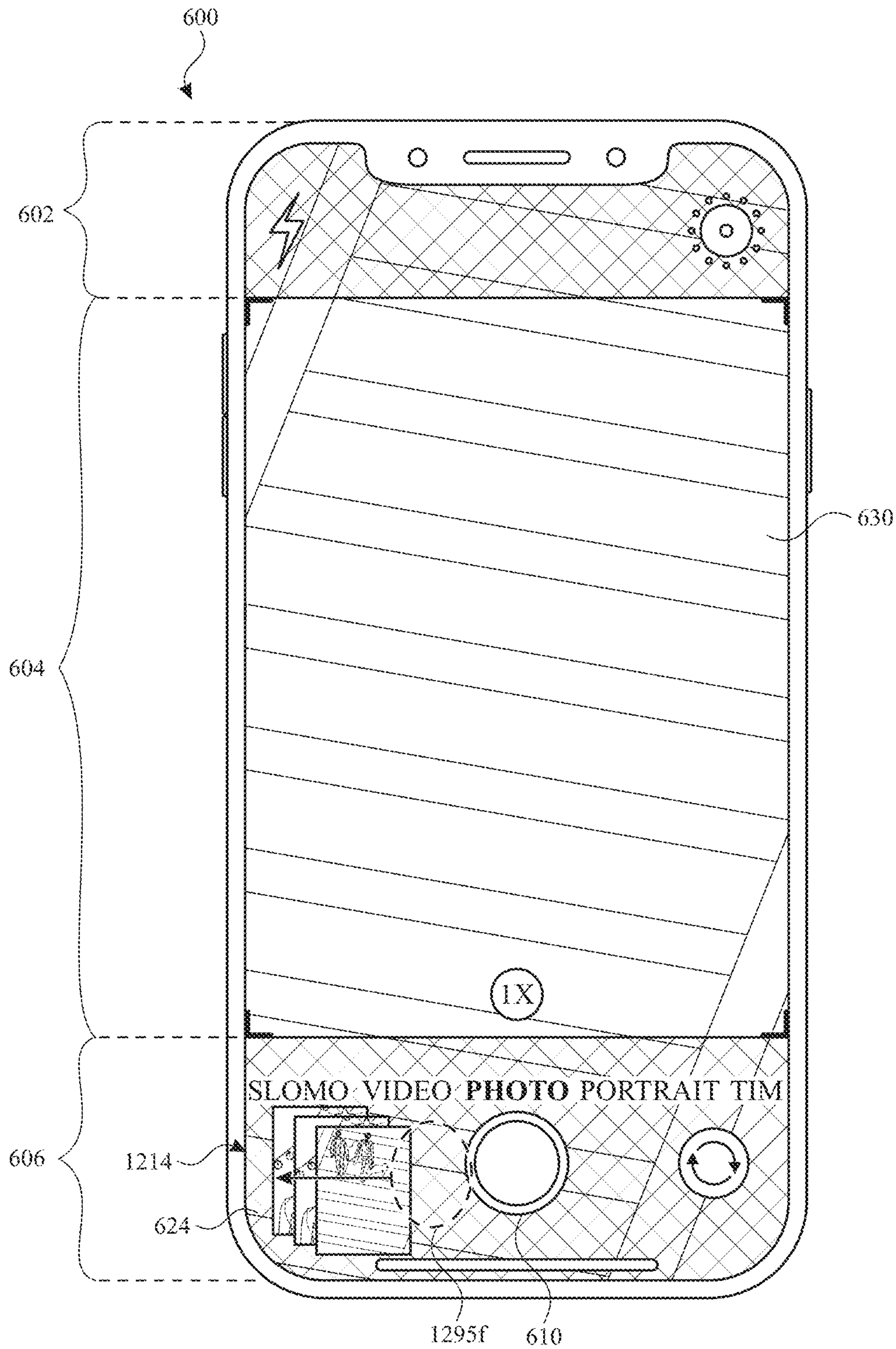

As illustrated in FIG. 12J, in response to detecting input 1295*e*, device 600 exits out of the enlarged representation 1226 of the media and displays the media collection 624 near device edge 1214. While displaying media collection 624, device 600 detects input 1295*f* which is a swipe gesture that moves towards device edge 1214.

Figure 12K:
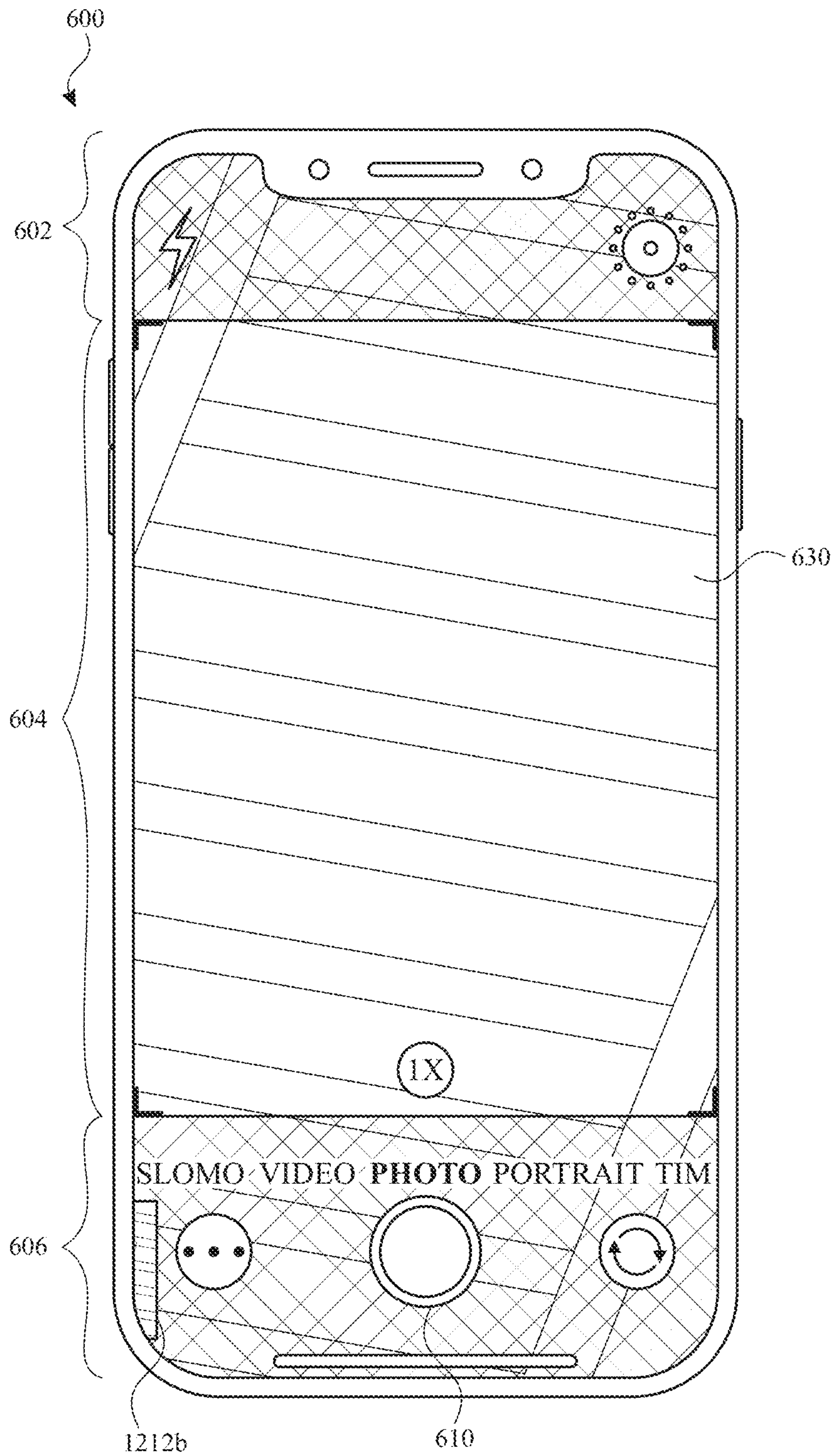

As illustrated in FIG. 12K, in response to detecting swipe input 1295*f*, device 600 ceases to display the first portion of media collection 1212*a* of media collection 624 and redisplays additional control affordance 616.

FIGS. 13A-13B are a flow diagram illustrating a method for accessing media items using an electronic device in accordance with some embodiments. Method 1300 is performed at a device (e.g., 100, 300, 500, 600) with a display device and one or more cameras (e.g., one or more cameras (e.g., dual cameras, triple camera, quad cameras, etc.) on different sides of the electronic device (e.g., a front camera, a back camera)). Some operations in method 1300 are, optionally, combined, the orders of some operations are, optionally, changed, and some operations are, optionally, omitted.

As described below, method 1300 provides an intuitive way for accessing media items. The method reduces the cognitive burden on a user for accessing media items, thereby creating a more efficient human-machine interface. For battery-operated computing devices, enabling a user to access media items faster and more efficiently conserves power and increases the time between battery charges.

The electronic device (e.g., 600) displays (1302), via the display device, a camera user interface, the camera user interface including (e.g., displaying concurrently) a camera display region (e.g., 604), the camera display region including a representation (e.g., 630) of a field-of-view of the one or more cameras.

While displaying the camera user interface, the electronic device (e.g., 600) detects (1304) a request to capture media corresponding to the field-of-view (e.g., 630) of the one or more cameras (e.g., activation of a capture affordance such as a physical camera shutter button or a virtual camera shutter button).

In response to detecting the request to capture media corresponding to the field-of-view (e.g., 630) of the one or more cameras, the electronic device (e.g., 600) captures (1306) media corresponding to the field-of-view of the one or more cameras and displays a representation (e.g., 1224) of the captured media.

While displaying the representation of the captured media, the electronic device (e.g., 600) detects (1308) that the representation of the captured media has been displayed for a predetermined period of time. In some embodiments, the predetermined amount of time is initiated in response to an event (e.g., capturing an image, launching the camera application, etc.). In some embodiments, the length of the predetermined amount of time is determined based on the detected event. For example, if the event is capturing image data of a first type (e.g., still image), the predetermined amount of time is a fixed amount of time (e.g., 0.5 seconds), and if the event is capturing image data of a second type (e.g., a video), the predetermined amount of time corresponds to the amount of image data captured (e.g., the length of the captured video)).

In some embodiments, while the representation of the captured media is displayed, the electronic device (e.g., 600) detects (1310) user input corresponding to a request to display an enlarged representation of the captured media (e.g., user input corresponding to a selection (e.g., tap) on of the representation of the captured media). In some embodiments, in response to detecting user input corresponding to the selection of the representation of the captured media, the electronic device (e.g., 600) displays (1312), via the display device, an enlarged representation of the captured media (e.g., enlarging a representation of the media).

In some embodiments, the representation of the captured media is displayed at a fifth location on the display. In some embodiments, after ceasing to display at least a portion of the representation of the captured media while maintaining display of the camera user interface, the electronic device (e.g., 600) displays an affordance (e.g., a selectable user interface object) for controlling a plurality of camera settings at the fifth location. Displaying an affordance for controlling a plurality of camera settings after ceasing to display at least a portion of the representation of the captured media while maintaining display of the camera user interface provides a user with easily accessible and usable control options. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, capturing media (e.g., a video, a moving image (e.g., live photo)) corresponding to the field-of-view (e.g., 630) of the one or more cameras includes capturing a sequence of images. By capturing (e.g., automatically, without additional user input) a sequence of images when capturing media corresponding to the field-of-view of the one or more cameras, the electronic device provides improved feedback, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, displaying the representation of the captured media includes playing at least a portion of the captured sequence of images that includes at least two images (e.g., video, photo). In some embodiments, the captured video is looped for a predetermined period of time.

In some embodiments, the predetermined time is based on (e.g., equal to) the duration of the captured video sequence. In some embodiments, the representation of the captured media ceases to be displayed after playback of the video media is completed.

In response to detecting that the representation (e.g., 1224) of the captured media has been displayed for the predetermined period of time, the electronic device (e.g., 600) ceases to display (1314) at least a portion of the representation of the captured media while maintaining display of the camera user interface. Ceasing to display at least a portion of the representation of the captured media while maintaining display of the camera user interface in response to detecting that the representation of the captured media has been displayed for the predetermined period of time reduces the number of inputs needed to perform an operation, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, ceasing to display the representation of the captured media includes displaying an animation of the representation of the captured media moving off the camera control region (e.g., once the predetermined amount of time expires, the image preview slides off-screen (e.g., to the left) in an animation)).

In some embodiments, the portion of the representation of the captured media is a first portion of the representation of the capture media. In some embodiments, ceasing to display at least the first portion of the representation of the captured media while maintaining display of the camera user interface further includes maintaining display of at least a second portion of the representation of the captured media (e.g., an edge of the representation sticks out near an edge of the user interface (e.g., edge of display device (or screen on display device)).

In some embodiments, before ceasing to display the first portion of the representation, the representation of the captured media is displayed at a first location on the display. In some embodiments, ceasing to display at least the first portion of the representation of the captured media while maintaining display of the camera user interface further includes displaying an animation that moves (e.g., slides) the representation of the captured media from the first location on the display towards a second location on the display that corresponds to an edge of the display device (e.g., animation shows representation sliding towards the edge of the camera user interface). Displaying an animation that moves the representation of the captured media from the first location on the display towards a second location on the display that corresponds to an edge of the display device when ceasing to display at least the first portion of the representation of the captured media while maintaining display of the camera user interface provides to a user visual feedback that the at least the first portion of the representation is being removed from being displayed. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the captured media is displayed at a third location on the display. In some embodiments, while a second representation of the captured media is displayed, the electronic device (e.g., 600) detects user input (e.g., a swipe gesture towards the edge of the display device) corresponding to a request to cease display of at least a portion of the second representation of the captured media while maintaining display of the camera user interface. In some embodiments, in response to detecting the request to cease display of at least a portion of the second representation, the electronic device (e.g., 600) ceases to display at least a portion of the second representation of the captured media while maintaining display of the camera user interface.

In some embodiments, after ceasing to display the first portion of the representation, the electronic device (e.g., 600) receives (1316) user input corresponding to movement of a second contact from a fourth location on the display that corresponds to an edge of the display device to a fifth location on the display that is different from the fourth location (e.g., swipe in from edge of display) (e.g., user input corresponding to a request to display (or redisplay) the representation (or preview). In some embodiments, in response to receiving user input corresponding to movement of the contact from the fourth location on the display that corresponds to the edge of the display device to the fifth location on the display, the electronic device (e.g., 600) re-displays (1318) the first portion of the representation. Re-displaying the first portion of the representation in response to receiving user input corresponding to movement of the contact from the fourth location on the display that corresponds to the edge of the display device to the fifth location on the display enables a user to quickly and easily cause the electronic device to re-display the first portion of the representation. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the camera user interface is not displayed (e.g., after dismissing the camera user interface), the electronic device (e.g., 600) receives (1320) a request to redisplay the camera user interface. In some embodiments, in response receiving the request to redisplay the camera user interface, the electronic device (e.g., 600) displays (1322) (e.g., automatically displaying) a second instance of the camera user interface that includes (e.g., automatically includes) a second representation of captured media. In some embodiments, the second representation of captured media is displayed via an animated sequence of the representation translating on to the UI from an edge of the display.

Note that details of the processes described above with respect to method 1300 (e.g., FIGS. 13A-13B) are also applicable in an analogous manner to the methods described above and below. For example, methods 700, 900, 1100, 1500, 1700, 1900, 2000, 2100, 2300, 2500, 2700, 2800, 3000, 3200, 3400, 3600, and 3800 optionally include one or more of the characteristics of the various methods described above with reference to method 1300. For brevity, these details are not repeated below.

FIGS. 14A-14U illustrate exemplary user interfaces for modifying media items using an electronic device in accordance with some embodiments. The user interfaces in these figures are used to illustrate the processes described below, including the processes in FIG. 15A-15C.

FIGS. 14A-14D illustrate the process by which device 600 is configured to capture media using different aspect ratios.

As illustrated in FIG. 14A, device 600 displays live preview 630 that is a representation of the field-of-review of one or more cameras. Live preview 630 includes visual portion 1404 and dimmed portion 1406. Visual boundary 608 is between visual portion 1404 and dimmed portion 1406 and visually displayed on device 600. Visual boundary 608 includes predefined input locations 1410A-1410D at the corners of visual boundary 608. Visual portion 1404 is a visual indication of media that will be captured and displayed to the user in response to a request to capture media. In other words, visual portion 1404 is a visual indication of the portion of the representation of media that is typically displayed when media is captured and represented. Dimmed portion 1406 is a visual indication of the portion of the media that is not typically displayed after media is captured and represented. Visual portion 1404 is visually distinguished from dimmed portion 1406. Specifically, visual portion 1404 is not shaded while dimmed portion 1406 is shaded. In addition, device 600 displays zoom affordance 622.

FIGS. 14A-14D show various portions of an overall input 1495A. Overall input 1495A changes the aspect ratio corresponding to visual portion 1404 from four-by-three aspect ratio 1400 (e.g., a 4:3 aspect ratio corresponding to visual portion 1404) to a new aspect ratio. Overall input 1495A includes input portion 1495A1 and input portion 1495A2. Input portion 1495A1, corresponding to stationary component of the input, is the first portion of overall input 1495A and input portion 1495A2, corresponding to a moving component of the input, is a second portion of overall input 1495A. As shown in FIG. 14A, while device 600 is configured to capture media with four-by-three aspect ratio 1400, device detects input portion 1495A1 at location 1410A, corresponding to the upper-right corner of visual boundary 608.

At FIG. 14B, device 600 has determined that input portion 1495A1 has been maintained at location 1410A for a predetermined period of time (e.g., a non-zero length of time, 0.25 seconds, 0.5 seconds). As illustrated in FIG. 14B, in accordance with this determination, device 600 shrinks the area enclosed by visual boundary 608. In some embodiments, shrinking the area enclosed by visual boundary 608 provides an indication that visual boundary can now be modified (e.g., using further movement of the input). Reducing the area enclosed by visual boundary 608, reduces the area of visual portion 1404 and increases the area of dimmed portion 1406. In some embodiments, device 600 displays an animation of visual boundary 608 shrinking and dimmed portion 1406 expanding into the area that visual boundary 608 left vacant. In addition to shrinking the area enclosed by visual boundary 608, device 600 generates tactile output 1412A and ceases to display zoom affordance 622. After detecting that input portion 1495A1, device 600 detects input portion 1495A2 of overall input 1495A moving in a downwards direction, aware from location 1410A.

As illustrated in FIG. 14C, in response to detecting input portion 1495A2, device 600 moves or translates visual boundary 608 from its original position to a new position based on a characteristic (e.g., a magnitude and/or direction) of input portion 1495A2. Device 600 displays visual boundary 608 at the new. While displaying visual boundary 608 at the new position, device 600 detects lift off of overall input 1495A.

As illustrated in FIG. 14D, in response to detecting lift off of input 1495A, device 600 expands visual boundary 608, increasing the size of visual boundary 608 to square aspect ratio 1416 (e.g., a square aspect ratio corresponding to visual portion 1404). Square aspect ratio 1416 is a predetermined aspect ratio. Because device 600 determined that input portion 1495A2 resulted in visual boundary 608 having a final position within a predetermined proximity to the predetermined square aspect ratio, device 600 causes the visual boundary to snap to the square aspect ratio 1416. In response to detecting lift off of overall input 1495A, device 600 also generates tactile output 1412B and redisplays zoom affordance 622. In addition, device 600 displays aspect ratio status indicator 1420 to indicate that device 600 is configured to capture media of square aspect ratio 1416.

In some embodiments, in accordance with input portion 1495A2 not having a final position within a predetermined proximity to the predetermined square aspect ratio (or any other predetermined aspect ratio), visual boundary 608 will be displayed based on the magnitude and direction of input portion 1495A2 and not at a predetermined aspect ratio. In this way, users can set a custom aspect ratio or readily select a predetermined aspect ratio. In some embodiments, device 600 displays an animation of visual boundary 608 expanding. In some embodiments, device 600 displays an animation of visual boundary 608 snapping into the predetermined aspect ratio. In some embodiments, tactile output 412B is provided when visual boundary 608 snaps into a predetermined aspect ratio (e.g., aspect ratio 1416).

As illustrated in FIG. 14E, device 600 detects input portion 1495B1 of overall input 1495B on predetermined location 1404B corresponding to a lower-right corner of visual boundary 608. Input portion 1495B1 is a contact that is maintained for at least a predetermined time at location 1404B. As illustrated in FIG. 14F, in response to detecting input portion 1495B1, device 600 performs similar techniques to those discussed in FIG. 14B. For clarity, device 600 shrinks the area enclosed by visual boundary 608 and generates tactile output 1412C. Device 600 also detects input portion 1495B2 of overall input 1495B, which is a drag moving in a downwards direction away from location 1404B.

As illustrated in FIG. 14G, in response to detecting movement of input portion 1495B2, device 600 moves or translates visual boundary 608 from its original position to a new position based on a characteristic (e.g., magnitude and/or direction) of input portion 1495B2. While moving visual boundary 608 to the new position, device 600 detects that visual boundary 608 is in four-by-three aspect ratio 1418. In response to detecting that visual boundary 608 is in four-by-three aspect ratio 1418, without detecting lift off of input 1495B, device 600 issues tactile output 1412D. In addition, device 600 maintains display of aspect ratio status indicator 1420 that indicates that device 600 is configured to capture media of square aspect ratio 1416 and forgoes updating aspect ratio status indicator 1420 to indicate that device 600 is configured to capture media of aspect ratio 1418 (e.g., 4:3), since overall input 1495B is still being maintained without lift off.

As illustrated in FIG. 14H, device 600 continues to detect input portion 1495B2. Visual boundary 608 is now aspect ratio 1421 and has moved from its position illustrated in FIG. 14G to a new position. While displaying visual boundary 608 at the new position, device 600 detects lift off of overall input 1495B.

As illustrated in FIG. 14I, in response to detecting lift off of input 1495B, device 600 performs similar techniques to those discussed in FIG. 14D in relation to the response to a detection of lift off of 1495A. For clarity, as illustrated in FIG. 14I, device 600 expands visual boundary 608 to predetermined sixteen-by-nine aspect ratio 1422. In addition, device 600 redisplays zoom affordance 622 and updates aspect ratio status indicator 1418 to indicate that device 600 is configured to capture media of sixteen-by-nine aspect ratio 1422 (e.g., 16:9). In some embodiments, device 600 generates tactile output in response to lift off of input 1495B.

As illustrated in FIG. 14J, device 600 detects input 1495C (e.g., a continuous upwards swipe gesture) on predefined input location 1404B that corresponds to a corner of visual boundary 608. Device 600 determines that 1495C has not been maintained on predefined input location 1404B for a predetermined period of time (e.g., the same predetermined time discussed with respect to FIG. 14B).

As illustrated in FIG. 14K, in response to input 1495C, device 600 displays camera setting affordances 624 in accordance with the techniques described above for displaying camera setting affordances 802 in FIGS. 8A-8B above. Device 600 does not, however, adjust the visual boundary 608 in response to input 1495C because input 1495C did not include a stationary contact at location 1404B, corresponding to a corner of visual boundary 608. In some embodiments, camera setting affordances 624 and camera setting affordances 802 are the same. While displaying camera setting affordances 624, device 600 detects input 1495D on aspect ratio control 1426.

As illustrated in FIG. 14L, in response to detecting input 1495D, device 600 displays adjustable aspect ratio control 1470. Adjustable aspect ratio controls 1470 include aspect ratio options 1470A-1470D. As shown in FIG. 14L, aspect ratio option 1495C is bolded and selected, which matches the status indicated by aspect ratio status indicator 1420. While displaying adjustable aspect ratio controls 1470, device 600 detects input 1495E on aspect ratio option 1470B.

As illustrated in FIG. 14M, in response to detecting input 1495E, device 600 updates visual boundary 1408 and visual portion 1410 from sixteen-by-nine aspect ratio to four-by-three aspect ratio. At FIG. 14M, device 600 detects input 1495F, which is a downward swipe in the live preview 630.

As illustrated in 14N, in response to detecting input 1495F, device 600 ceases to display camera setting affordances 624 in accordance with the techniques described above in FIG. 8Q-8R. At FIG. 14N, device 600 detects input 1495G, which is tap gesture at predefined input location 1410A corresponding to the upper-right corner of visual boundary 608.

As illustrated in FIG. 14O, in response to detecting input 1495G, device 600 determines that input 1495G has not been maintained on predefined input location 1410A for a predetermined period of time. Device 600 does not adjust the visual boundary 608 in response to input 1495G because input 1495G did not meet the conditions for adjusting the visual boundary. In response to input 1495G, device 600 updates live preview 630 and adjusts image capture setting by adjusting the focus and exposure settings based on the location of tap input 1495G. As illustrated in FIG. 14O, visual portion 1404 appears more blurry and out of focus due to the updated focus and exposure setting.

At FIG. 14P, device 600 detects input portion 1495H1 of overall input 1495H on a location in live preview 630 (e.g., a location that is not one of the corners 1410A-1410D of visual boundary 608). Overall input 1495H includes a first contact, followed by a lift-off, and then a second contact. Input portion 1495H1 is a stationary contact (e.g., the first contact of overall input 1495H) that is maintained for more than a predetermined period of time (e.g., is maintained for at least the same period of time as input portion 1495A1 of FIG. 14B).

As illustrated in FIG. 14Q, in response to detecting input portion 1495H1, device 600 activates an exposure lock function that updates the live preview and updates the capture settings based on light values at the location of input portion 1495H1. Device 600 also displays exposure setting manipulator 1428.

At FIG. 14R, device 600 detects input portion 1495H2 (e.g., the second contact of overall input 1495H) of overall input 1495H, which is a dragging movement performed with the second contact of overall input 1495H. As illustrated in FIG. 14S, device 600 updates the exposure setting manipulator 1428 to a new value based on a characteristic (e.g., magnitude and/or direction) of input portion 1495H2.

As illustrated in FIG. 14T, device 600 maintains display of exposure setting manipulator 1428. Device 600 also detects input 1495I, which is a horizontal swipe starting from predefined input location 1410A, which is the upper-right corner of visual boundary 608.

As illustrated in FIG. 14U, in response to detecting input 1495I, device 600 changes the camera mode in accordance with similar techniques discussed in FIGS. 8D-8H. Device 600 does not, however, adjust the visual boundary 608 in response to input 1495I because input 1495I did not include a stationary contact component that was detected for a predetermined period of time at predefined input location 1410A, corresponding to a corner of visual boundary 608.

FIGS. 15A-15C are a flow diagram illustrating a method for modifying media items using an electronic device in accordance with some embodiments. Method 1500 is performed at a device (e.g., 100, 300, 500, 600) with a display device and one or more cameras (e.g., one or more cameras (e.g., dual cameras, triple camera, quad cameras, etc.) on different sides of the electronic device (e.g., a front camera, a back camera)). Some operations in method 1500 are, optionally, combined, the orders of some operations are, optionally, changed, and some operations are, optionally, omitted.

As described below, method 1500 provides an intuitive way for modifying media items. The method reduces the cognitive burden on a user for modifying media items, thereby creating a more efficient human-machine interface. For battery-operated computing devices, enabling a user to modify media items faster and more efficiently conserves power and increases the time between battery charges.

The electronic device (e.g., 600) displays (1502), via the display device, a camera user interface, the camera user interface including (e.g., displaying concurrently) a camera display region (e.g., 604), the camera display region including a representation (e.g., 630) of a field-of-view of the one or more cameras.

In some embodiments, the camera user interface further comprises an indication that the electronic device (e.g., 600) is configured to operate in a first media capturing mode. In some embodiments, in accordance with detecting a fourth input including detecting continuous movement of a fourth contact in a second direction (e.g., vertical) on the camera display region (e.g., 604) (e.g., above a third predetermined threshold value) (e.g., request to display control for adjusting property) (in some embodiments, the request to display the control for adjusting the property is detected by continuous movement of a contact in a direction that is different (e.g., opposite) of a direction that is detected by continuous movement of a content for a request to switch cameras modes), the electronic device (e.g., 600) displays a control (e.g., a slider) for adjusting a property (e.g., a setting) associated with a media capturing operation. Displaying the control for adjusting a property associated with a media capturing operation in accordance with detecting a fourth input including detecting continuous movement of a fourth contact in a second direction enables a user to quickly and easily access the control. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, while displaying the control for adjusting the property associated with a media capturing operation, the electronic device (e.g., 600) displays a first indication (e.g., number, slider knob (e.g., bar) on slider track) of a first value of the property (e.g., amount of light, a duration, etc.). In some embodiments, in response to receiving a request (e.g., dragging a slider control on the control to an indication (e.g., value) on the adjustable control) to adjust the control property (e.g., amount of light, a duration, etc.) to a second value of the property associated with the media capturing operation (e.g., amount of light, a duration, etc.), the electronic device (e.g., 600) replaces display of the first indication of the first value of the property with display of a second indication of value of the property. In some embodiments, the value of the property is displayed when set. In some embodiments, the value of the property is not displayed.

While the electronic device (e.g., 600) is configured to capture media with a first aspect ratio (e.g., 1400) in response to receiving a request to capture media (e.g., in response to activation of a physical camera shutter button or activation of a virtual camera shutter button), the electronic device detects (1504) a first input (e.g., a touch and hold) including a first contact at a respective location on the representation of the field-of-view of the one or more cameras (e.g., a location that corresponds to a corner of the camera display region).

In response to detecting the first input (1506), in accordance with a determination that a set of aspect ratio change criteria is met, the electronic device (e.g., 600) configures (1508) the electronic device to capture media with a second aspect ratio (e.g., 1416) that is different from the first aspect ratio in response to a request to capture media (e.g., in response to activation of a physical camera shutter button or activation of a virtual camera shutter button). The set of aspect ratio change criteria includes a criterion that is met when the first input includes maintaining the first contact at a first location corresponding to a predefined portion (e.g., a corner) of the camera display region that indicates at least a portion of a boundary of the media that will be captured in response to a request to capture media (e.g., activation of a physical camera shutter button or activation of a virtual camera shutter button) for at least a threshold amount of time, followed by detecting movement of the first contact to a second location different from the first location (1510). By configuring the electronic device to capture media with a second aspect ratio that is different from the first aspect ratio in response to a request to capture media and in accordance with a determination that a set of aspect ratio change criteria is met, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting at least a first portion of the first input, in accordance with a determination that the first portion of the first input includes maintaining the first contact at the first location for at least the threshold amount of time, the electronic device (e.g., 600) provides (1512) a first tactile (e.g., haptic) output. Providing the first tactile output in accordance with a determination that the first portion of the first input includes maintaining the first contact at the first location for at least the threshold amount of time provides feedback to a user the first contact has been maintained at the first location for at least the threshold amount of time. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting at least a second portion of the first input, in accordance with a determination that a second portion of the first input includes maintaining the first contact at the first location for at least the threshold amount of time, the electronic device (e.g., 600) displays (1514) a visual indication of the boundary (e.g., 1410) of the media (e.g., a box) that will be captured in response to a request to capture media. Displaying the visual indication of the boundary of the media that will be captured in accordance with a determination that a second portion of the first input includes maintaining the first contact at the first location for at least the threshold amount of time provides visual feedback to a user of the portion of the media that will be captured. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the visual indication (e.g., 1410) is displayed and in response detecting at least a third portion of the first input, in accordance with a determination that the third portion of the first input includes movement of the first contact, after the first contact has been maintained at the first location for the threshold amount of time, the movement of the first contact having a first magnitude and first direction, the electronic device (e.g., 600) modifies (1516) the appearance of the visual indication based on the first magnitude and the first direction (e.g., adjusting the visual indication to show changes to the boundary of the media that will be captured).

In some embodiments, in response to detecting at least a first portion of the first input, in accordance with a determination that the first portion of the first input includes maintaining the first contact at the first location for at least the threshold amount of time, the electronic device (e.g., 600) displays (1518) an animation that includes reducing a size of a portion of the representation of the field-of-view of the one or more cameras that is indicated by the visual indication (e.g., animation of boundary being pushed back (or shrinking)). Displaying an animation that includes reducing a size of a portion of the representation of the field-of-view of the one or more cameras that is indicated by the visual indication in accordance with a determination that the first portion of the first input includes maintaining the first contact at the first location for at least the threshold amount of time provides visual feedback to a user that the size of the portion of the representation is being reduced while also enabling the user to quickly and easily reduce the size. Providing improved visual feedback and additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the visual indication is displayed and in response detecting at least a fourth portion of the first input, in accordance with a determination that the fourth portion of the first input includes lift off of the first contact, the electronic device (e.g., 600) displays (1520) an animation (e.g., expanding) that includes increasing a size of a portion of the representation of the field-of-view of the one or more cameras that is indicated by the visual indication (e.g., expanding the first boundary box at a first rate (e.g., rate of expansion)).

In some embodiments, a first portion of the representation of the field-of-view of the one or more cameras is indicated as selected by the visual indication (e.g., 1410) of the boundary of the media (e.g., enclosed in a boundary (e.g., box)) and a second portion of the representation of the field-of-view of the one or more cameras is not indicated as selected by the visual indication of the boundary of the media (e.g., outside of the boundary (e.g., box)). Indicating the first portion as being selected by the visual indication of the boundary of the media and not indicating the second portion as being selected by the visual indication of the boundary of the media enables a user to quickly and easily visually distinguish the portions of the representation that are and are not selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the second portion is visually distinguished (e.g., having a dimmed or shaded appearance) (e.g., having a semi-transparent overlay on the second portion of the field-of-view of the one or more cameras) from the first portion.

In some embodiments, configuring the electronic device (e.g., 600) to capture media with a second aspect ratio (e.g., 1416) includes, in accordance with the movement of the first contact to the second location having a first magnitude and/or direction of movement (e.g., a magnitude and direction) that is within a first range of movement (e.g., a range of vectors that all correspond to a predetermined aspect ratio), configuring the electronic device to capture media with a predetermined aspect ratio (e.g., 4:3, square, 16:9). In some embodiments, configuring the electronic device (e.g., 600) to capture media with a second aspect ratio includes, in accordance with the movement of the first contact to the second location having a second magnitude and/or direction of movement (e.g., a magnitude and direction) that is not within the first range of movement (e.g., a range of vectors that all correspond to a predetermined aspect ratio), configuring the electronic device to capture media with an aspect ratio that is not predetermined (e.g., a dynamic aspect ratio) and that is based on the magnitude and/or direction of movement (e.g., based on a magnitude and/or direction of the movement).

In some embodiments, configuring the electronic device (e.g., 600) to capture media with the predetermined aspect ratio includes generating, via one or more tactile output devices, a second tactile (e.g., haptic) output. Generating the second tactile output when configuring the electronic device to capture media with the predetermined aspect ratio provides feedback to a user of the aspect ratio setting. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to detecting the first input, the electronic device (e.g., 600) is configured to capture media using a first camera mode. In some embodiments, each camera mode (e.g., video, phot/still, portrait, slow-motion, panoramic modes) has a plurality of settings (e.g., for a portrait camera mode: a studio lighting setting, a contour lighting setting, a stage lighting setting) with multiple values (e.g., levels of light for each setting) of the mode (e.g., portrait mode) that a camera (e.g., a camera sensor) is operating in to capture media (including post-processing performed automatically after capture. In this way, for example, camera modes are different from modes which do not affect how the camera operates when capturing media or do not include a plurality of settings (e.g., a flash mode having one setting with multiple values (e.g., inactive, active, auto)). In some embodiments, camera modes allow user to capture different types of media (e.g., photos or video) and the settings for each mode can be optimized to capture a particular type of media corresponding to a particular mode (e.g., via post processing) that has specific properties (e.g., shape (e.g., square, rectangle), speed (e.g., slow motion, time elapse), audio, video). For example, when the electronic device (e.g., 600) is configured to operate in a still photo mode, the one or more cameras of the electronic device, when activated, captures media of a first type (e.g., rectangular photos) with particular settings (e.g., flash setting, one or more filter settings); when the electronic device is configured to operate in a square mode, the one or more cameras of the electronic device, when activated, captures media of a second type (e.g., square photos) with particular settings (e.g., flash setting and one or more filters); when the electronic device is configured to operate in a slow motion mode, the one or more cameras of the electronic device, when activated, captures media that media of a third type (e.g., slow motion videos) with particular settings (e.g., flash setting, frames per second capture speed); when the electronic device is configured to operate in a portrait mode, the one or more cameras of the electronic device captures media of a fifth type (e.g., portrait photos (e.g., photos with blurred backgrounds)) with particular settings (e.g., amount of a particular type of light (e.g., stage light, studio light, contour light), f-stop, blur); when the electronic device is configured to operate in a panoramic mode, the one or more cameras of the electronic device captures media of a fourth type (e.g., panoramic photos (e.g., wide photos) with particular settings (e.g., zoom, amount of field to view to capture with movement). In some embodiments, when switching between modes, the display of the representation of the field-of-view changes to correspond to the type of media that will be captured by the mode (e.g., the representation is rectangular mode while the electronic device is operating in a still photo mode and the representation is square while the electronic device is operating in a square mode). In some embodiments, the electronic device (e.g., 600) displays an indication of that the device is configured to the first camera mode. In some embodiments, in response to detecting the first input, in accordance with a determination that the first input does not include maintaining the first contact at the first location for the threshold amount of time and a determination that the first input includes movement of the first contact that exceeds a first movement threshold (e.g., the first input is a swipe across a portion of the display device without an initial pause), the electronic device (e.g., 600) configures the electronic device to capture media using a second camera mode different from the first camera mode. In some embodiments, the electronic device (e.g., 600), while in the second camera mode, is configured to capture media using the first aspect ratio. In some embodiments, configuring the electronic device to use the second camera mode includes displaying an indication that the device is configured to the second camera mode.

In some embodiments, in response to detecting the first input, in accordance with a determination that the first input (e.g., a touch for short period of time on corner of boundary box) includes detecting the first contact at the first location for less than the threshold amount of time (e.g., detect a request for setting a focus), the electronic device (e.g., 600) adjusts (1522) a focus setting, including configuring the electronic device to capture media with a focus setting based on content at the location in the field-of-view of the camera that corresponds to the first location. Adjusting a focus setting in accordance with a determination that the first input includes detecting the first contact at the first location for less than the threshold amount of time reduces the number of inputs needed to perform an operation, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the first input, in accordance with a determination that the first input (e.g., a touch for long period of time on anywhere on representation that is not the corner of the boundary box) includes maintaining the first contact for a second threshold amount of time at a third location (e.g., a location that is not the first location) that does not correspond to a predefined portion (e.g., a corner) of the camera display region (e.g., 604) that indicates at least the portion of the boundary of the media that will be captured in response to the request to capture media (e.g., activation of a physical camera shutter button or activation of a virtual camera shutter button), the electronic device (e.g., 600) configures (1524) the electronic device to capture media with a first exposure setting (e.g., an automatic exposure setting) based on content at the location in the field-of-view of the camera that corresponds to the third location. Configuring the electronic device to capture media with the first exposure setting in accordance with a determination that the first input includes maintaining the first contact for a second threshold amount of time at a third location that does not correspond to a predefined portion of the camera display region that indicates at least the portion of the boundary of the media that will be captured in response to the request to capture media reduces the number of inputs needed to perform an operation, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after configuring the configuring the electronic device (e.g., 600) to capture media with the first exposure setting (e.g., an automatic exposure setting) based on content at the location in the field-of-view of the camera that corresponds to the third location, the electronic device (e.g., 600) detects a change in the representation of the field-of-view of the one or more cameras (e.g., due to movement of the electronic device) that causes the content at the location in field-of-view of the camera that corresponds to the third location to no longer be in the field-of-view of the one or more cameras. In some embodiments, in response to detecting the change, the electronic device (e.g., 600) continues to configure the electronic device to capture media with the first exposure setting.

Note that details of the processes described above with respect to method 1500 (e.g., FIGS. 15A-15C) are also applicable in an analogous manner to the methods described above and below. For example, methods 700, 900, 1100, 1300, 1700, 1900, 2000, 2100, 2300, 2500, 2700, 2800, 3000, 3200, 3400, 3600, and 3800 optionally include one or more of the characteristics of the various methods described above with reference to method 1500. For brevity, these details are not repeated below.

FIGS. 16A-16Q illustrate exemplary user interfaces for varying zoom levels using an electronic device in accordance with some embodiments. The user interfaces in these figures are used to illustrate the processes described below, including the processes in FIGS. 17A-17B.

FIG. 16A illustrates device 600 in a portrait orientation 1602 (e.g., vertical), where device 600's long axis is running vertically. While device 600 is in portrait orientation 1602, the device displays portrait orientation camera interface 1680. Portrait orientation interface 1680 includes portrait orientation live preview 1682, zoom toggle affordance 1616, shutter affordance 1648, and camera switching affordance 1650. In FIG. 16A, portrait orientation live preview 1682 is a live preview of a portion of the field-of-view of front facing camera 1608. Live preview 1682 does not include grayed out portions 1681 and 1683, which also display previews of content from the field-of-view of front-facing camera 1608.

As shown in FIG. 16A, portrait orientation live preview 1682 shows person 1650A preparing to take an image (e.g., a selfie) using front-facing camera 1608 of device 600. Notably, portrait orientation live preview 1682 is displayed at zoom level 1620A that uses 80% of front-facing camera 604's field-of-view (e.g., the live preview is zoomed in) that is available for display in portrait orientation live preview 1682. Portrait orientation live preview 1682 shows person 1650A (e.g., a user of device 600) standing in the center with person 1650B partially visible on the right side of the image and person 1650C partially visible on the left side of the image. While displaying portrait orientation live preview 1682 in the way described above, device 600 detects input 1695A (e.g., a tap) on shutter affordance 1648.

As illustrated in FIG. 16B, in response to detecting input 1695A, device 600 captures media representative of portrait orientation live preview 1682 and displays a representation 1630 of the media in portrait orientation camera user interface 1680.

Further, as illustrated in FIG. 16B, while displaying portrait orientation live preview 1682, device 600 detects clockwise rotational input 1695B that causes device 600 to be physically rotated into a landscape orientation (e.g., with the device's long axis running horizontally). In some embodiments, person 1650A rotates device 600 clockwise in order to capture more of the environment in the horizontal direction (e.g., so as to bring persons 1650B and 1650C into the field-of-view). As illustrated in FIG. 16C, in response to detecting rotational input 1695B, device 600 replaces portrait orientation camera user interface 1680 with landscape orientation camera interface 1690 automatically, without additional intervening user inputs. Landscape orientation camera interface 1690 includes a landscape orientation live preview 1692 that is displayed at zoom level 1620B in landscape orientation 1604.

Zoom level 1620B is different from zoom level 1620A in that device 600 is using 100% of front-facing camera 1608's field-of-view ("FOV") to display landscape orientation live preview 1692. Using zoom level 1620B, instead of zoom level 1620A, to display landscape orientation live preview 1692 causes landscape orientation live preview 1692 to appear more zoomed out. As shown in FIG. 16C, landscape orientation live preview 1692 shows the entire faces of person 1650A, as well as persons 1650B, and 1650C. Thus, landscape orientation live preview 1692, while at zoom level 1620B (100% of FOV), allows the user to frame a photo (e.g., a potential photo) that includes a greater degree of content. Landscape orientation live preview 1692 also shows a new person, person 1650D, who was not shown in portrait orientation live preview 1682. In some embodiments, device 600 automatically shifts between zoom level 1620A (80% of FOV) and zoom level 1620B (100% of FOV) when the device orientation changes from portrait to landscape because user's typically want to use the front cameras of their devices to capture more of their environment when in a landscape orientation than in a portrait orientation. While displaying landscape orientation live preview 1692 in FIG. 16C, device 600 detects input 1695B (e.g., a tap) on shutter affordance 1648. As illustrated in FIG. 16D, in response to detecting input 1695B, device 600 captures media representative of landscape orientation live preview 1692 and displays a representation 1632 of the media in landscape orientation camera user interface 1690. Representation 1632 is different from representation 1630 in that it is in landscape orientation 1604 and matches zoom level 1620B (100% of FOV).

Device 600 is also capable of changing zoom levels based on various manual inputs. For instance, while displaying landscape orientation live preview 1692 at zoom level 1620B, device 600 detects de-pinch input 1695D or tap input 1695DD on zoom toggle affordance 1616. As illustrated in FIG. 16E, in response to detecting input 1695D or tap input 1695DD, device 600 changes the zoom level of landscape orientation live preview 1692 from zoom level 1620B (100% of FOV) back to zoom level 1620A (80% of FOV). In some embodiments, a de-pinch gesture while at zoom level 1620B (100% of FOV) snaps to zoom level 1620A (80% of FOV; a predetermined zoom level) rather than setting a zoom level entirely based on the magnitude of the de-pinch gesture. However, when changing the zoom level of landscape orientation live preview 1692, live preview 1692 remains in landscape orientation 1604. As a result of changing the zoom level, landscape orientation live preview 1692 currently shows only a portion of person 1650B and ceases to show person 1650D. Also, while the zoom level has changed to be the same zoom level as in FIG. 16B, landscape orientation live preview 1692 shows a different image than portrait orientation live preview 1682 showed because device 600 is now in landscape orientation 1604. While displaying landscape orientation live preview 1692 at zoom level 1620A, device 600 detects de-pinch input 1695E.

As illustrated in FIG. 16F, in response to detecting input 1695E, device 600 changes the zoom level of landscape orientation live preview 1692 from zoom level 1620A (80% of FOV) to zoom level 1620C (e.g., 40% of FOV). Here, landscape orientation live preview 1692 only shows a portion of person 1650A's face and a small amount of persons 1650B and 1650C. In some embodiments, switching between zoom level 1620A (e.g., 80% of FOV) and zoom level 1670 (e.g., 40% of FOV) is not predefined and occurs in response to a pinch gesture based on the magnitude of the pinch gesture. While displaying landscape orientation live preview 1692 at zoom level 1620C (40% of FOV), device 600 detects pinching input 1695F.

As shown in FIG. 16G, in response to detecting pinching input 1695F, device 600 changes the zoom level of landscape orientation live preview 1692 from zoom level 1620C (40% of FOV) back to zoom level 1620A (80% of FOV), which is described above in relation to FIG. 16E. While displaying landscape orientation live preview at zoom level 1620A, device 600 detects pinching input 1695G.

As shown in FIG. 16H, in response to detecting pinching input 1695G, device 600 changes the zoom level of landscape orientation live preview 1692 from zoom level 1620A (80% of FOV) back to zoom level 1620B (100% of FOV), which is described in relation to FIG. 16C-16D. While displaying portrait landscape orientation live preview 1692, device 600 detects counterclockwise rotational input 1695H that causes device 600 to be rotated back into portrait orientation 1602.

As illustrated in FIG. 16I, in response to detecting rotation input 1695H, device 600 displays automatically, without interviewing inputs, portrait orientation camera user interface 1680 that includes portrait orientation live preview 1682 in portrait orientation 1602 at the zoom level 1620A (80% of FOV). Here, device 600 is capable of allowing a user to automatically, without additional inputs, change camera user interface 1692 at zoom level 1620B back into camera user interface 1680 (as illustrated in FIG. 16A) at zoom level 1620A.

At FIG. 16I, device 600 (as described above) also displays zoom toggle affordance 1616 on portrait camera user interface 1680. Zoom toggle affordance 1616 is used to change a live preview between zoom level 1620A (using 80% of FOV) and zoom level 1620B (using 100% of FOV), which is different from pinching inputs (as described above) that allow a user to change the zoom level of a live preview to other zoom levels (e.g., zoom level 1620C). While displaying portrait orientation live preview 1682 at 1620B, device 600 detects input 1695I (e.g., a tap) on zoom toggle affordance 1616.

As illustrated in FIG. 16J, in response to detecting input 1695I, device 600 displays changes the zoom level of portrait orientation live preview 1682 from zoom level 1620A (field-of-view 80% of FOV) to zoom level 1620B (100% FOV). Here, portrait orientation live preview 1682 shows the full face of person 1650A, as well as persons 1650B and 1650C.

FIGS. 16J-16N depict scenarios where device 600 does not automatically change the zoom level of the camera user interface when detecting rotational input. Turning back to FIG. 16J, device 600 detects an input 1695J on camera switching affordance.

As illustrated in FIG. 16K, in response to detecting input 1695J, device 600 displays portrait orientation camera interface 1680 that includes portrait orientation live preview 1684 depicting at least a portion of the field-of-view of one or more cameras. Portrait orientation live preview 1684 is displayed at zoom level 1620D. Additionally, device 600 has switched from being configured to capture media using front-facing camera 1608 to being configured to capture media using of one or more cameras. While displaying live preview 1684, device 600 detects clockwise rotational input 1695K of device 600, changing the device from being in a portrait orientation to a landscape orientation.

As illustrated in FIG. 16L, in response to detecting rotational input 1695K, device 600 displays landscape orientation camera interface 1690. Landscape orientation camera interface camera interface 1690 includes landscape orientation live preview 1694 that depicts the field-of-view of one or more cameras in landscape orientation 1604. Device 600 does not automatically adjust the zoom level, as was seen in FIGS. 16B-16C, so landscape orientation live preview 1694 remains displayed at zoom level 1620D because automatic zoom criteria are not satisfied when device 600 is configured to capture media using a rear-facing camera (e.g., camera on the opposite side of device with respect to front-facing camera 1608). While displaying landscape orientation live preview 1694, device 600 detects input 1695L on live preview 1684 corresponding to the video capture mode affordance.

As illustrated in FIG. 16M, in response to detecting input 1695L, device 600 initiates a video capture mode. In video capture mode, device 600 displays landscape orientation camera interface 1691 at zoom level 1620E. Landscape orientation camera interface 1691 includes landscape orientation live preview 1697 that depicts the field-of-view of a rear-facing camera (e.g., camera on the opposite side of device with respect to front-facing camera 1608). While displaying landscape orientation camera interface 1691, device 600 detects input 1695M on camera switching affordance 1616.

As illustrated in FIG. 16N, in response to detecting input 1695M, device 600 displays landscape orientation camera interface 1691. Landscape orientation camera interface 1691 includes landscape orientation live preview 1697 that depicts the FOV in landscape orientation 1604. Landscape orientation camera interface 1691 and live preview 1697 remain in the landscape orientation 1604 at zoom level 1620E. Additionally, device 600 has switched from being configured to capture media using a rear-facing camera (e.g., camera on the opposite side of device with respect to front-facing camera 1608) to front-facing camera 1608 and remains in video capture mode. While displaying camera interface 1691, device 600 detects counterclockwise rotational input 1695N that causes device 600 to be rotated back into portrait orientation 1602.

As illustrated in FIG. 16O, in response to receiving rotational input 1695N, device 600 displays portrait orientation camera interface 1681. Portrait orientation interface 1681 includes live preview 1687 that depicts at least a portion of field-of-view of front-facing camera 1608 in portrait orientation 1602 at zoom level 1620E because automatic zoom criteria are not satisfied when device 600 is configured to capture media in video mode. Further, as illustrated in FIG. 16O, device 600 displays a notification 1640 to join a live communication session that includes join affordance 1642. While displaying the notification 1640, device 600 detects input (e.g., tap) 16950 on notification affordance 1642.

As illustrated in FIG. 16P, in response to detecting input 1695O, device 600 joins the live communication session. In some embodiments, by joining the live communication session, device 600 switches from video capture mode to a live communication session mode. While in the live communication session, device 600 displays portrait orientation camera interface 1688 in portrait orientation 1602 that includes displaying a portrait orientation live preview 1689 at zoom level 1620A (80% of FOV). While displaying camera interface 1688, device 600 detects clockwise rotational input 1695P that causes device 600 to be rotated into landscape orientation 1604.

As illustrated in FIG. 16Q, in response to detecting rotational input 1695P, device 600 replaces portrait orientation camera user interface 1688 with landscape orientation camera interface 1698 automatically, without additional intervening user inputs. Landscape orientation camera interface 1698 includes a landscape orientation live preview 1699 that is displayed at zoom level 1620B (e.g., at 100% of FOV) because a set of automatic zoom criteria are satisfied when device 600 is transmitting live video in a live communication session (e.g., as opposed to being in a video capture mode).

FIGS. 17A-17B are a flow diagram illustrating a method for varying zoom levels using an electronic device in accordance with some embodiments. Method 1700 is performed at a device (e.g., 100, 300, 500, 600) with a display device (e.g., a touch-sensitive display) and a camera (e.g., 1608; one or more cameras (e.g., dual cameras, triple camera, quad cameras, etc.) on different sides of the electronic device (e.g., a front camera, a back camera)). Some operations in method 1700 are, optionally, combined, the orders of some operations are, optionally, changed, and some operations are, optionally, omitted.

As described below, method 1700 provides an intuitive way for varying zoom levels. The method reduces the cognitive burden on a user for varying zoom levels, thereby creating a more efficient human-machine interface. For battery-operated computing devices, enabling a user to vary zoom levels faster and more efficiently conserves power and increases the time between battery charges.

While the electronic device (e.g., 600) is in a first orientation (e.g., 1602) (e.g., the electronic is orientated in portrait orientation (e.g., the electronic device is vertical)), the electronic device displays (1702), via the display device, a first camera user interface (e.g., 1680) for capturing media (e.g., image, video) in a first camera orientation (e.g., portrait orientation) at a first zoom level (e.g., zoom ratio (e.g., 1×, 5×, 10×)).

The electronic device (e.g., 600) detects (1704) a change (e.g., 1695B) in orientation of the electronic device from the first orientation (e.g., 1602) to a second orientation (e.g., 1604).

In response to detecting the change in orientation of the electronic device (e.g., 600) from the first orientation (e.g., 1602) to a second orientation (e.g., 1604) (1706) (e.g., the electronic device is changing from being orientated in a portrait orientation to a landscape orientation (e.g., the electronic device is horizontal)), in accordance with a determination that a set of automatic zoom criteria are satisfied (e.g., automatic zoom criteria include a criterion that is satisfied when the electronic device using a first camera (e.g., a front camera) to capture the field-of-view of the camera and/or a when the electronic device in one or more other modes (e.g., portrait mode, photo mode, mode associated with a live communication session)), the electronic device (e.g., 600) automatically, without intervening user inputs, displays (1708) a second camera user interface (e.g., 1690) for capturing media in a second camera orientation (e.g., landscape orientation) at a second zoom level that is different from the first zoom level (e.g., detecting that the orientation of the electronic device is changing from a portrait orientation to a landscape orientation). Automatically displaying, without intervening user inputs, a second camera user interface for capturing media in a second camera orientation at a second zoom level that is different from the first zoom level reduces the number of inputs needed to perform an operation, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) displays (1710) (e.g., in the first camera user interface and in the second camera user interface) a media capture affordance (e.g., a selectable user interface object) (e.g., a shutter button). In some embodiments, the electronic device (e.g., 600) detects (1712) a first input that corresponds to the media capture affordance (e.g., 1648) (e.g., a tap on the affordance). In some embodiments, in response to detecting the first input (1714), in accordance with a determination that the first input was detected while the first camera user interface (e.g., 1680) is displayed, the electronic device (e.g., 600) captures (1716) media at the first zoom level (e.g., 1620A). In some embodiments, in response to detecting the first input (1714), in accordance with a determination that the first input was detected while the second camera user interface (e.g., 1690) is displayed, the electronic device (e.g., 600) captures (1718) media at the second zoom level (e.g., 1620B). Capturing media at different zoom levels based on a determination of whether the first input is detected while the first camera user interface is displayed or while the second camera user interface is displayed enables a user to quickly and easily capture media without the need to manually configure zoom levels. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first camera user interface (e.g., 1680) includes displaying a first representation (e.g., 1682) (e.g., a live preview (e.g., a live feed of the media that can be captured)) of a field-of-view of the camera (e.g., an open observable area that is visible to a camera, the horizontal (or vertical or diagonal) length of an image at a given distance from the camera lens). In some embodiments, the first representation is displayed in the first camera orientation (e.g., a portrait orientation) at the first zoom level (e.g., 1620A) (e.g., 80% of camera's field-of-view, zoom ratio (e.g., 1×, 5×, 10×)). In some embodiments, the first representation (e.g., 1682) is displayed in real time. In some embodiments, displaying the second camera user interface (e.g., 1690) includes displaying a second representation (e.g., 1692) (e.g., a live preview (e.g., a live feed of the media that can be captured)) of the field-of-view of the camera (e.g., an open observable area that is visible to a camera, the horizontal (or vertical or diagonal) length of an image at a given distance from the camera lens). In some embodiments, the second representation (e.g., 1692) is displayed in the second camera orientation (e.g., a landscape orientation) at the second zoom level (e.g., 1620B) (e.g., 100% of camera's field-of-view, zoom ratio (e.g., 1×, 5×, 10×)). In some embodiments, the second representation (e.g., 1692) is displayed in real time.

In some embodiments, the first orientation (e.g., 1602) is a portrait orientation and the first representation is a portion of the field-of-view of the camera, and the second orientation (e.g., 1604) is a landscape orientation and the second representation is an entire field-of-view of the camera. In some embodiments, in portrait orientation, the representation (e.g., 1682) displayed in the camera interface is a cropped portion of the field-of-view of the camera. In some embodiments, in landscape orientation, the representation (e.g., 1692) displayed in the camera interface is the entire field-of-view of the camera (e.g., the field-of-view of the camera (e.g., 1608) is not cropped).

In some embodiments, while displaying the first representation (e.g., 1682) of the field-of-view of the camera, the electronic device (e.g., 600) receives (1720) a request (e.g., a pinch gesture on the camera user interface) to change the first zoom level (e.g., 1620A) to a third zoom level (e.g., 1620B). In some embodiments, the request is received when the automatic zoom criteria are satisfied (e.g., automatic zoom criteria include a criterion that is satisfied when the electronic device using a first camera (e.g., a front camera) to capture the field-of-view of the camera and/or a when the electronic device in one or more other modes (e.g., portrait mode, photo mode, mode associated with a live communication session)). In some embodiments, in response to receiving the request to change the first zoom level (e.g., 1620A) to the third zoom level (e.g., 1620B), the electronic device (e.g., 600) replaces (1722) display of the first representation (e.g., 1682) with a third representation (e.g., a live preview (e.g., a live feed of the media that can be captured)) of the field-of-view of the camera. In some embodiments, the third representation is in the first camera orientation and at the third zoom level. In some embodiments, the third zoom level (e.g., 1620B) is the same as the second zoom level (e.g., 1620A and 1620B). In some embodiments, a user can use a pinch out (e.g., two contacts moving relative to each other so that a distance between the two contacts increases) gesture to zoom in on the representation from a first zoom level (e.g., 80%) to a third zoom level (e.g., second zoom level (e.g., 100%)) (e.g., capture less of the field-of-view of the camera). In some embodiments, a user can use a pinch in (e.g., two fingers coming together) gesture to zoom out the representation from a first zoom level (e.g., 100%) to a third zoom level (e.g., second zoom level (e.g., 80%)) (e.g., capture more of the field-of-view of the camera).

In some embodiments, while displaying the first representation (e.g., 1682) of the field-of-view of the camera, the electronic device (e.g., 600) displays (1724) (e.g., displaying in the first camera user interface and in the second camera user interface) a zoom toggle affordance (e.g., 1616) (e.g., a selectable user interface object). Displaying a zoom toggle affordance while displaying the first representation of the field-of-view of the camera enables a user to quickly and easily adjust the zoom level of the first representation manually, if needed. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the electronic device (e.g., 600) detects (1726) a second input (e.g., 16951) that corresponds to selection of the zoom toggle affordance (e.g., 1616) (e.g., a selectable user interface object) (e.g., a tap on the affordance). In some embodiments, selection of the zoom toggle affordance to a request to change the first zoom level to a fourth zoom level. In some embodiments, in response to detecting the second input, the electronic device (e.g., 600) replaces (1728) display of the first representation (e.g., 1682) with a fourth representation (e.g., a live preview (e.g., a live feed of the media that can be captured)) of the field-of-view of the camera. In some embodiments, the fourth representation (e.g., a live preview (e.g., a live feed of the media that can be captured)) is in the first camera orientation and at the fourth zoom level. In some embodiments, the fourth zoom level is the same as the second zoom level. In some embodiments, a user taps an affordance to zoom in on the representation from a first zoom level (e.g., 80%) to a third zoom level (e.g., the second zoom level (e.g., 100%)) (e.g., capture less of the field-of-view of the camera). In some embodiments, a user can tap on an affordance to zoom out the representation from a first zoom level (e.g., 100%) to a third zoom level (e.g., second zoom level (e.g., 80%)) (e.g., capture more of the field-of-view of the camera). In some embodiments, once selected, the affordance for changing the zoom level can toggle between a zoom in and a zoom out state when selected (e.g., display of the affordance can change to indicate that the next selection will cause the representation to be zoomed out or zoomed in).

In some embodiments, the zoom toggle affordance (e.g., 1616) is displayed in the first camera user interface (e.g., 1680) and the second camera interface (e.g., 1690). In some embodiments, the zoom toggle affordance (e.g., 1616) is initially displayed in the first camera user interface with an indication that it will, when selected, configure the electronic device to capture media using the second zoom level, and is initially displayed in the second camera user interface with an indication that it will, when selected, configure the electronic device (e.g., 600) to capture media using the first zoom level.

In some embodiments, while displaying the first representation (e.g., 1682) of the field-of-view of the camera, the electronic device (e.g., 600) receives a request (e.g., a pinch gesture (e.g., 1695D-16951) on the camera user interface) to change the first zoom level (e.g., 1620A) to a third zoom level (e.g., 1620B). In some embodiments, the request is received when the electronic device (e.g., 600) is operating in a first mode (e.g., a mode that includes a determination that the electronic device using a first camera (e.g., a front camera) to capture the field-of-view of the camera and/or a determination of operating the device in one or more other modes (e.g., portrait mode, photo mode, mode associated with a live communication session)). In some embodiments, in response to receiving the request to change the first zoom level (e.g., 1620A) to the third zoom level (e.g., 1620C), the electronic device (e.g., 600) replaces display of the first representation (e.g., 1682) with a fifth representation (e.g., a live preview (e.g., a live feed of the media that can be captured)) of the field-of-view of the camera. In some embodiments, the fifth representation is in the first camera orientation and at the fifth zoom level. In some embodiments, the fifth zoom level is the different from the second zoom level. In some embodiments, the user can zoom-in and out of the representation to a zoom level that the device would not automatically display the representation when the orientation of the device is changed.

In some embodiments, the camera includes a first camera (e.g., a front camera (e.g., a camera located on the first side (e.g., front housing of the electronic device)) and a second camera (e.g., a rear camera (e.g., located on the rear side (e.g., rear housing of the electronic device))) that is distinct from the first camera. In some embodiments, the automatic zoom criteria include a criterion that is satisfied when the electronic device (e.g., 600) is displaying, in the first camera user interface (e.g., 1680, 1690), (e.g., set by the user of the device, a representation that is displayed of the field-of-view of the camera, where the camera corresponds to the first or second camera) a representation of the field-of-view of the first camera and not a representation of the field-of-view of the second camera. In some embodiments, in accordance with a determination that the automatic zoom criteria are not met (e.g., the device is displaying a representation of the field-of-view of the second camera and not the first camera) (e.g., FIG. 16J-16K), the electronic device (e.g., 600) forgoes automatically, without intervening user inputs, displaying a second camera user interface (e.g., 1690) for capturing media in a second camera orientation (e.g., landscape orientation) at a second zoom level that is different from the first zoom level. Automatically forgoing displaying, without intervening user inputs, the second camera user interface for capturing media in the second camera orientation at the second zoom level in accordance with a determination that the automatic zoom criteria are not met prevents unintended access to the second camera user interface. Automatically forgoing performing an operation when a set of conditions has not been met enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the automatic zoom criteria include a criterion that is satisfied when the electronic device (e.g., 600) is not in a video capture mode of operation (e.g., capturing video that does not include video captured while the electronic device is in a live communication session between multiple participants, streaming video (e.g., FIGS. 16M-16N)).

In some embodiments, the automatic zoom criteria include a criterion that is satisfied when the electronic device (e.g., 600) is configured to capture video for a live communication session (e.g., communicating in live video chat (e.g., live video chat mode) between multiple participants, displaying a user interface for facilitating a live communication session (e.g., first camera user interface is a live communication session interface) (e.g., FIGS. 16P-16Q)).

In some embodiments, the first zoom level is higher than the second zoom level (e.g., the first zoom level is 10× and the second zoom level is 1×; the first zoom level is 100% and the second zoom level is 80%). In some embodiments, while displaying the second camera user interface (e.g., 1690), the electronic device (e.g., 600) detects a change in orientation of the electronic device from the second orientation (e.g., 1604) to the first orientation (e.g., 1602). In some embodiments, in response to detecting the change in orientation of the electronic device (e.g., 600) from the second orientation to the first orientation (e.g., switching the device from landscape to portrait mode), the electronic device displays, on the display device, the first camera user interface (e.g., 1680). In some embodiments, when switching the device from a landscape orientation (e.g., a landscape mode) to a portrait orientation (e.g., a portrait mode), the camera user interface zooms in and, when switching the device from a portrait orientation to a landscape orientation, the device zooms outs.

Note that details of the processes described above with respect to method 1700 (e.g., FIGS. 17A-17B) are also applicable in an analogous manner to the methods described above and below. For example, methods 700, 900, 1100, 1300, 1500, 1900, 2000, 2100, 2300, 2500, 2700, 2800, 3000, 3200, 3400, 3600, and 3800 optionally include one or more of the characteristics of the various methods described above with reference to method 1700. For brevity, these details are not repeated below.

FIGS. 18A-18X illustrate exemplary user interfaces for managing media using an electronic device in accordance with some embodiments. The user interfaces in these figures are used to illustrate the processes described below, including the processes in FIGS. 19A-19B, 20A-20C, and 21A-21C.

In particular, FIGS. 18A-18X illustrate device 600 operating in several environments with different levels of visible light. An environment that has an amount of light below a low-light threshold (e.g., 20 lux) will be referred to as a low-light environment. An environment having an amount of light above the low-light threshold will be referred to as a normal environment. In the examples below, device 600 can detect, via one or more cameras, whether there is a change in the amount of light in an environment (e.g., in the field-of-view of the one or more cameras (FOV)) and determine whether device 600 is operating in a low-light environment or a normal environment. The discussion below will illustrate the interplay of providing different user interfaces based on whether device 600 is operating in or out of a low-light environment.

As illustrated in FIG. 18A, device 600 displays a camera user interface that includes camera display region 604, control region 606, and indicator region 602. Live preview 630 is a representation of the FOV.

Live preview 630 shows a person posing for a picture in a well-lit environment. Therefore, the amount of light in the FOV is above a low-light threshold and device 600 is not operating in the low-light environment. Because device 600 is not operating in a low-light environment, device 600 continuously captures data in the FOV and updates live preview 630 based on a standard frame rate.

As illustrated in FIG. 18B, device 600 displays live preview 630 showing a person posing for a picture in a low-light environment, which is evident by live preview 630 displaying a visually darker image. Because device 600 is operating in the low-light environment, device 600 displays low-light mode status indicator 602*c* and flash status indicator 602*a*. Low-light mode status indicator 602*c* indicates that low-light mode is inactive (e.g., device 600 is not configured to operate in low-light mode) and flash status indicator 602*a* indicates that a flash operation is active (e.g., device 600 is configured to perform a flash operation when capturing an image). In some embodiments, flash status indicator 602*a* can appear in control region 606, even when device 600 is not operating in a low-light environment. At FIG. 18B, device 600 detects input 1895A on low light mode status indicator 602*c*.

As illustrated in FIG. 18C, in response to input 1895A, device 600 updates low-light mode status indicator 602*c* to indicate that low-light mode is active and flash mode status indicator 602*a* to indicate that the flash operation is inactive. While low-light mode and the flash operation are both useful when capturing media in a darker environment, in the present embodiment, low-light mode is mutually exclusive with the flash operation. In addition, in response to input 1895A, device 600 displays adjustable low-light mode control 1804 for setting a capture duration for capturing media in the low-light mode. Indication 1818 on adjustable low-light mode control 1804 indicates that the low-light mode is set to a particular capture duration, where each tick mark on adjustable low-light mode control 1804 represents a different capture duration.

Notably, live preview 630 is visually brighter in FIG. 18C than it was in FIG. 18B. This is because when low-light mode is active, device 600 operates one or more of its cameras using a lower frame rate (e.g., corresponding to longer exposure times). Using the standard frame rate (e.g., a higher frame rate) in a low light environment captures darker images (as shown in FIG. 18B) because exposure times for each frame are short. Thus, when device 600 is operating in low-light mode (as shown in 18C), device 600 lowers the frame rate from the standard frame rate.

In FIG. 18C, device 600 is being held substantially still and the subject in the FOV is likewise substantially still. In some embodiments, if the content in the FOV is moving above a threshold speed (e.g., due to movement of device 600 and/or movement of the subjects in the FOV), device 600 forgoes lowering the frame rate or lowers the frame rate to a lesser degree than if movement is not detected, as lower framerates can result in blurred images, when content is moving in the FOV. Thus, device 600 can be configured to balance the options between decreasing the frame rate due to low-light in the environment and increasing the frame rate due to detected movement in the environment.

As illustrated in FIG. 18D, in response to detecting input 1895B, device 600 has started capturing media using low-light mode. When initiating capture of the media, live preview 630 ceases to be displayed. In particular, live preview 630 darkens to black. Moreover, device 600 also replaces display of shutter affordance 610 with stop affordance 1806 and generates tactile response 1820A. Stop affordance 1806 indicates that low-light mode capture can be stopped by an input on stop affordance 1806. Further in response to detecting input 1895B, device 600 also initiates movement of indication 1818 towards a capture duration of zero (e.g., a countdown from 1 sec to zero). In some embodiments, adjustable low-light mode control 1804 also changes color (e.g., white to red) in response to detecting input 1895B.

As illustrated in FIG. 18E, while capturing media, device 600 moves indication 1818 on adjustable low-light mode control 1804 to a capture duration that is near zero. As shown in FIG. 18E, live preview 630 is displayed with a representation of media that has been captured between the one second capture duration (e.g., in 18E) and the near zero capture duration.

As illustrated in FIG. 18F, after completing the capture of media in low-light mode, device 600 displays a representation 1812 of the captured media. Device 600 replaces display of stop affordance 1806 with shutter affordance 610 after the media is captured. While low-light mode status indicator 602*c* indicates that low-light mode is active, device 600 detects input 1895C on low-light mode status indicator 602*c*.

As illustrated in FIG. 18G, in response to receiving input 1895C, device 600 updates low-light mode status indicator 602*c* to indicate that low-light mode is inactive and updates flash status indicator 602*a* to indicate that the flash operation is active. Further, in response to detecting input 1895C, device 600 ceases to display adjustable low-light mode control 1804. In some embodiments, when device 600 goes from operating in low-light conditions to normal conditions, adjustable low-light mode control 1804 ceases to be displayed automatically without any user input.

Notably, because low-light mode is inactive, device 630 increases the frame rate of one or more cameras of its cameras and live preview 630 is visually darker, as in FIG. 18B. At FIG. 18G, device 600 detects input 1895D on low-light mode controller affordance 614*b* that device 600 has displayed adjacent to additional camera control affordance 614.

As illustrated in FIG. 18H, in response to detecting input 1895D, device 600 updates low-light mode status indicator 602*c* to indicate that low-light mode is active and updates flash status indicator 602*c* to indicate that the flash operation is inactive. Device 600 redisplays adjustable low-light mode control 1804 with indication 1818 set to the previous one second capture duration. Notably, because low-light mode is active, device 600 decreases the frame rate of one or more of its cameras, which makes live preview 630 visually brighter, as in FIG. 18C. At FIG. 18H, device 600 detects input 1895E on indication 1818 to adjust adjustable low-light mode control 1804 to a new capture duration.

As illustrated in FIG. 18I, in response to receiving input 1895E, device 600 moves indication 1818 from a one second capture duration to a two second capture duration. While moving indication 1818 from the one second duration to the two second capture duration, device 600 brightens live preview 630. In some embodiments, device 600 displays a brighter live preview 630 by decreasing (e.g., further decreasing) the frame rate of one or more cameras of device 600 and/or by applying one or more image-processing techniques. At FIG. 18I, device 600 detects input 1895F on indication 1818 to adjust adjustable low-light mode control 1804 to a new capture duration. In some embodiments, input 1895F is a second portion of input 1895E (e.g., a continuous dragging input that includes 1895E and 1895F).

As illustrated in FIG. 18J, in response to detecting input 1895F, device 600 moves indication 1818 from a two second capture duration to a four second capture duration. While moving indication 1818 from the two second capture duration to the four second capture duration, device 600 further brightens live preview 630. At FIG. 18J, device 600 detects input 1895G on shutter affordance 610. As illustrated in FIGS. 18K-18M, in response to detecting input 1895G, device 600 initiates capture of media based on the four second capture duration that was set in FIG. 18K. FIGS. 18K-18M illustrate a winding up animation 1814. Winding up animation 814 includes an animation of the low-light mode control 1804 starting at 0 seconds (18K) before progressing rapidly to the 2 second mark (18L) before arriving at the 4 second mark (18M), which is equal to the captured duration of the adjustable low-light mode control 1804 (e.g., four seconds). Winding up animation generates tactile output at various stages. Winding up animation 1814 corresponds to the start of the low-light mode media capture. In some embodiments, winding up animation is a smooth animation that displays FIGS. 18K-18M at evenly spaced intervals. In some embodiments, device 600 generates a tactile output in conjunction with winding up animation (e.g., tactile outputs 1820B-1820D). In some embodiments, the winding up animation occurs in relatively short amount of time (e.g., 0.25 seconds, 0.5 seconds).

After displaying the winding up animation 1814, device 600 displays winding down animation 1822 as illustrated in FIGS. 18M-18Q. Winding down animation 1822 occurs based on the capture duration and coincides with image capture occurring. Wounding down animation generates tactile output at various stages. Turning back to FIG. 18M, device 600 displays indication 1818 at a four second capture duration.

As illustrated in FIG. 18N, device 600 has moved indication 1818 from the four second capture duration to a three and a half seconds to indicate the remaining capture duration, without updating live preview 630 or generating a tactile output.

As illustrated in FIG. 18O, device 600 has moved indication 1818 from the three and a half second capture duration to a three second capture remaining duration. Device 600 updates live preview 630 to show an image representative of camera data that has been captured up until the three second capture remaining duration. (e.g., 1 second of captured camera data). Notably, in FIGS. 18N-18O, device 600 does not continuously update live preview 630 to show a brighter image. Instead, device 600 only updates live preview 630 at one second intervals of capture duration. In addition to updating live preview 630, device 600 generates tactile output 1820E.

As illustrated in FIG. 18P, device 600 moves indication 1818 from the three second capture remaining duration to the two second capture remaining duration and generates tactile output 1820F. Further, in view of 18N, live preview 630 is visually brighter here because live preview 630 updates at one second intervals with additional, captured camera data. In some embodiments, the live preview is updated at intervals other than 1 second (e.g., 0.5 seconds, 2 seconds).

As illustrated in FIG. 18Q, device 600 moves indication 1818 from a two second capture remaining duration to a zero capture remaining duration. In FIG. 18Q, live preview 630 is visually brighter than it was in FIG. 18P.

As illustrated in FIG. 18R, device 600 has completed capture over the full 4 second duration and displays a representation 1824 of the media that was captured. Representation 1826 is brighter than each of the live previews of FIG. 18O (e.g., 1 second of data) and 18P (2 seconds of data) and is comparable in brightness to the live preview of FIG. 18Q (4 seconds of data).

In some embodiments, device 600 detects an input on stop affordance 820 while capturing media and before the completion of the set capture duration. In such embodiments, device 600 uses data captured up to that point to generate and store media. FIG. 18S shows the result of an embodiment in which capture is stopped 1 second in to a 4 second capture. In 18S, representation 1824 of the media captured in the 1 second interval prior to being stopped is noticeably darker than representation 1826 of FIG. 18R, which was captured over a 4 second duration.

Turning back to FIG. 18R, device 600 detects input 1895R on adjustable low-light mode control 1804. As illustrated in FIG. 18T, in response to detecting input 1895R, device 600 moves indication 1818 from the four second capture duration to the zero second capture duration. In response to moving indication 1818 to the zero capture duration, device 600 updates low-light mode status indicator 602*c* to indicate that low-light mode is inactive. In addition, device 600 updates flash status indicator 602*a* to indicate that the flash operation is active. Accordingly, setting low-light mode control 1804 to a duration of zero is equivalent to turning off low-light mode.

At FIG. 18T, device 600 detects input 1895S on additional control affordance 614.

As illustrated in FIG. 18U, in response to detecting input 1895S, device 600 displays low-light mode control affordance 614*b* in control region 606.

FIGS. 18V-18X illustrates different sets of user interfaces showing flash status indicators 602*c*1-602*c*3 and low light mode status indicator 602*c*1-602*c*3 in three different surroundings. FIGS. 18V-18X show devices 600A, 600B, and 600C, which each include one or more features of devices 100, 300, 500, or 600. Device 600A displays adjustable flash control as set to on, device 600B displays adjustable flash control 662B as set to auto, and device 600B display adjustable flash control 662C as set to off. As discussed above, in relation to FIGS. 6H-61, adjustable flash control 662 sets a flash setting for device 600.

FIG. 18V illustrates a surroundings where the amount 1888 of light in the FOV is between ten lux and zero lux, as shown by indicator graphic 1888. Because the amount of light in the FOV is between ten lux and zero lux (e.g., very low-light mode), device 600 displays low-light status indicator as active only when flash is set to off. As shown in FIG.

18V, low-light indicator 602c2 is the only low-light indicator displayed as active and flash status indicator 602a2 is the only flash status indicator that is set to inactive because adjustable flash control 662B is set to off.

FIG. 18W illustrates an environment where the amount 1890 of light FOV is between twenty lux and ten lux. Because the amount of light FOV is between twenty lux and ten lux (e.g., a moderately low-light), device 600 displays low-light status indicator as inactive only when flash is set to on. As shown in FIG. 18W, low-light indicator 602c1 is the only low-light indicator displayed as inactive and flash status indicator 602a1 is the only flash status indicator that is set to active because adjustable flash control 662A is set to on.

FIG. 18X illustrates a surroundings where the amount 1892 of light in the FOV is above twenty lux. Because the amount of light in the FOV is above 20 lux (e.g., normal light), a low-light indicator is not displayed on any of devices 600A-600C. Flash status indicator 602c-2 is displayed as active because adjustable flash control 662A is set to on. Flash status indicator 602c-3 is displayed as inactive because adjustable flash control 662B is set to off. Device 600C does not display a flash status indicator because adjustable flash control 662C is set to auto and device 600 has determined that flash is not automatically operable above 10 lux.

FIGS. 19A-19B are a flow diagram illustrating a method for varying frame rates using an electronic device in accordance with some embodiments. Method 1900 is performed at a device (e.g., 100, 300, 500, 600) with a display device (e.g., a touch-sensitive display), and one or more cameras (e.g., one or more cameras (e.g., dual cameras, triple camera, quad cameras, etc.) on different sides of the electronic device (e.g., a front camera, a back camera)). Some operations in method 1900 are, optionally, combined, the orders of some operations are, optionally, changed, and some operations are, optionally, omitted.

As described below, method 1900 provides an intuitive way for varying frame rates. The method reduces the cognitive burden on a user for varying frame rates, thereby creating a more efficient human-machine interface. For battery-operated computing devices, enabling a user to vary frame rates faster and more efficiently conserves power and increases the time between battery charges.

The electronic device (e.g., 600) displays (1902), via the display device, a media capture user interface that includes displaying a representation (e.g., 630) (e.g., a representation over-time, a live preview feed of data from the camera) of a field-of-view of the one or more cameras (e.g., an open observable area that is visible to a camera, the horizontal (or vertical or diagonal) length of an image at a given distance from the camera lens).

In some embodiments, displaying the media capture user interface includes (1904), in accordance with a determination that the variable frame rate criteria are met, displaying (1906) an indication (e.g., 602c) (e.g., a low-light status indicator) that a variable frame rate mode is active. Displaying the indication that a variable frame rate mode is active in accordance with a determination that the variable frame rate criteria are met provides a user with visual feedback of the state of the variable frame rate mode (e.g., 630 in 18B and 18C). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, displaying the media capture user interface includes (1904), in accordance with a determination that the variable frame rate criteria are no satisfied, displaying (1908) the media capture user interface without the indication that the variable frame rate mode is active. In some embodiments, the low-light status indicator (e.g., 602c) indicates that the device is operating in a low-light mode (e.g., low-light status indicator includes a status (e.g., active or inactive) of whether the device is operating in a low-light mode).

In some embodiments, the representation (e.g., 1802) of the field-of-view of the one or more cameras updated based on the detected changes in the field-of-view of the one or more cameras at the first frame rate is displayed, on the display device, at a first brightness (e.g., 630 in 18B and 18C). In some embodiments, the representation (e.g., 1802) of the field-of-view of the one or more cameras updated based on the detected changes in the field-of-view of the one or more cameras at the second frame rate that is lower than the first frame rate is displayed (e.g., by the electronic device), on the display device, at a second brightness that is visually brighter than the first brightness (e.g., 630 in 18B and 18C). In some embodiments, decreasing the frame rate increases the brightness of the representation that is displayed on the display (e.g., 630 in 18B and 18C).

While displaying the media capture user interface (e.g., 608), the electronic device (e.g., 600) detects (1910), via the camera, changes (e.g., changes that are indicative of movement) in the field-of-view of the one or more cameras (e.g., 630 in 18B and 18C).

In some embodiments, the detected changes include detected movement (e.g., movement of the electronic device; a rate of change of the content in the field-of-view). In some embodiments, the second frame rate is based on an amount of the detected movement. In some embodiments, the second frame rate increases as the movement increases (e.g., 630 in 18B and 18C).

In response to detecting the changes in the field-of-view of the one or more cameras and in accordance with a determination that variable frame rate criteria (e.g., a set of criteria that govern whether the representation of the field-of-view is updated with a variable or static frame rate) are satisfied (1912), in accordance with a determination that the detected changes in the field-of-view of the one or more cameras (e.g., one or more cameras integrated into a housing of the electronic device) satisfy movement criteria (e.g., a movement speed threshold, a movement amount threshold, or the like), the electronic device (e.g., 600) updates (1914) the representation (e.g., 630) of the field-of-view of the one or more cameras based on the detected changes in the field-of-view of the one or more cameras at a first frame rate (e.g., 630 in 18C). By updating the representation of the field-of-view of the one or more cameras based on the detected changes in the field-of-view of the one or more cameras at a first frame rate in accordance with a determination that the detected changes in the field-of-view of the one or more cameras satisfy movement criteria, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, frame rate criteria include a criterion that is satisfied when the electronic device is determined to be moving (e.g., the predetermined threshold is based on position displacement, speed, velocity, acceleration, or a combination of any thereof). In some embodiments, frame rate criteria include a criterion that is satisfied when the electronic device (e.g., 600) is determined to be not moving (e.g., 630 in 18B and 18C) (e.g., substantially stationary (e.g., movement of the device is more than or equal to a predetermined threshold (e.g., the predetermined threshold is based on position displacement, speed, velocity, acceleration, or a combination of any thereof))).

In response to detecting the changes in the field-of-view of the one or more cameras and in accordance with a determination that variable frame rate criteria (e.g., a set of criteria that govern whether the representation of the field-of-view is updated with a variable or static frame rate) are satisfied (1912), in accordance with a determination that the detected changes in the field-of-view of the one or more cameras do not satisfy the movement criteria, the electronic device (e.g., 600) updates (1916) the representation (e.g., 630) of the field-of-view of the one or more cameras based on the detected changes in the field-of-view of the one or more cameras at a second frame rate, where the second frame rate is lower than the first frame rate (e.g., a frame rate and where the image data is captured using a second exposure time, longer than the first exposure time) (e.g., 630 in 18A and 18B). By updating the representation of the field-of-view of the one or more cameras based on the detected changes in the field-of-view of the one or more cameras at the second frame rate in accordance with a determination that the detected changes in the field-of-view of the one or more cameras do not satisfy the movement criteria, the electronic device performs an operation when a set of conditions has been met (or, on the other hand, has not been met) without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the variable frame rate criteria include a criterion that is satisfied when ambient light in the field-of-view of the one or more cameras is below a threshold value (e.g., the variable frame rate criteria are not satisfied when ambient light is above the threshold value) and prior to detecting the changes in the field-of-view of the one or more cameras, the representation of the field-of-view of the one or more cameras is updated at a third frame rate (e.g., a frame rate in normal lighting conditions) (e.g., 1888, 1890, and 1892) (1918). In some embodiments, in response to detecting the changes in the field-of-view of the one or more cameras and in accordance with a determination that the variable frame rate criteria are not met, the electronic device (e.g., 600) maintains (1920) the updating of the representation of the field-of-view of the one or more cameras at the third frame rate (e.g., irrespective of whether the detected changes in the field-of-view of the one or more cameras satisfies the movement criteria (e.g., without determining or without consideration of the determination)) (e.g., 630 in FIG. 8A). By maintaining the updating of the representation of the field-of-view of the one or more cameras at the third frame rate in response to detecting the changes in the field-of-view of the one or more cameras and in accordance with a determination that the variable frame rate criteria are not met, the electronic device performs an operation when a set of conditions has been met (or, on the other hand, has not been met) without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the low-light variable frame rate criteria include a criterion that is satisfied a flash mode is inactive. In some embodiments, the low-light status indicator (e.g., 602*c*) is mutually exclusive with a flash operation (e.g., active when a flash operation is inactive or inactive when a flash operation is active). In some embodiments, the status of a flash operation and the status of a low-light capture mode are opposite of each other.

In some embodiments, the second frame rate is based on an amount of ambient light in the field-of-view of the one or more cameras is below a respective threshold. In some embodiments, the ambient can be detected by one or more cameras or a detected ambient light sensor. In some embodiments, the frame decreases as the ambient light decreases.

In some embodiments, the movement criteria includes a criterion that is satisfied when the detected changes in the field-of-field of the one or more cameras correspond to movement of the electronic device (e.g., 600) (e.g., correspond to a rate of change of the content in the field-of-view due to movement) that is greater than a movement threshold (e.g., a threshold rate of movement).

Note that details of the processes described above with respect to method 1900 (e.g., FIGS. 19A-19B) are also applicable in an analogous manner to the methods described above and below. For example, methods 700, 900, 1100, 1300, 1500, 1700, 2000, 2100, 2300, 2500, 2700, 2800, 3000, 3200, 3400, 3600, and 3800 optionally include one or more of the characteristics of the various methods described above with reference to method 1900.

FIGS. 20A-20C is a flow diagram illustrating a method for accommodating lighting conditions using an electronic device in accordance with some embodiments. Method 2000 is performed at a device (e.g., 100, 300, 500, 600) with a display device (e.g., a touch-sensitive display) and one or more cameras (e.g., one or more cameras (e.g., dual cameras, triple camera, quad cameras, etc.) on different sides of the electronic device (e.g., a front camera, a back camera)). Some operations in method 2000 are, optionally, combined, the orders of some operations are, optionally, changed, and some operations are, optionally, omitted.

As described below, method 2000 provides an intuitive way for accommodating lighting conditions. The method reduces the cognitive burden on a user for viewing camera indications, thereby creating a more efficient human-machine interface. For battery-operated computing devices, enabling a user to accommodate lighting conditions faster and more efficiently conserves power and increases the time between battery charges.

The electronic device (e.g., 600) receives (2002) a request to display a camera user interface (e.g., a request to display the camera application or a request to switch to a media capture mode within the camera application).

In response to receiving the request to display the camera user interface, the electronic device (e.g., 600) displays (2004), via the display device, a camera user interface.

Displaying the camera user interface (2004) includes the electronic device (e.g., 600) displaying (2006), via the display device (e.g., 602), a representation (e.g., 630) (e.g., a representation over-time, a live preview feed of data from the camera) of a field-of-view of the one or more cameras (e.g., an open observable area that is visible to a camera, the horizontal (or vertical or diagonal) length of an image at a given distance from the camera lens).

Displaying the camera user interface (2004) includes, in accordance with a determination that low-light conditions have been met, where the low-light conditions include a condition that is met when ambient light in the field-of-view of the one or more cameras is below a respective threshold (e.g., 20 lux) (e.g., or, in the alternative, between a respective range of values), the electronic device (e.g., 600) displaying (2008), concurrently with the representation (e.g., 630) of the field-of-view of the one or more cameras, a control (e.g., 1804) (e.g., a slider) for adjusting a capture duration for capturing media (e.g., image, video) in response to a request to capture media (e.g., a capture duration adjustment control). Displaying the control for adjusting a capture duration for capturing media concurrently with the representation of the field-of-view of the one or more cameras enables a user to quickly and easily adjust the capture duration while viewing the representation of the field-of-view. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the adjustable control (e.g., 1804) includes tick marks, where each tick mark is representative of a value on the adjustable control. In some embodiments, the ambient light determined by detecting ambient light via one or more cameras or a dedicated ambient light sensor.

Displaying the camera user interface (2004) includes, in accordance with a determination that the low-light conditions have not been met, the electronic device (e.g., 600) forgoes display of (2010) the control (e.g., 1804) for adjusting the capture duration. By forgoing displaying the control for adjusting the capture duration in accordance with a determination that the low-light conditions have not been met, the electronic device performing an operation when a set of conditions has been met (or, has not been met) without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more efficiently.

In some embodiments, while displaying the control (e.g., a slider) for adjusting the capture duration, the electronic device (e.g., 600) acquires (2012) (e.g., receives, determines, obtains) an indication that low-light conditions (e.g., decrease in ambient light or increase in ambient light) are no longer met (e.g., at another time another determination of whether low-light conditions are met occurs). In some embodiments, in response to acquiring the indication, the electronic device (e.g., 600) ceases to display (2014), via the display device, the control for adjusting the capture duration. By ceasing to display (e.g., automatically, without user input) the control for adjusting the capture duration in response to acquiring the indication that low-light conditions are no longer met, the electronic device performing an operation when a set of conditions has been met (or, has not been met) without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in accordance with a determination that low-light conditions continue to be met, the electronic device (e.g., 600) maintains display of the control (e.g., 1804) for adjusting the capture duration for capturing media in response to a request to capture media.

In some embodiments, while displaying the representation (e.g., 630) of the field-of-view of the one or more cameras without concurrently displaying the control (e.g., 1804) for adjusting the capture duration, the electronic device (e.g., 600) acquires (2030) (e.g., receives, determines, detects, obtains) an indication low-light conditions have been met (e.g., at another time another determination of whether low-light conditions are met occurs). In some embodiments, in response to acquiring the indication, the electronic device (e.g., 600) displays (2032), concurrently with the representation of the field-of-view of the one or more cameras, the control (e.g., 1804) for adjusting the capture duration. Displaying, concurrently with the representation of the field-of-view of the one or more cameras, the control for adjusting the capture duration in response to acquiring the indication that low-light conditions have been met provides to a user a quick and convenient access to the control for adjusting the capture duration when the control is likely to be needed. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in accordance with a determination low-light has not been met, the electronic device (e.g., 600) maintains forgoing display of the control for adjusting the capture duration for capturing media in response to a request to capture media.

In some embodiments, the low-light conditions include a condition that is met when a flash mode is inactive (e.g., a flash setting is set to off, the status of a flash operation is inactive).

In some embodiments, the control (e.g., 1804) for adjusting the capture duration is a slider. In some embodiments, the slider includes tick marks, where each tick mark (e.g., displayed at intervals) is representative of a capture duration.

In some embodiments, displaying the camera user interface further includes the electronic device (e.g., 600) displaying (2016), concurrently with the representation (e.g., 1802) of the field-of-view of the one or more cameras, a media capturing affordance (e.g., 610) (e.g., a selectable user interface object) that, when selected, initiates the capture of media using the one or more cameras (e.g., a shutter affordance; a shutter button).

In some embodiments, while displaying the control (e.g., 1804) for adjusting the capture duration, the electronic device (e.g., 600) displays (2018) a first indication (e.g., number, slider knob (e.g., bar) on slider track) of a first capture duration (e.g., measured in time (e.g., total capture time; exposure time), number of pictures/frames). Displaying the first indication of the first capture duration while displaying the control for adjusting the capture duration provides visual feedback to a user of the set capture duration for the displayed representation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in response to receiving a request (e.g., dragging a slider control on the adjustable control to an indication (e.g., value) on the adjustable control) to adjust the control (e.g., 1804) for adjusting the capture duration from the first capture duration (e.g., measured in time (e.g., total capture time; exposure time), number of pictures/frames) to a second capture duration (e.g., measured in time (e.g., total capture time; exposure time), number of pictures/frames), the electronic device (e.g., 600) replaces (2020) display of the first indication of the first capture duration with display of a second indication of the second capture duration. In some embodiments, the capture duration is displayed when set. In some embodiments, the capture duration is not displayed. In some embodiments, the duration is the same as the value set via the adjustable control. In some embodiments, the duration is different than the value set via the adjustable input control (e.g., the value is 1 second but the duration is 0.9 seconds; the value is 1 second but the duration is 8 pictures). In some of these embodiments, the correspondence (e.g., translation) of the value to the duration is based on the type of the electronic device (e.g., 600) and/or camera or the type of software that is running of the electronic device or camera.

In some embodiments, the representation (e.g., 630) of the field-of-view of the one or more cameras is a first representation (2022). In some embodiments, further in response to receiving the request to adjust the control for adjusting the capture duration from the first capture duration (2024), the electronic device (e.g., 600) replaces (2026) display of the first representation with a second representation of the of the field-of-view of the one or more cameras, where the second representation based on the second duration and is visually distinguished (e.g., brighter) from the first representation. In some embodiments, a brightness of the fourth representation is different than a brightness of the fifth representation (2028).

In some embodiments, while displaying the second indication of the second capture duration, the electronic device (e.g., 600) receives a request to capture media. In some embodiments, receiving the request to capture the media corresponds to a selection of the media capture affordance (e.g., tap). In some embodiments, in response to receiving the request to capture media and in accordance with a determination that the second capture duration corresponds to a predetermined duration that deactivates low-light capture mode (e.g., a duration less than or equal to zero (e.g., a duration that corresponds to a duration to operate the device in normal conditions or another condition)), the electronic device (e.g., 600) initiates capture, via the one or more cameras, of media based on a duration (e.g., a normal duration (e.g., equal to a duration for capturing still photos on the electronic device) that is different than the second capture duration). By initiating capture of media based on the duration (e.g., that is different than the second capture duration) in response to receiving the request to capture media and in accordance with a determination that the second capture duration corresponds to the predetermined duration that deactivates low-light capture mode, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second indication of the second capture duration, the electronic device (e.g., 600) receives a request to capture media. In some embodiments, receiving the request to capture the media corresponds to a selection of the media capture affordance (e.g., 610) (e.g., tap). In some embodiments, in response to receiving the request to capture media (and, in some embodiments, in accordance with a determination that the second capture duration does not correspond to a predetermined that deactivates low-light capture mode), the electronic device (e.g., 600) initiates capture, via the one or more cameras, of media based on the second capture duration. In some embodiments, the media capture user interface (e.g., 608) includes a representation of the media after the media is captured.

In some embodiments, further in response to receiving the request to capture media, the electronic device (e.g., 600) ceases to display the representation (e.g., 630) of the field-of-view of the one or more cameras. In some embodiments, the representation (e.g., 630) (e.g., a live preview) is not displayed at all while capturing media when low-light conditions are met. In some embodiments, the representation (e.g., 630) is not displayed for a predetermined period of time while capturing media when low-light conditions are met. Not displaying the representation at all while capturing media when low-light conditions are met or not displaying the representation for the predetermined period of time while capturing media when low-light conditions are met reduces power usage and improves battery life of the device by enabling the user to use the device more quickly and efficiently.

In some embodiments, the control (e.g., 1804) for adjusting the capture duration is displayed in a first color (e.g., black). In some embodiments, further in response to receiving the request to capture media, the electronic device (e.g., 600) displays the control (e.g., 1804) for adjusting the capture duration in a second color (e.g., red) that is different than the first color.

In some embodiments, further in response to receiving the request to capture media, the electronic device (e.g., 600) displays a first animation (e.g., winding up and setting up egg timer) that moves a third indication of a third capture value (e.g., predetermined starting value or wound down value (e.g., zero)) to the second indication of the second capture duration (e.g., sliding an indication (e.g., slider bar) across the slider over (e.g., winding up from zero to value)). Displaying the first animation provides a user with visual feedback of the change(s) in the set capture value. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, after displaying the first animation, the electronic device (e.g., 600) displays a second animation (e.g., egg timer counting down) that moves the second indication of the second capture duration to the third indication of the third capture value (e.g., sliding an indication (e.g., slider bar) across the slider over) (e.g., wounding down (e.g., counting down from value to zero)), where a duration of the second animation corresponds to a duration of the second capture duration and is different from a duration of the first animation. Displaying the second animation provides a user with visual feedback of the change(s) in the set capture value. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, there is a pause between the first and second animations. In some embodiments, at least one of the first and second animations has a sound of an egg time that winds up or down. In some embodiments, the second animation is slower than the first animation.

In some embodiments, while displaying the first animation, the electronic device (e.g., 600) provides a first tactile output (e.g., a haptic (e.g., a vibration) output). In some embodiments, while displaying the second animation, the electronic device (e.g., 600) provides a second tactile output (e.g., a haptic (e.g., a vibration) output). In some embodiments, the first tactile output can be a different type of tactile output than the second tactile output. Providing the first tactile output while displaying the first animation and providing the second tactile output while displaying the second animation provides a user with further feedback of the change(s) in the set capture value. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after initiating capture of the media, the electronic device (e.g., 600) captures the media based on the second capture duration.

In some embodiments, the media is first media captured based on the second capture duration. In some embodiments, after capturing of the first media, the electronic device (e.g., 600) receives a request to capture second media (e.g., second selection (e.g., tap) of the second affordance for requesting to capture media while capturing media) based on the second capture duration. In some embodiments, in response to receiving the request to capture second media based on the second capture duration, the electronic device (e.g., 600) initiates capture of the second media based on the second capture duration. In some embodiments, after initiating capture of the second media based on the second capture duration, the electronic device (e.g., 600) receives a request terminate capture of the second media before the second capture duration has elapsed. In some embodiments, in response to receiving the request to terminate capture of the second media, the electronic device (e.g., 600) terminates (e.g., stops, ceases) the capturing of the second media based on the second capture duration. In some embodiments, in response to receiving the request to terminate capture of the second media, the electronic device (e.g., 600) displays a representation of the second media that was captured before termination, is based on visual information captured by the one or more cameras prior to receiving the request to terminate capture of the second media. In some embodiments, the second media is darker or has less contrast than the first media item because less visual information was captured than would have been captured if the capture of the second media item had not been terminated before the second capture duration elapsed, leading to a reduced ability to generate a clear image.

In some embodiments, the media is first media captured based on the second capture duration. In some embodiments, after capturing of the first media, the electronic device (e.g., 600) receives a request to capture third media (e.g., second selection (e.g., tap) of the second affordance for requesting to capture media while capturing media) based on the second capture duration. In some embodiments, in response to receiving the request to capture third media based on the second capture duration, the electronic device (e.g., 600) initiates capture of the third media based on the second capture duration. In some embodiments, after initiating capture of the third media based on the second capture duration, in accordance with a determination that detected changes in the field-of-view of the one or more cameras (e.g., one or more cameras integrated into a housing of the electronic device) exceeds movement criteria (in some embodiments, user is moving device above a threshold while capturing; in some embodiments, if the movement does not exceed movement criteria, the electronic device will continue to capture the media without interruption), the electronic device (e.g., 600) terminates (e.g., stops, ceases) the capturing of the third media. In some embodiments, after initiating capture of the third media based on the second capture duration, in accordance with a determination that detected changes in the field-of-view of the one or more cameras (e.g., one or more cameras integrated into a housing of the electronic device) exceeds movement criteria (in some embodiments, user is moving device above a threshold while capturing; in some embodiments, if the movement does not exceed movement criteria, the electronic device will continue to capture the media without interruption), the electronic device (e.g., 600) displays a representation of the third media that was captured before termination, is based on visual information captured by the one or more cameras prior to receiving the request to terminate capture of the second media. In some embodiments, the third media is darker or has less contrast than the first media item because less visual information was captured than would have been captured if the capture of the third media item had not been terminated before the second capture duration elapsed, leading to a reduced ability to generate a clear image.

In some embodiments, further in response to receiving the request to capture media, the electronic device (e.g., 600) replaces display of the affordance (e.g., 610) for requesting to capture media with display of an affordance (e.g., 610 of FIG. 18K) for terminating capture of media (e.g., a stop affordance (e.g., a selectable user interface object)). Replacing display of the affordance for requesting to capture media with display of an affordance for terminating capture of media in response to receiving the request to capture media enables a user to quickly and easily access the affordance for terminating capture of media when such an affordance is likely to be needed. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the stop affordance is displayed during an amount of time based on the camera duration. In some embodiments, after displaying the stop affordance (e.g., 1806) for the amount of time based on the camera duration, the electronic device (e.g., 600), when the camera duration expires, replaces display of the stop affordance with the affordance (e.g., 610) for requesting to capture media.

In some embodiments, after initiating capture of the media (e.g., after pressing the affordance for requesting capture of media), the electronic device (e.g., 600) displays a first representation of the first media that is captured at a first capture time (e.g., a point in time of the capture (e.g., at 2 seconds after starting the capturing of media)). In some embodiments, after displaying the first representation of the first media, the electronic device (e.g., 600) replaces display of the first representation of the first media with display of a second representation of the first media that is captured at a second capture time that is after the first capture time (e.g., a point in time of the capture (e.g., at 3 seconds after starting the capturing of media)), where the second representation is visually distinguished (e.g., brighter) from the first representation (e.g., displaying an increasingly bright, well defined composite image as more image data is acquired and used to generate the composite image).

In some embodiments, the replacing display of the first representation with display of the second representation occurs after a predetermined period of time. In some embodiments, the replacement (e.g., brightening) occurs at evenly spaced intervals (e.g., not smooth brightening).

In some embodiments, displaying the camera user interface (e.g., 608) includes, in accordance with a determination that low light conditions have been met, the electronic device (e.g., 600) displaying, concurrently with the control (e.g., 1804) for adjusting capture duration, a low-light capture status indicator (e.g., 602*c*) that indicates that a status of a low-light capture mode is active. By displaying the low-light capture status indicator concurrently with the control for adjusting capture duration in accordance with a determination that low light conditions have been met, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, while displaying the low-light capture status indicator, the electronic device (e.g., 600) receives a first selection (e.g., tap) of the low-light status indicator (e.g., 602*c*). In some embodiments, in response to response to receiving a first selection of the low-light status indicator (e.g., 602*c*), the electronic device (e.g., 600) ceases to display the control (e.g., 1804) for adjusting the capture duration while maintaining display of the low-light capture status indicator. In some embodiments, in response to response to receiving a first selection of the low-light status indicator (e.g., 602*c*), the electronic device (e.g., 600) updates an appearance of the low-light capture status indicator to indicate that the status of the low-light capture mode is inactive. In some embodiments, the low-light capture status indicator (e.g., 602*c*) is maintained when the control for adjusting capture duration ceases to be displayed (e.g., while low-light conditions are met).

In some embodiments, displaying the camera user interface (e.g., 608) includes, in accordance with a determination that low light conditions have been met while displaying the low-light capture status that indicates the low-light capture mode is inactive, the electronic device (e.g., 600) receiving a second selection (e.g., tap) of the low-light status indicator (e.g., 602*c*). In some embodiments, in response to receiving the second selection of the low-light status indicator (e.g., 602*c*), the electronic device (e.g., 600) redisplays the control (e.g., 1804) for adjusting the capture duration. In some embodiments, when the control (e.g., 1804) for adjusting capture duration is redisplayed, an indication of the capture value that was previously is displayed on the control (e.g., the control continues to remain set to the last value that it was previously set to).

In some embodiments, in response to receiving the first selection of the low-light capture status indicator (e.g., 602*c*), the electronic device (e.g., 600) configures the electronic device to not perform a flash operation. In some embodiments, a flash status indicator (e.g., 602*a*) that indicates the inactive status of the flash operation will replace the display of a flash status that indicates the active status of the flash operation. In some embodiments, when capture of media is initiated and the electronic device (e.g., 600) is not configured to perform the flash operation, a flash operation does not occur (e.g., flash does not trigger) when capturing the media.

In some embodiments, the low-light conditions include a condition that is met when the low-light status indicator has been selected. In some embodiments, the low-light capture status indicator is selected (e.g., the electronic device detects a gesture directed to the low-light status indicator) before the control for adjusting capture duration is displayed.

Note that details of the processes described above with respect to method 2000 (e.g., FIGS. 20A-20C) are also applicable in an analogous manner to the methods described above and below. For example, methods 700, 900, 1100, 1300, 1500, 1700, 1900, 2100, 2300, 2500, 2700, 2800, 3000, 3200, 3400, 3600, and 3800 optionally include one or more of the characteristics of the various methods described above with reference to method 2000. For brevity, these details are not repeated below.

FIGS. 21A-21C are a flow diagram illustrating a method for providing camera indications using an electronic device in accordance with some embodiments. Method 2100 is performed at a device (e.g., 100, 300, 500, 600) with a display device (e.g., a touch-sensitive display) and one or more cameras (e.g., one or more cameras (e.g., dual cameras, triple camera, quad cameras, etc.) on different sides of the electronic device (e.g., a front camera, a back camera)) and, optionally, a dedicated ambient light sensor. Some operations in method 2100 are, optionally, combined, the orders of some operations are, optionally, changed, and some operations are, optionally, omitted.

As described below, method 2100 provides an intuitive way for providing camera indications. The method reduces the cognitive burden on a user for viewing camera indications, thereby creating a more efficient human-machine interface. For battery-operated computing devices, enabling a user to view camera indications faster and more efficiently conserves power and increases the time between battery charges.

The electronic device (e.g., 600) displays (2102), via the display device, a camera user interface.

While displaying the camera user interface, the electronic device (e.g., 600) detects (2104), via one or more sensors of the electronic device (e.g., one or ambient light sensors, one or more cameras), an amount of light (e.g., amount of brightness (e.g., 20 lux, 5 lux)) in a field-of-view of the one or more cameras.

In response detecting the amount of light in the field-of-view of the one or more cameras (2106), in accordance with a determination that the amount of light in the field-of-view of the one or more cameras satisfies low-light environment criteria, where the low-light environment criteria include a criterion that is satisfied when the amount of light in the field-of-view of the one or more cameras is below a predetermined threshold (e.g., below 20 lux), the electronic device (e.g., 600) concurrently displays (2108), in the camera user interface (in some embodiments, the low-light environment criteria include a criterion that is satisfied when the amount of light in the field-of-view of the one or more cameras is in a predetermined ranged (e.g., between 20-0 lux)), a flash status indicator (e.g., 602*a*) (2110) (e.g., a flash mode affordance (e.g., a selectable user interface object)) that indicates a status of a flash operation (e.g., the operability that a flash will potentially occur when capturing media) (in some embodiments, the status of the flash operation is based on a flash setting (or a flash mode); in some of these embodiments, when the status of the flash operation is set to auto or on, the flashing of light (e.g., the flash) has the potential to occur when capturing meeting; however, when the flash operation is set to off, the flashing of light does not have the potential to occur when capturing media) and a low-light capture status indicator (e.g., a low-light mode affordance (e.g., a selectable user interface object)) that indicates a status of a low-light capture mode (2112). Displaying the flash status indicator in accordance with a determination that the amount of light in the field-of-view of the one or more cameras satisfies low-light environment criteria provides a user with feedback about the detected amount of light and the resulting flash setting. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the low-light capture status indicator corresponds to an option to operate that the electronic device (e.g., 600) in a mode (e.g., low-light environment mode) or in a way that was not previously selectable (e.g., not readily available (e.g., having more than one input to select) or displayed) on the camera user interface (e.g., 608). In some embodiments, the electronic device (e.g., 600) maintains display of the low-light capture status indicator (e.g., 602*c*) once the low-light indicator is displayed even if light detected in another image is below the predetermined threshold. In some embodiments, the electronic device (e.g., 600) does not maintain display of the low-light capture status indicator (e.g., 602*c*) or ceases to display the low-light indicator once even if light detected in the image is below the predetermined threshold. In some embodiments, one or more of the flash status indicator (e.g., 602*a*) or the low-light capture status indicator (e.g., 602*c*) will indicate that the status of its respective modes are (e.g., active (e.g., displayed as a color (e.g., green, yellow, blue)) or inactive (e.g., displayed as a color (grayed-out, red, transparent)).

In some embodiments, in accordance with the determination that the amount of light in the field-of-view of the one or more cameras satisfies low-light environment criteria and a flash operation criteria is met, where the flash operation criteria include a criterion that is satisfied when a flash setting is set to automatically determine whether the flash operation is set to active or inactive (e.g., flash setting is set to auto), the flash status indicator (e.g., 602*a*) indicates that the status of the flash operation (e.g., device will using additional light from a light source (e.g., a light source included in the device) while capturing media) is active (e.g., active ("on"), inactive ("off")). The flash status indicator indicating that the status of the flash operation is active in accordance with the determination that the amount of light in the field-of-view of the one or more cameras satisfies low-light environment criteria and a flash operation criteria is met informs a user of the current setting of the flash operation and the amount of light in the environment. Providing improved feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, in accordance with the determination that the amount of light in the field-of-view of the one or more cameras satisfies low-light environment criteria and a flash operation criteria is met, where the flash operation criteria include a criterion that is satisfied when a flash setting is set to automatically determine whether the flash operation is set to active or inactive (e.g., flash setting is set to auto), the low-light capture indicator (e.g., 602*c*) indicates that the status of the low-light capture mode is inactive (e.g., active ("on"), inactive ("off")).

In some embodiments, while the amount of light in the field-of-view of the one or more cameras satisfies low-light environment criteria, in accordance with a determination that the amount of light in the field-of-view of the one or more cameras is in a first predetermined range (moderately low-light (e.g., 20-10 lux); outside of a flash range) and a flash setting (e.g., a flash mode setting on the device) is set to active (e.g., on), the flash status indicator indicates that the status of the flash operation (e.g., the operability that a flash will potentially occur when capturing media) is active, and the low-light capture indicator (e.g., 602*c*) indicates that the status of the low-light capture mode is inactive. In some embodiments, while the amount of light in the field-of-view of the one or more cameras satisfies low-light environment criteria, in accordance with a determination that the amount of light in the field-of-view of the one or more cameras is in the first predetermined range (moderately low-light (e.g., 20-10 lux); outside of a flash range) and a flash setting (e.g., a flash mode setting on the device) is not set to active (e.g., on), the flash status indicator (e.g., 602*a*) indicates that the status of the flash operation is inactive, and the low-light capture indicator indicates that the status of the low-light capture mode is active.

In some embodiments, while the amount of light in the field-of-view of the one or more cameras satisfies low-light environment criteria, in accordance with a determination that the amount of light in the field-of-view of the one or more cameras is in a second predetermined range that is different than the first predetermined range (e.g., very low-light (e.g., a range such as 10-0 lux); in a flash range) (in some embodiments, the first predetermined range (e.g., a range such as 20-10 lux) is greater than the second predetermined range (10-0 lux) and a flash setting (e.g., a flash mode setting on the device) is set to inactive (e.g., on), the flash status indicator (e.g., 602*a*) indicates that the status of the flash operation (e.g., the operability that a flash will potentially occur when capturing media) is inactive, and the low-light capture indicator (e.g., 602*c*) indicates that the status of the low-light capture mode is active. In some embodiments, while the amount of light in the field-of-view of the one or more cameras satisfies low-light environment criteria in accordance with a determination that the amount of light in the field-of-view of the one or more cameras is in the second predetermined range that is different than the first predetermined range (e.g., very low-light (e.g., a range such as 10-0 lux); in a flash range) (in some embodiments, the first predetermined range (e.g., a range such as 20-10 lux) is greater than the second predetermined range (10-0 lux) and a flash setting (e.g., a flash mode setting on the device) is not set to inactive (e.g., on)), the flash status indicator (e.g., 602*a*) indicates that the status of the flash operation is active, and the low-light capture (e.g., 602*c*) indicator indicates that the status of the low-light capture mode is inactive.

In some embodiments, while the flash indicator (e.g., 602*a*) is displayed and indicates that the status of the flash operation is active and the low-light capture indicator (e.g., 602*c*) is displayed and indicates that the status of the low-light capture mode is inactive, the electronic device (e.g., 600) receives (2116) a selection (e.g., a tap) of the flash status indicator. In some embodiments, in response to receiving the selection of the flash status indicator (e.g., 602*a*) (2118), the electronic device (e.g., 600) updates (2120) the flash status indicator to indicate that the status of the flash operation is inactive (e.g., change flash status indicator from active to inactive). In some embodiments, in response to receiving the selection of the flash status indicator (e.g., 602*a*) (2118), the electronic device (e.g., 600) updates (2122) the low-light capture indicator (e.g., 602*c*) to indicate that the status of the low-light capture mode is active (e.g., change low-light capture indicator from inactive to active). Providing the selectable flash status indicator enables a user to quickly and easily change the state of the flash operation (e.g., from active to inactive or from inactive to active). Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, tapping the flash status indicator will turn on flash mode and turn off low-light mode.

In some embodiments, while the flash indicator (e.g., 602*a*) is displayed and indicates that the status of the flash operation is active and the low-light capture indicator (e.g., 602*c*) is displayed and indicates that the status of the low-light capture mode is inactive, the electronic device (e.g., 600) receives (2124) (e.g., tap) a selection of the low-light capture status indicator. In some embodiments, in response to receiving the selection of the low-light capture status indicator (e.g., 602*c*) (2126), the electronic device (e.g., 600) updates (2128) the flash status indicator (e.g., 602*a*) to indicate that the status of the flash operation is inactive (e.g., change flash status indicator from inactive to active). In some embodiments, in response to receiving the selection of the low-light capture status indicator (e.g., 602*c*) (2126), the electronic device (e.g., 600) updates (2130) the low-light capture status indicator to indicate that the status of the low-light capture mode is active (e.g., change low-light capture status indicator from inactive to active). Providing the selectable low-light capture status indicator enables a user to quickly and easily change the low-light capture mode. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, tapping the low-light capture status indicator (e.g., 602*c*) will turn on low-light mode and turn off flash mode.

In some embodiments, in accordance with a determination that the status of low-light capture mode is active, the electronic device (e.g., 600) displays (2132) a control (e.g., 1804) (e.g., a slider) for adjusting a capture duration (e.g., measured in time (e.g., total capture time; exposure time), number of pictures/frames). Displaying the control for adjusting a capture duration for adjusting a capture duration in accordance with a determination that the status of low-light capture mode is active enables a user to quickly and easily access the control for adjusting a capture duration when such a control is likely to be needed. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the adjustable control (e.g., 1804) includes tick marks, where each tick mark is representative of a value on the adjustable control.

In some embodiments, while displaying the control (e.g., 1804) for adjusting the capture duration, the electronic device (e.g., 600) receives (2134) a request to change the control from a first capture duration to a second capture duration. In some embodiments, in response to receiving the request to change the control from the first capture duration to the second capture duration (2136), in accordance with a determination that the second capture duration is a predetermined capture duration that deactivates low-light capture mode (e.g., a duration less than or equal to zero (e.g., a duration that corresponds to a duration to operate the device in normal conditions or another condition)), the electronic device (e.g., 600) updates (2138) the low-light capture status indicator (e.g., 602*c*) to indicate that the status of the low-light capture mode is inactive. In some embodiments, in accordance with a determination that a capture duration is not a predetermined capture duration, the electronic device (e.g., 600) maintains the low-light capture indication (e.g., 602*c*) to indicate that the status of the low-light capture mode is active. Updating (e.g., automatically, without user input) the low-light capture status indicator based on the determination of whether the second capture duration is a predetermined capture duration that deactivates low-light capture mode or the capture duration is not a predetermined capture duration provides to a user visual feedback of whether low-light capture mode is active or inactive, and enables the user to not have to manually having to change the low-light capture mode. Providing improved visual feedback and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the control (e.g., 1804) (e.g., a slider) for adjusting a capture duration, the electronic device (e.g., 600) detects a change in status of low-light capture mode. In some embodiments, in response to detecting the change in status of the low-light capture mode, in accordance with a determination that the status of low-light capture mode is inactive, the electronic device (e.g., 600), ceases display of the control (e.g., 1804) (e.g., a slider) for adjusting a capture duration (e.g., measured in time (e.g., total capture time; exposure time), number of pictures/frames). By ceasing display of the control for adjusting the capture duration in response to detecting the change in status of the low-light capture mode and in accordance with a determination that the status of low-light capture mode is inactive, the electronic device removes a control option that is not currently likely to be needed, thus avoiding cluttering the UI with additional displayed controls. This in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, the adjustable control (e.g., 1804) includes tick marks, where each tick mark is representative of a value on the adjustable control.

In some embodiments, the electronic device (e.g., 600) displays, in the camera user interface (e.g., 608), a first representation of the field-of-view of the one or more cameras. In some embodiments, while the status of low-light capture mode is active, the electronic device (e.g., 600) receives a request to capture first media of the field-of-view of the one or more cameras. In some embodiments, in response to receiving the request to capture first media (e.g., photo, video) (e.g., activation (e.g., tapping on) of a capture affordance) while the status of low-light capture mode is active, the electronic device (e.g., 600) initiates (e.g., via the one or more cameras) capture of the first media. In some embodiments, in response to receiving the request to capture first media (e.g., photo, video) (e.g., activation (e.g., tapping on) of a capture affordance) while the status of low-light capture mode is active, the electronic device (e.g., 600) maintains (e.g., continuing to display without updating or changing) the display the first representation (e.g., still photo) of the field-of-view of the one or more cameras for the duration of the capturing of the first media.

In some embodiments, while the status of low-light capture mode is active, the electronic device (e.g., 600) receives a request to capture second media of the field-of-view of the one or more cameras. In some embodiments, in response to receiving the request to capture second media (e.g., photo, video) (e.g., activation (e.g., tapping on) of a capture affordance) while the status of low-light capture mode is active, the electronic device (e.g., 600) initiates (e.g., via the one or more cameras) capture of the second media. In some embodiments, while capturing the second media (e.g., via the one or more cameras), the electronic device (e.g., 600) concurrently displays, in the camera user interface, a representation of the second media (e.g., photo or video of being captured). Concurrently displaying the representation of the second media in the camera user interface while capturing the second media provides to a user visual feedback of the second media that is being captured. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device (e.g., 600) displays, in the camera user interface, a second representation of the field-of-view of the one or more cameras. In some embodiments, while the status of low-light capture mode is active, the electronic device (e.g., 600) receives a request to capture third media of the field-of-view of the one or more cameras. In some embodiments, in response to receiving a request to capture third media (e.g., photo, video) (e.g., activation (e.g., tapping on) of a capture affordance) while the status of the low-light capture mode is active, the electronic device (e.g., 600) initiates capture of the third media (e.g., via the one or more cameras). In some embodiments, while capturing the third media, the electronic device (e.g., 600) ceases to display a representation derived from (e.g., captured from, based on) the field-of-view of the one or more cameras in the camera user interface (e.g., media being captured). By ceasing to display the representation derived from the field-of-view of the one or more cameras while capturing the third media and while the status of the low-light capture mode is active, the electronic device performs an operation when a set of conditions has been met without requiring further user input, which in turn enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response detecting the amount of light in the field-of-view of the one or more cameras (2106), in accordance with a determination that the amount of light in the field-of-view of the one or more cameras does not satisfy the low-light environment criteria, the electronic device (e.g., 600) forgoes display of (2114) the low-light capture status indicator (e.g., 602*c*) in the camera user interface (e.g., 608) (e.g., while maintaining display of the flash status indicator). Forgoing display of the low-light capture status indicator in accordance with a determination that the amount of light in the field-of-view of the one or more cameras does not satisfy the low-light environment criteria informs a user that low-light capture mode is inactive (e.g., because it is not needed based on the detected amount of light). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, further in accordance with a determination that the amount of light in the field-of-view of the one or more cameras does not satisfy the low-light environment criteria, the electronic device (e.g., 600) displays, in the camera user interface, the flash status indicator (e.g., 602*a*) that indicates the status of the flash operation (e.g., flash status indicator is maintained when low-light mode is not displayed).

In some embodiments, the status of the flash operation and the status of the low-light capture mode are mutually exclusive (e.g., flash operation and the light-capture mode are not on at the same time (e.g., when flash operation is active, low-light capture mode is inactive; when low-light capture mode is active, flash operation is inactive)). The flash operation and the low-light capture mode being mutually exclusive reduces power usage and improves battery life of the electronic device as the device's resources are being used in a more efficient manner.

In some embodiments, the status of the low-light capture mode is selected from the group consisting of an active status (e.g., 602*c* in FIG. 26H) (e.g., a status that indicates that the low-light capture mode is active (e.g., that the device is currently configured to capture media in low-light capture mode in response to a request to capture media)), an available status (e.g., a status that indicates that low-light capture mode is available (e.g., 602*c* in FIG. 26B) (e.g., that the device is not currently configured to capture media in low-light capture mode but can be configured to capture media in the low-light mode), a status that indicates that low-light capture mode is available and has not been manually turned on or turned off by a user (e.g., the device has not been configured to capture or not capture media in low-light capture mode since the low-light capture mode indicator was first (recently) displayed or a determination was made to display the low-light capture mode indicator)), and an inactive status (e.g., absence of 602*c* in FIG. 26A) (e.g., a status that indicates that the low-light capture mode is inactive (e.g., that the device is currently not configured to capture media in low-light capture mode in response to a request to capture media)).

In some embodiments, while the amount of light in the field-of-view of the one or more cameras satisfies low-light environment criteria and in accordance with a determination that the amount of light in the field-of-view of the one or more cameras is in a third predetermined range (moderately low-light (e.g., 20-10 lux); outside of a flash range), the flash status indicator indicates that the status of the flash operation (e.g., the operability that a flash will potentially occur when capturing media) is available (e.g., 602*c* in FIG. 26B).

In some embodiments, the control for adjusting a capture duration is a first control. In some embodiments, while the flash status indicator indicates that the status of the flash operation is available (e.g., 602*c* in FIG. 26B), the electronic device receives selection of the low-light capture status indicator. In some embodiments, in response to receiving selection of the capture low-light capture status indicator, the electronic device updates the low-light capture status indicator to indicate that the status of the low-light capture mode is active (e.g., 602*c* in FIG. 26B-26C). In some embodiments, in response to receiving selection of the capture low-light capture status indicator and in accordance with a determination that a flash status indicator indicates that the status of a flash mode is automatic, the electronic device updates the flash status indicator to indicate that the status of the flash mode is inactive and displays a second control (e.g., a slider) for adjusting a capture duration (e.g., measured in time (e.g., total capture time; exposure time), number of pictures/frames). In some embodiments, the adjustable control includes tick marks, where each tick mark is representative of a value on the adjustable control.

In some embodiments, in accordance with a determination that ambient light in the field-of-view of the one or more cameras is within a fourth predetermined range (e.g., a predetermined range such as less than 1 lux), the first low-light capture status indicator (e.g., 602*c* in FIG. 26H) includes a first visual representation (e.g., text denoting the first capture duration) of the first capture duration. In some embodiments, in accordance with a determination that ambient light in the field-of-view of the one or more cameras is not within the fourth predetermined range (e.g., a predetermined range such as above 1 lux), the first low-light capture status indicator does not include the first visual representation (e.g., text denoting the first capture duration) of the first capture duration (e.g., 602*c* in FIG. 26E) (or second capture duration wheel displaying the indication that the control is set to the second capture duration). In some embodiments, when the ambient light in the field-of-view of the one or more cameras changes, the electronic device will automatically re-evaluate whether to display the visual representation of the first capture duration (or second capture duration) based on whether the ambient light is in the first predetermined range or the second predetermined range.

In some embodiments, in response detecting, the amount of light in the field-of-view of the one or more cameras and in accordance with the determination that the amount of light in the field-of-view of the one or more cameras satisfies low-light environment criteria, the electronic device: in accordance with a determination that ambient light in the field-of-view of the one or more cameras is within a third predetermined range (e.g., below a threshold such as 1 lux), the low-light capture status indicator (e.g., 602*c* in FIG. 26H) indicates that a status of the low-light capture mode is active (e.g., a status that indicates that the low-light capture mode is active (e.g., that the device is currently configured to capture media in low-light capture mode in response to a request to capture media)) and that includes a second visual representation of the first capture duration (e.g., "5 s"); in accordance with a determination that ambient light in the field-of-view of the one or more cameras is within a fourth predetermined range (e.g., a range such as between 1 lux—10 lux), the low-light capture status indicator (e.g., 602*c* in FIG. 26E) indicates that the status of the low-light capture mode is active and does not include the second visual representation of the first capture duration (e.g., "5 s"); and in accordance with a determination that ambient light in the field-of-view of the one or more cameras is within a fifth predetermined range (e.g., a range such as between 10-20 lux), the low-light capture status indicator indicates that a status of the low-light capture mode is available (e.g., 602*c* in FIG. 26B), where the low-light capture status indicator that indicates that the status of the low-light capture mode is active and that includes the second visual representation of the first capture duration, the low-light capture status indicator that indicates that the status of the low-light capture mode is active and does not include the second visual representation of the first capture duration, and the low-light capture status indicator indicates that a status of the low-light capture mode is available (e.g., a status that indicates that low-light capture mode is available (e.g., that the device is not currently configured to capture media in low-light capture mode but can be configured to capture media in the low-light mode), a status that indicates that low-light capture mode is available and has not been manually turned on or turned off by a user (e.g., the device has not been configured to capture or not capture media in low-light capture mode since the low-light capture mode indicator was first (recently) displayed or a determination was made to display the low-light capture mode indicator)) are visually different (e.g., different in color, texture, boldness, characters or marks displayed (e.g., crossed out to show an inactive state), having or not having a visual representation of capture duration) from each other. In some embodiments, the low-light capture mode that indicates that the status of the low-light mode is available does not include the visual representation of a capture duration (e.g., third capture duration). Displaying a visual representation of capture duration in a low-light status indicator when prescribed conditions are met provides the user with feedback about the current state of the capture duration that the electronic device will use to capture media when a capture duration is outside of a normal range of capture durations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying a low-light status indicator without a visual representation when prescribed conditions are met provides the user with feedback that the electronic device is configured to capture media while in a low-light mode and will use a capture duration to capture media that is a normal range of capture durations, without cluttering the user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying a low-light capture status indicator that indicates that low-light status is available when prescribed conditions are met allows a user to quickly recognize that the electronic device is not configured to capture media while in the low-light mode but is available to be configured (e.g., via user input) to capture media in a low-light mode and enables a user to quickly understand that the electronic device will not operate according to a low-light mode in response to receiving a request to capture media. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2100 (e.g., FIGS. 21A-21C) are also applicable in an analogous manner to the methods described above. For example, methods 700, 900, 1100, 1300, 1500, 1700, 1900, 2300, 2500, 2700, 2800, 3000, 3200, 3400, 3600, and 3800 optionally include one or more of the characteristics of the various methods described above with reference to method 2100. For brevity, these details are not repeated below.

FIGS. 22A-22AM illustrate exemplary user interfaces for editing captured media using an electronic device in accordance with some embodiments. The user interfaces in these figures are used to illustrate the processes described below, including the processes in FIGS. 23A-23B.

FIG. 22A illustrates electronic device 600 displaying a media viewer user interface. The media viewer user interface includes edit affordance 644*a* and representation 2230*a* of captured media (e.g., a photo). While displaying representation 2230*a*, device 600 determines that the captured media represented by representation 2230*a* was previously captured while a portrait camera mode (e.g., a mode in which bokeh and/or lighting effects are applied) was enabled (e.g., via activation of shutter button 610 while device 600 is configured in portrait mode as illustrated in FIG. 8H, the captured media includes depth information). Moreover, in response to this determination, device 600 displays portrait image status indicator 644*g*. In other words, portrait image status indicator 644*g* shows that representation 2230*a* is a representation of a portrait image.

Figure 22B:
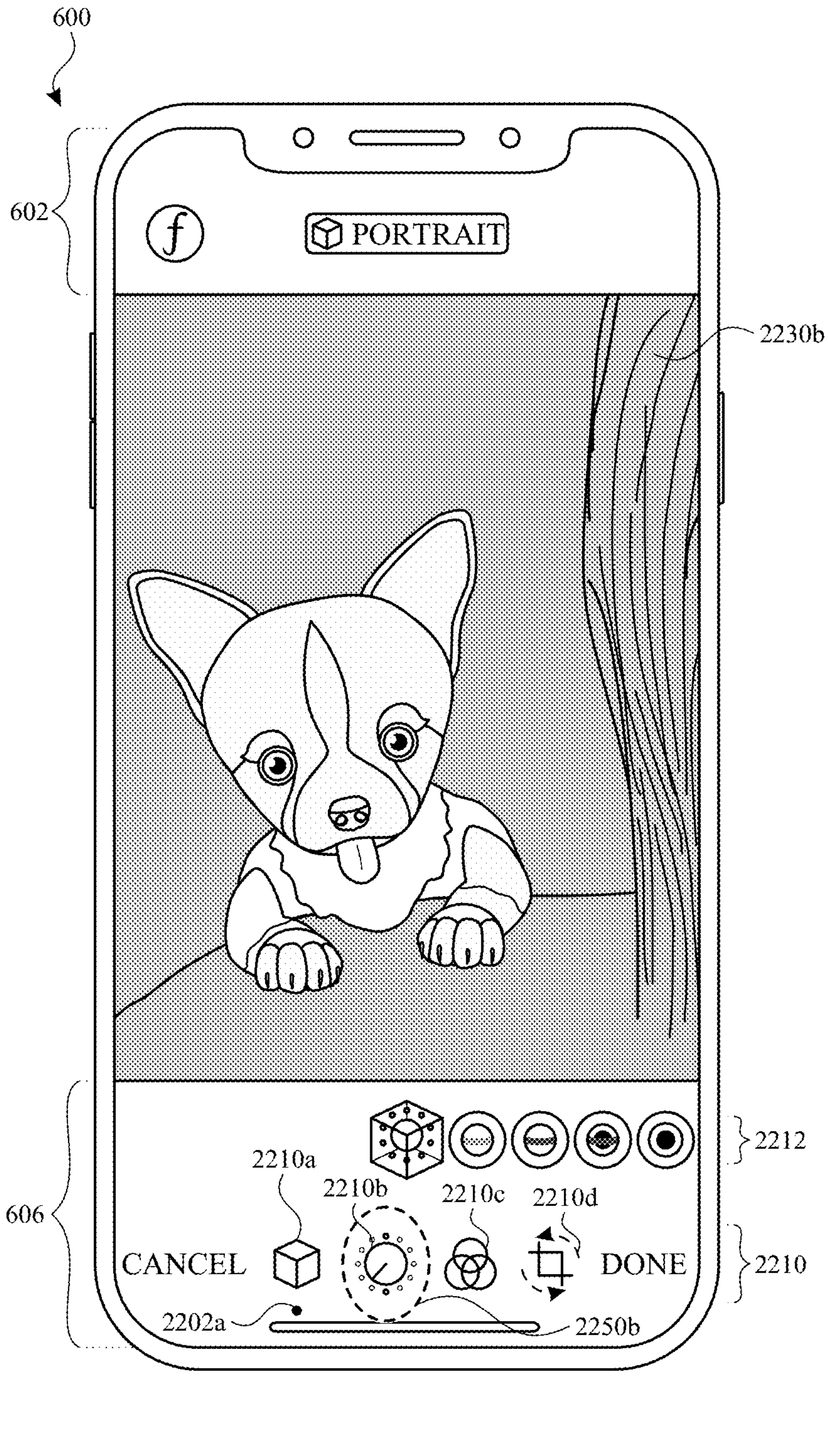

At FIG. 22A, device 600 detects tap gesture 2250*a* at a location that corresponds to edit affordance 644*a*. In response to detecting tap gesture 2250*a*, as shown in FIG. 22B, device 600 replaces the media viewer user interface with a media editing user interface. As illustrated in FIG. 22B, the media editing user interface includes representation 2230*b* that corresponds to representation 2230*a* in FIG. 22A. That is, representation 2230*b* depicts the same representation of the previously captured media as representation 2230*a* without any adjustments. The media editing user interface also includes indicator region 602 and control region 606. In FIG. 22A, a portion of control region 606 is overlaid onto representation 2230*b* and, optionally, includes a colored (e.g., gray, translucent) overlay. In some embodiments, indicator region 602 is overlaid onto representation 2230*b* and, optionally, includes a colored (e.g., gray, translucent) overlay.

Control region 606 includes editing mode affordances 2210, including portrait media editing mode affordance 2210*a*, visual characteristic editing mode affordance 2210*b*, filter editing mode affordance 2210*c*, and image content editing mode affordance 2210*d*. Portrait media editing mode affordance 2210*a* is a type of media editing mode affordance. That is, portrait media editing mode affordance 2210*a* corresponds to a particular type of captured media that is being edited. When a media editing affordance is selected, device 600 displays a particular set of editing tools designed for editing a particular type of media. At FIG. 22A, device 600 determines that representation 2230*b* corresponds to a portrait image (e.g., based on the media including depth information) and, in response, displays portrait media editing mode affordance 2210*a*. Because portrait media editing mode affordance 2210*a* is selected, as shown by mode selection indicator 2202*a* under portrait media editing mode affordance 2210*a*, device 600 displays portrait media editing tool affordances 2212. In some embodiments (e.g., in FIGS. 22AE-22AL), when device 600 determines that a representation corresponds to a different type of media, such as animated images media or video media, device 600 displays a (e.g., one or more) different type of media editing affordance (e.g., video media editing mode affordance 2210*f* in FIG. 22AI). When selected, the different type of media editing affordance causes device 600 to display a particular set of tool affordances (e.g., video media affordances 2222) that are different from portrait media editing tool affordances 2212. In some embodiments, device 600 determines that the captured media corresponds to a type of media that does not have a corresponding particular set of editing tools for editing the respective type of media. Moreover, in response, device 600 does not display a media editing affordance for editing the respective type of media and, instead, displays editing mode affordances 2210*b*-2210*d* without displaying editing tools that are specific to (e.g., correspond to) the respective type of media.

Figure 22C:
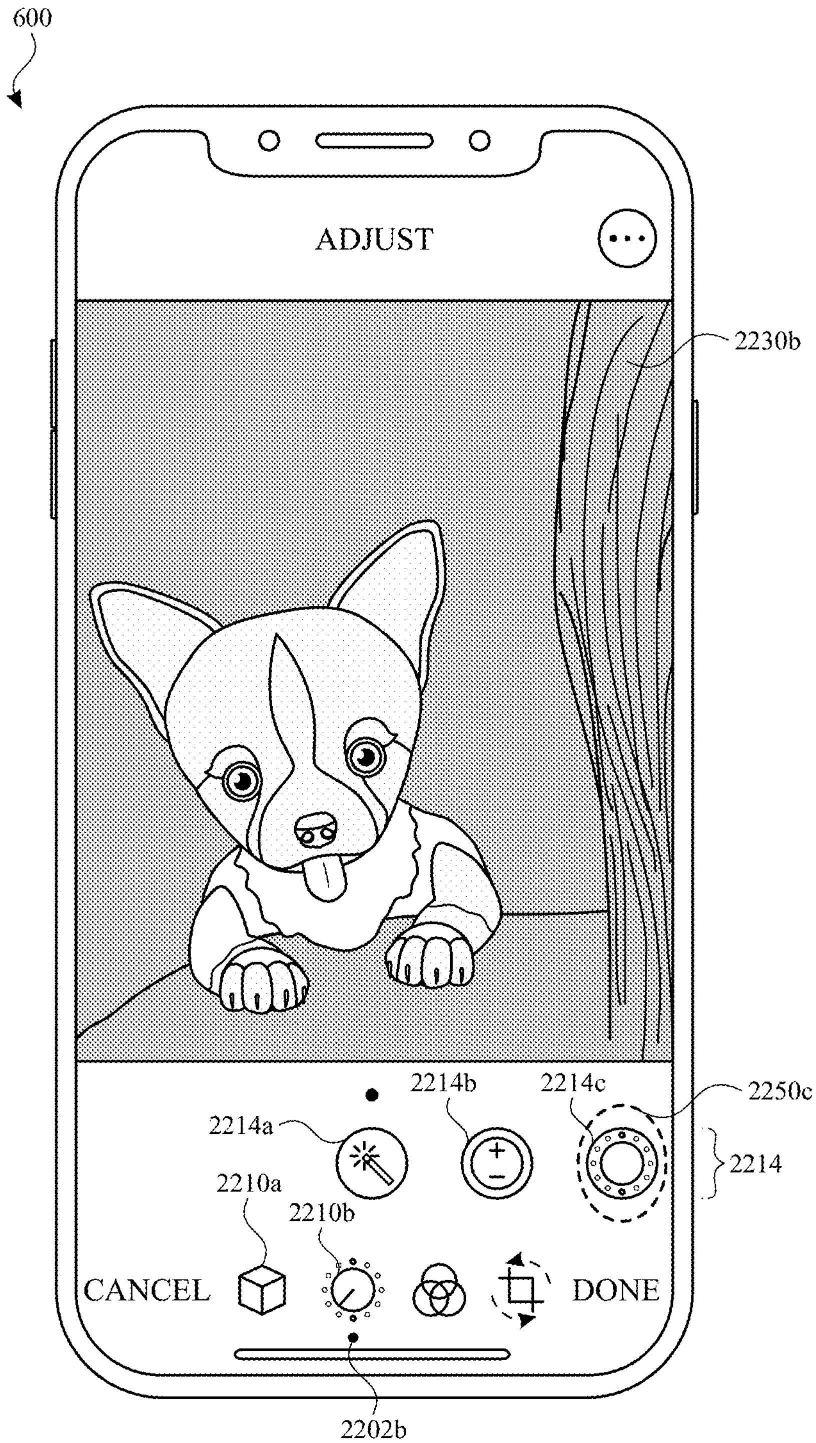

At FIG. 22B, device 600 detects tap gesture 2250*b* at a location that corresponds to visual characteristic editing mode affordance 2210*b*. As illustrated in FIG. 22C, in response to detecting tap gesture 2250*b*, device 600 displays mode selection indicator 2202*b* under visual characteristic editing mode affordance 2210*b* and ceases to display mode selection indicator 2202*a* under portrait media editing mode affordance 2210*a*. Displaying mode selection indicator 2202*b* under visual characteristic editing mode affordance 2210*b* shows that device 600 has changed from being configured to operate in the portrait editing mode to being configured to operate in a visual characteristic editing mode. Moreover, in response to detecting tap gesture 2250*b*, device 600 also replaces portrait media editing tool affordances 2212 with visual characteristic editing tool affordances 2214. After replacing portrait media editing tool affordances 2212, visual characteristic editing tool affordances 2214 initially occupy a portion of the media editing user interface that portrait media editing tool affordances 2212 occupied in FIG. 22A. Visual characteristic editing tool affordances 2214 include auto visual characteristic editing tool affordance 2214*a*, exposure editing tool affordance 2214*b*, and brightness editing tool affordance 2214*c*. A visual characteristic editing tool, when selected, causes device 600 to display user interface elements for adjusting one or more visual characteristics of a representation, as illustrated in the following figures.

Figure 22D:
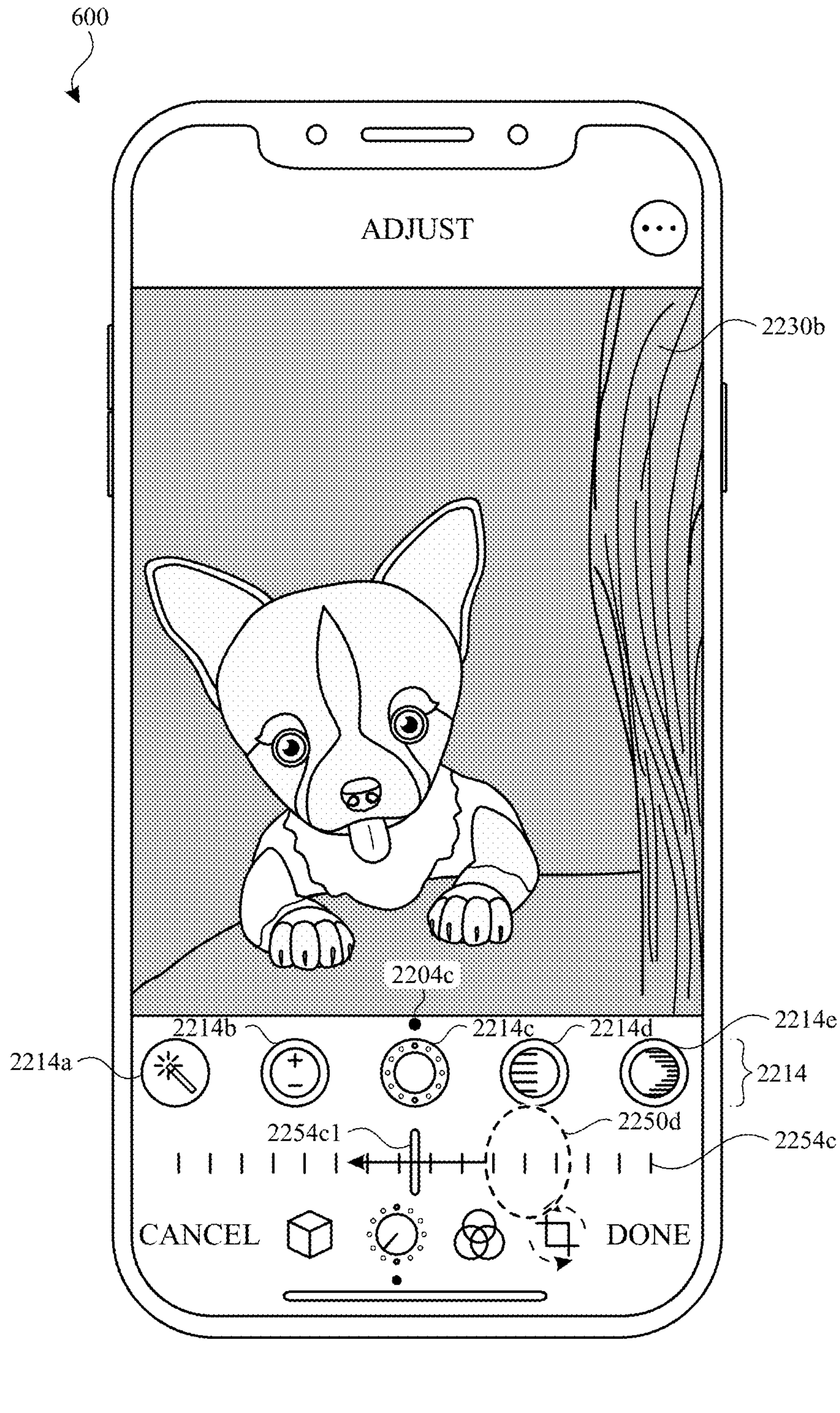

As illustrated in FIG. 22C, device 600 detects tap gesture 2250*c* at a location that corresponds to brightness editing tool affordance 2214*c*. As illustrated in FIG. 22D, in response to detecting tap gesture 2250*c*, device 600 automatically, without additional user input, slides visual characteristic editing tool affordances 2214*a*-2214*c* to the left to display brightness editing tool affordance 2214*c* in the horizontal center of the media editing user interface. As a result, device 600 displays auto visual characteristic editing tool affordance 2214*a* close to the left edge of the media user interface, exposure editing tool affordance 2214*b* to the immediate right of auto visual characteristic editing tool affordance 2214*a*, and brightness editing tool affordance 2214*c* to the immediate right of exposure editing tool affordance 2214*b*. Thus, device 600 maintains the display of the order of visual characteristic editing tool affordances 2214*a*-2214*c*, although brightness editing tool affordance 2214*c* is displayed in the horizontal center. When a visual characteristic editing tool is displayed in the horizontal center of device 600, device 600 is configured to adjust a visual characteristic of a representation that corresponds to a value that is adjusted via a particular editing tool. Thus, because brightness editing tool affordance 2214*c* is in the center of the media editing user interface in FIG. 22D, device 600 is configured to adjust the brightness of representation 2230*b*. Further, to show that brightness editing tool affordance 2214*c* is selected, device 600 displays tool selection indicator 2204*c*. In addition to moving visual characteristic editing tool affordances 2214*a*-2214*c*, device 600 also displays two additional visual characteristic editing tool affordances that were not displayed in FIG. 22B (highlight editing tool affordance 2214*d* and shadow editing tool affordance 2214*e* as respectively displayed). As illustrated in FIG. 22D, in response to detecting tap gesture 2250*c*, device 600 also automatically, without additional user input, displays adjustable brightness control 2254*c*. Adjustable brightness control 2254*c* is a slider that includes brightness control indication 2254*c*1 and multiple tick marks, where each tick mark corresponds to a value for adjusting the brightness of representation 2230*b*. Brightness control indication 2254*c*1 is displayed at a position on the slider that is in between two consecutive and adjacent ticket marks on adjustable brightness control 2254*c*. The position of brightness control indication 2254*c*1 on adjustable brightness control 2254*c* corresponds to the current brightness value of representation 2230*b*. At FIG. 22D, device 600 detects gesture 2250*d* (e.g., a leftward dragging or swiping gesture) directed to adjustable brightness control 2254*c*.

Figure 22E:
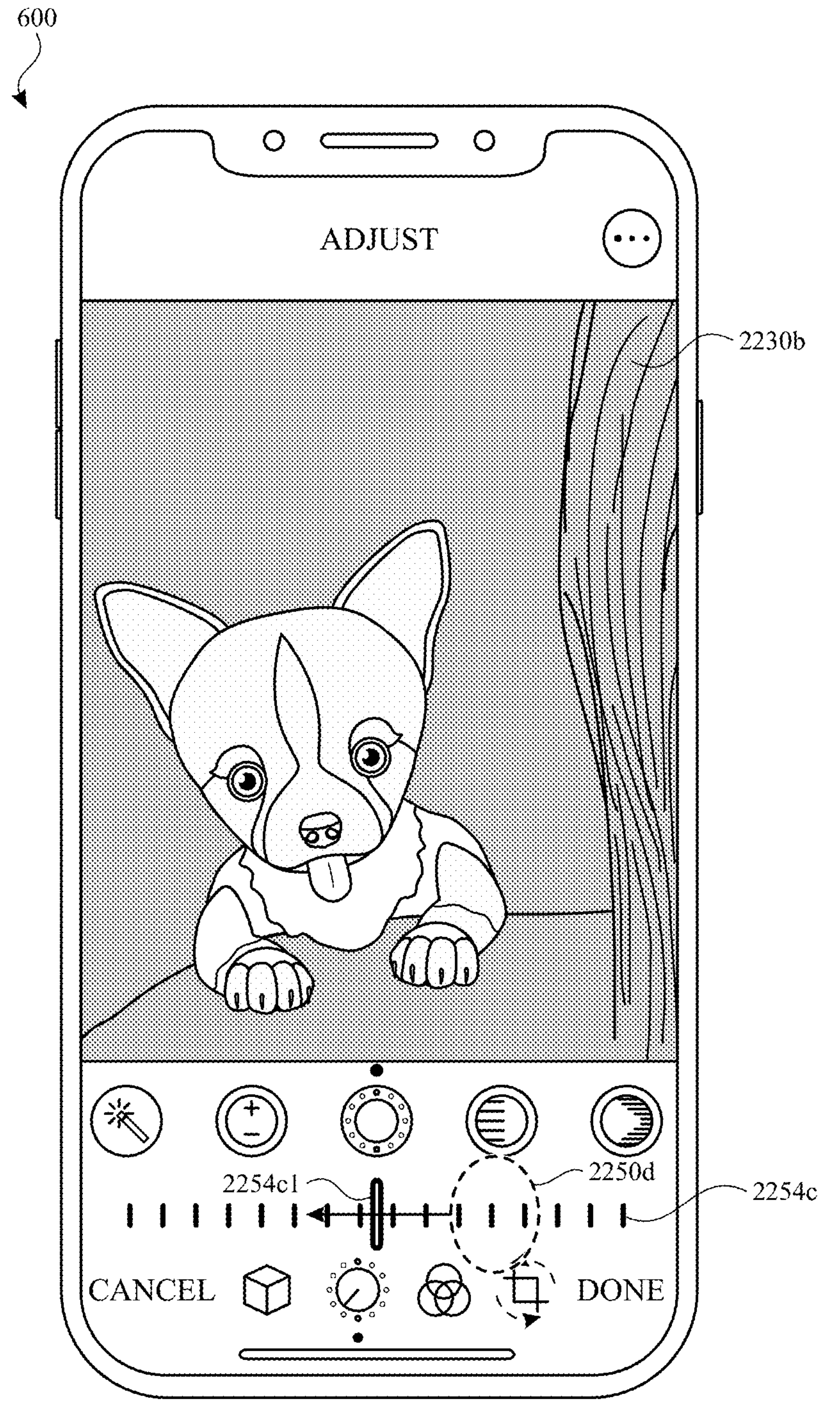

As illustrated in FIG. 22E, in response to detecting gesture 2250*d*, device 600 emphasizes adjustable brightness control 2254*c* while device 600 continues to detect contact of gesture 2250*d* on the touch-sensitive display of device 600 (e.g., while contact of a finger continues to remain on the touch-sensitive display of device 600). In particular, device 600 enlarges and darkens the display of adjustable brightness control 2254*c*, which includes enlarging the tick marks and brightness control indication 2254*c*1 of adjustable brightness control 2254*c*. In some embodiments, emphasizing adjustable brightness control 2254*c* attempts to help a user of device 600 set an accurate brightness value, via brightness control indication 2254*c*1, on adjustable brightness control 2254*c* by further distinguishing adjustable brightness control 2254*c* from the rest of the media editing user interface. In some embodiments, device 600 emphasizes adjustable brightness control 2254*c* by changing the color (e.g., from black to red) of portions (e.g., tick marks or brightness control indication 2254*c*1) of adjustable brightness control 2254*c*. In some embodiments, device 600 emphasizes adjustable brightness control 2254*c* by deemphasizing other user interface elements in control region 606. Deemphasizing other user interface elements includes displaying other portions of control region 606 (e.g., areas below/above adjustable brightness control 2254*c*) out of focus. At FIG. 22E, device 600 detects liftoff (e.g., ceases to detect contact) of gesture 2250*d*.

Figure 22F:
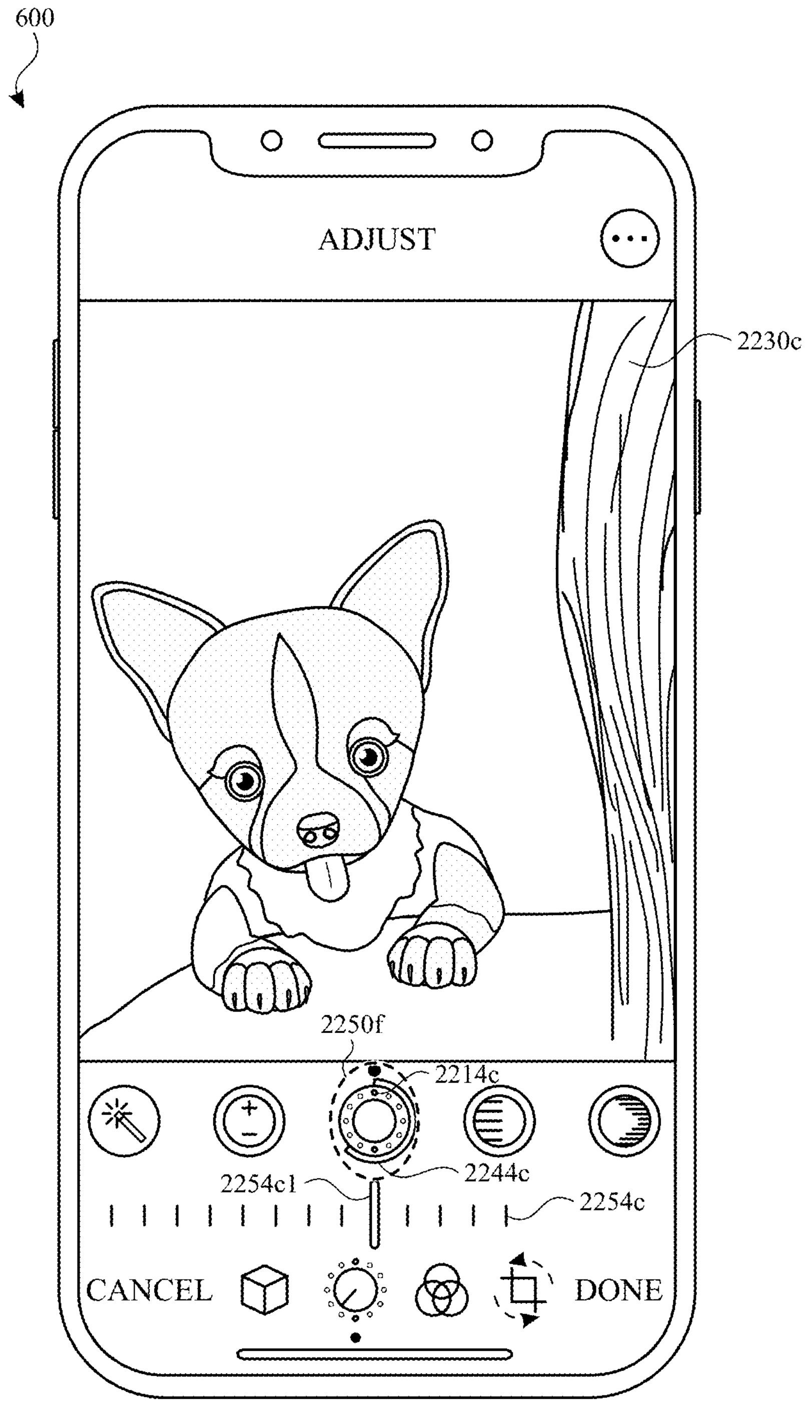

As illustrated in FIG. 22F, in response to detecting liftoff of gesture 2250*d*, device 600 re-displays adjustable brightness control 2254*c* without emphases (e.g., as it was displayed without emphases in FIG. 22D). In addition, in response to detecting gesture 2250*d*, device 600 moves brightness control indication 2254*c*1 to a new position on adjustable brightness control 2254*c* based on the magnitude and direction (e.g., speed, length of swipe) of gesture 2250*d*. At FIG. 22F, the magnitude and direction of gesture 2250*d* cause device 600 to display the new position of brightness control indication 2254*c*1 closer to the rightmost tick mark (e.g., the maximum value of brightness) on adjustable brightness control 2254*c* than the position of brightness control indication 2254*c*1 in FIG. 22D. Moving brightness control indication 2254*c*1 to a new position on adjustable brightness control 2254*c*, includes moving the tick marks of adjustable brightness control 2254*c* to the left (e.g., direction of gesture 2250*d*) while the maintaining the display of brightness control indication 2254*c*1 in the center of the media editing user interface. Thus, the rightmost tick mark is displayed closer to the horizontal center of the media editing user interface in FIG. 22F from where it was displayed in FIG. 22D, leaving additional space between the rightmost tick mark and the right edge of the media editing user interface.

Additionally, in response to detecting gesture 2250*d*, device 600 displays brightness value indicator 2244*c* around brightness editing tool affordance 2214*c*. Brightness value indicator 2244*c* is a circular user interface element that starts at the top-center of brightness editing tool affordance 2214*c* (e.g., position of twelve o'clock on an analog clock) and wraps around the perimeter of brightness editing tool affordance 2214*c* to a position that is a little more than halfway around brightness editing tool affordance 2214*c* (e.g., position of seven o'clock on an analog clock). The size of brightness value indicator 2244*c* indicates the current value of adjustable brightness control 2254*c* relative to the maximum value (e.g., rightmost tick mark) of adjustable brightness control 2254*c*. Thus, when brightness control indication 2254*c*1 is changed to a new position, brightness value indicator 2244*c* updates to encompass more or less of the perimeter of brightness editing tool affordance 2214*c* based on the position of brightness control indication 2254*c*1. In some embodiments, brightness value indicator 2244*c* is displayed as a particular color (e.g., blue). Further, in response to detecting gesture 2250*d*, device 600 digitally adjusts representation 2230*b* based on a brightness value that corresponds to the new position of brightness control indication 2254*c*1. Because the new position of brightness control indication 2254*c*1 is closer to the rightmost tick mark (e.g., the maximum value of brightness) than the position on brightness control indication 2254*c*1 in FIG. 22D, device 600 displays adjusted representation 2230*c* (or updates representation 2230*b*) that is brighter than representation 2230*b*. Adjusted representation 2230*c* is displayed based on the newly adjusted brightness value.

Figure 22G:
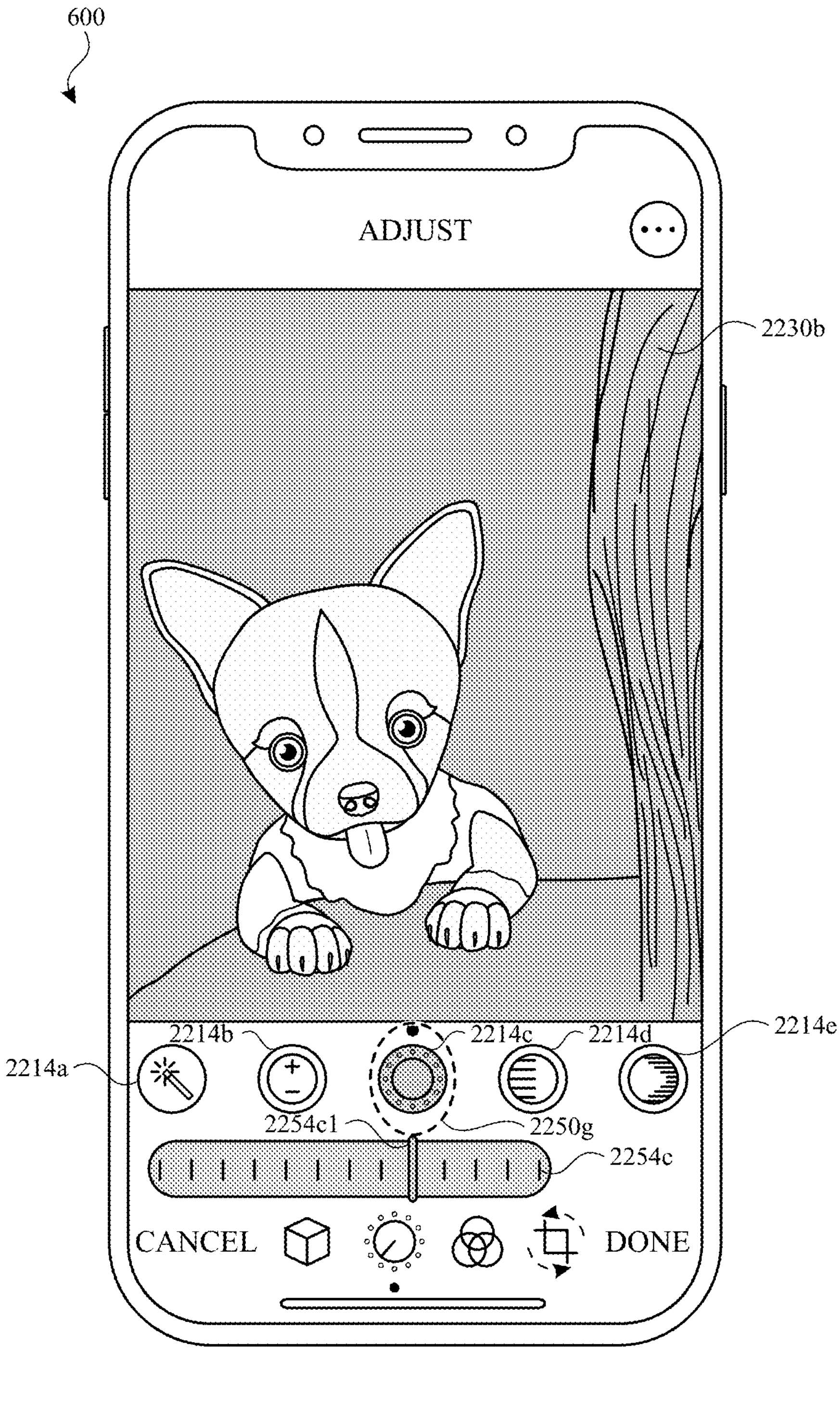

At FIG. 22F, device 600 detects tap gesture 2250*f* at a location that corresponds to brightness editing tool affordance 2214*c*. As illustrated in FIG. 22G, in response to detecting tap gesture 2250*f*, device 600 replaces adjusted representation 2230*c* with representation 2230*b*, undoing the adjustment made in FIG. 22E. In other words, the current value of adjustable brightness control 2254*c* (e.g., the newly adjusted value in FIG. 22E) has no effect on the representation that is displayed on the media editing user interface. To emphasize that adjustable brightness control 2254*c* has no effect on the representation that is displayed on the media editing user interface, device 600 fades brightness editing tool affordance 2214*c* and adjustable brightness control 2254*c* to gray (e.g., or to appear translucent) while the display of other visual characteristic editing tool affordances 2214 (e.g., 2214*a*, 2214*b*, 2214*d*, and 2214*e*) are maintained (e.g., do not fade to gray). Further, device 600 also ceases to display brightness value indicator 2244*c* around brightness editing tool affordance 2214*c* and tool selection indicator 2204*c*. As illustrated in FIG. 22G, device 600 toggles brightness editing tool affordance 2214*c* off and shows representation 2230*b* with the original brightness value (e.g., in FIG. 22B) in lieu of showing adjusted representation 2230*c* that was adjusted based on the newly adjusted brightness value (e.g., in FIG. 22E). At FIG. 22G, device 600 detects tap gesture 2250*g* at a location that corresponds to brightness editing tool affordance 2214*c*.

Figure 22H:
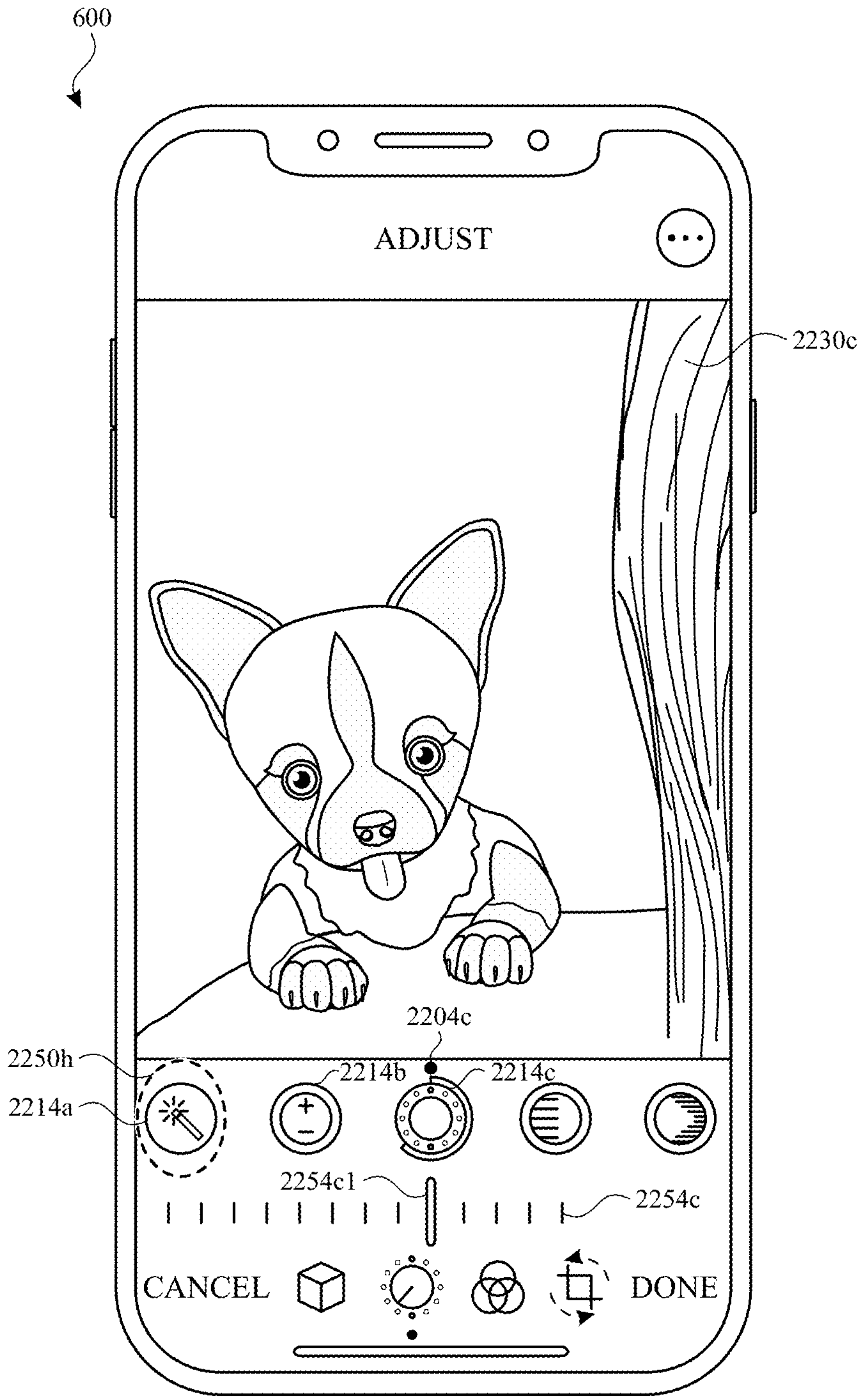

As illustrated in FIG. 22H, in response to detecting tap gesture 2250*g*, device 600 toggles brightness editing tool affordance 2214*c* on, re-displaying adjusted representation 2230*c*, brightness editing tool affordance 2214*c*, adjustable brightness control 2254*c*, tool selection indicator 2204*c*, brightness value indicator 2244*c*, tool selection indicator 2204*c* as they were displayed in FIG. 22F. The current value of adjustable brightness control 2254*c* (e.g., the new adjusted value in FIG. 22E) has an effect on the representation that is displayed on the media editing user interface. In some embodiments, toggling on (via tap gesture 2250*g*) or off (e.g., via tap gesture 2250*f*) a particular editing tool affordance, allows a user of device 600 to see how the particular adjusted value (e.g., adjusted brightness value) of the particular editing tool has affected a representation. At FIG. 22H, device 600 detects tap gesture 2250*h* at a location that corresponds to auto visual characteristic editing tool affordance 2214*a*.

Figure 22I:
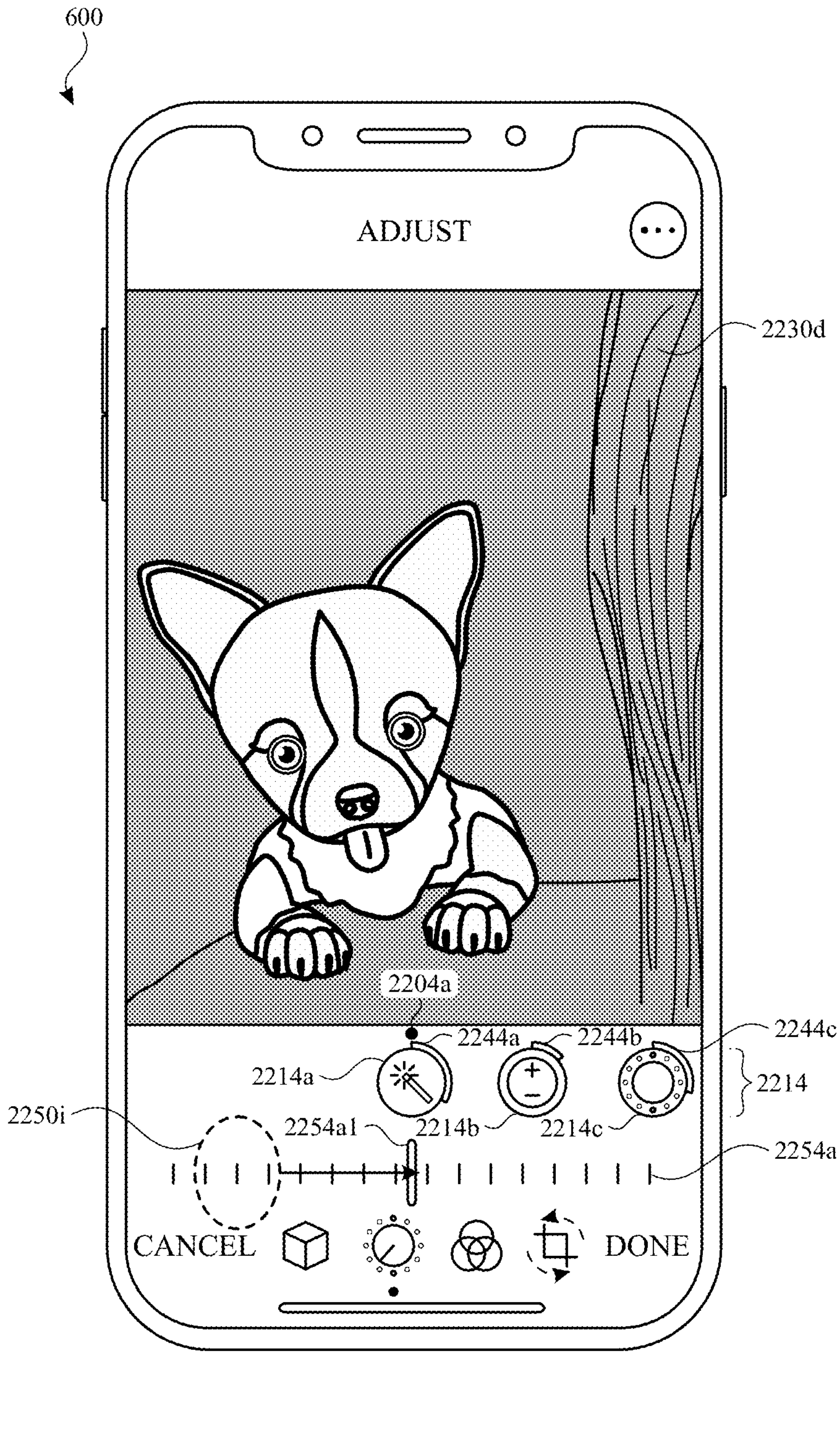

As illustrated in FIG. 22I, in response to detecting tap gesture 2250*h*, device 600 replaces the display of adjustable brightness control 2254*c* and brightness control indication 2254*c*1 with the display of adjustable auto visual characteristic control 2254*a* and auto visual characteristic control indication 2254*a*1. Device 600 also displays tool selection indicator 2204*a* above auto visual characteristic control indication 2254*a*1. Device 600 displays adjustable auto visual characteristic 2254*a* at the same respective location that adjustable brightness control 2254*c* was displayed in FIG. 22H. When making the replacement, device 600 displays auto visual characteristic control indication 2254*a*1 at a different position on adjustable auto visual characteristic control 2254*a* from the position that brightness control indication 2254*c*1 was displayed on adjustable brightness control 2254*c* in FIG. 22H. As illustrated in FIG. 22I, device 600 displays auto visual characteristic control indication 2254*a*1 at a position that corresponds to the middle value of adjustable auto visual characteristic control 2254*a* value (e.g., 50% auto visual characteristic adjustment value), which is different from the position of brightness control indication 2254*c*1 in FIG. 22H that was closer to the rightmost tick mark of adjustable brightness control 2254*c* (e.g., 75% brightness value). Notably, the position of auto visual characteristic control indication 2254*a*1 is similar to the position of brightness control indication 2254*c*1 on adjustable brightness control 2254*c* in FIG. 22D (e.g., when adjustable brightness control 2254*c* was first initiated in response to gesture 2250*d*).

In some embodiments, when an adjustable control is first initiated, the indication of the adjustable control will be displayed at a position in the middle of the adjustable control. In some embodiments, the middle position of the adjustable control corresponds to a value detected in the displayed representation or a value that is calculated via an auto adjustment algorithm (e.g., the middle position corresponds to a value of 75% brightness that is calculated based on an auto adjustment algorithm). In addition, the middle position on one adjustable control (e.g., a 75% brightness value) can equal to a different value than the middle position on another adjustable control (e.g., a 64% exposure value). In some embodiments, the scales of two adjustable controls (e.g., adjustable auto visual characteristic control 2254*a* and adjustable brightness control 2254*c*) are the same or consistent (e.g., having the same minimum and maximum values and/or the increments of values representative between consecutive tick marks are the same on each slider).

When device 600 replaces the display of adjustable brightness control 2254*c* with the display of adjustable auto visual characteristic control 2254*a*, device 600 maintains the display of some static parts of adjustable brightness control 2254*c* (e.g., tick marks to the left of the center) in their same respective position when displaying adjustable auto visual characteristic control 2254*a*. However, some variable parts of adjustable brightness control 2254*c* (e.g., the position of the indication and new tick marks that appear to the right of center on adjustable brightness control 2254*c*) are not maintained in their same respective position. As illustrated in FIG. 22I, when device 600 replaces the display of adjustable brightness control 2254*c* with display of adjustable auto visual characteristic control 2254*a*, device 600 maintains the tick marks left of the center of the adjustable brightness control 2254*c* at respective positions while moving some parts of the adjustable control (e.g., device 600 moves auto visual characteristic control indication 2254*a*1 to another position on the display than brightness control indication 2254*c*1).

As further illustrated in FIG. 22I, in response to detecting tap gesture 2250*h*, device 600 displays auto visual characteristic editing tool affordance 2214*a* in the center of the media editing user interface (e.g., as illustrated in FIG. 22C when visual characteristic editing mode affordance 2210*b* was first selected in FIG. 22B). To display auto visual characteristic editing tool affordance 2214*a* in the center of the media editing user interface, device 600 slides visual characteristic editing tool affordances 2214*a*-2214*f* to left, such that exposure editing tool affordance 2214*b* is displayed as the second to last affordance to the left of the media editing user interface, and brightness editing tool affordance 2214*c* is displayed as the last affordance to the left of the center of the media editing user interface. In addition, device 600 ceases to display highlight editing tool affordance 2214*d* and shadow editing tool affordance 2214*e* because the media editing user interface does not have any additional space to display any additional visual characteristic editing tool affordances 2214 to the immediate right of brightness editing tool affordance 2214*c*. Displaying auto visual characteristic editing tool affordance 2214*a* in the center of the media editing user interface indicates that device 600 is configured to adjust the displayed representation in response to the current value of adjustable auto visual characteristic control 2254*a*, where the current value of adjustable auto visual characteristic control 2254*a* corresponds to the value corresponding to the position of auto visual characteristic control indication 2254*a*1 on adjustable auto visual characteristic control 2254*a*.

In contrast to the current value of adjustable brightness control 2254*c* discussed in FIGS. 22D-22G that impacts on only values associated with a brightness visual characteristic (e.g., controlled by adjustable brightness control 2254*c*), the current value of adjustable auto visual characteristic control 2254*a* impacts one or more current values of one or more other visual characteristics (e.g., brightness and exposure values). When the current value of adjustable auto visual characteristic control 2254*a* changes, device 600 automatically, without additional user input, updates one or more current values that correspond to one or more other visual characteristics (e.g., visual characteristics that correspond to other visual characteristic editing tool affordances 2214). At FIG. 22I, the current value of adjustable auto visual characteristic control 2254*a* changes in response to device 600 detecting tap gesture 2250*h*. As a result, device 600 shows that the current adjusted brightness value has decreased by updating brightness value indicator 2244*c* to encompass less of the perimeter of brightness editing tool affordance 2214*c* than brightness value indicator 2244*c* encompassed in FIG. 22H. In addition, device 600 displays exposure value indicator 2244*b* around the perimeter exposure editing tool affordance 2214*b* to indicate that the displayed representation is being adjusted by a current exposure value (e.g., an increased exposure value). In some embodiments, device 600 adjusts the current values of one or more other visual characteristics (e.g., brightness value or exposure value) by using an auto adjustment algorithm with data corresponding to representation 2230*c* (e.g., previously displayed representation) and the current value of adjustable auto visual characteristic control 2254*a*.

Further, in response to detecting tap gesture 2250*h*, device 600 replaces the display of representation 2230*c* with adjusted representation 2230*d*. Representation 2230*d* corresponds to an adjusted version of representation 2230*c*, where representation 2230*c* has been adjusted based on the one or more updated current values that correspond to one or more other visual characteristics (e.g., decreased brightness value or increased exposure value). As illustrated in FIG. 22I, representation 2230*d* is visually darker and has more exposure than representation 2230*c*.

Turning to FIG. 22B, after device 600 detects gesture 2250*b*, device 600 displays FIG. 22I instead of FIG. 22C, in some embodiments. As a result, adjustable auto visual characteristic control 2254*a* causes device 600 to update one or more current values of one or more other visual characteristics (e.g., exposure and/or brightness values) and display an adjusted representation (e.g., representation 2230*d*) based on the one or more updated current values.

Figure 22J:
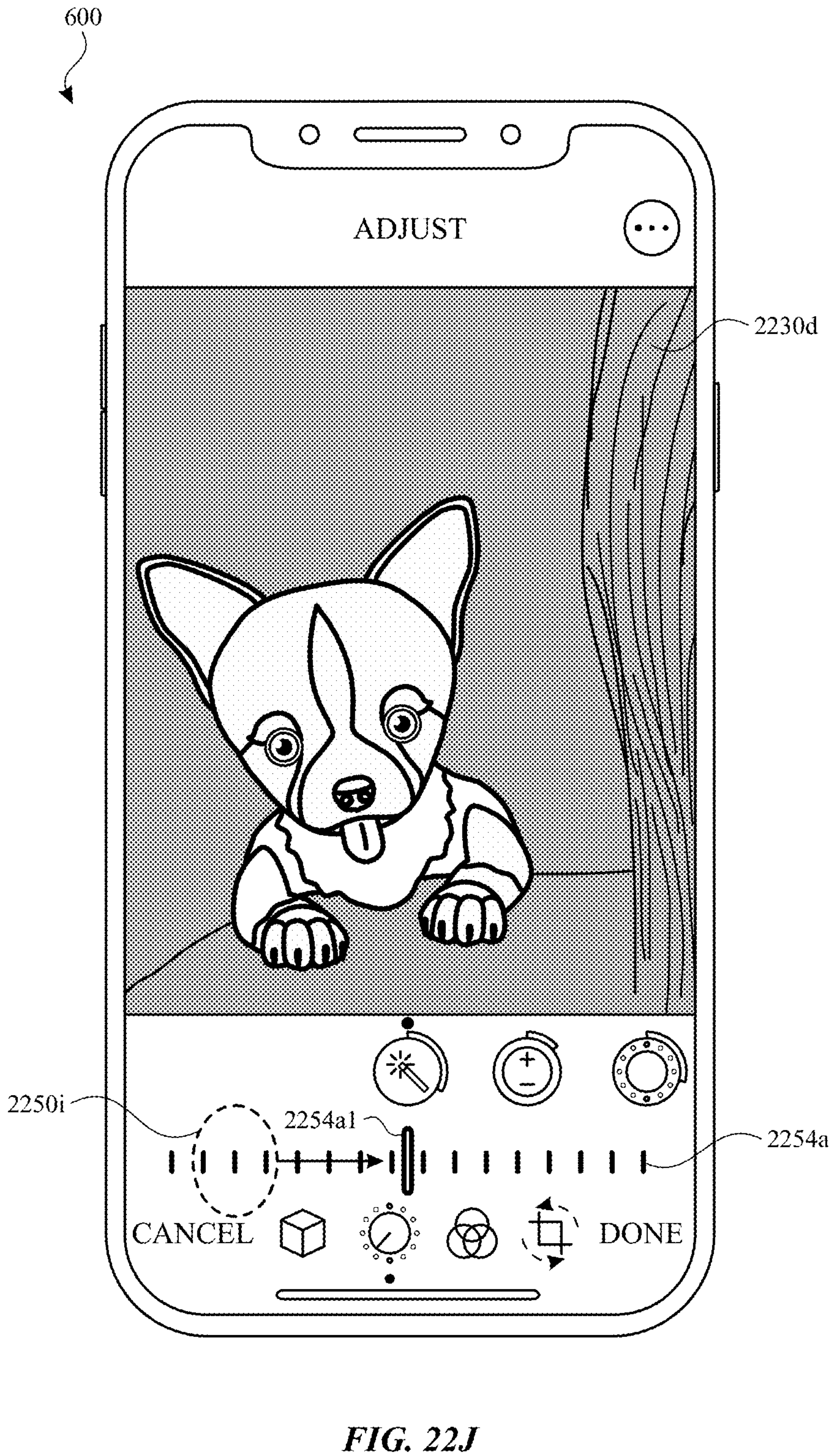

Turning back FIG. 22I, device 600 detects gesture 2250*i* (e.g., a rightward dragging or swiping gesture) directed to adjustable auto visual characteristic control 2254*a*. As illustrated in FIG. 22J, in response to detecting gesture 2250*i*, device 600 emphasizes adjustable auto visual characteristic control 2254*a* while device 600 continues to detect contact of gesture 2250*i* (e.g., using similar techniques as described above in relation to gesture 2250*d* and adjustable brightness control 2254*c* in FIG. 22E). At FIG. 22J, device 600 detects liftoff (e.g., ceases to detect contact) of gesture 2250*i*.

Figure 22K:
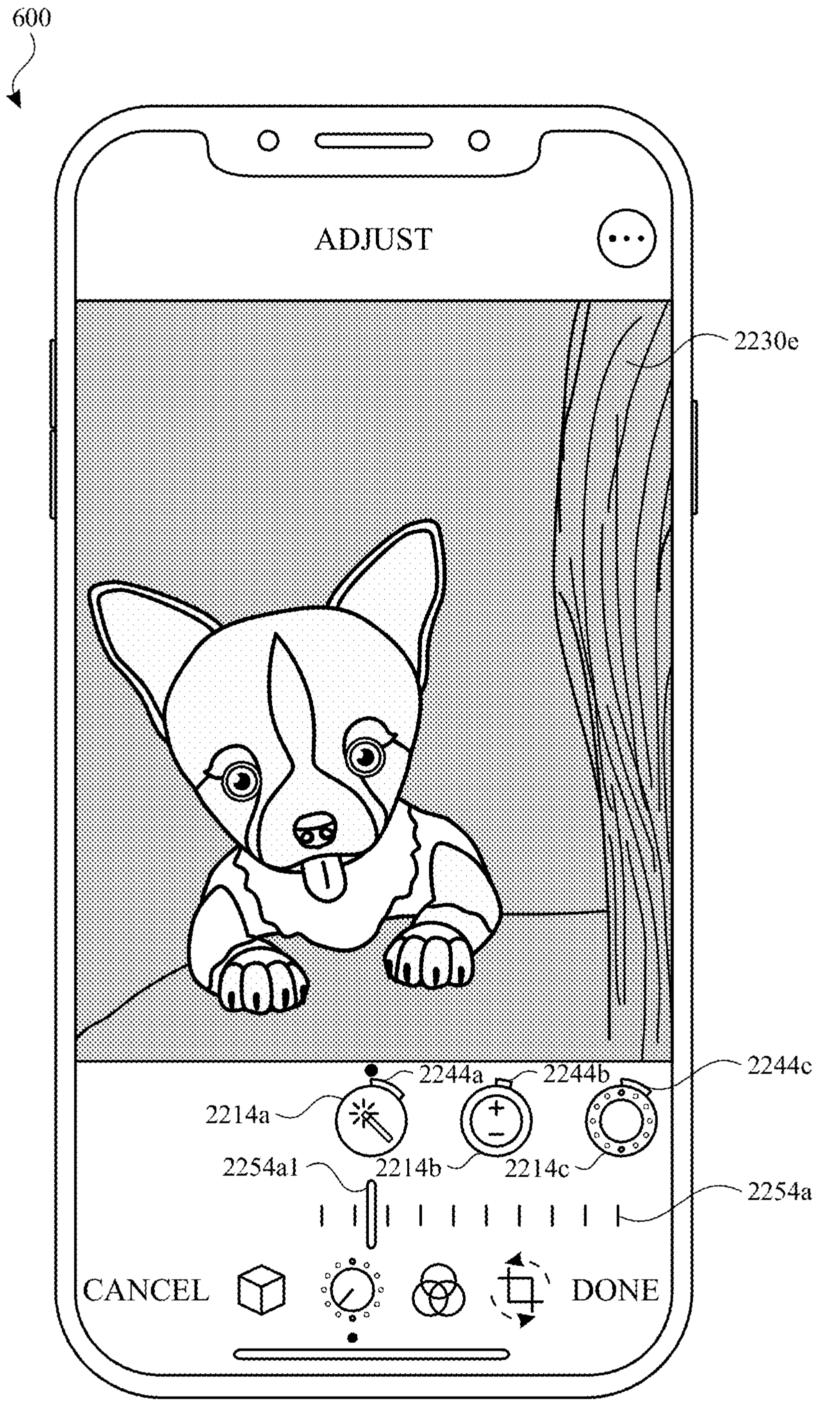

As illustrated in FIG. 22K, in response to detecting liftoff of gesture 2250*i*, device 600 re-displays adjustable auto visual characteristic control 2254*a* without emphases (e.g., as it was displayed without emphases in FIG. 22I) and moves auto visual characteristic control indication 2254*a*1 to a new position on adjustable auto visual characteristic control 2254*a* based on the magnitude and direction (e.g., speed, length of swipe) of gesture 2250*i*. At FIG. 22K, the magnitude and direction of gesture 2250*i* cause device 600 to display auto visual characteristic control indication 2254*a*1 in a new position on adjustable auto visual characteristic control 2254*a* that is closer to the leftmost tick mark (e.g., the minimum value of auto visual characteristic adjustment) of adjustable auto visual characteristic control 2254*a* than the previous position of auto visual characteristic control indication 2254*a*1 in FIG. 22I. Moving auto visual characteristic control indication 2254*a*1 to a new position on adjustable auto visual characteristic control 2254*a*, includes moving the tick marks of adjustable auto visual characteristic control to the right (e.g., direction of gesture 2250*i*) while maintaining the display of auto visual characteristic control indication 2254*a*1 in the center of the media editing user interface. As a result, the leftmost tick mark is displayed closer to the center of the media editing user interface in FIG. 22K from where it was displayed in FIG. 22I, leaving additional space between the leftmost tick mark and the left edge of the media editing user interface.

After moving auto visual characteristic control indication 2254*a*1 to the new position on adjustable auto visual characteristic control 2254*a*, device 600 updates auto characteristic value indicator 2244*a* to correspond to the updated auto visual characteristic adjustment value that corresponds to the position of auto visual characteristic control indication 2254*a*1. In particular, device 600 modifies auto characteristic value indicator 2244*a* to encompass less of the perimeter of auto visual characteristic editing tool affordance 2214*a*, which mirrors auto visual characteristic control indication 2254*a*1 moving from a position that corresponds to a higher auto visual characteristic adjustment value to a lower auto visual characteristic adjustment value. In addition, device 600 updates exposure value indicator 2244*b* and brightness value indicator 2244*c* to correspond to new lower adjusted exposure and brightness values by modifying them to encompass less of the perimeter of their respective indicators, which also mirrors the movement of auto visual characteristic control indication 2254*a*1 moving from a position that corresponds to a higher auto visual characteristic adjustment value to a lower auto visual characteristic adjustment value. In some embodiments, one or more value indicators that correspond to one or more values of one or more other visual characteristics can be maintained or adjusted in the opposite direction of the movement of auto visual characteristic control indication 2254*a*1. In some embodiments, the values of the one or more visual characteristics are calculated based on an auto adjustment algorithm. As illustrated in FIG. 22K, in response to detecting liftoff of gesture 2250*i*, device 600 replaces display of representation 2230*d* with display of adjusted representation 2230*e*, where representation 2230*e* a version of representation 2230*d* that has been adjusted based on the updated auto visual characteristic adjustment values and one or more other visual characteristic values that were adjusted in response to detecting liftoff of gesture 2250*i*.

Figure 22L:
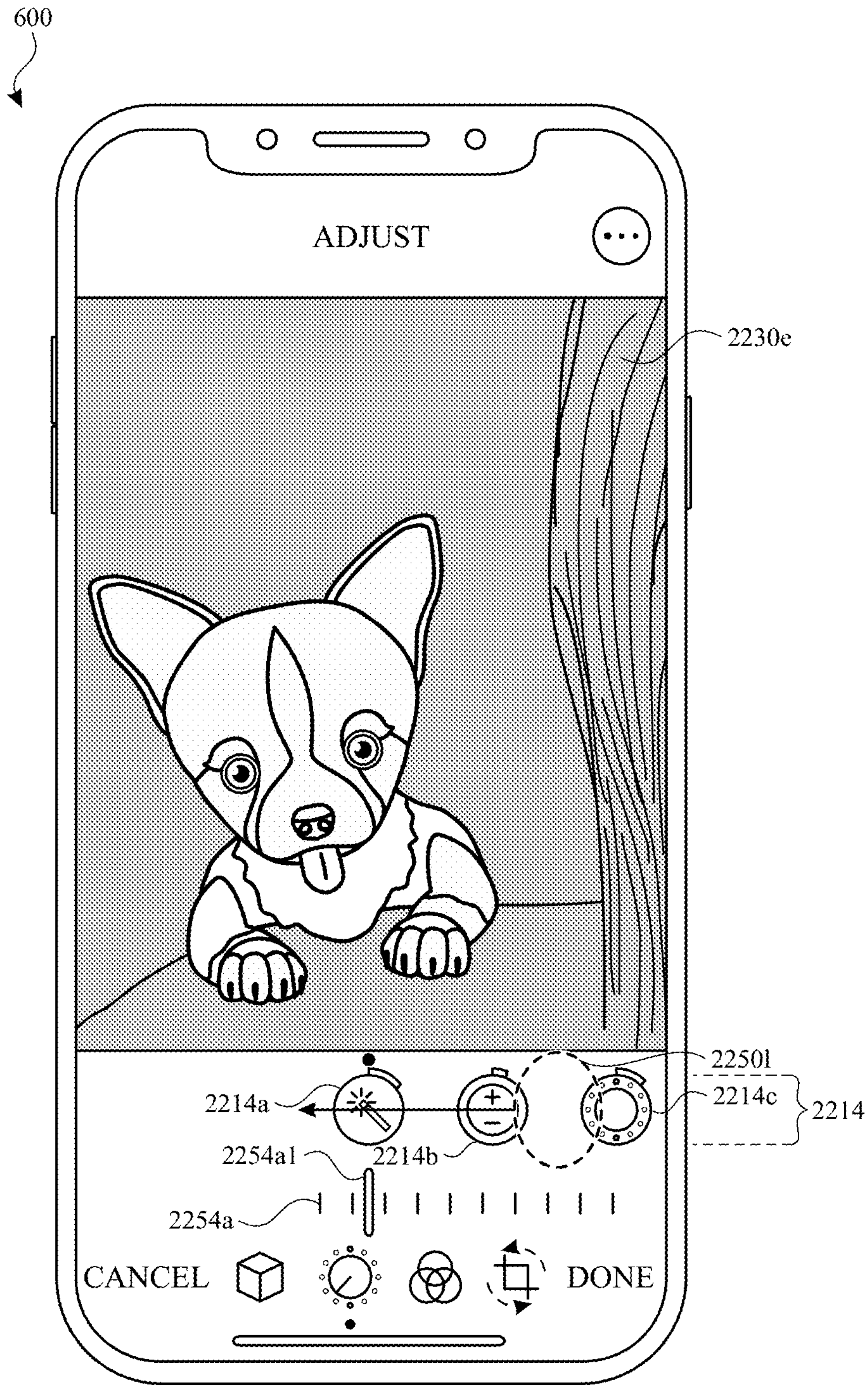
Figure 22M:
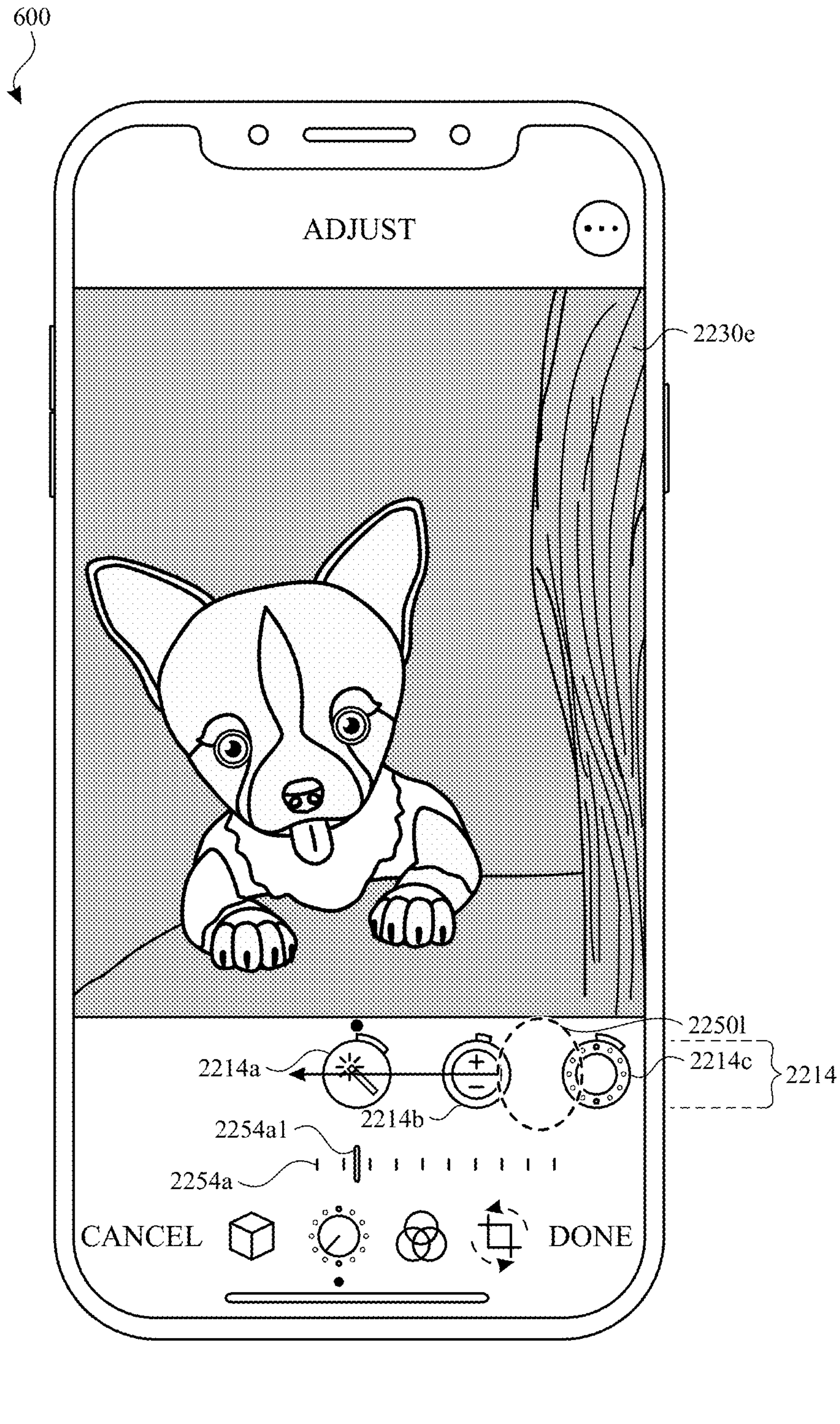

As illustrated in FIG. 22L, device 600 detects gesture 22501 (e.g., dragging or swiping gesture) directed to an area where visual characteristic editing tool affordances 2214 are located. In response to detecting gesture 22501, as illustrated in FIG. 22M, device 600 deemphasizes adjustable auto visual characteristic control 2254*a* while device 600 continues to detect contact on the touch-sensitive display of device 600 (e.g., while contact of a finger continues to remain on the touch-sensitive display of device 600). In particular, device 600 reduces the size of adjustable auto visual characteristic control 2254*a*, including the tick marks and auto visual characteristic control indication 2254*a*1. In some embodiments, deemphasizing adjustable auto visual characteristic control 2254*a* attempts to help a user of device 600 navigate to a particular editing tool affordance. In some embodiments, device 600 deemphasizes adjustable auto visual characteristic control 2254*a* by changing the color (e.g., from black to gray) of portions (e.g., tick marks or auto visual characteristic control indication 2254*a*1) of adjustable auto visual characteristic control 2254*a*. In some embodiments, device 600 deemphasizes adjustable auto visual characteristic control 2254*a* by blurring adjustable auto visual characteristic control 2254*a* or displaying adjustable auto visual characteristic control 2254*a* as out of focus.

Figure 22N:
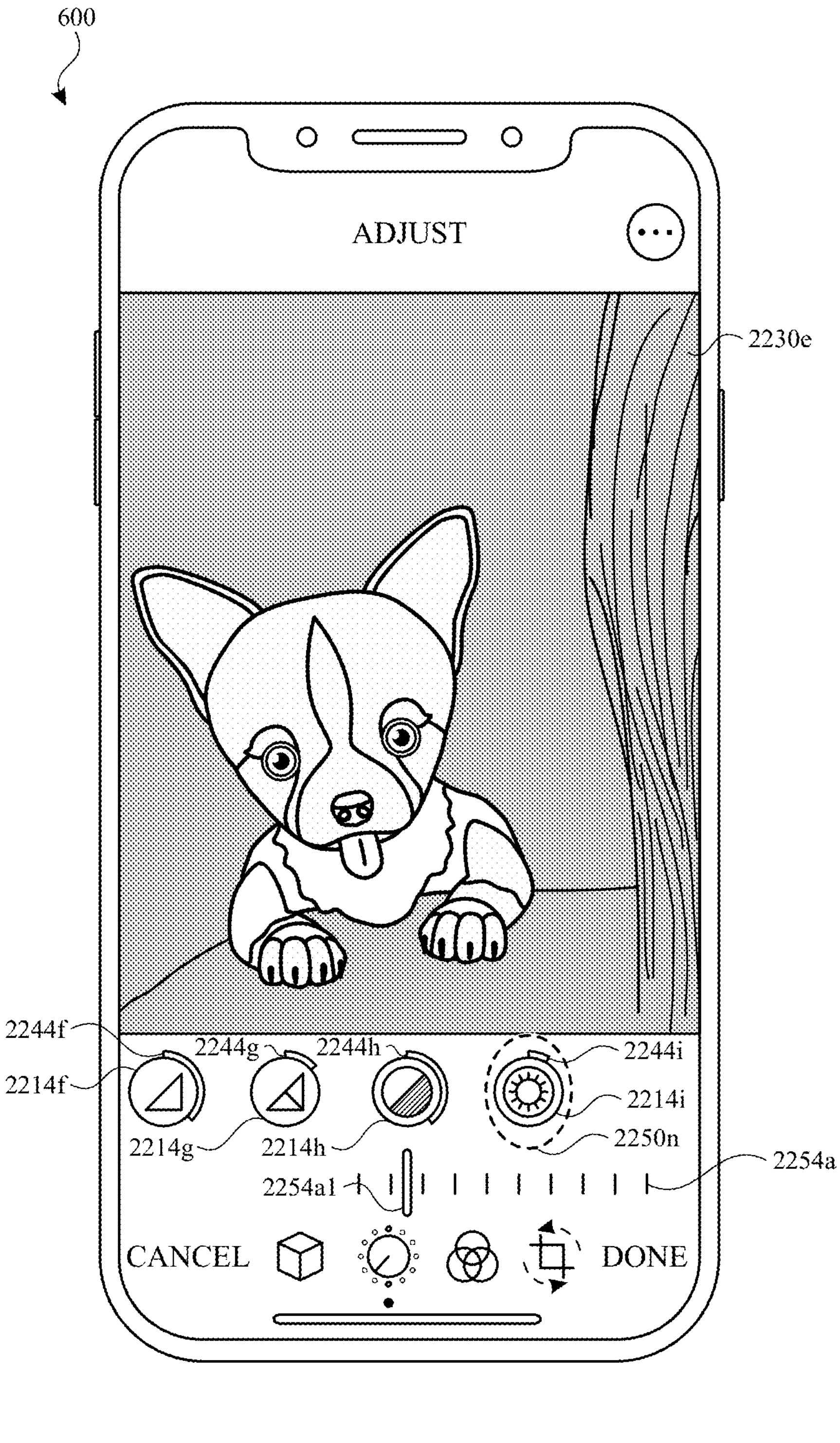

At FIG. 22M, device 600 detects liftoff (e.g., ceases to detect contact) of gesture 22501. As illustrated in FIG. 22N, in response to detecting liftoff of gesture 22501, device 600 ceases to deemphasize adjustable auto visual characteristic control 2254*a*. Device 600 re-displays auto visual characteristic control 2254*a* as it was displayed in FIG. 22L. In addition, in response detecting gesture 22501, device 600 shifts visual characteristic editing tool affordances 2214 to the left based on the magnitude and direction (e.g., speed, length of swipe) of gesture 22501. At FIG. 22N, the magnitude and direction of gesture 22501 cause device 600 to display visual characteristic editing tool affordances 2214*f*-2214*i* and to cease to display visual characteristic editing tool affordances 2214*a*-2214*e*. Notably, visual characteristic editing tool affordances 2214*f*-2214*i* also include value indicators 2244*f*-2244*i* around each respective affordance. Device 600 displays value indicators 2244*f*-2244*i* that were adjusted in FIGS. 22J-22K in response to device 600 moving auto visual characteristic control indication 2254*a*1 to the new position on adjustable auto visual characteristic control 2254*a*.

Figure 22O:
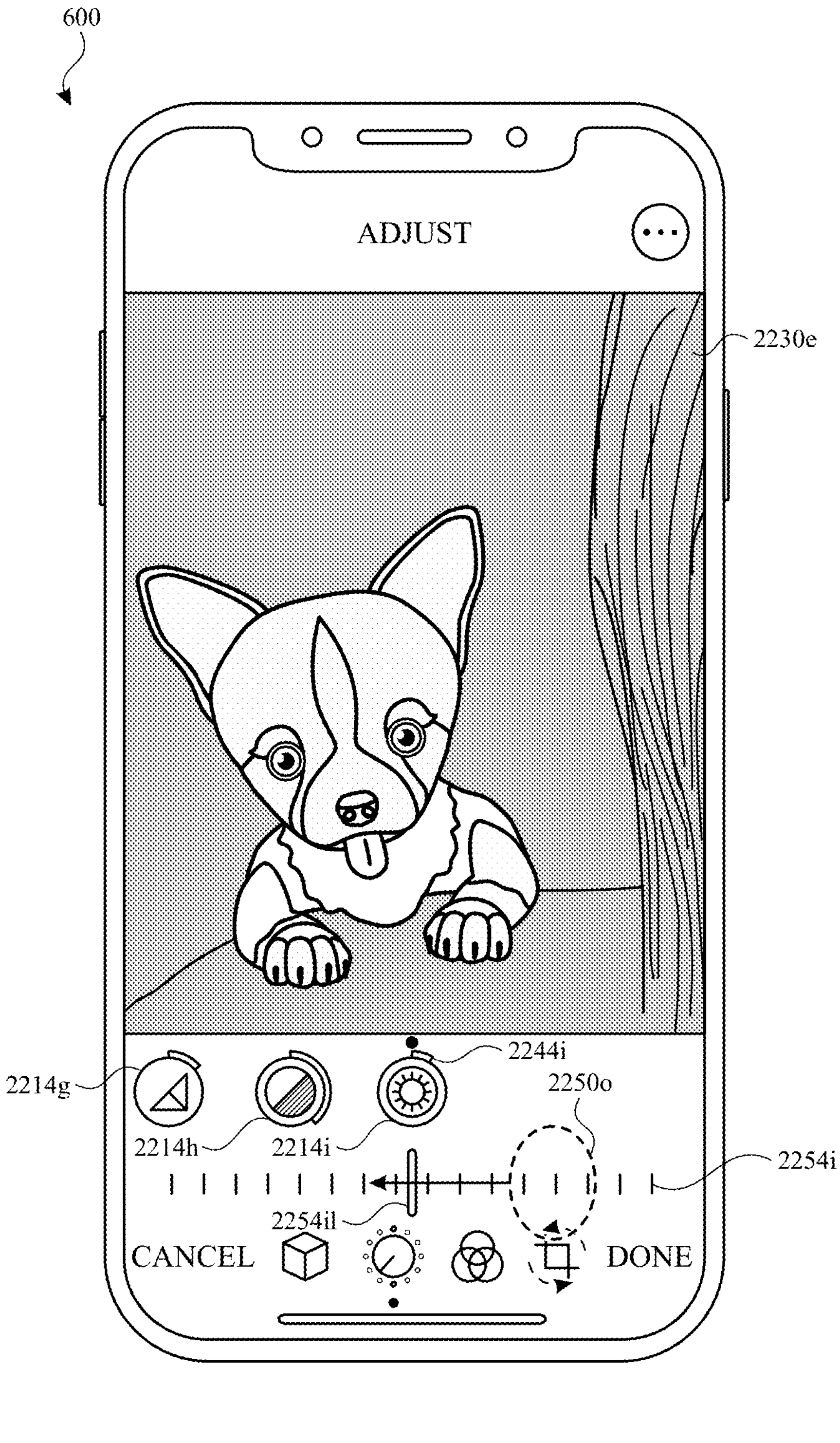

At FIG. 22N, device 600 detects tap gesture 2250*n* at a location that corresponds to vignette editing tool affordance 2214*i*. As illustrated in FIG. 22O, in response to detecting tap gesture 2250*n*, device 600 replaces the display of adjustable auto visual characteristic control 2254*a* and auto visual characteristic control indication 2254*a*1 with the display of adjustable vignette control 2254*i* and ceases to display adjustable auto visual characteristic control 2254*a*. At FIG. 22O, device 600 performs this replacement using similar techniques to those described above in FIG. 22I with respect to replacing the display of adjustable brightness control 2254*c* and brightness control indication 2254*c*1 with the display of adjustable auto visual characteristic control 2254*a* and auto visual characteristic control indication 2254*a*1. In FIG. 22O, device 600 displays vignette control indication 2254*i*1 at a position that corresponds to the middle of adjustable vignette control 2254*i*.

Figure 22P:
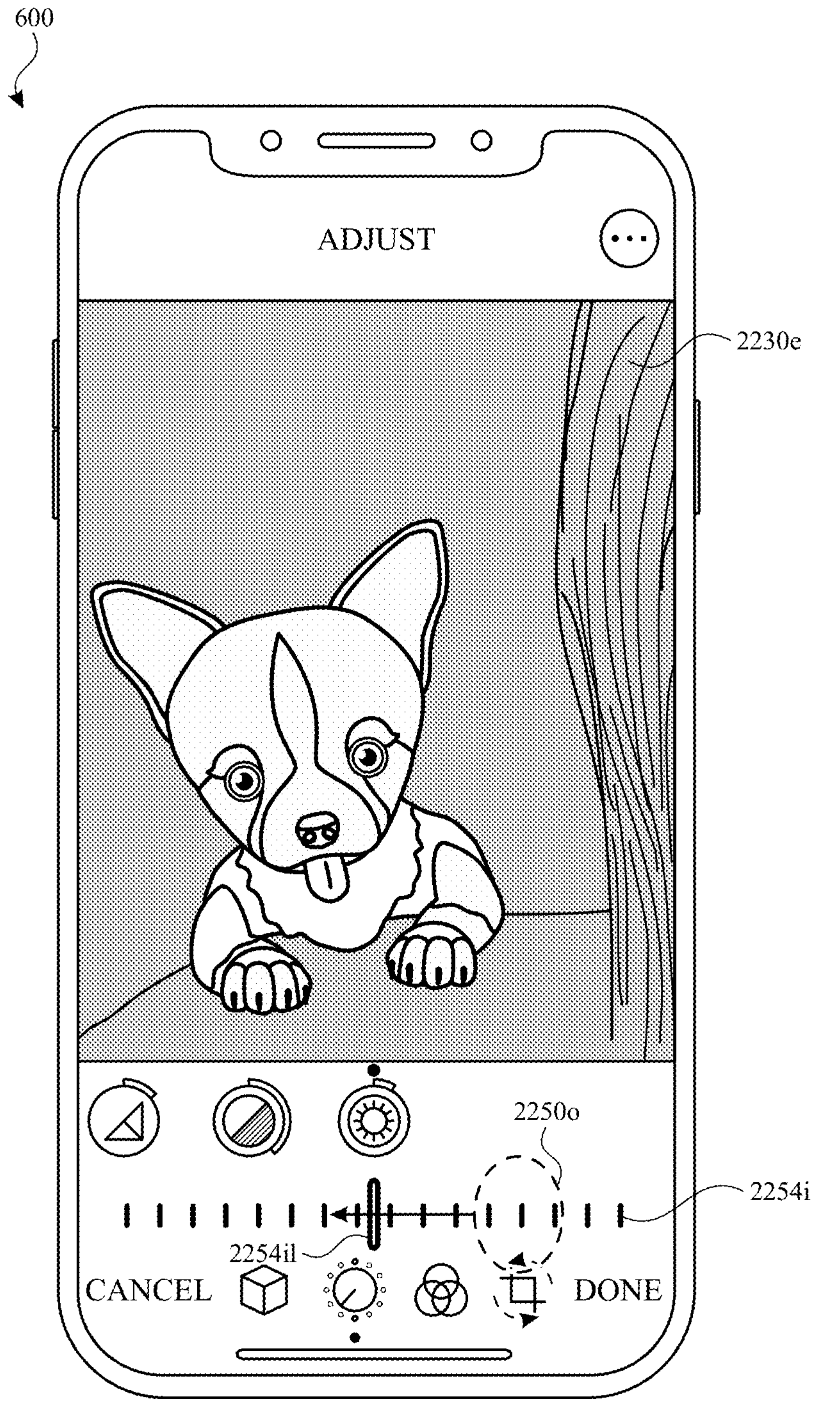
Figure 22Q:
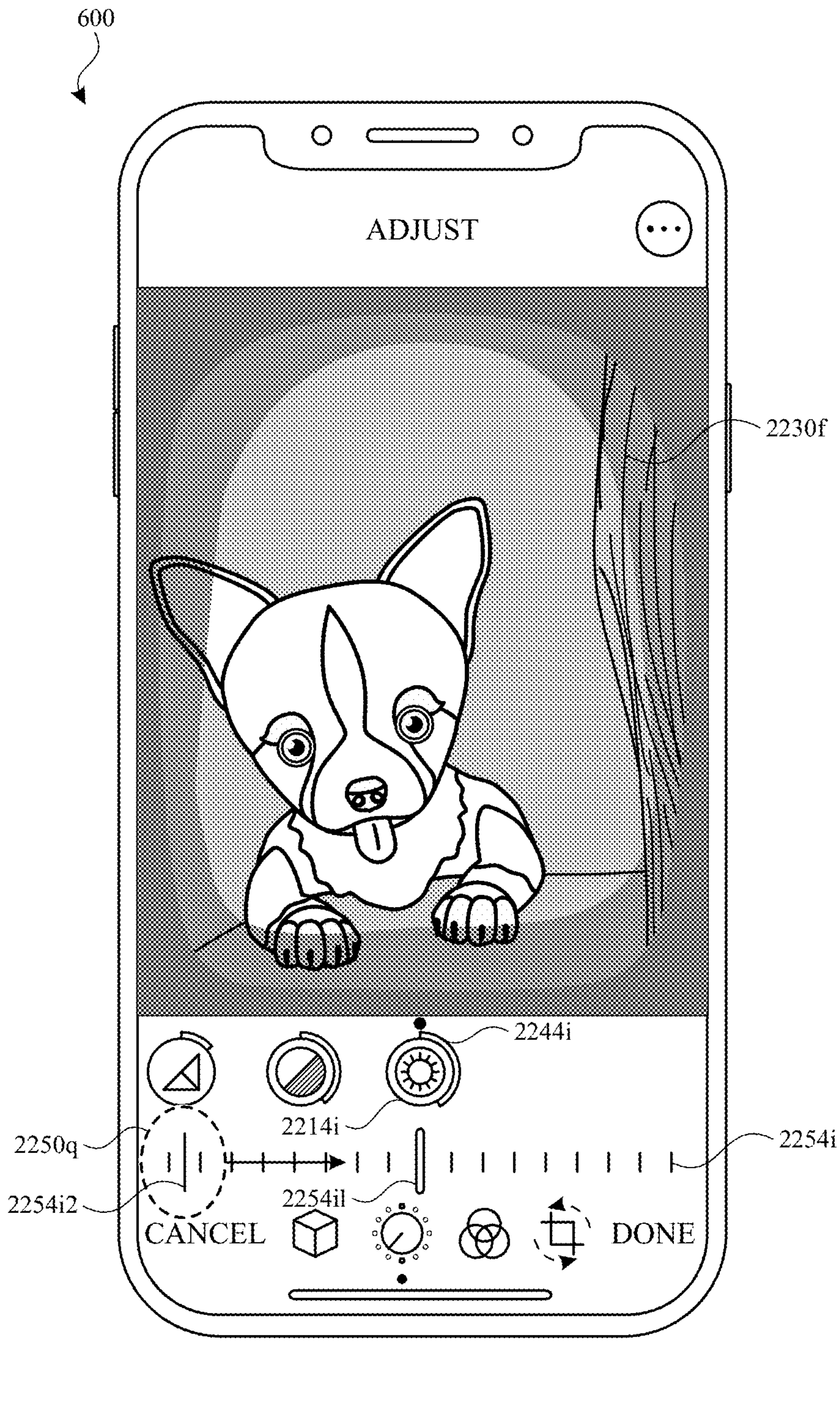

At FIG. 22O, device 600 detects gesture 2250*o* (e.g., a leftward dragging or swiping gesture) directed to adjustable vignette control 2254*i*. In response to detecting gesture 2250*o*, as illustrated in FIGS. 22P-22Q, device 600 moves vignette control indication 2254*i*1 to a new position on adjustable vignette control 2254*i* and displays adjusted representation 2230*f*, using techniques similar to those described above in relation to FIGS. 22D-22F. Representation 2230*f* has been adjusted based on the new vignette value that corresponds to a value at the new position of vignette control indication 2254*i*1 on adjustable vignette control 2254*i*. As shown in FIG. 22Q, representation 2230*f* includes a more pronounced vignette effect displayed around the dog than the vignette effect displayed around the dog in representation 2230*e* with respect to FIG. 22P.

As illustrated in FIG. 22Q, the rightmost tick mark or the leftmost tick mark is not displayed in FIG. 22Q (e.g., as opposed to the rightmost tick mark being displayed in FIG. 22F and the leftmost tick mark being displayed in FIG. 22K). Thus, the new position on adjustable vignette control 2254*i* is close to the previous position (e.g., in FIGS. 22O-22P) of vignette control indication 2254*i*1 on adjustable vignette control 2254*i*. Because the new position on adjustable vignette control 2254*i* is relatively close to the previous position (e.g., in FIGS. 22O-22P) of vignette control indication 2254*i*1 on adjustable vignette control 2254*i*, device 600 displays vignette reset indication 2252*i*2 at the previous position of vignette control indication 2254*i*1 on adjustable vignette control 2254*i*. At FIG. 22Q, the previous position of vignette control indication 2254*i*1 corresponds to a value that was calculated after device 600 moved auto visual characteristic control indication 2254*a*1 to a new position on adjustable auto visual characteristic control 2254*a* (based on the magnitude and direction of gesture 2250*i*). In some embodiments, adjusting auto visual characteristic control indication 2254*a*1 on adjustable auto visual characteristic control 2254*a* can change the position of vignette reset indication 2252*i*2 on adjustable vignette control 2254*i*. In some embodiments, vignette reset indication 2252*i*2 allows a user to reset a value of a visual characteristic that was calculated based on an auto adjustment algorithm. In some embodiments, with respect to the adjustable controls described above (e.g., adjustable auto visual characteristic control 2254*a* and adjustable brightness control 2254*c*), reset indications are also displayed while detecting gestures 2250*d* or 2250*i*. However, because the indications described above ended in a position that was close to the leftmost or rightmost tick marks after detecting lift off of gestures 2250*d* or 2250*i*, reset indications are not displayed in FIGS. 22F and 22K.

Figure 22R:
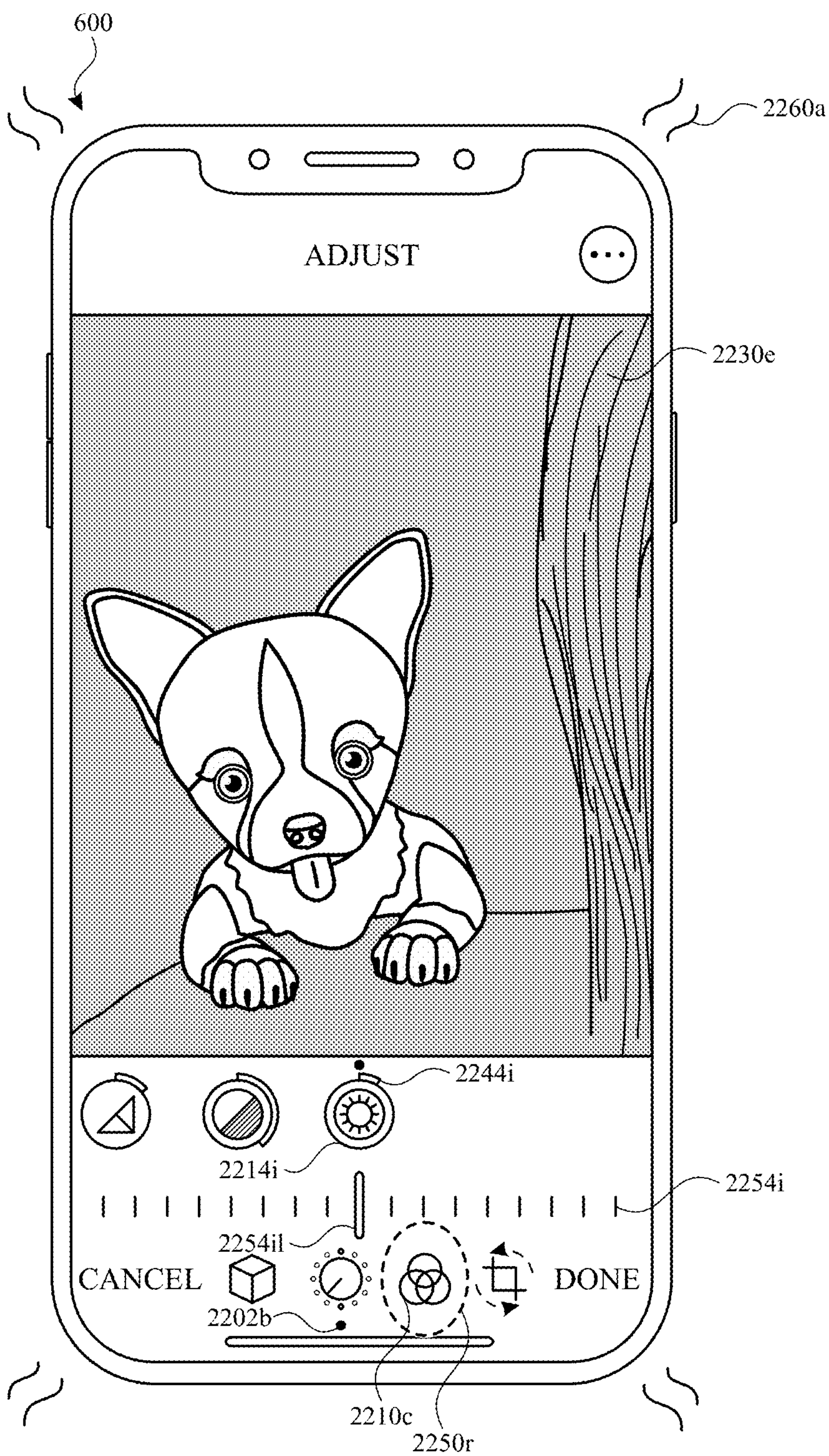

At FIG. 22Q, device 600 detects gesture 2250*q* (e.g., a dragging or swiping gesture in the opposite direction of gesture 2250*o*) directed to adjustable vignette control 2254*i*. As illustrated in FIG. 22R, based on the magnitude and direction of 2250*q*, device 600 displays vignette control indication 2254*i*1 at the position at which vignette reset indication 2252*i*2 was displayed in FIG. 22Q. When vignette control indication 2254*i*1 is displayed at the position at which vignette reset indication 2252*i*2 was displayed, device 600 issues haptic output 2260*a*. In addition, because vignette control indication 2254*i*1 is displayed at the position at which vignette reset indication 2252*i*2 was displayed in FIG. 22Q (or its initial position in FIG. 22O), device 600 re-displays adjusted representation 2230*e* (adjusted based on a value that corresponds to the current position of vignette control indication **2254*i*1) and vignette control indication 2244*i* as they were originally displayed in 22**O.

Figure 22S:
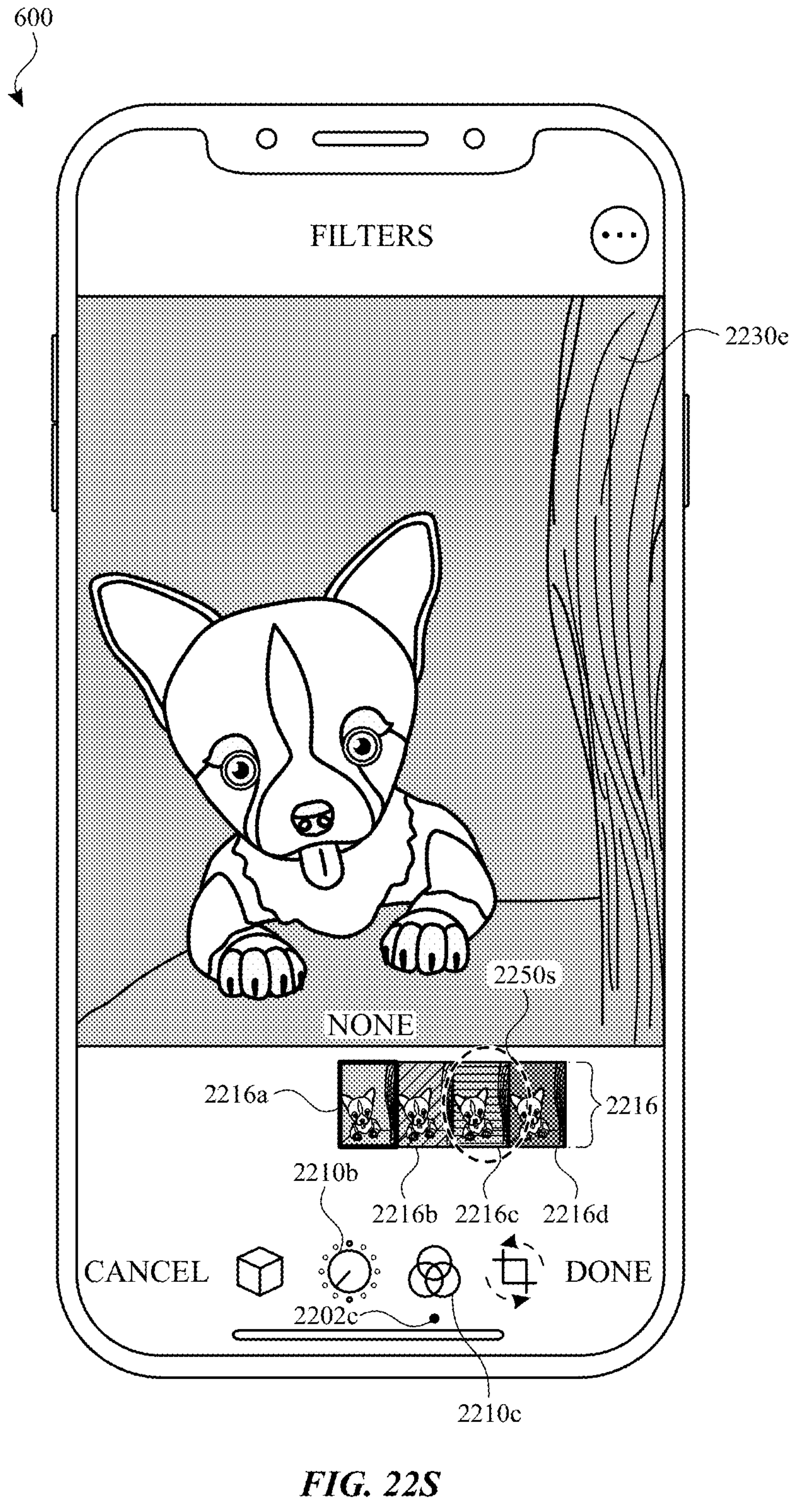

At FIG. 22R, device 600 detects tap gesture **2250*r* at a location that corresponds to filter editing mode affordance 2210*c*. As illustrated in FIG. 22S, in response to detecting tap gesture 2250*r*, device 600 replaces visual characteristic editing affordances 2214 with filter editing tool affordances 2216. Device 600 also displays mode selection indicator 2202*c* under filter editing mode affordance 2210*c* that shows that device 600 has changed from being configured to operate in the visual characteristic editing mode to being configured to operate in a filtering editing mode. Moreover, in response to detecting tap gesture 2250*r*, device 600 ceases to display vignette control indication 2254*i*1. Moreover, because no-filter editing tool affordance 2216*a* is selected (e.g., denoted by "NONE"), device 600** ceases to display an adjustable control.

Figure 22T:
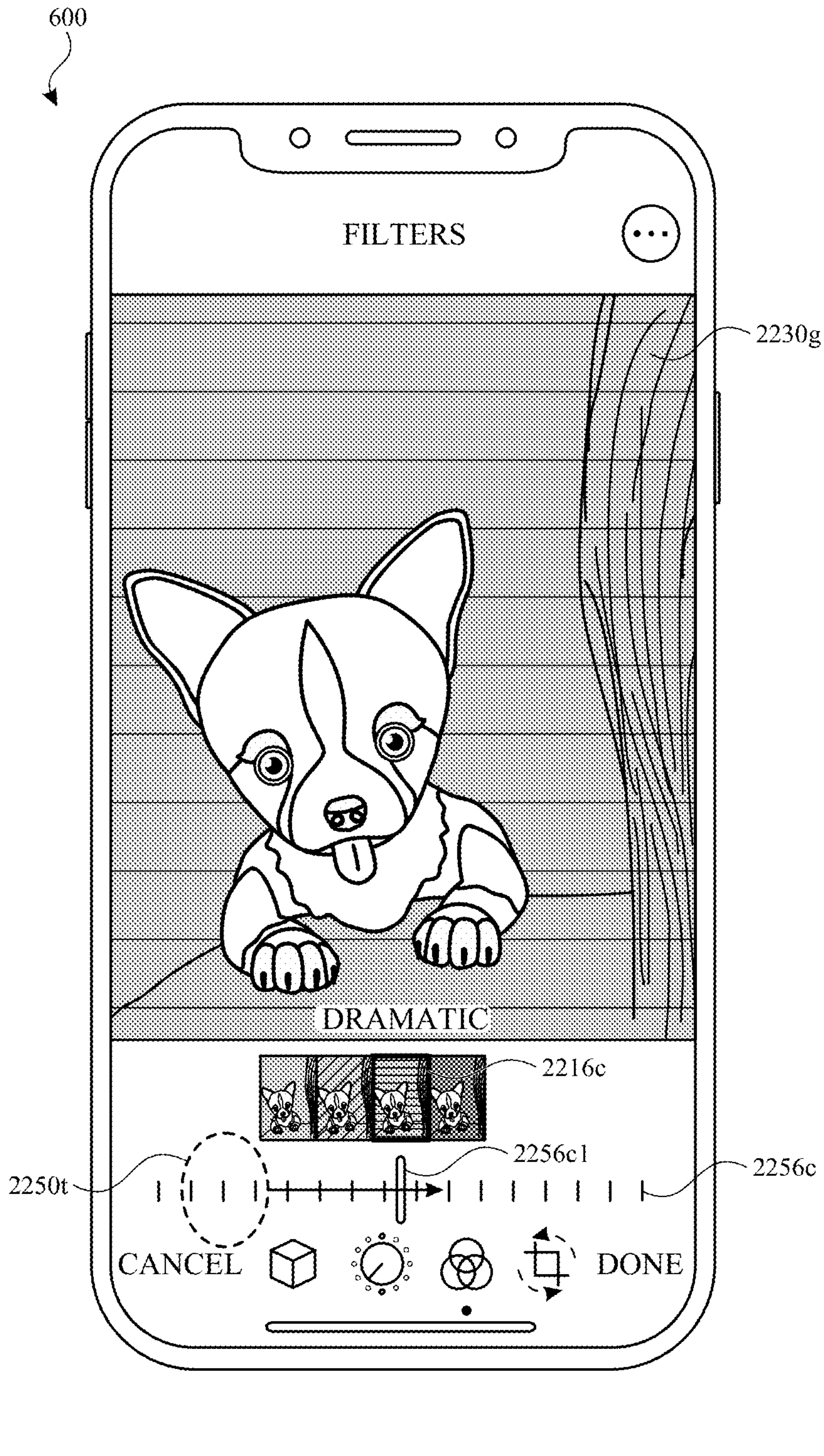

At FIG. 22S, device 600 detects tap gesture **2250*s* at a location that corresponds to dramatic filter editing tool affordance 2216*c*. As illustrated in FIG. 22T, in response to detecting tap gesture 2250*s*, device 600 displays that dramatic filter editing tool affordance 2216*c* is selected (e.g., replacing "NONE" with "DRAMATIC"). In addition, device 600 displays adjustable dramatic filter control 2256*c* and dramatic filter control indication 2256*c*1. Device 600 uses similar techniques in response to detecting inputs directed to adjustable dramatic filter control 2256*c* (and other adjustable filter controls) as described above in relation to adjustable controls 2254*a*, 2254*c*, and/or 2254*i*. In addition, in response to detecting tap gesture 2250*s*, device 600 displays representation 2230*g*, where representation 2230*e* in FIG. 22U has been adjusted based on the value that corresponds to the initial position of dramatic filter control indication 2256*c*1 on adjustable dramatic filter control 2256*c***.

Figure 22U:
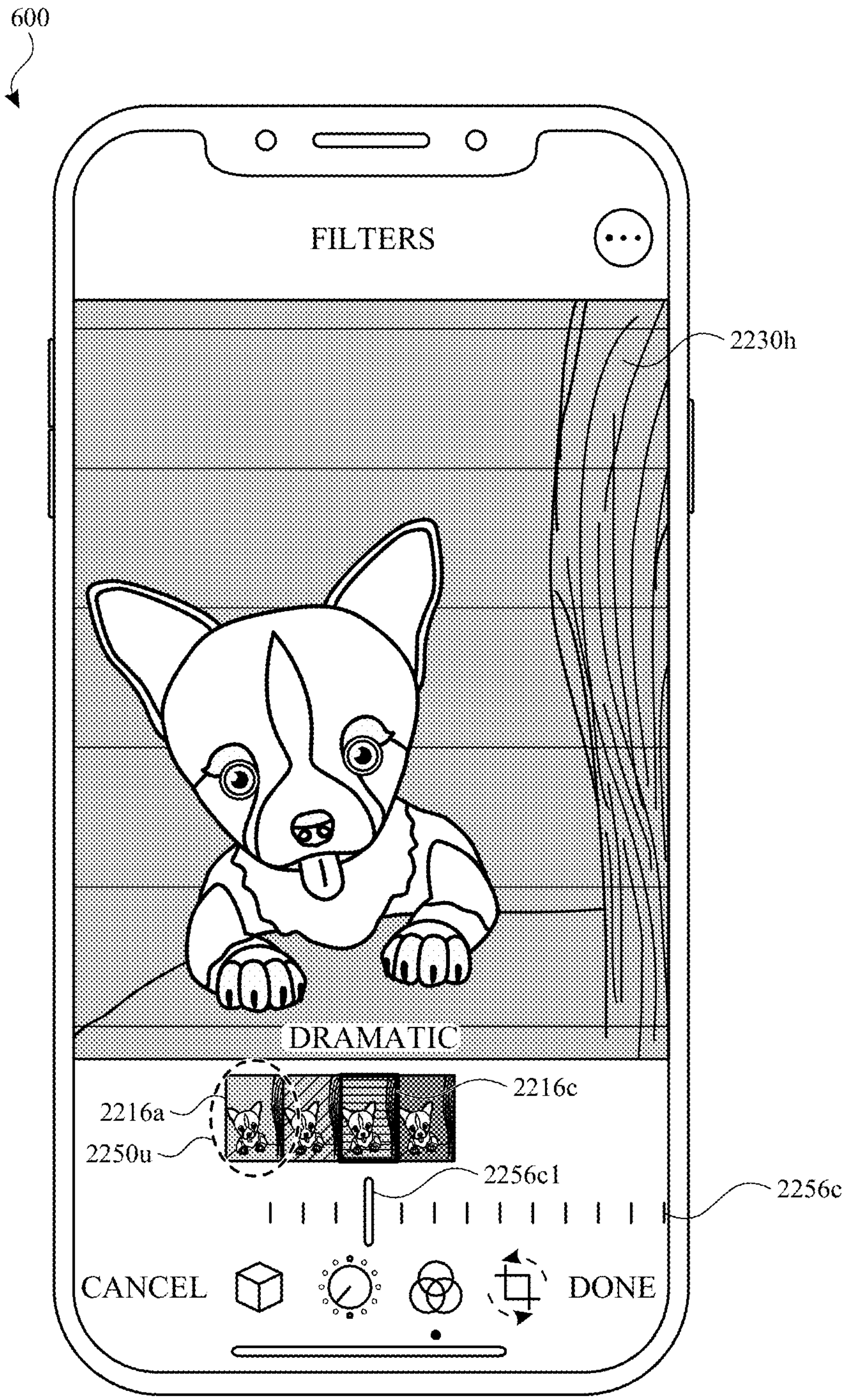

At FIG. 22T, device 600 detects gesture **2250*t* (e.g., a rightward dragging or swiping gesture) directed to adjustable dramatic filter control 2256*c*. As illustrated in FIG. 22U, in response to detecting gesture 2250*t*, device 600 performs similar techniques as those described above in response to device 600 detecting gesture 2250*d*, 2250*i*, and/or 2250*o*. Device 600 moves dramatic filter control indication 2256*c*1 to a new position on adjustable dramatic filter control 2256*c* based on the magnitude and direction (e.g., speed, length of swipe) of gesture 2250*t*. The magnitude and direction of gesture 2250*t* cause device 600 to display filter control indication 2256*c*1 at a new position that is closer to the leftmost tick mark (e.g., the minimum value) of adjustable dramatic filter control 2256*c* than the previous position of adjustable dramatic filter control 2256*c* in FIG. 22T. In addition, device 600 replaces the display of representation 2230*g* with a display of adjusted representation 2230*h*, where representation 2230*g* has been adjusted based on a value corresponding to the new position of filter control indication 2256*c*1 on adjustable dramatic filter control 2256*c*. As shown, in FIG. 22U, device 600 displays representation 2230*h* with less dramatic filter (e.g., less number of horizontal lines) than the dramatic filter of representation 2230*g* in FIG. 22T because the new position of dramatic filter control indication 2256*c*1 is associated with a lower value (e.g., closer to leftmost tick mark that corresponds to the minimum value of dramatic filter) than the previous position of dramatic filter control indication 2256*c*1 (e.g., in FIG. 22T). Moreover, no value indicators are displayed around dramatic filter editing tool affordance 2216*c***.

Figure 22V:
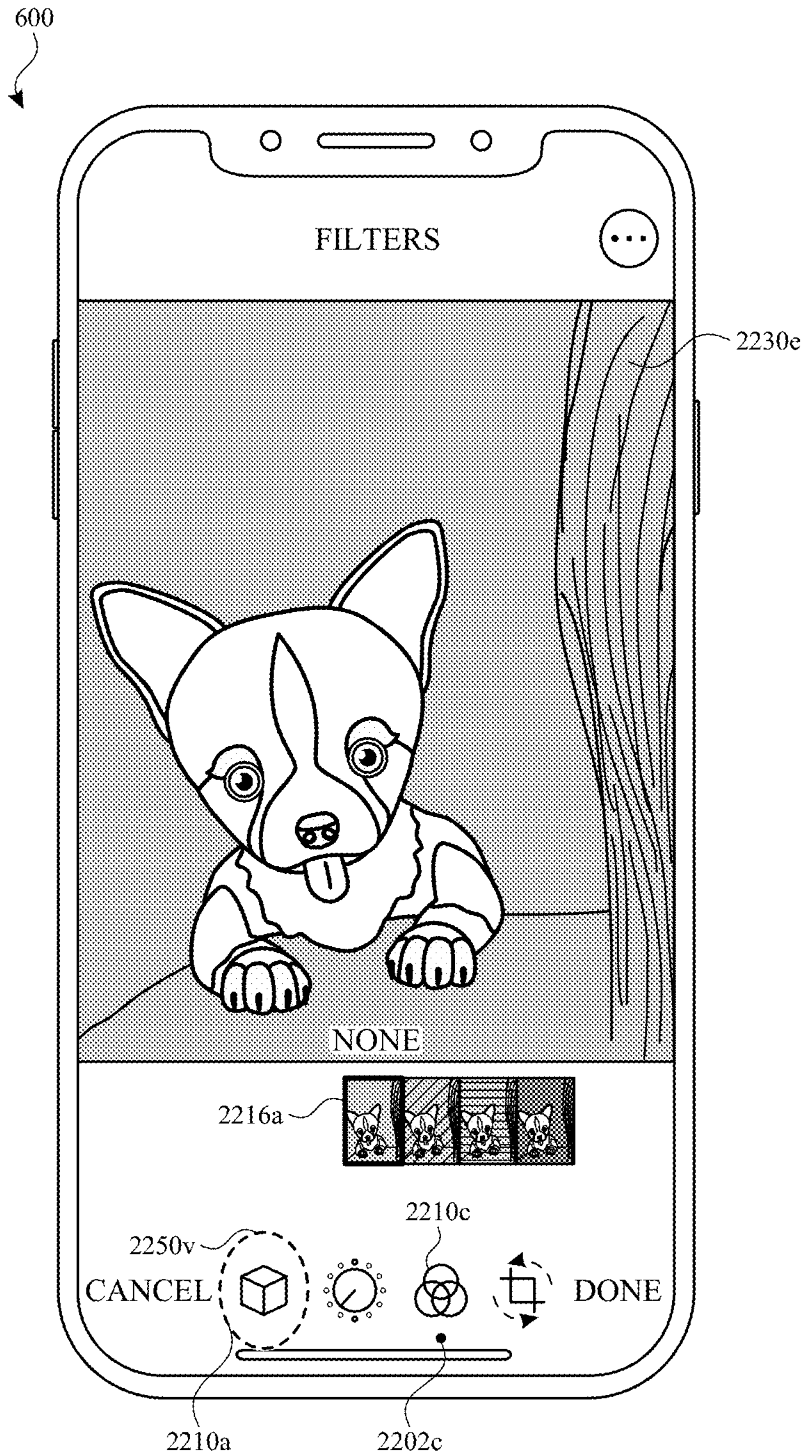

At FIG. 22U, device 600 displays tap gesture **2250*u* at a location that corresponds to no-filter editing tool affordance 2216*a*. As illustrated in FIG. 22V, in response to detecting tap gesture 2250*u*, device 600 displays that no-filter editing tool affordance 2216*a* is selected (e.g., replacing "DRAMATIC" with "NONE"). As discussed above in relation to FIG. 22S, because no-filter editing tool affordance 2216*a* is selected (e.g., denoted by "NONE"), device 600 ceases to display an adjustable control. Additionally, device 600 replaces the display of representation 2230*h* with a display of representation 2230*e*, where representation 2230*e* is not adjusted based on any filter (e.g., no horizontal lines representing the filter are displayed in representation 2230*e* of FIG. 22V). Thus, representation 2230*e* is the same representation that was displayed in FIG. 22S before any filter was used to adjust representation 2230*e*** via an adjustable filter control.

Figure 22W:
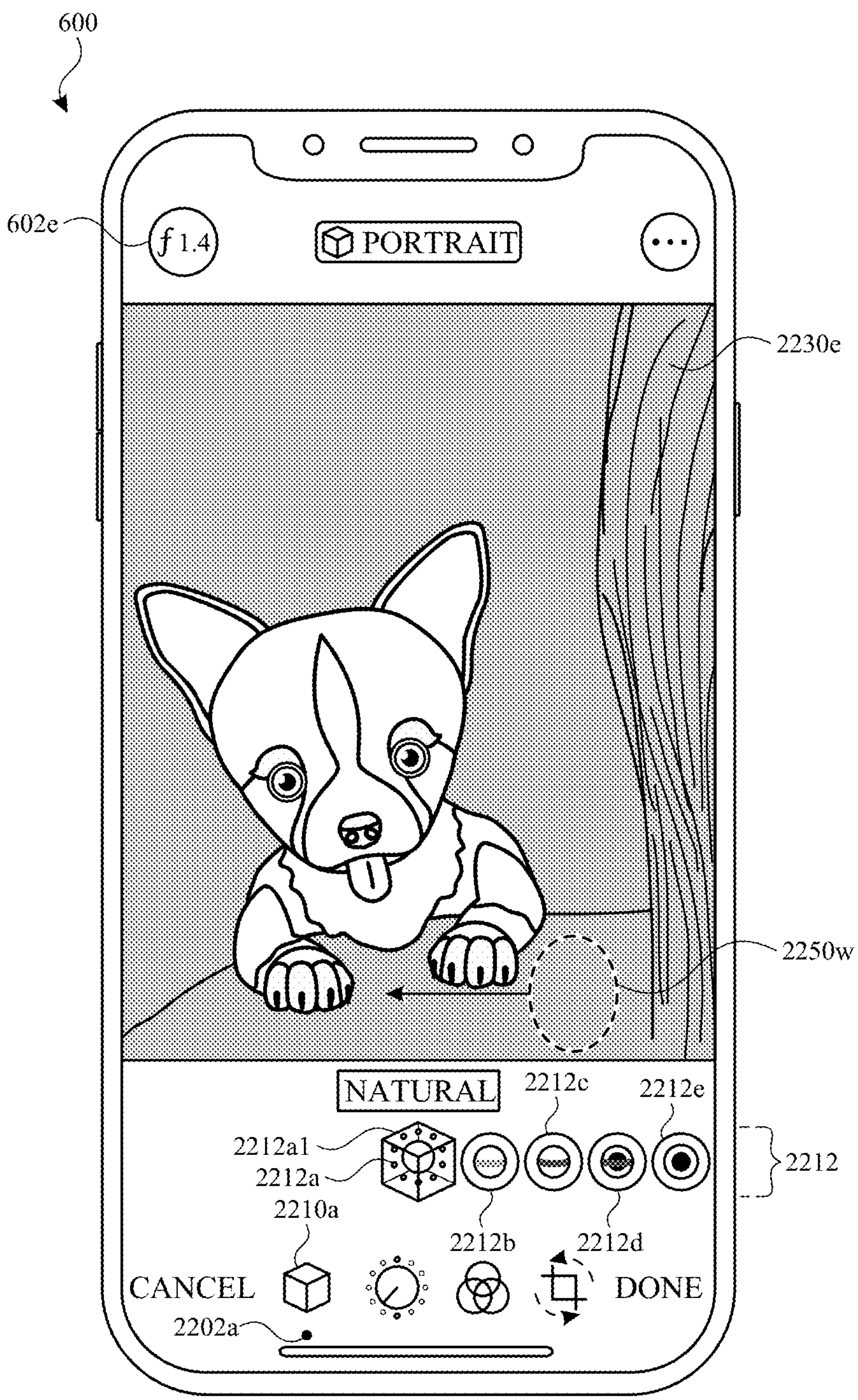

At FIG. 22V, device 600 detects tap gesture **2250*v* at a location that corresponds to portrait media mode editing affordance 2210*a*. As illustrated in FIG. 22W, in response to detecting tap gesture 2250*v*, device 600 displays mode selection indicator 2202*a* under portrait media editing mode affordance 2210*a* and ceases to display mode selection indicator 2202*c* under filter editing mode affordance 2210*c*. As shown by mode selection indicator 2202*a*, device 600 is configured to operate in the portrait editing mode, so device 600 also displays f-stop indicator 602*e* that provides an indication of an f-stop value (e.g., a numerical value) in indicator region 602 (e.g., using similar techniques as disclosed in FIG. 8H). In addition, in response to detecting tap gesture 2250*v*, device 600 replaces filter editing tool affordances 2216 with portrait media editing tool affordances 2212. In some embodiments, portrait media editing tool affordances 2212 correspond to lighting effect control 628; thus, device 600 uses similar techniques to those described above in FIGS. 6S-6U in relation to lighting effect control 628 to perform functions related to portrait media editing tool affordances 2212**.

As illustrated in FIG. 22W, device 600 illustrates lighting selection indicator **2212*a*1 on top of natural light editing tool affordance 2212*a*, which indicates that natural light editing tool affordance 2212*a* is selected. Similar to no-filter editing tool affordance 2216*a* as described above in FIG. 22S, because natural light editing tool affordance 2212*a* is selected, device 600 is configured to operate using the natural light in representation 2230*e*. In other words, an adjustable lightening effect will not be used to adjust representation 2230*e*, so device 600 does not display an adjustable for adjusting the natural lighting effect (also explained above in relation to lighting effect control 628 in FIGS. 6R-6Q). At FIG. 22W, device 600 detects gesture 2250*w*** (e.g., a pressing gesture).

Figure 22X:
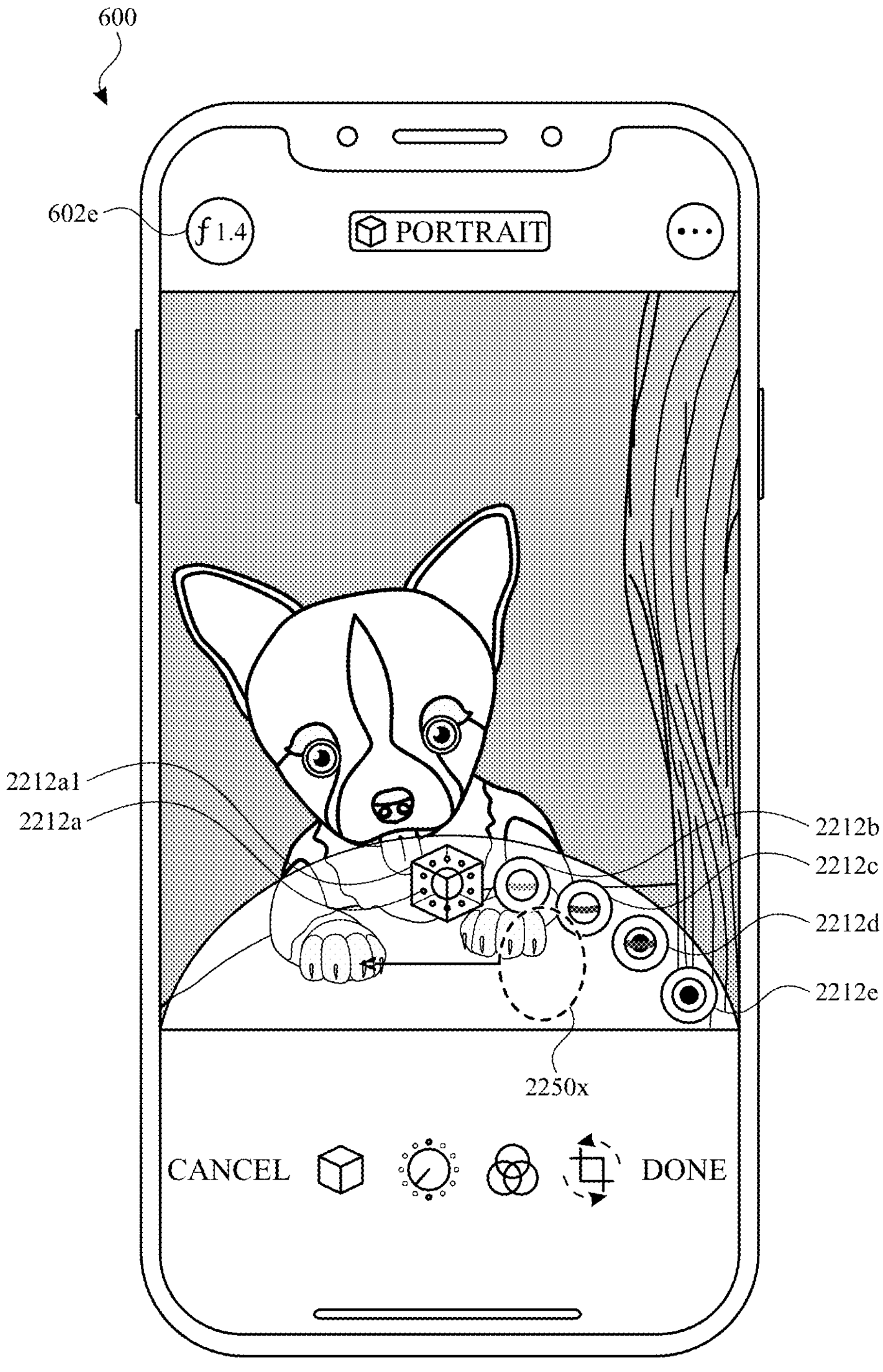

As illustrated in FIG. 22X, device 600 transitions the display of portrait media editing tool affordances 2212 from being displayed in a horizontal line to the display of portrait media editing tool affordances 2212 being displayed in an arch. Because natural light editing tool affordance **2212*a* is selected, natural light editing tool affordance 2212*a* is displayed at the top or top of the arch (e.g., middle of the media editing user interface) and portrait media editing tool affordances 2212*b*-2212*e* are displayed cascading down to the right of natural light editing tool affordance 2212*a*. At FIG. 22X, device 600 detects movement of gesture 2250*w*** without a break in contact (e.g., finger contact with the touch-sensitive display).

Figure 22Y:
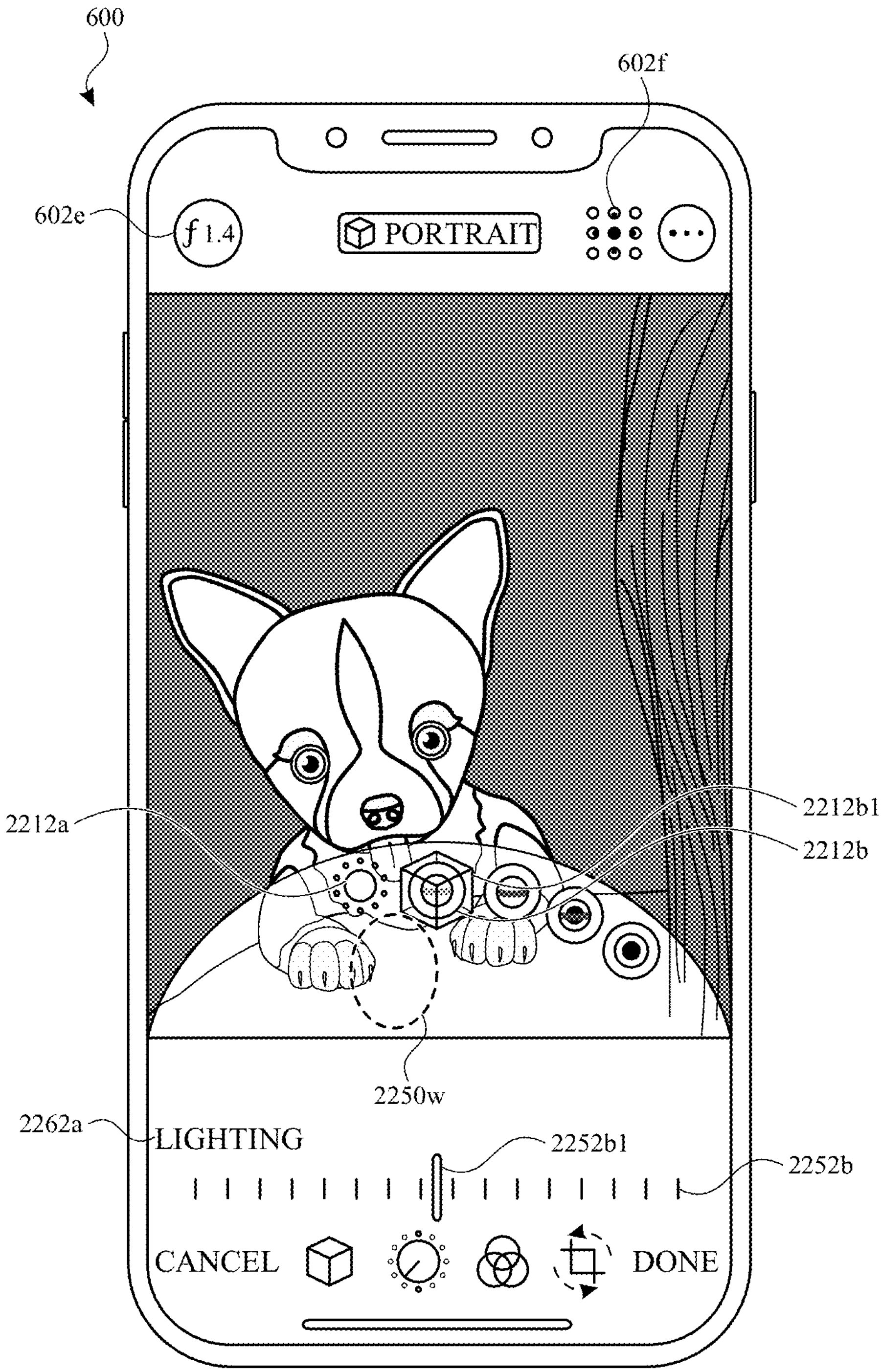

As illustrated in FIG. 22Y, in response to device 600 detecting movement of gesture **2250*w*, device 600 moves portrait media editing tool affordances 2212 one position to the left. After moving portrait media editing tool affordances 2212, studio lighting editing tool affordance 2212***b* is displayed at the top of the arch, natural light editing tool affordance 2212*a* is displayed to left of studio lighting editing tool affordance 2212*b*, and portrait media editing tool affordances 2212*c*-2212*e* are displayed cascading down to the right of studio lighting editing tool affordance 2212*b*. In contrast to visual characteristic editing tool affordances 2214 which were selected based on a tap gesture irrespective of whether a particular visual characteristic editing tool affordance was centered, portrait media editing tool affordances 2212 are selected once centered irrespective of whether device 600 detects a tap gesture at a location that corresponds to a particular media editing affordance. In some embodiments, a particular portrait media editing tool affordances is selected via a tap gesture, using similar techniques to selecting visual characteristic editing tool affordances 2214.

As illustrated in FIG. 22Y, device 600 displays lighting selection indicator 2212*b*1 on top of studio lighting editing tool affordance 2212*b*, which indicates that studio lighting editing tool affordance 2212*b* is selected. Concurrently, device 600 ceases to display lighting selection indicator 2212*a*1 on top of natural light editing tool affordance 2212*a*. Because studio lighting editing tool affordance 2212*b* is selected, device 600 displays adjustable studio lighting control 2252*b* with studio lighting control indication 2252*b*1. In contrast to when natural light editing tool affordance 2212*a* was selected in FIG. 22W, because studio lighting editing tool affordance 2212*b*, device 600 displays lighting status indicator 602*f* in indicator region 602. Lighting status indicator 602*f* includes an indication of the current value of lighting effect that is used/applied when capturing media. Lighting status indicator 602*f* operates in the following figures using similar techniques to those described above in relation to FIGS. 6R-6U. Lighting status indicator 602*f* is displayed with approximately half of the nine bulbs that make up lighting status indicator 602*f* as being filled-in (e.g., shown as black) and half of the nine bulbs as not being filled-in (e.g., shown as white). Showing half of the nine bulbs that filled-in corresponds to the position of studio lighting control indication 2252*b*1 being displayed at a position equal to roughly a 50% studio lighting value. In control region 606, device 600 also displays that lighting indicator 2262*a*, which indicates that studio lighting editing tool affordance 2212*b* is displayed. When lighting indicator 2262*a* is displayed, device 600 is configured to adjust representation 2230*e* based on a lighting value (e.g., studio lighting value) when receiving a gesture directed to adjusting an adjustable lighting control.

Figure 22Z:
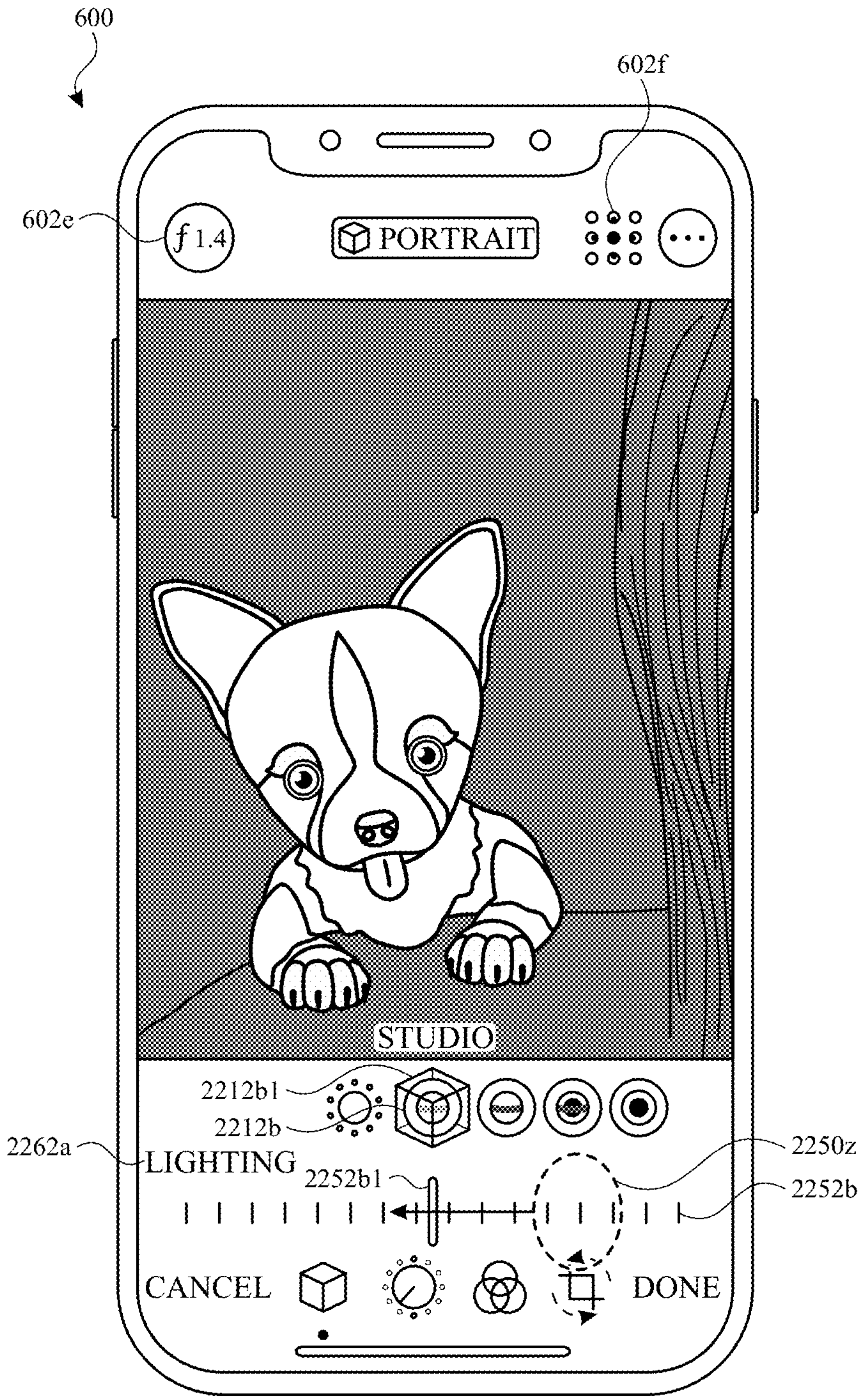
Figure 22A:
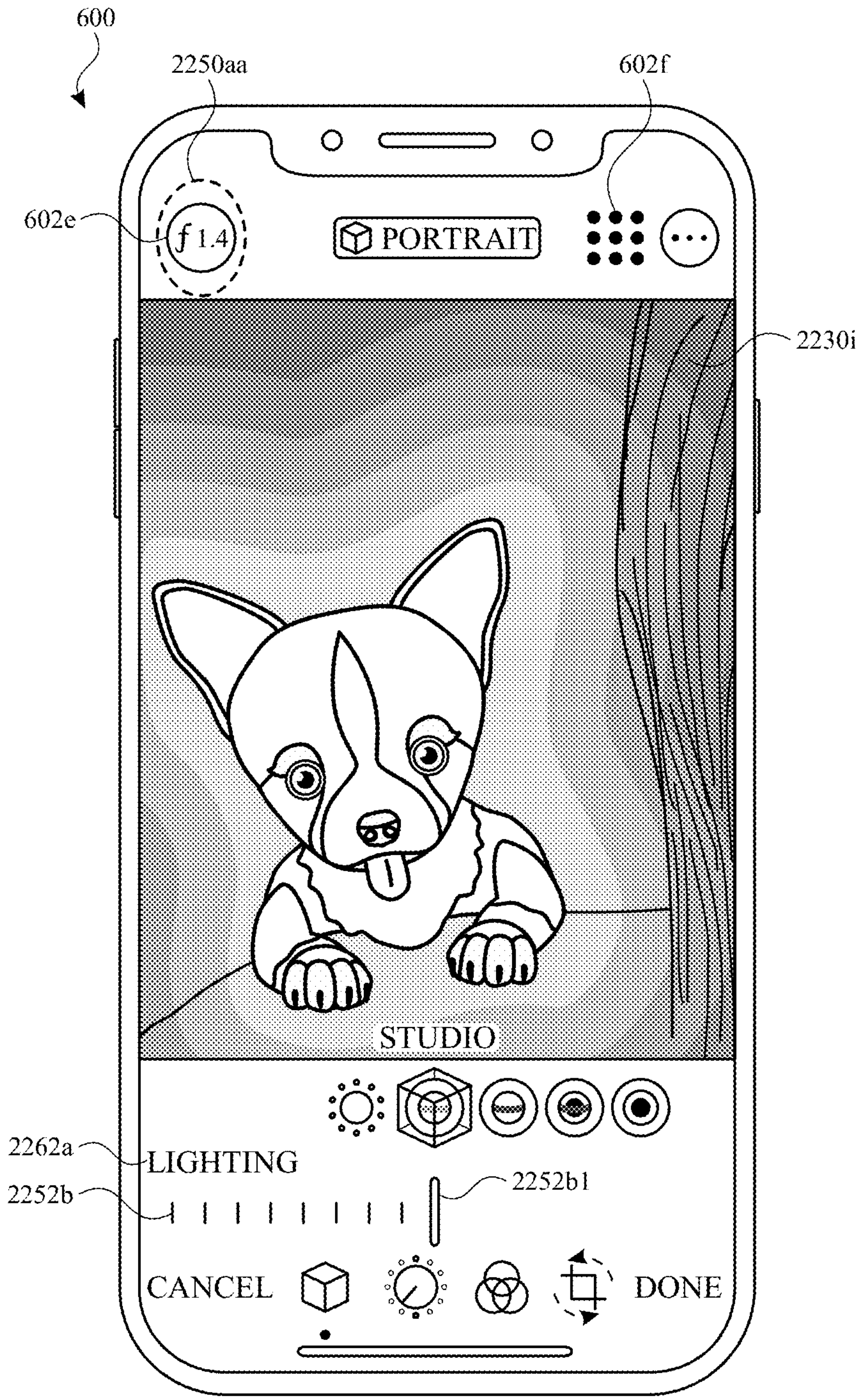
Figure 22A:
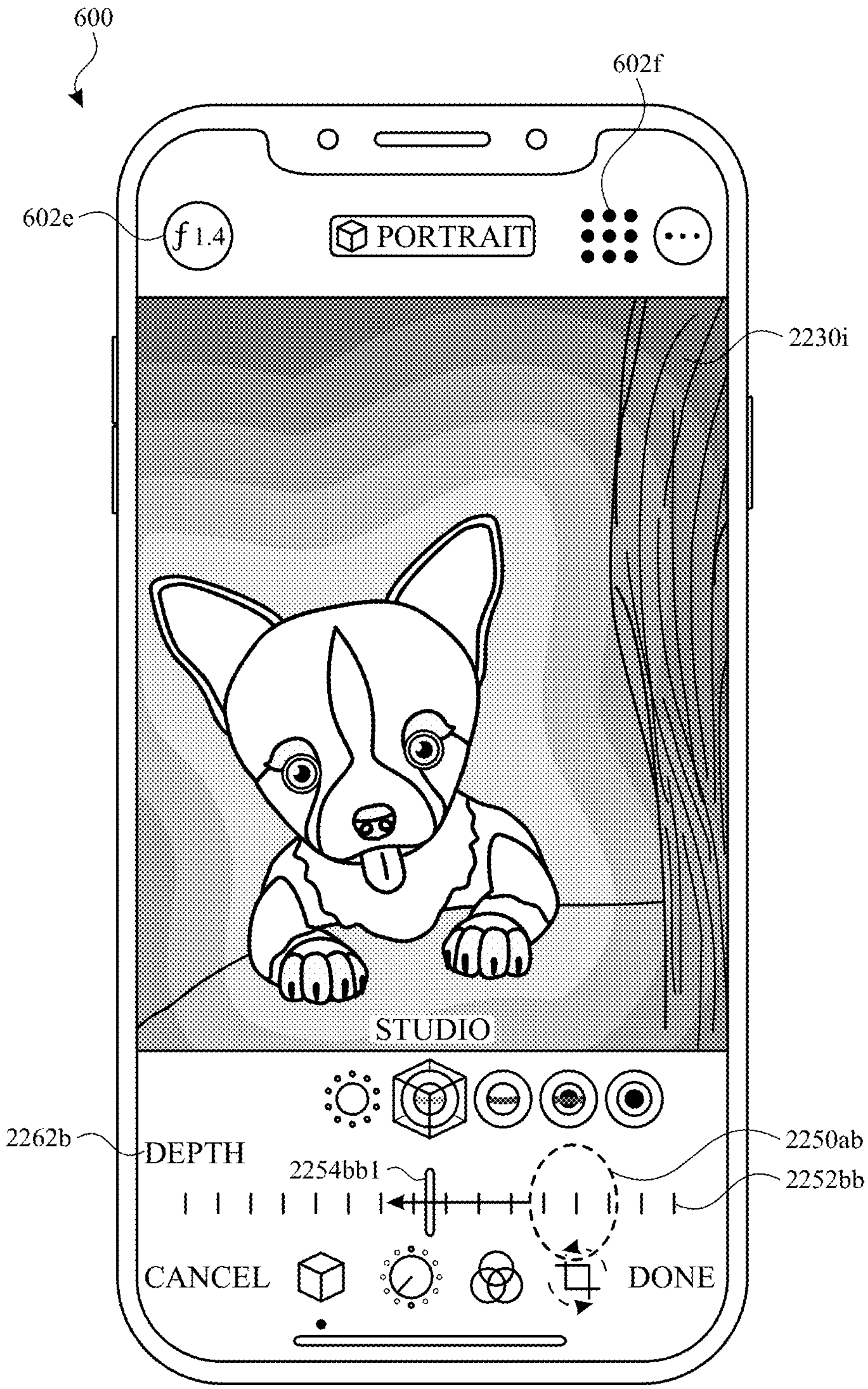
Figure 22A:
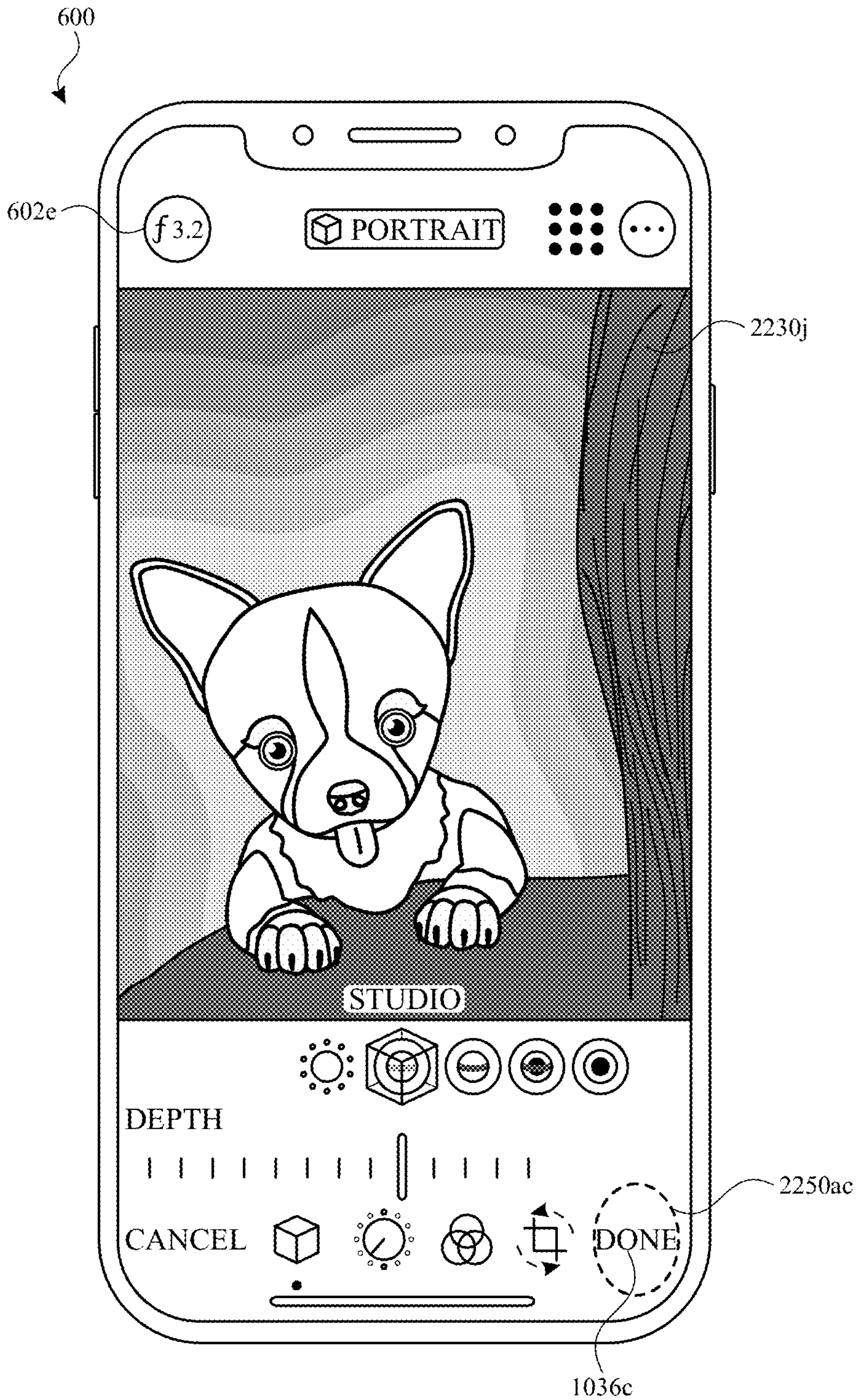
Figure 22A:
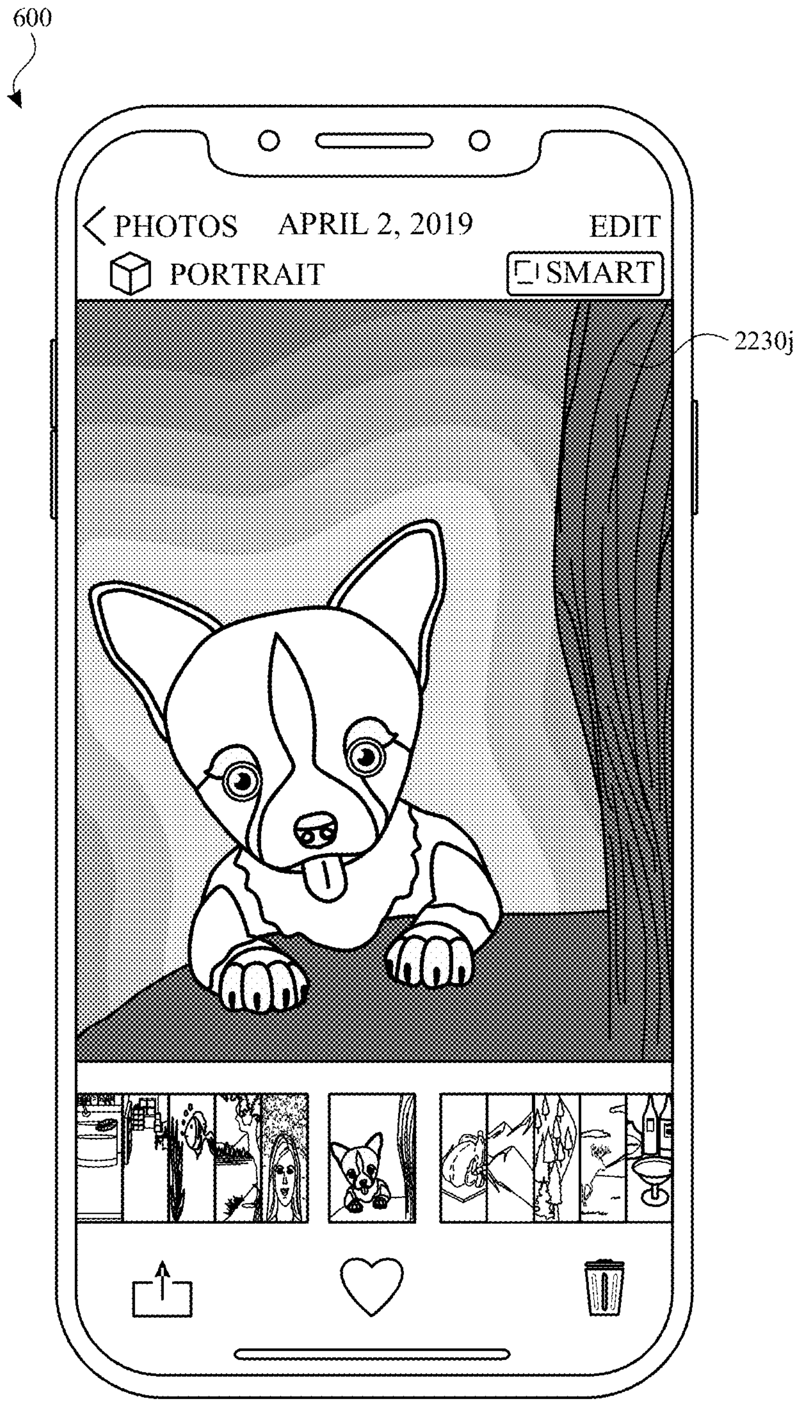
Figure 22A:
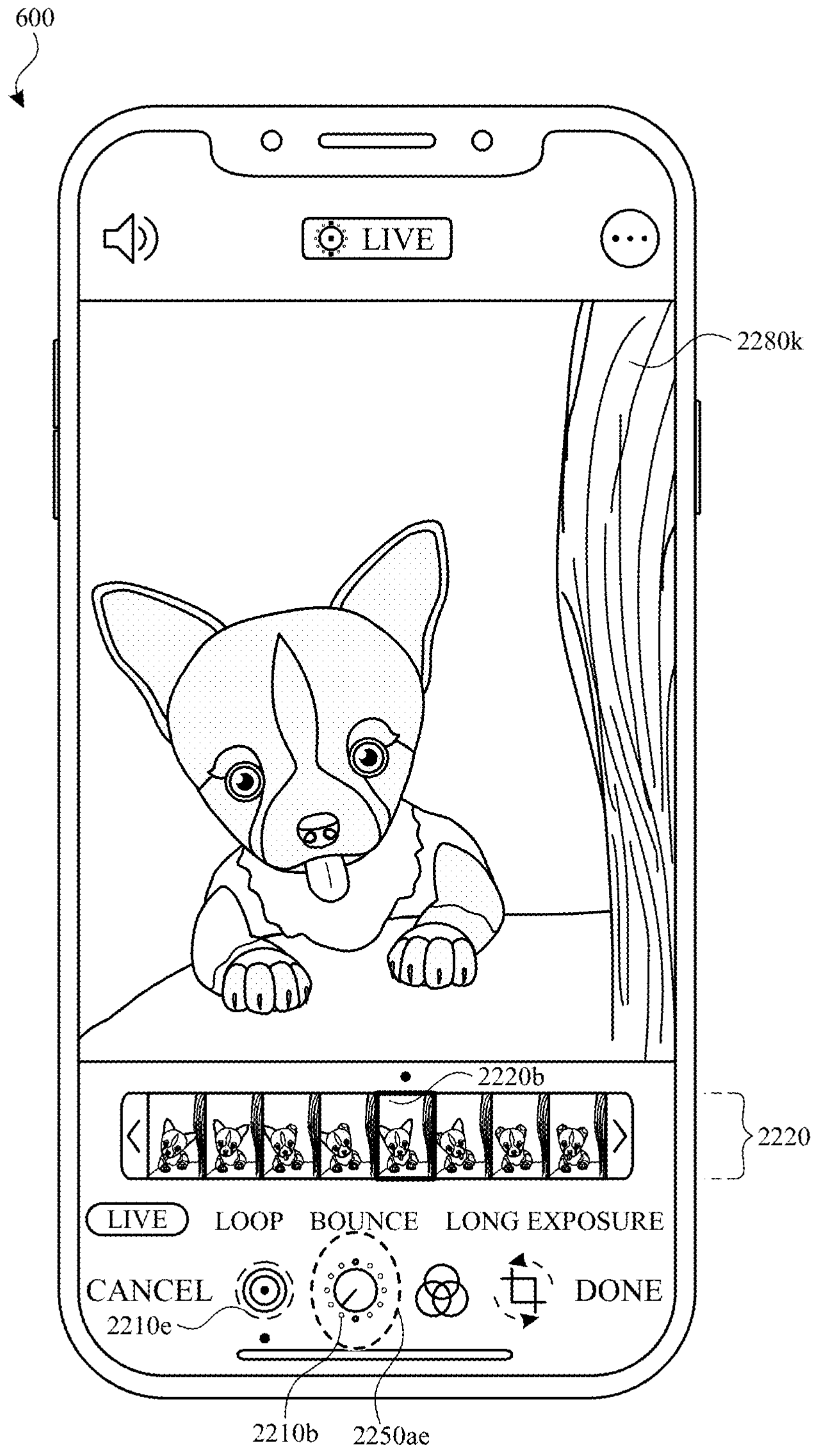
Figure 22A:
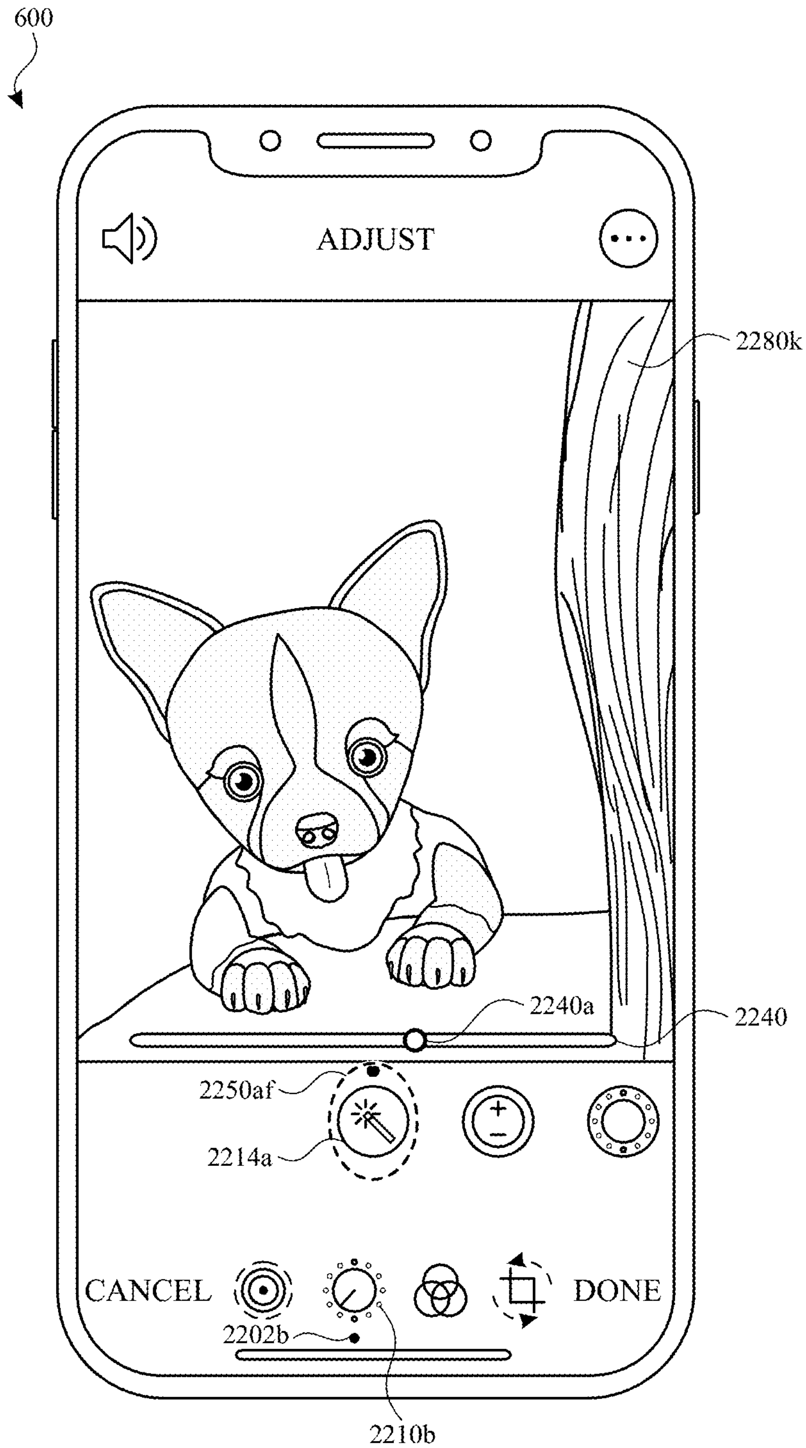
Figure 22A:
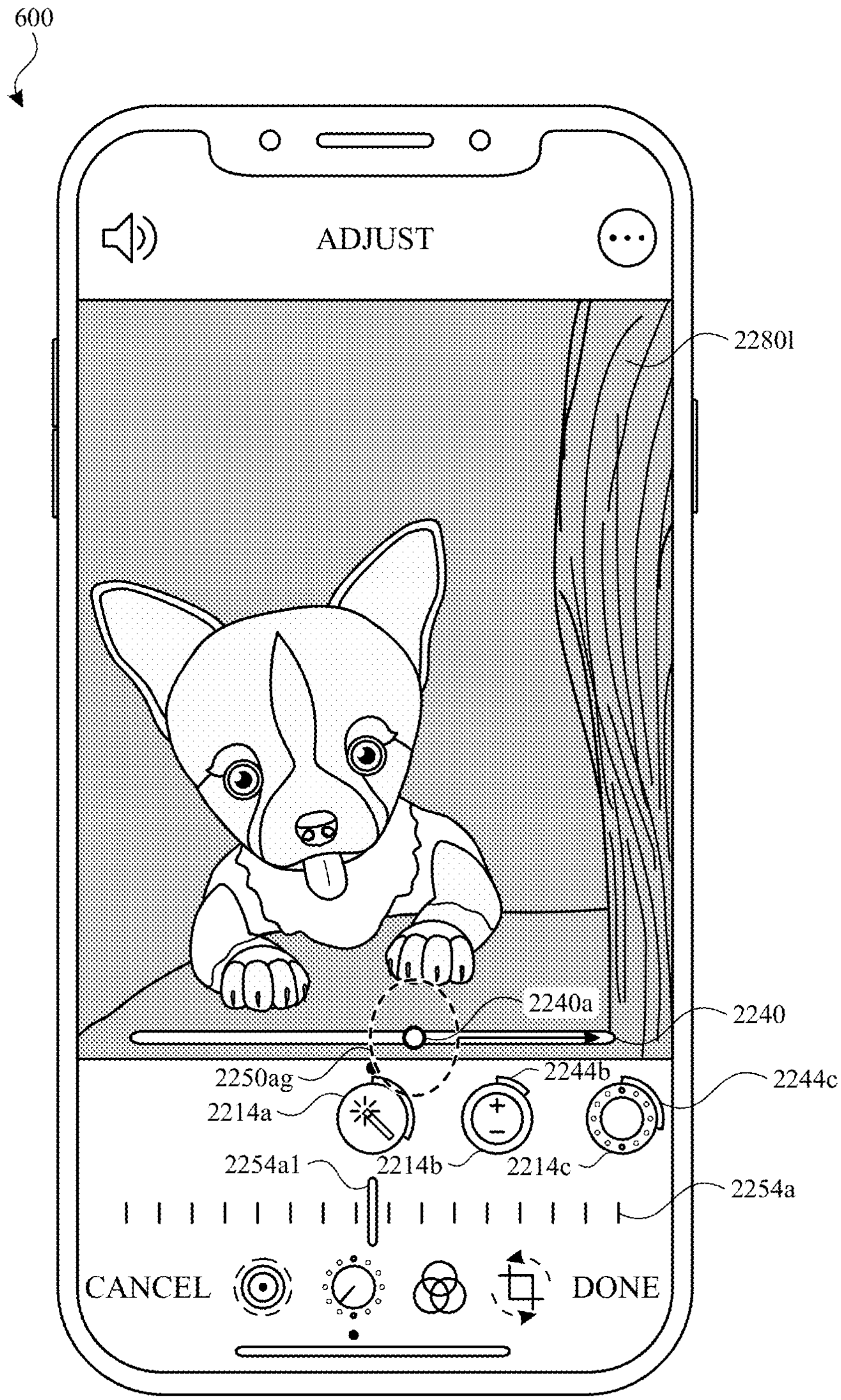
Figure 22A:
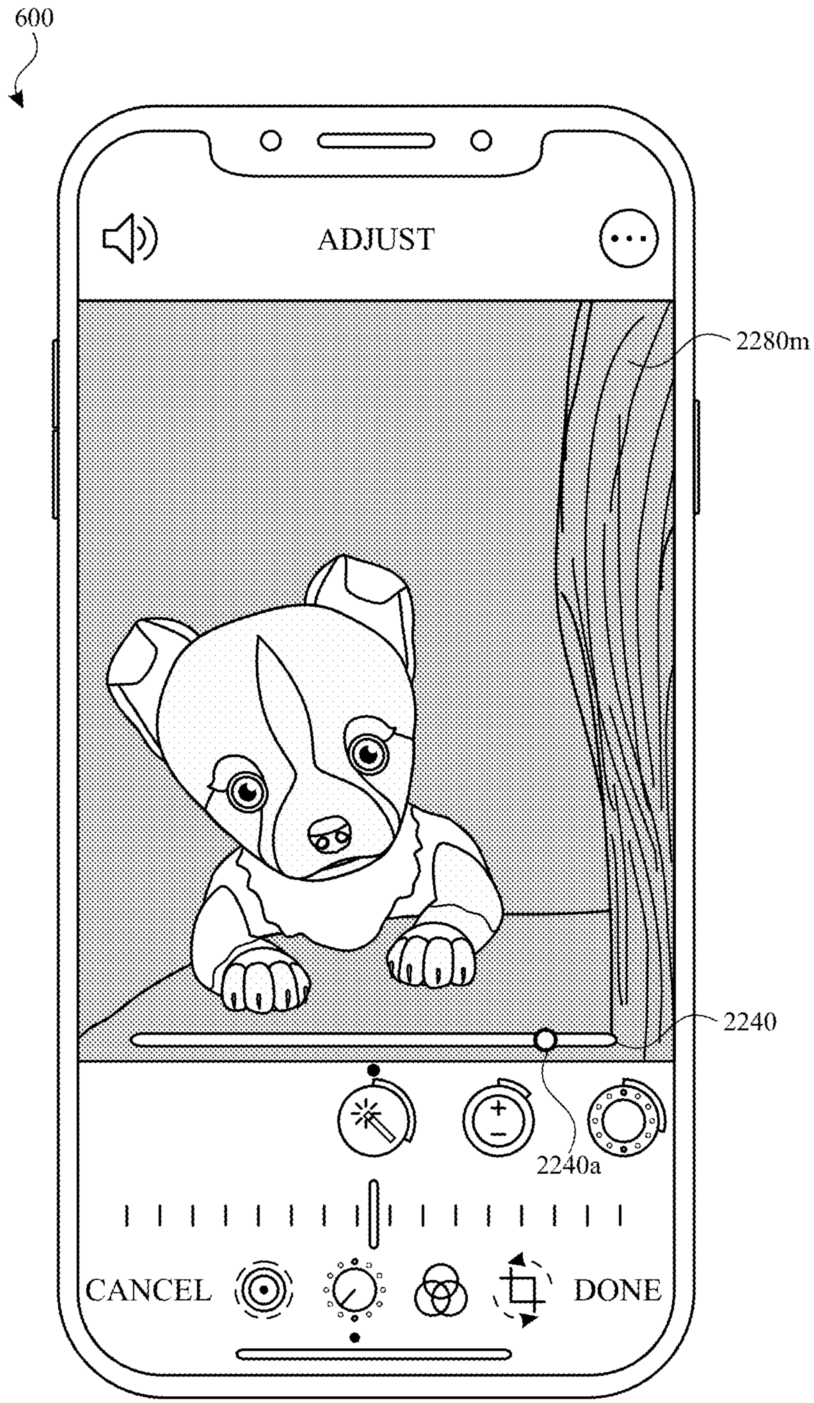
Figure 22A:
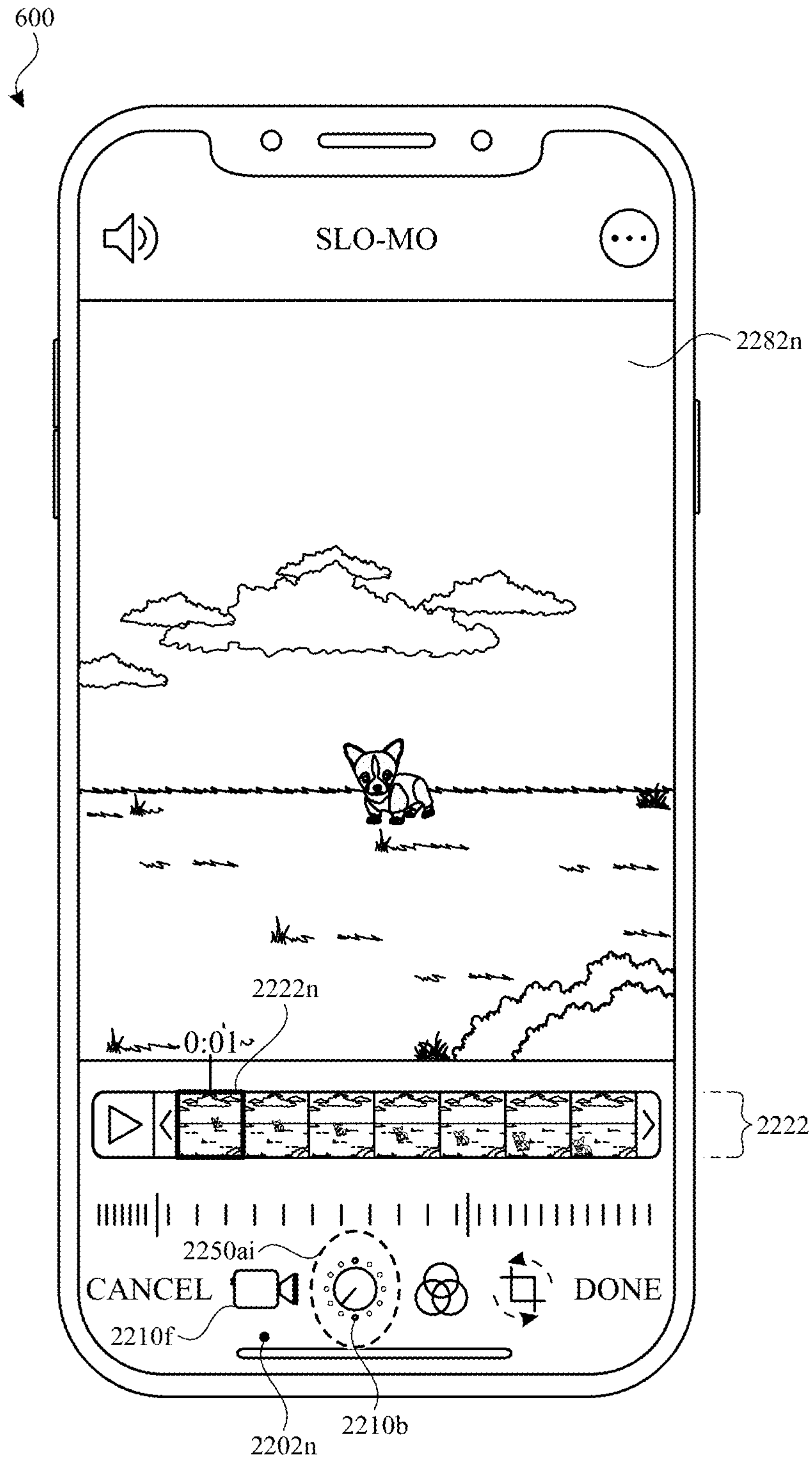
Figure 22A:
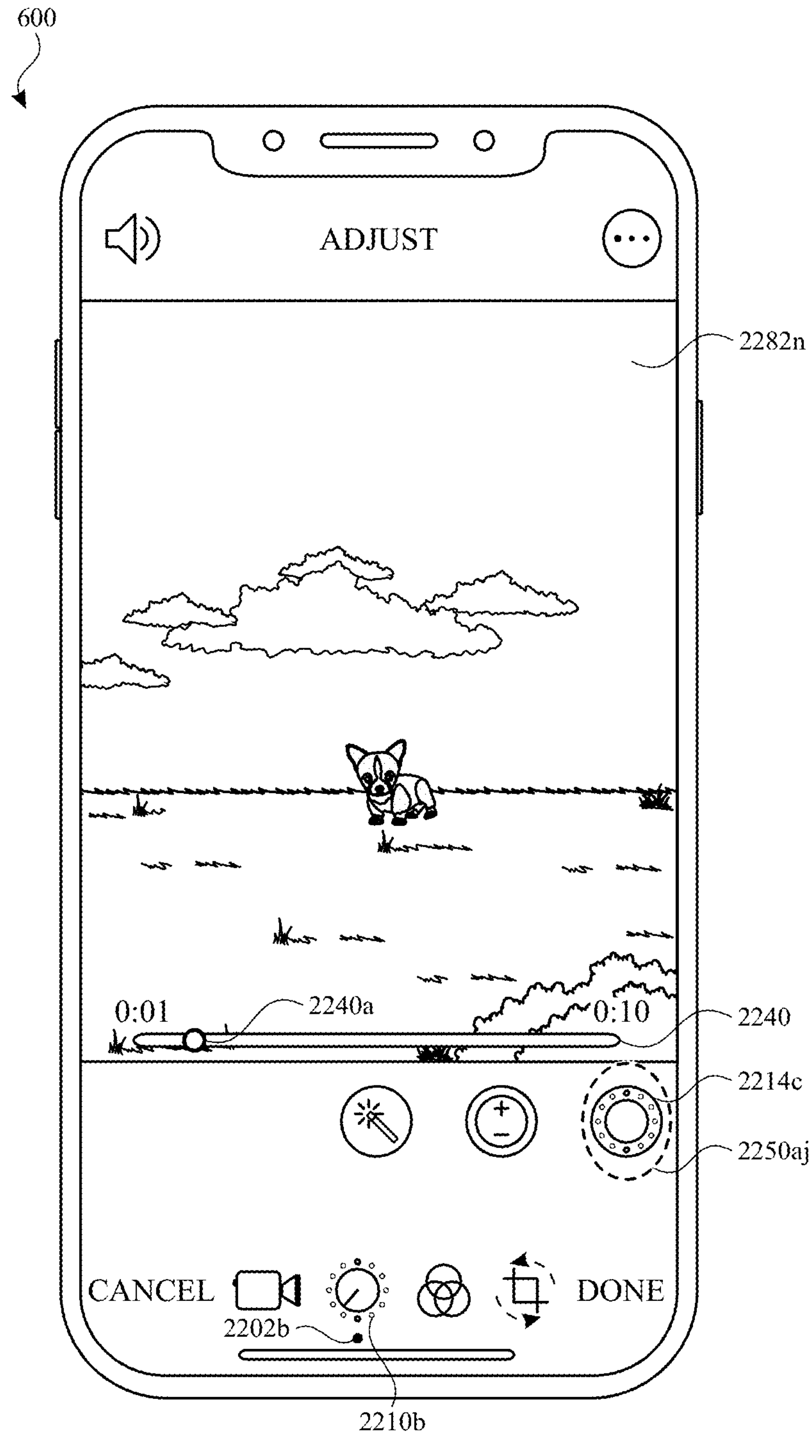
Figure 22A:
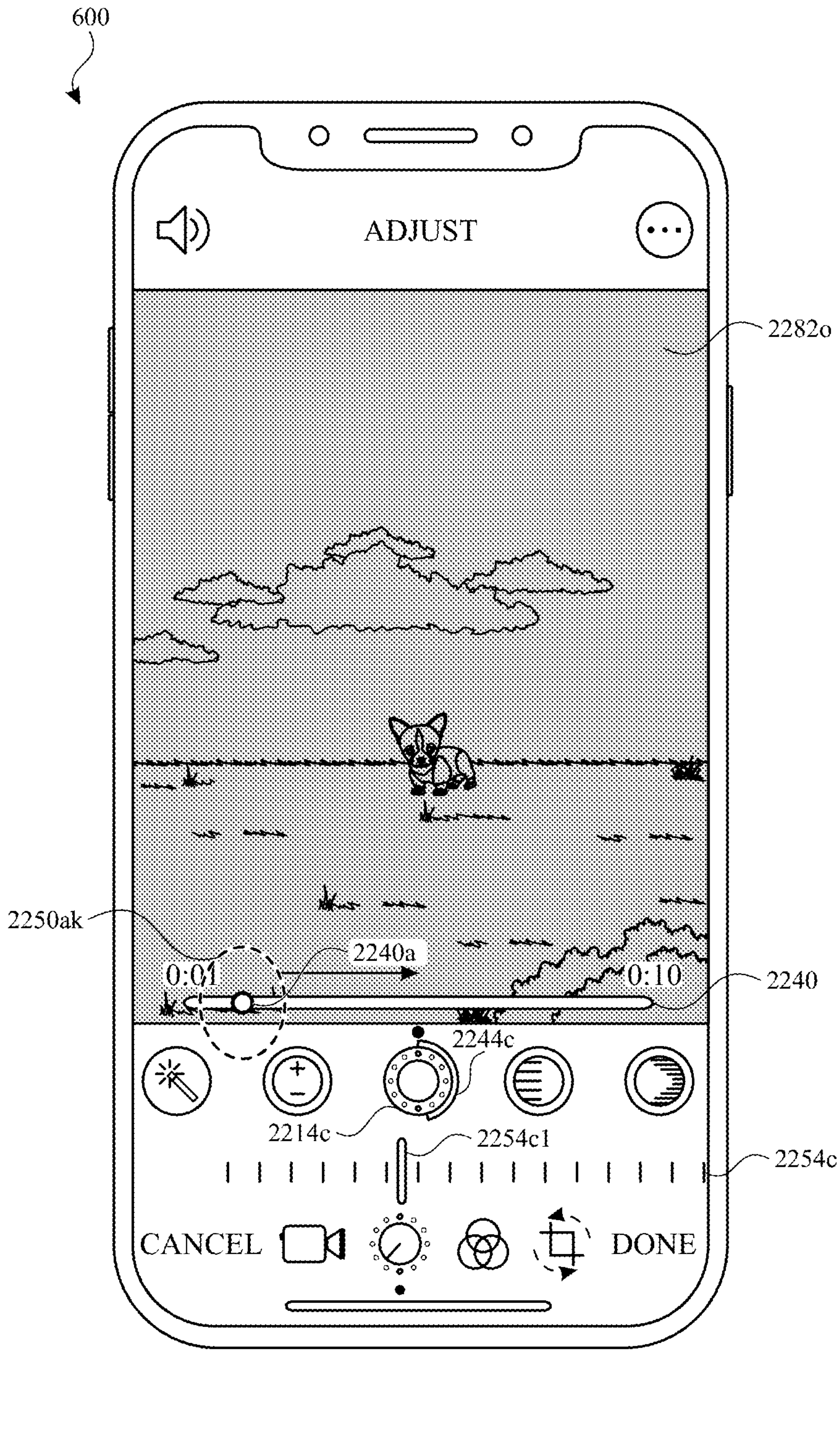
Figure 22A:
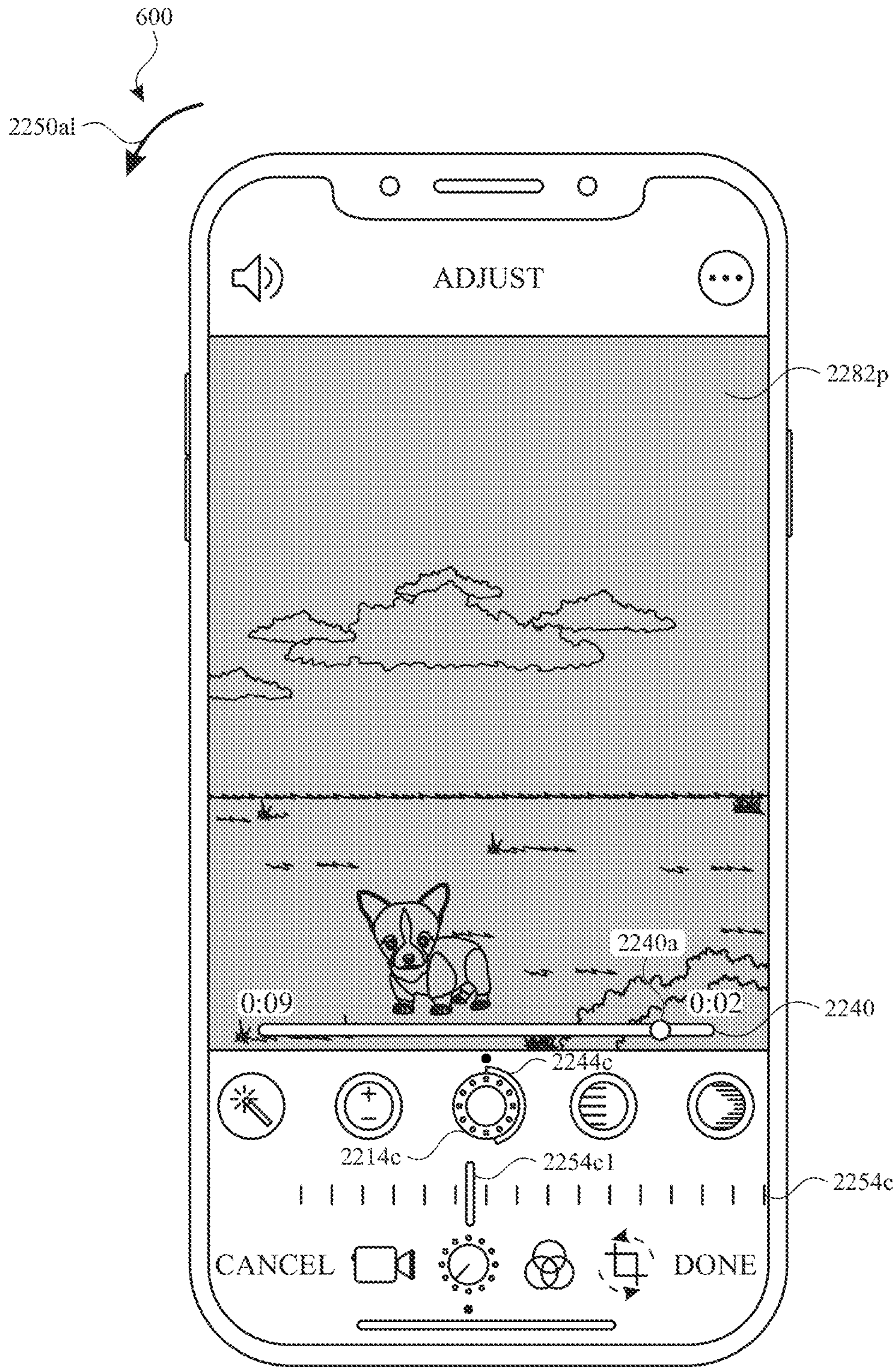
Figure 22A:
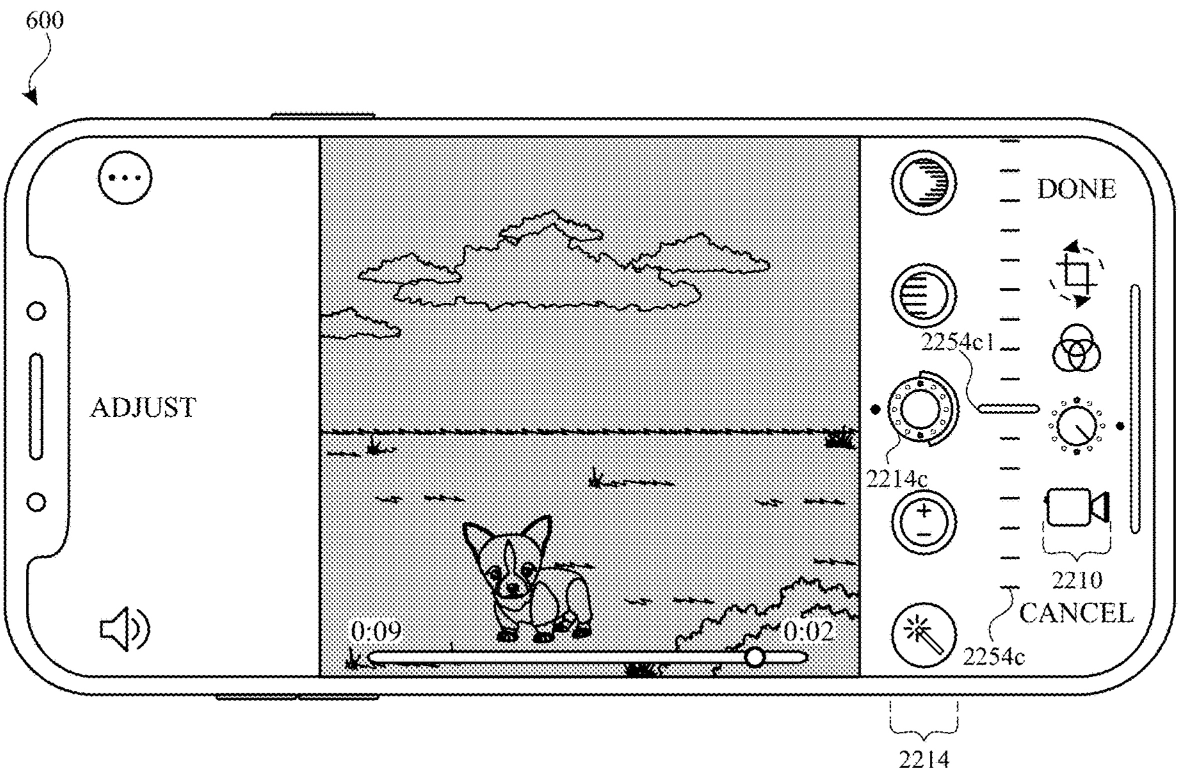

At FIG. 22Y, device 600 detects liftoff of gesture 2250*w*. As illustrated in FIG. 22Z, in response to detecting liftoff of gesture 2250*w*, device 600 re-displays the display of portrait media editing tool affordances 2212 in a horizontal line to the display of portrait media editing tool affordances 2212. At FIG. 22Y, because studio lighting editing tool affordance 2212*b* is selected, studio lighting editing tool affordance 2212*b* is displayed in the center of the media edit user interface. Moreover, “STUDIO” is displayed to indicate that studio lighting editing tool affordance 2212*b* is selected. In some embodiments, studio lighting editing tool affordance 2212*b* is the same adjustable control as adjustable lighting effect control 666 and device 600 uses similar techniques to perform functions via studio lighting editing tool affordance 2212*b* that device 600 uses to perform function via adjustable lighting effect control 666, as discussed in FIGS. 6S-6U above.

At FIG. 22Z, device 600 detects gesture 2250*z* (e.g., a leftward dragging or flicking gesture) directed to adjustable studio lighting control 2252*b*. As illustrated in FIG. 22AA, in response to detecting gesture 2250*z*, device 600 performs similar techniques as those described above in response to device 600 detecting gesture 2250*d*, 2250*i*, and/or 2250*o*. As shown in FIG. 22AA, device 600 moves studio lighting control indication 2252*b*1 to a new position (e.g., rightmost tick mark) on adjustable studio lighting control 2252*b*. The new position (e.g., rightmost tick mark) corresponds to the maximum value of studio lighting adjustment value. As a result, device 600 displays representation 2230*i*, where representation 2230*e* has been adjusted based on the new value (e.g., maximum studio lighting adjustment) that corresponds to the position of studio lighting control indication 2252*b*1 on adjustable studio lighting control 2252*b*. For example, representation 2230*i* has more light surrounding the dog than representation 2230*e*. In addition, device 600 also updates lighting status indicator 602*f* to show all nine bulbs being filled-in, which corresponds to adjustable studio lighting control 2252*b* being set to its maximum value. Notably, device 600 continues to display f-stop indicator 602*e* with a value of 1.4. At FIG. 2AA, device 600 detects tap gesture 2250*aa* at a location that corresponds to f-stop indicator 602*e*. As illustrated in FIG. 22AB, in response to detecting tap gesture 2250*aa*, device 600 replaces display of adjustable studio lighting control 2252*b* and studio lighting control indication 2252*b*1 with display of adjustable studio lighting depth control 2252*bb* and studio lighting depth control indication 2252*bb*1. At FIG. 22AB, studio lighting depth control indication 2252*bb*1 is displayed on adjustable studio lighting depth control 2252*bb* at a position that corresponds to the depth value displayed as f-stop indicator 602*e* (e.g., 1.4). In addition, device 600 also replaces the display of lighting indicator 2262*a* with a display of depth indicator 2262*b*. When lighting indicator 2262*a* is displayed, device 600 is configured to adjust representation 2230*i* based on a depth value (e.g., studio lighting depth value) when receiving gestures directed to an adjustable depth control.

At FIG. 22AB, device 600 detects gesture 2250*ab* (e.g., a leftward dragging or flicking gesture) directed to adjustable studio lighting depth control 2252*bb*. As illustrated in FIG. 22AC, in response to detecting gesture 2250*ab*, device 600 performs similar techniques as those described above in response to device 600 detecting gesture 2250*d*, 2250*i*, and/or 2250*o*. As shown in FIG. 22AC, device 600 moves studio lighting depth control indication 2252*bb*1 to a new position (e.g., towards rightmost tick mark) on adjustable studio lighting depth control 2252*bb*. As a result, device 600 displays representation 2230*j*, where representation 2230*i* in FIG. 22AB has been adjusted based on the new value that corresponds to the position of studio lighting depth control indication 2252*bb*1 on adjustable studio lighting depth control 2252*bb*. For example, representation 2230*j* visually has more depth (e.g., darkened tree and table) than representation 2230*i*. In addition, device 600 also updates f-stop indicator 602*e* to the new value (e.g., 3.4) that corresponds to the position of studio lighting depth control indication 2252*bb*1. Notably, device 600 continues to display lighting status indicator 602*f* as it was displayed in FIG. 22AB. At FIG. 22AC, device 600 detects tap gesture 2250*ac* at a location that corresponds to done affordance 1036*c*. As illustrated in FIG. 22AD, in response to detecting tap gesture 2250*ac*, device 600 displays the media viewer interface with representation 2230*j*. Device 600 preserves the modifications made to previously displayed representation 2230*a* by saving representation 2230*j*. FIGS. 22AE-22AL illustrate device 600 being configured to edit animated images media (e.g., FIGS. 22AE-22AH) and video media (e.g., FIGS. 22AI-22AL). In particular, FIGS. 22AE-22AL illustrate that the media editing user interface displays similar user interface elements when device 600 is configured to edit animated images media and video image media.

As illustrated in FIG. 22AE, device 600 displays representation 2230*k* of captured animated images media. Because representation 2280*k* is a representation of animated images media, device 600 displays animated images media editing mode affordance 2210*e*. Because animated images media editing mode affordance 2210*e* is selected, as shown by mode selection indicator 2202*a* under animated images media editing mode affordance 2210*e*, device 600 displays animated images media affordances 2220. Animated images media affordances 2220 includes thumbnail representations (e.g., thumbnail representation 2220*k*) of frames of content corresponding to different times in the animated images media. At FIG. 22AE, thumbnail representation 2220*k* is selected, so thumbnail representation 2220*k* corresponds to representation 2280*k*, where representation 2280*k* is an enlarged version of thumbnail representation 2220*k*. At FIG. 22AE, device 600 detects tap gesture 2250*ae* at a location that corresponds to visual characteristic editing mode affordance 2210*b*. As illustrated in FIG. 22AF, in response to detecting tap gesture 2250*ae*, device 600 displays scrubber 2240 with scrubber indication control 2240*a* at a position that corresponds to the location of representation 2280*k* (or thumbnail representation 2220*k*) in the animated images media. In addition, device 600 replaces animated images media affordances 2220 with visual characteristic editing tool affordances 2214 and displays mode selection indicator 2202*b* under visual characteristic editing mode affordance 2210*b*, using similar techniques to those discussed in relation to FIG. 22C. At FIG. 22AF, device 600 detects tap gesture 2250*af* at a location that corresponds to auto visual characteristic editing tool affordance 2214*a*.

At FIG. 22AG, in response to detecting tap gesture 2250*af*, device 600 displays auto visual characteristic editing tool affordance 2214*a* in the center of the media editing user interface (as illustrated in FIG. 22I). Device 600 further displays adjustable auto visual characteristic control 2254*a* and auto visual characteristic control indication 2254*a*1. In addition, in response to detecting tap gesture 2250*af*, device 600 adjusts one or more current values of other visual characteristic editing tool affordances 2214 (e.g., as shown by exposure value indicator 2244*b* being displayed around the perimeter exposure editing tool affordance 2214*b*), using techniques similar to those described above in FIG. 22I. Further, in response to detecting tap gesture 2250*ag*, device 600 replaces representation 2280*k* with representation 22801. Device 600 displays representation 22801 based on the adjusted current values corresponding to visual characteristic editing tool affordances 2214. At FIG. 22AG, device 600 detects gesture 2250*ag* (e.g., a rightward dragging gesture) directed to scrubber 2240.

As illustrated in FIG. 22AH, in response to detecting gesture 2250*ag*, device 600 moves scrubber indication control 2240*a* to a new position on scrubber 2240. In particular, device 600 moves scrubber indication control 2240*a* to a new position that is to the right of the position of scrubber indication control 2240*a* in FIG. 22AG. Further, in response to detecting gesture 2250*ag*, device 600 replaces representation 22801 with representation 22801. Representation 22801 shows one of the animated images at a time that corresponds to the new position of scrubber indication control 2240*a* on scrubber 2240. Thus, representation 2280*m* corresponds to a different time in the animated images media from the time in the animated images media that representation 22801 corresponded to in FIG. 22AG. As illustrated in FIG. 22AF, although device 600 adjusted one or more current values of visual characteristic editing tool affordances 2214 while displaying representation 2280*k* to display representation 22801, representation 2280*m* is also adjusted based on the adjusted one or more current values of visual characteristic editing tool affordances 2214. Thus, adjusting one of the representations at a particular time in the animated images media also adjusts other representations at a different time in animated images media. So, even if a representation of the animated images media is not displayed while device 600 adjusts one or more current values associated with one or more visual characteristics, scrubber 2240 can be used by a user to view the changes to the representations after adjusting the one or more current values.

As described above, FIGS. 22AI-22AL illustrated device 600 configured to edit video media. As illustrated in FIG. 22AI, device 600 displays representation 2282*n* of captured video media. Because representation 2282*n* is a representation of video media, device 600 displays video media editing mode affordance 2210*f* Because animated images media editing mode affordance 2210*e* is selected, as shown by mode selection indicator 2202*a* under video media editing mode affordance 2210*f*, device 600 displays video media affordances 2222. Video media affordances 2222 includes thumbnail representations (e.g., representation 2222*n*) of frames of content corresponding to different times in the video media. Thus, video media affordances 2222 is similar to animated images media affordances 2220. Because thumbnail representation 2220*n* is selected, thumbnail representation 2220*n* corresponds to representation 2282*n*, an enlarged version of thumbnail representation 2220*n*. At FIG. 22AI, device 600 detects tap gesture 2250*ai* at a location that corresponds to visual characteristic editing mode affordance 2210*b*.

As illustrated in FIG. 22AJ, in response to detecting tap gesture 2250*ai*, device 600 displays scrubber 2240 with scrubber indication control 2240*a* at a position that corresponds to the location of representation 2282*n* (or thumbnail representation 2220*n*) in the video media. Notably, device 600 displays scrubber 2240 when the device configured to operate in a video editing mode and when the device is configured to operate in an animated images media mode (e.g., in FIG. 22AF). At FIG. 22AJ, device 600 detects tap gesture 2250*aj* at a location that corresponds to brightness editing tool affordance 2214*c*. At FIG. 22AK, in response to detecting tap gesture 2250*aj*, device 600 moves automatically, without additional user input, slides visual characteristic editing tool affordances 2214*a*-2214*c* to the left to display brightness editing tool affordance 2214*c* in the horizontal center of the media editing user interface, using similar techniques as discussed above in FIG. 22C. Device 600 also automatically, without additional user input (e.g., without a gesture directed to adjustable brightness control 2254*c*), displays brightness control indication 2254*c*1 at a position on adjustable brightness control 2254*c*. Further, in response to detecting tap gesture 2250*aj*, device 600 replaces representation 2282*n* with representation 2282*o*. Device 600 displays representation 2282*o* based on the current value of adjustable brightness control 2254*c* (e.g., corresponding to the position of brightness control indication 2254*c*1). At FIG. 22AK, device 600 detects gesture 2250*ak* (e.g., a rightward dragging gesture) directed to scrubber 2240.

As illustrated in FIG. 22AL, in response to detecting gesture 2250*ak*, device 600 moves scrubber indication control 2240*a* to a new position on scrubber 2240. In particular, device 600 moves scrubber indication control 2240*a* to a new position that is to the right of the position of scrubber indication control 2240*a* in FIG. 22AK. Further, in response to detecting gesture 2250*ak*, device 600 replaces representation 2282*o* with representation 2282*p*. Representation 2282*p* shows one of the frames of the video media at a time that corresponds to the new position of scrubber indication control 2240*a* on scrubber 2240. Thus, representation 2282*p* corresponds to a different time in the video media from the time in the video media that representation 2282*o* corresponded to in FIG. 22AK. As illustrated in FIG. 22AL, although device 600 adjusted the current brightness value while displaying representation 2282*n* to display representation 2282*o*, representation 2282*p* is also adjusted based on the adjusted brightness value. Thus, adjusting one of the representation at a particular time in the video media (as if the animated images media) also adjusts other representations that correspond to a different time in video media. Notably, in FIG. 22AK, device 600 displays editing mode affordances 2210, adjustable brightness control 2254*c*, and visual characteristic editing tool affordances 2214 near the bottom edge of device 600. In some embodiments, displaying these user interface elements near the bottom edge of device 600 allows these user interface elements to be in thumb reach (e.g., the reach of thumb on a hand that is holding a device when the device is being held only with that hand) for some users of device 600.

At FIG. 22AL, device 600 detects clockwise rotation of device 600. As illustrated in FIG. 22AM, in response to detecting clockwise rotation 2250*a*1, device 600 transition the display of the media editing user interface in a portrait orientation to a display of the media editing user interface in a landscape orientation. As illustrated in FIG. 22AM, when displaying the media editing user interface in the landscape orientation, device 600 displays editing mode affordances 2210, adjustable brightness control 2254*c*, and visual characteristic editing tool affordances 2214 near the right edge of device 600. In some embodiments, displaying these user interface elements near the right edge of device 600 while the media user interface is in landscape orientation keeps the user elements within thumb reach for some users of device 600 when rotating the media editing user interface.

FIGS. 23A-23B are a flow diagram illustrating a method for editing captured media using an electronic device in accordance with some embodiments. Method 2300 is performed at a device (e.g., 100, 300, 500, 600) with a display device (e.g., a touch-sensitive display; 112). Some operations in method 2300 are, optionally, combined, the orders of some operations are, optionally, changed, and some operations are, optionally, omitted.

As described below, method 2300 provides an intuitive way for editing captured media. The method reduces the cognitive burden on a user for editing media, thereby creating a more efficient human-machine interface. For battery-operated computing devices, enabling a user to edit media faster and more efficiently conserves power and increases the time between battery charges.

The electronic device (e.g., 600) displays (2302), via the display device, a media (e.g., image, video) editing user interface including a representation (e.g., 2230*a*-2230*p*) of a visual media (e.g., an image, a frame of a video), a first affordance (e.g., 2210-2216; 2252-2256) corresponding (e.g., representing, illustrating, controlling) to a first editable parameter to edit the representation of the visual media (e.g., 2230*a-p*) (e.g., media editing parameters (e.g., 2214) (e.g., auto (e.g., 2214*a*), exposure (e.g., 2214*b*), brilliance, highlights, shadows, contrast, brightness (e.g., 2214*c*), blackpoint, saturation, vibrance, temperature, tint, sharpness, definition, noise reduction, vignette, color, black and white, lighting parameters (e.g., 2212) (e.g., natural light, studio light, contour light, stage light, stage light mono), filtering (e.g., 2216) parameters (e.g., original (e.g., 2216*a*), vivid, vivid warm, vivid cool, dramatic (e.g., 2216*c*), dramatic warm, dramatic cool, mono, silvertone, noir), cropping parameters (e.g., 2218), correction parameters (e.g., horizontal perspective correction, vertical perspective correction, horizon correction))), and a second affordance (e.g., 2210-2216) corresponding (e.g., representing, illustrating, controlling, a part of) to a second editable parameter to edit the representation (e.g., 2230*a*-2230*p*) of the visual media (e.g., media editing parameters (e.g., 2214) (e.g., auto (e.g., 2214*a*), exposure (e.g., 2214*b*), brilliance, highlights, shadows, contrast, brightness (e.g., 2214*c*), blackpoint, saturation, vibrance, temperature, tint, sharpness, definition, noise reduction, vignette, color, black and white, lighting parameters (e.g., 2212) (e.g., natural light, studio light, contour light, stage light, stage light mono), filtering (e.g., 2216) parameters (e.g., original (e.g., 2216*a*), vivid, vivid warm, vivid cool, dramatic (e.g., 2216*c*), dramatic warm, dramatic cool, mono, silvertone, noir), cropping parameters (e.g., 2218), correction parameters (e.g., horizontal perspective correction, vertical perspective correction, horizon correction))).

While displaying the media editing user interface, the electronic device detects (2304) a first user input (e.g., tap input on the affordance) corresponding to selection of the first affordance (e.g., 2250*c*, 2250*h*).

In some embodiments, the first user input (e.g., 2250*c*, 2250*h*, 2250*n*) is a tap input on the first affordance (2214*a*, 2214*c*, 2214*n*).

In response to detecting the first user input corresponding to selection of the first affordance, the electronic device displays (2306), on the display device, at a respective location in the media editing user interface (e.g., a location adjacent to the first and second affordance (a location below the first and second affordances)), an adjustable control (e.g., 2252*b*, 2252*bb*, 2254*a*, 2254*c*, 2254*f*, 2256*c*) (e.g., a graphical control element (e.g., a slider)) for adjusting the first editable parameter. In some embodiments, the adjustable control slides into the respective location out of the first and second affordances or from the left/right sides of the display device (e.g., FIGS. 22C-22D).

While displaying the adjustable control for adjusting the first editable parameter and while the first editable parameter is selected (e.g., 2204) (e.g., FIGS. 22C-22D) (e.g., displayed as being pressed, centered in the middle of the media user interface, or displayed in a different color (e.g., not grayed-out)), the electronic device detects (2308) a first gesture (e.g., 2250*d*, 2250*i*, 2250*o*, 2250*t*, 2250*z*, 2250*ab*) (e.g., a dragging gesture (e.g., dragging an indication (e.g., slider bar) from one respective location (e.g., tick mark) on the adjustable control to another respectable location on the adjustable control)) directed to the adjustable control (e.g., 2252*b*, 2252*bb*, 2254*a*, 2254*c*, 2254*f*, 2256*c*) for adjusting the first editable parameter. In some embodiments, when multiple conditions are met, multiple affordances are displayed. Providing additional control options (e.g., slider) without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response to (2310) detecting the first gesture (e.g., 2250*d*, 2250*i*, 2250*o*, 2250*t*, 2250*z*, 2250*ab*) directed to the adjustable control (e.g., 2252*b*, 2252*bb*, 2254*a*, 2254*c*, 2254*f*, 2256*c*) for adjusting the first editable parameter while the first editable parameter is selected, the electronic device adjusts (2312) a current value of the first editable parameter in accordance with the first gesture (e.g., in accordance with a magnitude of the first gesture) (e.g., displaying a slider bar on the slider at a new position) (e.g., FIGS. 22E-22F).

In some embodiments, in response to (2310) detecting the first gesture (e.g., 2250*d*, 2250*i*, 2250*o*, 2250*t*, 2250*z*, 2250*ab*) directed to the adjustable control e.g., 2252*b*, 2252*bb*, 2254*a*, 2254*c*, 2254*f*, 2256*c*) for adjusting the first editable parameter while the first editable parameter is selected (2204*a*, 2204*c*, 2204*i*), the electronic device replaces (2314) display of the representation of the visual media with an adjusted representation (e.g., 2230*b*, 2230*e*) of the visual media that is adjusted based on the adjusted current value of the first editable parameter (e.g., when the editable parameter is contrast, the representation that is adjusted based on the current value of the first editable parameter (e.g., the current adjusted by the magnitude of the first gesture) has more or less contrast than the representation of the visual media that is initially displayed). Displaying an adjusted representation in response to changing the value of the adjustable control provides the user with feedback about the current effect of the parameter on the representation of the captured media and provides visual feedback to the user indicating that the operation associated with the adjustable control will be performed if the user decides to accept the adjustment. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first editable parameter is an auto adjustment editable parameter (e.g., when the electronic device detects selection of the auto adjustment affordance (e.g., first editable parameter affordance (e.g., 2214*a*)) or a change in value of the adjustable control (e.g., 2254*a*) for adjusting the auto adjustment editable parameter, the electronic device calculates values for other edible parameters (e.g., contrast, tint, saturation) and automatically updates the current values of the other editable parameters) (e.g., 22H-22K). In some embodiments, the electronic device adjusts the current value of the first editable parameter in accordance with the first gesture includes adjusting current values of a plurality of editable parameters that includes the second editable parameter (e.g., 2244*a*, 2244*b*, 2244*c* in FIGS. 22H-22K). Reducing the number of inputs needed to perform an operation (e.g., adjust multiple editable parameters of an images) enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the media editing user interface includes a plurality of editable-parameter-current-value indicators (e.g., 2244*a*-2244*i*) (e.g., graphical borders around the affordances corresponding to the editable parameters that are updated based on the values of the parameters) including: a value indicator corresponding to the second editable parameter of the representation of the visual media (e.g., the value indicator corresponding to the second editable parameter is displayed as part of or adjacent to an affordance that, when selected, displays a control for adjusting the second editable parameter); and a value indicator corresponding to a third editable parameter of the representation of the visual media (e.g., the value indicator corresponding to the third editable parameter is displayed as part of or adjacent to an affordance that, when selected, displays a control for adjusting the second editable parameter). In some embodiments, the electronic device adjusting current values of the plurality of editable parameters includes: the electronic device adjusting a current value of a third editable parameter; updating the value indicator corresponding to the second editable parameter (e.g., 2244*a*, 2244*b*, 2244*c* in FIGS. 22H-22K) based on the adjusted current value of the second editable parameter; and updating the value indicator corresponding to the third editable parameter (e.g., 2244*a*, 2244*b*, 2244*c* in FIGS. 22H-22K) based on the adjusted current value of the third editable parameter. In some embodiments, the current value indicators are around the affordances (e.g., the first progress indicator is around the first affordance; the second progress indicator is around the second affordance). In some embodiments, there is a value indicator corresponding to the first editable parameter that is updated based on the adjusted current value of the first editable parameter that is displayed as part of or adjacent to the affordance for the first editable parameter. (e.g., FIG. 22K). Providing value indicators when editable parameters are updated (or change) allows the user to determine the current value of the editable parameter that has changed to display the adjustable representation. In addition, automatically updating the value indicators based on a change in an auto adjustment algorithm allows a user to quickly determine how the auto adjustment algorithm has changed a particular value of a particular editable parameter. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while detecting the first gesture directed to the adjustable control for adjusting the first editable parameter, the electronic device visually emphasizes (e.g., displaying as not being grayed out, displaying parts of the user interface as being out of focus while the adjustable input control is displayed in focus, displaying as a different color or enlarging) the adjustable control for adjusting the first editable parameter (e.g., 2254*a*, 2254*c*, and 2254*i* in on of FIGS. 22E, 22J, 22P). In some embodiments, the electronic device visually emphasizes the adjustable control until detecting lift off of the first gesture (e.g., 2250*d*, 2250*i*, 2250*o*). Emphasizing the adjustable control while providing inputs to the adjustable control allows a user to determine that the current state of the operating is affecting the adjustable control and reduces mistakes by the user setting the adjustable control to a certain value by increasing the change that a user sets the value of the adjustable control with accuracy. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first editable parameter is a visual filter effect intensity (e.g., intensity of a filter effect (e.g., cool, vivid, dramatic)) (e.g., 2216*a*-2216*d* in FIGS. 22T-22V). In some embodiments, the electronic device adjusting the current value of the first editable parameter in accordance with the first gesture further includes the electronic device replacing display of the representation (e.g., 2230*g* and 2230*h*) of visual media with a representation of the visual media that has been adjusted based on the current value of the filter effect intensity (e.g., a filtered representation).

In some embodiments, an aspect ratio affordance (e.g., button at top) has a slider. In some embodiments, electronic device displays user interface elements (e.g., slider and options) differently on different devices to be in reach of thumbs. In some embodiments, the key frame for navigating between frames of visual media and animated images media are the same.

While displaying, on the display device, the adjustable control for adjusting the first editable parameter, the electronic device detects (2316) a second user input (e.g., tap input on the affordance) corresponding to selection of the second affordance (e.g., 2250*c*, 2250*h*) (e.g., FIG. 22N).

In some embodiments, the second user input is a tap input (e.g., 2250*c*, 2250*h*, 2250*n*) on the second affordance (2214*a*, 2214*c*, 2214*n*).

In response to detecting the second user input (e.g., tap) input (e.g., 2250*c*, 2250*h*, 2250*n*) corresponding to selection of the second affordance (2214*a*, 2214*c*, 2214*n*), the electronic device displays (2318) at the respective location in the media editing user interface (e.g., a location adjacent to the first and second affordance (a location below the first and second affordances)) an adjustable control (e.g., 2252*b*, 2252*bb*, 2254*a*, 2254*c*, 2254*f*, 2256*c*) for adjusting the second editable parameter (e.g., a graphical control element (e.g., a slider). In some embodiments, the adjustable control slides into the respective location out of the first and second affordances or from the left/right sides of the display device. In some embodiments, when multiple conditions are met, multiple affordances are displayed. Providing additional control options (e.g., slider) without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the adjustable control (e.g., 2252*b*, 2252*bb*, 2254*a*, 2254*c*, 2254*f*, 2256*c*) for adjusting the first editable parameter includes a first static portion (e.g., tick marks of slider (e.g., 2252*b*, 2252*bb*, 2254*a*, 2254*c*, 2254*f*, 2256*c*) (e.g., frame of slider (e.g., tick marks, range of slider, color)) and a first variable portion (e.g., indication of current value (e.g., slider bar)) (e.g., indications 2252*b*1, 2252*bb*1, 2254*a*1-*i*1, 2256*c*1). In some embodiments, the adjustable control (e.g., 2254) for adjusting the second editable parameter includes the first static portion (e.g., frame of slider (e.g., tick marks, range of slider, color)) and a second variable portion (e.g., indications 2252*b*1, 2252*bb*1, 2254*a*1-*i*1, 2256*c*1) (e.g., indication of current value (e.g., slider bar)). In some embodiments, the second variable portion is different from the first variable portion. In some embodiments, the electronic device displays at the respective location in the media editing user interface the adjustable control for adjusting the second editable parameter includes the electronic device maintaining, on the display device, display of the first static portion at the respective location in the media editing user interface (e.g., maintaining one or more portions of the adjustable control (e.g., displayed positions and frame (e.g., tick marks) of the slider continue to be displayed) while one or more other portions of the adjustable control are maintained and/or updated (e.g., a value indicator is updated to reflect a new value)) (e.g., the display of the slider is maintained between multiple editing operations) (e.g., indications 2252*b*1, 2252*bb*1, 2254*a*1-*i*1, 2256*c*1 in FIGS. 22H-22I; 22N-22O). In some embodiments, when the second variable portion is displayed, the first variable portion ceases to be displayed or display of the second indication replaces display of the first indication. In some embodiments, the first and second variable positions are at different positions on the slider. In some embodiments, the first and second variable portions are at the same position on the slider. In some embodiments, the first and second variable portion are displayed at the same position of the slider while the first and the second values (e.g., first type (e.g., tin) of value different from the second type (e.g., contrast) of value). In some embodiments, the first value and second values are different types of values. In some embodiments, the electronic device replaces the display of the first variable portion of the first value that corresponds to the first edit parameter to display a second variable portion of a second value that corresponds to the second editing parameter on the adjustable control. Maintaining static portions of the adjustable control when switching between two adjustable controls provides the user with more control of the device by allowing the user to set different editable parameters while simultaneously minimizing the change of elements that are displayed on the UI. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the adjustable control (e.g., 2252*b*, 2252*bb*, 2254*a*, 2254*c*, 2254*f*, 2256*c*) for adjusting the first editable parameter and the adjustable control for adjusting the second editable parameter (e.g., 2252*b*, 2252*bb*, 2254*a*, 2254*c*, 2254*f*, 2256*c*) share one or more visual features (e.g., tick marks on a slider) when adjusted to the same relative position (e.g., the adjustable control for adjusting the first editable parameter and the adjustable control for adjusting the second editable parameter have the same appearance when adjusted to a central value, a maximum value and/or a minimum value) (e.g., FIGS. 22H-22I; 22N-22O). Providing adjustable controls that share visual features in the same relative position provides the user with more control of the device by allowing the user to set different editable parameters while simultaneously minimizing the change of elements (e.g., change of position of elements and/or the representation of the element) that are displayed on the UI. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the adjustable control for adjusting the second editable parameter and while the second editable parameter is selected (e.g., displayed as being pressed, centered in the middle of the media user interface, or displayed in a different color (e.g., not grayed-out)), the electronic device detects (2320) a second gesture (e.g., 2250*d*, 2250*i*, 2250*o*) (e.g., a dragging gesture (e.g., dragging an indication (e.g., slider bar) from one respective location (e.g., tick mark) on the adjustable control (e.g., 2252*b*, 2252*bb*, 2254*a*, 2254*c*, 2254*f*, 2256*c*) to another respectable location on the adjustable control)) directed to the adjustable control for adjusting the second editable parameter.

In response to (2322) detecting the second gesture (e.g., 2250*d*, 2250*i*, 2250*o*) directed to the adjustable control (e.g., 2252*b*, 2252*bb*, 2254*a*, 2254*c*, 2254*f*, 2256*c*) for adjusting the second editable parameter while the second editable parameter is selected, the electronic device adjusts (2324) a current value of the second editable parameter in accordance with the second gesture (e.g., in accordance with a magnitude of the second gesture) (e.g., displaying a slider bar on the slider at a new position) (e.g., FIGS. 22J-22K). Providing different adjustable controls for adjusting different editable parameters provides the user with more control of the device by helping the user avoid unintentionally changing a representation in a way that is not desired and simultaneously allowing the user to recognize that an input into the adjustable control will change a representation based on the input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to (2322) detecting the second gesture (e.g., 2252*b*, 2252*bb*, 2254*a*, 2254*c*, 2254*f*, 2256*c*) directed to the adjustable control for adjusting the second editable parameter while the second editable parameter is selected, the electronic device replaces (2326) display of the representation (2230*a*-2230*p*) of the visual media with an adjusted representation (2230*a*-2230*p*) of the visual media that is adjusted based on the adjusted current value of the second editable parameter (e.g., when the editable parameter is tint, the representation that is adjusted based on the current value of the second editable parameter (e.g., the current adjusted by the magnitude of the second gesture) has more or less tint than the representation of the visual media that is initially displayed) (e.g., FIGS. 22J-22K). Displaying an adjusted representation in response to changing the value of the adjustable control provides the user with feedback about the current effect of the parameter on the representation of the captured media and provides visual feedback to the user indicating that the operation associated with the adjustable control will be performed if the user decides to accept the adjustment. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the media editing user interface does not include a third affordance (e.g., 2214*f-i*) corresponding to a fourth editable parameter to edit the representation of the visual media, the electronic device detects a third user input (e.g., 22501) (e.g., a swipe gesture (e.g., at a location corresponding to a control region of the media editing user interface, a tap on affordance (e.g., an affordance towards the edge of the display that will center)). In some embodiments, in response to detecting the third user input (e.g., 22501), the electronic device displays the third affordance (e.g., 2214*f-i*) (e.g., displaying an animation of the third affordance sliding on to the display). In some embodiments, the electronic device also ceases to display the first affordance (2214*a*) and/or the second affordance (2214*c*) when displaying the third affordance (e.g., 2214*f-i*). In some embodiments, a plurality of affordances for corresponding parameters were not displayed prior to detecting the third user input, and a number of affordances that are displayed in response to detecting the third user input is selected based on a magnitude (e.g., speed and/or distance) and/or direction of the third user input (e.g., a speed and/or direction of movement of a contact in a swipe or drag gesture) (e.g., FIGS. 22L-22N).

In some embodiments, the electronic device adjusting the current value of the first editable parameter in accordance with the first gesture further includes, in accordance with a determination that the current value (e.g., the adjusted current value) of the first editable parameter corresponds to a predetermined reset value (e.g., 2252*i*2) (e.g., a value that is calculated by an auto adjustment algorithm) for the first editable parameter, the electronic device generating a tactile output (e.g., 2260*a*) (e.g., a vibration). In some embodiments, the electronic device adjusting the current value of the first editable parameter in accordance with the first gesture further includes, in accordance with a determination that the current value (e.g., the adjusted current value) of the first editable parameter corresponds does not correspond to the predetermined reset value (e.g., a value that is calculated by an auto adjustment algorithm) for the first editable parameter, the electronic device forgoes to generate a tactile output (e.g., a vibration). In some embodiments, an indicator (e.g., a colored or bolded tick mark on the slider or another identifying user interface element on the slider) is displayed on the slider to indicate the predetermined reset value. (e.g., FIGS. 22Q-22R). Providing additional control options to reset a representation to its original conditions makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. In some embodiments, when multiple conditions are met, multiple affordances are displayed.

In some embodiments, while displaying the adjustable control for adjusting the first editable parameter and detecting the third input (e.g., 22501), the electronic device visually deemphasizes (e.g., 2254*a*1 in FIG. 22M) (e.g., display as being grayed out, smaller, out of focus, dimmed) the adjustable control for adjusting the first editable parameter. In some embodiments, the electronic device will visually deemphasize the adjustable control until detecting lift off of the third input (e.g., FIGS. 22L-22N). Deemphasizing the adjustable control while navigating through editable parameters provides the user with feedback about the current state of the adjustable control, allows a user to determine that the current state of the operation is not affecting the adjustable control, and reduces the mistakes by the user navigating to a certain editable parameter by decreasing the pronounced display of certain user interface elements. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third input (e.g., 22501) is received by the electronic device while the adjustable control for adjusting the first editable parameter is displayed (e.g., 2254*a*1). In some embodiments, the electronic device displaying the third affordance includes, in accordance with a determination that a first set of criteria are met, the first set of criteria including a criterion that is met when the fourth editable parameter is a parameter of a first type (e.g., 2212*a*-2212*d*) (e.g., a parameter that is automatically selected for adjustment when displayed at a predetermined location (e.g., center of the media editing user interface)), the electronic device displays at the respective location in the media editing user interface an adjustable control (e.g., 2252*b*1 in FIG. 22Y) for adjusting the fourth editable parameter. In some embodiments, the first set of criteria includes a criterion that is met when the third affordance is displayed at a second respective location (e.g., center of a control ribbon for displaying affordances that correspond to editable parameters) (e.g., an editable parameter that does not require a selection input before being selected for adjustment such rotation, contrast, brightness, lightness, saturation, or the like where the default state of the editable parameter corresponds to a current state of the representation of the visual media). In some embodiments, the electronic device displaying the third affordance (e.g., 2214*a*-2214*i*) also includes, in accordance with a determination that the first set of criteria are not met, the electronic device forgoes displaying at the respective location in the media editing user interface the adjustable control (e.g., 2214*h*) for adjusting the fourth editable parameter. In some embodiments, the electronic device also maintains display of the adjustable control for adjusting the first editable parameter. In some embodiments, the first set of criteria are not met when the fourth editable parameter is a parameter of a second type (e.g., a parameter that is not automatically selected for adjustment when displayed at a predetermined location (e.g., an editable parameter that requires a selection input before being selected for adjustment such as a filter or editing tool where the default application of the filter or editing tool changes the representation of the visual media by applying the filter or editing tool to the representation of the visual media)) (e.g., FIGS. 22H-22I and FIGS. 22W-22Z).

In some embodiments, while displaying the representation of the visual media and the first affordance (e.g., 2214*c*), the electronic device displays a first editable parameter status indicator (e.g., 2214*c*) (e.g., a selectable user interface object that toggles an editable parameter on/off) that indicates a status (e.g., 2204*c* in FIGS. 22F-22G) of whether the representation of the visual media is currently adjusted based on the first editable parameter. In some embodiments, the electronic device detects a fourth user input corresponding to selection of the first affordance. In some embodiments, in response to detecting the fourth user input (e.g., 2250*f* and/or 2250*g*) and in accordance with a determination that the representation of the visual media is currently adjusted based on the first editable parameter (e.g., when the first editable parameter status indicator is displayed as being active or selected (e.g., displayed with a visual indication that the first editable parameter is active, such as being displayed as pressed and/or in a different color (e.g., saturated and/or not dimmed or grayed-out)), the electronic device updates the first editable parameter status indicator to indicate that the representation of the visual media is not currently adjusted based on the first editable parameter (e.g., when the first editable parameter status indicator is displayed as being inactive or not selected (e.g., displayed with a visual indication that the first editable parameter is inactive such as being depressed and/or in a different color (e.g., dimmed and/or de-saturated or grayed-out)) and replaces display of the representation of the visual media with a representation of the visual media that has not been adjusted based on the first editable parameter (e.g., representation has an original captured value (e.g., original contrast value when media was captured) corresponding to the first editable parameter (e.g., contrast)). In some embodiments, in response to detecting the fourth user input and in accordance with a determination that the representation of the visual media is not currently adjusted based on the first editable parameter (e.g., when the first editable parameter status indicator is displayed as being inactive or not selected (e.g., displayed with a visual indication that the first editable parameter is inactive such as being depressed and/or in a different color (e.g., dimmed and/or de-saturated or grayed-out)), the electronic device updates the status indicator to indicate that the representation of the visual media is currently adjusted based on the current value of the first editable parameter (e.g., when the first editable parameter status indicator is displayed as being active or selected (e.g., displayed with a visual indication that the first editable parameter is active, such as being displayed as pressed and/or in a different color (e.g., saturated and/or not dimmed or grayed-out)) and replaces display of the representation of visual media with a representation of the visual media that has been adjusted based on the first editable parameter (e.g., representation adjusted based on the current value of the first editable parameter (e.g., current value displayed on the adjustable control for adjusting the first editable parameter)) (e.g., FIGS. 22F-22H).

In some embodiments, a third editable-parameter-current-value indicator (e.g., 2244*a*-2244*i*) is visually surrounding (e.g., wrapped in a circle around, encompasses) at least a portion of the first affordance (e.g., 2214*a*-2214*i*), and a fourth editable-parameter-current-value (e.g., 2244*a*-2244*i*) indicator is visually surrounding (e.g., wrapped in a circle around, encompasses) the second affordance (e.g., 2214*a*-2214*i*). In some embodiments, the progress indicator includes a circular status bar that fills in with a color (e.g., blue) based on the current value's relationship to the maximum value that which the first editable parameter can be set). Providing value indicators when editable parameters are updated (or change) allows the user to determine the current value of the editable parameter that has changed to display the adjustable representation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device includes one or more cameras. In some embodiments, the representation of the visual media is a representation of a field-of-view of the one or cameras. In some embodiments, the media editing user interface is displayed while the electronic device is configured to capture (or edit) visual media in a first capture mode (e.g., a camera mode (e.g., a portrait mode (e.g., a media lighting capture control (e.g., a portrait lighting effect control (e.g., a studio lighting, contour lighting, stage lighting)))) that permits the application of a lighting effect and a depth effect. In some embodiments, the first editable parameter is a lighting effect intensity (e.g., **602*f*) (e.g., a simulated amount of light (e.g., luminous intensity)). In some embodiments, the second editable parameter is a depth effect intensity (e.g., 602*e*) (e.g., a bokeh effect intensity, a simulated f-stop value) (e.g., FIGS. 22W-22**AC).

In some embodiments, the first editable parameter corresponds to a lighting effect parameter (e.g., **602*f*) (e.g., FIGS. 22W-22AC). In some embodiments, the media editing user interface includes a value indicator (e.g., 602*f***) corresponding (e.g., graphical borders around the affordances corresponding to the editable parameters that are updated based on the values of the parameters) to the lighting effect parameter. In some embodiments, the electronic device adjusting the current value of the first editable parameter in accordance with the first gesture includes the electronic device adjusting the light effecting status indicator based on the adjusted current value of the first editable parameter (e.g., displaying more or less lights as being active (e.g., not gray-out) based on the portion of the current value to the maximum possible value of the lighting effect). Updating the visual characteristics of the icon to reflect an activation state while executing an operation provides the user with feedback about the current state of icon and provides visual feedback to the user indicating that the value of the adjustable control is changing. In some embodiments, the depth indicator is different from the lighting indicator. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2300 (e.g., FIGS. 23A-23B) are also applicable in an analogous manner to the methods described above. For example, methods 700, 900, 1100, 1300, 1500, 1700, 1900, 2100, 2500, 2700, 2800, 3000, 3200, 3400, 3600, and 3800 optionally include one or more of the characteristics of the various methods described above with reference to method 2300. For brevity, these details are not repeated below.

FIGS. 24A-24AB illustrate exemplary user interfaces for editing captured media using an electronic device in accordance with some embodiments. The user interfaces in these figures are used to illustrate the processes described below, including the processes in FIGS. 25A-25B.

To improve understanding, FIGS. 24A-24J are discussed below to provide examples of user interfaces for correcting (e.g., reducing and/or changing) the position of the horizon, the vertical perspective distortion, and the horizontal perspective distortion of a representation of previously captured media via post-processing techniques (e.g., after the media has been captured). In some embodiments, the position of the horizon, the vertical perspective distortion, and the horizontal perspective distortion of a representation are affected by the position (e.g., tilt, angle) of a camera or the shape and/or position of a camera lens while capturing the media.

Figure 24B:
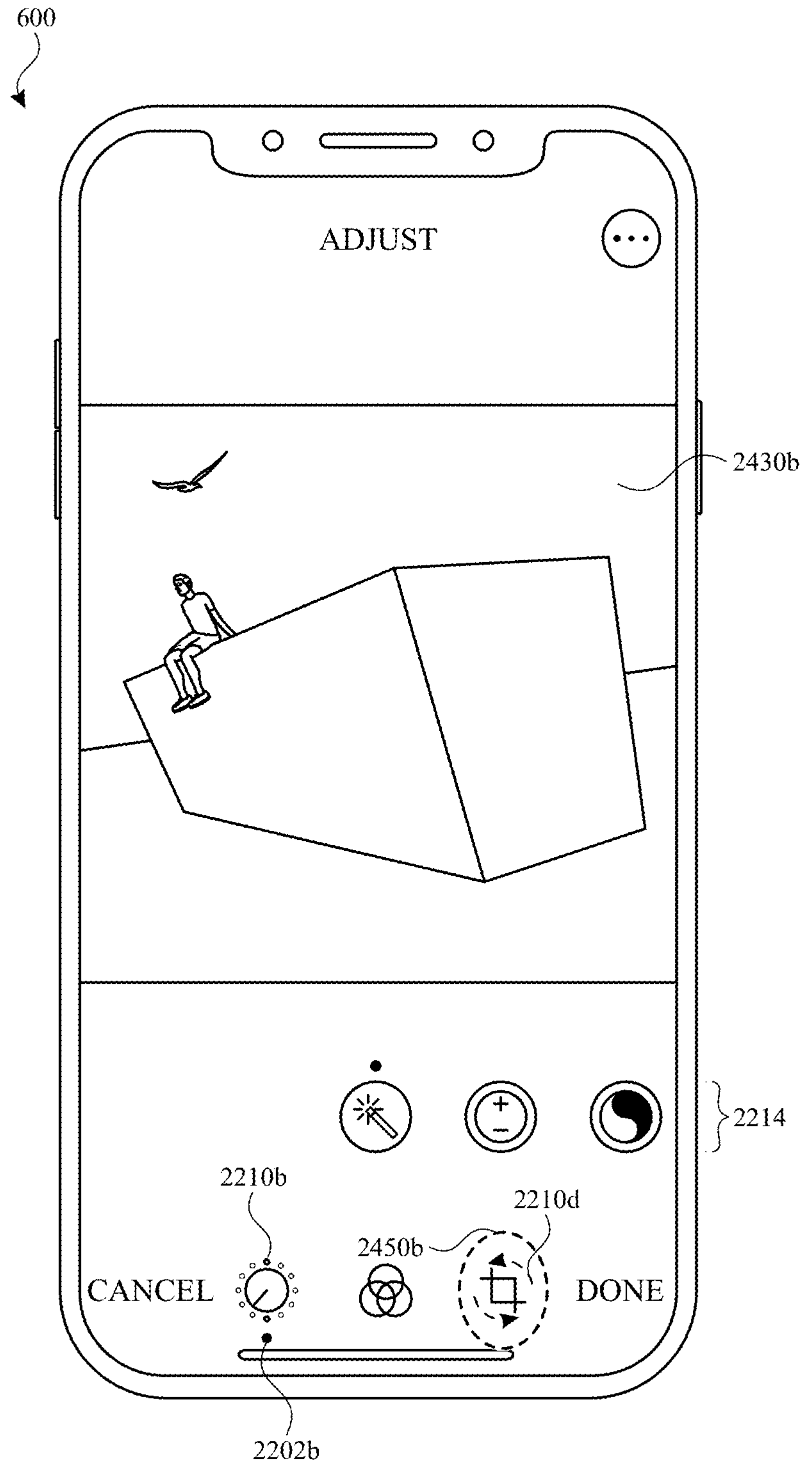
Figure 24C:
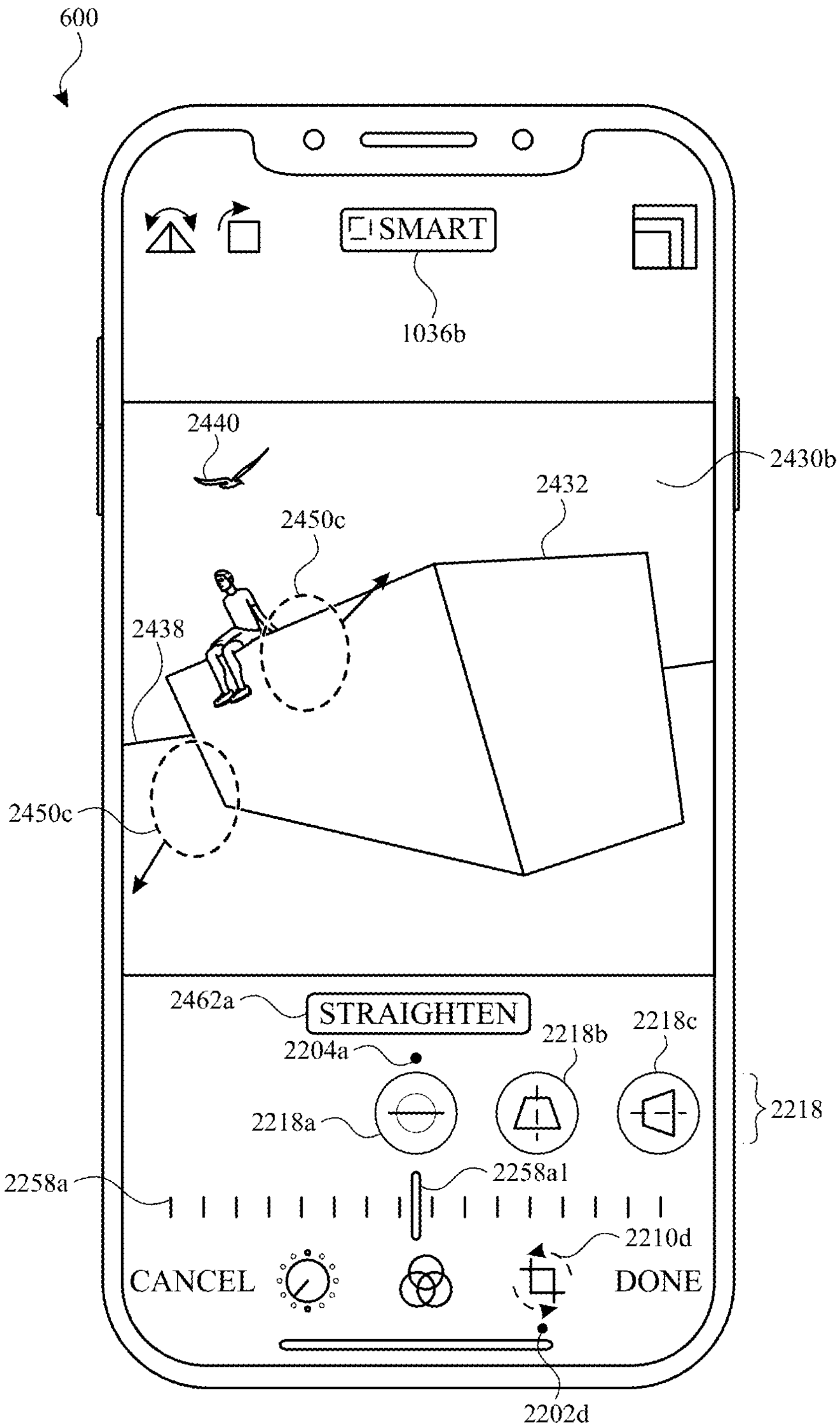
Figure 24D:
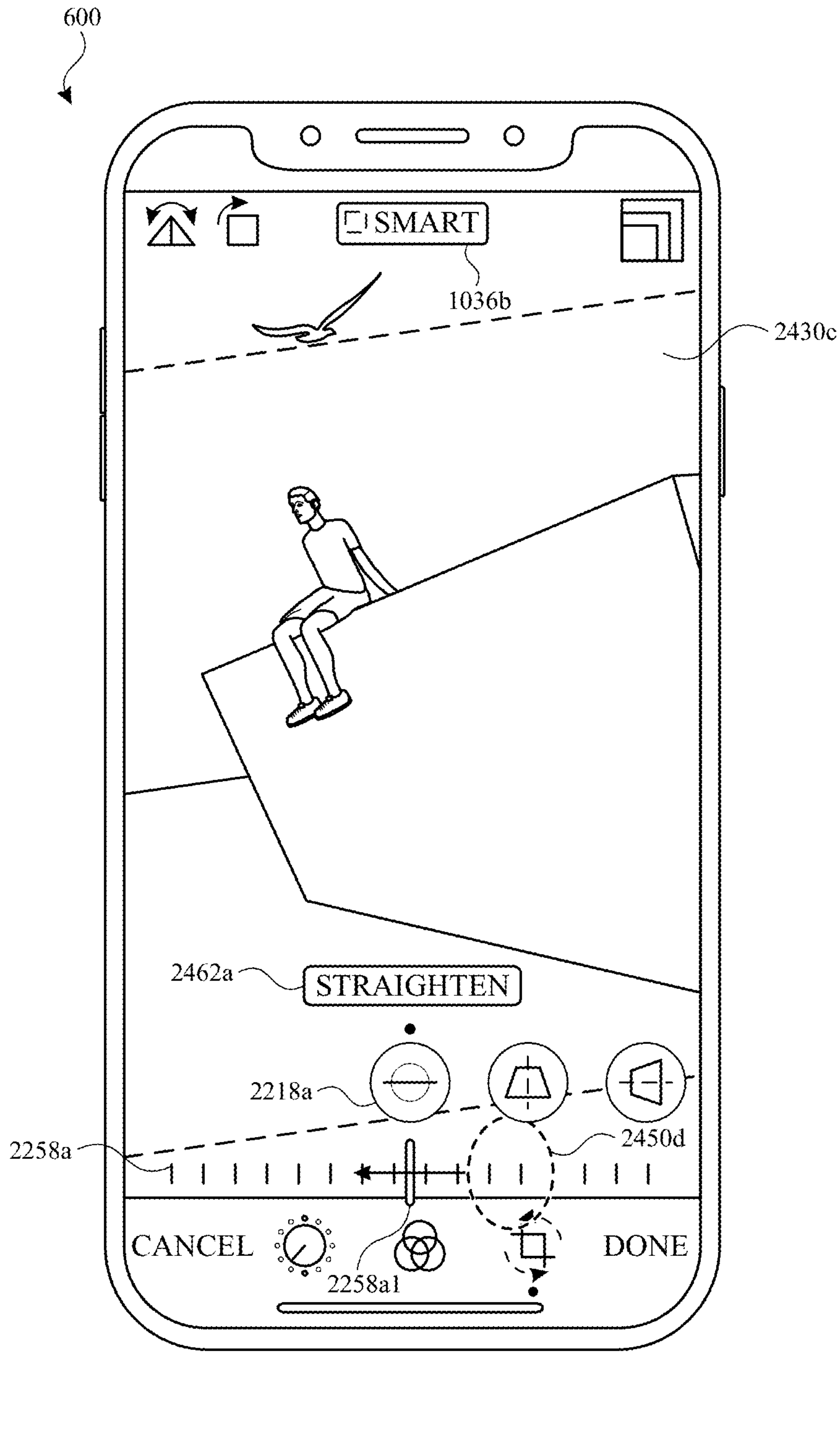
Figure 24E:
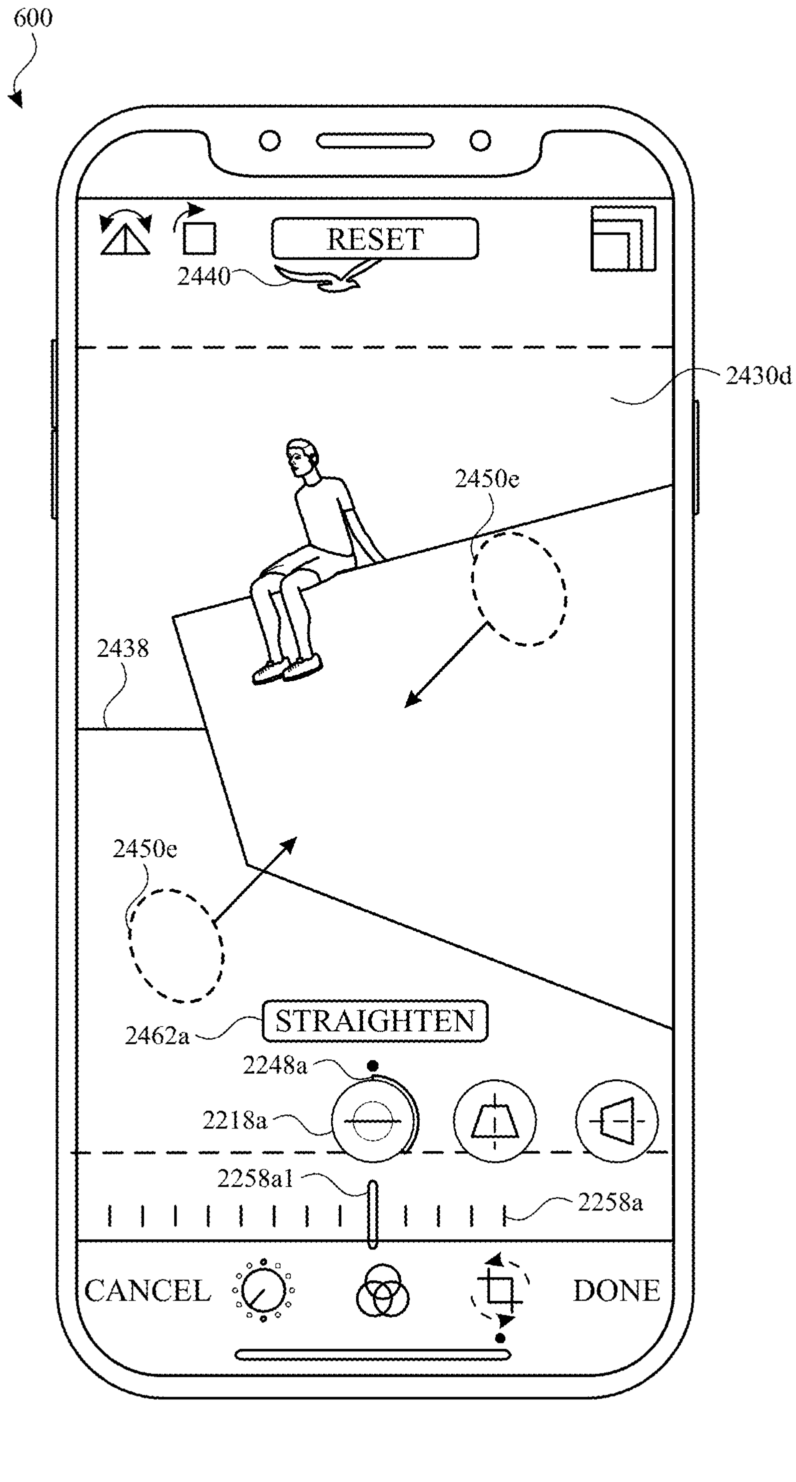
Figure 24F:
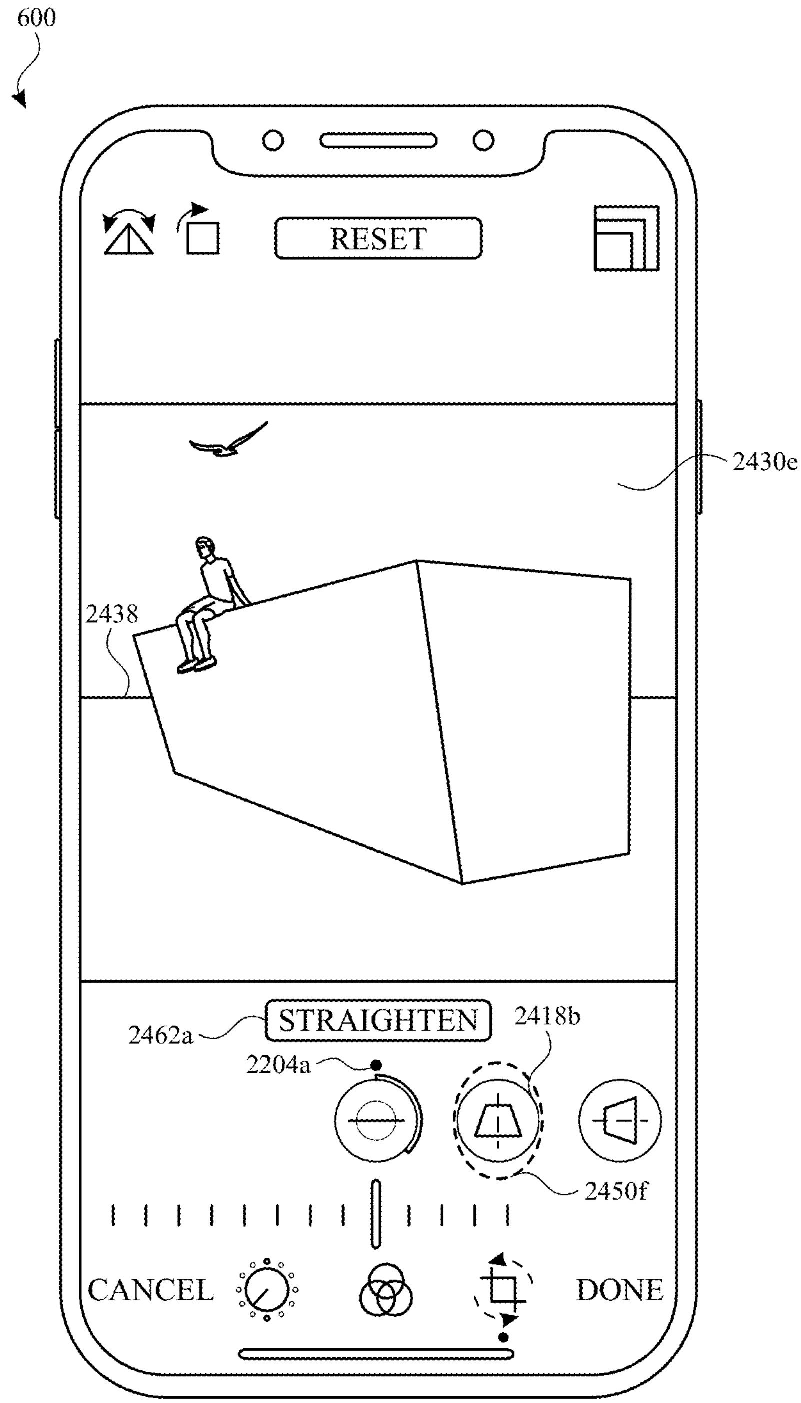
Figure 24G:
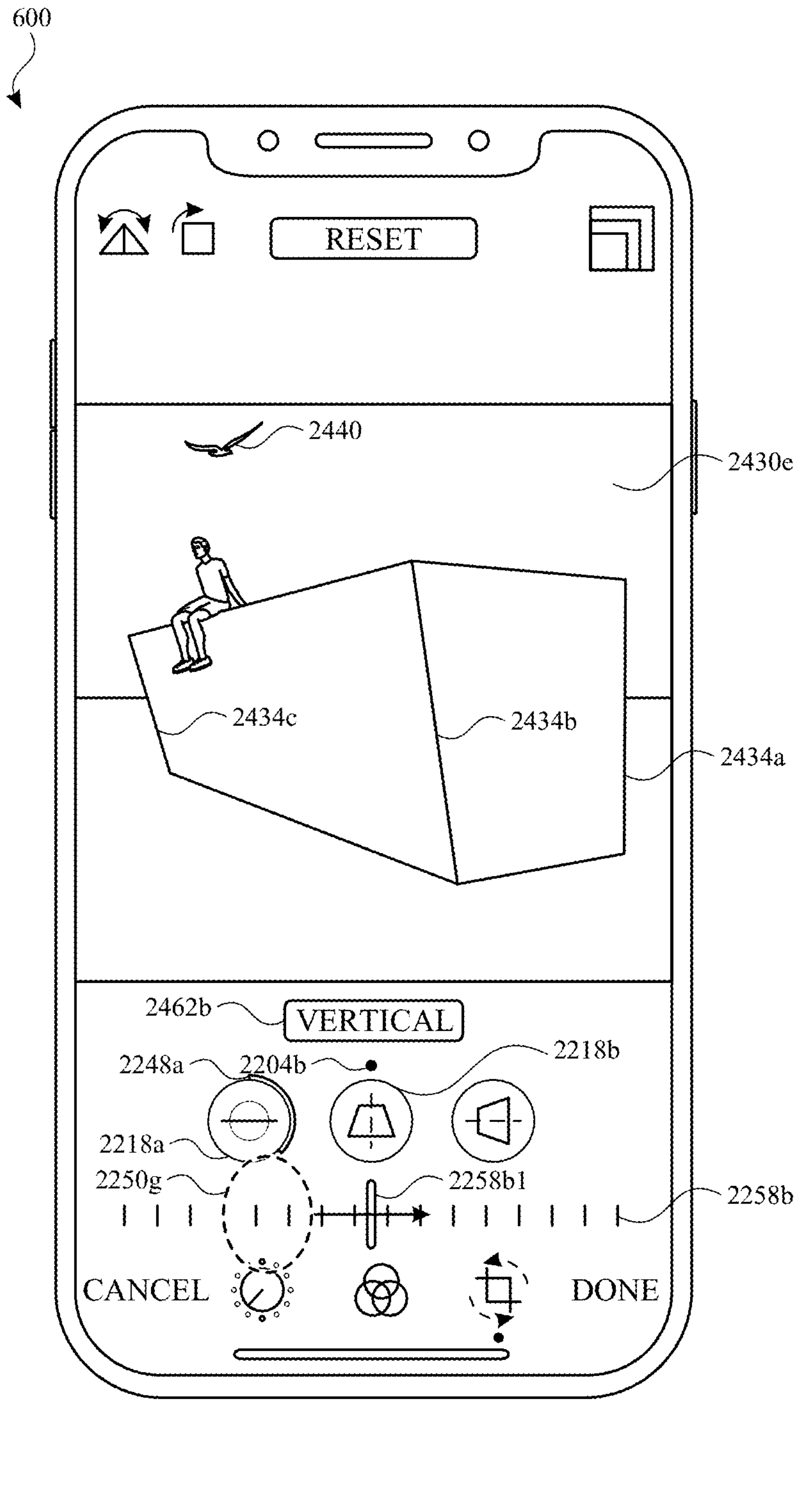
Figure 24H:
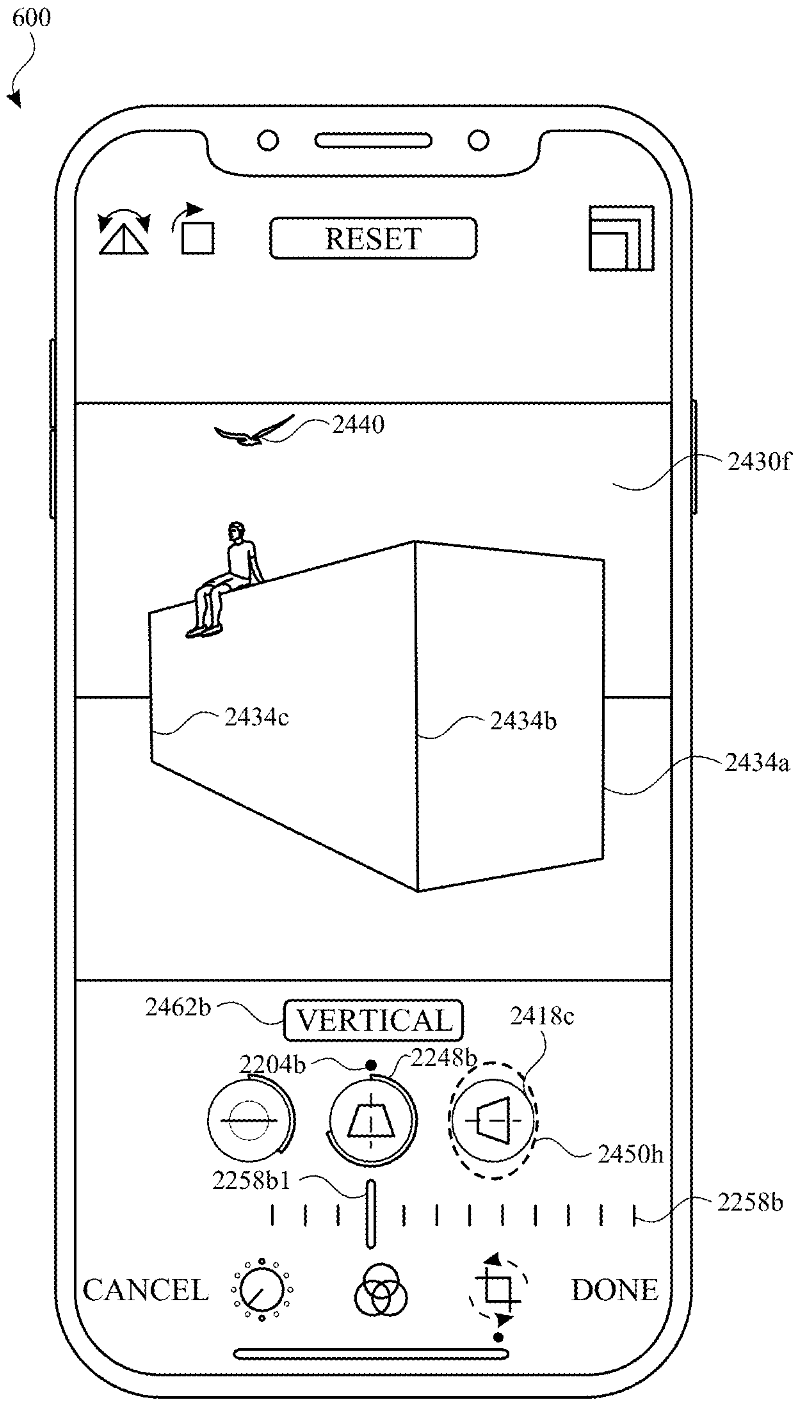
Figure 24I:
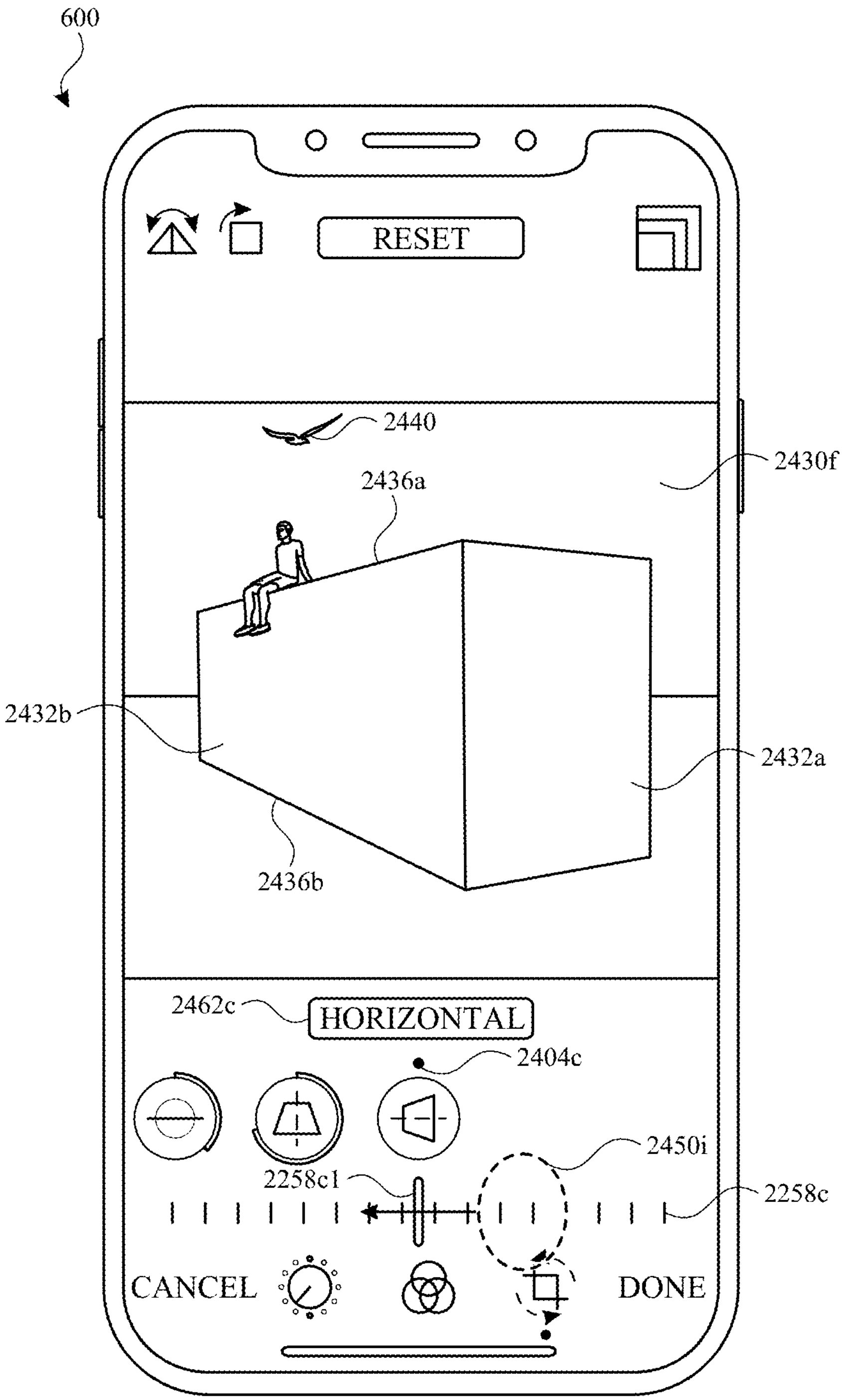
Figure 24J:
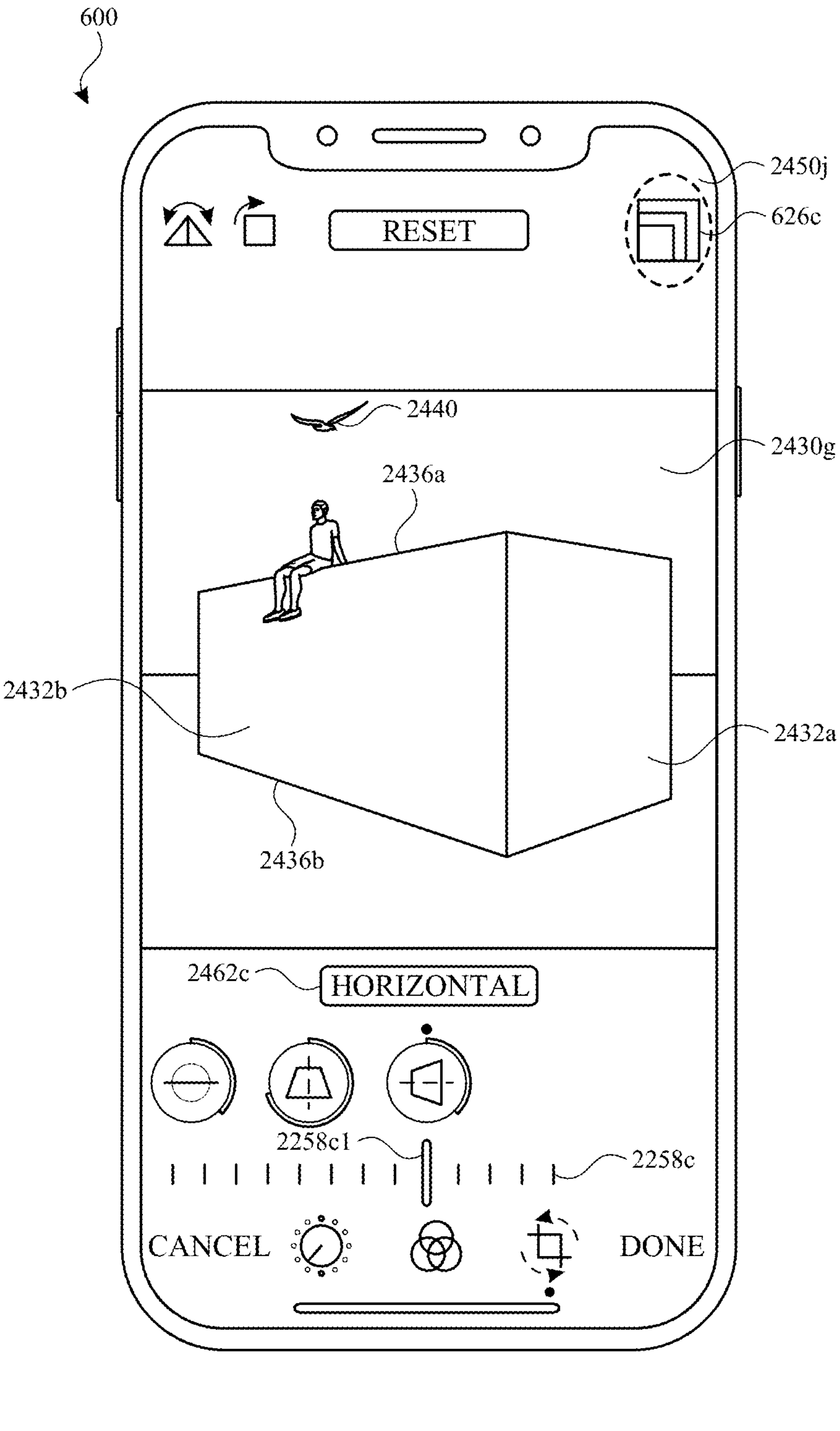

In FIG. 24A, electronic device 600 displays a media viewer user interface that includes representation **2430*a* of previously captured media (e.g., a photo). Representation 2430*a* shows a person sitting on top of rectangular prism 2432 with the person's feet dangling over lateral face 2432*b* of rectangular prism 2432. The only other face of rectangular prism 2432 that is depicted, besides lateral face 2432*b*, is end face 2432*a*. Representation 2430*a* includes horizon line 2438 that has not been corrected because the horizon line is diagonal in representation 2430*a* (e.g., where some points of horizon line 2438 have different y-values). As shown in FIG. 24E (discussed in detail below), device 600 corrects the position of horizon line 2438 by adjusting representation 2430*a* to make horizon line 2438 appear to proceed only along the x-axis of the representation (e.g., where each point of the horizon line has the same y-value). Moreover, in FIG. 24A, representation 2430*a* includes vertical perspective distortion that has not been corrected. Although vertical lines 2434*a*-2434*c* should be parallel (e.g., because the vertical lines of the actual (e.g., in the natural or real-world environment) prism are parallel) in representation 2430*a*, vertical lines 2434*a*-2434*c* appear to visually converge at a respective point towards the bottom of representation 2430*a*. As shown in FIG. 24H, device 600 corrects the vertical perspective by adjusting representation 2430*a* such that vertical lines 2434*a*-2434*c* appear to be parallel (e.g., non-converging). Further, in FIG. 24A, representation 2430*a* includes horizontal perspective distortion that has not been corrected. For example, although horizontal lines 2436*a*-2436*b* should be parallel (e.g., the horizontal lines of the actual prism (e.g., in the natural or real-world environment) in representation 2430*a*, horizontal lines 2436*a*-2436*b* appear to converge moving from right to left in representation 2430*a*. As shown in FIG. 24J, device 600 corrects the horizontal perspective by adjusting representation 2430*a* such that horizontal lines 2436*a*-2436*b* appear to be parallel (e.g., non-converging). As illustrated in FIG. 24A, the media viewer user interface also includes edit affordance 644*a***.

At FIG. 24A, device 600 detects tap gesture **2450*a* at a location that corresponds to edit affordance 644*a*. As illustrated in FIG. 24B, in response to detecting tap gesture 2450*a*, device 600 replaces the media viewer user interface with a media editing user interface (e.g., as discussed above in relation to FIGS. 22A-22B). The media editing user interface includes representation 2430*b* that corresponds to representation 2430*a* in FIG. 24A. That is, representation 2430*b* depicts the same representation of the captured media and has the same position of the horizon, vertical perspective distortion, and horizontal perspective distortion as discussed above in relation to representation 2430*a*. The media editing user interface also includes similar components to the media editing user interface described above in FIG. 22A. However, in contrast to the media editing user interface described above in FIG. 22A, device 600 determines that the captured media represented by representation 2430*b* is photo media. As a result, device 600 determines that photo media does not have a particular set of editing tools for editing photos. And, in accordance with this determination, device 600 displays editing mode affordances 2210*b*-2210*d* (e.g., instead of a fourth media editing affordance, such as portrait mode media editing mode affordance 2210*a*) without displaying a media editing mode affordance for editing photo media. In particular, editing mode affordances 2210***b*-2210*d* include visual characteristic editing mode affordance 2210*b*, filter editing mode affordance 2210*c*, and image content editing mode affordance 2210*d*. As shown in FIG. 24B, visual characteristic editing mode affordance 2210*b* is selected, as indicated by mode selection indicator 2202*b*. As a result, device 600 displays visual characteristic editing tool affordances 2214 using similar techniques discussed in FIGS. 22B-22C.

At FIG. 24B, device 600 detects tap gesture 2450*b* at a location corresponding to image content editing mode affordance 2210*d*. As illustrated in FIG. 24C, in response to detecting tap gesture 2450*b*, device 600 displays mode selection indicator 2202*d* under image content editing mode affordance 2210*d* to indicate that the device is configured to edit a representation in image content editing mode. In addition, device 600 replaces visual characteristic editing tool affordances 2214 with image content editing tool affordances 2218. Displaying image content editing tool affordances 2218 includes concurrently displaying straightening editing tool affordance 2218*a* (for correcting the position of the horizon of a representation), vertical perspective editing tool affordance 2218*b* (for correcting the vertical perspective distortion of a representation), and horizontal perspective editing tool affordance 2218*c* (for correcting the horizontal perspective distortion of a representation). Device 600 displays straightening editing tool affordance 2218*a* as being selected, which is indicated by tool selection indicator 2204*a* being displayed adjacent to the top of straightening editing tool affordance 2218*a*. In addition to displaying straightening editing tool affordance 2218*a* as being selected, device 600 also displays straitening control indication 2258*a*1 at a position that is near the center of adjustable straitening control 2258*a*.

At FIG. 24C, device 600 detects de-pinching gesture 2450*c* directed to representation 2430*b*. As illustrated in FIG. 24D, in response to detecting de-pinching gesture 2450*c*, device 600 changes the zoom level (e.g., 1× zoom) of representation 2430*b* by displaying representation 2430*c* that corresponds to a zoomed-in representation (e.g., 2× zoom) of representation 2430*b*. As a result of zooming in, representation 2430*c* depicts a portion of rectangular prism 2432 and horizon line 2438 while another portion of rectangular prism 2432 and horizon line 2438 ceases to be displayed. The displayed portion of horizon line 2438 is diagonal, where some points of horizon line 2438 have different y-values. Representation 2430*c* also continues to include bird 2440, which was displayed at the top left of representation 2430*b*.

In addition, as illustrated in FIG. 24D, device 600 has determined that the captured media represented by representation 2430*c* was captured using similar techniques to those described in relation to method 1100. Thus, the captured media includes visual content that is displayed as representation 2430*c* (e.g., visual content captured as displayed in live preview 630 when capturing media in FIGS. 10E-10G) and additional visual content that is not displayed as representation 2430*c* (e.g., visual content captured as displayed in indicator region 602 and control region 606 when capturing media in FIGS. 10E-10G; over-captured content). In some embodiments, the additional visual content can include visual content that is outside of a predetermined spatial bounds (e.g., outside of an originally captured frame or outside of live preview 630 in FIGS. 10E-10G) of the visual content. In some embodiments, a data file corresponding to the captured media includes the visual content displayed as representation 2430*c* and the additional visual content that is not displayed as representation 2430*c*. As a result of device 600 determining that the captured media represented by representation 2430*c* includes additional data, device 600 displays auto adjust affordance 1036*b* (for automatically editing the representation of the captured media). In some embodiments, when device 600 determines that the captured media represented by representation 2430*c* does not include additional visual content, device 600 does not display auto adjust affordance 1036*b*.

At FIG. 24D, device 600 detects gesture 2450*d* (leftward flick, or dragging gesture) directed to adjustable straitening control 2258*a*. As illustrated in FIG. 24E, in response to detecting gesture 2450*d*, device 600 performs similar techniques as those described above in response to device 600 detecting gestures 2250*d*, 2250*i*, and/or 2250*o*. Device 600 moves straitening control indication 2258*a*1 to a new position on adjustable straitening control 2258*a* based on the magnitude and direction (e.g., speed, length of swipe) of gesture 2450*d* and displays value indicator 2248*a*. The magnitude and direction of gesture 2450*d* cause device 600 to display straitening control indication 2258*a*1 at a new position that is closer to the rightmost tick mark (e.g., the maximum value) of adjustable straitening control 2258*a*. In addition, device 600 displays representation 2430*d*, where representation 2430*d* is a version of representation 2430*c* that has been adjusted based on a value that corresponds to the new position of straitening control indication 2258*a*1 on adjustable straitening control 2258*a*. As shown by representation 2430*d*, device 600 rotates representation 2430*c* clockwise until horizon line 2438 appears to proceed only along the x-axis of the representation (e.g., where each point of the horizon line has the same y-value). Because the captured media includes additional content that was not displayed in representation 2430*d*, device 600 utilizes (e.g., brings in) the additional visual content while rotating representation 2430*c*, such that bird 2440 continues to be displayed in representation 2430*d*. Utilizing the additional visual content not displayed in representation 2430*c* (e.g., visual content displayed in indicator region 602 when the image was captured) allows device 600 to maintain display of the visual content in representation 2430*d*. In contrast, in some embodiments, bird 2440 would not continue to be displayed in representation 2430*d*. For example, when the captured media does not include additional visual content that is not displayed, device 600 crops out the region above dotted line 2466 when rotating representation 2404*c* in response to detecting gesture 2450*d*. As shown in FIGS. 24D-24E for clarity, device 600 would crop out the region above dotted line 2466 to make the adjusted representation appear to be rectangular (e.g., where if not cropped, a portion of the region above dotted line 2466 would be outside of the media editing user interface). Thus, after cropping dotted line 2466, device 600 ceases to display the region above dotted line 2466 in FIG. 24E. In some embodiments, correcting vertical perspective distortion includes tilting the perspective of the representation in the vertical direction (e.g., down to up). In some embodiments, correcting the vertical perspective includes adjusting the horizontal lines in the representation, which causes the representation to visually appear as if the vertical perspective has changed in the representation.

At FIG. 24E, device 600 detects pinching gesture 2450*e* directed to representation 2430*d*. As illustrated in FIG. 24F, in response to detecting pinching gesture 2450*e*, device 600 displays representation 2430*e* by zooming out representation 2430*d* to the previous zoom level at which representation 2430*b* was displayed in FIG. 24C. As shown in representation 2430*e*, device 600 continues to display the portion of horizon line 2438 that was displayed in representation

2430*d* with adjustment. Notably, device 600 also displays the portion of horizon line 2438 that was not displayed in representation 2430*d* with adjustment such that the entirety of horizon line 2438 appears to proceed only along the x-axis of the representation (e.g., where each point of the horizon line has the same y-value). Thus, device 600 (as shown by FIGS. 24E-24D) is capable of making and maintaining adjustments to a representation independent of the zoom level of the representation.

At FIG. 24F, device 600 detects tap gesture 2450*f* at a location that corresponds to vertical perspective editing tool affordance 2218*b*. As illustrated in FIG. 24G, in response to detecting tap gesture 2450*f*, device 600 performs similar techniques as those described above in response to device 600 detecting tap gestures 2250*h* and/or 2250*n*. At FIG. 24G, device 600 replaces the display of adjustable straitening control 2258*a* and straitening control indication 2258*a*1 with the display of adjustable vertical perspective distortion control 2258*b* and vertical perspective distortion control indication 2258*b*1. In addition, device 600 displays tool selection indicator 2204*b* and ceases to display tool selection indicator 2204*a* to show that device 600 is configured to operate in a vertical perspective distortion adjustment mode.

At FIG. 24G, device 600 detects gesture 2450*g* (rightward flick, or dragging gesture) directed to adjustable vertical perspective distortion control 2258*b*. As illustrated in FIG. 24H, in response to detecting gesture 2450*g*, device 600 performs similar techniques as those described above in response to device 600 detecting gesture 2250*d*, 2250*i*, and/or 2250*o*. In particular, device 600 moves vertical perspective distortion control indication 2258*b*1 to a new position on adjustable vertical perspective distortion control 2258*b* based on the magnitude and direction (e.g., speed, length of swipe) of gesture 2450*g*. In response to detecting gesture 2450*g*, device 600 also displays representation 2430*f* that has been adjusted based on a value that corresponds to the new position of vertical perspective distortion control indication 2258*b*1 on adjustable vertical perspective distortion control 2258*b*. As a result, device 600 modifies vertical lines 2434*a*-2434*c* to converge less when moving towards the bottom of the media user interface when compared to vertical lines 2434*a*-2434*c* in FIG. 24G. As illustrated in FIG. 24H, vertical lines 2434*a*-2434*c* appear to be parallel.

At FIG. 24H, while displaying representation 2430*f*, device 600 detects tap gesture 2450*h* at a location corresponding to horizontal perspective editing tool affordance 2218*c*. As illustrated in FIG. 24I, in response to detecting tap gesture 2450*h*, device 600 performs similar techniques as those described above in response to device 600 detecting tap gestures 2250*h*, 2250*n*, and 2450*f*. In particular, device 600 replaces the display of adjustable vertical perspective distortion control 2258*b* and vertical perspective distortion control indication 2258*b*1 with the display of adjustable horizontal perspective distortion control 2258*c* and adjustable horizontal perspective distortion control indication 2258*c*1. In addition, device 600 displays tool selection indicator 2204*c* and ceases to display tool selection indicator 2204*b* to show that device 600 is configured to operate in a horizontal perspective distortion adjustment mode.

At FIG. 24I, device 600 detects gesture 2450*i* (leftward flick, or dragging gesture) directed to adjustable horizontal perspective distortion control 2258*c*. As illustrated in FIG. 24J, in response to detecting gesture 2450*i*, device 600 performs similar techniques as those described above in response to device 600 detecting gesture 2250*d*, 2250*i*, and/or 2250*o*. In particular, device 600 moves horizontal perspective distortion control indication 2258*c*1 to a new position on adjustable horizontal perspective distortion control 2258*c* based on the magnitude and direction (e.g., speed, length of swipe) of gesture 2450*i*. In response to detecting gesture 2450*i*, device 600 also displays representation 2430*g* that is a version of representation 2430*f* that has been adjusted based on a value that corresponds to the new position of horizontal perspective distortion control indication 2258*c*1 on adjustable horizontal perspective distortion control 2258*c*. As a result, device 600 modifies horizontal lines 2436*a*-2436*b* to converge less when moving from right to left of the media user interface. At FIG. 24J, the length of lateral face 2432*b* of rectangular prism 2432 is reduced when the convergence of horizontal lines 2436*a*-2436*b* is reduced. In some embodiments, correcting horizontal perspective distortion includes tilting the perspective of the representation in the horizontal direction (e.g., left to right). In some embodiments, correcting the horizontal perspective includes adjusting the vertical lines in the representation, which causes the representation to visually appear as if the horizontal perspective has changed in the representation.

In some embodiments, when adjusting the vertical perspective distortion and/or horizontal perspective distortion, device 600 utilizes additional content that is not displayed in a representation to adjust (e.g., reduce or increase) the vertical or horizontal perspective distortion in the captured media. In some embodiments, after adjusting the horizon, vertical, or horizontal of a representative, device 600 displays grayed out (e.g., translucent) portions of visual content that is not included in the adjusted representation. In some embodiments, device 600 displays a visual boundary between the adjusted representation and the visual content that is not included in the adjusted representation.

Figure 24K:
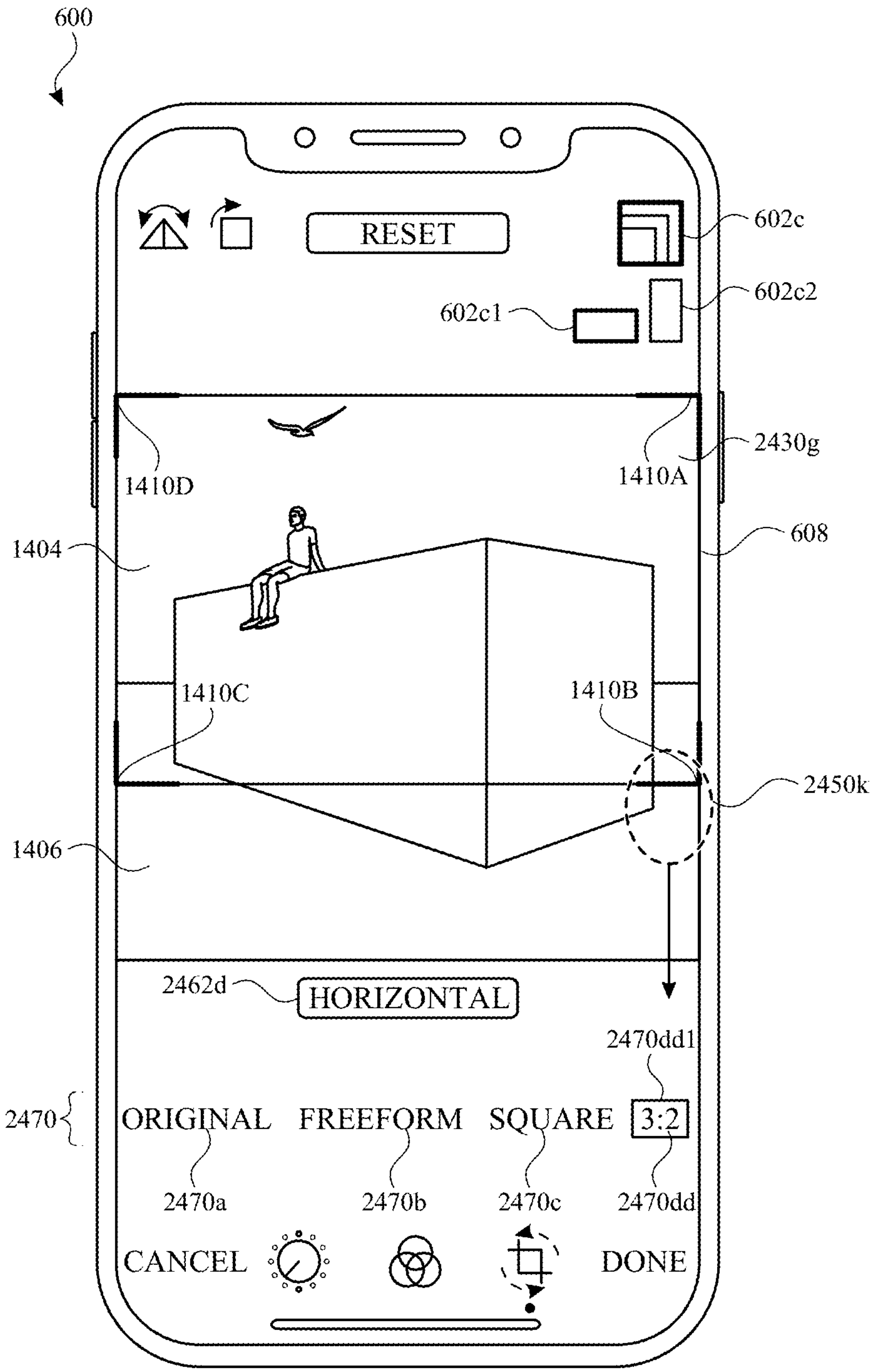

FIGS. 24J-24O illustrate device 600 operating in an aspect ratio adjustment mode. When operating in the aspect ratio adjustment mode, device 600 uses similar techniques to those described above with respect to FIGS. 8J and 14A-14U. At FIG. 24J, device 600 detects gesture 2450*j* that corresponds to aspect ratio control affordance 626*c*. As illustrated in FIG. 24K, in response to detecting gesture 2450*j*, device 600 displays visual boundary 608 on representation 2430*g*. At FIG. 24K, similar to FIG. 14A, device 600 displays visual boundary 608 between visual portion 1404 and dimmed portion 1406. Visual portion 1404 includes predefined input locations 1410A-1410D. Additionally, in response detecting gesture 2450*j*, device 600 displays horizontal aspect ratio control affordance 626*c*1 and vertical aspect ratio control affordance 626*c*2. Because visual boundary 608's horizontal sides are longer than its vertical sides, device 600 emphasizes (e.g., boldness, highlights) horizontal aspect ratio control affordance 626*c*1 and displays horizontal indicator 2462*d* to show that visual boundary 608 is in a horizontal orientation (e.g., landscape orientation). Further, in response detecting gesture 2450*j*, device 600 displays aspect ratio tool affordances 2470, including original aspect ratio tool 2470*a*, freeform aspect ratio tool 2470*b*, square aspect ratio tool 2470*c*, and 3:2 aspect ratio tool 2470*dd*. Device 600 determines that the aspect ratio of representation 2430*g* is a 3:2 aspect ratio. Thus, device 600 displays aspect ratio selection indicator 2470*dd*1 around 3:2 aspect ratio tool 2470*dd*. In some embodiments, the components and techniques described herein in relation to aspect ratio tool affordances 2470 are the same as those described in relation to aspect ratio controls 1470 and 818 described above.

Figure 24L:
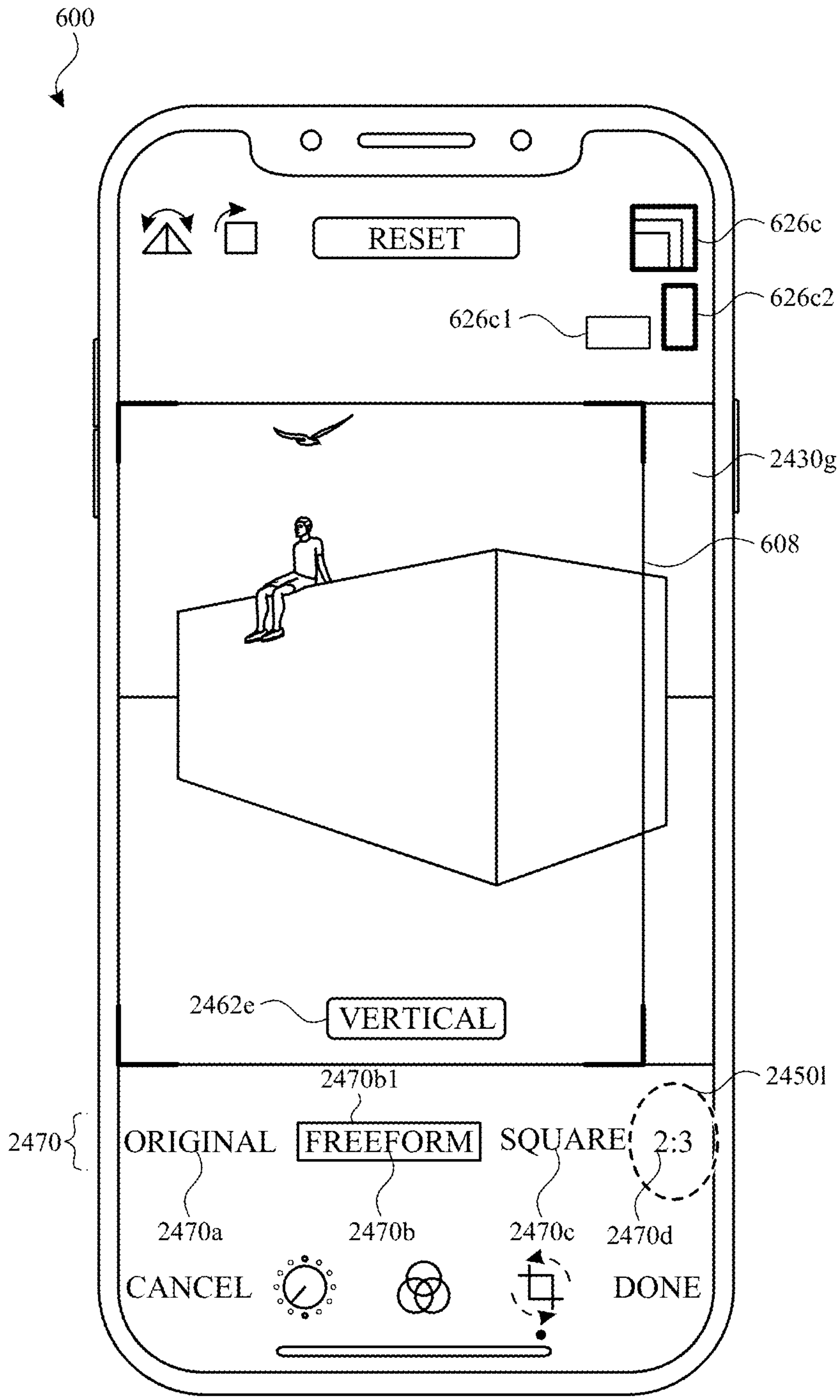

At FIG. 24K, device 600 detects gesture 2450*k* (e.g., downward dragging gesture) directed to predefined input location 1410B. As illustrated in FIG. 24L, in response to detecting gesture 2450*k*, device 600 changes the aspect ratio of visual boundary 608 using similar techniques to those described above in relation to 1495B in FIGS. 14E-141. When device 600 changes the aspect ratio of visual boundary 608, device 600 determines that the aspect ratio of visual boundary 608 (e.g., same as aspect ratio of representation surrounded by visual boundary 608) is not a predefined aspect ratio (e.g., square, 3:2). As a result of this determination, device 600 ceases to display aspect ratio selection indicator 2470*dd*1 around aspect ratio tool 2470*dd* and displays aspect ratio selection indicator 2470*b*1 around freeform aspect ratio tool 2470*dd*. When changing the aspect ratio of visual boundary 608, device 600 also determines that the vertical sides of visual boundary 608 are larger than the horizontal sides of visual boundary 608. As a result of this determination, device 600 emphasizes (e.g., boldness, highlights) vertical aspect ratio control affordance 626*c*2 instead of emphasizing horizontal aspect ratio control affordance 626*c*1. Device 600 replaces display of horizontal indicator 2462*d* with vertical indicator 2462*e*. In addition, because device 600 determines that the vertical sides of visual boundary 608 are larger than the horizontal sides of visual boundary 608 (e.g., a vertical or portrait orientation), device 600 replaces 3:2 aspect ratio tool 2470*dd* with 2:3 aspect ratio tool 2470*d* (e.g., a reciprocal aspect ratio tool) to be consistent with the comparison of the width of visual boundary 608 being smaller than the length of visual boundary 608.

Figure 24M:
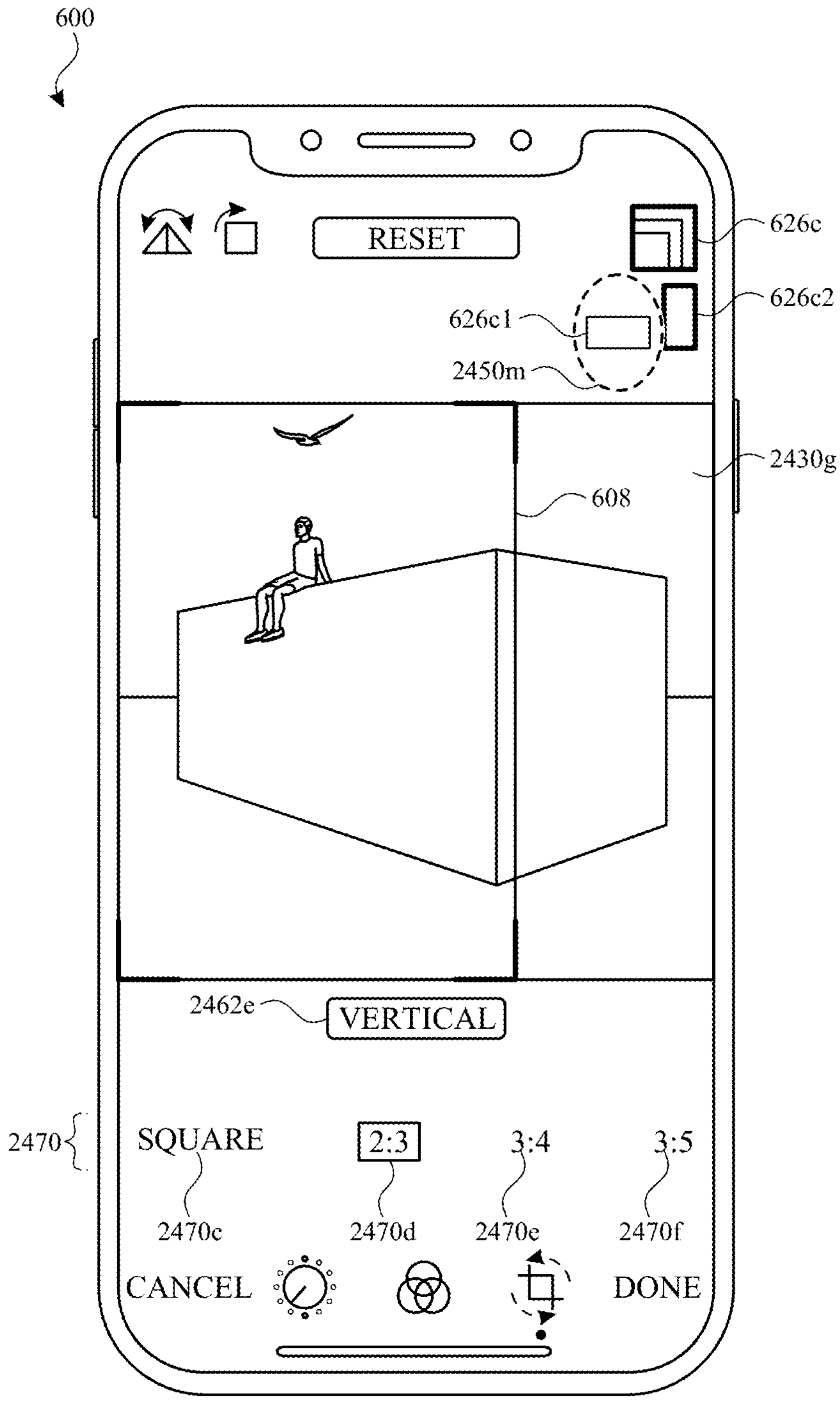

At FIG. 24L, device 600 tap gesture 24501 that corresponds to the location of 2:3 aspect ratio tool 2470*d*. As illustrated in FIG. 24M, in response to detecting tap gesture 24501, device 600 displays 2:3 aspect ratio tool 2470*d* in the center of the media editing user interface by shifting aspect ratio tool affordances 2470 to the right. At FIG. 24M, device 600 ceases to display original aspect ratio tool 2470*a* and freeform aspect ratio tool 2470*b*, and displays 3:4 aspect ratio tool 2470*e* and 3:5 aspect ratio tool 2470*f* to the right of 2:3 aspect ratio tool 2470*d*. Device 600 also displays selection aspect ratio selection indicator 2470*d*1 around 2:3 aspect ratio tool 2470*d* to indicate that aspect ratio tool 2470*d* is selected. In response to detecting gesture 24501, device 600 also automatically, without further user input, displays visual boundary 608 at a 2:3 aspect ratio.

Figure 24N:
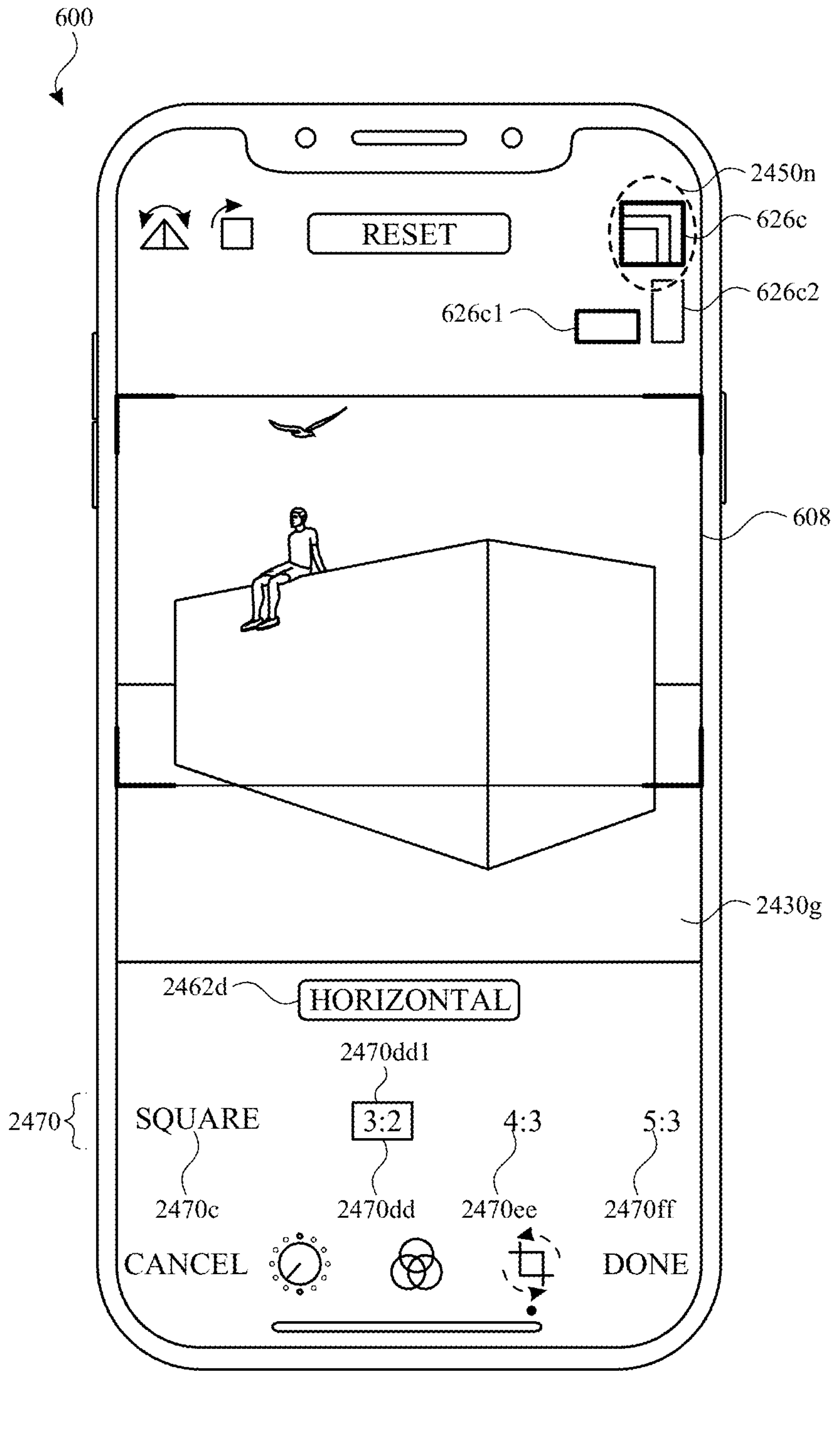

At FIG. 24M, device 600 detects taping gesture 2450*m* that corresponds to a location of horizontal aspect ratio control affordance 626*c*1. As illustrated in FIG. 24N, in response to detecting gesture tapping 2450*m*, device 600 automatically, without further user input, replaces the display of visual boundary 608 at a 2:3 aspect ratio with display of visual boundary 608 at a 3:2 aspect ratio. Notably, device 600 performs this replacement (e.g., changing one aspect ratio to a reciprocal aspect ratio of visual boundary 608) without rotating representation 2430*g*. In addition, in response to detecting gesture 2450*m*, device 600 re-emphasizes horizontal aspect ratio affordance 626*c*1 and deemphasizes vertical aspect ratio affordance 626*c*2. Device 600 also changes aspect ratio tool affordances 2470 to a reciprocal aspect ratio tool of those displayed in FIG. 24M (e.g., changes 2:3 aspect ratio tool 2470*d* to correspond to 3:2 aspect ratio tool 2470*dd,* 3:4 aspect ratio tool 2470*e* to correspond to 4:3 aspect ratio tool 2470*ee*, and 5:3 aspect ratio tool 2470*f* to corresponds to 3:5 aspect ratio tool 2470*ff*).

Figure 24O:
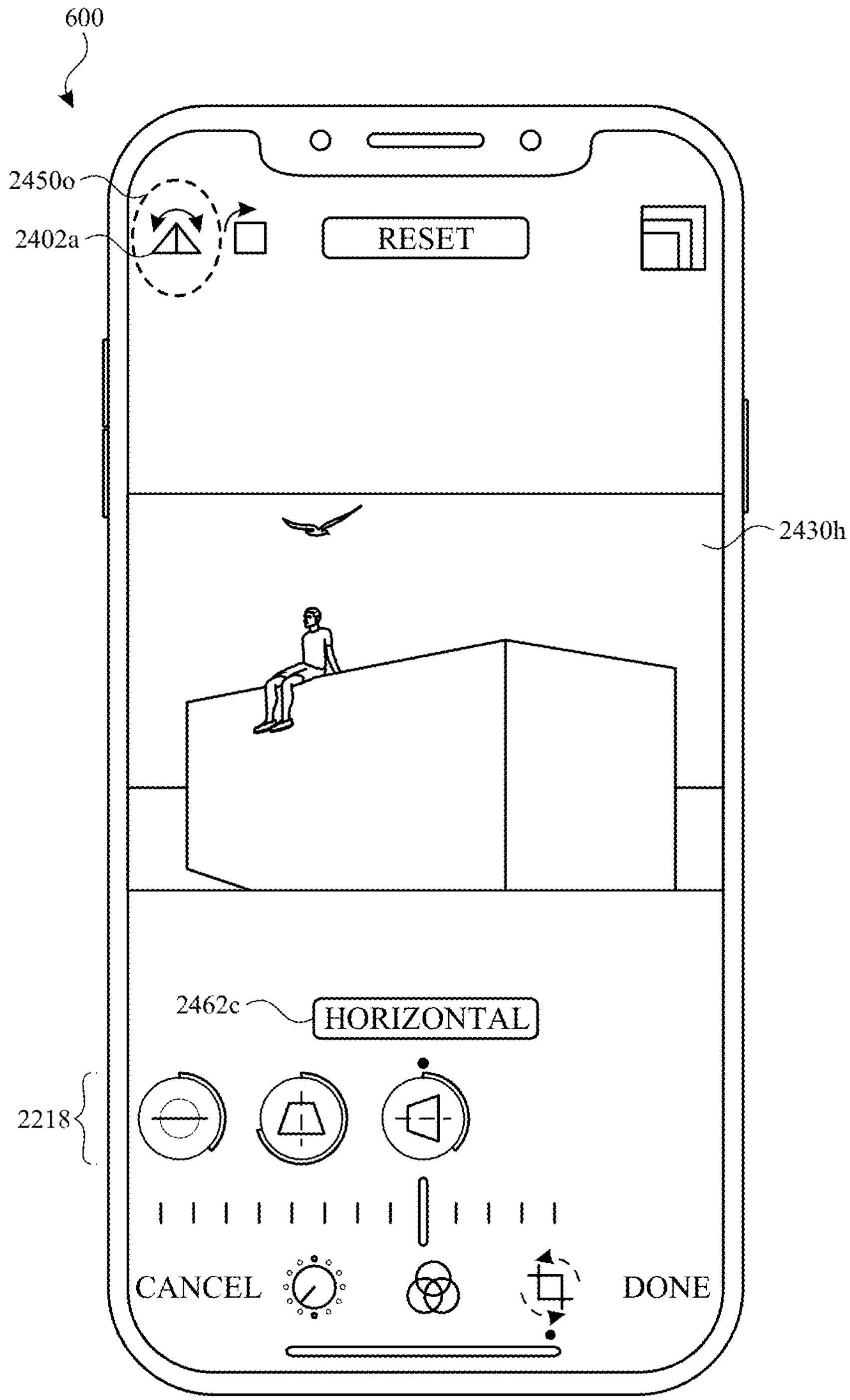

At FIG. 24N, device 600 detects tap gesture 2450*n* at a location that corresponds to aspect ratio control affordance 626*c*. As illustrated in FIG. 24O, in response to detecting tap gesture 2450*n*, device 600 displays representation 2430*h* that includes the visual content surrounded by visual boundary 608 (e.g., visual portion 1404). Thus, representation 2430*h* has an aspect ratio of 3:2 aspect ratio, which was displayed in response to detects taping gesture 2450*m*. Because tap gesture 2450*n* also configures device 600 to not operate in the aspect ratio adjustment mode, device 600 re-displays image content editing tool affordances 2218 and ceases to display aspect ratio editing tool affordances 2470.

Figure 24P:
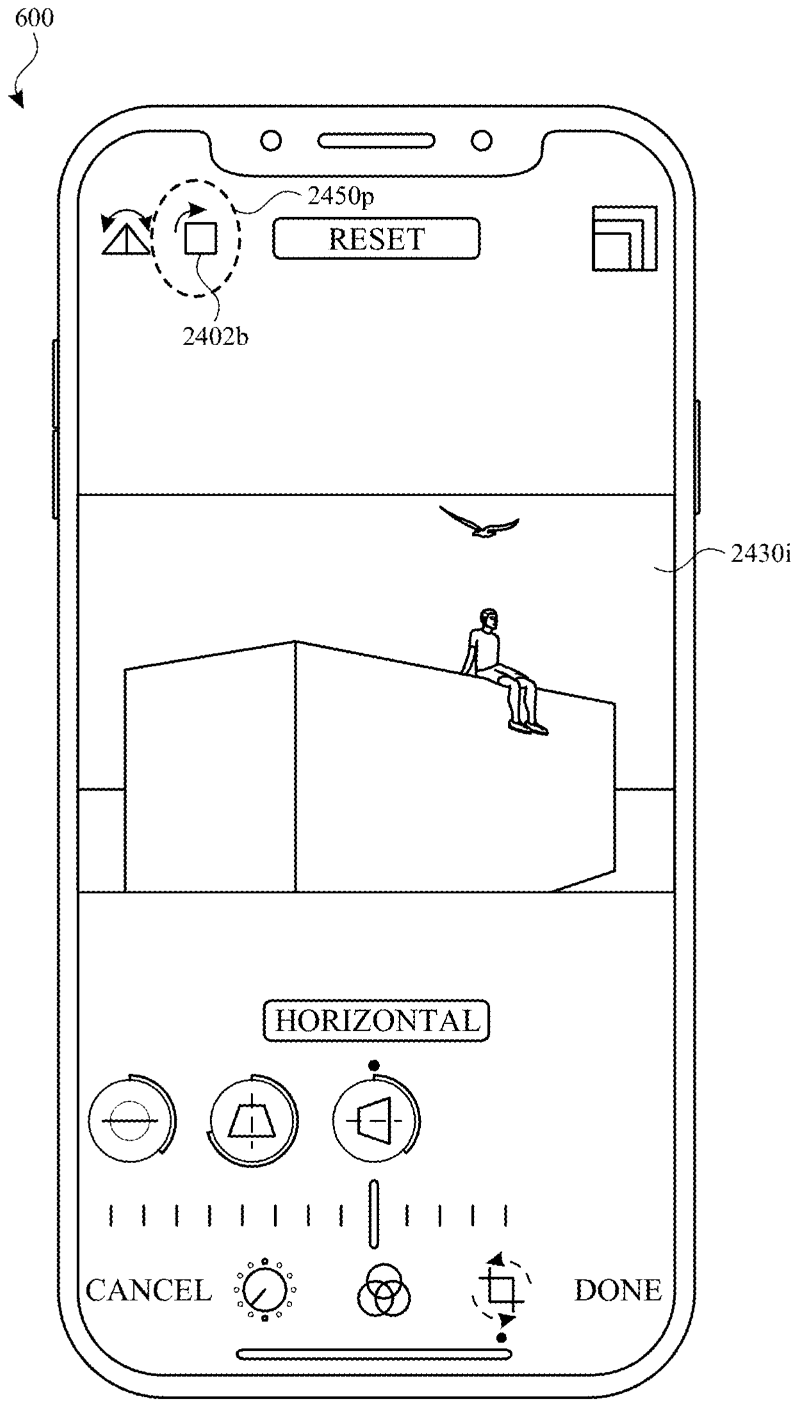

At FIG. 24O, device 600 detects tap gesture 2450*o* at a location that corresponds to flip control affordance 2402*a*. As illustrated in FIG. 24P, in response to detecting tap gesture 2450*o*, device 600 displays representation 2430*i*. Representation 2430*i* includes visual content that has been flipped horizontally (e.g., creating a horizontal mirror) from the visual content of representation 2430*h*. For example, the person sitting on rectangular prism 2432 has moved from the right side in representation 2430*h* to the left side of representation 2430*i*. In some embodiments, in response detecting gesture 2450*o* on another flip control affordance, device 600 flips the representation vertically (e.g., creating a vertical mirror), where bird 2440 is displayed at the bottom of the adjusted representation.

Figure 24Q:
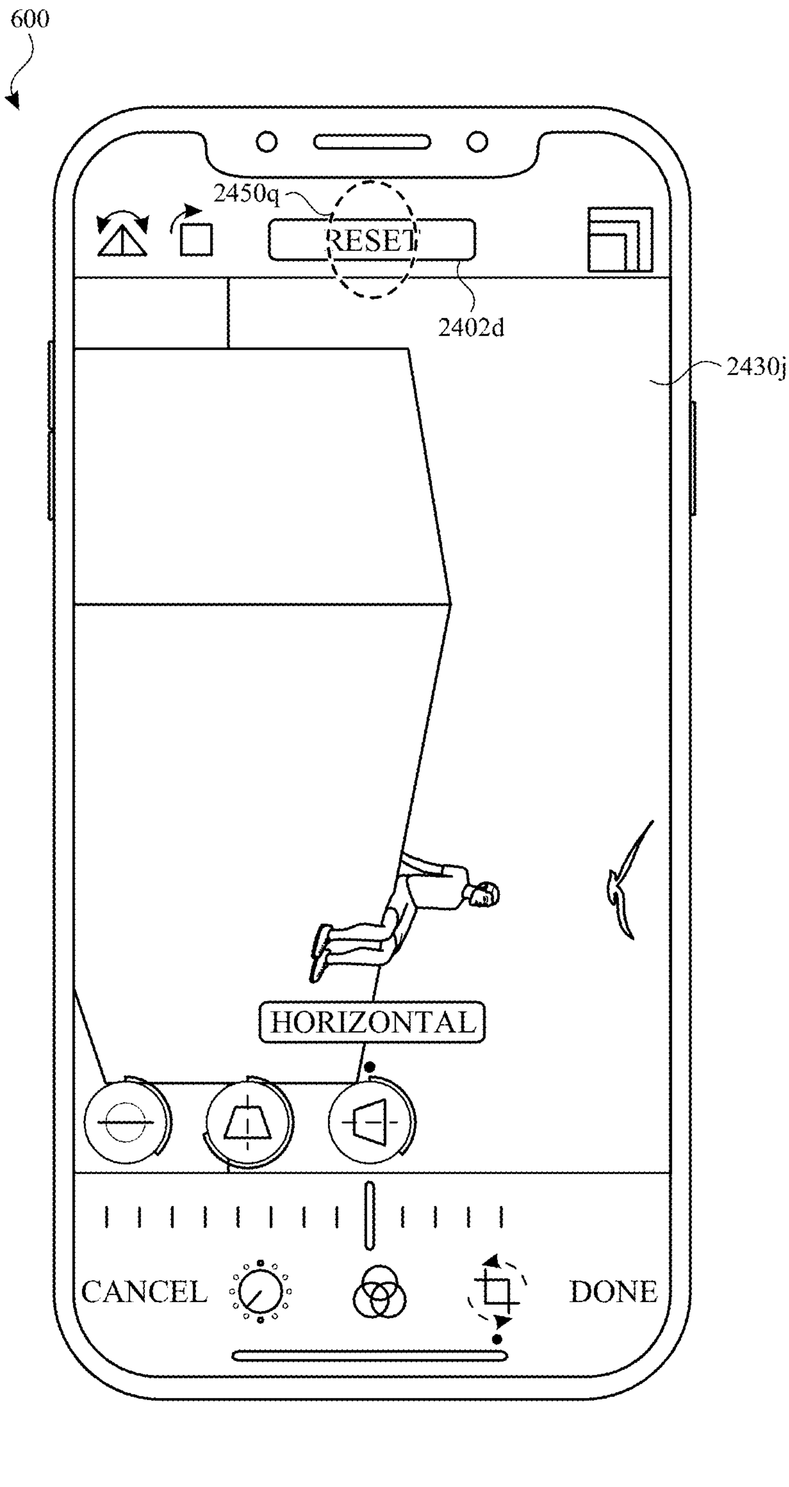

At FIG. 24P, device 600 detects tap gesture 2450*p* at a location that corresponds to rotation control affordance 2402*b*. As illustrated in FIG. 24Q, in response to detecting tap gesture 2450*p*, device 600 rotates representation 2430*i* to display representation 2430*j*. Representation 2430*j* has a 2:3 aspect ratio, which is the reciprocal aspect ratio of representation 2430*i*. However, in contrast to when a gesture is detected that is directed to horizontal aspect ratio control affordance 626*c*1 or vertical aspect ratio control affordance 626*c*2, device 600 rotates the entire representation in response to a gesture at a location that corresponds to rotation control affordance 2402*b*.

Figure 24R:
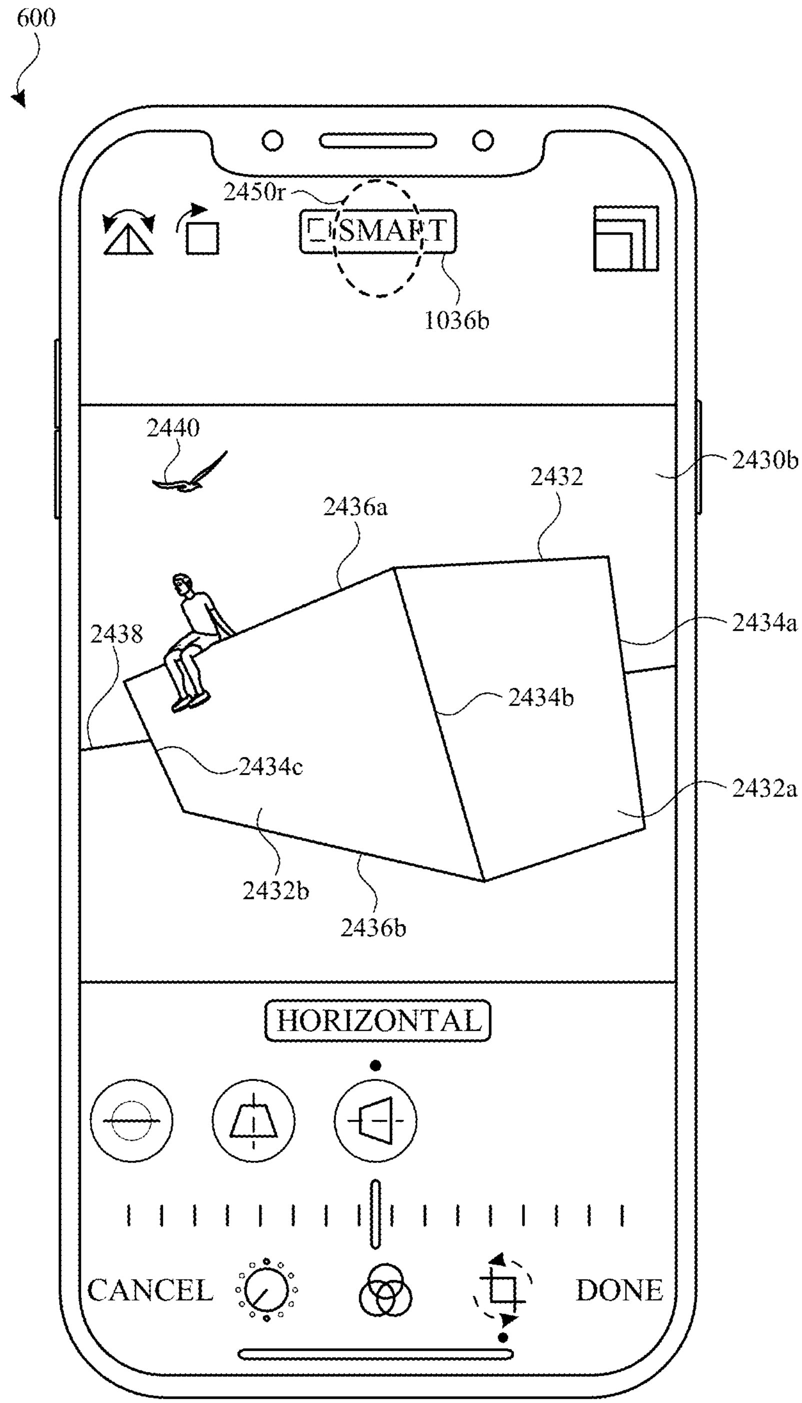

At FIG. 24Q, device 600 detects tap gesture 2450*q* at a location that corresponds to reset affordance 2402*d*. As illustrated in FIG. 24R, in response to detecting tap gesture 2450*q* on reset affordance 2402*d*, device 600 displays representation 2430*b*, undoing the adjustments made to representation in FIGS. 24B-24Q. When resetting the adjustment, device 600 resets the previous adjusted values corresponding to adjustable image content controls 2258*a*-2258*c* (as shown by device 600 moving horizontal perspective distortion indication 2258*c*1 on adjustable horizontal perspective distortion control 2258*c* to its initial position in FIG. 24I). As a result, image content value indicators 2248*a*-2248*c* cease to be displayed around adjustable image content controls 2258*a*-2258*c*.

Figure 24S:
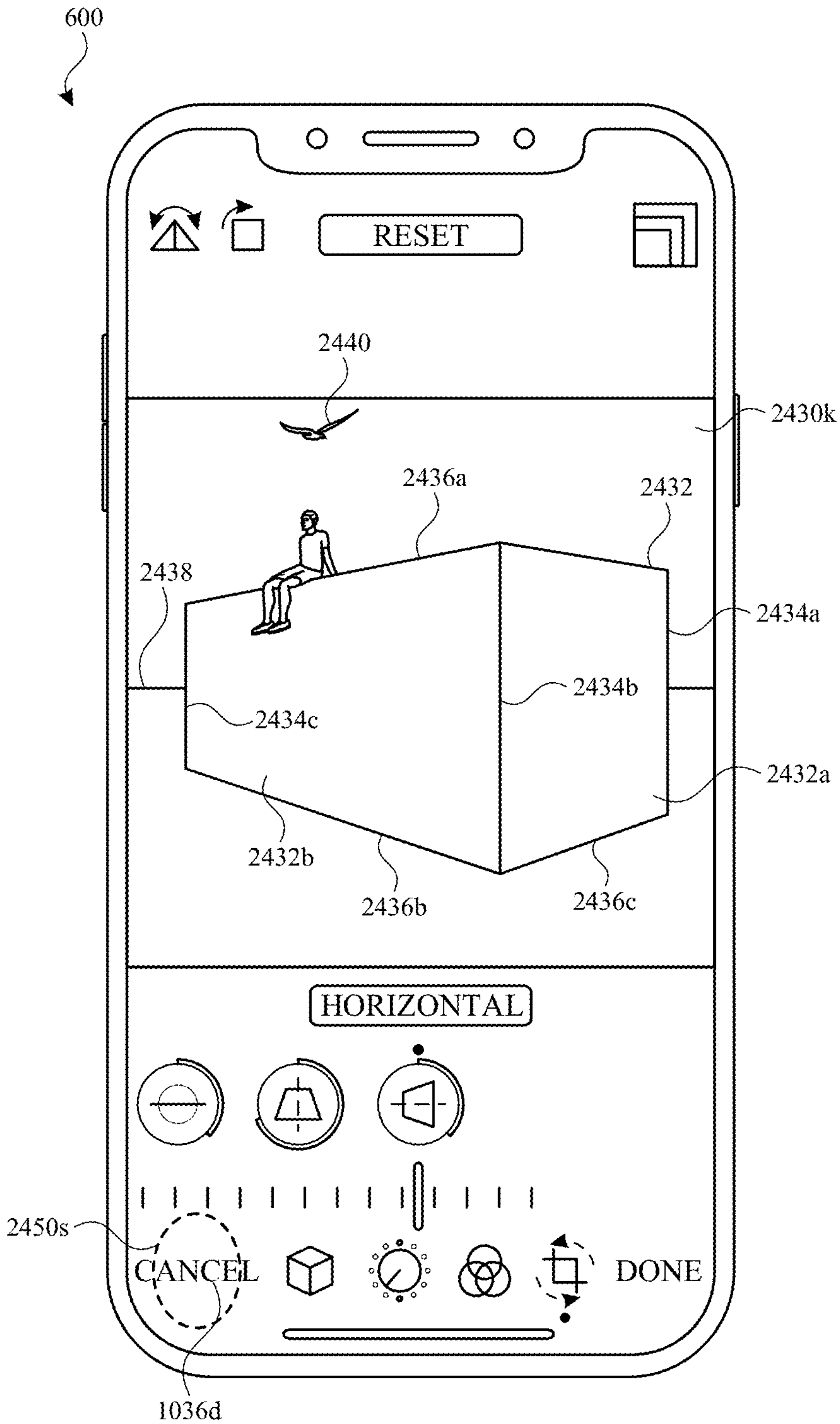

At FIG. 24R, device 600 detects tap gesture 2450*r* at a location that corresponds to auto adjust affordance 1036*b*. As illustrated in FIG. 24S, in response to detecting tap gesture 2450*r*, device 600 automatically, without additional inputs, displays representation 2430*k*. Representation 2430*k* is a version of representation 2430*b* that device 600 has adjusted based on an auto adjustment algorithm. In FIG. 24R, the position of the horizon line 2438, the vertical perspective distortion (e.g., vertical lines 2434*a*-2434*c* converge less), and the horizontal perspective distortion (e.g., horizontal lines 2436*a*-2436*b* converge less) is different from the position of the horizon line 2438, the vertical perspective distortion, the horizontal perspective distortion in representation 2430*a*.

Figure 24T:
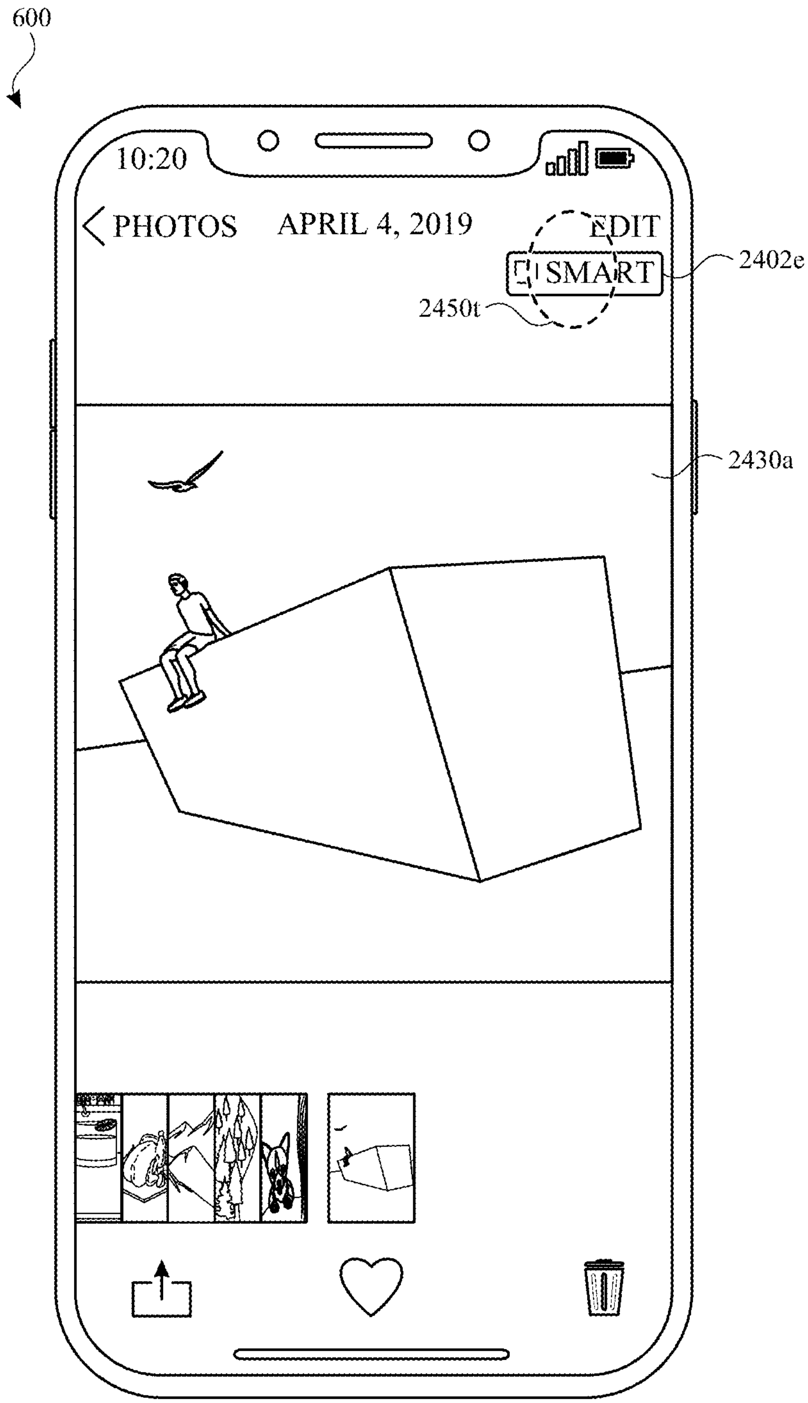
Figure 24U:
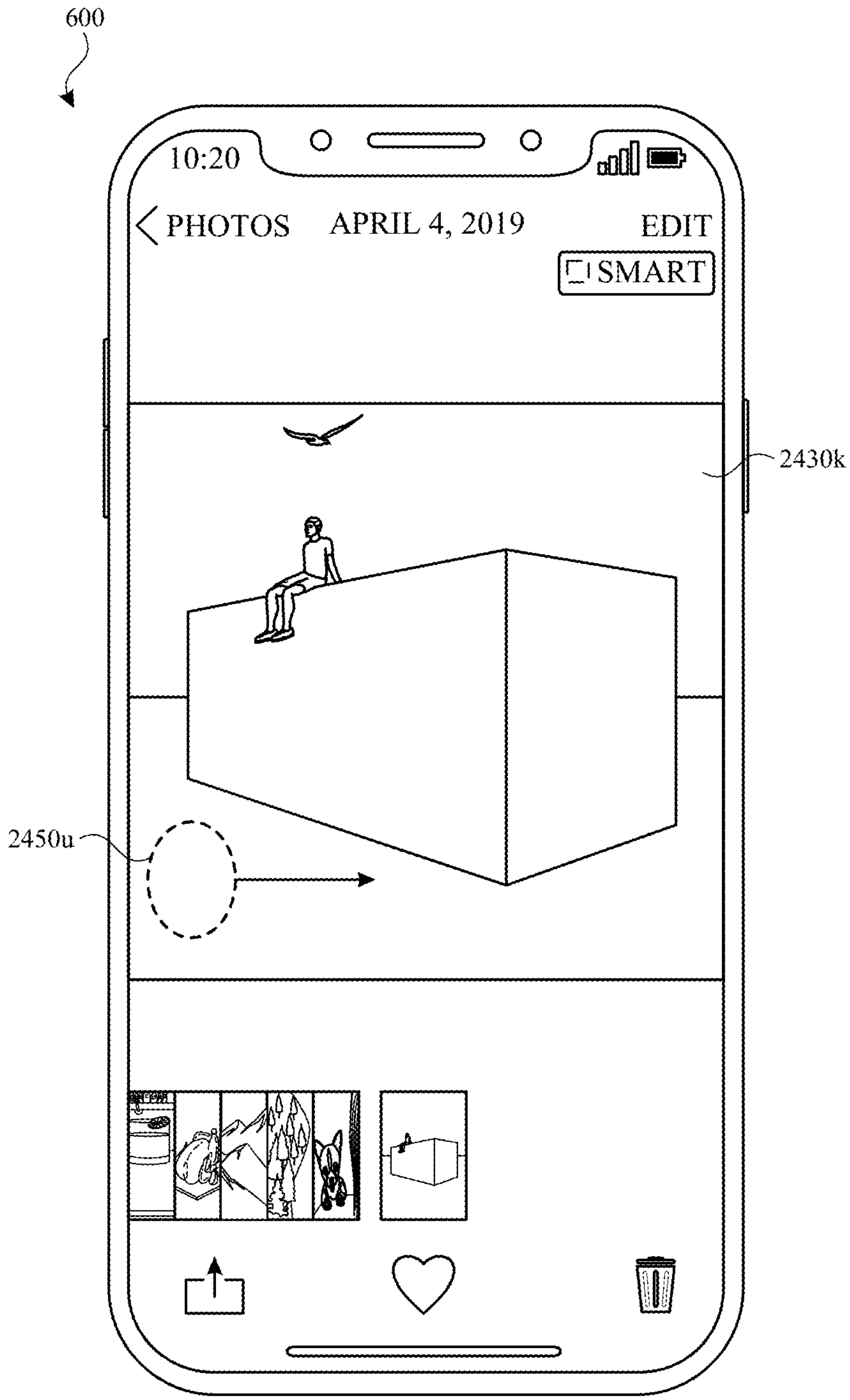

At FIG. 24S, device 600 detects tap gesture 2450*s* at a location that corresponds to cancel affordance 1036*d*. As illustrated in FIG. 24T, in response to detecting tap gesture 2450*s*, device 600 displays representation 2430*a* that is a representation of the captured media without any adjustments. At FIG. 24T, device 600 detects gesture 2450*t* at a location that corresponds to auto adjust affordance 1036*b*. As illustrated in FIG. 24U, in response to detecting tap gesture 2450*t*, device 600 automatically, without additional inputs, displays representation 2430*k*, where representation 2430*a* (e.g., same as representation 2430*b*) has been adjusted based on an auto adjustment algorithm.

Figure 24V:
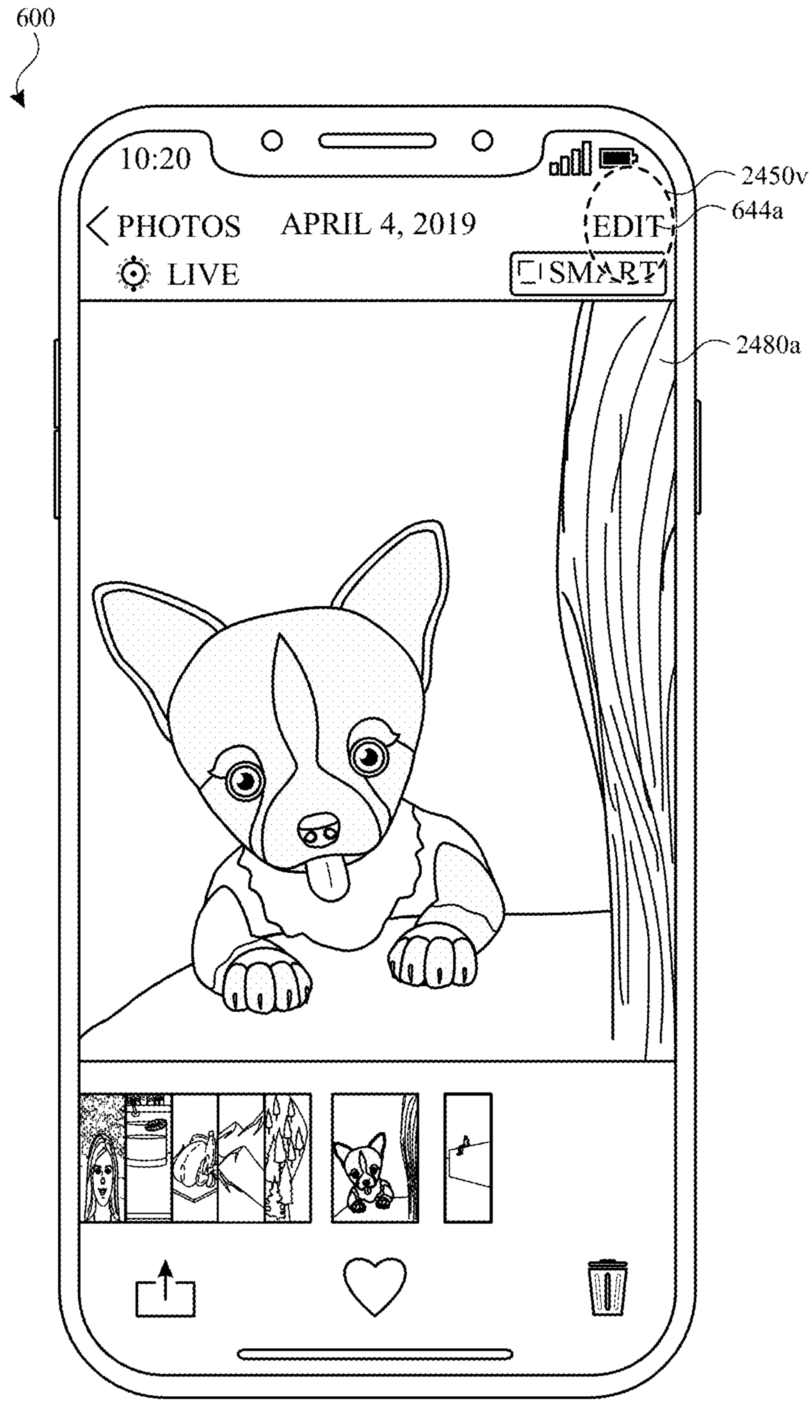

At FIG. 24U, device 600 detects gesture 2450*u* (e.g., swiping gesture) directed to representation 2430*k*. As illustrated in FIG. 24V, in response to detecting gesture 2450*u*, device 600 display representation 2480*a* of captured media. In FIG. 24V, the captured media corresponds to live animated images media.

Figure 24W:
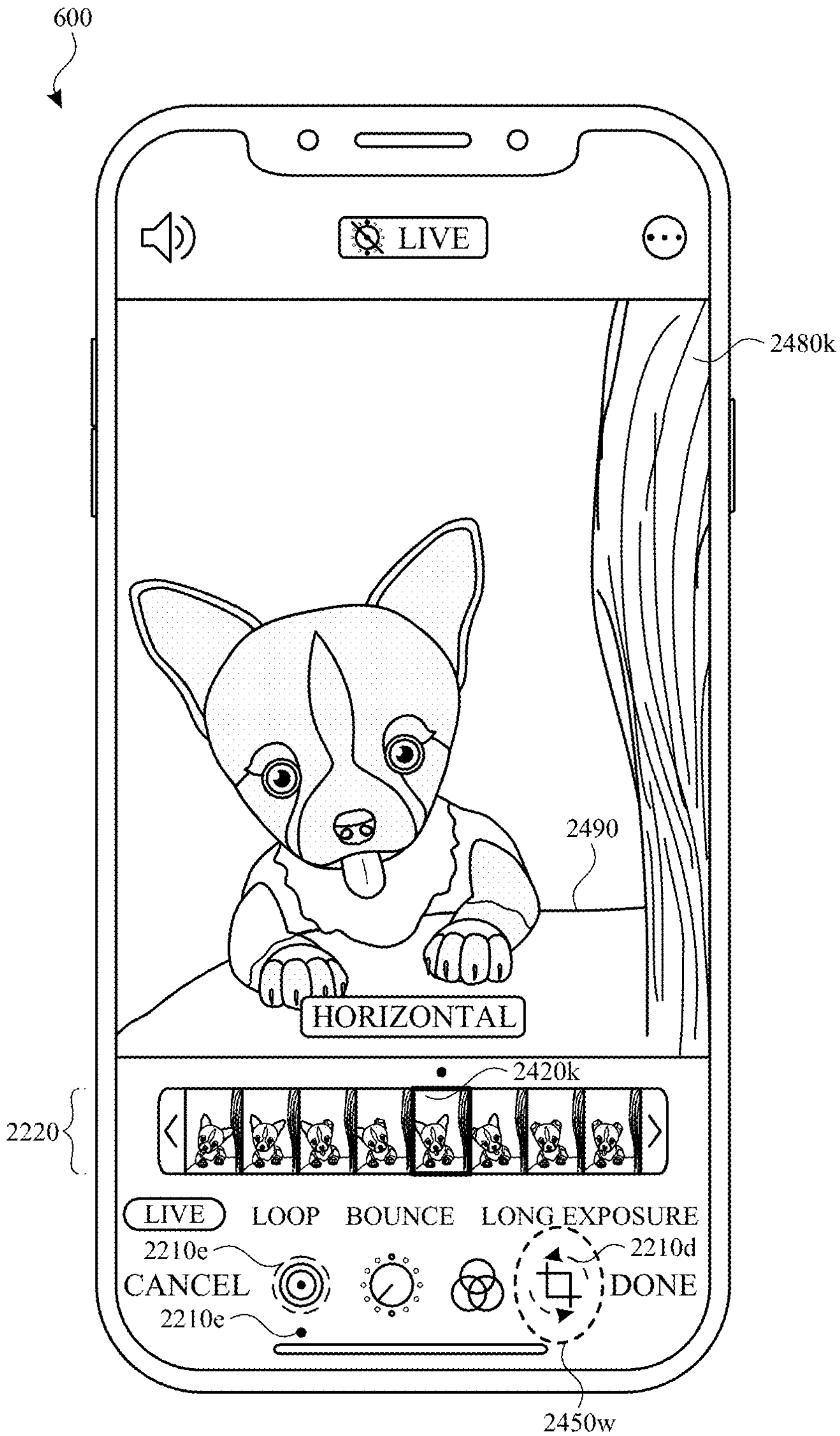
Figure 24X:
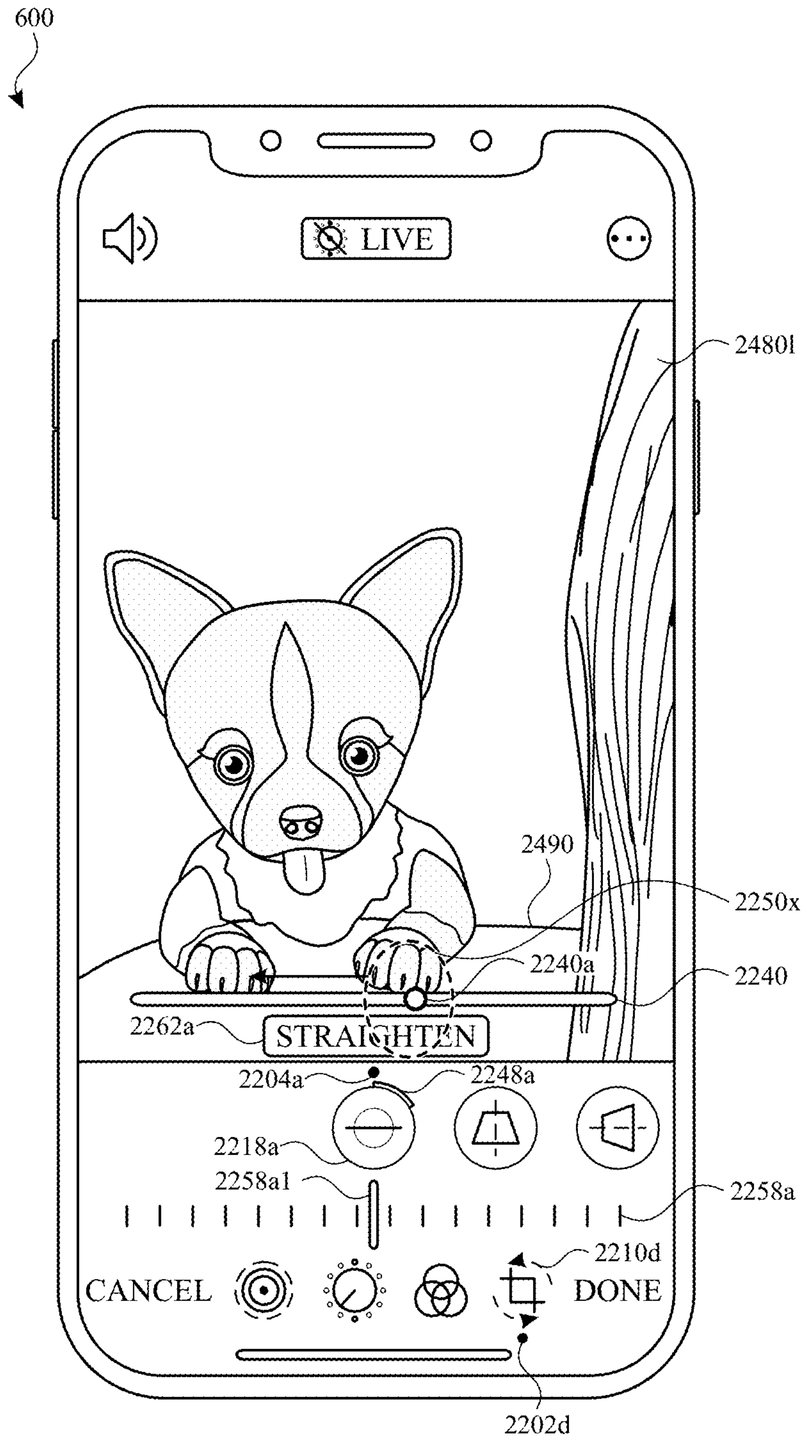
Figure 24Y:
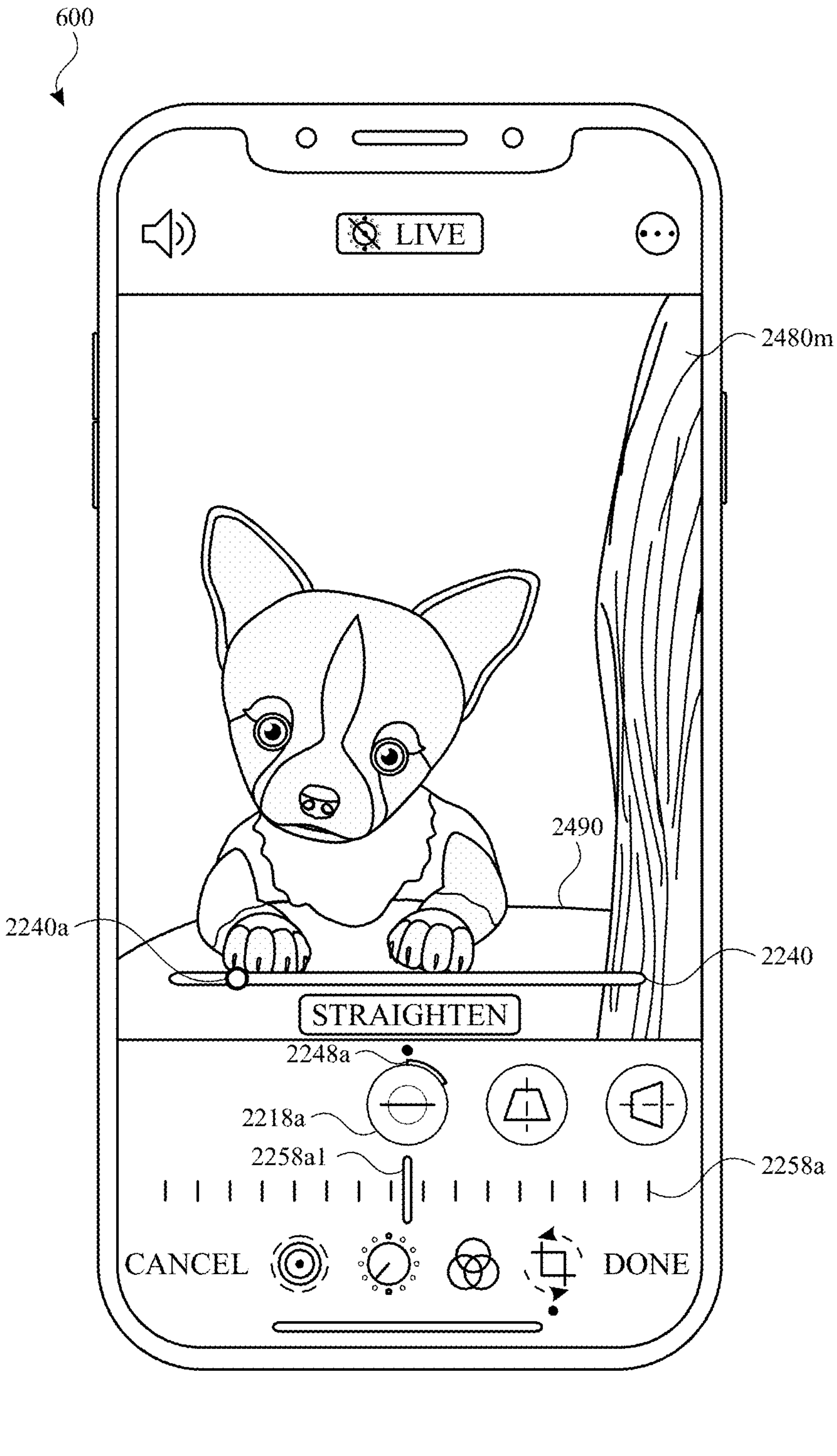
Figure 24Z:
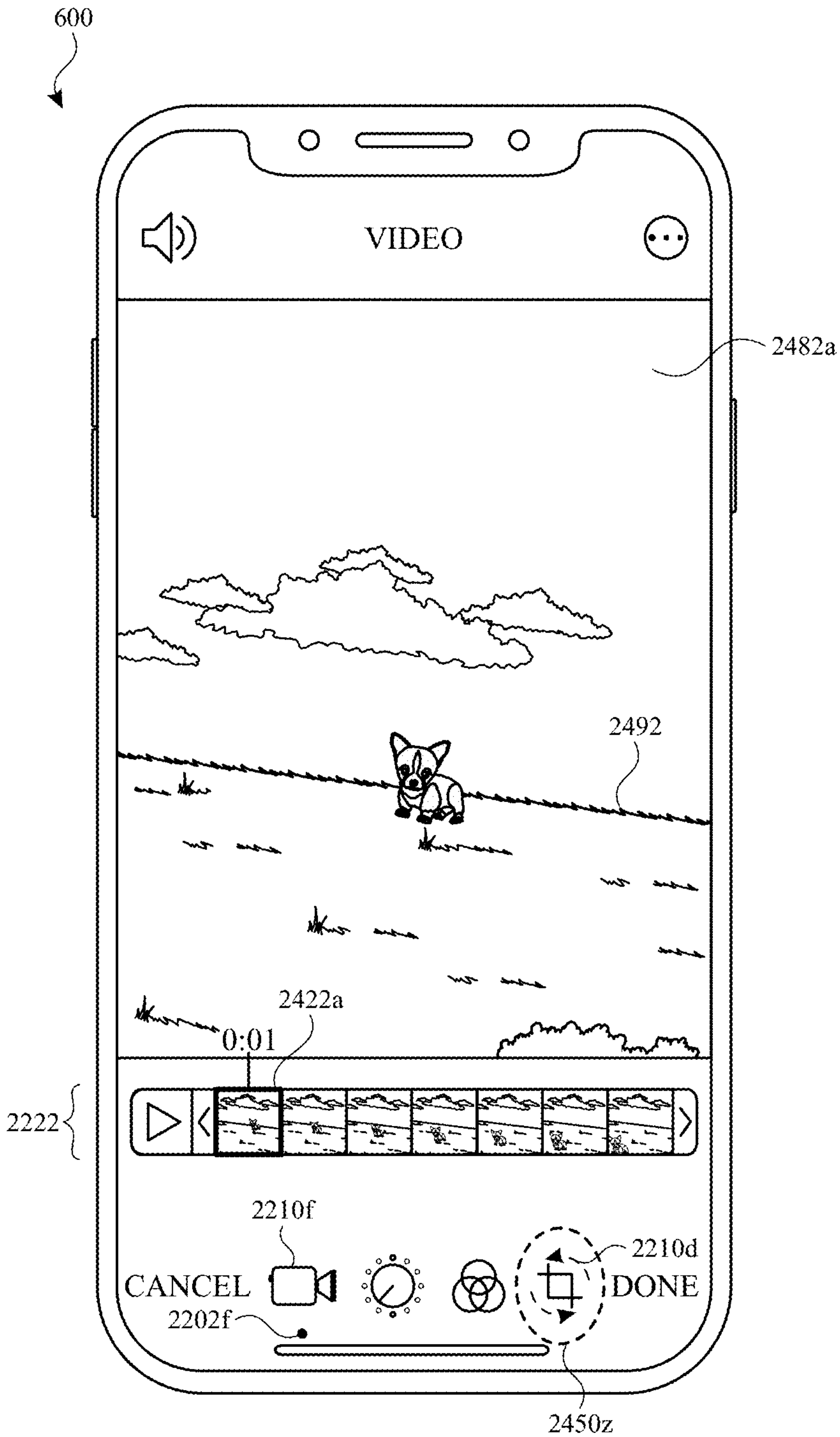
Figure 24A:
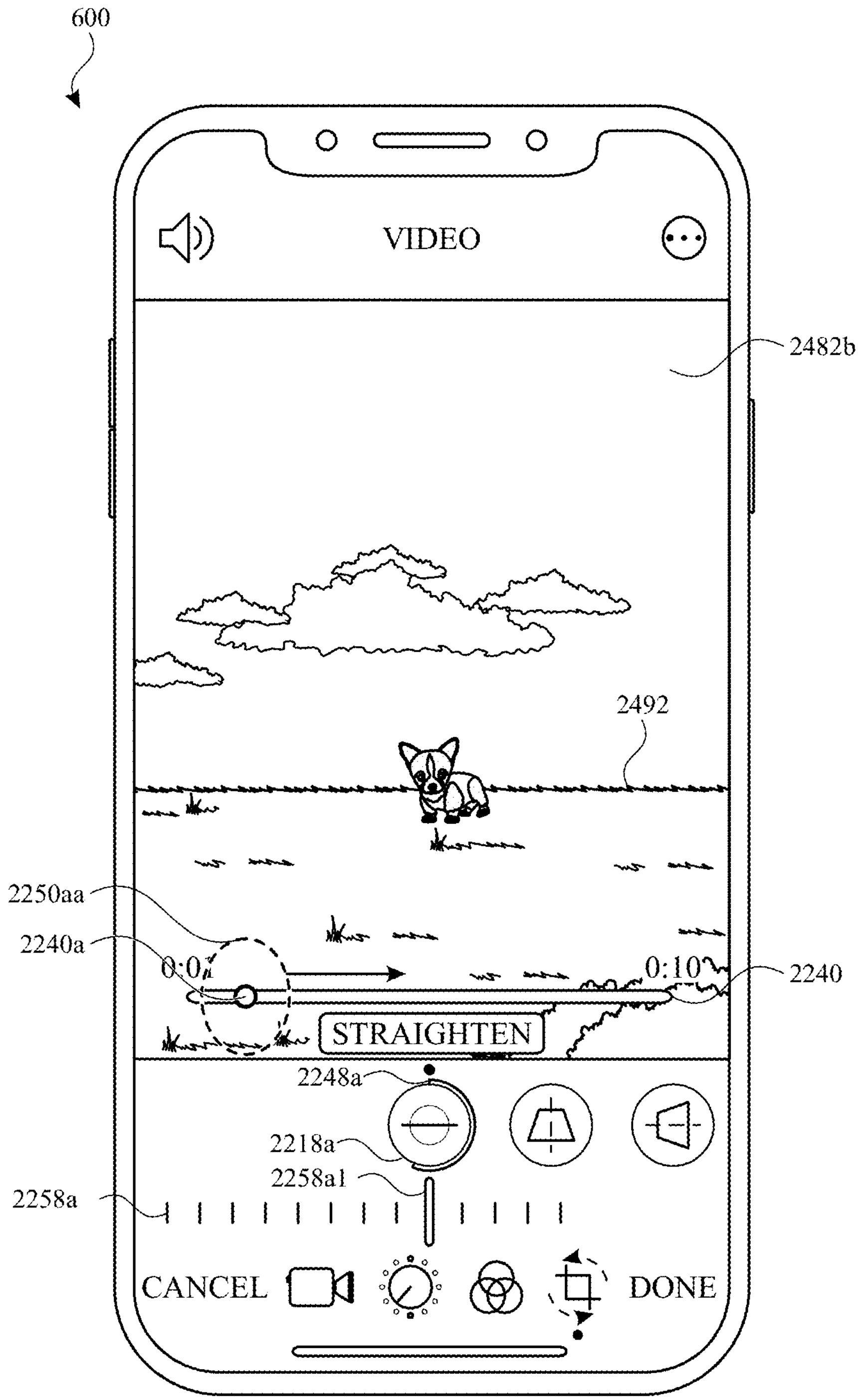
Figure 24A:
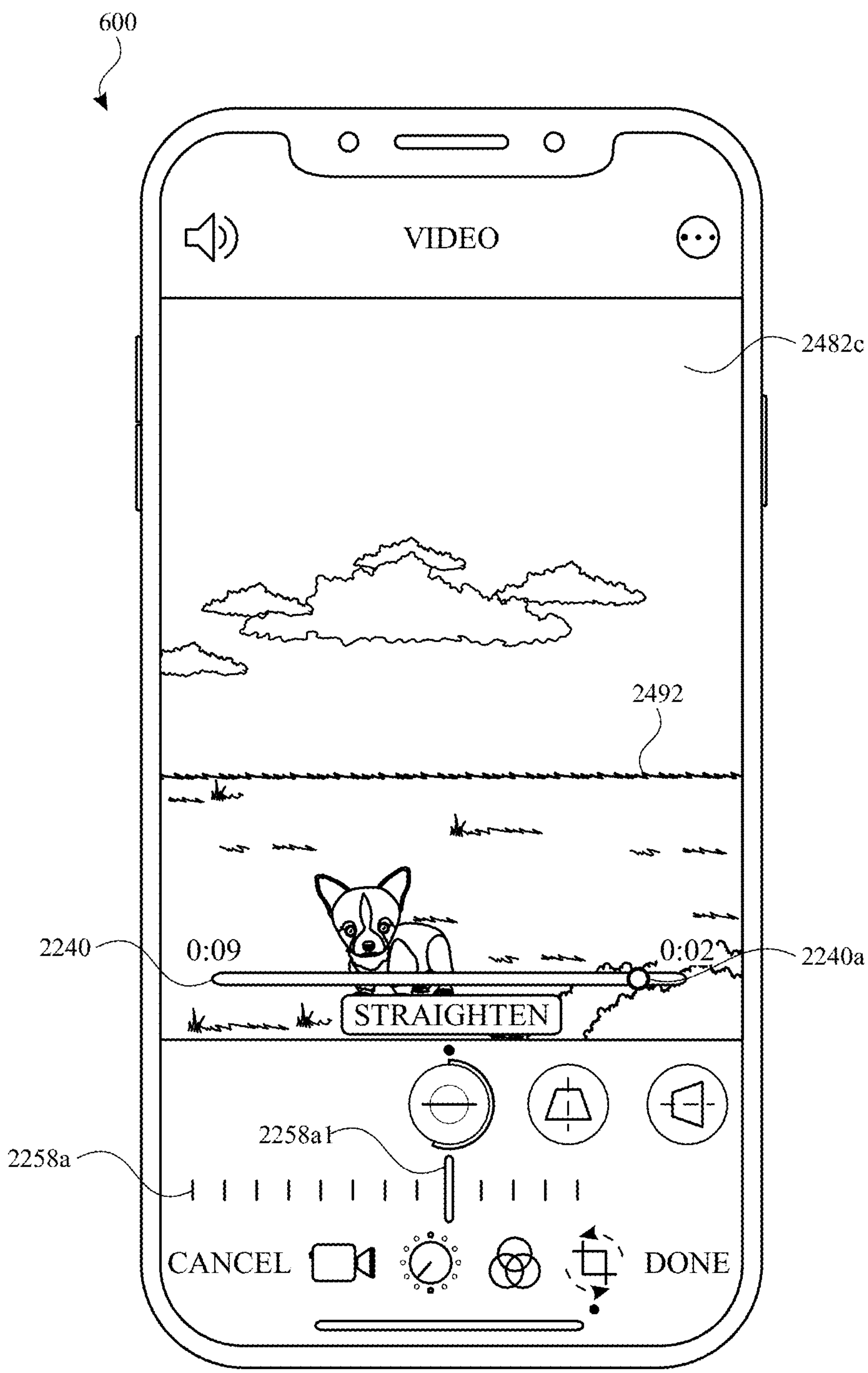

FIGS. 24V-24AB illustrate device 600 being configured to edit animated images media (e.g., FIGS. 24V-24Y) and video media (e.g., FIGS. 24Z-24AB). In particular, FIGS. 24V-24AB illustrate that the media editing user interface displays similar user interface elements when device 600 is configured to edit animated images media and video image media. In contrast to FIGS. 22AE-22AM, where a visual characteristic of the media (e.g., brightness, auto visual characteristic value) was used to edit the animated images media and video image media, FIGS. 24V-24AB illustrate that image content can be used to edit the animated images media and video image media in a similar way (e.g., changing the position of the horizon of a representation).

As illustrated in FIG. 24V, device 600 displays representation 2480*k* of captured animated images media. Because representation 2480*k* is a representation of animated images media, device 600 displays animated images media editing mode affordance 2210*e*. Because animated images media editing mode affordance 2210*e* is selected, as shown by mode selection indicator 2202*e* under animated images media editing mode affordance 2210*e*, device 600 displays animated images media affordances 2220 (as discussed above in relation to FIG. 22AE).

At FIG. 24V, device 600 detects tap gesture 2450*v* at a location that corresponds to image content editing mode affordance 2210*d*. As illustrated in FIG. 24W, in response to detecting tap gesture 2450*v*, device 600 displays scrubber 2240 with scrubber indication control 2240*a* at a position that corresponds to the location of representation 2480*k* (or thumbnail representation 2420*k*) in the animated images media. In addition, device 600 replaces animated images media affordances 2220 with image content editing tool affordances 2218 and displays mode selection indicator 2202*d* under image content editing mode affordance 2210*d*, using similar techniques to those discussed in relation to FIG. 24C.

At FIG. 24W, device 600 detects tap gesture 2450*w*. As illustrated in FIG. 24X, in response to detecting tap gesture 2450*w*, device 600 automatically, without user input, straightens representation 2480*k* to display representation 24801. At FIG. 24X, device 600 detects gesture 2450*x* (e.g., a leftward dragging gesture) directed to scrubber 2240. As illustrated in FIG. 24V, in response to detecting gesture 2450*x*, device 600 moves scrubber indication control 2240*a* to a new position on scrubber 2240. In particular, device 600 moves scrubber indication control 2240*a* to a new position that is to the left of the position of scrubber indication control 2240*a* in FIG. 24X. Further, in response to detecting gesture 2450*x*, device 600 replaces representation 24801 with representation 2480*m*. Representation 2480*m* shows one of the animated images at a time that corresponds to the new position of scrubber indication control 2240*a* on scrubber 2240. Thus, representation 2480*m* corresponds to a different time in the animated images media from the time in the animated images media to which representation 24801 (e.g., or 2480*k*) corresponded. As illustrated in FIG. 24V, although device 600 adjusted one or more current values of image content editing tool affordances 2218 while displaying representation 2480*k* to display representation 24801, representation 2480*m* is also adjusted based on the adjusted one or more current values of image content editing tool affordances 2218. Thus, adjusting one of the representations at a particular time in the animated images media also adjusts other representations at a different time in animated images media. So, even if a representation of the animated images media is not displayed while device 600 adjusts one or more current values associated with one or more image content editing tool values, scrubber 2240 can be used by a user to view the changes to the representations after adjusting the one or more current values. Device 600 completes a similar process for video media as shown in FIGS. 24Z-24AB. As illustrated in FIGS. 24AA and 24AB, after adjusting an image content value in FIGS. 24Z-24AA, device 600 scrubber 2240 can be used by a user to view the changes to the different representations after adjusting the one or more current image values.

FIGS. 25A-25B are a flow diagram illustrating a method for editing captured media using an electronic device in accordance with some embodiments. Method 2500 is performed at a device (e.g., 100, 300, 500, 600) with a display device (e.g., a touch-sensitive display). Some operations in method 2500 are, optionally, combined, the orders of some operations are, optionally, changed, and some operations are, optionally, omitted.

As described below, method 2500 provides an intuitive way for editing captured media. The method reduces the cognitive burden on a user for editing media, thereby creating a more efficient human-machine interface. For battery-operated computing devices, enabling a user to edit media faster and more efficiently conserves power and increases the time between battery charges.

The electronic device (e.g., 600) displays (2502), via the display device (e.g., a touch-sensitive display), a first user interface (e.g., cropping user interface and/or prospective editing user interface) that includes concurrently displaying a first representation (2504) of a first visual media (e.g., an image, a frame of a video) (e.g., representation 2430*a*-2430*k*) and an adjustable control (2506) (e.g., 2258*a*-2258*c*) (e.g., a graphical control element (e.g., a slider)) that includes an indication (e.g., 2258*a*1-2258*c*1) (e.g., a slider control at a first position on the slider) of a current amount (e.g., a degree of vertical, horizontal, or horizon adjustment) of adjustment for a perspective distortion (e.g., 2218-*c*) (e.g., a distortion state, perspective distortion state (of current horizontal, vertical, parallel lines of an image) of the first visual media.

In some embodiments, the first user interface includes a first affordance (2508) (e.g., 2218*c*) that, when selected, updates the indication of the adjustable control to indicate a current amount of adjustment for a horizontal perspective distortion of the first visual media and configures the adjustable control to permit adjustment of the current amount of adjustment for the horizontal perspective distortion of the first visual media based on user input. In some embodiments, in response to detecting a tap on the horizontal-perspective-distortion-adjustment affordance, the electronic device configures the adjustable control (e.g., 2545*c*) to where the current amount of adjustment for perspective distortion of the first visual media to correspond to a current amount for adjustment for the horizontal perspective distortion. In some embodiments, the first user interface includes a second affordance (2510) (e.g., 2218*b*) that, when selected, updates the indication of the adjustable control to indicate a current amount of adjustment for a vertical perspective distortion of the first visual media and configures the adjustable control to permit adjustment of the current amount of adjustment for the vertical perspective distortion of the first visual media based on user input. In some embodiments, in response to detecting a tap on the vertical-perspective-distortion-adjustment affordance, the electronic device configures the adjustable control (e.g., 2454*b*) to where the current amount of adjustment for perspective distortion of the first visual media to correspond to a current amount for adjustment for the vertical perspective distortion.

In some embodiments, while displaying (e.g., concurrently) the first affordance (e.g., 2218*c*) and the second affordance (e.g., 2218*b*), concurrently displaying a third affordance (2512) (e.g., 2218*a*) that, when selected, updates the indication of the adjustable control to indicate a current amount of adjustment for rotating visual content in the first representation of the first visual media (e.g., to straighten a first visible horizon in the visual content). In some embodiments, in response to detecting a tap on the straightening perspective adjustment affordance, the electronic device configures the adjustable control (e.g., 2454*a*) to where the current amount of adjustment for horizon correction of the first visual media to correspond to a current amount for adjustment for the horizon correction.

While displaying, on the display device, the first user interface, the electronic device detects (2514) user input (e.g., 2450*d*, 2450*g*, 2450*i*) that includes a gesture (e.g., swiping or dragging gesture) directed to (e.g., on) the adjustable control (e.g., 2258*a*-2258*c*).

In response to detecting the user input that includes the gesture directed to the adjustable control, the electronic device displays (2516), on the display device, a second representation (e.g., 2530*c*-2430*k*) of the first visual media (e.g., an image, a frame of a video) with an respective amount of adjustment for the perspective distortion selected based on a magnitude of the gesture (e.g., adjusting the current amount of perspective distortion by a first amount when the gesture has a first magnitude and the current amount of perspective distortion adjusting the perspective distortion by a second amount that is different from the first amount when the gesture has a second magnitude that is different from the first magnitude). In some embodiments, the second representation replaces the first representation when it is displayed at a particular location (e.g., the previous location of the first representation before it cease to display). Providing an adjustable control for adjusting an editable parameter and displaying an adjusted representation in response to input directed to the adjustable control provides the user with more control of the device by helping the user avoid unintentionally changing a representation and simultaneously allowing the user to recognize that an input into the adjustable control will change a representation based on the input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the perspective distortion corresponds to horizontal perspective distortion (e.g., 2218*c*, 2436*a*-2436*b*). In some embodiments, an amount of horizontal perspective distortion of the first representation of the first visual media is different from an amount of horizontal perspective distortion of the second representation of the first visual media. In some embodiments, the first representation has reduced horizontal perspective distortion.

In some embodiments, the perspective distortion corresponds to vertical perspective distortion (e.g., 2218*b*, 2434*a*-2434*b*) (e.g., distortion of an image caused by camera angle and/or lens such that lines that are parallel in the real world are not parallel lines in the image). In some embodiments, an amount of vertical perspective distortion of the first representation of the first visual media is different from an amount of vertical perspective distortion of the second representation of the first visual media. In some embodiments, the first representation has reduced vertical perspective distortion.

In some embodiments, the first representation includes a first visible horizon (e.g., 2218*a*, 2238). In some embodiments, while the first representation of the first visual media includes the degree of rotation with respect to a visual boundary in the representation of the first visual media (e.g., a horizon (e.g., skyline) in the image), the electronic device detects an input to change the degree of rotation of the representation of the first visual media. In some embodiments, in response to detecting an input to change the degree of rotation of the representation of the first visual media (e.g., rotate visual content in representation to straighten horizon line in representation), the electronic device rotates the representation of the first visual media by an amount determined based on the input (e.g., rotating the representation of the first visual media so as to straighten a horizon of the image relative to an edge of the image).

In some embodiments, the first representation (e.g., 2430*g*) includes a first visual content of the first visual media. In some embodiments (e.g., FIGS. 24K-24L), while the first representation of the first visual media includes the first visual content (e.g., content captured when the media was captured), the electronic device detects a set of one or more inputs (e.g., tap on an automatic adjustment affordance, dragging a visual boundary to from a first position to a second position to crop the image) to change the content of the first representation. In some embodiments (e.g., FIGS. 24K-24L), in response to detecting the set of one or more inputs to change the content of the first representation of the first visual media, the electronic device displays a fourth representation of the first visual media that includes second visual content of the first visual media, different from the first visual content of the first visual media. In some embodiments (e.g., FIGS. 24K-24L), the third representation includes more visual content of the first visual media than the visual content included in the first representation. In some embodiments (e.g., FIGS. 24K-24L), the third representation includes less content of the first visual media than the visual content included in the first representation. In some embodiments, the third representation includes less content of the first visual media than the visual content included in the first representation. In some embodiments (e.g., FIGS. 24K-24L), the second visual content is additional content (e.g., content from a file corresponding to second visual media that includes visual content data that is not represented in the first representation (e.g., content and data that is useable for operations from when the media was captured)).

In some embodiments, the first user interface includes an automatic adjustment affordance (e.g., 1036*b*). In some embodiments (e.g., FIG. 24R), the electronic device detects an input (e.g., a tap gesture) corresponding to the automatic adjustment affordance. In some embodiments (e.g., FIGS.

24R-24S), in response to detecting the input corresponding to the automatic adjustment affordance, the electronic device automatically (e.g., without further user input; without user input specifying values) adjusts (e.g., based on an algorithm and characteristics of the first visual media) current values of two or more parameters of the first visual media selected from the group consisting of: a horizontal-perspective-distortion parameter (e.g., amount of horizontal perspective distortion correction), a vertical-perspective-distortion parameter (e.g., amount of vertical perspective distortion correction), a rotation parameter (e.g., amount of rotation). In some embodiments, the magnitude an direction of the selected current values of the two or more parameters are selected automatically by the device based on an analysis of content of the visual media (e.g., a greater amount of horizontal perspective distortion correction is selected when a greater amount of horizontal perspective distortion is detected based on the analysis of the visual media, a smaller amount of horizontal perspective distortion correction is selected when a smaller amount of horizontal perspective distortion is detected based on the analysis of the visual media, a greater amount of vertical perspective distortion correction is selected when a greater amount of vertical perspective distortion is detected based on the analysis of the visual media, a smaller amount of vertical perspective distortion correction is selected when a smaller amount of vertical perspective distortion is detected based on the analysis of the visual media, a greater amount of rotation is selected when a greater amount of horizon rotation is detected based on the analysis of the visual media, a smaller amount of rotation is selected when a smaller amount of horizon rotation is detected based on the analysis of the visual media. In some embodiments, the device automatically applies changes to a horizontal-perspective-distortion parameter (e.g., amount of horizontal perspective distortion correction), a vertical-perspective-distortion parameter (e.g., amount of vertical perspective distortion correction) and a rotation parameter (e.g., amount of rotation), and visual content parameter. In some embodiments, the representation of the visual content is automatically cropped (e.g., to display more or less content) while adjusting the other parameters. In some embodiments, in response to detecting the input corresponding to the automatic adjustment affordance, the electronic device displays (e.g., automatically) a fifth representation of the first visual media based on the adjusted current values of the two or more adjusted parameters. Automatically updating a representation based on an auto adjustment algorithm allows a user to quickly determine how the auto adjustment algorithm has changed the representation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (e.g., 24R-24U), while displaying the first user interface that includes the automatic adjustment affordance, the electronic device detects a second set of one or more inputs (e.g., a tap on an affordance for navigating to the third user interface) corresponding to a request to display a third user interface that is different than the first user interface. In some embodiments (e.g., 24R-24U), in response to detecting the second set of one or more inputs, the electronic device displays (e.g., prior to displaying the media editing user interface, after displaying the media editing user interface), on the display device, a third user interface (e.g., a media viewer interface (e.g., media gallery)). In some embodiments (e.g., 24R-24U), displaying the third user interface includes displaying a representation of at least a portion of the visual content of a second visual media. In some embodiments (e.g., 24R-24U), in accordance with a determination that the second visual media includes additional visual content that is outside of predetermined spatial bounds (e.g., outside of an originally captured frame of the visual content or outside of a currently cropped frame of the visual content) of the visual content (e.g., visual content not represented in the representation of at least a portion of the visual content of a second visual media) (e.g., a file corresponding to the second visual media includes visual content data that is not represented in the representation (e.g., content and data that is useable for operations, including edit operations)), the electronic device displays the automatic adjustment interface (e.g., 1036*b* in FIG. 24R). In some embodiments, in accordance with a determination that the second visual media does not include additional visual content that is outside of predetermined spatial bounds (e.g., outside of an originally captured frame of the visual content or outside of a currently cropped frame of the visual content) of the visual content (e.g., visual content not represented in the representation of at least a portion of the visual content of a second visual media), the electronic device forgoes displaying the automatic adjustment interface.

In some embodiments (e.g., 24R-24U), the first representation of the first visual media is a representation of (e.g., is based on) a first portion of visual content of the first visual media that does not include additional visual content that is outside of predetermined spatial bounds (e.g., outside of an originally captured frame of the visual content or outside of a currently cropped frame of the visual content) of the visual content that was also captured when the first visual media was captured. In some embodiments, the second representation of the first visual media includes at least a portion of the additional visual content that is outside of predetermined spatial bounds (e.g., outside of an originally captured frame of the visual content or outside of a currently cropped frame of the visual content) of the visual content that was also captured when the first visual media was captured (e.g., the perspective distortion of the second representation is generated using visual content data (e.g., content data that was captured and stored at the time the second media was captured) that was not used to generate the first representation).

In some embodiments, the first representation of the first visual media is displayed at a first aspect ratio (e.g., FIG. 24J). In some embodiments, the first user interface includes an aspect ratio affordance (e.g., 626*c*). In some embodiments, while displaying the first representation of the first visual media, the electronic device detects a user input corresponding to the aspect ratio affordance. In some embodiments, in response to detecting the user input corresponding to the aspect ratio affordance, the electronic device displays a sixth representation of the first visual media at a second aspect ratio, different from the first aspect ratio (e.g., FIG. 24K). In some embodiments, the aspect ratio button has an adjustable control (e.g., slider) that is used to adjust the aspect ratio of a representation of the first visual media. Automatically changing the aspect ratio of a previously displayed aspect ratio in response to receiving user input allows a user to see the change of the aspect ratio on a representation without rotating the representation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first representation of the first visual media is displayed in a first orientation (e.g., an original orientation, a non-rotated orientation). In some embodiments, the first aspect ratio has a first horizontal aspect value (e.g., a length) and a first vertical aspect value (e.g., 2430*d*). In some embodiments, the first user interface includes an aspect ratio affordance (e.g., 626*c*1 or 626*c*2). In some embodiments, while displaying the first representation of the first visual media, the electronic device displays a user input corresponding to the aspect ratio affordance (e.g., 2450*m*). In some embodiments, in response to detecting the user input corresponding to the aspect ratio affordance, the electronic device displays visual feedback indicating a portion of the first visual media corresponding to a third aspect ratio that is different from the first aspect ratio without rotating the first representation of the first visual media (e.g., FIG. 24N; 608). In some embodiments, the third aspect ratio has a second horizontal aspect ratio value equal to the first vertical aspect ratio value. In some embodiments, the third aspect ratio has a second vertical aspect ratio value equal to the first horizontal aspect ratio value (e.g., the second aspect ratio is a reversal (e.g., reciprocal) of the first aspect ratio value (e.g., 4:3 in comparison to 3:4; 16:9 in comparison to 9:16)). Automatically displaying the reciprocal aspect ratio of a previously displayed aspect ratio in response to receiving user input allows a user to see the change of the aspect ratio on a representation without rotating the representation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first visual media includes a plurality of frames of content corresponding to different times (e.g., a live photo or a video) (e.g., FIGS. 24Y-24AB), the electronic device displays an adjustable control for adjusting which frame of content corresponding to the first visual media is displayed along with one or more controls for adjusting perspective distortion, cropping and/or rotation of the image. In some embodiments (e.g., FIGS. 24Y-24AB), in accordance with a determination the first visual media does not include a plurality of frames of content corresponding to different time, the electronic device forgoes to display an adjustable control for adjusting which frame of content corresponding to the first visual media is displayed along with one or more controls for adjusting perspective distortion, cropping and/or rotation of the image. Displaying frames of content at different time frames in visual media allows a user visual feedback of how a change to an editable parameter effects two or more particular frames of the media (e.g., video) without having the user to reapply a particular change to an editable parameter to each frame of the media. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (e.g., FIGS. 24Y-24AB), a visual boundary (e.g., 608) is displayed around a first portion of a seventh representation of the first visual media, the seventh representation corresponding to a first time in the first visual media. In some embodiments, while displaying the adjustable control (e.g., 2240, 2240*a*) for adjusting which frame of content corresponding to the first visual media is displayed, the electronic device detects a request to select a time-based representation of the first visual media that corresponds to a respective time. In some embodiments, in response to detecting the request to select the time-based representation of the first visual media that corresponds to a respective time, the electronic device displays an eighth representation of the first visual media that corresponds to a second time in the first visual media (e.g., 6 minutes into the video). In some embodiments (e.g., FIGS. 24Y-24AB), in response to detecting the request to select the time-based representation of the first visual media that corresponds to a respective time, the electronic device maintains display of visual boundary. In some embodiments, the visual boundary is displayed around a first portion of the eighth representation of the first visual media. In some embodiments (e.g., FIGS. 24Y-24AB), the adjustable control for selecting a time-based representation of the first visual media that corresponds to a respective time (e.g., does not update based on the representation that is displayed) is displayed at a respective location (e.g., a fixed location) on the display device (e.g., cropping frame displayed at a fixed location on the video, cropping frame stays at the fixed location while different frames of the video are displayed). Displaying frames of content at different time frames in visual media allows a user visual feedback of how a change to an editable parameter effects two or more particular frames of the media (e.g., video) without having the user to reapply a particular change to an editable parameter to each frame of the media. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (e.g., FIGS. 24C-24F), the first representation of the first visual media is displayed at a first zoom level (e.g., 1× zoom; a first magnification level). In some embodiments (e.g., FIGS. 24C-24F), while displaying the first representation of the first visual media, the electronic device detects a request to change (e.g., 2450*e*) (e.g., a pinch or de-pinch gesture) a zoom level of a representation of the first visual media. In some embodiments (e.g., FIGS. 24C-24F), in response to detecting the request to change the zoom level of the representation of the first visual media, the electronic device displays a ninth representation of the first visual media at a second zoom level (e.g., 2X zoom) (e.g., based on the magnitude of the gesture directed to changing a zoom level of the representation), different from the first zoom level. In some embodiments (e.g., FIGS. 24C-24F), the electronic device is configured to adjust/edit the image at the second zoom level. In some embodiments, while the ninth representation is displayed at the first zoom level (e.g., FIGS. 24C-24F), the electronic device can adjust the representation such that the adjustments are maintained when another representation of the visual media is displayed at a different zoom level. Displaying a representation at different zoom levels and allowing a user to change a particular characteristic of the representation while at a certain zoom level that applies to the representation at all zoom levels allows the user to apply a particular change without having to reapply the particular change at all zoom levels a representation. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (e.g., FIG. 24A), the first representation (e.g., 2430*b*) of the first visual media includes perspective distortion based on a shape of a camera lens and/or position of the camera (e.g., the first representation has an unmodified (e.g., original perspective) corresponding to the perspective of a camera used to capture the first visual media, at the time the media was captured; the first representation does not include any added perspective distortion). In some embodiments (e.g., FIG. 24F), the second representation (e.g., 2430*e*) (e.g., of the first visual media is adjusted to reduce the perspective distortion based on the shape of a camera lens and/or position of the camera (e.g., the second representation of the first visual media has a simulated perspective that is different than the unmodified (e.g., original perspective), the simulated perspective is other than a perspective of the camera used to capture the first visual media, at the time the media was captured)).

In some embodiments (e.g., FIGS. 24B-24J), the adjustable control (2258*a*-2258*c*) corresponds to a control for correcting perspective distortion. In some embodiments (e.g., FIGS. 24B-24J), the electronic device, in response to detecting the user input (e.g., user input directed to 2258*a*-2258*c*) that includes the gesture directed to the adjustable control, updates (e.g., moving display of the indication or displaying the indication at a second location) the amount of correction for perspective distortion in accordance with a direction and/or magnitude of the gesture directed to the adjustable control (e.g., increasing the amount of correction if the gesture is in a first direction, decreasing the amount of correction of the gesture is in a second direction that is opposite to or substantially opposite to the first direction, with a magnitude of change in the amount of correction that is selected based on a distance and/or speed of movement of the gesture such as changing the amount of correction by a greater amount for a greater distance and/or speed of movement of the gesture, and changing the amount of correction by a smaller amount for a smaller distance and/or speed of movement of the gesture (and, optionally, changing indication of the current amount (e.g., a degree of vertical, horizontal, or horizon adjustment) of adjustment for the perspective distortion to correspond to the respective amount of adjustment for the perspective distortion). Providing different adjustable controls for correcting perspective distortion allows the user with more control of the device by helping the user avoid unintentionally changing a representation in a way that is not desired and simultaneously allowing the user to recognize that an input into the adjustable control will change a representation based on the input. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2500 (e.g., FIGS. 25A-25B) are also applicable in an analogous manner to the methods described above. For example, methods 700, 900, 1100, 1300, 1500, 1700, 1900, 2100, 2300, 2700, 2800, 3000, 3200, 3400, 3600, and 3800 optionally include one or more of the characteristics of the various methods described above with reference to method 2500. For brevity, these details are not repeated below.

FIGS. 26A-26U illustrate exemplary user interfaces for managing media using an electronic device in accordance with some embodiments. The user interfaces in these figures are used to illustrate the processes described below, including the processes in FIGS. 27A-27C and FIGS. 28A-28B.

In particular, FIGS. 26A-26U illustrate device 600 operating in several environments that have different levels of light (e.g., visible and/or ambient light). An environment having an amount of light above a low-light threshold (e.g., a threshold such as 20 lux) will be referred to as a normal environment. An environment that has an amount of light below a low-light threshold (e.g., a threshold such as 20 lux) will be referred to as a low-light environment. Moreover, the low-light environment will be further separated into three categories. A low-light environment that has an amount of light between a first range of light (e.g., 20-10 lux) will be referred to as a standard low-light environment. A low-light environment that has an amount of light between a second range of light (e.g., 10-1 lux) will be referred to as a substandard low-light environment. And a low-light environment that has an amount of light between a third range of light (e.g., below a threshold value such as 1 lux) will be referred to an extremely substandard low-light environment. In the examples below, device 600 detects, via one or more cameras, whether there is a change in the amount of light in an environment (e.g., in the field-of-view of one or more cameras (FOV) of device 600) and determines whether device 600 is operating in a low-light environment or a normal environment. When device 600 is operating in a low-light environment, device 600 (e.g., or some other system or service connected to device 600) will determine whether it is operating in a standard low-light environment, a substandard low-light environment, or an extremely substandard low-light environment. When device 600 is operating in a standard low-light environment, device 600 will not automatically turn on a low-light mode without additional input (e.g., a mode whether the device captures a plurality of images according to a capture duration in response to a request to capture media). On the other hand, when device 600 is operating in a substandard or extremely substandard low-light environment, device 600 will automatically turn on low-light mode without additional user input. While device 600 will automatically turn on low-light mode without additional user input when it is operating in the substandard or extremely substandard low-light environment, device 600 will be automatically configured to capture media in low-light mode differently for each environment. When device 600 is operating in a substandard low-light environment, device 600 will automatically be configured to capture media based on a fixed low-light capture duration (e.g., one or two seconds). However, when device 600 is operating in an extremely substandard low-light environment, device 600 will automatically, without additional user input, be configured to capture media based on a capture duration that is longer than the fixed low-light capture duration. To improve understanding, some of FIGS. 26A-26U include a graphical illustration (e.g., light graph 2680) that illustrates the amount of light that device 600 is detecting in the FOV. In some embodiments, one or more techniques discussed in FIGS. 18A-18X, 19A-19B, 20A-20C, and/or 21-21C may be optionally combined with one or more techniques of FIGS. 26A-26U, FIGS. 27A-27C, and FIGS. 28A-28B discussed below.

FIG. 26A illustrates electronic device 600 displaying a camera user interface that includes live preview 630 that extends from the top of device 600 to the bottom of device 600. Live preview 630 is based on images detected by one or more camera sensors (e.g., and/or cameras) and is a representation of the FOV. In some embodiments, live preview 630 is only a portion of the screen that does not extend to the top and/or bottom of device 600. In some embodiments, device 600 capture images using a plurality of camera sensors and combines them to display live preview 630 (e.g., different portions of live preview 630). In some embodiments, device 600 captures images using a single camera sensor to display live preview 630.

The camera user interface of FIG. 26A includes indicator region 602 and control region 606, which are overlaid on live preview 630 such that indicators and controls can be displayed concurrently with live preview 630. Camera display region 604 is positioned between indicator region 602 and control region 606. Camera display region 604 is not substantially overlaid with indicators or controls.

As illustrated in FIG. 26A, indicator region 602 is overlaid onto live preview 630 and optionally includes a colored (e.g., gray; translucent) overlay. Indicator region 602 includes flash status indicator 602*a*. Flash status indicator 602*a* indicates whether a flash mode (e.g., a mode that controls a flash operation in response to a request to capture media) is in an automatic mode, on, off, or in another mode (e.g., red-eye reduction mode).

As illustrated in FIG. 26A, camera display region 604 includes live preview 630 and zoom affordances 2622. Zoom affordances 2622 includes 0.5× zoom affordance 2622*a,* 1× zoom affordance 2622*b*, and 2× zoom affordance 2622*c*. In this example, 1× zoom affordance 2622*b* is selected, which indicates that device 600 is displaying live preview 630 at a 1× zoom level.

As illustrated in FIG. 26A, control region 606 is overlaid onto live preview 630 and optionally includes a colored (e.g., gray; translucent overlay). Control region 606 includes camera mode affordances 620, a portion (e.g., a representation of media) of media collection 624, shutter affordance 610, and camera switcher affordance 612. Camera mode affordances 620 indicate which camera mode is currently selected and enables the user to change the camera mode.

As illustrated in FIG. 26A, device 600 detects that the amount of light in the FOV is 25 lux, which is represented by current light level 2680*a* on light graph 2680. Because the amount of light in the FOV (25 lux) is above the low-light threshold (e.g., a threshold such as 20 lux), device 600 is operating in a normal environment. Thereby, device 600 forgoes operating in the low-light mode. Device 600 continuously captures data in the FOV and updates live preview 630 based on a standard frame rate (e.g., a frame rate that device 600 normally uses to capture media while it is not operating in a low-light mode). At FIG. 26A, device 600 detects tap gesture 2650*a* at a location that corresponds to shutter affordance 610.

As illustrated in FIG. 26B, in response to detecting tap gesture 2650*a*, device 600 captures media representative of the FOV and displays a representation 2624*a* of the newly captured media as the portion of media collection 624. When device 600 captures the newly capture media, device 600 captures a single image and displays a representation of the single image as the portion of media collection 624.

As illustrated in FIG. 26B, at some in time after detecting tap gesture 2650*a*, device 600 detects that the amount of light in the FOV has changed to 15 lux, as represented by current light level 2680*b*. Because device 600 is operating in a standard low-light environment (e.g., between 20-10 lux), device 600 displays low-light mode status indicator 602*c* adjacent to flash status indicator 602*a*. Low-light mode status indicator 602*c* indicates that low-light mode is available, but is currently inactive. Low-light mode is available when low-light mode is initially off (e.g., off by default), but can be turned on by selecting low-light mode status indicator 602*c*. At FIG. 26B, device 600 detects tap gesture 2650*b* at a location that corresponds to low-light mode status indicator 602*c*.

As illustrated in FIG. 26C, in response to detecting tap gesture 2650*b*, device 600 updates low-light mode status indicator 602*c* to indicate that low-light mode is active. While low-light mode status indicator 602*c* indicates that the status of low-light mode is active, device 600 is configured to capture media in low-light mode in response to a request to capture media. In response to detecting tap gesture 2650*b*, device 600 displays adjustable low-light mode control 1804 in control region 606. Adjustable low-light mode control 1804 can be used to set (e.g., via indication 1818 being at a position on adjustable low-light mode control 1804 that corresponds to a particular capture duration) a capture duration for capturing media in the low-light mode. In particular, adjustable low-light mode control 1804 includes several capture duration states, including off state 2604*a* (illustrated in FIG. 26U), default state 2604*b*, and max state 2604*c* (illustrated in FIG. 26K). Further, in response to detecting tap gesture 2650*b*, adjustable low-light mode control 1804 is automatically set to default state 2604*b* (e.g., "Auto is"), which corresponds to the fixed capture duration (e.g., capture duration on one second).

In FIG. 26C, off state 2604*a* and max state 2604*c* are not illustrated given the current position of indication 1818. Off state 2604*a*, as illustrated in FIG. 26U, is the leftmost tick mark on adjustable low-light mode control 1804. Setting adjustable low-light mode control 1804, via indication 1818, to the leftmost tick mark on adjustable low-light mode control 1804 causes device 600 to turn off low-light mode and capture media based on a standard frame rate in response to receiving a request to capture media (e.g., as described below in FIG. 26U). Max state 2604*c*, illustrated in FIG. 26K, is the rightmost tick mark on adjustable low-light mode control 1804. Setting adjustable low-light mode control 1804, via indication 1818, to the leftmost tick mark on adjustable low-light mode control 1804 causes device 600 to capture media based on a maximum capture duration (e.g., as described below in relation to FIGS. 26J-26Q).

As illustrated in FIG. 26C, in response to detecting tap gesture 2650*b*, device 600 determines a capture duration that corresponds to default state 2604*b* and a capture duration that corresponds to max state 2604*c*. These capture durations are calculated based on certain environmental conditions associated with the capture of media. The environmental conditions include conditions such as the stabilization of device 600, light detected in the FOV, and movement of one or more objects with the FOV. Device 600 determines a higher/lower capture (e.g., each state independently) based on an analysis of one or more of these environmental conditions. For example, a higher level of stability, a lower level of light in the FOV, and a lower level of movement of objects in the FOV cause device 600 to compute higher capture duration that corresponds to one or more states (e.g., default state 2604*b* and/or max state 2604*c*). In some embodiments, a change in one or more of the environmental conditions causes device 600 to change one capture duration state while maintaining another capture duration state. In other words, in some embodiments, different environmental conditions affect the capture duration for each state differently.

As illustrated in FIG. 26C, because device 600 is highly stabilized, the objects (e.g., person standing still in live preview 630) in the are substantially not moving, and device 600 is operating in a standard low-light environment, device 600 determines that the capture duration that corresponds to the default state 2604*b* is the fixed low-light capture duration value (one second). At FIG. 26C, device 600 detects tap gesture 2650*c* at a location that corresponds to low-light mode status indicator 602*c*.

At illustrated in FIG. 26D, in response to detecting tap gesture 2650*c*, device 600 updates low-light mode status indicator 602*c* to indicate that the low-light mode is inactive. While the low-light mode status indicator indicates that the status of the low-light mode is inactive, device 600 is not configured to capture media in the low-light mode. Further, in response to detecting tap gesture 2650*c*, device 600 ceases to display adjustable low-light mode control 1804 because low-light mode is currently set to inactive. In some embodiments, in response to detecting tap gesture 2650*c*, device 600 updates low-light mode status indicator 602*c* to indicate that the low-light mode is available (e.g., low-light mode is inactive, but the indicator 602*c* is visually distinguishable an indicator that indicates that low-light mode is set to inactive). At FIG. 26D, after detecting tap gesture 2650*c*, device 600 detects a change in light in the FOV.

As illustrated in FIG. 26E, in response to detecting a change in light in the FOV, device 600 detects that the amount of light in the FOV is 5 lux, as represented by current light level 2680*c*. After detecting that the amount of light in FOV is 5 lux, device 600 determines that device 600 is operating in a substandard low-light environment (e.g., between 10-1 lux). Because device 600 is operating in the substandard low-light environment, device 600 displays low-light mode status indicator 602*c* adjacent to flash status indicator 602*a*. Further, because device 600 determines that device 600 is operating in a substandard low-light environment, device 600 displays low-light mode status indicator 602*c* with a status that indicates that low-light mode is active and turns low-light mode on. Here, device 600 automatically, without additional user input, turns on low-light mode after detecting that it is operating in a substandard low-light environment as opposed to when device 600 detected that is was operating in the standard low-light environment (e.g., as discussed in FIG. 26B). Notably, because the light in the FOV is lower than the light in the standard low-light environment, it may be more useful to users if device 600 automatically turns on low-light mode when operating in darker environment (e.g., substandard low-light environment as compared to standard low-light environment because users may capture media in low-light mode more often in response to detecting a request to capture media. Thereby, device 600 is automatically set to capture media in low-light mode in response to detecting a request to capture media (e.g., tap gesture directed to shutter affordance 610) without having low-light mode manually turned on (e.g., tap gesture directed to low-light mode status indicator 602*c*) or displaying adjustable low-light mode control 1804. In some embodiments, when device 600 turns on low-light mode, device 600 automatically, without additional user input, switches from using a first type of camera (e.g., a camera with a narrow field-of-view (e.g., telephoto camera)) to a second type of camera (e.g., a camera with a wide field-of-view (e.g., wide-angle or ultra-wide angle camera)) that is different from the first type of cameras (or, in some embodiments, device 600 automatically, without additionally user input, switches from using the second type of camera to the first type of camera). At FIG. 26E, device 600 detects tap gesture 2650*e* at a location that corresponds to low-light mode status indicator 602*c*.

As illustrated in FIG. 26F, in response to detecting tap gesture 2650*e*, device 600 displays adjustable low-light mode control 1804 in control region 606 (and maintains the status and display of low-light mode status indicator 602*c*). Adjustable low-light mode control 1804, via indication 1818, is set to a one-second capture duration, which is also the capture duration that device 600 determined should correspond to default state 2604*b*. In some embodiments, device 600, instead, determines that default state 2604*b* should correspond to a capture duration that is above the minimal capture duration (e.g., 2*s*) or a capture duration that is different from the capture duration of default state 2604*b* when device 600 was operating in the standard low-light environment (e.g., as discussed in FIG. 26C). At FIG. 26F, device 600 detects tap gesture 2650*f* at a location that corresponds to shutter affordance 610.

As illustrated in FIG. 26G, in response to detecting tap gesture 2650*f*, device 600 capture media based on the one-second capture duration (e.g., default state 2604*b*). When capturing media based on the one-second capture duration (or any other capture duration) while device 600 is configured to capture media in low-light mode, device 600 capture multiple images over a period of time that corresponds to the capture duration. After capturing the images, device 600 generates a composite image by combining the captured images (e.g., by combining data from the captured images) (e.g., using similar techniques to those described above in relation to FIGS. 18A-18X). At FIG. 26G, after generating the composite image, device 600 updates the portion of media collection 624 to display representation 2624*b* of the newly captured media. While representation 2624*b* is visually darker than representation 2624*a* displayed in FIG. 26B, representation 2624*b* is visually lighter than a representation of media at 5 lux when the device is not configured to capture media in low-light mode (e.g., using the standard frame rate).

Turning back to FIG. 26B, in some embodiments, when device 600 detects a tap gesture at a location that corresponds to shutter affordance 610 in FIG. 26B, device 600 generates a composite image from a plurality of images, even though the low-light mode is not set to active. In some embodiments, device 600 captures a smaller number of images to generate the composite image in response to detecting a tap gesture in FIG. 26B than the number of images used to generate the composite image represented by representation 2624*b* in FIG. 26B. In other words, in some embodiments, in low-light environments (e.g., below 20 lux), device 600 automatically makes adjustments and fuses multiple images (in some embodiments, with less images than when low-light mode is selected) together to get an enhanced composite image as device 600 does when low-light status indicator 602*c* is actively selected. At FIG. 26G after detecting tap gesture 2650*f*, device 600 detects a change in light in the FOV.

As illustrated in FIG. 26H, in response to detecting a change in light in the FOV, device 600 detects that the amount of light in the FOV is 0.5 lux as represented by current light level 2680*d* and determines that it is operating in an extremely substandard low-light environment (e.g., less than 1 lux). Because device 600 is operating in an extremely substandard low-light environment, device 600 display low-light mode status indicator 602*c* adjacent to flash status indicator 602*a*. Here, low-light mode status indicator indicates that the status of the low-light mode is active (for similar reasons discussed above when device 600 was operating in the substandard low-light environment. In addition, low-light mode status indicator 602*c* further includes a current capture duration (e.g., "5 s" displayed in low-light mode status indicator 602*c*) because device 600 is operating in an extremely substandard low-light environment (and/or device 600 is configured to capture media in the low-light environment for a duration that is higher than a threshold (e.g., a threshold such as above is or 2 s). Here, device 600 determines that the capture duration that corresponds to default state 2604*b* should be higher than the minimal capture duration because the light in the FOV is below a threshold (e.g., light level is lower than standard and substandard low-light environments). In some embodiments, the low-light indicator does not include a capture duration until the low-light mode is configured to capture media with (e.g., adjustable low-light mode control 1804 is set to) a capture duration that is higher than the minimal capture duration or some other threshold. At FIG. 26H, device 600 detects tap gesture 2650*h* at a location that corresponds to low-light mode status indicator 602*c*.

As illustrated in FIG. 26I, in response to detecting tap gesture 2650*h*, device 600 displays adjustable low-light mode control 1804 in control region 606. Here, adjustable low-light mode control 1804 is set to a five-second capture duration, which also corresponds to default state 2604*b*. As discussed above, device 600 determines that the capture duration should be five seconds instead of the minimal capture duration (e.g., one second). Device 600 makes this determination because the light in the FOV has changed to a light level where the minimal capture duration will not be effective enough to a certain quality of media (e.g., where one or more objects are distinguishable in the captured media). Here, the capture duration changes although other environmental conditions (e.g., stabilization of device 600 and move of objects in FOV) remain the same. At FIG. 26I, device 600 detects leftward swipe gesture 2650*i* at a location that corresponds to adjustable low-light mode control 1804.

As illustrated in FIG. 26J, in response to detecting leftward swipe gesture 2650*i*, device 600 shifts the tick marks of adjustable low-light mode control 1804 to the left based on the magnitude and direction of leftward swipe gesture 2650*i*. After shifting the tick marks of adjustable low-light mode control 1804 to the left, device 600 displays indication 1818 at the location that corresponds to a ten-second capture duration. Here, the ten-second capture duration corresponds to the capture duration for max state 2604*c* (or the rightmost tick mark on adjustable low-light mode control 1804). In doing so, device 600 ceases to display the capture duration that corresponds default state 2604*b*. As illustrated in FIG. 26J, in response to leftward swipe gesture 2650*i*, device 600 updates low-light capture indicator 602*c* to indicate that the current capture duration is ten seconds because device 600 is configured to capture media in the low-light mode based on a capture duration (e.g., 10*s*) that is higher than a threshold (e.g., a threshold such as is or 2 s). In some embodiments, adjustable low-light mode control 1804 can only be set to capture durations that correspond to the off state 2604*a*, default state 2604*b*, and max state 2604*c*. In some embodiments, adjustable low-light mode control 1804 can be set to other capture durations that do not correspond to one or more of the predetermined (e.g., suggested) capture duration states (e.g., off state 2604*a*, default state 2604*b*, and max state 2604*c*).

FIGS. 26J-26Q illustrate device 600 capturing media in a low-light mode based on a capture duration. In particular, FIGS. 26J-26Q illustrate one or more animations and/or techniques that device 600 uses while capturing media in the low-light mode based on a capture duration. When the capture duration (e.g., 10 s) is set higher than a threshold capture duration (e.g., a threshold such as 1 s or a threshold such as 2 s) and/or the detected level of light is below 1 lux, device 600 displays the following animations and uses the following techniques for capturing media in the low-light mode. When the capture duration (e.g., 1 s) is not set higher than a threshold capture duration (e.g., a threshold such as is or 2 s) and/or the detected level of light is not below 1 lux, device 600 forgoes displaying the following animations and using the following techniques for capturing media in the low-light mode. For example, turning back to FIGS. 26F-26G, none of the following animations or techniques were described when device 600 captured media because the one second capture duration was not set higher to the threshold capture duration (e.g., a threshold such as is or 2 s). In some alternative embodiments, some of the animations and/or techniques are used when the capture duration is below the threshold and/or the detected level of light is not below 1 lux. Further, in some embodiments, one or more animations or techniques described in FIGS. 18J-18T are included in the animations and techniques described below in relation to FIG. 26J-26Q and, for brevity, some of these animations and techniques have been omitted from the discussion below. At FIG. 26J, device 600 detects tap gesture 2650*j* at a location that corresponds to shutter affordance 610.

As illustrated in FIG. 26K, in response to detecting tap gesture 2650*j*, device 600 has initiated the capture of media in low-light mode based on the ten-second capture duration (e.g., capture duration that corresponds to max state 2604*c* set in response to leftward swipe gesture 2650*i*). When initiating capture of the media, device 600 replaces display of shutter affordance 610 with stop affordance 1806 and initiates movement of indication 1818 towards a capture duration of zero (e.g., countdown from 10 seconds to 0 seconds). Further, device 600 ceases to display some of the user interface elements that cannot be interacted with while device 600 is capturing media in the low-light mode, such as flash status indicator 602*a* and low-light mode status indicator 602*c* in indicator region 602, zoom affordances 2622 in camera display region 604, and media collection 624 in control region 606. In some embodiments, in response to detecting tap gesture 2650*j*, device 600 shows an animation that moves indication 1818 from a 0 second capture duration to the 10 s capture duration (e.g., similar to winding up animation 18K-18M) before moving the indications from the 10 s capture duration to the 0 second capture duration (e.g., similar to winding down animation 18M-18Q). In some embodiments, in response to detecting tap gesture 2650*j*, device 600 dims out shutter affordance 610; and, in some embodiments, device 600 does not display stop affordance 1806 after dimming out shutter affordance 610.

As illustrated in FIG. 26K, in response to detecting tap gesture 2650*j*, device 600 displays visual guidance 2670 that shows the difference between a pose (e.g., position and/or orientation) of device 600 when the capture of the media was initiated and a pose at a time while capturing the media. Visual guidance is displayed because the capture duration (10 s) is set higher than a threshold capture duration (e.g., a threshold such as is or a threshold such as 2 s) and/or the detected level of light (0.5 lux) is below 1 lux. Visual guidance 2670 includes instruction 2670*a* (e.g., "Hold Still"), which indicates that device 600 should be stabilized (e.g., held still) while capturing media in low-light mode. In addition, visual guidance 2670 also includes original pose indication 2670*b*, which indicates the pose of device 600 when capture of the media was initiated. When device 600 is not stabilized while capturing images or images are captured out of the original pose, device 600 generates media that is of poorer quality than when device 600 is stabilized or remains in its original pose. To improve understanding, some of FIGS. 26K-26Q include graphical illustration 2668 that provides details about how the position of a current pose 2668*c* as changes relative to the position of original pose 2668*b* of device 600.

As illustrated in FIG. 26L, device 600 has moved indication 1818 from the ten-second capture duration to an eight-second capture duration. At the eight-second capture duration, device 600 has captured a number of images. At some point in time while displaying indication 1818 at the eight-second capture duration, device 600 detects a change in its pose. As shown by graphical illustration 2668, current pose 2668*c* (e.g., shown as a solid phone) of device 600 is shifted up and to the right from its original pose 2668*b* (e.g., shown as dotted lines). In response to detecting the change in pose of device 600, device 600 maintains display of original pose indication 2670*b* and displays current pose indication 2670*c*. Current pose indication 2670*c* is displayed at position on the camera user interface that corresponds to current pose 2668*c* (e.g., shifted up and to the right from original pose indication 2670*b*). As illustrated in FIG. 26L, device 600 displays original pose indication 2670*b* and current pose indication 2670*c* as two separate sets of lines (e.g., boxes). In some embodiments, original pose indication 2670*b* and current pose indication 2670*c* are visually distinguished by having one or more different visual characteristics, such as different colors, boldness, gradients, blur, or other types of visual effects.

As illustrated in FIG. 26M, device 600 has moved indication 1818 from the eight-second capture duration to a seven-second capture duration. At the seven-second capture duration, device 600 has captured more images than device 600 captured at the eight-second capture duration. At some point in time while displaying indication 1818 at the seven-second capture duration, device 600 detects a change in its pose. As shown by graphical illustration 2668, current pose 2668*c* of device 600 has shifted down and to the left from original pose 2668*b*. Here, an overcorrection to current pose 2668*c* has been applied (e.g., device 600 was overcorrected down and to the left from current pose 2668*c* in FIG. 26N). As illustrated in FIG. 26M, in response to detecting the change in pose of device 600 (at the seven-second capture duration), device 600, on live preview 630, moves current pose indication 2670*c* to a position that corresponds to current pose 2668*c* in FIG. 26M. In response to detecting the change in pose of device 600 (at the seven-second capture duration), device 600 maintains display of original pose indication 2670*b* at the position that it was displayed in FIG. 26L, such that device 600 displays current pose indication 2670*c* shifted down and to the left from original pose indication 2670*b*. In some embodiments, instead of moving current pose indication 2670*c* to a new position, device 600 moves original pose indication 2670*b* to a new position and maintains display of current pose indication 2670*c* at the position that it was previously displayed in FIG. 26L.

As illustrated in FIG. 26N, device 600 has moved indication 1818 from the seven-second capture duration to a five-second capture duration. At the five-second capture duration, device 600 has captured more images than device 600 captured at the seven-second capture duration. At some point in time while displaying indication 1818 at the five-second capture duration, device 600 detects a change in its pose. As shown by graphical illustration 2668, current pose 2668*c* of device 600 has shifted closer to being in the position of original pose 2668*b*, shifting up and to the right from the position of current pose 2668*c* in FIG. 26M. In response to detecting the change in pose of device 600 (at the five-second capture duration), device 600, on live preview 630, moves current pose indication 2670*c* to a position that corresponds to current pose 2668*c* in FIG. 26N, such that device 600 displays current pose indication 2670*c* shifted closer to original pose indication 2670*b* than current pose indication 2670*c* was displayed in FIG. 26M. In addition, device 600 maintains display of original pose indication 2670*b* in its original position.

As illustrated in FIG. 26O, device 600 has moved indication 1818 from the five-second capture duration to a four-second capture duration. At the four-second capture duration, device 600 has captured more images than the device captured at the five-second capture duration. At some point in time while displaying indication 1818 at the four-second capture duration, device 600 detects a change in its pose, where the position of current pose 2668*c* matches the position of original pose 2668*b*. As illustrated in FIG. 26N, in response to detecting that the current pose 2668*c* matches the position of original pose 2668*b*, device 600 issues a tactile output 2620*a*. In addition, in response to detecting that the current pose 2668*c* matches the position of original pose 2668*b*, device 600 ceases to display current pose indication 2670*c* and maintains display of instruction 2670*a* and original pose indication 2670*b*. In some embodiments, original pose indication 2670*b* displays a different color when the current pose matches the original pose than when the current pose does not match the original pose.

As illustrated in FIG. 26P, device 600 has moved indication 1818 from the four-second capture duration to a three-second capture duration. At the three-second capture duration, device 600 has captured more images than the device captured at the four-second capture duration. At the three-second capture duration, device 600 does not detect a change in its pose and maintains display of instruction 2670*a*. Thereby, device 600 forgoes updating display of visual guidance 2670.

As illustrated in FIG. 26Q, device 600 has moved indication 1818 from the two-second capture duration to a zero second capture duration. At the zero second capture duration, device 600 has captured more images than the device captured at the three-second capture duration. At the zero second capture duration, device 600 detects an end to capturing of media.

As illustrated in FIG. 26R, in response to detecting an end to the capturing of media, device 600 displays indication 1818, on adjustable low-light mode control 1804, at the ten-second capture duration that corresponds to max state 2604*c* and replaces display of stop affordance 1806 with shutter affordance 610. In addition, in response to detecting an end to the capture of media, device 600 re-displays some of the user interface element that could be interacted with while device 600 was capturing media in the low-light mode. As illustrated in FIG. 26R, in response to detecting an end to the capturing of media, device 600 generates a media of a composite image based on the plurality of images captured in response to detecting tap gesture 2650*j*. Device 600 displays representation 2624*c* as a portion of media collection 624. While representation 2624*c* is visually darker than representation 2624*b* displayed in FIG. 26G (and representation 2624*a*), representation 2624*c* is visually lighter than a representation of media at 0.5 lux when the device is not configured to capture media in low-light mode (e.g., using the standard frame rate). At FIG. 26R, device 600 captured more images to generate the composite image represented by representation 2624*c* than the number of images that device 600 captured to generate the composite image represented by representation 2624*b* in FIG. 26G due to the longer capture duration. In some embodiments, when capturing media in an environment with less ambient light, device 600 needs to capture and fuse more images to generate the same image that device 600 produces in an environment with higher levels of ambient light. At FIG. 26R, device 600 detects change in movement of device 600 such that the electronic device is less stable.

As illustrated in FIG. 26S, in response to detecting a change in movement of device 600 such that the electronic device is less stable, device 600 updates max state 2604*c* from the ten-second capture duration to the five-second capture duration. As discussed above, when device 600 is less stable, device 600 can lower the capture duration that corresponds to max state 2604*c* (e.g., or default state 2604*b*). In addition, in response to detecting the change in movement of device 600 such that the electronic device is less stable, device 600 also updates low-light mode status indicator 602*c* to show a capture duration of five seconds (e.g., because adjustable low-light mode control 1804, via indication 1818, is currently set to max state 2604*c*). In some embodiments, when device 600 determines that the capture duration is less than a threshold value (e.g., a threshold value such as one or two seconds), device 600 ceases to display the capture duration in low-light mode status indicator 602*c*.

Notably, in some embodiments, device 600 can detect a change in one or more environmental conditions while capturing media based on the previously set capture duration. In some embodiments, based on this change, device 600 can update the capture duration value that corresponds to max state 2604*c* (or default state 2604*b*). When device 600 updates the capture value that corresponds to max state 2604*c* (or default state 2604*b*), device 600 can display indication 1818 at the new capture duration in response to detecting an end to the capturing of media (e.g., device 600 can display the camera user interface at FIG. 26Q followed by the camera user interface in 26S). At FIG. 26S, device 600 detects change in movement of device 600 such that the electronic device is more stable.

As illustrated in FIG. 26T, in response to detecting a change in movement of device 600 such that the electronic device is more stable, device 600 updates max state 2604*c* from the five-second capture duration back to the ten-second capture duration. In addition, in response to detecting the change in movement of device 600 such that the electronic device is more stable, device 600 also updates low-light mode status indicator 602*c* to indicate a capture duration of ten seconds (e.g., because adjustable low-light mode control 1804, via indication 1818, is currently set to max state 2604*c*). At FIG. 26T, device 600 detects rightward swipe gesture 2650*t* at a location that corresponds to adjustable low-light mode control 1804.

As illustrated in FIG. 26U, in response to detecting rightward swipe gesture 2650*t*, device 600 shifts the tick marks of adjustable low-light mode control 1804 to the right based on the magnitude and direction of rightward swipe gesture 2650*t*. After shifting the tick marks of adjustable low-light mode control 1804 to the right, device 600 displays indication 1818 at the location that corresponds to a capture duration of off state 2604*a* on adjustable low-light mode control 1804. In response to detecting that the adjustable low-light mode control 1804 is set to off state 2604*a*, device 600 ceases to operate in the low-light mode. In other words, the low-light mode is turned off or set to inactive. In addition to ceasing to operate in low-light mode, device 600 updates low-light mode status indicator 602*c* to indicate that the status of the low-light capture mode is inactive. In some embodiments, in response to detecting that the adjustable low-light mode control 1804 is set to off state, device 600 forgoes to low-light mode status indicator 602*c*. In some embodiments, at FIG. 26U, in response to receiving a request to capture media, device 600 will capture media based on a standard frame rate, capturing only one image of the media.

FIGS. 27A-27C are a flow diagram illustrating a method for managing media using an electronic device in accordance with some embodiments. Method 2700 is performed at a device (e.g., 100, 300, 500, 600) with a display device (e.g., a touch-sensitive display). Some operations in method 2700 are, optionally, combined, the orders of some operations are, optionally, changed, and some operations are, optionally, omitted.

As described below, method 2700 provides an intuitive way for managing media. The method reduces the cognitive burden on a user for editing media, thereby creating a more efficient human-machine interface. For battery-operated computing devices, enabling a user to manage media faster and more efficiently conserves power and increases the time between battery charges.

An electronic device (e.g., 600) includes a display device (e.g., a touch-sensitive display) and one or more cameras (e.g., one or more cameras (e.g., dual cameras, triple camera, quad cameras, etc.) on the same side or on different sides of the electronic device (e.g., a front camera, a back camera))). The electronic device displays (2702), via the display device, a media capture user interface that includes displaying (2704) a representation (e.g., a representation over-time, a live preview feed of data from the camera) of a field-of-view of the one or more cameras (e.g., an open observable area that is visible to a camera, the horizontal (or vertical or diagonal) length of an image at a given distance from the camera lens).

While a low-light camera mode is active (e.g., as indicated by 602*c*), the electronic device displays (2706) a control (e.g., 1804) (e.g., a slider or timer) for adjusting a capture duration for capturing media. In some embodiments, a low-light camera mode (e.g., a low-light capture mode) is active when low-light conditions are met. In some embodiments, low-light conditions are met when the low-light conditions include a condition that is met when ambient (e.g., 2680*a*-*d*) light in the field-of-view of the one or more cameras is below a respective threshold, when the user selects (e.g., turn on) a low-light status indicator that indicates where the device is operating in a low-light mode, when the user turns on or activates a setting that activates low-light camera mode.

As a part of displaying the control, in accordance (2708) with a determination that a set of first capture duration criteria (e.g., set of criteria that are satisfied based on camera stabilizations, environmental conditions, light level, camera motion, and/or scene motion) is satisfied (e.g., 2680*c*), the electronic device displays (2712) an indication (e.g., 1818 in FIG. 26F) (e.g., a slider bar on a particular tick-mark of slider, text displayed on display device) that the control (e.g., 1804) is set to a first capture duration (e.g., 2604*b* in FIG. 26F) (e.g., measured in time (e.g., total capture time; exposure time), number of pictures/frames). Displaying an indication that an adjustable control is set to a certain capture duration only when prescribed conditions are met allows a user to quickly recognize the capture duration that device will use capture media in response to a request, without having to configure the capture duration manually. Displaying an indication that an adjustable control is set to a certain capture duration only when prescribed conditions are met also alleviates the user from having to compute a particular capture duration that works in consideration of the prescribed conditions. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As a part of displaying the control (e.g., 1804), in accordance (2708) with a determination that a set of first capture duration criteria (e.g., set of criteria that are satisfied based on camera stabilizations, environmental conditions, light level, camera motion, and/or scene motion) is satisfied (e.g., 2680*c*), the electronic device configures (2714) the electronic device (e.g., 600) to capture a first plurality of images over the first capture duration responsive to a single request (e.g., gesture 2650*f*) to capture an image corresponding to a field-of-view of the one or more cameras (e.g., adjusting a setting so that one or more cameras of the electronic device, when activated (e.g., via initiation of media capture (e.g., a tap on a shutter affordance (e.g., a selectable user interface object))), cause the electronic device to capture the plurality of images at a first rate for at least a portion of the capture duration)). Automatically configuring the electronic device to capture a number of images in response to a request to capture media when prescribed conditions reduce the number of inputs a user has to make to manually configure the device to capture the number of images. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As a part of displaying the control, in accordance (2710) with a determination that a set of second capture duration criteria (e.g., set of criteria that are satisfied based on camera stabilizations, environmental conditions, light level, camera motion, and/or scene motion) is satisfied (e.g., 2680*d*), where the set of second capture criteria is different from the set of first capture duration criteria, the electronic device displays (2716) an indication (e.g., 1818 in FIG. 26I) (e.g., a slider bar on a particular tick-mark of slider, text displayed on display device) that the control (e.g., 1804) is set to a second capture duration (e.g., 2604*b* in FIG. 26I) (e.g., measured in time (e.g., total capture time; exposure time), number of pictures/frames)) that is greater than the first capture duration. Displaying an indication that an adjustable control is set to a certain capture duration only when prescribed conditions that are different from another set of prescribed conations are met allows a user to quickly recognize the capture duration that device will use capture media in response to a request, without having to configure the capture duration manually. Displaying an indication that an adjustable control is set to a certain capture duration only when prescribed conditions are met also alleviates the user from having to compute a particular capture duration that works in consideration of the prescribed conditions. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

As a part of displaying the control (e.g., 1804), in accordance (2710) with a determination that a set of second capture duration criteria (e.g., set of criteria that are satisfied based on camera stabilizations, environmental conditions, light level, camera motion, and/or scene motion) is satisfied (e.g., 2680*d*), where the set of second capture criteria is different from the set of first capture duration criteria, the electronic device configures (2718) the electronic device (e.g., 600) to capture a second plurality of images over the second capture duration responsive to the single request (e.g., gesture 2650*j*) to capture the image corresponding to the field-of-view of the one or more cameras (including capturing at least one image during a portion of the second capture duration that is outside of the first capture duration) (e.g., adjusting a setting so that one or more cameras of the electronic device, when activated (e.g., via initiation of media capture (e.g., a tap on a shutter affordance)), causes the electronic device to capture the plurality of images at a first rate for at least a portion of the capture duration). In some embodiments, the second plurality of images is different from the first plurality of images. In some embodiments, the first plurality of images is made (e.g., combined) into a first composite image or the second plurality of images is made (e.g., combined) into a second composite image. Automatically configuring the electronic device to capture a number of images in response to a request to capture media when prescribed conditions are met reduces the number of inputs a user has to make to manually configure the device to capture the number of images. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device receives the single request (e.g., gesture 2650*f* or 2650*j*) to capture the image corresponding to the field-of-view of the one or more cameras. In some embodiments, the single request to capture the image corresponding to the field-of-view of the one or more cameras is received when the device receives a gesture (e.g., a tap) directed to a shutter affordance (e.g., 610). In some embodiments, in response to receiving the single request (e.g., gesture 2650*f* or 2650*j*) to capture the image corresponding to the field-of-view of the one or more cameras, the electronic device, in accordance with a determination that the electronic device is configured to capture the first plurality of images over the first capture duration, captures the first plurality of images over the first capture duration (e.g., FIGS. 26F-26G). In some embodiments, in accordance with a determination that the electronic device is configured to capture the second plurality of images over the second capture duration, the electronic device captures the second plurality of images over the second capture duration (e.g., in FIGS. 26J-26R). In some embodiments, the first plurality of images (or the second plurality of images) is combined based on the analysis of the content of the plurality of images.

In some embodiments, an amount of images in the first plurality of images (e.g., FIGS. 26F-26G) is different from (e.g., greater than or less than) the amount of images in the second plurality of images (e.g., in FIGS. 26J-26R). In some embodiments, the quantity of images in the plurality of images is based on the capture duration, where a longer capture duration would produce more images.

In some embodiments, in response to receiving the single request (e.g., gesture 2650*f* or 2650*j*) to capture the image corresponding to the field-of-view of the one or more cameras and in accordance with the determination that the electronic device is configured to capture the first plurality of images over the first capture duration, the electronic device generates a first composite image (e.g., 624 in FIG. 26G) that includes content of at least some of the first plurality of images. In some embodiments, the first composite image (e.g., representation of image in media collection 624) is displayed, via the display device, after the first composite image is generated. In some embodiments, in response to receiving the single request (e.g., gesture 2650*f* or 2650*j*) to capture the image corresponding to the field-of-view of the one or more cameras and in accordance with the determination that the electronic device is configured to capture the second plurality of images over the second capture duration, the electronic device generates a second composite image (e.g., 624 in FIG. 26R) that includes content at least some of the second plurality of images. In some embodiments, the second composite image is displayed, via the display device, after the first composite image is generated. In some embodiments, the first plurality of images is made (e.g., combined) into a first composite image or the second plurality of images is made (e.g., combined) into a second composite image. In some embodiments, each of the plurality of images is independently captured and combined based on analysis of the content (e.g., data) of the images.

In some embodiments, while displaying the indication that the control is set to the first capture duration, the electronic device detects (e.g., via an accelerometer and/or gyroscope) a first degree of stability (e.g., discussed in FIG. 26R) (e.g., a current amount of movement (or lack of movement) of the electronic device) of the electronic device. In some embodiments, the electronic device, in response to detecting the first degree of stability (e.g., discussed in FIG. 26R) of the electronic device and in accordance with a determination that the first degree of stability of the electronic device is above a first stability threshold (e.g., detecting that the electronic device is more stable): displays an indication (e.g., 1818) that the control (e.g., 1804) is set to a third capture duration (e.g., 2604*c* in FIG. 26R) that is greater than the first capture duration (e.g., increase the first capture duration); and configures the electronic device to capture a third plurality of images over the third capture duration responsive to the single request (e.g., gesture 2650*f* or 2650*j*) to capture the image corresponding to the field-of-view of the one or more cameras. In some embodiments, the indication that the control is set to the first capture duration ceases to be displayed. Updating the display of an indication that an adjustable control is set when certain prescribed conditions are met (e.g., the electronic device is stable) allows a user to quickly recognize that the capture duration of the electronic device has changed and the electronic device will be configured to capture media with the changed capture duration. In some embodiments, the electronic device is configured to capture the third plurality of images instead of capturing the first plurality of images over the first capture duration in response to a single request to capture images. In some embodiments, in accordance with a determination that the degree of stability of the electronic device is below the threshold (e.g., detecting that the electronic device is less stable), the first capture duration (or second) is decreased (e.g., an indication is displayed with the decreased capture duration and the electronic device is configured to capture images over the decreased capture duration). In some embodiments, in accordance with a determination that the degree of stability of the electronic device is less that the stability threshold and greater than a second stability threshold (e.g., stableness of device has not changed enough), maintain the indication that the control is set to the first capture duration and maintain the configuration of the device to capture the first plurality of images over the first capture duration. Displaying an updated indication that an adjustable control is set to a certain capture duration only when prescribed conditions are met also alleviates the user from having to compute a particular capture duration that works when conditions related to the capture duration has changed. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Automatically configuring the electronic device to capture a new number of images in response to a request to capture media when prescribed conditions have changed reduces the number of inputs a user has to make to manually configure the device to capture the new number of images. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the low-light camera mode is active, the electronic device displays a first low-light capture status indicator (e.g., 602*c*) that indicates a status (e.g., active (e.g., 602*c* in FIG. 26H) (e.g., on), inactive (e.g., 602*c* in FIG. 26S) (e.g., off), available (e.g., 602*c* in FIG. 26B) (e.g., low-light mode is inactive but can be set to active)) of the low-light capture mode and that, in accordance with a determination that capture duration display criteria are met, includes a visual representation (e.g., 10 s in 602*c* in 26J) of the first capture duration (e.g., 602*c* in FIG. 26H) (or second capture duration displaying the indication that the control is set to the second capture duration). In some embodiments, while the low-light camera mode is active, the electronic device displays a first low-light capture status indicator that indicates a status (e.g., active (e.g., on), inactive (e.g., off), available (e.g., ability to be turned on)) of the low-light capture mode and that, in accordance with a determination that duration display criteria are not met, does not include the visual representation (e.g., 10 s in 602*c* in 26J) of the first capture duration (e.g., 602*c* in FIG. 26E) (or second capture duration displaying the indication that the control is set to the second capture duration). Displaying a visual representation of capture duration in a low-light status indicator when prescribed conditions are met provides the user with feedback about the current state of the capture duration that the electronic device will use to capture media when a capture duration is outside of a normal range of capture durations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Forgoing to display a visual representation of capture duration in a low-light status indicator when prescribed conditions are met provides a user interface that is decluttered and does not visually distract the user with feedback when a capture duration is within a normal range of capture durations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the capture duration display criteria includes a criterion that is satisfied when ambient light in the field-of-view of the one or more cameras is within a first predetermined range (e.g., 2680*a-c* vs. 2680*d*). In some embodiments, when the ambient light in the field-of-view of the one or more cameras changes, the electronic device will automatically reevaluate whether to display the visual representation of the first capture duration (e.g., 602*c* in FIG. 26J and capture duration set by indicator 1818) (or second capture duration) based on whether the ambient light (e.g., 2680*a-d*) is in the first predetermined range or the second predetermined range.

Before the low-light camera mode is active, in some embodiments, the electronic device: in accordance with a determination that ambient light (e.g., 2680*d*) in the field-of-view of the one or more cameras is within a second predetermined range (e.g., below a threshold value such as 1 lux) (e.g., determined when in a first predetermined range that satisfies capture duration display criteria), displays a second low-light capture status indicator (e.g., 602*c* in FIG. 26H) that indicates that a status of the low-light capture mode is active (e.g., a status that indicates that the low-light capture mode is active (e.g., that the device is currently configured to capture media in low-light capture mode in response to a request to capture media)) and that includes a visual representation (e.g., "5 s" in 26H) of a third capture duration (e.g., first or second capture duration). In some embodiments, before the low-light camera mode is active, in accordance with a determination that ambient light (e.g., 2680*c*) in the field-of-view of the one or more cameras is within a fourth predetermined range (e.g., a predetermined range such as between 1-10 lux), displays a third low-light capture status indicator (e.g., 602*c* in FIG. 26E) that indicates that a status of the low-light capture mode is active and does not include the visual representation (e.g., 602*c* in FIG. 26E) of the third capture duration; in accordance with a determination that ambient light (e.g., 2680*b*) in the field-of-view of the one or more cameras is within a fifth predetermined range (e.g., a predetermined range such as between 10-20 lux), displays a fourth low-light capture status indicator that indicates a status of the low-light capture mode is available (e.g., 602*c* in FIG. 26B) (e.g., available for activation, but not currently active) (e.g., a status that indicates that low-light capture mode is available (e.g., that the device is not currently configured to capture media in low-light capture mode but can be configured to capture media in the low-light mode), a status that indicates that low-light capture mode is available and has not been manually turned on or turned off by a user (e.g., the device has not been configured to capture or not capture media in low-light capture mode since the low-light capture mode indicator was first (recently) displayed or a determination was made to display the low-light capture mode indicator)); and in accordance with a determination that ambient light (e.g., 2680*a*) in the field-of-view of the one or more cameras is within a sixth predetermined range (e.g., a predetermined range such as above 20 lux), the electronic device forgoes display (e.g., absence of 602*c* in FIG. 26A) of the second low-light capture status indicator, the third low-light capture status indicator, and the fourth low-light capture status indicator. In some embodiments, the second low-light capture status indicator, the third low-light capture status indicator, and the fourth low-light capture status indicator are visually different (e.g., different in color, texture, boldness, characters or marks displayed (e.g., crossed out to show an inactive state), having or not having a visual representation of capture duration) from each other. In some embodiments, the fourth low-light status indicator that indicates a status of the low-light capture mode is available does not include the visual representation of a capture duration (e.g., third capture duration). In some embodiments, in accordance with a determination that ambient light in the field-of-view of the one or more cameras is within a sixth predetermined range, the electronic device forgoes to display any low-light capture status indicator. In some embodiments, the third predetermined range (e.g., of ambient light) is less than the fourth predetermined range (e.g., of ambient light), the fourth predetermined range (e.g., of ambient light) is less than the fifth predetermined range (e.g., of ambient light), and the fifth predetermined range is less than the sixth predetermined (e.g., of ambient light). In some embodiments, the predetermined ranges do not overlap (e.g., non-overlapping predetermined ranges). Displaying a visual representation of capture duration in a low-light status indicator when prescribed conditions are met provides the user with feedback about the current state of the capture duration that the electronic device will use to capture media when a capture duration is outside of a normal range of capture durations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying a visual representation of capture duration in a low-light status indicator when prescribed conditions are met provides the user with feedback about the current state of the capture duration that the electronic device will use to capture media when a capture duration is outside of a normal range of capture durations. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying a low-light status indicator without a visual representation when prescribed conditions are met provides the user with feedback that the electronic device is configured to capture media while in a low-light mode and will use a capture duration to capture media that is a normal range of capture durations, without cluttering the user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Displaying a low-light capture status indicator that indicates that low-light status is available when prescribed conditions are met allows a user to quickly recognize that the electronic device is not configured to capture media while in the low-light mode but is available to be configured (e.g., via user input) to capture media in a low-light mode and enables a user to quickly understand that the electronic device will not operate according to a low-light mode in response to receiving a request to capture media. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Forgoing to display a low-light capture status indicator when prescribed conditions are met allows a user to quickly recognized that the electronic device is not configured to capture media while in the low-light mode and enables a user to quickly understand that the electronic device will not operate according to a low-light mode in response to receiving a request to capture media. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the control (e.g., 1804) for adjusting the capture duration for capturing media is configured to be adjustable to: a first state (e.g., 2604*a*) (e.g., a position on the adjustable control (e.g., a tick mark of the adjustable control at a position) that is left (e.g., farthest left) of center) that corresponds to a first suggested capture duration value (e.g., a value that indicates that the capture duration is at a minimum value, a value that indicates that a single image, rather than a plurality of images, will be captured in response to a single capture request); a second state (e.g., 2604*b*) (e.g., a center position on the adjustable control (e.g., a tick mark of the adjustable control at a position) on the control) that corresponds to a second suggested capture duration value (e.g., a value set by the electronic device that is greater than a minimum user-selectable value and less than a maximum available value that can be set by the user in the current conditions); and a third state (e.g., 2604*c*) (e.g., a position on the adjustable control (e.g., a tick mark of the adjustable control at a position) that is right (e.g., farthest right) of center) that corresponds to a third suggested capture duration value (e.g., a maximum available value that can be set by the user in the current conditions, the maximum available value optionally changes as the lighting conditions and or camera stability changes (increasing as the lighting level decreases and/or the camera is more stable and decreasing as the lighting level increases and/or the camera is less stable). In some embodiments, when displaying the adjustable control, positions on the control for the first state, the second state, and the third state are displayed on the control and are visually distinguishable (e.g., labeled differently (e.g., "OFF," "AUTO," "MAX") from each other. In some embodiments, when displaying the adjustable control, positions on the adjustable control (e.g., tick marks) for the first state, the second state, and the third state are visually distinguishable from other positions (e.g., tick marks) on the adjustable control. In some embodiments, there are one or more selectable states (e.g., that a visually different from the first, second, and third states). In some embodiments, the adjustable control can be set to positions that correspond to the selectable state. In some embodiments, the adjustable control can be set to a position (e.g., intermediate positions) that is between the positions of two or more of the selectable states. Displaying a control for adjusting the capture duration at which an electronic device will capture media while in a low-light mode provides the user with feedback about capture durations that correspond to predefined states (e.g., an off state, a default state, a max state) for a particular capture duration. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of displaying the control (e.g., 1804) for adjusting the capture duration for capturing media, the electronic device: in accordance with a determination that a set of first capture duration criteria, displays (e.g., when the control is displayed (e.g., initially displayed)) the control (e.g., 1804 in FIG. 26G) for adjusting the capture duration for capturing media adjusted to the second state (e.g., 2604*b* in FIG. 26G) (e.g., indication that control is set to first capture duration is displayed at a position that corresponds to second suggested capture duration value on the control), where the first capture duration is the second suggested capture duration value; and in accordance with a determination that a set of second capture duration criteria, displays (e.g., when the control is displayed (e.g., initially displayed)) the control (e.g., 1804 in FIG. 26I) for adjusting the capture duration for capturing media adjusted to (e.g., in) the second state, e.g., 2604*b* in FIG. 26I) (e.g., indication that control is set to second capture duration is displayed at a position that corresponds to second suggested capture duration value on the control), where the second capture duration is the second suggested capture duration value. Providing different suggested capture durations for a capture duration state based on when respective prescribed conditions are met allows a user to quickly recognize the value that corresponds to a particular capture duration state based on the respective capture duration that is used when the respective predefined conditions are met. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of displaying the control (e.g., 1804) for adjusting the capture duration for capturing media, in accordance with the determination that the control for adjusting the capture duration for capturing media is in the third state (e.g., 2604*c*) and a determination that the set of first capture duration criteria is satisfied, the third suggested capture duration value (e.g., 2604*c* in FIG. 26R) is a third capture duration value; and in accordance with the determination that the control for adjusting the capture duration for capturing media is in the third state and a determination that the set of second capture duration criteria is satisfied, the third suggested capture duration value (e.g., 2604*c* in FIG. 26S) is a fourth capture duration value that is different from (e.g., greater than) the third capture duration value. In some embodiments, the maximum user-selectable capture duration is dynamic and varies based on one or more of on camera stabilizations, environmental conditions, light level, camera motion, and/or scene motion. Providing different suggested capture durations for a capture duration state based on when respective prescribed conditions are met allows a user to quickly recognize the value that corresponds to a particular capture duration state based on the respective capture duration that is used when the respective predefined conditions are met. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second capture duration value is a fifth capture duration value, and the third suggested capture duration value is a sixth capture value. In some embodiments, while displaying the control (e.g., 1804) for adjusting a capture duration for capturing media, the electronic device detects a first change in current conditions (e.g., stabilization of electronic device, ambient light detected by the one or more cameras, movement in the field-of-view of the one or more cameras) of the electronic device. In some embodiments, in response to detecting the first change in current conditions of the electronic device and in accordance with a determination that first current conditions satisfy third capture duration criteria, the electronic device changes at least one of: the second suggested capture duration value (e.g., 2604*b*) to a seventh capture duration. In some embodiments, the fifth capture duration is different from the seventh capture duration. In some embodiments, the third suggested capture duration value (e.g., 2604*c*) to an eighth capture duration. In some embodiments, the eighth capture duration is different from the sixth capture duration.

In some embodiments, the set of first capture duration criteria (e.g., or second capture duration criteria) includes a criterion based on one or more parameters selected from the group consisting of ambient light detected in the field-of-view of the one or more cameras (e.g., ambient light detected in the field-of-view of the one or more cameras being within a first predetermined range of ambient light over a respective time period (or, in the case of the second capture duration criteria, above a second predetermined range of ambient light that is different from the first predetermined range of ambient light)); movement detected in the field-of-view of the one or more cameras (e.g., detected movement in the field-of-view of the one or more cameras being within a first predetermined range of detected movement in the field-of-view of the one or more cameras over a respective time period (or, in the case of the second capture duration criteria, above a second predetermined range of movement in the field-of-view of the one or more cameras that is different from the first predetermined range of movement in the field-of-view of the one or more cameras)); and a (e.g., via an accelerometer and/or gyroscope) second degree of stability (e.g., a current amount of movement (or lack of movement) of the electronic device over a respective time period) of the electronic device (e.g., a second degree of stability of the electronic device being above a second stability threshold (or, in the case of the second capture duration, above a third stability threshold that is different from the second stability threshold).

In some embodiments, as a part of displaying the media capture user interface, the electronic device displays, concurrently with the representation (e.g., 603) of the field-of-view of the one or more cameras, an affordance (e.g., 610) (e.g., a selectable user interface object) for capturing media. In some embodiments, while displaying the affordance for capturing media and displaying the indication (e.g., 1818) that the control (e.g., 1804) is set to a third capture duration (e.g., the first capture duration, the second capture duration, or another duration set with user input directed to setting the control), the electronic device detects a first input (e.g., 2650*j*) (e.g., a tap) that includes selection of the affordance for capturing media. In some embodiments, selection of the affordance for capturing media corresponds to the single request to capture an image corresponding to the field-of-view of the one or more cameras. In some embodiments, in response to detecting the first input (e.g., 2650*j*) that corresponds to the affordance for capturing media, the electronic device initiates capture of a fourth plurality of images over the first capture duration.

In some embodiments, the indication (e.g., 1818) that the control (e.g., 1804) is set to the third capture duration is a first indication. In some embodiments, the first indication is displayed at a first position on the control that corresponds to the third capture duration. In some embodiments, the electronic device, in response to detecting the first input (e.g., 2650*j*) that corresponds to the affordance for capturing media, displays an animation (e.g., in FIGS. 26J-26Q) that moves the first indication from the first position on the control to a second position (e.g., a position on the control that corresponds to a capture duration of zero, where the capture duration of zero is different from the third capture duration) on the control (e.g., the second position on the control is different from the first position on the control) (e.g., sliding an indication (e.g., slider bar) across the slider over) (e.g., wounding down (e.g., counting down from value to zero)). In some embodiments, in response to displaying the first indication at the second position, the electronic device re-displays the first indication at the first position on the control (e.g., 1818 in FIG. 26Q-26R) (and ceases to display the first indication at the second position on the control). Re-displaying the indication on the control for adjusting the capture duration back to a position that corresponds the preset capture duration allows a user quickly recognize the capture duration that was used to capture the most recently captured media and reduces the number of inputs that a user would make to have to reset the control for adjusting the capture duration. Providing improved visual feedback to the user and reducing the number inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the indication (e.g., 1818) that the control (e.g., 1804) is set to the third capture duration is a second indication. In some embodiments, the second indication is displayed at a third position on the control that corresponds to the third capture duration. In some embodiments, in response to detecting the first input that corresponds to the affordance for capturing media, the electronic device displays an animation that moves the second indication from the third position on the control to a fourth position (e.g., a position on the control that corresponds to a capture duration of zero, where the capture duration of zero is different from the third capture duration) on the control (e.g., the second position on the control is different from the first position on the control) (e.g., sliding an indication (e.g., slider bar) across the slider over) (e.g., wounding down (e.g., counting down from value to zero)). In some embodiments, while displaying the animation, the electronic device detects a second change in current conditions of the electronic device. In some embodiments, in response to detecting the second change in conditions and in accordance with a determination that second current conditions satisfy fourth capture duration criteria and in response to displaying the first indication at the fourth position (e.g., a position that corresponds to the position of the maximum capture duration value (or third suggested capture duration value)), the electronic device displays the second indication at a fifth position on the control that corresponds to a fourth capture duration that is different from the third capture duration. In some embodiments, in accordance with a determination that current conditions do not satisfy fourth capture duration criteria and in response to displaying the second indication at the fourth position, the electronic device re-displays the second indication at the third position on the control. Displaying the indication on the control for adjusting the capture duration to a different capture duration value when prescribed conditions allows a user quickly recognize the capture duration that was used to capture the most recently captured media has changed and reduces the number of inputs that a user would make to have to reset the control for adjusting the capture duration to new capture duration that is preferable (e.g., more likely to produce a better quality image while balancing the length of capture) for the prescribed conditions. Providing improved visual feedback to the user and reducing the number inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while capturing (e.g., after initiating capture) the media (e.g., via the one or more cameras): at a first time after initiating capture of the first plurality of images over the first capture duration, the electronic device displays a representation (e.g., 630) representation (e.g., 624 in FIGS. 18A-18X) of a third composite image that is based on at least some content from a plurality of images captured, by the one or more cameras, before the first time (e.g., before the first time and after the time that captured was initiated); and at a second time after initiating capturing of the first plurality of images over the first capture duration, the electronic device displays a representation (e.g., 630) (e.g., 624 in FIGS. 18A-18X) of a fourth composite image that is based on at least some content from a plurality of images captured, by the one or more cameras, before the second time (e.g., before the second time and after the time that captured was initiated). In some embodiments, the first time is different from the second time. In some embodiments, the representation of the third composite image is visually distinguished from the representation of the fourth composite image.

In some embodiments, in response to detecting the first input (e.g., 2650*j*) that corresponds to the affordance (e.g., 610) for capturing the media, the electronic device alters a visual appearance (e.g., dimming) of the affordance for capturing media. Updating the visual characteristics of the icon to reflect an activation state without executing an operation provides the user with feedback about the current state of icon and provides visual feedback to the user indicating that the electronic device is capturing media, but capture of the media cannot be interrupted or stopped during media capture. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the first input that corresponds to the affordance (e.g., 610) for capturing the media (e.g., 2650*j*), the electronic device replaces display of the affordance for capturing the media with display of an affordance (e.g., 1806) for terminating capture of media that is visually different from the affordance for capturing the media (e.g., a stop affordance (e.g., a selectable user interface object)). In some embodiments, the stop affordance is displayed during an amount of time based on the camera duration. In some embodiments, after displaying the stop affordance for an amount of time based on the camera duration, the electronic device, when the camera duration expires, replaces display of the stop affordance with the affordance for requesting to capture media. In some embodiments, while displaying the stop affordance, the electronic device receives an input that corresponds to selection of the stop affordance before the end of the capture duration; and in response to receiving the input that corresponds to the stop button, the electronic device stops capturing the plurality of images. In some embodiments, selecting the stop affordance before the end of the capture will cause the capture of fewer images. In some embodiments, the composite image generated with fewer images is darker than a composite image generated with more images (e.g., or images taken during the full capture duration). Updating the visual characteristics of the icon to reflect an activation state without executing an operation provides the user with feedback about the current state of icon and provides visual feedback to the user indicating that the electronic device is capturing media, but capture of the media can be interrupted or stopped during media capture and that the operation associated with the icon will be performed if the user activates the icon one more time. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the first input (e.g., 2650*j*) that corresponds to the affordance for capturing the media, the electronic device displays, via the display device, a visual indication (e.g., 2670) (e.g., one or more shapes having different colors, a box that includes lines that have different colors) of a difference (e.g., degrees (e.g., any value including zero degrees) between one or more different angles of rotations or axes of rotation, degrees between an orientation of the electronic device when capture of the media was initiated and an orientation of the electronic device after the capture of media was initiated that are greater than a threshold level of difference) between a pose (e.g., orientation and/or position) of the electronic device when capture of the media was initiated and a pose (e.g., orientation and/or position) of the electronic device at the first time after initiating capture of media (e.g., as described below above in relation to FIG. 26J-FIG. 26Q and in method 2800 of FIGS. 28A-28B). In some embodiments, the difference in the pose is measured relative to a prior pose of the electronic device. In some embodiments, the difference in the pose is measured relative to a prior pose of a subject in a field-of-view of the one or more cameras (e.g., current or time-delayed orientation of the electronic device). In some embodiments, the difference is a non-zero difference. In some embodiments, the difference is zero. In some embodiments, at a first time after initiating capture, via the one or more cameras, of media, the electronic device displays a visual guide that: a) in accordance with the orientation of the electronic device at the first time having a first difference value from the orientation of the electronic device at the time of initiating capture of media, has a first appearance; and b) in accordance with the orientation of the electronic device at the first time having a second difference value from the orientation of the electronic device at the time of initiating capture of media, has a second appearance different from the first appearance. Providing visual guidance allows a user to quickly recognize when the electronic device movies from its original position after capture of the media was initiated and allows the user to keep the same framing when capturing a plurality of images so that a maximum number of the images are useable and can be easily combined to form a useable or an improved merged photo. Performing enhanced visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after initiating capture of the first plurality of images over the first capture duration and before detecting an end to capture of the first plurality of images over the first capture duration, the electronic device: in accordance with a determination that the first capture duration is above a threshold value (e.g., 2604*b* in FIG. 26J), (e.g., below a threshold value such as 1 second or seconds), displays one or more low-light mode animations (e.g., in FIGS. 26J-26Q); and in accordance with a determination that the first capture duration is not above a threshold value (e.g., 2604*b* in FIG. 26F), forgoes displaying (e.g., FIGS. 26F-26G) the one or more low-light mode animations (e.g., fading shutter affordance, developing animation, showing guidance, etc.). In some embodiments, a low-light mode animation includes a visual guidance to hold device still (e.g., visual indication of a difference between a pose (e.g., orientation and/or position) the electronic device when capture of the media was initiated and a pose (e.g., orientation and/or position) of the electronic device), an animation that updates the control for adjusting the capture duration for capturing media, updating the indication on the adjustable control, an animation that updates the representation of the field-of-view of the one or more cameras. In some embodiments, the electronic device forgoes displaying one or more low-light mode animations by maintaining the display in the state that it was before capture was initiated. Displaying animations only when prescribed conditions are met allows the user to quickly recognize whether the electronic device is capturing media and provides an indication of the status of the captured media and guidance on how to improved media capture while the device is capturing media. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2700 (e.g., FIGS. 27A-27C) are also applicable in an analogous manner to the methods described above. For example, methods 700, 900, 1100, 1300, 1500, 1700, 1900, 2100, 2300, 2500, 2800, 3000, 3200, 3400, 3600, and 3800 optionally include one or more of the characteristics of the various methods described above with reference to method 2700. For example, method 2800, optionally employs, one or more techniques to capture a plurality of images to generate a composite image using various techniques described above in relation to method 2700.

FIGS. 28A-28B are a flow diagram illustrating a method for editing captured media using an electronic device in accordance with some embodiments. Method 2800 is performed at a device (e.g., 100, 300, 500, 600) with a display device (e.g., a touch-sensitive display). Some operations in method 2800 are, optionally, combined, the orders of some operations are, optionally, changed, and some operations are, optionally, omitted.

As described below, method 2800 provides an intuitive way for providing guidance while capturing media. The method reduces the cognitive burden on a user for providing guidance while capturing media, thereby creating a more efficient human-machine interface. For battery-operated computing devices, enabling a user to capture media faster and more efficiently conserves power and increases the time between battery charges.

An electronic device (e.g., 600) having a display device (e.g., a touch-sensitive display) and one or more cameras (e.g., one or more cameras (e.g., dual cameras, triple camera, quad cameras, etc.) on the same side or different sides of the electronic device (e.g., a front camera, a back camera))). The electronic device displays (2802), via the display device, a media capture user interface that includes a representation (e.g., 630) (e.g., a representation over-time, a live preview feed of data from the camera) of a field-of-view of the one or more cameras (e.g., an open observable area that is visible to a camera, the horizontal (or vertical or diagonal) length of an image at a given distance from the camera lens).

While displaying, via the display device, the media capture user interface, the electronic device receives (2804) a request to capture media (e.g., 2650*j*) (e.g., a user input on a shutter affordance (e.g., a selectable user interface object) that is displayed or physically connect to the display device).

In response to receiving the request to capture media, the electronic device initiates (2806) capture, via the one or more cameras (e.g., via at least a first camera of the one or more cameras), of media.

At a first time (2808) after initiating (e.g., starting the capture of media, initializing one or more cameras, displaying or updating the media capture interface in response to receiving the request to capture media) capture, via the one or more cameras, of media and in accordance with a determination that a set of guidance criteria is satisfied (e.g., the set of guidance criteria that is based a capture duration (e.g., measured in time (e.g., total capture time; exposure time), number of pictures/frames), when a low-light mode is active), where the set of guidance criteria includes a criterion that is met when a low-light mode is active (e.g., 602*c* in FIG. 26J) (e.g., when at least one of the one or more cameras is configured to capture media in a low-light environment), the electronic device displays (2810), via the display device, a visual indication (e.g., FIG. 2670) (e.g., one or more shapes having different colors, a box that includes lines that have different colors) of a difference (e.g., degrees (e.g., any value including zero degrees) between one or more different angles of rotations or axes of rotation, degrees between an orientation of the electronic device when capture of the media was initiated, and an orientation of the electronic device after the capture of media was initiated that are greater than a threshold level of difference) between a pose (e.g., orientation and/or position) of the electronic device when capture of the media was initiated and a pose (e.g., orientation and/or position) of the electronic device at the first time after initiating capture of media. In some embodiments, a low-light camera mode is active when low-light conditions are met. In some embodiments, low-light conditions are met when the low-light conditions include a condition that is met when ambient light in the field-of-view of the one or more cameras is below a respective threshold, when the user selects (e.g., turn on) a low-light status indicator that indicates where the electronic device is operating in a low-light mode, when the user turns on or activates a setting that activates low-light camera mode. In some embodiments, the difference in the pose is measured relative to a prior pose of the electronic device. In some embodiments, the difference in the pose is measured relative to a prior pose of a subject in a field-of-view of the one or more cameras (e.g., current or time-delayed orientation of the electronic device. In some embodiments, the difference is a non-zero difference. In some embodiments, the difference is zero. In some embodiments, at a first time after initiating capture, via the one or more cameras, of media, displaying a visual guide that: in accordance with the orientation of the electronic device at the first time having a first difference value from the orientation of the electronic device at the time of initiating capture of media, has a first appearance; and in accordance with the orientation of the electronic device at the first time having a second difference value from the orientation of the electronic device at the time of initiating capture of media, has a second appearance different from the first appearance. Providing visual guidance only when prescribed conditions are met allows a user to quickly recognize when the electronic device has moved from its original position when the capture of media started and allows the user to keep the same framing when capturing a plurality of images so that a maximum number of the images are useable and can be easily combined to form a useable or an improved merged photo. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of guidance criteria further includes a criterion that is satisfied when the electronic device is configured to capture a plurality of images over a first capture duration that is above a threshold duration (e.g., in FIGS. 26J-26Q). In some embodiments, a control (e.g., slider) for adjusting a capture duration for capturing media includes an indication (e.g., slider bar) of the first capture duration. The control causes the electronic device to be configured to a duration (e.g., first capture duration) that corresponds to the duration of the indication. Providing visual guidance only when prescribed conditions are met allows a user to quickly recognize when the electronic device has moved from its original position when the capture duration is over a threshold capture duration, without wasting battery life and causing visual distraction in situations when the visual guidance is not needed (e.g., by providing visual guidance when these conditions are not met). Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a first set of one or more shapes (e.g., 2670*b*) (e.g., a first box, cross, circle/oval, one or more lines) that is representative of the pose of the electronic device when capture of the media was initiated. In some embodiments, the first set of one or more shapes is displayed at a first position on the media capture user interface. In some embodiments, a second set of one or more shapes (e.g., 2670*c*) (e.g., a second box, cross, circle/oval, one or more lines) that is representative of the pose of the electronic device at the first time after initiating capture of media. In some embodiments, the second set of one or more shapes is displayed at a second position. In some embodiments, the second position on the display (e.g., an offset position) that is different from the first position on the media capture user interface when there is a different between the pose of the electronic device when capture of the media was initiated and the pose of the electronic device at the first time after initiating capture of media.

In some embodiments, the first set of one or more shapes (e.g., 2670*b*) includes a first color (e.g., a first color). In some embodiments, the second set of one or more shapes (e.g., 2670*c*) includes a second color (e.g., a second color) that is different from the first color. In some embodiments, the first set of one or more shapes has a different visual appearance (e.g., bolder, higher opacity, different gradient, blurrier, or another type of visual effect that can be applied to images) than the second set of one or more shapes. Displaying visual guidance that includes set of shapes that reflect the pose of the electronic device when capture was initiated and another set of shapes that reflect the pose of the electronic device after capture was initiated allows a user to quickly identify the relational change in pose of the electronic device, which allows a user to quickly correct the pose, to improve media capture (such that the user may not have to recapture images to capture a useable photo due to constant movement of the device). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of one or more shapes does not include the second color and/or the second set of one or more shapes does not include the first color. Displaying visual guidance that includes a color that reflects the pose of the electronic device when capture was initiated and a different color that reflects the pose of the electronic device after capture was initiated allows a user to quickly identify the relational change in pose of the electronic device, which allows a user to quickly correct the pose, to improve media capture (such that the user may not have to recapture images to capture a useable photo due to constant movement of the device). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at a second time after initiating capture, the electronic device detects (2812) a change (e.g., FIGS. 26K-26O) in pose of the electronic device. In some embodiments, in response to detecting the change in the pose of the electronic device, the electronic device displays (2814) the second set of one or more shapes (or the first set of one or more shapes) at a third position (e.g., 2670*c* in FIGS. 26L-26O) on the media camera user interface that is different from the second position on the media camera user interface. In some embodiments, display of the first set of one or more shapes is maintained at the same position on the camera user interface. Updating the visual characteristics of the one or more shapes allows a user to quickly identify how the current pose of the electronic device is related to the original pose of the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the change in the pose of the electronic device: in accordance with a determination that a difference between the first position of the first set of one or more shapes and third position of the second set of one or more shapes is within a first threshold difference, the electronic device forgoes displaying (e.g., 2670*b* in FIG. 26O) at least one of the first set of one or more shapes or the second set of one or more shapes; and in accordance with a determination that a difference between the first position of the first set of one or more shapes and third position of the second set of one or more shapes is not within a first threshold difference, the electronic device maintains display (e.g., 2670*b-c* in FIG. 26N) of the first set of one or more shapes or the second set of one or more shapes. In some embodiments, when the pose of the electronic device at the first time after initiating capture is within a predetermined proximity to the pose of the electronic device at the time when capture of the media was initiated, at least one of the first set of one or more shapes or the second set of one or more shapes ceases to be displayed. Automatically ceasing to display at least one of the set of one or more shapes only when prescribed conditions are met allows the user to quickly recognize that the current pose of the electronic device is in the original pose of the electronic device. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at a second time after initiating capture, the electronic device detects a change in pose of the electronic device. In some embodiments, in response to detecting the change in the pose of the electronic device: in accordance with a determination that a difference between the pose of the electronic device when capture of the media was initiated and a pose of the electronic device the at the second time after initiating capture of the media is within a second threshold difference, the electronic device generates a tactile output (e.g., 2620*a*) (e.g., a haptic (e.g., a vibration) output generated with one or more tactile output generators); and in accordance with a determination that a difference between the pose of the electronic device when capture of the media was initiated and a pose of the electronic device the at the second time after initiating capture of media is not within the second threshold difference, the electronic device forgoes generating the tactile output. Providing a tactile output only when prescribed conditions are met allows the user to quickly recognize that the current pose of the electronic device is in the original pose of the electronic device. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that a set of guidance criteria is satisfied and while capturing media, the electronic device displays a representation (e.g., instruction 2670*a*) that corresponds to a request (e.g., displaying a set of characteristics or symbols (e.g., "Hold Still")) to stabilize the electronic device (e.g., maintain a current pose of the electronic device). Displaying visual guidance that includes an instruction to stabilize the electronic device provides visual feedback that allows a user to quickly recognize that the device is capturing media and in order to optimize the capture of the media the device must be held still and allows the user to keep the same framing when capturing a plurality of images so that a maximum number of the images are useable and can be easily combined to form a useable or an improved merged photo. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the set of guidance criteria is not satisfied, the electronic device forgoes displaying, via the display device, the visual indication of the difference (e.g., visual guidance 2670).

In some embodiments, the visual indication is displayed at the first time. In some embodiments, at a third time that is different from the first time, the electronic device detects an end to the capturing of the media. In some embodiments, in response to detecting the end to the capturing of the media, the electronic device forgoes (e.g., FIG. 26Q-26R) displaying, via the display device, the visual indication (e.g., visual guidance 2670). Ceasing to display guidance when the capture duration has ended allows a user quickly recognized that the capture of media is over and that they no longer need to maintain the pose of the electronic device to improve the capture of media. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 2800 (e.g., FIGS. 28A-28B) are also applicable in an analogous manner to the methods described above. For example, methods 700, 900, 1100, 1300, 1500, 1700, 1900, 2100, 2300, 2500, 2700, 3000, 3200, 3400, 3600, and 3800 optionally include one or more of the characteristics of the various methods described above with reference to method 2800. For example, method 2700, optionally employs, displaying a visual guidance while capturing images in low-light mode using various techniques described above in relation to method 2800. For brevity, these details are not repeated below.

FIGS. 29A-29P illustrate exemplary user interfaces for managing the capture of media controlled by using an electronic device with multiple cameras in accordance with some embodiments. The user interfaces in these figures are used to illustrate the processes described below, including the processes in FIGS. 30A-30C.

FIGS. 29A-29J illustrate user interfaces for displaying live preview 630 while focusing on one or more objects in the field-of-view of one or more cameras at particular distances. To improve understanding, FIGS. 29A-29J includes a graphical representation of scene 2980 that illustrates the spatial relationship between electronic device 600, flower 2986, and tree 2988. For example, in FIG. 29A, scene 2980 includes a side profile of device 600, where the back side of device 600 is facing towards an environment that includes flower 2986 positioned in front of tree 2988. The back side of device 600 includes a camera with a wide field-of-view and a camera with a narrow field-of-view, which will be collectively referred to as "the back cameras" when describing FIGS. 29A-29P below. Because device 600 is configured to capture media at 1× zoom level (e.g., as shown by 1× zoom affordance 2622*b* being selected) and with a set of cameras on the back side of device 600 (e.g., as opposed to front cameras), device 600 is currently configured to capture media using the camera with the wide field-of-view and the camera with the narrow field-of-view. Thereby, at least a portion of flower 2986 and/or tree 2988 is in the field-of-view of the wide camera (WFOV) and at least a portion of flower 2986 and/or tree 2988 is in the field-of-view of the narrow camera (NFOV). In FIG. 29A, device 600 is within distance 2982*a* from flower 2986 and distance 2984*a* from tree 2988.

As illustrated in FIG. 29A, device 600 displays a camera user interface that includes a live preview 630 that extends from the top of the display to the bottom of the display. Live preview 630 is based on images detected in the field-of-view (e.g., WFOV and NFOV) of the back cameras (FOV). Live preview 630 includes a representation that shows flower 2986 positioned in front of tree 2988 (as described above in relation to scene 2980). In some embodiments, live preview 630 does not extend to the top and/or bottom of device 600.

As illustrated in FIG. 29A, the camera user interface of FIG. 29A includes indicator region 602 and control region 606, which are overlaid on live preview 630 such that indicators and controls can be displayed concurrently with live preview 630. To display the portion of live preview 630 in indicator region 602 and control region 606, device 600 uses the portion of scene 2980 (e.g., flower 2986 and tree 2988) that is in the WFOV. In addition, the camera user interface of FIG. 29A also includes camera display region 604, which is overlaid on live preview 630 and, in contrast to region 602 and 606, is not substantially overlaid with indicators or controls. To display the portion of camera display region 604, device 600 uses the portion of scene 2980 that is in the NFOV.

As illustrated in FIG. 29A, indicator region 602 includes a gray overlay and camera display region 604 does not include the gray overlay. At the transition of color between indicator region 602 and camera display region 604, visual boundary 608 is displayed between indicator region 602 and camera display region 604. Indicator region 602 includes flash indicator 602*a*, which indicates whether the flash is in an automatic mode, on, off, or in another mode (e.g., red-eye reduction mode). In some embodiments, other indicators (e.g., indicators 602*b*-602*f* are also included in indicator region 602.

As illustrated in FIG. 29A, control region 606 also includes a gray overlay, and visual boundary 608 is displayed between control region 606 and camera display region 604 at the transition of color between these regions. Control region 606 includes camera mode affordances 620, a portion of media collection 624, shutter affordance 610, and camera switcher affordance 612. Camera mode affordances 620 indicates which camera mode is currently selected (e.g., "Photo" mode as shown in bold) and enables the user to change the camera mode. In some embodiments, visual boundary 608 is displayed as a solid or dotted line between regions 602, 604, and 608.

FIGS. 29B-29E illustrate user interfaces for displaying live preview 630 while focusing on an object (e.g., flower 2986) that is closer in the FOV than another object (e.g., tree 2988). At FIG. 29A, device 600 detects tap gesture 2950*a* at a location that corresponds to a location in camera display region 604 (e.g., a location that corresponds to a portion of flower 2986 displayed in camera display region 604).

As illustrated in FIG. 29B, in response to detecting tap gesture 2950*a*, device 600 displays focus indicator 2936*a* around a portion of flower 2986 at a location that corresponds to tap gesture 2950*a*. Further, in response to detecting tap gesture 2950*a*, device 600 changes a focus setting such that the back cameras focus on the portion of flower 2986 surrounded by focus indicator 2936*a* (e.g., using similar techniques as discussed above in relation to input 1495G in FIGS. 14N-140 and input portion 1495H1 in FIGS. 14P-14Q). After device 600 changes the focus setting of the back cameras, device 600 displays flower 2986 with less blur (e.g., shown by bolded lines) than it was previously displayed in FIG. 29A because flower 2986 is now in focus of the back cameras. For further understanding, in FIG. 29B, scene 2980 also includes current focus indicator box 2990 to illustrate that device 600 is currently focusing on the portion of flower 2986. At FIG. 29B, device 600 detects a change in distance between device 600 and flower 2986 (e.g., the object in focus), where device 600 and flower 2986 have moved closer together.

As illustrated in FIG. 29C, in response to detecting the change in distance between device 600 and flower 2986, device 600 decreases the visual prominence of the portions of live preview 630 in indicator region 602 and control region 606 ("the outside portions") while maintaining the visual prominence of the portion of live preview 630 displayed in camera display region 604 ("the inside portion"). Here, device 600 decreases the prominence of the outside portions because distance 2982*b* between device 600 and flower 2986 (e.g., the object in focus) is within a first range of distances. In particular, device 600 increases the opacity of regions 602 and 606 such that the outside portions are displayed as darker to decrease their visual prominence. In some embodiments, device 600 decreases visual prominence of the outside portions by decreasing their brightness, color saturation, and/or contrasts. In some embodiments, decreasing visual prominence includes gradually fading the outside portions from the state of outside portions displayed in FIG. 29A to the state of outside portions displayed in FIG. 29B (or any other figures where visual prominence is decreased). In some embodiments, decreasing visual prominence includes gradually decreasing the opacity of regions 602 and/or 606.

As illustrated in FIG. 29C, in response to detecting the change in distance between device 600 and flower 2986, device 600 updates live preview 630. When updating live preview 630, device 600 updates the outside portions based on the WFOV (e.g., because the field-of-view of the wide camera is used to display the portion of live preview 630 in regions 602 and 606 as discussed above) and updates the inside portion based on the NFOV (e.g., because the field-of-view of the narrow camera is used to display the portion of live preview in camera display region 604 as discussed above). Notably, updating different regions of live preview 630 with cameras that have field-of-views that differ in size (e.g., width), causes device 600 to display live preview 630 with visual tearing along visual boundary 608 when device 600 is distance 2982*b* away from flower 2986 (e.g., or within the first range of distances). That is, device 600 displays the outside portions as being shifted with respect to the inside portion when device 600 is distance 2982*b* away from flower 2986. As illustrated in FIG. 29C, the stem of flower 2986 displayed in control region 606 is shifted to the right of the stem of flower 2986 in camera display region 604. In addition, some of the petals of flower 2986 displayed in indicator region 602 are shifted to the right of the same petals of flower 2986 in camera display region 604. In FIG. 29C, device 600 decreases the visual prominence of the outside portions, which increases the relative visual prominence of the camera display region relative to the outside region (e.g., making the visual tearing less prominent).

Looking back at FIG. 29A, when device 600 is at particular distances away from flower 2986 that are greater than 2982*b*, there is substantially no (e.g., none or minor) visual tearing or less of a chance of visual tearing while device 600 is configured to capture media at the 1× zoom level, so device 600 does not decrease the visual prominence of the outside portions. At FIG. 29C, device 600 detects a change in distance between device 600 and flower 2986 (e.g., the object in focus), where device 600 and flower 2986 have moved closer together.

As illustrated in FIG. 29D, in response to detecting the change in distance between device 600 and flower 2986, device 600 further decreases the visual prominence of the outside portions while maintaining the visual prominence of the inside portion because distance 2982*c* between device 600 and flower 2986 is within a second range of distances. Here, the second range of distances is lower than the first range of distances described in relation to FIG. 29C. In FIG. 29D, device 600 decreases the visual prominence of the outside portions by obscuring (e.g., fading or blacking out) the outside portions. In particular, device 600 has increased the opacity level of indicator region 602 and control region 606 such that the outside portions are not distinguishable, the portions of live preview 630 displayed in regions 602 and 606 appear to be black, and some portion of live preview 630 (e.g., the stem of flower 2986) that was previously displayed in FIG. 29C have ceased to be displayed. In some embodiments, device 600 has the determined that actual visual tearing or the likelihood of visual tearing are extreme when device 600 is distance 2982*c* away from flower 2986 (e.g., or within the second range of distances). Thus, in some embodiments, device 600 ceases to display the outside portions based on distance when device 600 has determined that the visual tearing or changes of visual tearing are extreme. At FIG. 29D, device 600 detects a change in distance between device 600 and flower 2986 (e.g., the object in focus), where device 600 and flower 2986 have moved further apart (e.g., back to distance 2982*a* as shown in FIG. 29A).

As illustrated in FIG. 29E, in response to detecting the change in distance between device 600 and flower 2986, device 600 increases the visual prominence of the outside portions because is distance 2982*a* away from flower 2986. In other words, in FIG. 29E, device 600 forgoes displaying the outside portions with the visual prominence in which they were displayed in FIG. 29B and FIG. 29C because distance 2982*a* is not within the first or second range of distances as discussed in relation to FIG. 29B. Notably, at FIG. 29F, device 600 displays live preview 630 with substantially no visual tearing. In some embodiments, device 600 has determined that distance 2982*a* is within a third range of distances where there is no actual visual tearing or little chance of visual tearing). In some embodiments, device 600 has determined that distance 2982*a* is within a third range of distances, increases the visual prominence to a maximum visual prominence.

FIGS. 29E-29I illustrate user interfaces for displaying live preview 630 while focusing on an object (e.g., tree 2988) that is farther away from device 600 than another object (e.g., flower 2986). At FIG. 29E, device 600 detects tap gesture 2950*e* at a location that corresponds to a location in camera display region 604 (e.g., a location that corresponds to a portion of tree 2988 displayed in camera display region 604).

As illustrated in FIG. 29F, in response to detecting tap gesture 2950*e*, device 600 displays focus indicator 2936*b* around a portion of tree 2988 at a location on camera display region 604 that corresponds to tap gesture 2950*e*. Further, in response to detecting tap gesture 2950*e*, device 600 changes a focus setting such that the back cameras change from focusing on the portion of flower 2986 to focusing on the portion of tree 2988 surrounded by focus indicator 2936*b* (using similar techniques as discussed above in relation to input 1495G in FIGS. 14N-140 and input portion 1495H1 in FIGS. 14P-14Q). After device 600 changes the focus setting of the back cameras, device 600 displays tree 2988 with less blur (e.g., shown by bolded lines) and flower with more blur (e.g., shown by dotted lines) than they were previously displayed in FIG. 29E. At FIG. 29F, scene 2980 illustrates current focus indicator box 2990 around tree 2988 because device 600 is currently focusing on a portion of tree 2988. At FIG. 29F, device 600 detects a change in distance between device 600 and tree 2988 (e.g., the object in focus), where device 600 and tree 2988 have moved closer together.

As illustrated in FIG. 29G, in response to detecting the change in distance between device 600 and tree 2988, device 600 forgoes decreasing the visual prominence of the outside portions because distance 2984*b* between device 600 and tree 2988 is not within the first range of distances (e.g., as opposed to distance 2982*b* in relation to FIG. 29C). In other words, device 600 making a determination based on distance 2984*b* (and not distance 2982*b*) being in the first range of threshold distances, device 600 does not change the visual prominence of the outside portions. Moreover, by not changing the visual prominence, visual tearing at visual boundary 608 is more apparent in FIG. 29G than in FIG. 29B because regions 602 and 606 have not been darkened. In particular, device 600 displays stem of flower 2986 control region 606 shifted to the right of the stem of flower 2986 in camera display region 604 and some of the petals of flower 2986 displayed in indicator region 602 shifted to the right of the same petals of flower 2986 in camera display region 604 without decreasing the visual prominence of any portion of live preview 630. At FIG. 29G, device 600 detects a change in distance between device 600 and tree 2988 (e.g., the object in focus), where device 600 and tree 2988 have moved closer together.

As illustrated in FIG. 29H, in response to detecting the change in distance between device 600 and tree 2988, device 600 forgoes decreasing the visual prominence of the outside portions because distance 2984*c* between device 600 and tree 2988 is not within the first range of distances (e.g., as opposed to distance 2982*c* in relation to FIG. 29C). Because device 600 has not decreased the visual prominence of any portion of live preview 630, device 600 displays more visual tearing at visual boundary 608 than in FIG. 29G, where the outside portions are shifted even further to the right of the inside portion. At FIG. 29H, device 600 detects a tap gesture 2950*h* at a location that corresponds to shutter affordance 610.

As illustrated in FIG. 29I, in response to detecting tap gesture 2950*h*, device 600 capture media based on the current state of live preview 630 that includes visual tearing at visual boundary 608 as displayed in FIG. 29H (using similar techniques as discussed in relation to FIGS. 8Q-8R). Further, in response to detecting tap gesture 2950*h*, device 600 updates media collection 624 that has been updated with a representation of the newly capture media. At FIG. 29I, device 600 detects tap gesture 2950*i* at a location that corresponds to indicator region 602.

As illustrated in FIG. 29I, in response to detecting tap gesture 2950*i*, device 600 forgoes changing a focus setting or displaying a focus indicator because the tap gesture 2950*i* was directed to a location outside of camera display region 604 (e.g., as opposed to gestures 2950*b* and 2950*f*). In FIG. 29I, in response to detecting tap gesture 2950*i*, device 600 maintains the camera user interface, the electronic device forgoes to update portions of the camera user interface (e.g., the camera user interface remains the same). At FIG. 29I, device 600 detects tap gesture 2950*j* at a location that corresponds to a location in camera display region 604 (e.g., a location that corresponds to a portion of flower 2986 displayed in camera display region 604).

As illustrated in FIG. 29K, in response to detecting tap gesture 2950*j*, device 600 displays focus indicator 2936*c* around a portion of flower 2986 at a location on camera display region 604 that corresponds to tap gesture 2950*j*. Further, in response to detecting tap gesture 2950*j*, device 600 changes a focus setting such that the back cameras change from focusing on the portion of tree 2988 to focusing on the portion of flower 2986 surrounded by focus indicator 2936*c* (using techniques similar to those discussed above in FIGS. 29A-29B). Because device 600 is focusing on a portion of flower 2986 instead of a portion of tree 2988, device 600 decreases the visual prominence of the outside portions because the distance between device 600 and flower 2986 (e.g., the object in focus) is within the third the range of distances. Here, because the object that device 600 was focusing on switched, the determination of which distance (e.g., distance 2982*c* or distance 2984*c*) to trigger whether or not to decrease (or, alternatively, increase) the visual prominence of the outside portions change. Thereby, device 600 makes a determination that distance 2982*c* between device 600 and flower 2986 (or distance 2984*c* between device 600 and tree 2988) is within the third range of distances and, in accordance with that determination, decreases the visual prominence of the outside portions (e.g., ceasing to display the outside portion) as described above in relation to FIG. 29C. To aid understanding, at FIG. 29K, scene 2980 illustrates current focus indicator box 2990 around flower 2986 because device 600 is currently focusing on a portion of flower 2986.

Before turning to FIG. 29L, FIGS. 29A-29K describe techniques based on whether to increase or decrease visual prominence based on certain scenarios. In some embodiments descriptions of FIGS. 29A-29K can be reversed (e.g., FIG. 29K-29A), skipped, re-ordered (e.g., such that, for example, device 600 can increase visual prominence where it decreases visual prominence in the above description, or vice-versa). In addition, in FIGS. 29A-29K, device 600 changes (or forgoes changing) visual prominence of a portion of live preview 630 based on whether a distance between device 600 and an object that is in focus is within or outside of a threshold value. In some embodiments, device 600 changes (or forgoes changing) visual prominence of a portion of live preview 630 based on other criteria. In some embodiments, device 600 changes (or forgoes changing) visual prominence of a portion of live preview 630 based on a predetermined relationship status to a respective object (e.g., whether the object is the closest or farthest object) in addition to or alternative to whether or not the object is in focus. In some embodiments, device 600 changes (or forgoes changing) visual prominence of a portion of live preview 630 based on the type of cameras that device 600 is using to display live preview 630. In some embodiments, device 600, device 600 changes (or forgoes changing) visual prominence of a portion of live preview 630 based on a determination of a likelihood that visual tearing will occur (e.g., at visual boundary 608) based on one or more environmental conditions (e.g., distance between device 600 and objects, lighting conditions, etc.). In some embodiments, when device 600 is using only one or more camera(s) (e.g., only using a telephoto camera) with the same size field-of-view(s), device 600 will forgo visual prominence of a portion of live preview 630 irrespective of a distance between an object in the cameras' field-of-view(s) and device 600. At FIG. 29K, device 600 detects tap gesture 2950*k* at a location that corresponds to media collection 624.

FIGS. 29L-29P illustrate user interfaces for editing media to show that device 600 captures and has available for use additional content (e.g., portions of live preview 630 displayed in regions 602 and 606 in FIG. 29H) for editing media although visual tearing has occurred. As illustrated in FIG. 29L, in response to detecting tap gesture 2950*k*, device 600 replaces display the camera user interface with display of a photo viewer interface. Media view interfaces include representation 2930, which is a representation of media captured in response to detecting tap gesture 2950*h* in FIG. 29H. In addition, media viewer user interface includes an edit affordance 644*a* for editing media, send affordance 644*b* for transmitting the captured media, favorite affordance 644*c* for marking the captured media as a favorite media, trash affordance 644*d* for deleting the captured media, and back affordance 644*e* for returning to display of live preview 630. At FIG. 29L, device 600 detects tap gesture 29501 at a location that corresponds to edit affordance 644*a*.

As illustrated in FIG. 29M, in response to detecting tap gesture 29501, device 600 replaces the media viewer user interface with a media editing user interface (using techniques similar to those in FIGS. 22A-22B and 24A). Media editing user interface includes representation 2930 and image content editing affordance 2210*d*. At FIG. 29M, device 600 detects tap gesture 2950*m* at a location that corresponds to image content editing affordance 2210*d*.

As illustrated in FIG. 29N, in response to detecting tap gesture 2950*m*, device 600 displays aspect ratio control affordance 626*c* near the top of device 600. At FIG. 29N, device 600 detects tap gesture 2950*n* at a location that corresponds to aspect ratio control affordance 626*c* (using similar to those described in 24J-24O).

As illustrated in FIG. 29O, in response to detecting tap gesture 2950*n*, device 600 displays visual boundary 608 on representation 2930. At FIG. 29O, device 600 detects pinching gesture 2950*o* on representation 2930.

As illustrated in FIG. 29P, in response to detecting pinching gesture 2950*o*, device 600 updates representation 2930 to display the portions of the media captured in FIG. 29H that were displayed in indicator region 602 and control region 606 of live preview 630. Here, as opposed to live preview 630 in FIG. 29H, device 600 has stitched together the portions of live preview 630 in regions 602, 604, 606 such that representation 2930 has substantially no visual tearing in FIG. 29P. In some embodiments, device 600 can capture outside portions that have been blacked out (e.g., in 29D) and stitches the outside portions to inside portion to display a representation of media (live preview 630 in regions 602, 604, 606) with little to no visual tearing. In some embodiments, device 600 forgoes displaying the stitched representation unless a request is received (e.g., pinching gesture 2950*o*) and, instead, displays a representation of the captured media that is not stitched (e.g., as shown by representation 2930 in FIG. 29L, the representation of the portion of live preview 630 displayed in camera display region 604 in 29H).

FIGS. 30A-30C are a flow diagram illustrating a method for managing the capture of media controlled by using an electronic device with multiple cameras in accordance with some embodiments. Method 3000 is performed at a device (e.g., 100, 300, 500, 600) with a display device (e.g., a touch-sensitive display). Some operations in method 3000 are, optionally, combined, the orders of some operations are, optionally, changed, and some operations are, optionally, omitted.

As described below, method 3000 provides an intuitive way for managing the capture of media controlled by using an electronic device with multiple cameras. The method reduces the cognitive burden on a user for managing the capture of media using an electronic device that has multiple cameras, thereby creating a more efficient human-machine interface. For battery-operated computing devices, enabling a user to capture media faster and more efficiently conserves power and increases the time between battery charges.

An electronic device (e.g., 600) includes a display device (e.g., a touch-sensitive display) and one or more cameras (e.g., one or more cameras (e.g., a first camera and second camera (e.g., the second camera has a wider field-of-view than the first camera)) (e.g., dual cameras, triple camera, quad cameras, etc.) on different sides of the electronic device (e.g., a front camera, a back camera))). The electronic device displays (3002), via the display device, a camera user interface, the camera user interface. The camera user includes: a first region (e.g., 604) (e.g., a camera display region), the first region including (3004) a first representation (e.g., a representation over-time, a live preview feed of data from the camera) of a first portion (e.g., a first portion of the field-of-view of a first camera) of a field-of-view of the one or more cameras (e.g., an open observable area that is visible to a camera, the horizontal (or vertical or diagonal) length of an image at a given distance from the camera lens) (e.g., a first camera); and a second region (e.g., 602 and/or 606) (e.g., a camera control region) that is outside of the first region and is visually distinguished from the first region. Displaying a second region that is visually different from a first region provides the user with feed about content that the main content that will be captured and used to display media and the additional content that may be captured to display media, allowing a user to frame the media to keep things in/out the different regions when capturing media. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The second region includes (3006), in accordance with a determination that a set of first respective criteria is satisfied, where the set of first respective criteria includes a criterion that is satisfied when a first respective object (e.g., 2986) (e.g., a detected observable object, object in focus, object within the focal plane of one or more cameras) in the field-of-view of the one or more cameras is a first distance (e.g., 2982*b*) from the one or more cameras, the electronic device displays (3008), in the second region, a second portion of the field-of-view of the one or more cameras with a first visual appearance (e.g., 602 in FIG. 29C). Choosing to display a portion of the field of view in the second region based on when a prescribed condition is met or not met allows the electronic device to provide an optimized user interface to decrease the prominence of the second region when there is a determination that the field-of-view of one or more cameras of the electronic device is likely to cause visual tearing when rendered on a camera user interface of the electronic device and/or increase the prominence of the second region when there is a determination that the field-of-view of one or more cameras of the electronic device is not likely to cause visual tearing when rendering on the camera user interface. This reduces the distraction that visual tearing causes the user when capturing media, for example, allowing a user to spend less time framing and capturing an image. In addition, this reduces the chances that the device will perform computationally intensive stitching operations that the device performs in order to correct the captured image; and thus, this reduces power usage and improves battery life of the device by enabling the user to use the device more quickly and efficiently. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

The second region includes, in accordance with a determination that a set of second respective criteria is satisfied, where the set of second respective criteria includes a criterion that is satisfied when the first respective object (e.g., a detected observable object, object in focus, object within the focal plane of one or more cameras) in the field-of-view of the one or more cameras is a second distance (e.g., 2982*a*) from the one or more cameras, the electronic device forgoes (3010) displaying, in the second region, the second portion of the field-of-view of the one or more cameras with the first visual appearance (e.g., 602 in FIG. 29B). Choosing to display a portion of the field of view in the second region based on when a prescribed condition is met or not met allows the electronic device to provide an optimized user interface to decrease the prominence of the second region when there is a determination that the field-of-view of one or more cameras of the electronic device is likely to cause visual tearing when rendered on a camera user interface of the electronic device and/or increase the prominence of the second region when there is a determination that the field-of-view of one or more cameras of the electronic device is not likely to cause visual tearing when rendering on the camera user interface. This reduces the distraction that visual tearing causes the user when capturing media, for example, allowing a user to spend less time framing and capturing an image. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second region includes a plurality of control affordances (e.g., a selectable user interface object) (e.g., proactive control affordance, a shutter affordance, a camera selection affordance, a plurality of camera mode affordances) for controlling a plurality of camera settings (e.g., 620) (e.g., flash, timer, filter effects, f-stop, aspect ratio, live photo, etc.) (e.g., changing a camera mode) (e.g., taking a photo) (e.g., activating a different camera (e.g., front facing to rear facing)).

In some embodiments, the electronic device is configured (3012) to focus on the first respective object in the field-of-view of the one or more cameras. In some embodiments, while displaying the second portion of the field-of-view of the one or more cameras with the first visual appearance, the electronic device receives (3014) a first request (e.g., 2950*a*) to adjust a focus setting of the electronic device. In some embodiments, in response to receiving the first request to adjust the focus setting of the electronic device (e.g., a gesture (e.g., tap) directed towards the first region), the electronic device configures (3016) the electronic device to focus on a second respective object in the field-of-view of the one or more cameras (e.g., 2936*a*). In some embodiments, while (3018) the electronic device is configured to focus on the second respective object in the field-of-view of the one or more cameras and in accordance with a determination that a set of third respective criteria is satisfied, where the set of third respective criteria includes a criterion that is satisfied when the second respective object (e.g., 2988) in the field-of-view of the one or more cameras (e.g., a detected observable object, object in focus, object within the focal plane of one or more cameras) is a third distance (e.g., 2984*b*) (e.g., a further distance away than from the one or more cameras than the first respective object) from the one or more cameras, the electronic device forgoes (3020) displaying (e.g., 602 in 29G), in the second region, the second portion of the field-of-view of the one or more cameras with the first visual appearance. In some embodiments, in accordance with a determination that the set of third respective criteria is not satisfied, where the set of third respective criteria includes a criterion that is satisfied when the second respective object in the field-of-view of the one or more cameras, the electronic device displays (or maintaining display), in the second region, the second portion of the field-of-view of the one or more cameras with the first visual appearance. Choosing to display a portion of the field of view in the second region based on when a prescribed condition is met or not met concerning an object in focus of one or more cameras of the electronic device allows the electronic device to provide an optimized user interface to decrease the prominence of the second region when there is a determination that the field-of-view of one or more cameras of the electronic device is likely to cause visual tearing when rendered on a camera user interface of the electronic device and/or increase the prominence of the second region when there is a determination that the field-of-view of one or more cameras of the electronic device is not likely to cause visual tearing when rendering on the camera user interface. This reduces the distraction that visual tearing causes the user when capturing media, for example, allowing a user to spend less time framing and capturing an image. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second portion of the field-of-view of the one or more cameras with the first visual appearance (e.g., 602 in FIG. 29C), the electronic device detects a first change (e.g., increase in distance when first respective object is in focus) in distance between the first respective object (e.g., 2986) in the field-of-view of the one or more cameras and the one or more cameras. In some embodiments, in response detecting the first change in distance between the first respective object in the field-of-view of the one or more cameras and the one or more cameras and in accordance with a determination that a set of fourth respective criteria is satisfied, where the set of fourth respective criteria includes a criterion that is satisfied when the first respective object in the field-of-view of the one or more cameras is a fourth distance (e.g., 2982*c*) from the one or more cameras, the electronic device forgoes (e.g., 602 in FIG. 29D) displaying, in the second region, the second portion of the field-of-view of the one or more cameras with the first visual appearance. In some embodiments, in accordance with a determination that the set of fourth respective criteria is not satisfied, where the set of fourth respective criteria includes a criterion that is satisfied when the first respective object in the field-of-view of the one or more cameras is the fourth distance from the one or more cameras, the electronic device displays (e.g., maintains display), in the second region, the second portion of the field-of-view of the one or more cameras with the third visual appearance that is less visually prominent than the first visual appearance. Choosing to display a portion of the field of view in the second region based on when a prescribed condition is met or not met based on a distance between the electronic device and an object allows the electronic device to provide an optimized user interface to decrease the prominence of the second region when there is a determination that the field-of-view of one or more cameras of the electronic device is likely to cause visual tearing when rendered on a camera user interface of the electronic device and/or increase the prominence of the second region when there is a determination that the field-of-view of one or more cameras of the electronic device is not likely to cause visual tearing when rendering on the camera user interface. This reduces the distraction that visual tearing causes the user when capturing media, for example, allowing a user to spend less time framing and capturing an image. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of forgoing displaying, in the second region, the second portion of the field-of-view of the one or more cameras with the first visual appearance, the electronic device ceases to display (e.g., 602 in FIG. 29D), in the second region, at least some of a third portion of the field-of-view of the one or more cameras that was previously displayed in the second region. Ceasing to display portions of the field-of-view of the one or more cameras allows the electronic device to provide an optimized user interface to decrease the prominence of the second region when there is a determination that the field-of-view of one or more cameras of the electronic device is likely to cause visual tearing when rendered on a camera user interface of the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of forgoing displaying, in the second region, the second portion of the field-of-view of the one or more cameras with the first visual appearance, the electronic device increases (e.g., 602 in FIG. 29D) the opacity of a first darkening layer (e.g., a simulated darkening layer; a simulated masking layer) overlaid on the second region (e.g., is displayed with less detail, less color saturation, less brightness, and/or less contrast; displayed with a more opaque masking/darkening layer) (e.g., the second region appears to have less brightness, contrast, and/or color saturation than the first region). Increasing the opacity of a darkening layer overlaid on the second region reduces the visual allows the electronic device to provide an optimized user interface to decrease the prominence of the second region when there is a determination that the field-of-view of one or more cameras of the electronic device is likely to cause visual tearing when rendered on a camera user interface of the electronic device. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device is configured to focus on the first respective object in the field-of-view of the one or more cameras. In some embodiments, while the second portion of the field-of-view of the one or more cameras is not displayed with the first visual appearance, the electronic device receives a second request (e.g., 2950*j*) to adjust a focus setting of the electronic device. In some embodiments, in response to receiving the second request to adjust the focus setting of the electronic device, the electronic device configures the electronic device to focus on a third respective object in the field-of-view of the one or more cameras. In some embodiments, while the electronic device is configured to focus on the third respective object in the field-of-view of the one or more cameras and in accordance with a determination that a set of fifth respective criteria is satisfied, where the set of fifth respective criteria includes a criterion that is satisfied when the third respective object in the field-of-view of the one or more cameras (e.g., a detected observable object, object in focus, object within the focal plane of one or more cameras) is a fifth distance (e.g., a closer distance from the one or more cameras than the first respective object) from the one or more cameras, the electronic device displays, in the second region, the second portion of the field-of-view of the one or more cameras with the first visual appearance. In some embodiments, in accordance with a determination that the set of fifth respective criteria is not satisfied, where the set of fifth respective criteria includes a criterion that is satisfied when the third respective object in the field-of-view of the one or more cameras (e.g., a detected observable object, object in focus, objects within the focal plane of one or more cameras) is the fifth distance (e.g., a closer distance from the one or more cameras than the first respective object) from the one or more cameras, the electronic device forgoes displaying, in the second region, the second portion of the field-of-view of the one or more cameras with the first visual appearance. Choosing to display a portion of the field of view in the second region based on when a prescribed condition is met or not met concerning an object in focus allows the electronic device to provide an optimized user interface to decrease the prominence of the second region when there is a determination that the field-of-view of one or more cameras of the electronic device is likely to cause visual tearing when rendered on a camera user interface of the electronic device and/or increase the prominence of the second region when there is a determination that the field-of-view of one or more cameras of the electronic device is not likely to cause visual tearing when rendering on the camera user interface. This reduces the distraction that visual tearing causes the user when capturing media, for example, allowing a user to spend less time framing and capturing an image. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the second portion of the field-of-view of the one or more cameras with the first visual appearance is not displayed, the electronic device detects a second change (e.g., decrease in distance when first respective object is in focus) in distance (e.g., 2982*c*) between the first respective object in the field-of-view of the one or more cameras and the one or more cameras. In some embodiments, in response detecting the second change in the distance between the first respective object in the field-of-view of the one or more cameras and the one or more cameras and in accordance with a determination that the set of sixth respective criteria is satisfied, where the set of sixth respective criteria includes a criterion that is satisfied when the first respective object in the field-of-view of the one or more cameras is a sixth distance (e.g., 2982*a*) from the one or more cameras, the electronic device displays, in the second region, the second portion of the field-of-view of the one or more cameras with the first visual appearance (e.g., in FIG. 29E). In some embodiments, in accordance with a determination that the set of sixth respective criteria is not satisfied, where the set of sixth respective criteria includes a criterion that is satisfied when the first respective object in the field-of-view of the one or more cameras is the sixth distance from the one or more cameras, the electronic device forgoes displaying, in the second region, the second portion of the field-of-view of the one or more cameras with the first visual appearance. Choosing to display a portion of the field of view in the second region based on when a prescribed condition is met or not met based on the distance between the electronic device and an object allows the electronic device to provide an optimized user interface to decrease the prominence of the second region when there is a determination that the field-of-view of one or more cameras of the electronic device is likely to cause visual tearing when rendered on a camera user interface of the electronic device and/or increase the prominence of the second region when there is a determination that the field-of-view of one or more cameras of the electronic device is not likely to cause visual tearing when rendering on the camera user interface. This reduces the distraction that visual tearing causes the user when capturing media, for example, allowing a user to spend less time framing and capturing an image. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of displaying, in the second region, the second portion of the field-of-view of the one or more cameras with the first visual appearance includes (e.g., the first visual appearance is more visually prominent that a previous appearance of the second portion of the field-of-view (e.g., is displayed with more detail, more color saturation, more brightness, and/or more contrast; displayed with a less masking/darkening layer)), the electronic device displays (e.g., 602 in FIG. 29E), in the second region, a fourth portion of the field-of-view of the one or more cameras that was not previously displayed in the second region. Showing additional content to the user allows the electronic device to provide an optimized user interface to increase the prominence of the second region when there is a determination that the field-of-view of one or more cameras of the electronic device is not likely to cause visual tearing when rendered on a camera user interface of the electronic device and allows a user to see more of the field-of-view of the one or more cameras when taking an image in order to provide additional contextual information that enables the user to frame the media quicker and capture media using the camera user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of displaying, in the second region, the second portion of the field-of-view of the one or more cameras with the first visual appearance includes (e.g., is displayed with more detail, more color saturation, more brightness, and/or more contrast; displayed with a less opaque masking/darkening layer) (e.g., the first visual appearance is more visually prominent that a previous appearance of the second portion of the field-of-view (e.g., is displayed with more detail, more color saturation, more brightness, and/or more contrast; displayed with a less masking/darkening layer)), the electronic device decreases (e.g., 602 in FIG. 29E) the opacity of a second darkening layer (e.g., a simulated darkening layer; a simulated masking layer) overlaid on the second region (e.g., the second region appears to have more brightness, contrast, and/or color saturation than the first region). Decreasing the opacity of a darkening layer overlaid on the second region reduces the visual allows the electronic device to provide an optimized user interface to increase the prominence of the second region when there is a determination that the field-of-view of one or more cameras of the electronic device is not likely to cause visual tearing when rendered on a camera user interface of the electronic device and allows a user to see more of the field-of-view of the one or more cameras when taking an image in order to provide additional contextual information that enables the user to frame the media quicker and capture media using the camera user interface, which, for example, reduces the number of media captures that a user has to perform to produce media. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first visual appearance includes a first visual prominence. In some embodiments, as a part of displaying the second portion of the field-of-view of the one or more cameras with the first visual appearance, the electronic device displays an animation that gradually transitions (e.g., displayed at different appearances that are different from the first visual appearance and second visual appearance before displaying the first visual appearance) the second portion of the field-of-view of the one or more cameras from a second visual appearance to the first visual appearance. In some embodiments, the second visual appearance has a second visual prominence (e.g., is displayed with more/less detail, more/less color saturation, more/less brightness, and/or more/less contrast; displayed with a less/more opaque masking/darkening layer) that is different from the first visual prominence. In some embodiments, the first visual appearance is different from the second visual appearance. Displaying an animation that gradually transitions the second region from one state of visual prominence to a second state of visual prominence provides the user a user interface with reduce visual tearing while reducing the chances for distraction that an abrupt change in visual prominence can cause user actions (e.g., shaking or moving the device) that interrupts the user's ability to frame and capture media using the camera user interface or increases the amount of time for framing and capturing media. Decreasing the opacity of a darkening layer overlaid on the second region reduces the visual allows the electronic device to provide an optimized user interface to increase the prominence of the second region when there is a determination that the field-of-view of one or more cameras of the electronic device is not likely to cause visual tearing when rendered on a camera user interface of the electronic device and allows a user to see more of the field-of-view of the one or more cameras when taking an image in order to provide additional contextual information that enables the user to frame the media quicker and capture media using the camera user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first portion is displayed with a third visual appearance that is different from (e.g., is displayed with more/less detail, color saturation, brightness, and/or contrast; displayed with a less/more masking/darkening layer) the first visual appearance. In some embodiments, while displaying the first portion is displayed with the third visual appearance and the second portion of the field-of-view of the one or more cameras is displayed with the first visual appearance, the electronic device receives a request to capture media (e.g., 2950*h*). In some embodiments, the second portion is blacked-out, and the region is not blacked out. In some embodiments, in response to receiving the request to capture media, the electronic device captures media corresponding to the field-of-view of the one or more cameras, the media including content from the first portion of the field-of-view of the one or more cameras and content from the second portion of the field-of-view of the one or more cameras. In some embodiments, after capturing the media corresponding to the field-of-view of the one or more cameras, the electronic device displays a representation (e.g., 2930 in FIG. 26P) of the media that includes content from the first portion of the field-of-view of the one or more cameras and content from the second portion of the field-of-view of the one or more cameras. In some embodiments, the representation of the media does not have the first visual appearance.

In some embodiments, at least a first portion of the second region (e.g., 602) is above (e.g., closer to the camera of the device, closer to top of the device) the first region. In some embodiments, at least a second portion of the second region (e.g., 606) is below (e.g., further away from the camera of the device, closer to the bottom of the device) the second region.

In some embodiments, the electronic device receives an input at a location on the camera user interface. In some embodiments, in response to receiving the input at the location on the camera user interface: the electronic device, in accordance with a determination that the location of the input (e.g., 2950*j*) is in the first region (e.g., 604), configures the electronic device to focus (and optionally set one or more other camera settings such as exposure or white balance based on properties of the field-of-view of the one or more cameras) at the location of the input (e.g., 2936*c*); and the electronic device, in accordance with a determination that the location of the input (e.g., 2950*hi*) is in the second region (e.g., 602), forgoes configuring the electronic device to focus (and optionally forgoing setting one or more other camera settings such as exposure or white balance based on properties of the field-of-view of the one or more cameras) at the location of the input.

In some embodiments, when displayed with the first appearance, the second region (e.g., 602) is visually distinguished from the first region (e.g., 604) (e.g., the content that corresponds to the field-of-view of the one or more cameras in the second region is faded and/or displayed with a semi-transparent overlay, and the content that corresponds to the field-of-view of the one or more cameras in the first region is not faded and/or displayed with a semi-transparent overlay). Displaying a second region that is visually different from a first region provides the user with feed about content that the main content that will be captured and used to display media and the additional content that may be captured to display media, allowing a user to frame the media to keep things in/out the different regions when capturing media. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the set of first respective criteria further includes a criterion that is satisfied when the first respective object is the closest object identified in the field-of-view of the one or more cameras. In some embodiments, the set of first respective criteria further includes a criterion that is satisfied when the first respective object is at a location of focus in the field-of-view of the one or more cameras.

In some embodiments, the first region is separated from the second region by a boundary (e.g., 608). In some embodiments, the set of first respective criteria further includes a criterion that is satisfied when detected visual tearing (e.g., in FIG. 26H) (e.g., screen tearing (e.g., appearance (e.g., of a visual artifact) that a representation displayed in first region is not visually in sync with representation displayed in second region (e.g., second representation appears to be shifted in a direction (e.g., right or left) such that a single object displayed across the first representation and the second representation appears to be altered (e.g., such that the part of the object displayed in the first representation appears not to be in line with a part of the object displayed in the second representation)) adjacent to (e.g., next to, on) the boundary is above a threshold level of visual tearing.

In some embodiments, the set of first respective criteria further includes a criterion that is satisfied when the first portion of the field-of-view of the one or more cameras is a portion of a field-of-view of a first camera. In some embodiments, the set of second respective criteria further includes a criterion that is satisfied when the second portion of the field-of-view of the one or more cameras is a portion of a field-of-view of a second camera that is different from the first camera (e.g., as described below in relation to FIG. 31A-FIG. 31I and method 3200 described in FIGS. 32A-FIG. 32C). In some embodiments, the first camera is a first type of camera (e.g., cameras with different lens of different widths (e.g., ultra wide-angle, wide-angle, telephoto camera)) that is different from a second type of the second camera (e.g., cameras with different lens of different widths (e.g., ultra wide-angle, wide-angle, telephoto camera.

In some embodiments, while displaying the second portion of the field-of-view of the one or more cameras with a first visual appearance, the electronic receives a request to capture media. In some embodiments, in response to receiving the request to capture media, the electronic device receives media corresponding to the field-of-view of the one or more cameras, the media including content from the first portion of the field-of-view of the one or more cameras and content from the second portion of the field-of-view of the one or more cameras. In some embodiments, after capturing the media, the electronic device receives a request (e.g., 2950*o*) to edit the captured media. In some embodiments, in response to receiving the request to edit the captured media, the electronic device displays a representation (e.g., 2930 in FIG. 26P) of the captured media that includes at least some of the content from the first portion of the field-of-view of the one or more cameras and at least some of the content from the second portion of the field-of-view of the one or more cameras. In some embodiments, the representation of the media item that includes the content from the portion and the content from the second portion is a corrected version (e.g., stabilized, horizon corrected, vertical perspective corrected, horizontal perspective corrected) of a representation of the media. In some embodiments, the representation of the media item that includes the content from the portion and the content from the second portion includes the combination of the first and the second content includes displaying a representation of at least some of the content from the first portion and a representation of at least some of content from the second portion. In some embodiments, the representation does not include displaying a representation of at least some of the content of the second portion (or first portion), the representation of the media item is generated using at least some of the content from the second portion without displaying at least some of the content of the second portion.

Note that details of the processes described above with respect to method 3000 (e.g., FIGS. 30A-30C) are also applicable in an analogous manner to the methods described above. For example, methods 700, 900, 1100, 1300, 1500, 1700, 1900, 2100, 2300, 2500, 2700, 2800, 3200, 3400, 3600, and 3800 optionally include one or more of the characteristics of the various methods described above with reference to method 3000. For example, method 3200, optionally employs, changing the visual prominence of various regions of the camera user interface using various techniques described above in relation to method 3000. For brevity, these details are not repeated below.

FIGS. 31A-31I illustrate exemplary user interfaces for displaying a camera user interface at various zoom level using different cameras of an electronic device in accordance with some embodiments. The user interfaces in these figures are used to illustrate the processes described below, including the processes in FIGS. 32A-32C. In some embodiments, one or more techniques as discussed in FIGS. 29A-29P and 30A-30C may be optionally combined with one or more techniques of FIGS. 31A-31I and FIGS. 32A-32C discussed below.

Figure 31A:
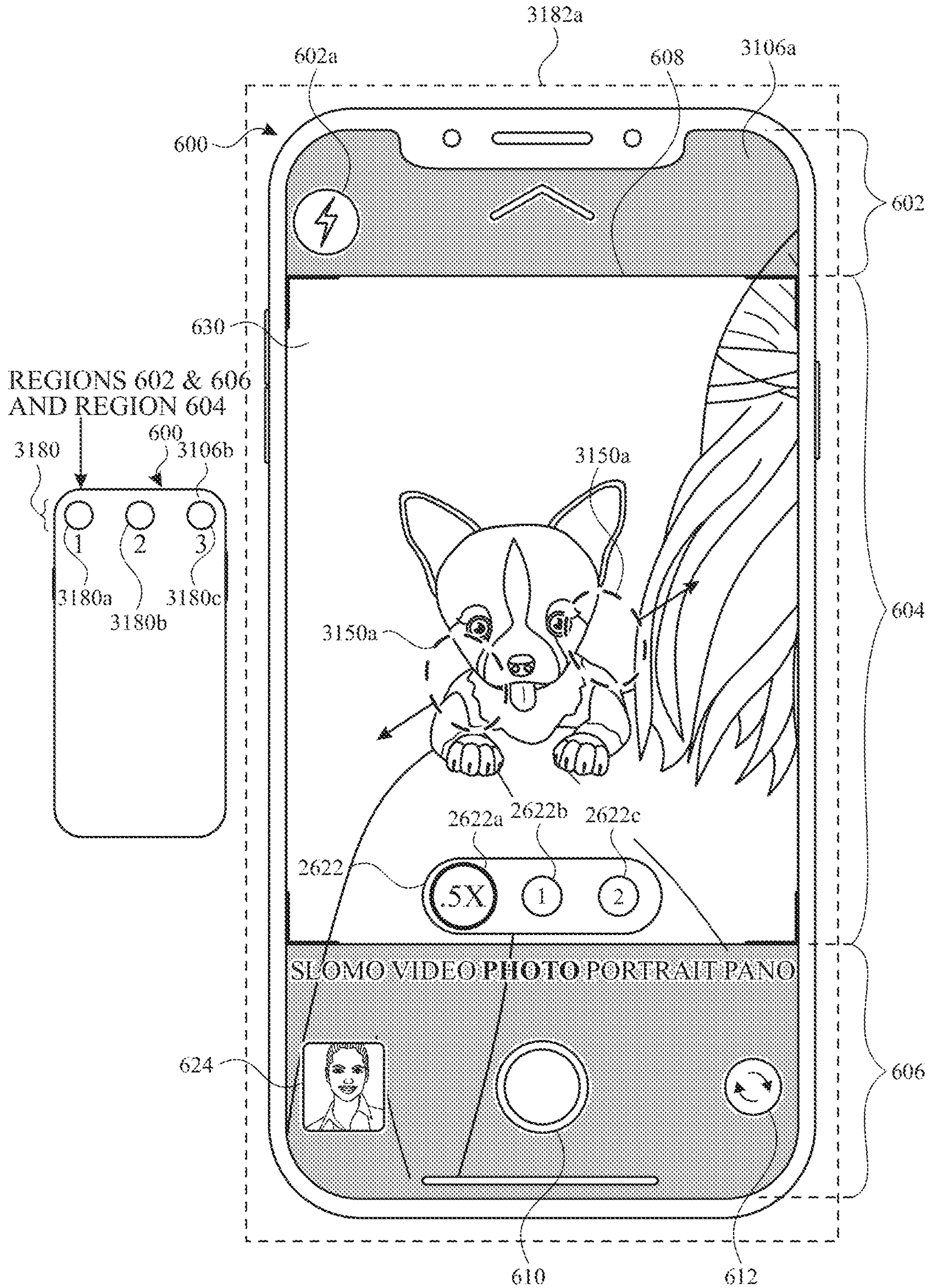
FIGS. 31A-31I illustrate exemplary user interfaces for displaying a camera user interface at various zoom level using different cameras of an electronic device in accordance with some embodiments.
Figure 32B:
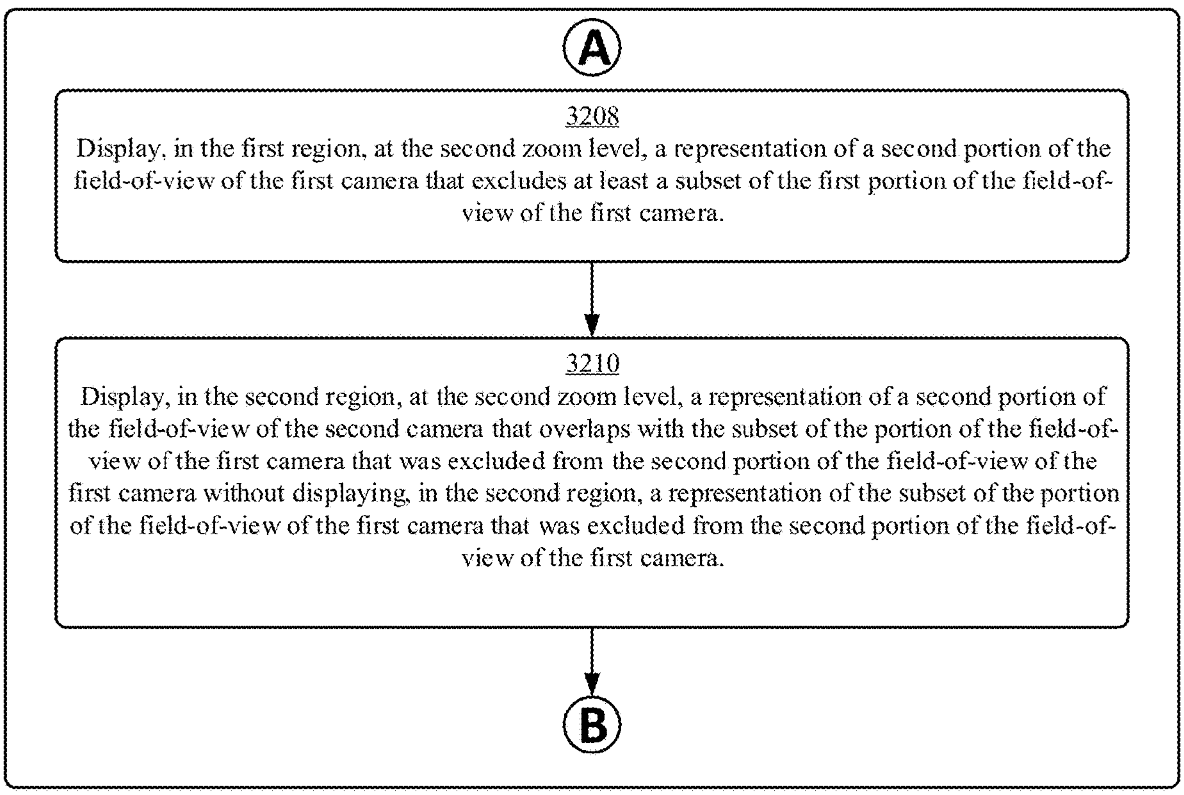

FIG. 31A illustrates electronic device 600 that includes a front side 3106*a* and a back side 3106*b*. A touch-sensitive display is located on front side 3106*a* of device 600 and used to display a camera user interface. The camera user interface includes indicator region 602 and control region 606, which are overlaid on live preview 630 such that indicators and controls can be displayed concurrently with live preview 630. Camera display region 604 is substantially not overlaid with indicators or controls. In this example, live preview 630 includes a dog sitting on a person's shoulder in a surrounding environment. The camera user interface of FIG. 31A also includes visual boundary 608 that indicates the boundary between indicator region 602 and camera display region 604 and the boundary between camera display region 604 and control region 606.

As illustrated in FIG. 31A, indicator region 602 is overlaid onto live preview 630 and optionally includes a colored (e.g., gray; translucent) overlay. Indicator region 602 includes flash indicator 602*a*. Flash indicator 602*a* indicates whether the flash is in an automatic mode, on, off, or in another mode (e.g., red-eye reduction mode).

As illustrated in FIG. 31A, camera display region 604 includes live preview 630 and zoom affordances 2622, which include 0.5× zoom affordance 2622*a*, 1× zoom affordance 2622*b*, and 2× zoom affordance 2622*c*. In this example, 0.5× zoom affordance 2622*a* is selected, which indicates that live preview 630 is displayed at a 0.5× zoom level.

As illustrated in FIG. 31A, control region 606 is overlaid onto live preview 630 and optionally includes a colored (e.g., gray; translucent) overlay. Control region 606 includes camera mode affordances 620, a portion of media collection 624, shutter affordance 610, and camera switcher affordance 612. Camera mode affordances 620 indicates which camera mode is currently selected and enables the user to change the camera mode.

As illustrated in FIG. 31A, live preview 630 that extends from the top of the display to the bottom of the display. Live preview 630 is a representation of content detected by one or more cameras (e.g., or camera sensors). In some embodiments (e.g., under certain conditions), device 600 uses a different set of the one or more cameras to display live preview 630 at different zoom levels. In some embodiments, at one zoom level, device 600 uses content from a first camera to display the portion of live preview 630 that is displayed in camera display region 604 and a second camera (e.g., a camera that has a wider field-of-view (FOV) than the first camera) to display the portions of live preview 630 that are displayed in indicator region 602 and control region 606. In some embodiments, device 600 uses content from only one camera to display the entirety of live preview 630. In some embodiments, live preview 630 does not extend to the top and/or bottom of device 600.

To improve understanding concerning the exemplary set of cameras that contribute to display of live preview 630 at particular zoom levels, FIGS. 26A-26S include an exemplary representation of the back side 3106*b* of device 600. Back side 3106*b* of device 600 includes cameras 3180. Each FOV of cameras 3180 has a different width (e.g., different width of the angle encompassed in the FOV), which is due to each cameras 3180 having a different combination of camera sensors and lenses. Cameras 3180 includes ultra wide-angle camera 3180*a*, wide-angle camera 3180*b*, and telephoto camera 3180*c*, which is shown on back side 3106*b* with FOVs from widest to narrowest. In addition, to improve understanding concerning the exemplary set of cameras that contribute to display of live preview 630 at particular zoom levels, FOV box 3182*a* is also shown encompassing front side 3106*a* of device 600. FOV box 3182*a* in relation to live preview 630 is representative of the portion of the FOV of the camera that device 600 is using to display the portion of live preview 630 displayed in the camera display region 604 (e.g., ultra wide-angle camera 3180*a* in FIG. 31A). FOV box 3182*a* is not shown at scale. In FIG. 31A, FOV box 3182*a* shows that the FOV of ultra wide-angle camera 3180*a* is sufficient (e.g., wide enough) to provide content for the entirety of live preview 630, including camera display region 604, indicator region 602, and control region 606. In contrast, in FIG. 31C, which is discussed in more detail below, wide angle camera 3180*b* is being used to provide content for camera display region 604, but the FOV of wide angle camera 3180*b* is not sufficient to provide content for the entirety of indicator region 602 and control region 606, as shown by the FOV box 3182*b*.

As discussed above, device 600 is displaying live preview 630 at the 0.5× zoom level in FIG. 31A. Because the 0.5× zoom level within a first range of zoom values (e.g., less than a 1× zoom level), device 600 uses only ultra wide-angle camera 3180*a* to display portions of live preview 630 in regions 602, 604, and 606. As illustrated FIG. 31A, FOV box 3182*a* is the FOV of ultra wide-angle camera 3180*a*. In addition, FOV box 3182*a* encompasses live preview 630, which indicates that the FOV of ultra wide-angle camera 3180*a* is large enough (e.g., wide enough) for device 600 to use ultra wide-angle camera 3180*a* to display the entirety of live preview 630 (e.g., including portions of live preview 630 in regions 602, 604, and 606). Here, because the FOV of ultra wide-angle camera 3180*a* is large enough to provide the entirety of live preview 630 (and/or the 0.5× zoom level within a first range of zoom values), device 600 uses only ultra wide-angle camera 3180*a* to display portions of live preview 630 in regions 602, 604, and 606. At FIG. 31A, device 600 detects de-pinching gesture 3150*a* at a location corresponds to camera display region 604.

Figure 31B:
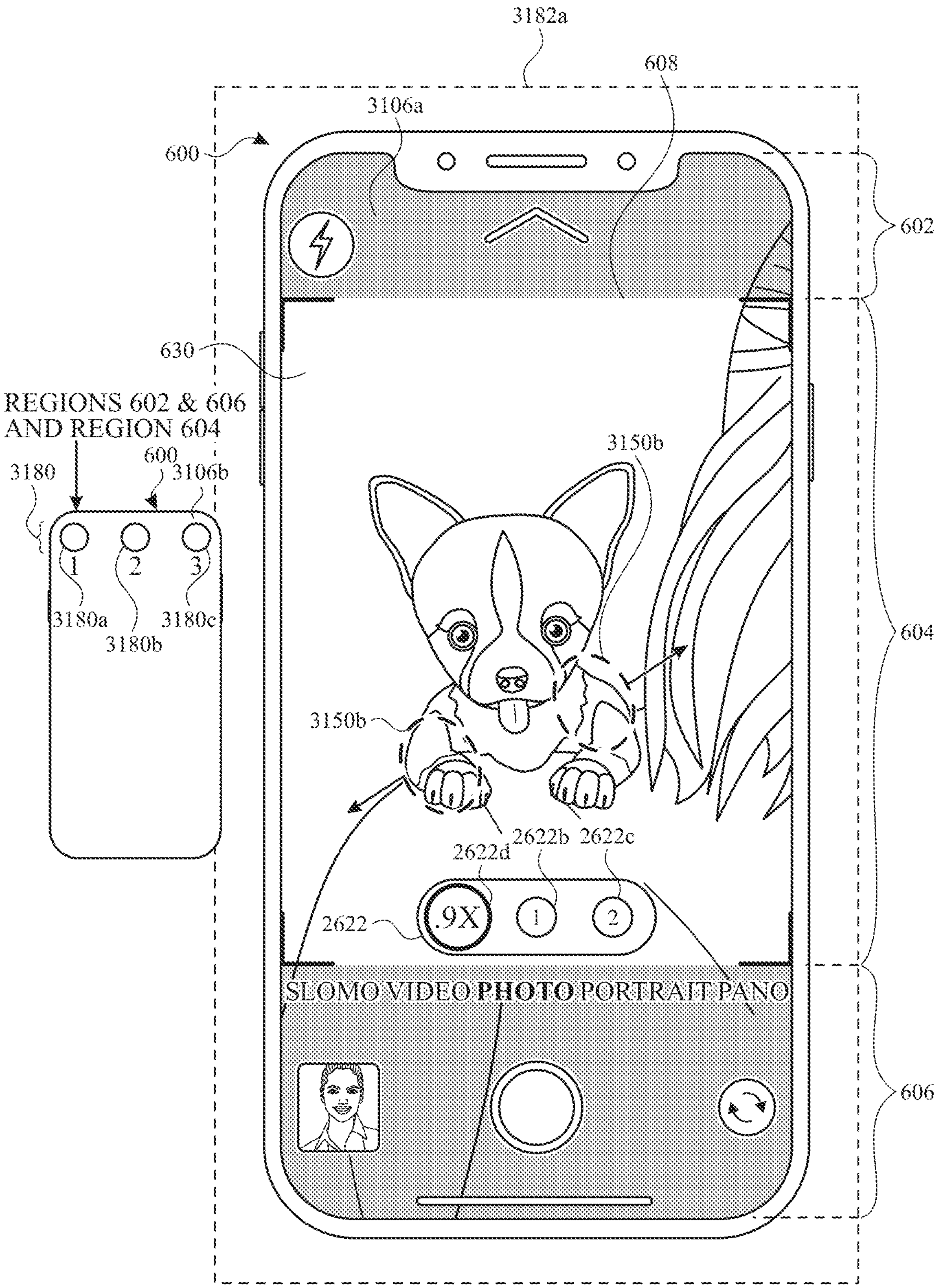

As illustrated in FIG. 31B, in response to detecting de-pinching gesture 3150*a*, device 600 zooms in live preview 630, changing the zoom level of live preview 630 from the 0.5× zoom level to a 0.9× zoom level (e.g., as indicated by newly selected and displayed 0.9× zoom affordance 2622*d*). Because the 0.9× zoom level is within the first range of zoom values (e.g., less than 0.99 zoom level), device 600 continues to use only ultra wide-angle camera 3180*a* to display portions of live preview 630 in regions 602, 604, and 606. When zooming in live preview 630, device 600 uses a lesser percentage of the FOV of ultra wide-angle camera 3180*a* to display live preview 630 than it used in FIG. 31A, which is represented by FOV box 3182*a* increasing in size with respect to live preview 630 (e.g., live preview 630 occupies a greater portion of FOV box 3182). By using the lesser percentage of the FOV of ultra wide-angle camera 3180*a*, device 600 is applying digital zoom to the FOV of ultra wide-angle camera 3180*a* that is higher than the digital zoom applied in FIG. 31A. Thus, in some embodiments, live preview 630 in FIG. 31B has more image distortion than live preview 630 in FIG. 31A. In addition to zooming in live preview 630, device 600 also replaces display of 0.5× zoom affordance 2622*a* with display of 0.9× zoom affordance 2622*d* in response to detecting de-pinching gesture 3150*a*. Here, device 600 replaces the 0.5× zoom affordance 2622*a* with 0.9× zoom affordance 2622*d* because the 0.9× zoom level is below a threshold zoom level (e.g., 1×) to replace a zoom affordance. As illustrated in FIG. 31B, in response to detecting de-pinching gesture 3150*a*, device 600 further ceases to display 0.5× zoom affordance 2622*a* as being selected and displays 0.9× zoom affordance 2622*d* as being selected to indicate that live preview 630 is displayed at the 0.9× zoom level. At FIG. 31B, device 600 detects de-pinching gesture 3150*b* at a location corresponds to camera display region 604.

Figure 31C:
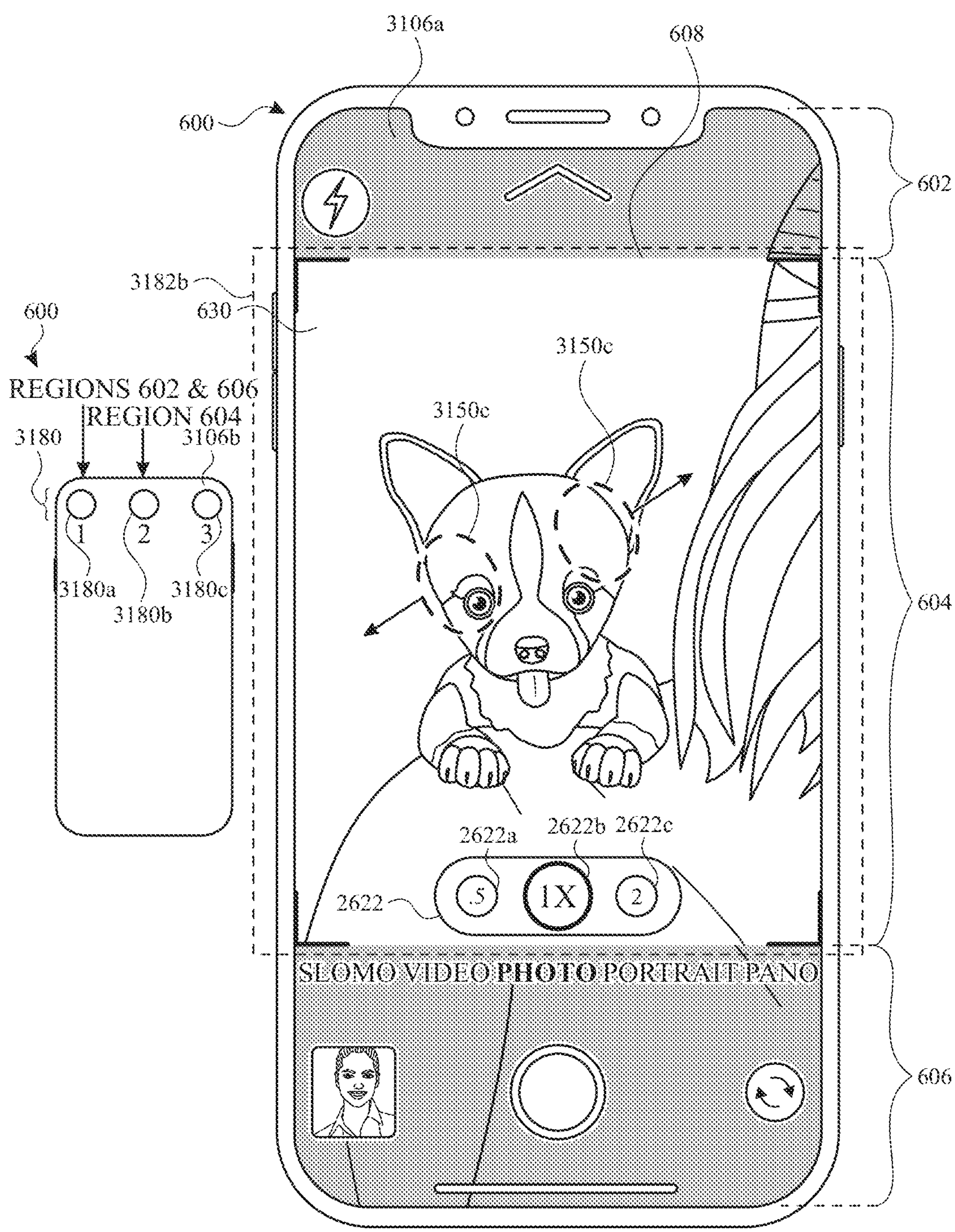

As illustrated in FIG. 31C, in response to detecting de-pinching gesture 3150*b*, device 600 zooms in live preview 630, changing the zoom level of live preview 630 from the 0.9× zoom level to a 1× zoom level (e.g., as indicated by newly selected and re-displayed 1× zoom affordance 2622*b*). Because the 1× zoom level is within a second range of zoom values (e.g., between a 1× zoom level and 1.89 zoom level), device 600 switches to using the FOV of camera wide-angle camera 3180*b* to display the portion of live preview 630 displayed in the camera display region 604 while maintaining to use the FOV of ultra wide-angle camera 3180*a* to display the portion of live preview 630 in the other regions (e.g., regions 602 and 606). In some embodiments, device 600 switches to using the wide-angle camera 3180*b* to reduce image distortion of the portion of live preview 630 in the camera display region 604. In other words, even though device 600 is capable of displaying the entirety of live preview 630 using ultra wide-angle camera 3180*a*, device 600 switches to using a camera with a narrower field-of-view (e.g., wide-angle camera 3180*b*) because device 600 is able to display camera display region 604 of live preview 630 with less distortion and/or an increased fidelity using a camera narrower FOV (e.g., cameras with narrow FOVs are capable of producing images with less distortion and/or an increased fidelity because they have higher optical zoom levels). In FIG. 31C, because device 600 has switched to using the wide-angle camera 3180*b* to display the portion of live preview 630, FOV box 3182*b* is shown to represent the FOV of wide-angle camera 3180*b*.

As illustrated in FIG. 31C, device 600 displays visual tearing at visual boundary 608 because device 600 is using two cameras (e.g., which introduce parallax due to their different positions on device 600) to display the entirety of live preview 630. Turning back to FIG. 31B, device 600 displayed substantially no visual tearing at visual boundary 608 because device 600 used only one camera to display the entirety of live preview 630. As illustrated in FIG. 31C, device 600 re-displays 0.5× zoom affordance 2622*a* and ceases to display 0.9× zoom affordance 2622*d*. Device 600 also displays 1× zoom affordance 2622*b*, where the 1× zoom affordance 2622*b* is displayed as being selected to indicate that live preview 630 is displayed at the 1× zoom level. At FIG. 31C, device 600 detects de-pinching gesture 3150*c* at a location corresponds to camera display region 604.

Figure 31D:
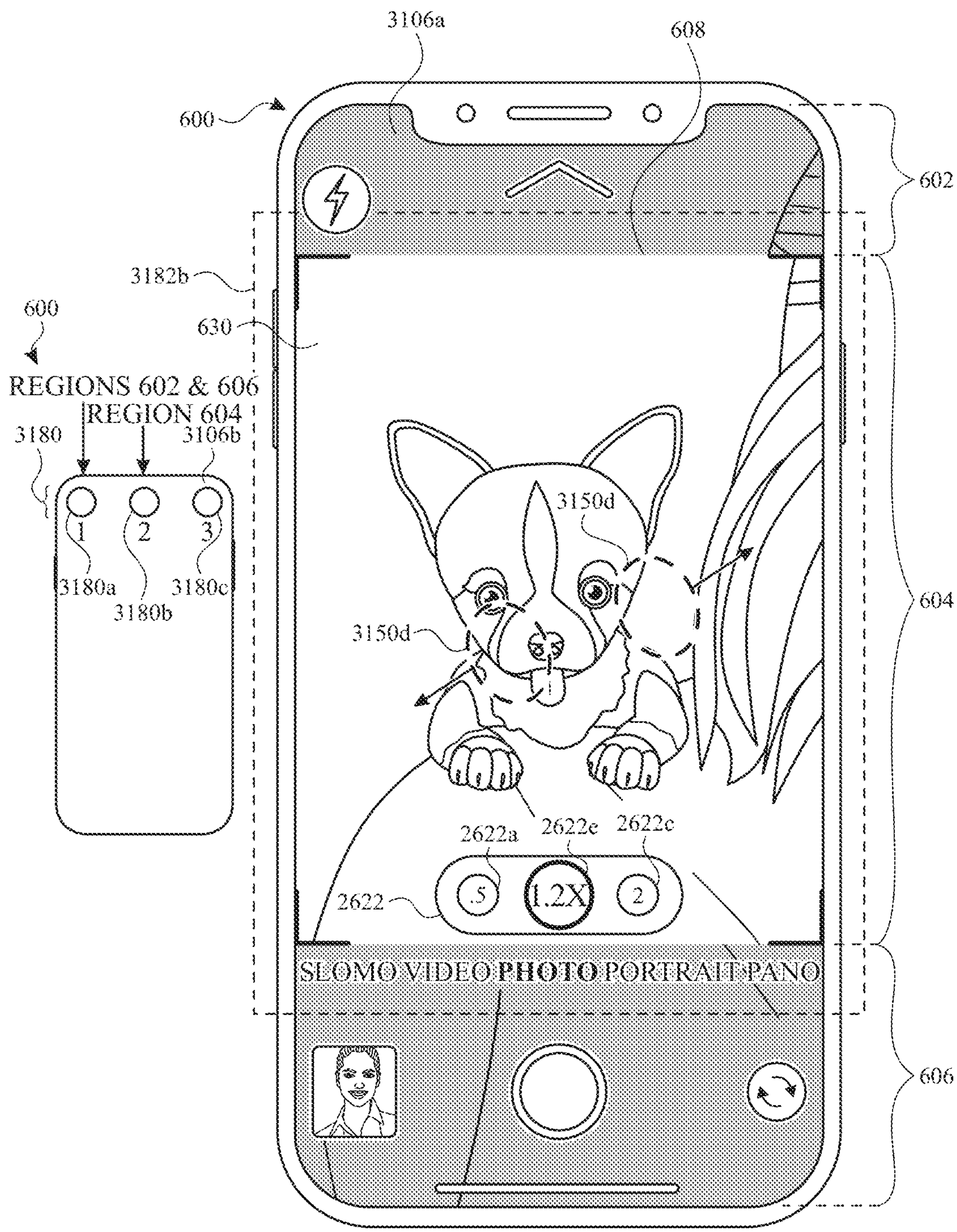

As illustrated in FIG. 31D, in response to detecting de-pinching gesture 3150*c*, device 600 zooms in live preview 630, changing the zoom level of live preview 630 from the 1× zoom level to a 1.2× zoom level (e.g., as indicated by newly displayed and selected 1.2× zoom affordance 2622*e*). Because the 1.2× zoom level is within the second range of zoom values (e.g., between a 1× zoom level and 1.89 zoom level), device 600 continues to use the FOV of camera wide-angle camera 3180*b* to display the portion of live preview 630 displayed in the camera display region 604 and the FOV of ultra wide-angle camera 3180*a* to display the portion of live preview 630 displayed in the other regions (e.g., regions 602 and 606). In FIG. 31D, FOV box 3182*b* has grown but does not encompass the entirety of live preview 630 (e.g., unlike box 3182*a* in FIG. 31A), which indicates that the FOV of wide-angle camera 3180*b* is not large enough (e.g., wide enough) for device 600 to use wide-angle camera 3180*b* to display the entirety of live preview 630 (e.g., including portions of live preview 630 in regions 602, 604, and 606). Thus, device 600 continues to use two cameras to display the entirety of live preview 630. As illustrated in FIG. 31D, device 600 also replaces display of 1× zoom affordance 2622*b* with display of 1.2× zoom affordance 2622*e*, where 1.2× zoom affordance 2622*e* is displayed as being selected to indicate that live preview 630 is displayed at the 1.2× zoom level. Here, device 600 replaces the 1× zoom affordance 2622*b* because the 1.2× zoom level is between a range of zoom levels (e.g., a predetermined range such as between 1× and 2×) to replace a zoom affordance. At FIG. 31D, device 600 detects de-pinching gesture 3150*d* at a location corresponds to camera display region 604.

Figure 31E:
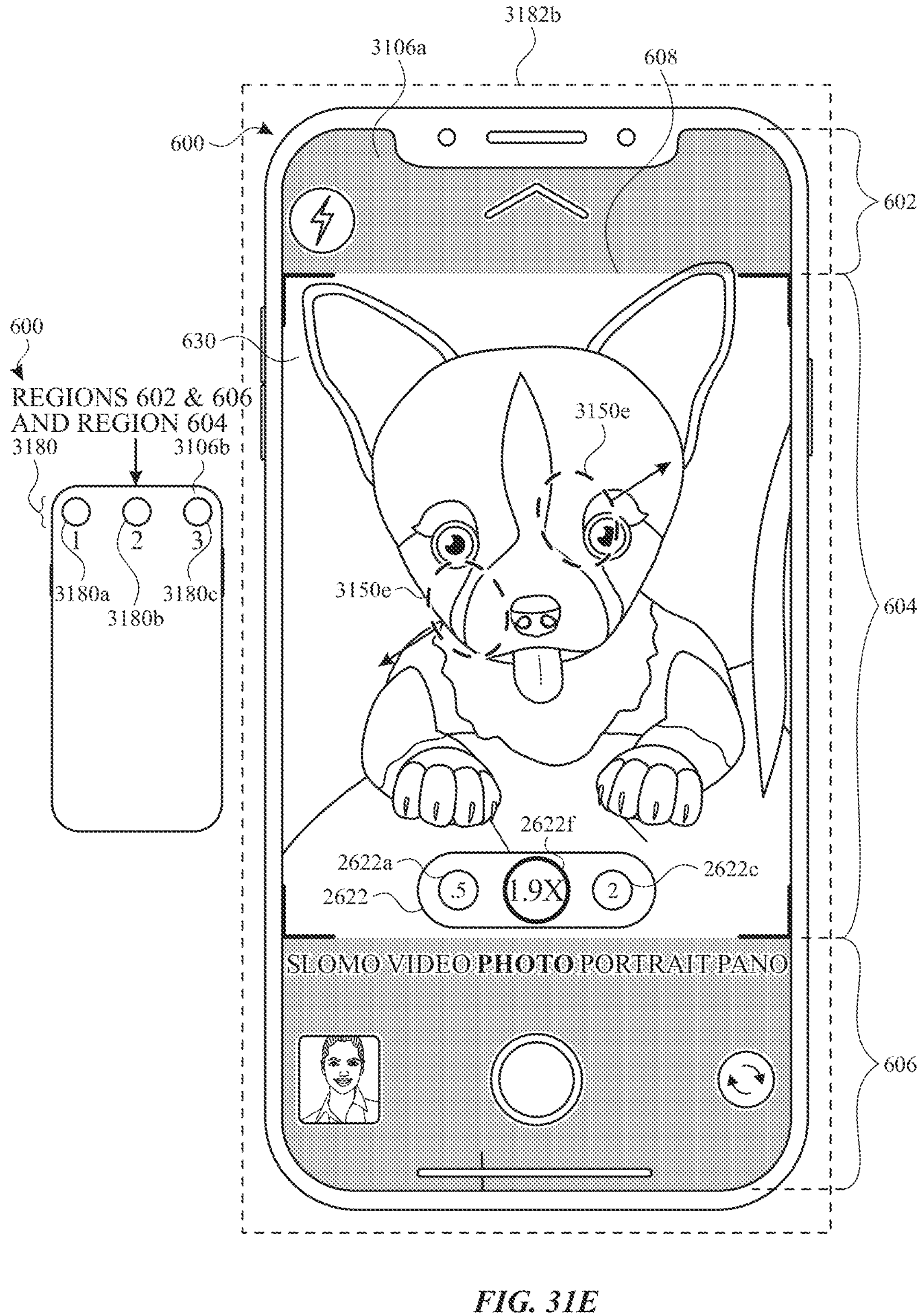

As illustrated in FIG. 31E, in response to detecting de-pinching gesture 3150*e*, device 600 zooms in live preview 630, changing the zoom level of live preview 630 from the 1.2× zoom level to a 1.9× zoom level (e.g., as indicated by newly displayed and selected 1.9× zoom affordance 2622*f*). Because the 1.9× zoom level is within a third range of zoom values (e.g., between a 1.9× zoom level and 2× zoom level), device 600 switches to using solely the FOV of wide-angle camera 3180*b* to display the entirety of live preview 630 (e.g., live preview 630 in regions 602, 604, and 606). As illustrated in FIG. 31D, FOV box 3182*b* grows to encompasses the entirety of live preview 630, which indicates that the FOV of wide-angle camera 3180*b* is now large enough (e.g., wide enough) for device 600 to use wide-angle camera 3180*b* to display the entirety of live preview 630 (e.g., including portions of live preview 630 in regions 602, 604, and 606). Thus, device 600 uses only one camera to display the entirety of live preview 630. As illustrated in FIG. 31E, device 600 also replace display of 1.2× zoom affordance 2262*d* with display of 1.9× zoom affordance 2622*e* as being selected (e.g., because the 1.9× zoom level is within is between a range of zoom levels (e.g., a predetermined range such as between 1× and 2×) to replace a zoom affordance. In addition, as illustrated in FIG. 31E, device 600 displays no visual tearing because device 600 is using only wide-angle camera 3180*b* to display live preview 630. At FIG. 31E, device 600 detects de-pinching gesture 3150*e* at a location corresponds to camera display region 604.

Figure 31F:
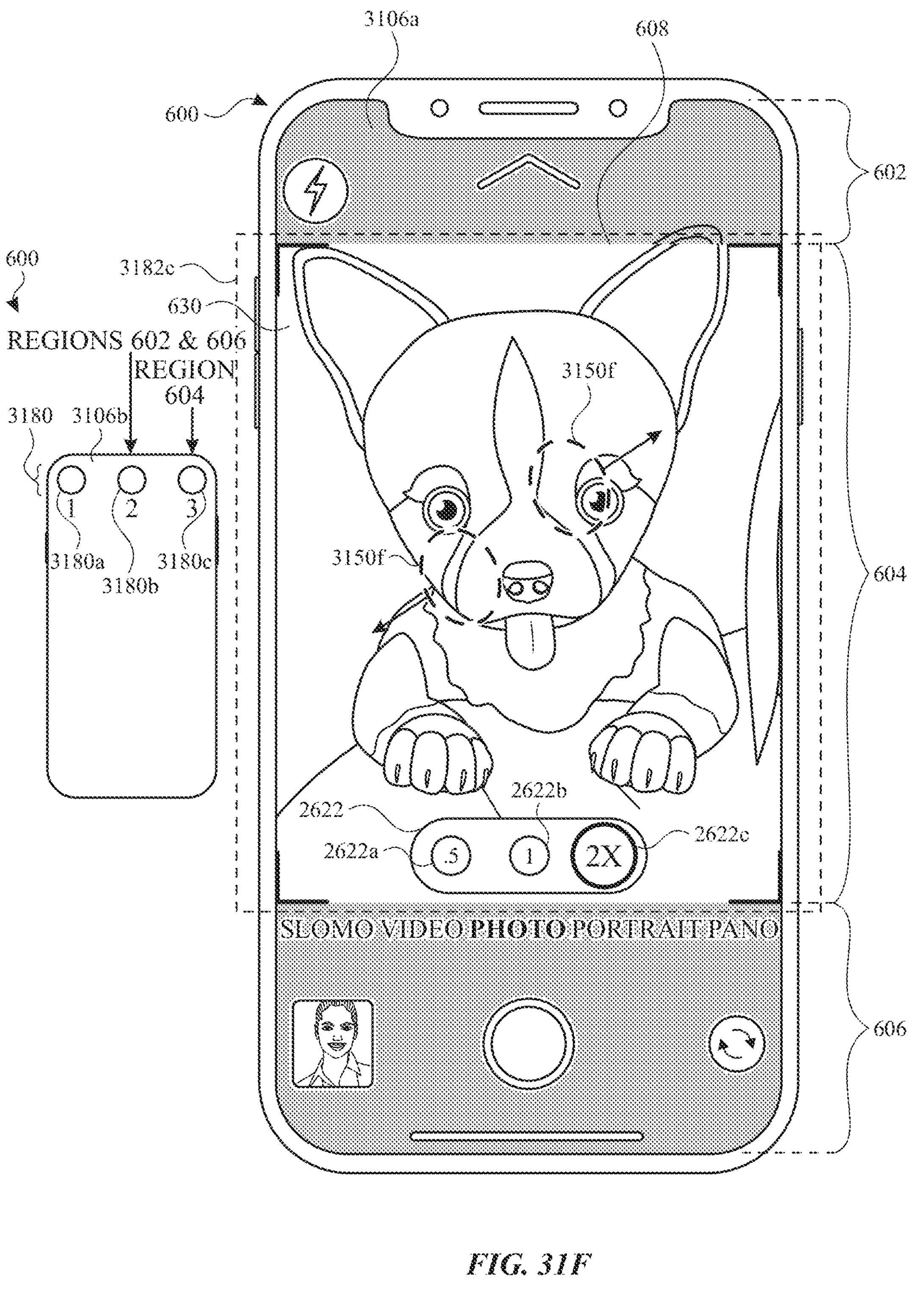

As illustrated in FIG. 31F, in response to detecting de-pinching gesture 3150*e*, device 600 zooms in live preview 630, changing the zoom level of live preview 630 from the 1.9× zoom level to a 2× zoom level (e.g., as indicated by selected 2× zoom affordance 2622*c*). Because the 2× zoom level is within a fourth range of zoom values (e.g., between a 2× zoom level and 2.9× zoom level), device 600 switches to using the FOV of telephoto camera 3180*c* to display the portion of live preview 630 displayed in the camera display region 604 while maintaining use of the FOV of wide-angle camera 3180*b* to display the portion of live preview 630 in the other regions (e.g., regions 602 and 606). In some embodiments, device 600 to uses the FOV of telephoto camera 3180*c* to display camera display region 604, instead of using wide-angle camera 3180*b*, for similar reasons as discussed for switching cameras (e.g., ultra wide-angle camera 3180*a* to wide-angle camera 3180*b*) in FIG. 31C. Moreover, similar to FIG. 31C, device 600 displays device 600 displays visual tearing at visual boundary 608 because device 600 is using two cameras to display the entirety of live preview 630. As illustrated in FIG. 31F, because device 600 has switched to using the telephoto camera 3180*c* to display the portion of live preview 630, FOV box 3182*c* is shown to represent the FOV of telephoto camera 3180*c*. As illustrated in FIG. 31F, device 600 also replaces display of 1.9× zoom affordance 2622*f* with display of 1× zoom affordance 2622*b* and displays 2× zoom affordance 2622*c* as being selected. At FIG. 31F, device 600 detects de-pinching gesture 3150*f* at a location corresponds to camera display region 604.

Figure 31G:
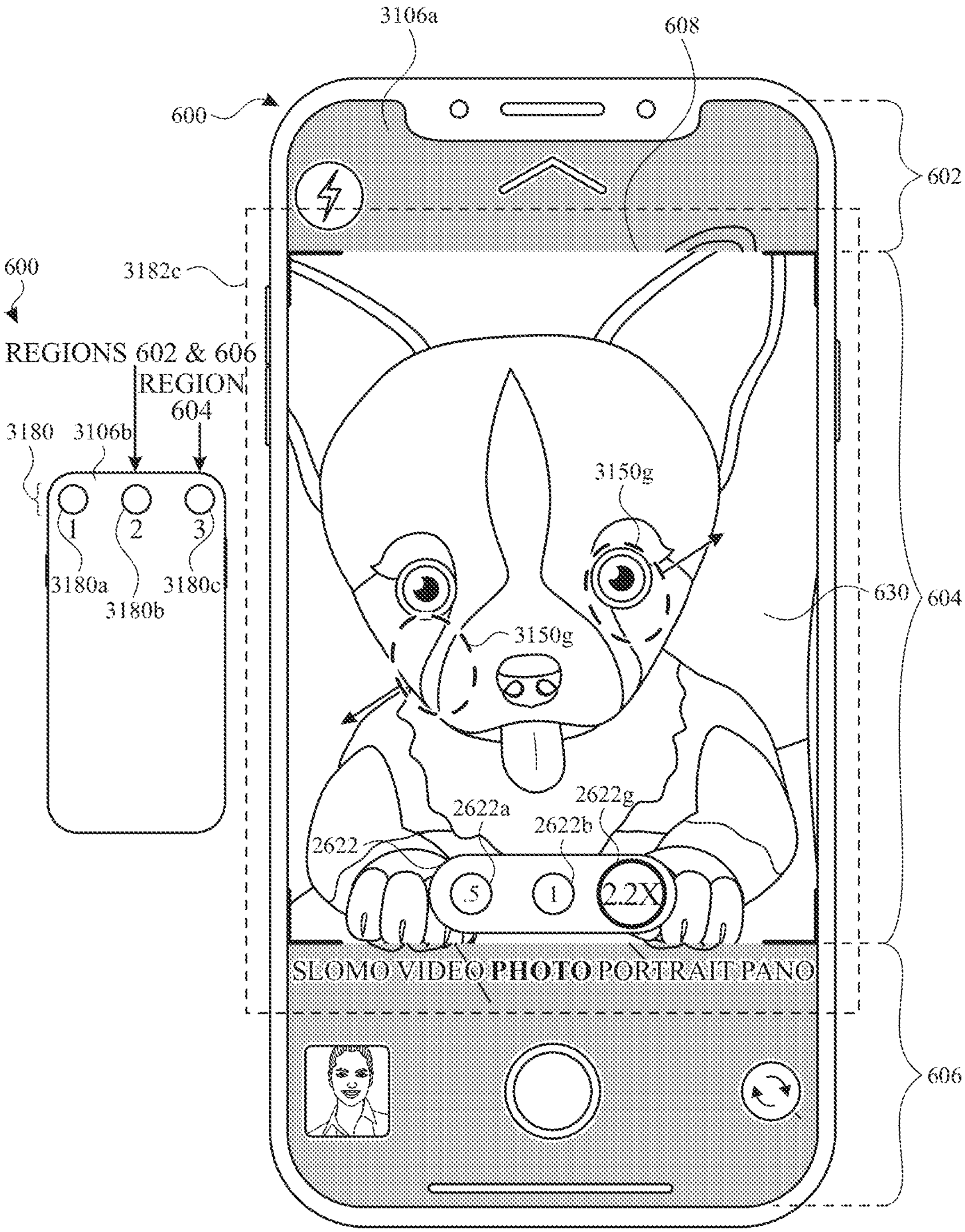

As illustrated in FIG. 31G, in response to detecting de-pinching gesture 3150*f*, device 600 zooms in live preview 630, changing the zoom level of live preview 630 from the 2× zoom level to a 2.2× zoom level (e.g., as indicated by selected 2.2× zoom affordance 2622*g*). Because the 2.2× zoom level is within the fourth range of zoom values (e.g., between a 2× zoom level and 2.9× zoom level), device 600 continues to use the FOV of telephoto camera 3180*c* to display the portion of live preview 630 displayed in the camera display region 604 and the FOV of wide-angle camera 3180*b* to display the portion of live preview 630 displayed in the other regions (e.g., regions 602 and 606). In FIG. 31G, FOV box 3182*c* has grown but does not encompass the entirety of live preview 630 (e.g., unlike box 3182*a* in FIG. 31A), which indicates that the FOV of telephoto camera 3180*c* is not large enough (e.g., wide enough) for device 600 to use telephoto camera 3180*c* to display the entirety of live preview 630 (e.g., including portions of live preview 630 in regions 602, 604, and 606). Thus, device 600 continues to use two cameras to display the entirety of live preview 630. As illustrated in FIG. 31G, device 600 also replaces display of 2× zoom affordance 2622*c* with display of 2.2× zoom affordance 2622*g*, where 2.2× zoom affordance 2622*g* is displayed as being selected to indicate that live preview 630 is displayed at the 2.2× zoom level. Here, device 600 replaces 2× zoom affordance 2622*c* because the 2.2× zoom level is above is a zoom level (e.g., above 2×) to replace a zoom affordance. At FIG. 31G, device 600 detects de-pinching gesture 3150*g* at a location corresponds to camera display region 604.

Figure 31H:
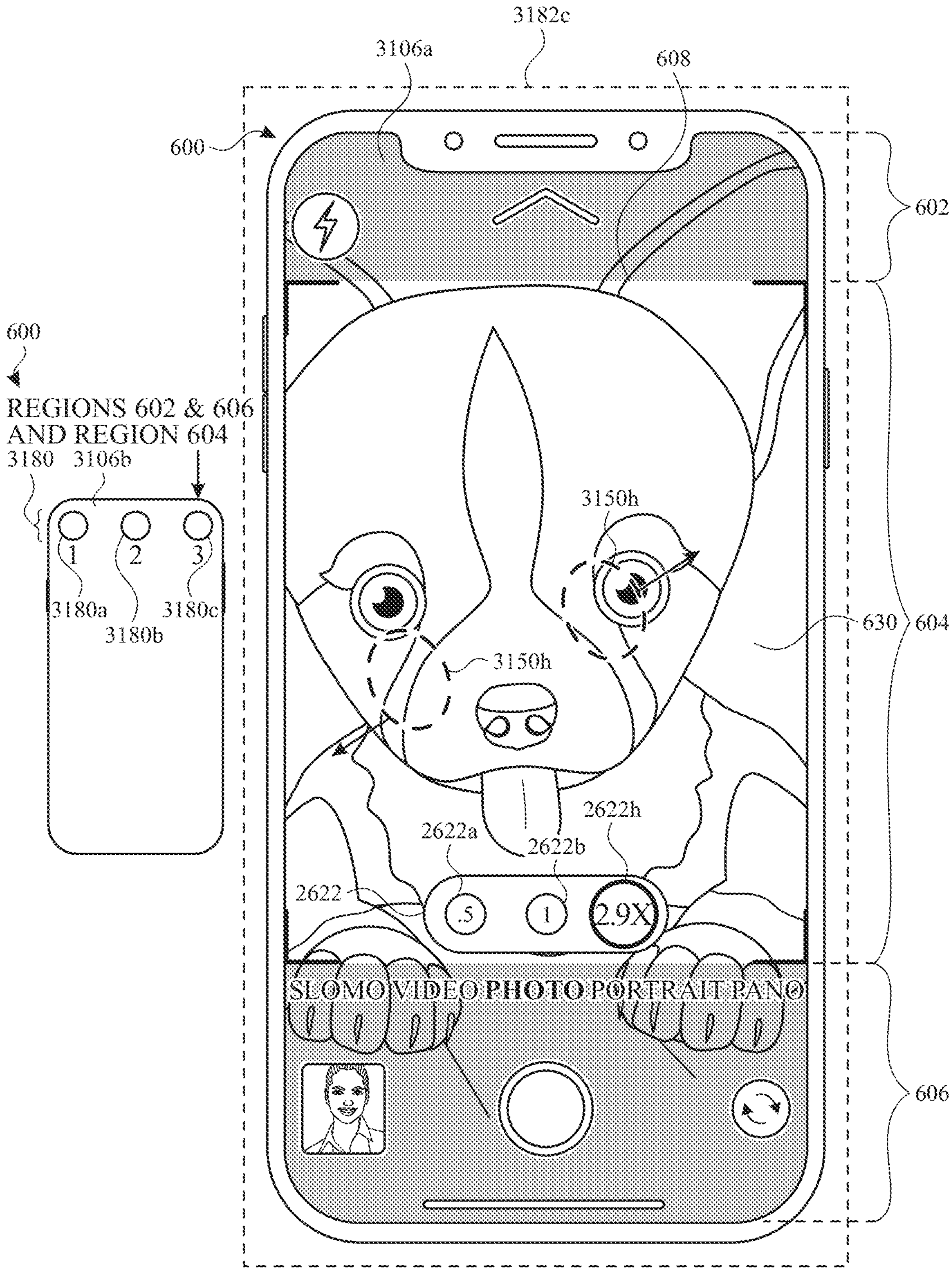

As illustrated in FIG. 31H, in response to detecting de-pinching gesture 3150*g*, device 600 zooms in live preview 630, changing the zoom level of live preview 630 from the 2.2× zoom level to a 2.9× zoom level (e.g., as indicated by newly displayed and selected 2.9× zoom affordance 2622*h*). Because the 2.9× zoom level is within a fifth range of zoom values (e.g., above or equal to 2.9× zoom level), device 600 switches to using solely uses the FOV of telephoto camera 3180*c* to display the entirety of live preview 630 (e.g., live preview 630 in regions 602, 604, and 606). As illustrated in FIG. 31H, FOV box 3182*c* grows to encompasses the entirety of live preview 630, which indicates that the FOV of telephoto camera 3180*c* is now large enough (e.g., wide enough) for device 600 to use telephoto camera 3180*c* to display the entirety of live preview 630 (e.g., including portions of live preview 630 in regions 602, 604, and 606). Thus, device 600 uses only one camera to display the entirety of live preview 630. As illustrated in FIG. 31H, device 600 also replace display of 2.2× zoom affordance 2262*g* with display of 2.9× zoom affordance 2622*h* as being selected. In addition, as illustrated in FIG. 31E, device 600 displays no visual tearing because device 600 is using only telephoto camera 3180*c* to display live preview 630. At FIG. 31H, device 600 detects de-pinching gesture 3150*h* at a location corresponds to camera display region 604.

Figure 31I:
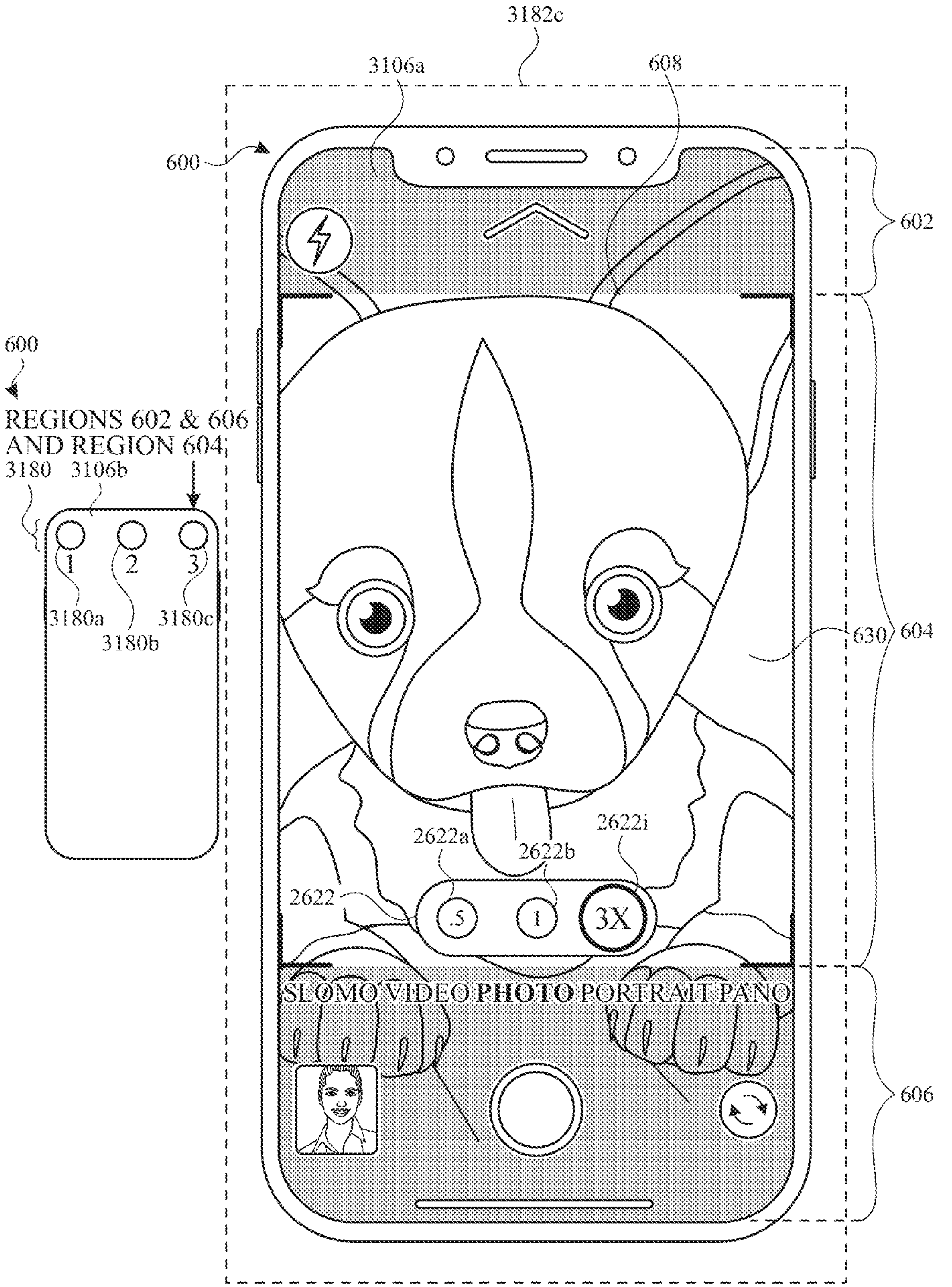

As illustrated in FIG. 31I, in response to detecting de-pinching gesture 3150*h*, device 600 zooms in live preview 630, changing the zoom level of live preview 630 from the 2.9× zoom level to a 3× zoom level (e.g., as indicated by newly displayed and selected 3× zoom affordance 2622*i*). Because the 3× zoom level is within a fifth range of zoom values (e.g., above or equal to 2.9× zoom level), device 600 continues using to solely the FOV of telephoto camera 3180*c* to display the entirety of live preview 630 (e.g., live preview 630 in regions 602, 604, and 606). In some embodiments, device 600 uses a digital zoom to display live preview 630 at FIG. 31I (or at higher zoom levels (e.g., a 10× zoom level)). In addition, as illustrated in FIG. 31I, device 600 displays no visual tearing because device 600 is using only telephoto camera 3180*c* to display live preview 630.

In some embodiments, instead of zooming in live preview 630, device 600 zooms out on live preview 630 via one or more pinch gestures, such that the descriptions described above in relation to FIGS. 31A-31I are reversed. In some embodiments, in addition to FIGS. 31A-31I, device 600 uses one or more techniques as described above in relation to FIG. 29A-29U. For example, in some embodiments, device 600 may receive gestures similar to those described above (e.g., FIGS. 29A-29B, 29E-29F, 29H-29I, and 29J-29K) to focus (or forgo focusing) one or more cameras at a location that corresponds a gesture directed to (or outside of) a location that corresponds to camera display region 604. Additionally or alternatively, in some embodiments, device 600 may receive input similar to those described above (e.g., FIGS. 29L-29P) to use (e.g., or display) content that was not displayed in live preview 630 in response to receiving an input on shutter affordance 610.

FIGS. 32A-32C are a flow diagram illustrating a method for displaying a camera user interface at various zoom level using different cameras of an electronic device in accordance with some embodiments. Method 3200 is performed at a device (e.g., 100, 300, 500, 600) with a display device (e.g., a touch-sensitive display). Some operations in method 3200 are, optionally, combined, the orders of some operations are, optionally, changed, and some operations are, optionally, omitted.

As described below, method 3200 provides an intuitive way for displaying a camera user interface at varying zoom levels. The method reduces the cognitive burden on a user for vary zoom levels of the camera user interface, thereby creating a more efficient human-machine interface. For battery-operated computing devices, enabling a user to vary zoom levels of user interfaces faster and more efficiently conserves power and increases the time between battery charges.

An electronic device having a display device (e.g., a touch-sensitive display), a first camera (e.g., a wide-angle camera) (e.g., 3180*b*) that has a field-of-view (e.g., one or more cameras (e.g., dual cameras, triple camera, quad cameras, etc.) on the same side or different sides of the electronic device (e.g., a front camera, a back camera))), a second camera (e.g., an ultra wide-angle camera) (e.g., 3180*a*) (e.g., one or more cameras (e.g., dual cameras, triple camera, quad cameras, etc.) on the same side or different sides of the electronic device (e.g., a front camera, a back camera))) that has a wider field-of-view than the field-of-view of the first camera (e.g., the wide-angle camera) (e.g., 3180*b*). The electronic device displays (3202), via the display device, a camera user interface that includes a representation of at least a portion of a field-of-view of the one or more cameras displayed at a first zoom level. The camera user interface includes a first region (e.g., 604) (e.g., a camera display region), the first region including a representation (e.g., 630) of a first portion of the field-of-view of the first camera (e.g., the wide-angle camera) (e.g., 3180*b*) at the first zoom level (e.g., 2622*a*) (e.g., a camera with a narrower field-of-view than the second camera) and a second region (e.g., 602 and 606) (e.g., a camera control region), the second region including a representation (e.g., 630) of a first portion of the field-of-view of the second camera (e.g., the ultra wide-angle camera) (e.g., 3180*a*) at the first zoom level (e.g., 2622*a*) (e.g., a camera with a wider field-of-view than the first camera). In some embodiments, the second region is visually distinguished (e.g., having a dimmed appearance) (e.g., having a semi-transparent overlay on the second portion of the field-of-view of the one or more cameras) from the first region. In some embodiments, the second region has a dimmed appearance when compared to the first region. In some embodiments, the second region is positioned above and/or below the first region in the camera user interface.

While displaying, via the display device, the camera user interface that includes the representation of at least a portion of a field-of-view of the one or more cameras displayed at the first zoom level (e.g., a request to change the first zoom level to a second zoom level), the electronic device receives (3204) a first request (e.g., 3150*a*, 3150*b*) to increase the zoom level of the representation of the portion of the field of view of the one or more cameras to a second zoom level.

In response (3206) to receiving the first request (e.g., a request to zoom-in on the first user interface) to increase the zoom level of the representation of the portion of the field of view of the one or more cameras to a second zoom level, the electronic device displays (3208), in the first region, at the second zoom level (e.g., 2622*d*, 2622*b*), a representation (e.g., 630) of a second portion of the field-of-view of the first camera (e.g., the wide-angle camera) (e.g., 3180*b*) that excludes at least a subset of the first portion of the field-of-view of the first camera (e.g., the wide-angle camera) (e.g., 3180*b*), and displays (3210), in the second region, at the second zoom level (e.g., 2622*d*, 2622*b*), a representation (e.g., 630) of a second portion of the field-of-view of the second camera (the ultra wide-angle camera) (e.g., 3180*a*) that overlaps with the subset of the portion of the field-of-view of the first camera (e.g., the wide-angle camera) (e.g., 3180*b*) that was excluded from the second portion of the field-of-view of the first camera (e.g., the wide-angle camera) (e.g., 3180*b*) without displaying, in the second region, a representation of the subset of the portion of the field-of-view of the first camera (e.g., the wide-angle camera) (e.g., 3180*b*) that was excluded from the second portion of the field-of-view of the first camera (e.g., the wide-angle camera) (e.g., 3180*b*) (e.g., the cut off portion from the first representation of the field-of-view of the first camera does not get displayed in the second region when the user interface and/or first representation of the field-of-view of the first camera is zoomed-in). In some embodiments, the amount of the subset that is excluded depends on the second zoom level. In some embodiments, the second representation is the same as the first representation. Displaying different portions of a representation using different cameras of the electronic device when certain conditions are prescribed allows the user to view an improved representation of the electronic device when the representation is displayed within a particular range of zoom values. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first portion (e.g., 604) of the field-of-view of the second camera (e.g., the ultra wide-angle camera) (e.g., 3180*a*) is different from the second portion (e.g., 602 and 606) of the field-of-view of the second camera (e.g., the ultra wide-angle camera) (e.g., 3180*a*) (e.g., the first portion and the second portion are different portions of the available field of view of the second camera). Displaying a second region that is visually different from a first region provides the user with feed about content that the main content that will be captured and used to display media and the additional content that may be captured to display media, allowing a user to frame the media to keep things in/out the different regions when capturing media. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, in the first region (e.g., 604), at the second zoom level, the representation (e.g., 630 in FIG. 31D) of the second portion of the field-of-view of the first camera (e.g., the wide-angle camera) (e.g., 3180*b*) and displaying, in the second region (e.g., 602 and 606), at the second zoom level, the representation (e.g., 630 in FIG. 31D) of the second portion of the field-of-view of the second camera (e.g., the ultra wide-angle camera) (e.g., 3180*a*), the electronic device receives (3212) a second request (e.g., 3150*d*) (e.g., a request to zoom-in on the camera user interface) to increase the zoom level of the representation of the portion of the field of view of the one or more cameras to a third zoom level (e.g., 2622*f*). In some embodiments, in response (3214) to receiving the second request (e.g., a request to zoom-in on the camera user interface) to increase the zoom level of the representation of the portion of the field of view of the one or more cameras to the third zoom level and in accordance with a determination that the third zoom level is within a first range of zoom values (e.g., a range of zoom values in which the field-of-view of the first camera is sufficient to populate both the first region and the second region), the electronic device displays (3216), in the first region (e.g., 604), at the third zoom level, a representation (e.g., 630 in FIG. 31E) of a third portion of the field-of-view of the first camera (e.g., the wide-angle camera) (e.g., 3180*b*) (e.g., 3180*b* in FIG. 31E) and displays (3218), in the second region (e.g., 602 and 606), at the third zoom level, a representation (e.g., 630 in FIG. 31E) a fourth portion of the field-of-view of the first camera (e.g., the wide-angle camera) (e.g., 3180*b*) (e.g., the wide-angle camera) (e.g., 3180*b*) (e.g., 3180*b* in FIG. 31E). In some embodiments, when one camera's field-of-view (e.g., camera that has a narrower field of view than a second camera) can fill both the first and the second regions at a particular zoom level, the electronic device switches to only using a single camera to display representation in both region. In some embodiments, when one camera cannot fill both the first and the second regions at a particular zoom level, the device continues to use one camera to display a representation in the first region and another camera to display a representation in the second region; for example in response to receiving the first request (e.g., a request to zoom-in on the first user interface) to increase the zoom level of the representation of the portion of the field of view of the one or more cameras to the third zoom level, in accordance with a determination that the third zoom level is below the first range of zoom values, the electronic device displays, in the first region, at the third zoom level, a representation of a second portion of the field-of-view of the first camera that excludes at least a subset of the first portion of the field-of-view of the first camera (in some embodiments, the amount of the subset that is excluded depends on the third zoom level.) and displaying, in the second region, at the third zoom level, a representation of a second portion of the field-of-view of the second camera that overlaps with the subset of the portion of the field-of-view of the first camera that was excluded from the second portion of the field-of-view of the first camera without displaying, in the second region, a representation of the subset of the portion of the field-of-view of the first camera that was excluded from the second portion of the field-of-view of the first camera. In some embodiments, in accordance with a determination that the third zoom level is not within the first range of zoom values, the electronic device uses one type of camera (e.g., ultra wide-angle, wide-angle, telephoto camera) to display representation in the first region and one type of camera to display representation in the second region. In some embodiments, in accordance with a determination that the third zoom level is not within the first range of zoom values, the electronic device forgoes displaying, in the first region, at the third zoom level, a representation of a first subset of a third portion of the field-of-view of the first camera; and displaying, in the second region, at the third zoom level, a representation of a second subset of the third portion of the field-of-view of the first camera fourth portion of the field-of-view of the first camera. Switching to one camera to display a representation when certain conditions are prescribed allows the user to view an improved representation of the electronic device with increased fidelity and visual tearing when the representation is displayed within a particular range of zoom values. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, in the first region (e.g., 604), at the third zoom level, the representation (e.g., 630 in FIG. 31E) of the third portion of the field-of-view of the first camera (e.g., the wide-angle camera) (e.g., 3180*b*) and displaying, in the second region (e.g., 602 and 606), at the third zoom level (e.g., 2622*f* in FIG. 31E), the representation (e.g., 630 in FIG. 31E) the fourth portion of the field-of-view of the first camera (e.g., the wide-angle camera) (e.g., 3180*b*), the electronic device receives a third request (e.g., 3150*e*) (e.g., a request to zoom-in on the camera user interface) to increase the zoom level of the representation of the portion of the field of view of the one or more cameras to a fourth zoom level (e.g., 2622*c*). In some embodiments, in response to receiving the third request to increase the zoom level of the representation of the portion of the field of view of the one or more cameras to the fourth zoom level and in accordance with a determination that the fourth zoom level is within a second range of zoom values (e.g., a range of zoom values in which the devices switches to using the first camera and the third camera (e.g., the telephoto camera can fill the preview region)), the electronic device displays, in the first region, at the fourth zoom level (e.g., 2622c in FIG. 31F), a representation (e.g., 630 in FIG. 31F) of a fifth portion of the field-of-view of a third camera (e.g., a telephoto camera with a narrower field of view than the wide-angle camera) that excludes at least a subset of a third portion of the field-of-view of the third camera (e.g., the telephoto camera) (e.g., 3180c) (e.g., the third camera has a narrower field-of-view than the first camera, but a higher optical zoom level) and displays, in the second region, at the fourth zoom level, a representation (e.g., 630 in FIG. 31F) of a fifth portion of the field-of-view of the first camera (e.g., the wide-angle camera) (e.g., 3180b) that overlaps with the subset of the portion of the field-of-view of the third camera (e.g., the telephoto camera) (e.g., 3180c) that was excluded from the fifth portion of the field-of-view of the third camera (e.g., the telephoto camera) (e.g., 3180c) without displaying, in the second region, a representation of the subset of the portion of the field-of-view of the third camera (e.g., the telephoto camera) (e.g., 3180c) that was excluded from the fifth portion of the field of view of the third camera (e.g., the telephoto camera) (e.g., 3180c) (e.g., the cut off portion from the representation of the field-of-view of the third camera does not get displayed in the second region when the user interface and/or first representation of the field-of-view of the first camera is zoomed-in). In some embodiment, in accordance with a determination that the fourth zoom level is not a second range of zoom values (when zooming in) (or still within the range of the first zoom values), the electronic device continues to use only the first camera in the first and the second region (e.g., displaying, in the first region, at the third zoom level, a representation of a third portion of the field-of-view of the first camera (e.g., the wide-angle camera) (e.g., 3180b) and displaying, in the second region, at the third zoom level, a representation a fourth portion of the field-of-view of the first camera (e.g., the wide-angle camera) (e.g., 3180b)). Displaying different portions of a representation using different cameras of the electronic device when certain conditions are prescribed allows the user to view an improved representation of the electronic device when the representation is displayed within a particular range of zoom values. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, in the first region, at the fourth zoom level, a representation (e.g., 630 in FIG. 31G) of a fourth fifth portion of the field-of-view of a third camera (e.g., the telephoto camera) (e.g., 3180c) that excludes at least a subset of the third portion of the field-of-view of the third camera (e.g., the third camera has a narrower field-of-view than the first camera) and displaying, in the second region, at the fourth zoom level, a representation of a fifth a fourth portion of the field-of-view of the first camera (e.g., the telephoto camera) (e.g., 3180c) (e.g., the wide-angle camera) (e.g., 3180b) that overlaps with the subset of the portion of the field-of-view of the third camera (e.g., the telephoto camera) (e.g., 3180c) that was excluded from the fifth portion of the field-of-view of the third camera (e.g., the telephoto camera) (e.g., 3180c) without displaying, in the second region, a representation of the subset of the portion of the field-of-view of the third camera (e.g., the telephoto camera) (e.g., 3180c) that was excluded from the fifth portion of the field of view of the third camera (e.g., the telephoto camera) (e.g., 3180c), the electronic device receives a fourth request (e.g., 3150g) to increase the zoom level of the representation of the portion of the field of view of the one or more cameras to a fifth zoom level (e.g., 2622h). In some embodiments, in response receiving the fourth request to increase the zoom level of the representation of the portion of the field of view of the one or more cameras to the fifth zoom level and in accordance with a determination that the fifth zoom level is within a third range of zoom values (e.g., a range of zoom values that is outside of the first range of zoom values and the second range of zoom values) (e.g., a range of zoom values in which the field-of-view of the third camera is sufficient to populate both the first region and the second region), the electronic device displays, in the first region, at the fifth zoom level, a representation (e.g., 630 in FIG. 31H) of a sixth portion of the field-of-view of the third camera (e.g., the telephoto camera) (e.g., 3180c) and displays, in the second region, at the fifth zoom level, a representation (e.g., 630 in FIG. 31H) of a seventh portion of the field-of-view of the third camera (e.g., the telephoto camera) (e.g., 3180c). In some embodiments, when one camera's field-of-view (e.g., camera that has a narrower field of view than a second camera) can fill both the first and the second regions at a particular zoom level, the electronic device switches to only using a single camera to display representation in both region. In some embodiments, when one camera cannot fill both the first and the second regions at a particular zoom level, the device continues to use one camera to display a representation in the first region and another camera to display a representation in the second region; for example, in response to receiving the fourth request to increase the zoom level of the representation of the portion of the field of view of the one or more cameras to the fifth zoom level, in accordance with a determination that the fifth zoom level is not within (e.g., is below) the third range of zoom values, displaying, in the first region, at the fifth zoom level, a representation of a fifth portion of the field-of-view of a third camera that excludes at least a subset of the third portion of the field-of-view of the third camera (e.g., the third camera has a narrower field-of-view than the first camera, but a higher optical zoom level); and displaying, in the second region, at the fifth zoom level, a representation of a fifth portion of the field-of-view of the first camera that overlaps with the subset of the portion of the field-of-view of the third camera that was excluded from the fifth portion of the field-of-view of the third camera without displaying, in the second region, a representation of the subset of the portion of the field-of-view of the third camera that was excluded from the fifth portion of the field of view of the third camera. In some embodiments, in accordance with a determination that the fifth zoom level is not within the third range of zoom values, the electronic device uses one camera to display representation in the first region and one camera to display representation in the second region. In some embodiments, in accordance with a determination that the fifth zoom level is not within the third range of zoom values (or still within the range of the second zoom values), the electronic device forgoes displaying, in the first region, at the fifth zoom level, a representation of a sixth portion of the field-of-view of the third camera and displaying, in the second region, at the fifth zoom level, a representation of a seventh portion of the field-of-view of the third camera. Switching to one camera to display a representation when certain conditions are prescribed allows the user to view an improved representation of the electronic device with increased fidelity and visual tearing when the representation is displayed within a particular range of zoom values. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, in the first region, at the fifth zoom level, a representation of a sixth portion of the field-of-view of the third camera (e.g., the telephoto camera) (e.g., 3180*c*) and displaying, in the second region, at the fifth zoom level, a representation of a seventh portion of the field-of-view of the third camera (e.g., the telephoto camera) (e.g., 3180*c*), the electronic device receives a first request to decrease (e.g., zoom out) the zoom level of the representation of the portion of the field of view of the one or more cameras to a sixth zoom level (e.g., a zoom level that is less than the fifth zoom level but greater than the third zoom level). In some embodiments, in response to receiving the first request to decrease (e.g., zoom out) the zoom level of the representation of the portion of the field of view of the one or more cameras to the sixth zoom level and in accordance with a determination the sixth zoom level is within a fourth range of zoom values to display in the second region (e.g., a range of zoom values that is outside of the first range of zoom values and the third range of zoom values), the electronic device displays, in the first region, at the sixth zoom level, a representation of an eighth portion of the field-of-view of the third camera (e.g., a telephoto camera with a narrower field of view than the wide-angle camera) that excludes at least a subset of the third portion of the field-of-view of the third camera (e.g., the telephoto camera) (e.g., 3180*c*) (e.g., the third camera has a narrower field-of-view than the first camera, but a higher optical zoom level) and displays, in the second region, at the sixth zoom level, a representation of an eighth portion of the field-of-view of the first camera (e.g., the wide-angle camera) (e.g., 3180*b*) that overlaps with the subset of the portion of the field-of-view of the third camera (e.g., the telephoto camera) (e.g., 3180*c*) that was excluded from the eighth portion of the field-of-view of the third camera (e.g., the telephoto camera) (e.g., 3180*c*) without displaying, in the second region, a representation of the subset of the portion of the field-of-view of the third camera (e.g., the telephoto camera) (e.g., 3180*c*) that was excluded from the eighth portion of the field of view of the third camera (e.g., the telephoto camera) (e.g., 3180*c*). In some embodiments, the fourth range of zoom values is the same as the second range of zoom values. In some embodiments, when one camera's field-of-view (e.g., camera that has a narrower field of view than a second camera) can fill both the first and the second regions at a particular zoom level, the electronic device switches to only using a single camera to display representation in both region. In some embodiments, when one camera cannot fill both the first and the second regions at a particular zoom level, the device continues to use one camera to display a representation in the first region and another camera to display a representation in the second region. In some embodiments, in accordance with a determination that the sixth zoom level is not within the fourth range of zoom values, the electronic device uses one type of camera to display representation in the first region and one type of camera to display representation in the second region. In some embodiments, in accordance with a determination that the sixth zoom level is not within the fourth range of zoom values, the electronic device continues to display, in the first region, at the sixth zoom level, a representation of a sixth portion of the field-of-view of the third camera and display, in the second region, at the fifth zoom level, a representation of a seventh portion of the field-of-view of the third camera. Displaying different portions of a representation using different cameras of the electronic device when certain conditions are prescribed allows the user to view an improved representation of the electronic device when the representation is displayed within a particular range of zoom values. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying, in the first region, at the sixth zoom level, a representation of an eighth portion of the field-of-view of the third camera (e.g., the telephoto camera) (e.g., 3180*c*) that overlaps with at least a subset of an eighth portion of the field-of-view of the first camera (e.g., the wide-angle camera) (e.g., 3180*b*) without displaying, in the first region, a representation of at least the subset of the eighth portion of the field-of-view of the first camera (e.g., the wide-angle camera) (e.g., 3180*b*) and displaying, in the second region, at the sixth zoom level, a representation of an eighth portion of the field-of-view of the first camera (e.g., the wide-angle camera) (e.g., 3180*b*) that excludes at least the subset of the eighth portion of the field-of-view of the first camera (e.g., the wide-angle camera) (e.g., 3180*b*), the electronic device receives a second request to decrease (e.g., zoom out) the zoom level of the representation of the portion of the field of view of the one or more cameras to a seventh zoom level (e.g., a zoom level that is less than the sixth zoom level but greater than the second zoom level). In some embodiments, in response to receiving the first request to decrease (e.g., zoom out) the zoom level of the representation of the portion of the field of view of the one or more cameras to the seventh zoom level and in accordance with a determination that the seventh zoom level is within a fifth range of zoom values (e.g., a range of zoom values that is outside of the second range of zoom values and the fourth range of zoom values) (e.g., a range of zoom values in which the field-of-view of the first camera is sufficient to populate both the first region and the second region) (e.g., a range of zoom values in which the device switches to using the first camera and the third camera (e.g., the telephoto camera can fill the preview region)), the electronic device displays, in the first region, at the seventh zoom level, a representation of a first a ninth portion of the field-of-view of the first camera (e.g., the wide-angle camera) (e.g., 3180*b*) and displays, in the second region, at the seventh zoom level, a representation of a tenth portion of the field-of-view of the first camera (e.g., the wide-angle camera) (e.g., 3180*b*). In some embodiments, the second zoom values are the same as the first range of zoom values. In some embodiments, when one camera's field-of-view (e.g., camera that has a narrower field of view than a second camera) can fill both the first and the second regions at a particular zoom level, the electronic device switches to only using a single camera to display representation in both region. In some embodiments, when one camera cannot fill both the first and the second regions at a particular zoom level, the device continues to use one camera to display a representation in the first region and another camera to display a representation in the second region; for example in response to receiving the first request (e.g., a request to zoom-out on the first user interface) to decrease the zoom level of the representation of the portion of the field of view of the one or more cameras to the seventh zoom level, in accordance with a determination that the seventh zoom level is not within (e.g., below) the fifth range of zoom values, the electronic device displays, in the first region, at the seventh zoom level, a representation of an eighth portion of the field-of-view of the third camera that excludes at least a subset of the eighth portion of the field-of-view of the third camera (in some embodiments, the amount of the subset that is excluded depends on the seventh zoom level.) and displaying, in the second region, at the seventh zoom level, a representation of an eighth portion of the field-of-view of the first camera that overlaps with the subset of the portion of the field-of-view of the third camera that was excluded from the eighth portion of the field-of-view of the third camera without displaying, in the second region, a representation of the subset of the portion of the field-of-view of the third camera that was excluded from the eighth portion of the field-of-view of the third camera. In some embodiments, in accordance with a determination that the seventh zoom level is not within the fifth range of zoom values, the electronic device uses one type of camera to display representation in the first region and one type of camera to display representation in the second region. In some embodiments, in accordance with a determination that the third zoom level is not within the first range of zoom values, the electronic device forgoes displaying, in the first region, at the seventh zoom level, a representation of a first a ninth portion of the field-of-view of the first camera and displaying, in the second region, at the seventh zoom level, a representation of a tenth portion of the field-of-view of the first camera. Switching to one camera to display a representation when certain conditions are prescribed allows the user to view an improved representation of the electronic device with increased fidelity and visual tearing when the representation is displayed within a particular range of zoom values. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second region (e.g., 602 and 606) includes a plurality of control affordances (e.g., 620, 626) (e.g., a selectable user interface object) (e.g., proactive control affordance, a shutter affordance, a camera selection affordance, a plurality of camera mode affordances) for controlling a plurality of camera settings.

In some embodiments, the electronic device receives an input (e.g., 2950*i*, 2950*j*) at a location on the camera user interface. In some embodiments, in response to receiving the input at the location on the camera user interface: the electronic device, in accordance with a determination that the location of the input (e.g., 2950*j*) is in the first region (e.g., 604), configures the electronic device to focus (e.g., 2936*c*) at the location of the input (and optionally set one or more other camera settings such as exposure or white balance based on properties of the field-of-view of the one or more cameras); and the electronic device, in accordance with a determination that the location of the input (e.g., 2950*i*) is in the second region (e.g., 602), forgoes (e.g., FIG. 29J) configuring the electronic device to focus at the location of the input (and optionally forgoing setting one or more other camera settings such as exposure or white balance based on properties of the field-of-view of the one or more cameras).

In some embodiments, while displaying, via the display device, the camera user interface that includes the representation (e.g., 630 in FIG. 29H) of at least a portion of a field-of-view of the one or more cameras displayed at the first zoom level (e.g., a request to change the first zoom level to a second zoom level), the electronic device receives a request (e.g., 2950*h*) to capture media (e.g., a gesture (e.g., tap) directed to a shutter affordance (e.g., 610)). In some embodiments, in response to receiving the request to capture media, the electronic device captures media (e.g., 624 in FIG. 29I) corresponding to the field-of-view of the one or more cameras, the media including content from the first portion of the field-of-view of the first camera (e.g., the wide-angle camera) (e.g., 3180*b*) at the first zoom level and content from the first portion of the field-of-view of the second camera (e.g., the ultra wide-angle camera) (e.g., 3180*a*) at the first zoom level. In some embodiments, after capturing the media, the electronic device receives (e.g., 2950*o*) a request to edit the captured media. In some embodiments, in response to receiving the request to edit the captured media, the electronic device displays a representation (e.g., 2930 in FIG. 29P) of the captured media that includes at least some of the content from the first portion of the field-of-view of the first camera (e.g., the wide-angle camera) (e.g., 3180*b*) at the first zoom level and at least some of the content from the first portion of the field-of-view of the second camera (e.g., the ultra wide-angle camera) (e.g., 3180*a*) at the first zoom level. In some embodiments, the representation of the media item that includes the content from the first portion of the field-of-view of the first camera at the first zoom level and content from the first portion of the field-of-view of the second camera at the first zoom level is a corrected version (e.g., stabilized, horizon corrected, vertical perspective corrected, horizontal perspective corrected, and/or reframed to keep an identified subject in the media item) of a representation of the media. In some embodiments, the electronic device displays the representation of the media item that includes the content from the first portion of the field-of-view of the first camera at the first zoom level and content from the first portion of the field-of-view of the second camera at the first zoom level includes displaying a representation of at least some of the content from the first portion of the field-of-view of the first camera at the first zoom level and a representation of at least some of the content from the first portion of the field-of-view of the second camera at the first zoom level. In some embodiments the representation does not include displaying a representation of at least some of the content from the first portion of the field-of-view of the second camera (or first camera) at the first zoom level, the representation of the media item is generated using at least some of the content from the first portion of the field-of-view of the second camera at the first zoom level.

Note that details of the processes described above with respect to method 3200 (e.g., FIGS. 32A-32C) are also applicable in an analogous manner to the methods described above. For example, methods 700, 900, 1100, 1300, 1500, 1700, 1900, 2100, 2300, 2500, 2700, 2800, 3000, 3400, 3600, and 3800 optionally include one or more of the characteristics of the various methods described above with reference to method 3200. For example, method 3000, optionally employs, using different set of camera combinations to capture media at various zoom level using various techniques described above in relation to method 3200. For brevity, these details are not repeated below.

FIGS. 33A-33Q illustrate exemplary user interfaces for varying zoom levels using an electronic device in accordance with some embodiments. The user interfaces in these figures are used to illustrate the processes described below, including the processes in FIGS. 34A-34B. In some embodiments, one or more techniques as discussed in FIGS. 8A-8V and 9A-9C may be optionally combined with one or more techniques of FIGS. 33A-33Q and FIGS. 34A-34B discussed below.

FIG. 33A illustrates electronic device 600 displaying live preview 630 that extends from the top of the display to the bottom of the display. Live preview 630 is based on images detected by one or more camera sensors. In some embodiments, device 600 captures images using a plurality of camera sensors and combines them to display live preview 630. In some embodiments, device 600 captures images using a single camera sensor to display live preview 630.

The camera user interface of FIG. 33A includes indicator region 602 and control region 606, which are overlaid on live preview 630 such that indicators and controls can be displayed concurrently with live preview 630. Camera display region 604 is substantially not overlaid with indicators or controls. In this example, live preview 630 includes a dog sitting on a person's shoulder in a surrounding environment. In some embodiments, the camera user interface of FIG. 33A includes a visual boundary that indicates the boundary between indicator region 602 and camera display region 604 and the boundary between camera display region 604 and control region 606. In some embodiments, live preview 630 does not extend into indicator region 602 and/or control region 606.

As illustrated in FIG. 33A, indicator region 602 is overlaid onto live preview 630 and optionally includes a colored (e.g., gray; translucent) overlay. Indicator region 602 includes flash indicator 602*a*. Flash indicator 602*a* indicates whether the flash is in an automatic mode, on, off, or in another mode (e.g., red-eye reduction mode).

As illustrated in FIG. 33A, camera display region 604 includes live preview 630 and zoom affordances 2622, which include 0.5× zoom affordance 2622*a*, 1× zoom affordance 2622*b*, and 2× zoom affordance 2622*c*. In this example, 1× zoom affordance 2622*b* is selected, which indicates that live preview 630 is displayed at a 1× zoom level.

As illustrated in FIG. 33A, control region 606 is overlaid onto live preview 630 and optionally includes a colored (e.g., gray; translucent) overlay. Control region 606 includes camera mode affordances 620, a portion of media collection 624, shutter affordance 610, and camera switcher affordance 612. Camera mode affordances 620 indicates which camera mode is currently selected and enables the user to change the camera mode.

Moreover, FIG. 33A illustrates device 600 responding to various gestures at locations corresponding to different locations of the camera interface. In particular, FIG. 33A illustrates device 600 responds to three inputs: (1) a tap gesture at a location corresponding to a location in indicator region 602 (tap gesture 3350*a*); (2) a tap gesture corresponding to a location in camera display region 604 that does not correspond to a location of one of zoom affordances 2622 (tap gesture 3350*b*); and (3) a tap gesture corresponding to a location that corresponds to one of zoom affordances 2622 (tap gesture 3350*c*), which is in camera display region 604. In one alternative scenario, at FIG. 33A, device 600 detects tap gesture 3350*a* at a location corresponding to a location in indicator region 602. In response to detecting tap gesture 3350*a*, device 600 maintains display of the camera user interface and forgoes configuring one or more cameras of the electronic device to focus at a location of tap gesture 3550*a* that corresponds to a location in the field-of-view of the one or more cameras (e.g., using similar techniques disclosed above in relation to tap gesture 2950*i* in FIG. 29H-29I). In another alternative scenario, at FIG. 33A, device 600 detects tap gesture 3350*b* at a location a tap gesture corresponding to a location in camera display region 604 that does not correspond to a location of one of zoom affordances 2622. In response to detecting tap gesture 3350*b*, device 600 configures one or more cameras of the electronic device to focus at a location of tap gesture 3550*b* that corresponds to a location in the field-of-view of the one or more cameras (e.g., using similar techniques disclosed above in relation to tap gesture 2950*j* in FIG. 29I-29J). In an additional scenario at FIG. 33A, device 600 detects tap gesture 3350*c* at a location corresponding to 1× zoom affordance 262*b*.

As illustrated in FIG. 33B, in response to detecting tap gesture 3350*c*, device 600 updates a zoom level of live preview 630 from the 1× zoom level in FIG. 33A to a 2× zoom level by switching from a first camera sensor to a second camera sensor with a different field-of-view. In some embodiments, because the second camera sensor corresponds to a camera that has a telephoto lens (e.g., as described above in relation to FIG. 31I), device 600 displays indicator region 602 with a non-transparent (e.g., or black) overlay.

In response to detecting tap gesture 3350*c*, device 600 also updates zoom affordances 2622. In particular, device 600 updates the display of 1× zoom affordance 2622*b* such that device 600 displays 1× zoom affordance 2622*b* as being unselected. As illustrated in FIG. 33B, when a zoom affordance is displayed as being unselected, the zoom affordance is not bold and does not include one or more characters (e.g., "x") that is displayed when it was selected (e.g., 1× zoom affordance 2622*b* in FIG. 33A compared to 1× zoom affordance 2622*b* in FIG. 33B). In addition, device 600 also updates the display of 2× zoom affordance 2622*c* such that device 600 displays 2× zoom affordance 2622*c* as being selected. As illustrated in FIG. 33B, when a zoom affordance is displayed as being selected, the zoom affordance is bold and includes one or more characters that the unselected zoom affordance do not include (e.g., "x" next to the zoom level). In some embodiments, in response to detecting tap gesture 3350*c*, device 600 enlarges the text of zoom affordances 2622. In some embodiments, device 600 enlarges the text because the device is displaying live preview 630 at a larger zoom level (e.g., from the 1× zoom level in FIG. 33A to the 2× zoom level in FIG. 33B). Additionally, in response to detecting tap gesture 3350*c*, device 600 maintains display of 0.5× zoom affordance 2622*a* (e.g., 0.5× zoom affordance 2622*a* remains unselected). As illustrated in FIG. 33B, when a zoom affordance is selected, the zoom affordance has a bigger size than the other unselected zoom affordances. In some embodiments, when the zoom affordance is selected, the zoom affordance is a different color than the other unselected zoom affordances. In some embodiments, in response to detecting tap gesture 3350*c*, device 600 updates the display of 1× zoom affordance 2622*b* to indicate the new zoom level (e.g., text of 1× zoom affordance 2622*b* changes to “2×”) and continues to display the 1× zoom affordance as being selected. In some embodiments, when device updates the display of 1× zoom affordance 2622*b* to indicate the new zoom level, device 600 displays the 2× zoom affordance 2622*c* as being unselected (or selected).

FIGS. 33B-33F illustrate device 600 changing zoom levels in response to gesture directed to two different types of zoom affordances: (1) a zoom affordance that causes the device 600 to update live preview 630 such that live preview 630 is displayed at different zoom levels when the zoom affordance (e.g., 1× zoom affordance 2622*b*) is repeatedly selected; and (2) a zoom affordance (e.g., zoom affordance 2622*c*) that causes device 600 to update live preview 630 such that live preview 630 is only displayed at one zoom level when the zoom affordance is repeatedly selected. At FIG. 33B, device 600 detects an additional tap gesture 3350*d* at a location corresponding to 1× zoom affordance 2622*b*.

As illustrated in FIG. 33C, in response to detecting tap gesture 3350*d*, device 600 updates a zoom level of live preview 630 from the 2× zoom level in FIG. 33B to a 0.5× zoom level by switching from the second camera sensor to a third camera sensor with a different field-of-view. Here, because the third camera sensor corresponds to a camera that has an ultra-wide lens, device 600 displays indicator region 602 with a transparent overlay instead of a non-transparent (e.g., or black) overlay when the device was displayed with the second camera sensor (e.g., telephone lens or lens that is not the ultra-wide lens as described above in relation to FIG. 31A). In response to detecting tap gesture 3350*d*, device 600 also updates zoom affordances 2622. In particular, device 600 updates the display of 2× zoom affordance 2622*c* such that device 600 displays zoom affordance 2622*c* as being unselected (e.g., using similar techniques to those described above in relation to 1× zoom affordance 2622*b* in FIG. 33B). In addition, device 600 also updates the display of 0.5× zoom affordance 2622*a* such that device 600 displays 2× zoom affordance 2622*c* as being selected (e.g., using similar techniques to those described above in relation to 2× zoom affordance 2622*c* in FIG. 33B). Additionally, in response to detecting tap gesture 3350*d*, device 600 maintains display of 1× zoom affordance 2622*b* (e.g., 1× zoom affordance 2622*b* remains unselected). In some embodiments, in response to detecting tap gesture 3350*d*, device 600 decreases the text of zoom affordances 2622. In some embodiments, device 600 decreases the text because the device is displaying live preview 630 at a smaller zoom level (e.g., from the 2× zoom level in FIG. 33A to 0.5× zoom level in FIG. 33B). In some embodiments, the decreased text displayed when the zoom level is at 0.5× is smaller than the text displayed when the zoom level is at 1×. In some embodiments, in response to detecting tap gesture 3350*d*, device 600 updates the display of 1× zoom affordance 2622*b* to indicate the new zoom level (e.g., the text of 1× zoom affordance 2622*b* changes to “0.5×”) and continues to display the 1× zoom affordance 2622*b* as being selected. In some embodiments, when device updates the display of 1× zoom affordance 2622*b* to indicate the new zoom level, device 600 displays the 0.5× zoom affordance 2622*a* as being unselected (or selected). At FIG. 33C, device 600 detects an additional tap gesture 3350*e* at a location corresponding to 1× zoom affordance 2622*b*.

As illustrated in FIG. 33D, in response to detecting tap gesture 3350*e*, device 600 updates a zoom level of live preview 630 from the 0.5× zoom level in FIG. 33C to the 1× zoom level by switching from the third camera sensor to a first camera sensor with a different field-of-view. In response to detecting tap gesture 3350*e*, device 600 also updates zoom affordances 2622. In particular, device 600 updates the display of 0.5× zoom affordance 2622*a* such that device 600 displays 0.5× zoom affordance 2622*a* as being unselected (e.g., using similar techniques to those described above in relation to 1× zoom affordance 2622*b* in FIG. 33B). In addition, device 600 also updates the display of 1× zoom affordance 2622*b* such that device 600 displays 1× zoom affordance 2622*b* as being selected (e.g., using similar techniques to those described above in relation to 2× zoom affordance 2622*c* in FIG. 33B). Additionally, in response to detecting tap gesture 3350*e*, device 600 maintains display of 2× zoom affordance 2622*c* (e.g., 2× zoom affordance 2622*c* remains unselected). In some embodiments, in response to detecting tap gesture 3350*e*, device 600 increase the text of zoom affordances 2622. In some embodiments, device 600 increase the text because the device is displaying live preview 630 at a larger zoom level (e.g., from the 0.5× zoom level in FIG. 33A to the 1× zoom level in FIG. 33B). At FIG. 33D, device 600 detects tap gesture 3350*f* at a location corresponding to 2× zoom affordance 2622*c*.

As illustrated in FIG. 33E, in response to detecting tap gesture 3350*f*, device 600 updates a zoom level of live preview 630 from the 1× zoom level in FIG. 33D to the 2× zoom level by switching from the third camera sensor to a first camera sensor with a different field-of-view. In response to detecting tap gesture 3350*f*, device 600 also updates zoom affordances 2622. In particular, device 600 updates the display of 1× zoom affordance 2622*b* and 2× zoom affordance 2622*c* as being selected (e.g., using similar techniques to those decreased above in relation to FIG. 33B). Additionally, in response to detecting tap gesture 3350*f*, device 600 maintains display of 0.5× zoom affordance 2622*a* (e.g., 0.5× zoom affordance 2622*a* remains unselected). At FIG. 33E, device 600 detects an additional tap gesture 3350*g* at a location corresponding to 2× zoom affordance 2622*c*.

As illustrated in FIG. 33F, in response to detecting tap gesture 3350*g*, device 600 forgoes updating the zoom affordances 2622 and the zoom level of live preview 630. In FIG. 33E, live preview 630 continues to be displayed at the 2× zoom level. Here, unlike detecting tap gestures on 1× zoom affordance 2622*b* (e.g., described in FIGS. 35B-35D), device 600 does not display live preview 630 at multiple zoom levels in response to an additional tap on 2× zoom affordance 2622*c*. Thus, because device 600 determines that 2× zoom affordance 2622*c* is a type of zoom affordance that cannot cycle through zoom levels, device 600 forgoes updating the zoom level of live preview 630 in response to detecting gesture 3350*g*. However, if device 600 determined that 0.5× zoom affordance 2622*c* was a type of zoom affordance that could cycle through zoom levels (e.g., like 1× zoom affordance 2622*b*), device 600 would have updated the zoom level of live preview 630 in response to detecting gesture 3350*g*.

FIGS. 33F-33O illustrate device 600 displaying an adjustable zoom control in response to a swipe gesture or press-hold gesture on one of more zoom affordance and changing zoom levels of a live preview in response to detecting a gesture directed to the adjustable zoom control. At FIG. 33F, device 600 detects upward swipe gesture 3550*h* (e.g., a swipe up gesture that moves toward indicator region 602 and away from control region 606) at a location corresponding to 2× zoom affordance 2622*c*. Alternately, device 600 device detects a press-and-hold gesture at the location corresponding to 2× zoom affordance 2622*c*.

As illustrated in FIG. 33G, in response to detecting upward swipe gesture 3350*h* (or a press-and-hold gesture), device 600 displays adjustable zoom control 3328 and ceases to display zoom affordances 2622. Adjustable zoom control 3328, in FIG. 33G, covers up the location where zoom affordances 2622 were previously displayed in FIG. 33F. In some embodiments, device 600 displays adjustable zoom control 3328 by displaying an animation of adjustable zoom control 3328 sliding in from the bottom of camera display region 604 to the position in camera display region 604 that it is displayed in FIG. 33G.

As illustrated in FIG. 33G, adjustable zoom control 3328 is a rotatable user interface that mimics a virtually rotatable wheel or dial. Adjustable zoom control 3328 includes zoom indication 3328*a*1 and multiple tick marks, where each tick mark corresponds to a different zoom level. Each tick mark on adjustable zoom control 3328 is not an equal distance a part. As illustrated in FIG. 3328, adjustable zoom control 3328 includes a first set of tick marks that are each displayed at a first distance apart (e.g., tick marks below 1× zoom indicator 3328*b*) and a second set of tick marks that are each displayed at a second distance apart (e.g., tick marks above 1× zoom indicator 3328*b*). Adjustable zoom control 3328 further includes 1× zoom indicator 3328*b,* 2× zoom indicator 3328*c*, and 3× level indicator 3328*d*, which are located a tick mark (or position) on adjustable zoom control 3328 that correspond to a 1× zoom level, a 2× zoom level, and a 3× zoom level, respectively.

As illustrated in FIG. 33G, in response to detecting upward swipe gesture 3350*h* (or a press-and-hold gesture), device 600 displays zoom indication 3328*a*1 at a position, on the adjustable zoom control 3328, that corresponds to the tick mark labeled with 2× zoom indicator 3328*c*. Here, device 600 displays zoom indication 3328*a*1 aligned with 2× zoom indicator 3328*c* at a position substantially in the center of adjustable zoom control 3328. In other words, when initially displaying the adjustable zoom control 3328, device 600 displays zoom indication 3328*a*1 at a position (e.g., central position) on the adjustable zoom control that corresponds to the current zoom level (e.g., 2× zoom level) of live preview 630. Moreover, device 600 displays that the 2× zoom level is selected by displaying 2× zoom indicator 3328*c* as being selected. In some embodiments, when adjustable zoom control 3328 is initially displayed (or at the first point in time after adjustable zoom control 3328 is displayed), device 600 concurrently displays zoom indicators that correspond to each of zoom affordances 2622. At FIG. 33G, device 600 detects rightward swipe gesture 3350*i* at a location corresponding to zoom control 3328.

As illustrated in FIG. 33G, in response to detecting rightward swipe gesture 3350*i*, device 600 rotates adjustable zoom control 3328 clockwise based on the magnitude of rightward swipe gesture 3350*i*. When device 600 rotates adjustable zoom control 3328, device 600 moves the tick marks on adjustable zoom control 3328 to positions that are clockwise of where they were previously displayed. Further, in response to detecting rightward swipe gesture 3350*i*, device 600 replaces 2× zoom indicator 3328*c* with 1.7× zoom indicator 3328*e* and maintains zoom indication 3328*a*1 at a position substantially in the center of adjustable zoom control 3328. Thereby, in FIG. 33G, device 600 displays zoom indication 3328*a*1 as being aligned with 1.7× zoom indicator 3328*e*, and device 600 displays 1.7× zoom indicator 3328*e* as being selected. At FIG. 33H, device 600 detects lift off of rightward swipe gesture 3350*i* at a second location corresponding to zoom control 3328.

As illustrated in FIG. 33I, at a first time after detecting lift off of rightward swipe gesture 3350*i*, device 600 ceases to display adjustable zoom control 3328 and re-displays 0.5× zoom affordance 2622*a* and 2× zoom affordance 2622*c* at their previously displayed location in FIG. 33F. However, device 600 ceases to display 1× zoom affordance 2622*b* and displays 1.7× zoom affordance 2622*i* at the previously displayed location of 1× zoom affordance 2622*b* in FIG. 33F. This is at least because the adjustable zoom control is now set to a 1.7× zoom level and the 1.7× zoom level is between a range of zoom levels (e.g., a predetermined range such as between 1× and 2×) to replace a zoom affordance. The 1.7× zoom affordance 2622*j* is also displayed as being selected (as described above in relation to 2× zoom affordance 2622*c* in FIG. 33B). In addition to displaying the zoom affordances, device 600 also updates the zoom level of live preview 630 to the 1.7× zoom level. In some embodiments, device 600 updates the zoom level of live preview 630 in response to detecting rightward swipe gesture 3350*i* and before detecting lift off of rightward swipe gesture 3350*i*. At FIG. 33I, device 600 detects tap gesture 3350*j* at a location that corresponds to 0.5× zoom affordance 2622*a.*

As illustrated in FIG. 33J, in response to detecting tap gesture 3350*j*, device 600 updates a zoom level of live preview 630 to a 0.5× zoom level. Further, in response to detecting tap gesture 3350*j*, device 600 replaces display of 1.7× zoom affordance 2622*j* with 2× zoom affordance 2622*h* because live preview 630 is displayed at a default zoom level (e.g., a zoom level that corresponds to one of zoom affordances 2622). As illustrated in FIG. 33J, device 600 also updates the camera user interface using similar techniques discussed above in relation to displaying the camera user interface when live preview 630 was displayed at the 0.5× zoom level in FIG. 33C. At FIG. 33J, device 600 detects upward swipe gesture 3350*k* at a location that corresponds 0.5× zoom affordance 2622*a*. Alternatively, device 600 device detects a press-and-hold gesture at the location corresponding to 0.5× zoom affordance 2622*a.*

As illustrated in FIG. 33K, in response to detecting upward swipe gesture 3350*k* (or a press-and-hold gesture), device 600 displays zoom indication 3328*a*1 at a position in the center of adjustable zoom control 3328. Because live preview 630 was displayed at a 0.5× zoom level immediately before upward swipe gesture 3350*k* was detected, device 600 displays zoom indication 3328*a*1 aligned with 0.5× zoom indicator 3328*a*. In addition, device 600 uses similar techniques to display the camera user interface and adjustable zoom control 3328 when the 0.5× zoom level is selected that device 600 used in relation to displaying the camera user interface and adjustable zoom control 3328 when 2× zoom level was selected in FIG. 33G. At FIG. 33K, device 600 device 600 detects leftward swipe gesture 33501 at a location corresponding to zoom control 3328.

As illustrated in FIG. 33L, in response to detecting leftward swipe gesture 33501 at a location corresponding to zoom control 3328, device rotates adjustable zoom control 3328 counterclockwise based on the magnitude of leftward swipe gesture 33501. After rotating adjustable zoom control 3328, device 600 displays zoom indication 3328*a*1 as being aligned with the 1× zoom indicator 3328*b* at the center position on adjustable zoom control 3328. In addition, device 600 uses similar techniques to display the camera user interface in response to detecting leftward swipe gesture 33501 that device 600 used in relation to displaying the camera user interface in response to detecting rightward swipe gesture 3350*i* in FIG. 33H. At FIG. 33L, device 600 detects liftoff of leftward swipe gesture 33501 and, before a first time (e.g., a time corresponding to a time where device 600 would cease to display adjustable zoom control 3328) after detecting liftoff of leftward swipe gesture 33501, device 600 detects tap gesture 3350*m* at a location corresponding to a location outside of zoom control 3328 and in camera display region 604.

As illustrated in FIG. 33M, in response to detecting tap gesture 3350*m* before the first time after detecting liftoff of leftward swipe gesture 33501, device 600 ceases to display adjustable zoom control 3328 and re-displays multiple zoom affordances 2622. In addition, device 600 also displays live preview 630 at the 1× zoom level using similar techniques to those described above. In contrast to FIG. 33I, FIG. 33M demonstrates an example of how device 600 ceases to display adjustable zoom control 628 and display live preview 630 at a zoom level set on adjustable zoom control 628 before waiting until a first time after detecting liftoff of a gesture. At FIG. 33M, device detects upward swipe gesture 3350*n* at a location that corresponds 0.5× zoom affordance 2622*a*. Alternatively, device 600 device detects a press-and-hold gesture at the location corresponding to 0.5× zoom affordance 2622*a*.

As illustrated in FIG. 33N, in response to detecting upward swipe gesture 3350*n* (or a press-and-hold gesture) at a location that corresponds 0.5× zoom affordance 2622*a*, device 600 displays zoom indication 3328*a*1 as being aligned with 1× zoom indicator 3328*b* at the center position on adjustable zoom control 3328 and ceases to display zoom affordances 2622. Here, at FIG. 33N, device 600 displays zoom indication 3328*a*1 as being aligned with 1× zoom indicator 3328*b* and not the zoom level because live preview 630 was displayed at a 1× zoom level immediately before upward swipe gesture 3350*n* was detected (e.g., the currently displayed zoom level of the camera user interface and/or live preview 630). At FIG. 33N, device 600 detects tap gesture 3350*o* at location corresponding to a location that is outside of zoom control 3328 and in camera display region 604.

As illustrated in FIG. 33O, after detecting tap gesture 3350*o*, device 600 ceases to display adjustable zoom control 3328 and re-displays zoom affordances 2622. At FIG. 33O, device 600 detects de-pinch gesture 3350*p* at a location that corresponds to camera display region 604.

As illustrated in FIG. 33P, in response to detecting de-pinch gesture 3350*p*, device 600 displays live preview 630 at a 2.2× zoom level based on the magnitude of de-pinch gesture 3350*p*. Additionally, in response to detecting de-pinch gesture 3350*p*, device 600 replaces display of 2× zoom affordance 2622*c* with display of 2.2× zoom affordance 2622*g*, where 2.2× zoom affordance 2622*g* is displayed as being selected to indicate that live preview 630 is displayed at the 2.2× zoom level. Here, device 600 replaces 2× zoom affordance 2622*c* with 2.2× zoom affordance 2622*g* because the 2.2× zoom level is above is a zoom level (e.g., above 2×) to replace a zoom affordance. As illustrated in FIG. 31B, in response to detecting de-pinching gesture 3150*a*, device 600 further displays 2.2× zoom affordance 2622*g* as being selected to indicate that live preview 630 is displayed at the 2.2× zoom level. At FIG. 33P, device 600 detects pinch gesture 3350*q* at a location that corresponds to camera display region 604.

As illustrated in FIG. 33Q, in response to detecting pinch gesture 3350*q*, device 600 displays live preview 630 at a 0.9× zoom level based on the magnitude of pinch gesture 3550*q*. Additionally, in response to detecting pinch gesture 3350*q*, device 600 replaces display of 0.5× zoom affordance 2622*a* with display of 0.9× zoom affordance 2622*d*. Here, device 600 replaces 0.5× zoom affordance 2622*a* with 0.9× zoom affordance 2622*d* because the 0.9× zoom level is below a threshold zoom level (e.g., 1×) to replace a zoom affordance. Because the zoom level is no longer above the 2× zoom level, device 600 also replaces the 2.2× zoom affordance 2622*g* with the 2× zoom affordance 2622*c*. In response to detecting pinch gesture 3350*q*, device 600 further displays 0.9× zoom affordance 2622*d* as being selected to indicate that live preview 630 is displayed at the 0.9× zoom level FIGS. 34A-34B are a flow diagram illustrating a method for varying zoom levels using an electronic device in accordance with some embodiments. Method 3400 is performed at a device (e.g., 100, 300, 500, 600) with a display device (e.g., a touch-sensitive display). Some operations in method 3400 are, optionally, combined, the orders of some operations are, optionally, changed, and some operations are, optionally, omitted.

As described below, method 3400 provides an intuitive way for varying zoom levels of user interfaces. The method reduces the cognitive burden on a user for varying zoom levels of user interfaces, thereby creating a more efficient human-machine interface. For battery-operated computing devices, enabling a user to vary zoom levels faster and more efficiently conserves power and increases the time between battery charges.

As described below, method 3400 provides an intuitive way for editing captured media. The method reduces the cognitive burden on a user for editing media, thereby creating a more efficient human-machine interface. For battery-operated computing devices, enabling a user to edit media faster and more efficiently conserves power and increases the time between battery charges.

An electronic device (e.g., 600) includes a display device (e.g., a touch-sensitive display) and one or more cameras (e.g., one or more cameras (e.g., dual cameras, triple camera, quad cameras, etc.) on the same side or different sides of the electronic device (e.g., a front camera, a back camera))). The electronic device displays (3402), via the display device, a camera user interface that includes a first representation (e.g., 630) of at least a portion of a field-of-view of the one or more cameras displayed at a first zoom level (e.g., 0.5×, 1×, 2×). The camera user interface includes a plurality of zooming affordances (e.g., 2622) (e.g., selectable user interface objects). The plurality of zoom affordances includes a first zoom affordance (e.g., 2622*b*) (e.g., a selectable user interface object) and a second zoom affordance (e.g., 2622) (e.g., a selectable user interface object). In some embodiments, the zoom affordances are displayed overlaid on at least a portion of a representation of a field-of-view of the one or more cameras. Displaying multiple zoom affordances that correspond to different zoom levels reduces the number of inputs required by the user to change the zoom level of the displayed representation. Providing additional control options without cluttering the UI with additional displayed controls enhances the operability of the device enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the plurality of zooming affordances, the electronic device receives (3404) (e.g., detects) a first gesture (e.g., 3350*c*-3350*g*), (e.g., a tap) directed to one of the plurality of affordances.

In response (3406) to receiving the first gesture and in accordance (3410) with a determination that the first gesture is a gesture (e.g., 3350*c*) directed to the first zoom affordance (e.g., 2622*b*) (e.g., an affordance that corresponds to a particular zoom level (e.g., second zoom level)), the electronic device displays (3412) (e.g., update the camera user interface to be displayed at the first zoom level), at a second zoom level (e.g., 0.5×, 1×, 2×), a second representation (e.g., 630) of at least a portion of a field-of-view of the one or more cameras. Dynamically updating display of a representation to a particular zoom level when a particular zoom affordance is selected provides the user with feedback about the change in zoom level of the updated representation that corresponds to the particular zoom affordance. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response (3410) to receiving the first gesture and in accordance (3416) with a determination that the first gesture is a gesture (e.g., 3350*f*) directed to the second zoom affordance (e.g., an affordance that corresponds to a particular zoom level (e.g., third zoom level)), the electronic device displays (3418) (e.g., update the camera user interface to be displayed at the second zoom level), at a third zoom level (e.g., 0.5×, 1×, 2×), a third representation (e.g., 630) of at least a portion of a field-of-view of the one or more cameras. In some embodiments, the third zoom level is different from the first zoom level and the second zoom level. Dynamically updating display of a representation to a particular zoom level when a particular zoom affordance is selected provides the user with feedback about the change in zoom level of the updated representation that corresponds to the particular zoom affordance. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 35B:
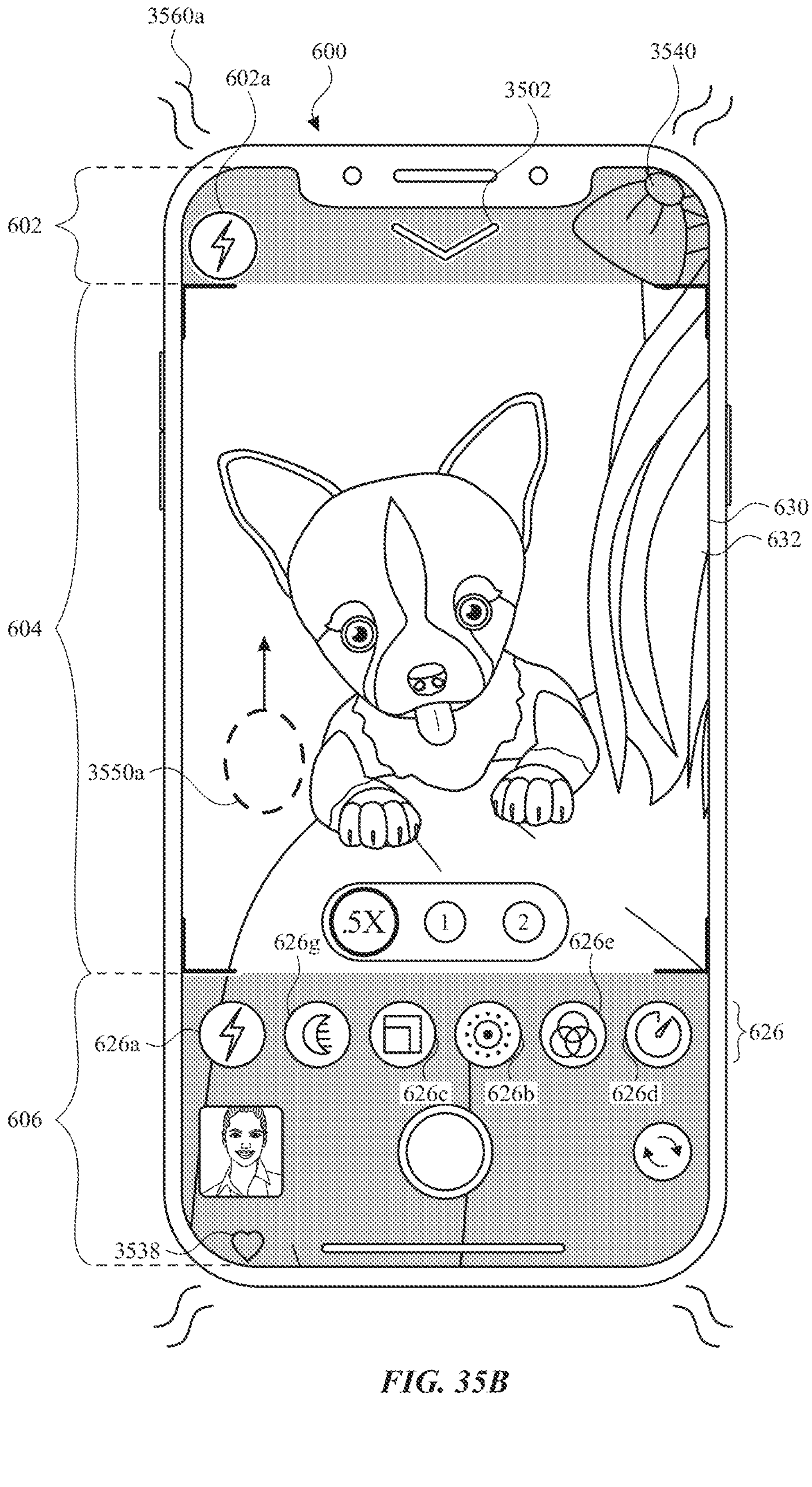
Figure 36A:
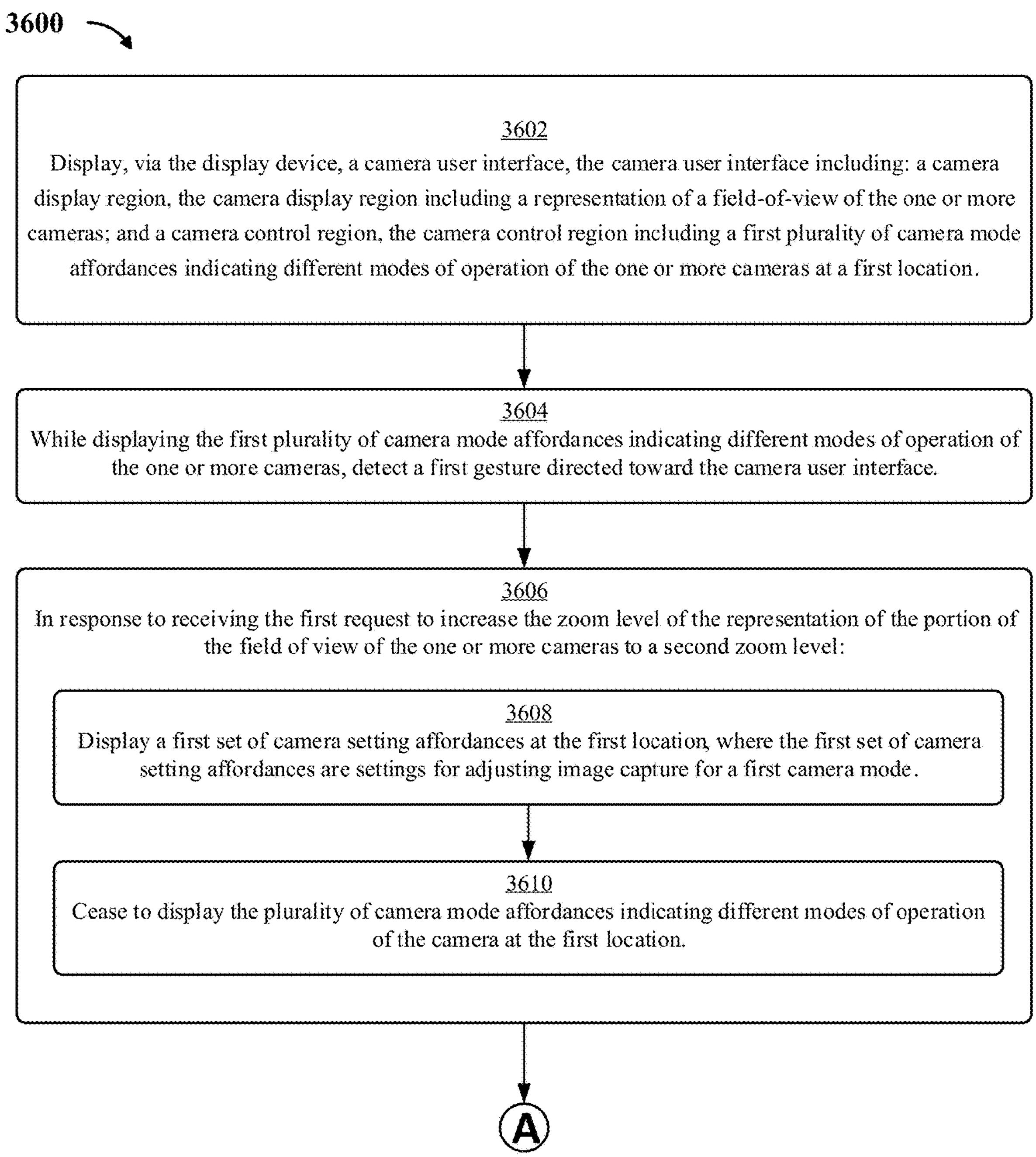

In some embodiments, in accordance (3410) with the determination that the first gesture is the gesture directed to the first zoom affordance, the electronic device maintains (3414) a visual characteristic (e.g., visual characteristic (e.g., color, text, boldness, opacity, highlighting) does not change) of the second zoom affordance (e.g., 2622*c* in FIG. 35B in response to 3350*c*) and changes (e.g., updating, replacing a current visual characteristic of the first zoom affordance with a new visual characteristic of the first zoom affordance) a visual characteristic (e.g., visual characteristic (e.g., color, text, boldness, opacity, highlighting) changes) of the first zoom affordance (e.g., 2622*b* in FIG. 35B in response to 3350*c*). Updating a visual characteristic of a zoom affordance while maintaining the visual characteristic of other zoom affordances provides the user with feedback about the current state of the selected zoom affordance and provides visual feedback to the user indicating that the zoom affordance is selected and the electronic device is currently displaying a representation at a zoom level that corresponds to the zoom affordance and not the other zoom affordances. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Figure 35C:
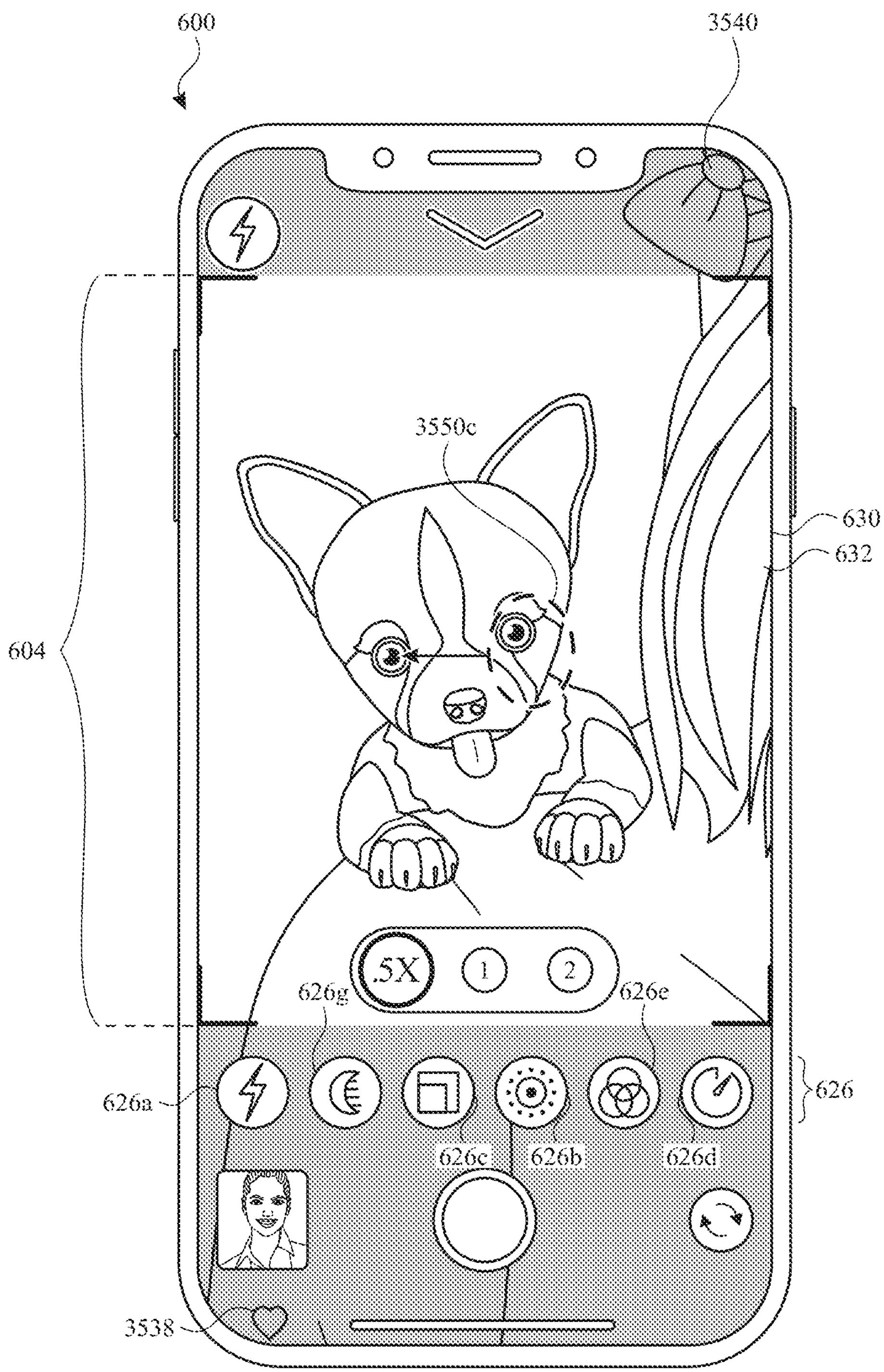
Figure 35D:
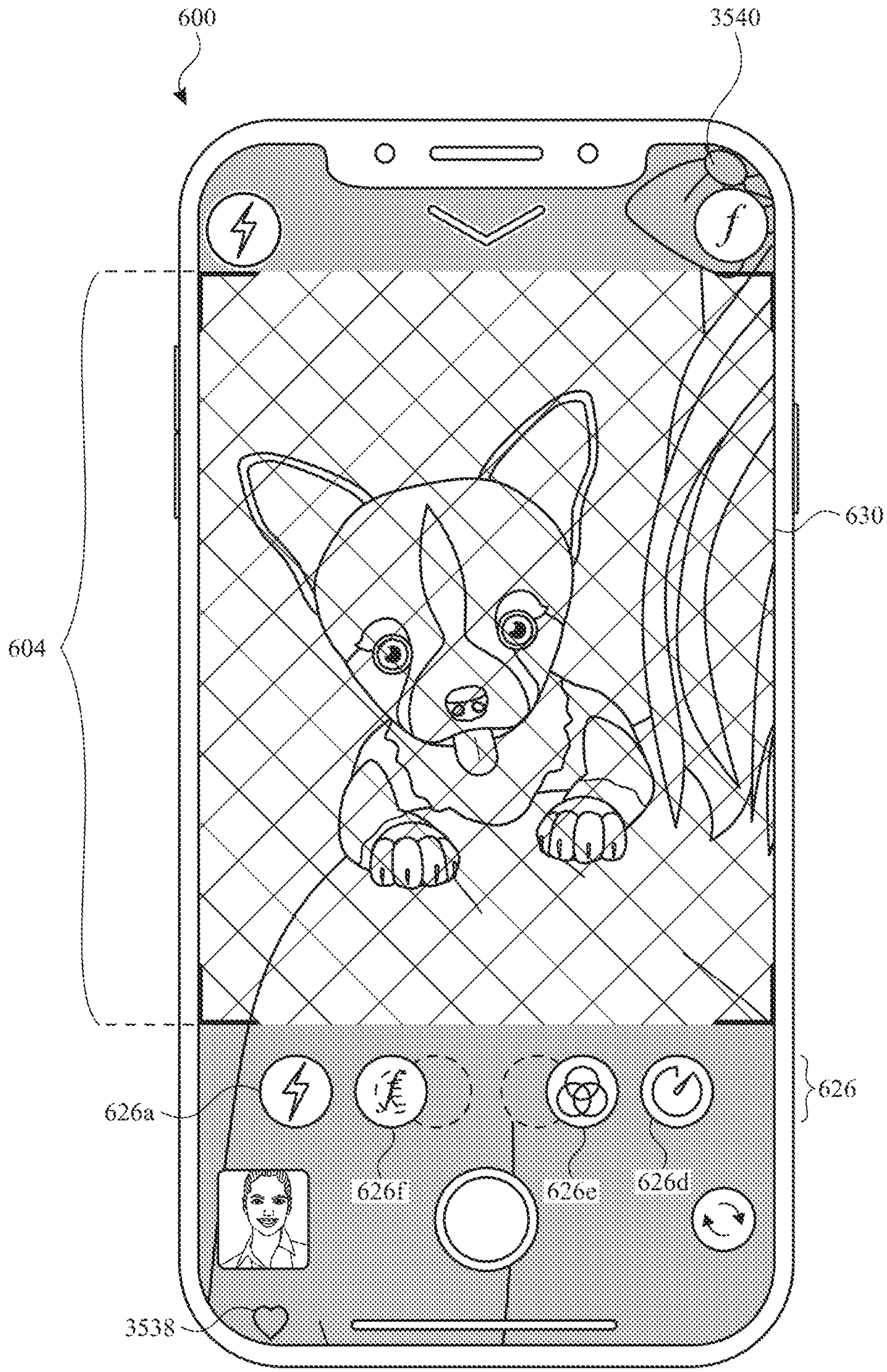
Figure 35E:
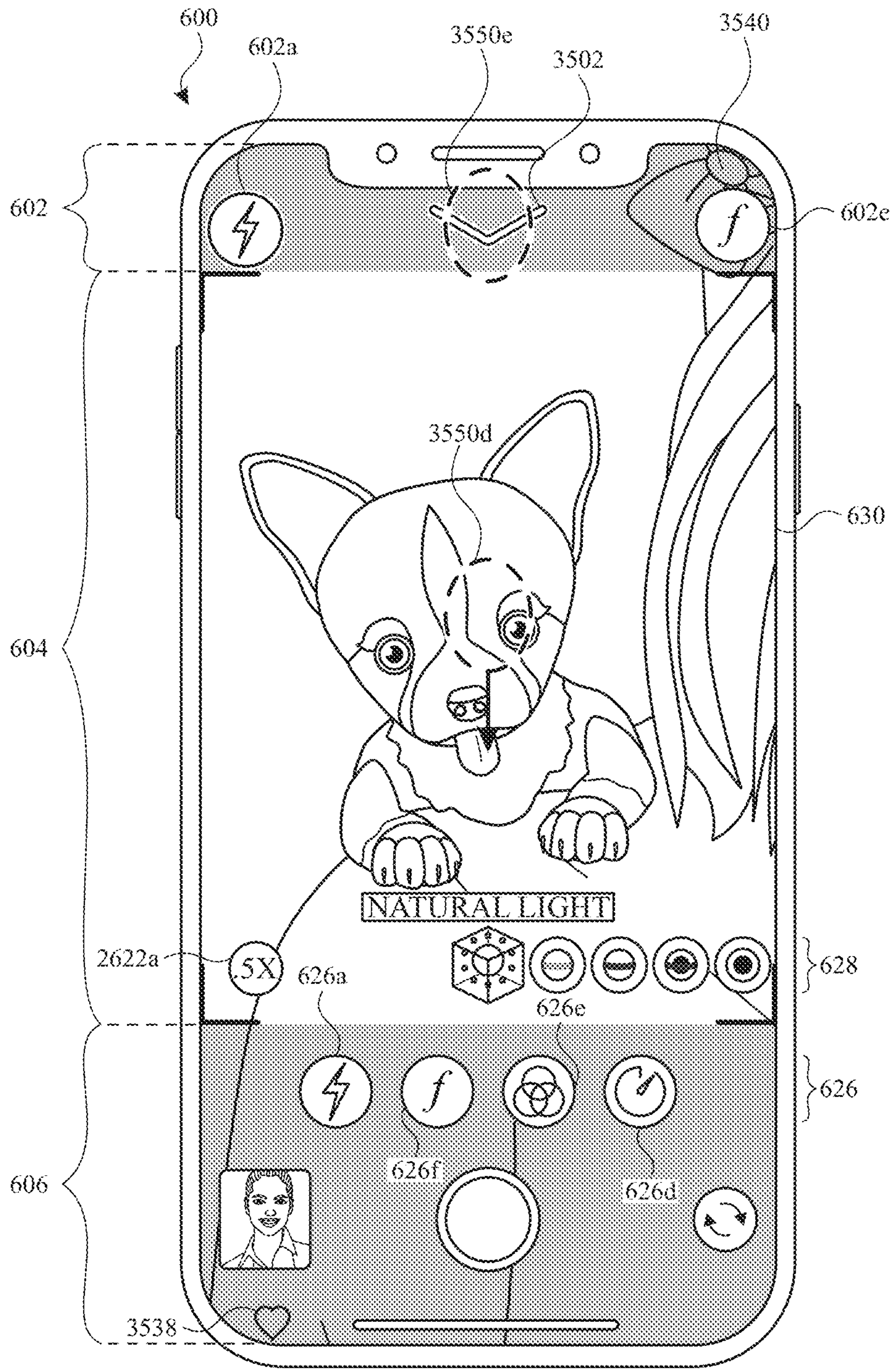

In some embodiments, in accordance with the determination (3416) that the first gesture is the gesture directed to the second zoom affordance (e.g., an affordance that corresponds to a particular zoom level (e.g., third zoom level)), the electronic device maintains (3420) the visual characteristic (e.g., visual characteristic (e.g., color, text, boldness, opacity, highlighting) does not change) of the first zoom affordance (e.g., 2622*b* in FIG. 35E in response to 3350*f*) and changes (e.g., updating, replacing a current visual characteristic of the second zoom affordance with a new visual characteristic of the second zoom affordance) the visual characteristic (e.g., visual characteristic (e.g., color, text, boldness, opacity, highlighting) change) of the second zoom affordance (e.g., 2622*c* in FIG. 35E in response to 3350*f*). In some embodiments, the visual characteristic of the first zoom affordance, and the visual characteristic of the second zoom affordance are the type of visual characteristic (e.g., e.g., color, text, boldness, opacity, highlighting). In some embodiments, a visual characteristic is moved from a zoom affordance that was previously selected to the new zoom affordance (e.g., zoom affordance showing 1× that is selected and zoom affordance showing 0.5 is unselected and, in response to detecting the first gesture, the zoom affordance that showed 1× shows 1 and the zoom affordance that showed 0.5 shows 0.5× (e.g., the "x" moves between the affordances). In some embodiments, the size of the text changes with the zoom level of selected affordance (e.g., the size of text is smaller when 0.5× affordance is selected than the size of text when 1× affordance is selected) (e.g., greater zoom levels have bigger text). Updating a visual characteristic of a zoom affordance while maintaining the visual characteristic of other zoom affordances provides the user with feedback about the current state of the selected zoom affordance and provides visual feedback to the user indicating that the zoom affordance is selected, and the electronic device is currently displaying a representation at a zoom level that corresponds to the zoom affordance and not the other zoom affordances. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of changing the visual characteristic of the first zoom affordance includes one or more of: changing (e.g., increasing) a size of the first zoom affordance (e.g., 2622*b* in FIG. 35B in response to 3350*c*) from a first size to a second size. In some embodiments, the second size of the first zoom affordance is different from a current size of the second zoom affordance (e.g., 2622*c* in FIG. 35B in response to 3350*c*) (e.g., the size at which the second zoom affordance is currently displayed); and changing a color of the first zoom affordance from a first color to a second color. In some embodiments, the second color of the first zoom affordance is different from a current color of the second zoom affordance (e.g., the color at which the second zoom affordance is currently displayed). In some embodiments, the first size of the first zoom affordance is the same size as the current size of the second zoom affordance. In some embodiments, the electronic device increases the size of the first zoom affordance from a first size to a second size that is different from the first size. Updating a visual characteristic of a zoom affordance to be different than the visual characteristic of other zoom affordances provides the user with feedback about the current state of the selected zoom affordance and provides visual feedback to the user indicating that the zoom affordance is selected, and the electronic device is currently displaying a representation at a zoom level that corresponds to the zoom affordance and not the other zoom affordances. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device changes a color of the first zoom affordance from a first color to a second color. In some embodiments, the second color of the first zoom affordance is different from a current color of the second zoom affordance (e.g., the color at which the second zoom affordance is currently displayed). In some embodiments, the first color of the first zoom affordance is the same color as the current color of the second zoom affordance. In some embodiments, the electronic device changes the color of the first zoom affordance from a first color to a second color that is different from the first color. Updating a visual characteristic of a zoom affordance to be different than the visual characteristic of other zoom affordances provides the user with feedback about the current state of the selected zoom affordance and provides visual feedback to the user indicating that the zoom affordance is selected, and the electronic device is currently displaying a representation at a zoom level that corresponds to the zoom affordance and not the other zoom affordances. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying (e.g., update the camera user interface to be displayed at the first zoom level), at the second zoom level (e.g., 0.5×, 1×, 2×), the second representation of at least the portion of the field-of-view of the one or more cameras, the electronic device receives a second gesture directed to the first zoom affordance. In some embodiments, in response to receiving the second gesture (e.g., 3350*d*, 3550*g*) directed to the first zoom affordance and in accordance with a determination that the first zoom affordance satisfies first respective criteria (e.g., 2622*b*), the electronic device displays (e.g., update the camera user interface to be displayed at the first zoom level), at a fourth zoom level (e.g., 0.5×, 1×, 2×), a fourth representation of at least a portion of a field-of-view of the one or more cameras. In some embodiments, the first respective criteria includes one or more criteria that are satisfied when the zoom affordance is a type of affordance that can cycle through zoom level, the zoom affordance is displayed in a particular position (e.g., center position) of the plurality of zoom affordance, the zoom affordance is displayed on a particular location (e.g., center location) on the camera user interface. Updating a representation to different zoom levels in response to receiving multiple inputs on a particular affordance provides additional control of the device, without cluttering the user interface, such that one zoom affordance can change between zoom levels of the electronic device. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the second gesture (e.g., 3350*d*, 3550*g*) directed to the first zoom affordance and in accordance with a determination that the first zoom affordance satisfies second respective criteria (e.g., 2622*c*), the electronic device forgoes displaying, at the fourth zoom level, the fourth representation of at least the portion of the field-of-view of the one or more cameras and maintains (e.g., do not change zoom level) display, at the second zoom level (e.g., the previous zoom level), of the second representation of the portion of the field-of-view of the one or more cameras. In some embodiments, the second respective criteria includes one or more criteria that are satisfied when the zoom affordance is a type of affordance that cannot cycle through zoom levels, the zoom affordance is displayed in a particular position (e.g., not in center position, left or right of center position, leftmost or rightmost zoom affordance) of the plurality of zoom affordance, the zoom affordance is displayed on a particular location (e.g., left or right of center) on the camera user interface. Forgoing to update a representation to different zoom levels in response to receiving multiple inputs on a particular affordance provides visual feedback that lets user quickly determine that the affordance cannot be used to go to multiple zoom levels and is only associated with one zoom level. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first gesture is a first type of gesture (e.g., a tap). In some embodiments, the electronic device receives a third gesture (e.g., 3350*h*) directed to the first zoom affordance. In some embodiments, the third gesture is a second type of gesture (e.g., a press and hold gesture or a swipe up gesture) that is different from the first type (e.g., a tap) of gesture. In some embodiments, in response to receiving the third gesture directed to the first zoom affordance, the electronic device displays a control (e.g., 3328) (e.g., a scroll wheel, a slider) for changing the zoom level of a first currently displayed representation. In some embodiments, the control for changing the zoom level of the first currently displayed representation includes a first indication (e.g., 3328*a*1 in FIG. 33I) of a current zoom level of the first currently displayed representation. In some embodiments, the control has a visual representation (e.g., textual indications ((e.g., 0.5×, 1×, 2×)) of the first and second zoom levels (or other zoom levels that correspond to each affordance in the plurality of affordances) on the control). Displaying a control for changing the zoom level of a representation when the user provides a swipe or long press gesture towards an affordances, but without executing the operation associated with a tap gesture directed to the icon provides the user with more control of the device by helping the user avoid unintentionally executing the operation and simultaneously allowing the user to recognize that the user can display the representation at zoom levels that do not correspond to the selected zoom affordances. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the control for changing the zoom level of the first currently displayed representation, the electronic device receives a fourth gesture (e.g., 3350*i*) (e.g., swipe or dragging gesture directed to the adjustable control) directed to the control for changing the zoom level. In some embodiments, in response to receiving the fourth gesture directed to the control for changing the zoom level, the electronic device displays a second indication (e.g., 3328*a*1 in FIG. 33H) (e.g., an indication that a particular zoom level is selected) of a fifth zoom level on the control for changing the zoom level and displays, at the fifth zoom level, a fourth representation (e.g., 630) of the field-of-view of the one or more cameras. In some embodiments, the first indication ceases to be displayed. In some embodiments, the first indication moves from the position of the current zoom level of the currently displayed representation to the fifth zoom level. In some embodiments, the fourth representation replaces display of a previously displayed representation.

In some embodiments, the first indication (e.g., 3328*a*1) of the zoom level of the first currently displayed representation is displayed at a position (e.g., center position) that corresponds to a selected zoom level on the control for changing the zoom level of the first currently displayed representation. In some embodiments, when a gesture directed to the control for changing the zoom level is received, the new zoom level is displayed at the position that corresponds to the selected zoom level and the zoom level of the currently (e.g., previously) selected zoom level is displayed at another position on the control for changing the zoom level of the currently displayed representation. Updating the control for changing the zoom level of the currently displayed representation to the zoom level of the currently displayed representation, where the zoom level is displayed at a predetermined position on the zoom control, allows a user quickly determine the zoom level of the currently displayed representation and provides visual feedback to the user indicating the current zoom level of the currently displayed representation. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the control (e.g., 3328) for changing the zoom level of the first currently displayed representation is a rotatable user interface element (e.g., a virtual rotatable wheel or dial).

In some embodiments, the electronic device displays the control (e.g., 3228) (e.g., a scroll wheel, a slider) for changing the zoom level of the first currently displayed representation includes replacing (e.g., or ceasing to) display of the plurality of zoom affordances (e.g., 2622) with the display of the control for changing the zoom level of the first currently displayed representation. Replacing the zoom level affordances with the control for changing the zoom affordances allows the user more control of the device by helping the user avoid unintentionally executing the operation and simultaneously allowing the user to recognize that the zoom affordances cannot be used and provides an expanded control (e.g., able to change to more zoom levels than the zoom affordances) without cluttering the UI with additional zoom affordances. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the third gesture (e.g., 3350*h*) includes movement (e.g., is detected in) in a first direction. In some embodiments, the fourth gesture (e.g., 3350*i*) includes movement in (e.g., is detected in) a second direction that is different from (e.g., the second direction is relatively perpendicular to, not opposite, and/or not parallel to the first direction) the first direction.

In some embodiments, after receiving the fourth gesture (e.g., 3350*i*) directed to the control for changing the zoom level, the electronic device detects lift off of the fourth gesture. In some embodiments, after detecting lift off of the fourth gesture and in accordance with a determination that no gesture is directed to the control for changing the zoom level within a predetermined timeframe, the electronic device ceases to display the control for changing the zoom level. In some embodiments, in accordance with a determination that no gesture is directed to the control for changing the zoom level within a predetermined timeframe, the electronic device forgoes or ceases to display the control for changing the zoom level. Replacing the control for changing the zoom affordances with the zoom level affordances allows the user more control of the device by helping the user avoid unintentionally executing the operation and simultaneously allowing the user to recognize that the zoom affordances can be used and provides additional display of the representation without cluttering the UI with additional zoom affordances. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of displaying the control for changing the zoom level of the first currently displayed representation, the electronic device concurrently displays a plurality of visual indicators (e.g., 3228*a-c* in FIG. 3L) (e.g., the first visual indicator of the plurality of indicators is displayed at a first position on the adjustable control, the second visual indicator of the plurality of visual indicators is displayed a second position on the adjustable control that is different than the first position on the adjustable control) on the adjustable control. In some embodiments, each of the plurality of zoom levels (e.g., 2622) corresponding to the zoom affordances (e.g., each zoom level (e.g., second zoom level of the first zoom affordance, the third zoom level of the second zoom affordance) that corresponds to each of the plurality of zoom affordances (e.g., the first zoom affordance and the second zoom affordance) is represented by a different corresponding visual indicator (e.g., the first zoom affordance is represented by a first indicator, the second zoom affordance is represented by the second indicator) of the plurality of visual indicators. In some embodiments, each of the plurality of visual indicators has a unique visual characteristic that is different from the other visual indicators (e.g., unique text (e.g., 0.5×, 1×, 2×), colors, sizes). Displaying the zoom levels of the zoom affordances on the control for adjusting the zoom level provides the user with feedback about the current zoom levels that are related to the zoom affordances and provides visual feedback to the user indicating that the user can change the zoom level of the currently displayed representations without using the control such that more of the representation will be displayed when the zoom level is changed with the zoom affordances. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the first gesture and in accordance with a determination that the first gesture is not directed to at least one of the plurality of zooming affordances (e.g., 3350*b*) and directed to a first portion of the representation, the electronic device configures the electronic device to focus at a location of the first gesture (and optionally set one or more other camera settings such as exposure or white balance based on properties of the field-of-view of the one or more cameras at a location of the first gesture).

In some embodiments, in response to receiving the first gesture and in accordance with a determination that the first gesture is not directed to at least one of the plurality of zooming affordances and directed to a second portion of the representation (e.g., 3350*a*), the electronic device forgoes configuring the electronic device to focus at a location of the first gesture (and optionally forgoing setting one or more other camera settings such as exposure or white balance based on properties of the field-of-view of the one or more cameras at a location of the first gesture). In some embodiments, the second portion is displayed in a second region. In some embodiments, the second region is visually distinguished (e.g., having a dimmed appearance) (e.g., having a semi-transparent overlay on the second portion of the field-of-view of the one or more cameras) from the first region. In some embodiments, the second region has a dimmed appearance when compared to the first region. In some embodiments, the second region is positioned above and/or below the first region in the camera user interface.

In some embodiments, the second representation of at least the portion of the field-of-view of the one or more cameras is a representation of at least a portion of the field-of-view of a first camera (e.g., 3180*b* in FIG. 31) (e.g., a first type of camera (e.g., cameras with different lens of different widths (e.g., ultra wide-angle, wide-angle, telephoto camera)) of the one or more cameras. In some embodiments, the third representation of at least the portion of the field-of-view of the one or more cameras is a representation of at least a portion of the field-of-view of a second camera (e.g., 3180*c* in FIG. 31) (e.g., a second type of camera (e.g., a camera with different lens of different widths (e.g., ultra wide-angle, wide-angle, telephoto camera)) of the one or more cameras. In some embodiments, the first camera is different from the second camera (e.g., the first type of camera is different from the second type of camera; the lens of the first camera captures (e.g., or can capture (e.g., configured to capture) at least one image of a different width than the lens of the second camera).

In some embodiments, as a part of displaying, at the second zoom level, the second representation of at least the portion of the field-of-view of the one or more cameras, the electronic device: in accordance with a determination that the second zoom level is a sixth zoom level (e.g., 0.5× zoom level) (and/or in accordance with a determination that the portion of field-of-view of the one or more cameras is a portion of a field-of-view of a first type of camera (e.g., a camera with a wider lens (e.g., ultra wide-angle lens) than the second type of camera)), displays a portion (e.g., region 604) of the second representation with a first visual appearance (e.g., semi-transparent, lower opacity than the second visual appearance); and in accordance with a determination that the second zoom level is a seventh zoom level that is different from the sixth zoom level (and/or in accordance with a determination that the portion of field-of-view of the one or more cameras is a portion of a field-of-view of a second type of camera (e.g., a camera with a wider lens (e.g., ultra wide-angle lens) than the second type of camera) (e.g., a camera with a narrower lens (e.g., telephoto) than the first type of camera) that is different from the first type of camera), displays a portion (e.g., regions 602 and 606) of the second representation with a second visual appearance (e.g., gray-out, blacked-out, higher opacity than the first visual appearance) that is different from the first visual appearance. In some embodiments, the electronic device displays, at the second zoom level, the second representation of at least the portion of the field-of-view of the one or more cameras includes displaying the second representation based on one or more of the methods/techniques as discussed above at FIGS. 29A-29P and method 3000 discussed in FIGS. 30A-30C).

In some embodiments, the plurality of zoom affordances includes a third zoom affordance (e.g., an affordance that corresponds to a particular zoom level (e.g., ninth zoom level)). In some embodiments, the first, second, and third zoom affordances correspond to different zoom levels (e.g., selection of the first, second, and third zoom affordances cause different representations to be displayed, where each representation has a different zoom level). In some embodiments, the electronic device receives a request to change the zoom level of a second currently displayed representation. In some embodiments, the electronic device receives the request to change the zoom level of the currently displayed representation via detecting a pinching or de-pinching gesture and detects a selection of the adjustable zoom control. In some embodiments, in response to receiving the request (e.g., 3350*i*, 3350*p*, 3350*q*) to change the zoom level of the second currently displayed representation to an eighth zoom level: the electronic device: in accordance with a determination that the eighth zoom level is within a first range of zoom values (e.g., a range such as, for example, 0.5×-1× (e.g., below 1×)), replaces (e.g., at a position of the first zoom affordance) display of the first zoom affordance (e.g., 2622*b*) with display of a fourth zoom affordance (e.g., 2622*j*) that corresponds to the eighth zoom level; in accordance with a determination that the eighth zoom level is within a second range of zoom values (e.g., a second range of zoom values such as values that are above 1× and below 2×), replaces (e.g., at a position of the second zoom affordance) display of the second zoom affordance (e.g., 2622*c*) with display of the fourth zoom affordance (e.g., 2622*g*) that corresponds to the eighth zoom level; and in accordance with a determination that the eighth zoom level is within a third range of zoom values (e.g., above 2×), replaces (e.g., at the position of the third zoom affordance) display of the third zoom affordance (e.g., 2622*a*) with display of the fourth zoom affordance (e.g., 2622*d*) that corresponds to the eighth zoom level. In some embodiments, in accordance with a determination that the eighth zoom level is not within a first range of zoom values (a range such as, for example, e.g., 0.5×-1× (e.g., below as threshold value such as 1×)), the electronic device displays, at the position of a zoom affordance that is not the second or third zoom affordance, the first zoom affordance (or maintaining display of the first zoom affordance. In some embodiments, the second and third zoom affordances are maintained. In some embodiments, in accordance with a determination that the eighth zoom level is not within a second range of zoom values (e.g., 1×-2×), the electronic device displays, at the position of a zoom affordance that is not the first or third zoom affordance, the second zoom affordance (or maintaining display of the second zoom affordance). In some embodiments, the first and third zoom affordances are maintained. In some embodiments, in accordance with a determination that the eighth zoom level is not within a third range of zoom values (e.g., above or equal to 2×), the electronic device displays, at a position of a zoom affordance that is not the first or second zoom affordance, the first zoom affordance (or maintaining display of the first zoom affordance). In some embodiments, the first, second, third and fourth zoom affordances are visually different from each other (e.g., text is different (e.g., 0.5×, 1×, 1.7×, 2×). In some embodiments, the second or third zoom affordances are maintained. Applying replacing a zoom affordance with a zoom affordance only when prescribed conditions are met allows the user to quickly recognize the zoom level that corresponds to the cameras that the device is using to display the representation at the current zoom level, where each affordance corresponds to a different camera device 600 is currently using to capture media at the particular zoom level, and allows the user to quickly recognize the predetermined zoom levels that are not within range of the current zoom level of the currently displayed representation such that the user could easily switch to these zoom level if needed. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 3400 (e.g., FIGS. 34A-34B) are also applicable in an analogous manner to the methods described above. For example, methods 700, 900, 1100, 1300, 1500, 1700, 1900, 2100, 2300, 2500, 2700, 2800, 3000, 3200, 3600, and 3800 optionally include one or more of the characteristics of the various methods described above with reference to method 3400. For example, method 3200, optionally employs, changing the zoom level of a camera user interface in response to one or more inputs as described above in relation to method 3400. For brevity, these details are not repeated below.

FIGS. 35A-35I illustrate exemplary user interfaces for accessing media capture controls using an electronic device in accordance with some embodiments. The user interfaces in these figures are used to illustrate the processes described below, including the processes in FIGS. 36A-36B.

FIG. 35A illustrates electronic device 600 displaying a live preview 630 that extends from the top of the display to the bottom of the display. Live preview 630 is based on images detected by one or more camera sensors. In some embodiments, live preview 630 does not extend to the top and/or bottom of device 600. In some embodiments, device 600 captures images using a plurality of camera sensors and combines them to display live preview 630. In some embodiments, device 600 captures images using a single camera sensor to display live preview 630.

The camera user interface of FIG. 35A includes indicator region 602 and control region 606, which are overlaid on live preview 630 such that indicators and controls can be displayed concurrently with live preview 630. Camera display region 604 is substantially not overlaid with indicators or controls. In this example, live preview 630 includes a dog sitting on a person's shoulder in a surrounding environment.

As illustrated in FIG. 35A, indicator region 602 is overlaid onto live preview 630 and optionally includes a colored (e.g., gray; translucent) overlay. Indicator region 602 includes flash indicator 602*a* and modes-to-settings-switcher affordance 3502. Flash indicator 602*a* indicates whether the flash is in an automatic mode, on, off, or in another mode (e.g., red-eye reduction mode). As discussed below, modes-to-settings-switcher affordance 3502, when selected, causes device 600 to switch between displaying camera mode affordances 620 to particular camera setting affordances (e.g., 626) for the currently selected camera mode.

As illustrated in FIG. 35A, camera display region 604 includes live preview 630 and zoom affordances 2622, which include 0.5× zoom affordance 2622*a*, 1× zoom affordance 2622*b*, and 2× zoom affordance 2622*c*. In this example, 0.5× zoom affordance 2622*a* is selected, which indicates that live preview 630 is displayed at a 0.5× zoom level.

As illustrated in FIG. 35A, control region 606 is overlaid onto live preview 630 and optionally includes a colored (e.g., gray; translucent) overlay. Control region 606 includes camera mode affordances 620, a portion of media collection 624, shutter affordance 610, and camera switcher affordance 612. Camera mode affordances 620 indicates which camera mode is currently selected and enables the user to change the camera mode. In FIG. 35A, camera mode affordances 620*a*-620*d* and 620*f* are displayed, and 'Photo' camera mode is indicated as being the current mode in which the camera is operating by the bolding of the text and/or centering of photo camera mode affordance 620*c* in the middle of control region 606. When a camera mode is currently selected (or the electronic device is operating in the camera mode), the electronic device is configured to capture media (e.g., in response to detecting an input on shutter affordance 610) using the camera settings of that particular camera mode. At FIG. 35A, device 600 detects upward swipe gesture 3550*a* (e.g., a swipe up gesture that moves toward indicator region 602 and away from control region 606) at a location that corresponds to camera display region 604. Alternatively, at FIG. 35A, device 600 detects tap gesture 3550*b* at a location corresponding to modes-to-settings-switcher affordance 3502, which is located in indicator region 602.

As illustrated in FIG. 35B, in response to detecting upward swipe gesture 3550*a* or tap gesture 3550*b* (e.g., a tap gesture at a location that corresponds to modes-to-settings-switcher affordance 3502), device 600 shifts up camera display region 604, including shifting up zoom affordances 2622. Device 600 shifts up camera display region 604 while maintaining the size and aspect ratio of camera display region 604. Thereby, when device 600 shifts up camera display region 604, device 600 reduces the height of height of indicator region 602 and increases the height of control region 606. In addition to reducing the height of indicator region 602, device 600 shifts flash indicator 602*a* so that the center of flash indicator 602*a* is more aligned with the center of modes-to-settings-switcher affordance 3502. By doing this, device 600 maintains the display of indicators in indicator region 602 while switching between displaying camera mode affordances 620 and camera setting affordances 626. Moreover, device 600 updates modes-to-settings-switcher affordance 3502 from including an upward pointing arrow (e.g., an indication that the camera user interface can be shifted up or indication that camera setting affordances 626 can be displayed in response to an input on modes-to-settings-switcher affordance 3502) to displaying a downward pointing arrow (e.g., indication that the camera user interface can be shifted down or indication that camera mode affordances can be displayed in response to detecting an input on modes-to-settings-switcher affordance 3502).

In addition to increasing the height of control region 606, device 600 replaces camera mode affordances 620 with camera setting affordances 626 that include a first set of camera setting affordances. The first set of camera setting affordances includes, from left-to-right, flash mode control affordance 626*a*, a low-light mode operation control affordance 626*g*, an aspect ratio control affordance 626*c*, an animated image control affordance 626*b*, filter control affordance 626*e*, and timer control affordance 626*d*. Because the device is currently configured to capture media in the photo mode, the first set of camera setting affordances is shown. In some embodiments, when the device is currently configured to capture media in a camera mode that is not the photo mode, a second set of camera setting affordances is shown that is different from the first set of camera setting affordances.

As illustrated in FIG. 35B, in response to detecting upward swipe gesture 3550*a* or tap gesture 3550*b*, device 600 also shifts the field-of-view of the one or more cameras up (unlike the example described above in relation to FIGS. 8A-8B where the field-of-view of the one or more cameras as shown by live preview 630 is maintained and not shifted). Thereby, device 600 shifts some visual portions that was displayed in FIG. 35A off the display in FIG. 35B. For example, a portion of bow 3540 displayed in indicator region 602 of FIG. 35A is not displayed in indicator region 602 of FIG. 35B. Additionally, device 600 shifts some visual portions that was not displayed in FIG. 35A onto the display in FIG. 35B. For example, a portion of arm patch 3538 (e.g., heart) that was not displayed in control region 606 of FIG. 35A is displayed in control region 606 of FIG. 35B. At FIG. 35B, device 600 shifts some newly displayed visual portions onto the display and some previously displayed visual portions off the display because the device is configured to capture media using a camera with an ultra-wide-angle lens, which is evident by live preview 630 being displayed at a 0.5× zoom level (e.g., see discussion above in relation to FIGS. 31A-31B). In some embodiments, when the device is not configured to capture media using a camera with an ultra-wide-angle lens (e.g., device 600 is configured to capture media using a telephoto lens), device 600 does not shift some visual portions on the display and/or some visual portions off the display, such as when device 600 is configured to capture media at a 2× zoom (e.g., when live preview 630 is displayed at a 2× zoom level like in FIG. 35I).

Moreover, as illustrated in FIG. 35B, at a first point in time after detecting upward swipe gesture 3550*a*, device 600 detects completion of upward swipe gesture 3550*a* or tap gesture 3550*b*. In some embodiments, device 600 detects completion of upward swipe gesture 3550*a* before detecting lift off of upward swipe gesture 3550*a* (e.g., lift off of a touch contact of upward swipe gesture 3550*a* using a touch sensitive surface of device 600). In some embodiments, completion of upward swipe gesture 3550*a* may occur after a touch contact of upward swipe gesture 3550*a* has been detected to move a threshold distance from a first location corresponding to a location on camera display region 604 to a second location corresponding to a location on camera display region 604.

As illustrated in FIG. 35B, when device 600 detects completion of upward swipe gesture 3550*a* or tap gesture 3550*b*, device 600 provides a tactile output 3560*a* to indicate that device 600 is replacing (or has replaced) camera mode affordances 620 with the camera setting affordances for the selected camera mode. At FIG. 35B, device 600 detects lift off of upward swipe gesture 3550*a*.

As illustrated in FIG. 35C, after detecting lift off of upward swipe gesture 3550*a*, device 600 no longer provides a tactile output. At FIG. 35C, device 600 detects leftward swipe gesture 3550*c* (e.g., a swipe gesture that moves from the left to right across camera display region 604) at a location that corresponds to camera display region 604.

As illustrated in FIG. 35D, in response to detecting leftward swipe gesture 3550*c*, device 600 replaces the first set of camera setting affordances (e.g., camera setting affordances 626*a*, 626*g*, 626*c*, 626*e*, and 626*d*) with a second set of camera setting affordances that includes, from left-to-right, flash mode control affordance 626*a*, f-stop control affordance 626*f*, filter control affordance 626*e*, and timer control affordance 626*d*. As illustrated in FIG. 35D, when replacing the first set of camera setting affordances with the second set of camera setting affordances, device 600 displays an animation, where device 600 overlays camera display region 604 with a colored (e.g., gray; translucent) overlay, dims live preview 630 and/or the display, and/or blurs the display (including live preview 630). In addition, at FIG. 35D, device 600 may dim, blur, and/or shrink one or more camera setting affordances (e.g., camera setting affordances 626*g*, 626*c*, 626*b* shown in FIG. 35C) from the first set of camera setting affordances that are not in the second set of camera setting affordances. Device 600 displays (e.g., fade-in or grow) one or more affordances that are in the second set of camera setting affordances (e.g., f-stop control affordance 626*f*) that were not in the first set of camera setting affordances.

As illustrated in FIG. 35E, in response to detecting leftward swipe gesture 3550*c*, device 600 has moved the second set of camera setting affordances such that the second set of camera setting affordances are located relatively in the center of the display. Because the second set of camera setting affordances contain a lower number of affordances, flash mode control affordance 626*a* and timer control affordance 626*d* are displayed at positions closer to the center of the display than the positions at which they were each respectfully displayed, for example, in FIG. 35C. At FIG. 35E, in response to detecting leftward swipe gesture 3550*c*, device 600 is configured to capture media in a portrait camera mode and, accordingly, the second set of camera setting affordances correspond to the settings for capturing portrait media (or according to the portrait camera mode). In some embodiments, when device 600 is configured to capture media in another mode (e.g., a video mode), one or more additional affordances are displayed, such as a high-dynamic-range imaging camera setting affordance.

Turning back to FIG. 35A, photo camera mode affordance 620*c* is centered and selected, and portrait mode affordance 620*d* is unselected and displayed right of and adjacent to photo camera mode affordance 620*c*. Thereby, as described above in relation to swipe left gesture 850*g* in FIGS. 8E-8H, a leftward swipe gesture (e.g., similar to gesture 3550*c*) on device 600 in FIG. 35A would cause device 600 to display: portrait mode affordance 620*d* as being centered and selected; and photo camera mode affordance 620*c* as being unselected and displayed left of portrait mode affordance 620*d*. In addition, as described above in relation to swipe left gesture 850*g* in FIGS. 8E-8H, a leftward swipe gesture (e.g., similar to gesture 3550*c*) would cause device 600 to be configured in portrait camera mode. Therefore, device 600 switches the camera mode in which it is configured to capture media in response to a leftward or rightward swipe gesture, regardless of whether device 600 is currently displaying camera mode affordances 620 (e.g., FIGS. 8E-8H) or camera setting affordances 626 (e.g., 35C-35E). In addition, when device 600 switches which camera mode in which it is configured to capture media in response to a leftward or rightward swipe gesture, the type of affordances (e.g., camera mode affordances 620 or camera setting affordances 626) persists to be displayed on the display. In other words, if device 600 displays camera mode affordances 620 immediately before detecting a leftward or rightward swipe gesture, device 600 will not replace the camera mode affordances 620 with camera setting affordances 626 in response to a leftward or rightward swipe gesture, or vice-versa. Moreover, a left or right gesture of the same magnitude would configure the device to capture media in the same new mode (e.g., portrait mode) whether device 600 receives the left or right gesture when the camera mode affordances 620 are displayed with the current camera mode affordance selected (e.g., photo mode affordance 620*c*) or when camera setting affordances 626 that correspond to the selected mode (e.g., photo mode) are displayed (e.g., camera setting affordances 626*a*, 626*g*, 626*c*, 626*e*, and 626*d*).

As illustrated in FIG. 35E, in response to detecting leftward swipe gesture 3550*c*, device 600 displays a revised set of indicators in indicator region 602, an updated live preview 630, and updated control region 606. The revised set of indicators includes previously displayed flash indicator 602*a* and newly displayed f-stop indicator 602*e*. In addition, zoom affordance 2622*a*, which is currently selected, has shifted to the left while zoom affordances 2622*b* and 2622*c* ceases to be displayed in camera display region 604. In addition, device 600 displays lighting effect controls 628 (which, when activated, enables changing lighting effects) to the right of zoom affordance 2622*a* in the camera display region 604. Updated live preview 630 in FIG. 35E provides different visual effects as compared to live preview 630 in FIG. 35C. For example, updated live preview 630 in 35E provides a bokeh effect and/or lighting effects, whereas live preview 630 in FIG. 35C does not provide the bokeh effect and/or lighting effects. In some embodiments, the zoom of objects in live preview 630 change because of the change in camera mode (photo vs. portrait mode). In some embodiments, the zoom of objects in live preview 630 does not change despite the change in camera mode (photo vs. portrait mode). At FIG. 35E, device 600 detects downward swipe gesture 3550*d* (e.g., a swipe down gesture that moves away from indicator region 602 and towards control region 606) at a location that corresponds to camera display region 604. Alternatively, at FIG. 35E, device 600 detects tap gesture 3550*e* at a location corresponding to modes-to-settings-switcher affordance 3502, which is located in indicator region 602.

Figure 35F:
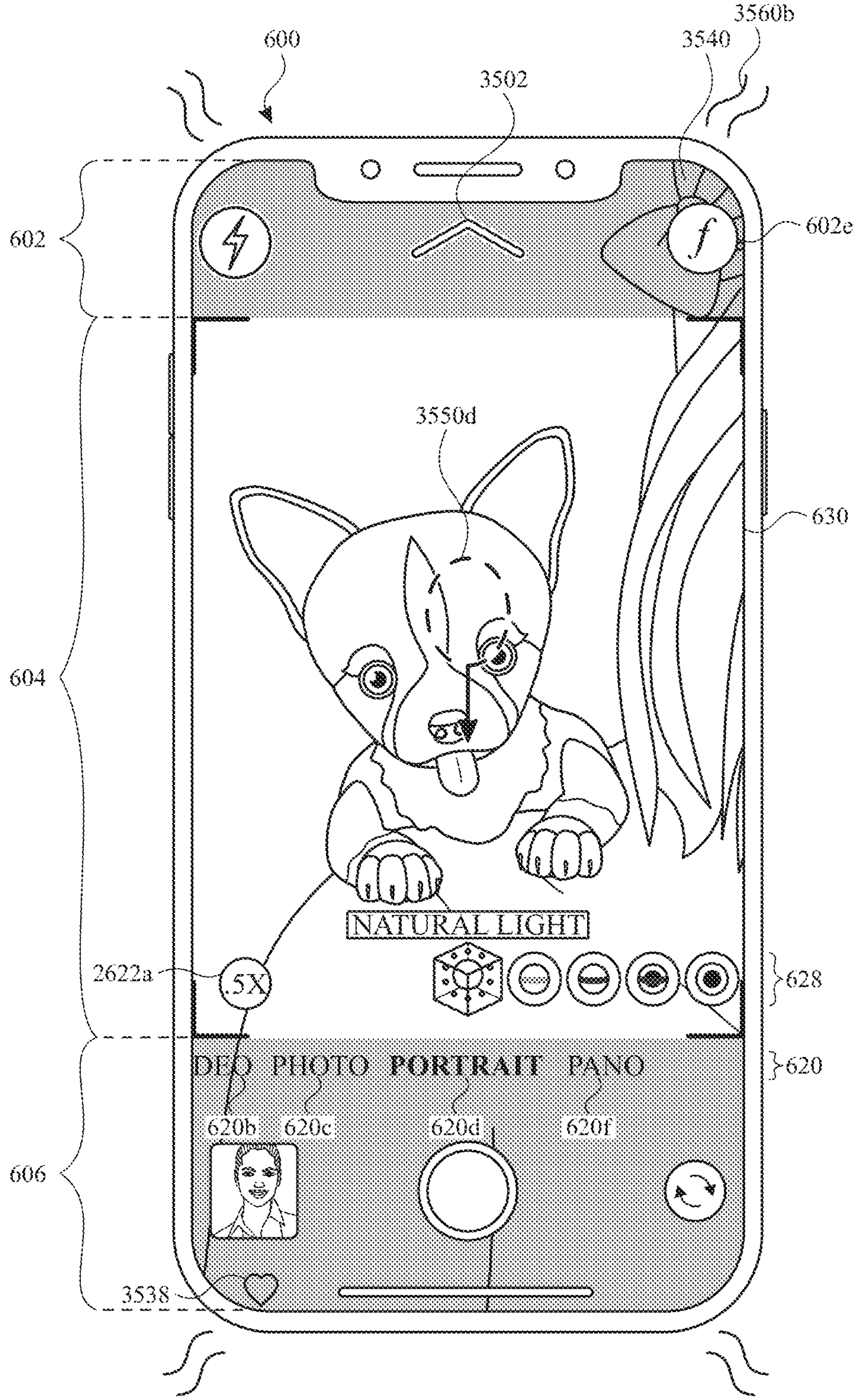

As illustrated in FIG. 35F, in response to detecting downward swipe gesture 3550*d* or tap gesture 3550*e*, device 600 shifts reverses the shifting up of the camera user interface shown in FIG. 35B. In particular, device 600 shifts down camera display region 604 while maintaining the size and aspect ratio of camera display region 604. Thereby, when device 600 shifts down camera display region 604, device 600 increases the height of indicator region 602 and decreases the height of control region 606 back to the original their original heights shown in FIG. 35A. In addition to increasing the height of indicator region 602, device 600 updates modes-to-settings-switcher affordance 3502 from including a downward pointing arrow (e.g., indication that the camera user interface can be shifted down or indication that camera mode affordances can be displayed in response to detecting an input on modes-to-settings-switcher affordance 3502) to displaying a upward pointing arrow (e.g., an indication that the camera user interface can be shifted up or indication that camera setting affordances 626 can be displayed in response to an input on modes-to-settings-switcher affordance 3502). In addition to decreasing the height of control region 606, device 600 replaces camera setting affordances 626 with camera mode affordances 620. Because device 600 is configured to capture media in the portrait camera mode, device 600 displays portrait camera mode affordance 620*d* shifted to the left, where portrait camera mode 620*d* is displayed as being selected and centered, and photo camera mode 620*c* (e.g., previously selected in FIG. 35A) is displayed to the right of portrait camera mode 620*d* and is unselected.

As illustrated in FIG. 35F, in response to detecting downward swipe gesture 3550*d* or tap gesture 3550*e*, device 600 also shifts the field-of-view of the one or more cameras down. Thereby, device 600 shifts some visual portions that was displayed in FIG. 35E off/on the display in FIG. 35B. For example, a portion of bow 3540 in indicator region 602 that was not displayed in FIG. 35E is displayed in FIG. 35F, and a portion of patch 3538 that was displayed in FIG. 35E is not displayed in FIG. 35F. Like, described above in relation to FIG. 35B, device 600 shifts some visual portions on the display and some visual portions off/on the display because the device is configured to capture media using a camera with an ultra-wide-angle lens.

Moreover, as illustrated in FIG. 35F, at a first point in time after detecting downward swipe gesture 3550*d*, device 600 detects completion of downward swipe gesture 3550*d* or tap gesture 3550*e*. In some embodiments, device 600 detects completion of downward swipe gesture 3550*d* before detecting lift off of downward swipe gesture 3550*d* (e.g., lift off of a touch contact of downward swipe gesture 3550*d* using a touch sensitive surface of device 600). In some embodiments, completion of downward swipe gesture 3550*d* may occur after a touch contact of downward swipe gesture 3550*d* has been detected to move a threshold distance from a first location corresponding to a location on camera display region 604 to a second location corresponding to a location on camera display region 604.

As illustrated in FIG. 35F, when device 600 detects completion of downward swipe gesture 3550*d* or tap gesture 3550*e*, device 600 provides tactile output 3560*b* to indicate that device 600 is replacing (or has replaced) camera setting affordances 626 with camera mode affordances 620. At FIG. 35F, device 600 detects lift off of downward swipe gesture 3550*d*.

Figure 35G:
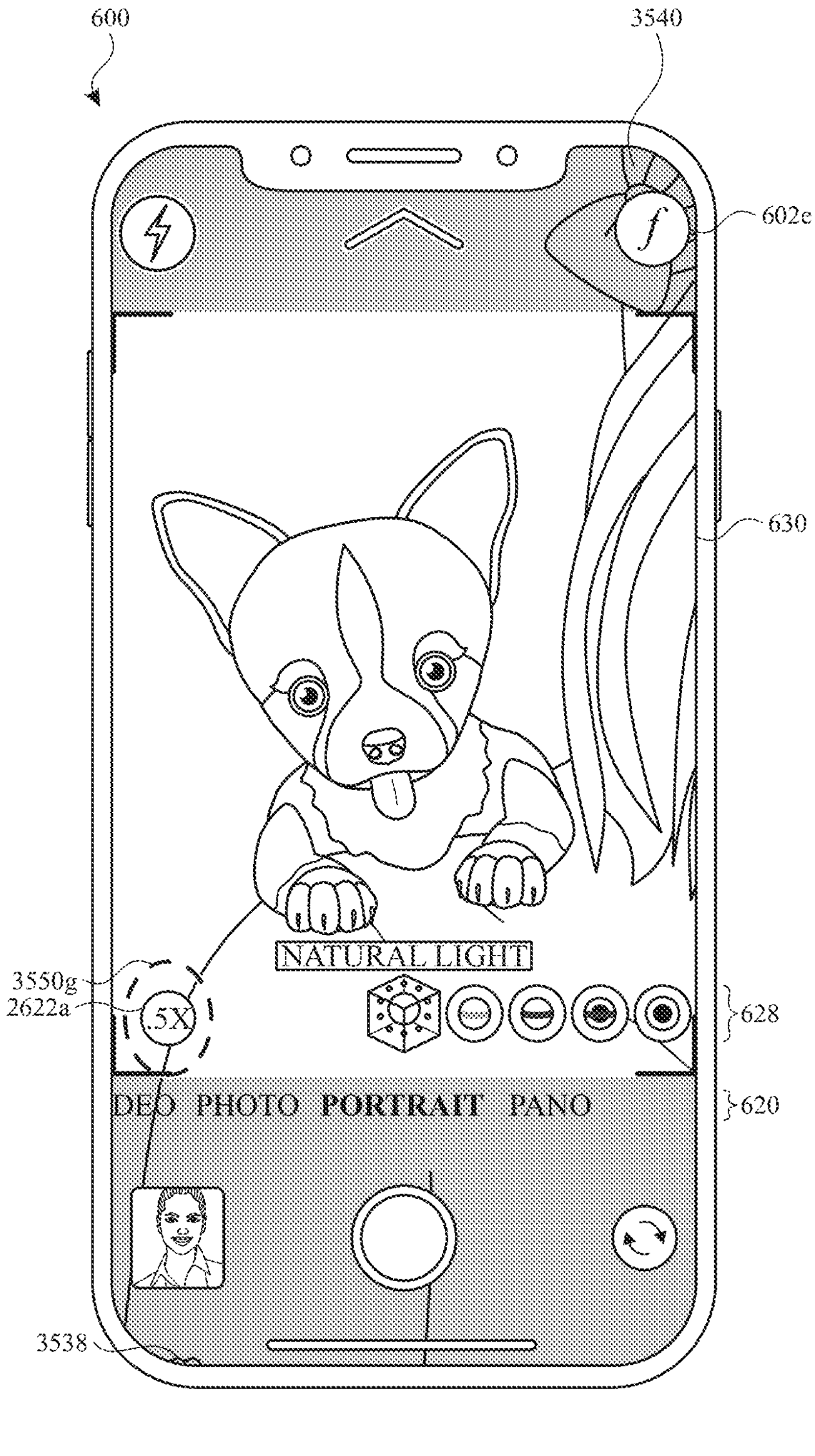

As illustrated in FIG. 35G, after detecting lift off of downward swipe gesture 3550*d*, device 600 no longer provides a tactile output. At FIG. 35G, device 600 detects tap gesture 3550*g* at a location that corresponds to 0.5× zoom affordance 2622*a*.

Figure 35H:
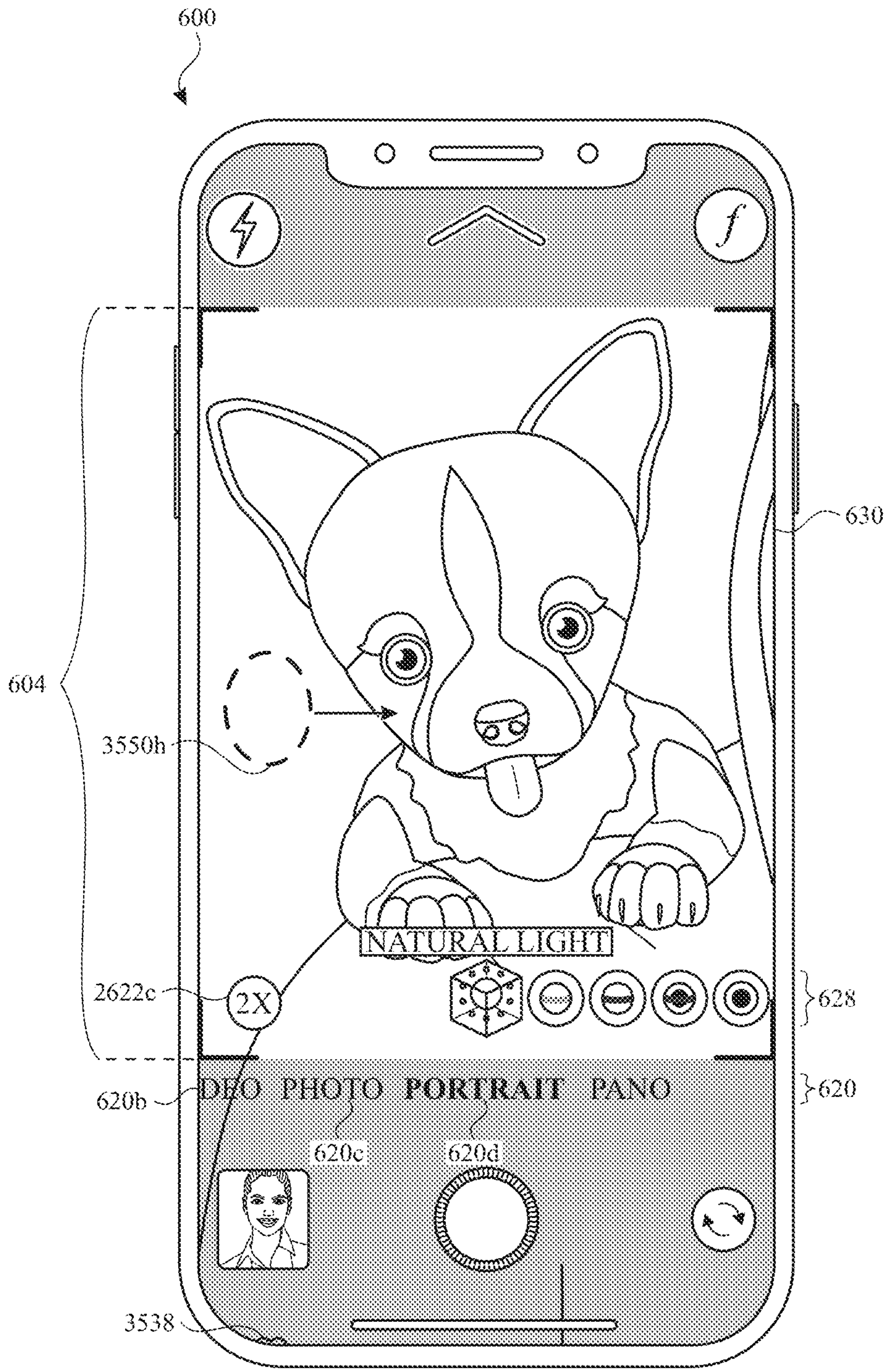

As illustrated in FIG. 35H, in response to detecting tap gesture 3550*g*, device 600 updates a zoom of live preview 630 (e.g., by switching camera sensors from a first camera sensor to a second camera sensor with a different field-of-view) to a 2× zoom level and updates zoom affordances 2622 to indicate the current zoom of 2×. Device 600 responds to tap gesture 3550*g* using similar techniques to those described in relation to gestures 850*o*, 850*p*, and 850*q* of FIGS. 8N-8P. At FIG. 35H, device 600 detects rightward swipe gesture 3550*h* (e.g., a swipe gesture that moves from the left to right across camera display region 604) at a location that corresponds to camera display region 604.

Figure 35I:
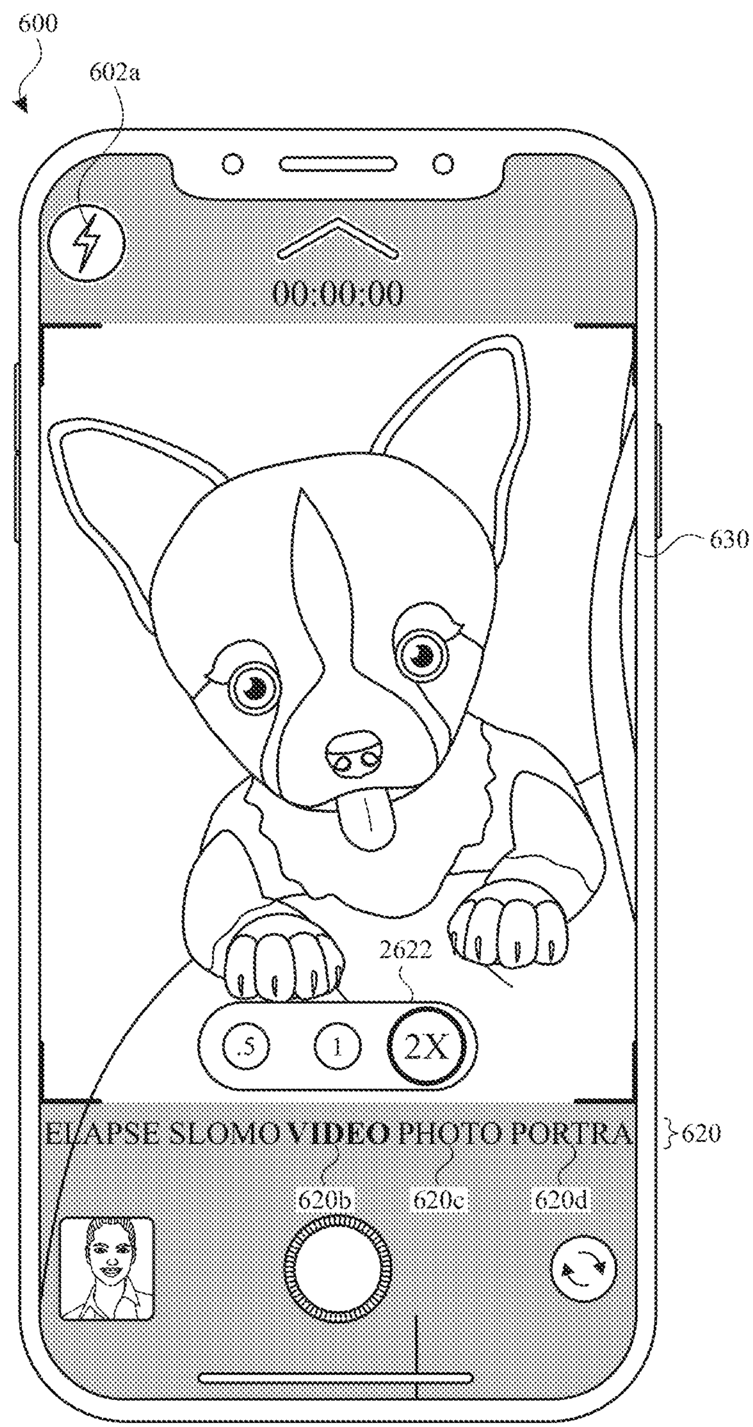

As illustrated in FIG. 35I, in response to detecting rightward swipe gesture 3550*h*, device 600 shifts camera mode affordances 620 to the right based on the magnitude of rightward swipe gesture 3550*h*. Here, device 600 detects that rightward swipe gesture 3550*h* has enough magnitude to shift camera mode affordances 620 to the right such that video mode affordance 620*b* is selected and centered while photo mode affordance 620*c* remains unselected and to the right of video mode affordance 620*b*. Thereby, photo mode affordance 620*c* is skipped from being selected because of the magnitude of rightward swipe gesture 3550*h*. As such, device 600 is configured to capture video media (or according to a video mode), and because the device is configured to capture video media instead of portrait media, device 600 ceases to display lighting effect controls 628. In addition, in response to detecting rightward swipe gesture 3550*h*, device 600 re-displays zoom affordances 2622 (e.g., affordances 2622*a*, 2622*b*, and 2622*c*), where 0.5× zoom affordance 2622*a* is selected because live preview 630 is displayed at the 0.5× zoom level.

FIGS. 36A-36B are a flow diagram illustrating a method for editing captured media using an electronic device in accordance with some embodiments. Method 3600 is performed at a device (e.g., 100, 300, 500, 600) with a display device (e.g., a touch-sensitive display). Some operations in method 3600 are, optionally, combined, the orders of some operations are, optionally, changed, and some operations are, optionally, omitted.

As described below, method 3600 provides an intuitive way for accessing media capture controls using an electronic device. The method reduces the cognitive burden on a user for accessing media controls, thereby creating a more efficient human-machine interface. For battery-operated computing devices, enabling a user to access media controls faster and more efficiently conserves power and increases the time between battery charges.

An electronic device (e.g., 600) includes a display device and one or more cameras (e.g., one or more cameras (e.g., dual cameras, triple camera, quad cameras, etc.) on the same side or different sides of the electronic device (e.g., a front camera, a back camera))). The electronic device displays (3602), via the display device, a camera user interface. The camera user interface includes (e.g., displaying concurrently) a camera display region (e.g., 602). The camera display region includes a representation of a field-of-view of the one or more cameras and a camera control region (e.g., 606) The camera user interface also includes a camera control region that includes a first plurality of camera mode affordances (e.g., 620) indicating different modes of operation of the one or more cameras (e.g., a selectable user interface object) (e.g., affordances for selecting different camera modes (e.g., slow motion, video, photo, portrait, square, panoramic, etc.) at a first location (e.g., a location above an image capture affordance (e.g., a shutter affordance that, when activated, causes the electronic device to capture an image of the content displayed in the camera display region)). In some embodiments, a plurality of the camera modes (e.g., two or more of video, photo, portrait, slow-motion, panoramic modes) have a corresponding plurality of settings (e.g., for a portrait camera mode: a studio lighting setting, a contour lighting setting, a stage lighting setting) with multiple values (e.g., levels of light for each setting) of the mode (e.g., portrait mode) that a camera (e.g., a camera sensor) is operating in to capture media (including post-processing performed automatically after capture). In this way, for example, camera modes are different from modes which do not affect how the camera operates when capturing media or do not include a plurality of settings (e.g., a flash mode having one setting with multiple values (e.g., inactive, active, auto). In some embodiments, camera modes allow user to capture different types of media (e.g., photos or video) and the settings for each mode can be optimized to capture a particular type of media corresponding to a particular mode (e.g., via post processing) that has specific properties (e.g., shape (e.g., square, rectangle), speed (e.g., slow motion, time elapse), audio, video). For example, when the electronic device is configured to operate in a still photo mode, the one or more cameras of the electronic device, when activated, capture media of a first type (e.g., rectangular photos) with particular settings (e.g., flash setting, one or more filter settings); when the electronic device is configured to operate in a square mode, the one or more cameras of the electronic device, when activated, capture media of a second type (e.g., square photos) with particular settings (e.g., flash setting and one or more filters); when the electronic device is configured to operate in a slow motion mode, the one or more cameras of the electronic device, when activated, captures media that media of a third type (e.g., slow motion videos) with particular settings (e.g., flash setting, frames per second capture speed); when the electronic device is configured to operate in a portrait mode, the one or more cameras of the electronic device captures media of a fifth type (e.g., portrait photos (e.g., photos with blurred backgrounds)) with particular settings (e.g., amount of a particular type of light (e.g., stage light, studio light, contour light), f-stop, blur); when the electronic device is configured to operate in a panoramic mode, the one or more cameras of the electronic device captures media of a fourth type (e.g., panoramic photos (e.g., wide photos) with particular settings (e.g., zoom, amount of field to view to capture with movement). In some embodiments, when switching between modes, the display of the representation of the field-of-view changes to correspond to the type of media that will be captured by the mode (e.g., the representation is rectangular mode while the electronic device is operating in a still photo mode and the representation is square while the electronic device is operating in a square mode). In some embodiments, while displaying the first plurality of camera mode affordances, the electronic device is configured to capture media in the first mode.

While displaying the first plurality of camera mode affordances (e.g., 620 in FIG. 35A) indicating different modes of operation of the one or more cameras, the electronic device detects (3604) a first gesture (e.g., 3350*a* and/or 3350*b*) (e.g., a touch gesture (e.g., an upward swipe or downward), a tap gesture on an affordance (e.g., 3502)) directed toward (e.g., on or at a location corresponding to) the camera user interface.

In response (3606) to detecting the first gesture directed toward the camera user interface, the electronic device displays (3608) a first set of camera setting (e.g., settings to control a camera operation) affordances (e.g., 626 in FIG. 35B) (e.g., one or more selectable user interface objects) (e.g., affordances for selecting or changing a camera setting (e.g., flash, timer, filter effects, f-stop, aspect ratio, live photo, etc.) for a selected camera mode) at the first location and ceases (3610) to display the plurality of camera mode affordances (e.g., a selectable user interface object) indicating different modes of operation of the camera at the first location. In some embodiments, the first set of camera setting affordances are settings for adjusting image capture (e.g., controls for adjusting an operation of image capture) for a first camera mode (e.g., 620*c*) (e.g., replacing the camera mode affordances with the camera setting affordances) (e.g., the first set of camera setting affordances includes a first affordance that, when selected, causes the electronic device to adjust a first image capture setting (e.g., property) of the first camera mode). Displaying camera setting affordances that correspond to a selected camera affordance for capturing media in a camera mode in response to a gesture provides the user with feedback about the camera settings associated with the camera mode and provides the user more control of the device by helping the user easily configure the camera mode based on the camera settings when one or more operations are performed to select the camera setting affordances. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

While displaying the first set of camera setting affordances (e.g., 626 in FIG. 35C) at the first location and while the electronic device is configured to capture media in the first camera mode (e.g., one or more images, videos) (e.g., adjusting a setting so that one or more cameras of the electronic device, when activated (e.g., via initiation of media capture (e.g., a tap on a shutter affordance)), cause the electronic device to capture the media in a second camera mode)), the electronic device receives (3612) a second gesture (e.g., 3550*c*) (e.g., a leftward swipe, a rightward swipe, and/or a swipe in a direction that is relatively perpendicular to the first gesture) directed toward (e.g., on or at a location corresponding to) the camera user interface. In some embodiments, the second gesture is in a direction that is different (e.g., perpendicular or not parallel) to the first gesture.)

In response (3614) to receiving the second gesture directed toward the camera user interface, the electronic device configures (3616) the electronic device to capture media (e.g., one or more images, videos) in a second camera mode (e.g., 620*c*) that is different from the first camera mode (e.g., adjusting a setting so that one or more cameras of the electronic device, when activated (e.g., via initiation of media capture (e.g., a tap on a shutter affordance)), cause the electronic device to capture the media in the second camera mode)) (e.g., first camera mode and second camera mode are adjacent to each other) (e.g., the second set of camera setting affordances includes a second affordance that, when selected, causes the electronic device to adjust a first image capture setting (e.g., property) of the second camera mode) and displays (3618) a second set of camera setting affordances (e.g., 626 in FIG. 35E) (e.g., one or more selectable user interface objects) (e.g., affordances for selecting or changing a camera setting (e.g., flash, timer, filter effects, f-stop, aspect ratio, live photo, etc.) for a selected camera mode) at the first location without displaying the plurality of camera mode affordances indicating different modes of operation of the one or more cameras (e.g., a selectable user interface object) (e.g., affordances for selecting different camera modes (e.g., slow motion, video, photo, portrait, square, panoramic, etc.) at the first location. Updating the display camera setting affordances that correspond to a selected camera affordance with display of camera setting affordances that correspond to a different mode and configuring the electronic device to operate in the different mode reduces the number of operations that a user has to configure the media to operate in the different mode and to set the camera settings that corresponds to the different mode and provides the user more control of the device by helping the user easily configure the camera mode based on the camera settings when one or more operations are performed to select the camera setting affordances. Reducing the number of inputs required to perform operations enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second set of camera setting affordances (3620) (e.g., 626 in FIG. 35E) are settings for adjusting image capture (e.g., controls for adjusting an operation of image capture) for the second camera mode (e.g., the second set of camera setting affordances includes a second affordance that, when selected, causes the electronic device to adjust a second image capture setting (e.g., property) of the second camera mode).

In some embodiments, the second set of camera setting affordances (e.g., 626 in FIG. 35E) are different from the first set of camera setting affordances (e.g., 626 in FIG. 35B). In some embodiments, the first set of camera setting affordances includes a camera setting affordance that is in the second set of camera setting affordances. In some embodiments, the first set of camera setting affordances includes a camera setting affordance that is not in the second set of camera setting affordances. In some embodiments, the first set of camera setting affordances and the second set of camera setting affordances have a different number of camera setting affordances. In some embodiments, the second set of camera setting affordances replaces the first set of camera setting affordances. Updating the display camera setting affordances that correspond to a selected camera affordance with display of camera setting affordances that correspond to a different mode provides the user more control of the device by helping the user easily configure the camera mode based on the camera settings when one or more operations are performed to select the camera setting affordances. Reducing the number of inputs required to perform operations enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Providing additional control of the device without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of camera setting affordances (e.g., 626 in FIG. 35B) (or second set of camera setting affordances) include one or more of a flash setting affordance (e.g., 626*a*) (e.g., a selectable user interface object) (e.g., a flash setting affordance that, when selected, causes the electronic device to: change (e.g., or display options that cause the electronic device to change) into or out of a state in which the electronic device captures media using a flash operation in response to a request to capture media, toggle (e.g., changes) display of the state (inactive, active, auto, one or more characters and/or images associated with the camera setting affordance) of the displayed flash setting affordance), and/or display a user interface for setting the flash operation), an image capture setting affordance (e.g., 626*b*) (e.g., a selectable user interface object) (e.g., an image capture setting affordance (e.g., an animated image capture setting affordance) that, when selected, causes the electronic device to: change (e.g., or display options that cause the electronic device to change) into or out a state in which the electronic device captures an animated image (e.g., moving image (e.g., still image(s) and/or video)) in response to a request to capture media, toggle (e.g., changes) display of the state (inactive, active, auto, one or more characters and/or images associated with the camera setting affordance) of the displayed image capture setting affordance, and/or display a user interface for setting an animated image capture operation), an aspect ratio camera setting affordance (e.g., 626*c*) (e.g., a selectable user interface object) (e.g., an aspect ratio setting affordance that, when selected, causes the electronic device to: change (e.g., or display options that cause the electronic device to change) into or out a state in which the electronic device captures, using a particular aspect ratio, media in response to a request to capture media, toggle (e.g., changes) display of the state (inactive, active, auto, one or more characters and/or images associated with the camera setting affordance) of the displayed aspect ratio camera setting affordance, and/or display a user interface for use of a certain aspect ratio when capturing media), a filter setting camera setting affordance (e.g., 626*e*) (e.g., a selectable user interface object) (e.g., a filter setting affordance that, when selected, causes the electronic device to: change (e.g., or display options that cause the electronic device to change) into or out a state in which the electronic device uses a particular filter to capture in response to a request to capture media, toggle (e.g., changes) display of the state (inactive, active, auto, one or more characters and/or images associated with the camera setting affordance) of the displayed filter camera setting affordance, and/or display a user interface for setting the use of a certain filter when capturing media), a high-dynamic-range imaging camera setting affordance (e.g., a selectable user interface object) (e.g., a high-dynamic-range setting affordance that, when selected, causes the electronic device to: change (e.g., or display options that cause the electronic device to change) into or out a state in which the electronic device captures high-dynamic-range images in response to a request to capture media, toggles (e.g., changes) display of the state (inactive, active, auto, one or more characters and/or images associated with the camera setting affordance) of the displayed high-dynamic-range setting affordance, and/or displays a user interface for using high-dynamic-range imaging when capturing media), and a low-light camera setting affordance (e.g., a selectable user interface object) (e.g., a low-light camera setting affordance that, when selected, causes the electronic device to: change (e.g., or display options that cause the electronic device to change) into or out a state in which the electronic device captures media using a low-light mode operation in response to a request to capture media, toggle (e.g., changes) display of the state (inactive, active, auto, one or more characters and/or images associated with the camera setting affordance) of the displayed low-light capture camera mode affordance, and/or display a user interface for setting a low-light capture camera mode).

In some embodiments, the electronic device detects the first gesture (e.g., 3550*a*) (e.g., a dragging gesture) includes detecting a first contact (e.g., continuous contact) directed to toward the camera user interface. In some embodiments, while detecting the first gesture, the electronic device detects completion (e.g., 3550*a* in FIG. 35B) (e.g., dragging a first threshold movement or movement) of the first gesture before detecting lift off of the first contact. In some embodiments, in accordance with a determination that movement of gesture has a first threshold movement (e.g., traveled a first distance), the electronic device detects completion of the first gesture. In some embodiments, in response to detecting completion of the first gesture before detecting lift off of the first contact, the electronic device provides a tactile output (e.g., 3560*a*) (e.g., a haptic (e.g., a vibration) output generated with one or more tactile output generators).

In some embodiments, while displaying the camera user interface, the electronic device detects a third gesture (e.g., 3550*d*) (e.g., a leftward swipe, a rightward swipe, and/or a swipe in a direction that is the same or opposite of the second gesture) directed to the camera user interface. In some embodiments, in response to detecting the third gesture (e.g., 3550*c* or 3550*h*) directed to the camera user interface and in accordance with a determination that the second set of camera setting affordances (e.g., 626 in FIG. 35C) (or the first set of camera setting affordances) was displayed when the third gesture was detected, the electronic device configures the electronic device to capture media (e.g., one or more images, videos) in a third camera mode (e.g., adjusting a setting so that one or more cameras of the electronic device, when activated (e.g., via initiation of media capture (e.g., a tap on a shutter affordance)), cause the electronic device to capture the media in the second camera mode)) (e.g., first camera mode and second camera mode are adjacent to each other) (e.g., the second set of camera setting affordances includes a second affordance that, when selected, causes the electronic device to adjust of a first image capture setting (e.g., property) of the second camera mode) and displays, at the first location, a third set of camera setting affordances (e.g., 626 in FIG. 35E) (e.g., one or more selectable user interface objects) (e.g., affordances for selecting or changing a camera setting (e.g., flash, timer, filter effects, f-stop, aspect ratio, live photo, etc.) for a selected camera mode) without displaying the plurality of camera mode affordances indicating different modes of operation of the one or more cameras (e.g., a selectable user interface object) (e.g., affordances for selecting different camera modes (e.g., slow motion, video, photo, portrait, square, panoramic, etc.). In some embodiments, in response to receiving the third gesture directed to the camera user interface and in accordance with a determination that the first set of camera setting affordances or the second set of camera setting affordances is currently displayed, the electronic device ceases to display the first set of camera setting affordances or the second set of camera setting affordances. In some embodiments, in response to detecting the third gesture (e.g., 3550*c* or 3550*h*) directed to the camera user interface and in accordance with a determination that the second set of camera setting affordances (e.g., 626 in FIG. 35C) (or the first set of camera setting affordances) was displayed when the third gesture was detected, the electronic device configures the electronic device to capture media (e.g., one or more images, videos) in a third camera mode and in accordance with a determination that the first plurality of camera mode affordances (e.g., 620 in FIG. 35H) was displayed when the third gesture (e.g., 3550*h*) was detected, the electronic device displays, at the first location, a second plurality of camera mode affordances (e.g., FIG. 35I) indicating different camera modes of operation of the camera without displaying the second set of camera setting affordances (or the first set of camera setting affordances) and the third set of camera setting affordances and configures the electronic device to capture media in the first camera mode and the third camera mode. In some embodiments, in response to receiving the third gesture directed to the camera user interface and in accordance with a determination that the first plurality of camera mode affordance is currently displayed, the electronic device ceases to display the first plurality of camera mode affordance. In some embodiments, while displaying the second plurality of camera mode affordances, the electronic device is configured to capture media in the second mode. In some embodiments, while displaying a second plurality of camera mode affordances, the electronic is configured to capture media in a third mode. In some embodiments, the second plurality of camera affordances is different from the first plurality of camera mode affordances. In some embodiments, the second plurality of camera mode affordances includes one or more affordances that are not in the first plurality of camera mode affordances, or vice-versa. Maintaining camera mode affordances when camera mode affordances are displayed or maintaining camera setting affordances when camera setting affordances are displayed in response to a gesture provides a user visual feedback of the change in camera mode affordances or camera setting affordances in response to the input. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the electronic device displays, at the first location, the third set of camera setting affordances (e.g., 626 in FIG. 35E) includes displaying an animation (e.g., FIGS. 35C-35E) of the third set of camera setting affordances replacing the first set of camera setting affordances (e.g., 626 in FIG. 35C) (e.g., or the second set of camera setting affordances that is currently displayed). In some embodiments, no animation is shown if camera setting affordances are hidden when detecting the third gesture (e.g., swipe). In some embodiments, the animation includes one or more controls fading in or fading out. In some embodiments, the animation includes one or more controls moving closer together or further apart to make room for additional controls or fill up space previously occupied by controls that have disappeared.)

In some embodiments, the representation of the field-of-view of the one or more cameras is a first representation of a first portion of the field-of-view of the one or more cameras. In some embodiments, in response to receiving the second gesture directed toward the camera user interface and in accordance with a determination that the electronic device is configured to capture media via a first type of camera (e.g., an ultra wide-angle camera) (e.g., 3180*a*), the electronic device displays a second representation of a second portion (e.g., 3540 displayed in 630 in FIG. 35A) of the field-of-view of the one or more cameras. In some embodiments, the second portion of the field-of-view does not include some of the first portion (e.g., 3540 displayed in 630 in FIG. 35B) of the field-of-view of the one or more cameras (e.g., part of the portion of the field-of-view of the one or more cameras is shifted off of the display when displaying the second representations). Shifting content on/off of the display only when prescribed conditions are met allows the user to quickly recognize that the electronic device has switched between displaying camera mode and camera settings and allows a user to recognize that a previously displayed portion of the media will not be captured or a newly displayed portion of the media will be captured in response to a request to capture media while the electronic device displays a particular user interface. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the field-of-view of the one or more cameras is a third representation of a third portion of the field-of-view of the one or more cameras. In some embodiments, in response to receiving the second gesture directed toward the camera user interface and in accordance with a determination that the electronic device is configured to capture media using a second type of camera (e.g., an ultra wide-angle camera (e.g., same camera type of camera as the first type of camera)), the electronic device displays a fourth representation of a fourth portion of a field-of-view of the one or more cameras. In some embodiments, the fourth portion (e.g., 3538 displayed in 630 in FIG. 35A) of the field-of-view of the one or more cameras includes a portion (e.g., 3538 displayed in 630 in FIG. 35B) of a field-of-view of the one or more cameras that is not in the third portion of the field-of-view of the one or more cameras (e.g., part of the portion of the field-of-view of the one or more cameras is shifted on the display when displaying the second representations). Shifting content on/off of the display only when prescribed conditions are met allows the user to quickly recognize that the electronic device has switched between displaying camera mode and camera settings and allows a user to recognize that a previously displayed portion of the media will not be captured or a newly displayed portion of the media will be captured in response to a request to capture media while the electronic device displaying a particular user interface. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the representation of the field-of-view of the one or more cameras is a fifth representation of a fifth portion of the field-of-view of the one or more cameras. In some embodiments, the fifth representation is displayed at a second location on the display. In some embodiments, in response to receiving the second gesture directed toward the camera user interface and in accordance with a determination that the electronic device is configured to capture media using a third type of camera (e.g., wide-angle or telephoto camera (e.g., the third type of camera is different from the first type of camera and the second type of camera), the electronic device moves the fifth representation from the second location on the display to the third location on the display (e.g., no portion of the field-of-view of the one or more cameras appears to be shifted off of the display).

In some embodiments, the first camera mode is a portrait mode (e.g., 626*c* in FIG. 35G). In some embodiments, the representation (e.g., 630 in FIG. 35G) of a field-of-view of the one or more cameras is displayed at a first zoom level (e.g., 2622*a*) (e.g., 0.5×, 1×, 2×). In some embodiments, while displaying the first plurality of camera mode affordances (e.g., 620) (e.g., portrait mode), the electronic device: displays (e.g., concurrently displayed) an affordance (e.g., 628) (e.g., a selectable user interface object) for controlling a lighting effect operation and a zoom affordance (e.g., 2622*a*). While displaying the zoom affordance, the electronic device receives a fourth gesture (e.g., 3550*g*) directed to the zoom affordance (e.g., a tap input on the zoom affordance or mouse click or other activation input while a focus selector is directed to the zoom affordance). In some embodiments, in response to receiving the fourth gesture directed to the zoom affordance, the electronic device displays a representation (e.g., 630 in FIG. 35H) of the field-of-view of the one or more cameras at a second zoom level (e.g., 2622*c*) (e.g., 0.5×, 1×, 2×).

In some embodiments, the first plurality of camera mode affordances includes a first camera mode affordance (e.g., 620*c*) (e.g., a selectable user interface object) that, when selected, causes the electronic device to capture media in the first camera mode in response to a request to capture media and a second camera mode affordance (e.g., 620*d*) (e.g., a selectable user interface object) that, when selected, causes the electronic device to capture media in the second camera mode in response to a request to capture media. In some embodiments, while the first plurality of camera mode affordances is displayed, the first camera mode affordance is selected (e.g., in a particular position (e.g., center position) on the display, displayed as bolded, with a different font, color, text-size).

In some embodiments, the first camera mode affordance (e.g., 620*c*) is displayed adjacent to the second camera mode affordance (e.g., 620*d*) while displaying the first plurality of camera mode affordances. In some embodiments, the first camera mode affordance is displayed with an indication that the first camera mode is active (e.g., 620*c* in FIG. 35A) (e.g., displayed with a visual indication that the first camera mode is active with the first camera mode affordance being pressed, bolded, and/or in a different color than when first camera mode is inactive (e.g., black vs. greyed-out)) before detecting the first gesture toward the camera user interface and while displaying the first plurality of camera mode affordances. In some embodiments, the second camera mode affordance is displayed with an indication that the second camera mode is inactive (e.g., displayed with a visual indication that the second camera mode is inactive such as being depressed, not-bolded, and/or in a different color than when second camera mode is active (e.g., greyed-out vs. black)) before detecting the first gesture toward the camera user interface and while displaying the first plurality of camera mode affordance and/or while the electronic device is configured to operate in a first camera mode.

In some embodiments, while displaying the second set of camera setting affordances (e.g., 626 in FIG. 35E) at the first location, the electronic device detects a fifth gesture directed toward the camera interface. In some embodiments, in response to detecting the fifth gesture (e.g., 3550*e* and 3550*d*) directed toward the camera interface, the electronic device displays a third plurality of camera mode affordances (e.g., 620 in FIG. 35F) (e.g., a selectable user interface object) indicating different camera modes of operation of the camera. In some embodiments, the third plurality of camera mode affordances includes the second mode affordance (e.g., 620*d* in FIG. 35F). In some embodiments, the second camera mode affordance (e.g., bold 620*d* in FIG. 35F) is displayed with an indication that the second camera mode is active (e.g., displayed with a visual indication that the second camera mode is active such as being pressed, bolded, and/or in a different color than when second camera mode is inactive (e.g., black vs. grayed-out)). In some embodiments, the third plurality of camera mode affordances includes the first camera mode affordance. In some embodiments, the first camera mode affordance is displayed with an indication that the first camera mode is inactive (e.g., displayed with a visual indication that the first camera mode is inactive such as being depressed, not-bolded, and/or in a different color than when second camera mode is active (e.g., greyed-out vs. black)) while the third camera mode affordance is displayed with an indication that the third camera mode is active and/or while the electronic device is configured to operate in the second camera mode.

Note that details of the processes described above with respect to method 3600 (e.g., FIGS. 36A-36B) are also applicable in an analogous manner to the methods described above. For example, methods 700, 900, 1100, 1300, 1500, 1700, 1900, 2100, 2300, 2500, 2700, 2800, 3000, 3200, 3400, and 3800 optionally include one or more of the characteristics of the various methods described above with reference to method 3600. For example, method 3200, optionally employs, accessing various camera settings for a camera mode to capture media using various techniques as described above in relation to method 3600. For brevity, these details are not repeated below FIGS. 37A-37AA illustrate exemplary user interfaces for automatically adjusting captured media using an electronic device in accordance with some embodiments. The user interfaces in these figures are used to illustrate the processes described below, including the processes in FIGS. 38A-38C.

FIG. 37A illustrates exemplary scene 3780 to improve understanding of the embodiments discussed below in FIGS. 37C-37AA. Moving from left to right, scene 3780 includes left portion 3782 and right portion 3784. Left portion 3782 includes a person sitting on rectangular prism 2432. Right portion 3784 includes dog 3784*a* sitting on the shoulder of person 3784*b*. In addition, scene 3780 further includes horizon line 2438 that runs across the width of scene 3780.

Figure 37B:
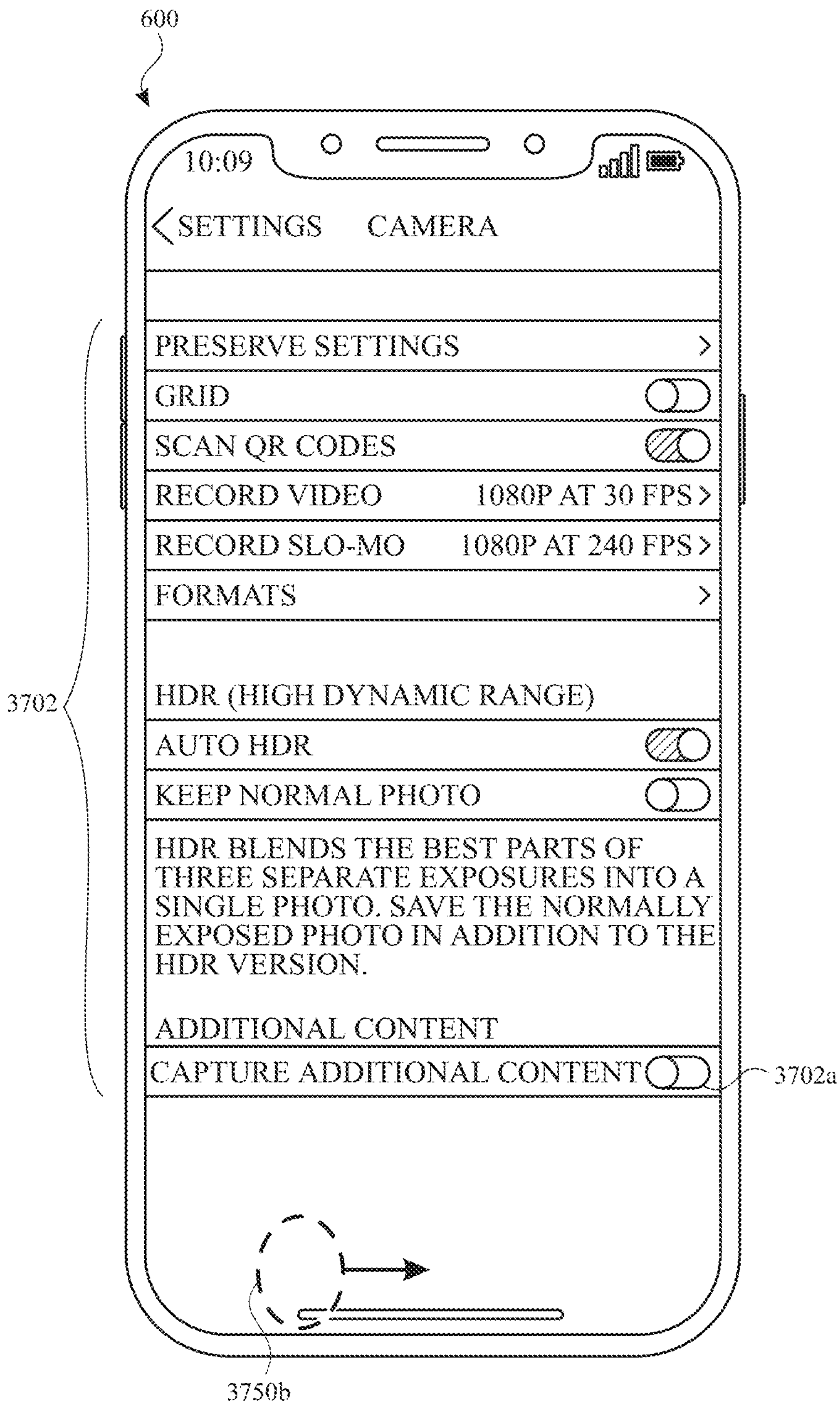

FIG. 37B illustrates electronic device 600 displaying a settings user interface to improve understanding of the embodiments discussed below in FIGS. 37C-37AA. The settings user interface includes setting affordances 3702. In particular, setting affordances 3702 include additional content setting affordance 3702*a*. In FIG. 37B, additional content setting affordance 3702*a* is displayed as not being selected (e.g., in an off state), which indicates that device 600 is not configured to capture additional content.

Figure 37C:
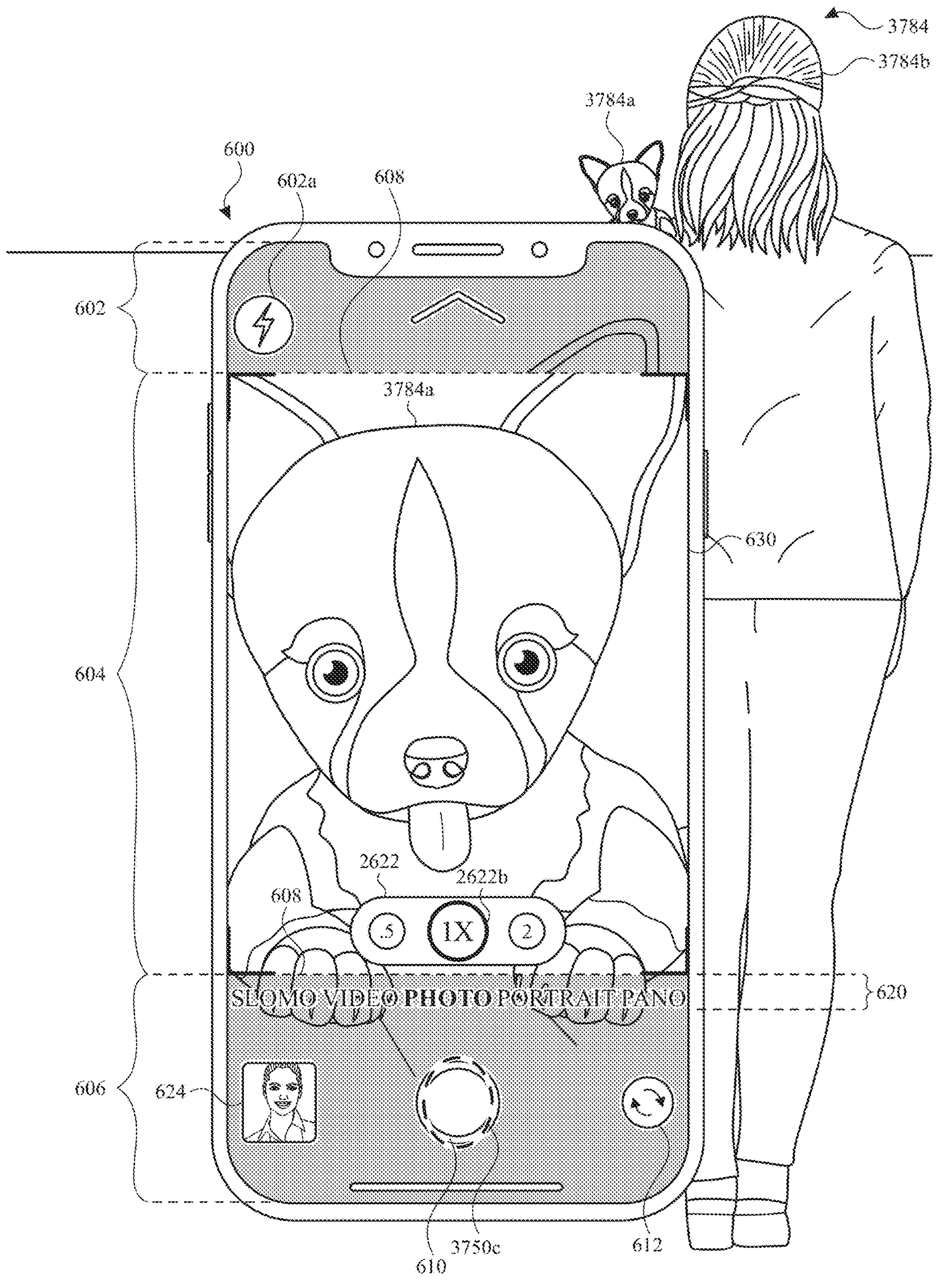

FIGS. 37C-37J illustrate exemplary user interfaces for capturing images for automatically adjusting captured media using an electronic device. FIGS. 37K-37Q illustrate exemplary user interfaces for automatically adjusting the images captured in one or more of FIGS. 37C-37J when device 600 is configured to adjust captured media automatically when media is displayed (e.g., as illustrated in FIGS. 37C and 37T). FIGS. 37R-37W illustrate exemplary user interfaces for automatically adjusting the images captured in one or more of FIGS. 37C-37J when device 600 is not configured to adjust captured media automatically when media is displayed (e.g., as illustrated in FIG. 37O). Moreover, FIGS. 37X-37AA illustrate exemplary user interfaces for adjusting other media (e.g., video media) using similar techniques as described in relation to FIGS. 37K-37W. At FIG. 37B, device 600 detects rightward swipe gesture 3750*b* at a location that corresponds to a bottom portion of settings user interface.

As illustrated in FIG. 37C, in response to detecting rightward swipe gesture 3750*b*, device 600 replaces the display of the settings user interface with a camera user interface. In FIG. 37C, device 600 is in a position to take a photo of right portion 3784. At FIG. 37C, device 600 is at location that is close to right portion 3784 such that dog 3784*a* and the shoulder of person 3784*b* is displayed on a camera user interface that includes live preview 630. Live preview 630 is based on images detected by one or more camera sensors. Live preview 630 is displayed at a 1× zoom level, which is evident by 1× zoom affordance 2622*b* being selected. Because live preview 630 is displayed at the 1× zoom level and device 600 is currently using cameras on the back side of device 600 to capture media, device 600 is capturing images of dog 3784*a* using a camera with a wide field-of-view (e.g., ultra wide-angle camera) and a camera with a narrow field-of-view (e.g., wide-angle camera), as discussed above in relation to FIG. 31C.

As illustrated in FIG. 37C, the camera user interface includes indicator region 602 and control region 606, which are overlaid on live preview 630 such that indicators and controls can be displayed concurrently with live preview 630. To display the portion of live preview 630 in indicator region 602 and control region 606, device 600 uses the portion of the environment (e.g., top or ear and bottom of paws of dog 3784*a*) that is in the field-of-view of the camera with the wide field-of-view (WFOV). In addition, the camera user interface includes camera display region 604. Device 600 displays the portion of live preview 630 in camera display region 604 by using the portion of the environment (e.g., the body of dog 3784*a*) that is in the field-of-view of the camera with the narrow field-of-view (NFOV).

As illustrated in FIG. 37C, indicator region 602 includes a gray overlay and camera display region 604 does not include the gray overlay. At the transition of color between indicator region 602 and camera display region 604, visual boundary 608 is displayed between indicator region 602 and camera display region 604. Indicator region 602 also includes flash indicator 602*a*, which indicates whether the flash is in an automatic mode, on, off, or in another mode (e.g., red-eye reduction mode). In some embodiments, other indicators (e.g., indicators 602*b*-602*f* are also included in indicator region 602.

As illustrated in FIG. 37C, control region 606 also includes a gray overlay, and visual boundary 608 is displayed between control region 606 and camera display region 604 at the transition of color between these regions. In some embodiments, visual boundary 608 is displayed as a solid or dotted line between regions 602, 604, and 608. Control region 606 includes camera mode affordances 620, a portion of media collection 624, shutter affordance 610, and camera switcher affordance 612. Camera mode affordances 620 indicates which camera mode is currently selected (e.g., "Photo" mode as displayed in bold) and enables the user to change the camera mode.

As illustrated in FIG. 37C, device 600 includes visual tearing along visual boundary 608 (as discussed in FIGS. 29B-29I) between indicator region 602 and camera display region 604. Here, the top portion of the dog's (e.g., dog 3784*a*) ear displayed in indicator region 602 is shifted to the left of the rest of the dog's ear displayed in camera display region 604. In some embodiments, the portions of live preview 630 displayed in indicator region 602 and control region 606 are blacked out because device 600 is not configured to capture additional content (e.g., portions of live preview 630 displayed in regions 602 and 606) as discussed above in relation to FIG. 37B. At FIG. 37C, device 600 detects tap gesture 3750*c* at a location that corresponds to shutter affordance 610.

Figure 37D:
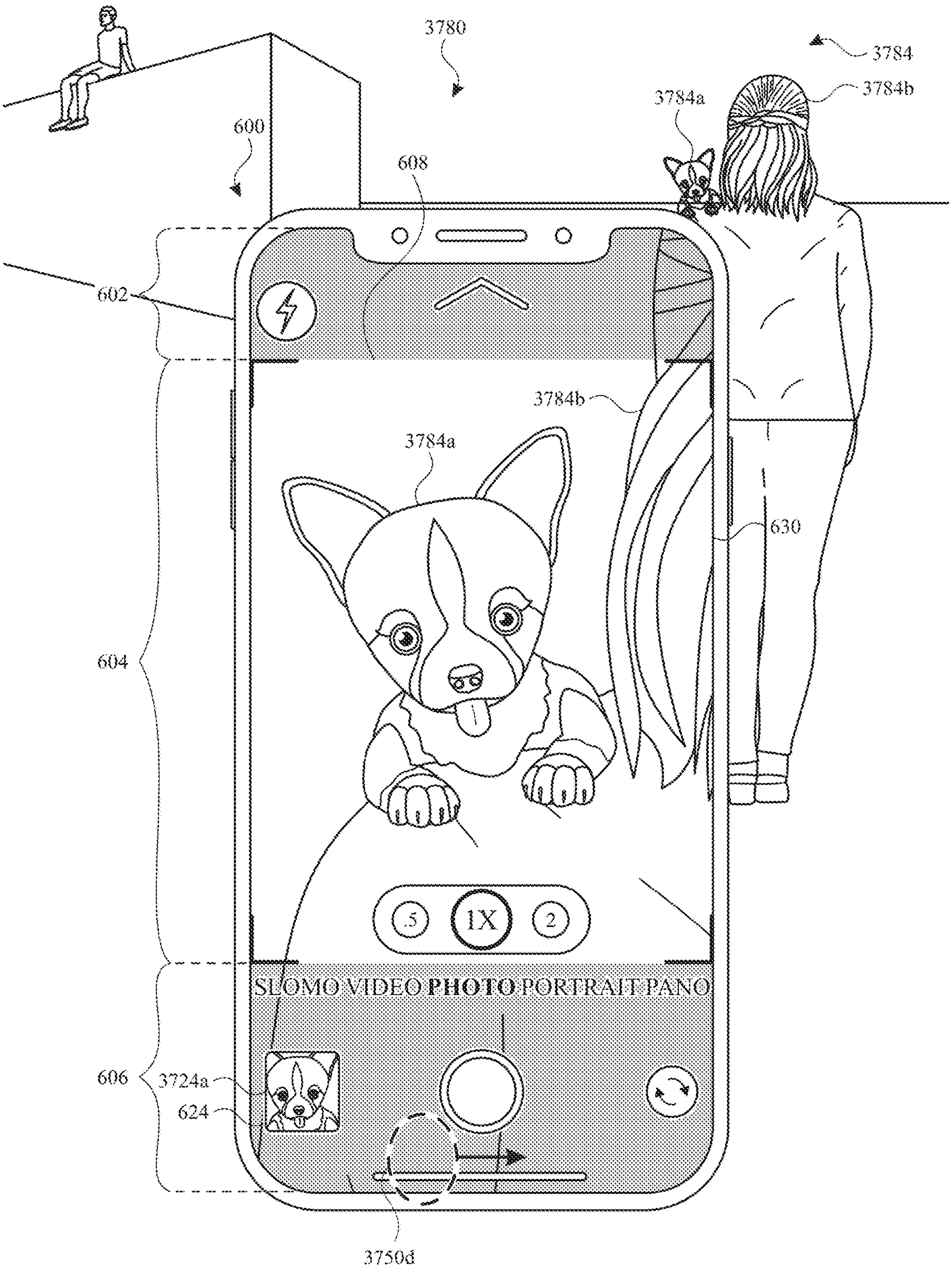

As illustrated in FIG. 37D, in response to detecting tap gesture 3750*c*, device 600 captures a media item (e.g., a photo) that corresponds to the portion of live preview 630 displayed in camera display region 604 because device 600 is not configured to capture additional content (e.g., portions of live preview 630 displayed in regions 602 and 606). Further, in response to detecting tap gesture 3750*c*, device 600 updates media collection 624 with representation 3724*a* of the media item captured in response to tap gesture 3750*c*. In some embodiments, when visual tearing in live preview 630 is above a threshold level, device 600 will capture a media item that does not include the additional content (e.g., portions of live preview 630 displayed in regions 602 and 606) in response to detecting tap gesture 3750*c* even when device 600 is configured to capture additional content.

At FIG. 37D, device 600 has changed position such that it is further away from right portion 3784. After detecting the change in movement, device 600 updates lives preview 630 as illustrated in FIG. 37D, where the dog's ear no longer intersects visual boundary 608 and a portion of the head of person 3784*b* is newly displayed. Here, device 600 is far enough from right portion 3784 such that no visual tearing is present on live preview 630. At FIG. 37D, device 600 detects rightward swipe gesture 3750*d* at a location on the bottom of control region 606.

Figure 37E:
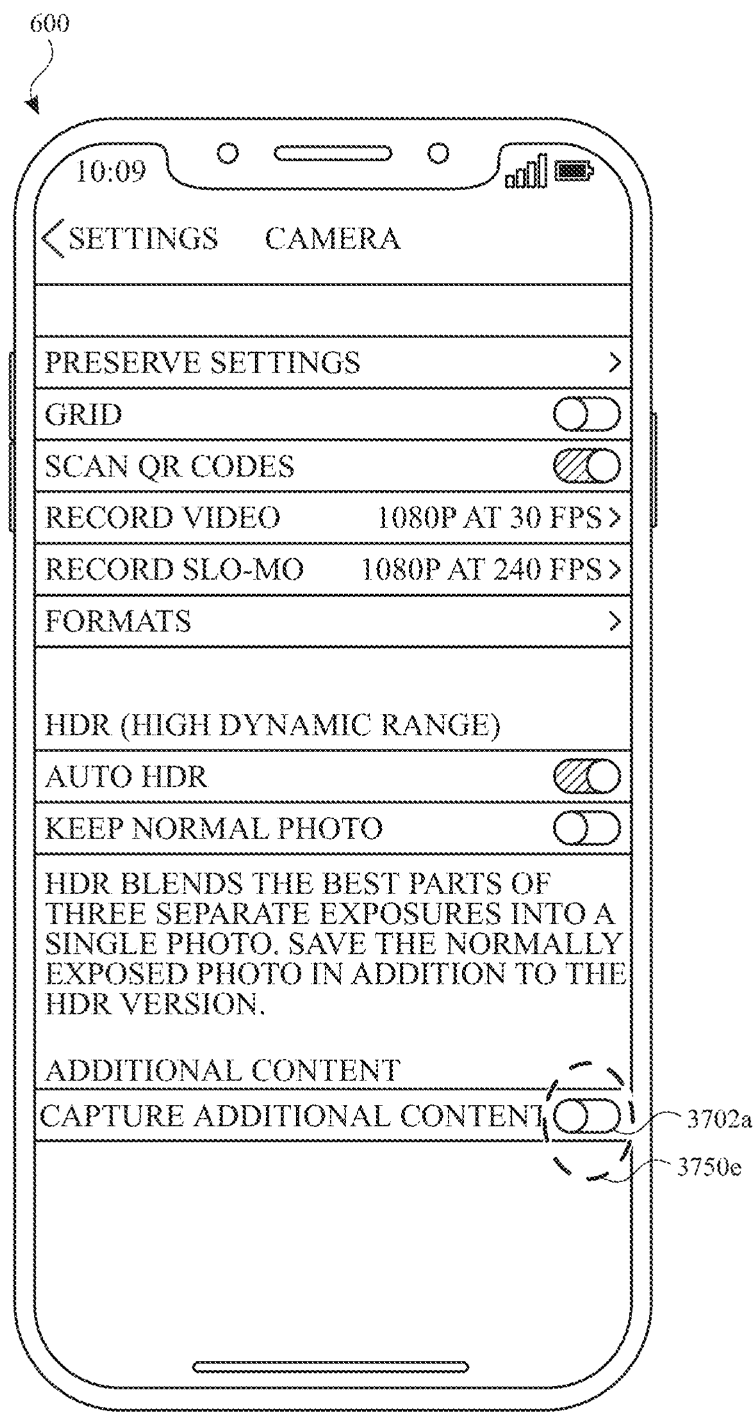

As illustrated in FIG. 37E, in response to detecting rightward swipe gesture 3750*d*, device 600 re-displays the settings user interface in place of the camera setting user interface. At FIG. 37E, device 600 detects tap gesture 3750*e* at a location that corresponds to additional content setting affordance 3702*a*.

Figure 37F:
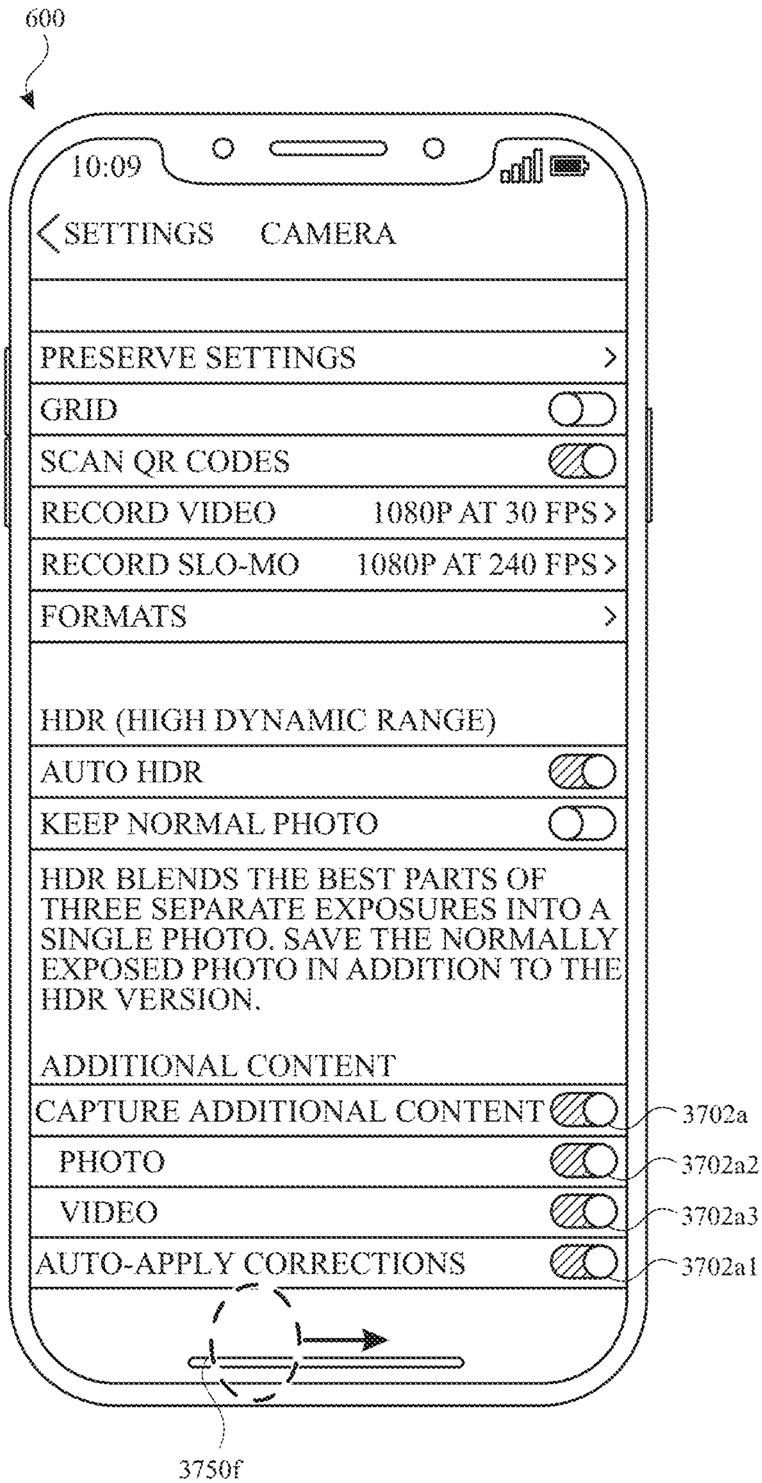

As illustrated in FIG. 37F, in response to detecting tap gesture 3750*e*, device 600 displays additional content setting affordance 3702*a* as being selected (e.g., in an on state), which indicates that device 600 is configured to capture additional content. In response to detecting tap gesture 3750*e*, device 600 also displays automatic media correction setting affordance **3702*a*1 as being selected, which indicates device 600 is configured to automatically adjust captured media, in some circumstances, when media is displayed as discussed below. Along with displaying automatic media correction setting affordance 3702*a*1, in response to detecting tap gesture 3750*e*, device 600 displays additional image content capture setting affordance 3702*a*2 as being selected, which indicates that device 600 is configured to capture additional content for image media in response to detecting a request to capture media (e.g., tap gesture 3750*c*), and additional video content capture setting affordance 3702*a*3, which indicates that device 600 is configured to capture additional content for video media in response to detecting a request to capture media. In some embodiments, automatic media correction setting affordance 3702*a*1 (or affordances 3702*a*2-3702*a*3) is not displayed as selected in response to detecting tap gesture 3750*e* and, when device 600 detects an additional tap gesture at a location corresponding to automatic media correction setting affordance 3702*a*1, device 600 updates automatic media correction setting affordance 3702*a*1 to being selected. In some embodiments, when device 600 displays additional image content capture setting affordance 3702*a*2 as not being selected, device 600 is not configured to capture additional content for image media in response to a request to capture media. In some embodiments, when device 600 displays additional video content capture setting affordance 3702*a*3 as not being selected, device 600 is not configured to capture additional content for video media in response to a request to capture media. At FIG. 37F, device 600 detects rightward swipe gesture 3750*f*** at a location that corresponds to the bottom of the settings user interface.

Figure 37G:
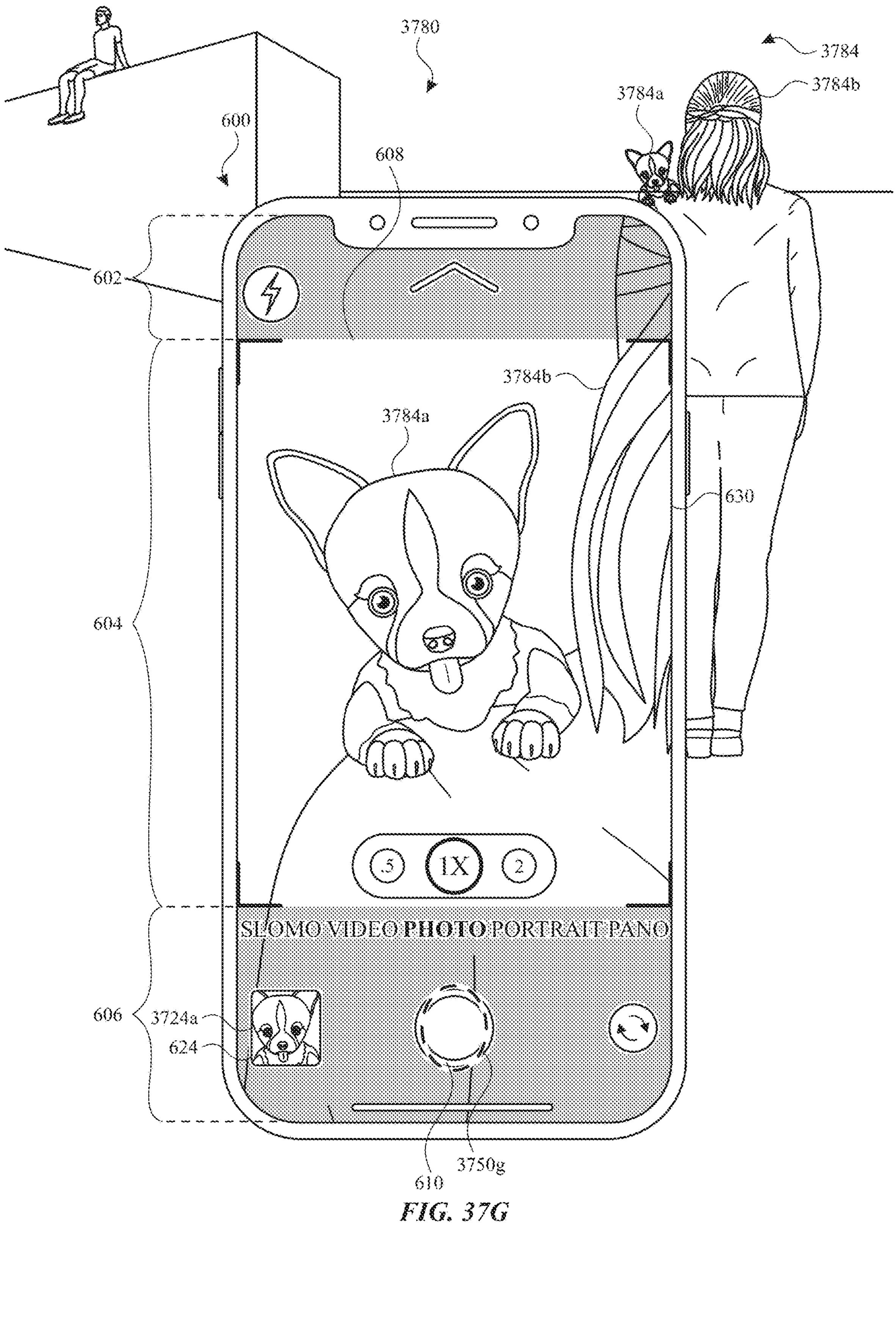

As illustrated in FIG. 37G, in response to detecting rightward swipe gesture **3750*f*, device 600 replaces the display of the settings user interface with display of the camera user interface as it was displayed in FIG. 37D. At FIG. 37G, device 600 detects tap gesture 3750*g* at a location that corresponds to shutter affordance 610**.

Figure 37H:
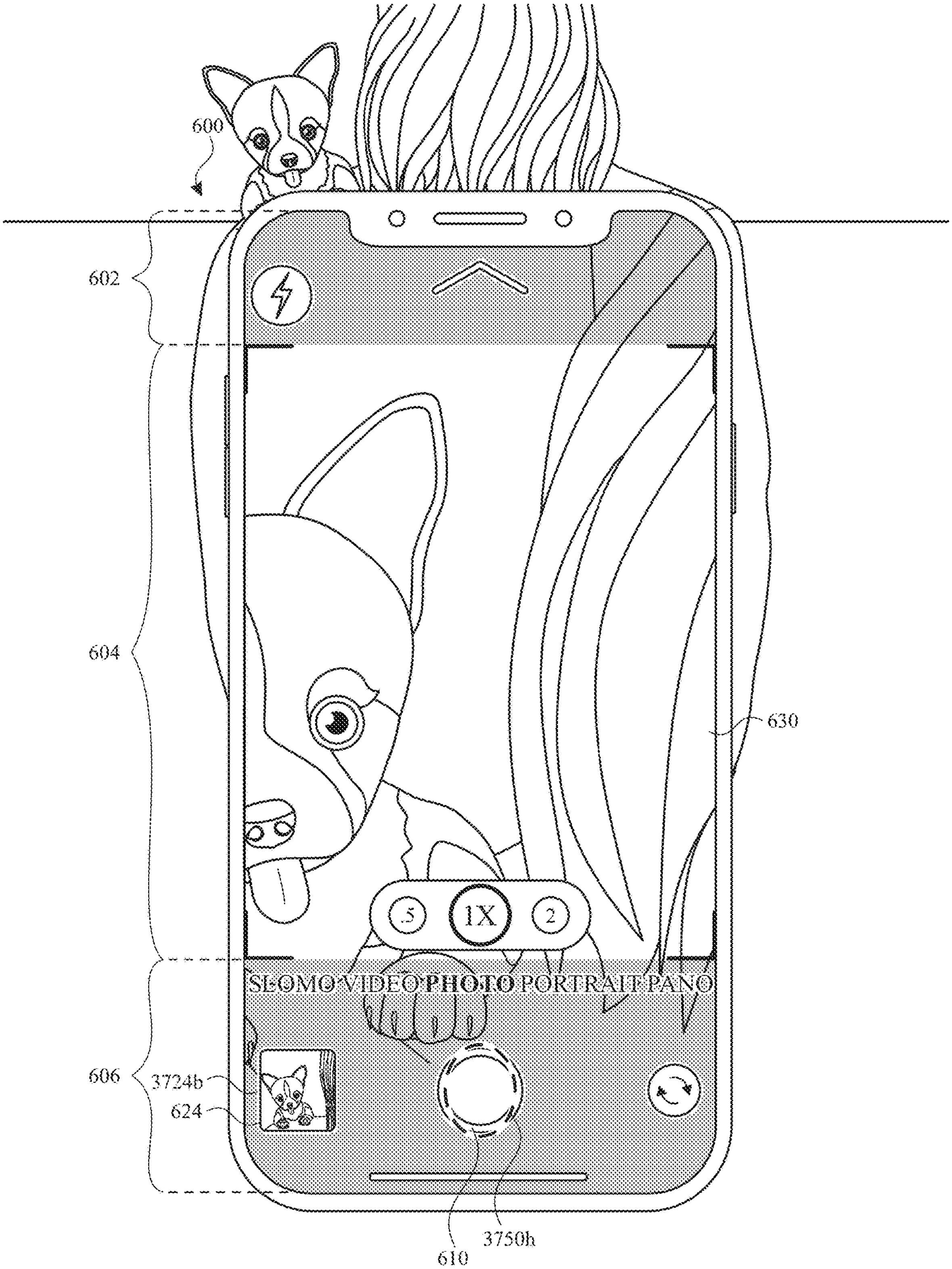

As illustrated in FIG. 37H, in response to detecting tap gesture **3750*g*, device 600 captures a new media item (e.g., photo) that corresponds to live preview 630 in FIG. 37G (e.g., the image of dog 3784*a* sitting on a portion of the shoulder of person 3784*b* with no visual tearing). Further, in response to detecting tab gesture 3750*g*, device 600 updates media collection 624 with a representation 3724*b*** of the newly captured media item.

At FIG. 37H, device 600 has shifted to the right. After shifting to the right, device 600 updates live preview 630 such that half of the head of dog **3784*a* is cut off from live preview 630 based on the updated field-of-view of one of more cameras of device 600. At FIG. 37H, device 600 detects tap gesture 3750*h* at a location that corresponds to shutter affordance 610**.

Figure 37I:
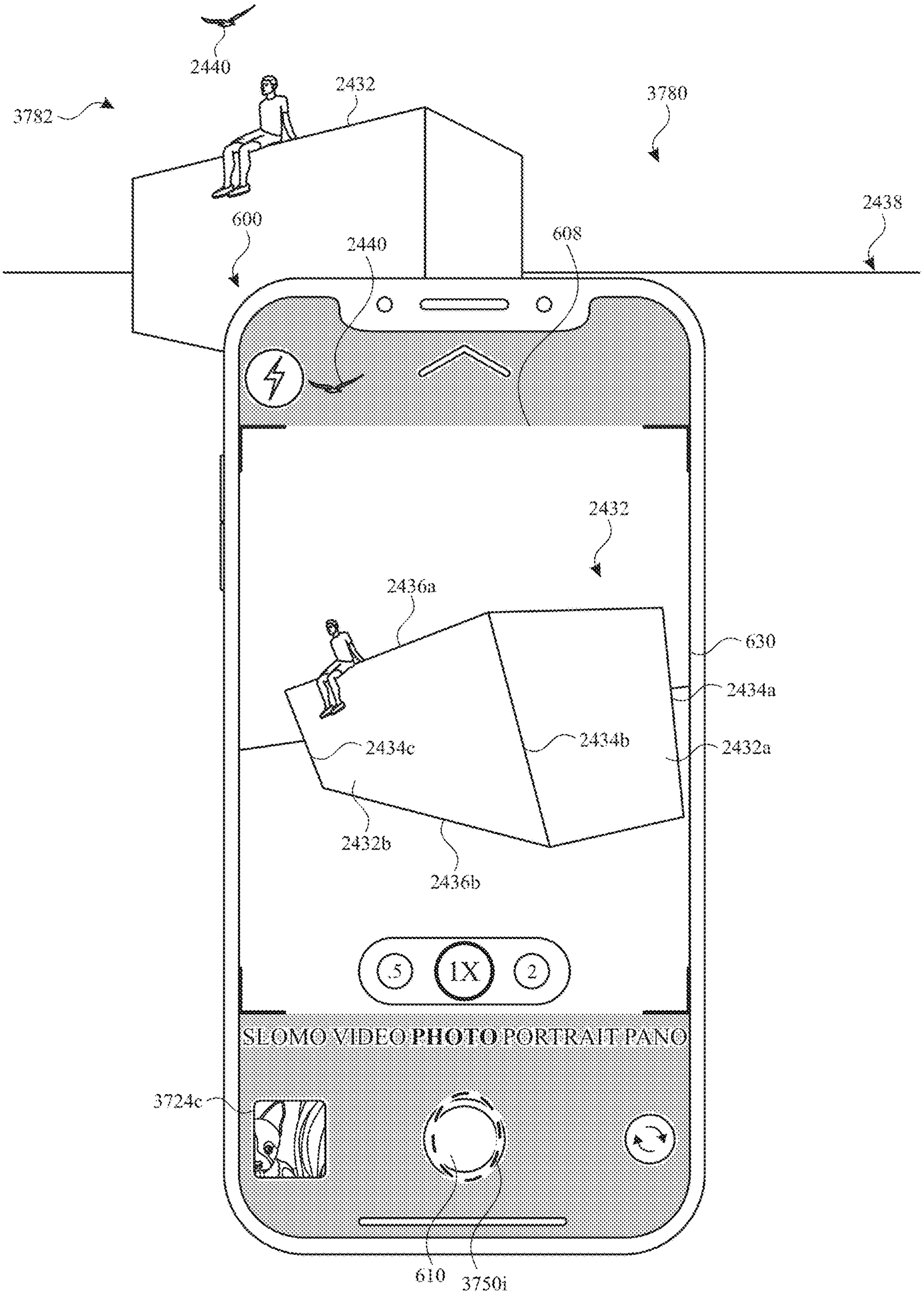

As illustrated in FIG. 37I, in response to detecting tap gesture **3750*h*, device 600 captures a new media item (e.g., photo) that corresponds to live preview 630 in FIG. 37H (e.g., the image with half of the head of dog 3784*a*). Further, in response to detecting tap gesture 3750*h*, device 600 updates media collection 624 with a representation 3724*c*** of the newly captured media item.

At FIG. 37I, device 600 has changed position such that the one or more cameras of device 600 are directed to left portion 3782 that has a person sitting on rectangular prism 2432. After detecting the change in movement, device 600 updates lives preview 630 as illustrated in FIG. 37I. For example, while displaying live preview 630, device 600 displays the person sitting on rectangular prism 2432 in camera display region 604 and bird 2440 that has come into the field-of-view of the back cameras of device 600 in indicator region 602. Because device 600 is slightly slanted (e.g., rotated along one or more of the x-, y-, and/or z-axis relative to the plane of the scene), various portions of left portion 3782 are distorted, as displayed in live preview 630 in FIG. 37I when compared to left portion 3782 in FIG. 24A above. In FIG. 37I, live preview 630 includes vertical perspective distortion that has not been corrected (e.g., vertical lines **2434*a*-2434*c* appear to visually converge at a respective point towards the bottom of live preview 630), horizontal perspective distortion (e.g., horizontal lines 2436*a*-2436*b* appear to converge moving from right to left in live preview 630), and horizon distortion (e.g., horizon line is diagonal in live preview 630 when it is straight in left portion 3782). At FIG. 37I, device 600 detects tap gesture 3750*i* at a location that corresponds to shutter affordance 610**.

Figure 37J:
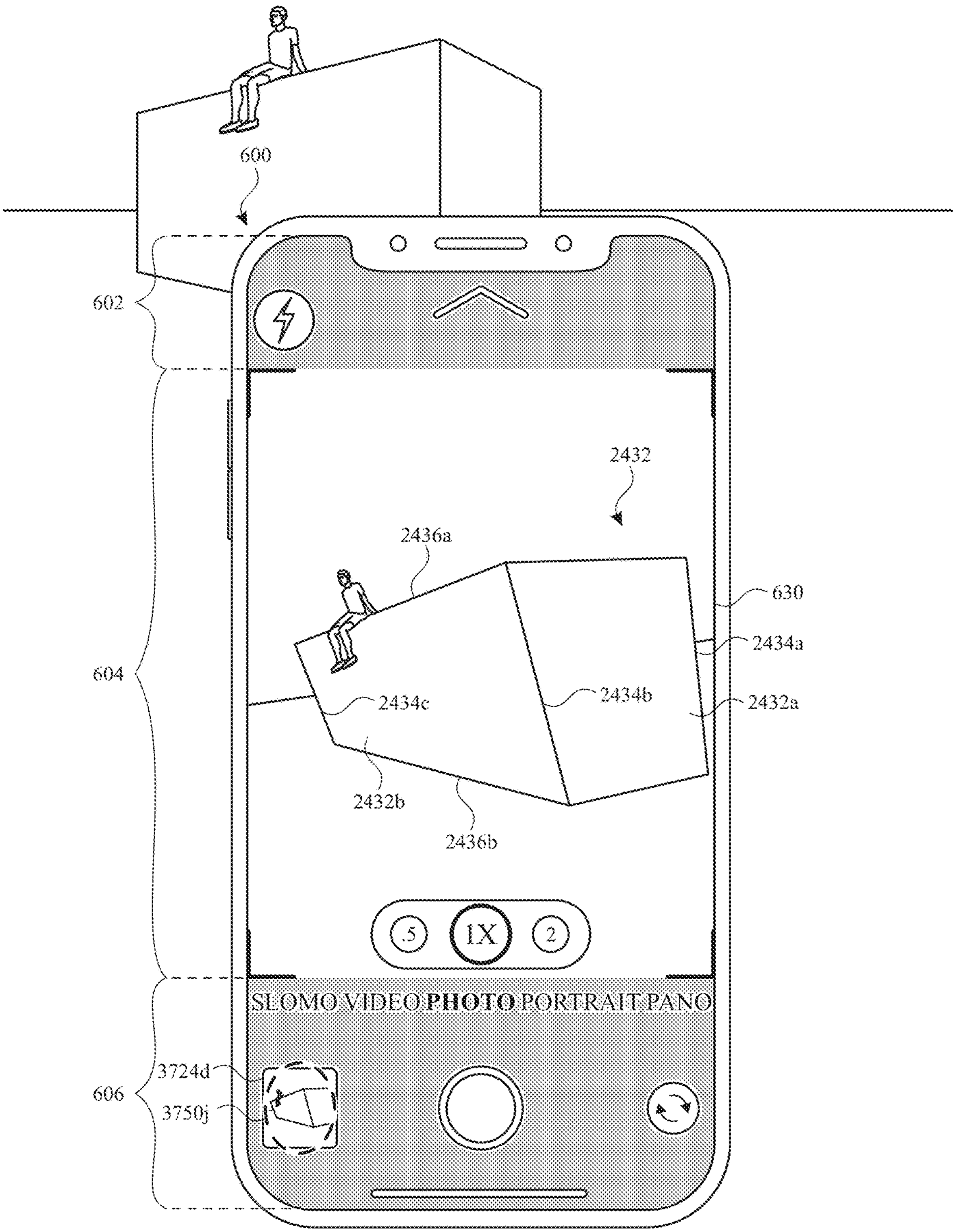

As illustrated in FIG. 37J, in response to detecting tap gesture **3750*i*, device 600 captures a new media item (e.g., photo) that corresponds to live preview 630 in FIG. 37I (e.g., person sitting on rectangular prism 2432 with distortion). Further, in response to detecting tap gesture 3750*i*, device 600 updates media collection 624 with representation 3724*d* of the newly captured media item. At FIG. 37J, device 600 detects tap gesture 3750*j* at a location that corresponds to media collection 624, where the media item captured in response to detecting tap gesture 3750*i* is the last media that was captured and representation 3724*d* is displayed on top of media collection 624**.

Figure 37K:
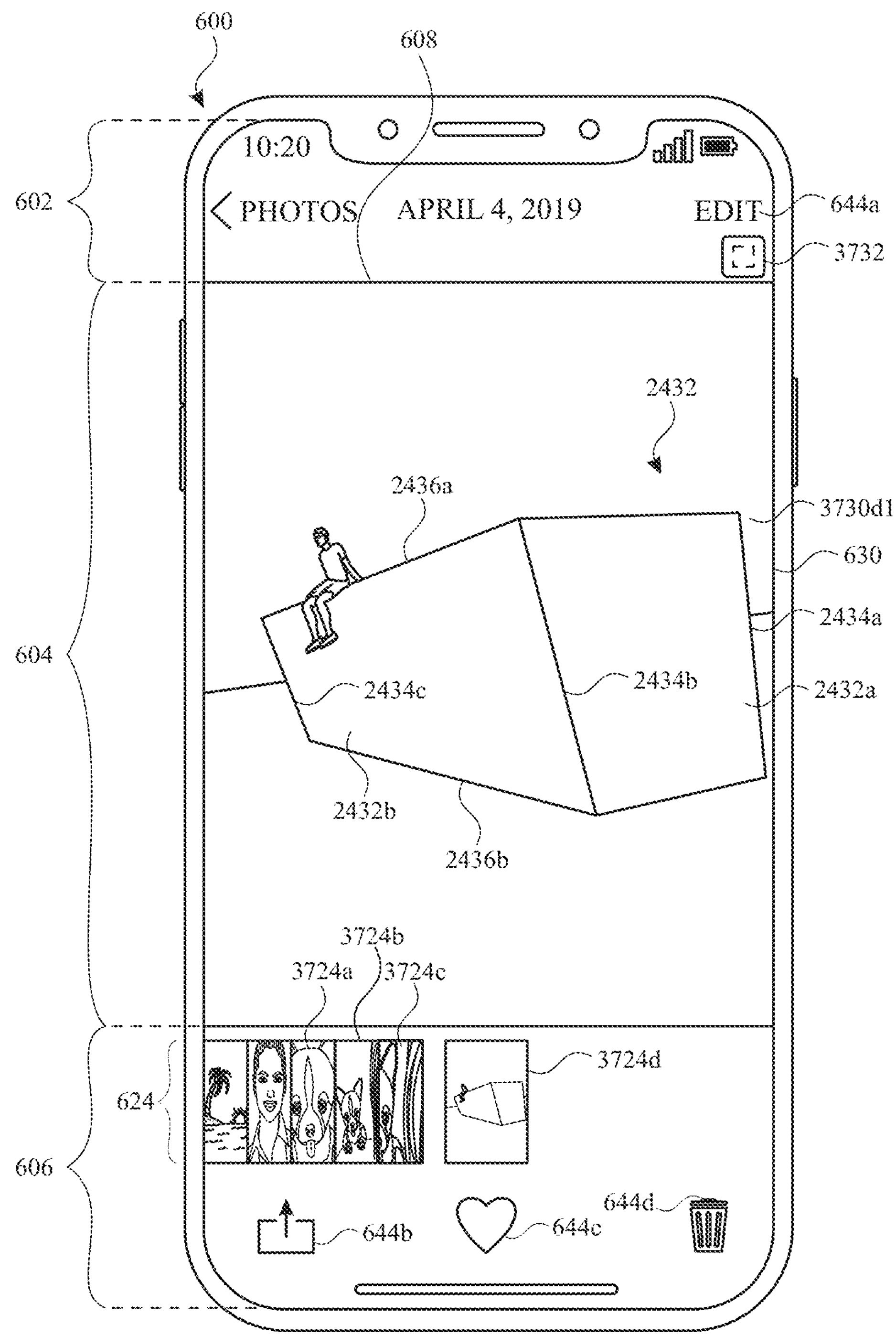

As illustrated in FIG. 37K, in response to detecting tap gesture **3750*j*, device 600 ceases to display the camera user interface and, instead, displays a photo viewer user interface. Photo viewer user interface includes media collection 624 displayed at the bottom of the photo viewer user interface. Media collection 624 includes, respectively, representations 3724*a-d* of media items captured as described in FIGS. 37C-37J above. Along with displaying representations 3724*a-d*, photo viewer user interface includes an edit affordance 644*a* for editing media, send affordance 644*b* for transmitting the captured media, favorite affordance 644*c* for marking the captured media as a favorite media, trash affordance 644*d* for deleting the captured media, and back affordance 644*e* for returning to display of live preview 630**.

At FIG. 37K, in response to detecting tap gesture **3750*j*, device 600 displays content processing indicator 3732 because content (e.g., data) was captured from the portions of indicator region 602 and control region 606 (and camera display region 604) in FIG. 37I (e.g., because device 600 is configured to capture additional content as discussed above in relation to FIG. 37F) and the media item represented by representation 3724*d* has not been fully processed. In other words, device 600 displays content processing indicator 3732 because device 600 captured additional content when capturing the media item represented by representation 3724*d* and less than a threshold amount of time has passed for the content that corresponds the media item to be fully processed. Here, the media item represented by representation 3724*d* includes content captured from the portions of indicator region 602 and control region 606 from the WFOV and the portion of camera display region 604 from the NFOV, as displayed in live preview 630 in FIG. 37I. However, representation 3724*d* only includes content captured from the portion of camera display region 604 from the NFOV. As used herein, a representation of a media item (e.g., a data structure that is saved in memory) can be formed using only a portion of the content (e.g., data) of the media item. In some embodiments, content processing indicator 3732 is an animated indicator that spins. In some embodiments, content processing indicator 3732 is an animated progress bar that fills up to indicate the percentage of captured content that corresponds to a requested media item (e.g., media item represented by representation 3724***d*) that has been processed.

At FIG. 37K, because device 600 has not fully processed the content of the media item represented by representation 3724*d*, device 600 displays enlarged unadjusted representation 3730*d*1, which is a representation of the media item that has not been adjusted. Here, unadjusted representation 3730*d*1 includes vertical perspective distortion, horizontal perspective distortion, and horizon distortion similar to the distortions displayed in live preview 630 in FIG. 37I. Unadjusted representation 3730*d*1 only includes content captured from content displayed in the camera display region 604, as displayed in FIG. 37I, because no adjustment has been applied to the media item (represented by representation 3724*d*) using the captured from content displayed in regions 602 and 606 in FIG. 37I. For example, unadjusted representation 3730*d*1 does not include additional content (e.g., bird 2440) displayed in indicator region 602 in FIG. 37I. Along with displaying unadjusted representation 3724*d*1, device 600 also displays representation 3724*d* that matches the unadjusted representation 3730*d*1.

Figure 37L:
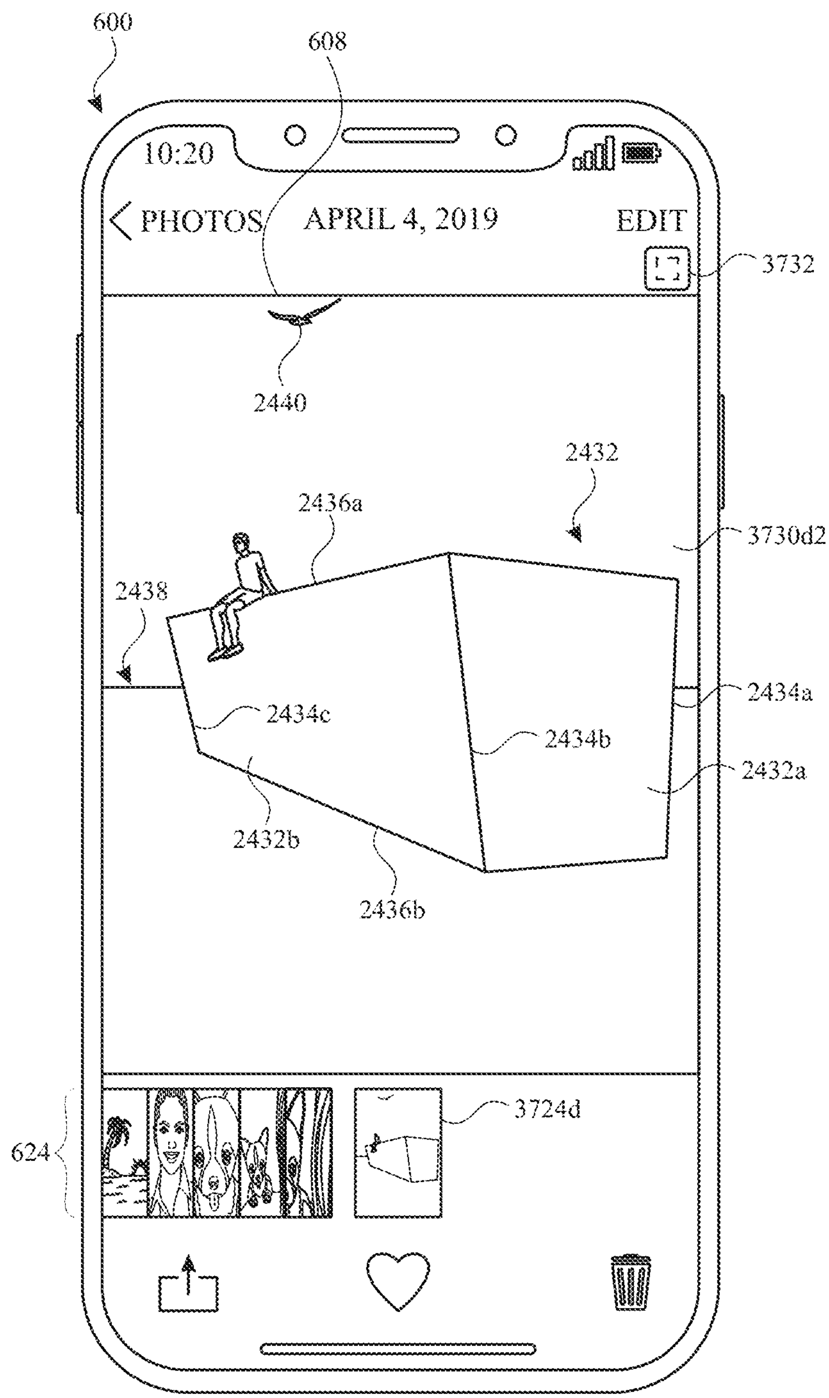

As illustrated in FIG. 37L, after processing additional content of the media item represented by representation 3724*d*, device 600 continues to animate or updates the display of content processing indicator 3732, where content processing indicator 3732 is rotated clockwise. At FIG. 37L, device 600 makes the determination that content should be used to correct the media item represented by representation 3724*d* because horizon line 2438, vertical lines 2434*a*-2434*c*, and horizontal lines 2436*a*-2436*b* of the media item represented by representation 3724*d* (e.g., unadjusted representation 3730*d*1) should be corrected. In some embodiments, a determination is made that the previously captured media item (e.g., media item represented by representation 3724*d*) includes one or more visual aspects (e.g., video stabilization, horizon correction, vertical correction, horizontal correct, and reframing) that can be corrected using captured content from portion of representation displayed in regions 602 and 606 (e.g., in FIG. 37I). In some embodiments, the determination that the previously captured media item includes one or more visual aspects that should be corrected is made based on a computed confidence value that is determined using the content of the previously captured media item. In some embodiments, when the computed confidence value is above (or equal to) a threshold, the determination is made that the previously captured media item should be corrected. In some embodiments, when the computed confidence value is below (or equal to) a threshold, the determination is made that the previously captured media item should not be corrected.

Because device 600 is configured to automatically adjust captured media (as discussed above in FIG. 37F by automatic media correction setting affordance 3702*a*1 being set to the active state) and because of a determination that the content (e.g., captured content from portion of representation displayed in regions 602 and 606 in FIG. 37I) should be used to correct the media item represented by representation 3724*d*, device 600 automatically displays, without additional user input, an animation. When displaying the animation, device 600 adjusts unadjusted representation 3730*d*1 to display updated representations such as partially adjusted representation 3730*d*2 in FIG. 37L. That is, in some embodiments, device 600 displays an animation of the unadjusted representation updating, while device 600 processes more of the additional content. At FIG. 37L, device 600 has rotated the representation to correct horizon distortion of horizon line 2438. Notably, because device 600 rotated the representation, device 600 displays some of the portion of live preview 630 displayed in indicator region 602 (e.g., bird 2440 in FIG. 37I) in partially adjusted representation 3730*d*2 (e.g., using some of the additional content of the media item represented by representation 3724*d*). In addition, the rotation changes horizon line 2438 from being diagonal line (e.g., where some points of horizon line 2438 have different y-values) in unadjusted representation 3730*d*1 to being a horizontal line (e.g., where each point of the horizon line has the same y-value and horizon line 2438 proceeds only along the x-axis of the representation in partially adjusted representation 3730*d*2 using techniques as discussed in relation to FIG. 24E. Along with displaying partially adjusted representation 3730*d*2, device 600 also updates the representation 3724*d* in media collection 624 to match partially adjusted representation 3730*d*2. In some embodiments, device 600 displays a similar animation when updating representation 3724*d* as device 600 displays when adjusting unadjusted representation 3730*d*1 to display updated representations such as partially adjusted representation 3730*d*2.

Figure 37M:
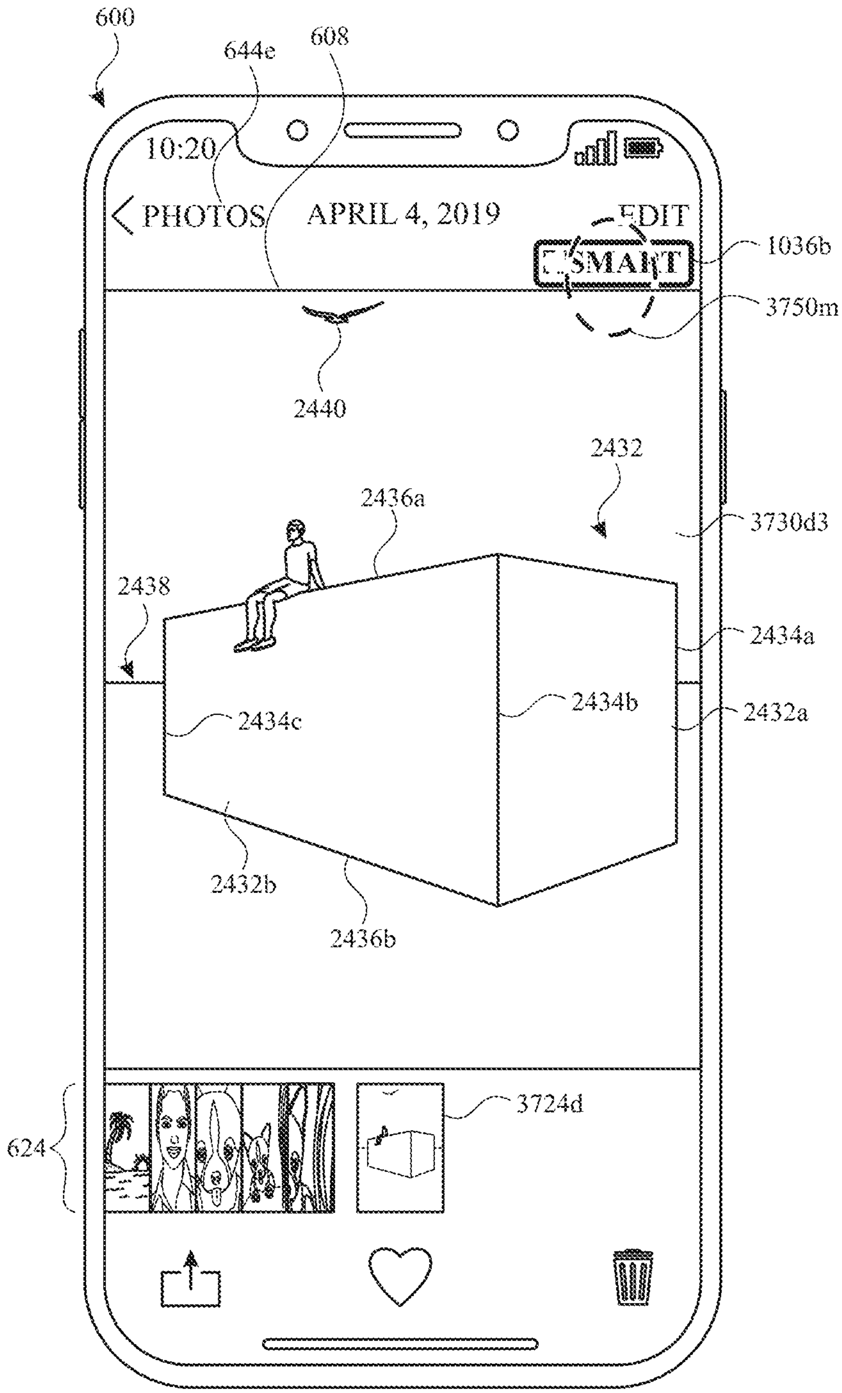

As illustrated in FIG. 37M, because device 600 has fully processed the content of the media item represented by representation 3724d in addition to the reasons for displaying the animation discussed above in FIG. 37L (because device 600 is configured to automatically adjust captured media and because of a determination that the content should be used to correct the media item represented by representation 3724*d*, device 600 displays an animation), device 600 automatically, without additional user input, replaces partially adjusted representation 3730*d*2 with adjusted representation 3730*d*3. Device 600 displays adjusted representation 3730*d*3 by updating the vertical and horizontal perspectives of the media item represented by representation 3724*d*. In FIG. 37M, as compared to the captured live preview 630 in FIG. 37I, adjusted representation 3730*d*3 has less vertical perspective distortion (e.g., vertical lines 2434*a*-2434*c* appear to be more parallel in representation 3730*d*1), horizontal perspective distortion (e.g., horizontal lines 2436*a*-2436*b* appear not to converge moving from right to left in live preview 630), and horizon distortion (e.g., horizon line is more horizontal). Here, adjusted representation 3730*d*3 includes some of the portion of live preview 630 displayed in camera display region 604 in FIG. 37I (person sitting on rectangular prism 2432) and some of the portion of live preview 630 displayed in indicator region 602 (e.g., bird 2440) in FIG. 37I. As discussed above, when the media item represented by represented 3724*d* is used to adjust a representation, device 600 utilizes (e.g., brings in) the additional visual content (e.g., bird 2440) to correct various components of the media item (e.g., as described above in relation to FIG. 24D). Thereby, device 600 displays adjusted representation 3730*d*3 with the additional visual content. Along with displaying adjusted representation 3730*d*3, device 600 also updates the representation 3724*d* in media collection 624 to match adjusted representation 3730*d*3.

As illustrated in FIG. 37M, because device 600 has fully processed the content of the media item represented by representation 3724*d* in addition to the reasons for displaying the animation discussed above in FIG. 37L, device 600 replaces content processing indicator 3732 with auto adjust affordance 1036*b* because device 600 has fully processed the content of the media item. Auto adjust affordance 1036*b* is displayed as being selected (e.g., bolded, pressed), which indicates that device 600 is displaying a representation (e.g., adjusted representation 3730*d*3) of the media item, where the media item has been adjusted based on one or more adjustment algorithms. At FIG. 37M, device 600 detects tap gesture 3750*m* at a location that corresponds to auto adjust affordance 1036*b*.

Figure 37N:
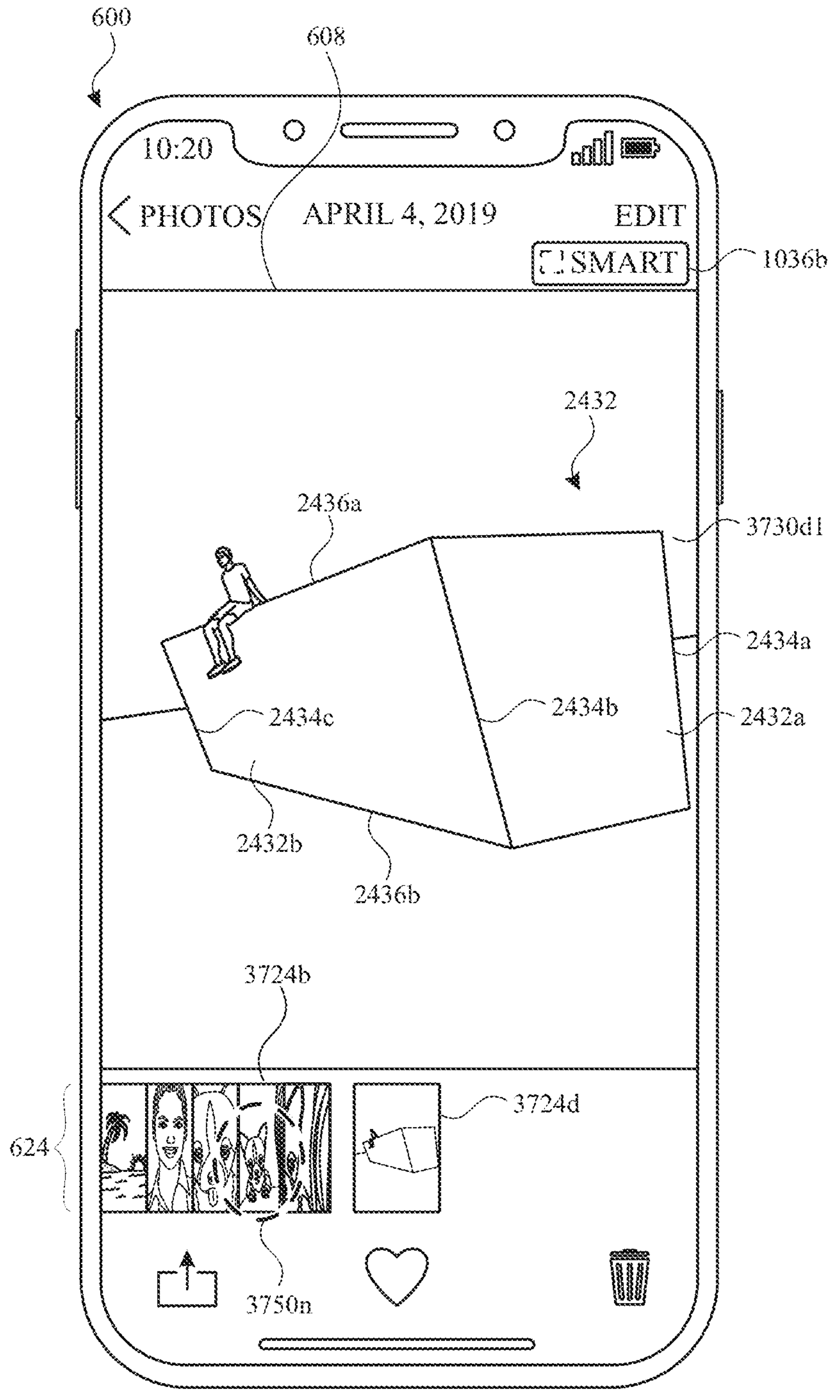
Figure 37O:
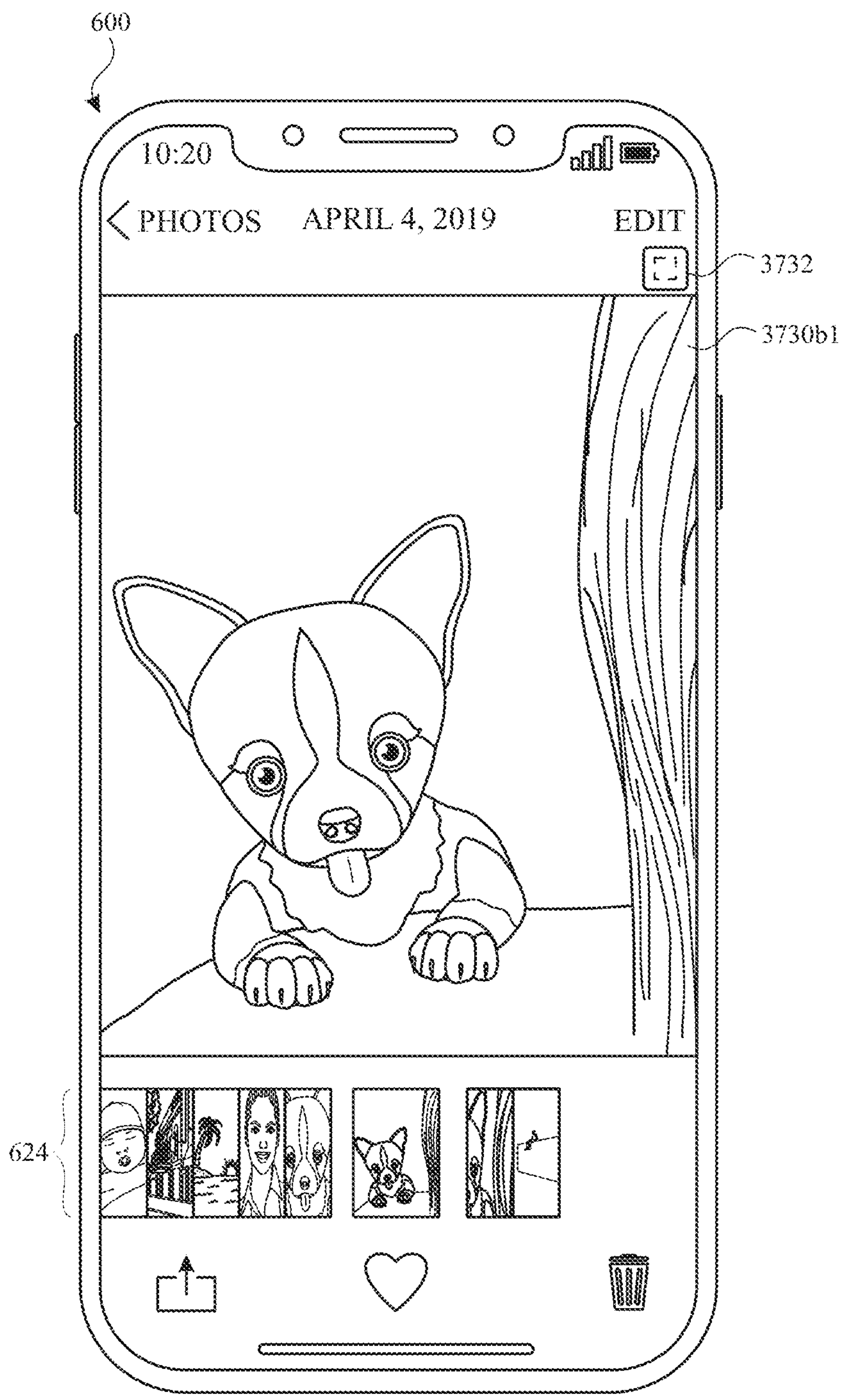

As illustrated in FIG. 37N, in response detecting tap gesture 3750*m*, device 600 displays enlarged unadjusted representation 3730*d*1, which is a the media item represented by representation 3724*d* that has not been adjusted, as described above in relation to FIG. 37K. In other words, device 600, in response to detecting tap gesture 3750*m*, reverses the adjustments made in FIGS. 37K-37L. In addition, in response to detecting tap gesture 37350*m*, device 600 updates display of auto adjust affordance 1036*b* such that auto adjust affordance is displayed as being unselected (e.g., not bolded, depressed) and updates the representation of 3724*b* in media collection 624 to match unadjusted representation 3730*d*1. At FIG. 37N, device 600 detects tap gesture 3750*n* at a location that corresponds to a representation 3724*b* in media collection 624.

As illustrated in FIG. 37O, in response to detecting tap gesture 3750*n*, device 600 replaces enlarged unadjusted representation 3730*d*1 with unadjusted representation 3730*b*1, which corresponds to the media item represented by representation 3724*b* in media collection 624. Further, in response to detecting tap gesture 3750*n*, device 600 replaces the display of auto adjust affordance 1036*b* with content processing indicator 3732. Device 600 displays content processing indicator 3732 for similar reasons as discussed in relation to the processing of the media item represented by representation 3724*d* in FIG. 37K. For example, device 600 displays content processing indicator 3732 because content was captured from the portions of indicator region 602 and control region 606 in FIG. 37D (e.g., because device 600 is configured to capture additional content as discussed above in relation to FIG. 37F) and the content of the media item represented by representation 3724*b* has not been fully processed.

Figure 37P:
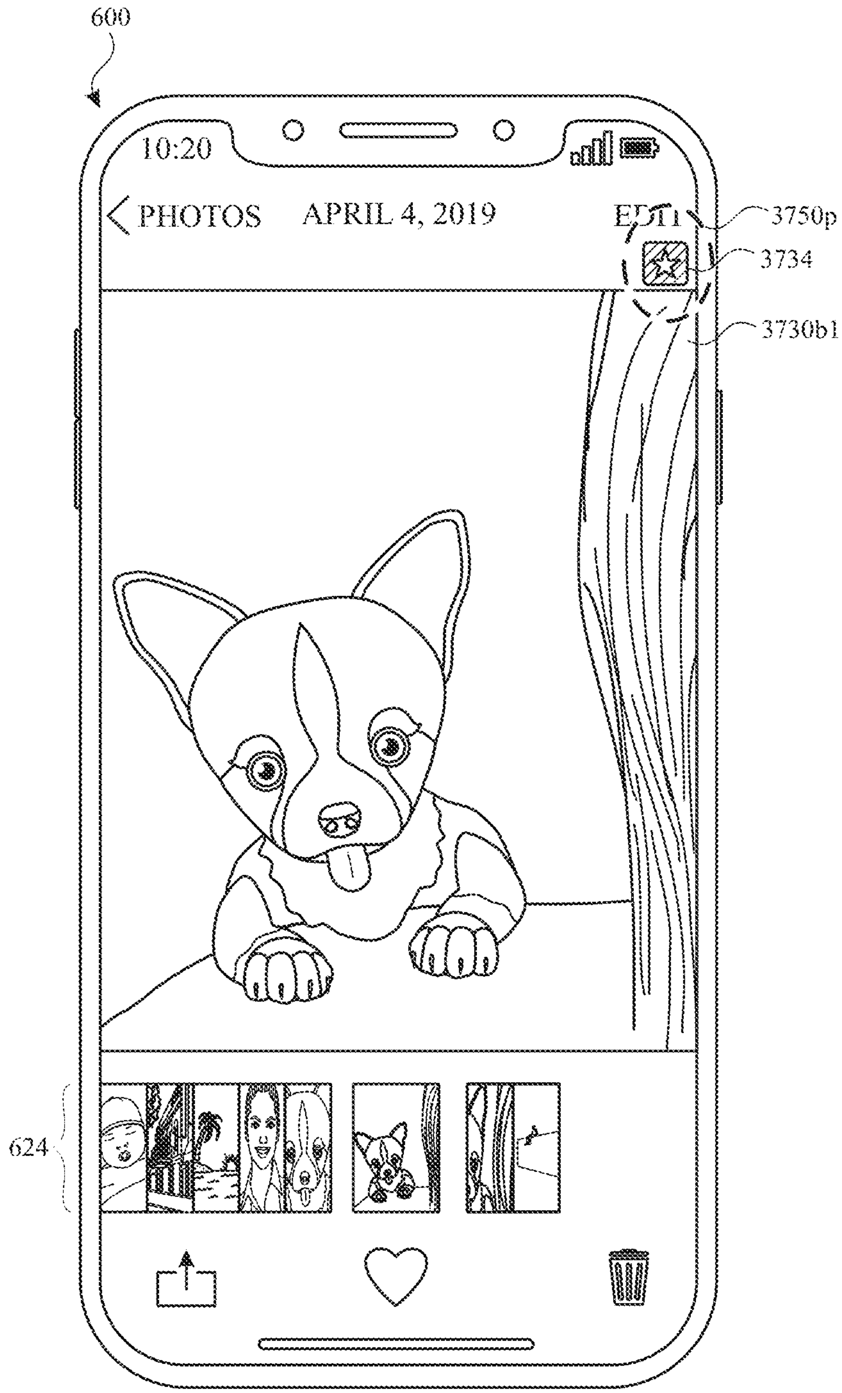

As illustrated in FIG. 37P, device 600 has fully processed the content of the media item represented by representation 3724*b* and a determination is made that the content (e.g., additional content) captured should not be used to correct the media item represented by representation 3724*d*. At FIG. 37B, device 600 has fully processed the content of the media item represented by representation 3724*b* and a determination is made that the content (e.g., additional content) captured should not be used to correct the media item represented by representation 3724*d*, device 600 forgoes displaying an adjusted representation of the media item represented by representation 3724*b* and maintains display of unadjusted representation 3730*b*1. In addition, because a determination is made that the captured content should not be used to correct the media item represented by representation 3724*b*, device 600 displays non-selectable auto adjust indicator 3734 when device 600 has fully processed the content of the media item represented by representation 3724*b*. Non-selectable auto adjust indicator 3734 indicates that additional content (e.g., content captured from regions 602 and 606) has been captured. However, non-selectable auto adjust indicator 3734 does not function like auto adjust affordance 1036*b* (as described above in relation to tap gesture 3750*m*). That is, auto adjust affordance 1036*b* does not adjust a displayed representation in response to gestures at a location that corresponds to non-selectable auto adjust indicator 3734. In some embodiments, while device 600 has determined that the additional content should be used for automatic adjustment of the media item represented by representation 3724*b*, the additional content remains available for use in one or more operations (e.g., manual editing) relating to the media item represented by representation 3724*b*. At FIG. 37P, device 600 detects tap gesture 3750*p* at a location that corresponds to non-selectable auto adjust indicator 3734.

Figure 37Q:
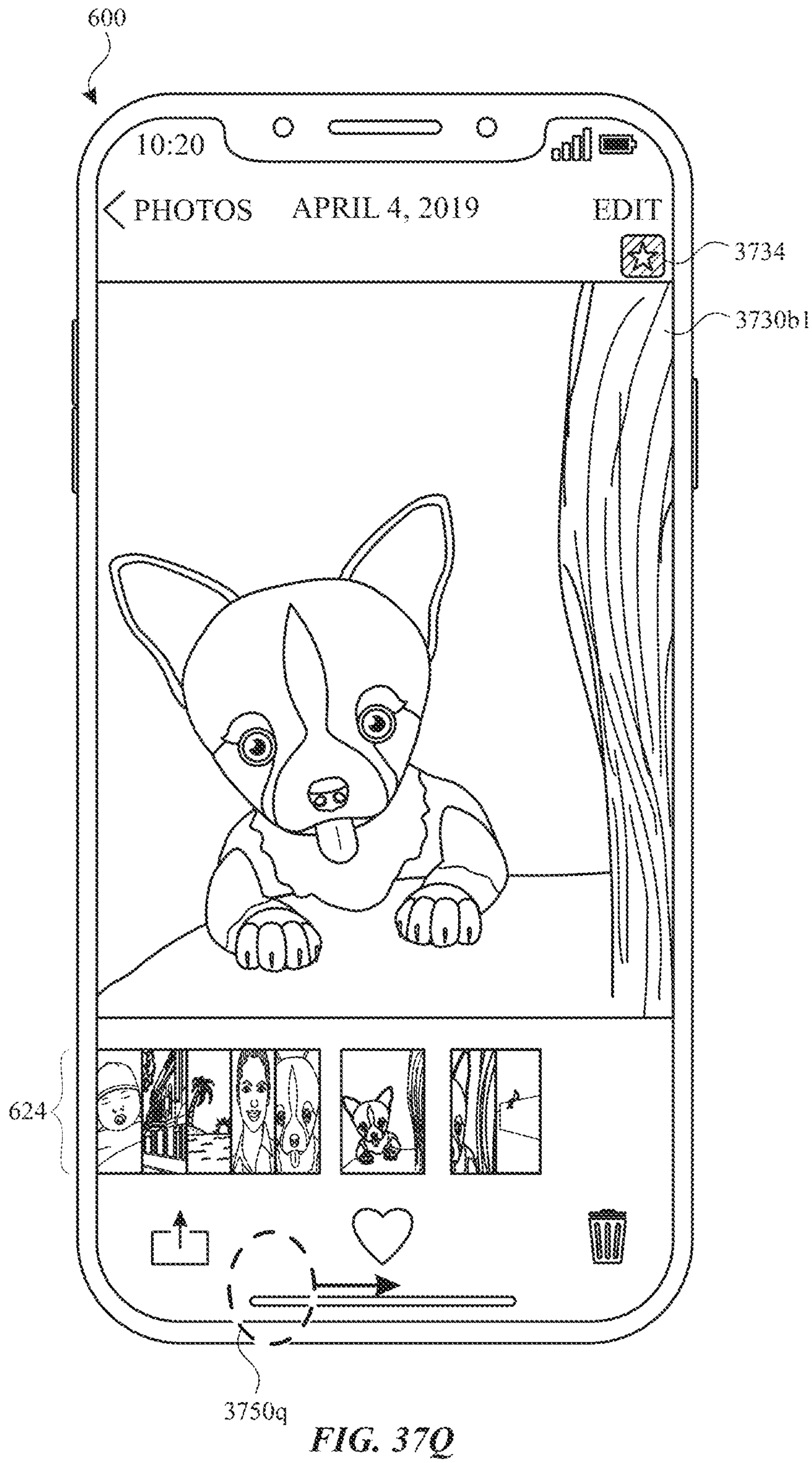

As illustrated in FIG. 37Q, in response to tap gesture 3750*p*, device 600 forgoes displaying a new representation of the media item represented by representation 3724*b* and updating non-selectable auto adjust indicator 3734. In other words, in response to tap gesture 3750*p*, device 600 continues to display unadjusted representation 3730*b*1 and non-selectable auto adjust indicator 3734 in the same way that they were displayed in FIG. 37P.

Looking back at FIGS. 37K-37Q, when a determination is made that additional content (e.g., content captured from regions 602 and 606) should be used to correct media, device 600 displays a selectable auto adjust affordance and automatically adjusts a representation of media after device 600 has fully processed the content of media and additional content has been captured (as described above in relation to FIG. 37K-37N). However, in some embodiments, when a determination is made that additional content should not be used to correct media, device 600 displays a non-selectable auto adjust indicator 3734 and does not adjust a representation of the media (as described above in relation to FIGS. 370-37Q) after device 600 has fully processed the content of media and additional content has been captured. At FIG. 37Q, device 600 detects rightward swipe gesture 3750*q* at a location that corresponds to the bottom of the photo viewer user interface.

Figure 37R:
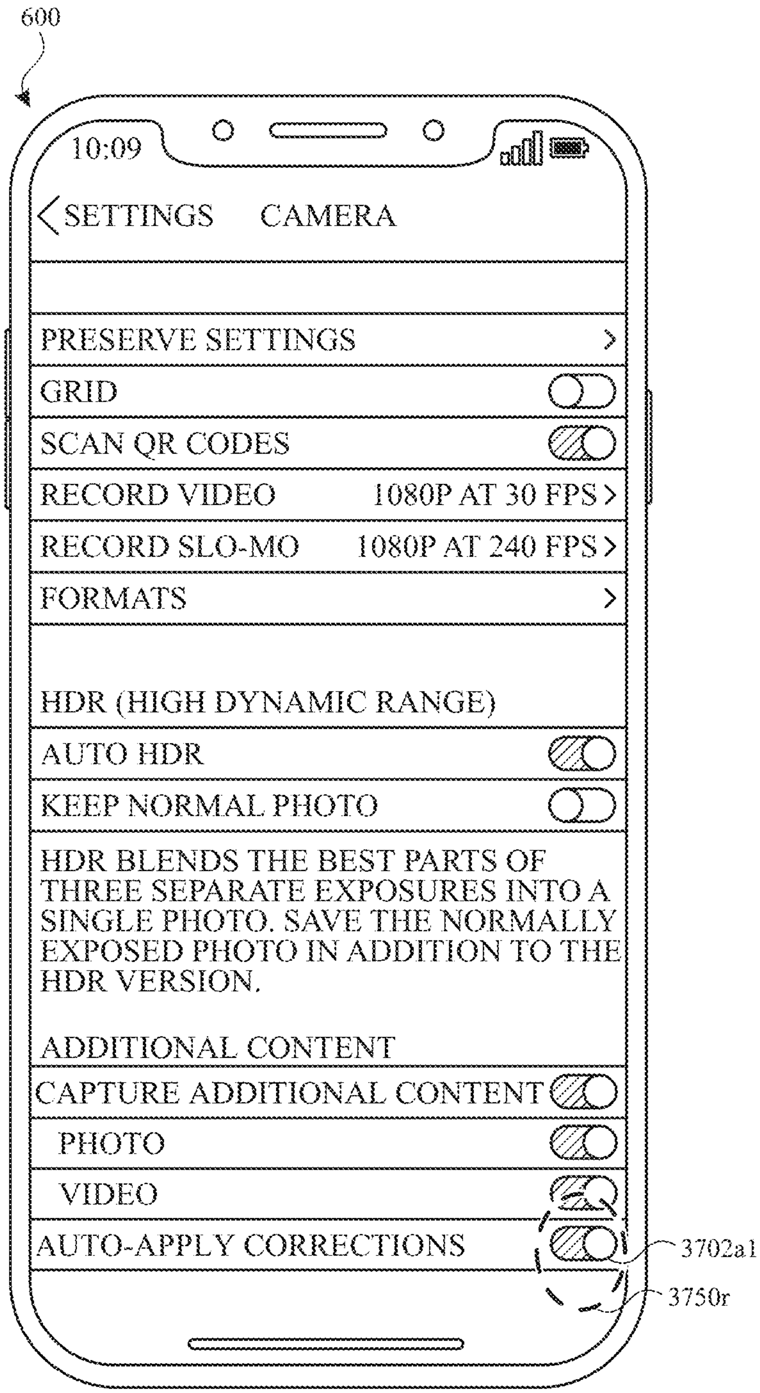

As illustrated in FIG. 37R, in response to detecting rightward swipe gesture 3750*q*, device 600 replaces the display of the photo viewer user interface with display of the setting user interface, where automatic media correction setting affordance 3702*a*1 is displayed as being selected (as discussed in relation to FIG. F). At FIG. 37R, device 600 tap gesture 3750*r* at a location that corresponds to automatic media correction setting affordance 3702*a*1.

Figure 37S:
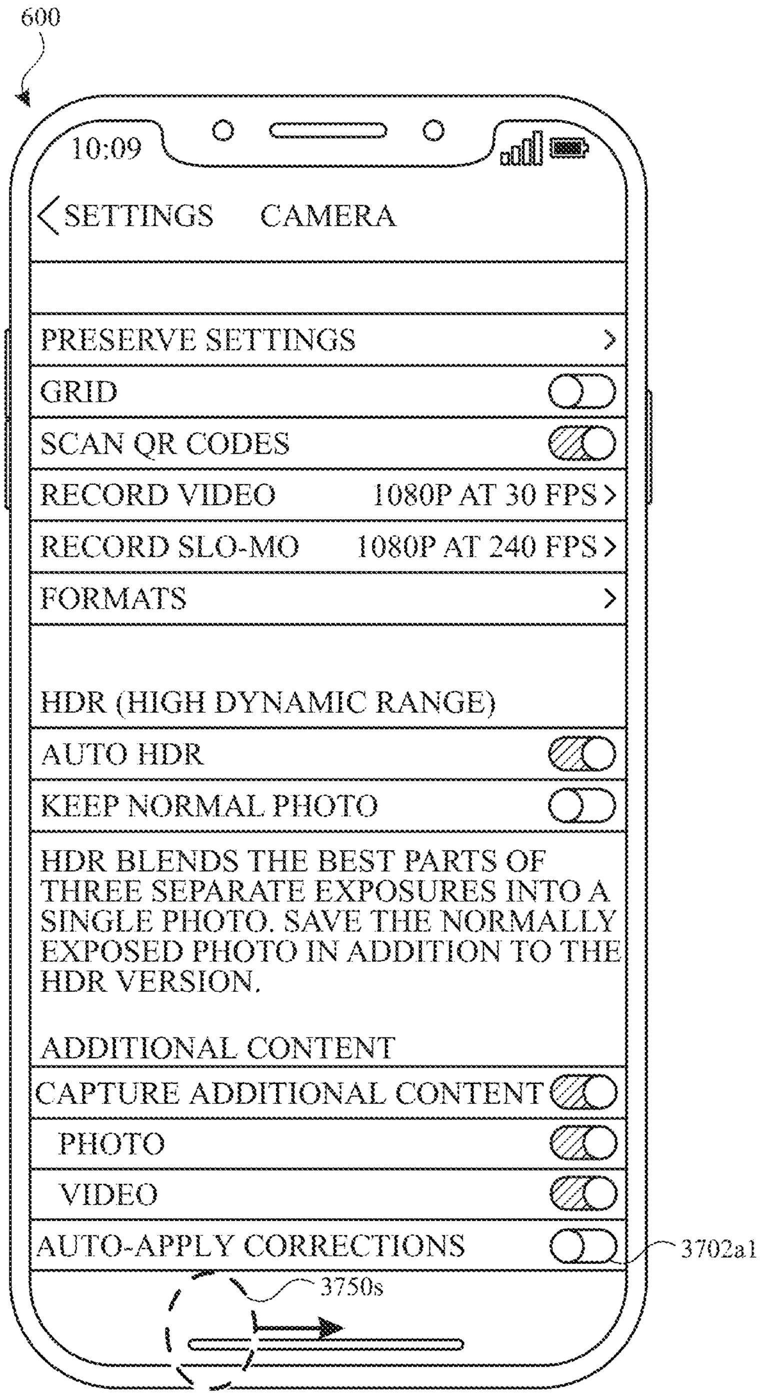
Figure 37T:
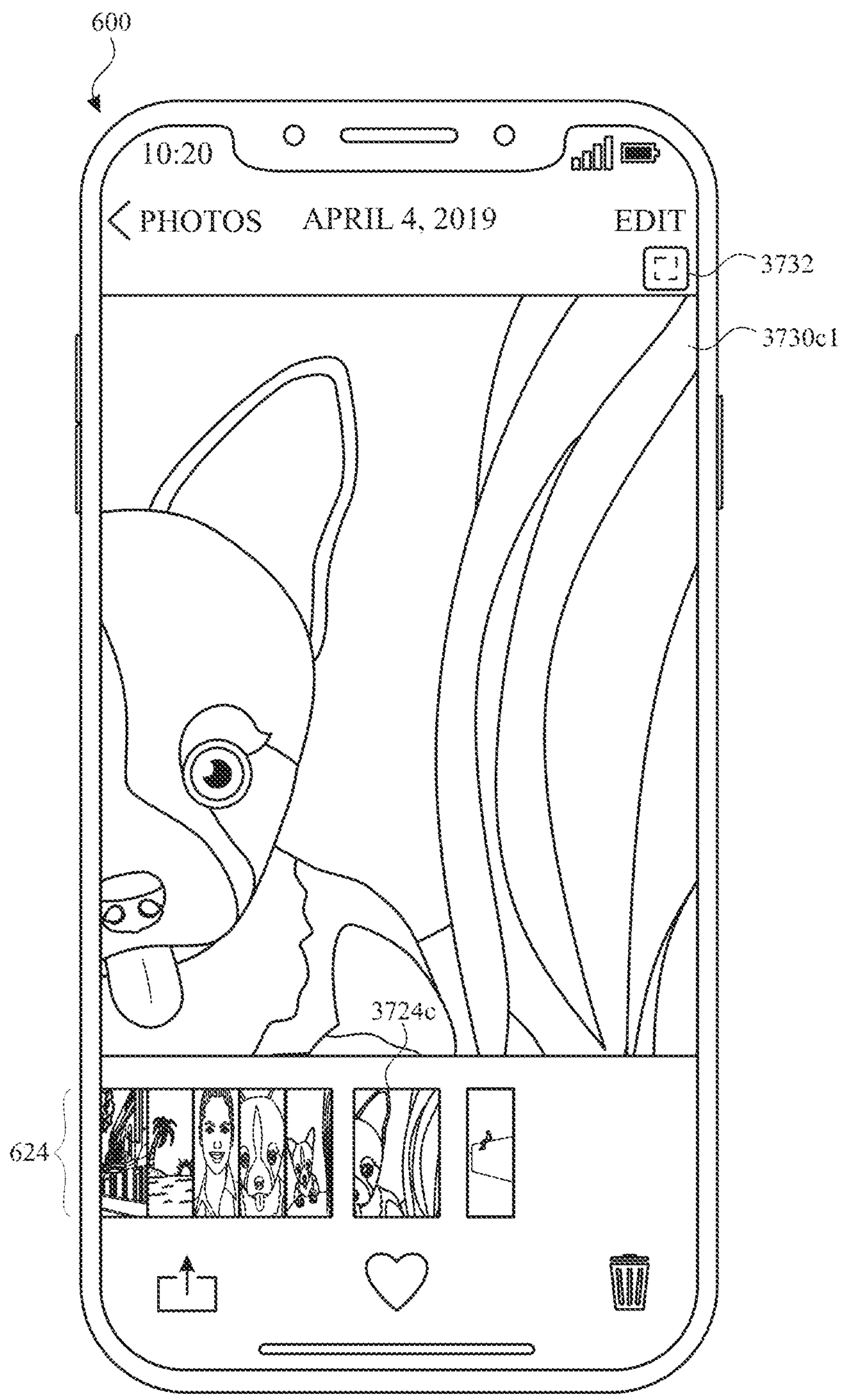

As illustrated in FIG. 37S, in response to detecting tap gesture 3750*r*, device 600 updates display of automatic media correction setting affordance 3702*a*1 such that automatic media correction setting affordance 3702*a*1 is unselected. Automatic media correction setting affordance 3702*a*1 being unselected (set to an inactive state) indicates that device 600 is not configured to automatically adjust captured media. At FIG. 37S, device 600 detects leftward swipe gesture 3750*s* at a location that corresponds to the bottom of the settings user interface.

As illustrated in FIG. 37T, in response to detecting swipe gesture 3750*s*, device 600 displays unadjusted representation 3730*c*1 (as previously navigated to by a tap gesture that corresponds to the location of the representation 3724*c* in media collection 624 using similar techniques as those described above in relation to tap gesture 3750*n*). Unadjusted representation 3730*c*1 corresponds to the representation 3724*c* in media collection 624. Further, in response to detecting tap gesture 3750*s*, device 600 displays of auto adjust affordance 1036*b* with content processing indicator 3732 for similar reasons as discussed in relation to the processing of the media item represented by representation 3724*d* in FIG. 37K.

Figure 37U:
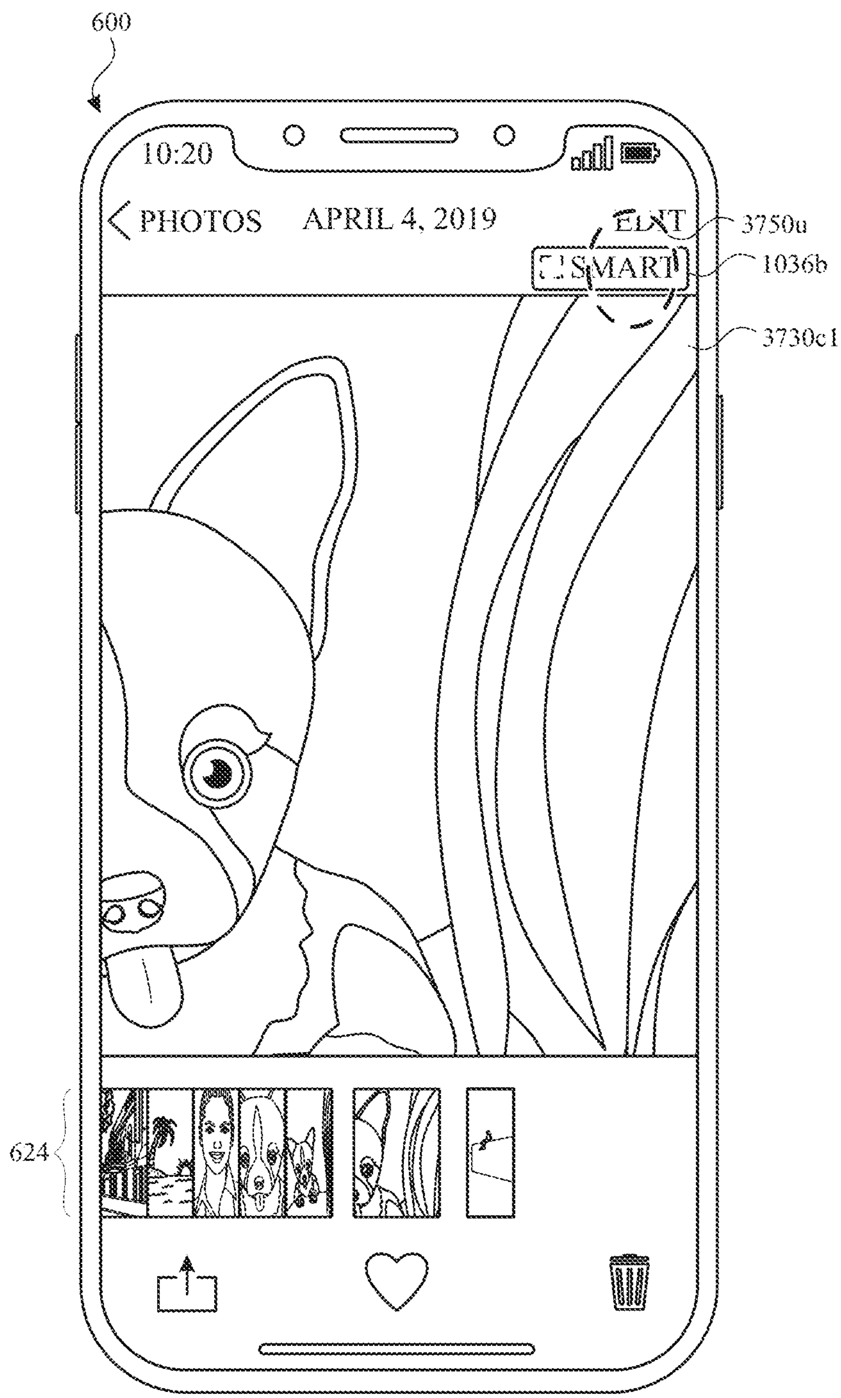

As illustrated in FIG. 37U, because device 600 has fully processed the content of the media item represented by representation 3724*c* (e.g., image with a portion of the head of dog 3784*a* missing) and because device 600 is not configured to automatically adjust captured media (as discussed in FIG. 37S), device 600 forgoes displaying an animation or an adjusted representation. In other words, device 600 maintains display of unadjusted representation 3730*c*1 because device 600 is not configured to automatically adjust captured media, as opposed to displaying an automatically adjusted representation in as discussed in FIGS. 37M-37N when device 600 was configured to automatically adjust captured media. Further, device 600 displays auto adjust affordance 1036*b* as being unselected. Here, device 600 displays auto adjust affordance 1036*b* as being unselected, instead of selected (e.g., in FIG. 37M), because device 600 is not configured to automatically adjust captured media (as discussed in FIG. 37S). Additionally, device 600 displays auto adjust affordance 1036*b*, instead of non-selectable auto adjust indicator 3734, because a determination has been made that content should be used to correct the media item represented by representation 3724*c*. Notably, because device 600 is not configured to automatically adjust captured media, device 600 forgoes displaying an adjusted representation of the media item represented by representation 3724*c* even though a determination is made that the content should be used to correct the media item represented by representation 3724*c*. At FIG. 37U, device 600 detects gesture 3750*u* at a location that corresponds to auto adjust affordance 1036*b*.

Figure 37V:
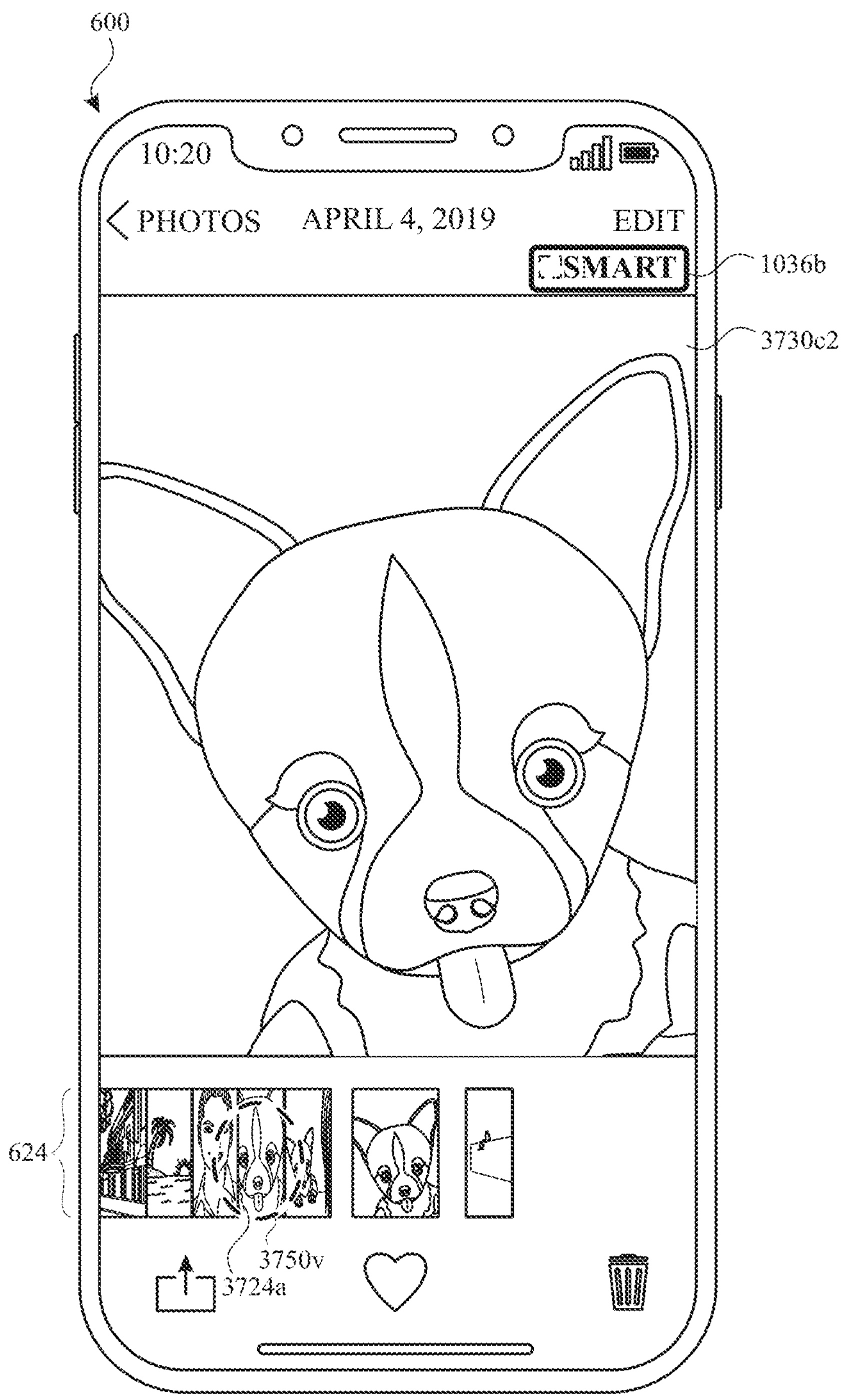

As illustrated in FIG. 37V, in response to detecting gesture 3750*u*, device 600 replaces unadjusted representation 3730*c*1 with adjusted representation 3730*c*2. Adjusted representation 3730*c*2 includes a portion of the head of dog 3784*a* (e.g., an identified object) that was not previously displayed in unadjusted representation 3730*c*1. Here, device 600 reframes the head of dog 3784*a* by bringing in additional content (e.g., in regions 602, 606, and/or portions on the sides of camera display region 604 that were not displayed as a part of live preview 630 in FIG. 37H) to display more of the head of dog 3784*a*. In some embodiments, device 600 displays an animation of the reframing the unadjusted representation 3730*c*1 by displaying several partially adjusted representations, where each partially adjusted representation is closer to the adjusted representation 3730*c*1 than the previous one in response to detecting gesture 3750*u*. Along with displaying adjusted representation 3730*c*2, device 600 also updates the representation 3724*c* in media collection 624 to match adjusted representation 3730*c*2. Further, in response to detecting gesture 3750*u*, device 600 updates auto adjust affordance 1036*b* such that auto adjust affordance 1036*b* is displayed as being selected. At FIG. 37V, device 600 detects gesture 3750*v* at a location that corresponds to the representation 3724*a* in media collection 624.

Figure 37W:
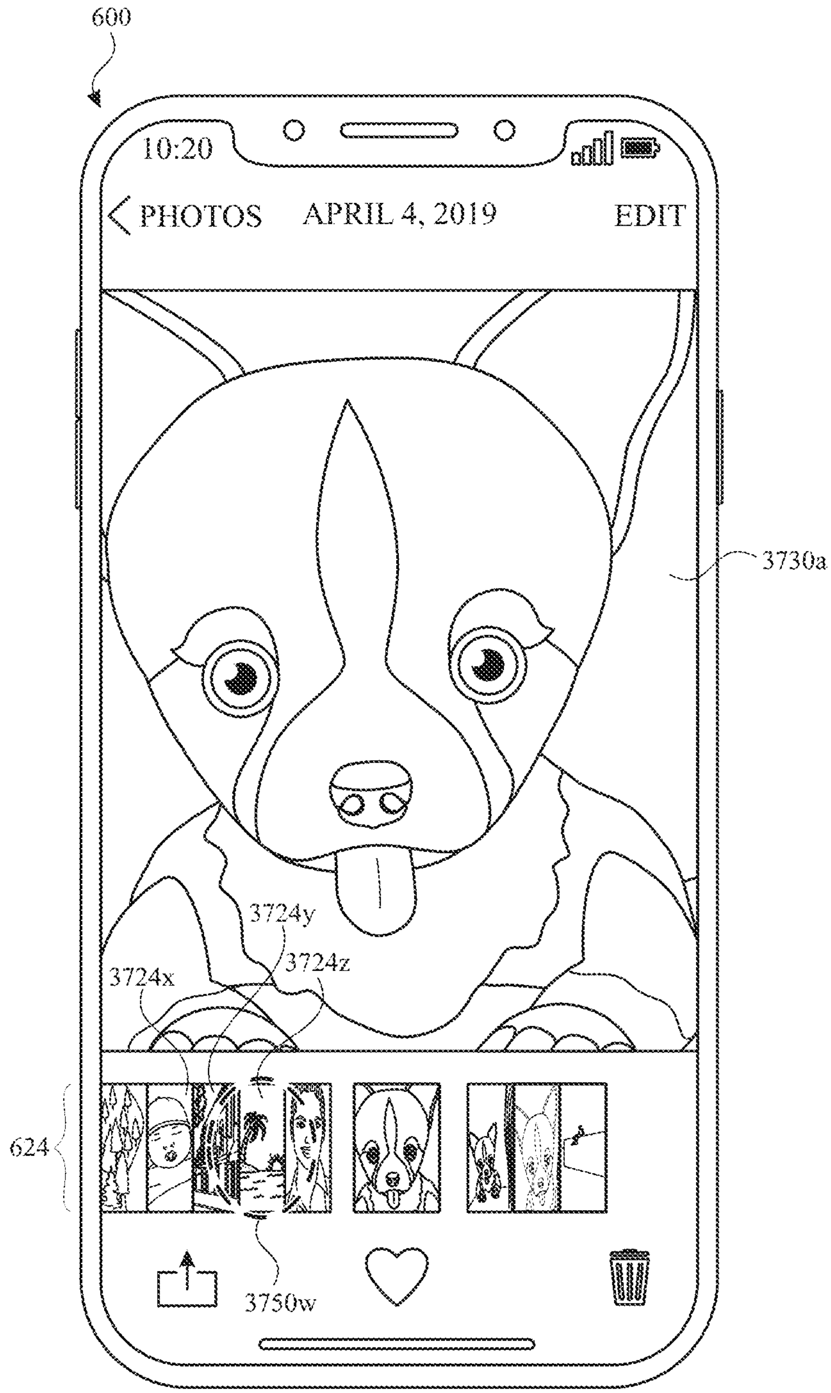

As illustrated in FIG. 37W, in response to detecting gesture 3750*v*, device 600 displays representation 3730*a* and forgoes displaying content processing indicator 3732, non-selectable auto adjust indicator 3734, and auto adjust affordance 1036*b*. In FIG. 37W, device 600 displays representation 3730*a* (which cannot be adjusted) and forgoes displaying indicators 3732 and 3734 and affordance 1036*b* because device 600 did not capture additional content when capturing the media item represented by representation 3734*a*. Looking back at 37B-37D, device 600 was not configured to capture additional content (because additional content affordance 3702*a* was set to off in FIG. 37B) when device 600 captured the media item represented by representation 3724*a* in FIGS. 37C-37D. In this example, additional content outside of the field of view of the camera is not captured when capturing the media item represented by representation 3724*a*. Turning back to FIG. 37W, in some embodiments, device 600 displays representation 3730*a* and forgoes displaying content processing indicator 3732, non-selectable auto adjust indicator 3734, and auto adjust affordance 1036*b* even when additional content is captured. In some embodiments, device 600 determines that the captured additional content is unusable such that the additional content is not saved (e.g., when the visual tearing in the image is above a certain threshold level of visual tearing).

Figure 37X:
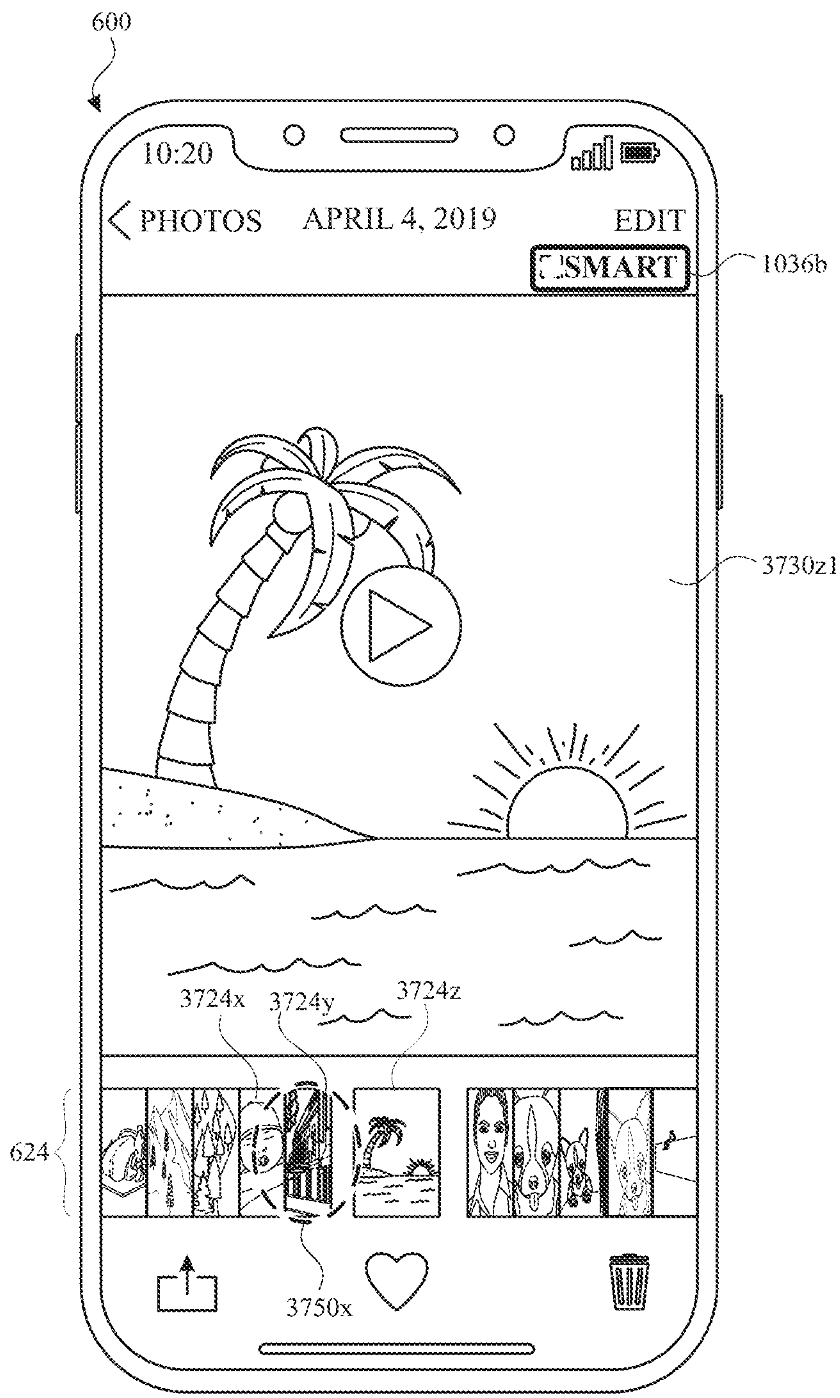

FIGS. 37X-37AA illustrate exemplary user interfaces adjusting other media (e.g., video media) using similar techniques as described in relation to FIGS. 37K-37V. In particular, FIG. 37X illustrated device 600 displaying adjusted representation 3730*z*1, which is an adjusted representation of the media item represented by representation 3724*z*. Further, FIG. 37X illustrates device 600 displaying auto adjust affordance 1036*b* that, when selected, causes device 600 to display an unadjusted representation of the media item represented by representation 3724*z* (using similar techniques to those described above in relation to tap gesture 3750*m*). In FIG. 37X, device 600 displays adjusted representation 3724*z*1 and auto adjust affordance 1036*b* without displaying content processing indicator 3732 because device 600 has fully processed the content of the media item represented by representation 3724*z* before a request was made to view the media item (e.g., a tap gesture at a location that corresponds to representation 3724*z* in media collection 624). In addition, device 600 displays adjusted representation 3730*z*1 and auto adjust affordance 1036*b* because device 600 determined that additional content should be used to stabilize the video media. Here, adjusted representation 3730*z*1 includes one or more modified frames of the media item represented by representation 3724*z* (e.g., less stable video) that have been modified using the additional content. Here, device 600 has shifted content displayed in camera display region 604 when the media item represented by representation 3724*z* was captured and, for each video frame, used additional content (e.g., in regions 602 and 606 when the media item represented by representation 3724*z* was captured) to fill in one or more gaps that resulted from the shifting of the content displayed in camera display region 604 when the media item represented by representation 3724*z* was captured. At FIG. 37X, device 600 detects tap gesture 3750*x* at a location that corresponds to representation 3724*y* in media collection 624.

Figure 37Y:
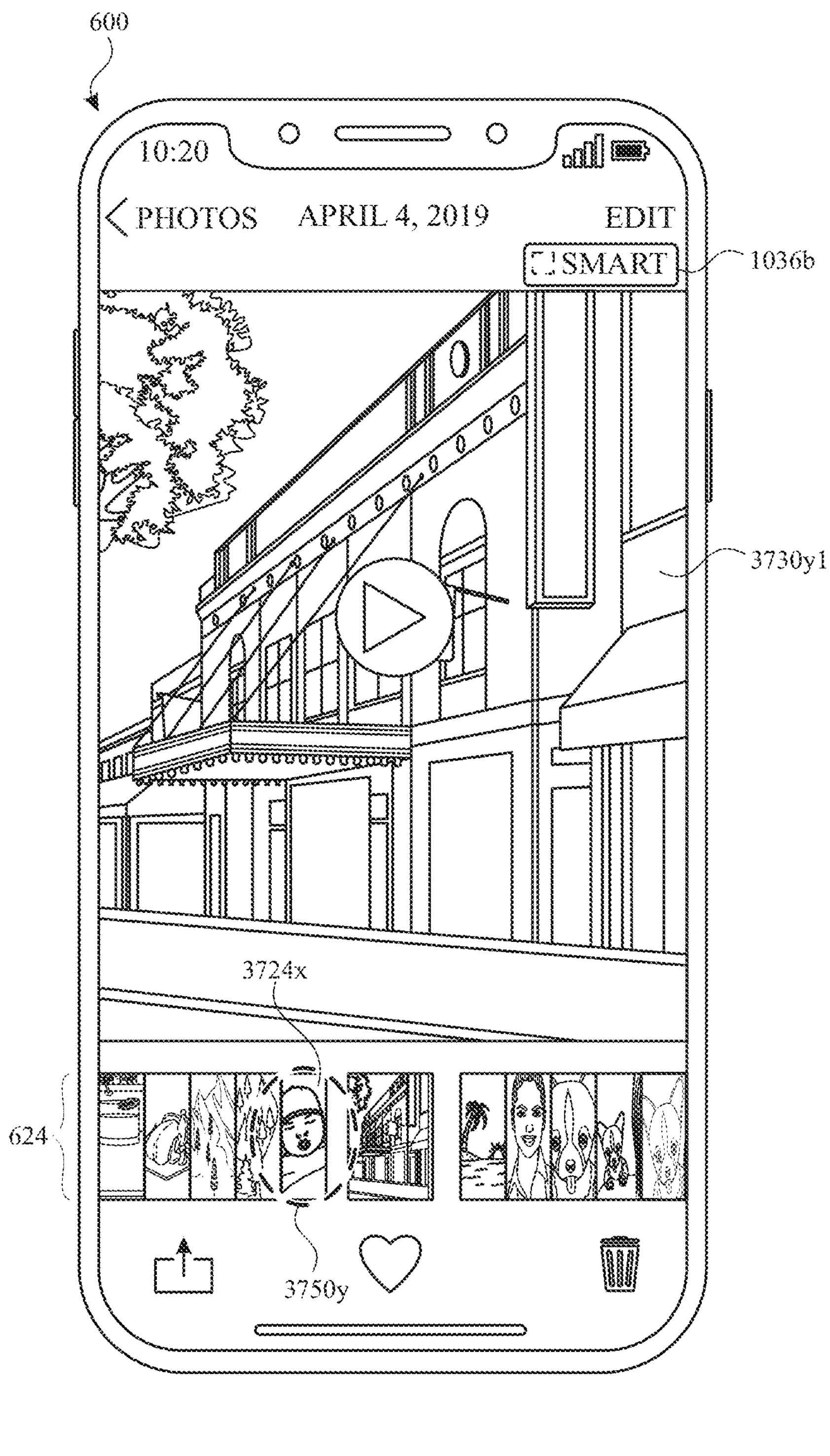

As illustrated in FIG. 37Y, in response to detecting tap gesture 3750*x*, device 600 replaces the display of adjusted representation 3730*z*1 with display of unadjusted representation 3730*y*1, which is an adjusted representation of the media item represented by representation 3724*y*. Between FIGS. 37X-37Y, device 600 was configured to not automatically adjust captured media (e.g., automatic media correction setting affordance 3702*a*1 being set to an inactive state). At FIG. 37Y, device 600 displays an unadjusted representation of the media item represented by representation 3724*z* because device 600 is not configured to automatically adjust captured media although device 600 has determined that determined that additional content should be used to correct the media (e.g., stabilize the video media). Further, device 600 displays 1036*b* as being unselected for similar reasons. At FIG. 37Y, device 600 detects tap gesture 3750*y* at a location that corresponds to representation 3724*x*.

Figure 37Z:
Figure 37A:
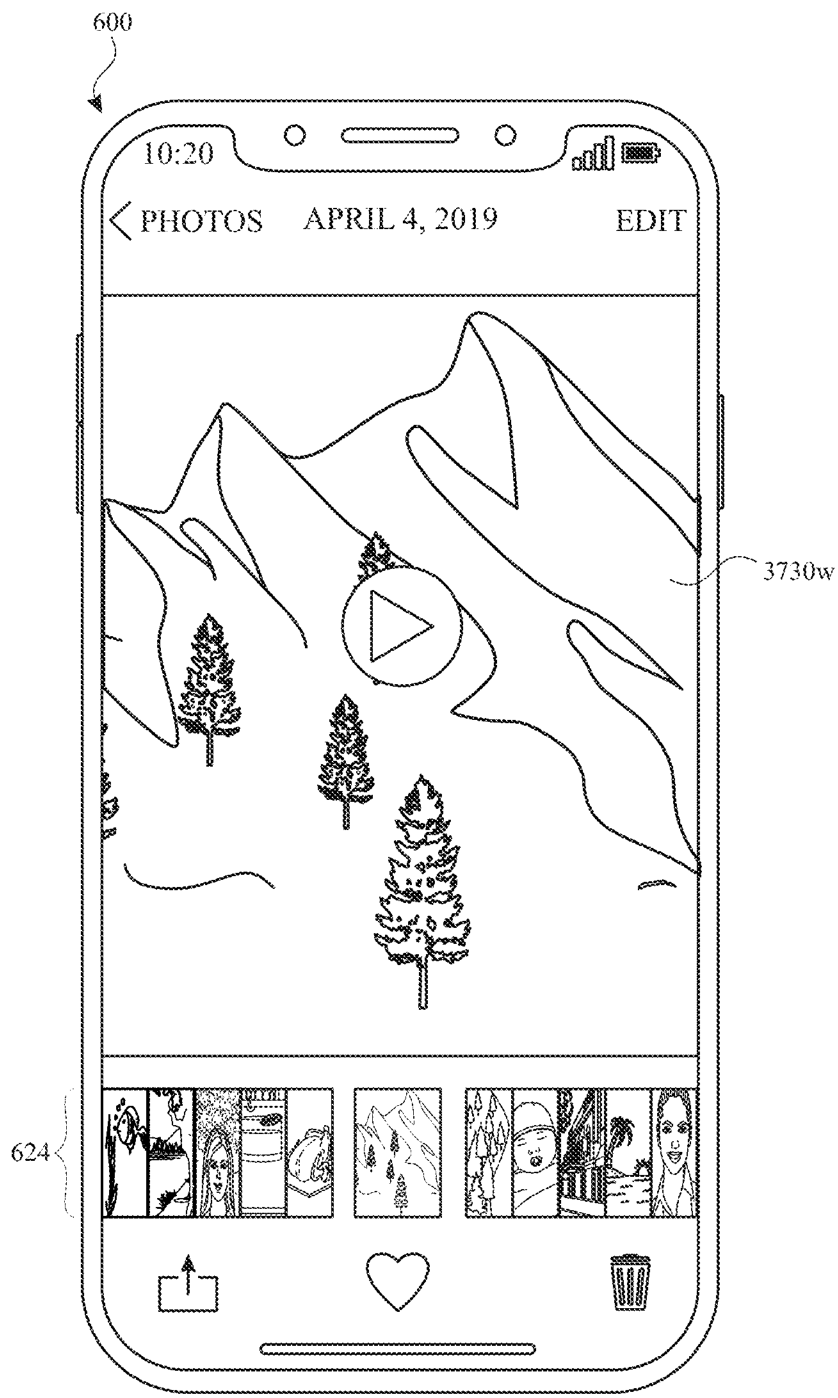

As illustrated in FIG. 37Z, in response to detecting tap gesture 3750*y*, device 600 displays unadjusted representation 3730*x*1 (which corresponds to the media item represented by representation 3724*x*) and non-selectable auto adjust indicator 3734 because additional content has been captured and a determination is made that the additional content should not be used to correct the media item represented by representation 3724*x* (e.g., stabilize the video media). At FIG. 37Z, device 600 detects tap gesture 3750*z* at a location that corresponds to representation 3724*w*.

As illustrated in FIG. 37AA, in response to detecting tap gesture 3750*z*, device 600 displays representation 3730*w*, which corresponds to the media item represented by representation 3724*w*. Device 600 displays representation 3730*w* and forgoes displaying indicators 3732 and 3734 and affordance 1036*b* because device 600 did not capture additional content when capturing the media item represented by representation 3724*w*.

The automatic adjustment of media items are not limited to image and video media that are used in the descriptions of FIGS. 37A-37AA above. For example, in some embodiments, device 600 captures media that includes audio (e.g., a video, audio recording). In some embodiments, device 600 adjusts the originally captured audio by using beamforming. In some embodiments, device 600 uses one or more microphones of device 600 to generate a single output based on directional inputs determined when zooming on an object or subject in the media.

FIGS. 38A-38C are a flow diagram illustrating a method for editing captured media using an electronic device in accordance with some embodiments. Method 3800 is performed at a device (e.g., 100, 300, 500, 600) with a display device (e.g., a touch-sensitive display). Some operations in method 3800 are, optionally, combined, the orders of some operations are, optionally, changed, and some operations are, optionally, omitted.

As described below, method 3800 provides an intuitive way for automatically adjusted captured media using an electronic device in accordance with some embodiments. The method reduces the cognitive burden on a user for adjusting captured media, thereby creating a more efficient human-machine interface. For battery-operated computing devices, enabling a user to access media that has been adjusted faster and more efficiently conserves power and increases the time between battery charges.

An electronic device (e.g., 600) includes a display device. The electronic device receives (3802) a request (e.g., 3750*j*, 3750*n*, 3750*v*, 3750*w*, 3750*x*, 3750*y*, 3750*z*) (e.g., a selection of a thumbnail image, a selection of an image capture affordance (e.g., a selectable user interface object) (e.g., a shutter affordance that, when activated, captures an image of the content displayed in the first region)) to display a representation of a previously captured media item (e.g., still images, video) that includes first content (e.g., image data (e.g., image data stored on a computer system)) from a first portion (e.g., content corresponding to live preview 630 displayed in region 604) of a field-of-view of one or more cameras (e.g., a primary or central portion of the field-of-view of the one or more cameras, a majority of which is included in representations of the field-of-view of the one or more cameras when displaying the media item) and second content (e.g., image data (e.g., image data stored on a computer system)) from a second portion (e.g., content corresponding to live preview 630 displayed in regions 602 and 606) of the field-of-view of the one or more cameras (e.g., a portion of the field-of-view of the one or more cameras that is outside of a primary or central portion of the field-of-view of the one or more cameras and is optionally captured by a different camera of the one or more cameras that the primary or central portion of the field-of-view of the one or more cameras).

In response (3804) to receiving the request to display the representation of the previously captured media item and in accordance (3806) with a determination that automatic media correction criteria are satisfied, the electronic device displays (3810), via the display device, a representation (e.g., 3730*d*3) of the previously captured media item that includes a combination of the first content and the second content. In some embodiments, automatic media correction criteria include one or more criteria that are satisfied when the media was captured during a certain time frame, the media has not been viewed, the media includes the second representation, the media includes one or more visual aspects that can be corrected (e.g., video stabilization, horizon correction, skew/distortion (e.g., horizontal, vertical) correction) using the second content. In some embodiments, the representation of the media item that includes the combination of the first and the second content is a corrected version (e.g., stabilized, horizon corrected, vertical perspective corrected, horizontal perspective corrected) of a representation of the media. In some embodiments, the representation of the media item that includes the combination of the first and the second content includes displaying a representation of at least some of the first content and a representation of at least some of the content. In some embodiments, the representation of the media item that includes the combination of the first content and the second content does not include displaying a representation of at least some of the second content (or first content), instead the representation of the media item that includes the combination of the first content and the content may be generated using at least some of the second content without displaying at least some of the second content. Displaying a representation of captured media that has been adjusted (e.g., representation that includes first and second content) when prescribed conditions are met allows the user to quickly view a representation of media that has been adjusted without having to adjust portions of the image that should be adjusted manually. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In response (3804) to receiving the request to display the representation of the previously captured media item and in accordance (3810) with a determination that automatic media correction criteria are not satisfied, the electronic device displays (3816), via the display device, a representation (e.g., 3730*b*1, 3730*c*1) of the previously captured media item that includes the first content and does not include the second content. In some embodiments, the representation of the previously captured media item that includes the first content and does not include the second content is a representation that has not been corrected (e.g., corrected using the second content in order to stabilize, correct the horizon, correct the vertical or horizontal perspective of the media). Displaying a representation of captured media that has not been adjusted (e.g., representation that includes first content but does not include second content) when prescribed conditions are met allows the user to quickly view a representation of media that has been not adjusted without having to manually reverse adjustments that should have been made if the media were automatically adjusted. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, before receiving the request to display the representation of the media item, displaying, via the display device, a camera user interface that includes a first region (e.g., 604) (e.g., a camera display region). In some embodiments, the first region includes a representation of the first portion of a field-of-view of the one or more cameras. In some embodiments, the camera user interface includes a second region (e.g., 602, 606) (e.g., a camera control region). In some embodiments, the second region including a representation of a second portion of the field-of-view of the one or more cameras. In some embodiments, the representation of the second portion of the field-of-view of the one or more cameras is visually distinguished (e.g., having a dimmed appearance) (e.g., having a semi-transparent overlay on the second portion of the field-of-view of the one or more cameras) from the representation of the first portion. In some embodiments, the representation of the second portion of the field-of-view of the one or more cameras has a dimmed appearance when compared to the representation of the first portion of the field-of-view of the one or more cameras. In some embodiments, the representation of the second portion of the field-of-view of the one or more cameras is positioned above and/or below the camera display region in the camera user interface. Displaying a second region that is visually different from a first region provides the user with feed about content that the main content that will be captured and used to display media and the additional content that may be captured to display media, allowing a user to frame the media to keep things in/out the different regions when capture media. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance (3806) with the determination that automatic media correction criteria are satisfied, the electronic device displays (3814) a first correction affordance (e.g., 1036*b* in, e.g., FIG. 37M) indicating that an automatic adjustment has been applied to the previously captured media item (e.g., an automatic adjustment affordance (e.g., a selectable user interface object) that is displayed in a first state (e.g., an active state (e.g., shown as being selected (e.g., pressed, displayed as bolded, darkened, in a first color, with first characters or markings))) that indicates that automatic adjustment has been applied to the previously captured media item). Displaying an automatic adjustment affordance that indicates that automatic adjustment is applied provides the user with feedback about the current state of the affordance and provides visual feedback to the user indicating that an operation to reverse the adjustment applied to a representation will be performed when the user activates the icon. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance (3808) with a determination that automatic media correction criteria are not satisfied, the electronic device displays (3818) a second correction affordance (e.g., 1036*b* in, e.g., FIG. 37U). In some embodiments, the second automatic adjustment affordance indicating that the automatic adjustment has not been applied to the previously captured media item (e.g., an automatic adjustment affordance (e.g., a selectable user interface object) that is displayed in a second state (e.g., an inactive state (e.g., shown as being unselected (e.g., depressed, displayed as without bolding or lightened, in a second color, with second characters or markings))) that indicates that automatic adjustment has not been applied to the previously captured media item). In some embodiments, the second automatic adjustment affordance is visually different from the first automatic adjustment affordance. In some embodiments, in accordance with a determination that the second content can be used to correct the media, the electronic device displays a third automatic adjustment affordance indicating that the automatic adjustment has not been applied to the previously captured media item, displaying a second automatic adjustment affordance, the second automatic adjustment affordance indicating that the automatic adjustment has not been applied to the previously captured media item (e.g., an automatic adjustment affordance that is displayed in a second state (e.g., an inactive state (e.g., shown as being unselected (e.g., depressed, displayed as without bolding or lightened, in a second color, with second characters or markings))) that indicates that automatic adjustment has not been applied to the previously captured media item. In some embodiments, the second automatic adjustment affordance is visually different from the first automatic adjustment affordance; and in accordance with a determination that the second content cannot be used to correct the media, the electronic device forgoes displaying the first automatic adjustment affordance and the second automatic adjustment affordance. In some embodiments, the determination is made that the second content can be used to correct the media based on an analysis that the one or more visual aspects that can be corrected (e.g., video stabilization, horizon correction, skew/distortion (e.g., horizontal, vertical) correction) using the second content in the media. In some embodiments, the analysis includes computing a confidence score and comparing the confidence score to a threshold. In some embodiments, when the confidence score is above (or equal to) the threshold the determination is made that content can be used to correct the media. Displaying an automatic adjustment affordance that indicates that automatic adjustment is not applied provides the user with feedback about the current state of the affordance and provides visual feedback to the user indicating that an operation to perform an adjustment to a representation will be performed when the user activates the icon. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the first automatic adjustment affordance (e.g., 1036*b*) and displaying, via the display device, the representation (e.g., 3730*d*3) of the previously captured media item that includes the combination of the first content and the second content, the electronic device receives a first input (e.g., 3750*m*) (e.g., a tap) corresponding to selection of the first automatic adjustment affordance.

In some embodiments, in response to receiving the first input corresponding to selection of the first automatic adjustment affordance, the electronic device displays, via the display device, the representation (e.g., 3730*c*1) of the previously captured media item that includes the first content and does not include the second content. In some embodiments, in response to receiving the first input corresponding to selection of the first automatic adjustment affordance, the electronic device also ceases to display the representation of the previously captured media item that includes a combination of the first content and the second content. In some embodiments, displaying the representation of the previously captured media item that includes the first content and does not include the second content replaces the display of the representation of the previously captured media item that includes a combination of the first content and the second content. Updating the display of an automatic adjustment affordance to indicate that automatic adjustment is not applied provides the user with feedback about the current state of an operation and provides visual feedback to the user indicating that an operation to perform an adjustment to a representation was performed in response to the previous activation of the affordance. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the second automatic adjustment affordance (e.g., 1036*b*) and displaying, via the display device, the representation (e.g., 3730*c*1) of the previously captured media item that includes the first content and does not include the second content, the electronic device receives a second input (e.g., 3750*b*) (e.g., a tap) corresponding to selection of the second automatic adjustment affordance. In some embodiments, in response to receiving the second input corresponding to selection of the second automatic adjustment affordance, the electronic device displays, via the display device, the representation (e.g., 3730*c*2) of the previously captured media item that includes the combination of the first content and the second content. In some embodiments, in response to receiving the first input corresponding to selection of the first automatic adjustment affordance, the electronic device also ceases to display the representation of the previously captured media item that includes the first content and does not include the second content. In some embodiments, displaying the representation of the previously captured media item that includes a combination of the first content and the second content replaces the display of the representation of the previously captured media item that includes the first content and does not include the second content. Updating the display of an automatic adjustment affordance to indicate that automatic adjustment is applied provides the user with feedback about the current state of an operation and provides the user with more control to visual feedback to the user indicating that an operation to reverse an adjustment to a representation was performed in response to the previous activation of the affordance. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the previously captured media item is an image (e.g., a still photo, animated images (e.g., a plurality of images)). In some embodiments, the representation (e.g., 3730*d*3) of the previously captured media item that includes the combination of the first content and the second content includes an edge portion (e.g., a horizon (e.g., a corrected (e.g., straighten) horizon) (e.g., skyline) in the image). In some embodiments, he representation (e.g., 3730*d*1) of the previously captured media item that includes the first content and does not include the second content further does not include the edge portion (e.g., as described above in relation to FIG. 24A-FIG. 24H and in method 2500 described above in relation to FIGS. 25A-FIG. 25B). In some embodiments, the representation of the previously captured media item that includes the combination of the first content and the second content includes a visible first horizon is created by rotating a representation of the first content to straighten the visible horizon and bringing in a representation of a portion of the second content to fill in the empty space left from rotating the representation. In some embodiments, the electronic device corrections to vertical perspective distortion and/or the horizontal perspective distortion of the image, using similar techniques to those described above in relation to FIG. 24A-FIG. 24H and in method 2500 described above in relation to FIGS. 25A-FIG. 25B of flow description.

In some embodiments, the previously captured media item is a video (e.g., a plurality of images). In some embodiments, the representation (e.g., 3730*z*1) of the previously captured media item that includes the combination of the first content and the second content includes a first amount of movement (e.g., movement between successive frames of video) (e.g., a stabilized video). In some embodiments, the representation of the previously captured media item that includes the first content and does not include the second content includes a second amount of movement (e.g., movement between successive frames of video) (e.g., a non-stabilized video) that is different from the first amount of movement. In some embodiments, the electronic device uses the second content to reduce the amount of movement in the video (e.g., which is indicated in the representation of the previously captured media item that includes the combination of the first content and the second content). In some embodiments, the representation of the previously captured media item that includes the combination of the first content and the second content is a more stable version (e.g., a version that includes one or more modified frames of the original video (e.g., less stable video) that have been modified (e.g., using content that is outside (e.g., second content) of the visually displayed frame (e.g., content corresponding to the first content) of the video) to reduce (e.g., smooth) motion (e.g., blur, vibrations) between frames when the video is played back of the captured media than the first content and does not include the second content includes a second amount of movement. In some embodiments, to reduce motion, the electronic device shifts the first content for a plurality of video frames and, for each video frame, uses second content to fill in one or more gaps (e.g., adding some of the second content to the first content to display a representation of a respective video frame) that resulted from the shifting of the first content.

In some embodiments, the previously captured media item includes (e.g., the second content includes) an identifiable (e.g., identified, visually observable/observed, detectable/detected) object (e.g., a ball, a person's face). In some embodiments, the representation (e.g., 3730c2) of the previously captured media item that includes the combination of the first content and the second content includes a portion of the identifiable object (e.g., a portion of the identifiable/identified object that is represented by the first content). In some embodiments, the representation (e.g., 3730c1) of the previously captured media item that includes the first content and does not include the second content does not include the portion of the identifiable object. In some embodiments, electronic device uses the second content to reframe (e.g., bring an object (e.g., subject) into the frame)) a representation of the first content that does not include the second content such that the identifiable object is not cut off (e.g., all portions of visual object is included) in the representation of the first content that does include the second content.

In some embodiments, the automatic media correction criteria includes a second criterion that is satisfied when a determination is made (e.g., above a respective confidence threshold) that the previously captured media item includes one or more visual aspects (e.g., video stabilization, horizon correction, skew/distortion correction) that can be corrected using the second content from the second portion of the field-of-view of the one or more cameras. In some embodiments, the determination that the previously captured media item includes one or more visual characteristics is made based on a computed confidence value that is determined using the content of the previously captured media item. In some embodiments, when the computed confidence value is above (or equal to) a threshold, the determination is satisfied. In some embodiments, when the computed confidence value is below (or equal to) a threshold, the determination is not satisfied.

In some embodiments, the automatic media correction criteria includes a third criterion that is satisfied when the second criterion has been satisfied before the previously captured media was displayed (e.g., viewed) (or before a request to display was received by the electronic device, such as a request to view a photo roll user interface or a photo library or a request review recently captured media).

In some embodiments, in response to receiving the request to display the representation of the previously captured media item and in accordance with a determination that automatic media correction criteria are satisfied, the electronic device displays, concurrently with the representation of the previously captured media item that includes a combination of the first content and the second content, a third correction affordance (e.g., 1036b) that, when selected, causes the electronic device to perform a first operation. In some embodiments, the first operation includes replacing the representation of the previously captured media item that includes a combination of the first content and the second content with the representation of the previously captured media item that includes the first content and does not include the second content. Displaying an automatic adjustment affordance that indicates that automatic adjustment is applied when prescribed conditions are met provides the user with feedback about the current state of the affordance and provides visual feedback to the user indicating that an operation to reverse the adjustment applied to a representation will be performed when the user activates the icon. Providing improved visual feedback to the user when prescribed conditions are met enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the automatic media correction criteria includes a criterion that is satisfied when an automatic application setting (e.g., 3702a1) is enabled and not satisfied when the automatic application setting is disabled. In some embodiments, the automatic application setting (e.g., 3702a1) is a user-configurable setting (e.g., the electronic device, in response to user input (e.g., input provided via a settings user interface), modifies the state of the automatic application setting).

In some embodiments, in response to receiving the request to display the representation of the previously captured media item and in accordance with a determination that automatic media correction criteria are not satisfied and in accordance with a determination that a first set of criteria are satisfied (e.g., a set of criteria that govern whether a selectable affordance should be presented), the electronic device displays, concurrently with the representation of the previously captured media item that includes the first content and does not include the second content, a fourth correction affordance (e.g., 1036b) that, when selected, causes the electronic device to perform a second operation (e.g., replacing the representation of the previously captured media item that includes the first content and does not include the second content with the representation of the previously captured media item that includes a combination of the first content and the second content). In some embodiments, the first set of criteria is not satisfied when the electronic device determines that the second content is not suitable for use in an automatic correction operation (e.g., is not suitable for automatic display in a representation together with the first content. Displaying an automatic adjustment affordance that indicates that automatic adjustment is not applied when prescribed conditions are met provides the user with feedback about the current state of the affordance and provides visual feedback to the user indicating that an operation to reverse the adjustment applied to a representation will be performed when the user activates the icon. Providing improved visual feedback to the user when prescribed conditions are met enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to receiving the request to display the representation of the previously captured media item and in accordance with a determination that automatic media correction criteria are not satisfied and in accordance with a determination that the first set of criteria are not satisfied, displaying, concurrently with the representation of the previously captured media item that includes the first content and does not include the second content, a non-selectable indicator (e.g., 3734) (e.g., an indicator that, when selected, does not cause the electronic device to perform an operation (e.g., perform any operation); the non-selectable correction indicator is a graphical element of the user interface that is non-responsive to user inputs). In some embodiments, the first operation and the second operation are the same operation. In some embodiments, the first operation and the second operation are different operations. In some embodiments, the first correction indicator and the second correction indicator have the same visual appearance. In some embodiments, the first correction affordance and the second correction affordance have a different visual appearance (e.g., the first correction affordance has a bolded appearance and the second correction affordance does not have a bolded appearance). In some embodiments, displaying the non-selectable indicator includes forgoing displaying the second correction affordance (e.g., display of the second correction affordance and display of the non-selectable indicator are mutually exclusive). In some embodiments, the second correction affordance, when displayed, is displayed at a first location and the non-selectable indicator, when displayed, is displayed at the first location. Displaying a non-selectable indicator that indicates that additional content has been captured provides a user with visual feedback additional content has been captured, but the user is not able to use the content to automatically adjust the image in response to an input that corresponds to the location of the indicator. Providing improved visual feedback to the user when prescribed conditions are met enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response (3804) to receiving the request to display the representation of the previously captured media item and in accordance (3808) with a determination that content processing criteria are satisfied, the electronic device displays (3814) a content processing indicator (e.g., 3732) (e.g., an animated graphical object (e.g., a spinning icon or an animated progress bar) that indicates that previously captured media item is being processed). In some embodiments, the content processing criteria are satisfied when the electronic device has not completed a processing operation on the previously captured media item (e.g., an operation to determine whether or not to automatically generate a representation of the previously captured media item that includes a combination of the first content and the second content or an operation to determine how to combine the first content and the second content to generate a representation of the previously capture media item that includes a combination of the first content and the second content. In some embodiments, in response (3804) to receiving the request to display the representation of the previously captured media item and in accordance (3808) with a determination that the content processing criteria are not satisfied, the electronic device forgoes (3820) displaying the content processing indicator. In some embodiments, the content processing indicator, when displayed, is displayed at the first location (e.g., the first location at which the first correction affordance, the second correction affordance, and the non-selectable indicator are displayed, when they are displayed. Displaying a progressing indicator only when prescribed conditions are met allows the user to quickly recognize whether a media item that corresponds to a currently displayed representation has additional content that is still being processed and provides the user notice that the current representation that is displayed can change. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the content processing indicator and in accordance with a determination the content processing criteria are no longer satisfied (e.g., because the content processing has been completed), the electronic device ceases to display the content processing indicator (e.g., 3732). In some embodiments, the content processing indicator is replaced with the first correction affordance (e.g., if the automatic media correction criteria are satisfied), the second correction affordance (e.g., if the automatic correction criteria are not satisfied, and the first set of criteria are satisfied), or the non-selectable indicator (e.g., if the automatic correction criteria are not satisfied and the first set of criteria are not satisfied).

In some embodiments, while displaying the representation of the previously captured media item that includes the first content and does not include the second content and while displaying the content processing indicator and in accordance with a determination that the content processing criteria are no longer satisfied, the electronic device replaces the representation (e.g., 3730*c*1) of the previously captured media item that includes the first content and does not include the second content with the representation (e.g., 3730*c*3) of the previously captured media item that includes a combination of the first content and the second content. Updating the displayed representation only when prescribed conditions are met allows a user to quickly recognize that the representation has been adjusted without requiring additional user input. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representation of the previously captured media item that includes the first content and does not include the second content and while displaying the content processing indicator, the electronic device displays a second representation (e.g., 3724 in FIG. 37K) (e.g., a reduced sized representation; a reduced-sized representation in a set of reduced-sized representations of a set of previously captured media items that includes the previously captured media item; a thumbnail representing the media item) of the previously captured media item that includes the first content and does not include the second content. In some embodiments, while displaying the second presentation of the of the previously captured media item that includes the first content and does not include the second content and in accordance with a determination that the content processing criteria are no longer satisfied, the electronic device replaces the second representation of the previously captured media item that includes the first content and does not include the second content with a second representation (e.g., 3724 in FIG. 37M) (e.g., a reduced sized representation; a reduced-sized representation in a set of reduced-sized representations of a set of previously captured media items that includes the previously captured media item; a thumbnail representing the media item) of the previously captured media item that includes a combination of the first content and the second content. Updating the displayed representation only when prescribed conditions are met allows a user to quickly recognize that the representation has been adjusted without requiring additional user input. Performing an optimized operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the representation of the previously captured media item that includes a combination of the first content and the second content, the electronic device displays an animation (e.g., reverse of 3730*d*1-3730*d*3 in FIGS. 37K-37M) of the representation of the previously captured media item that includes a combination of the first content and the second content transitioning to the representation of the previously captured media item that includes the first content and does not include the second content (e.g., displaying a zoom in or out, translation and/or cross fade animation that transitions from the representation of the combined first content and second content to the representation of the first content). In some embodiments, the animations in FIGS. 37K-37M can be reversed.

In some embodiments, while displaying the representation of the previously captured media item that includes the first content and does not include the second content, the electronic device displays an animation (e.g., 3730*d*1-3730*d*3 in FIGS. 37K-37M) of the representation of the previously captured media item that includes the first content and does not include the second content transitioning to representation of the previously captured media item that includes a combination of the first content and the second content (e.g., displaying a zoom in or out, translation and/or cross fade animation that transitions from the representation of the first content to the representation of the combination of the first content and the second content).

In some embodiments, the electronic device receives a request (e.g., 3750*v*) (e.g., a selection of a thumbnail image, a selection of an image capture affordance (e.g., a selectable user interface object) (e.g., a shutter affordance that, when activated, captures an image of the content displayed in the first region)) to display a representation (e.g., 3730*a*) of a media item (e.g., still images, video) that includes third content (e.g., image data (e.g., image data stored on a computer system)) from the first portion of a field-of-view of one or more cameras (e.g., a primary or central portion of the field-of-view of the one or more cameras, a majority of which is included in representations of the field-of-view of the one or more cameras when displaying the media item) and does not include fourth content (e.g., image data (e.g., image data stored on a computer system); does not include any content from the second portion) from the second portion of the field-of-view of the one or more cameras (e.g., a portion of the field-of-view of the one or more cameras that is outside of a primary or central portion of the field-of-view of the one or more cameras and is optionally captured by a different camera of the one or more cameras that the primary or central portion of the field-of-view of the one or more cameras). In some embodiments, in response to receiving the request to display the representation (e.g., 3730*a*) of the previously captured media item that includes third content from the first portion of the field-of-view of the one or more cameras and does not include fourth content from the second portion of the field-of-view of the one or more cameras, the electronic device forgoes to display of an indication (e.g., 1036*b* and/or 3724) that additional media content outside of the first portion of the field of view of the one or more cameras is available. In some embodiments, the electronic device forgoes displaying the first automatic adjustment affordance (e.g., 1036*b*). Forgoing to display an indication that additional content is not available to adjust a representation of the media provides a user with visual feedback that additional content has not been captured so the user will not be able to adjust a representation of the media with the additional content. Providing improved visual feedback to the user when prescribed conditions are met enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 3800 (e.g., FIGS. 38A-36C) are also applicable in an analogous manner to the methods described above. For example, methods 700, 900, 1100, 1300, 1500, 1700, 1900, 2100, 2300, 2500, 2700, 2800, 3000, 3200, 3400, and 3600 optionally include one or more of the characteristics of the various methods described above with reference to method 3800. For example, method 3200, optionally employs, media correction techniques as described above in relation to method 3800. For brevity, these details are not repeated below The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to manage media. The present disclosure contemplates that in some instances, this gathered data may include personal information data that uniquely identifies or can be used to contact or locate a specific person. Such personal information data can include location-based data or any other identifying or personal information.

The present disclosure recognizes that the use of such personal information data, in the present technology, can be used to the benefit of users. For example, the personal information data can be used to enable better media management. Accordingly, use of such personal information data enables users to more easily capture, edit, and access media. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of location services, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, media can be captured, accessed, and edited by inferring preferences based on non-personal information data or a bare minimum amount of personal information, such as the content being requested by the device associated with a user, other non-personal information available to the services, or publicly available information.

What is claimed is:

1. An electronic device, comprising:

a display device;

one or more cameras;

one or more processors; and memory storing one or more programs configured to be executed by the one or more processors, the one or more programs including instructions for:

displaying, via the display device, a media capture user interface that includes a live preview, wherein the live preview includes displaying a representation of a field-of-view of the one or more cameras;

while displaying the media capture user interface, detecting, via the one or more cameras, changes in the field-of-view of the one or more cameras; and in response to detecting the changes in the field-of-view of the one or more cameras and in accordance with a determination that variable frame rate criteria are satisfied, wherein the variable frame rate criteria include a criterion that is satisfied when ambient light in the field-of-view of the one or more cameras is below a first threshold value:

in accordance with a determination that the detected changes in the field-of-view of the one or more cameras satisfy movement criteria, updating the live preview that includes the representation of the field-of-view of the one or more cameras based on the detected changes in the field-of-view of the one or more cameras, wherein the updating of the live preview occurs at a first frame rate when the detected changes in the field-of-view of the one or more cameras satisfy movement criteria, and wherein the representation of the field-of-view of the one or more cameras updated based on the detected changes in the field-of-view of the one or more cameras at the first frame rate is displayed, on the display device, at a first brightness; and in accordance with a determination that the detected changes in the field-of-view of the one or more cameras do not satisfy the movement criteria, updating the live preview that includes the representation of the field-of-view of the one or more cameras based on the detected changes in the field-of-view of the one or more cameras, wherein the updating of the live preview occurs at a second frame rate when the detected changes in the field-of-view of the one or more cameras do not satisfy the movement criteria and wherein the second frame rate is lower than the first frame rate, and wherein the representation of the field-of-view of the one or more cameras updated based on the detected changes in the field-of-view of the one or more cameras at the second frame rate that is lower than the first frame rate is displayed, on the display device, at a second brightness that is visually brighter than the first brightness.

2. The electronic device of claim 1, wherein, prior to detecting the changes in the field-of-view of the one or more cameras, the representation of the field-of-view of the one or more cameras is updated at a third frame rate; and wherein the one or more programs further include instructions for:

in response to detecting the changes in the field-of-view of the one or more cameras and in accordance with a determination that the variable frame rate criteria are not satisfied, maintaining the updating of the representation of the field-of-view of the one or more cameras at the third frame rate.

3. The electronic device of claim 2, wherein the low-light variable frame rate criteria include a criterion that is satisfied when a flash mode is inactive.

4. The electronic device of claim 1, wherein displaying the media capture user interface includes:

in accordance with a determination that the variable frame rate criteria are satisfied, displaying an indication that a variable frame rate mode is active; and in accordance with a determination that the variable frame rate criteria are not satisfied, displaying the media capture user interface without the indication that the variable frame rate mode is active.

5. The electronic device of claim 1, wherein the second frame rate is based on an amount of ambient light in the field-of-view of the one or more cameras being below a second threshold value.

6. The electronic device of claim 1, wherein the detected changes include detected movement, and wherein the second frame rate is based on an amount of the detected movement.

7. The electronic device of claim 1, wherein the movement criteria includes a criterion that is satisfied when the detected changes in the field-of-field of the one or more cameras correspond to movement of the electronic device that is greater than a movement threshold value.

8. A non-transitory computer-readable storage medium storing one or more programs configured to be executed by one or more processors of an electronic device with a display device and one or more cameras, the one or more programs including instructions for:

displaying, via the display device, a media capture user interface that includes a live preview, wherein the live preview includes displaying a representation of a field-of-view of the one or more cameras;

while displaying the media capture user interface, detecting, via the one or more cameras, changes in the field-of-view of the one or more cameras; and in response to detecting the changes in the field-of-view of the one or more cameras and in accordance with a determination that variable frame rate criteria are satisfied, wherein the variable frame rate criteria include a criterion that is satisfied when ambient light in the field-of-view of the one or more cameras is below a first threshold value:

in accordance with a determination that the detected changes in the field-of-view of the one or more cameras satisfy movement criteria, updating the live preview that includes the representation of the field-of-view of the one or more cameras based on the detected changes in the field-of-view of the one or more cameras, wherein the updating of the live preview occurs at a first frame rate when the detected changes in the field-of-view of the one or more cameras satisfy movement criteria, and wherein the representation of the field-of-view of the one or more cameras updated based on the detected changes in the field-of-view of the one or more cameras at the first frame rate is displayed, on the display device, at a first brightness; and in accordance with a determination that the detected changes in the field-of-view of the one or more cameras do not satisfy the movement criteria, updating the live preview that includes the representation of the field-of-view of the one or more cameras based on the detected changes in the field-of-view of the one or more cameras, wherein the updating of the live preview occurs at a second frame rate when the detected changes in the field-of-view of the one or more cameras do not satisfy the movement criteria and wherein the second frame rate is lower than the first frame rate, and wherein the representation of the field-of-view of the one or more cameras updated based on the detected changes in the field-of-view if the one or more cameras at a second frame rate that is lower than the first frame rate is displayed, on the display device, at a second brightness that is visually brighter than the first brightness.

9. The non-transitory computer-readable storage medium of claim 8, wherein, prior to detecting the changes in the field-of-view of the one or more cameras, the representation of the field-of-view of the one or more cameras is updated at a third frame rate; and wherein the one or more programs further include instructions for:

in response to detecting the changes in the field-of-view of the one or more cameras and in accordance with a determination that the variable frame rate criteria are not satisfied, maintaining the updating of the representation of the field-of-view of the one or more cameras at the third frame rate.

10. The non-transitory computer-readable storage medium of claim 9, wherein the low-light variable frame rate criteria include a criterion that is satisfied when a flash mode is inactive.

11. The non-transitory computer-readable storage medium of claim 9, wherein displaying the media capture user interface includes:

in accordance with a determination that the variable frame rate criteria are satisfied, displaying an indication that a variable frame rate mode is active; and in accordance with a determination that the variable frame rate criteria are not satisfied, displaying the media capture user interface without the indication that the variable frame rate mode is active.

12. The non-transitory computer-readable storage medium of claim 9, wherein the second frame rate is based on an amount of ambient light in the field-of-view of the one or more cameras being below second threshold value.

13. The non-transitory computer-readable storage medium of claim 9, wherein the detected changes include detected movement, and wherein the second frame rate is based on an amount of the detected movement.

14. The non-transitory computer-readable storage medium of claim 9, wherein the movement criteria includes a criterion that is satisfied when the detected changes in the field-of-field of the one or more cameras correspond to movement of the electronic device that is greater than a movement threshold value.

15. A method, comprising:

at an electronic device with a display device and one or more cameras:

displaying, via the display device, a media capture user interface that includes a live preview, wherein the live preview includes displaying a representation of a field-of-view of the one or more cameras;

while displaying the media capture user interface, detecting, via the one or more cameras, changes in the field-of-view of the one or more cameras; and in response to detecting the changes in the field-of-view of the one or more cameras and in accordance with a determination that variable frame rate criteria are satisfied, wherein the variable frame rate criteria include a criterion that is satisfied when ambient light in the field-of-view of the one or more cameras is below a first threshold value:

in accordance with a determination that the detected changes in the field-of-view of the one or more cameras satisfy movement criteria, updating the live preview that includes the representation of the field-of-view of the one or more cameras based on the detected changes in the field-of-view of the one or more cameras, wherein the updating of the live preview occurs at a first frame rate when the detected changes in the field-of-view of the one or more cameras satisfy movement criteria, and wherein the representation of the field-of-view of the one or more cameras updated based on the detected changes in the field-of-view of the one or more cameras at the first frame rate is displayed, on the display device, at a first brightness; and in accordance with a determination that the detected changes in the field-of-view of the one or more cameras do not satisfy the movement criteria, updating the live preview that includes the representation of the field-of-view of the one or more cameras based on the detected changes in the field-of-view of the one or more cameras, wherein the updating of the live preview occurs at a second frame rate when the detected changes in the field-of-view of the one or more cameras do not satisfy the movement criteria and wherein the second frame rate is lower than the first frame rate, and wherein the representation of the field-of-view of the one or more cameras updated based on the detected changes in the field-of-view if the one or more cameras at a second frame rate that is lower than the first frame rate is displayed, on the display device, at a second brightness that is visually brighter than the first brightness.

16. The method of claim 15, wherein, prior to detecting the changes in the field-of-view of the one or more cameras, the representation of the field-of-view of the one or more cameras is updated at a third frame rate; and wherein the method further comprises:

in response to detecting the changes in the field-of-view of the one or more cameras and in accordance with a determination that the variable frame rate criteria are not satisfied, maintaining the updating of the representation of the field-of-view of the one or more cameras at the third frame rate.

17. The method of claim 16, wherein the low-light variable frame rate criteria include a criterion that is satisfied when a flash mode is inactive.

18. The method of claim 15, wherein displaying the media capture user interface includes:

in accordance with a determination that the variable frame rate criteria are satisfied, displaying an indication that a variable frame rate mode is active; and in accordance with a determination that the variable frame rate criteria are not satisfied, displaying the media capture user interface without the indication that the variable frame rate mode is active.

19. The method of claim 15, wherein the second frame rate is based on an amount of ambient light in the field-of-view of the one or more cameras being below second threshold value.

20. The method of claim 15, wherein the detected changes include detected movement, and wherein the second frame rate is based on an amount of the detected movement.

21. The method of claim 15, wherein the movement criteria includes a criterion that is satisfied when the detected changes in the field-of-field of the one or more cameras correspond to movement of the electronic device that is greater than a movement threshold value.

* * * * *

UNITED STATES PATENT AND TRADEMARK OFFICE

CERTIFICATE OF CORRECTION

PATENT NO. : 10,735,642 B1
APPLICATION NO. : 16/584044
DATED : August 4, 2020
INVENTOR(S) : Behkish J. Manzari et al.

It is certified that error appears in the above-identified patent and that said Letters Patent is hereby corrected as shown below:

On the Title Page

Column 1, Line 3 ((Residence of the Third Inventor), delete "Sa" and insert -- San --, therefor.

In the Claims

In Claim 7, Column 317, Line 31, delete "field-of-field" and insert -- field-of-view --, therefor.

In Claim 8, Column 318, Line 14, delete "if" and insert -- of --, therefor.

In Claim 8, Column 318, Line 15, delete "a" and insert -- the --, therefor.

In Claim 11, Column 318, Line 38, delete "claim 9," and insert -- claim 8, --, therefor.

In Claim 12, Column 318, Line 48, delete "claim 9," and insert -- claim 8, --, therefor.

In Claim 12, Column 318, Line 50, after "below" insert -- a --.

In Claim 13, Column 318, Line 52, delete "claim 9," and insert -- claim 8, --, therefor.

In Claim 14, Column 318, Line 56, delete "claim 9," and insert -- claim 8, --, therefor.

In Claim 14, Column 318, Line 58, delete "field-of-field" and insert -- field-of-view --, therefor.

In Claim 15, Column 319, Line 39, delete "if" and insert -- of --, therefor.

In Claim 15, Column 319, Line 40, delete "a" and insert -- the --, therefor.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*

In Claim 19, Column 320, Line 29, after “below” insert -- a --.

In Claim 21, Column 320, Line 37, delete “field-of-field” and insert -- field-of-view --, therefor.